United States Patent [19]

Edblad et al.

[11] 4,227,245

[45] Oct. 7, 1980

[54] DIGITAL COMPUTER MONITORED SYSTEM OR PROCESS WHICH IS CONFIGURED WITH THE AID OF AN IMPROVED AUTOMATIC PROGRAMMING SYSTEM

[75] Inventors: Warren A. Edblad; John W. Gomola, both of Pittsburgh; Frank E. Wallace, Irwin; William G. Wood; F. David Jones, both of Pittsburgh, all of Pa.

[73] Assignee: Westinghouse Electric Corp., Pittsburgh, Pa.

[21] Appl. No.: 258,800

[22] Filed: Jun. 1, 1972

[51] Int. Cl.[2] .............................................. B21B 37/00

[52] U.S. Cl. .................................... 364/468; 364/300; 364/200

[58] Field of Search ........................ 235/151.21, 151.3; 415/17; 60/73, 105; 340/172.5; 444/1; 364/200, 300, 103, 107, 492, 468, 472, 550

[56] References Cited

PUBLICATIONS

Application of the Prodac 50 System to Direct Digital Control, J. C. Belz, G. J. Kirk & P. S. Radcliffe, IEEE Intl. Conv. Rec. Part 3, 1965, pp. 102–122.

*Primary Examiner*—Edward J. Wise
*Attorney, Agent, or Firm*—E. F. Possessky

[57] ABSTRACT

An industrial production or other operational system is established by connecting apparatus which implements system operations to a digital computer system using an interface system. Machine readable definitions of events, of executable jobs, and of system variables are prepared for computer entry and ultimately for configuration of the system apparatus into an entity having operational characteristics corresponding to the entered definitions.

The definitions of system variables may include definitions of signals which are coupled between the system apparatus and the computer through the interface system, and such signals may be put to system monitoring or control uses or both of these uses in the structured system. Some of the definitions may be computer programs, but most are preferably definitions of the system configuration written out in a language which a systems engineer can understand and use. Generally, definitions may include designators which are names or numbers.

Any definition may refer to an event, a job, or a variable by making reference to the designator that is included in the definition of the event, the job or the variable. Executable job definitions may, by referring to event designators, specify specific events which are to trigger their execution—for example, variable scanning events or variable change-of-state events—or they may specify that they are to be periodically executed at a specified frequency or rate. The definitions are processed individually by an off-line preliminary processor which converts the systems engineer's language into a numeric language intelligible to processing programs within the computer system or to the computer system itself. The definitions are then fed into the computer system.

Automatic programming means within the computer system establish all the necessary linkages between each new definition and previously entered definitions and other operative portions of the computer system so as to implement each definition relative to the system apparatus as soon as the definition is received and so as automatically to establish the desired system operating configuration through the controlled operation of the computer relative to the interfaced system apparatus.

Definitions may be deleted from the computer system at any time and in any order by the automatic programming means without shutting down the system, and the system operating configuration may thus be modified whenever necessary or desirable. Following such deletions, the automatic programming means eliminates linkages which are no longer required and compresses the tables in which such linkages may be stored so as to maximize the storage space which is available for additional new definitions and their associated linkages.

22 Claims, 452 Drawing Figures

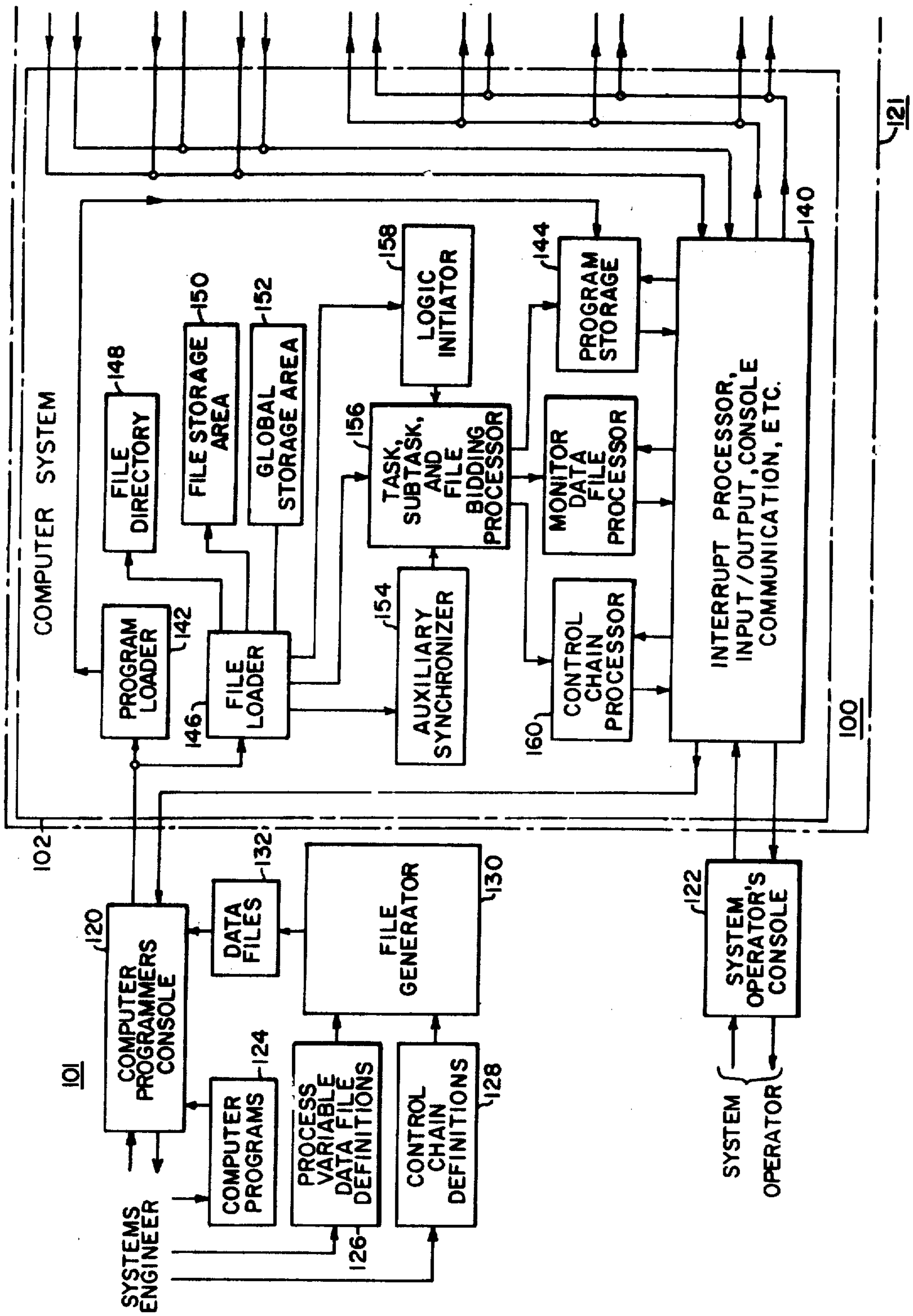
FIG. 1 PROCESS CONTROL SYSTEM

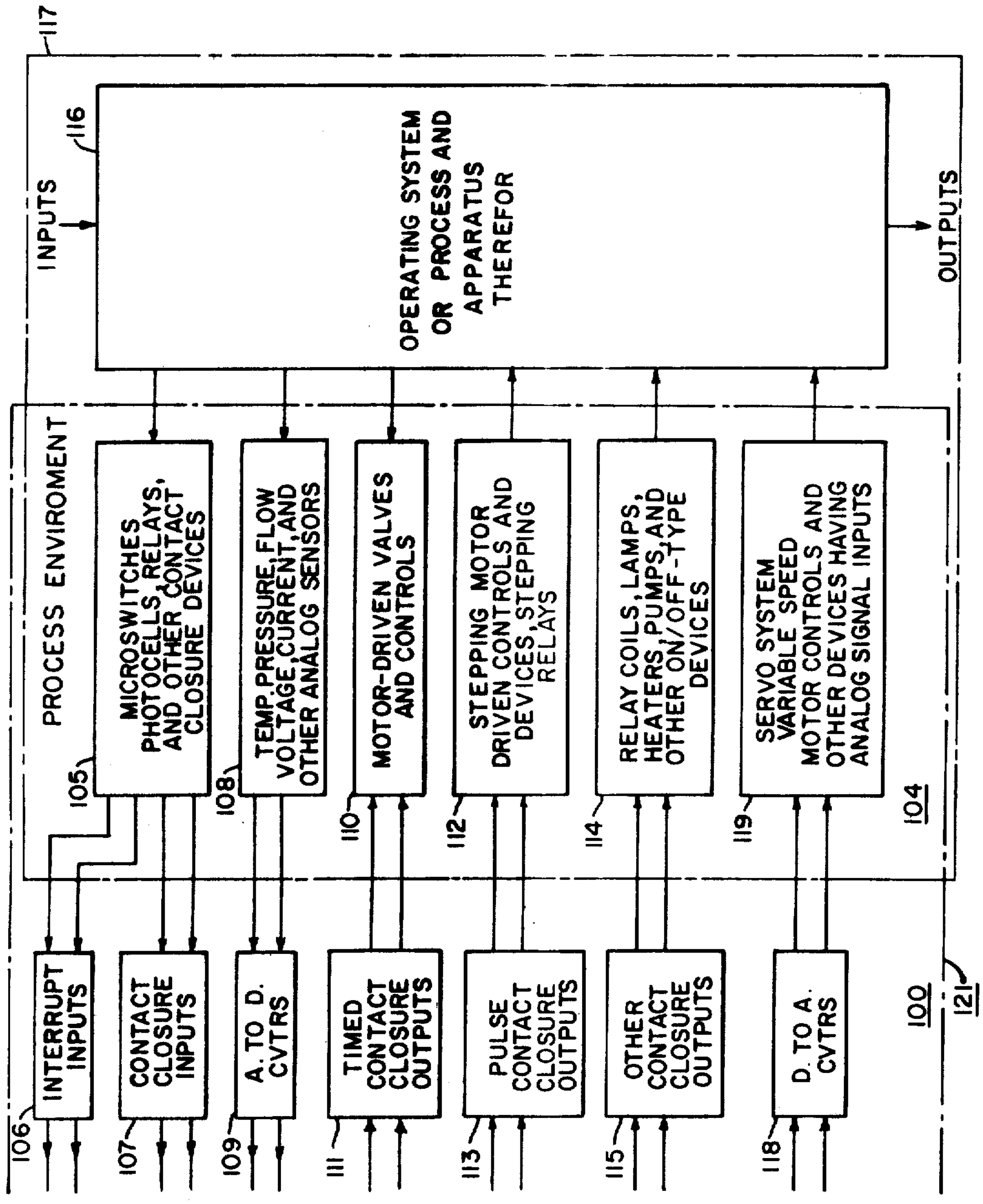
FIG. 1 PROCESS CONTROL SYSTEM (CONT.)

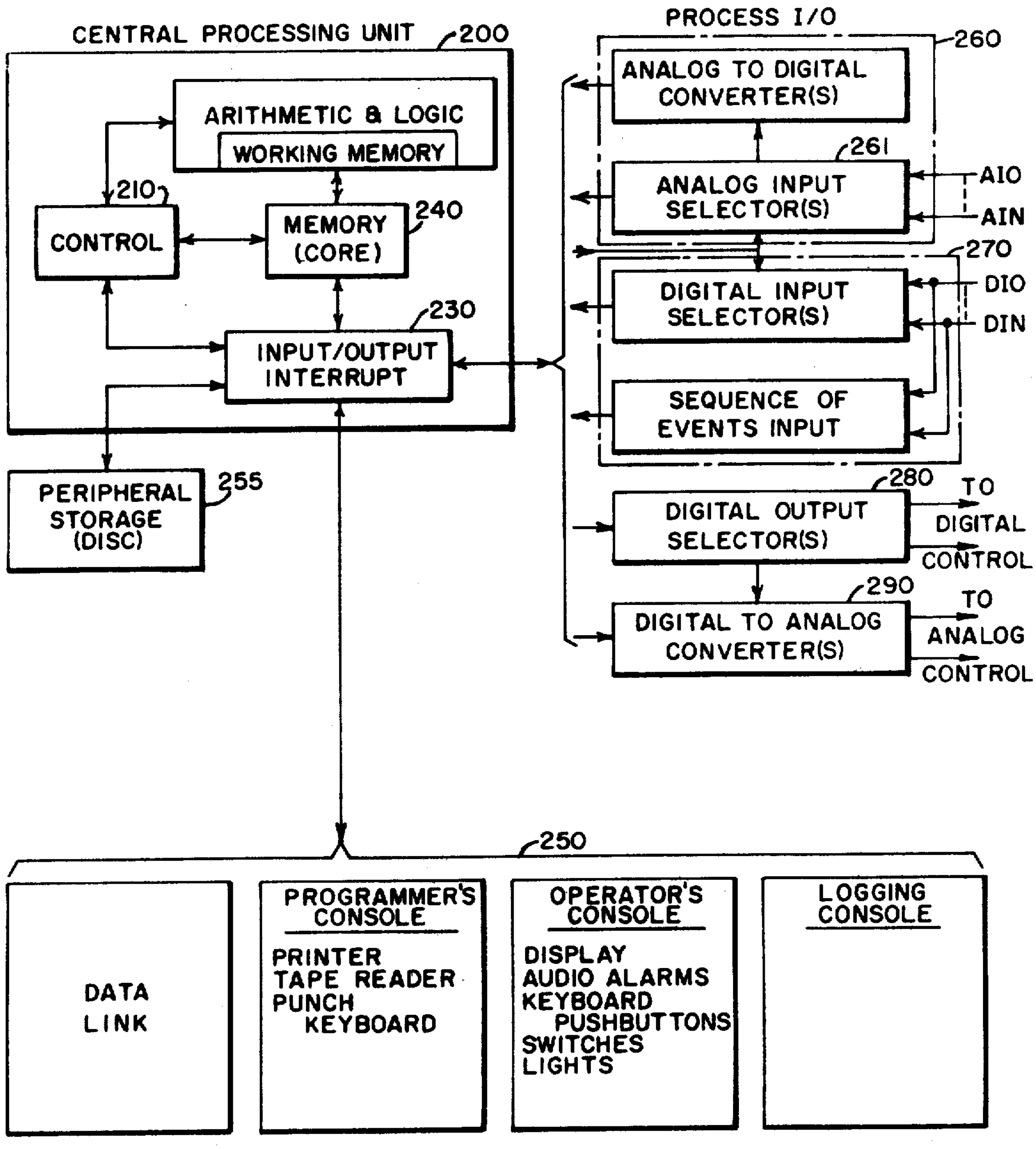
FIG. 2/1.

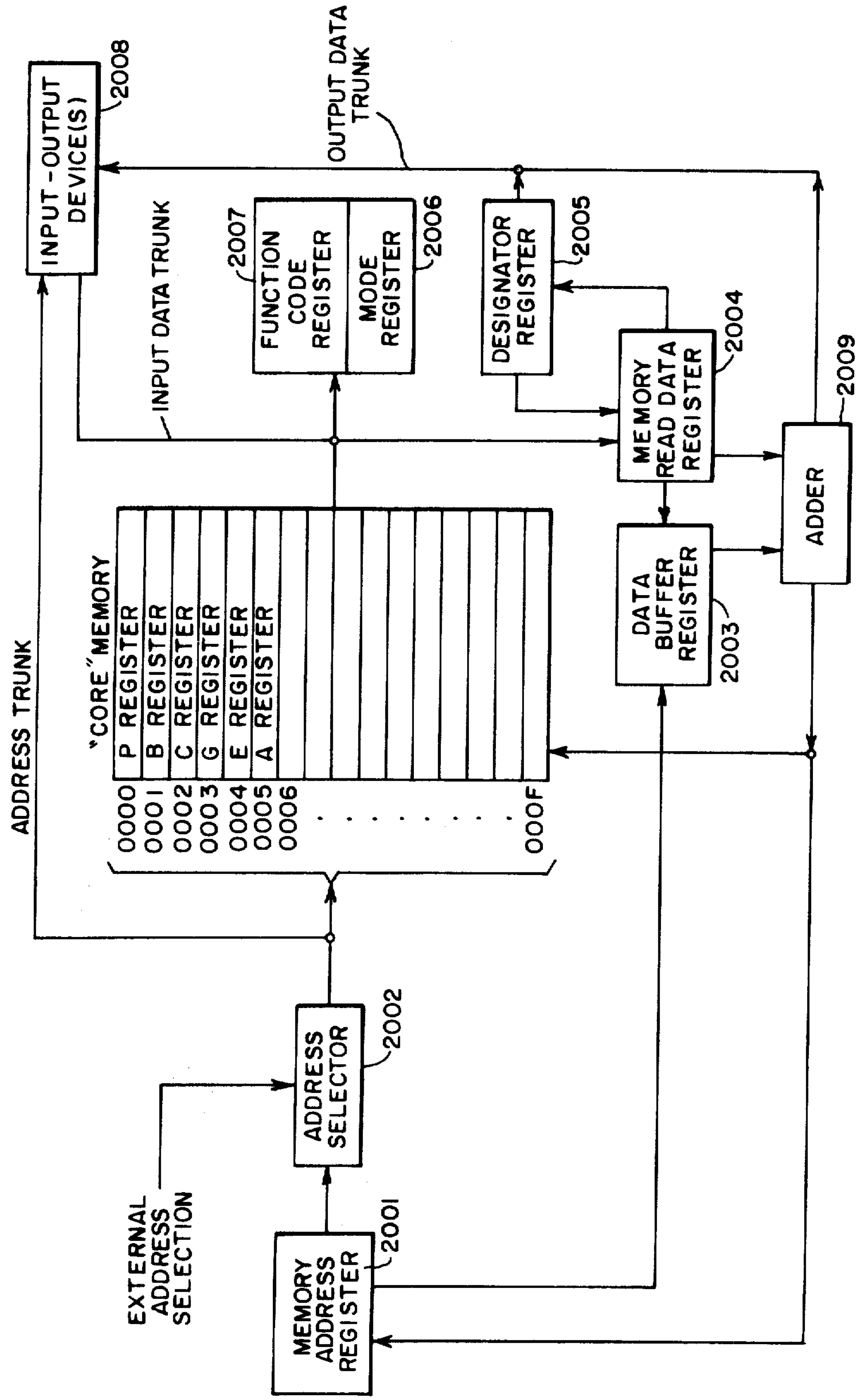
FIG. 2/2 ARITHMETIC AND LOGIC

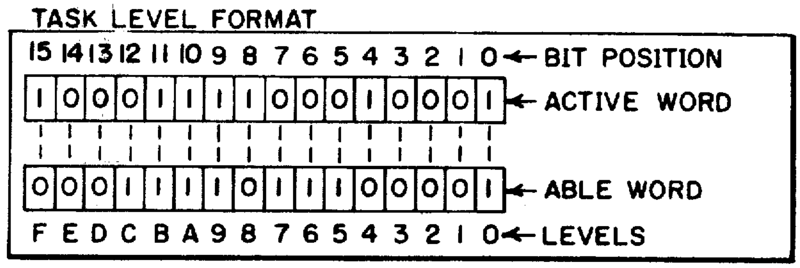
FIG. 2/3A.
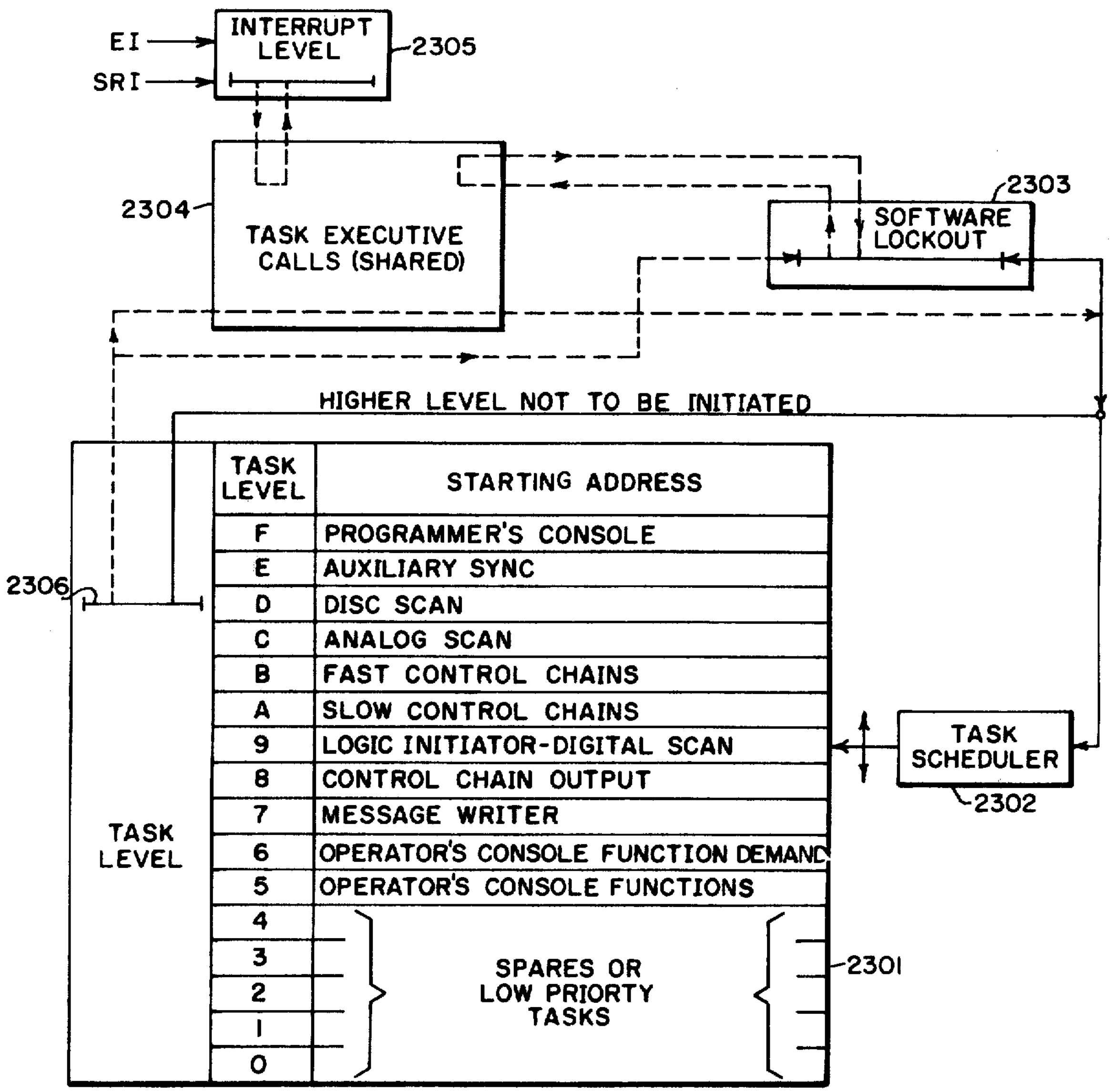
FIG. 2/3B.

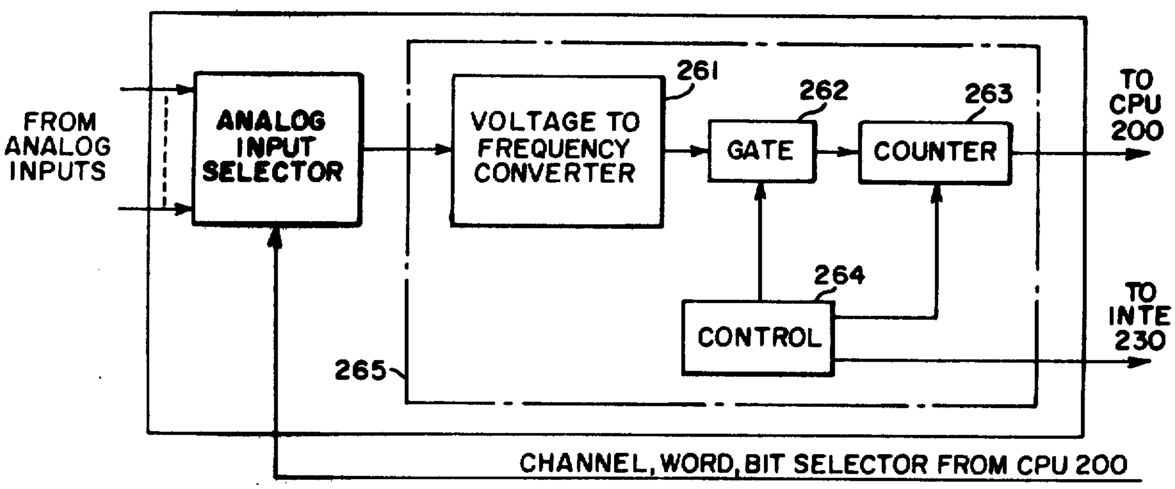
FIG. 2/4A.
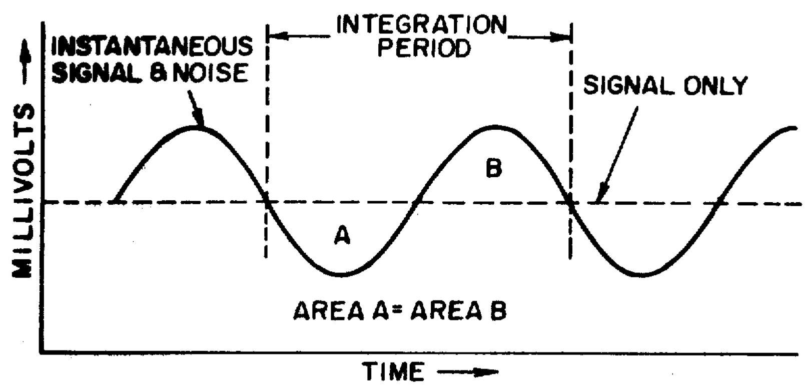
FIG. 2/4B.

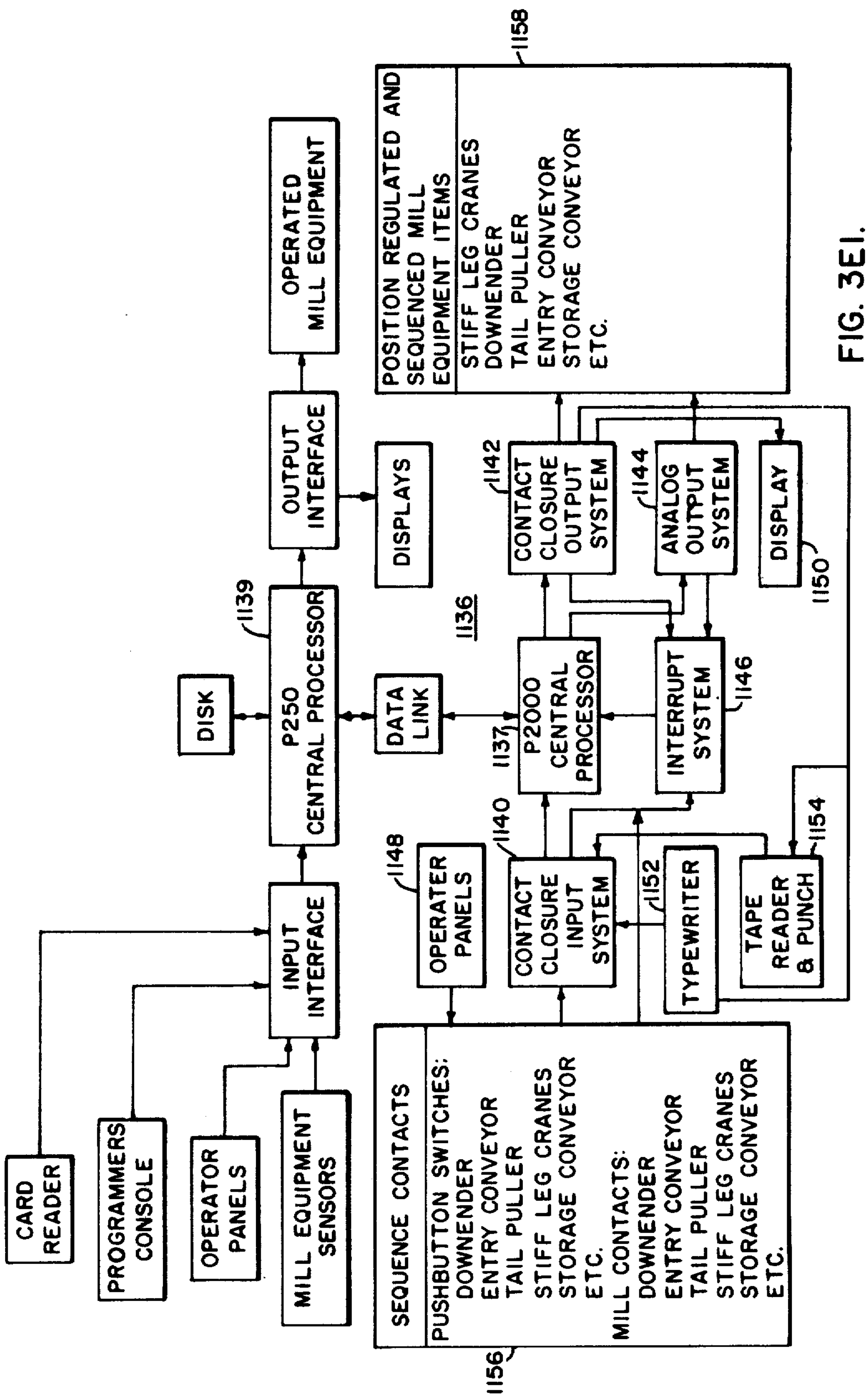
FIG. 3E1.

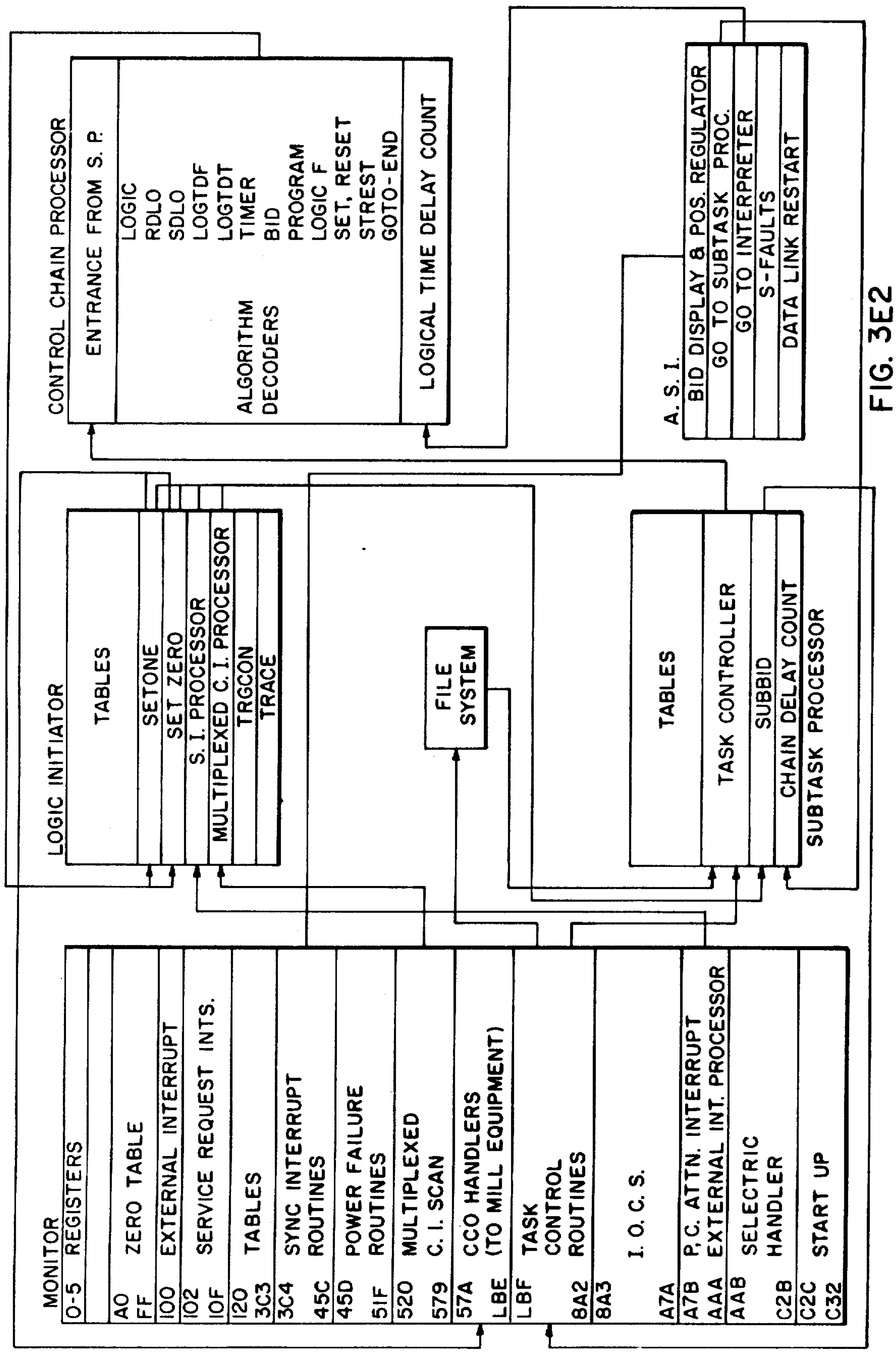
FIG. 3E2

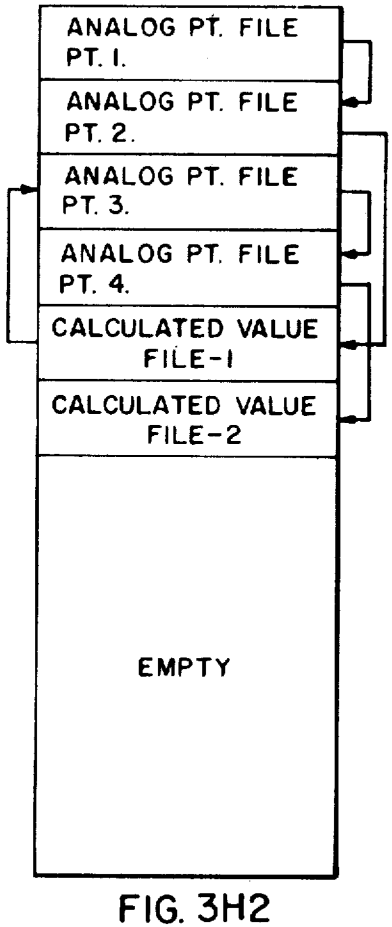
FIG. 3H2
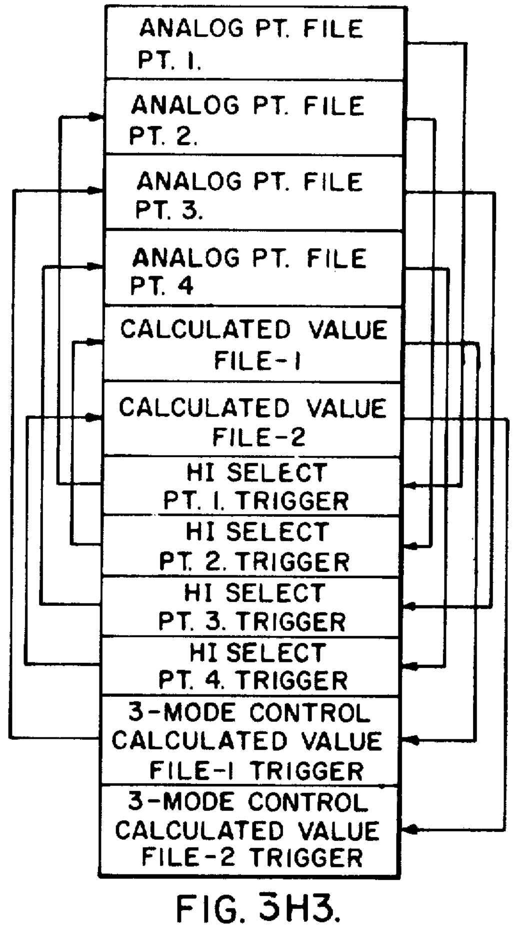
FIG. 3H3.
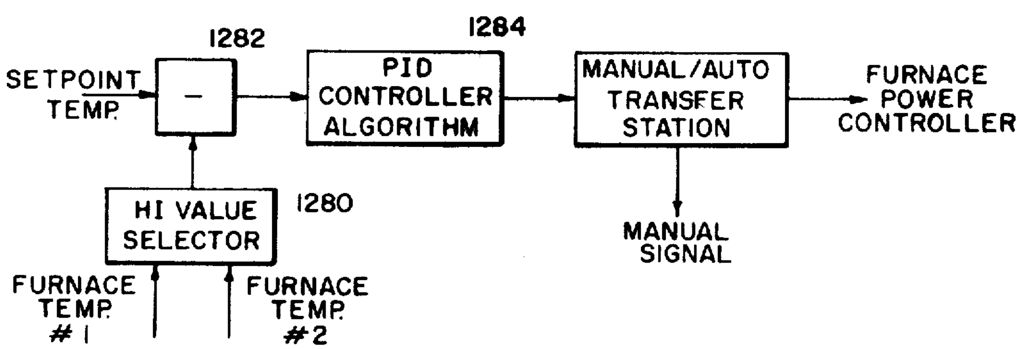
FIG. 3F.

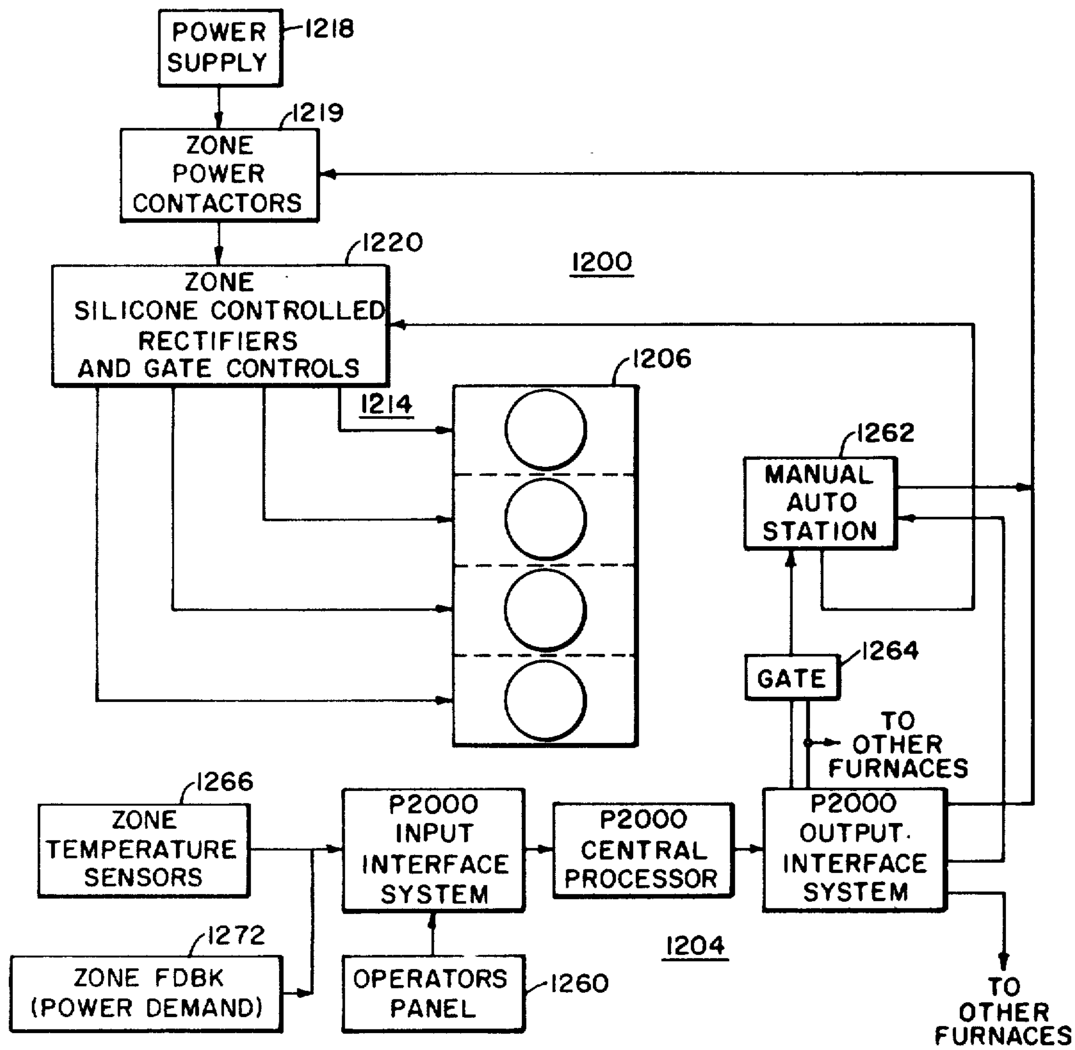
FIG. 3G1.
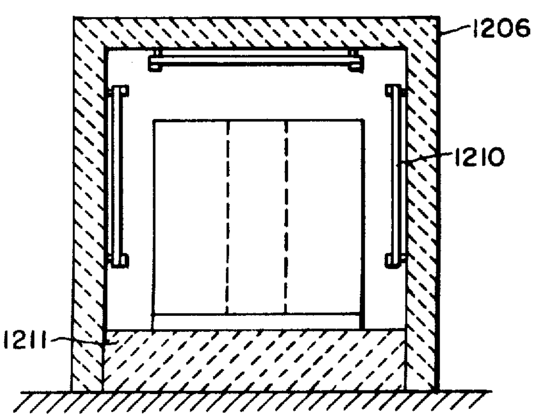
FIG. 3G2.

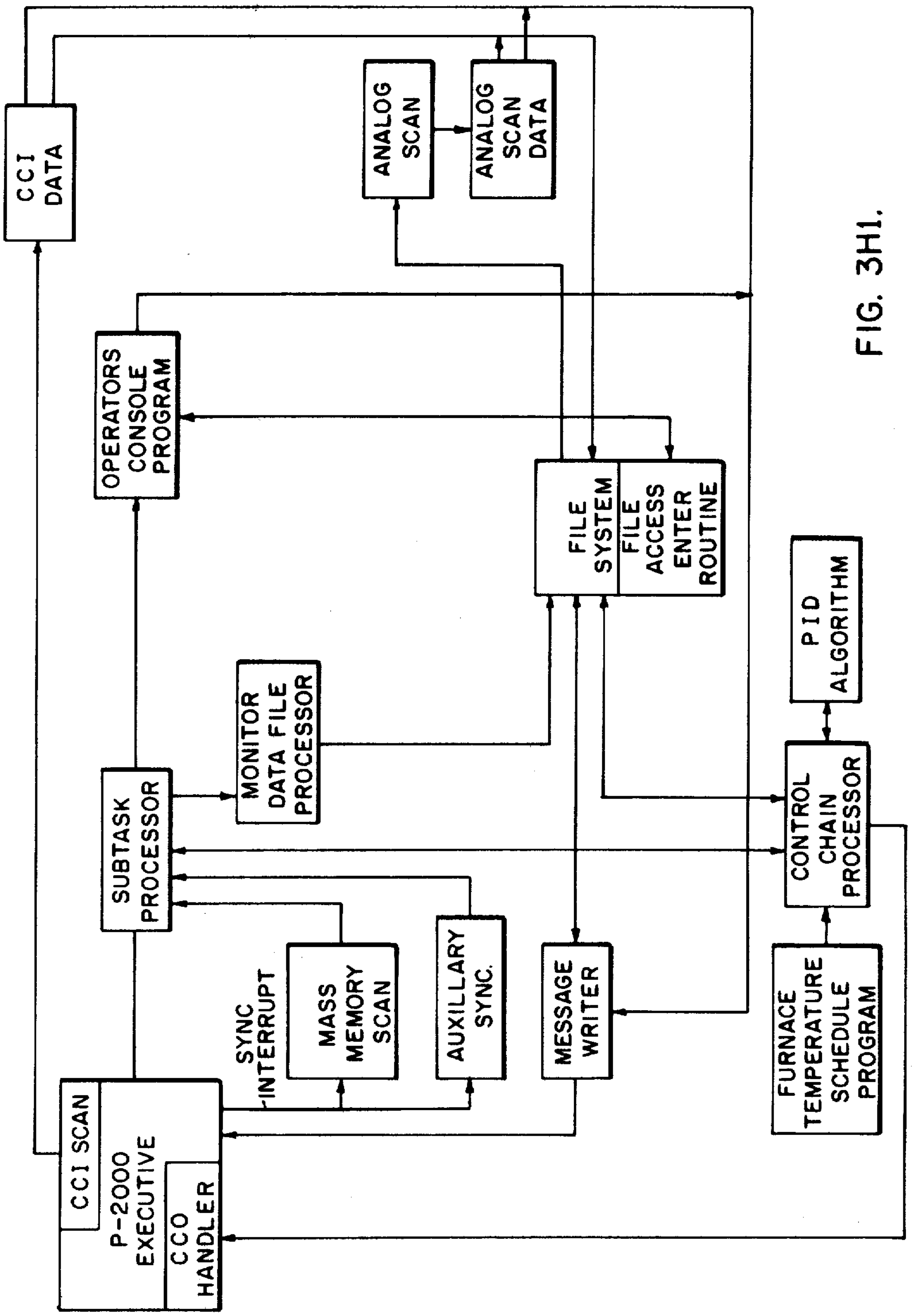
FIG. 3H1.

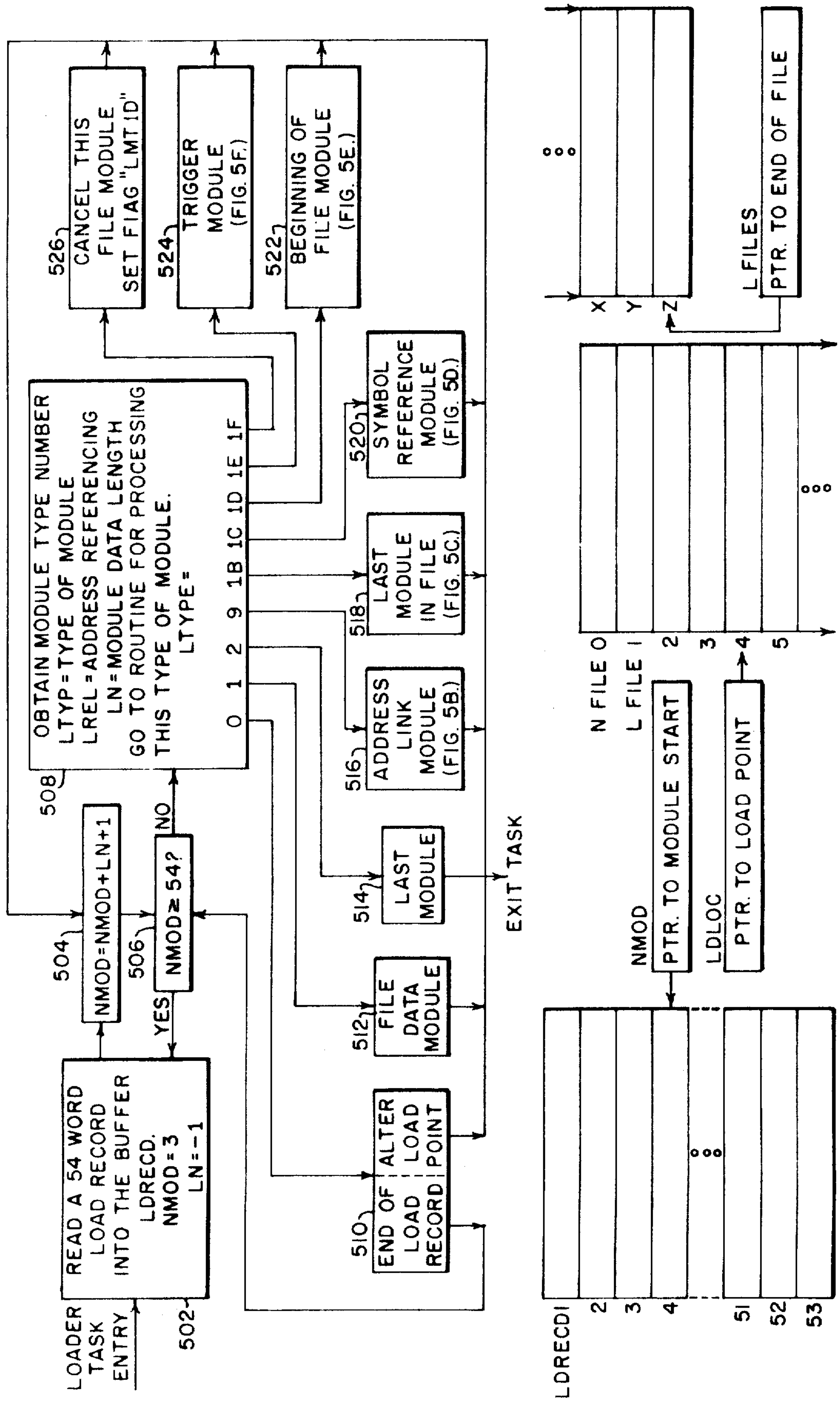
FIG. 5A. FILE LOADER

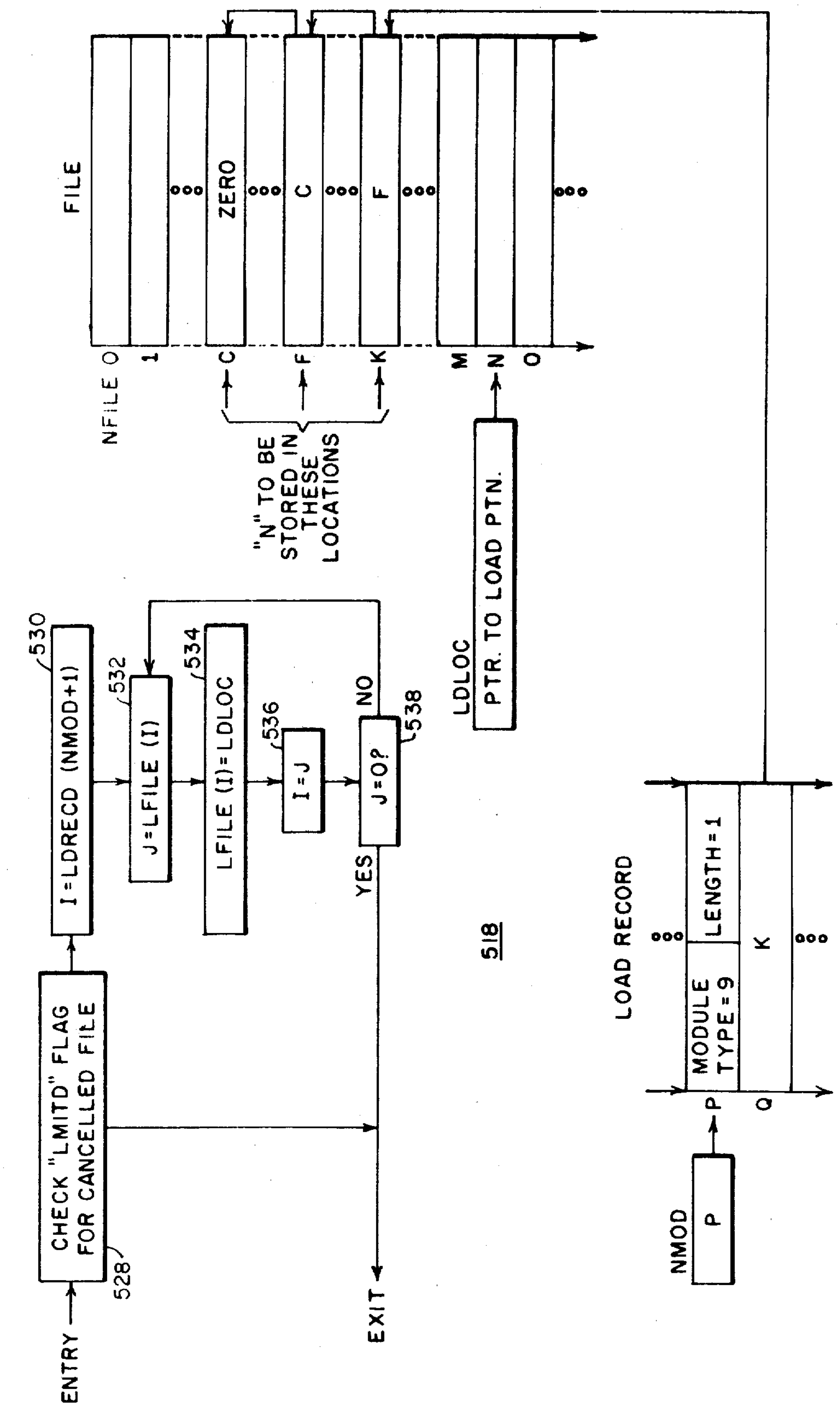
FIG. 5B. ADDRESS LINK MODULE ROUTINE

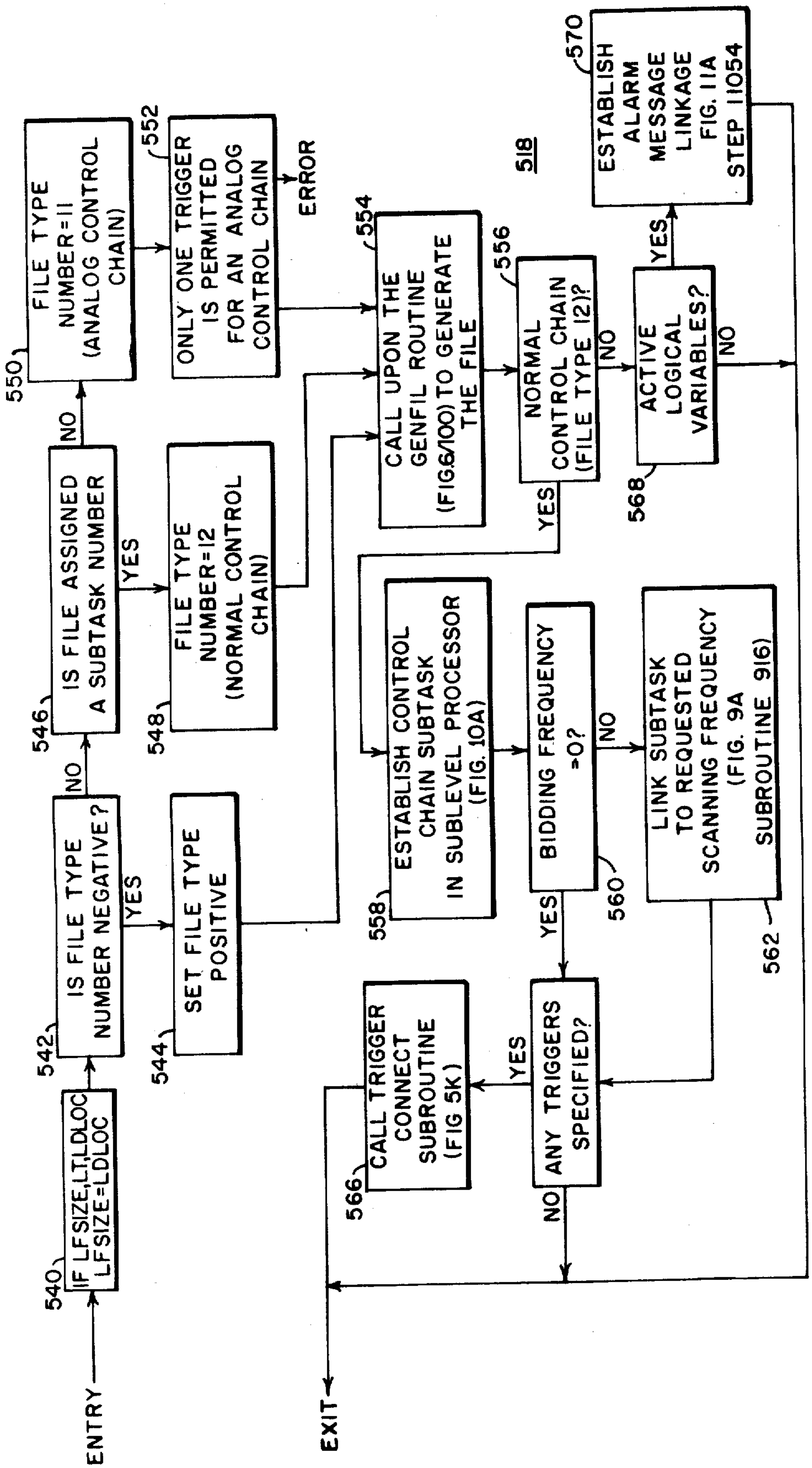
FIG. 5C. LAST MODULE IN FILE ROUTINE

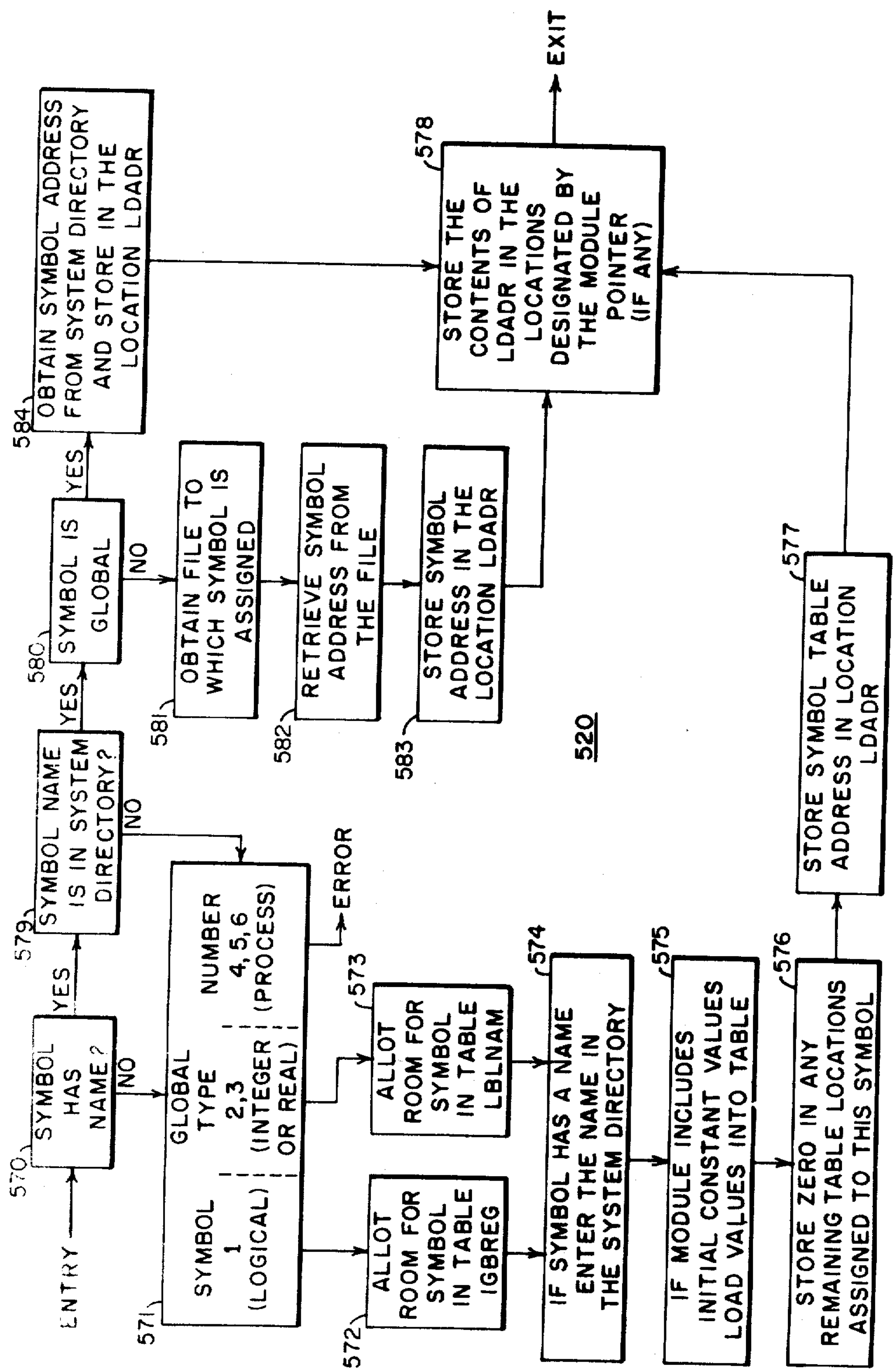
FIG. 5D. SYMBOL REFERENCE MODULE ROUTINE

FIG. 5E-BEGINNING OF FILE MODULE ROUTINE
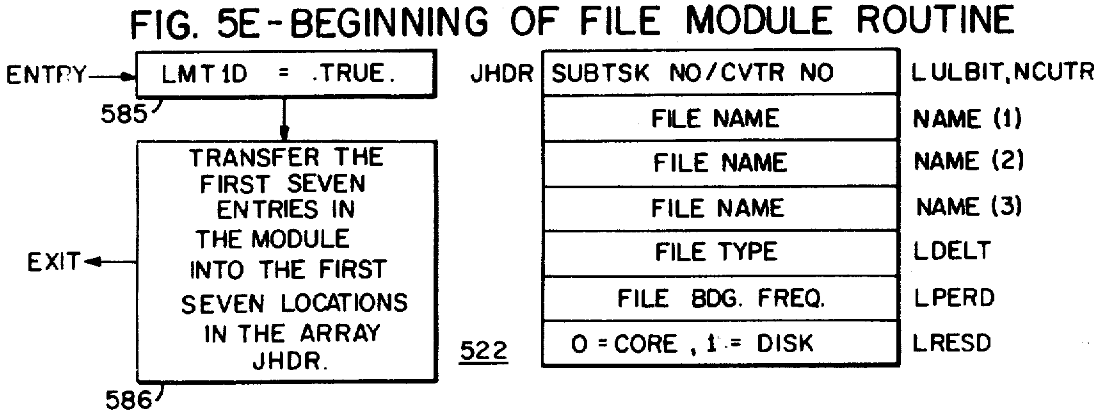
FIG. 5F-TRIGGER MODULE ROUTINE
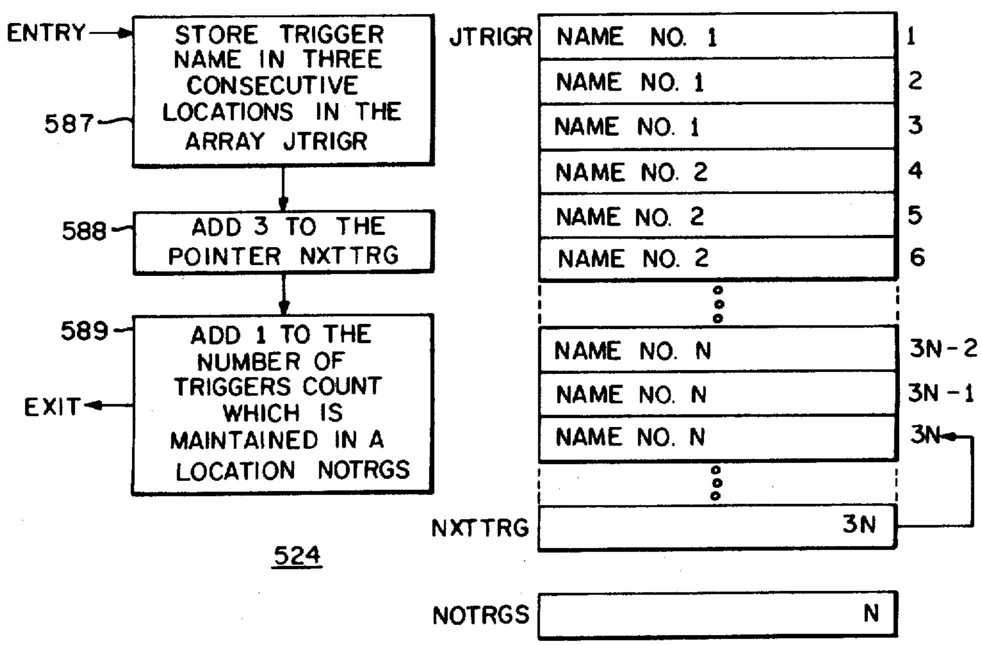

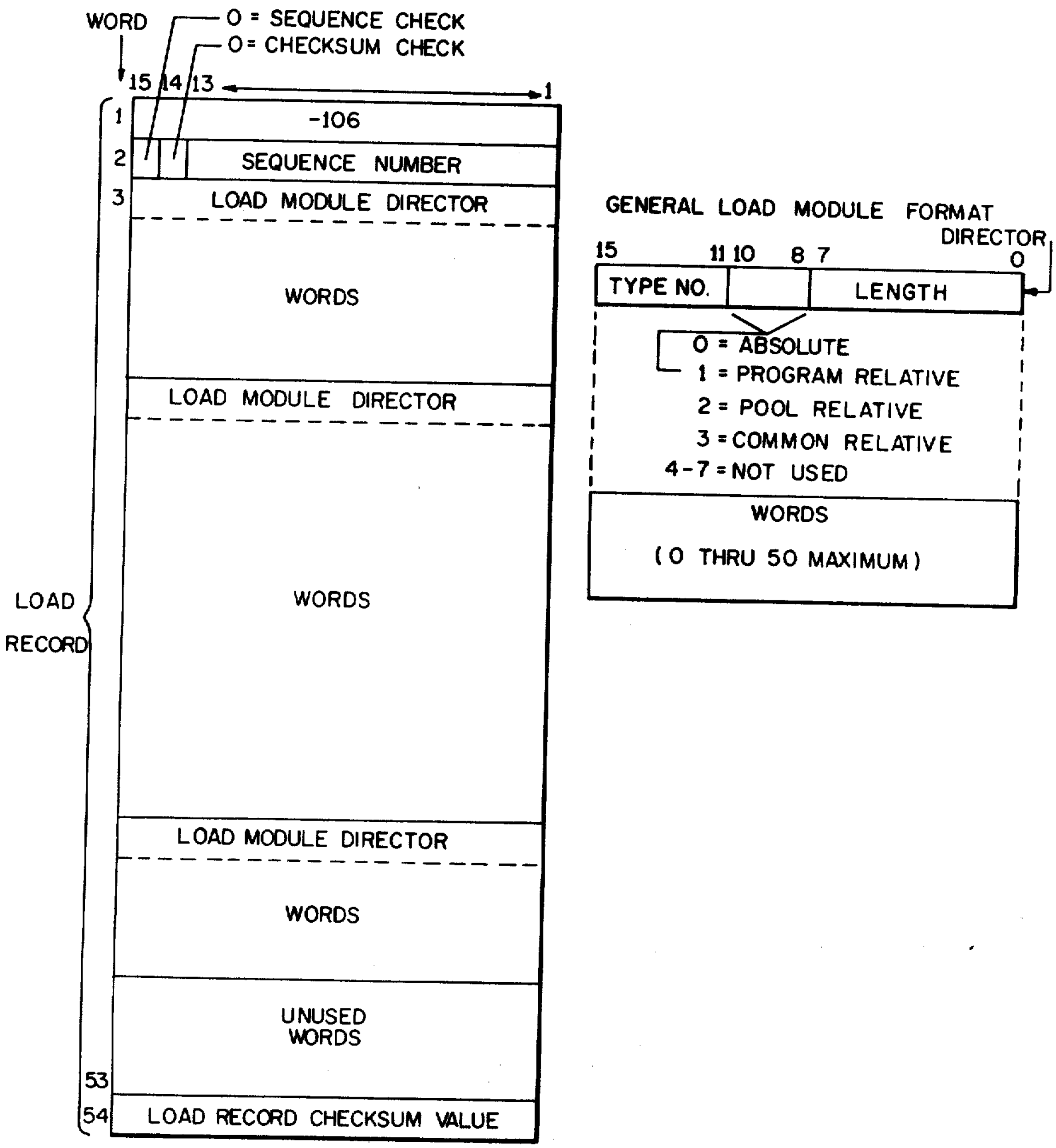
FIG. 5G - TYPICAL LOAD RECORD FORMAT

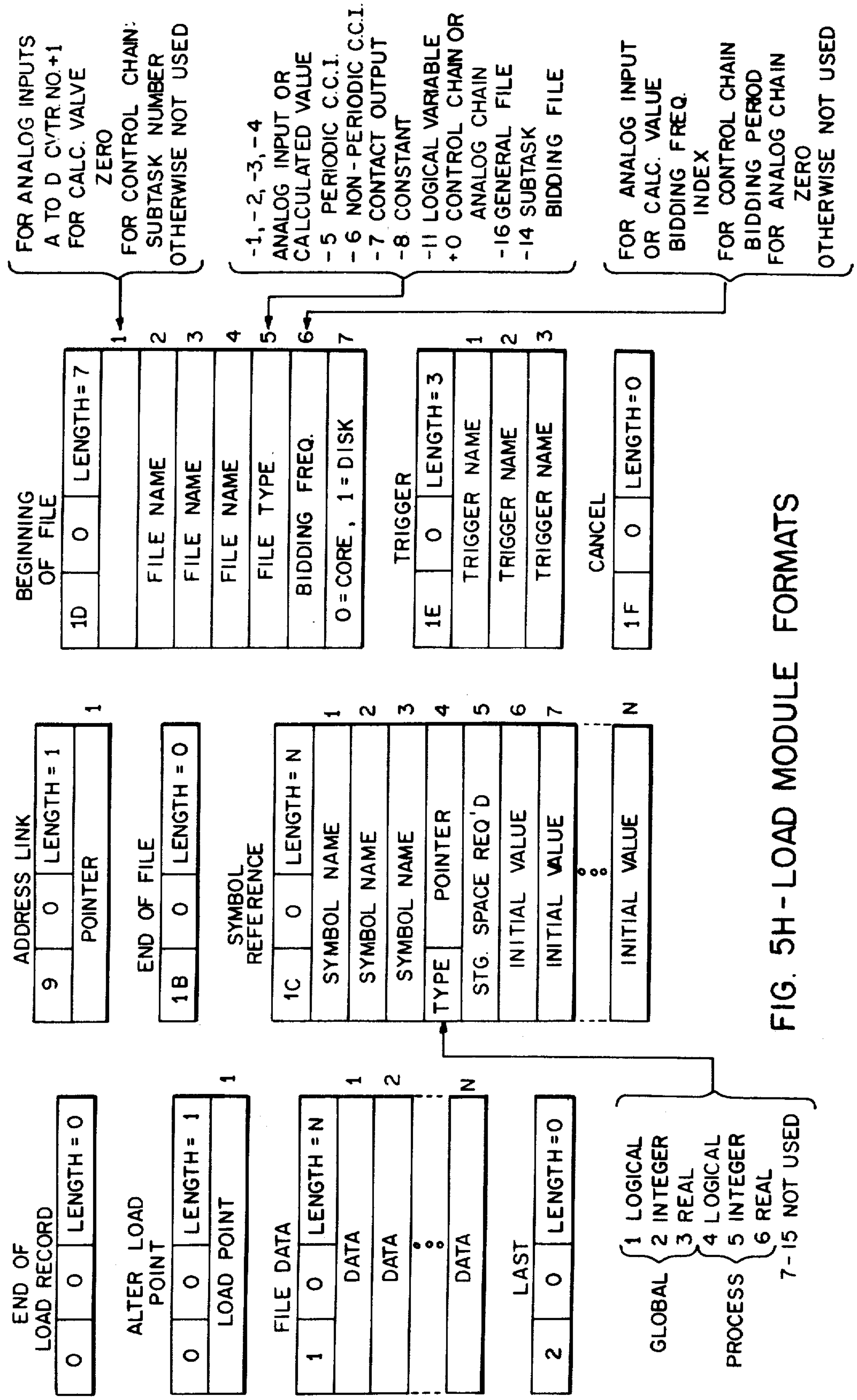
FIG. 5H - LOAD MODULE FORMATS

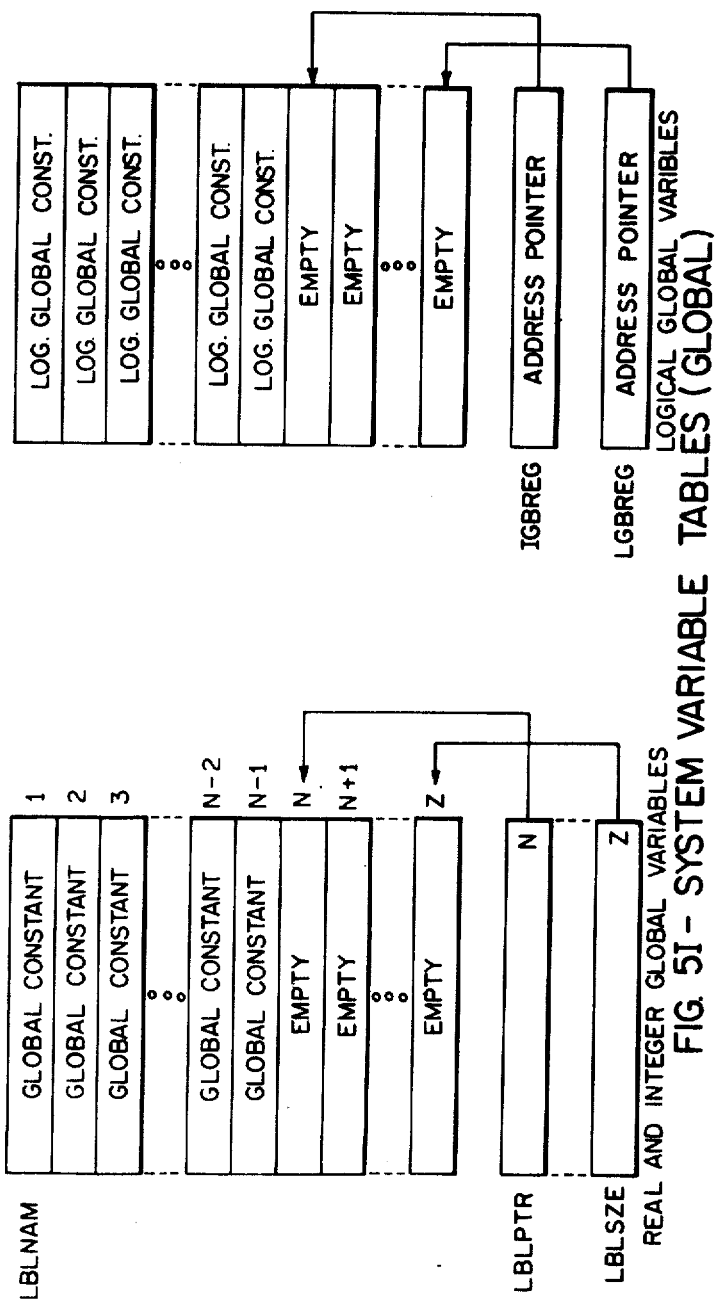
FIG. 5I - SYSTEM VARIABLE TABLES (GLOBAL)
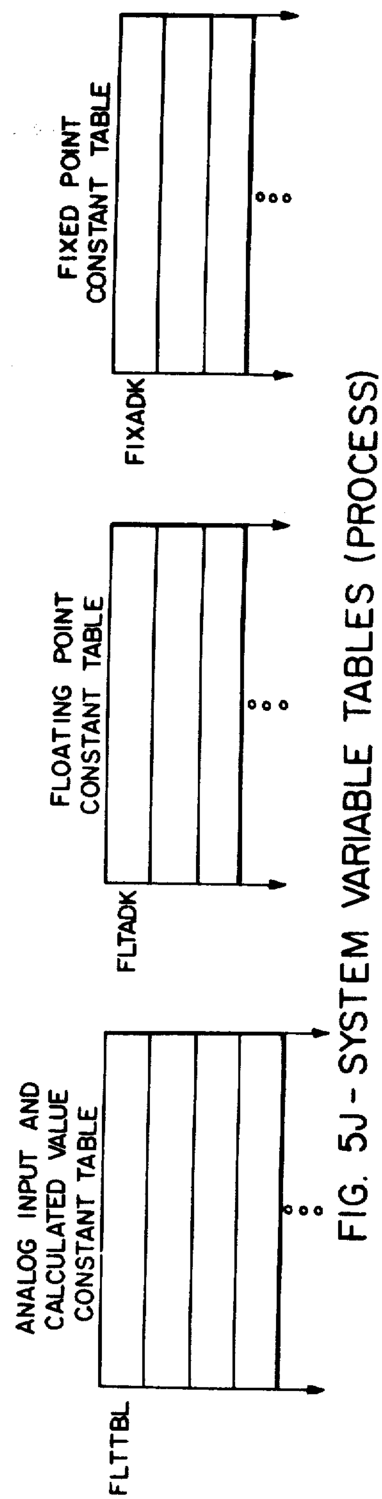
FIG. 5J - SYSTEM VARIABLE TABLES (PROCESS)

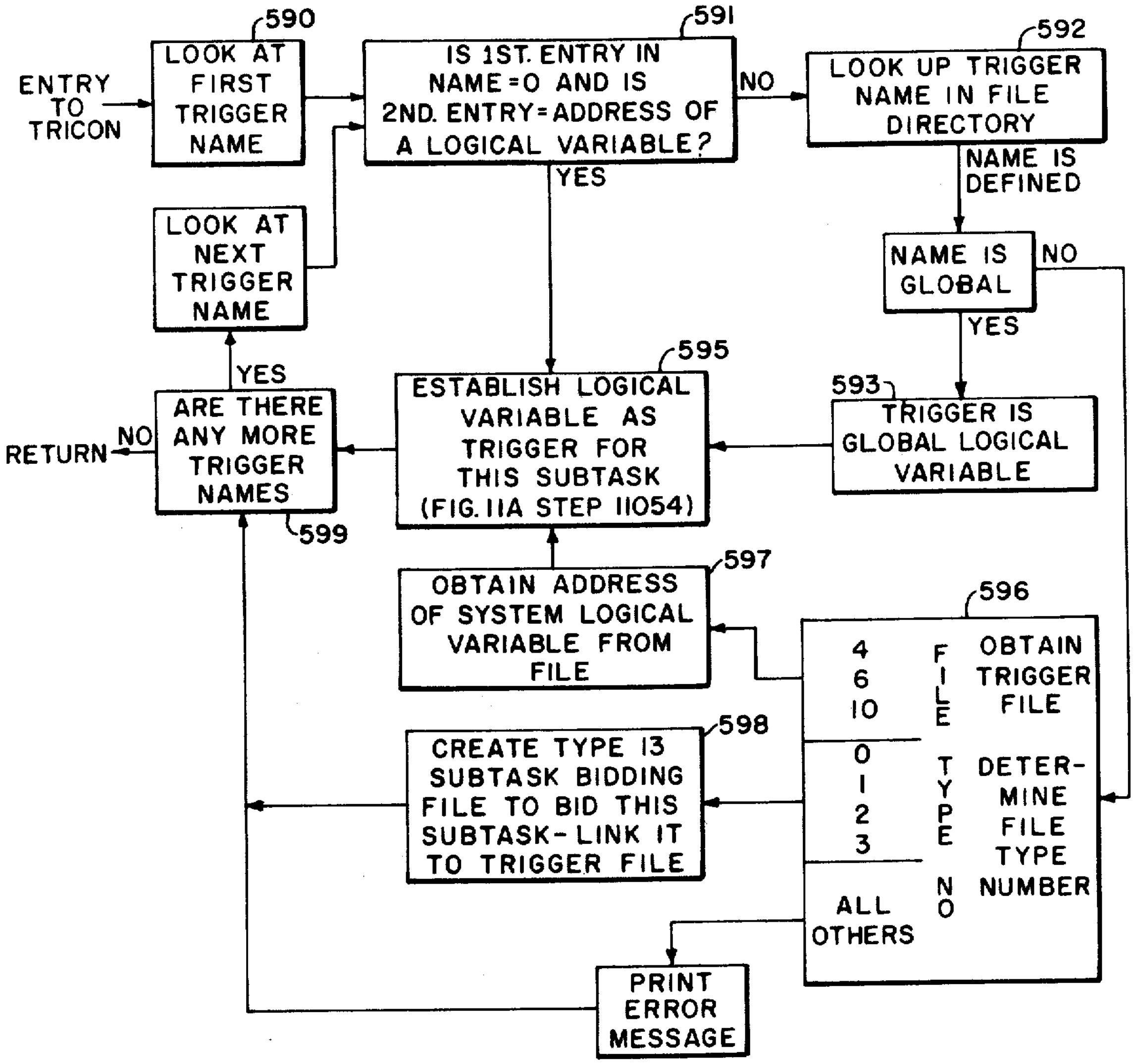
FIG. 5K TRIGGER CONNECT SUBROUTINE

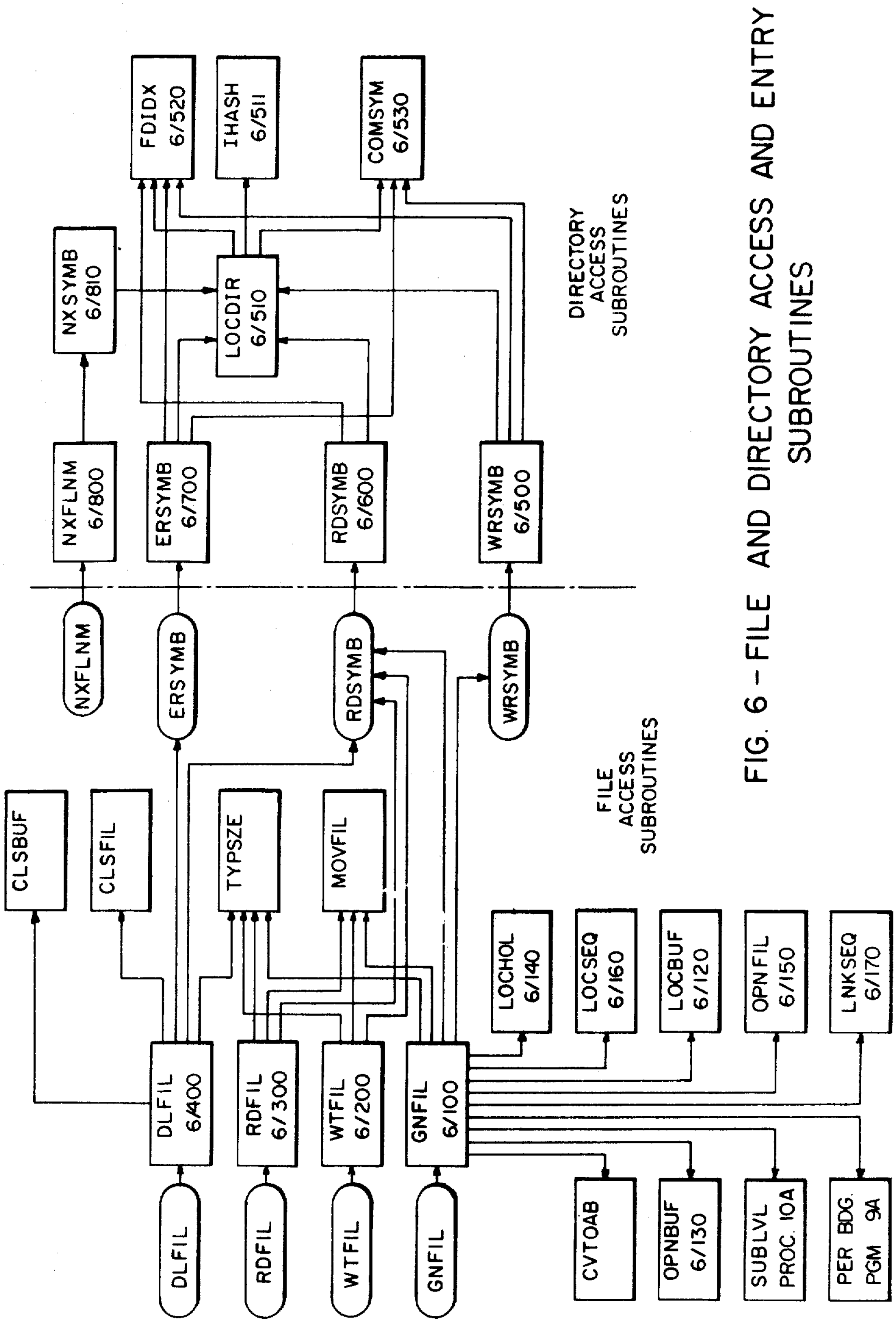
FIG. 6 - FILE AND DIRECTORY ACCESS AND ENTRY SUBROUTINES

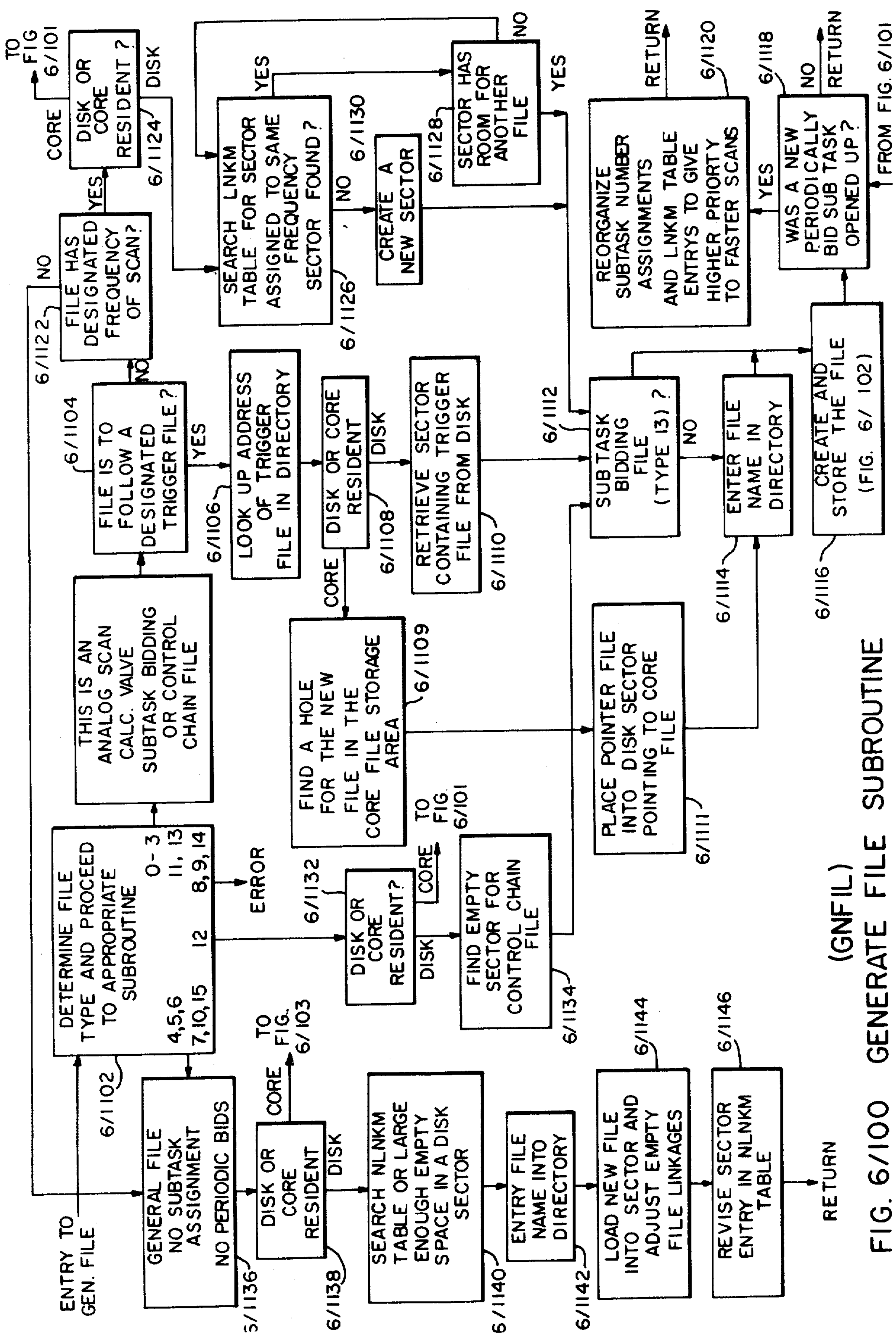
FIG. 6/100 GENERATE FILE SUBROUTINE (GNFIL)

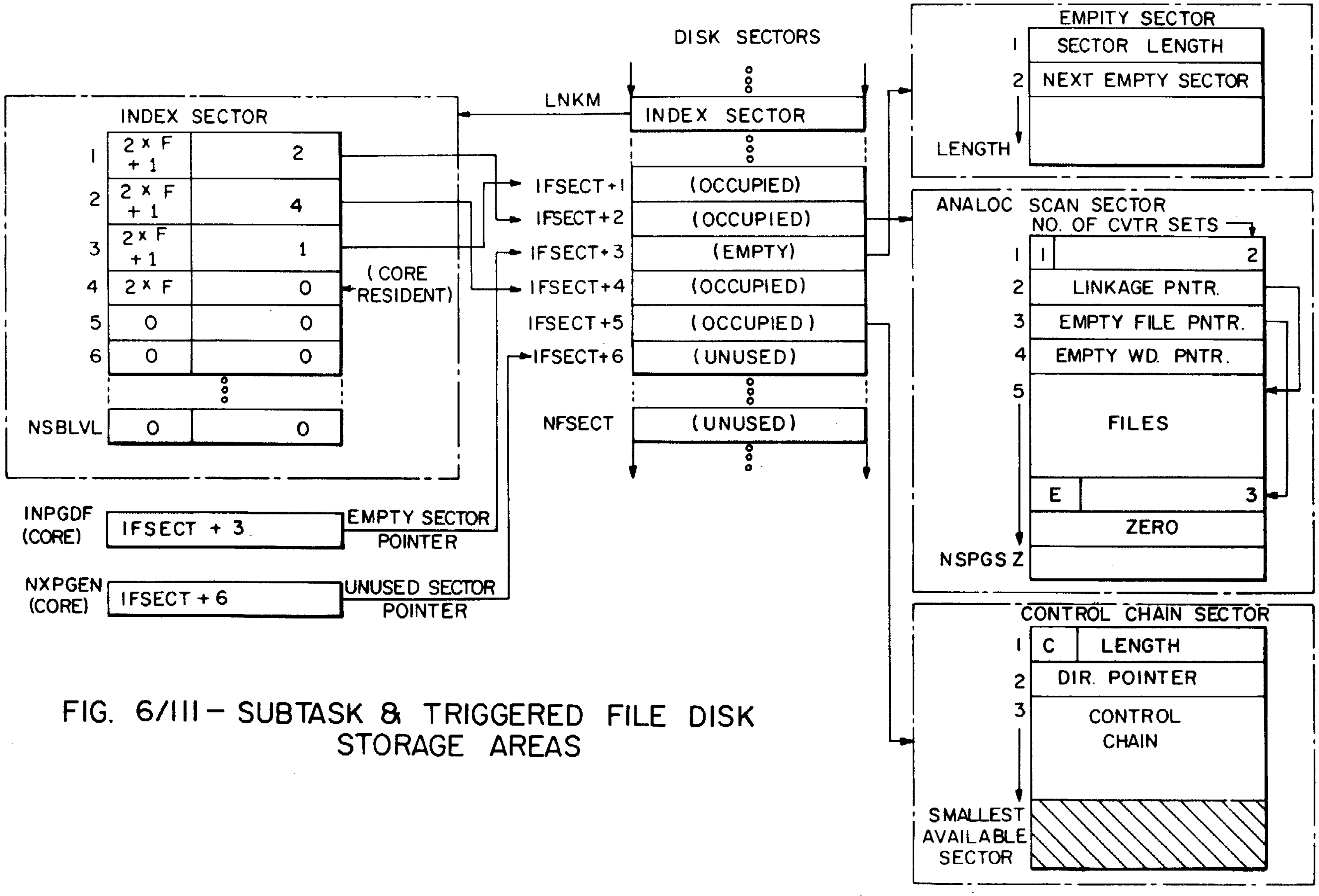
FIG. 6/III – SUBTASK & TRIGGERED FILE DISK STORAGE AREAS

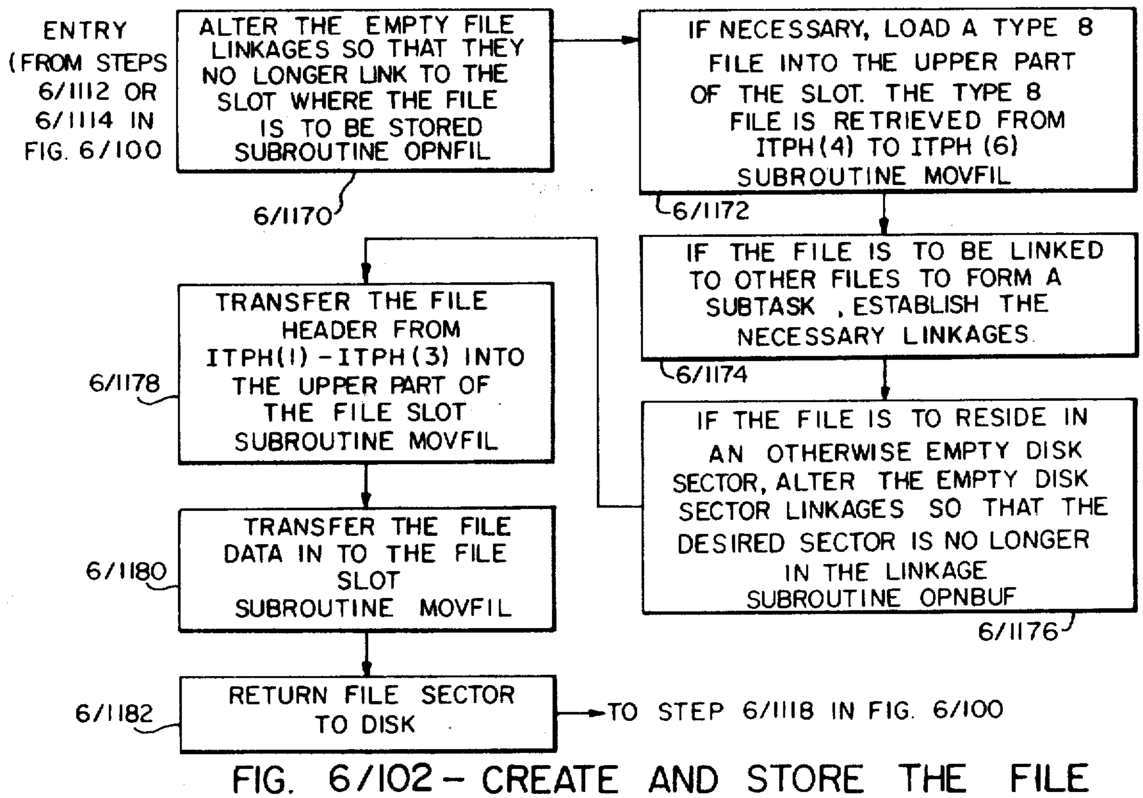
FIG. 6/102 - CREATE AND STORE THE FILE
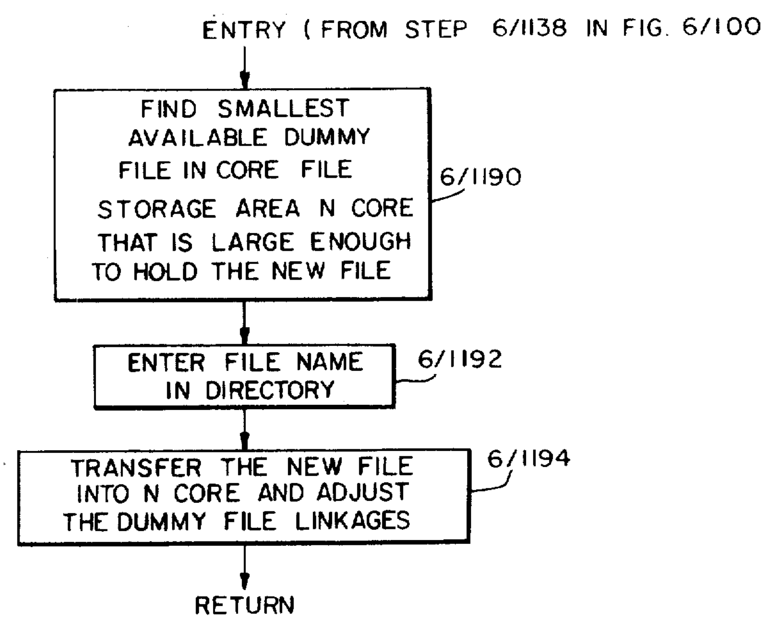
FIG. 6/103-CORE RESIDENT GENERAL FILE

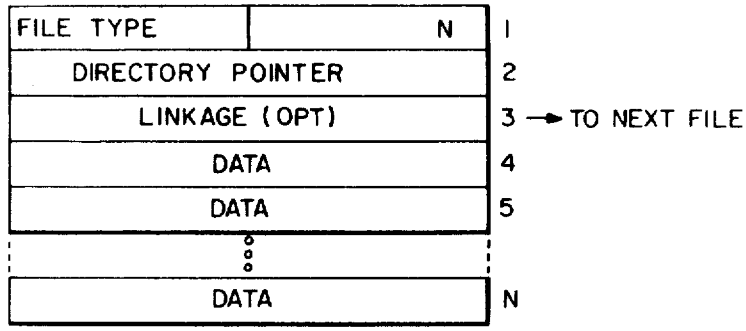
FIG. 6/104 - TYPICAL FILE FORMAT
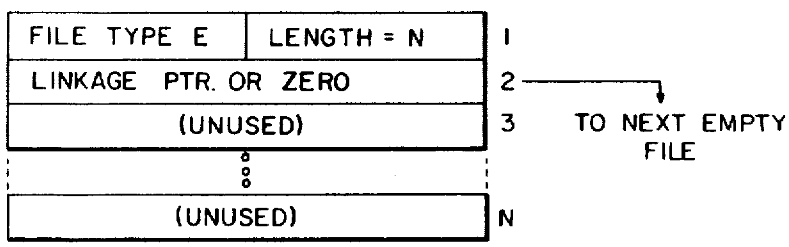
FIG. 6/105-EMPTY FILE FORMAT
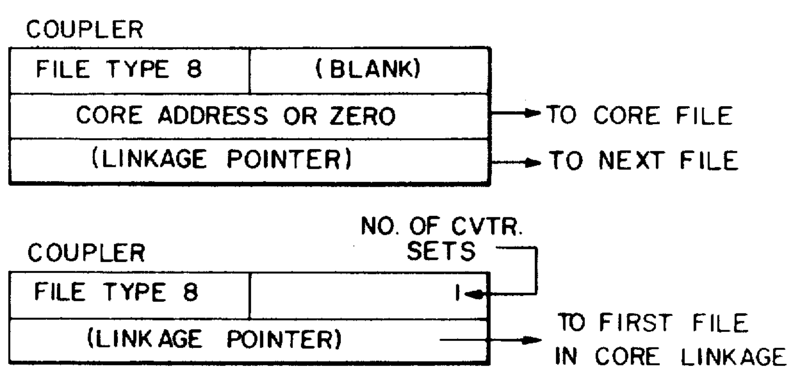
FIG. 6/106 - COUPLER FILE FORMAT

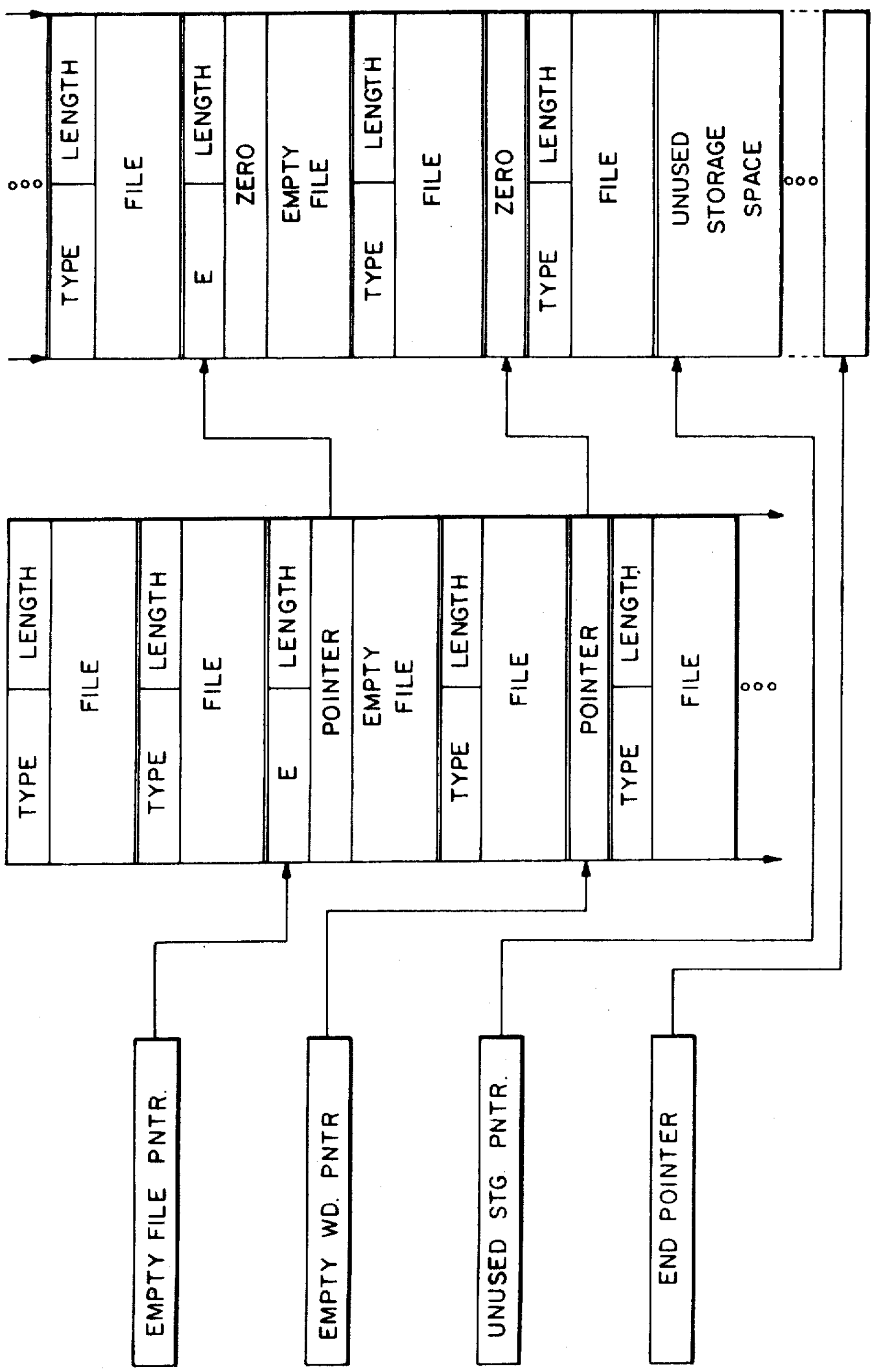
FIG. 6/107 – TYPICAL FILE STORAGE AREA

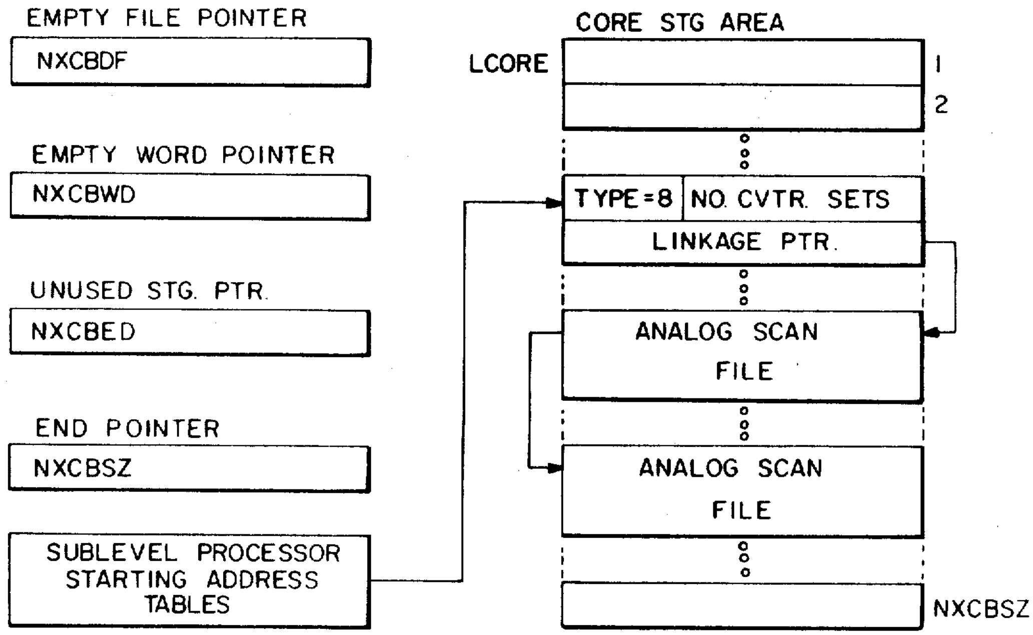
FIG. 6/108—SUBTASK & TRIGGERED FILE CORE STORAGE AREA
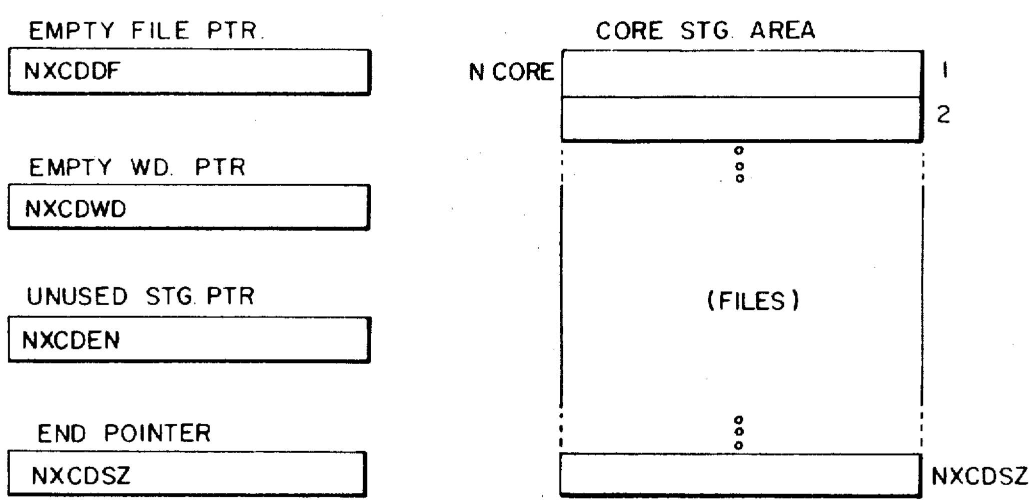
FIG. 6/109—GENERAL FILE CORE STORAGE AREA

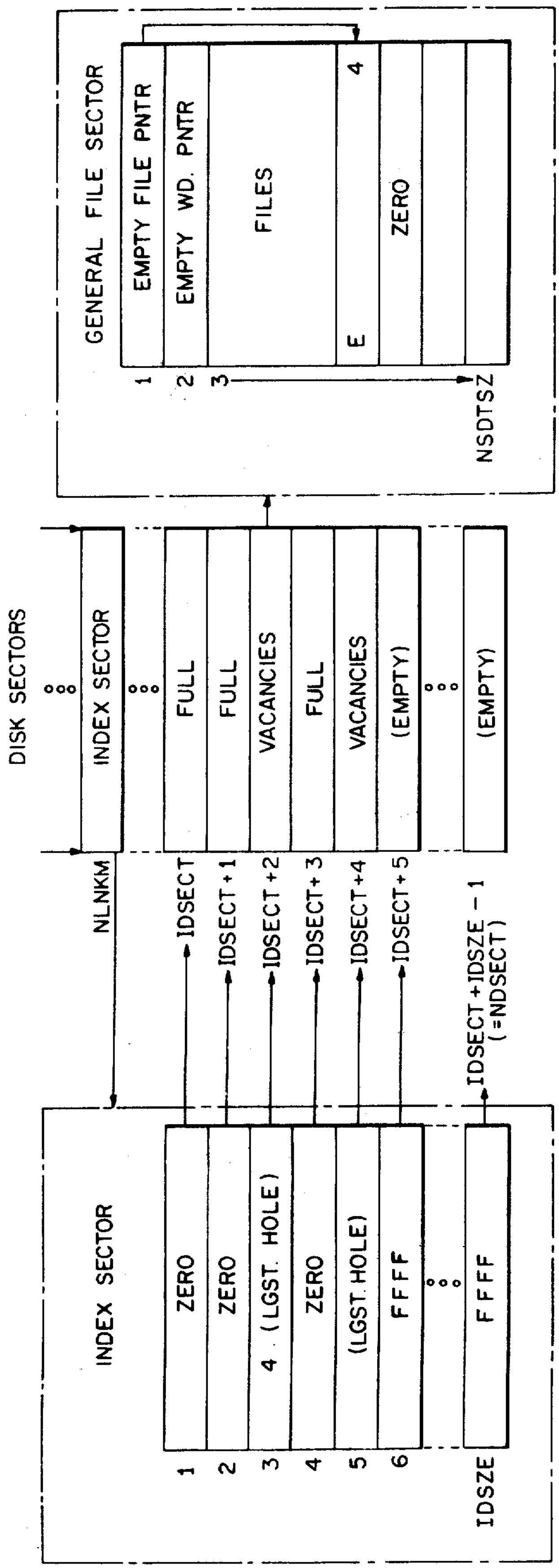
FIG. 6/110 - GENERAL FILE DISK STORAGE AREAS

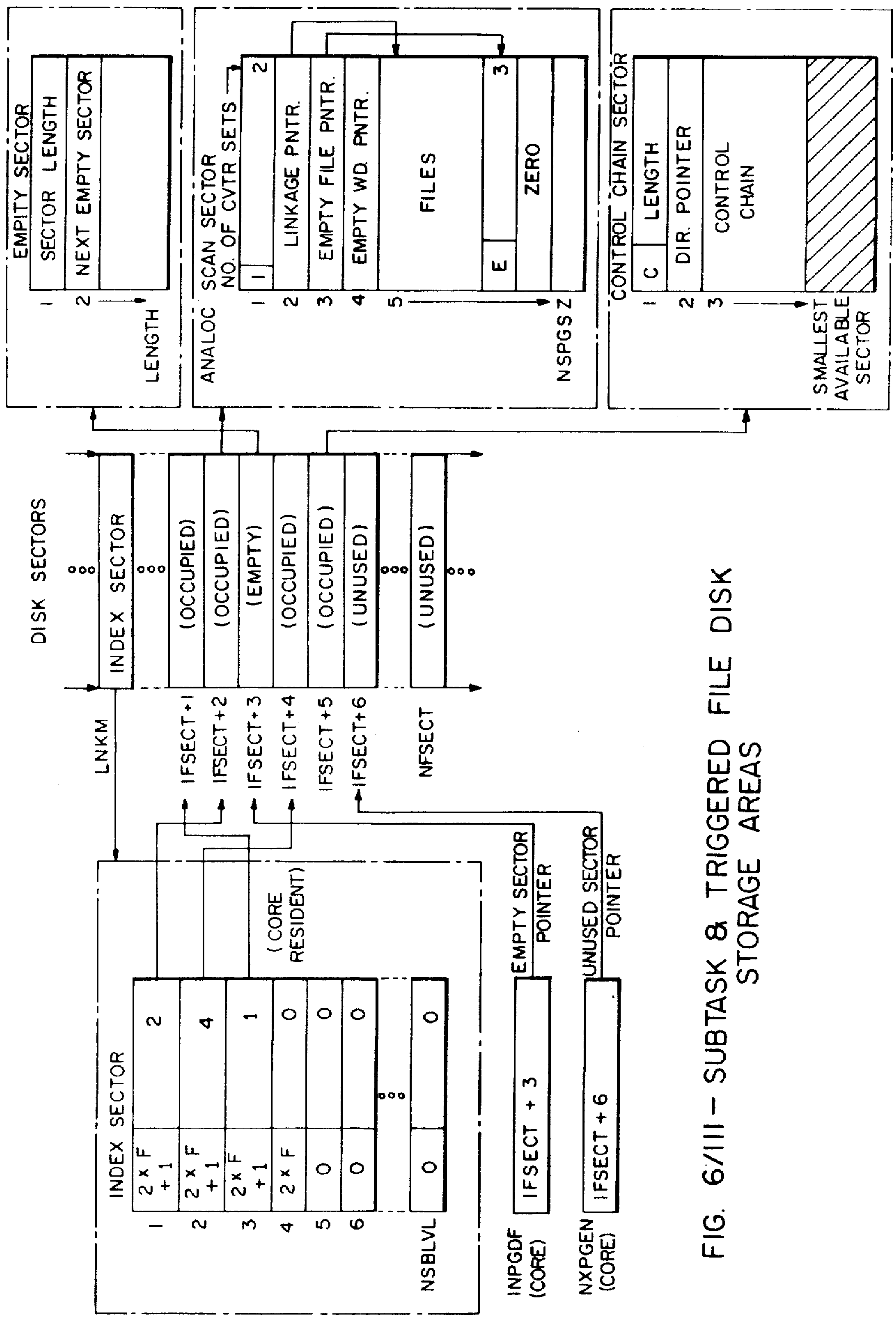
FIG. 6/III – SUBTASK & TRIGGERED FILE DISK STORAGE AREAS

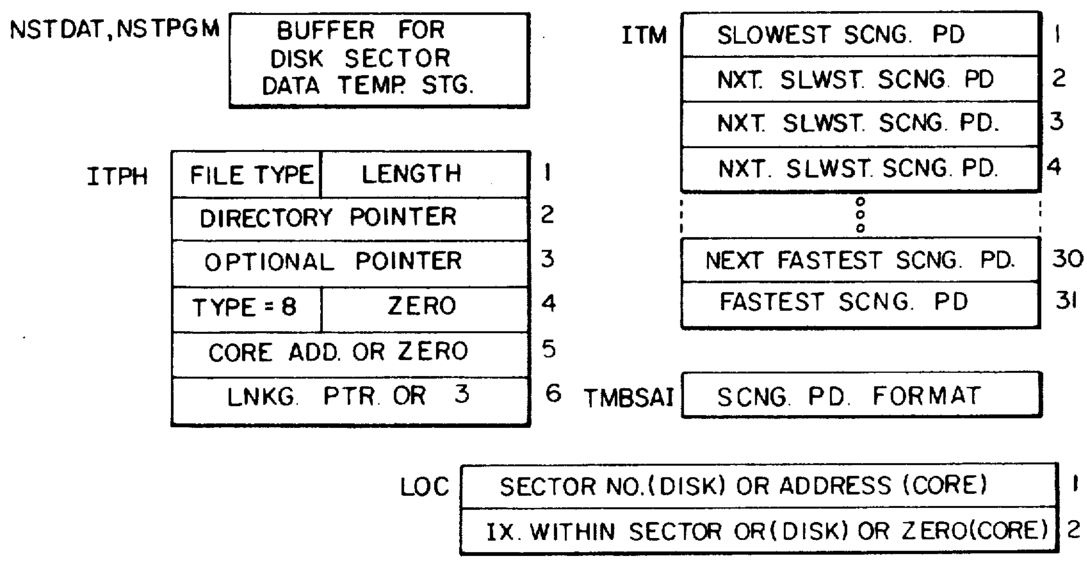
FIG. 6/112 - GENFIL BUFFERS AND TABLES
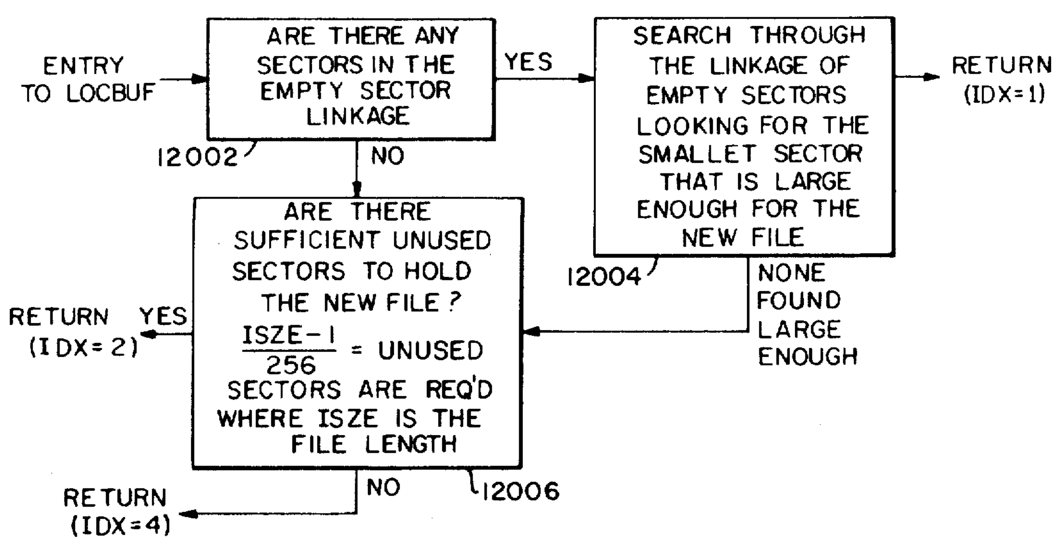
FIG. 6/120 - FIND AN EMPTY SECTOR

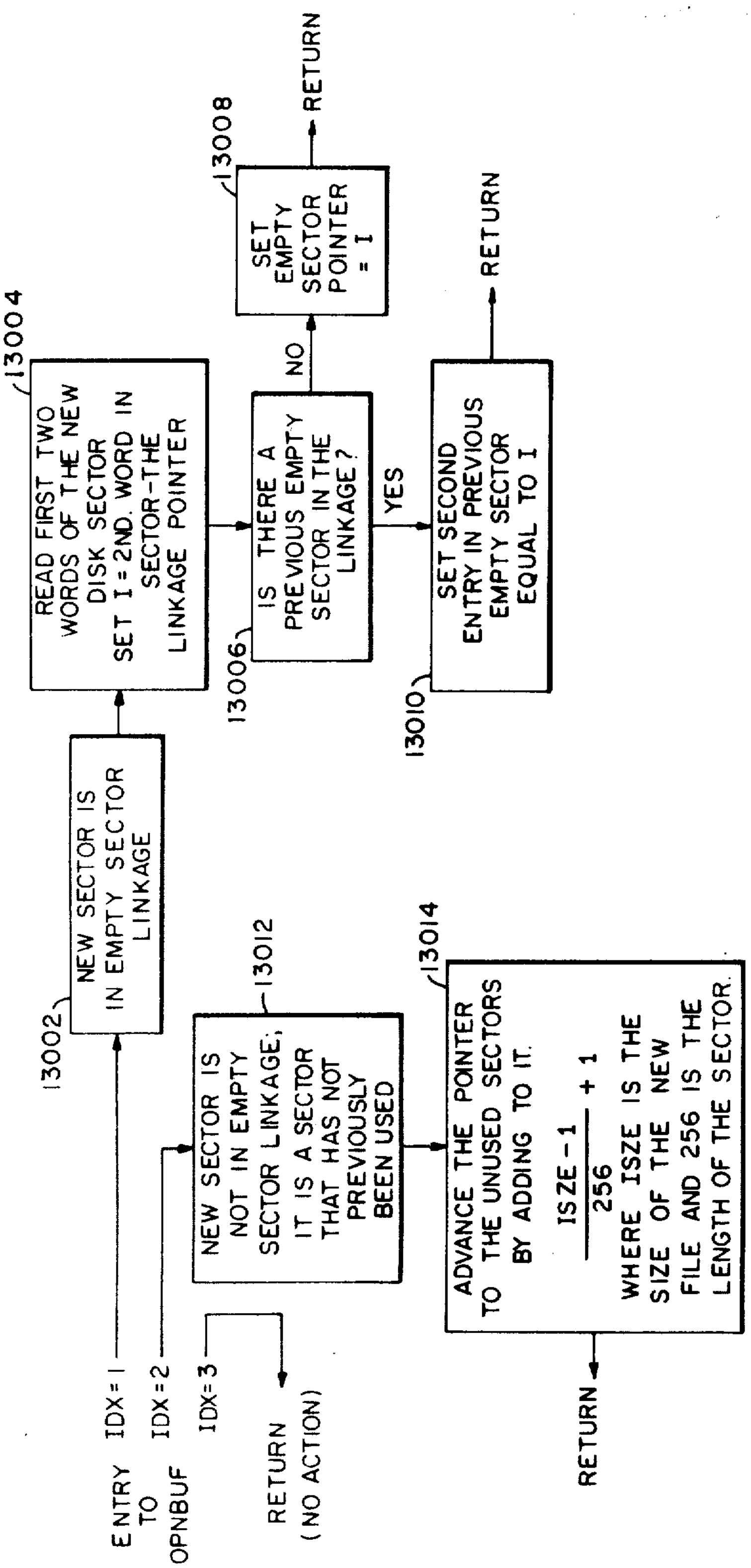
FIG. 6/130 - SUBROUTINE TO OPEN A NEW DISK SECTOR

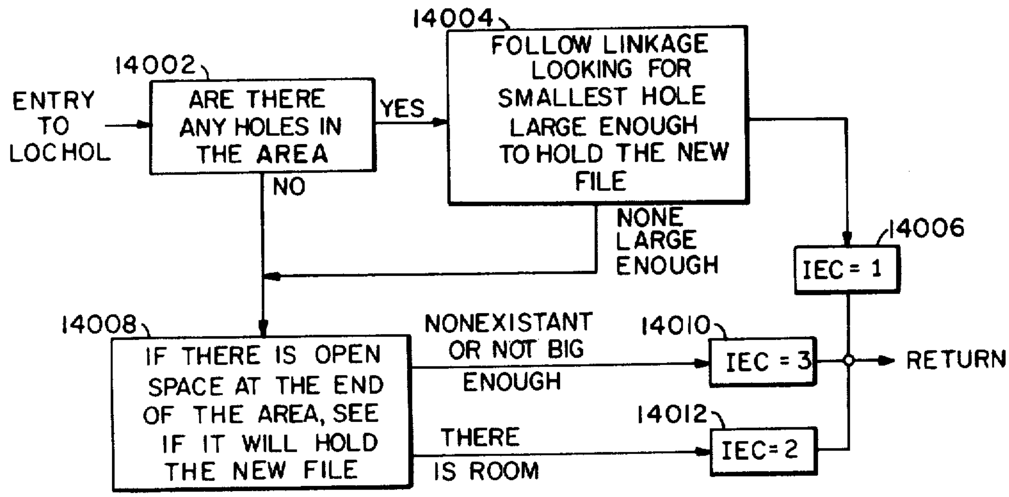
FIG. 6/140 - SUBROUTINE TO FIND HOLE IN FILE STORAGE AREA
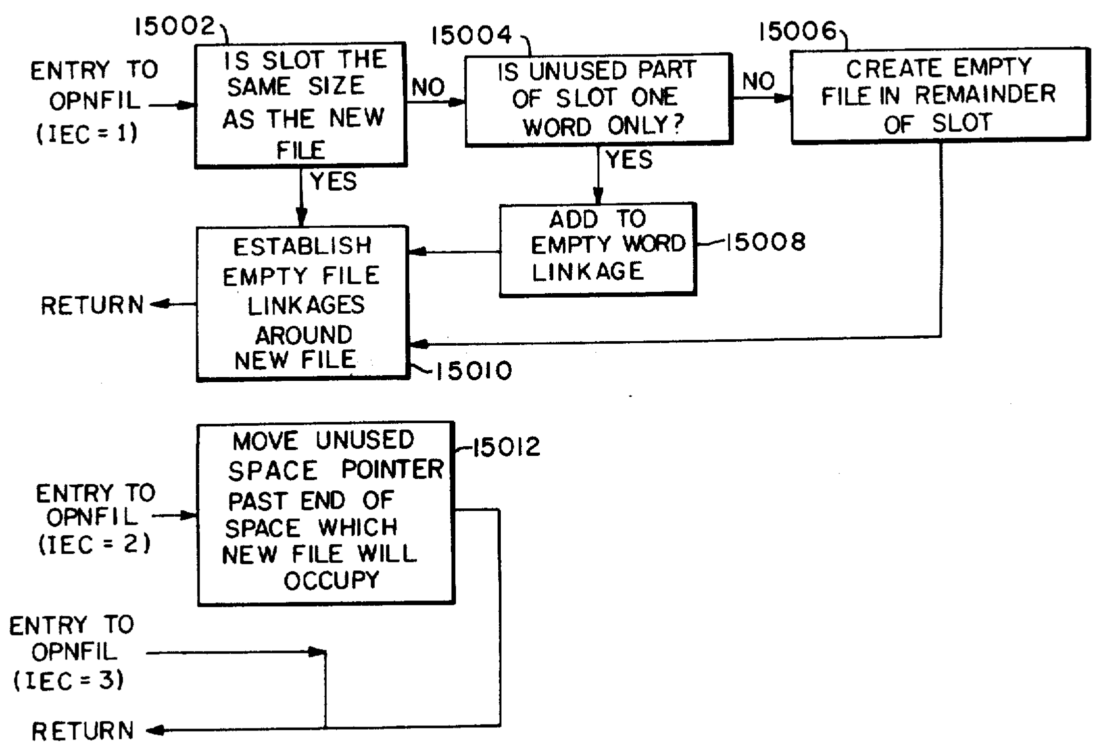
FIG. 6/150 - REMOVE EMPTY SLOT FROM EMPTY FILE LINKAGE

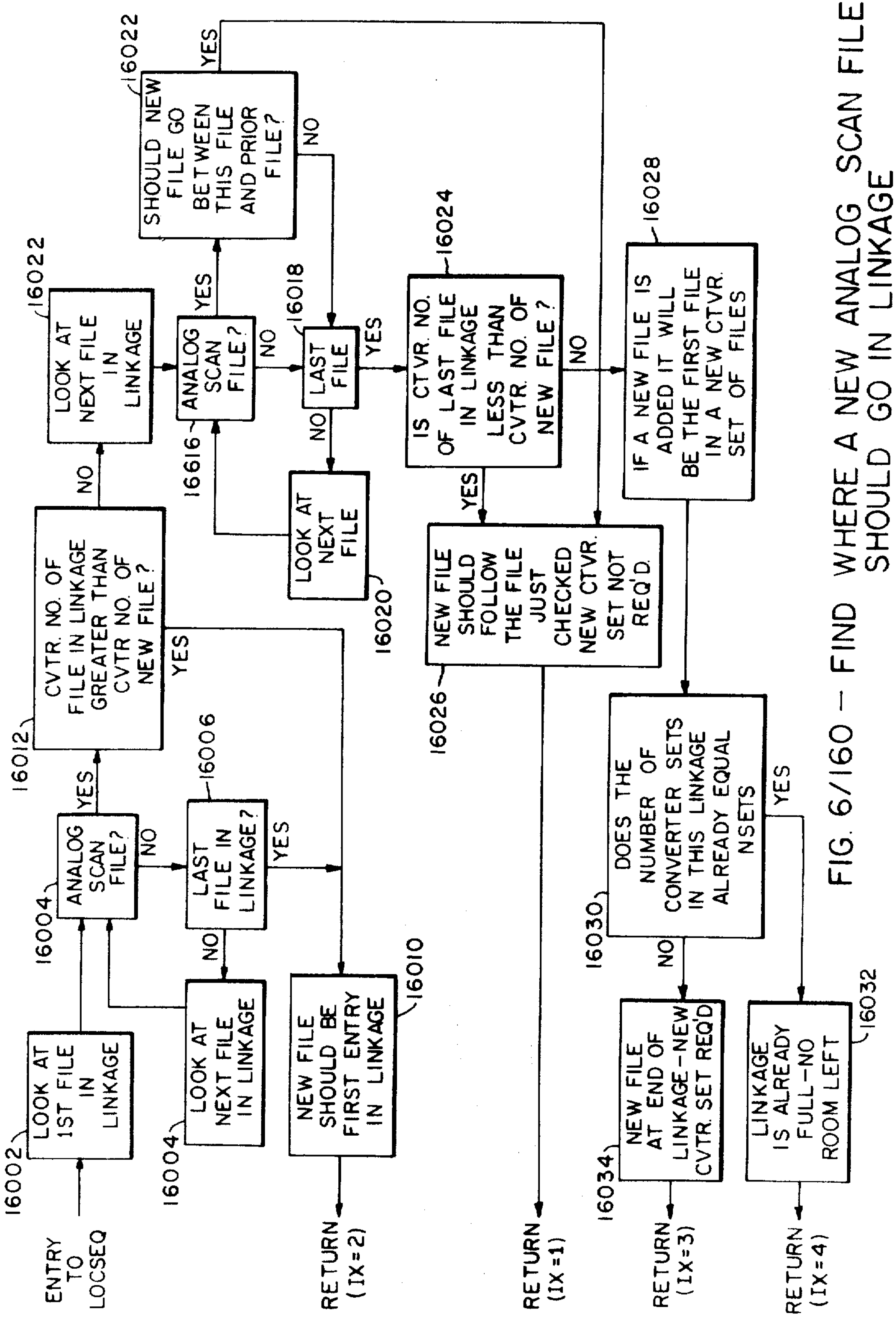
FIG. 6/160 — FIND WHERE A NEW ANALOG SCAN FILE SHOULD GO IN LINKAGE

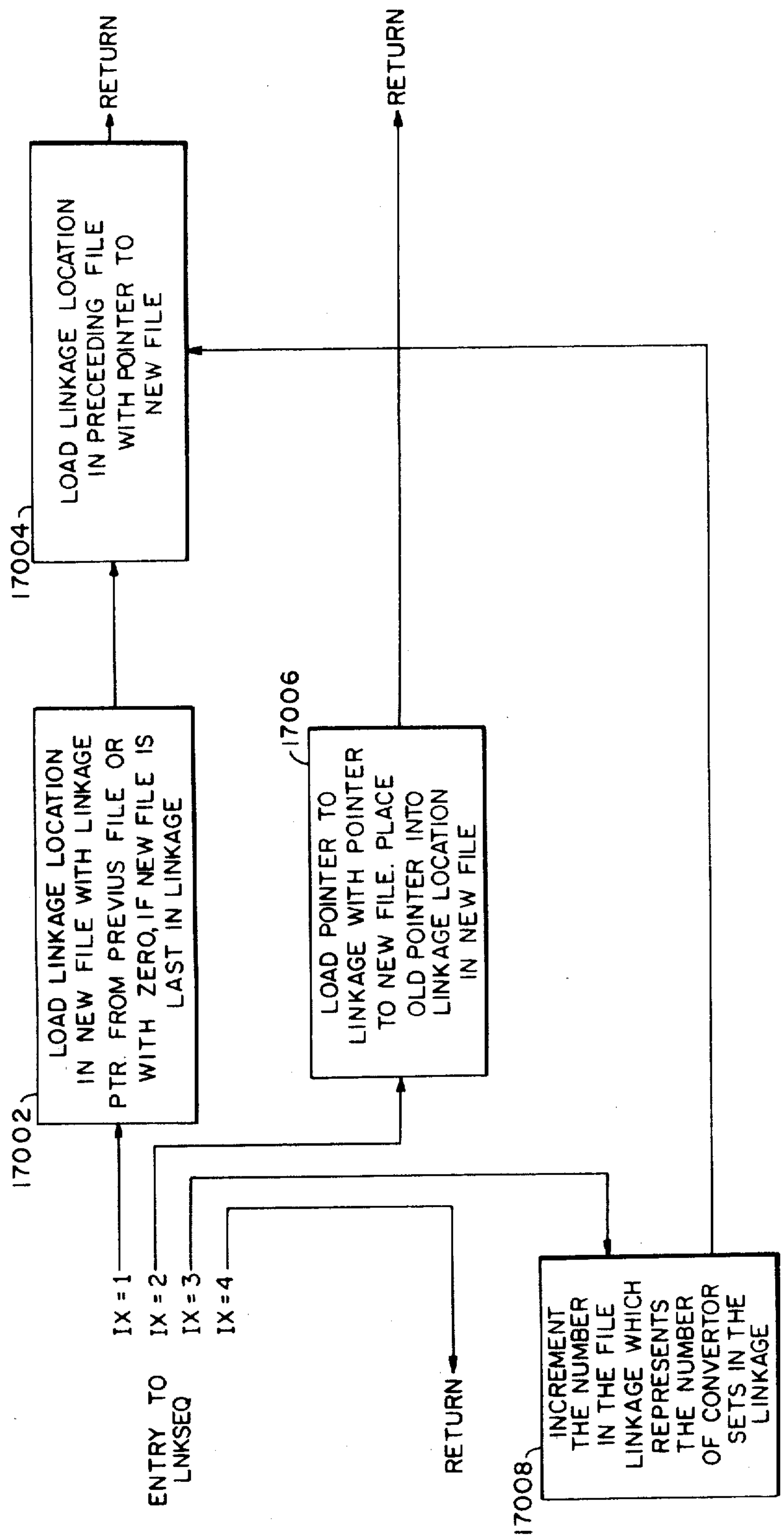
FIG. 6/170-CONNECT A NEW FILE INTO CVTR. LINKAGE

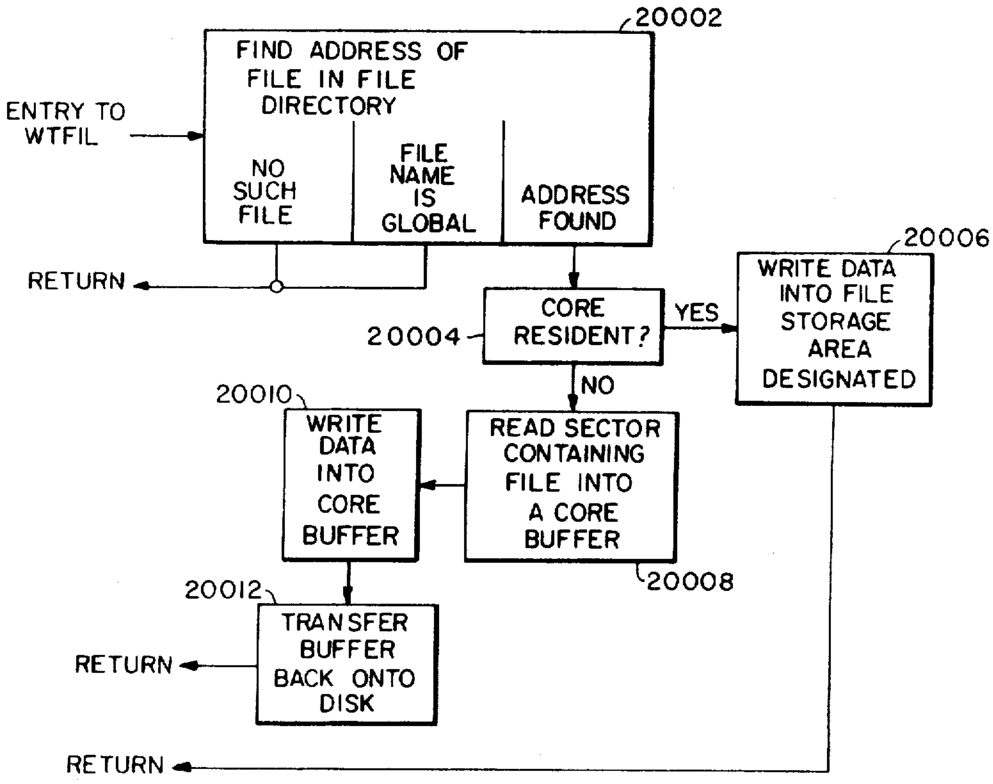
FIG. 6/200– WRITE INTO A FILE
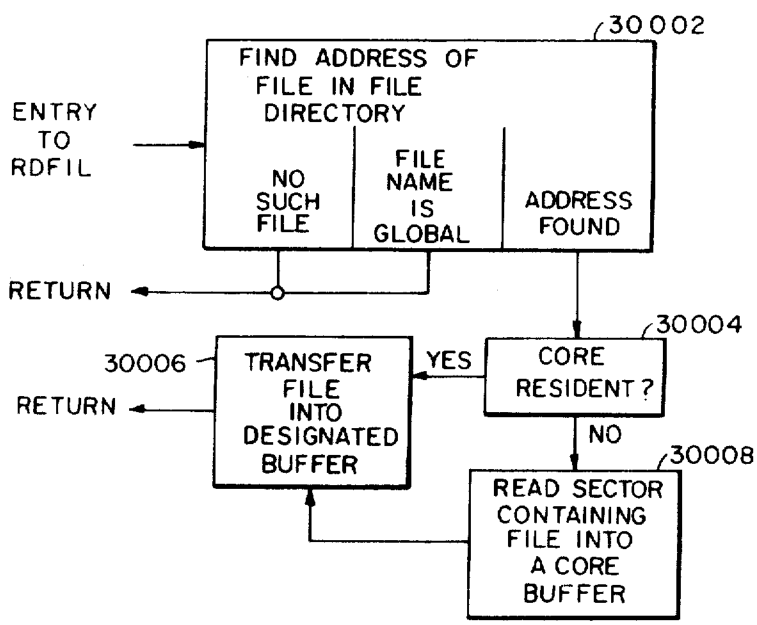
FIG. 6/300-TRANSFER A FILE TO A CORE BUFFER

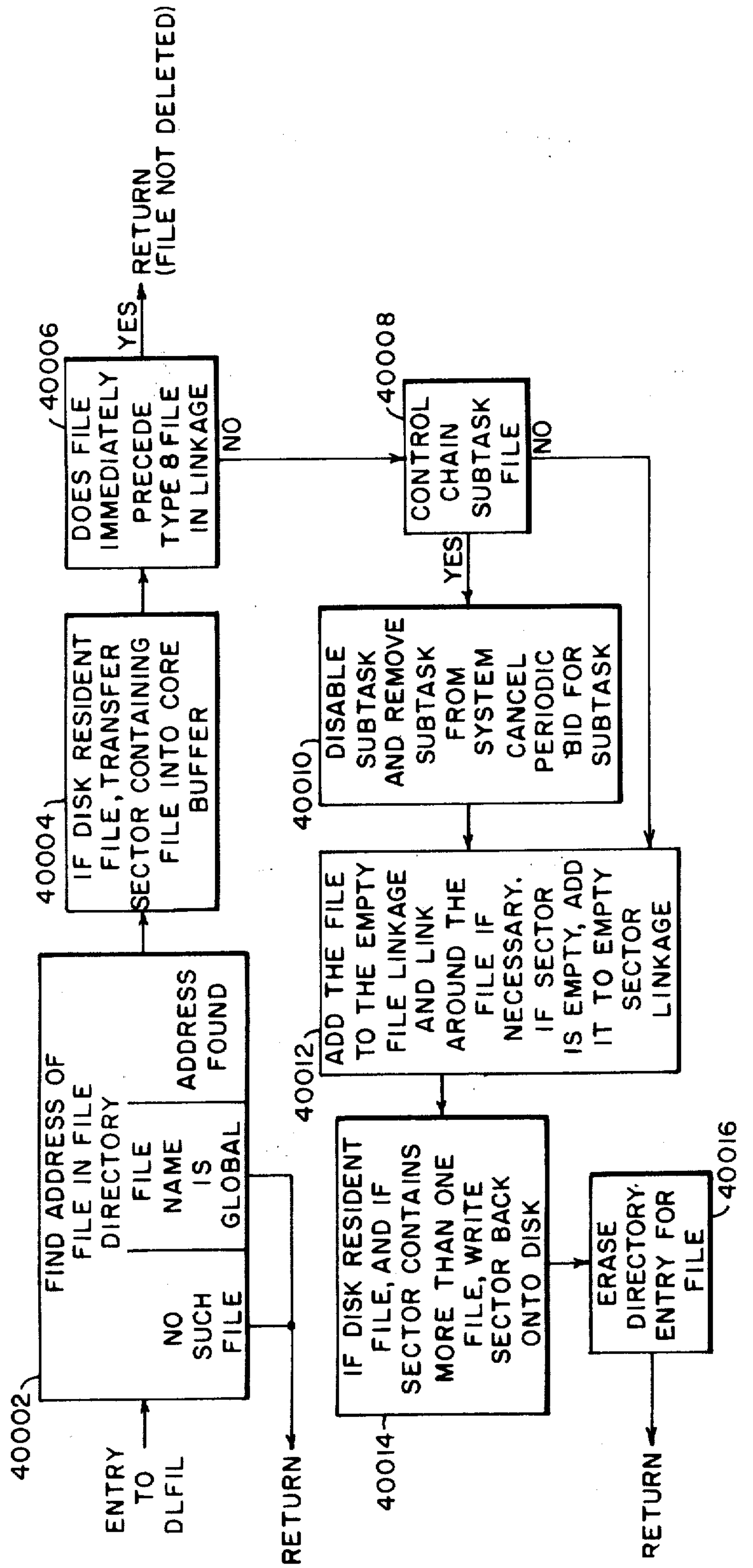
FIG. 6/400 DELETE A FILE FROM THE FILE STORAGE AREA

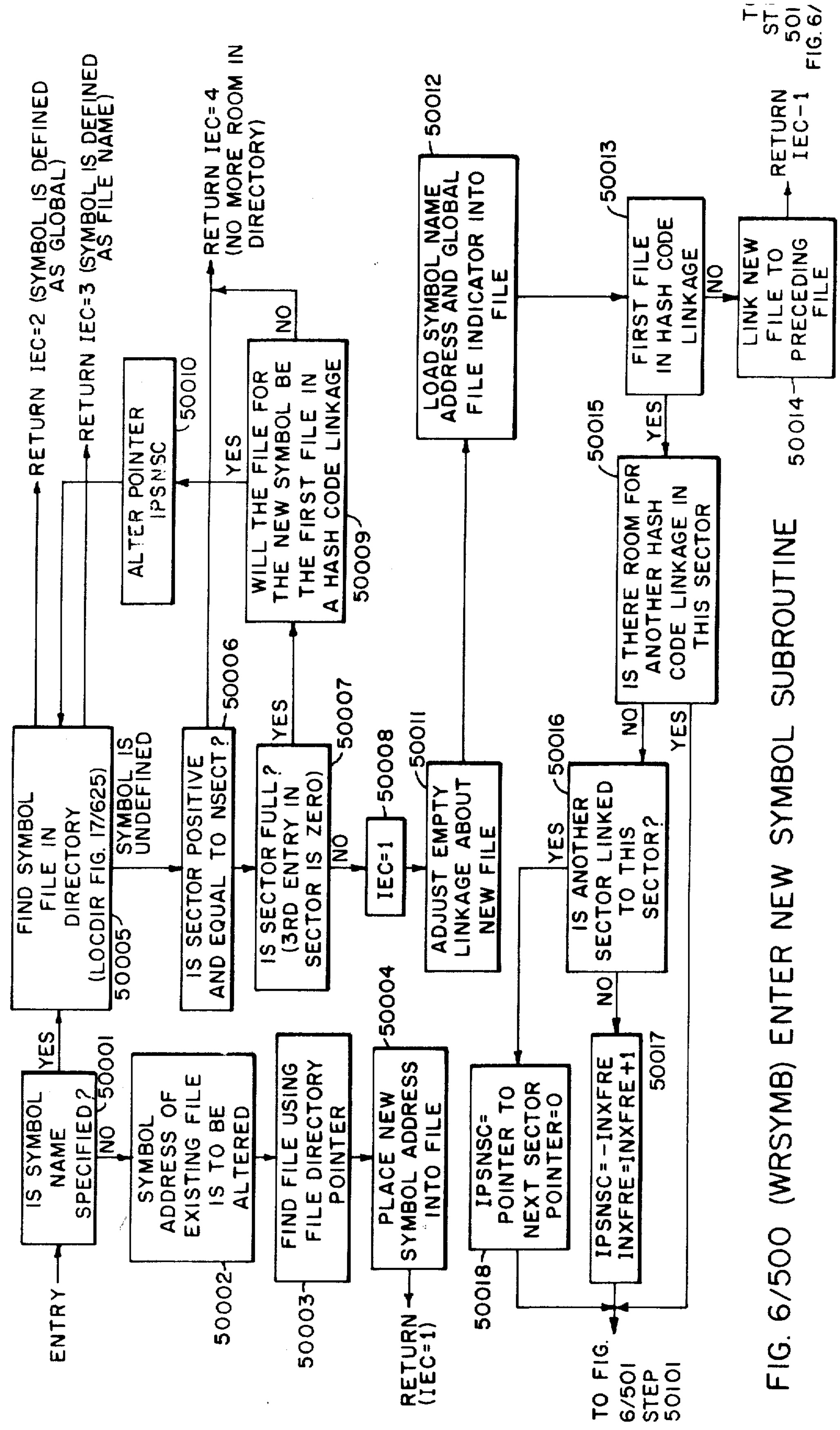
FIG. 6/500 (WRSYMB) ENTER NEW SYMBOL SUBROUTINE

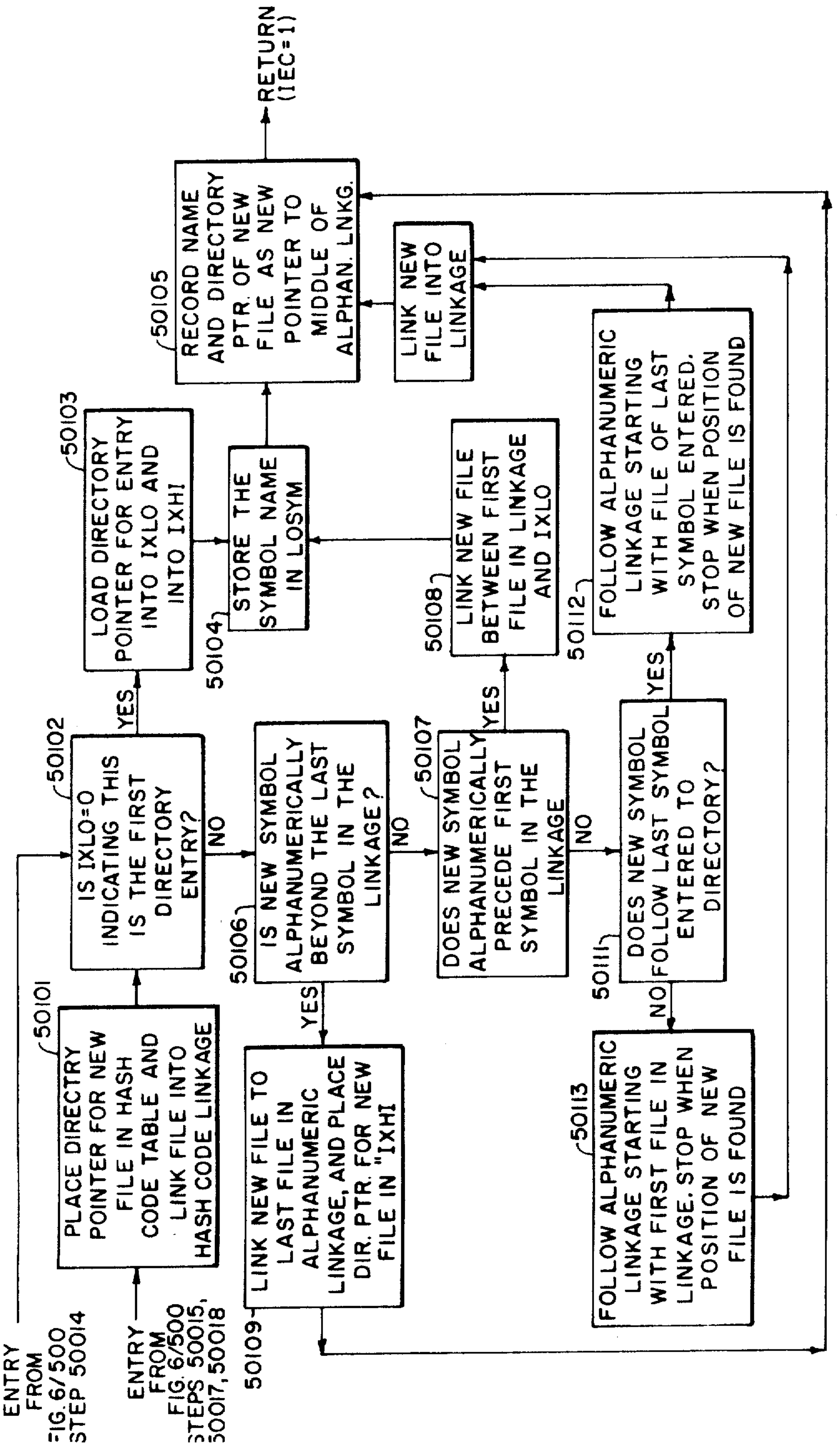
FIG. 6/501 ALPHANUMERIC AND HASH CODE LINKING

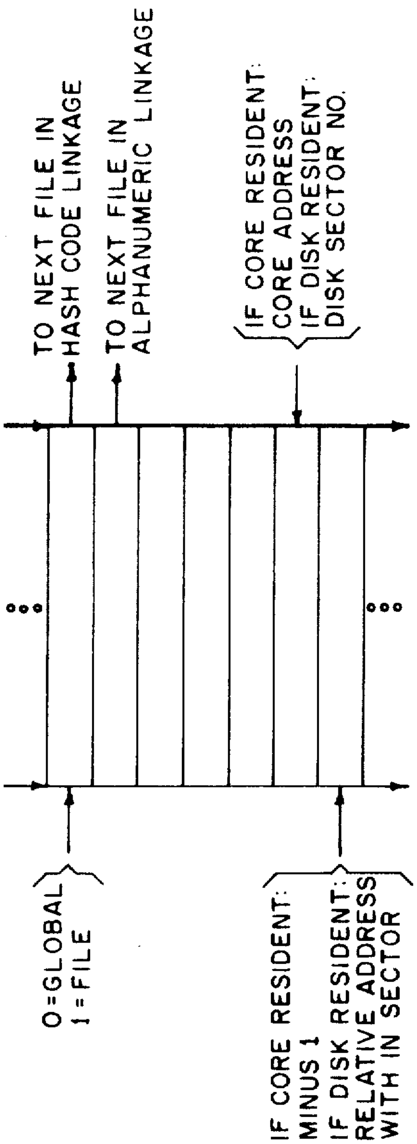
FIG. 6/502 DIRECTORY FILE
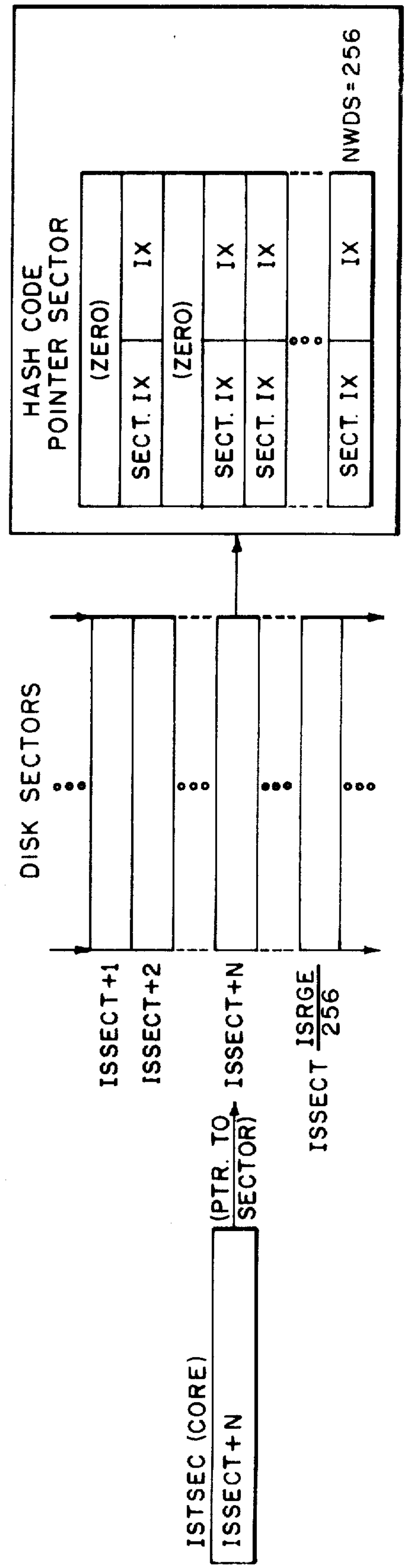
FIG. 6/504 HASH CODE POINTER TABLE

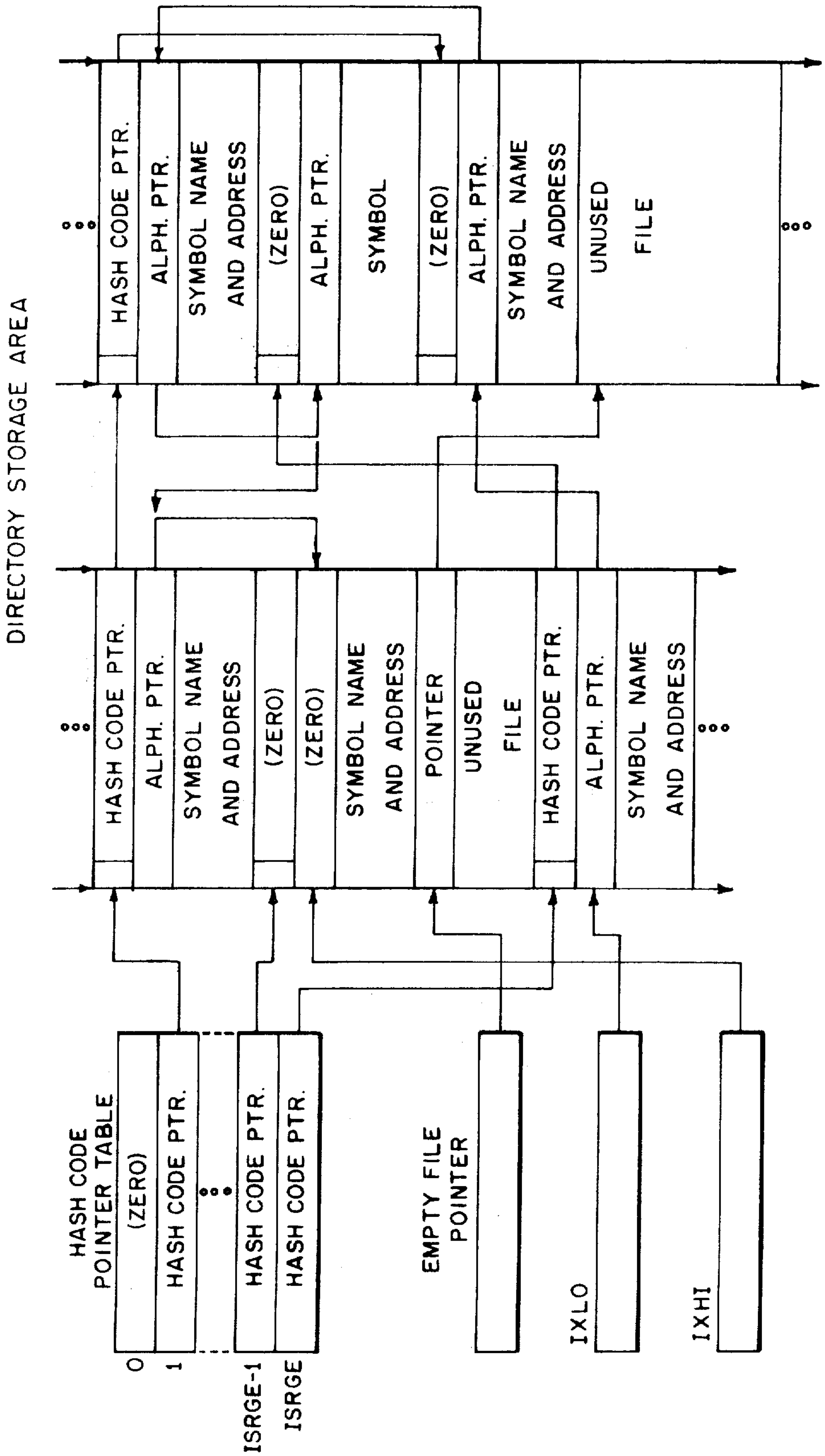
FIG. 6/503 DIRECTORY FILE STORAGE AREA (SIMPLIFIED)

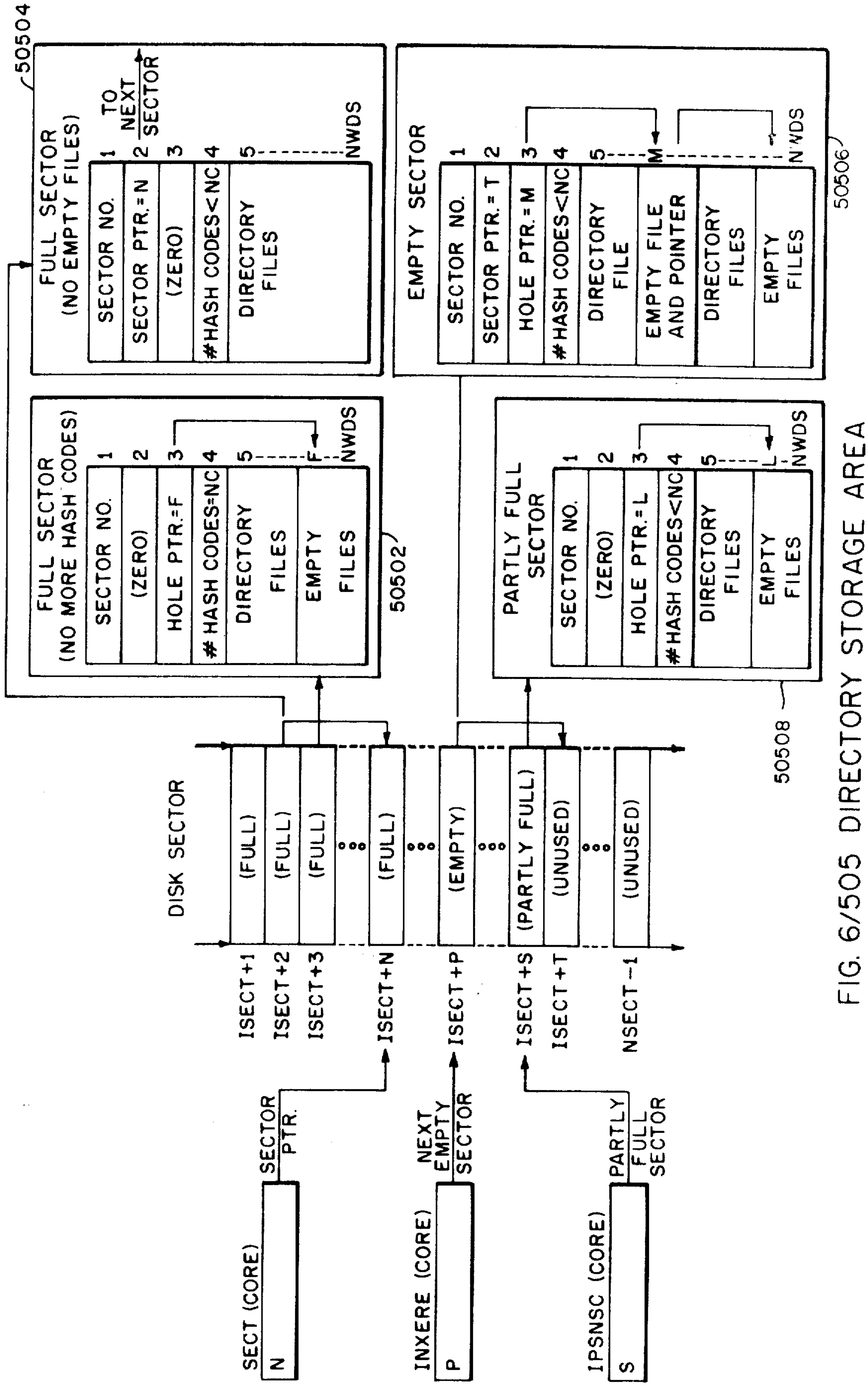
FIG. 6/505 DIRECTORY STORAGE AREA

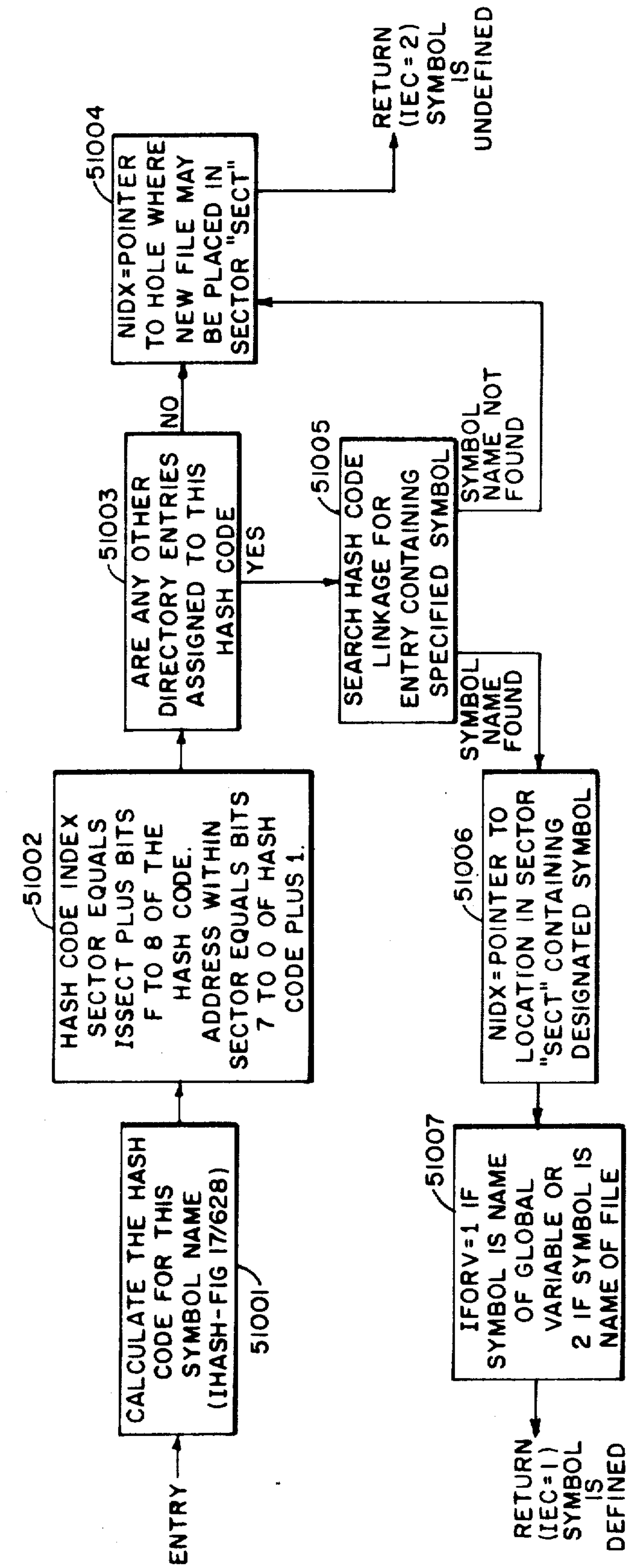
FIG. 6/510 (LOCDIR) LOCATE DIRECTORY ENTRY SUBROUTINE

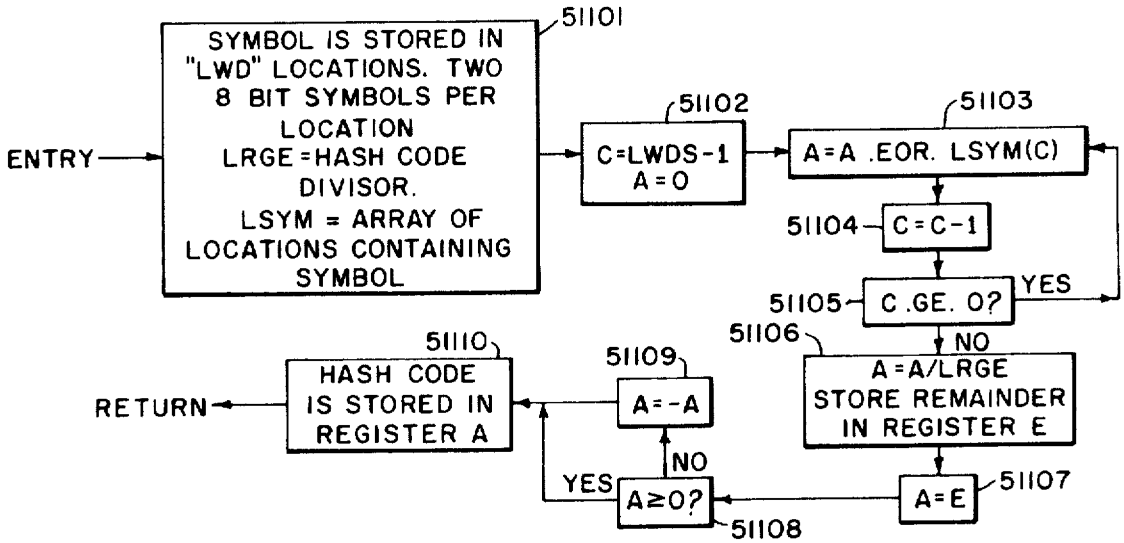
FIG. 6/511 (IHASH) FIND HASH CODE FOR SYMBOL
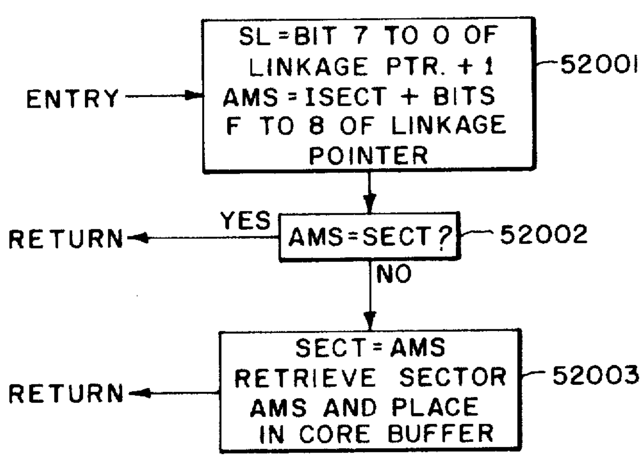
FIG. 6/520 (FDIDX) FIND NEXT FILE IN ALPHANUMERIC LINKAGE

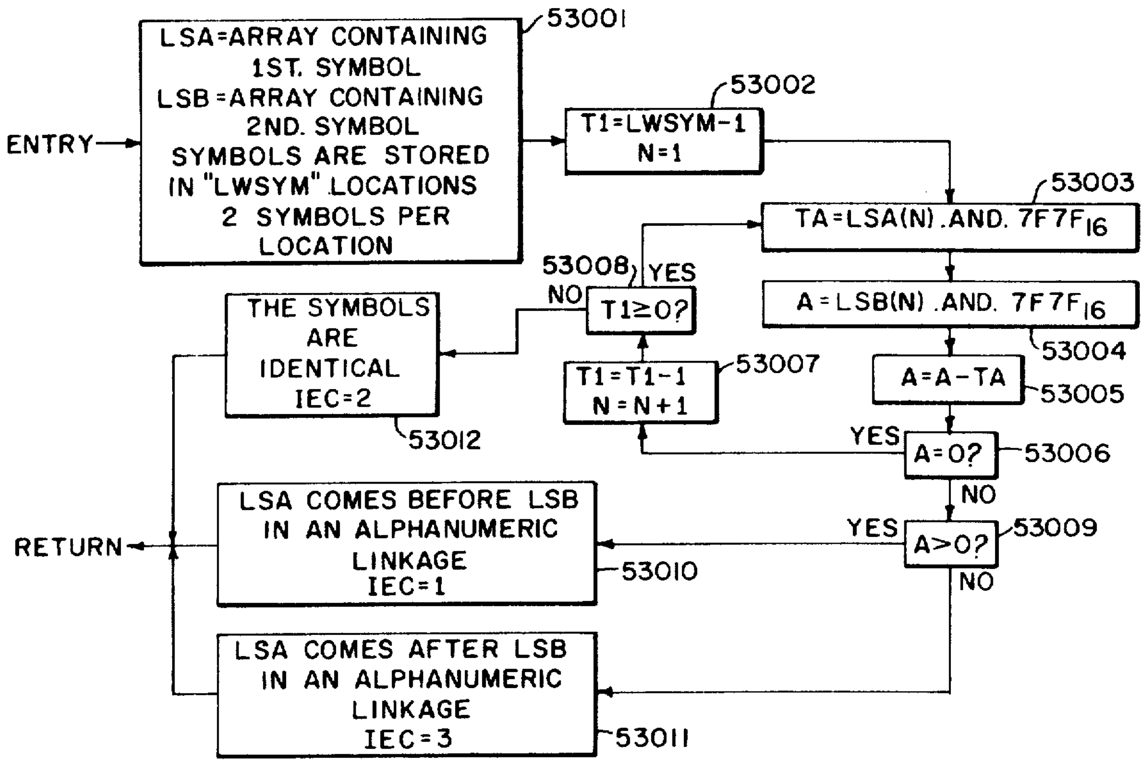
FIG. 6/530 (COMSYM) COMPARE TWO SYMBOLS
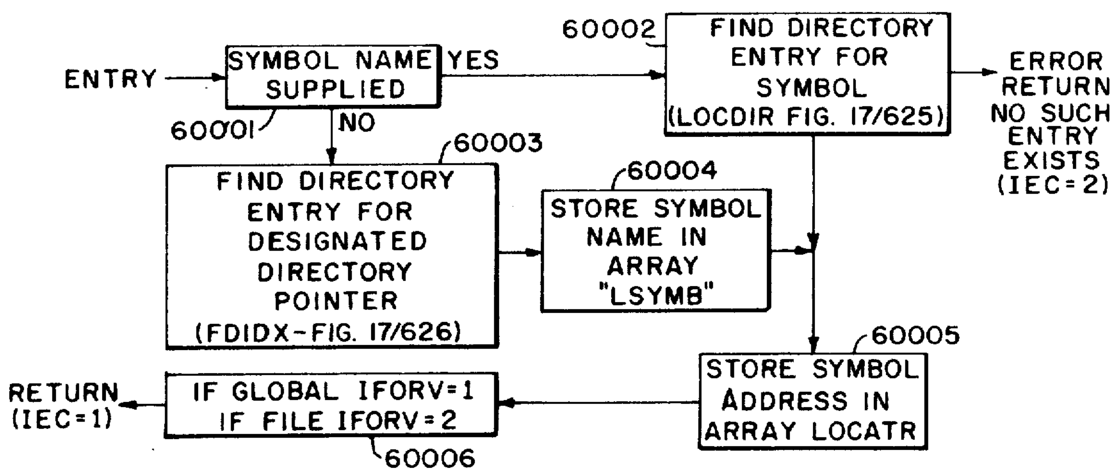
FIG. 6/600 (RDSYMB) READ SYMBOL SUBROUTINE

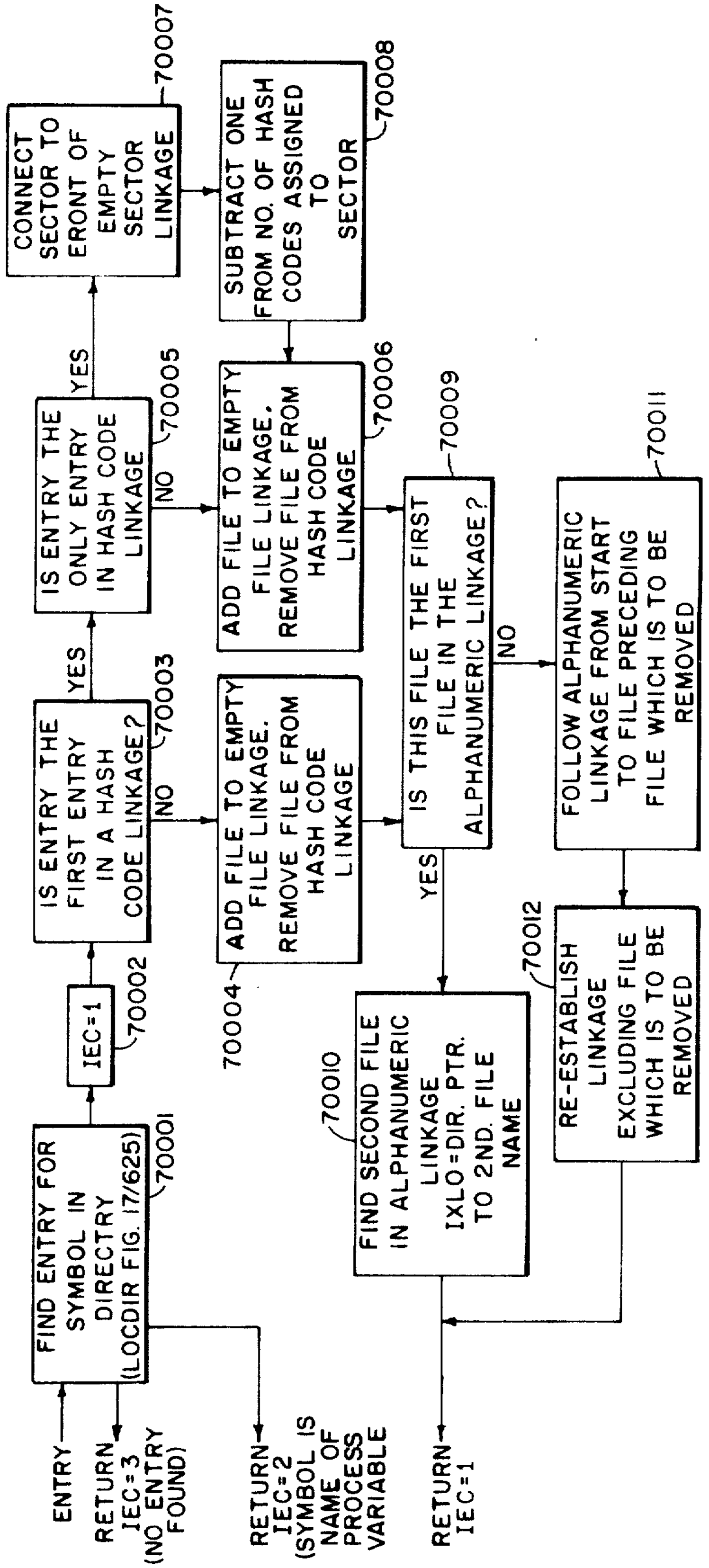
FIG. 6/700 (ERSYMB) REMOVE SYMBOL SUBROUTINE

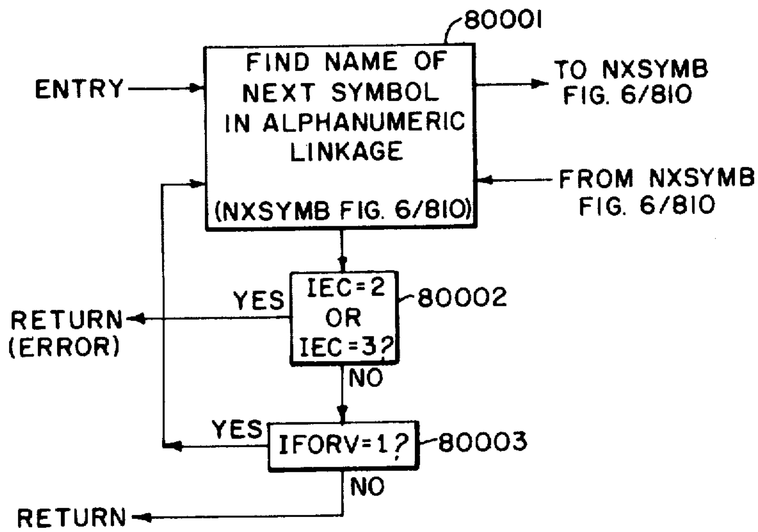
FIG. 6/800 (NXFLNM) FIND NEXT FILE NAME
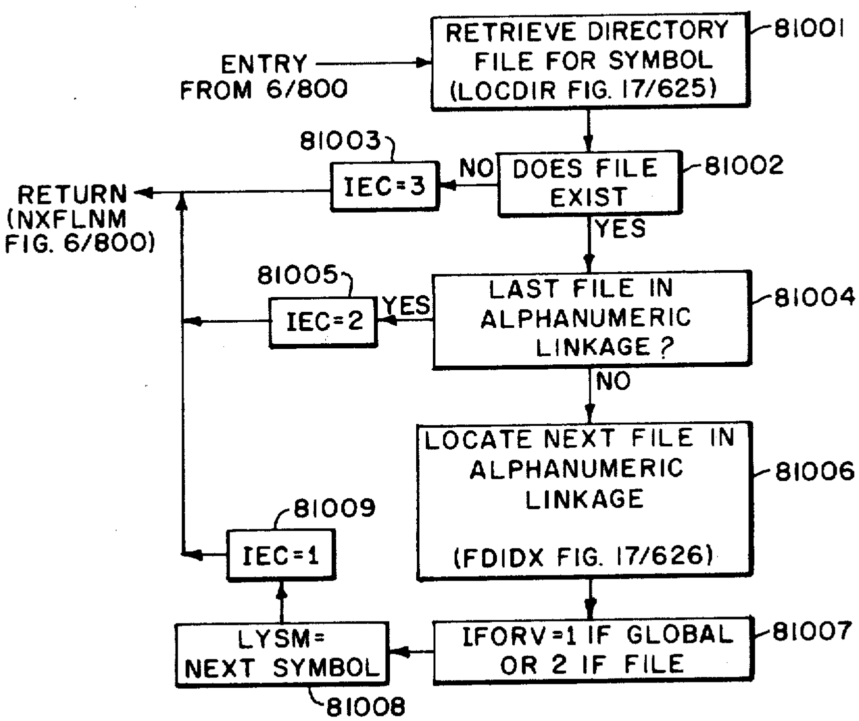
FIG. 6/810 (NXSYMB) FIND NEXT ALPHANUMERIC SYMBOL NAME

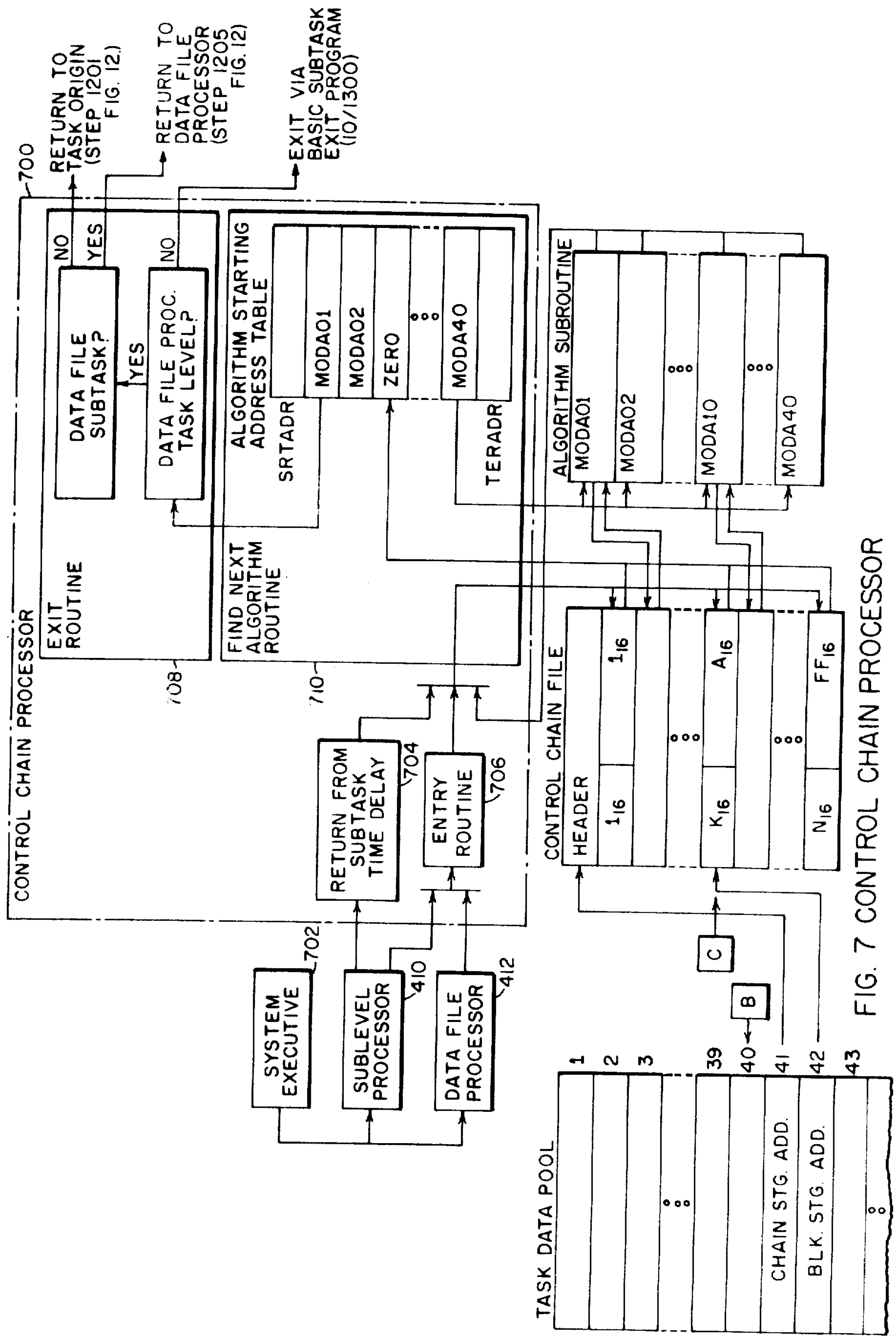
FIG. 7 CONTROL CHAIN PROCESSOR

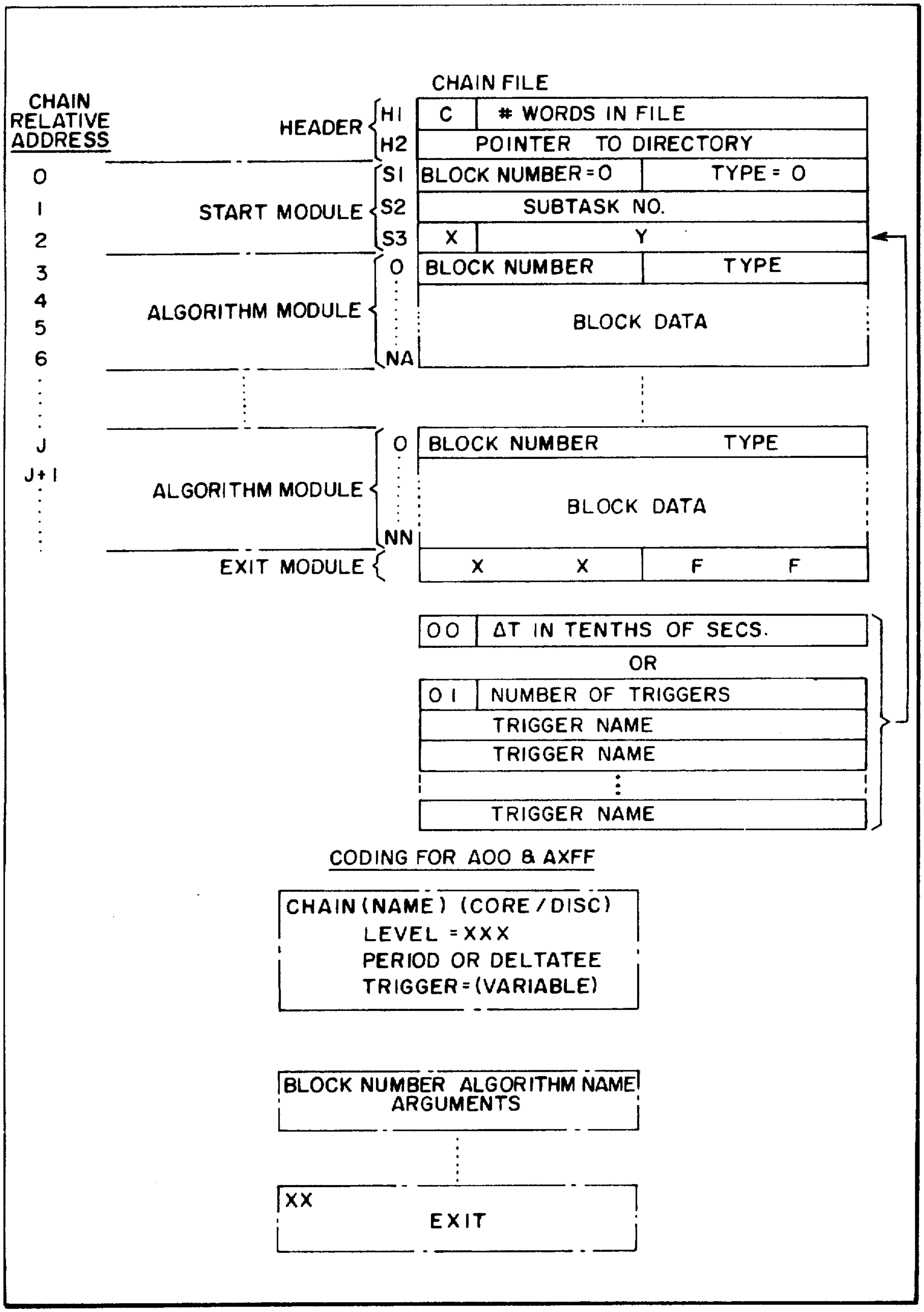
FIG. 8/A00 START AND EXIT MODULES

DRAWING SYMBOLS

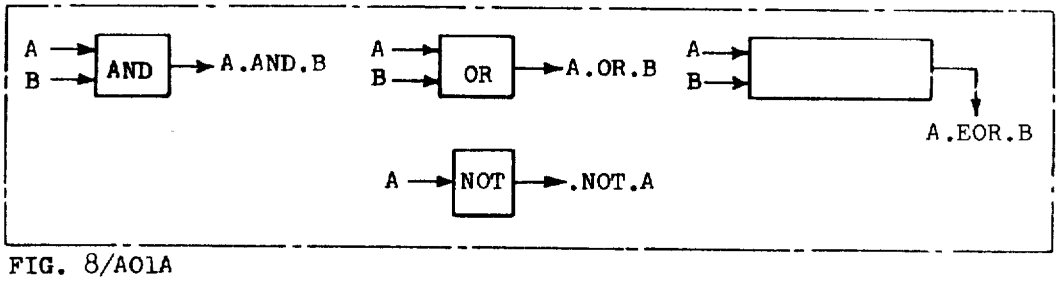

FIG. 8/A01A

CODING

3 LOGIC

A=B.OR.C.EOR.D.AND..NOT.E

FIG. 8/A01B

OP CODES

| OP CODE | BINARY CODE | SYMBOL |
|---|---|---|
| 0 | 00 | NOT |
| 1 | 01 | AND |
| 2 | 10 | OR |
| 3 | 11 | EOR |

FIG. 8/A01C

TABLE REFERENCE (TR)

| MEANING | CODE |
|---|---|
| VARIABLE | 0 |
| TEMPORARY | 1 |

FIG. 8/A01D

BLOCK FORMAT

| | | | | | |
|---|---|---|---|---|---|
| BLOCK NUMBER | | | TYPE = 1 | | |
| NUMBER OF VARIABLE(S) = n | | | | | |
| VARIABLE ADDRESS | | | | | |
| ⋮ | | | | | |
| VARIABLE ADDRESS | | | | | |
| NUMBER OF OPERATIONS | | | | | |
| TR | INDEX #1 | TR | INDEX #2 | RES | OP |
| | | | | | |
| TR | INDEX #1 | TR | INDEX #2 | RES | OP |

FIG. 8/A01E

EXPLANATION OF EXAMPLE

| | |
|---|---|
| 9 | T0 =.NOT. E |
| A | T1 = T0.AND. D |
| B | T2 = B .OR. C |
| C | A = T1.EOR. T2 |

FIG. 8/A01G

| INDEX | EXAMPLE | | | | | | WORD # |
|---|---|---|---|---|---|---|---|
| | 0 | 3 | 0 | 1 | | | 1 |
| | 0 | 0 | 0 | 5 | | | 2 |
| 0 | A-ADDRESS | | | | | | 3 |
| 1 | B-ADDRESS | | | | | | 4 |
| 2 | C-ADDRESS | | | | | | 5 |
| 3 | D-ADDRESS | | | | | | 6 |
| 4 | E-ADDRESS | | | | | | 7 |
| | 0 | 0 | 0 | 4 | | | 8 |
| | 0 | 0 | 0 | 4 | 0 | 0 | 9 |
| | 1 | 0 | 0 | 3 | 1 | 1 | 10 |
| | 0 | 1 | 0 | 2 | 2 | 2 | 11 |
| | 1 | 1 | 1 | 2 | 0 | 3 | 12 |

FIG. 8/A01F

FIG. 8/A01 LOGIC

DRAWING SYMBOLS
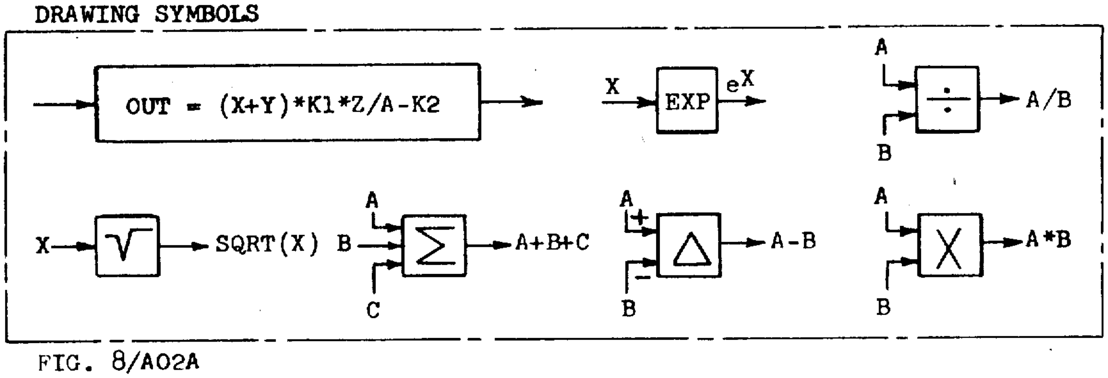
FIG. 8/A02A
CODING
```
32     ARITH
OUT = (X+Y)*2.5*Z/A-75.3
```
FIG. 8/A02B
OPERATION CODE (OP)
| OP CODE | FORTRAN SYMBOL | NAME |
|---|---|---|
| 1 | + | ADD |
| 2 | - | SUBTRACT |
| 3 | * | MULTIPLY |
| 4 | / | DIVIDE |
| 5 | ** | EXPONENT |
| | ⋮ FUTURE | ⋮ |
| 10 | SQRT | SQUARE ROOT |
FIG. 8/A02C
TABLE REFERENCE (TR)
| MEANING | CODE |
|---|---|
| VARIABLE INDEX TO ALGORITHM DATA | 00 |
| CONSTANT IN THE ALGORITHM DATA | 01 |
| VALUE IN THE TEMPORARY TABLE | 10 |
FIG. 8/A02D
FIG. 8/A02 ARITH

Figure 8:
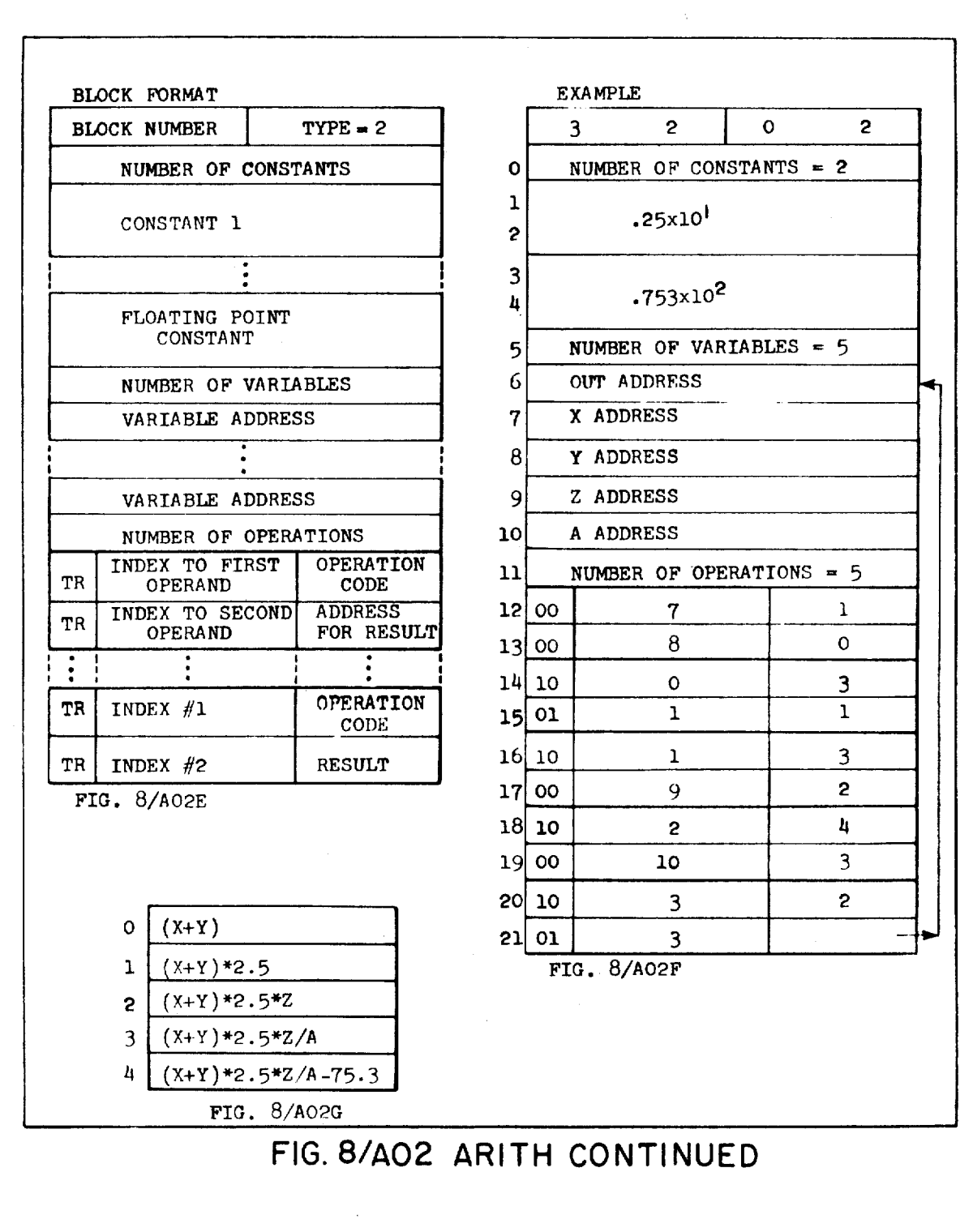

BLOCK FORMAT

| | | |
|---|---|---|
| BLOCK NUMBER | | TYPE = 2 |
| NUMBER OF CONSTANTS | | |
| CONSTANT 1 | | |
| ⋮ | | |
| FLOATING POINT CONSTANT | | |
| NUMBER OF VARIABLES | | |
| VARIABLE ADDRESS | | |
| ⋮ | | |
| VARIABLE ADDRESS | | |
| NUMBER OF OPERATIONS | | |
| TR | INDEX TO FIRST OPERAND | OPERATION CODE |
| TR | INDEX TO SECOND OPERAND | ADDRESS FOR RESULT |
| ⋮ | ⋮ | ⋮ |
| TR | INDEX #1 | OPERATION CODE |
| TR | INDEX #2 | RESULT |

FIG. 8/A02E

EXAMPLE

| | | | |
|---|---|---|---|
| | 3 2 | | 0 2 |
| 0 | NUMBER OF CONSTANTS = 2 | | |
| 1, 2 | .25x10[1] | | |
| 3, 4 | $.753 \times 10^2$ | | |
| 5 | NUMBER OF VARIABLES = 5 | | |
| 6 | OUT ADDRESS | | |
| 7 | X ADDRESS | | |
| 8 | Y ADDRESS | | |
| 9 | Z ADDRESS | | |
| 10 | A ADDRESS | | |
| 11 | NUMBER OF OPERATIONS = 5 | | |
| 12 | 00 | 7 | 1 |
| 13 | 00 | 8 | 0 |
| 14 | 10 | 0 | 3 |
| 15 | 01 | 1 | 1 |
| 16 | 10 | 1 | 3 |
| 17 | 00 | 9 | 2 |
| 18 | 10 | 2 | 4 |
| 19 | 00 | 10 | 3 |
| 20 | 10 | 3 | 2 |
| 21 | 01 | 3 | → (to OUT ADDRESS) |

FIG. 8/A02F

| | |
|---|---|
| 0 | (X+Y) |
| 1 | (X+Y)*2.5 |
| 2 | (X+Y)*2.5*Z |
| 3 | (X+Y)*2.5*Z/A |
| 4 | (X+Y)*2.5*Z/A-75.3 |

FIG. 8/A02G

FIG. 8/A02 ARITH CONTINUED

DRAWING SYMBOLS

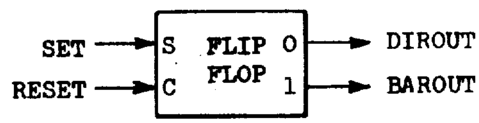

FIG. 8/A03A

CODING FORMAT

BLOCK NUMBER FLIPFLOP
SET = (LOGICAL SYMBOL)
RESET = (LOGICAL SYMBOL)
DIROUT = (LOGICAL SYMBOL)
BAROUT = (LOGICAL SYMBOL)

FIG. 8/A03B

CODING EXAMPLE

8 FLIPFLOP
SET = SFA
RESET = RFA
DIROUT = DFA
BAROUT = BFA

FIG. 8/A03C

BLOCK FORMAT

| BLOCK NUMBER | TYPE = 3 |
|---|---|
| SET ADDRESS | |
| RESET ADDRESS | |
| DIROUT ADDRESS | |
| BAROUT ADDRESS | |

FIG. 8/A03D

EXAMPLE

| 0 8 | 0 3 |
|---|---|
| ADDRESS FOR SFA | |
| ADDRESS FOR RFA | |
| ADDRESS FOR DFA | |
| ADDRESS FOR BFA | |

FIG. 8/A03E

MACRO FORMAT

| #1 | #2 | #3 | #4 | #5 | #6 | #7 | #8 | #9 |
|---|---|---|---|---|---|---|---|---|
| 1 | FLIPFLOP | 3 | 5 | 0 | 0 | 0 | 0 | 0. |
| 2 | SET | 1 | 3 | 0 | 1 | 0 | 0 | 0. |
| 2 | RESET | 1 | 3 | 0 | 1 | 0 | 0 | 0. |
| 2 | DIROUT | 1 | 3 | 0 | 1 | 0 | 0 | 0. |
| 2 | BAROUT | 1 | 3 | 0 | 1 | 0 | 0 | 0. |
| 5 | | | | | | | | |

FIG. 8/A03F

FIG. 8/A03 FLIP FLOP

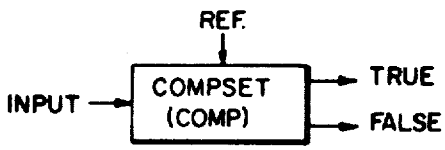

FIG. 8/A04A

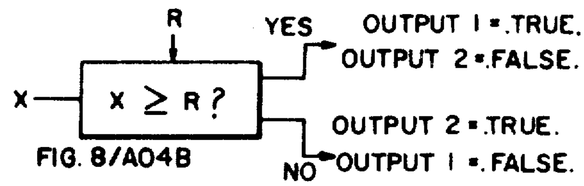

FIG. 8/A04B

CODING FORMAT

| | |
|---|---|
| BLOCK NUMBER | COMPSET |
| INPUT = (VARIABLE) | |
| REF = (VARIABLE) | |
| COMP = (LT, LE, EQ, NE, GT, OR GE) | |
| TRUE = (LOGICAL) | |
| FALSE = (LOGICAL) | |

FIG. 8/A04C

CODING EXAMPLE

| | |
|---|---|
| 11 | COMPSET |
| INPUT = X | |
| REF = R | |
| COMP = GE | |
| TRUE = OUTPUT 1 | |
| FALSE = OUTPUT 2 | |

FIG. 8/A04D

BLOCK FORMAT

| | |
|---|---|
| BLOCK NUMBER | TYPE = 4 |
| INPUT ADDRESS | |
| REF. ADDRESS | |
| COMPARISON ALPHA | |
| TRUE ADDRESS | |
| FALSE ADDRESS | |

FIG. 8/A04E

EXAMPLE

| | | | |
|---|---|---|---|
| 0 | B | 0 | 4 |
| ADDRESS FOR X | | | |
| ADDRESS FOR R | | | |
| G | E | | |
| ADDRESS FOR OUTPUT 1 | | | |
| ADDRESS FOR OUTPUT 2 | | | |

FIG. 8/A04F

MACRO FORMAT

| #1 | #2 | #3 | #4 | #5 | #6 | #7 | #8 | #9 |
|---|---|---|---|---|---|---|---|---|
| 1 | COMPSET | 4 | 6 | 0 | 0 | 0 | 0 | 0. |
| 2 | INPUT | 1 | 3 | 0 | 1 | 0 | 0 | 0. |
| 2 | REF. | 1 | 3 | 0 | 1 | 0 | 0 | 0. |
| 2 | COMP | 1 | 4 | 0 | 1 | 0 | 0 | 0. |
| 2 | TRUE | 1 | 3 | 0 | 1 | 0 | 0 | 0. |
| 2 | FALSE | 1 | 3 | 0 | 1 | 0 | 0 | 0. |
| 5 | | | | | | | | |

FIG. 8/A04G

FIG. 8/A04 COMPSET

DRAWING SYMBOL

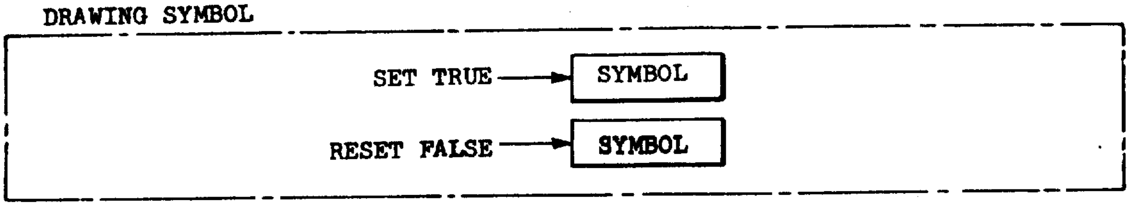

FIG. 8/A5A

CODING FORMAT

```
12    SETRESET
  TRUE = (LOGICAL SYMBOL)
  FALSE = (LOGICAL SYMBOL)
```

FIG. 8/A5B

CODING EXAMPLE

```
12    SETRESET
                 TRUE = ABC, FALSE = DEF
```

FIG. 8/A5C

BLOCK FORMAT

| | |
|---|---|
| BLOCK NUMBER | TYPE = 5 |
| NUMBER OF TRUE (n) | |
| TRUE ADDRESS 1 | |
| ⋮ | |
| TRUE ADDRESS n | |
| NUMBER FALSE (n) | |
| FALSE ADDRESS 1 | |
| ⋮ | |
| FALSE ADDRESS n | |

FIG. 8/A5D

EXAMPLE

| | |
|---|---|
| 12 | 5 |
| 1 | |
| ADDRESS FOR ABC | |
| 1 | |
| ADDRESS FOR DEF | |

FIG. 8/A5E

MACRO FORMAT

| #1 | #2 | #3 | #4 | #5 | #6 | #7 | #8 | #9 |
|---|---|---|---|---|---|---|---|---|
| 1 | SETRESET | 5 | 0 | 0 | 0 | 0 | 0 | 0. |
| 2 | TRUE | -20 | 3 | 0 | 1 | 0 | 0 | 0. |
| 2 | FALSE | -20 | 3 | 0 | 1 | 0 | 0 | 0. |
| 5 | | | | | | | | |

FIG. 8/A5F

FIG. 8/A05 SET RESET

DRAWING SYMBOL

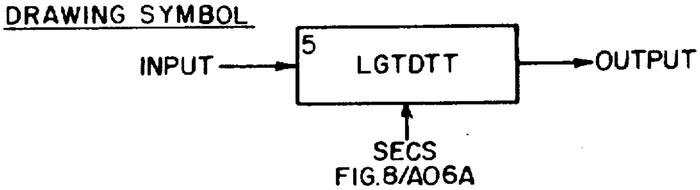

FIG.8/A06A

| INPUT | OUTPUT | ACTION | COUNTER |
|---|---|---|---|
| FALSE | FALSE | NONE | ZERO |
| FALSE | TRUE | RESET | COUNT = SECS |
| TRUE | FALSE | COUNT = COUNT - 1 | COUNT ≠ 0 |
| TRUE | FALSE | SET OUTPUT AND STOP | COUNT = 0 |
| TRUE | TRUE | FINISHED | COUNT REMAINS ZERO |

FIG.8/A06B

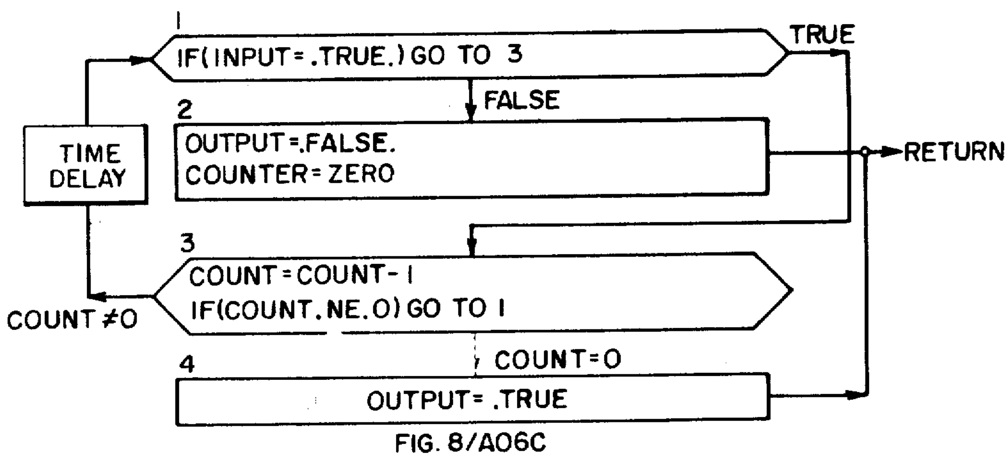

FIG. 8/A06C

CODING FORMAT

| BLOCK NUMBER | LGTDTT |
|---|---|
| SECS=TIME DELAY SECONDS | |
| INPUT=(LOGICAL NAME) | |
| OUTPUT=(LOGICAL NAME) | |

FIG.8/A06D

CODING EXAMPLE

| 1 | LGTDTT |
|---|---|
| SECS = 10.0 | |
| INPUT = A100 | |
| OUTPUT = A200 | |

FIG.8/A06E

FIG. 8/A06 LGTDTT

BLOCK FORMAT

| | | |
|---|---|---|
| 0 | BLOCK NUMBER | TYPE = 6 |
| 1 | TENTH SECS | |
| 2 | COUNTER | |
| 3 | LINK TO NEXT COUNTER | |
| 4 | ADDRESS OF INPUT | |
| 5 | ADDRESS OF OUTPUT | |

FIG.8/A06F

EXAMPLE

| | | | | |
|---|---|---|---|---|
| 0 | 0 | 1 | 0 | 6 |
| 1 | 100 | | | |
| 2 | 0 | 0 | 0 | 0 |
| 3 | 0 | 0 | 0 | 0 |
| 4 | = A100 | | | |
| 5 | = A200 | | | |

FIG.8/A06G

MACRO FORMAT

| #1 | #2 | #3 | #4 | #5 | #6 | #7 | #8 | #9 |
|---|---|---|---|---|---|---|---|---|
| 1 | LGTDTT | 6 | 6 | 0 | 0 | 0 | 0 | 0.0 |
| 2 | SECS | 1 | 2 | 0 | 0 | 0 | 6 | 0.0 |
| 2 | INPUT | 1 | 3 | 0 | 1 | 0 | 0 | 0.0 |
| 2 | OUTPUT | 1 | 3 | 0 | 1 | 0 | 0 | 0.0 |
| 3 | SEC * 10 | 6 | 6 | 3 | 7 | 7 | | 10.0 |
| 4 | TENTH SECS | 6 | 1 | 1 | 0 | | | |
| 4 | STORE 2 WORDS ZERO | 1 | 0 | 1 | 0 | | | |
| 5 | | | | | | | | |

FIG. 8/A06H

| ITEM | CALCULATION TABLE |
|---|---|
| 1 | 0.0 |
| 2 | ΔT |
| 3 | # WORDS REQ. FOR FILE = 6 |
| 4 | { SPARES } |
| 5 | |
| 6 | SECS = 10; 10*SECS.= 100 |
| 7 | 10.0 |
| 8 | |
| 9 | |

FIG. 8/A06I

| | | |
|---|---|---|
| 0 | 0 | START MODULE |
| 500A | | |
| (ZERO) | | |
| 1 | 6 | TIME DELAY MODULE |
| 100 | | |
| (ZERO) | | |
| (ZERO) | | |
| A100 | | |
| A200 | | |
| Z | FF | END MODULE |

FIG. 8/A06J

FIG.8/A06 LGTDTT CONTINUED

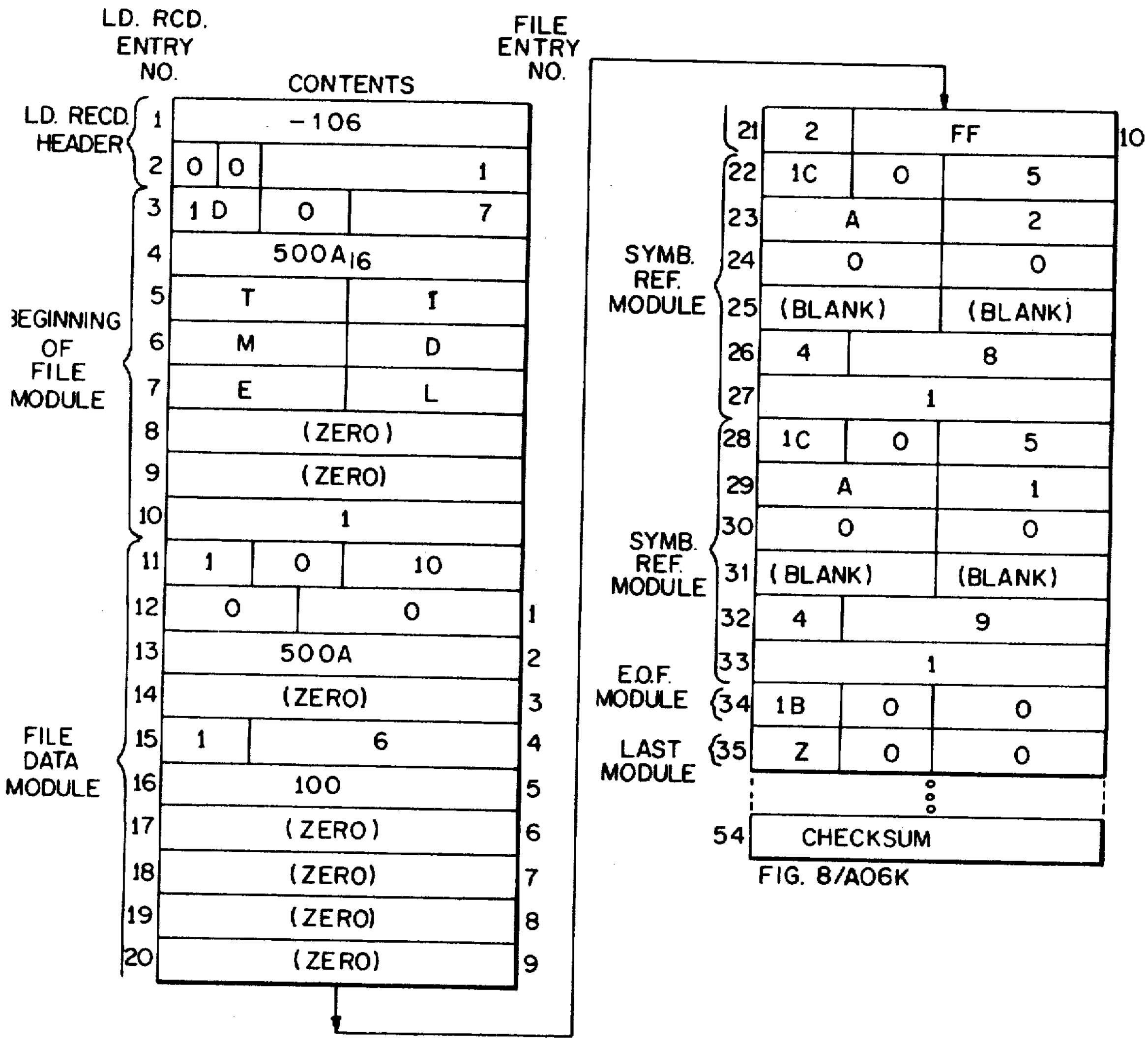
ACTUAL OUTPUT OF CONTROL CHAIN GENERATOR
FIG. 8/A06 LGTDDT CONTINUED

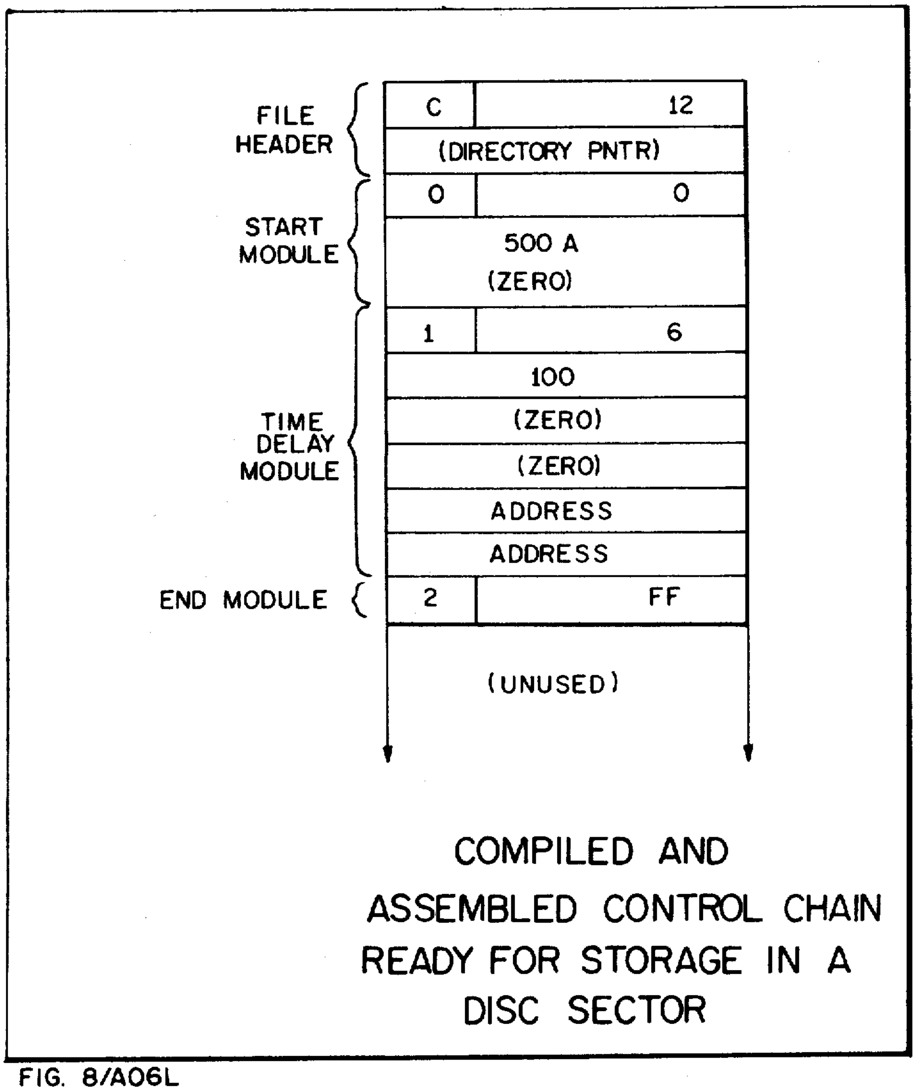
FIG. 8/A06L
FIG. 8/A06 LGTDDT CONTINUED

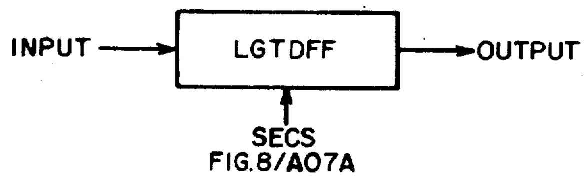
FIG.8/A07A
| INPUT | OUTPUT | ACTION | COUNTER |
|---|---|---|---|
| TRUE | TRUE | NONE | ZERO |
| TRUE | FALSE | RESET | |
| FALSE | TRUE | COUNT= COUNT-1 | COUNT≠0 |
| FALSE | TRUE | RESET OUTPUT AND STOP | COUNT=0 |
| FALSE | FALSE | FINISHED | COUNT REMAINS ZERO |
FIG.8/A07B
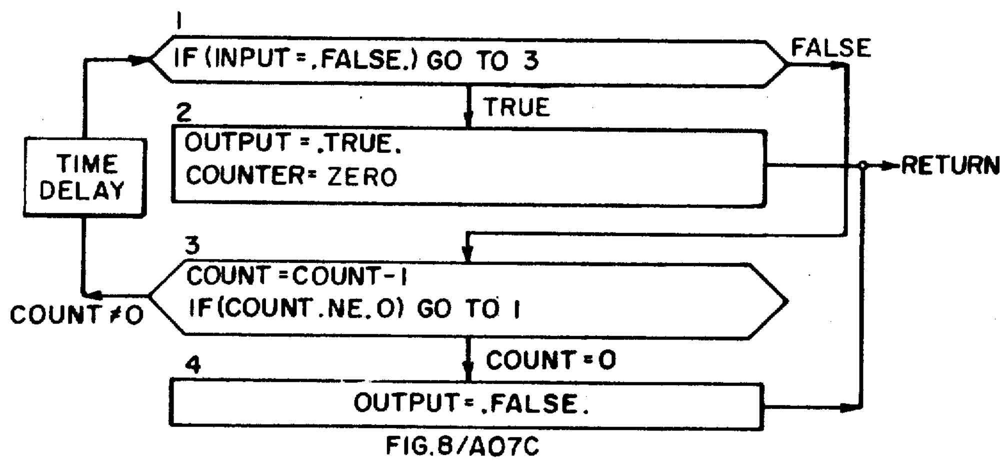
FIG.8/A07C
FIG.8/A07 LGTDFF

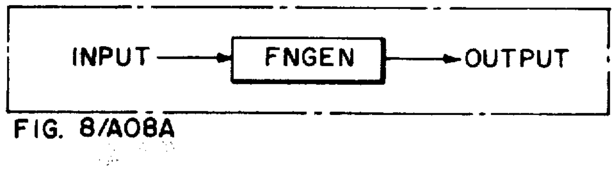
FIG. 8/A08A
CODING
```
BLOCK NUMBER          FNGEN
INPUT = (VARIABLE)
OUTPUT = (VARIABLE)
  LOLIM = CONSTANT
   HILIM = CONSTANT
        X = (ARRAY)
        Y = (ARRAY)
```
FIG. 8/A08B
EXAMPLE
```
21                    FNGEN
   INPUT = A100
  OUTPUT = B100
   LOLIM = 0.5
    HILIM = 4.5
        X = 0, 1, 2, 4, 8
        Y = 1, 3, 4, 5, 4
```
FIG. 8/A08C
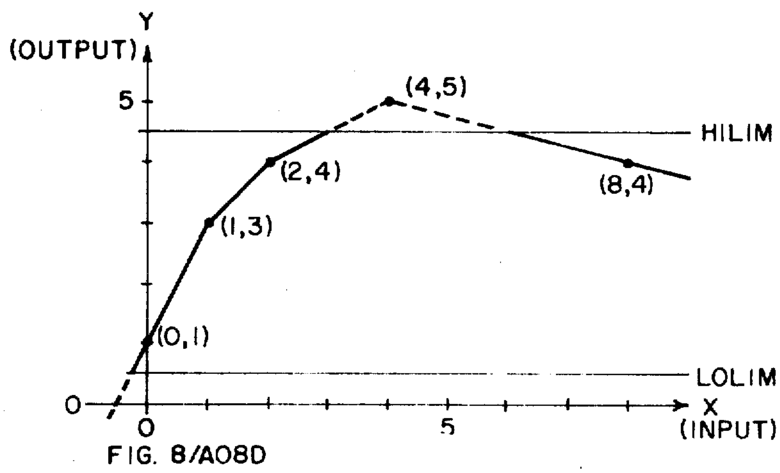
FIG. 8/A08D
$$\text{OUTPUT} = \left[\frac{Y_N - Y_{N-1}}{X_N - X_{N-1}}\right]\left[\text{INPUT} - X_{N-1}\right] + Y_{N-1}$$
FIG. 8/A08E
FIG. 8/A08 FUNCTION GENERATOR

BLOCK FORMAT

| BLOCK NUMBER | TYPE = 7 |
|---|---|
| INPUT ADDRESS | |
| OUTPUT ADDRESS | |
| HILIM CONSTANT | |
| LOLIM CONSTANT | |
| NO. OF X DATA WORDS | |
| FIRST X | |
| SECOND X | |
| ⋮ | |
| LAST X | |
| NO. OF Y DATA WORDS | |
| FIRST Y | |
| SECOND Y | |
| ⋮ | |
| LAST Y | |

FIG. 8/A08F

EXAMPLE

| 1 5 | 0 7 |
|---|---|
| ADDRESS OF A100 | |
| ADDRESS OF B100 | |
| 4.5 | |
| 0.5 | |
| 10 | |
| 0.0 | |
| 1.0 | |
| ⋮ | |
| 8.0 | |
| 10 | |
| 1.0 | |
| 3.0 | |
| ⋮ | |
| 4.0 | |

FIG. 8/A08G

MACRO FORMAT

| #1 | #2 | #3 | #4 | #5 | #6 | #7 | #8 | #9 |
|---|---|---|---|---|---|---|---|---|
| 1 | FNGEN | 7 | 0 | 0 | 0 | 0 | 0 | 0. |
| 2 | INPUT | 1 | 3 | 0 | 0 | 0 | 0 | 0. |
| 2 | OUTPUT | 1 | 3 | 0 | 1 | 0 | 0 | 0. |
| 2 | HILIM | 1 | 2 | 0 | 1 | 0 | 0 | 0. |
| 2 | LOLIM | 1 | 2 | 0 | 1 | 0 | 0 | 0. |
| 2 | X | -20 | 2 | 0 | 1 | 0 | 0 | 0. |
| 2 | Y | -20 | 2 | 0 | 1 | 0 | 0 | 0. |
| 5 | | | | | | | | |

FIG. 8/A08H

FIG. 8/A08 FUNCTION GENERATOR CONT.

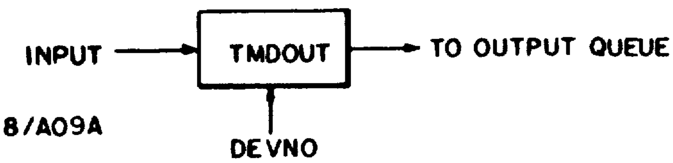
FIG. 8/A09A
INPUT FORMAT
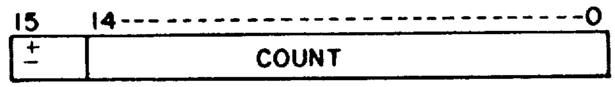
+ = RAISE
− = LOWER
FIG. 8/A09B
CODING
| |
|---|
| BLOCK NUMBER TMDOUT |
| INPUT = ADDRESS |
| DEVNO = INTEGER |
FIG. 8/A09C
EXAMPLE
| | | |
|---|---|---|
| 17 | | TMDOUT |
| INPUT | = | COUNT |
| DEVNO | = | 76 |
FIG. 8/A09D
BLOCK FORMAT
| | | |
|---|---|---|
| 0 | BLOCK NUMBER | TYPE = 9 |
| 1 | INPUT ADDRESS | |
| 2 | DEVICE NO. INTEGER | |
FIG. 8/A09E
EXAMPLE
| | | | | |
|---|---|---|---|---|
| 0 | 1 | 1 | 0 | 9 |
| 1 | (ADDRESS) | | | |
| 2 | 0 | 0 | 4 | C |
FIG. 8/A09F
MACRO FORMAT
| #1 | #2 | #3 | #4 | #5 | #6 | #7 | #8 | #9 |
|---|---|---|---|---|---|---|---|---|
| 1 | TMDOUT | 9 | 0 | 0 | 0 | 0 | 0 | 0 |
| 2 | INPUT | 1 | 6 | 3 | 1 | 0 | 0 | 0 |
| 2 | DEVNO | 1 | 6 | 0 | 1 | 0 | 0 | 0 |
| 5 | | | | | | | | |
FIG. 8/A09G
FIG. 8/A09 TMDOUT

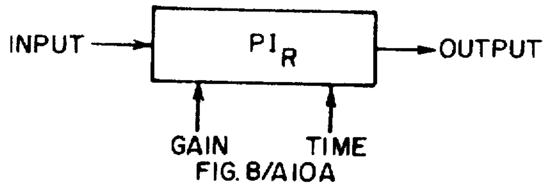
FIG. 8/A10A
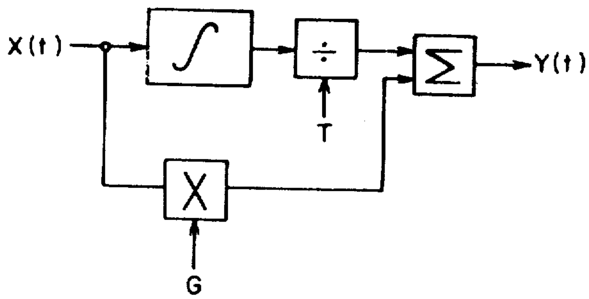
FIG. 8/A10B
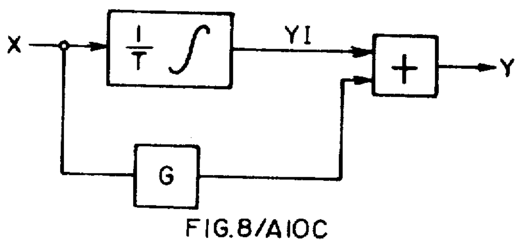
FIG. 8/A10C
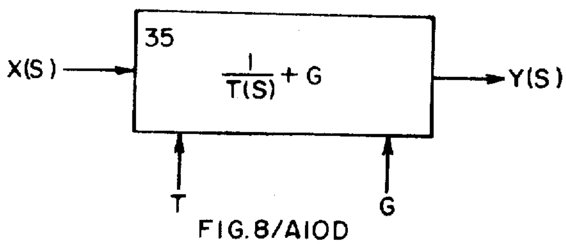
FIG. 8/A10D
```
REAL G,T,X,Y
ΔT = DELTATEE OR PERIOD
YI(t) = YI(t-1) + (ΔT/T) * X(t)
Y(t) = YI(t) + G * X(t)
```
FIG. 8/A10E
FIG.8/A10 ADJPIR

CODING

| |
|---|
| BLOCK NUMBER ADJPIR |
| GAIN = (VARIABLE) |
| TIME =(VARIABLE) |
| INPUT=(VARIABLE) |
| OUTPUT=(VARIABLE) |

FIG.8/A10F

EXAMPLE

| |
|---|
| 35 ADJPIR |
| GAIN = G |
| TIME = T |
| INPUT = X |
| OUTPUT = Y |

FIG.8/A10G

BLOCK FORMAT

| BLOCK NUMBER | TYPE = 10 |
|---|---|
| YI = VALUE OF PAST INTEGRAL | |
| ΔT = VALUE OF DELTATEE OR PERIOD | |
| ADDRESS OF GAIN | |
| ADDRESS OF TIME | |
| ADDRESS OF INPUT | |
| ADDRESS OF OUTPUT | |

FIG.8/A10H

| 2 3 | 0 A |
|---|---|
| 0.0 = INITIAL SETTING | |
| FLOATING POINT # = TENTHS OF SECS | |
| G ADDRESS | |
| T ADDRESS | |
| X ADDRESS | |
| Y ADDRESS | |

FIG.8/A10I

| #1 | #2 | #3 | #4 | #5 | #6 | #7 | #8 | #9 |
|---|---|---|---|---|---|---|---|---|
| 1 | ADJPIR | 10 | 0 | 40 | 0 | | | |
| 2 | GAIN | 1 | 3 | 0 | 1 | 0 | 0 | |
| 2 | TIME | 1 | 3 | 0 | 1 | 0 | 0 | |
| 2 | INPUT | 1 | 3 | 0 | 1 | 0 | 0 | |
| 2 | OUTPUT | 1 | 3 | 0 | 1 | 0 | 0 | |
| 4 | PAST INTEGRAL = YI | 1 | 0 | 1 | 0 | | | |
| 4 | ΔT = DELTATEE OR PERIOD | 2 | 0 | 1 | 0 | | | |
| 5 | | | | | | | | |

FIG.8/A10J

CALCULATION TABLE

| ITEM # | |
|---|---|
| 1 | 0.0 |
| 2 | ΔT |

FIG. 8/A10K

FIG.8/A10 ADJPIR CONT.

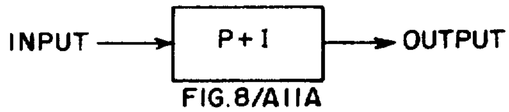
FIG.8/A11A
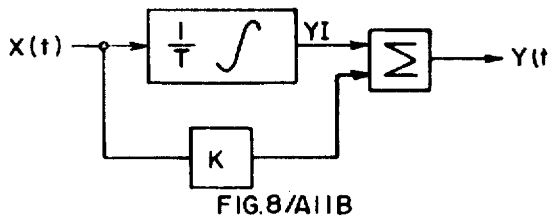
FIG.8/A11B
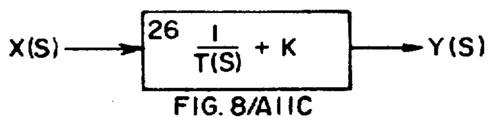
FIG. 8/A11C
$$Y(t) = YI(t-1) + \frac{\Delta T}{T} X(t) + KX(t)$$
$$= YI(t-1) + \left(\frac{\Delta T}{T} + K\right) X(t)$$
$$= YI(t-1) + C1\,X(t)$$
$$YI(t) = Y(t) - K\,X(t)$$
FIG.8/A11D
Y = YI + C1 * X
YI = Y - K * X
FIG.8/A11E
CODING
BLOCK NUMBER PIR
GAIN = CONSTANT
TIME = CONSTANT
INPUT = (VARIABLE)
OUTPUT = (VARIABLE)
FIG.8/A11F
EXAMPLE
| | |
|---|---|
| 25 | PIR |
| GAIN = | 2.0 |
| TIME = | 60.0 |
| INPUT = X | |
| OUTPUT = Y | |
FIG.8/A11G
FIG.8/A11 PIR

BLOCK FORMAT

| | | |
|---|---|---|
| 0 | BLOCK NUMBER | TYPE = 11 |
| 1<br>2 | CI = ΔT/T + K | |
| 3<br>4 | YI = PAST INTEGRAL | |
| 5<br>6 | GAIN | |
| 7<br>8 | TIME | |
| 9 | INPUT ADDRESS | |
| 10 | OUTPUT ADDRESS | |

FIG. 8/A11 H

BLOCK EXAMPLE

| | | | | |
|---|---|---|---|---|
| 0 | 1 | A | 0 | B |
| 1<br>2 | 0.6/60.0 + 2 = 2.01 = .201E1 | | | |
| 3<br>4 | 0.0 | | | |
| 5<br>6 | K = 2.0 | | | |
| 7<br>8 | T = 60.0 | | | |
| 9 | X ADDRESS | | | |
| 10 | Y ADDRESS | | | |

FIG. 8/A11 I

| ITEM | CALCULATION TABLE |
|---|---|
| 1 | 0.0 |
| 2 | ΔT = 0.6 |
| 3 | #WORDS REQ. FOR FILE = 10 |
| 4 | { SPARES } |
| 5 | |
| 6 | K = 2.0 |
| 7 | T = 60.0 |
| 8 | ΔT/T = 0.6/60.0 = .01 |
| 9 | CI = K + T/T = 2.01 |

FIG. 8/A11 J

MACRO FORMAT

| #1 | #2 | #3 | #4 | #5 | #6 | #7 | #8 | #9 |
|---|---|---|---|---|---|---|---|---|
| 1 | PIR | 11 | 0 | 50 | 0 | | | |
| 2 | GAIN | 1 | 2 | 0 | 1 | 0 | 6 | |
| 2 | TIME | 1 | 2 | 0 | 1 | 0 | 7 | |
| 2 | INPUT | 1 | 3 | 0 | 1 | 0 | 0 | |
| 2 | OUTPUT | 1 | 3 | 0 | 1 | 0 | 0 | |
| 3 | ΔT/T | 8 | 2 | 4 | 7 | 0 | 0 | 0. |
| 3 | CI = K + ΔT/T | 9 | 8 | 1 | 6 | | | |
| 4 | CI | 9 | 0 | 1 | 0 | | | |
| 4 | YI | 1 | 0 | 1 | 0 | | | |
| 5 | | | | | | | | |

FIG. 8/A11 K

FIG. 8/A11 PIR CONT.

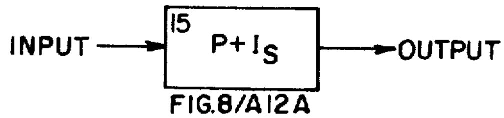

FIG.8/A12A

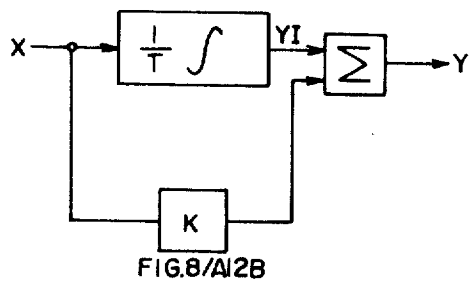

FIG.8/A12B $$Y(t)=Y_I(t-1)+\frac{\Delta T}{2T}\left(X(t)+X(t-1)\right)+KX(t)$$
$$Y(t)=Y_I(t-1)+\left(\frac{\Delta T}{2T}+K\right)X(t)+\frac{\Delta T}{2T}X(t-1)$$
$$Y(t)=Y_I(t-1)+C1X(t)+C2X(t-1)$$
$$Y_I(t)=Y(t)-KX(t)$$

FIG. 8/A12C $$Y=Y_I+C1*X+C2*X\Phi$$
$$Y_I=Y-K*X$$

FIG.8/A12D

CODING

BLOCK NUMBER PIT
GAIN = CONSTANT
TIME = CONSTANT
INPUT = (VARIABLE)
OUTPUT = (VARIABLE)

FIG.8/A12E

EXAMPLE

15 PIT
GAIN = 0. 75
TIME = 10.
INPUT = ERROR
OUTPUT = VALVE 1

FIG.8/A12F

FIG.8/A12 PIT

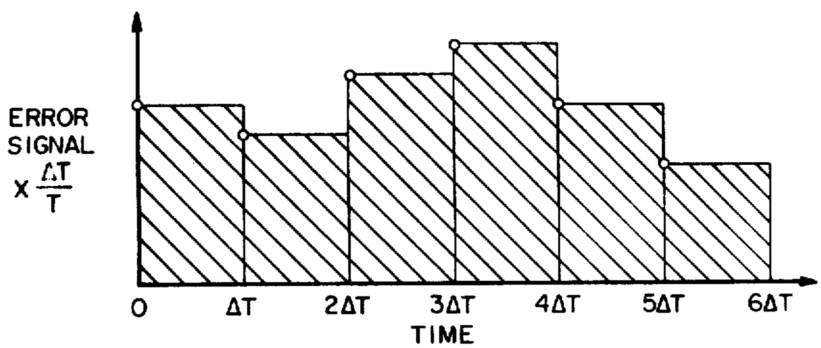
FIG. 8/A12K RECTANGULAR INTEGRATION
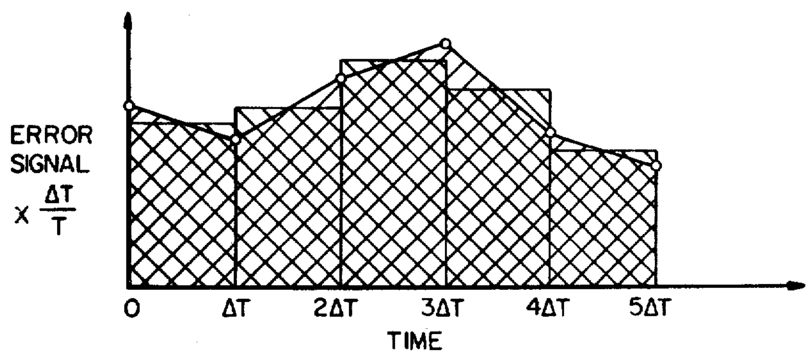
FIG. 8/A12L TRAPEZOIDAL INTEGRATION
FIG. 8/A12 —PIT CONT.

BLOCK FORMAT

| | | |
|---|---|---|
| 0 | BLOCK NUMBER | TYPE = 12 |
| 1<br>2 | C1 | |
| 3<br>4 | C2 | |
| 5<br>6 | Y1 | |
| 7<br>8 | XΦ | |
| 9<br>10 | GAIN | |
| 11<br>12 | TIME | |
| 13 | INPUT ADDRESS | |
| 14 | OUTPUT ADDRESS | |

FIG. 8/A12G

EXAMPLE

| | | | | |
|---|---|---|---|---|
| 0 | 0 | F | 0 | C |
| 1<br>2 | 0.8 | | | |
| 3<br>4 | 0.05 | | | |
| 5<br>6 | 0.0 | | | |
| 7<br>8 | 0.0 | | | |
| 9<br>10 | 0.75 | | | |
| 11<br>12 | 10.0 | | | |
| 13 | E | F | 0 | 7 |
| 14 | A | 9 | C | D |

FIG. 8/A12H

| ITEM | CALCULATION TABLE |
|---|---|
| 1 | 0.0 |
| 2 | DT = 1.0 |
| 3 | # WORDS 14 |
| : | |
| 6 | K = 0.75 |
| 7 | T = 10.0 |
| 8 | C2 = ΔT/(2*T) = .05 |
| 9 | C1 = K + C2 = .8 |
| 10 | 2.0 |

FIG. 8/A12I

MACRO FORMAT

| #1 | #2 | #3 | #4 | #5 | #6 | #7 | #8 | #9 |
|---|---|---|---|---|---|---|---|---|
| 1 | PIT | 12 | 0 | 27.5 | 0 | | | |
| 2 | GAIN = K | 1 | 2 | 0 | 1 | 0 | 6 | |
| 2 | TIME | 1 | 2 | 0 | 1 | 0 | 7 | |
| 2 | INPUT | 1 | 3 | 0 | 1 | 0 | 0 | |
| 2 | OUTPUT | 1 | 3 | 0 | 1 | 0 | 0 | |
| 3 | 2*T | 8 | 7 | 3 | 10 | 10 | 0 | 2.0 |
| 3 | C2 = ΔT/(2*T) | 8 | 2 | 4 | 8 | | | |
| 3 | C1 = C2 + K | 9 | 8 | 1 | 6 | | | |
| 4 | C1 | 9 | 0 | 1 | 0 | | | |
| 4 | C2 | 8 | 0 | 1 | 0 | | | |
| 4 | Y1 | 1 | 0 | 1 | 0 | | | |
| 4 | XΦ | 1 | 0 | 1 | 0 | | | |
| 5 | | | | | | | | |

FIG. 8/A12J

FIG. 8/A12 PIT CONT.

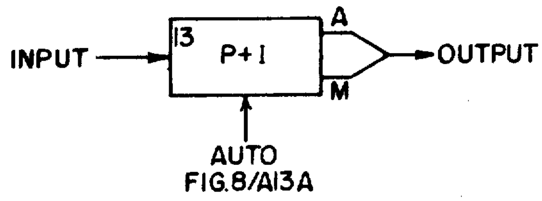

FIG.8/A13A

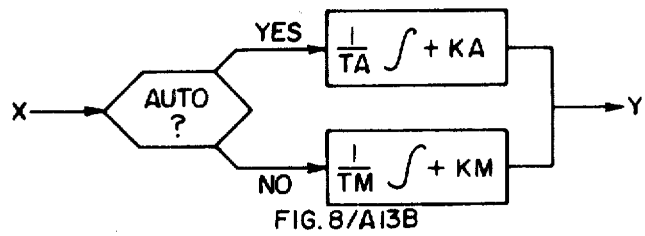

FIG. 8/A13B $$Y(t) = YI(t) + \frac{\Delta T}{2TA}\left(X(t) + X(t-1)\right) + KA\,X(t)$$
$$= YI(t) + \left(\frac{\Delta T}{2TA} + KA\right)X(t) + \frac{\Delta T}{2TA}X(t-1)$$
$$= YI(t) + C2X(t) + C1X(t-1)$$

AUTO MODE

FIG.8/A13C $$Y(t) = YI(t) + \frac{\Delta T}{2TM}\left(X(t) + X(t-1)\right) + KM\,X(t)$$
$$= YI(t) + \left(\frac{\Delta T}{2TM} + KM\right)X(t) + \frac{\Delta T}{2TM}X(t-1)$$
$$= YI(t) + C4X(t) + C3X(t-1)$$

MANUAL MODE

FIG.8/A13D

```
1  IF(AUTO) GO TO 5
2   Y=YI+C3*XΦ+C4*X
3  YI=Y-KM*X
4  RETURN
5  Y=YI+C1*XΦ+C2*X
6  YI=Y-KA*X
7  RETURN
```

FIG.8/A13E

FIG.8/A13 PITXAM

CODING

| |
|---|
| BLOCK NUMBER PITXAM |
| GAINA = CONSTANT |
| TIMEA = CONSTANT |
| GAINM = CONSTANT |
| TIME M = CONSTANT |
| AUTO = (VARIABLE) |
| INPUT = (VARIABLE) |
| OUTPUT = (VARIABLE) |

FIG. 8/A13F

EXAMPLE

| |
|---|
| 13 PITXAM |
| GAINA = KA = .5 |
| TIMEA = TA = 62.5 |
| GAIN M = KM = 5 |
| TIME M = TM = 20.0 |
| AUTO = AUMAN |
| INPUT = X |
| OUTPUT = Y |

FIG. 8/A13G

| ITEM | CALCULATION TABLE |
|---|---|
| 1 | 0.0 |
| 2 | ΔT=0.1 |
| 3 | 23 |
| | |
| 6 | KA= .5 |
| 7 | TA= 62.5 |
| 8 | KM= 5. |
| 9 | TM= 20.0 |
| 10 | ΔT/(2*TA) = C1 = 0.1/125.0 = .8 X 10$^{-3}$ |
| 11 | C2 = C1+KA = .5008 |
| 12 | ΔT/(2*TM) = C3 = .1/40.0 = .25 X 10$^{-2}$ |
| 13 | C4 = C3+KM = 5.0025 |

FIG. 8/A13H

FIG. 8/A13 . PITXAM CONT.

MACRO FORMAT

| #1 | #2 | #3 | #4 | #5 | #6 | #7 | #8 | #9 |
|---|---|---|---|---|---|---|---|---|
| 1 | PITXAM | 13 | 0 | 48 | 0 | | | |
| 2 | GAINA | 1 | 2 | 0 | 1 | 0 | 6 | |
| 2 | TIMEA | 1 | 2 | 0 | 1 | 0 | 7 | |
| 2 | GAINM | 1 | 2 | 0 | 1 | 0 | 8 | |
| 2 | TIME M | 1 | 2 | 0 | 1 | 0 | 9 | |
| 2 | AUTO | 1 | 3 | 0 | 1 | 0 | 0 | |
| 2 | INPUT | 1 | 3 | 0 | 1 | 0 | 0 | |
| 2 | OUTPUT | 1 | 3 | 0 | 1 | 0 | 0 | |
| 3 | 2*TA | 10 | 10 | 3 | 7 | 10 | 0 | 2.0 |
| 3 | ΔT/(C2*TA)=C1 | 10 | 2 | 4 | 10 | 0 | 0 | 0 |
| 3 | C2=C1+KA | 11 | 10 | 1 | 6 | 0 | 0 | 0 |
| 3 | 2*TM | 12 | 12 | 3 | 9 | 12 | 0 | 2.0 |
| 3 | ΔT/(2*TM)=C3 | 12 | 2 | 4 | 12 | 0 | 0 | 0 |
| 3 | C4=C3+KM | 13 | 12 | 1 | 8 | 0 | 0 | 0 |
| 4 | C1 | 10 | 0 | 1 | 0 | | | |
| 4 | C2 | 11 | 0 | 1 | 0 | | | |
| 4 | C3 | 12 | 0 | 1 | 0 | | | |
| 4 | C4 | 13 | 0 | 1 | 0 | | | |
| 4 | YI | 1 | 0 | 1 | 0 | | | |
| 4 | XΦ | 1 | 0 | 1 | 0 | | | |
| 5 | | | | | | | | |

FIG.8/A13I

FIG.8/A13 PITXAM CONT.

BLOCK FORMAT

| Word | | |
|---|---|---|
| 0 | BLOCK NUMBER | TYPE = 13 |
| 1, 2 | C1 | |
| 3, 4 | C2 | |
| 5, 6 | C3 | |
| 7, 8 | C4 | |
| 9, 10 | YI | |
| 11, 12 | XΦ | |
| 13, 14 | GAINA | |
| 15, 16 | TIMEA | |
| 17, 18 | GAINM | |
| 19, 20 | TIMEM | |
| 21 | ADDRESS AUTO | |
| 22 | ADDRESS INPUT | |
| 23 | ADDRESS OUTPUT | |

FIG. 8/A13J

EXAMPLE

| Word | | | | |
|---|---|---|---|---|
| 0 | 0 | D | 0 | D |
| 1, 2 | $.8 \times 10^{-3}$ | | | |
| 3, 4 | .5008 | | | |
| 5, 6 | $.25 \times 10^{-2}$ | | | |
| 7, 8 | 5.0025 | | | |
| 9, 10 | 0.0 | | | |
| 11, 12 | 0.0 | | | |
| 13, 14 | .5 | | | |
| 15, 16 | 62.5 | | | |
| 17, 18 | .5 | | | |
| 19, 20 | 20.0 | | | |
| 21 | =AUMAN | | | |
| 22 | = X | | | |
| 23 | = Y | | | |

FIG. 8/A13K

FIG. 8/A13 PITXAM CONT.

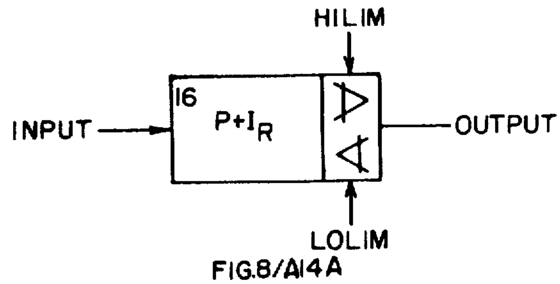
FIG.8/A14A
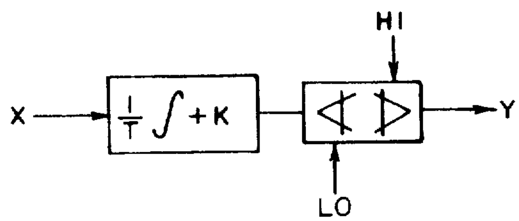
FIG.8/A14B
```
Y = YI + CI * X
YI = Y - K * X
IF(Y.GE.HI) Y = HI
IF(Y.LE.LO) Y = LO
```
FIG.8/A14C
CODING
| BLOCK NUMBER | PIRLIM |
|---|---|
| GAIN = | CONSTANT |
| TIME = | CONSTANT |
| HILIM = | CONSTANT |
| LOLIM = | CONSTANT |
| INPUT = | (VARIABLE) |
| OUTPUT = | (VARIABLE) |
FIG.8/A14D
EXAMPLE
| 16 | PIRLIM |
|---|---|
| GAIN = | 3.0 |
| TIME = | 60.0 |
| HILIM = | 25.0 |
| LOLIM = | -25.0 |
| INPUT = | X |
| OUTPUT = | Y |
FIG.8/A14E
| ITEM | CALCULATION TABLE |
|---|---|
| 1 | 0.0 |
| 2 | 6.0 |
| 3 | 14 |
| ⋮ | ⋮ |
| 6 | 3.0 |
| 7 | 60.0 |
| 8 | 3.1 |
FIG.8/A14F
FIG.8/A14 PIRLIM

BLOCK FORMAT

| | | |
|---|---|---|
| 0 | BLOCK NUMBER | TYPE = 14 |
| 1 2 | CI | |
| 3 4 | YI | |
| 5 6 | GAIN | |
| 7 8 | TIME | |
| 9 10 | HILIM | |
| 11 12 | LOLIM | |
| 13 | INPUT ADDRESS | |
| 14 | OUTPUT ADDRESS | |

FIG.8/A14G

EXAMPLE

| | | | | | |
|---|---|---|---|---|---|
| 0 | I | 0 | 0 | E |
| 1 2 | 3.1 | | | |
| 3 4 | 0.0 | | | |
| 5 6 | 3.0 | | | |
| 7 8 | 60.0 | | | |
| 9 10 | 25.0 | | | |
| 11 12 | -25.0 | | | |
| 13 | = X | | | |
| 14 | = Y | | | |

FIG.8/A14H

MACRO FORMAT

| #1 | #2 | #3 | #4 | #5 | #6 | #7 | #8 | #9 |
|---|---|---|---|---|---|---|---|---|
| 1 | PIRIM | 14 | 0 | 70 | 0 | | | |
| 2 | GAIN | 1 | 2 | 0 | 1 | 0 | 6 | |
| 2 | TIME | 1 | 2 | 0 | 1 | 0 | 7 | |
| 2 | HILIM | 1 | 2 | 0 | 1 | 0 | | |
| 2 | LOLIM | 1 | 2 | 0 | 1 | 0 | | |
| 2 | INPUT | 1 | 3 | 0 | 1 | 0 | | |
| 2 | OUTPUT | 1 | 3 | 0 | 1 | 0 | | |
| 3 | ΔT/T | 8 | 2 | 4 | 7 | 0 | 0 | 0. |
| 3 | CI = ΔT/T+K | 8 | 8 | 1 | 6 | 0 | 0 | 0. |
| 4 | CI | 8 | 0 | 1 | 0 | 0 | | |
| 4 | YI | 1 | 0 | 1 | 0 | | | |

FIG.8/A14I

FIG.8/A14 PIRLIM CONT.

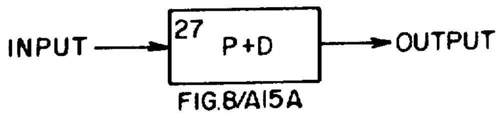

FIG.8/A15A

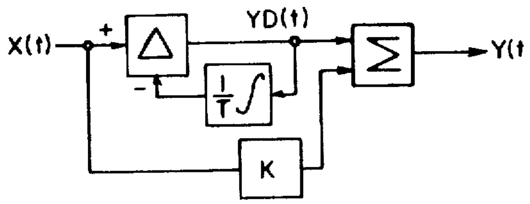

FIG.8/A15B

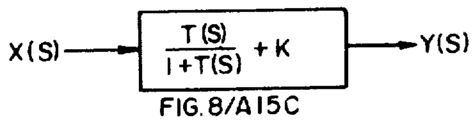

FIG.8/A15C

DERIVAT VE RECTANGULAR $$YD(t) = X(t) - \frac{1}{T}\int YD(t)$$

$$\dot{YD}(t) = \dot{X}(t) - \frac{1}{T}\,YD(t)$$

$$\frac{YD(t)-YD(t-1)}{\Delta T} = \frac{X(t)-X(t-1)}{\Delta T} - \frac{1}{T}\,YD(t)$$

$$YD(t)(T+\Delta T) = \left(YD(t-1)+X(t)-X(t-1)\right)$$

$$Y(t) = \frac{T}{T+\Delta T}\left[YD(t-1)+X(t)-X(t-1)\right] + KX(t)$$

$$CI = T/(T+\Delta T)$$

FIG.8/A15D

DERIVATIVE TRAPEZOIDAL $$\frac{YD(t)-YD(t-1)}{\Delta T} = \frac{X(t)-X(t-1)}{\Delta T} - \frac{1}{2T}\,YD(t)+YD(t-1)$$

$$YD(t)(2T+\Delta T) = 2T\left(X(t)-X(t-1)\right)+(2T-\Delta T)\,YI(t-1)$$

$$Y(t) = \frac{2T}{2T+\Delta T}\left(X(t)-X(t-1)\right)+\frac{2T-\Delta T}{2T+\Delta T}\,YD(t-1)+KX(t)$$

$$CI = \frac{2T}{2T-\Delta T}$$

$$C2 = \frac{2T-\Delta T}{2T+\Delta T}$$

FIG.8/A15E

FIG. 8/A15 PDR & PDT

PDR

| |
|---|
| YD=CI*(YD+Y-XΦ) |
| Y=YD+K*X |

FIG.8/A15F

PDT

| |
|---|
| YD=CI*(X-XΦ)+C2*YD |
| Y= YD+K*X |

FIG.8/A15G

CODING

| | |
|---|---|
| BLOCK NUMBER | PDR+PDT |
| INPUT=(VARIABLE) | |
| OUTPUT=(VARIABLE) | |
| GAIN = CONSTANT | |
| TIME = CONSTANT | |

FIG.8/A15H

EXAMPLE

| | |
|---|---|
| 27 | PDR+PDT |
| INPUT = | X |
| OUTPUT = | Y |
| GAIN=K = | 0.0 |
| TIME=T = | 10.0 |

FIG.8/A15 I

BLOCK FORMAT

| | | |
|---|---|---|
| 0 | BLOCK NUMBER | TYPE= 15 |
| 1<br>2 | CI | |
| 3<br>4 | XΦ | |
| 5<br>6 | YD | |
| 7<br>8 | GAIN | |
| 9<br>10 | TIME | |
| 11 | INPUT | |
| 12 | OUTPUT | |

FIG.8/A15 J

EXAMPLE

| | | | | |
|---|---|---|---|---|
| 0 | I | B | O | E |
| 1<br>2 | CI = 10/(10+1) | | | |
| 3<br>4 | 0.0 | | | |
| 5<br>6 | 0.0 | | | |
| 7<br>8 | K = 0.0 | | | |
| 9<br>10 | T = 10.0 | | | |
| 11 | = X | | | |
| 12 | = Y | | | |

FIG.8/A15K

FIG.8/A15 PDR & PDT CONT.

MACRO FORMAT

| #1 | #2 | #3 | #4 | #5 | #6 | #7 | #8 | #9 |
|---|---|---|---|---|---|---|---|---|
| 1 | PRD | 15 | 0 | 35 | 0 | | | |
| 2 | GAIN | 1 | 2 | 0 | 1 | 0 | 6 | |
| 2 | TIME | 1 | 2 | 0 | 1 | 0 | 7 | |
| 2 | INPUT | 1 | 3 | 0 | 1 | 0 | 0 | |
| 2 | OUTPUT | 1 | 3 | 0 | 1 | 0 | 0 | |
| 3 | T+ΔT | 8 | 7 | 1 | 2 | | | |
| 3 | T/(T+ΔT)=C1 | 8 | 7 | 4 | 8 | | | |
| 4 | C1 | 8 | 0 | 1 | 0 | | | |
| 4 | XΦ | 1 | 0 | 1 | 0 | | | |
| 4 | YD | 1 | 0 | 1 | 0 | | | |
| 5 | | | | | | | | |

FIG.8/A15L

| ITEM | CALCULATION TABLE PRD |
|---|---|
| 1 | 0.0 |
| 2 | ΔT=1.0 |
| 3 | 12 |
| ⋮ | ⋮ |
| 6 | K=0.0 |
| 7 | T=10.0 |
| 8 | C1=T/(T+ΔT) |

FIG.8/A15M

| ITEM | CALCULATION TABLE PRT |
|---|---|
| 1 | 0.0 |
| 2 | ΔT=1.0 |
| 3 | 14 |
| ⋮ | ⋮ |
| 6 | K=0.0 |
| 7 | T=10.0 |
| 8 | C1=2T/(2T+ΔT) |
| 9 | C2=(2T-ΔT)/(2T+ΔT) |

FIG.8/A15N

MACRO FORMAT

| #1 | #2 | #3 | #4 | #5 | #6 | #7 | #8 | #9 |
|---|---|---|---|---|---|---|---|---|
| 1 | PRT | 15 | 0 | 50 | 0 | | | |
| 2 | GAIN | 1 | 2 | 0 | 1 | 0 | 6 | |
| 2 | TIME | 1 | 2 | 0 | 1 | 0 | 7 | |
| 2 | INPUT | 1 | 3 | 0 | 1 | 0 | 0 | |
| 2 | OUTPUT | 1 | 3 | 0 | 1 | 0 | 0 | |
| 3 | 2*T | 8 | 8 | 3 | 7 | 8 | | 2.0 |
| 3 | 2*T+ΔT | 9 | 8 | 1 | 2 | | | |
| 3 | C1=2*T/(2*T+ΔT) | 8 | 8 | 4 | 9 | | | |
| 3 | ΔT/(2*T+ΔT) | 9 | 2 | 4 | 9 | | | |
| 3 | C2=(2*T-ΔT)/(2*T*ΔT) | 9 | 8 | 1 | 9 | | | |
| 4 | C1 | 8 | 0 | 1 | 0 | | | |
| 4 | C2 | 9 | 0 | 1 | 0 | | | |
| 4 | XΦ | 1 | 0 | 1 | 0 | | | |
| 4 | YD | 1 | 0 | 1 | 0 | | | |
| 5 | | | | | | | | |

FIG.8/A15O

FIG.8/A15 PDR & PDT CONT.

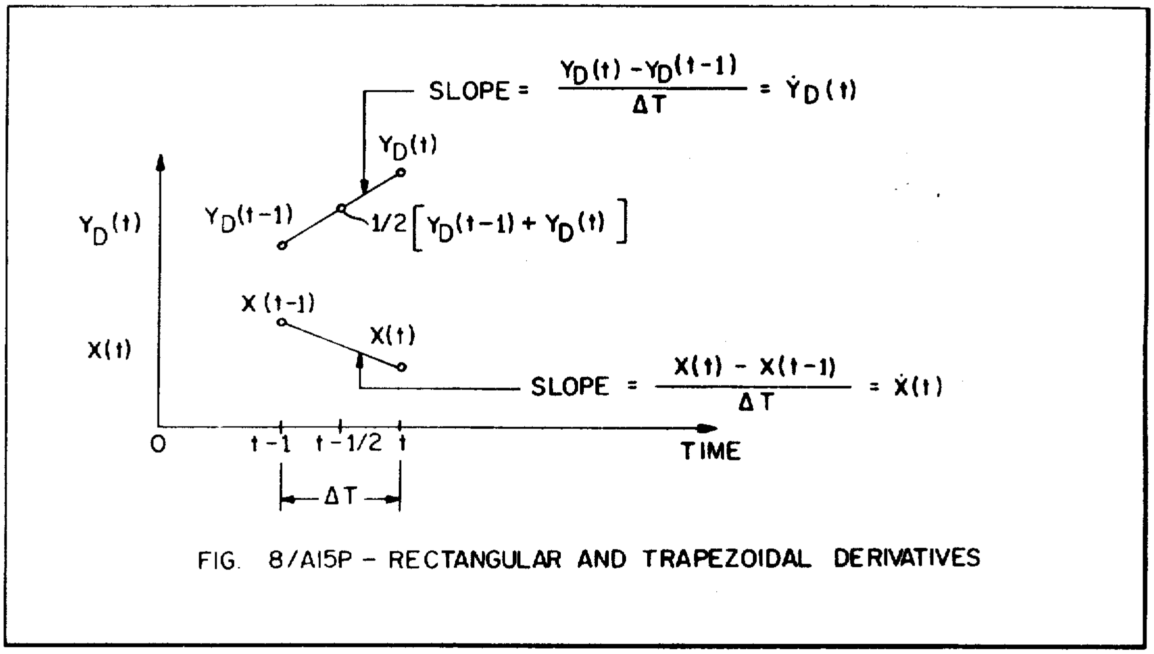
FIG. 8/A15P – RECTANGULAR AND TRAPEZOIDAL DERIVATIVES
FIG. 8/A15 PDR & PDT CONT.

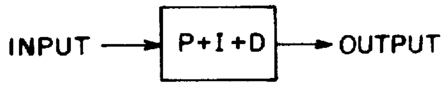
FIG. 8/A16A
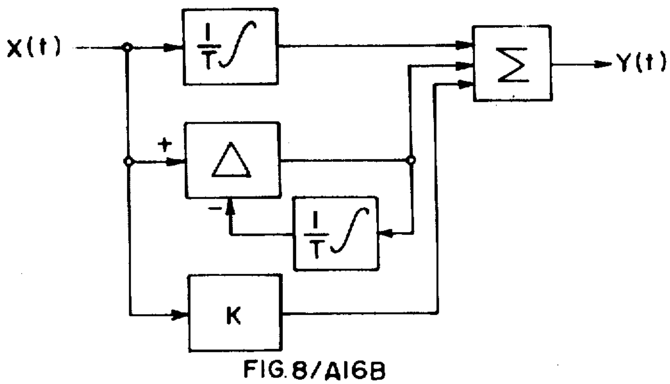
FIG. 8/A16B
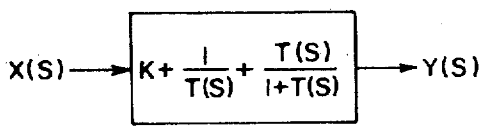
FIG. 8/A16C
$$Y(t) = \underbrace{KX(t)}_{P} + \underbrace{Y(t-1) + \frac{\Delta T}{2T}\left[X(t) + X(t-1)\right]}_{I} + \underbrace{\frac{2T-\Delta T}{2T+\Delta T}Y(t-1) + \frac{2T}{2T+\Delta T}\left[X(t) - X(t-1)\right]}_{D}$$
FIG. 8/A16D
FIG. 8/A16 PIDT

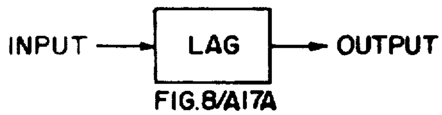

FIG.8/A17A

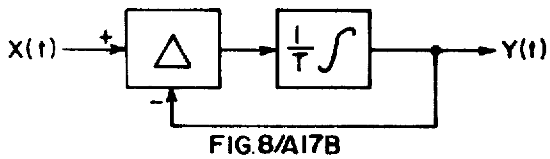

FIG.8/A17B

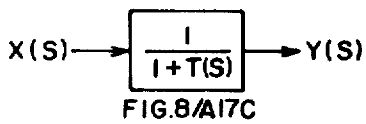

FIG.8/A17C

LAGR $$\frac{1}{T}\int X(t)-Y(t)=Y(t)$$

$$\frac{1}{T}\left[X(t)-Y(t)\right]=\dot{Y}(t)=\frac{Y(t)-Y(t-1)}{\Delta T}$$

$$Y(t)\left[\frac{1}{\Delta T}+\frac{1}{T}\right]=\frac{1}{T}X(t)+\frac{Y(t-1)}{\Delta T}$$

$$Y(t)\left[\frac{T+\Delta T}{\Delta T * T}\right]=\frac{X(t)\Delta T+Y(t-1)\ T}{\Delta T * T}$$

$$Y(t)=\frac{T}{T+\Delta T}\ Y(t-1)+\frac{\Delta T}{T+\Delta T}X(t)$$

LAGT $$\frac{1}{2T}\left[\left(X(t)+X(t-1)\right)-\left(Y(t)+Y(t-1)\right)\right]=\frac{Y(t)-Y(t-1)}{\Delta T}$$

$$Y(t)=\frac{2T-\Delta T}{2T+\Delta T}\ Y(t-1)+\frac{\Delta T}{2T+\Delta T}\left[X(t)+X(t-1)\right]$$

$$=C1*Y(t-1)+C2*\left(X(t)+X(t-1)\right)$$

FIG.8/A17E

FIG. 8/A17 LAGR, LAGT, LAGPT, LEAD-LAG

LEAD-LAG
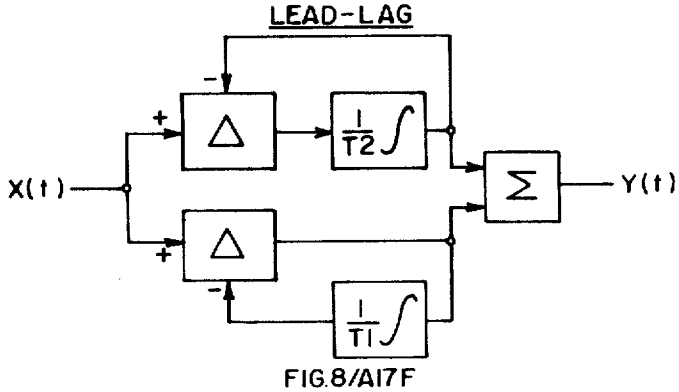
FIG.8/A17F
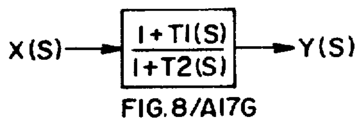
FIG.8/A17G
LAGPT
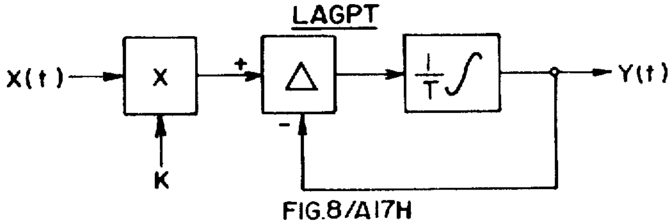
FIG.8/A17H
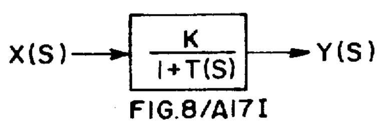
FIG.8/A17I
$$Y(t) = \frac{2T - \Delta T}{2T + \Delta T} Y(t-1) + \frac{\Delta T}{2T + \Delta T} \left[ X(t) + X(t-1) \right] * K$$
FIG.8/A17J
FIG.8/A17 LAGR, LAGT, LAGPT, LEAD-LAG CONT.

FIG.8/A18A

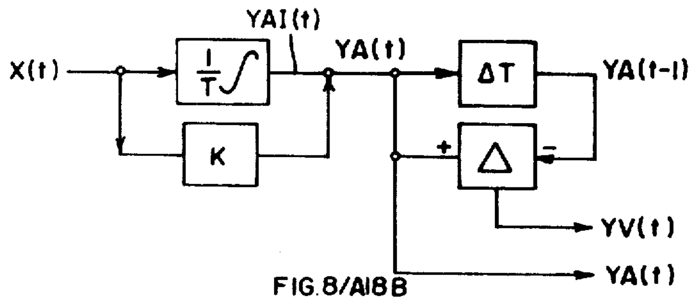

FIG.8/A18B $$YA = YAI + \left(\frac{\Delta T}{T} + K\right) * X$$

$$= YAI + CI * X$$

$$YAI = YA - K * X$$

$$YV = CI * X - K * X\Phi$$

FIG.8/A18C

VELOCITY FORM-GENERAL $$YV(t) = K\left[X(t) - X(t-1)\right] + \frac{\Delta T}{T} X(t)$$

$$= CIX(t) - KX(t-1)$$

FIG.8/A18D

CODING

BLOCK NUMBER = PIAVR
GAIN = CONSTANT
TIME = CONSTANT
INPUT = (VARIABLE)
OUTABS = (VARIABLE)
OUTVEL = (VARIABLE)

FIG.8/A18E

EXAMPLE

| | |
|---|---|
| 64 | PIAVR |
| GAIN = | K |
| TIME = | T |
| INPUT = | X |
| OUTABS = | YA |
| OUTVEL = | YV |

FIG.8/A18F

FIG.8/A18 ABSOLUTE & VELOCITY OR

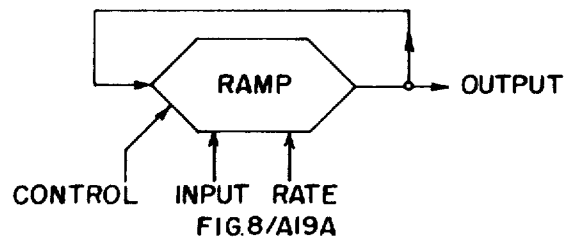
FIG.8/A19A
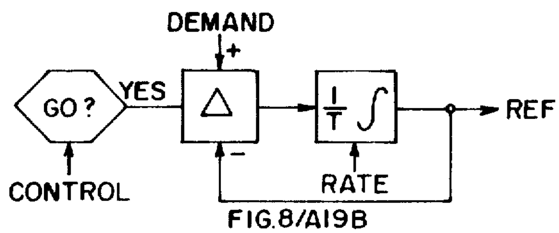
FIG.8/A19B
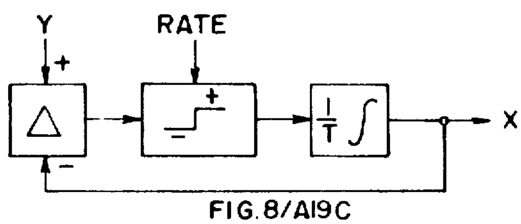
FIG.8/A19C
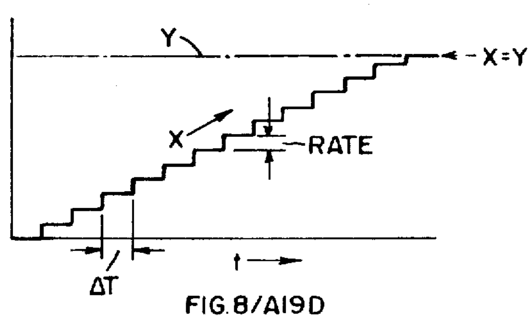
FIG.8/A19D
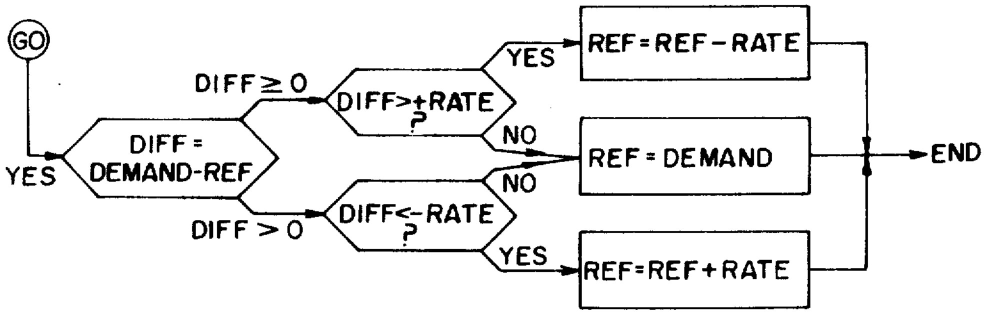
FIG. 8/A19E
FIG.8/A19 RAMP

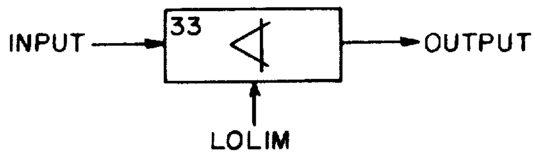

FIG.8/A20A

CODING

| | |
|---|---|
| BLOCK NUMBER | LOWLMT |
| INPUT = SYMBOL | |
| OUTPUT = SYMBOL | |
| LOLIM = CONSTANT | |

FIG.8/A20B

EXAMPLE

| | | |
|---|---|---|
| 33 | | LOWLMT |
| INPUT | = | SP |
| OUTPUT | = | SPLOLM |
| LOLIM | = | 10.3 |

FIG.8/A20C

BLOCK FORMAT

| | | |
|---|---|---|
| 0 | BLOCK NUMBER | TYPE = 20 |
| 1 | LOLIM | |
| 2 | | |
| 3 | INPUT ADDRESS | |
| 4 | OUTPUT ADDRESS | |

FIG.8/A20D

EXAMPLE

| | | | | |
|---|---|---|---|---|
| 0 | 2 | 1 | 1 | 4 |
| 1 | -10.3 | | | |
| 2 | | | | |
| 3 | = SP | | | |
| 4 | = SPLOLM | | | |

FIG.8/A20E

FORTRAN

```
OUTPUT = INPUT
IF(INPUT.LT.LOLIM)OUTPUT= LOLIM
RETURN
```

FIG.8/A20F

MACRO FORMAT

| #1 | #2 | #3 | #4 | #5 | #6 | #7 | #8 | #9 |
|---|---|---|---|---|---|---|---|---|
| 1 | LOWLMT | 20 | 0 | 0 | 0 | | | |
| 2 | LOLIM | 1 | 2 | 0 | 1 | | | |
| 2 | INPUT | 1 | 3 | 0 | 1 | | | |
| 2 | OUTPUT | 1 | 3 | 0 | 1 | | | |
| 5 | | | | | | | | |

FIG.8/A20G

FIG.8/A20 LOWLMT

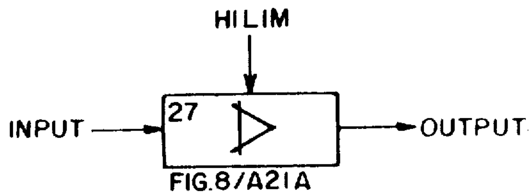

FIG.8/A21A

CODING

| |
|---|
| BLOCK NUMBER HIGHLMT |
| HILIM = CONSTANT |
| INPUT = SYMBOL |
| OUTPUT = SYMBOL |

FIG.8/A21B

EXAMPLE

| |
|---|
| 27 HIGHLMT |
| HILIM = -0.2E-3 |
| INPUT = SP |
| OUTPUT = SPHILM |

FIG.8/A21C

BLOCK FORMAT

| | | |
|---|---|---|
| 0 | BLOCK NUMBER | TYPE = 21 |
| 1<br>2 | HILIM CONSTANT | |
| 3 | INPUT ADDRESS | |
| 4 | OUTPUT ADDRESS | |

FIG.8/A21D

EXAMPLE

| | | |
|---|---|---|
| 0 | 1 8 | 1 5 |
| 1<br>2 | $-.2 \times 10^{-3}$ | |
| 3 | = SP | |
| 4 | =SPHILM | |

FIG.8/A21E

FORTRAN

```
OUTPUT = INPUT
IF(INPUT.GT.HILIM) OUTPUT = HILIM
RETURN
```

FIG.8/A21F

MACRO FORMAT

| #1 | #2 | #3 | #4 | #5 | #6 | #7 | #8 | #9 |
|---|---|---|---|---|---|---|---|---|
| 1 | HIGHLMT | 21 | 0 | 0 | 0 | | | |
| 2 | HILMT | 1 | 2 | 0 | 1 | | | |
| 2 | INPUT | 1 | 3 | 0 | 1 | | | |
| 2 | OUTPUT | 1 | 3 | 0 | 1 | | | |
| 5 | | | | | | | | |

FIG.8/A21G

FIG.8/A21 HIGHLMT

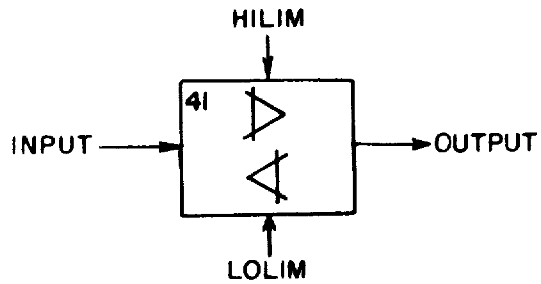

FIG. 8/A22A

CODING

| |
|---|
| BLOCK NUMBER HILOLMT |
| HILIM = CONSTANT |
| LOLIM = CONSTANT |
| INPUT = (SYMBOL) |
| OUTPUT = (SYMBOL) |

FIG. 8/A22B

EXAMPLE

| | | |
|---|---|---|
| 41 | | HILOLMT |
| HILIM | = | 25.7 |
| LOLIM | = | 5.36 |
| INPUT | = | SP |
| OUTPUT | = | SPHILOLM |

FIG. 8/A22C

BLOCK FORMAT

| | | |
|---|---|---|
| 0 | BLOCK NUMBER | TYPE = 22 |
| 1<br>2 | HILIM CONSTANT | |
| 3<br>4 | LOLIM CONSTANT | |
| 5 | INPUT ADDRESS | |
| 6 | OUTPUT ADDRESS | |

FIG. 8/A22D

EXAMPLE

| | | |
|---|---|---|
| 0 | 2 9 | 1 6 |
| 1<br>2 | $.257 \times 10^2$ | |
| 3<br>4 | $.536 \times 10^1$ | |
| 5 | ADDRESS FOR SP | |
| 6 | ADDRESS FOR SPHILOLM | |

FIG. 8/A22E

FORTRAN

```
OUTPUT = INPUT
IF INPUT .GE. HILIM OUTPUT = HILIM
IF INPUT .LE. LOLIM OUTPUT = LOLIM
RETURN
```

FIG. 8/A22F

MACRO FORMAT

| #1 | #2 | #3 | #4 | #5 | #6 | #7 | #8 | #9 |
|---|---|---|---|---|---|---|---|---|
| 1 | HILOLMT | 22 | 0 | 0 | 0 | 0 | 0 | 0. |
| 2 | HILIM | 1 | 2 | 0 | 1 | 0 | 0 | 0. |
| 2 | LOLIM | 1 | 2 | 0 | 1 | 0 | 0 | 0. |
| 2 | INPUT | 1 | 3 | 0 | 1 | 0 | 0 | 0. |
| 2 | OUTPUT | 1 | 3 | 0 | 1 | 0 | 0 | 0. |
| 5 | | | | | | | | |

FIG. 8/A22G

FIG. 8/A22 HILOLMT

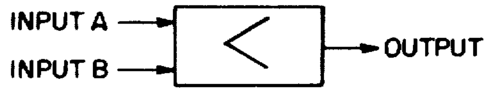

FIG. 8/A23A

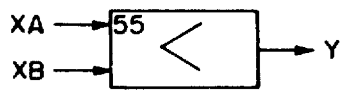

FIG. 8/A23B

FORTRAN

```
Y= XA
IF(XB . LT. XA) Y=XB
RETURN
```

FIG. 8/A23C

CODING

```
BLOCK NUMBER LOSEL
INPUT A=(SYMBOL)
INPUT B=(SYMBOL)
OUTPUT=(SYMBOL)
```

FIG. 8/A23D

EXAMPLE

```
55 LOSEL
INPUT A = XA
INPUT B = XB
OUTPUT = Y
```

FIG. 8/A23E.

BLOCK FORMAT

| | | |
|---|---|---|
| 0 | BLOCK NUMBER | TYPE = 23 |
| 1 | INPUT A ADDRESS | |
| 2 | INPUT B ADDRESS | |
| 3 | OUTPUT ADDRESS | |

FIG. 8/A23F

EXAMPLE

| | | | | |
|---|---|---|---|---|
| 0 | 3 | 7 | 1 | 7 |
| 1 | = XA | | | |
| 2 | = XB | | | |
| 3 | = Y | | | |

FIG. 8/A23G

MACRO FORMAT

| #1 | #2 | #3 | #4 | #5 | #6 | #7 | #8 | #9 |
|---|---|---|---|---|---|---|---|---|
| 1 | LOSEL | 23 | 0 | 0 | 0 | 0 | 0 | 0. |
| 2 | INPUT A | 1 | 3 | 0 | 1 | 0 | 0 | 0. |
| 2 | INPUT B | 1 | 3 | 0 | 1 | 0 | 0 | 0. |
| 2 | OUTPUT | 1 | 3 | 0 | 1 | 0 | 0 | 0. |
| 5 | | | | | | | | |

FIG. 8/A23H

FIG. 8/A23 LOSEL

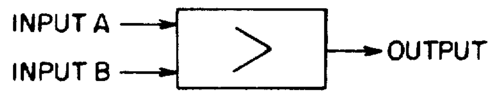

FIG. 8/A24A

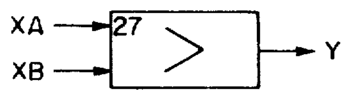

FIG. 8/A24B

FORTRAN

```
Y=XA
IF(XB.GT.XA)Y=XB
RETURN
```

FIG. 8/A24C

CODING

```
BLOCK NUMBER HISEL
INPUT A=(SYMBOL)
INPUT B=(SYMBOL)
OUTPUT=(SYMBOL)
```

FIG. 8/A24D

EXAMPLE

```
27 HISEL
INPUT A = XA
INPUT B = XB
OUTPUT = Y
```

FIG. 8/A24E.

BLOCK FORMAT

| | | |
|---|---|---|
| 0 | BLOCK NUMBER | TYPE = 24 |
| 1 | INPUT A ADDRESS | |
| 2 | INPUT B ADDRESS | |
| 3 | OUTPUT ADDRESS | |

FIG. 8/A24F

EXAMPLE

| | | |
|---|---|---|
| 0 | I B | I 8 |
| 1 | = XA | |
| 2 | = XB | |
| 3 | = Y | |

FIG. 8/A24G

MACRO FORMAT

| #1 | #2 | #3 | #4 | #5 | #6 | #7 | #8 | #9 |
|---|---|---|---|---|---|---|---|---|
| 1 | HISEL | 24 | 0 | 0 | 0 | 0 | 0 | 0. |
| 2 | INPUT A | 1 | 3 | 0 | 1 | 0 | 0 | 0. |
| 2 | INPUT B | 1 | 3 | 0 | 1 | 0 | 0 | 0. |
| 2 | OUTPUT | 1 | 3 | 0 | 1 | 0 | 0 | 0. |
| 5 | | | | | | | | |

FIG. 8/A24H

FIG. 8/A24 HISEL

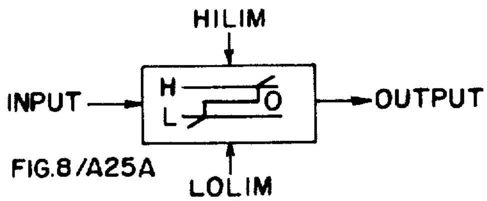

FIG.8/A25A

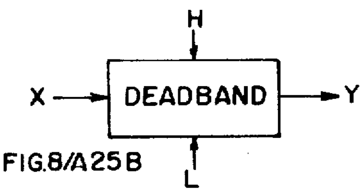

FIG.8/A25B

FORTRAN

```
IF [(L< X).AND.(X<H)] Y=0
IF [(L≥X).OR.(X≥H)] Y=X
RETURN
```

FIG.8/A25C

FORTRAN (ALTERNATE VERSION)

```
  Y=X
IF[(X.LT.H).AND.(X.GT.L)]Y=0
  RETURN
```

FIG.8/A25D

CODING

BLOCK NUMBER DEADBAND
HILIM CONSTANT
LOLIM CONSTANT
INPUT (SYMBOL)
OUTPUT (SYMBOL)

FIG.8/A25E

EXAMPLE

19 DEADBAND
HILIM = H = -.73
LOLIM = L = -1.56
INPUT = X
OUTPUT = Y

FIG.8/A25F

BLOCK FORMAT

| | | |
|---|---|---|
| 0 | BLOCK NUMBER | TYPE = 25 |
| 1<br>2 | HILIM CONSTANT | |
| 3<br>4 | LOLIM CONSTANT | |
| 5 | INPUT ADDRESS | |
| 6 | OUTPUT ADDRESS | |

FIG.8/A25G

EXAMPLE

| | | | | | |
|---|---|---|---|---|---|
| 0 | 1 | 3 | 1 | 9 |
| 1<br>2 | -.73 | | | |
| 3<br>4 | -1.56 | | | |
| 5 | = X | | | |
| 6 | = Y | | | |

FIG.8/A25H

MACRO FORMAT

| #1 | #2 | #3 | #4 | #5 | #6 | #7 | #8 | #9 |
|---|---|---|---|---|---|---|---|---|
| 1 | DEADBAND | 25 | 0 | 0 | 0 | | | |
| 2 | HILIM | 1 | 2 | 0 | 1 | | | |
| 2 | LOLIM | 1 | 2 | 0 | 1 | | | |
| 2 | INPUT | 1 | 3 | 0 | 1 | | | |
| 2 | OUTPUT | 1 | 3 | 0 | 1 | | | |
| 5 | | | | | | | | |
| | | | | | | | | |
| | | | | | | | | |

FIG.8/A25I

FIG.8/A25 DEADBAND

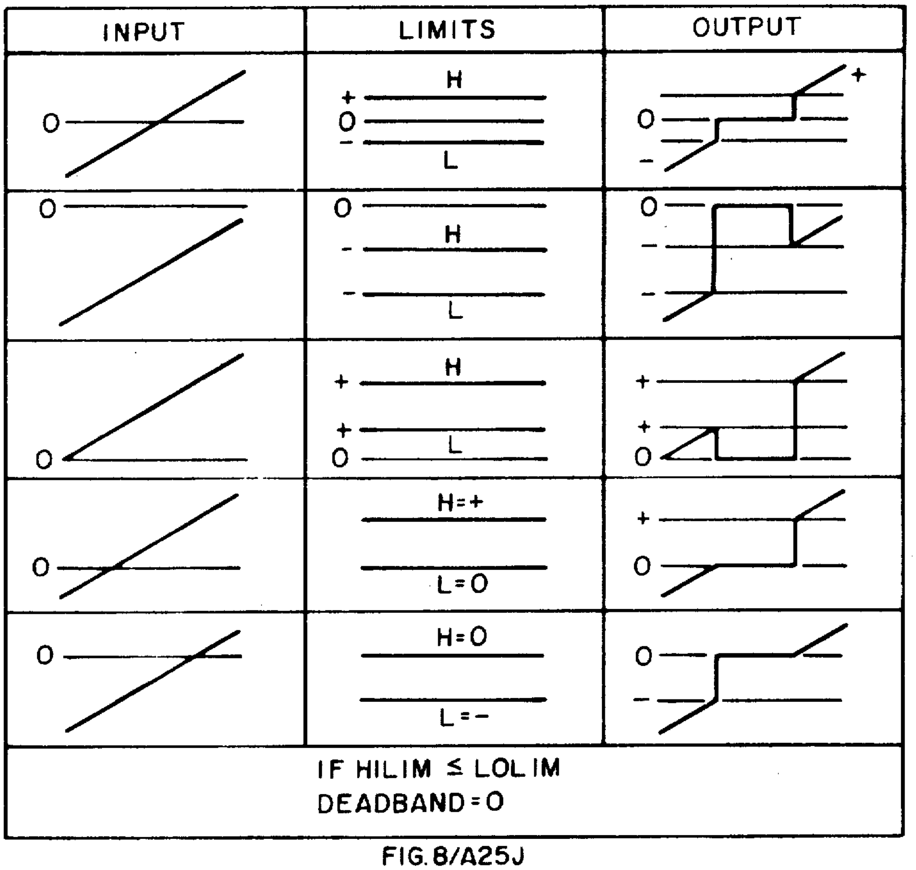
FIG. 8/A25J
ADJDBAND
BLOCK FORMAT
| BLOCK NUMBER | TYPE |
|---|---|
| HILIM ADDRESS | |
| LOLIM ADDRESS | |
| INPUT ADDRESS | |
| OUTPUT ADDRESS | |
FIG. 8/A25K
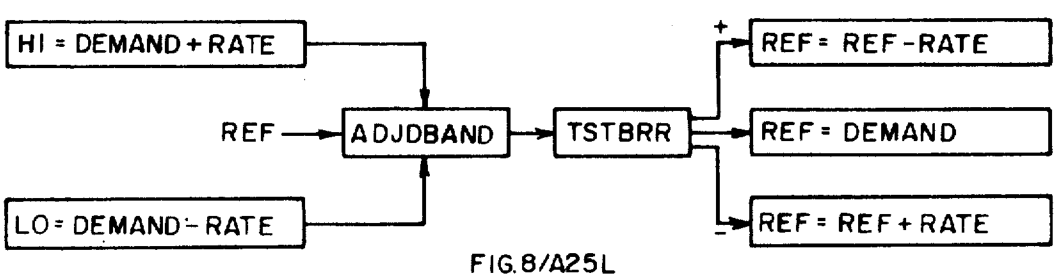
FIG. 8/A25L
FIG. 8/A25 DEADBAND CONT.

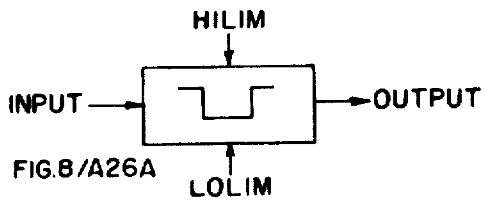

FIG.8/A26A

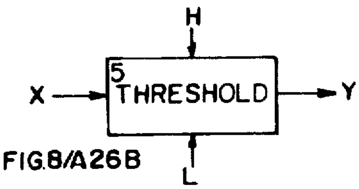

FIG.8/A26B

FORTRAN

```
IF(X ≥ H)              Y = .TRUE.
IF(X ≤ L)              Y = .TRUE.
IF[(L < X).AND.(X   H)] Y = FALSE
```

FIG.8/A26C

FORTRAN (ALTERNATE)

```
Y=.TRUE.
IF[(X.GT.L).AND.(X.LT.H)] Y=FALSE
RETURN
```

FIG.8/A26D

CODING

| |
|---|
| BLOCK NUMBER ADJTHRESH |
| HILIM CONSTANT |
| LOLIM CONSTANT |
| INPUT (SYMBOL) |
| OUTPUT (SYMBOL) |

FIG.8/A26E

EXAMPLE

| |
|---|
| 5 ADJTHRESH |
| HILIM = 20.3 |
| LOLIM = 10.2 |
| INPUT = X |
| OUTPUT = Y |

FIG.8/A26F

BLOCK FORMAT

| | | |
|---|---|---|
| 0 | BLOCK NUMBER | TYPE = 26 |
| 1<br>2 | HILIM CONSTANT | |
| 3<br>4 | LOLIM CONSTANT | |
| 5 | INPUT ADDRESS | |
| 6 | OUTPUT ADDRESS | |

FIG.8/A26G

EXAMPLE

| | | | | |
|---|---|---|---|---|
| 0 | 0 | 5 | 1 | A |
| 1<br>2 | 20.3 | | | |
| 3<br>4 | 10.2 | | | |
| 5 | = X | | | |
| 6 | = Y | | | |

FIG.8/A26H

MACRO FORMAT

| #1 | #2 | #3 | #4 | #5 | #6 | #7 | #8 | #9 |
|---|---|---|---|---|---|---|---|---|
| 1 | THRESHOLD | 26 | 0 | 0 | 0 | 0 | 0 | 0. |
| 2 | HILIM | 1 | 2 | 0 | 1 | 0 | 0 | 0. |
| 2 | LOLIM | 1 | 2 | 0 | 1 | 0 | 0 | 0. |
| 2 | INPUT | 1 | 3 | 0 | 1 | 0 | 0 | 0. |
| 2 | OUTPUT | 1 | 3 | 0 | 1 | 0 | 0 | 0. |
| 5 | | | | | | | | |

FIG. 8/A26I

FIG. 8/A26 THRESHOLD

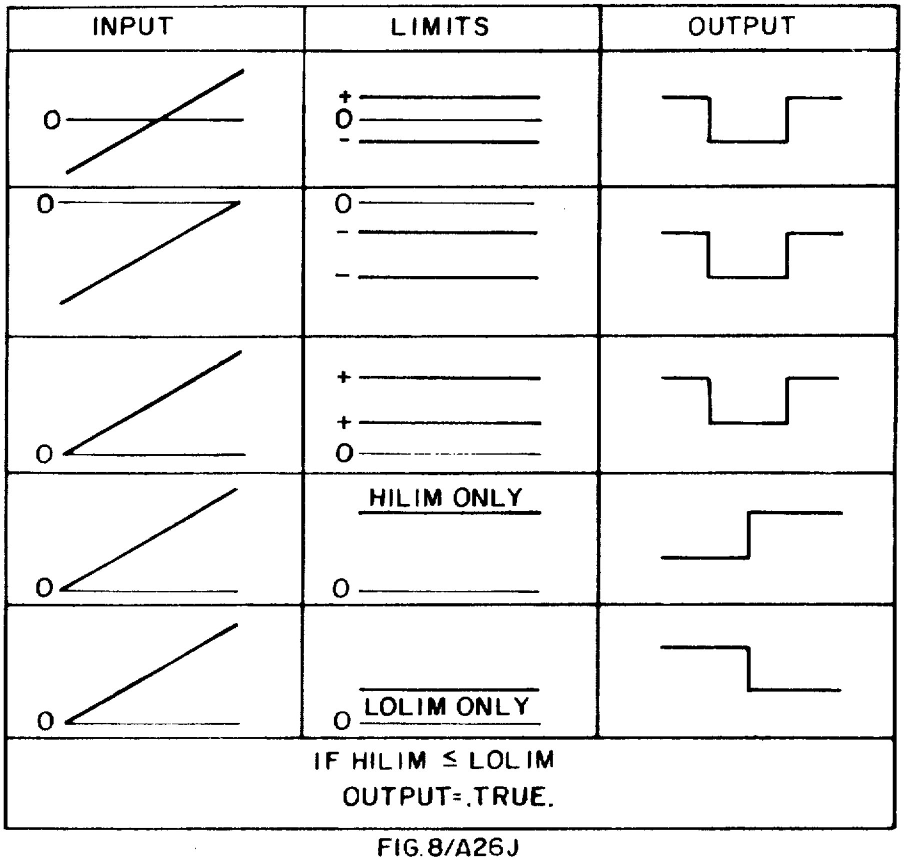
FIG. 8/A26J
ADJ THRESH
BLOCK FORMAT
| | |
|---|---|
| BLOCK NUMBER | TYPE |
| HILIM ADDRESS | |
| LOLIM ADDRESS | |
| INPUT ADDRESS | |
| OUTPUT ADDRESS | |
FIG. 8/A26K
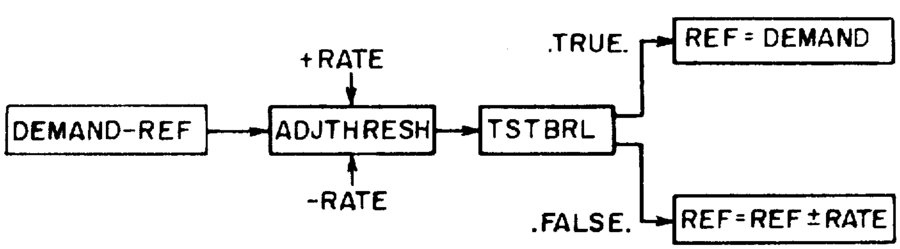
FIG. 8/A26L
FIG. 8/A26 THRESHOLD CONT.

CODING EXAMPLE
| | |
|---|---|
| 5 | GO TO |
| NEXT = 21 | |
FIG. 8/A27A
BLOCK FORMAT
| | |
|---|---|
| BLOCK NUMBER | TYPE = 27 |
| DESTINATION IX | |
FIG. 8/A27C
EXAMPLE
| | | |
|---|---|---|
| 0 | 5 | 27 |
| | | 87 |
FIG. 8/A27D
MACRO FORMAT
| #1 | #2 | #3 | #4 | #5 | #6 | #7 | #8 | #9 |
|---|---|---|---|---|---|---|---|---|
| 1 | GO TO | 27 | 0 | 0 | 0 | 0 | 0 | 0. |
| 2 | NEXT | 1 | 5 | 0 | 1 | 0 | 0 | 0. |
| 5 | | | | | | | | |
FIG. 8/A27B
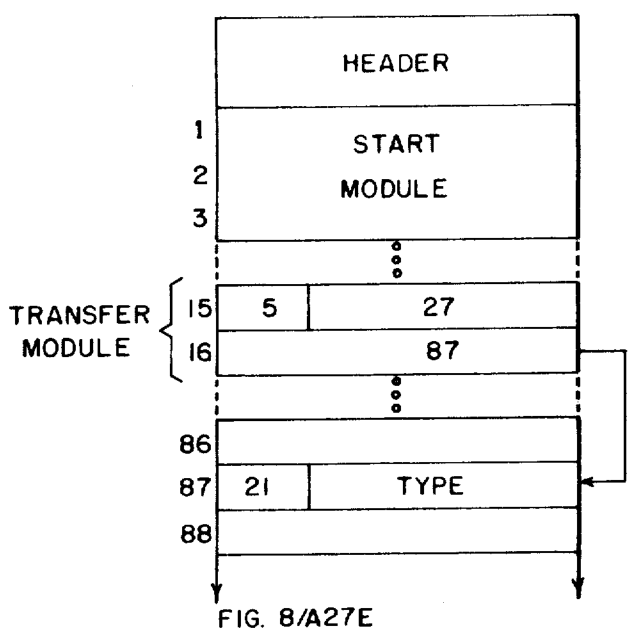
FIG. 8/A27E
FIG. 8/A27 TRANSFER

BLOCK FORMAT

| BLOCK NUMBER | TYPE = |
|---|---|
| INPUT ADDRESS | |
| TRUE IX | |
| FALSE IX | |

FIG 8/A28

FIG. 8/A28 TEST BRANCH LOGICAL

BLOCK FORMAT

| BLOCK NUMBER | TYPE = |
|---|---|
| INPUT ADDRESS | |
| "EQ", "GE", . . . | |
| TRUE IX | |
| FALSE IX | |
| REFERENCE ADDRESS | |

FIG 8/A29

FIG. 8/A29 TEST BRANCH REAL

BLOCK FORMAT

| BLOCK NUMBER | TYPE = |
|---|---|
| SUBTASK NUMBER | |

FIG 8/A30

FIG. 8/A30 CALL, ENABLE, OR INHIBIT SUBTASK

Figure 8:
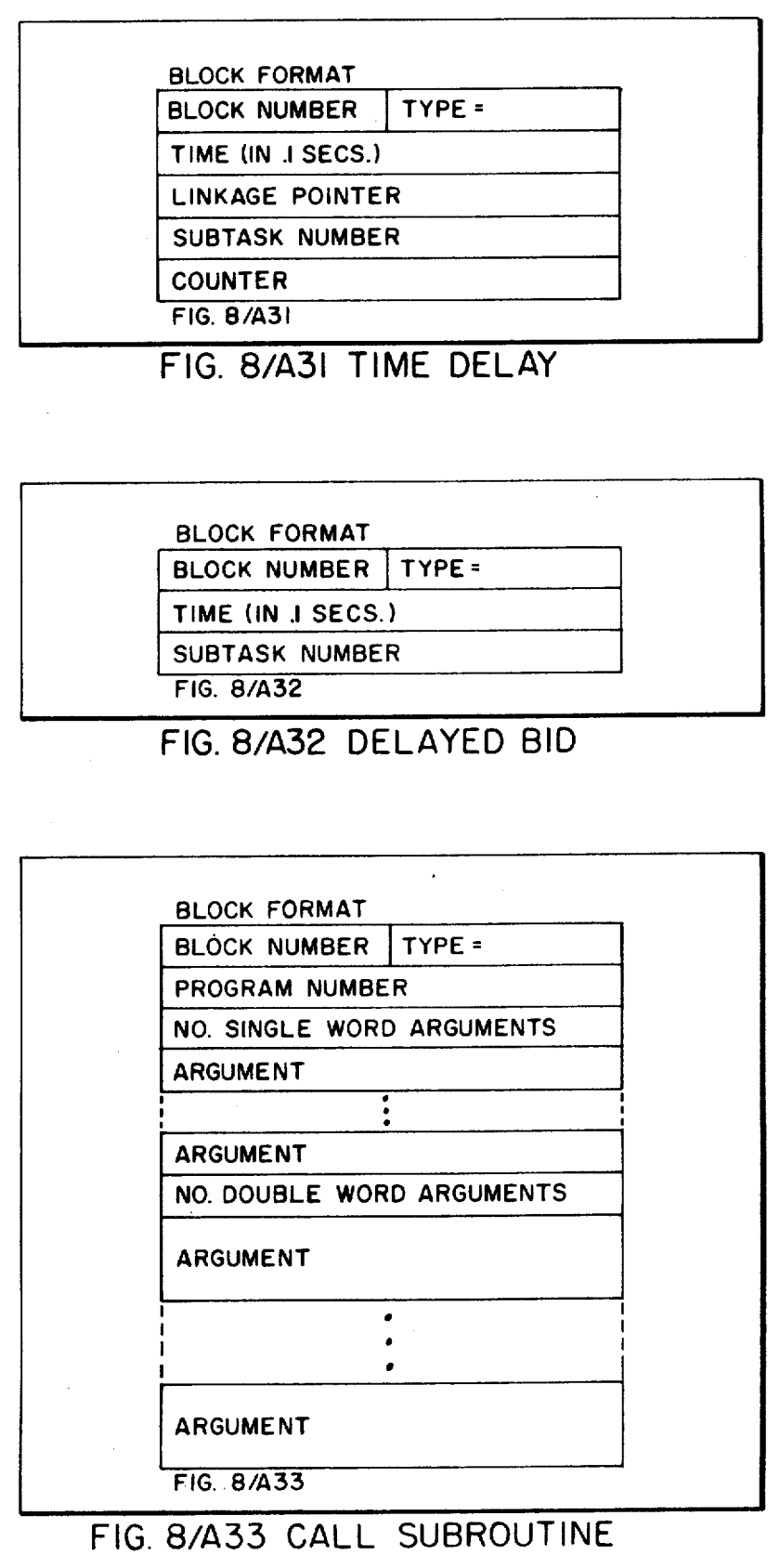

BLOCK FORMAT

| | |
|---|---|
| BLOCK NUMBER | TYPE = |
| TIME (IN .1 SECS.) | |
| LINKAGE POINTER | |
| SUBTASK NUMBER | |
| COUNTER | |

FIG. 8/A31

FIG. 8/A31 TIME DELAY

BLOCK FORMAT

| | |
|---|---|
| BLOCK NUMBER | TYPE = |
| TIME (IN .1 SECS.) | |
| SUBTASK NUMBER | |

FIG. 8/A32

FIG. 8/A32 DELAYED BID

BLOCK FORMAT

| | |
|---|---|
| BLOCK NUMBER | TYPE = |
| PROGRAM NUMBER | |
| NO. SINGLE WORD ARGUMENTS | |
| ARGUMENT | |
| ⋮ | |
| ARGUMENT | |
| NO. DOUBLE WORD ARGUMENTS | |
| ARGUMENT | |
| ⋮ | |
| ARGUMENT | |

FIG. 8/A33

FIG. 8/A33 CALL SUBROUTINE

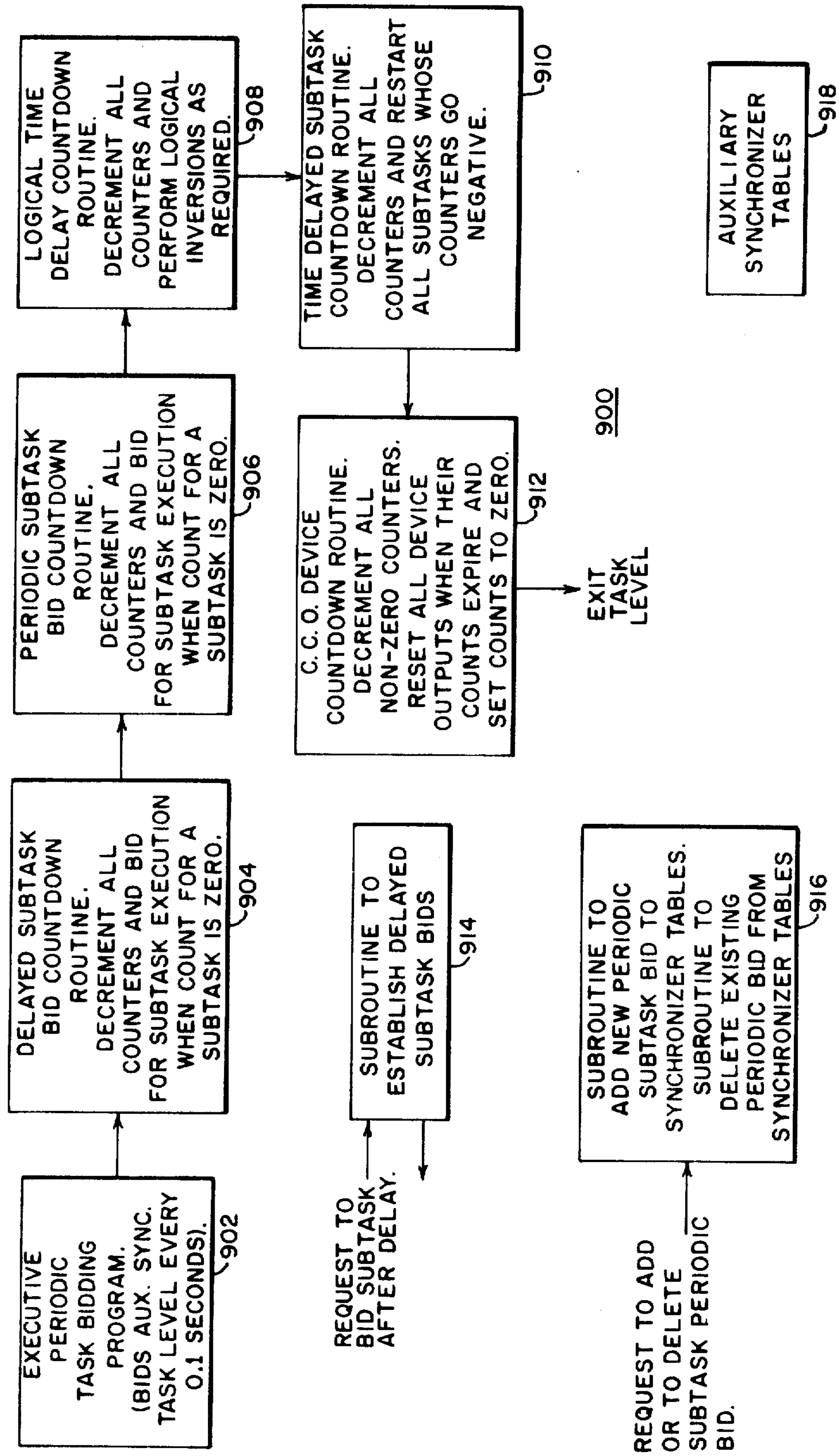
FIG. 9A. AUXILIARY SYNCHRONIZER

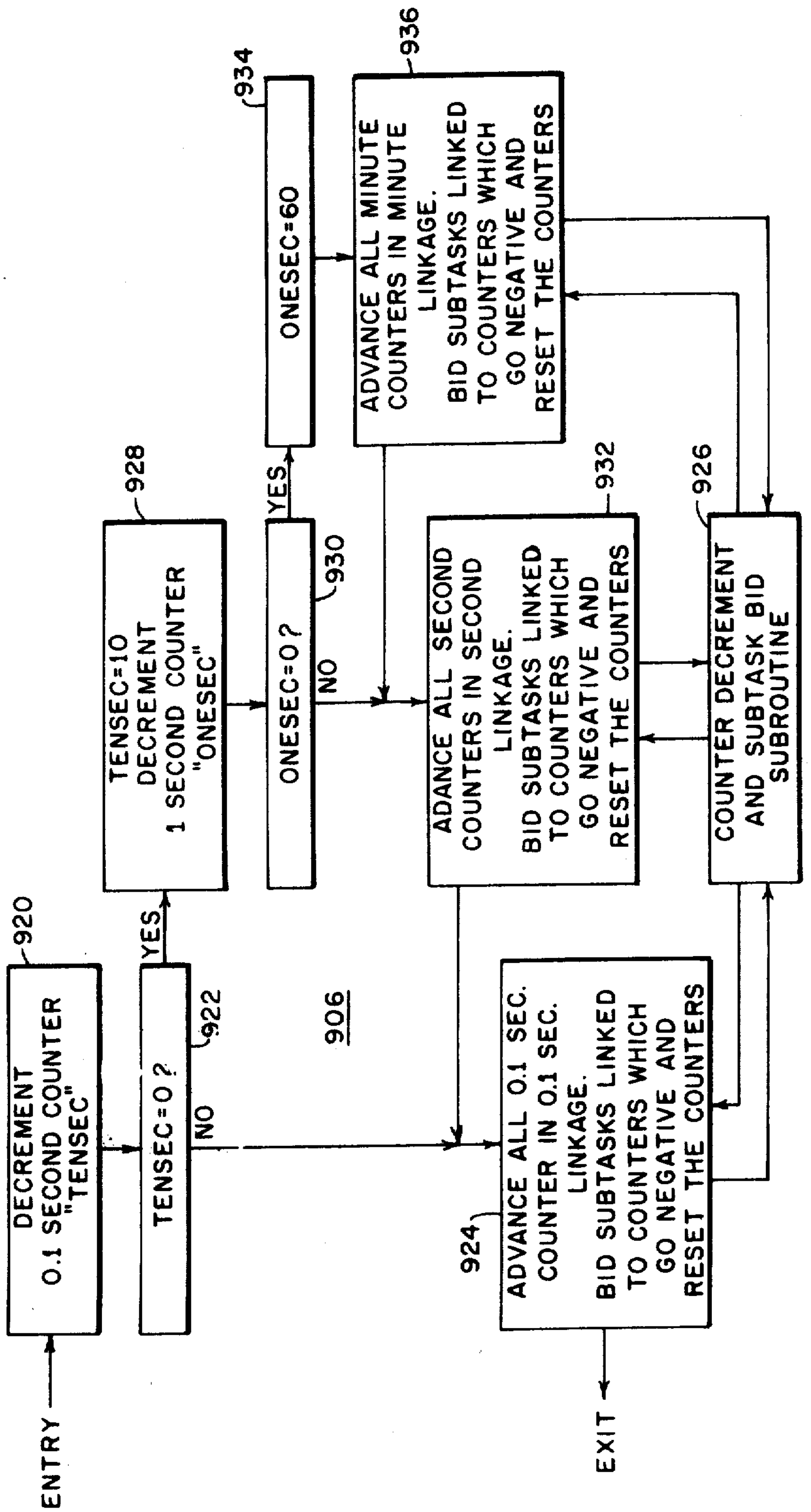
FIG. 9B. PERIODIC SUBTASK BID COUNTDOWN ROUTINE

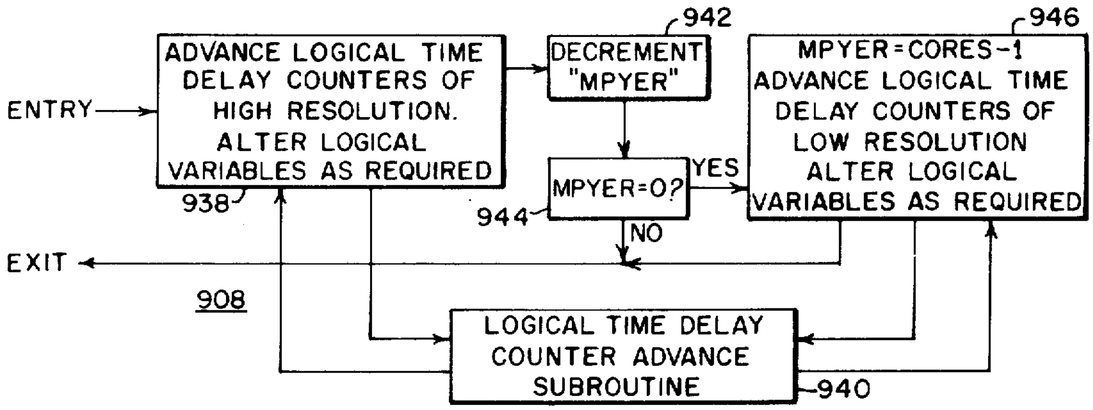
FIG. 9C. LOGICAL TIME DELAY COUNTDOWN ROUTINE
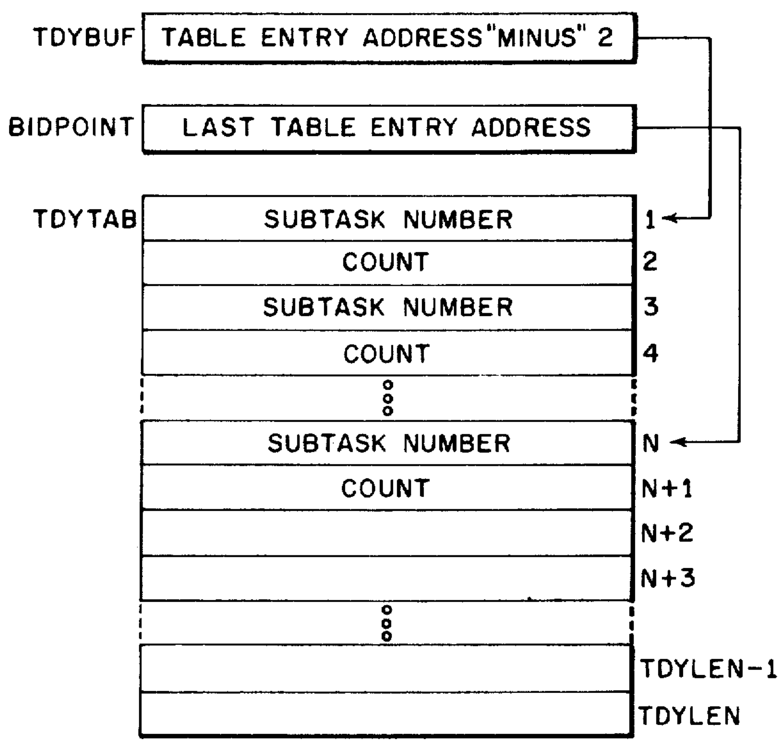
FIG. 9D. DELAYED SUBTASK BID TABLE

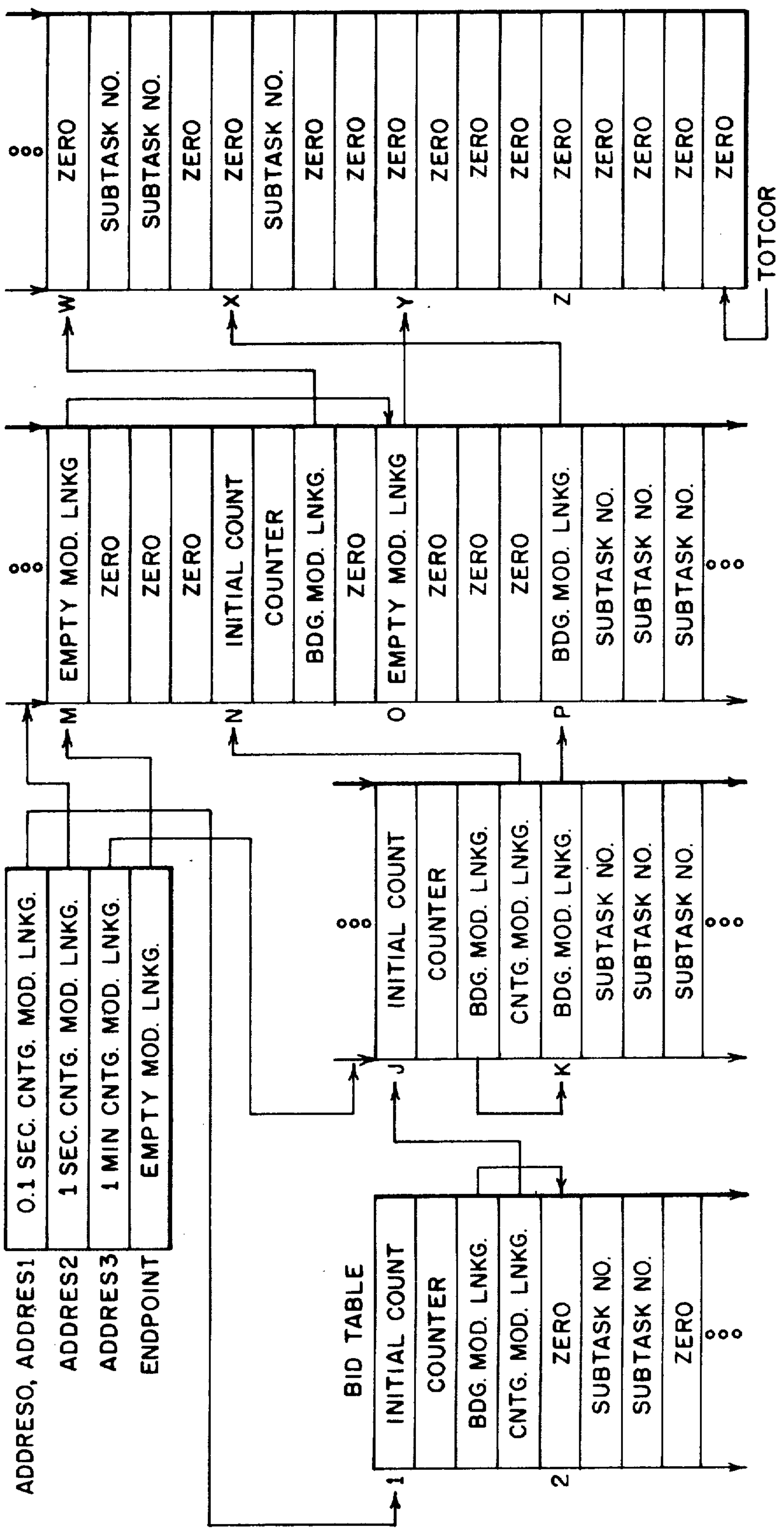
FIG. 9E. SUBTASK PERIODIC BIDDING TABLE

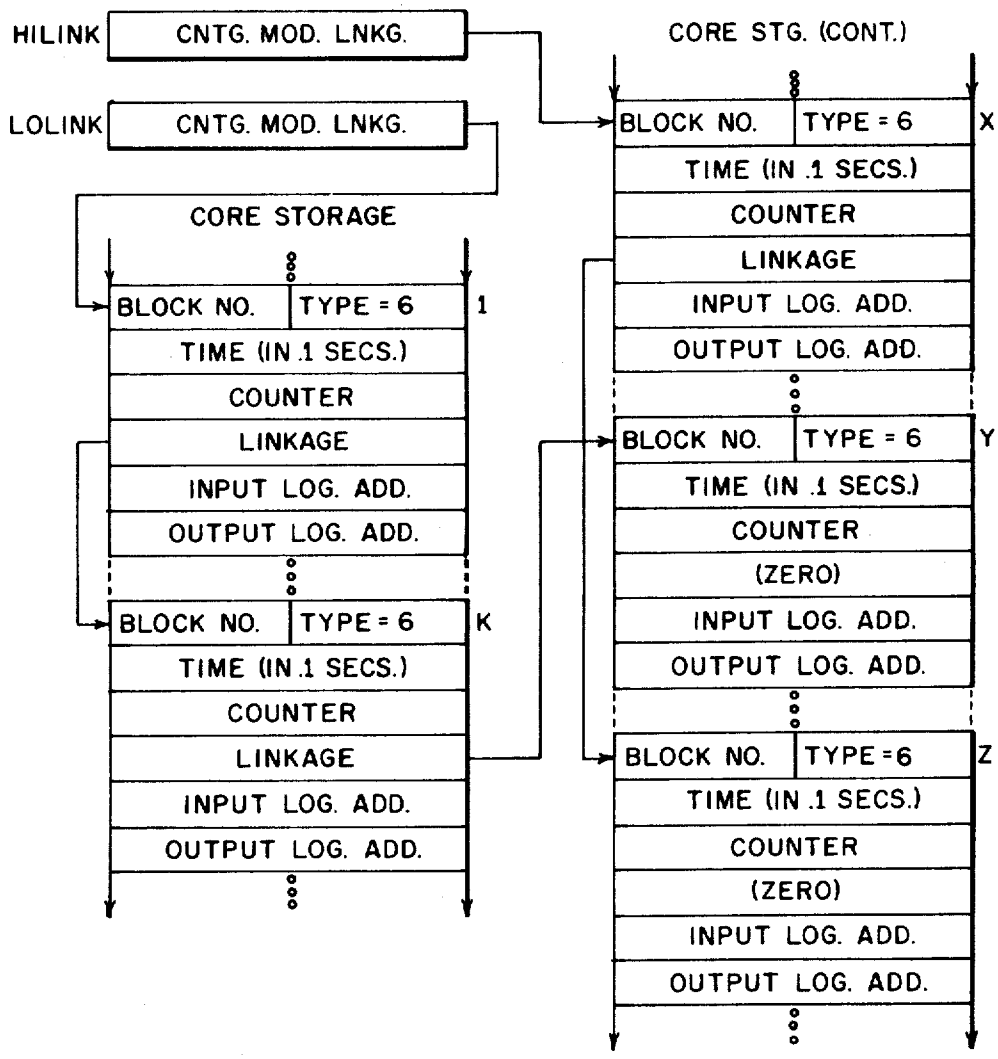
FIG. 9F. LOGICAL TIME DELAY COUNTDOWN LINKAGES
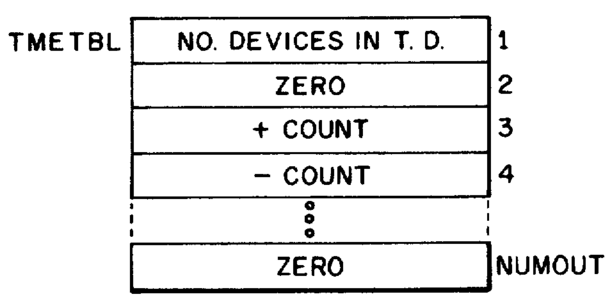
FIG. 9H. C.C.O. DEVICE TIMEOUT TABLE

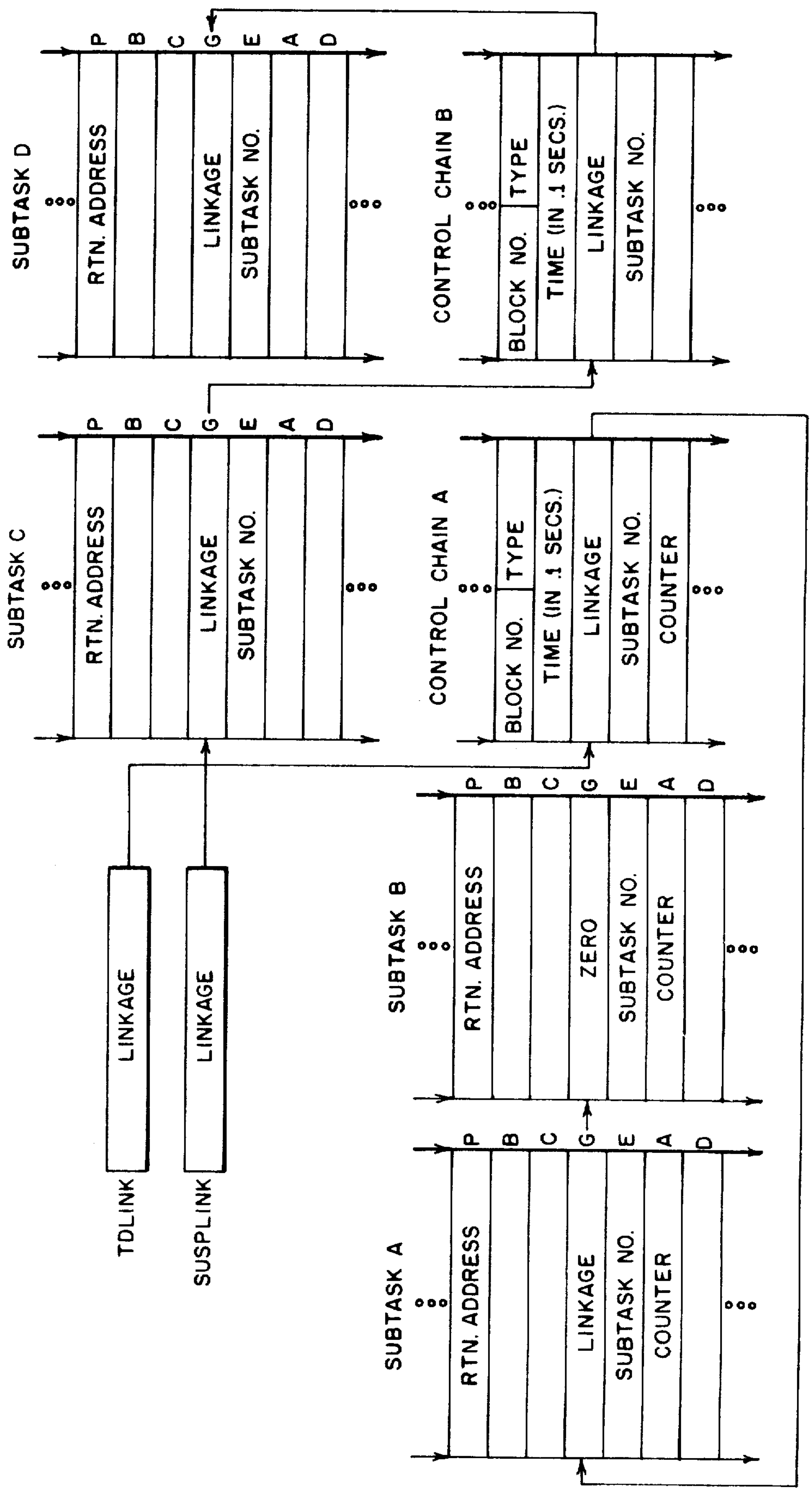
FIG. 9G. TIME DELAYED SUBTASK LINKAGES

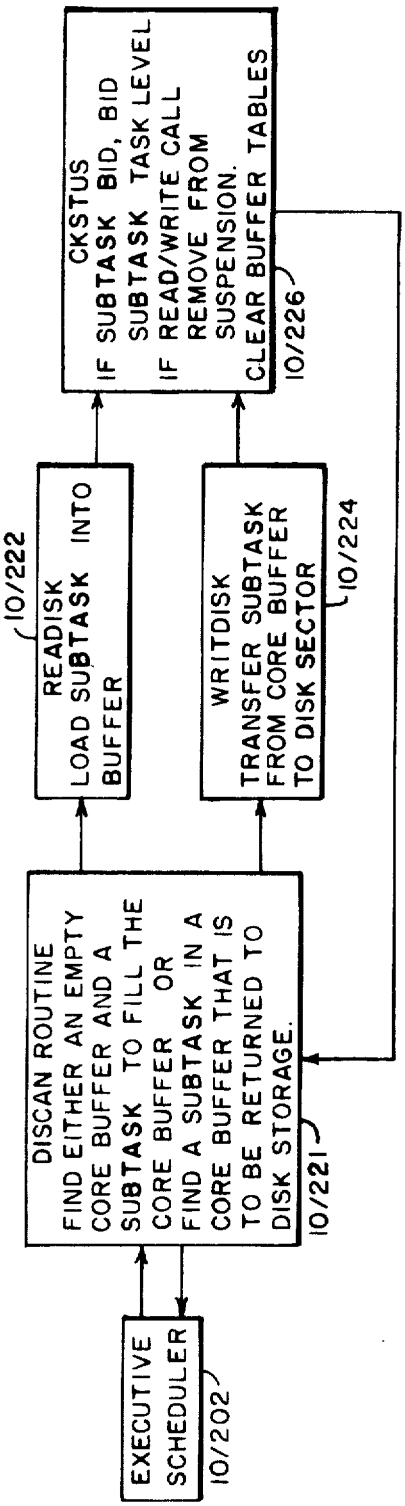
FIG. 10B. DISCAN PROGRAM

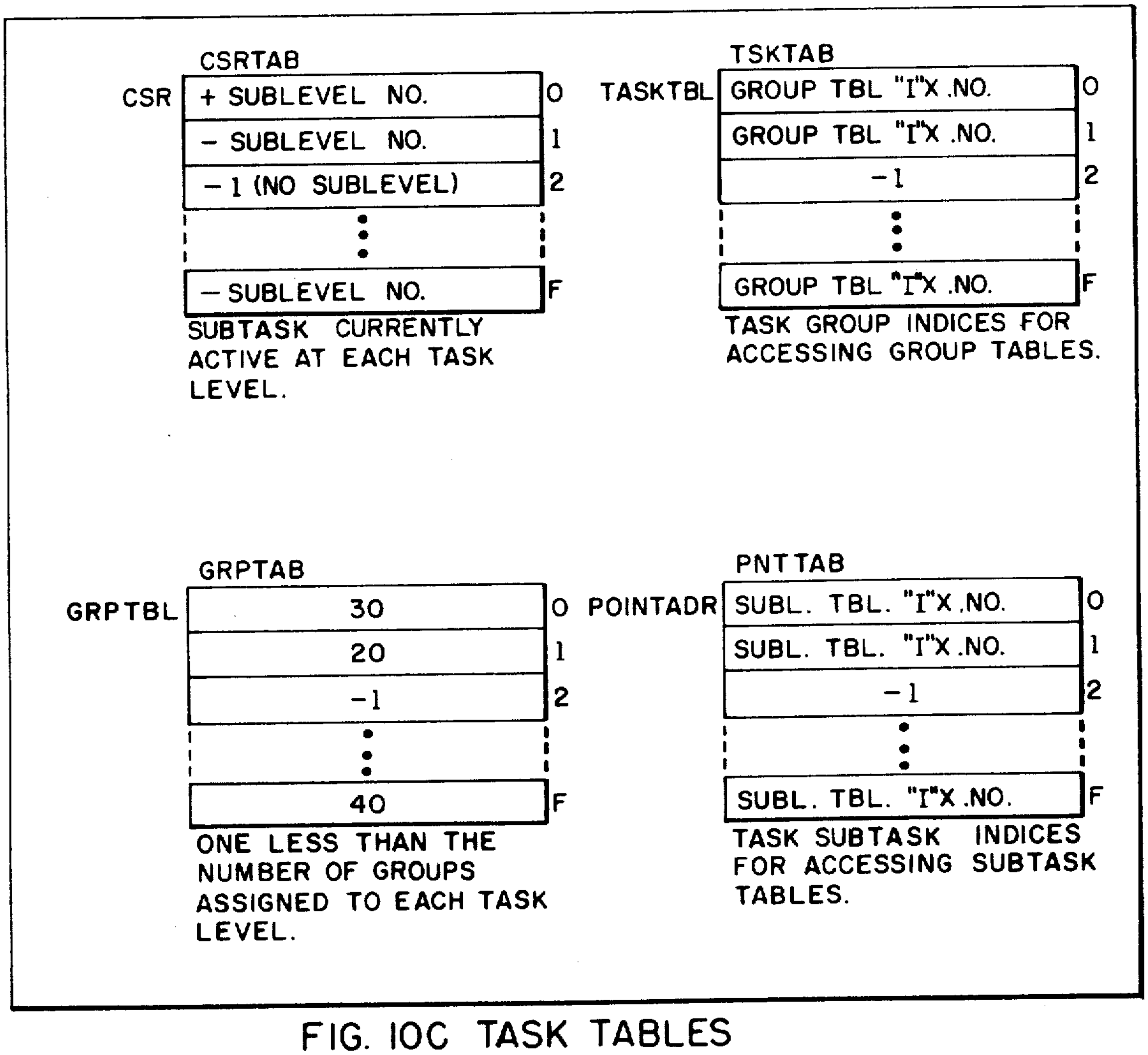
FIG. 10C TASK TABLES
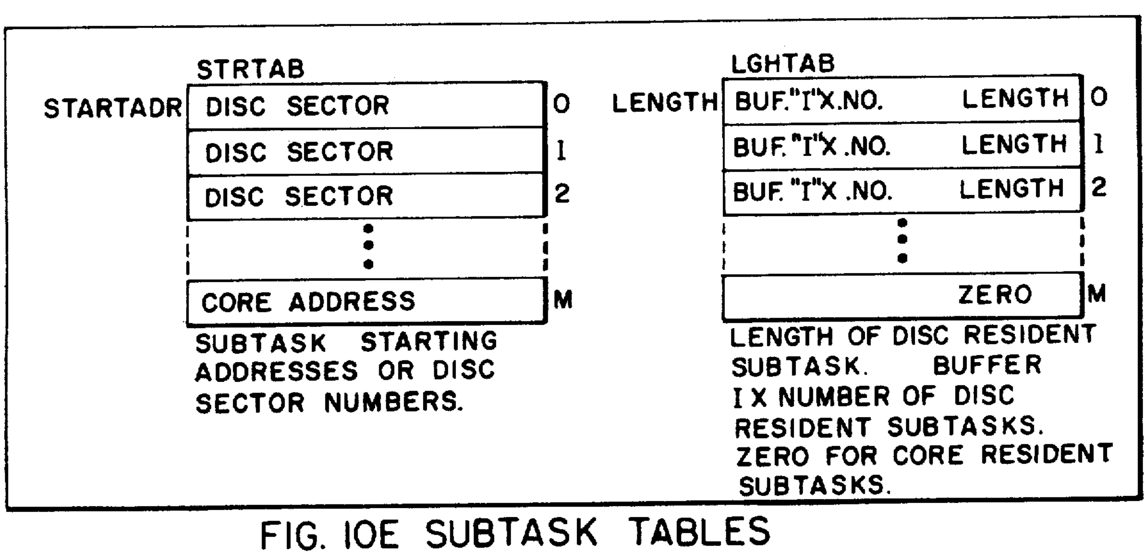
FIG. 10E SUBTASK TABLES

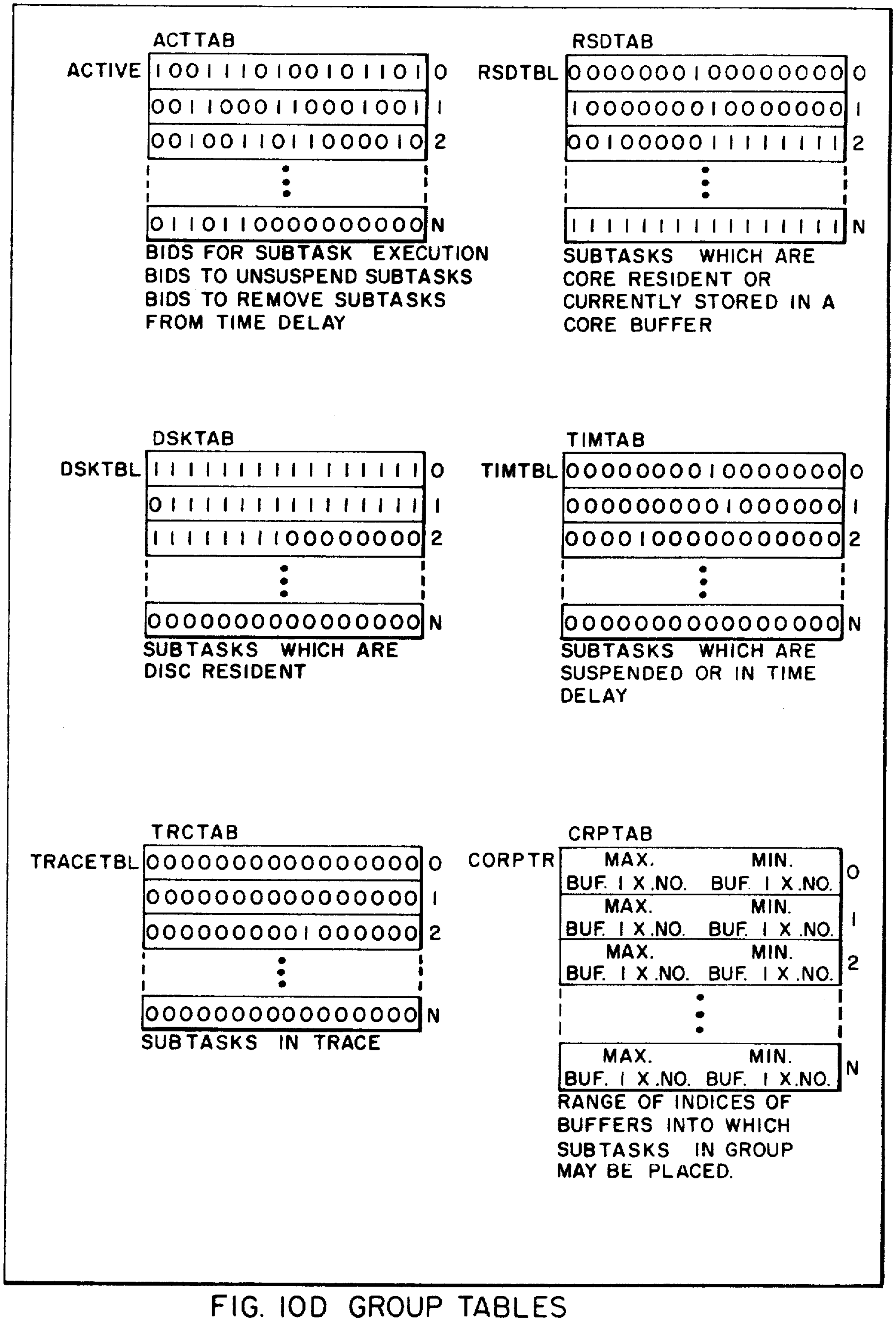
FIG. 10D GROUP TABLES

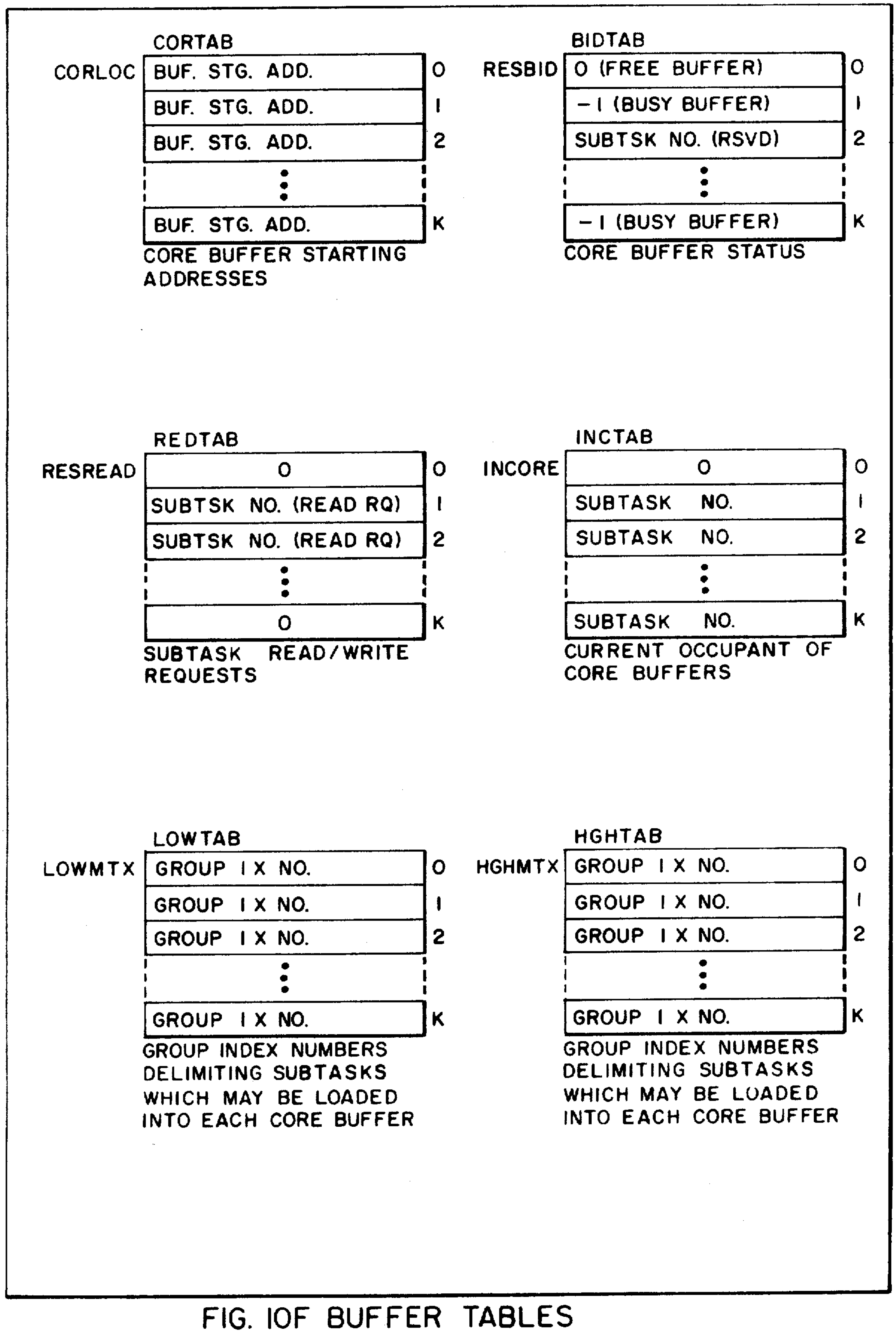
FIG. 10F BUFFER TABLES

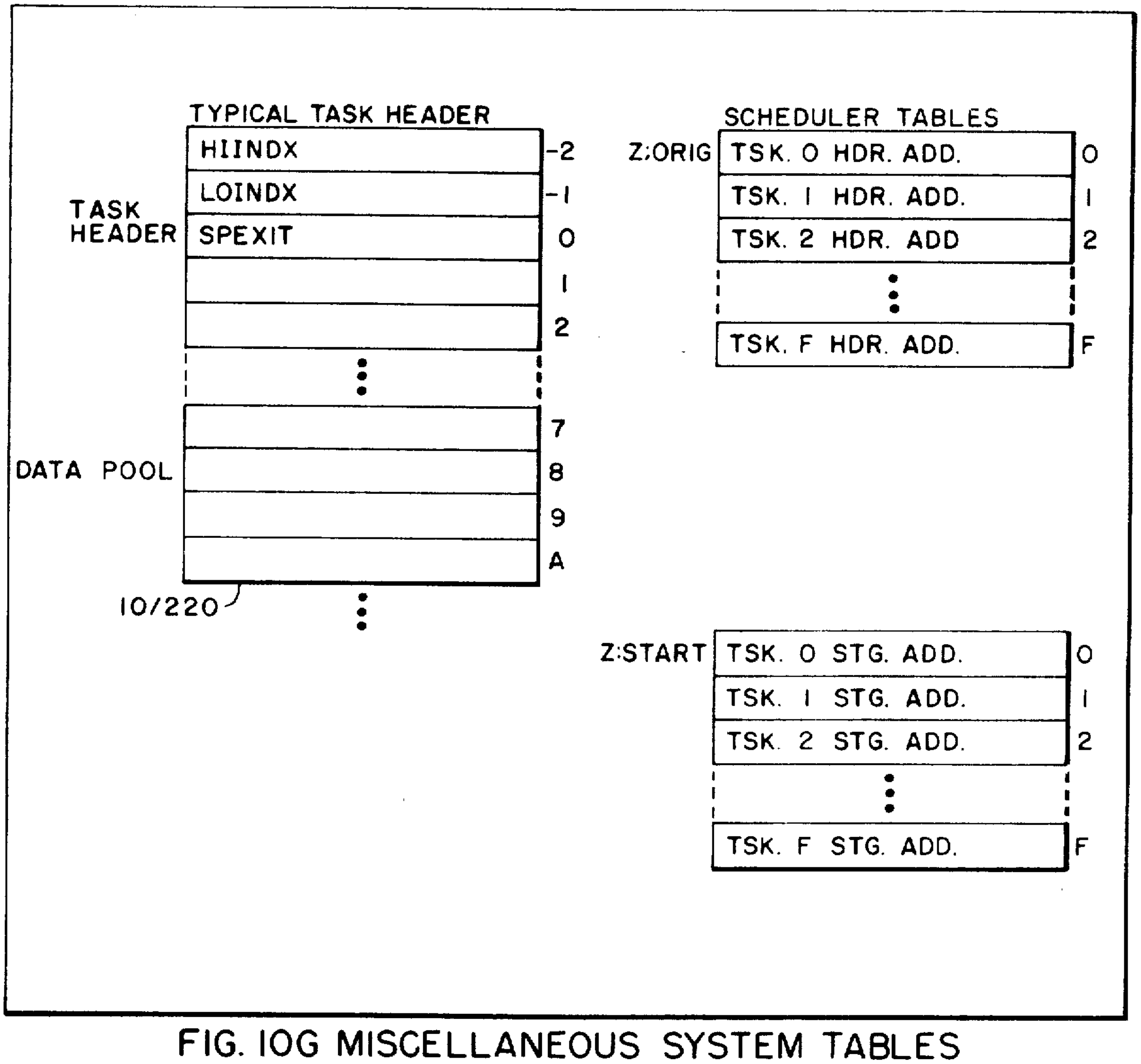
FIG. 10G MISCELLANEOUS SYSTEM TABLES

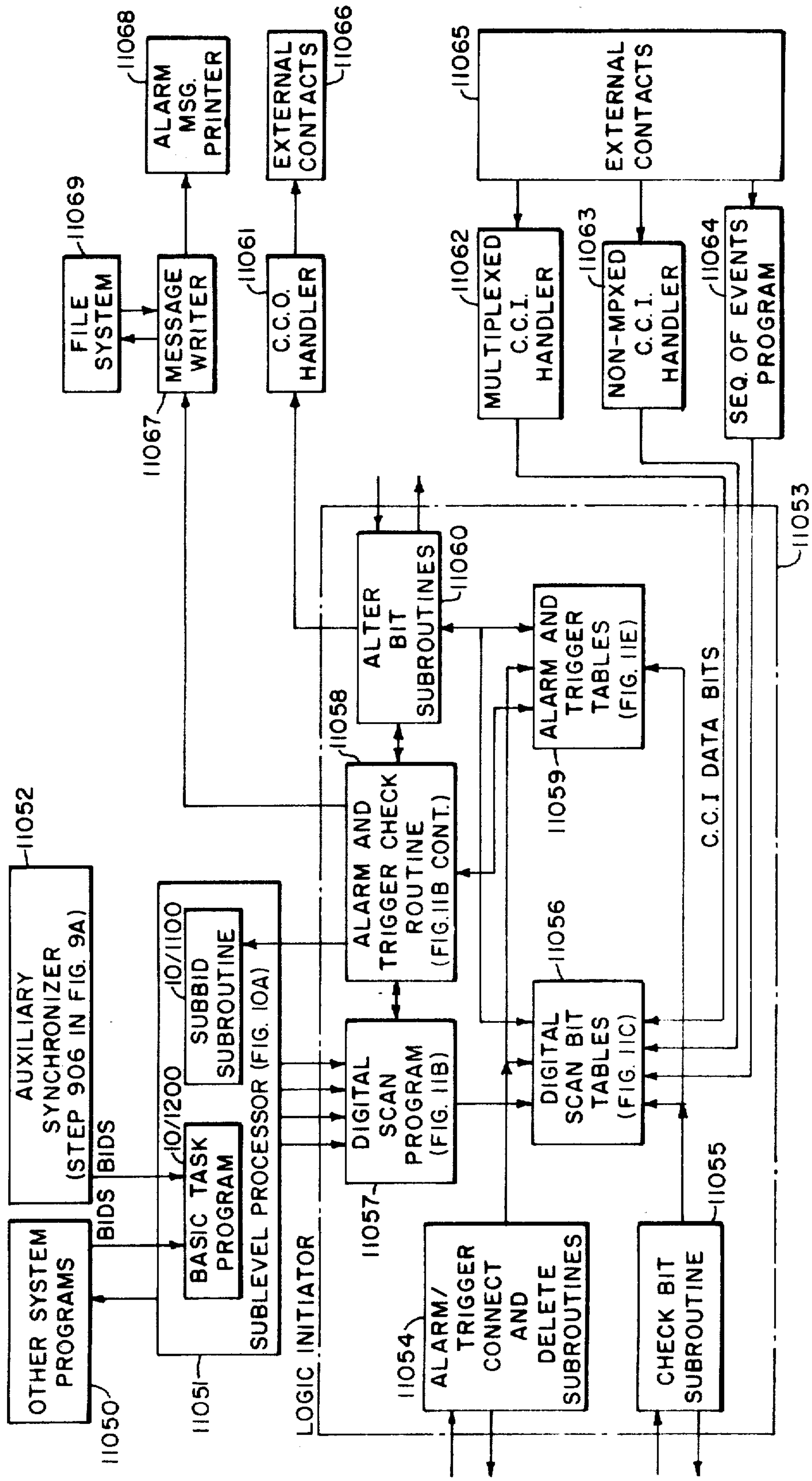
FIG. 11A LOGIC INITIATOR

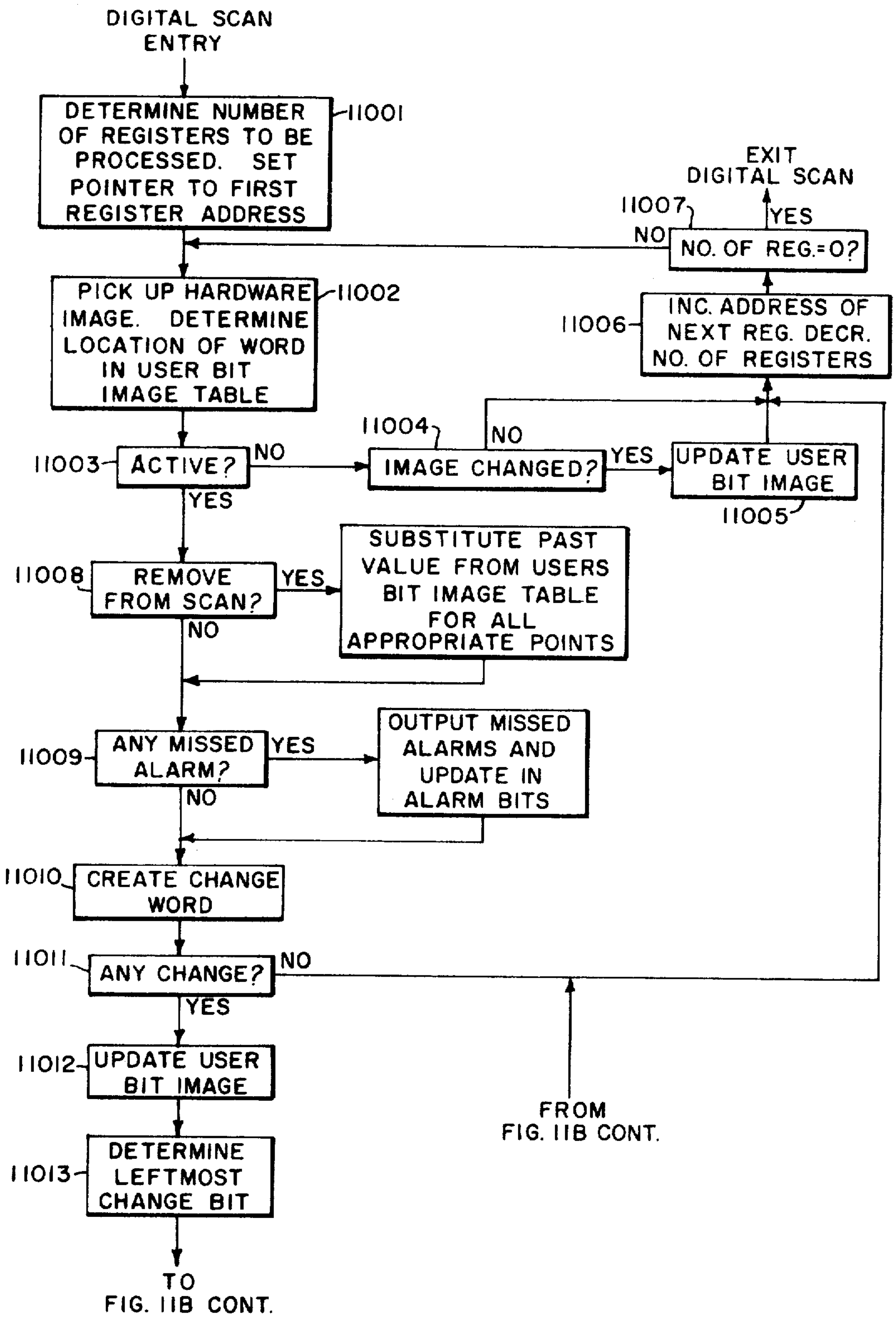
FIG. 11B DIGITAL SCAN PROGRAM

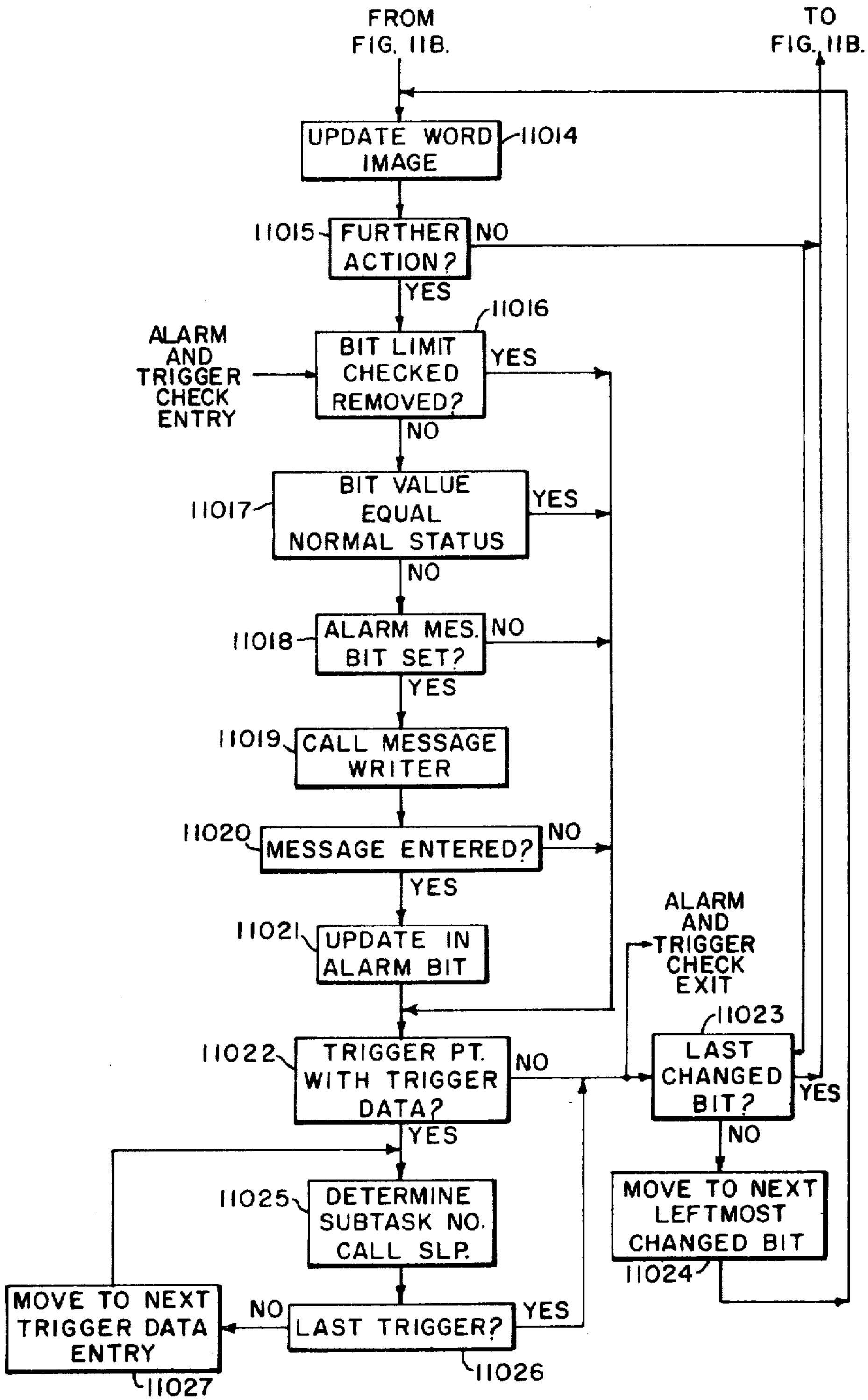
FIG. 11B DIGITAL SCAN PROGRAM CONT.

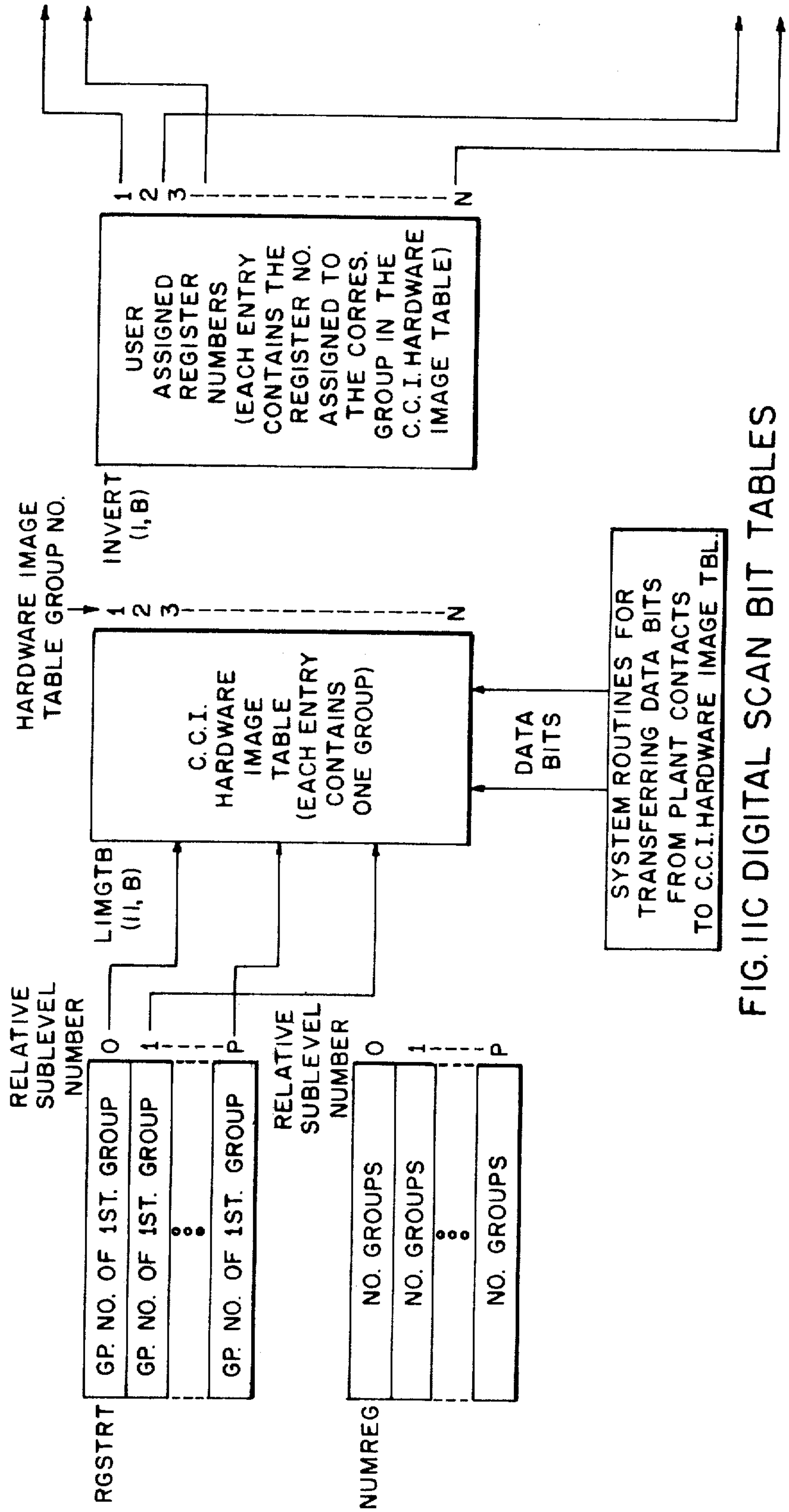
FIG. 11C DIGITAL SCAN BIT TABLES
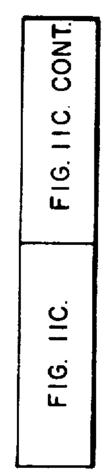
FIG. 11D.

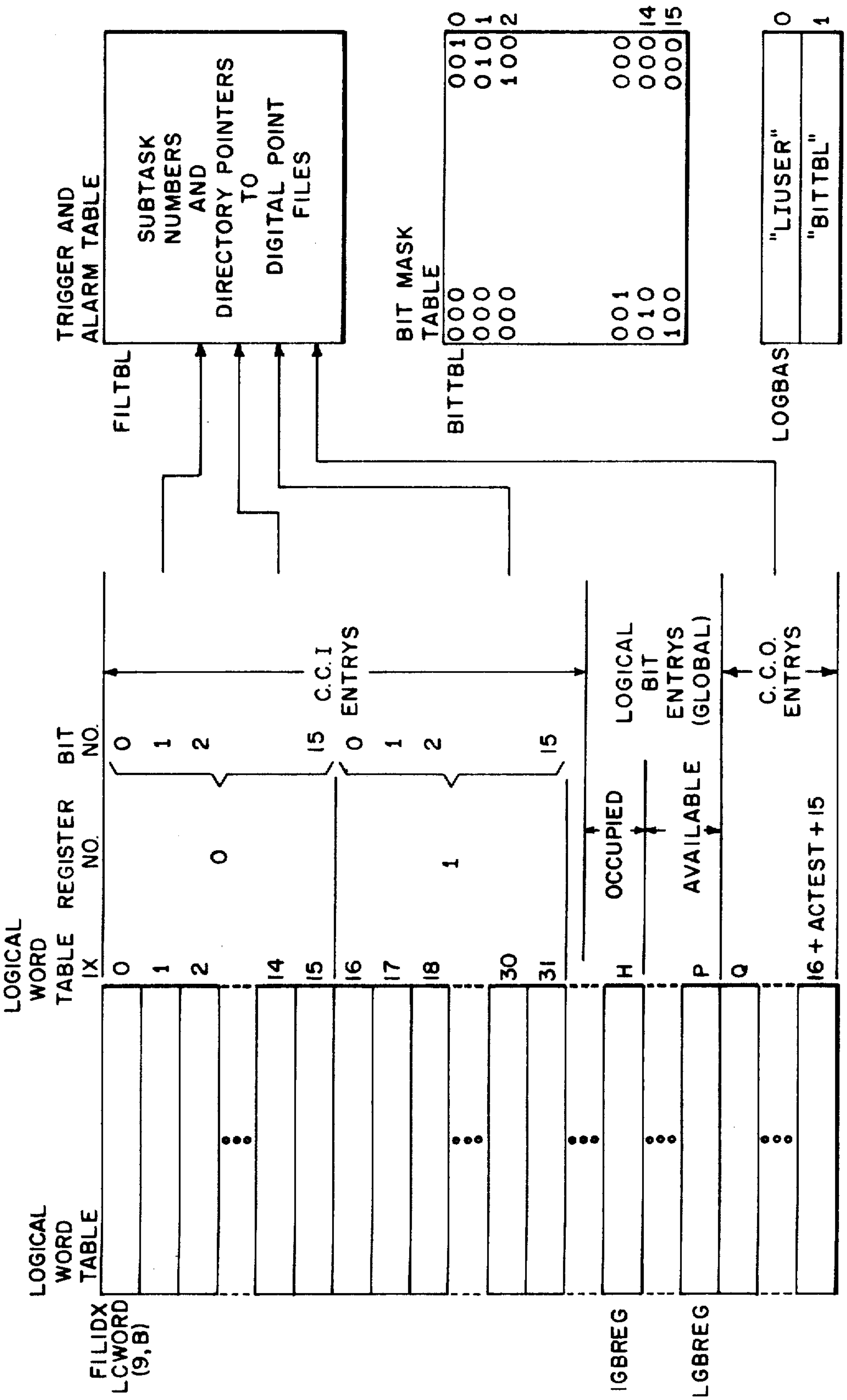
FIG. 11E ALARM AND TRIGGER TABLES

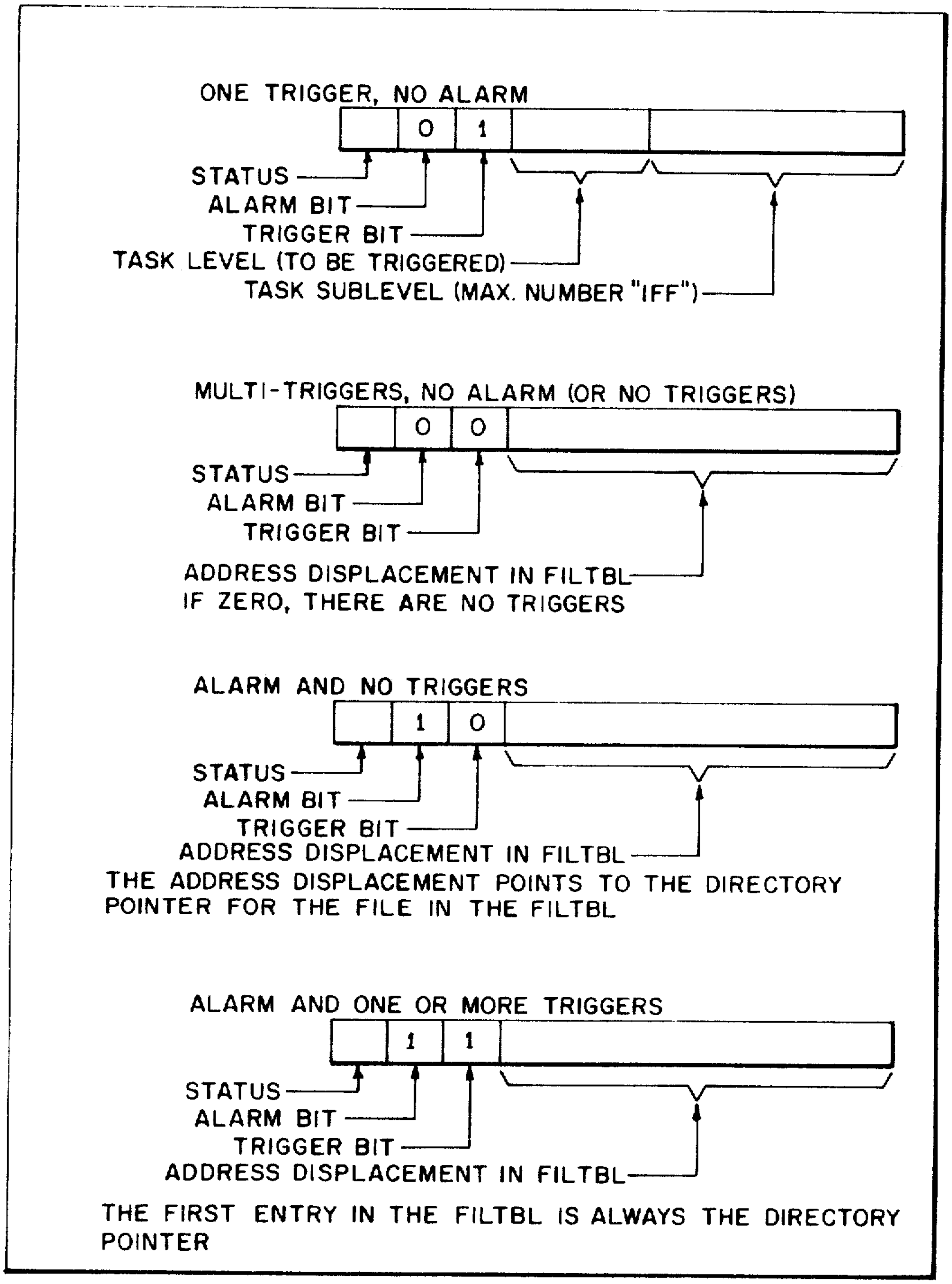
FIG. 11G FILIDX TABLE ENTIES

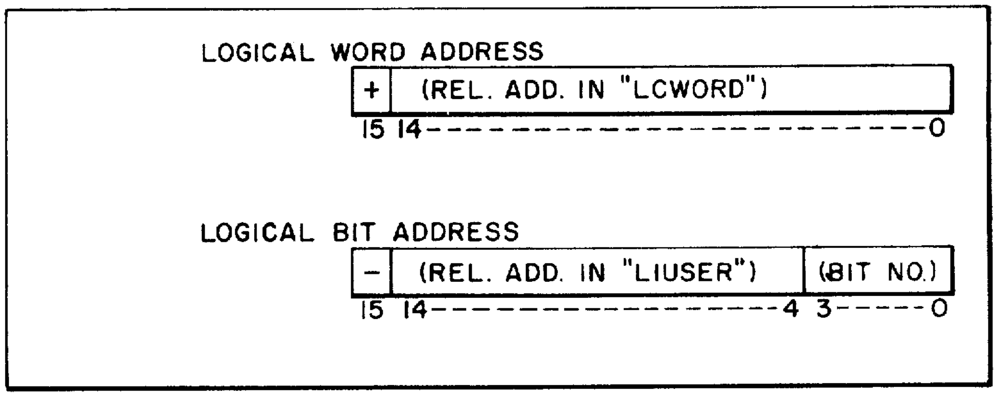
FIG. 11F LOGICAL VARIABLE ADDRESSING
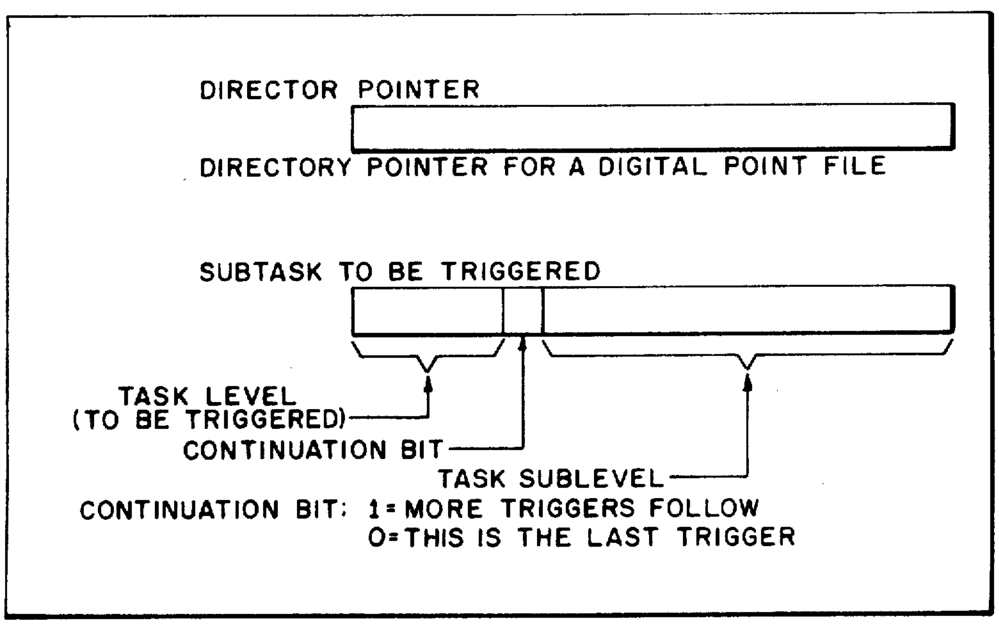
FIG. 11H FILTBL ENTRIES

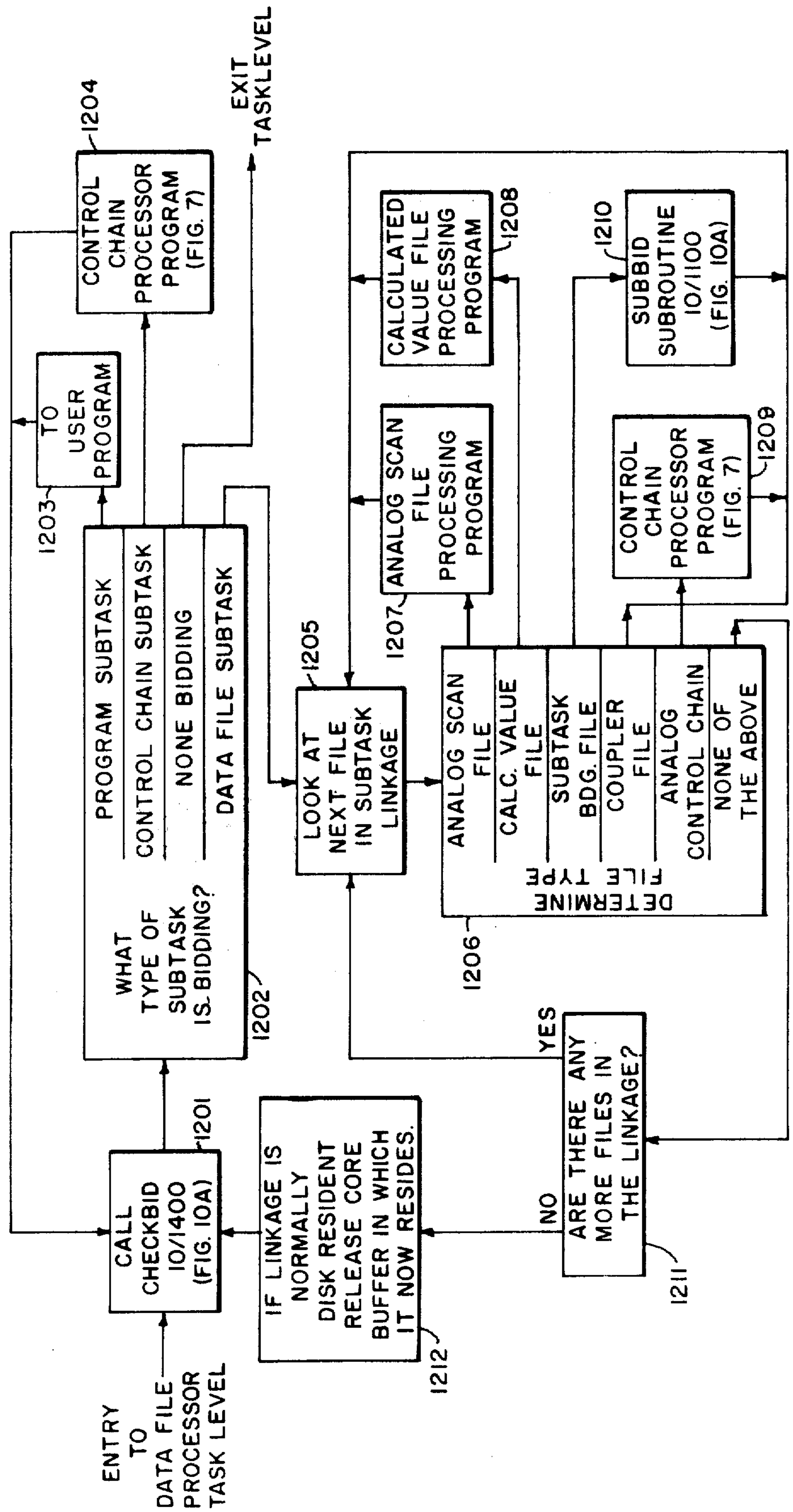
FIG. 12-DATA FILE PROCESSING PROGRAM

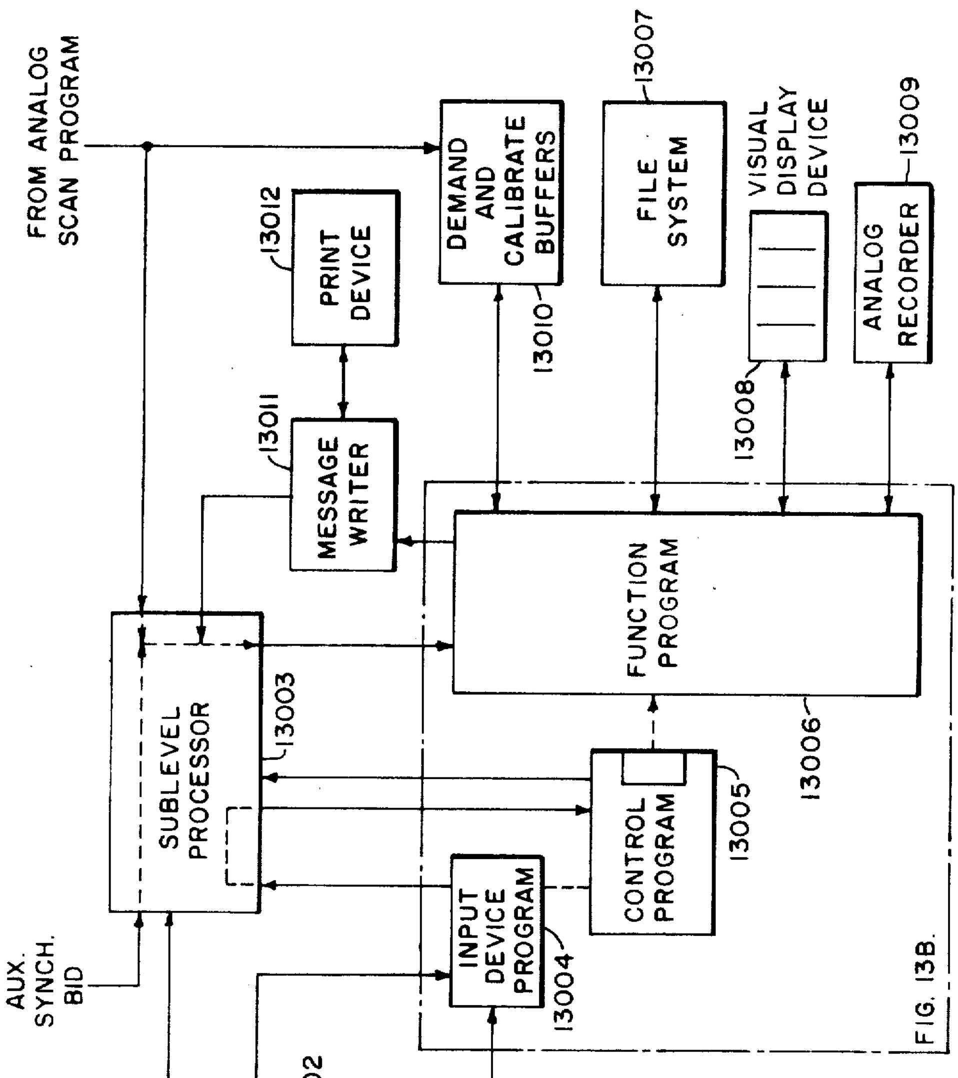
FIG. 13A - OPERATOR CONSOLE PROGRAM
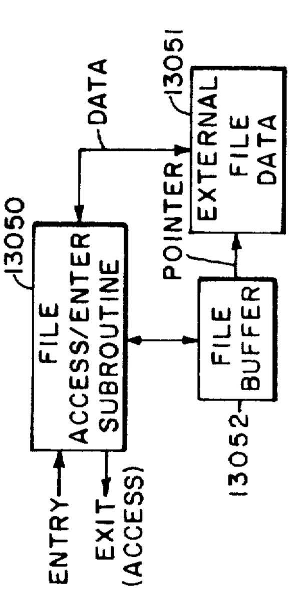
FIG. 13C
THE FILE ACCESS/ENTER SUBROUTINE

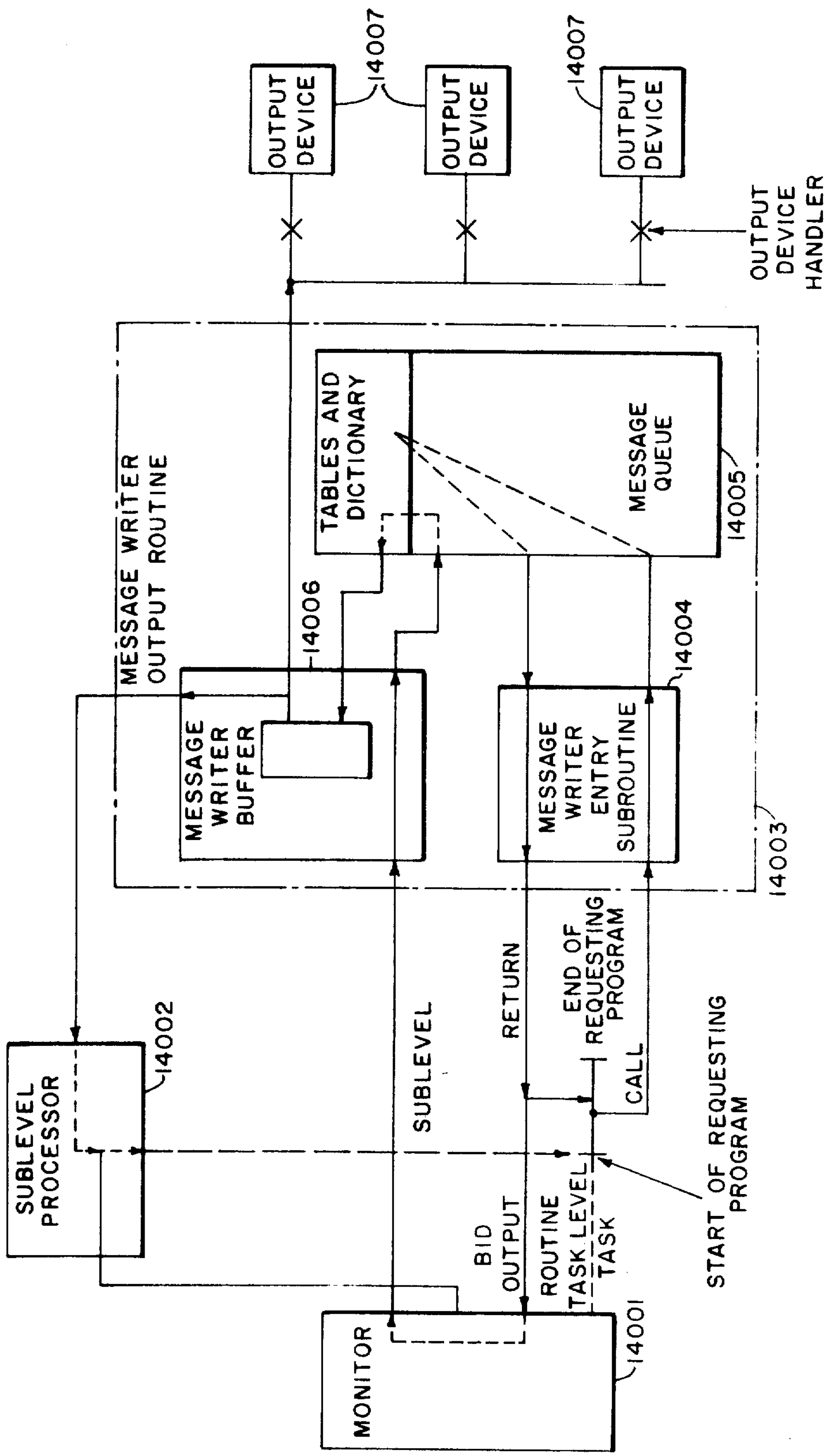
FIG. 14 - MESSAGE WRITER PROGRAM

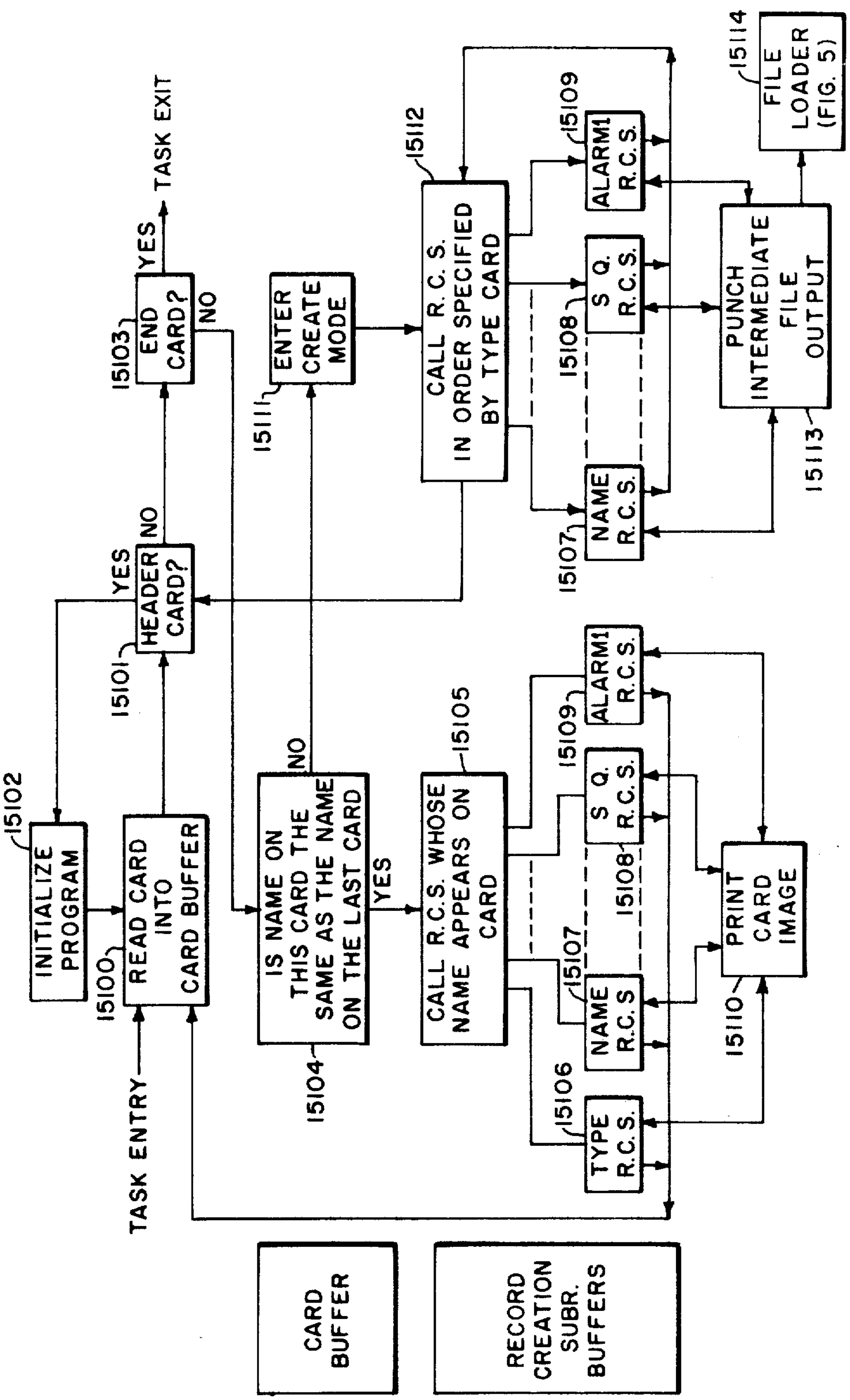
FIG. 15/100-DATA FILE GENERATOR PROGRAM

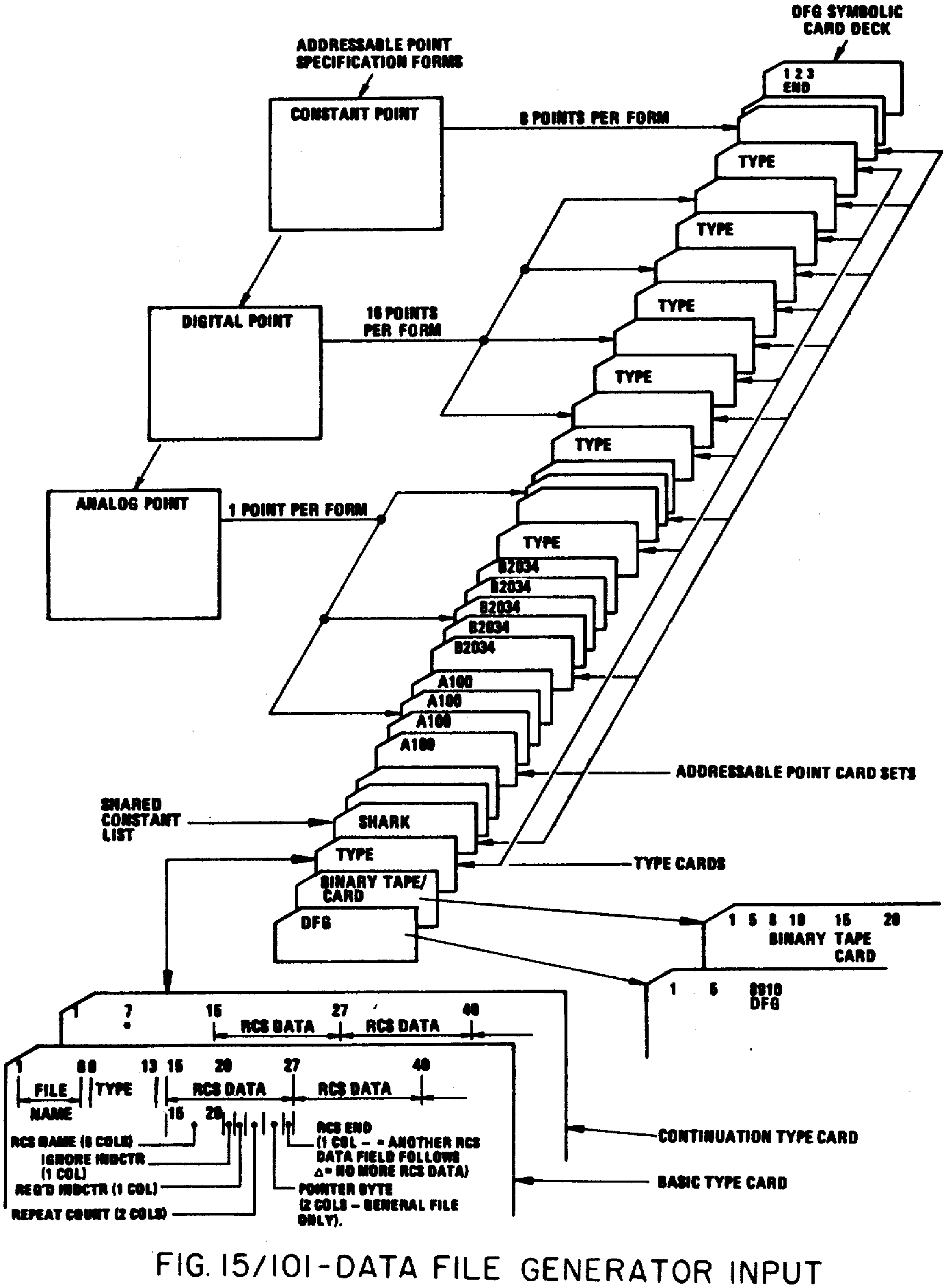
FIG. 15/101-DATA FILE GENERATOR INPUT

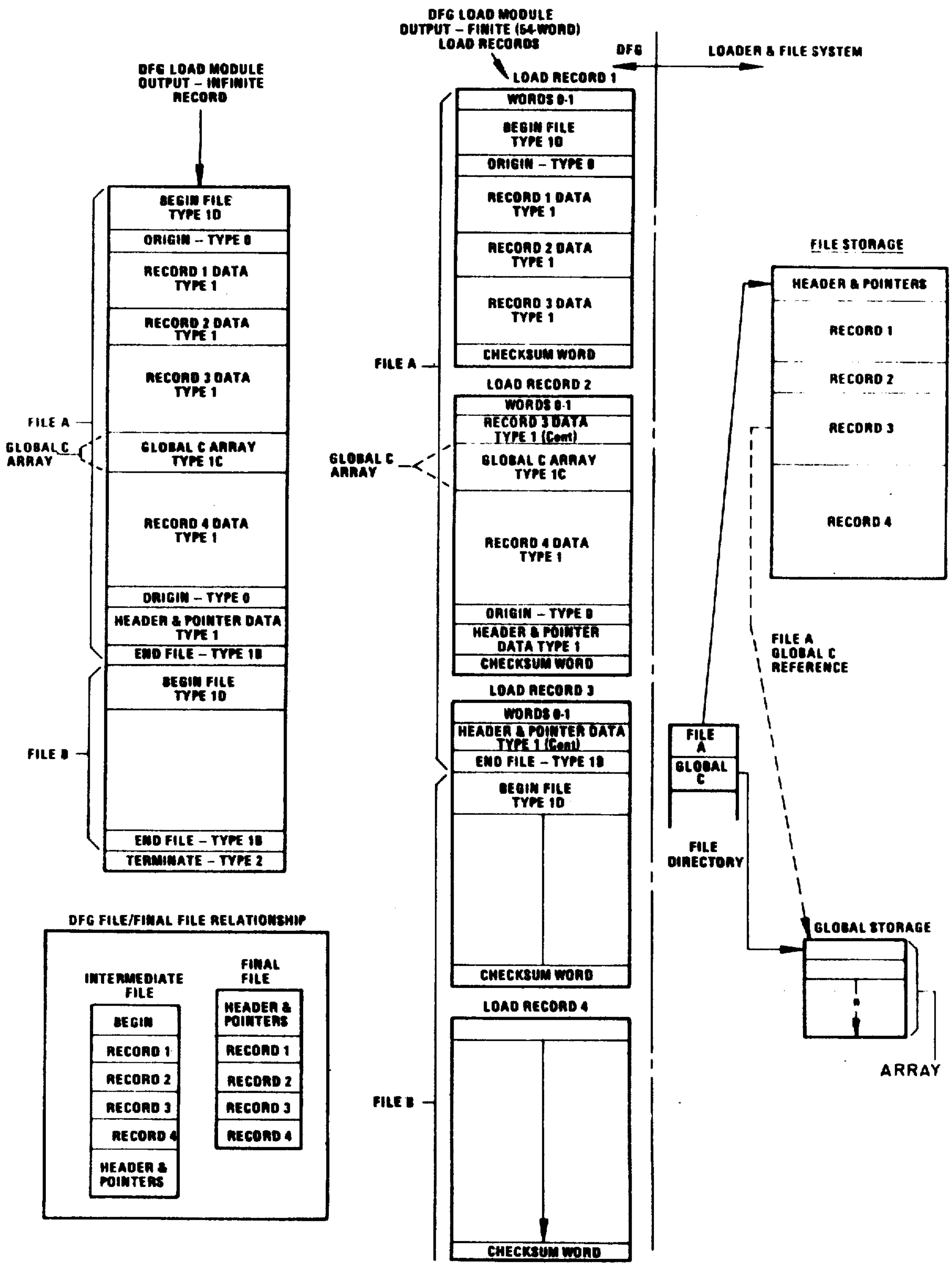
FIG. 15/102 - DATA FILE GENERATOR OUTPUT

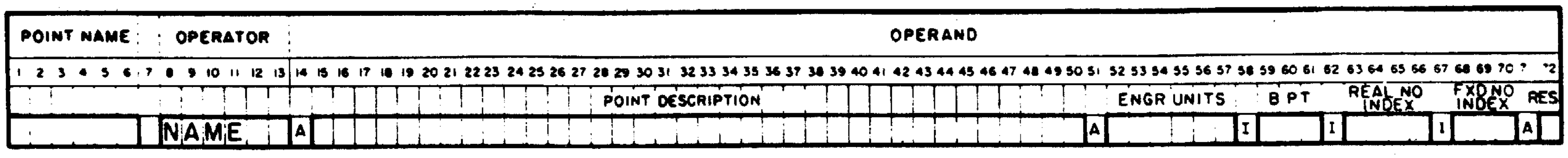
| NAME CARD COLUMNS | R/O | (R) FIELD NAME | EXPLANATION |
|---|---|---|---|
| 15 – 50 | O | Point Descr. | Descr. of Point Function |
| 52 – 57 | O | Engr. Units | Descr. of Pt. Engr. Units |
| 59 – 61 | R | B Pt | Binary Point For All Fixed No. Values Assigned The Point |
| 63 – 66 | R | Real No. Index | Index To The Storage For the Real No. Point Value |
| 68 – 70 | O | Fxd No. Index | Index To The Storage For the Fixed No. Point Value |
| 72 | R | Res | File Storage Indicator (C = Core, △ = Mass Memory) |
FIG. 15/103

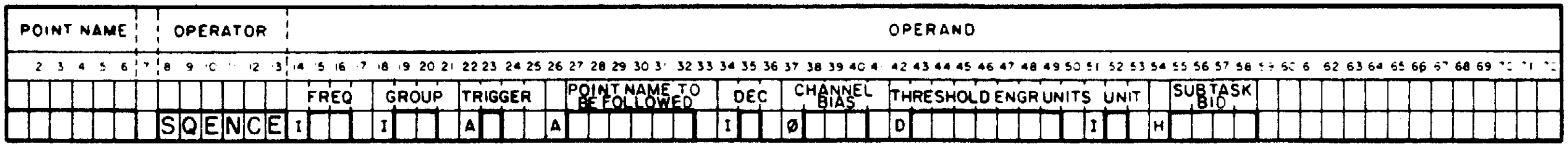

SQENCE CARD

| COLUMNS | R/O | (R) FIELD NAME | EXPLANATION |
|---|---|---|---|
| 15 – 16 | R | Freq | Scan Freq Index (>0) |
| 19 – 20 | O | Group | Sub Group Within The Scan Freq. Index |
| 23 | O | Trigger | Indicator Of Last Pt In A Group (Y = Yes, △ = No) |
| 27 – 32 | O | Point Name To Be Followed | Previous Pt In The Scan Freq Sequence; Pt Will Be Ordered After This Previous Pt |
| 35 | O | Dec | Number Of Decimal Places For Print Messages |
| 38 – 40 | O | Channel Bias | Bias To Be Subtracted From Channel No. |
| 43 – 49 | O | Threshold Engr Units | Threshold Value For Point Value |
| 52 | O | Unit | Unit No. To Which This Point Is Assigned |
| 55 – 58 | O | Subtask Bid | Subtask No. To Bid After The Point Is Processed |

FIG. 15/104

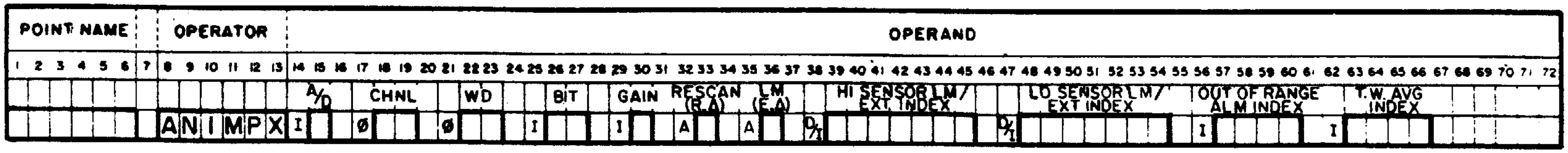

ANIMPX CARD (R) FOR ANALOG INPUTS

| COLUMNS | R/O | FIELD NAME | EXPLANATION |
|---|---|---|---|
| 15 | R | A/D | Analog/Digital Converter No. |
| 17 – 19 | R | Chnl | HW Channel Assignment |
| 22 – 23 | R | Wd | HW Word Assignment |
| 26 – 27 | R | Bit | HW Bit Assignment |
| 30 | R | Gain | Gain For The Point A/D Conv |
| 33 | R | Rescan | Rescan Pt In Alm State (R = Rescan, Δ = No Rescan) |
| 36 | R | Lm | High Limit Loc. (E = External, Δ = In File) |
| 39 – 45 | O | Hi Sensor Lm/ Ext Index | Hi Sensor Limit Value/Index To Ext Hi Sens Lm Value |
| 48 – 54 | O | Lo Sensor Lm/ Ext Index | Low Sensor Limit Value/Index To Ext Low Sens Lm Value |
| 57 – 60 | O | Out Of Range Alm Index | Index To Special Routine Written For Sensor Alm |
| 63 – 66 | O | T. W. Avg Index | Index To Storage Of Time For A Time Weighted Average Value |

FIG. 15/105

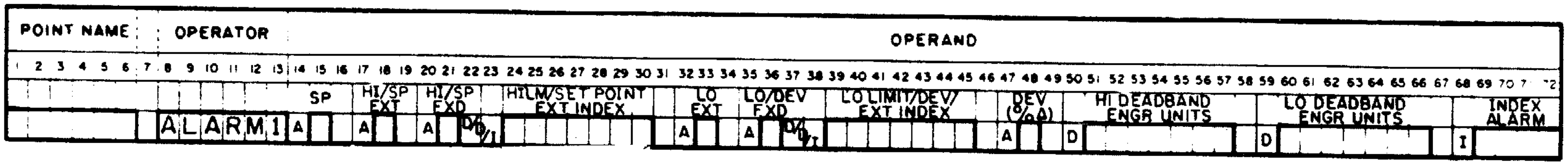

ALARM1 CARD

| COLUMNS | R/O | (O) FIELD NAME | EXPLANATION |
|---|---|---|---|
| 15 | R | Sp | Setpt or Alm Limit Indicator (S = Setpt, Δ = Alarm) |
| 18 | R | Hi/Sp Ext | Setpt or Hi Alm Loc. Indicator (C = Ext To Card, Δ = On Card) |
| 21 | O | Hi/Sp Fxd | External Setpt or Alm Lm Storage (F = Fixed, Δ = Real No.) |
| 24 – 30 | O | Hi Lm/Setpoint/ Ext Index | Setpt Or Hi Alm Lm Real No. Value/ Index To Externally Calc Limit |
| 33 | R | Lo Ext | Low Limit Or Dev Loc. Indicator (C = Ext To Card, Δ = On Card) |
| 36 | O | Lo/Dev Fxd | External Deviation Of Low Alm Lm Storage (F = Fixed, Δ = Real No.) |
| 39 – 45 | O | Lo Limit/Dev/ Ext Index | Dev Or Lo Alm Lm Real No. Value/ Index To Externally Calc Dev Or Lm |
| 48 | O | Dev | Deviation Value Interpretation (% = Percent, Δ = Engr. Units) |
| 51 – 57 | O | Hi Deadband Engr Units | Deadband Value In EU For Hi Alm Lm or Setpt + Dev Lm |
| 60 – 66 | O | Lo Deadband Engr Units | Deadband Value In EU For Lo Alm Lm or Setpt − Dev Lm |
| 69 – 72 | O | Alarm Index | Index To User Written Routine For Points In Engr Units Alm |

FIG. 15/106

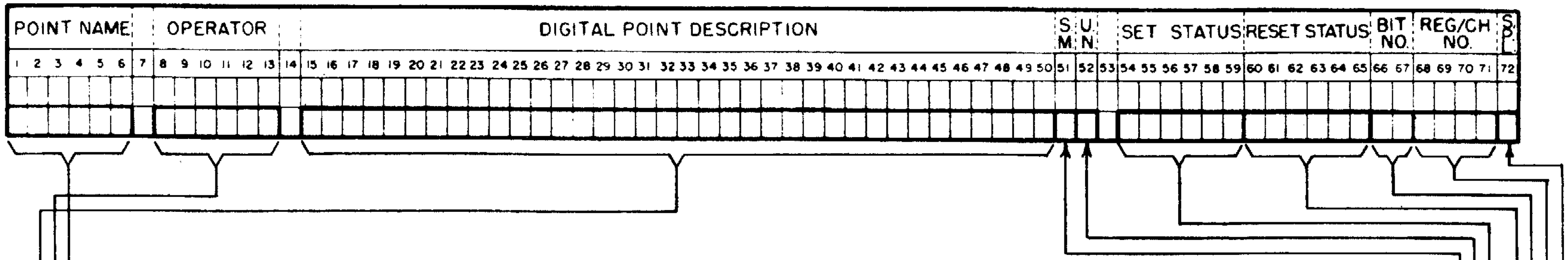

| Columns | Field Name | Explanation |
|---|---|---|
| 1-6 | Point Name | The six alphanumeric character name of the addressable point. |
| 8-13 | Operator | The name of the individual card (the point type). Use character field as follows: (△ = blank)<br><br>Periodic Contact Input = PERCCI<br>Non-periodic Contact Inp. = NPRCCI<br>Contact Output = △△△CCO<br>Logical Variable = LOGVAR (word or bit) |
| 15-50 | Digital Point Description | The user description of the point function. |
| 51 | Storage Medium (S. M.) | Core/disc = 0/1 |
| 52 | Unit Number (U. N.) | Unit number designation used when there are points for multiple units. |
| 54-59 | Set Status | The set status description of the point function (max. 6 characters). |

FIG. 15/107

| | | |
|---|---|---|
| 60-65 | Reset Status | The reset status description of the point function (max. 6 characters). |
| 66-67 | Bit Number | The bit number in the register or channel for the digital point. |
| 68-71 | Register/Channel Number | The register number (decimal) or the channel number (octal) assigned the digital point. Use register no. for periodic CCI, CCO, and logical variable. Use channel no. for non-periodic CCI. |
| 72 | Set Permissive/ Limit (S. P. L.) | To indicate whether or not the digital point may be entered or is assigned limits, use character field as follows:<br><br>Non-periodic CCI – blank (not used)<br>Periodic CCI and Logical Variable – the initial setpoint limit for the contact or variable. Use a blank to indicate no limit.<br>CCO – set entry permissable = S<br>Reset entry permissable = R<br>Both set and reset entry permis. = C<br>Neither set not reset entry permis. = blank |

FIG. 15/107 CONT.

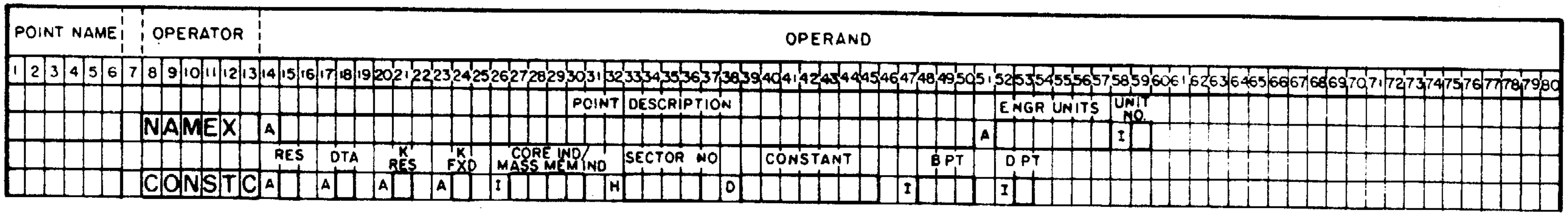

NAMEX CARD

| COLUMNS | R/O | FIELD NAME | EXPLANATION |
|---|---|---|---|
| 15-50 | O | CONSTANT DESCRIPTION | DESCRIPTION OF THE CONSTANT |
| 52-57 | O | ENGR. UNITS | DESCRIPTION OF CONSTANT ENGR. UNITS |
| 59 | O | UNIT NUMBER | ASSIGNED BY USER |

CONSTC CARD

| COLUMNS | R/O | FIELD NAME | EXPLANATION |
|---|---|---|---|
| 15 | R | RESIDENCE | CORE OR DISK |
| 18 | R | DTA | CONSTANT IN FILE OR EXTERNAL |
| 21 | O | K. RESIDENT | EXTERNAL DESIGNATOR |
| 24 | R | K. FIXED | FIXED POINT OR REAL |
| 27-30 | R | CORE INDICATOR/MASS MEM. IND. | RELATIVE ADDRESS OF CONSTANT IN SECTOR OR IN CONSTANT STORAGE AREA OF CORE, AND SECTOR NUMBER |
| 33-36 | O | SECTOR NO. | |
| 39-45 | O | CONSTANT | VALUE OF CONSTANT |
| 48-50 | O | B. PT. | BINARY POINT FOR FIXED POINT CONSTANT |
| 53 | O | D. PT. | DECIMAL POINT FOR PRINTOUT |

FIG. 15/108

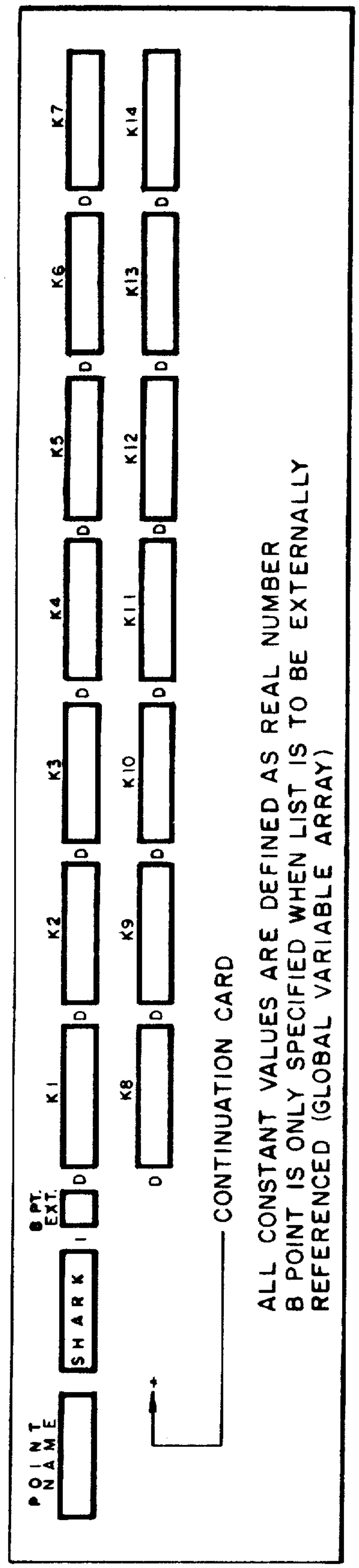
FIG. 15/109

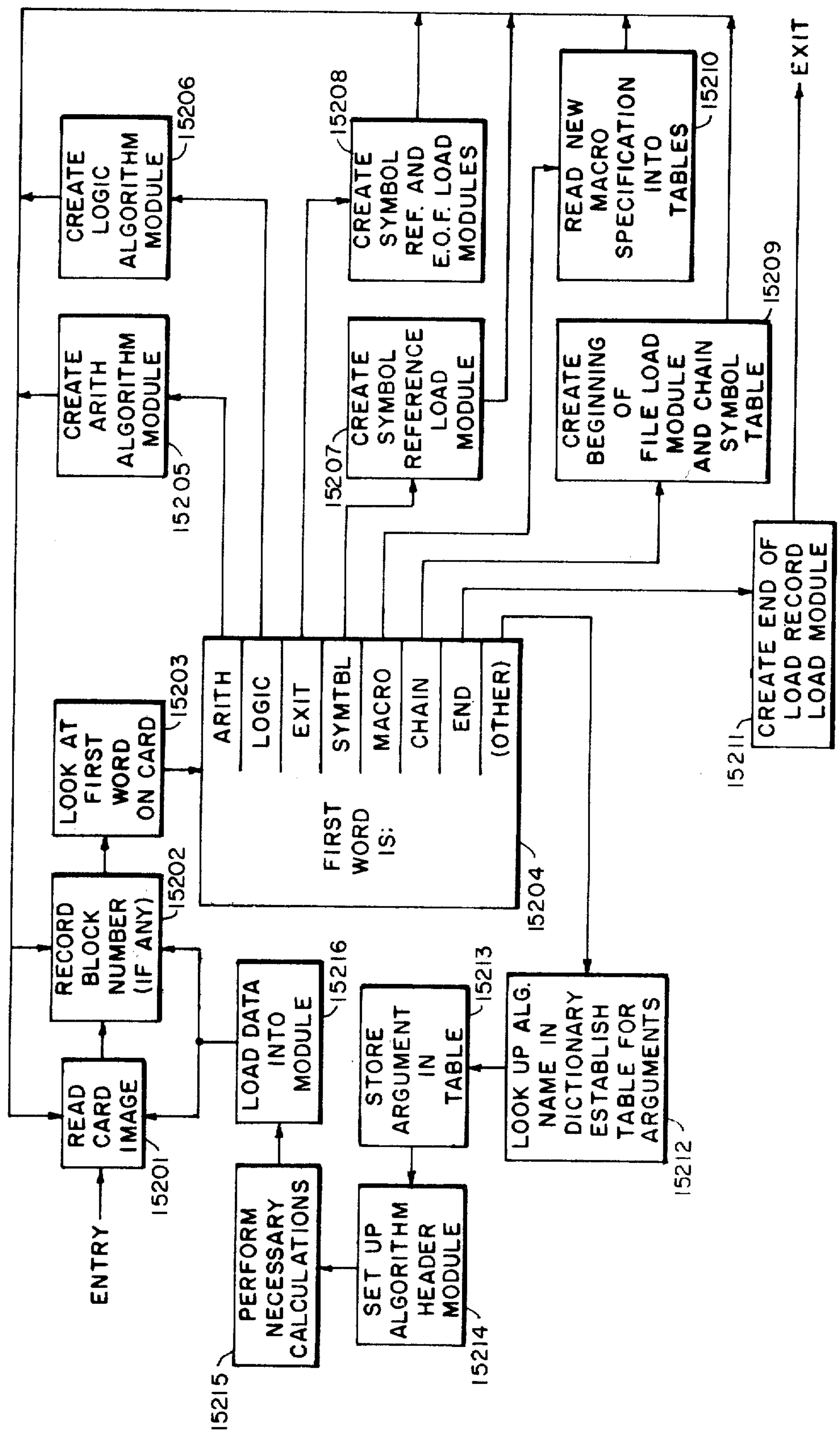
FIG. 15/200 CONTROL CHAIN GENERATOR PROGRAM

```
CHAIN (NAME) (CORE/DISC)

LEVEL = X X X  (TASK, SUBLEVEL)

TRIGGER = (VARIABLE(S) )

    TRIGGER VARIABLES MAY BE:

       ANALOG INPUT(S)
       CALCULATED VALUE(S)
       DIGITAL INPUT(S)
         PERIODIC CONTACT INPUT(S)

         CONTACT OUTPUT(S)
         LOGICAL VARIABLE(S)
```

FIG. 15/201

```
CHAIN (NAME) (CORE/DISC)

TRIGGER = (SINGLE ANALOG POINT)

    TRIGGER LINKAGE IS ESTABLISHED AS
    A DIRECT CONNECTION BETWEEN THE
    SPECIFIED POINT FILE AND THE ANALOG
    CONTROL CHAIN FILE
```

FIG. 15/202

```
CHAIN (NAME) (CORE/DISC)

    LEVEL = X X X (TASK, SUBLEVEL)

       TRIGGER IS ACCOMPLISHED THROUGH EITHER
       A SUBTASK BID ENTRY IN A FILE OR THROUGH
       SEPARATE SUBTASK BIDDING FILE(S)
```

FIG. 15/203

```
CHAIN (NAME) (CORE/DISC)
    PERIOD = (Floating point number in
                tenths of seconds) (ie: 15.5
    LEVEL = X X X

       THE NECESSARY LINKAGE IS PERFORMED THROUGH
       SPECIAL PROCESSORS IN THE AUXILLIARY
       SYNCHRONIZER
```

FIG. 15/204

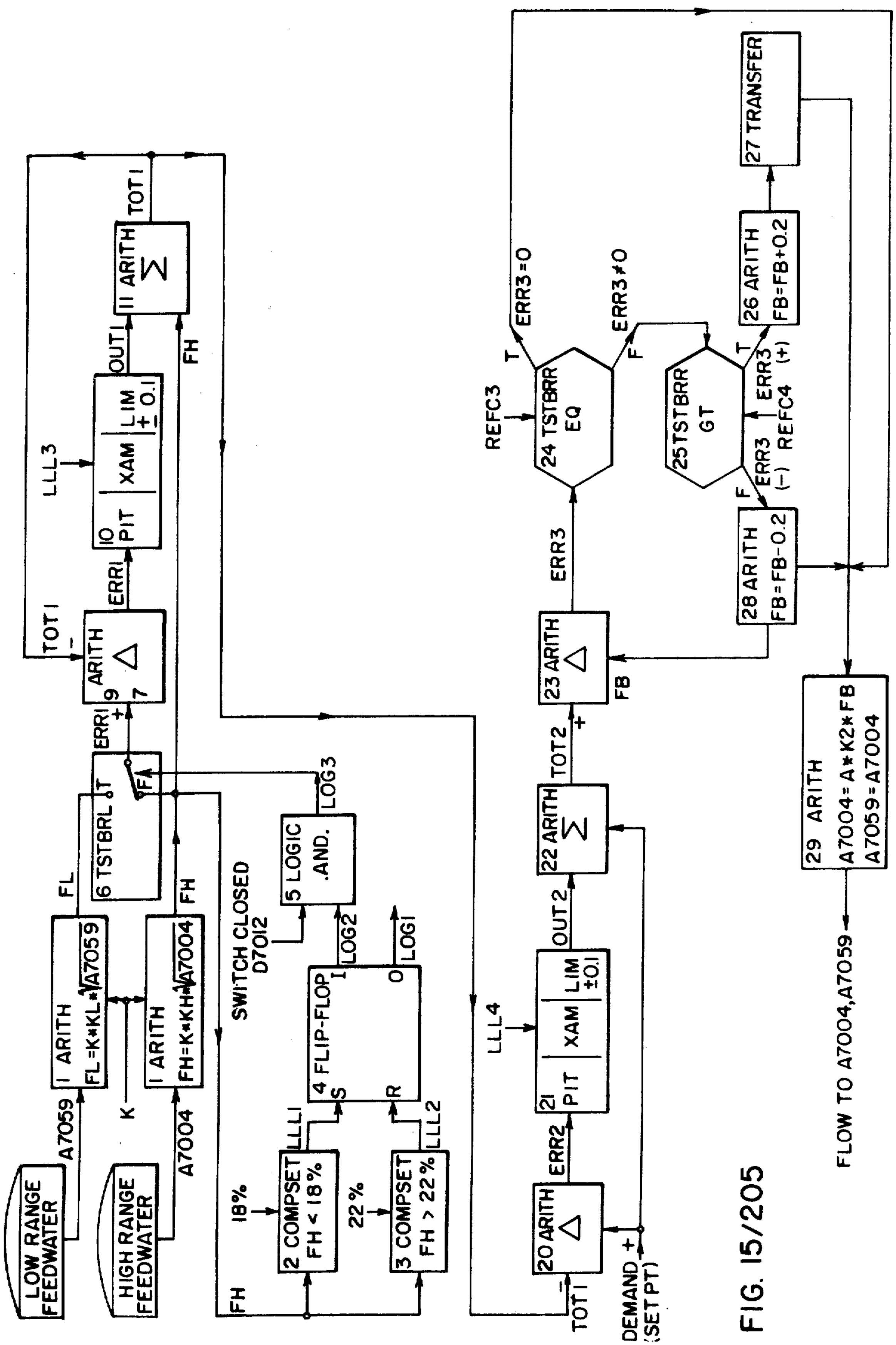
FIG. 15/205

```
CHAIN FLCHØV CØRE
   DELTATEE=1.0
   TRIGGER=A7059

PRØCESS
   REAL A7004, A7059
   LØGICAL D7012

GLØBAL
   REAL K,KH,KL,FH,FL,FB,ERR1,ERR2,ERR3,
   REAL ØUT1,ØUT2,TØT1,TØT2,REFC1,REFC2,REFC3,REFC4,A,K2
   LØGICAL LLL1,LLL2,LLL3,LLL4,LØG1,LØG2,LØG3
```

```
1 ARITH
    FH=K*KH*SQRT(A7004)
    FL=K*KL*SQRT(A7059)

2 CØMPSET
    INPUT=FH
    REF=REFC1
    CØMP=LE
    TRUE=LLL1
    FALSE=LLL4

3 CØMPSET
    INPUT=FH
    REF=REFC2
    CØMP=GE
    TRUE=LLL2
    FALSE=LLL4

4 FLPFLP
    SET=LLL1
    RESET=LLL2
    DIRØUT=LOG2
    BARØUT=LOG1

5 LØGIC
    LOG3=LOG2.AND.D7012

6 TSTBRL
    INPUT=LOG3
    TRUE=9
    FALSE=7

7 ARITH
    ERR1=FH-TØT1

8 TRANSFER
    DEST=10

9 ARITH
    ERR1=FL-TØT1

10 PITXAMLIM
    INPUT=ERR1
    GAINA=0.1
    TIMEA=0.15
    GAINB=1.0
    TIMEB=1.5
    HILIM= 10
    LØLIM= 0
    OUTPUT=ØUT1
    AUMAN=LLL3

11 ARITH
    TØT1=ØUT1+FH

20 ARITH
    ERR2=SETPT-TØT1

21 PITXAMLIM
    INPUT=ERR2
    GAINA=0.1
    TIMEA=0.15
    GAINB=1.0
    TIMEB=1.5
    HILIM=+100
    LØLIM=-100
    ØUTPUT=ØUT2
    AUMAN=LLL4

22 ARITH
    TØT2=OUT2+SETPT

23 ARITH
    ERR3=TOT2-FB

24 TSTBRR
    INPUT=ERR3
    REF=REFC3
    CØMP=EQ
    TRUE=29
    FALSE=25

25 TSTBRR
    INPUT=ERR3
    REF=REFC4
    CØMP=GT
    TRUE=26
    FALSE=28

26 ARITH
    FB=FB+0.2

27 TRANSFER
    DEST=29

28 ARITH
    FB=FB-0.2

29 ARITH
    A7004=A*K2*FB
    A7059=A7004

50 EXIT
```

FIG. 15/206

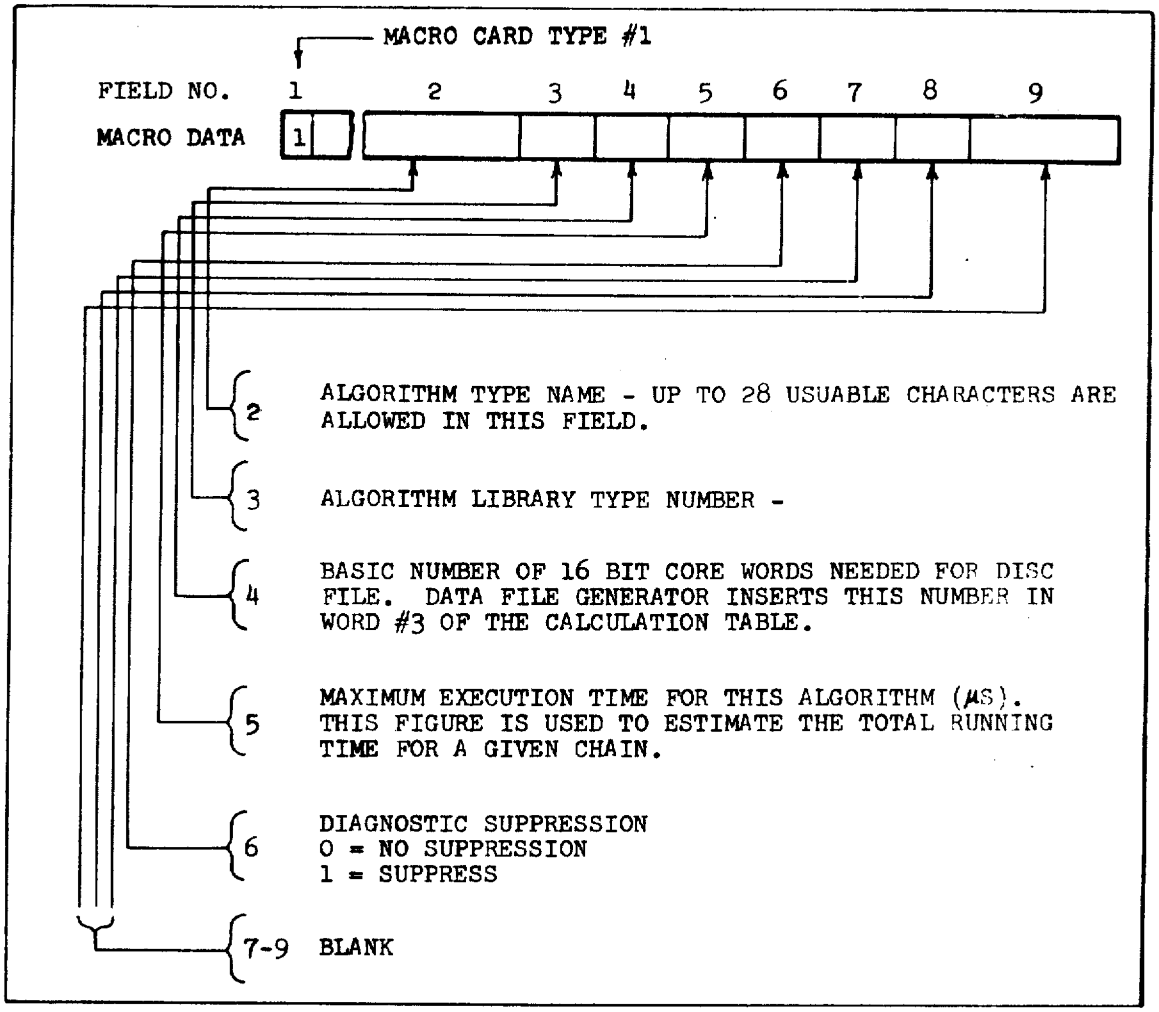
FIG. 15/210
CALCULATION TABLE
| ITEM | PURPOSE |
|---|---|
| 1 | 0.0 |
| 2 | Δt |
| 3 | #WORDS REQUIRED IN CORE FILE |
| 4 | SPARE |
| 5 | SPARE |
| 6 | FOR USE IN CALCULATIONS AT CHAIN |
| 7 | DATA GENERATION TIME |
| 8 | ↓ |
FIG. 15/211

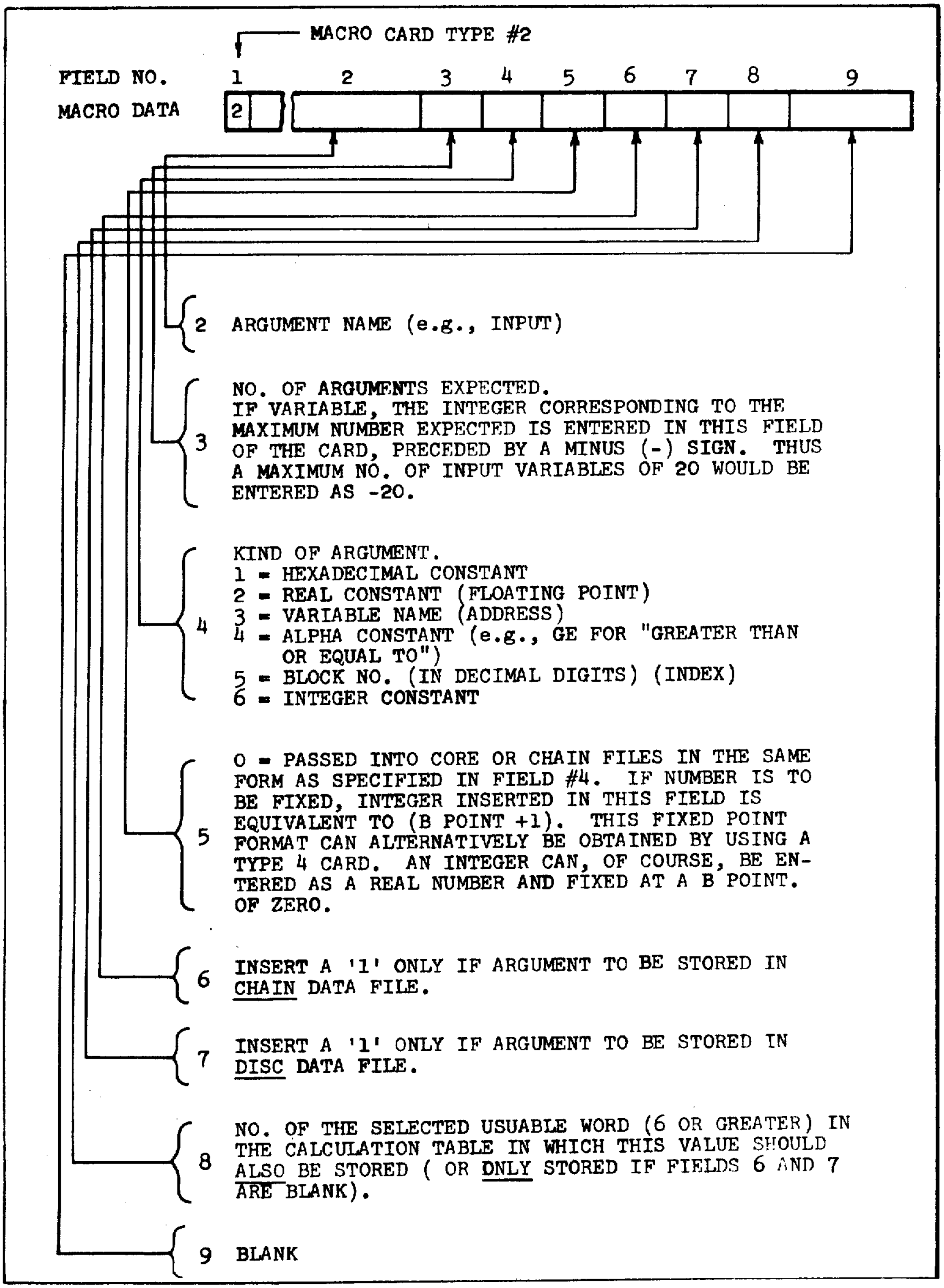
FIG. 15/212

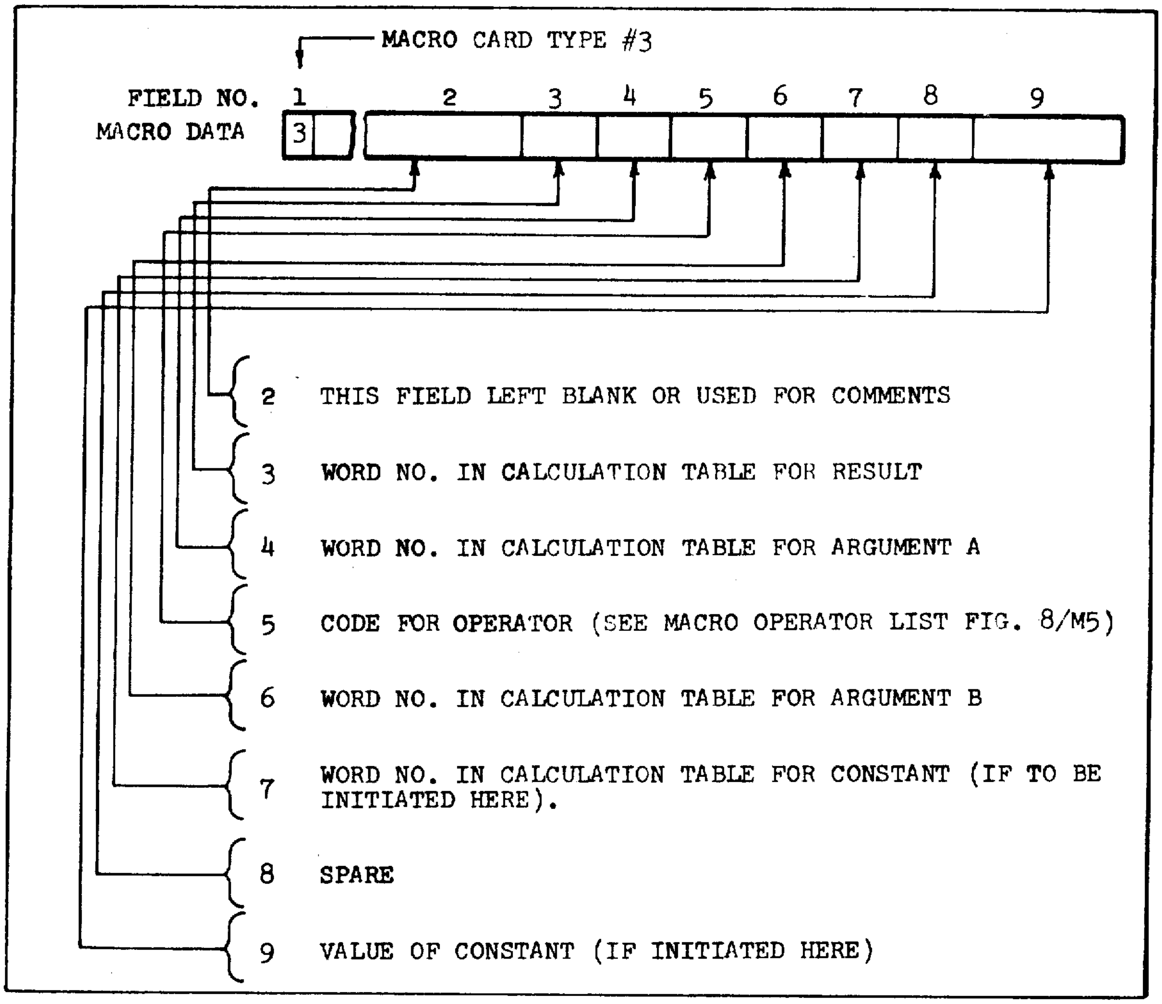
FIG. 15/213
MACRO OPERATORS
| | |
|---|---|
| 1 = + | 11 = .GT. |
| 2 = - | 12 = .LT. |
| 3 = * | 13 = .EQ. |
| 4 = / | 14 = .NE. |
| 5 = **(EXPON.) | |
| 6 = SQRT | |
| 7 = SIN | |
FIG. 15/214

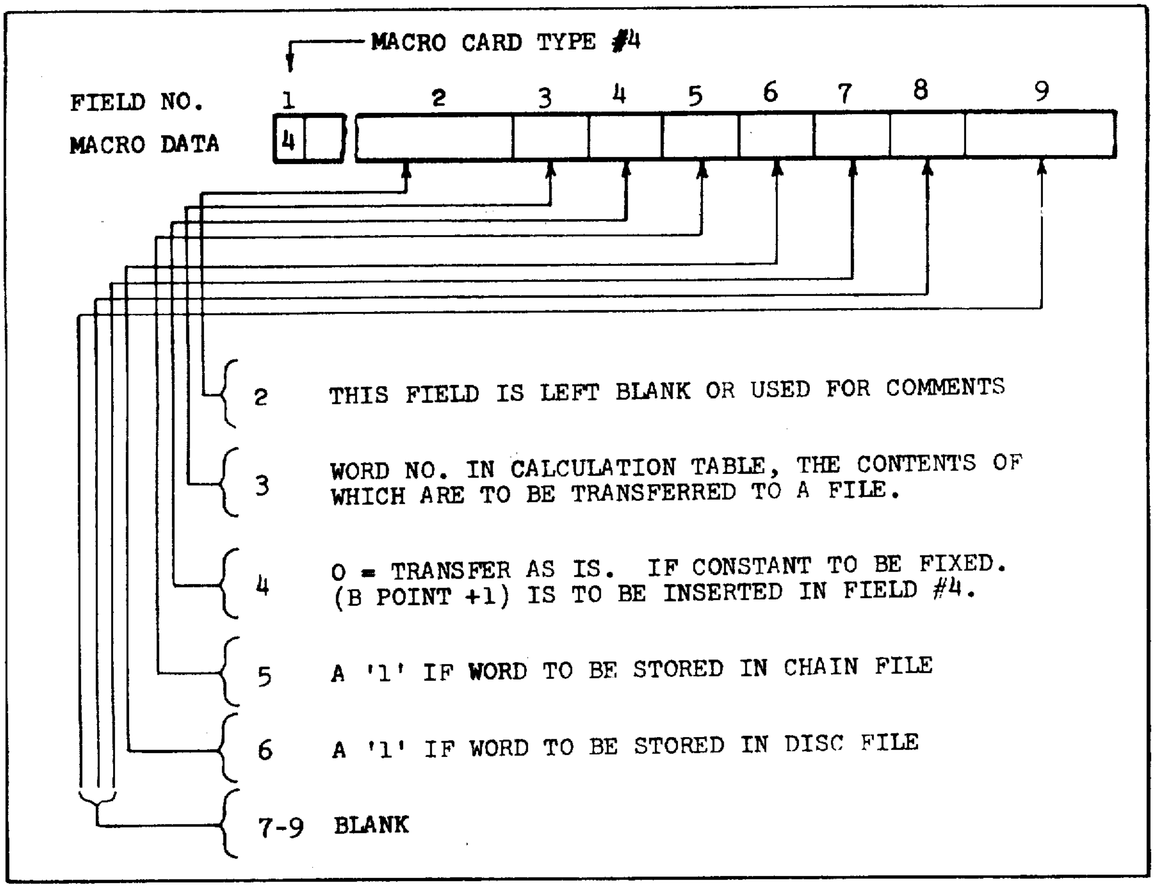
FIG. 15/215
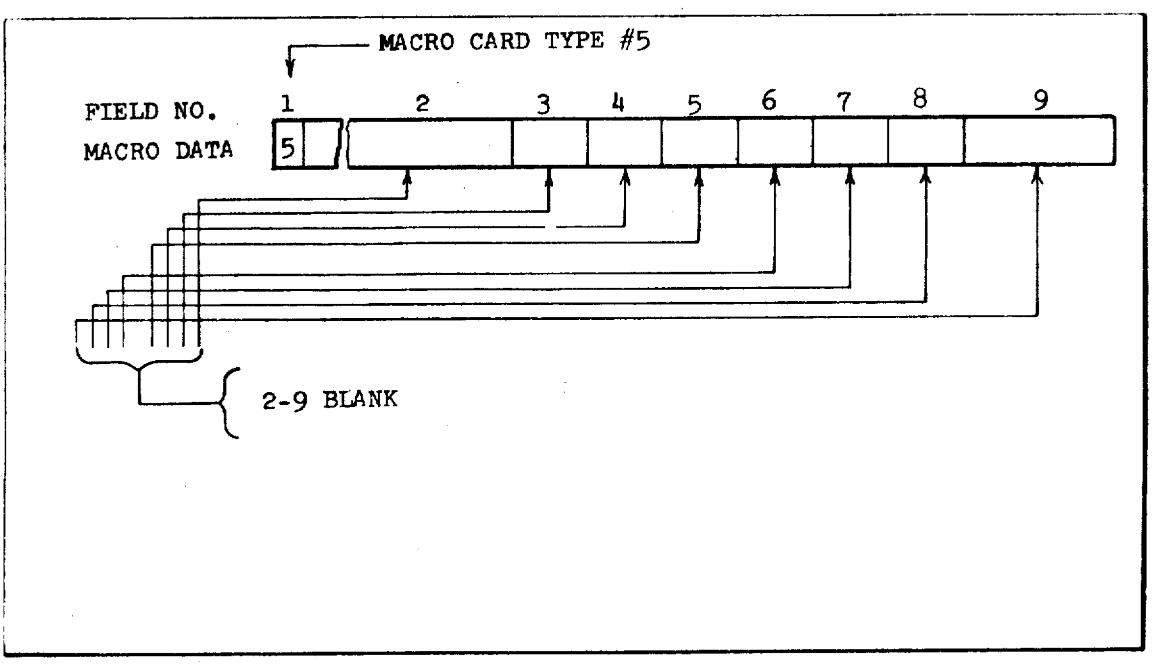
FIG. 15/216

TITLE ANALYST DATE

JOB NO. MACRO DECK L.S. NO. LABEL SHEET OF

| #1 | #2 | #3 | #4 | #5 | #6 | #7 | #8 | #9 |
|---|---|---|---|---|---|---|---|---|
| 12 | 3------------------------------30 | 31---35 | 36--40 | 41--45 | 46---50 | 51--55 | 56--60 | 61-------70 |
| 1 | LAGTLIM | 18 | | | | | | |
| 2 | GAIN | 1 | 2 | | | 1 | 6 | |
| 2 | TIME | 1 | 2 | | | 1 | 7 | |
| 2 | HILIM | 1 | 2 | | | 1 | | |
| 2 | LOLIM | 1 | 2 | | | 1 | | |
| 2 | INPUT | 1 | 3 | | | 1 | | |
| 2 | PAST | 1 | 3 | | | 1 | | |
| 2 | OUTPUT | 1 | 3 | | | 1 | | |
| 3 | 2*T | 7 | 7 | 3 | | 10 | | 2.0 |
| 3 | A = 2*T-DELTATEE | 8 | 7 | 2 | 2 | | | |
| 3 | B = 2*T+DELTATEE | 10 | 7 | 2 | 2 | | | |
| 3 | C1 = A/B | 8 | 8 | 4 | 10 | | | |
| 3 | D = GAIN*DELTATEE | 9 | 6 | 3 | 2 | | | |
| 3 | C2 = D/B | 9 | 9 | 4 | 10 | | | |
| 4 | C1 | 8 | 0 | 1 | | | | |
| 4 | C2 | 9 | 0 | 1 | | | | |
| 5 | | | | | | | | |

TYPE # NAME OR COMMENTS CODING FIELDS

FIG. 15/217

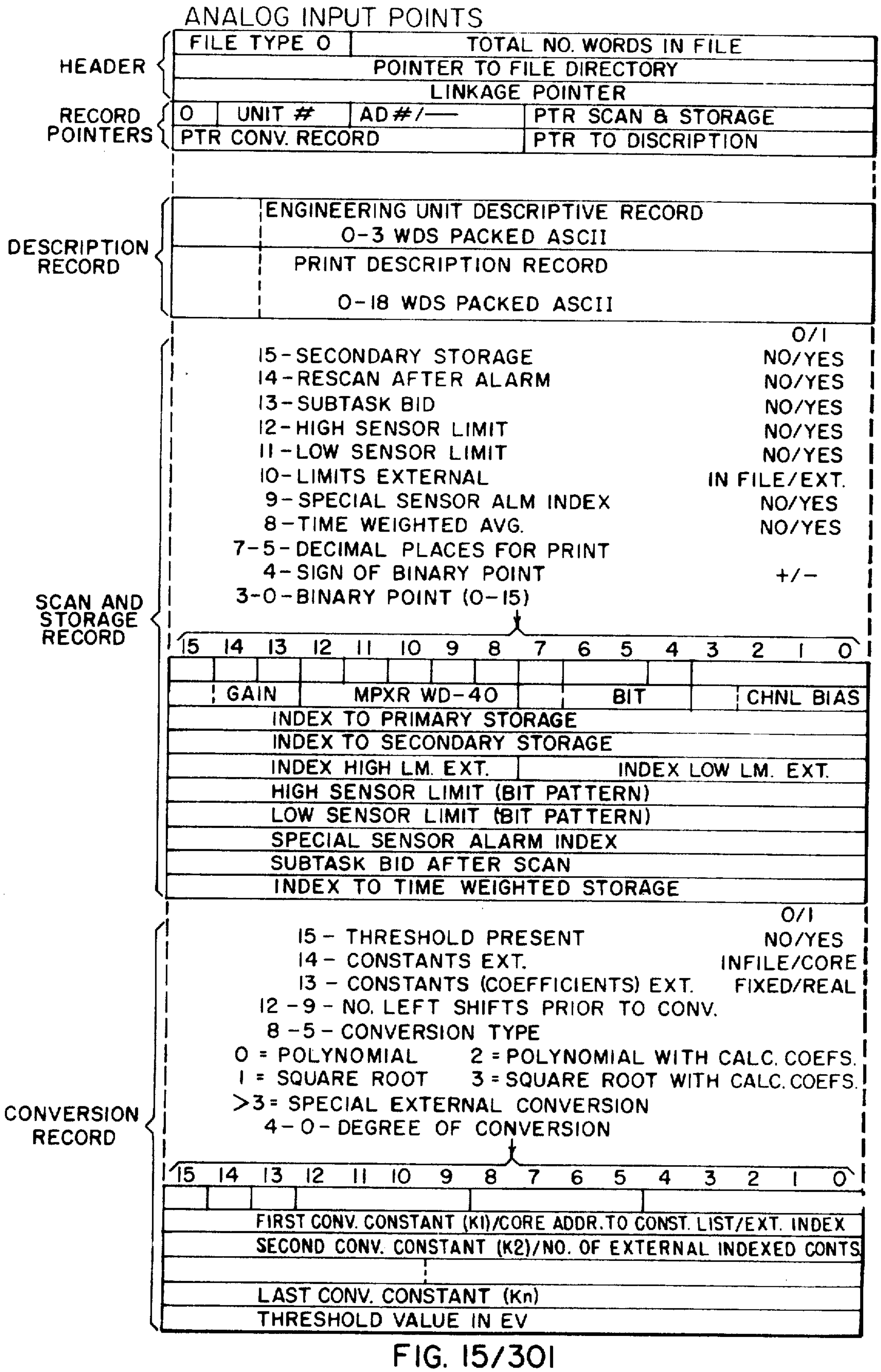
FIG. 15/301

ANALOG INPUT POINTS

| FILE TYPE 1 | HEADER |
|---|---|
| **RECORD POINTER** | |
| 0 \| UNIT # \| AD #/— | PTR SCAN & STORAGE |
| PTR CONV. RECORD | PTR TO DESCRIPTION |
| PTR INCR. LIMIT | PTR ALARM/SETPT |

DESCRIPTION RECORD

SCAN AND STORAGE RECORD

CONVERSION RECORD

ALARM SETPOINT RECORD

| Bit | | 0/1 |
|---|---|---|
| 15 | ALARM TYPE | HI-LOW/SETPT |
| 14 | HIGH LIMIT | NO/YES |
| 13 | HIGH LIMIT EXT. | IN FILE/EXT. |
| 12 | HIGH LIMIT EXT. REAL | FIXED/REAL |
| 11 | LOW LIMIT | NO/YES |
| 10 | LOW LIMIT EXT. | IN FILE/EXT. |
| 9 | LOW LIMIT EXT. REAL | FIXED/REAL |
| 8 | SETPT EXT. | NO/YES |
| 7 | SETPT EXT. REAL | FIXED/REAL |
| 6 | DEVIATION EXT. | NO/YES |
| 5 | DEVIATION EXT. REAL | FIXED/REAL |
| 4 | DEVIATION DIMENSION | EU/% |
| 3 | SPECIAL EU ALARM INDEX | NO/YES |
| 2 | HIGH DEADBAND | NO/YES |
| 1 | LOW DEADBAND | NO/YES |
| 0 | HIGH/LOW DEADBAND THE SAME | NO/YES |

15 14 13 12 11 10 9 8 7 6 5 4 3 2 1 0

HIGH ALM LIMIT EU/INDEX TO HIGH ALM LIMIT EXT.
LOW ALM LIMIT EU/INDEX TO LOW ALM LIMIT EXT.
SETPT VALUE EU/INDEX TO SETPT VALUE EXT.
DEVIATION (EU OR %)/INDEX TO DEVIATION EXT.
HIGH DEADBAND EU
LOW DEADBAND EU
SPECIAL EU ALARM INDEX

INCREMENTAL LIMIT RECORD

| Bit | | 0/1 |
|---|---|---|
| 15 | INCREMENTAL HIGH LIMITS | NO/YES |
| 14 | INCREMENTAL LIMITS FIXED | NO/YES |
| 13 | INCREMENTAL LOW LIMITS | NO/YES |
| 12 | DEADBANDS APPLY TO INCREMENTS | NO/YES |
| 11 | HIGH AND LOW INCREMENTS SAME | SAME/DIFF |
| 10 | VARIABLE INCRS. IN INCR. LIST | IN FILE/CORE |
| 9-5 | NO. OF HIGH INCR. LIMITS | |
| 4-0 | NO. OF LOW INCR. LIMITS | |

15 14 13 12 11 10 9 8 7 6 5 4 3 2 1 0

CORE ADDRESS OF VARIABLE INCR. LIMIT LIST
HIGH FIXED INCR. LM/FIRST VAR. HIGH INCR. LM
LOW FIXED INCR. LM/SECOND VAR. HIGH INCR. LM
↓
LAST VARIABLE HIGH INCR. LM
FIRST VARIABLE LOW INCR. LM
↓
LAST VARIABLE LOW INCR. LM

FIG. 15/302

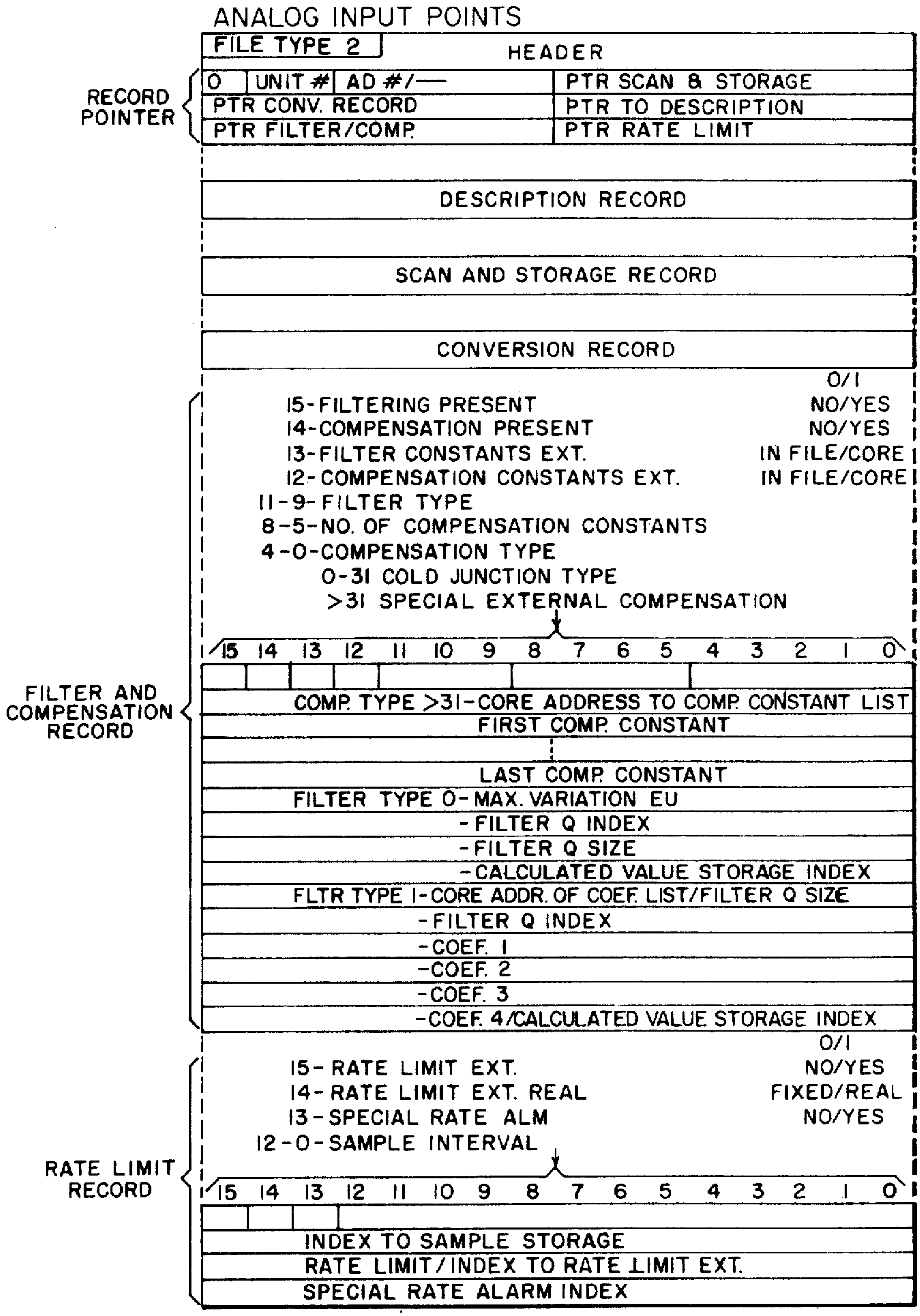
FIG. 15/303

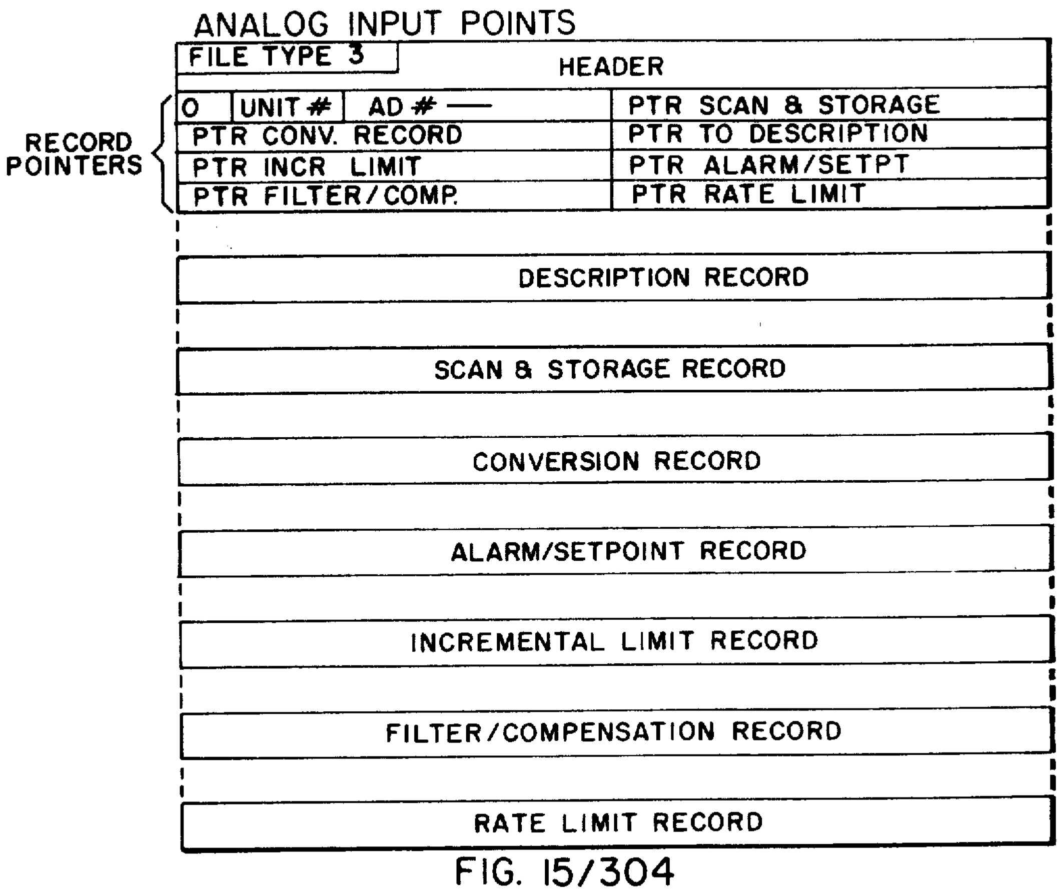
FIG. 15/304
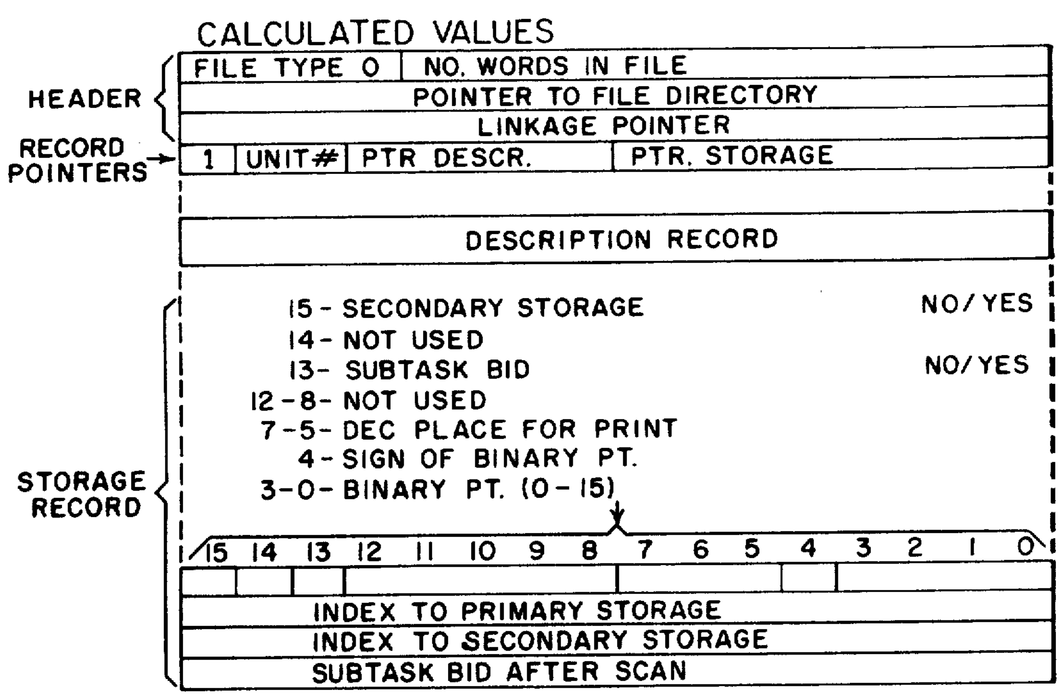
FIG. 15/305

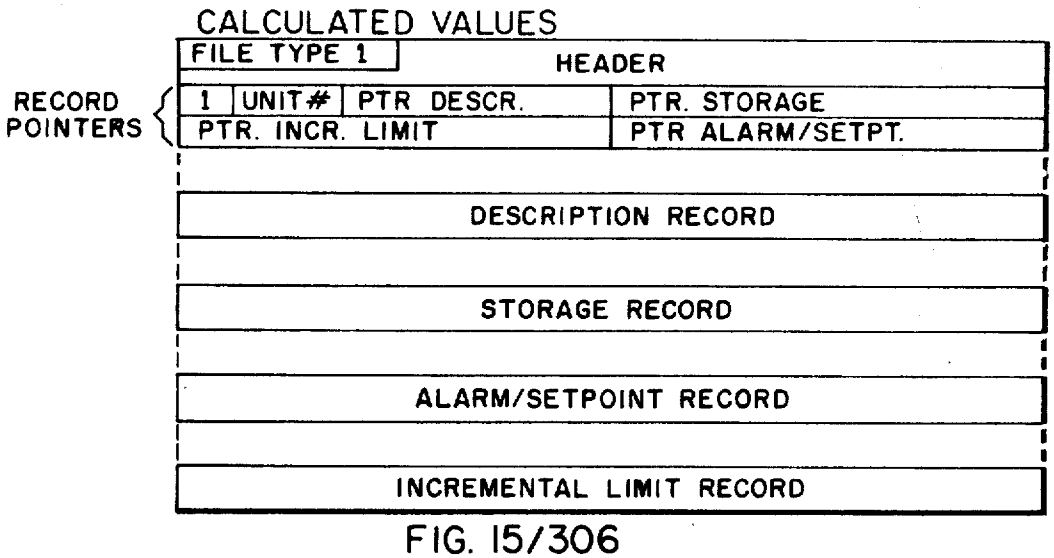
FIG. 15/306
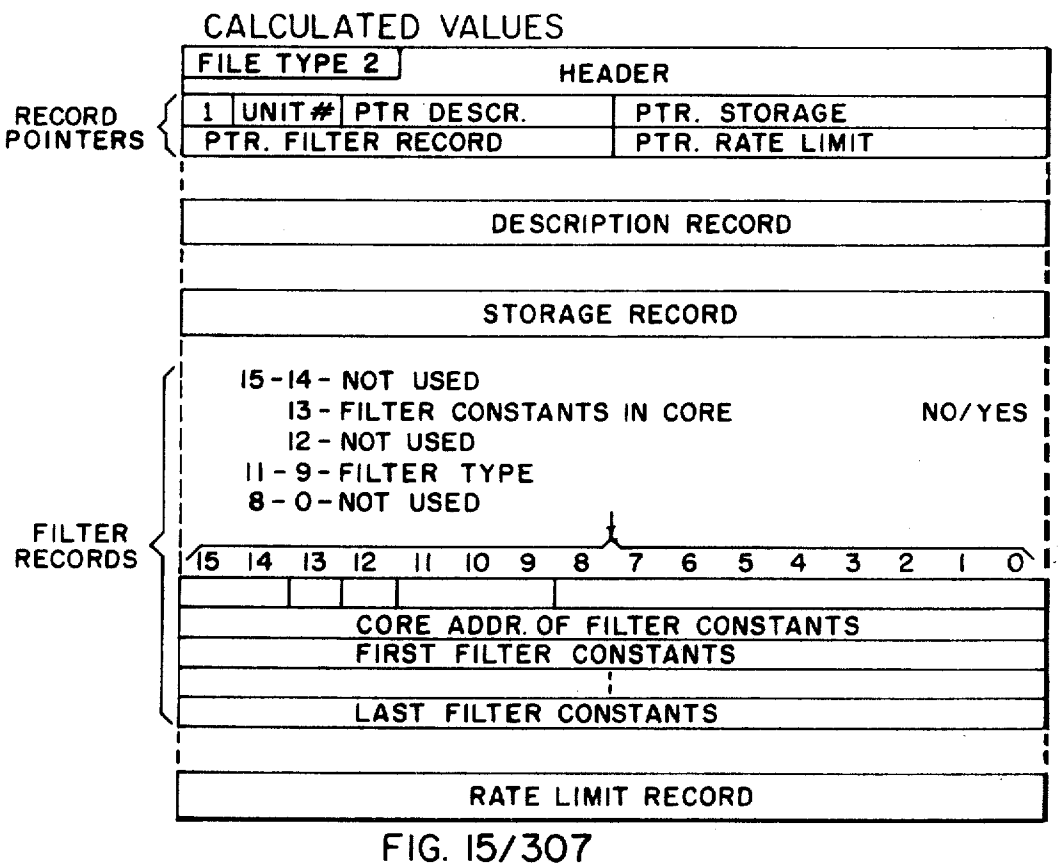
FIG. 15/307

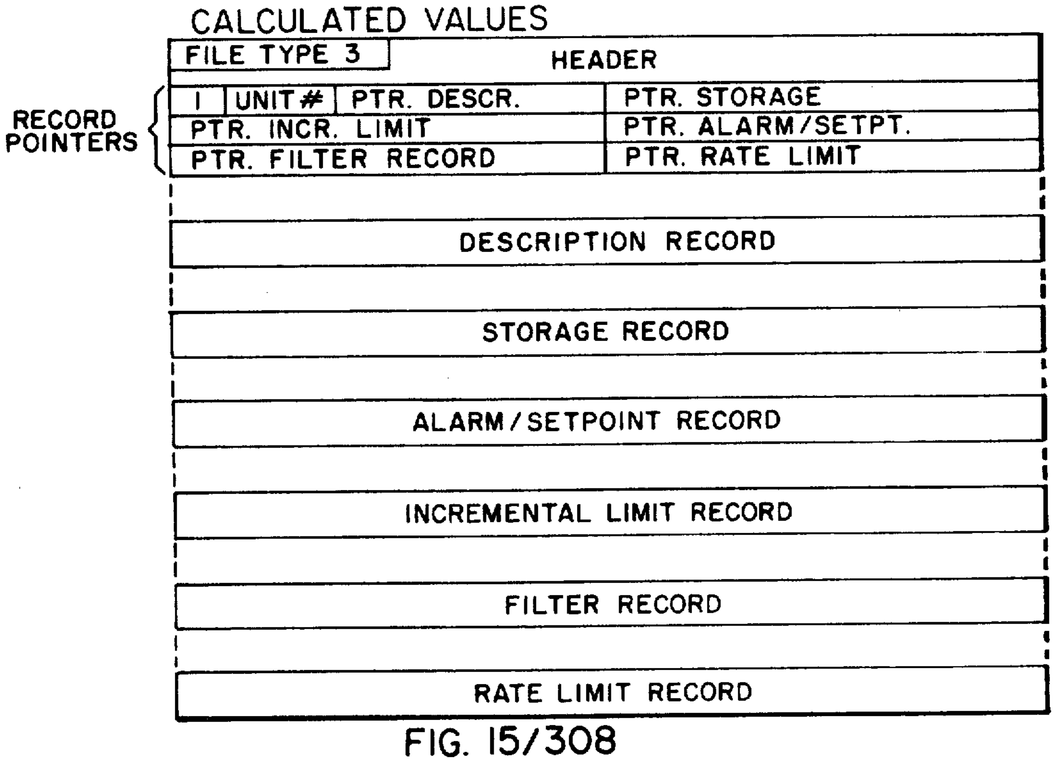
FIG. 15/308
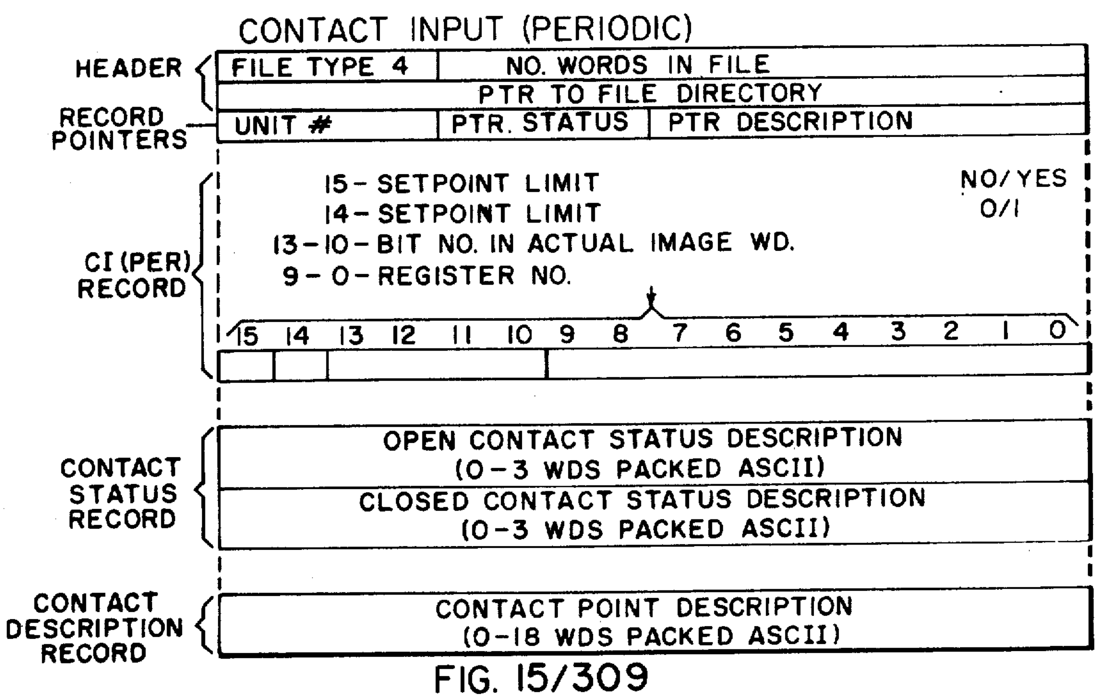
FIG. 15/309

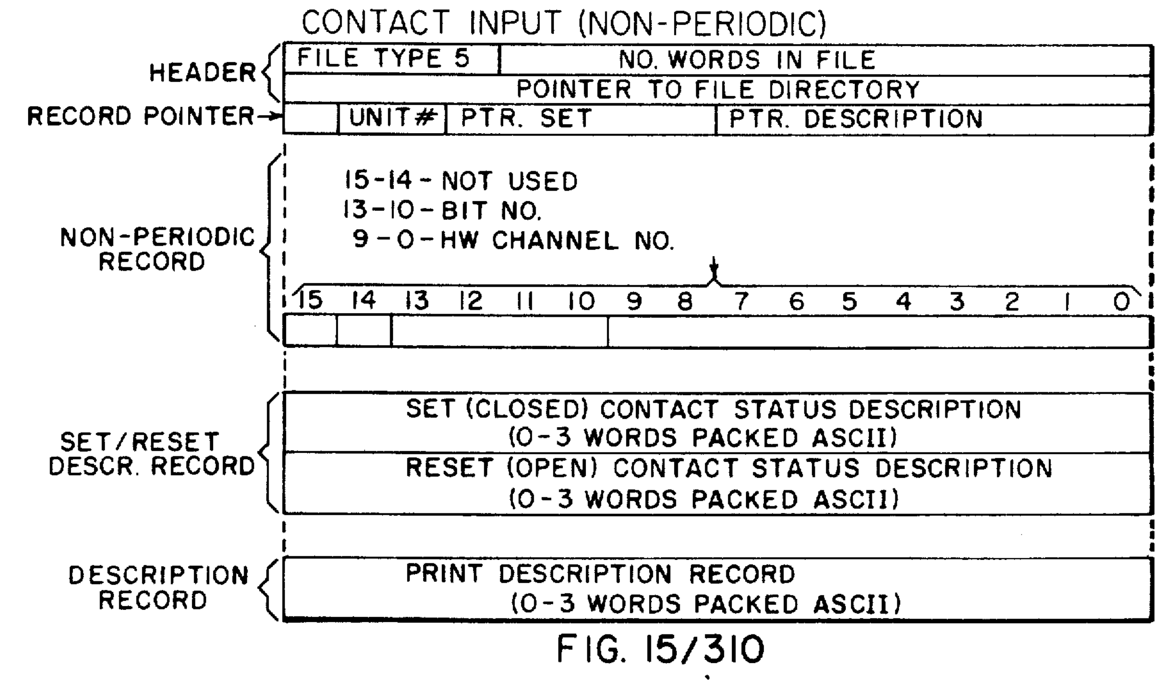
FIG. 15/310
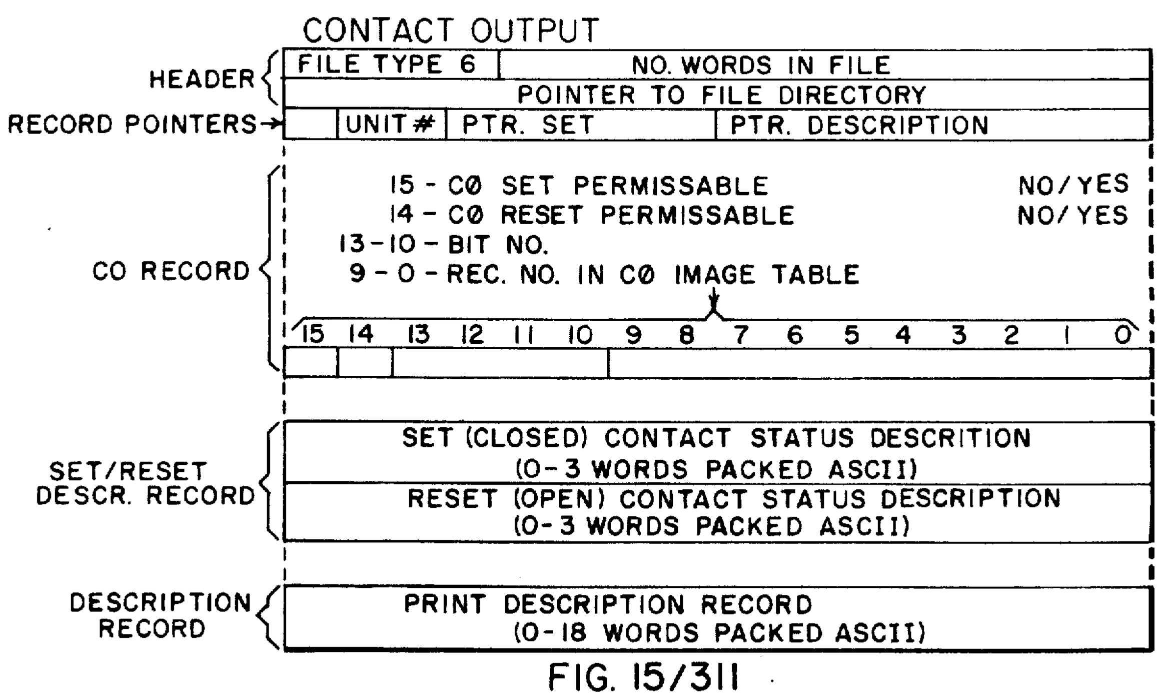
FIG. 15/311

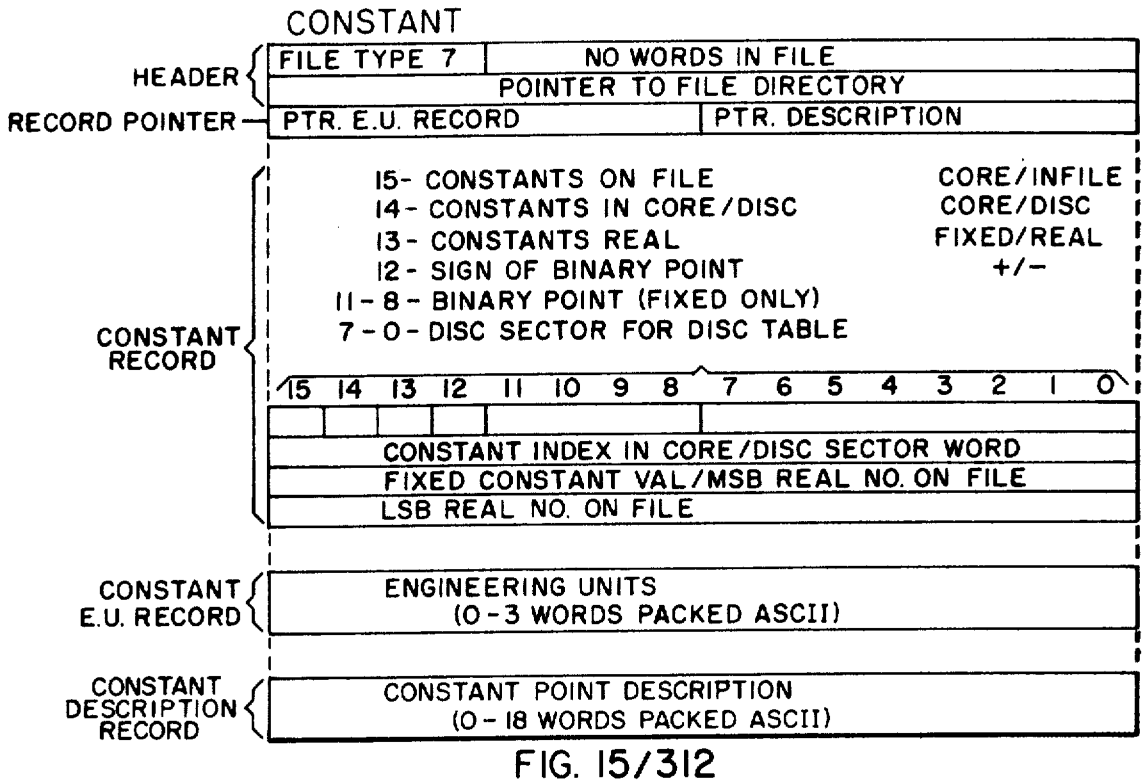
FIG. 15/312
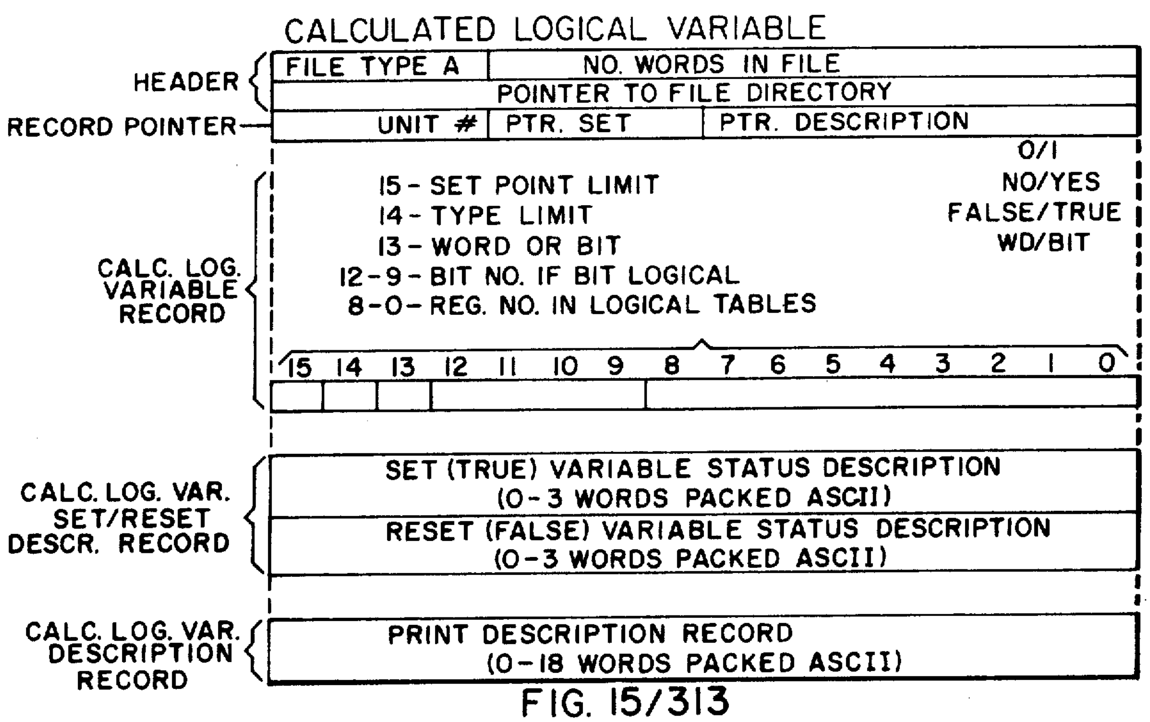
FIG. 15/313

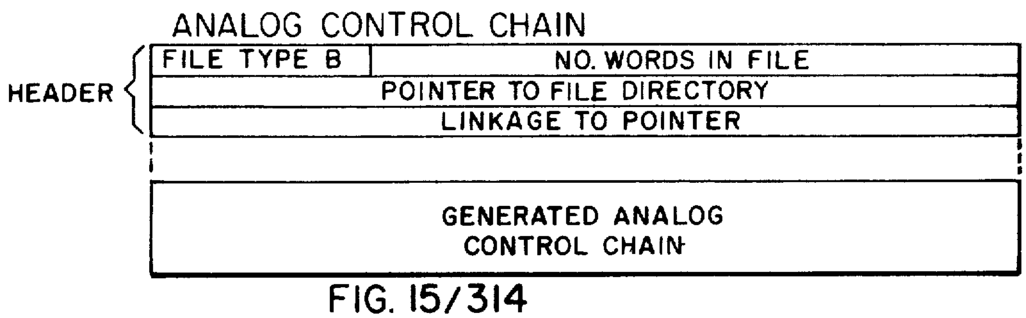
FIG. 15/314
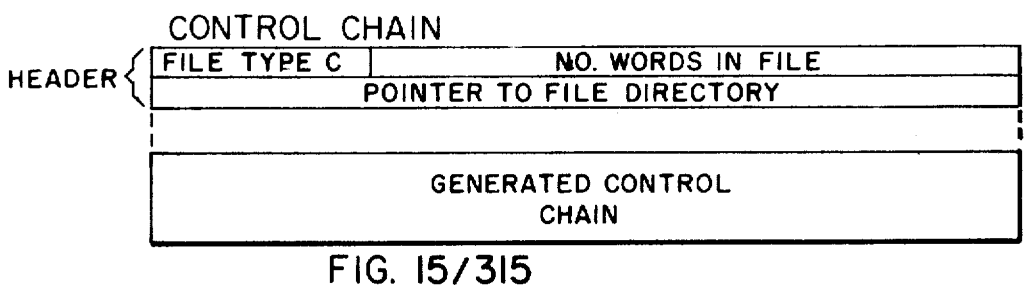
FIG. 15/315
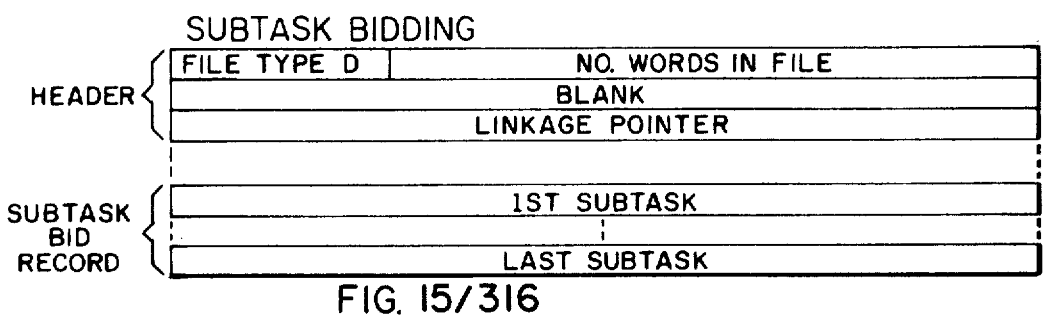
FIG. 15/316
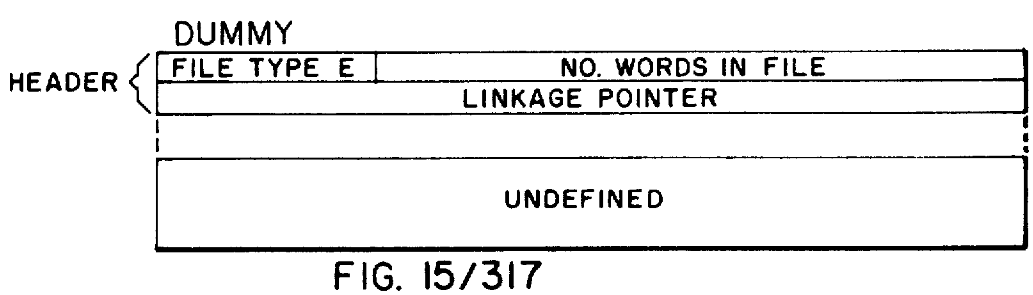
FIG. 15/317

GENERAL FILE-GENERAL FORMAT

| | |
|---|---|
| FILE TYPE F | NO. WORDS IN FILE |
| POINTER TO FILE DIRECTORY | |
| SUB-FILE TYPE | 1ST. RECORD PTR. |
| 2ND. RECORD PTR. | ------ |
| ------ | ------ |
| ------- | LAST RECORD PTR. |
| ⋮ | |
| USER DEFINED RECORD FORMAT AND COMPOSITION | |

FIG. 15/318

GENERAL FILE-INTEGER FILE

| | |
|---|---|
| FILE TYPE F | NO. WORDS IN FILE |
| POINTER TO FILE DIRECTORY | |
| SUB-FILE TYPE 0 | NOT USED |
| ⋮ | |
| 1ST INTEGER VALUE | |
| ⋮ | |
| LAST INTEGER VALUE | |

FIG. 15/319

GENERAL FILE-REAL NUMBER FILE

| | |
|---|---|
| FILE TYPE F | NO. WORDS IN FILE |
| POINTER TO FILE DIRECTORY | |
| SUB-FILE TYPE 1 | NOT USED |
| ⋮ | |
| MSB VALUE 1 | |
| LSB VALUE 1 | |
| ⋮ | |
| ⋮ | |
| MSB LAST VALUE | |
| LSB LAST VALUE | |

FIG. 15/320

GENERAL FILE - TEXT FILE

| | |
|---|---|
| FILE TYPE F | NO. WORDS FILE |
| POINTER TO FILE DIRECTORY | |
| SUB-FILE TYPE 2 | NOT USED |
| ⋮ | |
| PACKED ASCII CHARACTERS | |

FIG. 15/321

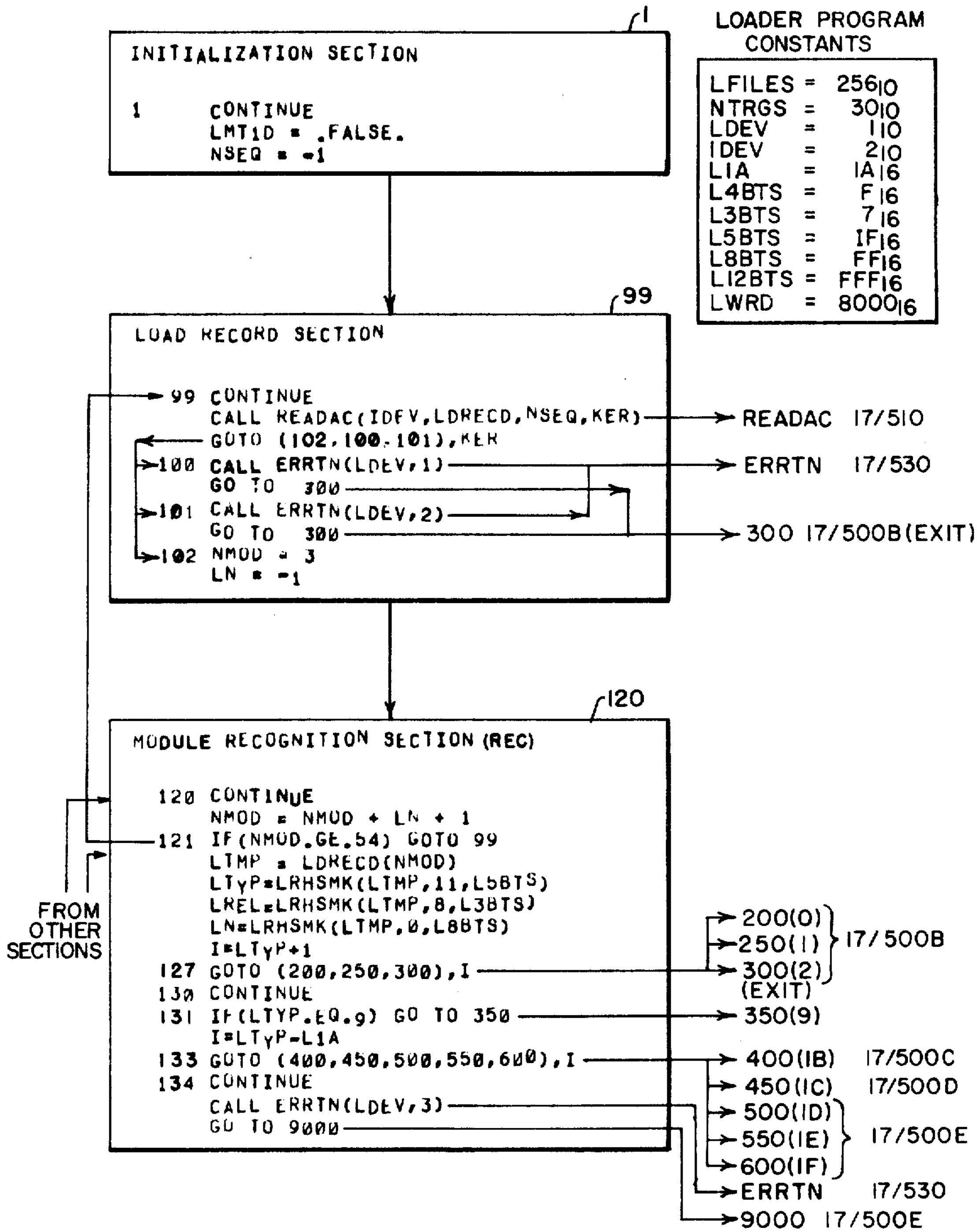
FIG. 17/500A.

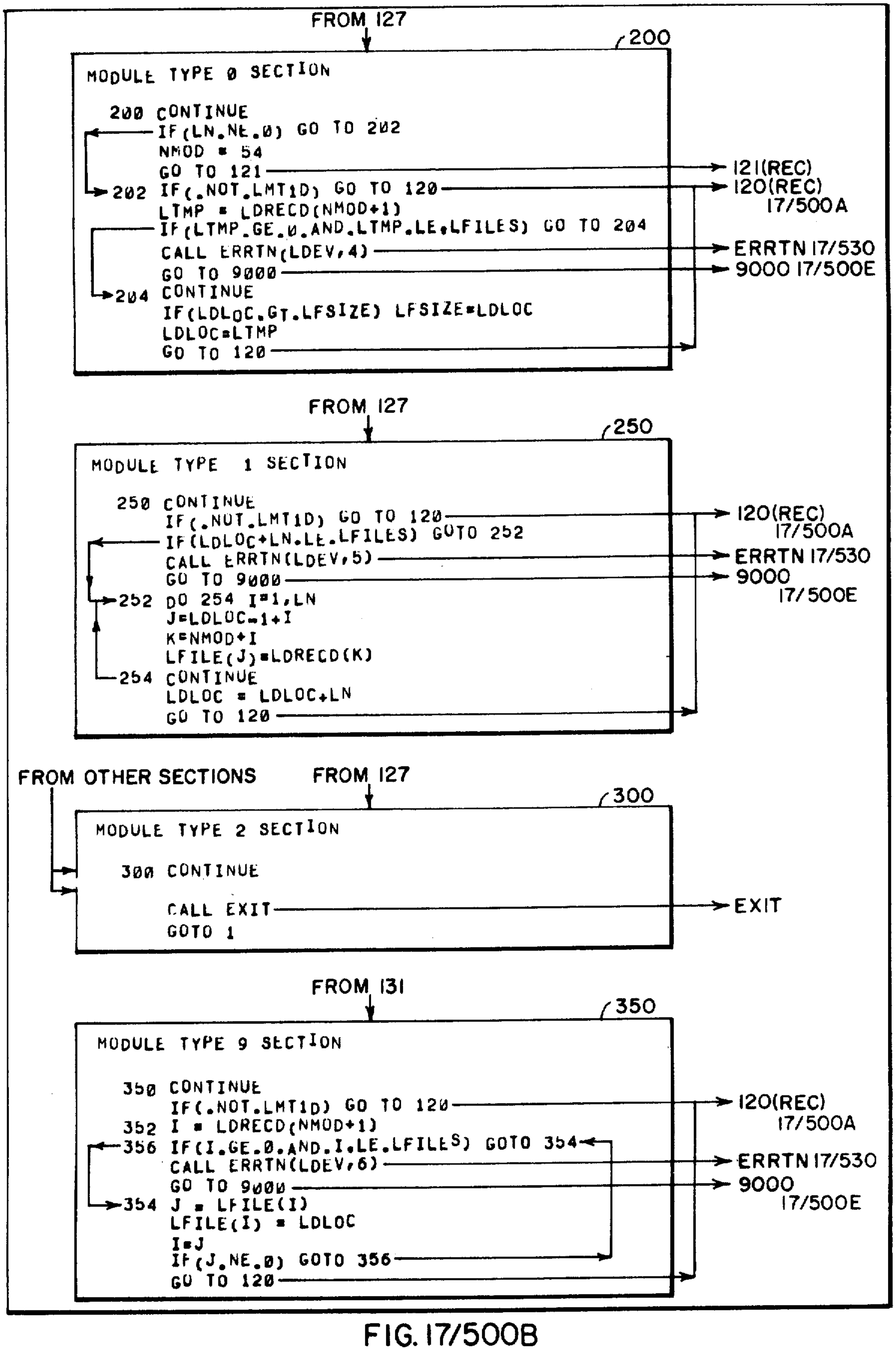
FIG. 17/500B

FROM 133

400

```
      MODULE TYPE 1B SECTION

  400 CONTINUE
      IF(.NOT.LMT1D) GO TO 120
      LMT1D=.FALSE.
      IF(LDLOC.GT.LFSIZE) LFSIZE=LDLOC
      IF(LDELT.LT.0) GO TO 405
      IDTYPE=12
      IF(LVLBIT.NE.0) GO TO 406
      IDTYP=11
      IF(NOTRGS.GT.1) GO TO 420
      GO TO 406
  405 CONTINUE
      IDTYP=-(LDELT+1)
  406 CONTINUE
      CALL  GNFL(IDTYP,NAME,NFILE,LFSIZE,NCVTR,LPERD,LRESD,
     XJTRIGER,LFADR,KER)
      GO TO(415,414,414,414,414,414,414,414,414,414,414) KER
  414 CALL ERRTN(LDEV,KER+10)
      GOTO 9000
  415 CONTINUE
      I=IDTYP+1
      GO TO (449,449,449,449,430,449,449,449,449,449,
     X449,449,416,449,449,449) I
  416 CONTINUE
      CALL LINK(LVLBIT,LFADR(1), LFADR(2),KER)
      GOTO (412,410)KER
  410 CALL ERRTN(LDEV,20)
      GOTO 9000
  412 CONTINUE
      IF(LPERD.LE.0) GO TO 402

      CALL PRLK(LVLBIT,TMBSCC,LPERD,KER)
      GOTO (402,401),KER
  401 CALL ERRTN(LDEV,19)
      GO TO 9000
  402 CONTINUE
      IF(NOTRGS.EQ.0) GOTO 449
      CALL TRICON(LVLBIT,NOTRGS,JTRIGR,NFILE,KER)
      GO TO(404,403,403.403,403,403,403,403,403,403,
     X403,403,403,403,403) KER
  403 CALL ERRTN(LDEV,KER+10)
      GO TO 9000
  404 CONTINUE
  449 CONTINUE
      GO TO 120
  420 CALL ERRTN(LDEV,8)
      GO TO 9000
```

120(REC) 17/500A

GNFIL 17/604A

ERRTN 17/530

430 17/500C CONT.

SUBLINK 17/1012

SYNCLK 17/970

TRICON 17/540

```
430     CONTINUE
        CALL RDFL (NAME,NFILE,KER)                          → RDFIL 17/601
        CALL FLAE(2,NFILE,VALUE,ITABLE)
        I=ITABLE(4)
        GO TO (431,431,449)I                                → 449 17/500C
431     CONTINUE
        I=ITABLE(1)
        CALL FLAE(8,NFILE,VALUE,ITABLE)                     → SFILE 17/1310A
        LDADR=ITABLE(2)*16+ITABLE(3)+LWRD
        CALL ALCN(LFADR(1),LDADR,I,KER)                     → ALMCON 17/1120A
        GO TO (449,432,432)KER
432     CONTINUE
        CALL ERRTN(LDEV.26,NAME)                            → ERRTN 17/530
        GO TO 449
```

Figure 17:
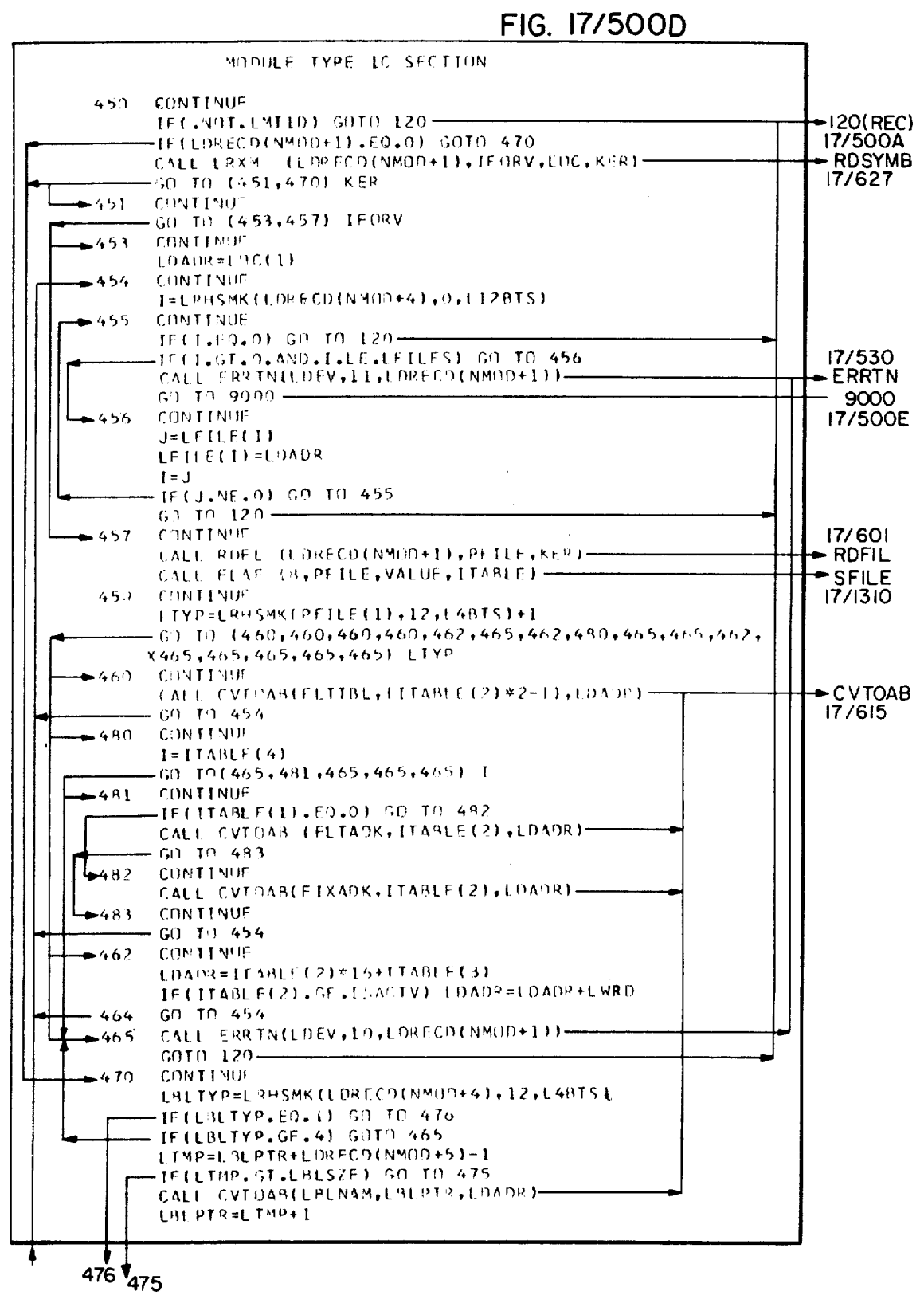

```
                 MODULE TYPE LC SECTION

  450  CONTINUE
       IF(.NOT.LMTID) GOTO 120                                   120(REC) 17/500A
       IF(LDRECD(NMOD+1).EQ.0) GOTO 470
       CALL LRXM  (LDRECD(NMOD+1),IFORV,LOC,KER)                 RDSYMB 17/627
       GO TO (451,470) KER
  451  CONTINUE
       GO TO (453,457) IFORV
  453  CONTINUE
       LDADR=LOC(1)
  454  CONTINUE
       I=LRHSMK(LDRECD(NMOD+4),0,L12BTS)
  455  CONTINUE
       IF(I.EQ.0) GO TO 120
       IF(I.GT.0.AND.I.LE.LFILES) GO TO 456                      17/530
       CALL ERRTN(LDEV,11,LDRECD(NMOD+1))                        ERRTN
       GO TO 9000                                                9000 17/500E
  456  CONTINUE
       J=LFILE(I)
       LFILE(I)=LDADR
       I=J
       IF(J.NE.0) GO TO 455
       GO TO 120
  457  CONTINUE                                                  17/601
       CALL RDFL  (LDRECD(NMOD+1),PFILE,KER)                     RDFIL
       CALL FLAF  (3,PFILE,VALUE,ITABLE)                         SFILE 17/1310
  459  CONTINUE
       LTYP=LRHSMK(PFILE(1),12,L4BTS)+1
       GO TO (460,460,460,460,462,465,462,480,465,465,462,
      X465,465,465,465,465) LTYP
  460  CONTINUE
       CALL CVTOAB(FLTTBL,(ITABLE(2)*2-1),LDADR)                 CVTOAB 17/615
       GO TO 454
  480  CONTINUE
       I=ITABLE(4)
       GO TO(465,481,465,465,465) I
  481  CONTINUE
       IF(ITABLE(1).EQ.0) GO TO 482
       CALL CVTOAB (FLTADK,ITABLE(2),LDADR)
       GO TO 483
  482  CONTINUE
       CALL CVTOAB(FIXADK,ITABLE(2),LDADR)
  483  CONTINUE
       GO TO 454
  462  CONTINUE
       LDADR=ITABLE(2)*16+ITABLE(3)
       IF(ITABLE(2).GE.ISACTV) LDADR=LDADR+LWRD
  464  GO TO 454
  465  CALL ERRTN(LDEV,10,LDRECD(NMOD+1))
       GOTO 120
  470  CONTINUE
       LBLTYP=LRHSMK(LDRECD(NMOD+4),12,L4BTS)
       IF(LBLTYP.EQ.1) GO TO 476
       IF(LBLTYP.GE.4) GOTO 465
       LTMP=LBLPTR+LDRECD(NMOD+5)-1
       IF(LTMP.GT.LBLSZE) GO TO 475
       CALL CVTOAB(LBLNAM,LBLPTR,LDADR)
       LBLPTR=LTMP+1
```

```
 477   CONTINUE
       LOC(1)=LOADR
       LOC(2)=-1
       IF(LDRECD(NMOD+1).EQ.0) GO TO 472
       CALL LWXM (LDRECD(NMOD+1),LOC,1,LOC(2),KER)
       GO TO (472,473,473,473) KER
 476   CONTINUE
       LTMP=IGBREG+LDRECD(NMOD+5)-1
       IF(LTMP.GT.LGBREG) GO TO 475
       LOADR=IGBREG
       IGBREG=LTMP+1
       GO TO 477
 473   CALL ERRTN(LDEV,14,LDRECD(NMOD+1))
       GO TO 9000
 472   CONTINUE
       LMN=LOADR
       MDS=LN-5
       ICS=LDRECD(NMOD+5)-MDS
       IF(MDS.EQ.0) GO TO 474
       DO 471 I=1,MDS
       J=NMOD+5+I
       K=LMN+I-1
       CORE(K)=LDRECD(J)
 471   CONTINUE
       LMN=K+1
 474   CONTINUE
       IF(ICS.EQ.0) GO TO 479
       DO 478 I=1,ICS
       K=LMN+I-1
       CORE(K)=0
 478   CONTINUE
 479   CONTINUE
       GO TO 454
 475   CONTINUE
       IF(LDRECD(NMOD+1)) 4751,4752,4751
 4751  CALL ERRTN(LDEV,9,LDRECD(NMOD+1))
       GOTO 9000
 4752  CALL ERRTN(LDEV,9,NAME)
       GOTO 9000
```

WRSYMB 17/620

17/530 ERRTN 9000 17/500E

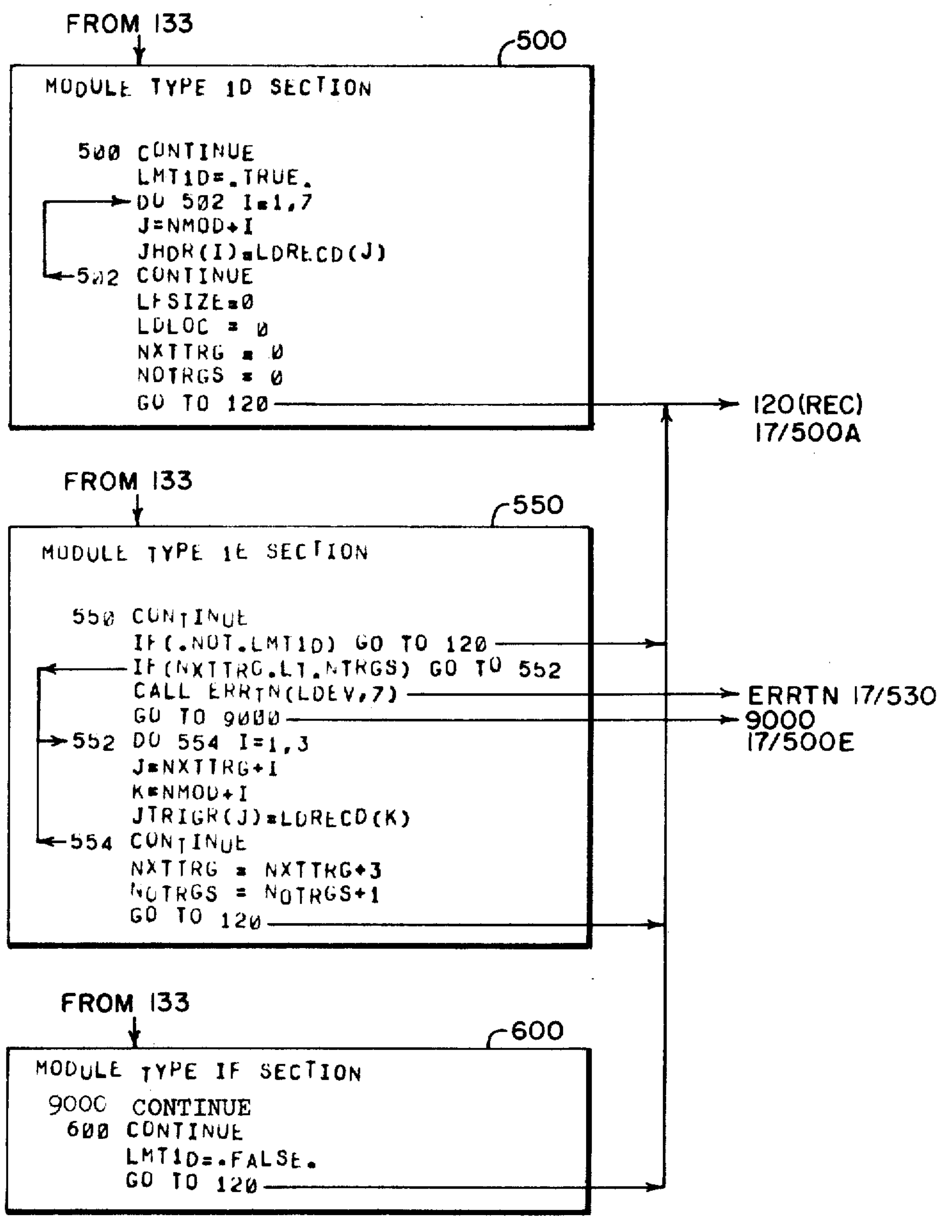
FIG. 17/500E.
| | |
|---|---|
| EQUIVALENCE (NFILE(2), LFILE(1)) | FILE DATA |
| EQUIVALENCE (JHDR(1), LVLBIT, NCVTR) | SUBTASK # |
| EQUIVALENCE (JHDR(2), NAME(1)) | FILE NAME |
| EQUIVALENCE (JHDR(5), LDELT) | FILE TYPE |
| EQUIVALENCE (JHDR(6), LPERD) | BDG. FREQ |
| EQUIVALENCE (JHDR(7), LRESD) | 0=CORE, 1=DISK |
FIG. 17/500F.

```
READAC(IDEV,LDRECD,NSEQ,KER)
      CALL RBINRD (IDEV,LDRECD)
      IF(LDRECD(2).LT.0) GO TO 30
      ISEQ=LRHSMK(LDRECD(2),0,L14BTS)
      IF(NSEQ.LT.0) GO TO 20
      IF(ISEQ.EQ.NSEQ+1) GO TO 20
      KER = 2
      GO TO 50
   20 NSEQ = ISEQ
   30 CONTINUE
      IF(LRHSMK(LDRECD(2),14,L16T).EQ.1) GOTO 40
      IF(LCKSM(LDRECD).EQ.LDRECD(54)) GO TO 40
      KER = 3
      GO TO 50
   40 CONTINUE
      KER = 1
   50 CONTINUE
      RETURN
      END
```

RBINRD 17/520

EXIT

FIG. 17/510

```
           ADL     SAT*
           ADL     DP
RBINRD     LDG     P
           JMP     *$-3
           DAT     1
           LDG     *IDEV
           SST     *M*RD
           STF     DEVBUF
           LDC     =53
           CDR     7
RBIN1      LDA     *DEVBUF-DP,B
           STA     *IRECD-DP,B
           DCR     C
           PJP     RBIN1
           CDR     4
           LDG     *IDEV
           SST     *M*RT
           LDB     1,B
           EST     1,B
DP         DAT     0,0
IDEV       DAT     0
IRECD      DAT     0
DEVBUF     DAT     0
           END
```

ARG, FETCH

READ DATA

TERMINATE READ DATA

FIG. 17/520

```
ERRTN(LDEV,NUM,NAME)

      WRITE(LDEV,100)NUM,NAME
  100 FORMAT(1H ,15HFILE LOAD ERROR,I5,3X,3A2)
      RETURN
      END
```

EXIT

FIG. 17/530

```
TRICON(LTASK,NTRGS,MNETRG,LBUF,IEC)

      DATA L1B/1/
      DATA L4B/$F/
      DATA LTYPE/13/
      DATA LWRD/$8000/
      NXTTRG = 1
      DO 9 I=1,NTRGS
      IF(MNETRG(NXTTRG).NE.0) GO TO 1
      K=NXTTRG+1
      LADDR=MNETRG(K)
      GO TO 7
    1 CONTINUE
      CALL LRXM(MNETRG(NXTTRG),IFORV,LOC,KER)
      GOTO(20,12) KER
   20 GOTO(100,101) IFORV
  100 CONTINUE
      IF(LOC(1).GT.LGBREG) GOTO 13
      LADDR=LOC(1)
      GOTO 7
  101 CONTINUE
      CALL RDFL (MNETRG(NXTTRG),LBUF,JERR)
      GO TO (2,12) JERR
    2 CONTINUE
      LTYP=LRHSMK(LBUF,12,L4B)+1
      GOTO(3,3,3,3,4,13,4,13,13,13,4,13,13,13,13,13) LTYP
    3 CONTINUE
      NFILE=LTASK
      CALL GNFL(LTYPE,0,NFILE,L1B,0,0,1,MNETRG(NXTTRG),LOC,KER)
      GO TO (8,10,10,10,10,10,10,10,10,10,10) KER
    4 CONTINUE
      CALL FLAF(3,LBUF,FVALUE,ITABLE)
      K=ITABLE(4)
      GO TO (5,5,14) K
    5 CONTINUE
      LADDR=ITABLE(2)*16+ITABLE(3)+LWRD
    7 CONTINUE
      CALL TGCN(LTASK,LADDR,KER)
      GO TO (8,15) KER
    8 CONTINUE
      NXTTRG=NXTTRG+3
    9 CONTINUE
      IEC=1
      RETURN
   12 IEC=12
      GOTO 10
   13 IEC=13
      GOTO 10
   14 IEC=14
      GOTO 10
   15 IEC=15
   10 CONTINUE
      CALL ERRTN(LDEV,IEC+10,MNETRG(NXTTRG))
      GOTO 8
      END
```

RDSYMB 17/627

RDFIL 17/601

GNFIL 17/604A

SFILE 17/1310

TGC

EXIT

ERRTN 17/530

FIG. 17/540

Figure 17:
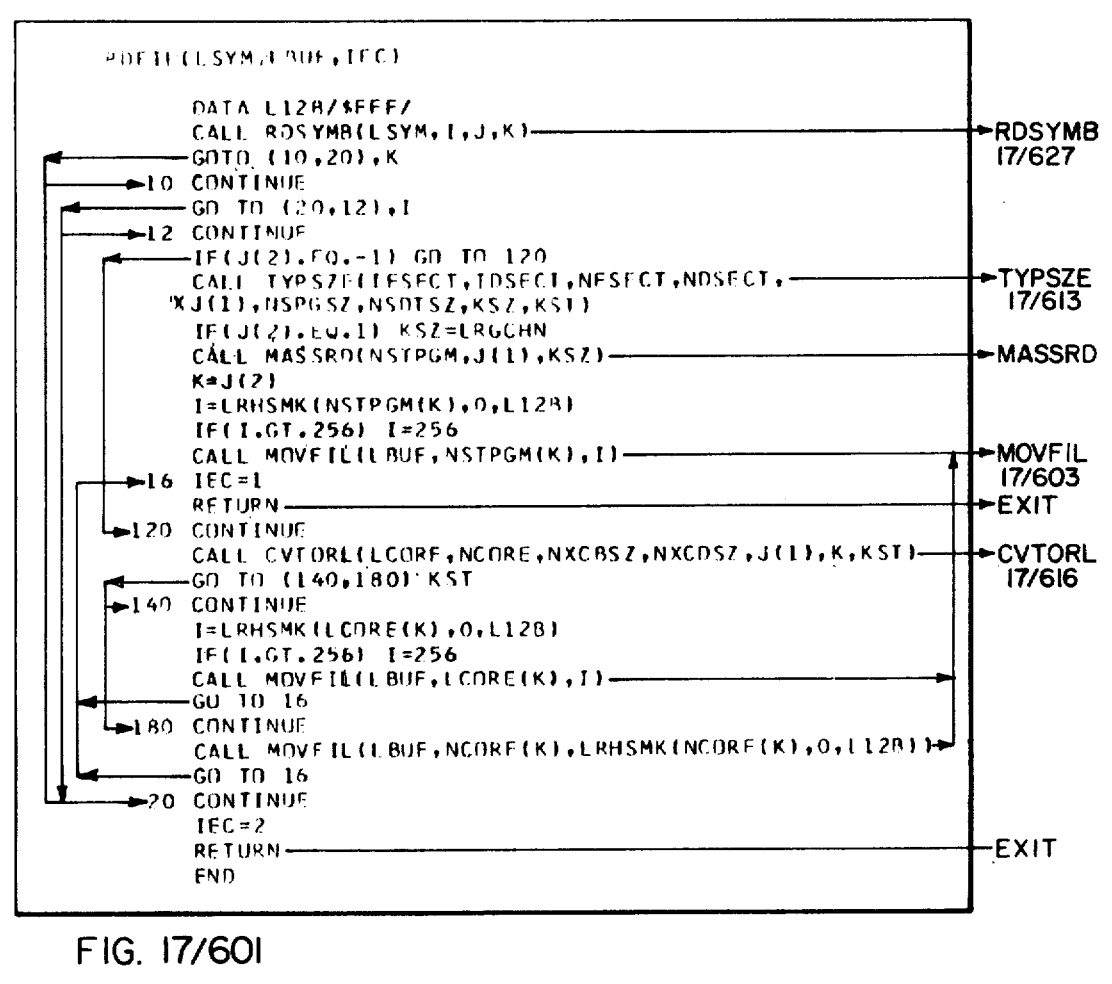

```
RDFILE(LSYM,LBUF,IEC)

      DATA L128/$FFF/
      CALL RDSYMB(LSYM,I,J,K)                                          -> RDSYMB 17/627
      GOTO (10,20),K
   10 CONTINUE
      GO TO (20,12),I
   12 CONTINUE
      IF(J(2).EQ.-1) GO TO 120
      CALL TYPSZE(IFSECT,IDSECT,NFSECT,NDSECT,                         -> TYPSZE 17/613
     XJ(1),NSPGSZ,NSDTSZ,KSZ,KST)
      IF(J(2).EQ.1) KSZ=LRGCHN
      CALL MASSRD(NSTPGM,J(1),KSZ)                                     -> MASSRD
      K=J(2)
      I=LRHSMK(NSTPGM(K),0,L128)
      IF(I.GT.256) I=256
      CALL MOVFIL(LBUF,NSTPGM(K),I)                                    -> MOVFIL 17/603
   16 IEC=1
      RETURN                                                           -> EXIT
  120 CONTINUE
      CALL CVTORL(LCORE,NCORE,NXCBSZ,NXCDSZ,J(1),K,KST)                -> CVTORL 17/616
      GO TO (140,180) KST
  140 CONTINUE
      I=LRHSMK(LCORE(K),0,L128)
      IF(I.GT.256) I=256
      CALL MOVFIL(LBUF,LCORE(K),I)
      GO TO 16
  180 CONTINUE
      CALL MOVFIL(LBUF,NCORE(K),LRHSMK(NCORE(K),0,L128))
      GO TO 16
   20 CONTINUE
      IEC=2
      RETURN                                                           -- EXIT
      END
```

FIG. 17/601

```
WTFIL(LSYM,LBUF,IEC)

      DATA L12B/$FFF/
      CALL RDSYMB(LSYM,I,J,K)                                          RDSYMB 17/627
      GOTO (10,20),K
   10 CONTINUE
      GO TO (20,12) ,I
   12 CONTINUE
      IF(J(2).EQ.-1) GO TO 120
      CALL TYPSZE(IFSECT,IDSECT,NFSECT,NDSECT,                         TYPSZE 17/613
     XJ(1),NSPGSZ,NSDTSZ,KSZ,KST)
      IF(J(2).EQ.1) KSZ=LRGCHN
      CALL MASSRD(NSTPGM,J(1),KSZ)                                     MASSRD
      I=J(2)+1
      CALL MOVFIL(NSTPGM(I),LBUF(2),LRHSMK(NSTPGM(I-1),0,L12B)-1)      MOVFIL 17/603
      KSZ=((LRHSMK(NSTPGM(I-1),0,L12B)-1)/256+1)*256
      CALL MASSWT(NSTPGM,J(1),KSZ)                                     MASSWT
   16 IEC=1
      RETURN                                                           EXIT
  120 CONTINUE
      CALL CVTORL(LCORE,NCORE,NXCBSZ,NXCDSZ,J(1),K,KST)                CVTORL 17/616
      GO TO (140,180) KST
  140 CONTINUE
      CALL MOVFIL(LCORE(K+1),LBUF(2),LRHSMK(LCORE(K),0,L12B)-1)
      GO TO 16
  180 CONTINUE
      CALL MOVFIL(NCORE(K+1),LBUF(2),LRHSMK(NCORE(K),0,L12B)-1)
      GO TO 16
   20 CONTINUE
      IEC=2
      RETURN                                                           EXIT
      END
```

FIG. 17/602

```
MOVFIL(LA,LB,NUM)

      IF(NUM.EQ.0) GO TO 100
      DO 10 I=1,NUM
      LA(I)=LB(I)
   10 CONTINUE
  100 CONTINUE
      RETURN                                                           EXIT
      END
```

FIG. 17/603

Figure 17:
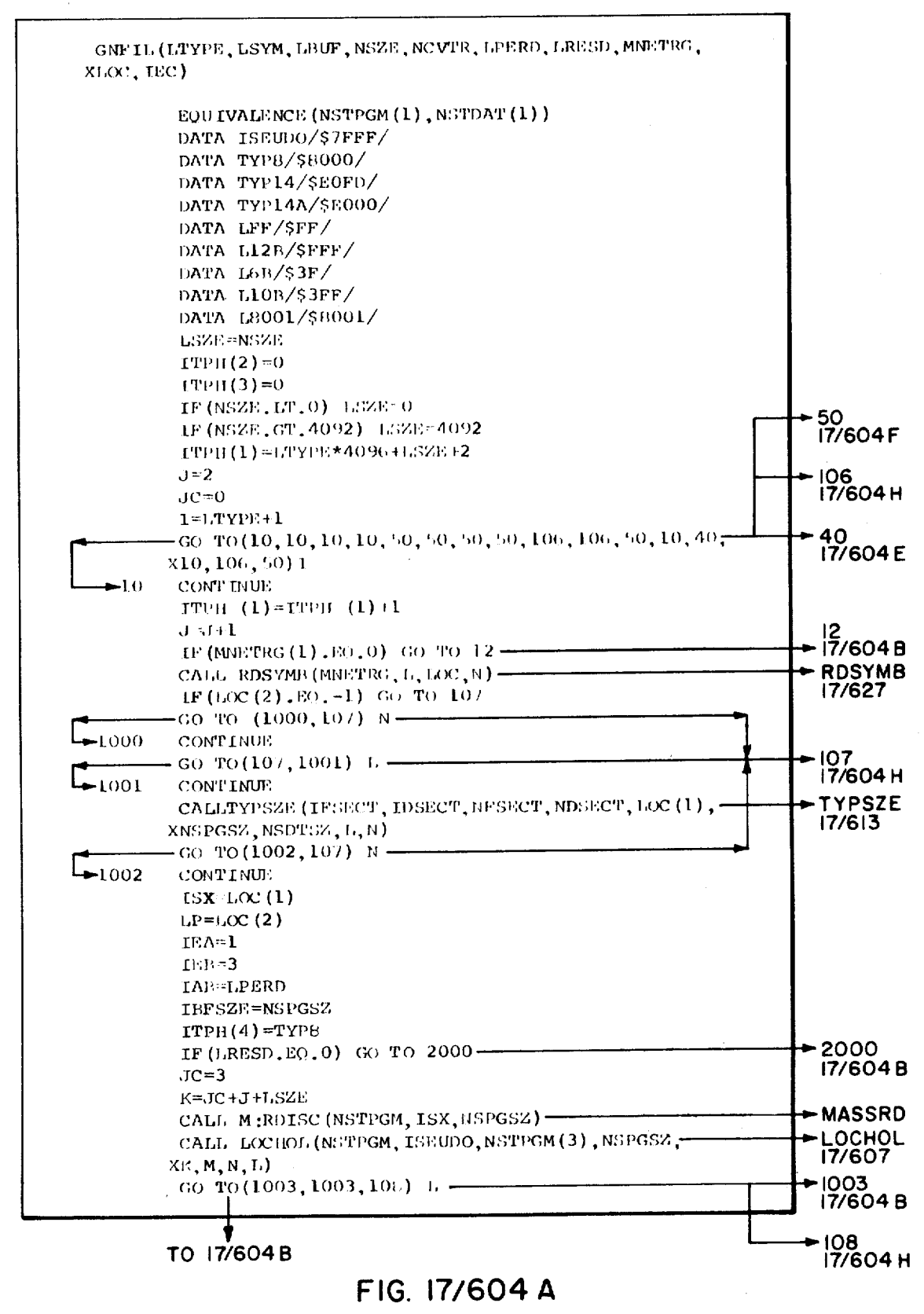

```
 GNFIL(LTYPE,LSYM,LBUF,NSZE,NCVTR,LPERD,LRESD,MNETRG,
XLOC,IEC)

       EQUIVALENCE(NSTPGM(1),NSTDAT(1))
       DATA ISEUDO/$7FFF/
       DATA TYP8/$8000/
       DATA TYP14/$E0FD/
       DATA TYP14A/$E000/
       DATA LFF/$FF/
       DATA L12B/$FFF/
       DATA L6B/$3F/
       DATA L10B/$3FF/
       DATA L8001/$8001/
       LSZE=NSZE
       ITPH(2)=0
       ITPH(3)=0
       IF(NSZE.LT.0) LSZE=0
       IF(NSZE.GT.4092) LSZE=4092                          --> 50 17/604F
       ITPH(1)=LTYPE*4096+LSZE+2
       J=2                                                 --> 106 17/604H
       JC=0
       I=LTYPE+1
       GO TO(10,10,10,10,50,50,50,50,106,106,50,10,40,     --> 40 17/604E
XI0,106,50)I
  10   CONTINUE
       ITPH (1)=ITPH (1)+1
       J=J+1
       IF(MNETRG(1).EQ.0) GO TO 12                         --> 12 17/604B
       CALL RDSYMB(MNETRG,L,LOC,N)                         --> RDSYMB 17/627
       IF(LOC(2).EQ.-1) GO TO 107
       GO TO (1000,107) N
  1000 CONTINUE
       GO TO(107,1001) L                                   --> 107 17/604H
  1001 CONTINUE
       CALLTYPSZE(IFSECT,IDSECT,NFSECT,NDSECT,LOC(1),      --> TYPSZE 17/613
XNSPGSZ,NSDTSZ,L,N)
       GO TO(1002,107) N
  1002 CONTINUE
       ISX=LOC(1)
       LP=LOC(2)
       IEA=1
       IEB=3
       IAB=LPERD
       IBFSZE=NSPGSZ
       ITPH(4)=TYP8
       IF(LRESD.EQ.0) GO TO 2000                           --> 2000 17/604B
       JC=3
       K=JC+J+LSZE
       CALL M:RDISC(NSTPGM,ISX,NSPGSZ)                     --> MASSRD
       CALL LOCHOL(NSTPGM,ISEUDO,NSTPGM(3),NSPGSZ,         --> LOCHOL 17/607
XK,M,N,L)
       GO TO(1003,1003,108) L                              --> 1003 17/604B
                                                           --> 108 17/604H
```

Figure 17:
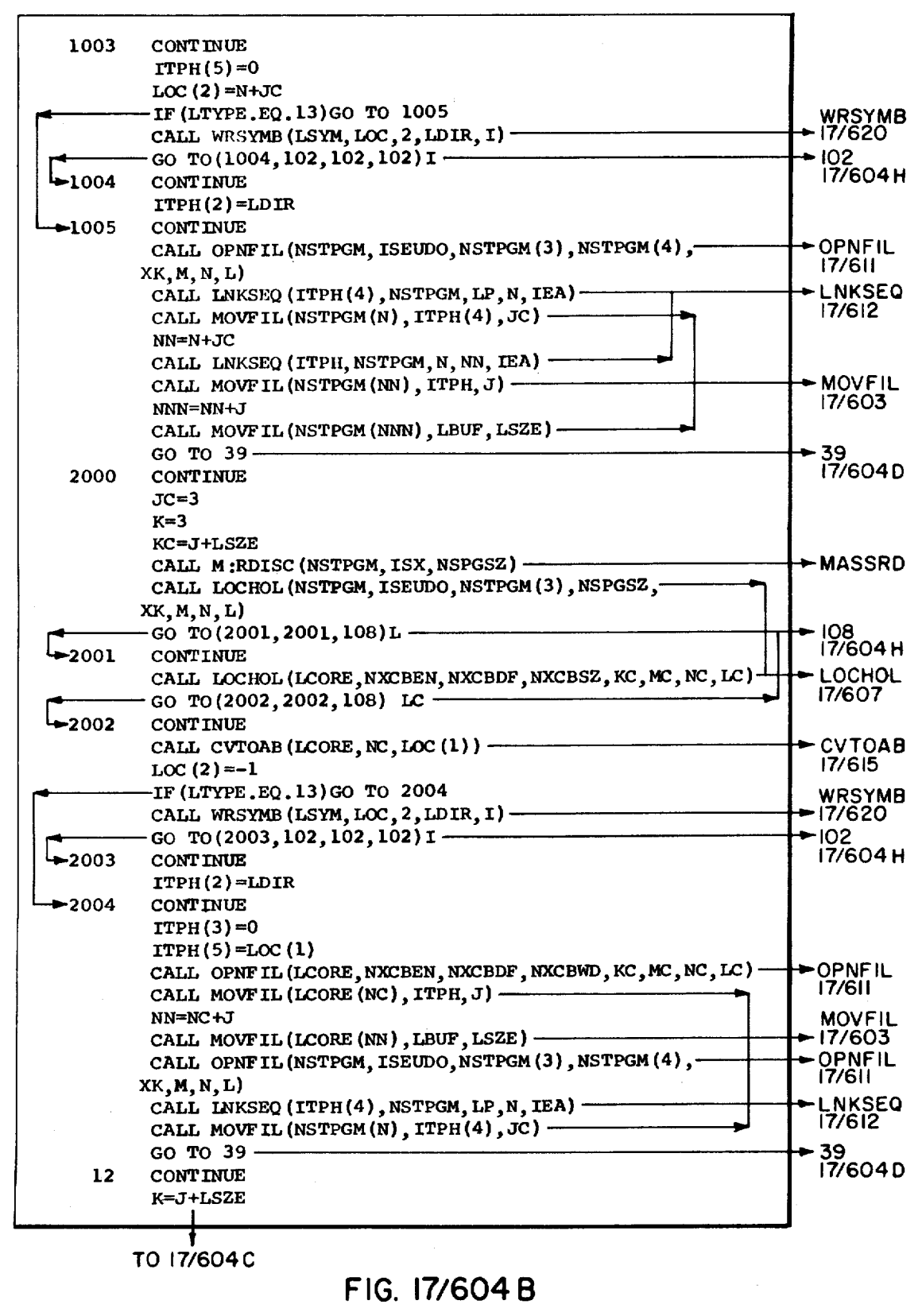

```
1003   CONTINUE
       ITPH(5)=0
       LOC(2)=N+JC
       IF(LTYPE.EQ.13)GO TO 1005
       CALL WRSYMB(LSYM,LOC,2,LDIR,I)                          WRSYMB 17/620
       GO TO(1004,102,102,102)I                                102 17/604H
1004   CONTINUE
       ITPH(2)=LDIR
1005   CONTINUE
       CALL OPNFIL(NSTPGM,ISEUDO,NSTPGM(3),NSTPGM(4),          OPNFIL 17/611
      XK,M,N,L)
       CALL LNKSEQ(ITPH(4),NSTPGM,LP,N,IEA)                    LNKSEQ 17/612
       CALL MOVFIL(NSTPGM(N),ITPH(4),JC)
       NN=N+JC
       CALL LNKSEQ(ITPH,NSTPGM,N,NN,IEA)
       CALL MOVFIL(NSTPGM(NN),ITPH,J)                          MOVFIL 17/603
       NNN=NN+J
       CALL MOVFIL(NSTPGM(NNN),LBUF,LSZE)
       GO TO 39                                                39 17/604D
2000   CONTINUE
       JC=3
       K=3
       KC=J+LSZE
       CALL M:RDISC(NSTPGM,ISX,NSPGSZ)                         MASSRD
       CALL LOCHOL(NSTPGM,ISEUDO,NSTPGM(3),NSPGSZ,
      XK,M,N,L)
       GO TO(2001,2001,108)L                                   108 17/604H
2001   CONTINUE
       CALL LOCHOL(LCORE,NXCBEN,NXCBDF,NXCBSZ,KC,MC,NC,LC)     LOCHOL 17/607
       GO TO(2002,2002,108) LC
2002   CONTINUE
       CALL CVTOAB(LCORE,NC,LOC(1))                            CVTOAB 17/615
       LOC(2)=-1
       IF(LTYPE.EQ.13)GO TO 2004
       CALL WRSYMB(LSYM,LOC,2,LDIR,I)                          WRSYMB 17/620
       GO TO(2003,102,102,102)I                                102 17/604H
2003   CONTINUE
       ITPH(2)=LDIR
2004   CONTINUE
       ITPH(3)=0
       ITPH(5)=LOC(1)
       CALL OPNFIL(LCORE,NXCBEN,NXCBDF,NXCBWD,KC,MC,NC,LC)     OPNFIL 17/611
       CALL MOVFIL(LCORE(NC),ITPH,J)
       NN=NC+J
       CALL MOVFIL(LCORE(NN),LBUF,LSZE)                        MOVFIL 17/603
       CALL OPNFIL(NSTPGM,ISEUDO,NSTPGM(3),NSTPGM(4),          OPNFIL 17/611
      XK,M,N,L)
       CALL LNKSEQ(ITPH(4),NSTPGM,LP,N,IEA)                    LNKSEQ 17/612
       CALL MOVFIL(NSTPGM(N),ITPH(4),JC)
       GO TO 39                                                39 17/604D
12     CONTINUE
       K=J+LSZE
```

Figure 17:
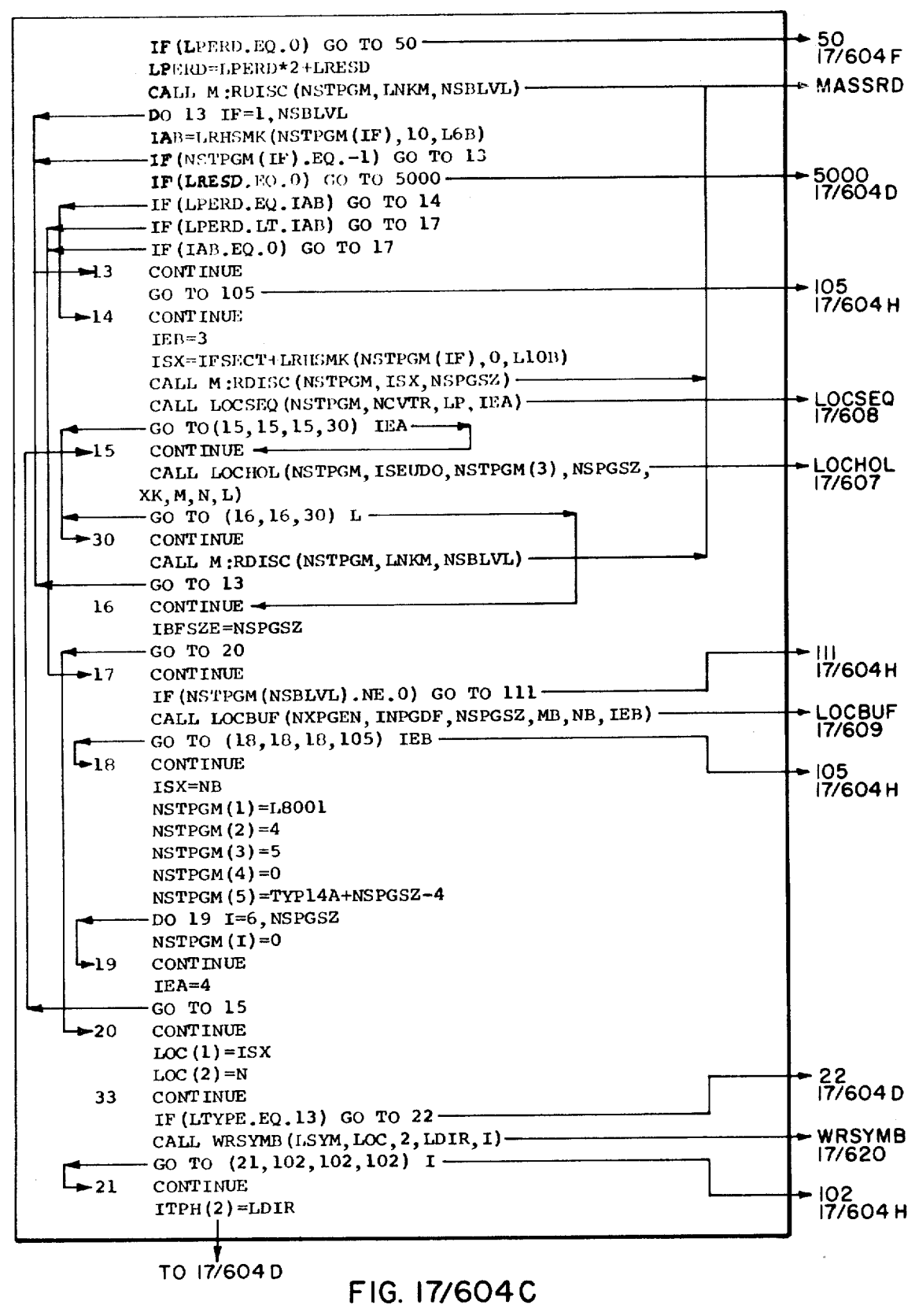

```
      IF(LPERD.EQ.0) GO TO 50
      LPERD=LPERD*2+LRESD
      CALL M:RDISC(NSTPGM,LNKM,NSBLVL)
      DO 13 IF=1,NSBLVL
      IAB=LRHSMK(NSTPGM(IF),10,L6B)
      IF(NSTPGM(IF).EQ.-1) GO TO 13
      IF(LRESD.EQ.0) GO TO 5000
      IF(LPERD.EQ.IAB) GO TO 14
      IF(LPERD.LT.IAB) GO TO 17
      IF(IAB.EQ.0) GO TO 17
   13 CONTINUE
      GO TO 105
   14 CONTINUE
      IEB=3
      ISX=IFSECT+LRHSMK(NSTPGM(IF),0,L10B)
      CALL M:RDISC(NSTPGM,ISX,NSPGSZ)
      CALL LOCSEQ(NSTPGM,NCVTR,LP,IEA)
      GO TO(15,15,15,30) IEA
   15 CONTINUE
      CALL LOCHOL(NSTPGM,ISEUDO,NSTPGM(3),NSPGSZ,
     XK,M,N,L)
      GO TO (16,16,30) L
   30 CONTINUE
      CALL M:RDISC(NSTPGM,LNKM,NSBLVL)
      GO TO 13
   16 CONTINUE
      IBFSZE=NSPGSZ
      GO TO 20
   17 CONTINUE
      IF(NSTPGM(NSBLVL).NE.0) GO TO 111
      CALL LOCBUF(NXPGEN,INPGDF,NSPGSZ,MB,NB,IEB)
      GO TO (18,18,18,105) IEB
   18 CONTINUE
      ISX=NB
      NSTPGM(1)=L8001
      NSTPGM(2)=4
      NSTPGM(3)=5
      NSTPGM(4)=0
      NSTPGM(5)=TYP14A+NSPGSZ-4
      DO 19 I=6,NSPGSZ
      NSTPGM(I)=0
   19 CONTINUE
      IEA=4
      GO TO 15
   20 CONTINUE
      LOC(1)=ISX
      LOC(2)=N
   33 CONTINUE
      IF(LTYPE.EQ.13) GO TO 22
      CALL WRSYMB(LSYM,LOC,2,LDIR,I)
      GO TO (21,102,102,102) I
   21 CONTINUE
      ITPH(2)=LDIR
```

50 17/604F

MASSRD 5000 17/604D 105 17/604H

LOCSEQ 17/608

LOCHOL 17/607

111 17/604H

LOCBUF 17/609

105 17/604H 22 17/604D

WRSYMB 17/620

```
  22    CONTINUE
        CALL OPNFIL(NSTPGM,ISEUDO,NSTPGM(3),NSTPGM(4),
       XK,M,N,L)
        CALL LNKSEQ(ITPH,NSTPGM,LP,N,IEA)
        CALL OPNBUF(NXPGEN,INPGDF,IBFSZE,MB,NB,IEB)
        CALL MOVFIL(NSTPGM(N),ITPH,J)
        NN=N+J
        CALL MOVFIL(NSTPGM(NN),LBUF,LSZE)
  39    CONTINUE
        CALL M;WDISC(NSTPGM,ISX,IBFSZE)
        GO TO 415
5000    CONTINUE
        IF(LPERD.EQ.IAB)GO TO 5014
        IF(LPERD.LT.IAB)GO TO 5017
        IF(IAB.EQ.0)GO TO 5017
        GO TO 13
5014    CONTINUE
        LVLBIT=ITASK*4096+(NSBLVL-IF)
        CALL SLOC(LVLBIT,LOC(1),LOC(2),KER)
        GO TO (5031,110,110)KER
5031    CONTINUE
        IF(LOC(2).NE.0)GO TO 13
        CALL CVTORL(LCORE,NCORE,NXCBSZ,NXCDSZ,LOC(1),
       XLOC(1),KST)
        GO TO (5032,110) KST
5032    CONTINUE
        LA=LOC(1)
        CALL LOCSEQ(LCORE(LA),NCVTR,LP,IEA)
        GO TO (5015,5015,5015,13)IEA
5015    CONTINUE
        CALL LOCHOL (LCORE,NXCBEN,NXCBDF,NXCBSZ,K,M,N,L)
        GO TO(5016,5016,13)L
5016    CONTINUE
        CALL CVTOAB (LCORE,N,LOC(1))
        GO TO 5020
5017    CONTINUE
        K=K+2
        CALL LOCHOL (LCORE,NXCBEN,NXCBDF,NXCBSZ,
       XK,M,N,L)
        GO TO (5018,5018,105)L
5018    CONTINUE
        LCORE(N)=L8001
        LCORE(N+1)=2
        IEA=4
        CALL CVTOAB (LCORE,N,NSTPGM)
        N=N+2
        GO TO 5016
5020    CONTINUE
        LOC(2)=-1
        IBFSZE=0
        IF(LTYPE.EQ.13)GO TO 5022
        CALL WRSYMB(LSYM,LOC,2,IDIR,I)
        GO TO (5021,102,102,102)I
```

OPNFIL 17/611
LNKSEQ 17/612
OPNBUF 17/616
MOVFIL 17/603
MASSWT
415 17/604 E
13 17/604 C
SUBLOC 17/1011
CVTORL 17/616
110 17/604 H
LOCSEQ 17/608
LOCHOL 17/607
CVTOAB 17/615
105 17/604 H
5022 17/604 E
WRSYMB 17/620
102 17/604 H

Figure 17:
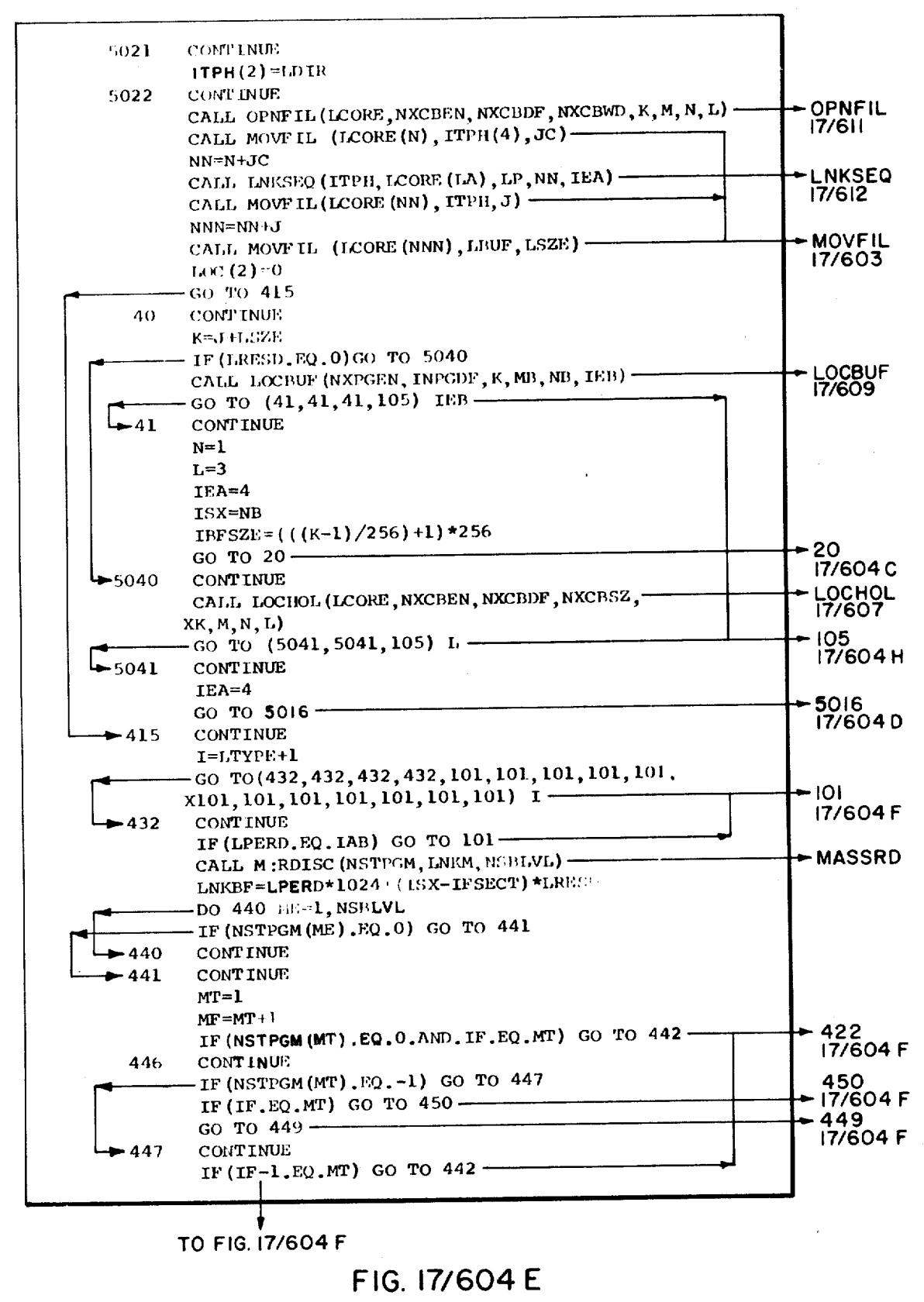

```
5021    CONTINUE
        ITPH(2)=LDIR
5022    CONTINUE
        CALL OPNFIL(LCORE,NXCBEN,NXCBDF,NXCBWD,K,M,N,L)      --> OPNFIL 17/611
        CALL MOVFIL (LCORE(N),ITPH(4),JC)
        NN=N+JC
        CALL LNKSEQ(ITPH,LCORE(LA),LP,NN,IEA)                --> LNKSEQ 17/612
        CALL MOVFIL(LCORE(NN),ITPH,J)
        NNN=NN+J
        CALL MOVFIL (LCORE(NNN),LBUF,LSZE)                   --> MOVFIL 17/603
        LOC(2)=0
        GO TO 415
  40    CONTINUE
        K=J+LSZE
        IF(LRESD.EQ.0)GO TO 5040
        CALL LOCBUF(NXPGEN,INPGDF,K,MB,NB,IEB)               --> LOCBUF 17/609
        GO TO (41,41,41,105) IEB
  41    CONTINUE
        N=1
        L=3
        IEA=4
        ISX=NB
        IBFSZE=(((K-1)/256)+1)*256
        GO TO 20                                             --> 20 17/604 C
5040    CONTINUE
        CALL LOCHOL(LCORE,NXCBEN,NXCBDF,NXCBSZ,              --> LOCHOL 17/607
       XK,M,N,L)
        GO TO (5041,5041,105) L                              --> 105 17/604 H
5041    CONTINUE
        IEA=4
        GO TO 5016                                           --> 5016 17/604 D
 415    CONTINUE
        I=LTYPE+1
        GO TO(432,432,432,432,101,101,101,101,101,
       X101,101,101,101,101,101,101) I                       --> 101 17/604 F
 432    CONTINUE
        IF(LPERD.EQ.IAB) GO TO 101
        CALL M:RDISC(NSTPGM,LNKM,NSBLVL)                     --> MASSRD
        LNKBF=LPERD*1024+(ISX-IFSECT)*LRESD
        DO 440 ME=1,NSBLVL
        IF(NSTPGM(ME).EQ.0) GO TO 441
 440    CONTINUE
 441    CONTINUE
        MT=1
        MF=MT+1
        IF(NSTPGM(MT).EQ.0.AND.IF.EQ.MT) GO TO 442           --> 422 17/604 F
 446    CONTINUE
        IF(NSTPGM(MT).EQ.-1) GO TO 447
        IF(IF.EQ.MT) GO TO 450                               --> 450 17/604 F
        GO TO 449                                            --> 449 17/604 F
 447    CONTINUE
        IF(IF-1.EQ.MT) GO TO 442
```

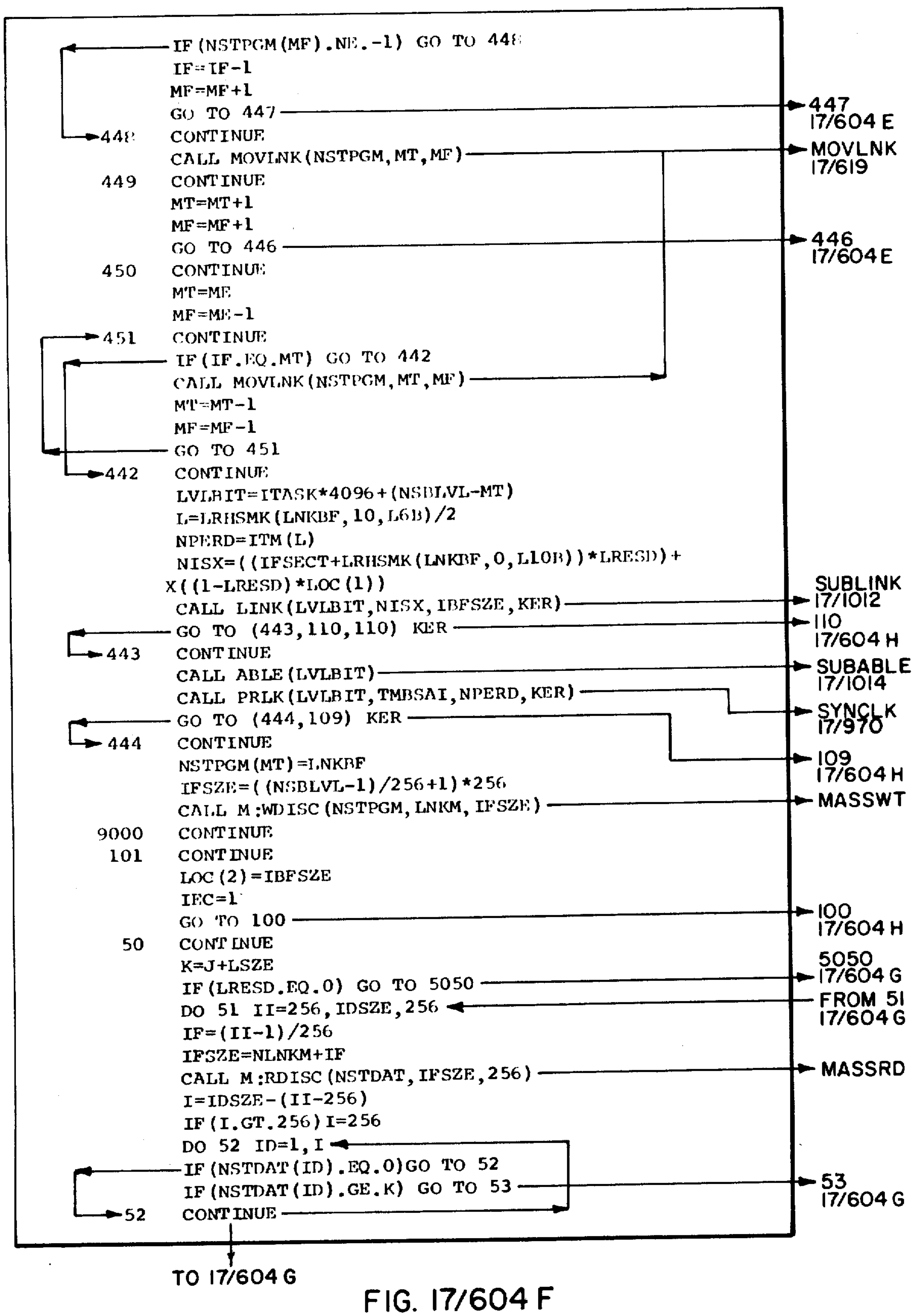
FIG. 17/604 F

Figure 17:
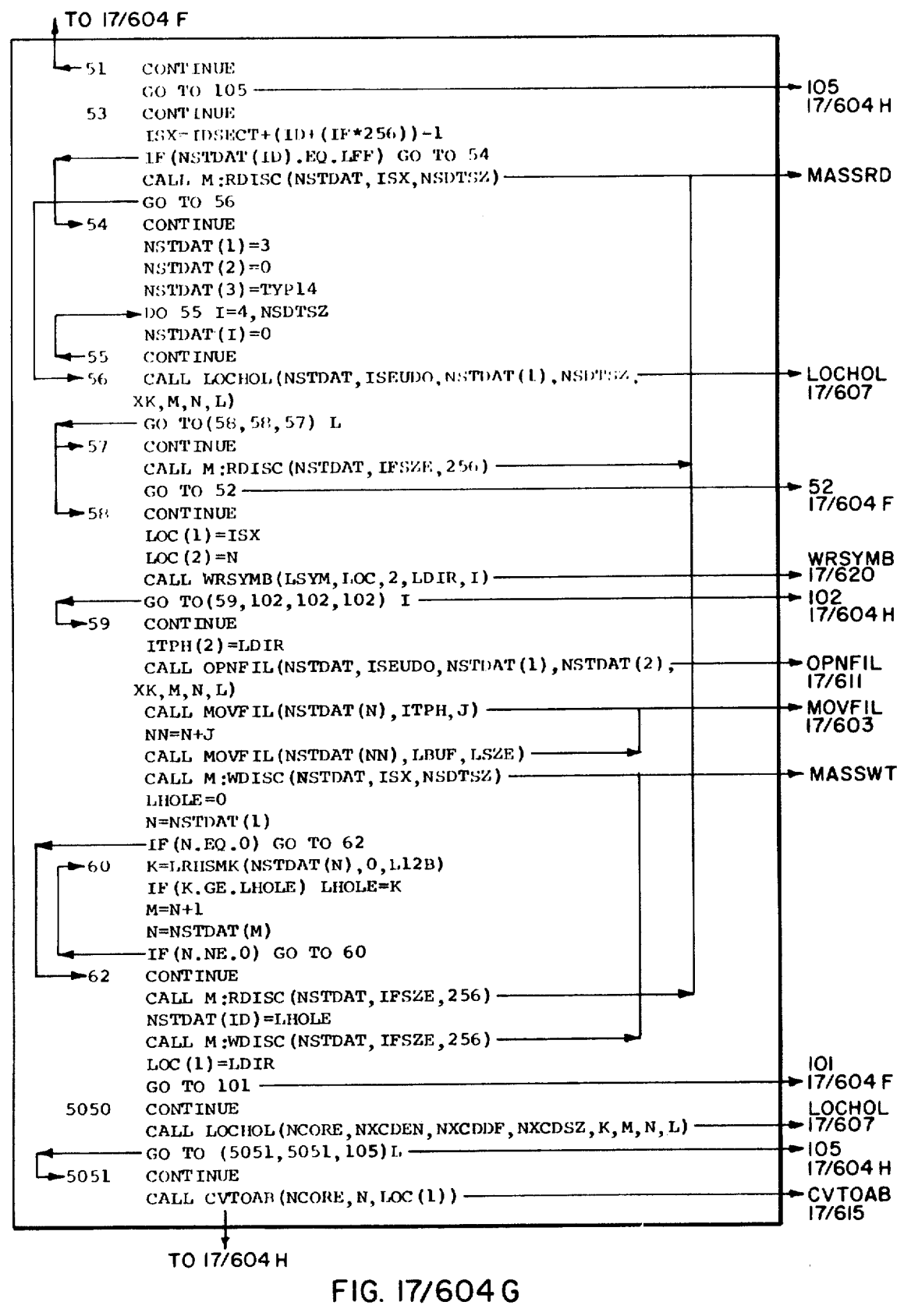

TO 17/604 F

```
 51     CONTINUE
        GO TO 105
 53     CONTINUE
        ISX=IDSECT+(ID+(IF*256))-1
        IF(NSTDAT(ID).EQ.LFF) GO TO 54
        CALL M:RDISC(NSTDAT,ISX,NSDTSZ)
        GO TO 56
 54     CONTINUE
        NSTDAT(1)=3
        NSTDAT(2)=0
        NSTDAT(3)=TYP14
        DO 55 I=4,NSDTSZ
        NSTDAT(I)=0
 55     CONTINUE
 56     CALL LOCHOL(NSTDAT,ISEUDO,NSTDAT(1),NSDTSZ,
       XK,M,N,L)
        GO TO(58,58,57) L
 57     CONTINUE
        CALL M:RDISC(NSTDAT,IFSZE,256)
        GO TO 52
 58     CONTINUE
        LOC(1)=ISX
        LOC(2)=N
        CALL WRSYMB(LSYM,LOC,2,LDIR,I)
        GO TO(59,102,102,102) I
 59     CONTINUE
        ITPH(2)=LDIR
        CALL OPNFIL(NSTDAT,ISEUDO,NSTDAT(1),NSTDAT(2),
       XK,M,N,L)
        CALL MOVFIL(NSTDAT(N),ITPH,J)
        NN=N+J
        CALL MOVFIL(NSTDAT(NN),LBUF,LSZE)
        CALL M:WDISC(NSTDAT,ISX,NSDTSZ)
        LHOLE=0
        N=NSTDAT(1)
        IF(N.EQ.0) GO TO 62
 60     K=LRHSMK(NSTDAT(N),0,L12B)
        IF(K.GE.LHOLE) LHOLE=K
        M=N+1
        N=NSTDAT(M)
        IF(N.NE.0) GO TO 60
 62     CONTINUE
        CALL M:RDISC(NSTDAT,IFSZE,256)
        NSTDAT(ID)=LHOLE
        CALL M:WDISC(NSTDAT,IFSZE,256)
        LOC(1)=LDIR
        GO TO 101
 5050   CONTINUE
        CALL LOCHOL(NCORE,NXCDEN,NXCDDF,NXCDSZ,K,M,N,L)
        GO TO (5051,5051,105)L
 5051   CONTINUE
        CALL CVTOAB(NCORE,N,LOC(1))
```

105 17/604 H

MASSRD

LOCHOL 17/607

52 17/604 F

WRSYMB 17/620

102 17/604 H

OPNFIL 17/611

MOVFIL 17/603

MASSWT 101 17/604 F

LOCHOL 17/607

105 17/604 H

CVTOAB 17/615

```
            LOC(2)=-1
            CALL WRSYMB(LSYM,LOC,2,LDIR,I)                      → WRSYMB 17/620
            GO TO (5052,102,102,102) I
      5052  CONTINUE
            ITPH(2)=LDIR
            CALL OPNFIL(NCORE,NXCBEN,NXCDDF,NXCDWD,K,M,N,L)     → OPNFIL 17/611
            CALL MOVFIL(NCORE(N),ITPH,J)
            NN=N+J
            CALL MOVFIL(NCORE(NN),LBUF,LSZE)                    → MOVFIL 17/603
            LOC(1)=LDIR
            GO TO 101                                           → 101 17/604F
       102  IEC=I
            GO TO 100
       105  IEC=5
            GO TO 100
       106  IEC=6
            GO TO 100
       107  IEC=7
            GO TO 100
       108  IEC=8
            GO TO 100
       109  IEC=9
            GO TO 100
       110  IEC=10
            GO TO 100
       111  IEC=11
       100  RETURN                                              → EXIT
            END
```

FIG. 17/604 H

```
      CLSFIL(NST,INDF,IDX)

            DATA L12B,TYP14/$FFF,$E000/
            NST(IDX+1)=INDF
            NST(IDX)=TYP14+LRHSMK(NST(IDX),0,L12B)
            INDF=IDX
            RETURN                                              → EXIT
            END
```

FIG. 17/605

Figure 17:
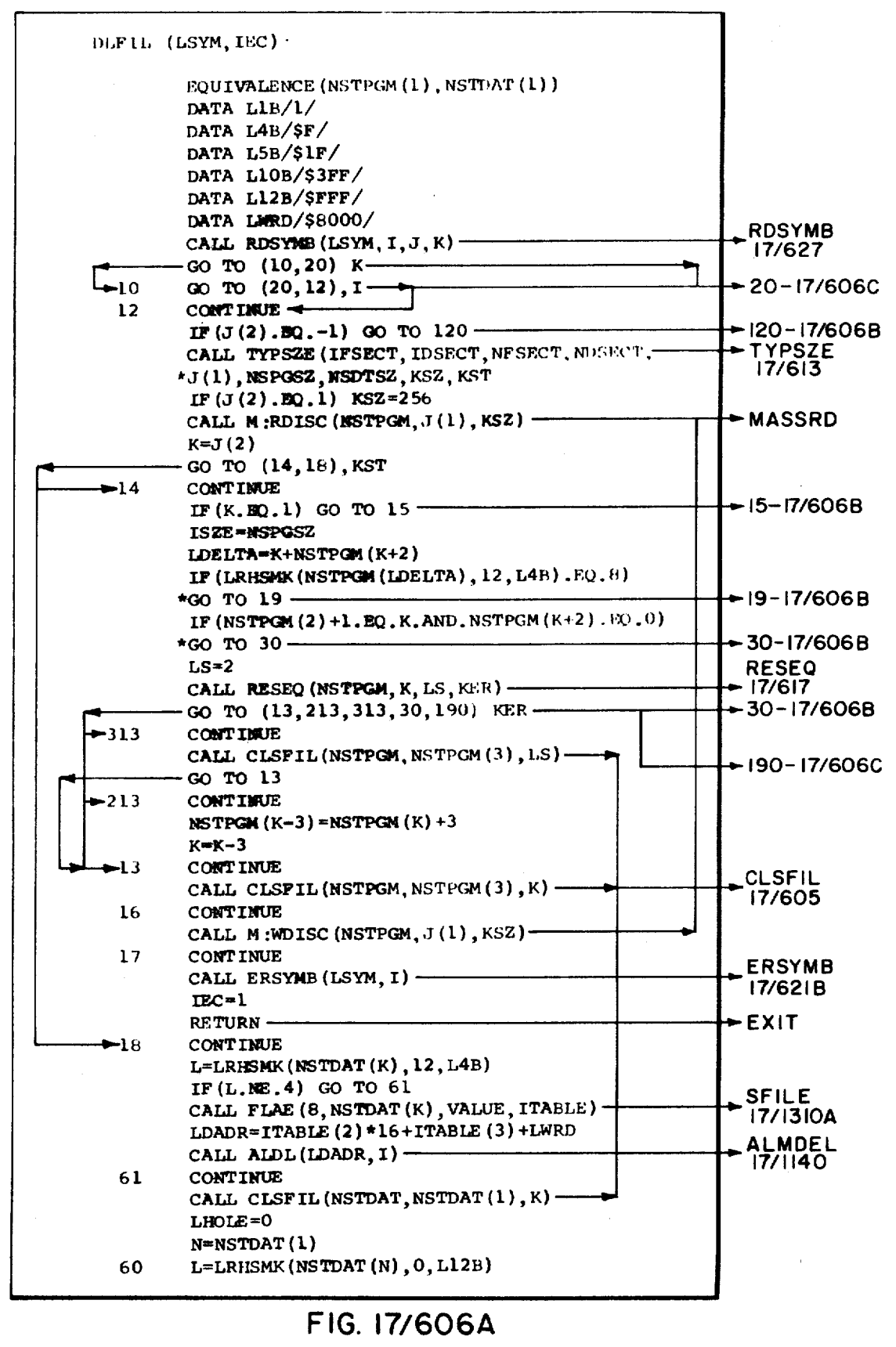

```
DLFIL (LSYM,IEC)

        EQUIVALENCE(NSTPGM(1),NSTDAT(1))
        DATA L1B/1/
        DATA L4B/$F/
        DATA L5B/$1F/
        DATA L10B/$3FF/
        DATA L12B/$FFF/
        DATA LWRD/$8000/
        CALL RDSYMB(LSYM,I,J,K)                      → RDSYMB 17/627
        GO TO (10,20) K
  10    GO TO (20,12),I                              → 20-17/606C
  12    CONTINUE
        IF(J(2).EQ.-1) GO TO 120                     → 120-17/606B
        CALL TYPSZE(IFSECT,IDSECT,NFSECT,NDSECT,     → TYPSZE 17/613
       *J(1),NSPGSZ,NSDTSZ,KSZ,KST
        IF(J(2).EQ.1) KSZ=256
        CALL M:RDISC(NSTPGM,J(1),KSZ)                → MASSRD
        K=J(2)
        GO TO (14,18),KST
  14    CONTINUE
        IF(K.EQ.1) GO TO 15                          → 15-17/606B
        ISZE=NSPGSZ
        LDELTA=K+NSTPGM(K+2)
        IF(LRHSMK(NSTPGM(LDELTA),12,L4B).EQ.8)
       *GO TO 19                                     → 19-17/606B
        IF(NSTPGM(2)+1.EQ.K.AND.NSTPGM(K+2).EQ.0)
       *GO TO 30                                     → 30-17/606B
        LS=2
        CALL RESEQ(NSTPGM,K,LS,KER)                  → RESEQ 17/617
        GO TO (13,213,313,30,190) KER                → 30-17/606B
 313    CONTINUE                                     → 190-17/606C
        CALL CLSFIL(NSTPGM,NSTPGM(3),LS)
        GO TO 13
 213    CONTINUE
        NSTPGM(K-3)=NSTPGM(K)+3
        K=K-3
  13    CONTINUE
        CALL CLSFIL(NSTPGM,NSTPGM(3),K)              → CLSFIL 17/605
  16    CONTINUE
        CALL M:WDISC(NSTPGM,J(1),KSZ)
  17    CONTINUE
        CALL ERSYMB(LSYM,I)                          → ERSYMB 17/621B
        IEC=1
        RETURN                                       → EXIT
  18    CONTINUE
        L=LRHSMK(NSTDAT(K),12,L4B)
        IF(L.NE.4) GO TO 61
        CALL FLAE(8,NSTDAT(K),VALUE,ITABLE)          → SFILE 17/1310A
        LDADR=ITABLE(2)*16+ITABLE(3)+LWRD
        CALL ALDL(LDADR,I)                           → ALMDEL 17/1140
  61    CONTINUE
        CALL CLSFIL(NSTDAT,NSTDAT(1),K)
        LHOLE=0
        N=NSTDAT(1)
  60    L=LRHSMK(NSTDAT(N),0,L12B)
```

FIG. 17/606A

```
      IF(L.GE.LHOLE) LHOLE=L
      M=N+1
      N=NSTDAT(M)
      IF(N.NE.0) GO TO 60                          60-17/606A
      CALL M:WDISC(NSTDAT,J(1),KSZ)                MASSWT
      M=J(1)-IDSECT
      L=M/256
      I=NLNKM+L
      ID=M-L*256+1
      CALL M:RDISC(NSTDAT,I,256)                   MASSRD
      NSTDAT(ID)=LHOLE
      CALL M:WDISC(NSTDAT,I,256)
      GO TO 17                                     17-17/606A
15    CONTINUE
      ISZE=((LRHSMK(NSTPGM,0,L12B)-1)/256+1)*256
      CALL DLELNK(NSTPGM(4),TMBSCC,NSTPGM(5))      DLELNK 17/618
      CALL CLSBUF(NSTPGM,INPGDF,ISZE,J(1))
      GO TO 17
30    CONTINUE
      CALL CLSBUF(NSTPGM,INPGDF,ISZE,J(1))         CLSBUF 17/614
      J(1)=J(1)-IFSECT
      CALL M:RDISC(NSTPGM,LNKM,NSBLVL)
      DO 31 IF=1,NSBLVL
      LSEC=LRHSMK(NSTPGM(IF),0,L10B)
      LR=LRHSMK(NSTPGM(IF),10,L1B)
      LFRC=LRHSMK(NSTPGM(IF),11,L5B)
      LPERD=ITM(LFRC)
      IF(LSEC.EQ.J(1).AND.LR.EQ.1.AND.LFRC.NE.0)
     *GO TO 33
31    CONTINUE
32    CONTINUE
      IEC=4
      RETURN                                       EXIT
33    CONTINUE
      LVLBIT=ITASK*4096+(NSBLVL-IF)
      CALL DLELNK(LVLBIT,TMBSAI,LPERD)             DLELNK 17/618
      NSTPGM(IF)=-1
      IFSZE=((NSBLVL-1)/256+1)*256
      CALL M:WDISC(NSTPGM,LNKM,IFSZE)              MASSWT
      GO TO 17
19    CONTINUE
      IEC=3
      RETURN                                       EXIT
120   CONTINUE
      CALL CVTORL(LCORE,NCORE,NXCBSZ,NXCDSZ,J(1),K,KST)   CVTORL 17/616
      GO TO (140,180) KST                          180-17/606C
140   CONTINUE
      IF(LRHSMK(LCORE(K),12,L4B).EQ.12) GO TO 150  150-17/606C
      LDELTA=K+LCORE(K+2)
      IF(LRHSMK(LCORE(LDELTA),12,L4B).EQ.8)
     *GO TO 19
      CALL M:RDISC(NSTDAT,LNKM,NSBLVL)             MASSRD
      DO 142 IF=1,NSBLVL                           142-17/606C
      LFC=LRHSMK(NSTDAT(IF),11,L5B)
```

FIG. 17/606B

```
      LR=LRHSMK(NSTDAT(IF),10,L1B)
      IF(LR.EQ.0.AND.LFC.NE.0) GO TO 145
142   CONTINUE
      IEC=4
      RETURN                                          EXIT
145   CONTINUE
      LVLBIT=ITASK*4096+(NSBLVL-IF)
      CALL SLOC(LVLBIT,J(1),J(2),KER)                 SUBLOC 17/1011
      GO TO (147,142,142) KER
147   CONTINUE
      IF(J(2).NE.0) GO TO 142
      CALL CVTORL(LCORE,NCORE,NXCBSZ,NXCDSZ,          CVTORL 17/616
     *J(1),L,KST)
      LS=L+1
      IF(LCORE(LS).EQ.K.AND.LCORE(LS+2).EQ.0)
     *GO TO 130
      CALL RESEQ(LCORE,K,LS,KER)                      RESEQ 17/617
      GO TO (148,248,348,130,142) KER
348   CONTINUE
      CALL CLSFIL(LCORE,NXCBDF,LS)                    CLSFIL 17/605
      GO TO 148
248   CONTINUE
      LCORE(K-3)=LCORE(K)+3
      K=K-3
148   CONTINUE
      CALL CLSFIL(LCORE,NXCBDF,K)
      GO TO 17                                        17-17/606A
180   CONTINUE
      L=LRHSMK(NCORE(K),12,L4B)
      IF(L.NE.4) GO TO 191
      CALL FLAE(8,NCORE(K),VALUE,ITABLE)              SFILE 17/1310A
      LDADR=ITABLE(2)*16+ITABLE(3)+LWRD
      CALL ALDL(LDADR,I)                              ALMDEL 17/1140
191   CONTINUE
      CALL CLSFIL(NCORE,NXCDDF,K)
      GO TO 17
150   CONTINUE
      CALL DLELNK(LCORE(K+3),TMESCC,LCORE(K+4))       DLELNK 17/618
      CALL CLSFIL(LCORE,NXCBDF,K)
      GO TO 17
130   CONTINUE
      LCORE(L)=LCORE(K)+2
      CALL CLSFIL(LCORE,NXCBDF,L)
      GO TO 33                                        33-17/606B
20    CONTINUE
      IEC=2
      RETURN                                          EXIT
190   CONTINUE
      IEC=4
      RETURN                                          EXIT
      END
```

FIG. 17/606C

```
LOCHOL(NST,NXEN,INDF,NSSZ,ISZE,LPHOLE,LHOLE,IEC)

      DATA LFILMX/4096/
      DATA L12B/$FFF/
      IF (INDF.EQ.0) GO TO 50
      I=0
      LHOLE=0
      LPHOLE=0
      LTSZ=LFILMX
      J= INDF
   10 CONTINUE
      K=LRHSMK(NST(J),0,L12B)
      IF(K.GE.ISZE) GOTO 20
   14 CONTINUE
      I=J
      J=NST(J+1)
      IF(J.NE.0) GOTO 10
      IF(LHOLE.EQ.0) GOTO 50
      IEC=1
      RETURN                                              EXIT
   20 CONTINUE
      IF(K.GE.LTSZ) GOTO 14
      LTSZ=K
      LHOLE=J
      LPHOLE=I
      GOTO 14
   50 CONTINUE
      IF(NXEN+ISZE-1.LE.NSSZ) GOTO 60
      IEC=3
      RETURN                                              EXIT
   60 LHOLE=NXEN
      IEC=2
      RETURN                                              EXIT
      END
```

FIG. 17/607

```
LOCSEQ(NST,NCVTR,LP,IEC)

      DATA L4B/$F/
      DATA L12B/$0FFF/
      DATA L15B/$7FFF/
      I=NST(2)+1
      IF(NCVTR.EQ.0) NCVTR=6
      K = NCVTR-1
    5 CONTINUE
      IF(LRHSMK(NST(I),12,L4B).LE.3.AND.LRHSMK
     X(NST(I+3),15,1).EQ.0)GO TO 10
      IF(NST(I+2).EQ.0) GO TO 100
      I=NST(I+2)+I
      GO TO 5
   10 CONTINUE
      IV=LRHSMK(NST(I+3),8,L4B)
      IF(K.LT.IV) GO TO 100
      J=NST(I+2)+I
   20 CONTINUE
   25 CONTINUE
      IF(LRHSMK(NST(J),12,L4B).LE.3.AND.LRHSMK
     X(NST(J+3),15,1).EQ.0)GO TO 30
      IF(NST(J+2).EQ.0) GO TO 80
      J=NST(J+2)+J
      GO TO 25
   30 CONTINUE
      IV=LRHSMK(NST(I+3),8,L4B)
      JV=LRHSMK(NST(J+3),8,L4B)
      M=JV-IV
      IF(M.EQ.1) GO TO 70
      IF(M) 40,40,50
   40 CONTINUE
      IF(K.GT.IV) GO TO 110
      GO TO 70
   50 CONTINUE
      IF(K.GT.IV.AND.K.LT.JV) GO TO 110
   70 CONTINUE
      I=J
      J=NST(J+2)+J
      IF(J.NE.I) GO TO 20
   80 CONTINUE
      IF(K.GT.LRHSMK(NST(I+3),8,L4B)) GO TO 110
      IF(LRHSMK(NST(1),0,L15B)+1.LE.NSETS) GO TO 120
      IEC=4
      GO TO 200
  100 CONTINUE
      IEC=2
      GO TO 200
  110 CONTINUE
      IEC=1
      GO TO 200
  120 CONTINUE
      IEC=3
  200 CONTINUE
      LP=I
      RETURN                                          EXIT
      END
```

FIG. 17/608

```
LOCBUF(NXEN,INDF,ISZE,LPHOLE,LHOLE,IEC)

      DATA LBUFMX/512/
      DATA L2/2/
      IF (INDF.EQ.0) GO TO 50
      I=0
      LHOLE=0
      LPHOLE=0
      LTSZ=LBUFMX
      J= INDF
   10 CONTINUE
      CALL MASSRD(IBUF,J,L2)                    ---> MASSRD
      IF(IBUF(1).GE.ISZE) GO TO 20
   14 CONTINUE
      I=J
      J=IBUF(2)
      IF(J.NE.0) GUTO 10
      IF(LHOLE.EQ.0) GUTO 50
      IEC=1
      RETURN                                    ---> EXIT
   20 CONTINUE
      IF(IBUF(1).GE.LTSZ) GO TO 14
      LTSZ=IBUF(1)
      LHOLE=J
      LPHOLE=I
      GOTO 14
   50 CONTINUE
      IF(NXEN+((ISZE-1)/256).LE.NFSELT) GO TO 60
      IEC=4
      RETURN                                    ---> EXIT
   60 LHOLE=NXEN
      IEC=2
      RETURN                                    ---> EXIT
      END
```

FIG. 17/609

```
OPNBUF(NXEN,INDF,ISZE,LP,LI,IDX)

      DATA L2/2/
      GO TO (10,20,30) IDX
   10 CONTINUE
      CALL MASSRD(IBUF,LI,L2)                   ---> MASSRD
      I=IBUF(2)
      IF(LP.EQ.0) GO TO 16
      CALL MASSRD(IBUF,LP,L2)
      IBUF(2)=I
      CALL MASSWT(IBUF,LP,L2)                   ---> MASSWT
      RETURN                                    ---> EXIT
   16 INDF=I
      RETURN                                    ---> EXIT
   20 CONTINUE
      NXEN=NXEN+((ISZE-1)/256)+1
   30 CONTINUE
      RETURN                                    ---> EXIT
      END
```

FIG. 17/610

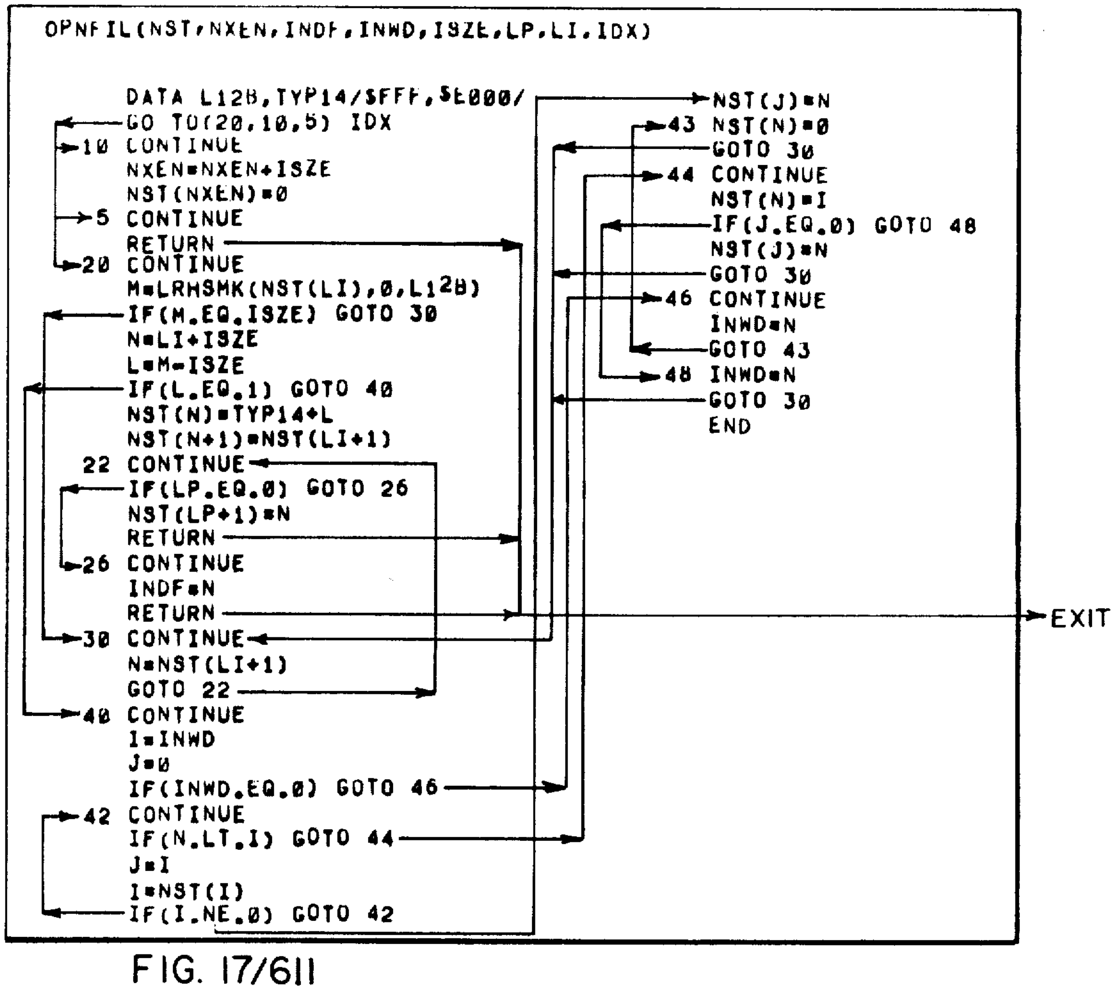
FIG. 17/611
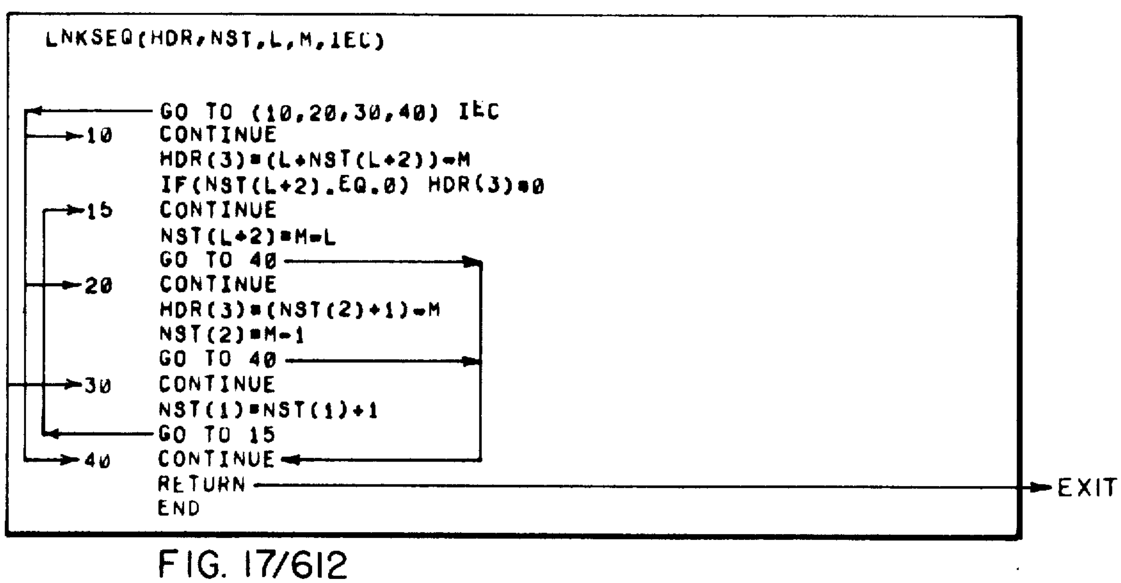
FIG. 17/612

Figure 17:
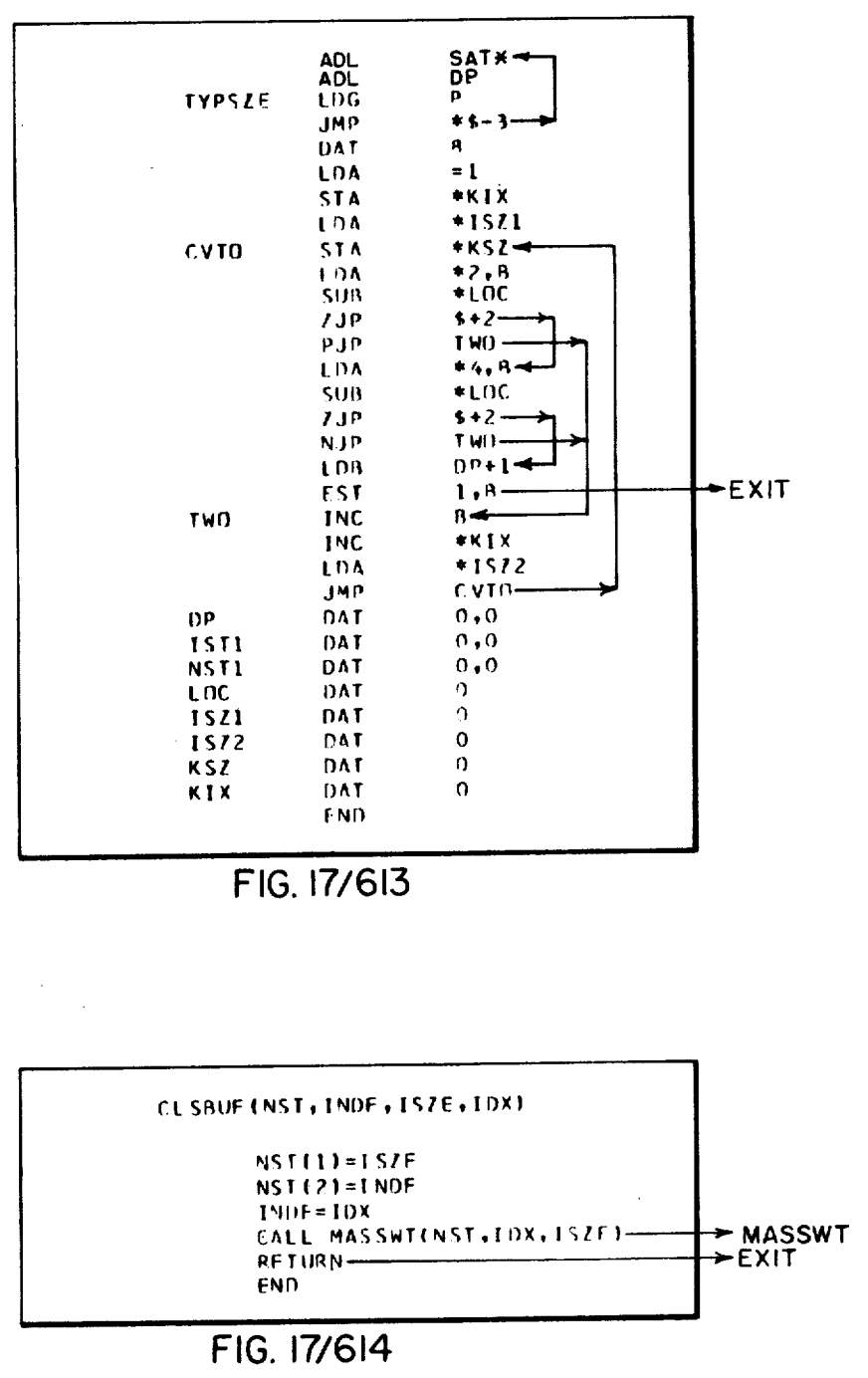

```
          ADL     SAT*
          ADL     DP
TYPSZE    LDG     P
          JMP     *$-3
          DAT     8
          LDA     =1
          STA     *KIX
          LDA     *ISZ1
CVTO      STA     *KSZ
          LDA     *2,B
          SUB     *LOC
          ZJP     $+2
          PJP     TWO
          LDA     *4,B
          SUB     *LOC
          ZJP     $+2
          NJP     TWO
          LDB     DP+1
          EST     1,B        → EXIT
TWO       INC     B
          INC     *KIX
          LDA     *ISZ2
          JMP     CVTO
DP        DAT     0,0
IST1      DAT     0,0
NST1      DAT     0,0
LOC       DAT     0
ISZ1      DAT     0
ISZ2      DAT     0
KSZ       DAT     0
KIX       DAT     0
          END
```

FIG. 17/613

```
CLSBUF(NST,INDF,ISZE,IDX)

      NST(1)=ISZE
      NST(2)=INDF
      INDF=IDX
      CALL MASSWT(NST,IDX,ISZE)    → MASSWT
      RETURN                       → EXIT
      END
```

FIG. 17/614

```
         ADL     SAT*    --> ARGUMENT FETCH
         ADL     DP
CVTDAB   LDG     P
         JMP     *$-3
         DAT     2
         LDA     NST
         DCR     A
         ADD     *IDX
         STA     *LOC
         LDB     1,B
         EST     1,B     --> EXIT
DP       DAT     0,0
NST      DAT     0
IDX      DAT     0
LOC      DAT     0
         END
```

FIG. 17/615

```
         ADL     SAT*    --> ARGUMENT FETCH
         ADL     DP
CVTDRL   LDG     P
         JMP     *$-3
         DAT     6
         LDA     =1
         STA     *KST
CVTRL    LDA     *LOC
         SUB     2,B
         NJP     CVTRL1
         SUB     *4,B
         PJP     CVTRL1
         LDA     *LOC
         SUB     2,B
         INC     A
         STA     *KIX
         LDB     DP+1
         EST     1,B     --> EXIT
CVTRL1   INC     B
         INC     *KST
         JMP     CVTRL
DP       DAT     0,0
NST1     DAT     0,0
TSZ1     DAT     0,0
LOC      DAT     0
KIX      DAT     0
KST      DAT     0
         END
```

FIG. 17/616

```
RESEQ(NST,LT,LS,IEC)

          DATA L4B/$F/
          LP=0
          LN=NST(LS)+1
    100   CONTINUE
          LF=LN+NST(LN+2)
          IF(LRHSMK(NST(LN),12,L4B).EQ.8.AND.LF.EQ.LT)
         *GO TO 102
          IF(LN.EQ.LT) GO TO 101
          LP=LN
          LN=LF
          IF(NST(LN+2).NE.0) GO TO 100
          IEC=5
          RETURN                                         EXIT
    102   CONTINUE
          LN=LF
          IEC=2
          GO TO 103
    101   CONTINUE
          IEC=1
    103   CONTINUE
          LF=LN+NST(LN+2)
          IF(LRHSMK(NST(LF),12,L4B).EQ.13) GO TO 105
          IF(LP.EQ.0) GO TO 104
    107   CONTINUE
          NST(LP+2)=LF-LP
          RETURN                                         EXIT
    104   CONTINUE
          NST(LS)=LF-1
          RETURN                                         EXIT
    105   CONTINUE
          IEC=3
          IF(LP.EQ.0) GO TO 106
          LS=LF
          LF=LF+NST(LF+2)
          GO TO 107
    106   CONTINUE
          LS=LF
          IEC=4
          RETURN                                         EXIT
          END
```

FIG. 17/617

```
DLELNK(LVL,TMBS,PERD)

      CALL TGDL(LVL,KER)               → TRGDEL-17/1130A
      CALL PRDL(LVL,TMBS,PERD,KER)     → SYNRMV-17/920
   10 CONTINUE
      CALL DSAB(LVL)                   → DISABLE-17/1015
      KER=1
      GO TO (20,30)KER
   20 CONTINUE
      CALL SRMV(LVL)                   → SUBRMOVE-17/1013
      RETURN                           → EXIT
   30 CALL M:RDISC(TD,0,1)             → MASSRD
      GO TO 10
      END
```

FIG. 17/618

```
MOVLNK(LA,MT,MF)

      DATA L1B/1/
      DATA L6B/$3F/
      DATA L10B/$3FF/
      IF(LA(MF).EQ.-1.AND.LA(MT).EQ.0) GO TO 22
      IF(LA(MF).EQ.-1) GO TO 20
      LNKBF=LA(MF)
      LVLBIT=ITASK*4096+(NSBLVL-MF)
      LR=LRHSMK(LNKBF,10,L1B)
      IF(LR.EQ.1) GO TO 10
      CALL SLOC(LVLBIT,ISC,IBFSZE,KER)
      GO TO 12
10    CONTINUE
      IBFSZE=NSPGSZ
12    CONTINUE
      L=LRHSMK(LNKBF,10,L6B)/2
      KPERD=ITM(L)
      CALL DLELNK(LVLBIT,TMBSA1,KPERD)
      LVLBIT=ITASK*4096+(NSBLVL-MT)
      NISX=((IFSECT+LRHSMK(LNKBF,0,L10B))*LR)+
     *((1-LR)*ISC)
      CALL LINK(LVLBIT,NISX,IBFSZE,KER)
      CALL ABLE (LVLBIT)
      CALL PRLK(LVLBIT,TMBSA1,KPERD,KER)
      LA(MT)=LA(MF)
      LA(MF)=-1
20    CONTINUE
      RETURN
22    CONTINUE
      LA(MF)=0
      GO TO 20
      END
```

- CALL SLOC → SUBLOC 17/1011
- CALL DLELNK → DLELNK 17/618
- CALL LINK → SUBLINK 17/1012
- CALL ABLE → SUBABLE 17/1016
- CALL PRLK → SYNCLK 17/950A
- RETURN → EXIT

FIG. 17/619

```
WRSYMB(LSYMB,LOC,IFORV,NIDX,IEC)

      EQUIVALENCE(IST(1),IDIR(1))
      DATA LT/$0000,$8000/
      DATA IDXE6/2H 6/
      DATA NWRDS/256/
      IF(LSYMB(1).EQ.0) GO TO 200             --> 200 17/620C
    1 CONTINUE
      CALL LOCDIR(LSYMB,L,M,J,K)              --> LOCDIR 17/625
      GO TO (10,20),K
   10 CONTINUE
      IEC=2
      IF(L.EQ.2)IEC=3
      RETURN                                  --> EXIT
   20 CONTINUE
      IF(J.EQ.0) GO TO 22
      GO TO 30
   22 IF(M.GE.0) GO TO 25
      IPSNSC=-IPSNSC
      IF(IPSNSC.EQ.(NSECT+1)) GO TO 25
      IDIR(1)=IPSNSC
      IDIR(2)=0
      IDIR(3)=5
      SECT=IPSNSC
      DO 24 I=4,256
      IDIR(I)=0
   24 CONTINUE
      CALL M:WDISC(IDIR,IPSNSC,NWRDS)         --> M:WDISC
      GO TO 1
   25 IEC=4
      RETURN                                  --> EXIT
   30 CONTINUE
      IEC=1
      IDIR(3)=IDIR(J)
      IF(IDIR(J).EQ.0) IDIR(3)=J+LDENT+2
      IF(IDIR(3).GE.256) IDIR(3)=0
   32 CONTINUE
      IDIR(J+1)=0
      DO 33 I=1,LWSYM
      K=J+1+I
      IDIR(K)=LSYMB(I)
   33 CONTINUE
      II=LDENT-LWSYM
      DO 35 I=1,II
      K=J+1+LWSYM+I
      IDIR(K)=LOC(I)
   35 CONTINUE
      NIDX=(IDIR(1)-ISECT)*64+(((J-5)/(LDENT+2)+1))
      IDIR(J)=LT(IFORV)
      IF(M.GE.0) GO TO 50                     --> 50 17/620B
```

Figure 17:
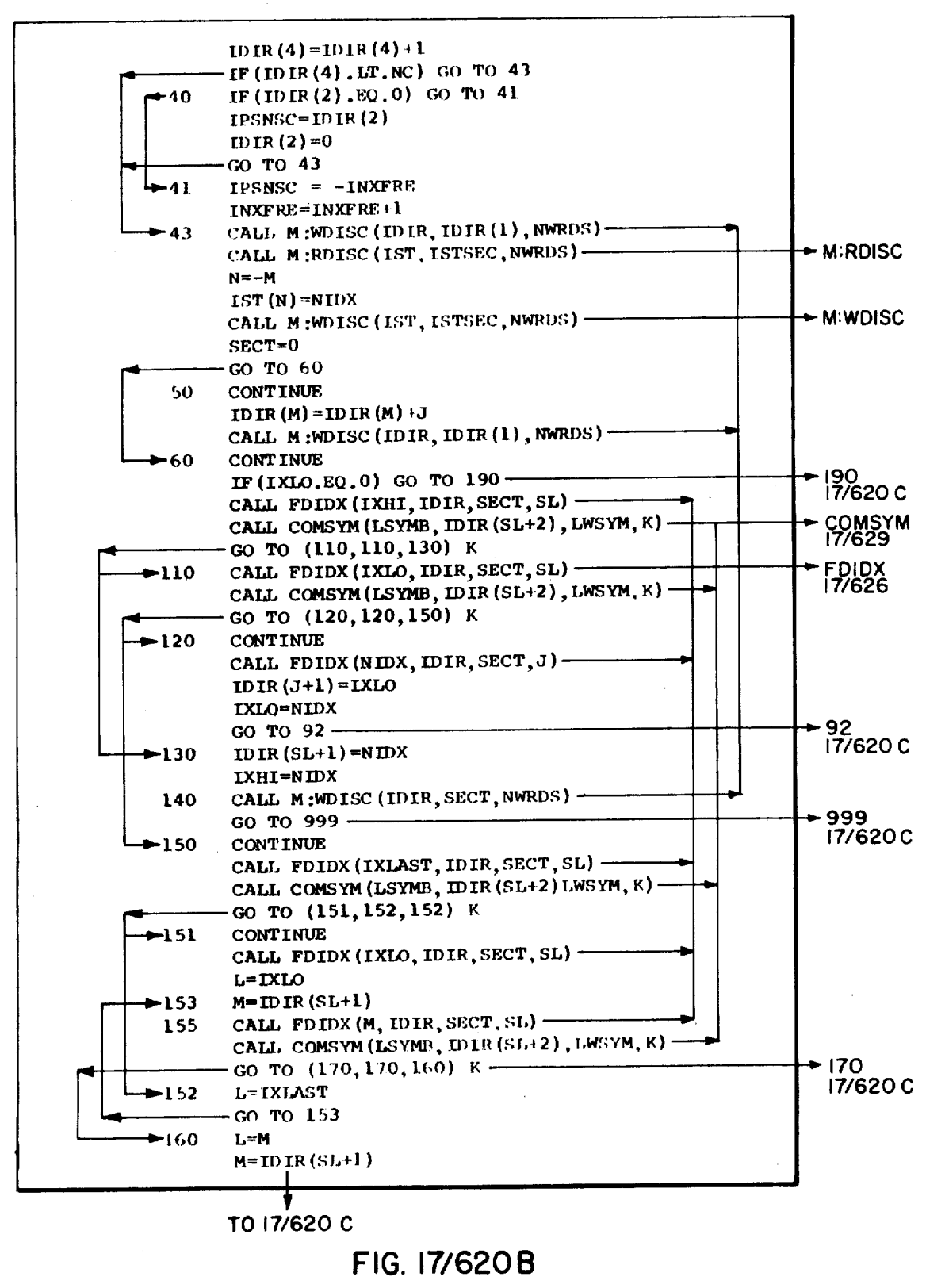

```
      IDIR(4)=IDIR(4)+1
      IF(IDIR(4).LT.NC) GO TO 43
40    IF(IDIR(2).EQ.0) GO TO 41
      IPSNSC=IDIR(2)
      IDIR(2)=0
      GO TO 43
41    IPSNSC = -INXFRE
      INXFRE=INXFRE+1
43    CALL M:WDISC(IDIR,IDIR(1),NWRDS)
      CALL M:RDISC(IST,ISTSEC,NWRDS)
      N=-M
      IST(N)=NIDX
      CALL M:WDISC(IST,ISTSEC,NWRDS)
      SECT=0
      GO TO 60
50    CONTINUE
      IDIR(M)=IDIR(M)+J
      CALL M:WDISC(IDIR,IDIR(1),NWRDS)
60    CONTINUE
      IF(IXLO.EQ.0) GO TO 190
      CALL FDIDX(IXHI,IDIR,SECT,SL)
      CALL COMSYM(LSYMB,IDIR(SL+2),LWSYM,K)
      GO TO (110,110,130) K
110   CALL FDIDX(IXLO,IDIR,SECT,SL)
      CALL COMSYM(LSYMB,IDIR(SL+2),LWSYM,K)
      GO TO (120,120,150) K
120   CONTINUE
      CALL FDIDX(NIDX,IDIR,SECT,J)
      IDIR(J+1)=IXLO
      IXLO=NIDX
      GO TO 92
130   IDIR(SL+1)=NIDX
      IXHI=NIDX
140   CALL M:WDISC(IDIR,SECT,NWRDS)
      GO TO 999
150   CONTINUE
      CALL FDIDX(IXLAST,IDIR,SECT,SL)
      CALL COMSYM(LSYMB,IDIR(SL+2)LWSYM,K)
      GO TO (151,152,152) K
151   CONTINUE
      CALL FDIDX(IXLO,IDIR,SECT,SL)
      L=IXLO
153   M=IDIR(SL+1)
155   CALL FDIDX(M,IDIR,SECT,SL)
      CALL COMSYM(LSYMB,IDIR(SL+2),LWSYM,K)
      GO TO (170,170,160) K
152   L=IXLAST
      GO TO 153
160   L=M
      M=IDIR(SL+1)
```

M:RDISC

M:WDISC 190 17/620 C

COMSYM 17/629

FDIDX 17/626

```
          IF(M.NE.0) GO TO 155
          IERX=IDXE6
          CALL PRTERR
          GO TO 151
    170   CALL FDIDX(NIDX,IDIR,SECT,SL)
          IDIR(SL+1)=M
          CALL M:WDISC(IDIR,SECT,NWRDS)
          CALL FDIDX(L,IDIR,SECT,SL)
          IDIR(SL+1)=NIDX
          CALL M:WDISC(IDIR,SECT,NWRDS)
          GO TO 999
    190   IXLO=NIDX
          IXHI=NIDX
          CALL FDIDX(NIDX,IDIR,SECT,J)
     92   CONTINUE
          DO 94 I=1,LWSYM
          K=J+1+I
          LOSYM(I)=IDIR(K)
     94   CONTINUE
          GO TO 140
    200   IEC=1
          NIDX=LSYMB(2)
          CALL FDIDX(NIDX,IDIR,SECT,SL)
          J=LDENT-LWSYM
          DO 210 I=1,J
          K=SL+1+LWSYM+I
          IDIR(K)=LOC(I)
    210   CONTINUE
          CALL M:WDISC(IDIR,SECT,NWRDS)
    999   IXLAST=NIDX
          RETURN
          END
```

- 155 17/620B
- 151 17/620B
- FDIDX 17/626
- M:WDISC
- EXIT

FIG. 17/620C

```
ERSYMH(LSYM,IEC)

       EQUIVALENCE(IST(1),IDIR(1))
       DATA L15B/$7FFF/
       DATA L15Z/$8000/
       DATA NWRDS/256/
       CALL LOCDIR(LSYM,I,J,K,L)                                  ---> LOCDIR 17/625
       GOTO(20,10),L
   10  CONTINUE
       IEC=3
       RETURN                                                     ---> EXIT
   20  CONTINUE
       GOTO (30,40),I
   30  CONTINUE
       IEC=2
       RETURN                                                     ---> EXIT
   40  CONTINUE
       IEC=1
       IF(J)50,60,60
   50  CONTINUE
       IF(IDIR(K).NE.0) GO TO 70
       IDIR(2)=IPSNSC
       IPSNSC=IDIR(1)
       IDIR(4)=IDIR(4)-1
   70  CONTINUE
       ITEMP=LRHSMK(IDIR(K),0,L15B)
       IDIR(K)=IDIR(3)
       IDIR(3)=K
       NIDX=(IDIR(1)-ISECT)*256+K
       CALL M:WDISC(IDIR,IDIR(1),NWRDS)
       CALL M:RDISC(IST,ISTSEC,NWRDS)                             ---> M:RDISC
       I=-J
       IST(I)=ITEMP
       CALL M:WDISC(IST,ISTSEC,NWRDS)
       SECT=0
       GO TO 69
   60  CONTINUE
       IDIR(J)=LRHSMK(IDIR(J),0,L15Z)+LRHSMK(IDIR(K),0,L15B)
       IDIR(K)=IDIR(3)
       IDIR(3)=K
       NIDX=(IDIR(1)-ISECT)*256+K
       CALL M:WDISC(IDIR,IDIR(1),NWRDS)                           ---> M:WDISC
   69  CONTINUE
       CALL COMSYM(LSYM,LUSYM,LWSYM,I)                            ---> COMSYM 17/629
       GOTO (80,80,90),I
  |
  v
17/621B
```

FIG. 17/621A

Figure 17:
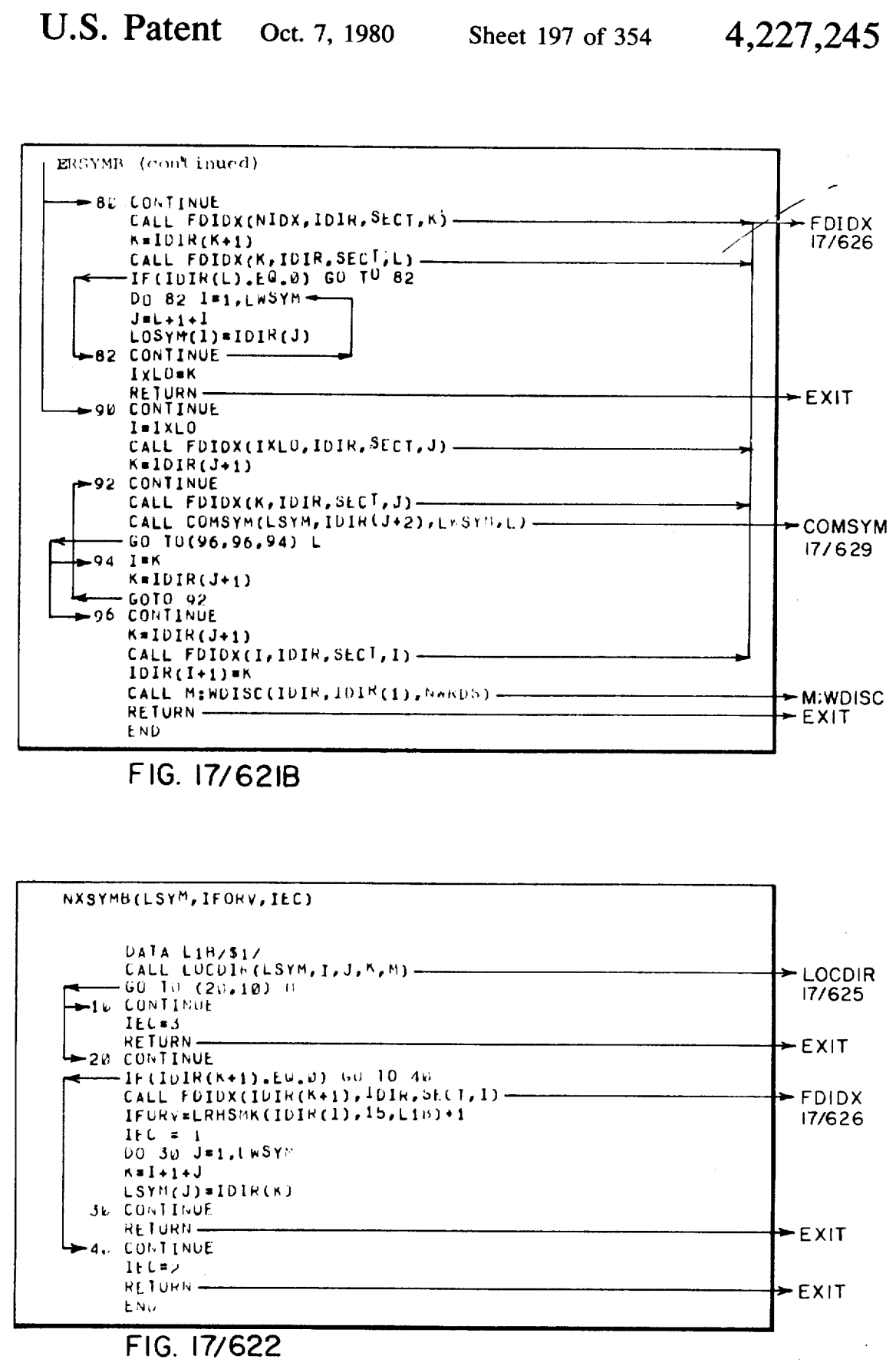

```
ERSYMB (con't inued)

   80 CONTINUE
      CALL FDIDX(NIDX,IDIR,SECT,K)
      K=IDIR(K+1)
      CALL FDIDX(K,IDIR,SECT,L)
      IF(IDIR(L).EQ.0) GO TO 82
      DO 82 I=1,LWSYM
      J=L+1+I
      LOSYM(I)=IDIR(J)
   82 CONTINUE
      IXLO=K
      RETURN
   90 CONTINUE
      I=IXLO
      CALL FDIDX(IXLO,IDIR,SECT,J)
      K=IDIR(J+1)
   92 CONTINUE
      CALL FDIDX(K,IDIR,SECT,J)
      CALL COMSYM(LSYM,IDIR(J+2),LWSYM,L)
      GO TO(96,96,94) L
   94 I=K
      K=IDIR(J+1)
      GOTO 92
   96 CONTINUE
      K=IDIR(J+1)
      CALL FDIDX(I,IDIR,SECT,I)
      IDIR(I+1)=K
      CALL M:WDISC(IDIR,IDIR(1),NWRDS)
      RETURN
      END
```

FDIDX 17/626

EXIT

COMSYM 17/629

M:WDISC

EXIT

FIG. 17/621B

```
NXSYMB(LSYM,IFORV,IEC)

      DATA LIB/$1/
      CALL LOCDIR(LSYM,I,J,K,M)
      GO TO (20,10) M
   10 CONTINUE
      IEC=3
      RETURN
   20 CONTINUE
      IF(IDIR(K+1).EQ.0) GO TO 40
      CALL FDIDX(IDIR(K+1),IDIR,SECT,I)
      IFORV=LRHSMK(IDIR(1),15,LIB)+1
      IEC = 1
      DO 30 J=1,LWSYM
      K=I+1+J
      LSYM(J)=IDIR(K)
   30 CONTINUE
      RETURN
   40 CONTINUE
      IEC=2
      RETURN
      END
```

LOCDIR 17/625

EXIT

FDIDX 17/626

EXIT

EXIT

FIG. 17/622

FROM 17/620A

ALPHANUMERIC LINKING

```
60  CONTINUE
    IF(IXLO.EQ.0) GO TO 190
    CALL FDIDX(IXHI,IDIR,SECT,SL)
    CALL COMSYM(LSYMB,IDIR(SL+2),LWSYM,K)
    GO TO(110,110,130) K
110 CALL FDIDX(IXLO,IDIR,SECT,SL)
    CALL COMSYM(LSYMB,IDIR(SL+2),LWSYM,K)
    GO TO(120,120,150) K
120 CONTINUE
    CALL FDIDX(NIDX,IDIR,SECT,J)
    IDIR(J+1)=IXLO
    IXLO=NIDX
    GOTO 92
130 IDIR(SL+1)=NIDX
    IXHI=NIDX
140 CALL M:WDISC(IDIR,SECT,NWRDS)
    GO TO 999
150 L=IXLO
    M=IDIR(SL+1)
155 CALL FDIDX(M,IDIR,SECT,SL)
    CALL COMSYM(LSYMB,IDIR(SL+2),LWSYM,K)
    GO TO(170,170,160) K
160 L=M
    M=IDIR(SL+1)
    GO TO 155
170 CALL FDIDX(NIDX,IDIR,SECT,SL)
    IDIR(SL+1)=M
    CALL M:WDISC(IDIR,SECT,NWRDS)
    CALL FDIDX(L,IDIR,SECT,SL)
    IDIR(SL+1)=NIDX
    CALL M:WDISC(IDIR,SECT,NWRDS)
    GO TO 999
190 IXLO=NIDX
    IXHI=NIDX
    CALL FDIDX(NIDX,IDIR,SECT,J)
92  CONTINUE
    DO 94 I=1,LWSYM
    K=J+1+I
    LOSYM(I)=IDIR(K)
94  CONTINUE
    GO TO 140
```

FDIDX 17/626

COMSYM 17/629

M:WDISC

999 EXIT 17/620B

FIG. 17/623

Figure 17:
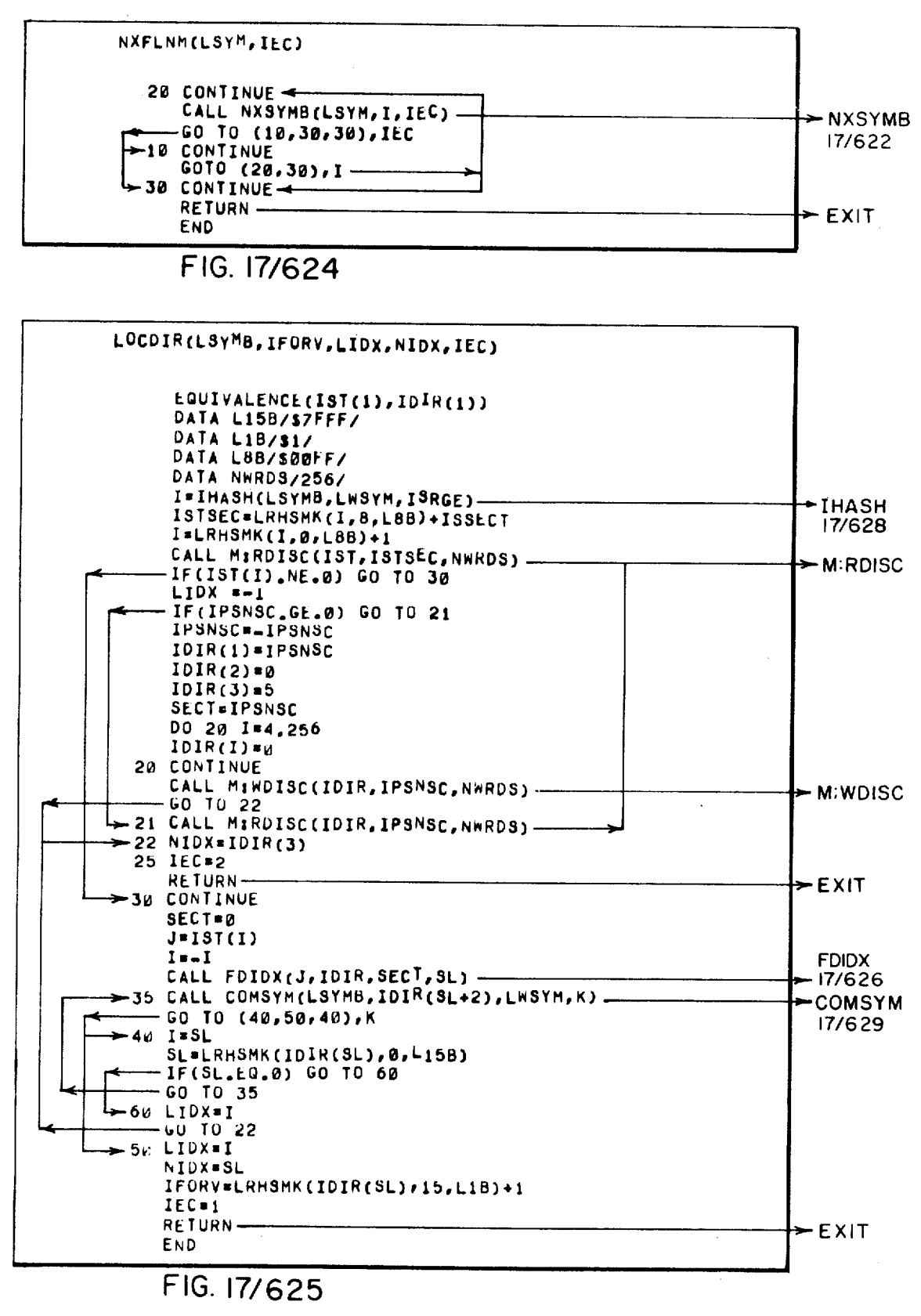

```
NXFLNM(LSYM,IEC)

 20 CONTINUE
    CALL NXSYMB(LSYM,I,IEC)                    NXSYMB 17/622
    GO TO (10,30,30),IEC
 10 CONTINUE
    GOTO (20,30),I
 30 CONTINUE
    RETURN                                     EXIT
    END
```

FIG. 17/624

```
LOCDIR(LSYMB,IFORV,LIDX,NIDX,IEC)

    EQUIVALENCE(IST(1),IDIR(1))
    DATA L15B/$7FFF/
    DATA L1B/$1/
    DATA L8B/$00FF/
    DATA NWRDS/256/
    I=IHASH(LSYMB,LWSYM,ISRGE)                 IHASH 17/628
    ISTSEC=LRHSMK(I,8,L8B)+ISSECT
    I=LRHSMK(I,0,L8B)+1
    CALL M:RDISC(IST,ISTSEC,NWRDS)             M:RDISC
    IF(IST(I).NE.0) GO TO 30
    LIDX =-1
    IF(IPSNSC.GE.0) GO TO 21
    IPSNSC=-IPSNSC
    IDIR(1)=IPSNSC
    IDIR(2)=0
    IDIR(3)=5
    SECT=IPSNSC
    DO 20 I=4,256
    IDIR(I)=0
 20 CONTINUE
    CALL M:WDISC(IDIR,IPSNSC,NWRDS)            M:WDISC
    GO TO 22
 21 CALL M:RDISC(IDIR,IPSNSC,NWRDS)
 22 NIDX=IDIR(3)
 25 IEC=2
    RETURN                                     EXIT
 30 CONTINUE
    SECT=0
    J=IST(I)
    I=-I
    CALL FDIDX(J,IDIR,SECT,SL)                 FDIDX 17/626
 35 CALL COMSYM(LSYMB,IDIR(SL+2),LWSYM,K)      COMSYM 17/629
    GO TO (40,50,40),K
 40 I=SL
    SL=LRHSMK(IDIR(SL),0,L15B)
    IF(SL.EQ.0) GO TO 60
    GO TO 35
 60 LIDX=I
    GO TO 22
 50 LIDX=I
    NIDX=SL
    IFORV=LRHSMK(IDIR(SL),15,L1B)+1
    IEC=1
    RETURN                                     EXIT
    END
```

FIG. 17/625

```
LOCDIR(LSYMB,IFORV,LIDX,NIDX,IEC)

      EQUIVALENCE(IST(1),IDIR(1))
      DATA L15B/$7FFF/
      DATA L1B/$1/
      DATA L8B/$00FF/
      DATA NWRDS/256/
      I=IHASH(LSYMB,LWSYM,ISRGE)                  → IHASH
      ISTSEC=LRHSMK(I,8,L8B)+ISSECT
      I=LRHSMK(I,0,L8B)+1
      CALL M:RDISC(IST,ISTSEC,NWRDS)              → M:RDISC
      IF(IST(I).NE.0) GO TO 30
      LIDX =-I
      IF(IPSNSC.GE.0) GO TO 21
      NIDX=0
      GO TO 25
21    CALL M:RDISC(IDIR,IPSNSC,NWRDS)
      SECT=IPSNSC
22    NIDX=IDIR(3)
25    IEC=2
      RETURN                                      → EXIT
30    CONTINUE
      SECT=0
      J=IST(I)
      I=-I
      CALL FDIDX(J,IDIR,SECT,SL)                  → FDIDX 17/626
35    CALL COMSYM(LSYMB,IDIR(SL+2),LWSYM,K)       → COMSYM 17/629
      GO TO (40,50,40),K
40    I=SL
      SL=LRHSMK(IDIR(SL),0,L15B)
      IF(SL.EQ.0) GO TO 60
      GO TO 35
60    LIDX=I
      GO TO 22
50    LIDX=I
      NIDX=SL
      IFORV=LRHSMK(IDIR(SL),15,L1B)+1
      IEC=1
      RETURN                                      → EXIT
      END
```

FIG. 17/625

Figure 17:
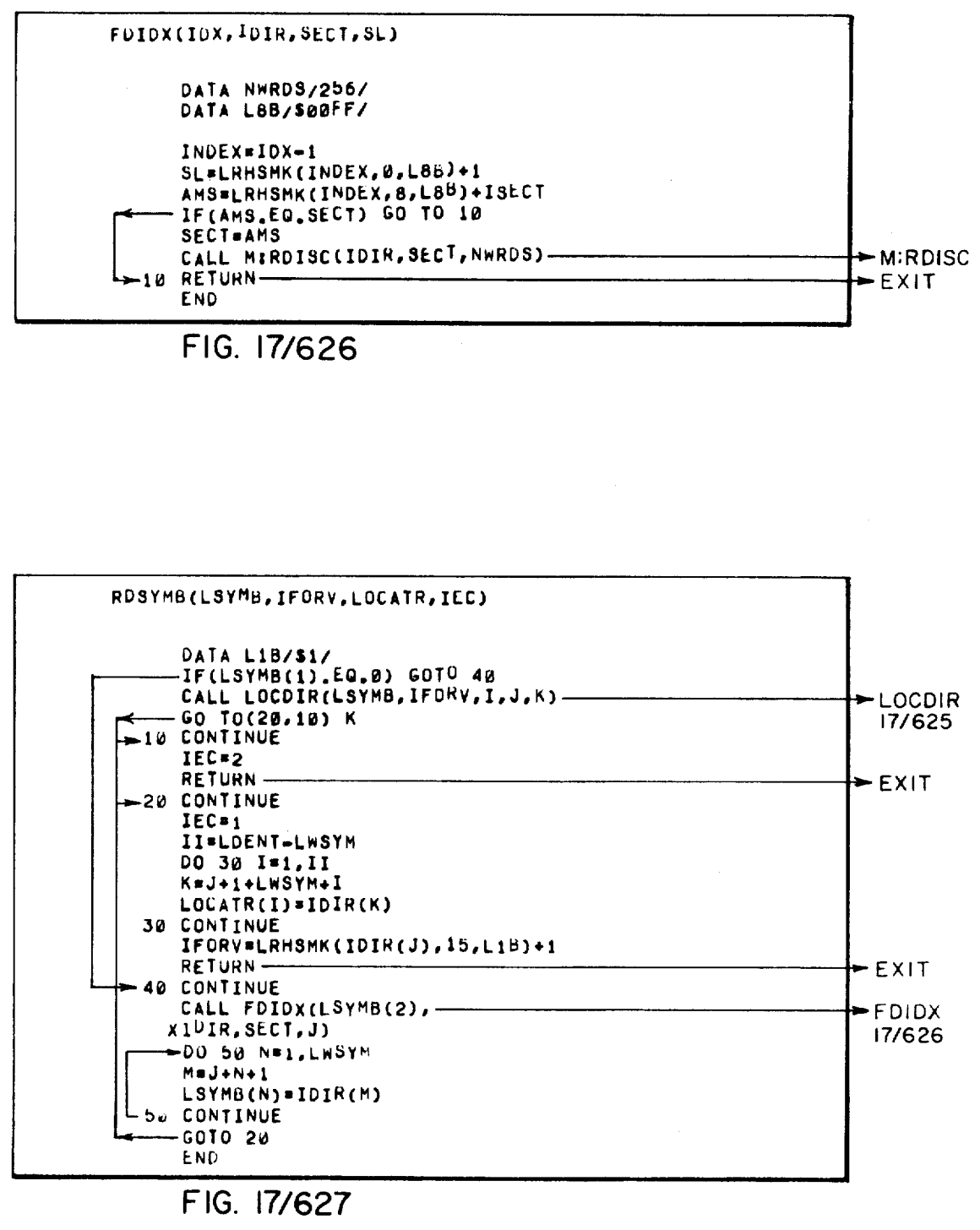

```
FDIDX(IDX,IDIR,SECT,SL)

      DATA NWRDS/256/
      DATA L8B/$00FF/

      INDEX=IDX-1
      SL=LRHSMK(INDEX,0,L8B)+1
      AMS=LRHSMK(INDEX,8,L8B)+ISECT
      IF(AMS.EQ.SECT) GO TO 10
      SECT=AMS
      CALL M:RDISC(IDIR,SECT,NWRDS)          --> M:RDISC
   10 RETURN                                 --> EXIT
      END
```

FIG. 17/626

```
RDSYMB(LSYMB,IFORV,LOCATR,IEC)

      DATA L1B/$1/
      IF(LSYMB(1).EQ.0) GOTO 40
      CALL LOCDIR(LSYMB,IFORV,I,J,K)         --> LOCDIR 17/625
      GO TO(20,10) K
   10 CONTINUE
      IEC=2
      RETURN                                 --> EXIT
   20 CONTINUE
      IEC=1
      II=LDENT-LWSYM
      DO 30 I=1,II
      K=J+1+LWSYM+I
      LOCATR(I)=IDIR(K)
   30 CONTINUE
      IFORV=LRHSMK(IDIR(J),15,L1B)+1
      RETURN                                 --> EXIT
   40 CONTINUE
      CALL FDIDX(LSYMB(2),                   --> FDIDX 17/626
     X1DIR,SECT,J)
      DO 50 N=1,LWSYM
      M=J+N+1
      LSYMB(N)=IDIR(M)
   50 CONTINUE
      GOTO 20
      END
```

FIG. 17/627

```
         ADL     SAT*
         ADL     DP
IHASH    LDG     P
         JMP     *$-3
         DAT     2
         LDC     *LWDS
         DCR     C
         LDA     =0
         CDP     7
HASH1    EOR     *LSYM-DP,B
         DCR     C
         PJP     HASH1
         CDR     4
         LDE     =0
         DIV     *LRGE
         LDA     E
         PJP     $+3
         EOR     =X'FFFF'
         INC     A
         JMP     RET*
DP       DAT     0,0
LSYM     DAT     0
LWDS     DAT     0
LRGE     DAT     0
         END
```

ARGUMENT FETCH

EXIT

FIG. 17/628

```
         ADL     SAT*
         ADL     DP
COMSYM   LDG     P
         JMP     *$-3
         DAT     3
         LDA     *LWSYM
         STA     T1
         DCR     T1
CMSM1    LDA     *LSA
         AND     =X'7F7F'
         STA     TA
         LDA     *LSB
         AND     =X'7F7F'
         SUB     TA
         ZJP     CMSM2
         PJP     CMSM3
         NJP     CMSM4
CMSM2    EQU     $
         INC     LSA
         INC     LSB
         DCR     T1
         PJP     CMSM1
         LDA     =2
CMSM5    STA     *IEC
         LDB     1,B
         EST     1,B
CMSM3    LDA     =1
         JMP     CMSM5
CMSM4    LDA     =3
         JMP     CMSM5
DP       DAT     0,0
LSA      DAT     0
LSB      DAT     0
LWSYM    DAT     0
IEC      DAT     0
T1       DAT     0
TA       DAT     0
         END
```

ARGUMENT FETCH

EXIT

FIG. 17/629

ENTRY

```
Z*CPR     EQU     X'C0'
ANLCHN    EQU     X'7C'
TRACP     EQU     X'7B'
I*TRAC    EQU     X'9F'
I*START   LDA     B
          ADD     =39
          LDB     A
          INC     F
          INC     E
          STE     1,B
          LDA     F
          ADD     =3
          STA     2,B
I*INTD    CDR     X'A4'
          LDA     *2,B
          LDG     I*TRAC
          ZJP     $+2
          SST     TRAC,B
          AND     =X'FF'
          ADD     SRTADR
          LDG     *A
          ZJP     ENDMOD
          SUB     TERADR
          PJP     ENDMOD
          LDC     2,B
          JMP     *G
ENDMOD    EQU     $
          LDA     Z*CPR
          SUB     =ANLTSK
          ZJP     ANLCHK
          LDB     =POOL-1
          JMP     *4,B
ANLCHK    LDA     B
          SUB     =48
          LDE     *A
          LDA     =CSR
          ADD     Z*CPR
          LDA     *A
          PJP     $+3
          EOR     =X'FFFF'
          INC     A
          SUB     F
          PJP     $+2
          JMP     *ANLCHN
          LDA     B
          SUB     =47
          LDA     *A
          JMP     *A
```

ALGORITHM RETURN

TRAC 17/730

TO ALGORITHM SUBROUTINE

TO BASIC SUB-TASK EXIT PGM. FIG. 17/1040

TO DOCCTC-1 FIG. 17/1210

TO SRTANL FIG. 17/1200

FIG. 17/700

```
TRAC      LDG     =X'4008'
          SHF     A
          AND     =X'FF'
          LDE     A
          LDA     =4
          SST     *TRACP
          EST     1,B
TERADR    DAT     TERMOD
SRTADR    DAT     MODULE-1
```

TO TRACE PGM.

RETURN

FIG. 17/730

```
MODULE    EQU     $
          DAT     MODA01
          DAT     MODA02
          DAT     MODA03
          *       *
          *       *
          DAT     MODA40
TERMOD    EQU     $
          END
```

FIG. 17/720

TIME DELAY RETURN

```
I*INTTD   LDG     A
          LDA     B
          ADD     =39
          LDB     A
          STE     2,B
          LDA     G
          AND     =X'FFF'
          STA     F
          LDA     Z*CPR
          ADD     =POINTADR
          LDA     *A
          ADD     STARTADR
          ADD     F
          LDA     *A
          ADD     -2
          STA     1,B
          LDA     2,B
          ADD     =6
          STA     2,B
          JMP     I*INTD
```

I*INTD FIG. 17/700

FIG. 17/710

LOGIC

```
FROM 68

20  MODA01  LDA C
21          ADD 1,C
22          ADD KIX2
23          STA 4,B
24          STA 5,B
25          INC 5,B
26          LDA *A
27          STA 6,B
28          DCR 6,B
29          ADD 5,B
30          STA 2,B
31          LDA 1,C
32          STA 7,B
33          DCR 7,B
34          LDA KIX10
35          ADD B
36          STA 8,B
37          ADD 1,C
38          STA C
39          LDG SRA4
41  MORARG  DCR 4,B
42          DCR C
43          LDA *4,B
44          STA 9,B
45          PJP LOGEX5
46          EOR KIX8000
47          STA E
48          AND KI4TH
49          SHF E
50          ADA LOGBAS
51          LDA *A
52          AND *E
53          ZJP $+2
55  LOGEX4  LDA KIX1
56          STA *C
57          DCR 7,B
58          PJP MORARG
59          JMP LOGEX6
61  LOGEX5  ADD FILIDX
62          LDA *A
63          NJP LOGEX4
64          STZ A
65          JMP LOGEX4+1
67  LOGEX6  LDA 6,B
68          NJP LOGEX1
TO 69

69  MOROP   LDA *5,B
70          AND KIX3
71          LDG KIX1
72          SHF A
73          ADD DUNDXX
74          STA 11,B
75          LDG SRA2
76          LDA *5,B
77          SHF A
78          AND KI4TH
79          ADD KIX20
80          ADD B
81          STA E
82          LDG SRA11
83          LDA *5,B
84          SHF A
85          AND HX1F
86          ADD 8,B
87          STA C
88          LDG SRA6
89          LDA *5,B
90          SHF A
91          AND HX1F
92          ADD 8,B
93          LDA *A
94          JMP *11,B
95  EXCLOG  STA *E
96          INC 5,B
97          DCR 6,B
98          PJP MOROP
100 LOGEX2  LDA 9,B
101         LDE 32,B
102         ZJP LOGEX3
103         SST *SET1R,B
104         JMP *DRCTR
106 LOGEX3  SST *SETOR,B
107         JMP *DRCTR
108 FUNEXC  EOR KIX1
109         JMP EXCLOG
110         AND *C
111         JMP EXCLOG
112         JMP OREXC
113         DAT 0
114         EOR *C
115         JMP EXCLOG
116 OREXC   ADD *C
117         ZJP $+2
118         LDA KIX1
119         JMP EXCLOG
120 LOGEX1  LDA 17,B
121         STA 32,B
122         JMP LOGEX2
```

SETONR 17/1160

I*INTD 17/700

SETZER 17/1160

FIG. 17/8A01

ARITH

```
17  MODA02  LDA B
18          ADD *13
19          STA 12,B
20          LDA C
21          INC A
22          STA 4,B
23          ADD 1,C
24          ADD 1,C
25          INC A
26          STA 5,B
27          LDA *A
28          ADD 5,B
29          INC A
30          LDE *A
31          STE 6,B
32          DCR 6,B
33          INC A
34          STA 7,B
35          STA 8,B
36          INC 8,B
37          ADD E
38          ADD E
39          STA 2,B
40          LDA 6,B
41          NJP ARTH7
42  ARTHST  LDA *7,B
43          AND K1X3F
44          ADD *OPADTB
45          LDA *A
46          STA 9,B
47          LDA *8,B
48          AND K1X3F
49          ADD 12,B
50          STA 10,B
51          LDG SHFR4
52          LDA *8,B
53          SHF A
54          AND HX3FF
55          SUB DC256
56          PJP ARTH1
57          ADD DC256
58          ADD 5,B
59          LDA *A
60          JMP ARTH3
61  ARTH1   SUB DC256
62          PJP ARTH2
63          ADD DC256
64          ADD 4,B
65          JMP ARTH3
66  ARTH2   ADD 12,B
67  ARTH3   STA 11,B
68          LDA *7,B
69          SHF A
70          AND HX3FF
71          SUB DC256
72          PJP ARTH4
73          ADD DC256
74          ZJP ARTH9
75          ADD 5,B
76          LDA *A
77          JMP ARTH6
TO 78

FROM 77
78  ARTH4   SUB DC256
79          PJP ARTH5
80          ADD DC256
81          ADD 4,B
82          JMP ARTH6
83  ARTH5   ADD 12,B
84  ARTH6   LDE *A
85          INC A
86          LDA *A
87          LDG 9,B
88  ARTH10  SST *G,B
89          DAT X'800B'
90  ARTH8   STE *10,B
91          INC 10,B
92          STA *10,B
93          INC 7,B
94          INC 7,B
95          INC 8,B
96          INC 8,B
97          DCR 6,B
98          PJP ARTHST
99          LDG 5,B
100         INC G
101         LDG *G
102         STE *G
103         INC G
104         STA *G
105         JMP *DRCTR      I*INTD 17/700
106 ARTH7   LDA 5,B
107         INC A
108         LDE *A
109         STE 10,B
110         LDG *4,B
111         ZJP ARTH11
112         LDA 4,B
113         INC A
114         JMP ARTH12
115 ARTH11  INC A
116         LDA *A
117 ARTH12  LDE *A
118         INC A
119         LDA *A
120         JMP ARTH8
121 ARTH9   STZ A
122         STZ E
123         JMP ARTH10-1
    OPADTB  DAT FLTADD
            DAT FLTSUB
            DAT FLTMPY
            DAT FLTDIV
            DAT EXPONT
            DAT SINE
            DAT COSINE
            DAT ARCTAN
            DAT SQUROT
            DAT ABSOLT
            DAT 0
            DAT EXP
            DAT ALOG
```

FIG.17/8A02

Figure 17:
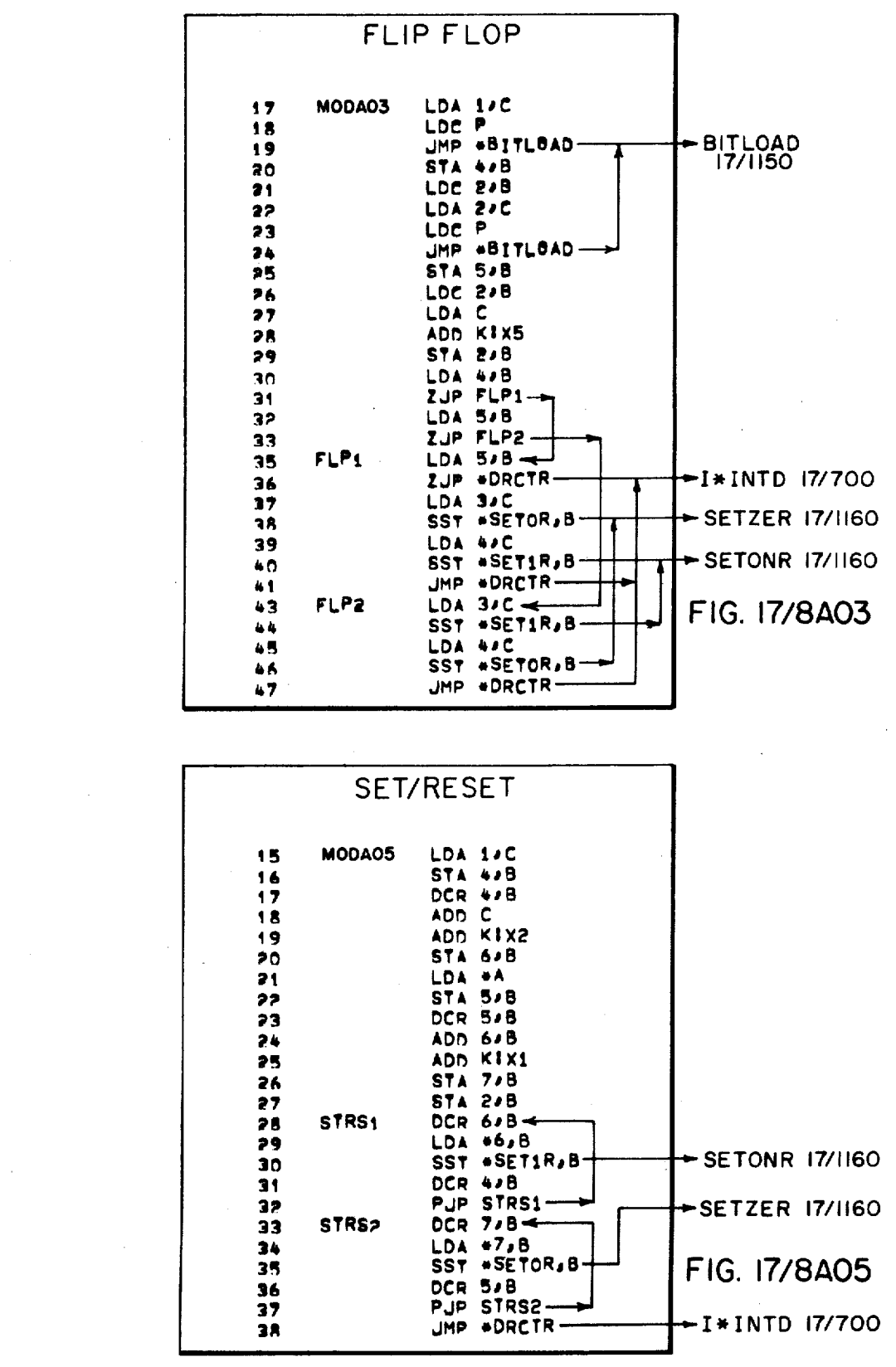

FLIP FLOP

```
MODA03  LDA 1,C
        LDC P
        JMP *BITLOAD
        STA 4,B
        LDC 2,B
        LDA 2,C
        LDC P
        JMP *BITLOAD
        STA 5,B
        LDC 2,B
        LDA C
        ADD K:X5
        STA 2,B
        LDA 4,B
        ZJP FLP1
        LDA 5,B
        ZJP FLP2
FLP1    LDA 5,B
        ZJP *DRCTR
        LDA 3,C
        SST *SET0R,B
        LDA 4,C
        SST *SET1R,B
        JMP *DRCTR
FLP2    LDA 3,C
        SST *SET1R,B
        LDA 4,C
        SST *SET0R,B
        JMP *DRCTR
```

BITLOAD 17/1150

I*INTD 17/700

SETZER 17/1160

SETONR 17/1160

FIG. 17/8A03

SET/RESET

```
MODA05  LDA 1,C
        STA 4,B
        DCR 4,B
        ADD C
        ADD K:X2
        STA 6,B
        LDA *A
        STA 5,B
        DCR 5,B
        ADD 6,B
        ADD K:X1
        STA 7,B
        STA 2,B
STRS1   DCR 6,B
        LDA *6,B
        SST *SET1R,B
        DCR 4,B
        PJP STRS1
STRS2   DCR 7,B
        LDA *7,B
        SST *SET0R,B
        DCR 5,B
        PJP STRS2
        JMP *DRCTR
```

SETONR 17/1160

SETZER 17/1160

FIG. 17/8A05

I*INTD 17/700

Figure 17:
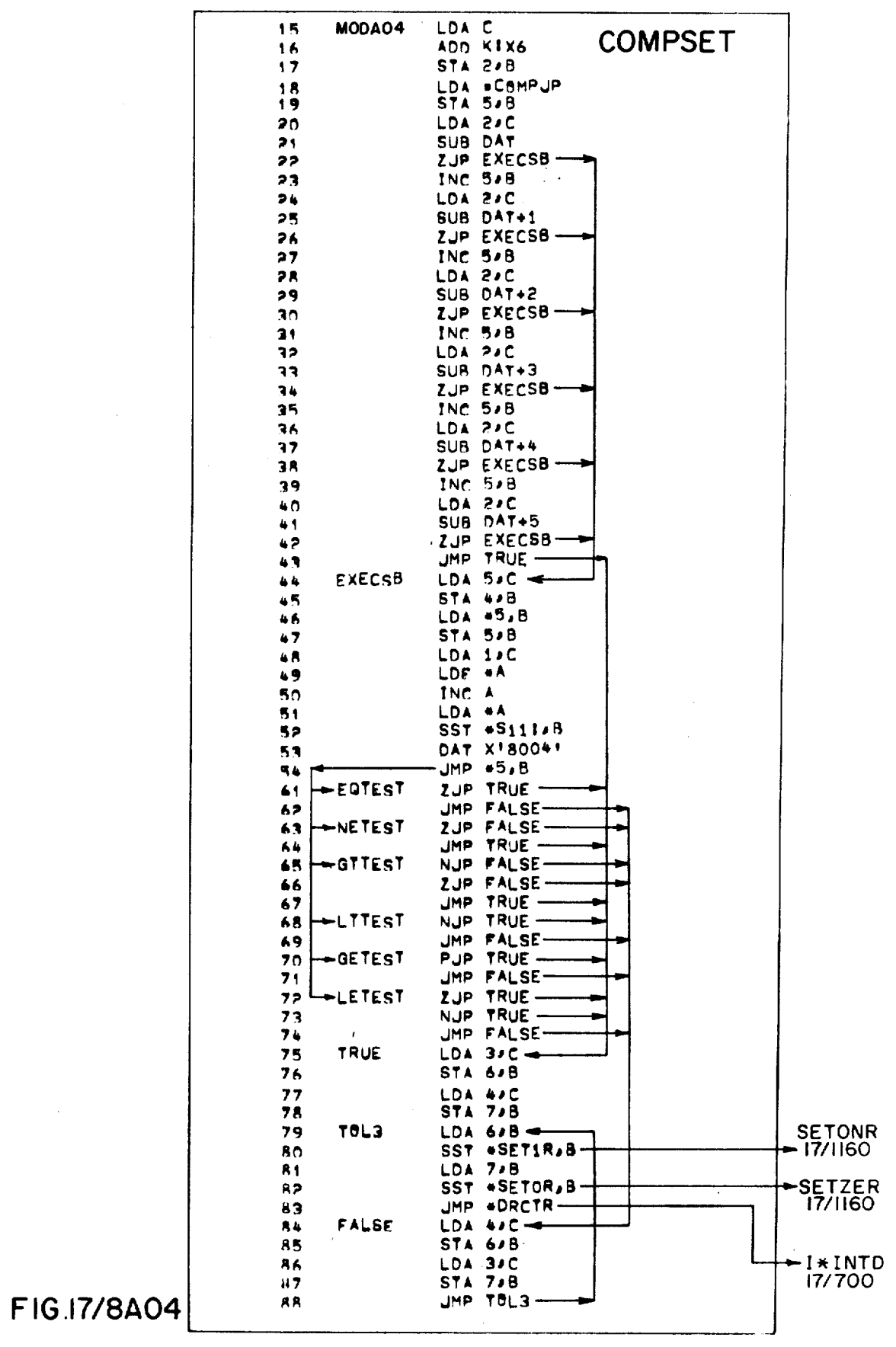

COMPSET

```
MODA04  LDA C
        ADD K'X6
        STA 2,B
        LDA *CBMPJP
        STA 5,B
        LDA 2,C
        SUB DAT
        ZJP EXECSB
        INC 5,B
        LDA 2,C
        SUB DAT+1
        ZJP EXECSB
        INC 5,B
        LDA 2,C
        SUB DAT+2
        ZJP EXECSB
        INC 5,B
        LDA 2,C
        SUB DAT+3
        ZJP EXECSB
        INC 5,B
        LDA 2,C
        SUB DAT+4
        ZJP EXECSB
        INC 5,B
        LDA 2,C
        SUB DAT+5
        ZJP EXECSB
        JMP TRUE
EXECSB  LDA 5,C
        STA 4,B
        LDA *5,B
        STA 5,B
        LDA 1,C
        LDF *A
        INC A
        LDA *A
        SST *S111,B
        DAT X'8004'
        JMP *5,B
EQTEST  ZJP TRUE
        JMP FALSE
NETEST  ZJP FALSE
        JMP TRUE
GTTEST  NJP FALSE
        ZJP FALSE
        JMP TRUE
LTTEST  NJP TRUE
        JMP FALSE
GETEST  PJP TRUE
        JMP FALSE
LETEST  ZJP TRUE
        NJP TRUE
        JMP FALSE
TRUE    LDA 3,C
        STA 6,B
        LDA 4,C
        STA 7,B
TBL3    LDA 6,B
        SST *SET1R,B
        LDA 7,B
        SST *SETOR,B
        JMP *DRCTR
FALSE   LDA 4,C
        STA 6,B
        LDA 3,C
        STA 7,B
        JMP TBL3
```

SETONR 17/1160

SETZER 17/1160

I*INTD 17/700

FIG.17/8A04

LOGICAL TIME DELAY

```
MODA06  LDA     4,C
        LDC     P
        JMP     *BITLBAD      --> BITLOAD 17/1150
        STA     4,B
        LDC     2,B
        LDA     C
        ADD     K1X6
        STA     2,B
        LDA     4,B
        ZJP     *DRCTR        --> I*INTD 17/700
        LDA     2,C
        ZJP     $+2
        PJP     *DRCTR
        LDA     1,C
        CDR     SIL
        SUB     *RESHI
        PJP     RESLB
RES1    ADD     *RESHI
        STA     2,C
        LDA     HILINK
        STA     3,C
        LDA     C
        STA     HILINK
RES2    CDR     RIL
        JMP     *DRCTR
RESLB   ADD     *RESHI
        STZ     E
        DIV     *LBRES
        STA     2,C
        LDA     LBLINK
        STA     3,C
        LDA     C
        STA     LBLINK
        JMP     RES2
```

FIG. 17/8A06

```
      LDA    1,C
      STA    4,B
      LDA    2,C
      STA    5,B
      LDA    K:X1
      STA    6,B
      LDA    C
      ADD    K:X8
      STA    8,B
      LDA    7,C
      LDG    =1
      SIIF   A
      ADD    =9
      ADD    2,B
      STA    2,B
      LDA    7,C
      LDG    =X'4001'
      SIIF   A
      STA    15,B
S1    EQU    $
      INC    8,B
      INC    8,B
      SDA    E
      ADA    *8,B
      SST    *S11:,B
      DAT    X'8004'
      PJP    S2
      INC    6,B
      LDA    6,B
      SUB    15,B
      NJP    S1
S2    EQU    $
      LDA    8,B
      SUB    K:X2
      STA    7,B
      LDA    7,C
      ADD    K:X1
      ADD    7,B
      STA    9,B
      ADD    K:X2
      STA    10,B
      SDA    E
      ADA    *4,B
      SST    *S11:,B
      DAT    X'8007'
      STE    11,B
      STA    12,B
      SDA    E
      ADA    *8,B
      SST    *S11:,B
      DAT    X'8007'
      STE    13,B
      STA    14,B
      SDA    E
      ADA    *10,B
      SST    *S11:,B
      DAT    X'8009'
      SST    *D11:,B
      DAT    X'000D'
      SST    *M11:,B
      DAT    X'000B'
      SST    *A11:,B
      DAT    X'8009'
      STE    *5,B
      INC    5,B
      STA    *5,B
      DCR    5,B
      LDE    3,C
      LDA    4,C
      SST    *S11:,B
      DAT    X'8005'
      NJP    S3
      LDE    5,C
      LDA    6,C
      SST    *S11:,B
      DAT    X'8005'
      ZJP    $+2
      PJP    S4
      JMP    *DRCTR
S3    SDA    E
      ADA    3,C
      JMP    S5
S4    SDA    E
      ADA    5,C
S5    STE    *5,B
      INC    5,B
      STA    *5,B
      JMP    *DRCTR          I*INTD 17/700
      END
```

FIG. 17/8A08 FNGEN

SETZER 17/1160 ← → I*INTD 17/700

```
MODA09   EQU   $
         LDA   C
         ADD   K:X4
         STA   2,B
         STZ   4,B
         LDA   3,C
         AND   =X'FFF'
         SUB   =NUMOUT
         PJP   *DRCTR
         ADD   CCOTB6
         STA   5,B
         LDA   3,C
         AND   =X'FFF'
         DIV   K:X7
         LDG   K:X1
         SHF   E
         LDG   K:X4
         SHF   A
         ADD   E
         ADD   CCOTB7
         STA   6,B
         LDA   *2,C
         ZJP   $+2
         JMP   TIME1
         LDA   6,B
         SST   *SETOR,B
         INC   A
         SST   *SETOR,B
         JMP   *DRCTR
TIME1    PJP   LOWTIM
         DCR   4,B
         EOR   K:XFFFF
         INC   A
LOWTIM   LDE   A
         SUB   1,C
         NJP   $+2
         LDE   1,C
         INC   Z:SFL
         LDA   *5,B
         ZJP   $+2
         JMP   $+2
         INC   TMETBL
         LDA   E
         LDG   4,B
         PJP   $+3
         EOR   K:XFFFF
         INC   A
         STA   *5,B
         STZ   E
         LDA   6,B
         LDE   B
         STE   BSTORD+1
         LDE   4,B
         NJP   RSZCON
         STA   BSTORA+5
         LDB   ADBSTA
         JMP   *SETOR        → SETZER 17/1160
BBBARA   INC   A
         JMP   *SET1R
BBBARB   JMP   *M:SFX        → SOFTWARE LOCKOUT RELEASE
BBBARD   JMP   *DRCTR        → I*INTD 17/700
RSZCON   STA   BSTORC+5
         LDB   ADBSTC
         JMP   *SET1R        → SETONR 17/1160
BBBARC   INC   A
         JMP   *SETOR
BSTORA   DAT   BBBARA-1
         DAT   BSTORB-1
BSTORB   DAT   BBBARB-1
         DAT   BSTORD-1
         DAT   0
         DAT   0
         DAT   0
BSTORC   DAT   BBBARC-1
         DAT   BSTORB-1
BSTORD   DAT   BBBARD-1
         DAT   0
         DAT   0
         DAT   0
         DAT   0
         DAT   0
         DAT   0

CCOTB6   DAT   NUMOUT+1+TMETBL
CCOTB7   DAT   COATVO-LIUSER+CCOINX-1*16+X'8000'
ADBSTA   DAT   BSTORA-1
ADBSTC   DAT   BSTORC-1
         END
```

FIG. 17/8A09 TMDOUT

Figure 17:
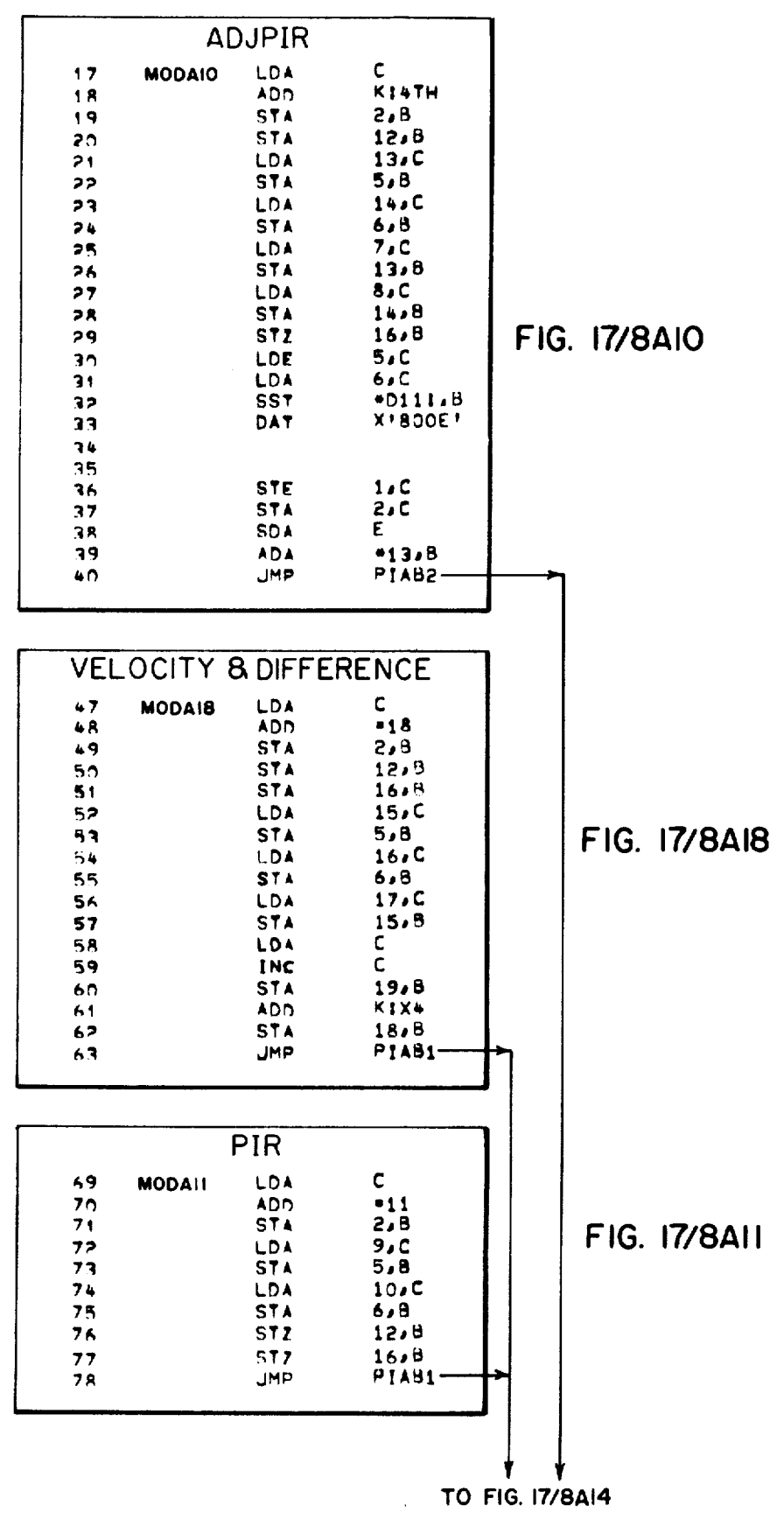

ADJPIR

```
MODAIO   LDA   C
         ADD   K14TH
         STA   2,B
         STA   12,B
         LDA   13,C
         STA   5,B
         LDA   14,C
         STA   6,B
         LDA   7,C
         STA   13,B
         LDA   8,C
         STA   14,B
         STZ   16,B
         LDE   5,C
         LDA   6,C
         SST   *D111,B
         DAT   X'800E'


         STE   1,C
         STA   2,C
         SDA   E
         ADA   *13,B
         JMP   PIAB2
```

FIG. 17/8A10

VELOCITY & DIFFERENCE

```
MODAI8   LDA   C
         ADD   =18
         STA   2,B
         STA   12,B
         STA   16,B
         LDA   15,C
         STA   5,B
         LDA   16,C
         STA   6,B
         LDA   17,C
         STA   15,B
         LDA   C
         INC   C
         STA   19,B
         ADD   K1X4
         STA   18,B
         JMP   PIAB1
```

FIG. 17/8A18

PIR

```
MODAII   LDA   C
         ADD   =11
         STA   2,B
         LDA   9,C
         STA   5,B
         LDA   10,C
         STA   6,B
         STZ   12,B
         STZ   16,B
         JMP   PIAB1
```

```
MODA13   EQU   $
         LDA   14,C
         LDC   P
         JMP   *BITLDR  ——→ BITLOAD 17/1150
         STA   G
         LDC   2,B
         LDA   C
         ADD   =21
         STA   2,B
         LDA   12,C
         STA   5,B
         LDA   13,C
         STA   6,B
         LDA   C
         ADD   K:X2
         LDG   G
         NJP   $+2
         ADD   K:X2
         STA   11,B
         LDG   G
         NJP   PIX1
         LDE   15,C
         LDA   16,C
         JMP   PIX2
PIX1     LDE   10,C
         LDA   11,C
PIX2     SST   *M11:,B
         DAT   X'8005'
         STE   9,B
         STA   10,B
         STE   15,B
         JMP   P12
P12      EQU   $
         LDA   1,C
         STA   12,B
         ADD   K:X2
         STA   16,B
         LDG   5,B
         LDE   *G
         INC   G
         LDA   *G
         SST   *A11:,B
         DAT   X'8010'
         SST   *M11:,B
         DAT   X'800B'
         SST   *A11:,B
         DAT   X'800C'
         JMP   LIM1  ——→ LIM1 17/8A15
```

FIG. 17/8A13 PITXAM

FROM FIGS. 17/8A11 & 17/8A18

FROM FIG. 17/8A10

PIRLIM

```
 84  MODA14  LDA  C
 85          ADD  K14TH
 86          STA  2,B
 87          STA  12,B
 88          LDA  13,C
 89          STA  5,B
 90          LDA  14,C
 91          STA  6,B
 92          STZ  16,B
 95  PIAB1   LDE  7,C
 96          LDA  8,C
 98  PIAB2   SST  *M11:,B
 99          DAT  X'8005'
100          STE  9,B
101          STA  10,B
102          LDA  C
103          ADD  K1X3
104          STA  11,B
105          LDE  1,C
106          LDA  2,C
107          SST  *M11:,B
108          DAT  X'8005'
109          SST  *A11:,B
110          DAT  X'800B'
112  PIAB7   LDE  12,B
113          ZJP  PIAB5
117          STE  7,B
118          STA  8,B
119          LDE  9,C
120          LDA  10,C
121          SST  *S11:,B
122          DAT  X'0007'
123          PJP  PIAB3
124          LDE  9,C
125          LDA  10,C
126          JMP  PIAB5
```

TO 127

FROM 126

```
127  PIAB3   LDE  11,C
128          LDA  12,C
129          SST  *S11:,B
130          DAT  X'0007'
131          NJP  PIAB4
132          LDE  11,C
133          LDA  12,C
134          JMP  PIAB5
136  PIAB4   LDE  7,B
137          LDA  8,B
139  PIAB5   LDE  11,B
140          ZJP  PIAB6
141          STE  3,C
142          STA  4,C
143          STZ  11,B
144          SST  *A11:,B
145          DAT  X'0009'
146          JMP  PIAB7
148  PIAB6   STE  *6,B
149          INC  6,B
150          STA  *6,B
151          LDA  16,B
152          ZJP  *DRCTR
154          SDA  E
155          ADA  *5,B
156          SST  *S11:,B
157          DAT  X'8012'
158          SST  *M11:,B
159          DAT  X'8013'
160          STE  *17,B
161          INC  17,B
162          STA  *17,B
163          SDA  E
164          ADA  *5,B
165          STE  5,C
166          STA  6,C
167          JMP  *DRCTR
```

I*INTD 17/700

FIG. 17/8A14

```
MODA15   EQU   $
         LDA   12,C
         STA   5,B
         LDE   10,C
         LDA   11,C
         SST   *M11:,B
         DAT   X'8005'
         STE   9,B
         STA   10,B
         STE   15,B
CONT1    EQU   $
         LDA   13,C
         STA   6,B
         LDA   C
         ADD   K:X4
         STA   11,B
         ADD   =12
         STA   2,B
         LDA   1,C
         STA   12,B
         INC   A
         INC   A
         STA   16,B
         LDE   2,C
         LDA   3,C
         SST   *M11:,B
         DAT   X'800C'
         STE   13,B
         STA   14,B
CONT2    EQU   $
         LDG   5,B
         LDE   *G
         INC   G
         LDA   *G
         SST   *S11:,B
         DAT   X'8010'
         SST   *M11:,B
         DAT   X'800B'
         SST   *A11:,B
         DAT   X'000D'
LIM1     EQU   $
         STE   7,B
         STA   8,B
         LDE   6,C
         LDA   7,C
         SST   *S11:,B
         DAT   X'0007'
         PJP   LIM3
         LDE   6,C
         LDA   7,C
         JMP   LIM5
LIM3     EQU   $
         LDE   8,C
         LDA   9,C
         SST   *S11:,B
         DAT   X'0007'
         NJP   LIM4
         LDE   8,C
         LDA   9,C
         JMP   LIM5
LIM4     EQU   $
         LDE   7,B
         LDA   8,B
LIM5     EQU   $
         LDG   11,B
         ZJP   LIM6
         STE   *12,B
         INC   12,B
         STA   *12,B
         STZ   11,B
         LDG   15,B
         ZJP   LIM6
         SST   *A11:,B
         DAT   X'0009'
         JMP   LIM1
LIM6     EQU   $
         STE   *6,B
         INC   6,B
         STA   *6,B
         LDE   *5,B
         INC   5,B
         LDA   *5,B
         STE   *16,B
         INC   16,B
         STA   *16,B
         JMP   *DRCTR        I*INTD 17/700
         END
```

FIG. 17/8A15 PDTLIM

LAG

```
MODA17  LDA C
        ADD K14TH
        STA 2,B
        LDA 13,C
        STA 5,B
        LDA 14,C
        STA 6,B
        LDE 1,C
        LDA 2,C
        SST *M111,B
        DAT X'8006'
        STE 7,B
        STA 8,B
        LDE 3,C
        LDA 4,C
        SST *M111,B
        DAT X'8005'
        SST *A111,B
        DAT X'0007'
        STE 7,B
        STA 8,B
        LDE 11,C
        LDA 12,C
        SST *S111,B
        DAT X'0007'
        NJP LAG2
        LDE 11,C
        LDA 12,C
        JMP LAG4
LAG2    LDE 9,C
        LDA 10,C
        SST *S111,B
        DAT X'0007'
        PJP LAG3
        LDE 9,C
        LDA 10,C
        JMP LAG4
LAG3    LDE 7,B
        LDA 8,B
LAG4    STE *6,B
        INC 6,B
        STA *6,B
        JMP     *DRCTR ——→ I*INTD
                           17/700
```

FIG.17/8A17

Figure 17:
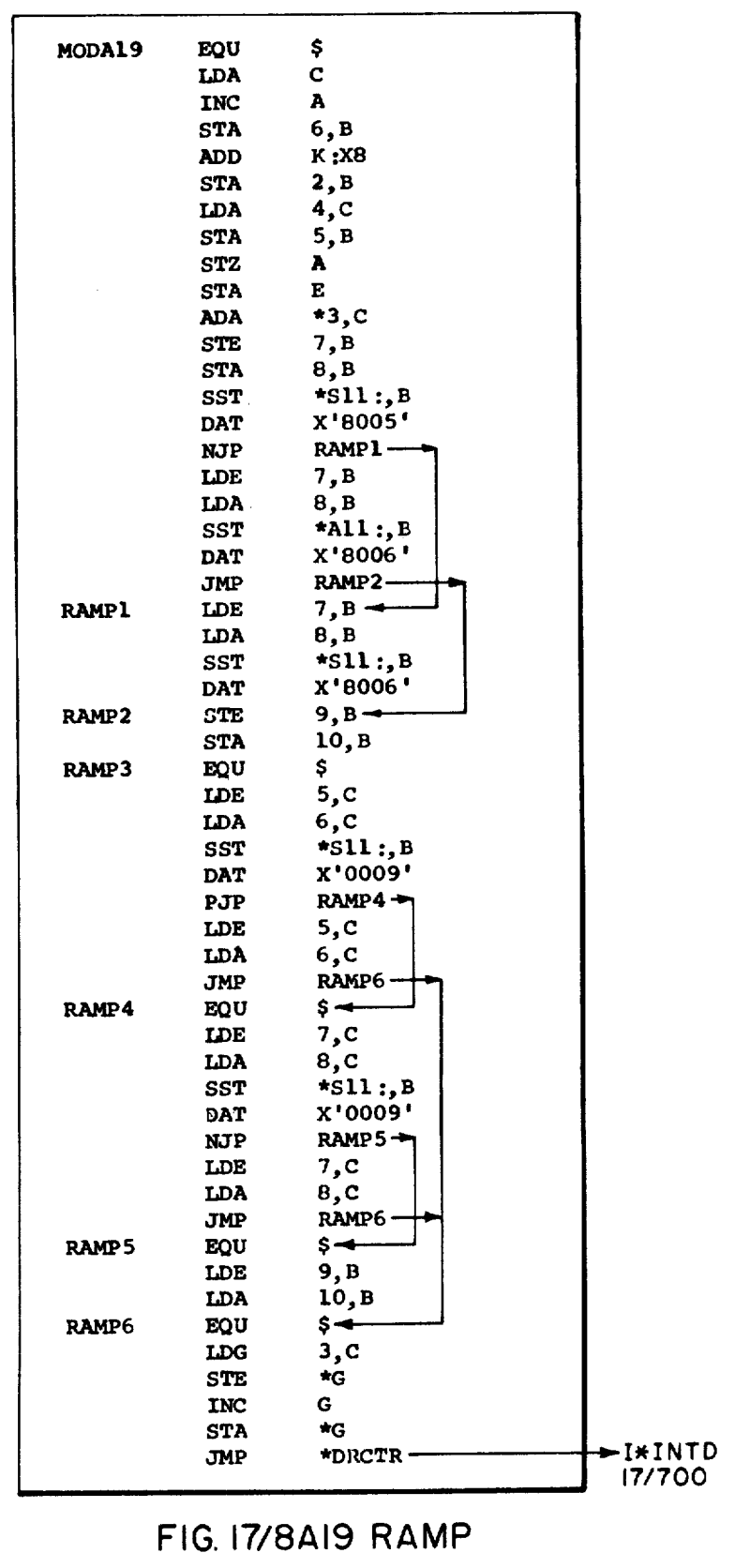

```
MODA19   EQU   $
         LDA   C
         INC   A
         STA   6,B
         ADD   K:X8
         STA   2,B
         LDA   4,C
         STA   5,B
         STZ   A
         STA   E
         ADA   *3,C
         STE   7,B
         STA   8,B
         SST   *S11:,B
         DAT   X'8005'
         NJP   RAMP1
         LDE   7,B
         LDA   8,B
         SST   *A11:,B
         DAT   X'8006'
         JMP   RAMP2
RAMP1    LDE   7,B
         LDA   8,B
         SST   *S11:,B
         DAT   X'8006'
RAMP2    STE   9,B
         STA   10,B
RAMP3    EQU   $
         LDE   5,C
         LDA   6,C
         SST   *S11:,B
         DAT   X'0009'
         PJP   RAMP4
         LDE   5,C
         LDA   6,C
         JMP   RAMP6
RAMP4    EQU   $
         LDE   7,C
         LDA   8,C
         SST   *S11:,B
         DAT   X'0009'
         NJP   RAMP5
         LDE   7,C
         LDA   8,C
         JMP   RAMP6
RAMP5    EQU   $
         LDE   9,B
         LDA   10,B
RAMP6    EQU   $
         LDG   3,C
         STE   *G
         INC   G
         STA   *G
         JMP   *DRCTR   ---> I*INTD 17/700
```

FIG. 17/8A19 RAMP

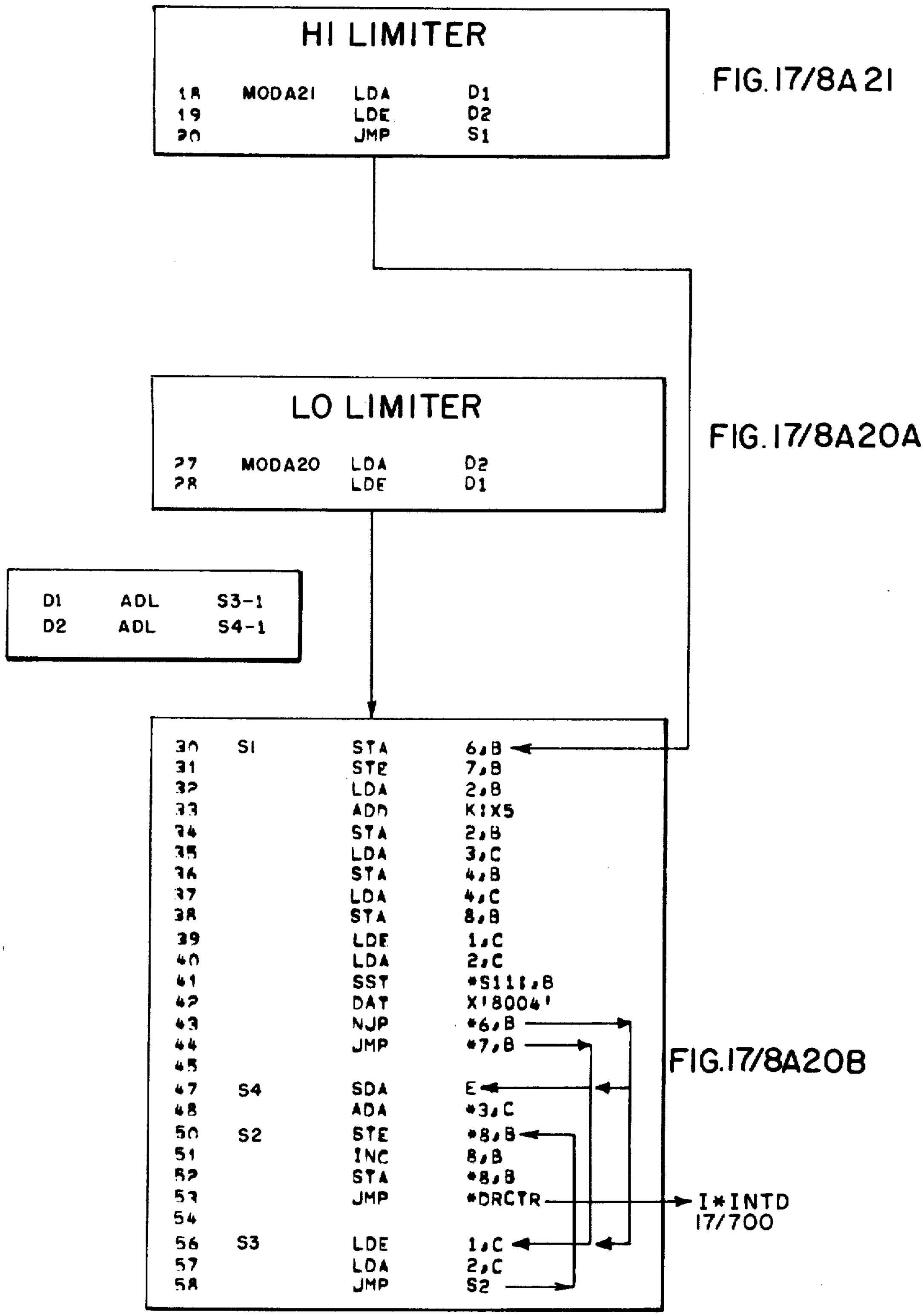
FIG.17/8A21
FIG.17/8A20A
FIG.17/8A20B

Figure 17:
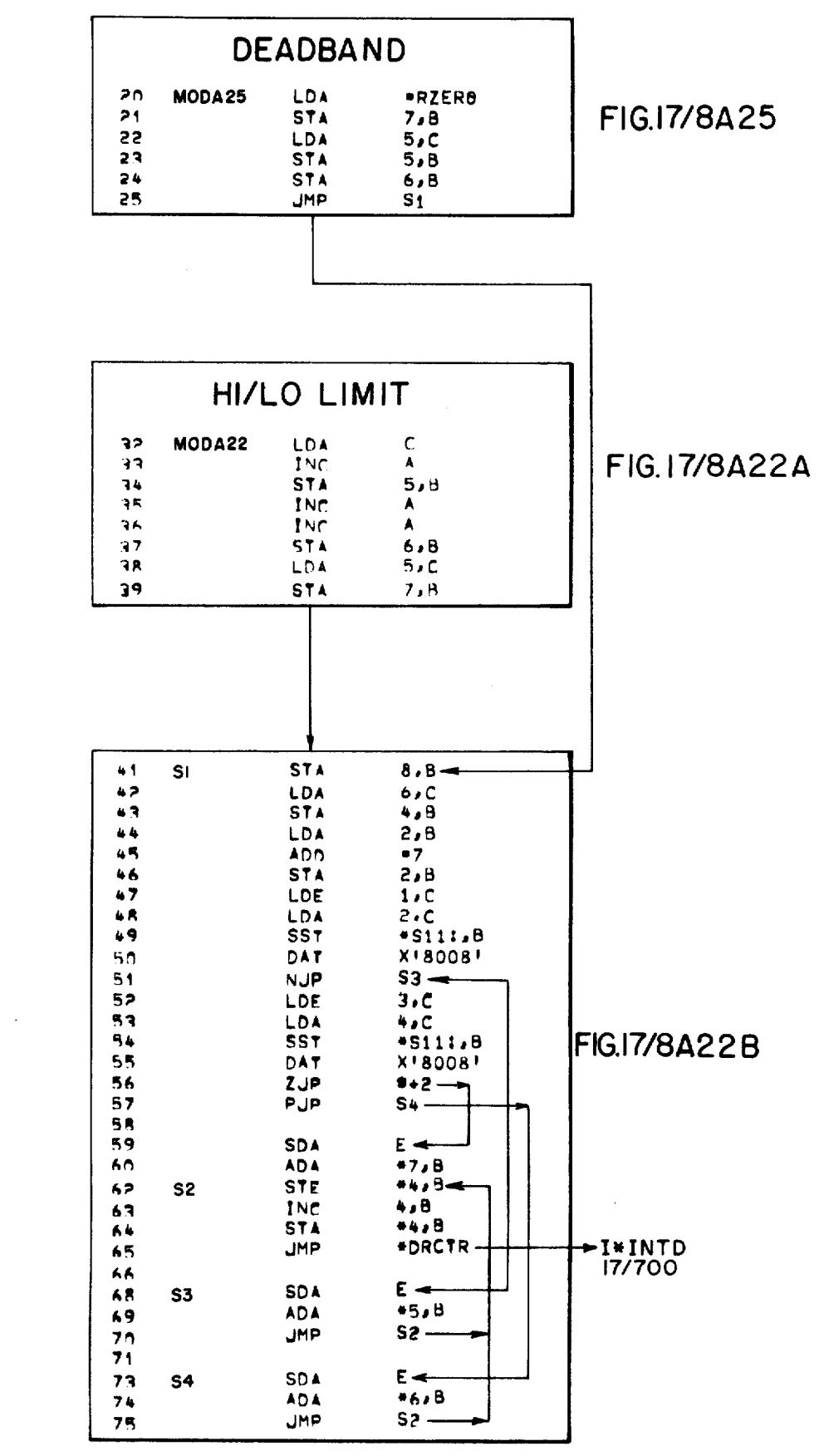

DEADBAND

```
MODA25    LDA    *RZERO
          STA    7,B
          LDA    5,C
          STA    5,B
          STA    6,B
          JMP    S1
```

FIG.17/8A25

HI/LO LIMIT

```
MODA22    LDA    C
          INC    A
          STA    5,B
          INC    A
          INC    A
          STA    6,B
          LDA    5,C
          STA    7,B
```

FIG.17/8A22A

```
S1        STA    8,B
          LDA    6,C
          STA    4,B
          LDA    2,B
          ADD    *7
          STA    2,B
          LDE    1,C
          LDA    2,C
          SST    *S111,B
          DAT    X'8008'
          NJP    S3
          LDE    3,C
          LDA    4,C
          SST    *S111,B
          DAT    X'8008'
          ZJP    *+2
          PJP    S4

          SDA    E
          ADA    *7,B
S2        STE    *4,B
          INC    4,B
          STA    *4,B
          JMP    *DRCTR        → I*INTD 17/700

S3        SDA    E
          ADA    *5,B
          JMP    S2

S4        SDA    E
          ADA    *6,B
          JMP    S2
```

FIG.17/8A22B

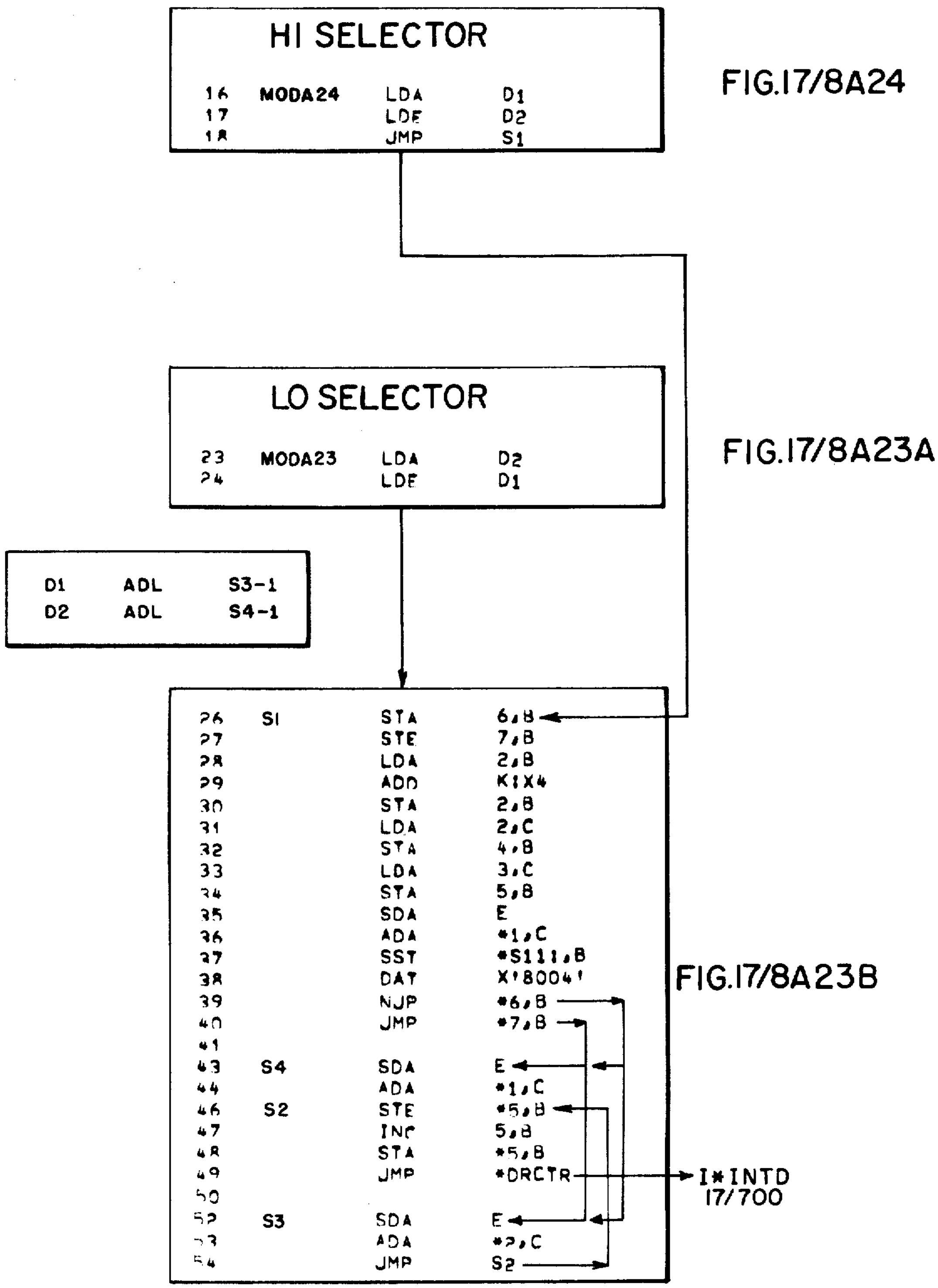
FIG.17/8A24
FIG.17/8A23A
FIG.17/8A23B

THRESHOLD

```
MODA26   LDA   C
         ADD   K!X7
         STA   2,B
         LDA   5,C
         STA   5,B
         STA   6,B
         LDE   1,C
         LDA   2,C
         SST   *S11!,B
         DAT   X'8005'
         NJP   THRES1
         LDE   3,C
         LDA   4,C
         SST   *S11!,B
         DAT   X'8006'
         PJP   THRES1
         LDA   6,C
         SST   *SET1R,B
         JMP   *DRCTR
THRES1   LDA   6,C
         SST   *SET0R,B
         JMP   *DRCTR
```

SETONR 17/1160

SETZER 17/1160

I*INTD 17/700

FIG.17/8A26

TRANSFER

```
MODA27   LDA 1,C
         ADD 1,B
         STA 2,B
         JMP *DRCTR
```

I*INTD 17/700

FIG.17/8A27

TEST BRANCH LOGICAL

```
MODA28   LDA 1,C
         LDC P
         JMP *BITLBAD
         ZJP TIPBR1
         LDC 2,B
         LDA 2,C
         JMP $+3
TIPBR1   LDC 2,B
         LDA 3,C
         ADD 1,B
         STA 2,B
         JMP     *DRCTR
```

BITLOD 17/1150

I*INTD 17/700

FIG. 17/8A28

Figure 17:
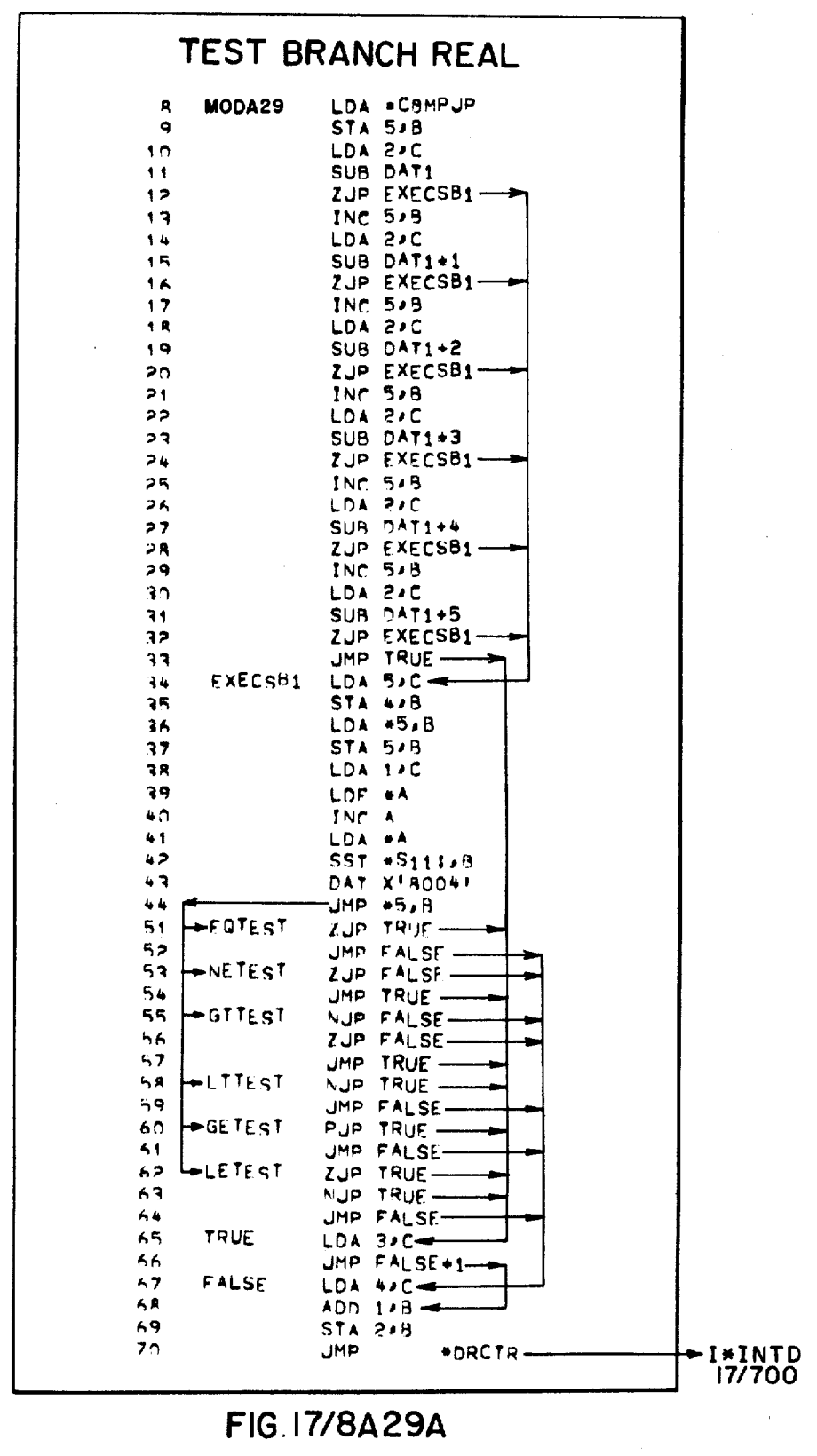

TEST BRANCH REAL

```
MODA29    LDA  *CBMPJP
          STA  5,B
          LDA  2,C
          SUB  DAT1
          ZJP  EXECSB1
          INC  5,B
          LDA  2,C
          SUB  DAT1+1
          ZJP  EXECSB1
          INC  5,B
          LDA  2,C
          SUB  DAT1+2
          ZJP  EXECSB1
          INC  5,B
          LDA  2,C
          SUB  DAT1+3
          ZJP  EXECSB1
          INC  5,B
          LDA  2,C
          SUB  DAT1+4
          ZJP  EXECSB1
          INC  5,B
          LDA  2,C
          SUB  DAT1+5
          ZJP  EXECSB1
          JMP  TRUE
EXECSB1   LDA  5,C
          STA  4,B
          LDA  *5,B
          STA  5,B
          LDA  1,C
          LDF  *A
          INC  A
          LDA  *A
          SST  *S111,B
          DAT  X'8004'
          JMP  *5,B
EQTEST    ZJP  TRUE
          JMP  FALSE
NETEST    ZJP  FALSE
          JMP  TRUE
GTTEST    NJP  FALSE
          ZJP  FALSE
          JMP  TRUE
LTTEST    NJP  TRUE
          JMP  FALSE
GETEST    PJP  TRUE
          JMP  FALSE
LETEST    ZJP  TRUE
          NJP  TRUE
          JMP  FALSE
TRUE      LDA  3,C
          JMP  FALSE+1
FALSE     LDA  4,C
          ADD  1,B
          STA  2,B
          JMP       *DRCTR  → I*INTD 17/700
```

FIG. 17/8A29A

```
COMPJP      DAT       EQTEST - 1
            DAT       NETEST - 1
            DAT       GTTEST - 1
            DAT       LTTEST - 1
            DAT       GETEST - 1
            DAT       LETEST - 1

DAT1        DAT       X'C5D1'   EQ
            DAT       X'4EC5'   NE
            DAT       X'47D4'   GT
            DAT       X'CCD4'   LT
            DAT       X'47C5'   GE
            DAT       X'CCC5'   LE
```

17/8A29B TEST BRANCH

```
MODA30A   LDA   C
          ADD   K:X2
          STA   2,B
          LDA   1,C
          SST         *ABLR,B  --> SUBABLE 17/1014
          JMP         *DRCTR
          LPL
          END
```

FIG. 17/8A30A

```
MODA32    LDA   C
          ADD   K:X3
          STA   2,B
          LDA   1,C
          STA   5,B
          LDA   2,C
          STA   6,B
          SST   *PRTD,B  --> SETTDY 17/930
          DAT   X'0005'
          DAT   X'0006'
          DAT   X'0007'
          JMP   *DRCTR
          LPL
          END
```

FIG. 17/8A32

```
MODA30B   LDA   C
          ADD   K:X2
          STA   2,B
          LDA   1,C
          SST         *BIDR,B  --> SUBBID 17/1020
          JMP         *DRCTR
          LPL
          END
```

FIG. 17/8A30B

```
MODA30C   LDA   C
          ADD   K:X2
          STA   2,B
          LDA   1,C
          SST         *DABR,B  --> DISABLE 17/1015
          JMP         *DRCTR
          LPL
          END
```

FIG. 17/8A30C

```
MODA31    LDA   C
          SUB   K:X2
          STA   E
          LDA   1,C
          STE   B
          JMP   *DLYR  --> TIMDLY 17/1080
```

FIG. 17/8A31

Figure 17:
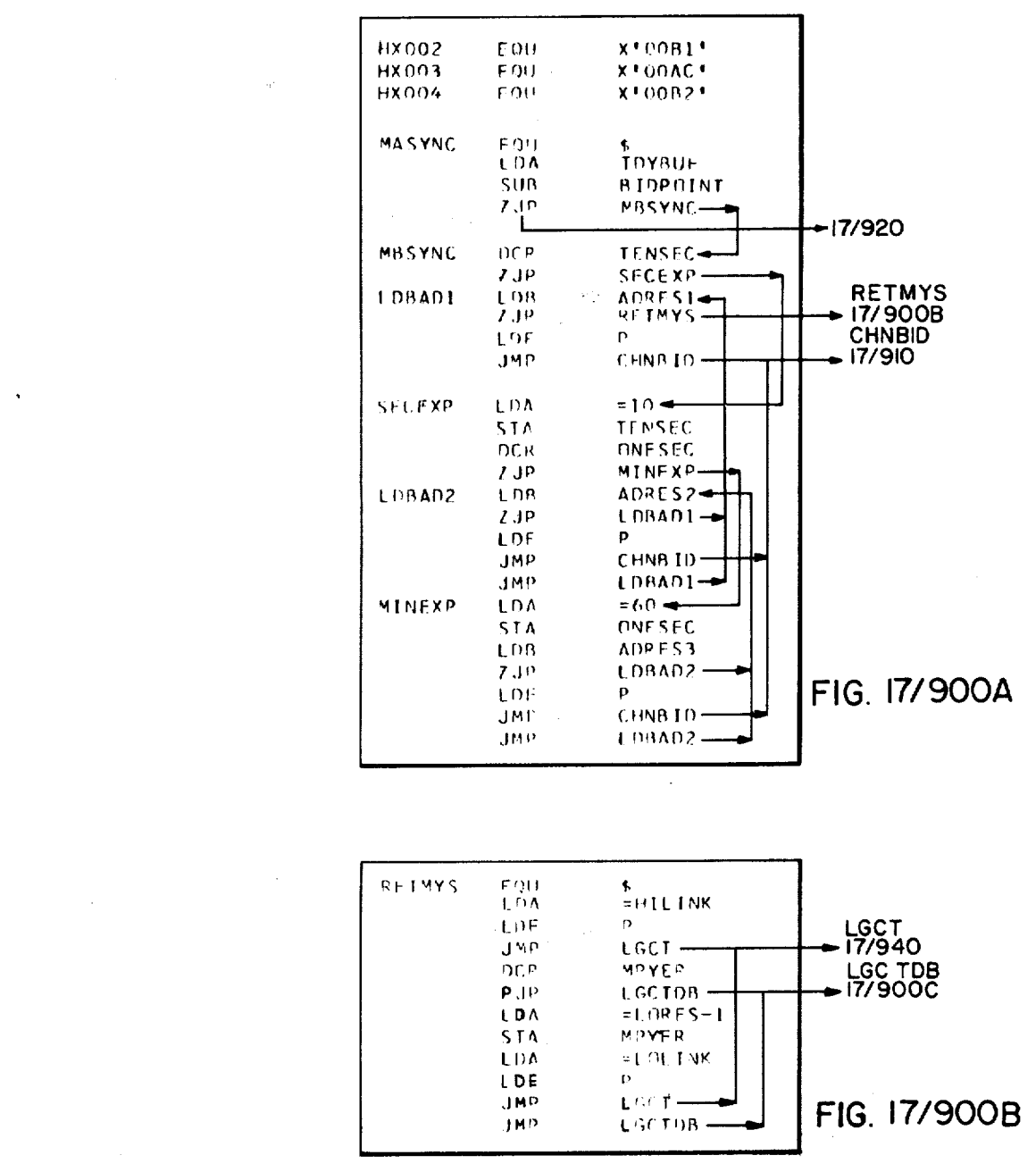

```
HX002    EQU    X'00B1'
HX003    EQU    X'00AC'
HX004    EQU    X'00B2'

MASYNC   EQU    $
         LDA    TDYBUF
         SUB    BIDPOINT
         ZJP    MBSYNC
MBSYNC   DCR    TENSEC
         ZJP    SECEXP
LDBAD1   LDB    ADRES1
         ZJP    RETMYS
         LDE    P
         JMP    CHNBID

SECEXP   LDA    =10
         STA    TENSEC
         DCR    ONESEC
         ZJP    MINEXP
LDBAD2   LDB    ADRES2
         ZJP    LDBAD1
         LDE    P
         JMP    CHNBID
         JMP    LDBAD1
MINEXP   LDA    =60
         STA    ONESEC
         LDB    ADRES3
         ZJP    LDBAD2
         LDE    P
         JMP    CHNBID
         JMP    LDBAD2
```

17/920

RETMYS 17/900B

CHNBID 17/910

FIG. 17/900A

```
RETMYS   EQU    $
         LDA    =HILINK
         LDE    P
         JMP    LGCT
         DCR    MPYER
         PJP    LGCTDB
         LDA    =LORES-1
         STA    MPYER
         LDA    =LOLINK
         LDE    P
         JMP    LGCT
         JMP    LGCTDB
```

LGCT 17/940

LGC TDB 17/900C

FIG. 17/900B

```
OUTSCA   LDA   TMETBL
         ZJP   OUTSCB
         STZ   B
         LDE   =TMETBL+1
         LDC   =NUMOUT-1
SCAN     LDA   *E
         ZJP   INDEX
         NJP   ISLWR
         DCR   *E
         ZJP   RASEXP
INDEX    INC   E
         DCR   A
         PJP   SCAN
         JMP   OUTSCB
ISLWR    INC   *E
         ZJP   LWREXP
         JMP   INDEX
RASEXP   INC   B
LWREXP   STA   RTNPLA
         STE   RTNPLE
         SUB   =NUMOUT-1
         LDE   =-1
         DIV   =-7
         LDG   K:X4
         SHF   A
         DCR   TMETBL
         LDG   K:X1
         SHF   E
         ADD   E
         ADD   B
         ADD   CCOTB5
         LDB   RTNPL1
         JMP   *SETOR
RTNPOL   DAT   INDEX-1
         DAT   0
CCOTB5   DAT   COATVO-LIUSER+CCOINX-1*16+X'8000'
RTNPL1   DAT   RTNPOL-1
RTNPLE   DAT   0
RTNPLA   DAT   0
         DAT   0
OUTSCB   EQU   $
         LDB   =TM4PRZ
         SST   *EXIT,B
         JMP   MASYNC
```

SETZER 17/1160

EXIT

MASYNC 17/900A

FIG. 17/900D

```
LCCTDE   LDG   P
         JMP   *CTDN
```

COUNTDOWN 17/1082

OUTSCA 17/900D

```
CHNBID  STF  LAST
        DCR  1,B
        ZJP  RESTCN
        NJP  RESTCN
LDCHN3  LDB  3,B
        ZJP  $+2
        JMP  CHNBID+1
        LDA  LAST
        INC  A
        STA  P
RESTCN  LDA  0,B
        STA  1,B
        LDC  2,B
        LDG  B
        LDF  HX002
LDA1CC  LDA  LDA03
        ADD  F
        STA  $+1
        DAT  0
        ZJP  LDA2CC
        LDB  =TMZPRZ
        SST  *BIDR,B
LDA2CC  DCR  F
        PJP  LDA1CC
        LDB  G
        LDC  0,C
        ZJP  LDCHN3
        JMP  LDA1CC-1
LDA03   LDA  1,C
```

RETURN

SUBBIDR 17/1020

FIG. 17/920

```
        LDF  BIDPOINT
NXTCHK  DCR  1,B
        ZJP  TDYEXP
NXTCHB  DCR  B
        DCR  B
        LDA  B
        SUB  TDYBUF
        ZJP  MBSYNC
        JMP  NXTCHK
TDYEXP  LDA  0,B
        LDF  B
        LDB  =TMZPRZ
        SST  *BIDR,B
        LDB  F
        LDA  B
        SUB  BIDPOINT
        ZJP  DCRBDP
        LDC  B
LDAMMV  LDA  2,C
        LDF  3,C
        STA  0,C
        STF  1,C
        LDA  C
        ADD  HX002
        SUB  BIDPOINT
        ZJP  DCRBDP
        INC  C
        INC  C
        JMP  LDAMMV
DCRBDP  DCR  BIDPOINT
        DCR  BIDPOINT
        JMP  NXTCHB
```

MBSYNC 17/900A

SUBBIDR 17/1020

```
SETTDY  CDP  4
        JMP  $+2
        ADI  DATSTZ
        LDG  P
        JMP  *SBT*
        DAT  2
        LDC  =DATSTZ
        STZ  *4,C
        INC  *4,C
        LDA  BIDPOINT
        SUB  TOTTDY
        NJP  $+3
        INC  *4,C
        JMP  LDDATS
        INC  BIDPOINT
        INC  BIDPOINT
        LDA  *2,C
        LDF  *3,C
        LDC  BIDPOINT
        STA  1,C
        STF  0,C
LDDATS  LDB  DATSTZ+1
        JMP  *MXSLX
DATSTZ  RES  5
```

ARGUMENT FETCH

RETURN

```
LGCT      SUB    3
          STA    LASTTD
          ADD    3
          INC    E
          STE    RTNADR
          LDE    *A
LGCT01    ZJP    *RTNADR        --> RETURN
          STE    B
          LDA    4,B
          LDC    P
          JMP    *BITLDR        --> BITLOD 17/1150
          PJP    LGCFAL
          LDA    2,B
          NJP    CANCELZ
          DCR    2,B
          ZJP    EXPIRED
LGCT02    LDA    B
          STA    LASTTD
          LDE    3,B
          JMP    LGCT01
RESLOG    INC    2,B
          ZJP    $+2
          JMP    LGCT02
          STZ    C
          JMP    EXPIRED+1
EXPIRED   LDC    HXFFFF
          LDA    5,B
          LDE    B
          STE    BTMDLY
          LDB    BTMDLZ
          LDC    C
          NJP    $+2
          JMP    *SETOR         --> SETZER 17/1160
          JMP    *SET1R         --> SETONR 17/1160
RTNSLG    LDE    3,B
          STZ    3,B
          STZ    2,B
          STE    3,A
          JMP    LGCT01
CANCELZ   LDC    2,B
          JMP    EXPIRED+1
LGCFAL    LDA    2,B
          NJP    RESLOG
          JMP    CANCELZ
RTNLPL    EQU    $-1
          DAT    RTNSLG-1
BTMDLY    DAT    0
BTMDLZ    DAT    RTNLPL
RTNADR    DAT    0
MPYER     DAT    LORES-1
LASTTD    DAT    0
          DAT    0
```

ARGUMENT FETCH

FIG. 17/950A

```
SYNMDB   EQU   $                      NOGROP   LDE   P
SYNCLK   INC   7*SEL                           JMP   FINDFIL      --> FINDFIL 17/960
         STZ   NINDEX                          LDA   ADRES0
         JMP   INPLST                          ADD   KINDEX
SYNRMV   INC   7*SEL                           LDE   C
         STZ   NINDEX                          STE   *A
         DCP   NINDEX                 LDBALC   LDB   C
INPLST   CDR   4                               LDE   P
         JMP   $+2                             JMP   FINDFIL
         ADD   DATSTY                          LDA   ALPHA1
         LDG   P                               STA   0,B
         JMP   *SAT*                           STA   1,B
         DAT   3                               LDA   C
         LDC   =DATSTY                         STA   2,B
         LDA   *2,C                   LDAPHO   LDA   ALPHA0
         STA   ALPHA0                          STA   1,C
         LDA   *4,C                            STZ   0,C
         STA   ALPHA1                 RETADC   LDB   DATSTY+1
         STZ   *5,C                            JMP   *M*SEX       --> RETURN
         INC   *5,C                   FNDSLT   LDE   P
         LDE   5,C                             JMP   FINDFIL
         STE   ERRTN                           LDA   C
         STZ   KINDEX                          STA   3,B
         LDE   *3,C                            JMP   LDBALC
         ZJP   PERIOD                 FRQEND   LDB   2,B
         DCP   E                               LDA   0,B
         ZJP   NOT10TH                         ZJP   $+3
         INC   KINDEX                          LDB   0,B
         JMP   NOTMIN                          JMP   $-3
PERIOD   STZ   E                               LDA   ALPHA0
         DIV   =10                             LDE   2,B
         LDE   E                               ZJP   LDAZ1T
         ZJP   NOT10TH                         LDF   3,B
         LDB   ADRES1                          ZJP   LDAZ2T
         JMP   BRANCH                          LDE   P
NOT10TH  INC   KINDEX                          JMP   FINDFIL
         STA   ALPHA1                          LDA   C
         DIV   =60                             STA   0,B
         LDE   E                               JMP   LDAPHO
         ZJP   NOTMIN                 LDAZ1T   STA   2,B
         LDB   ADRES2                          JMP   RETADC
         JMP   BRANCH                 LDAZ2T   STA   3,B
NOTMIN   INC   KINDEX                          JMP   RETADC
         STA   ALPHA1
         LDB   ADRES3
BRANCH   LDA   NINDEX
         NJP   REMOVL

         LDB   B
         ZJP   NOGROP
CNTMDL   LDA   0,B
         EOR   ALPHA1
         ZJP   FRQEND
         LDA   3,B
         ZJP   FNDSLT
         LDB   3,B
         JMP   CNTMDL
```

REMOVL 17/950B

FIG. 17/950B

RETADC 17/950A (EXIT)

```
ERRLZX   INC   *ERRTN
         JMP   RETADC
REMOVL   STZ   NINDEX
         DCR   NINDEX
         LDB   B
         ZJP   ERRLZX
LDREML   LDA   0,B
         FOR   ALPHA1
         ZJP   FOOFRQ
         LDA   3,B
         ZJP   ERRLZX
         LDA   B
         STA   LASTA
         LDB   3,B
         STZ   NINDEX
         JMP   LDREML
FOOFRQ   EQU   $
         LDA   B
         STA   LAST
         LDB   2,B
         STZ   MINDEX.
         DCR   MINDEX
         LDG   B
LDACIN   LDE   HX002
         INC   G
         LDA   *G
         FOR   ALPHA0
         ZJP   FDAPNT
         DCR   E
         PJP   LDACIN+1
         LDA   B
         STA   LAST
         LDB   0,B
         ZJP   ERRLZX
         STZ   MINDEX
         JMP   LDACIN-1
FDAPNT   LDC   0,B
         ZJP   SYNRMV1
         LDA   B
         STA   LASTA
SYNRMV2  LDA   0,C
         ZJP   FNDCHN
         LDA   C
         STA   LASTA
         LDC   0,C
         JMP   SYNRMV2
ENDCHN   LDA   C
         SUB   HX002
ENDLDC   LDE   3,C
         ZJP   $+2
         JMP   ENDCHK
         DCR   C
         JMP   ENDLDC
ENDCHK   STE   *G
         STZ   3,C
         SUB   C
         ZJP   LASTSK
         JMP   RETADC

LASTSK   INC   C
         INC   C
         LDE   P
         JMP   REMOVE
         LDC   LASTA
         STZ   0,C
         JMP   RETADC
SYNRMV1  STZ   *G
         LDC   G
         STZ   C
         DCR   E
         NJP   RETADC
         ZJP   $+2
         JMP   $+2
         DCR   G
LDASYN   LDA   1,C
         STZ   1,C
         STA   0,C
         ZJP   $+2
         DCR   G
         INC   C
         DCR   E
         PJP   LDASYN
         LDA   G
         NJP   RETADC
         LDC   LAST
         LDA   MINDEX
         ZJP   NOT1ST
         LDA   3,C
         STA   LAST
         LDE   P
         JMP   REMOVE
         LDC   B
         LDF   P
         JMP   REMOVE
         LDA   NINDEX
         NJP   OSTCNT
         LDC   LASTA
         LDA   LAST
         STA   3,C
         JMP   RETADC
NOT1ST   STZ   0,C
         LDC   B
         LDE   P
         JMP   REMOVE
         JMP   RETADC
OSTCNT   LDF   LAST
         LDA   ADRESO
         ADD   KINDEX
         STE   *A
         JMP   RETADC
```

REMOVE 17/970

RETADC 17/950A (EXIT)

17/950A RETADC (EXIT)

```
FINDFIL   LDC    ENDPOINT
          LDA    0,C
          ZJP    ENDCOR
          STA    ENDPOINT
RTFIND    INC    E
          STF    P          → RETURN
ENDCOR    LDA    C
          ADD    HX004
          SUB    TOTCOR
          PJP    ERRCZX     → ERRCZX 17/950B
          ADD    TOTCOR
          STA    ENDPOINT
          JMP    RTFIND
```

FIG. 17/960

```
REMOVE    LDA    ENDPOINT
          STA    0,C
          LDA    C
          STA    ENDPOINT
          STZ    1,C
          STZ    2,C
          STZ    3,C
          INC    E
          STF    P          → RETURN
```

FIG. 17/970

SUBUNPAC

```
SUBUNPAC STA    SUBTASK
         AND    K!1ST
         LDG    *S|C+4
         SHF    A
         STA    TASK

         LDA    SUBTASK
         AND    *X'07FF'
         STA    SUB

         AND    *X'07F0'
         LDG    *SRC+4
         SHF    A
         STA    GRAUP

         LDA    SUB
         AND    K!4TH
         STA    BIT

         INC    E
         JMP    *E          --> RETURN
```

FIG. 17/1000

SUBLOC

```
SUBLOC   INC    Z!SFL
         JMP    $+3         (ARGUMENT FETCH)
         ADL    SAT!-1
         ADL    P0AL3
         LDG    P
         JMP    *$-3
         LDA    *ARG1
         LDE    P
         JMP    SUBUNPAC    <--> SUBUNPAC 17/1000
         CDR    M!1
         LDB    *FILTAB
         LDC    TASK
         STZ    *ARG4
         INC    *ARG4
         LDA    *GRPTAB-FILTAB,B
         NJP    LOCEXIT-2
         SUB    GRAUP
         NJP    LOCEXIT-2
         LDA    *PNTTAB-FILTAB,B
         ADD    SUB
         STA    C
         LDA    *STRTAB-FILTAB,B
         ZJP    LOCEXIT-1
         STA    *ARG2
         LDA    *LGHTAB-FILTAB,B
         AND    *X'07FF'
         STA    *ARG3
         JMP    LOCEXIT
         INC    *ARG4
         INC    *ARG4
LOCEXIT  LDB    BSAVE13
         CDR    M00
         JMP    *M!SFX      --> EXIT
```

FIG. 17/1011

SUBLINK

```
SUBLINK   INC   Z:SFI
          JMP   $+3
          ADI   SAT:-1
          ADL   PBBL1
          LDG   P
          JMP   *$-3
          LDA   *SUBTSK
          LDF   P
          JMP   SUBUNPAC

          CDR   M11
          LDB   *FILTAB
          LDC   TASK
          STZ   *ERRBRLBC
          INC   *ERRBRLBC

          LDA   *GRPTAB-FILTAB,B
          NJP   SBLKEXIT-1
          SUB   GRBUP
          NJP   SBLKEXIT-1

          LDA   *PNTTAB-FILTAB,B
          ADD   SUB
          STA   C

          LDA   *STRTAB-FILTAB,B
          ZJP   $+2
          JMP   SBLKEXIT-2

          LDA   *STRSEC
          STA   *STRTAB-FILTAB,B
          LDA   *PRBLGH
          STA   *LGHTAB-FILTAB,B
          JMP   SBLKEXIT

          INC   *ERRBRLBC
          INC   *ERRBRLBC
SBLKEXIT  LDB   BSAVES
          CDR   M00
          JMP   *M:SFX
```

ARGUMENT FETCH

SUBUNPAC 17/1000

RETURN

FIG. 17/1012

SUBRMOVE

```
SUBRMOVE LDG   P
         JMP   TSA1              --> ARGUMENT FETCH
         LDA   *A
REMVR    EQU   $-1
         INC   Z:SFI
         LDE   P
         JMP   SUBUNPAC          --> SUBUNPAC 17/1000

         LDA   B
         STA   BSAVF11
         CDR   M11
         LDB   *FILTAB
         LDC   TASK

         LDA   *GRPTAB-FILTAB,B
         NJP   RMVXT
         SUB   GROUP
         NJP   RMVXT

         LDA   *TSKTAB-FILTAB,B
         ADD   GROUP
         STA   C
         STA   IDXSAVE

         LDA   *TIMTAB-FILTAB,B
         LDC   BIT
         AND   *MSKTAB-FILTAB,B
         ZJP   REMOVE

RMVXT    CDR   M00+RIL
         LDB   BSAVF11
         JMP   *MISFX            --> EXIT
REMOVE   LDA   *MSKTAB-FILTAB,B
         EOR   K:XFFFF
         STA   E
         LDC   IDXSAVE
         CDR   SI1
         AND   *ACTTAB-FILTAB,B
         STA   *ACTTAB-FILTAB,B
         LDA   E
         AND   *RSDTAB-FILTAB,B
         STA   *RSDTAB-FILTAB,B
         LDA   E
         AND   *DSKTAB-FILTAB,B
         STA   *DSKTAB-FILTAB,B
         LDA   E
         AND   *TRCTAB-FILTAB,B
         STA   *TRCTAB-FILTAB,B

         LDC   TASK
         LDA   *PNTTAB-FILTAB,B
         ADD   SUB
         STZ   *STRTAB-FILTAB,B
         STZ   *LGHTAB-FILTAB,B
         JMP   RMVXT
```

FIG. 17/1013

Figure 17:
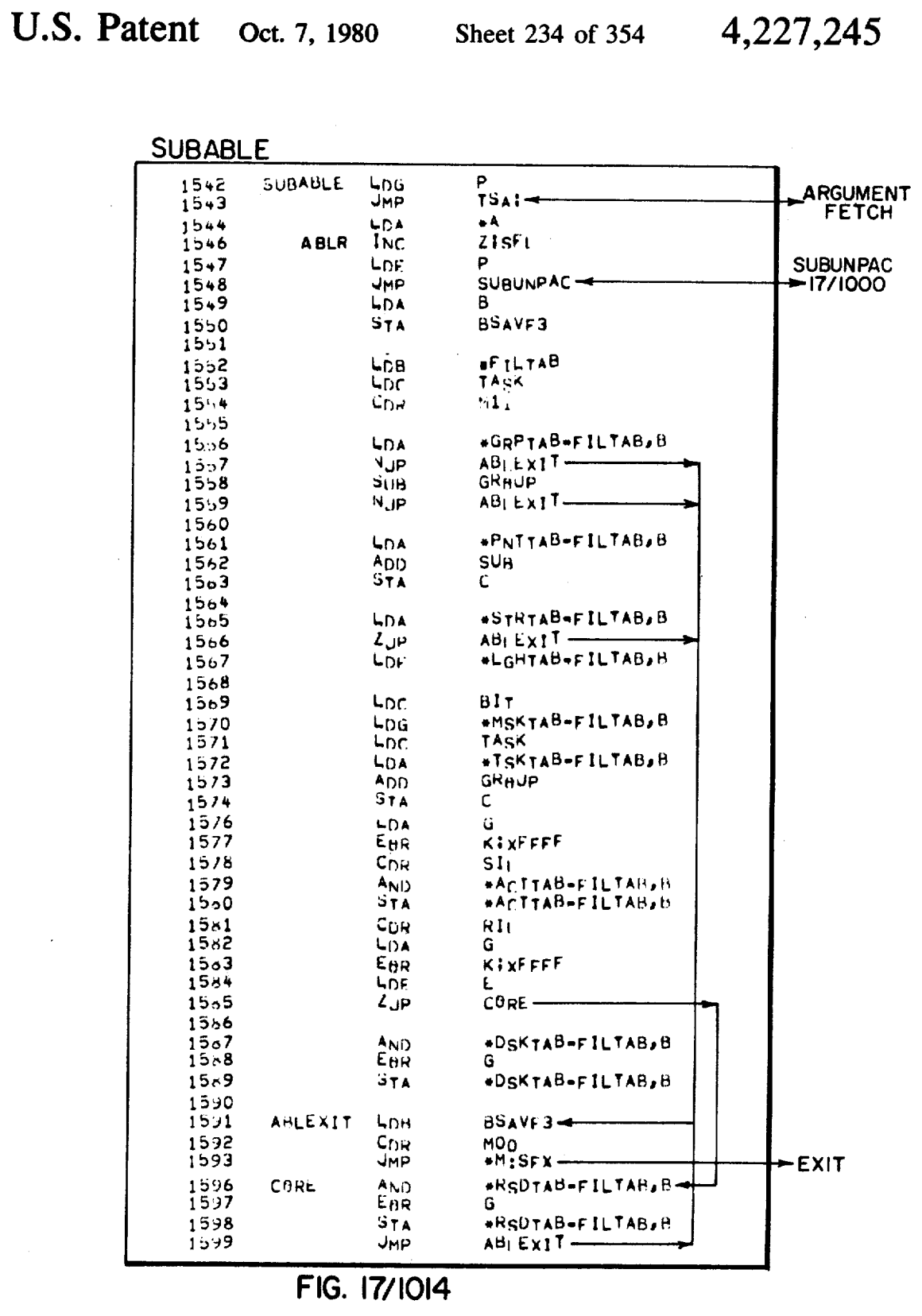

SUBABLE

```
SUBABLE   LDG   P
          JMP   TSA:                     <- ARGUMENT FETCH
          LDA   *A
ABLR      INC   ZISFL
          LDE   P
          JMP   SUBUNPAC                 <- SUBUNPAC 17/1000
          LDA   B
          STA   BSAVF3

          LDB   *FILTAB
          LDC   TASK
          CDR   MI1

          LDA   *GRPTAB-FILTAB,B
          NJP   ABLEXIT
          SUB   GROUP
          NJP   ABLEXIT

          LDA   *PNTTAB-FILTAB,B
          ADD   SUB
          STA   C

          LDA   *STRTAB-FILTAB,B
          ZJP   ABLEXIT
          LDF   *LGHTAB-FILTAB,B

          LDC   BIT
          LDG   *MSKTAB-FILTAB,B
          LDC   TASK
          LDA   *TSKTAB-FILTAB,B
          ADD   GROUP
          STA   C
          LDA   G
          EOR   K:XFFFF
          CDR   SI1
          AND   *ACTTAB-FILTAB,B
          STA   *ACTTAB-FILTAB,B
          CDR   RI1
          LDA   G
          EOR   K:XFFFF
          LDE   E
          ZJP   CORE

          AND   *DSKTAB-FILTAB,B
          EOR   G
          STA   *DSKTAB-FILTAB,B

ABLEXIT   LDH   BSAVF3
          CDR   MOO
          JMP   *M:SFX                   -> EXIT
CORE      AND   *RSDTAB-FILTAB,B
          EOR   G
          STA   *RSDTAB-FILTAB,B
          JMP   ABLEXIT
```

FIG. 17/1014

DISABLE

```
1606  DISABLE   LDG   P
1607            JMP   TSA;
1608            LDA   *A
1610  DABR      INC   Z;SFI
1611            LDE   P
1612            JMP   SUBUNPAC
1613            LDA   B
1614            STA   BSAVF4
1615
1616            LDB   *FILTAB
1617            CDR   M11
1618            LDC   BIT
1619
1620            LDA   *MSKTAB-FILTAB,B
1621            STA   E
1622            EOR   K;XFFFF
1623            STA   G
1624
1625            LDA   *GRPTAB-FILTAB,B
1626            NJP   DSABEXIT
1627            SUB   GROUP
1628            NJP   DSABEXIT
1629
1630            LDC   TASK
1631            LDA   *TSKTAB-FILTAB,B
1632            ADD   GROUP
1633            STA   C
1634
1635            LDA   *DSKTAB-FILTAB,B
1636            AND   E
1637            ZJP   CORRSD
1638            EOR   *DSKTAB-FILTAB,B
1639            STA   *DSKTAB-FILTAB,B
1640
1641  DSABEXIT  LDB   BSAVF4
1642            CDR   M00
1643            JMP   *M:SFX
1646  CORRSD    LDA   *RSDTAB-FILTAB,B
1647            AND   G
1648            STA   *RSDTAB-FILTAB,B
1649            JMP   DSABEXIT
```

ARGUMENT FETCH

SUBUNPAC 17/1000

EXIT

FIG. 17/1015

SUBTRACE

```
SUBTRACE  INC   ZISF1
          JMP   $+3
          ADL   SATI.1        ARGUMENT FETCH
          ADL   PBAL2
          LDG   P
          JMP   *$.3
          LDA   *SBTASK
          LDF   P
          JMP   SUBUNPAC      SUBUNPAC 17/1000

          CDR   M11
          LDB   *FILTAB
          LDC   TASK

          LDA   *GRPTAB-FILTAB,B
          NJP   TRCEXIT
          INC   *ARGUMT
          ZJP   ALLOFF
          SUB   GRAUP
          NJP   TRCEXIT

          LDA   *TSKTAB-FILTAB,B
          AND   GRAUP
          STA   E

          LDC   BIT
          LDA   *MSKTAB-FILTAB,B
          LDC   E
          STA   E
          EOR   K:XFFFF
          AND   *TRCTAB-FILTAB,B
          DCR   *ARGUMT
          ZJP   $+2
          EOR   E
          STA   *TRCTAB-FILTAB,B

TRCEXIT   LDB   BSAVE6
          CDR   M00
          JMP   *M:SFX        EXIT

ALLOFF    STA   E
          ADD   *TSKTAB-FILTAB,B
          STA   C
          STZ   *TRCTAB-FILTAB,B
          DCR   E
          NJP   TRCEXIT
          DCR   C
          JMP   $-4
```

FIG. 17/1016

SYSTIT

```
SYSTIT     INC     ZISFL
           LDA     B
           STA     BSAVF12

           LDB     *FILTAB
           LDC     *BIDTBEND*ACTIVE
           CDR     SIL+M11

SZERBBID   STZ     *ACTTAB-FILTAB,B
           DCR     C
           PJP     SZFRBBID

           STZ     TDLINK
           STZ     SUSPLINK

           LDC     *BIDTBEND-ACTIVE
SZERBTD    STZ     *TIMTAB-FILTAB,B
           DCR     C
           PJP     SZFRBTD

           LDC     *BIDTBEND-ACTIVE
SZERBRSD   LDA     K:XFFFF
           EBR     *DSKTAB-FILTAB,B
           AND     *RSDTAB-FILTAB,B
           STA     *RSDTAB-FILTAB,B
           DCR     C
           PJP     SZFRBRSD

           LDC     *BUFNUM-1
ZERBRSBD   STZ     *BIDTAB-FILTAB,B
           DCR     C
           PJP     ZERBRSBD
           LDC     *BUFNUM-1
ZERBRSRD   STZ     *RFDTAB-FILTAB,B
           DCR     C
           PJP     ZERBRSRD

           LDA     K:4TH
           STA     C
           STA     SYSTASK
HTTASK     LDA     *TSKTAB-FILTAB,B
           NJP     DCRTASK
           LDB     *DTPABL
           SST     *M:HT,B          ---> HALT TASK
           LDB     *FILTAB
DCRTASK    DCR     C
           NJP     HALTDISK
           DCR     SYSTASK
           JMP     HTTASK

HALTDISK   LDA     *DSKLVL
           STA     SYSTASK
           SST     *M:HT,B          ---> HALT DISCAN PROGRAM
           LDR     RIL+M00
           LDB     BSAVF12
           JMP     *M:SFX           ---> EXIT
```

FIG. 17/1017

SUBBID

ARGUMENT FETCH

```
1172  SUBBID   LDG  P
1173           JMP  TSA! ---------------> ARGUMENT FETCH
1174           LDA  *A
1177  SUBBIDR  CDR  SIL
1178           STA  SUBLVTSK
1179           AND  K!1ST
1180           LDG  *SLC+4
1181           SHF  A
1182           STA  TSKNUM
1183           LDA  SUBLVTSK
1184           AND  *X!07F0!
1185           LDG  *SRC+4
1186           SHF  A
1187           STA  GRPNUM
1188           LDA  SUBLVTSK
1189           AND  K!4TH
1190           STA  BITNUM
1192           LDA  B
1193           STA  BSAVF1
1194           LDB  *FILTAB
1195           LDC  TSKNUM
1196           CDR  M11
1198           LDA  *GRPTAB*FILTAB,B
1199           AND  SUSPFLAG
1200           NJP  NOBID
1201           LDA  *GRPTAB*FILTAB,B
1202           NJP  BIDIT
1203           SUB  GRPNUM
1204           NJP  EXCEED
1206           LDA  *TSKTAB*FILTAB,H
1207           ADD  GRPNUM
1208           STA  G
1209           STA  C
1211           LDA  *RSDTAB*FILTAB,B
1212           LDC  BITNUM
1213           AND  *MSKTAB*FILTAB,B
1214           ZJP  CKDISK
                    TO 1216

FROM 1214 --> 
1216  DISKRTN  LDC  G
1217           LDA  *TIMTAB*FILTAB,B
1218           LDC  BITNUM
1219           AND  *MSKTAB*FILTAB,B
1220           ZJP  NOTDLY
1221           EBR  SUSPFLAG
1222           ZJP  NOBID
1224  NOTDLY   LDA  *MSKTAB*FILTAB,B
1225           STA  E
1226           EBR  K!XFFFF
1227           LDC  G
1228           AND  *ACTTAB*FILTAB,B
1229           EBR  E
1230           STA  *ACTTAB*FILTAB,B
1232  BIDIT    LDA  TSKNUM
1233           LDB  BSAVF1
1234           CDR  MOO
1235           STZ  SUSPFLAG
1236           JMP  S!N+3 --------------> BID TASK
1238  CKDISK   LDA  *MSKTAB*FILTAB,B
1239           LDC  G
1240           AND  *DSKTAB*FILTAB,B
1241           ZJP  NOBID
1242           LDA  *DSKLVL
1243           STA  TSKNUM
1244           INC  BIDFLAG
1245           JMP  DISKRTN
1247  EXCEED   AND  SUSPFLAG
1248           NJP  NOBID
1249           LDA  SUBLVTSK
1250           AND  *X!0FFF!
1251           SUB  *X!0FFF!
1252           ZJP  BIDIT
1253  NOBID    STZ  SUSPFLAG
1254           LDB  BSAVF1
1255           LST  1,B ----------------> EXIT
```

FIG. 17/1020

UNSUSP

```
2056   UNSUSP   CDR   SIL
2057            STZ   SUSPFLAG
2058            DCR   SUSPFLAG
2059            JMP   SUBBID+1
```

SUBBID + 2 17/1020

FIG. 17/1021

BASIC TASK PROGRAM

```
1112            CDR   SAL
1113   SPEXIT   SST   *EXIT,B
1114            CDR   RAL
1115            LDA   P
1116            JMP   CHKENT
1127            LDF   E
1128            ZJP   SPEXIT-1
1129            LDA   A
1130            NJP   TDSTART
1131            AND   *X'7FF'
1132            SUB   1,C
1133            PJP   $+3
1134            ADD   1,C
1135            JMP   *ERROR
1136            ADD   1,C
1137            SUB   0,C
1138            PJP   $+5
1139            ADD   0,C
1140            LDB   *PROL+1
1141            INC   E
1142            JMP   *E
1143            ADD   0,C
1144            JMP   *P:INTSTR
1145
1146   TDSTART  AND   *X'7FF'
1147            SUB   0,C
1148            PJP   TDCHAIN
1149            ADD   0,C
1150            LDB   E
1151            LDA   6,B
1152            AND   *X'3FC0'
1153            ZJP   NORPRG
1154            LDF   *RFLBUF+1
1155            STE   3,B
1156            LDG   *SRA+6
1157            SHF   A
1158            ADD   *CORLOC+1
1159            LDA   *A
1160            INC   A
1161            DCR   B
1162            JMP   *A
1163   NORPRG   EST   *E
1164   TDCHAIN  ADD   0,C
1165            JMP   *P:INTTD
```

ENTER TASK LEVEL (→ 1114)

EXIT TASK LEVEL (← 1113)

CHKBID 17/1050 (← 1116)

TO PROGRAM SUBLEVEL (← 1142)

TO CONTROL CHAIN PROCESSOR I*START 17/700A (← 1144)

TO SUBTASK IN CORE BUFFER (← 1162)

RESTART PROGRAM (↔ 1163)

TO CONTROL CHAIN PROCESSOR I*INTTD 17/710 (← 1165)

FIG. 17/1030

BASIC SUBTASK EXIT PROGRAM

```
1036  RELBUF   LDA   7,B
1037           AND   =X'3FC0'
1038           ZJP   CKCORE
1039           LDG   =SRC+6
1040           SHF   A
1041           ADD   =RFSBID-1
1042  RELESBF  STZ   *A
1043           ADD   =BUFNUM
1044           STZ   *A
1045           ADD   =BUFNUM
1046           LDA   *A
1047           LDE   A
1048           AND   K:1ST
1049           LDG   =SLC+4
1050           SHF   A
1051           ADD   =TASKTBL
1052           LDC   *A
1053           LDA   E
1054           AND   =X'07F0'
1055           LDG   =SRC+4
1056           SHF   A
1057           ADD   C
1058           ADD   =RSDTBL
1059           STA   G
1060           LDA   E
1061           AND   K:4TH
1062           ADD   MSKTAB
1063           LDA   *A
1064           EOR   *G
1065           STA   *G
1066           INC   Z:SFI
1067           LDA   B
1068           STA   BSAVE20
1069           LDA   =DSKLVL
1070           LDH   =RFGPOBL
1071           CDR   MUO
1072           SST   S:TN+3,B
1073           LDH   BSAVE20
1074           JMP   *M:SEX
1076  CORERTN  EST   1,B
1077
1078  CKCORE   LDA   Z:CPR
1079           ADD   =CSR
1080           LDA   *A
1081           PJP   CORERTN
1082           AND   K:X7FFF
1083           STA   E
1084           LDA   Z:CPR
1085           ADD   =POINTADR
1086           LDA   *A
1087           ADD   E
1088           ADD   =LENGTH
1089           LDA   *A
1090           AND   =X'F800'
1091           LDG   =SLC+5
1092           SHF   A
1093           ADD   =RFSBID
1094           JMP   RELESBF
```

BID DISCAN PROGRAM (line 1072)

EXIT (line 1074)

EXIT (FOR CORE RESIDENT SUBTASKS) (line 1076)

FIG. 17/1040

CHKBID SUBROUTINE

FROM 17/1052 → 1368
FROM 17/1051 → 1414
FROM 17/1054 → 1353
FROM 17/1053 → 1327
FROM 17/1055 → 1330

```
1270  CHKBID
1271  CHKENT    INC   Z:SFL
1272            STA   RTNSAVE
1273
1274            CDR   M11
1275            LDA   *FILTAB
1276            LDC   Z:CPR
1277
1278            LDA   *TSKTAB*FILTAB,B
1279            NJP   CHKEXT
1327  CHKEXT    STZ   ADRSAVE
1328            JMP   REGGEN
1330  FOUNDBIT  CDR   SIL
1331            LDA   *ACTTAB*FILTAB,E
1332            LDG   C
1333            LDC   E
1334            EBR   *MSKTAB*FILTAB,B
1335            LDC   G
1336            STA   *ACTTAB*FILTAB,B
1337            CDR   RIL
1338
1339            LDA   G
1340            SUB   LOWPBINT
1341            LDG   *SLC+4
1342            SWF   A
1343            ADD   E
1344            STA   SUBSAVE
1345
1346            LDA   *DSKTAB*FILTAB,B
1347            LDG   C
1348            LDC   E
1349            AND   *MSKTAB*FILTAB,B
1350            ZJP   $+2
1351            LDA   K:X8000
1352            EBR   SUBSAVE
1353            LDC   Z:CPR
1354            STA   *CSRTAB*FILTAB,B
1355            NJP   DISKPROG            → 17/1054
1356
1357            ADD   *PNTTAB*FILTAB,B
1358            STA   C
1359            LDA   *STKTAB*FILTAB,B
1360            STA   ADRSAVE
1361
1362  DISKRTRN  LDC   G
1363            LDA   *TRCTAB*FILTAB,B
1364            LDC   E
1365            AND   *MSKTAB*FILTAB,B
1366            ZJP   NOTRACE
1367            SST   TRACF               → 17/1052
1368  NOTRACE   LDC   E
1369            LDA   *MSKTAB*FILTAB,B
1370            LDC   G
1371            AND   *TIMTAB*FILTAB,B
1372            ZJP   REGGEN              → 17/1051
1414  REGGEN    LDA   *Z:ORIG
1415            ADD   Z:CPR
1416            LDA   *A
1417            SUB   K:X2
1418            STA   C
1419            ADD   *10
1420            STA   B
1421
1422            CDR   M00
1423            LDA   SUBSAVE
1424            LDE   ADRSAVE
1425            LDG   RTNSAVE
1426            JMP   AP:SIBRL+1          → 17/1056
                                          → 17/1053
```

FIG. 17/1050

REMOVE SUBLEVEL FROM LINKAGE

FROM 17/1050 → 1374

```
1374             EØR     *TIMTAB-FILTAB,B
1375             STA     *TIMTAB-FILTAB,B
1376
1377             LDA     ZICPR
1378             LDG     *SRC+4
1379             SHF     A
1380             ADD     SUBSAVE
1381             STA     E
1382
1383
1384
1386             LDG     *SUSPLINK
1387             LDC     SUSPLINK
1388  CNTLØØP    LDA     1,C
1389             SUB     E
1390             ZJP     FØUNDDLY
1391             LDG     C
1392             LDC     *C
1393             ZJP     CKTDLINK
1394             JMP     CNTLØØP
1395
1396  CKTDLINK   LDG     *TDLINK
1397             LDC     TDLINK
1398             JMP     CNTLØØP
1399
1400  FØUNDDLY   LDA     *C
1401             STA     *G
1402
1403
1405
1406             LDA     C
1407             SUB     K:X3
1408             STA     ADRSAVE
1409
1410             LDA     SUBSAVE
1411             EØR     K:X8000
1412             STA     SUBSAVE
```

1412 SUBSAVE → TO REGGEN 17/1050

FIG. 17/1051

TRACE

FROM 17/1050 → 1430

```
1430  TRACE      LDA     ZICPR
1431             LDG     *SRC+4
1432             SHF     A
1433             ADD     SUBSAVE
1434             CDR     M00
1435             LDG     P
1436             JMP     TRACPRØG
1437             EST     TRACRTN
```

1436 TRACPRØG → TO TRACE PROGRAM

1437 TRACRTN → TO STEP 1368 (17/1050)

FIG. 17/1052

```
         STA   LOWPAINT
         ADD   *GRPTAB-FILTAB,B
         STA   C

CHKWRD   LDE   K:4TH
         LDA   *TIMTAB-FILTAB,B
         EAR   *RSDTAB-FILTAB,B
         STA   G
         LDA   *TIMTAB-FILTAB,B
         AND   *RSDTAB-FILTAB,B
         EAR   G
         AND   *ACTTAB-FILTAB,B
         ZJP   NONESET
NONESET  DCR   C
         LDA   C
         SUB   LOWPAINT
         PJP   CHKWRD
```

TO 17/1054

TO CKEXT (17/1050)

FIG. 17/1053

```
DISKPROG EAR   *X'C000'
         STA   SUBSAVE
         AND   *X'07FF'
         ADD   *PNTTAB-FILTAB,B
         STA   C
         LDA   G
         STA   TEMPGREG
         LDA   *LGHTAB-FILTAB,B
         AND   *X'F800'
         LDG   *SLC+5
         SHF   A
         ADD   *CARLOC
         LDA   *A
         STA   ADRSAVE
         LDG   TEMPGREG
         JMP   DISKRTRN
```

FINDBIT

FROM 17/1053

```
         NJP   FOUNDBIT
         SUB   K:X100
         PJP   CHECKHI
         SDA   S80000
         LDG   *SWC+8
         SHF   A
         NJP   FOUNDBIT
         SUB   K:X100
CHECKHI  EQU   $
         SUB   K:2ND
         PJP   CHECKLO
         SDA   S40000
         LDG   S2004
         SHF   A
         NJP   FOUNDBIT
         JMP   SCAN
CHECKLO  EQU   $
         ADD   K:X1000
SCAN     EQU   $
         DCR   E
         ADD   A
         PJP   SCAN
         JMP   FOUNDBIT
```

APLSLORL

17/1050 →

```
APLSLORL  CDR   SAL
          INC   G
          STA   GTFM1
          DCR   Z:SFL
          ZJP   GSFX1
GSFX1     LDA   GTFM1
          CDR   RAI
          JMP   *G

GSFXI     LDA   Z:CALL
          ZJP   GSFX1
          STF   GTFM2
          LDF   Z:ARG
          INC   E
          INC   E
          LDA   *Z:START
          ADD   Z:CFR
          STF   *A
          LDA   G
          STA   *E
          INC   E
          LDA   B
          STA   *E
          INC   E
          LDA   C
          STA   *E
          INC   E
          INC   E
          LDA   GTFM2
          STA   *E
          INC   E
          LDA   GTFM1
          STA   *E
          JMP   SCH1
```

→ TO EXECUTIVE SCHEDULER (10/202 IN FIG. 10A)

FIG. 17/1056

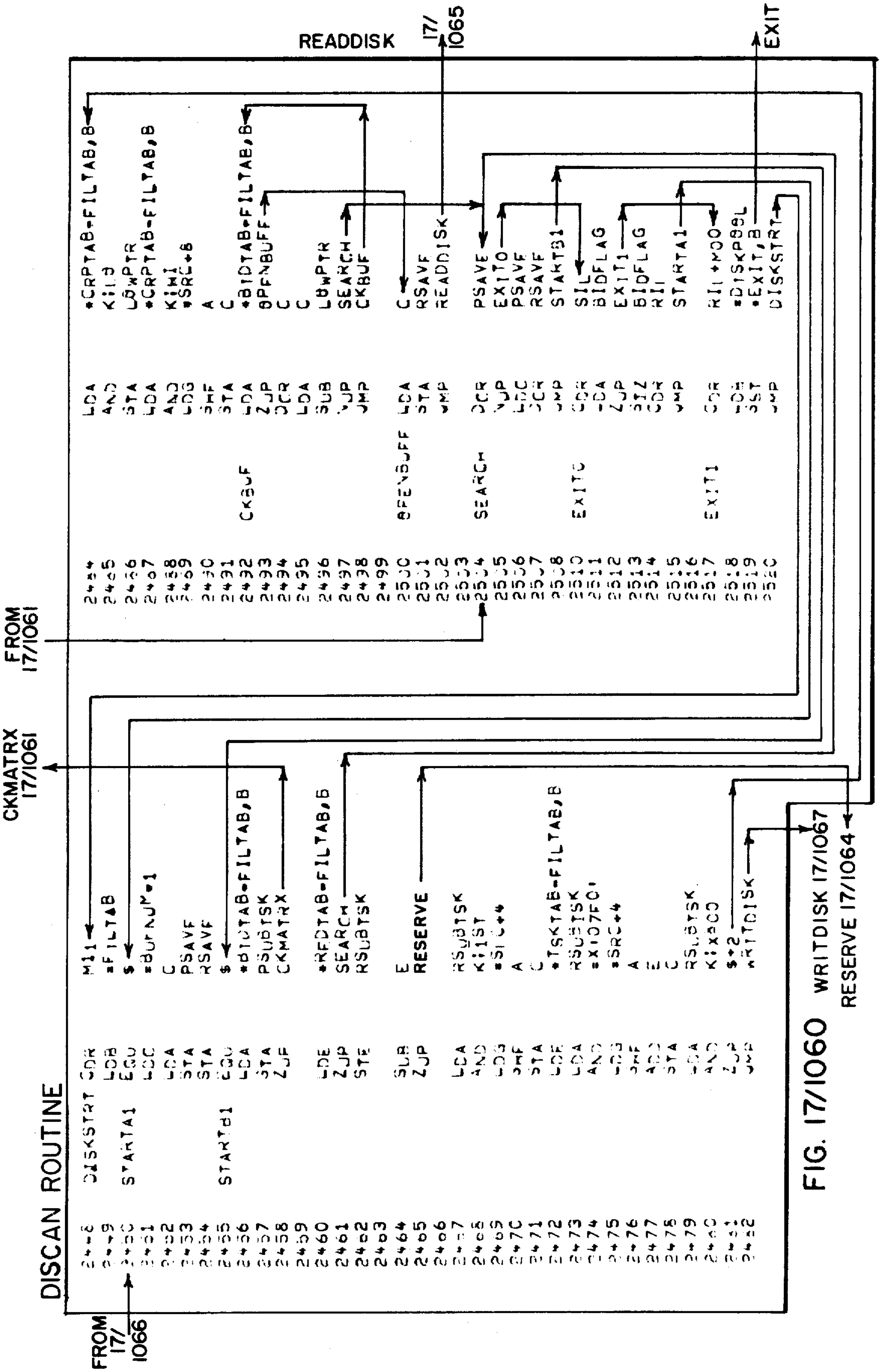
FIG. 17/1060

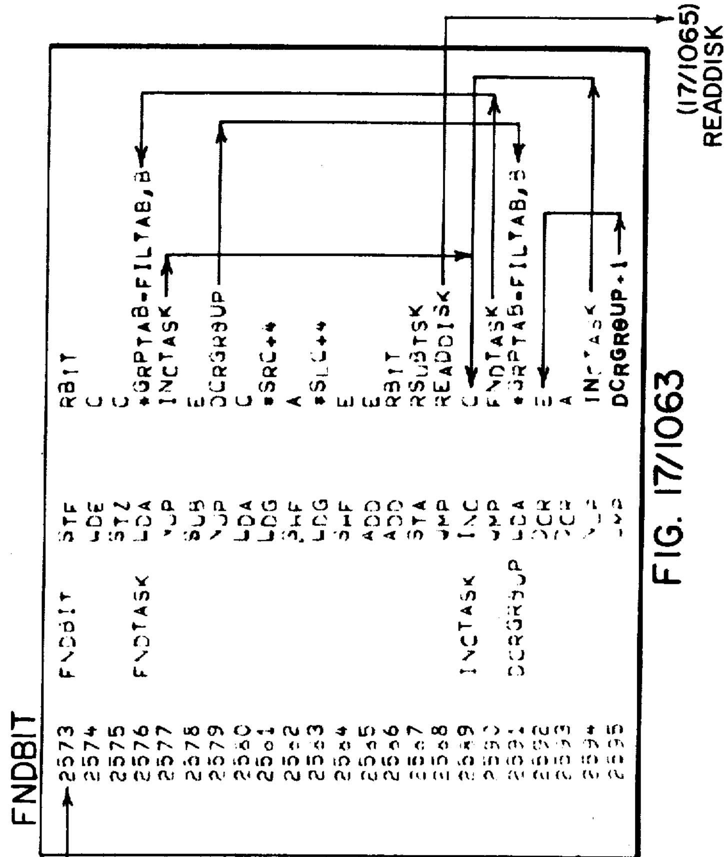
FIG. 17/1063
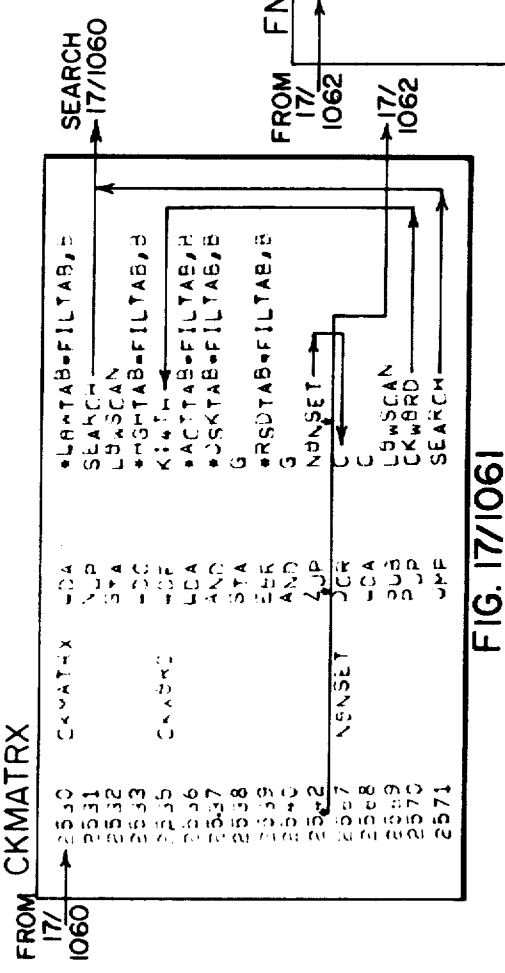
FIG. 17/1061
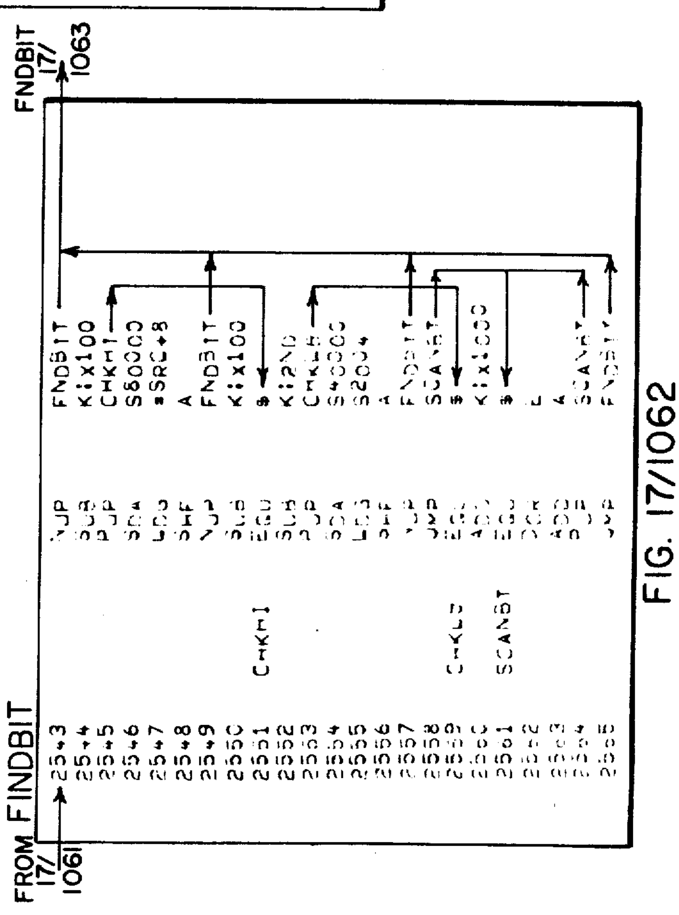
FIG. 17/1062

FROM 17/1060

WRITDISK

```
EOR     RSUBTSK
STA     RSUBTSK
AND     K:1ST
LDG     =SLC+4
SHF     A
STA     C
LDE     *PNTTAB-FILTAB,B
LDA     RSUBTSK
AND     =X'7FF'
ADD     E
STA     C

LDA     *LGHTAB-FILTAB,B
AND     =X'F800'
LDG     =SLC+5
SHF     A
LDF     C
STA     C

LDA     *INCTAB-FILTAB,B
SUB     RSUBTSK
ZJP     $+2
JMP     CKSTUS

LDA     *CØRTAB-FILTAB,B
STA     DCHRLØC
LDC     E
LDA     *STRTAB-FILTAB,B
STA     DSECTØR
LDA     *LGHTAB-FILTAB,B
AND     =X'7FF'
STA     DLENGTH
LDB     =DISKPØØL
SST     MASSWT,B
LDB     =FILTAB
JMP     CKSTUS
```

CKSTUS 17/1066

MASSWT

FIG. 17/1064

READDISK

FROM 17/1060, 17/1063, 17/1067

```
READDISK LDA    RSUBTSK
         AND    K:1ST
         LDG    *SRC+4
         SHF    A
         STA    RTASK
         LDA    RSUBTSK
         AND    *X'07FF'
         STA    RSUBLVL
         AND    *X'07F0'
         LDG    *SRC+4
         SHF    A
         STA    RGRBUP
         LDA    RSUBTSK
         AND    K:4TH
         STA    RBIT

         LDC    RSAVE
         LDA    *INCTAB-FILTAB,B
         SUB    RSUBTSK
         ZJP    NBREAD
         LDA    RSUBTSK
         STA    *INCTAB-FILTAB,B

         LDC    RTASK
         LDA    *PNTTAB-FILTAB,B
         ADD    RSUBLVL
         STA    C

         LDA    *STRTAB-FILTAB,B
         STA    DSECTBR
         LDA    *LGHTAB-FILTAB,B
         AND    *X'07FF'
         STA    DLENGTH
         LDF    RSAVE
         LDG    *SRC+5
         SHF    E
         ADD    E
         STA    *LGHTAB-FILTAB,B
         LDC    RSAVE
         LDA    *CBRTAB-FILTAB,B
         STA    DCBRLOC
         LDB    *DISKPOOL
         SST    MASSRD,B
         LDB    *FILTAB

NBREAD   LDC    RTASK
         LDA    *TSKTAB-FILTAB,B
         ADD    RGRBUP
         STA    G
         LDC    RBIT
         LDA    *MSKTAB-FILTAB,B
         STA    E
         EOR    K:XFFFF
         LDC    G
         AND    *RSDTAB-FILTAB,B
         EOR    E
         STA    *RSDTAB-FILTAB,B
         JMP    CKSTUS
```

MASSRD

CKSTUS 17/1066

FIG. 17/1065

Figure 17:
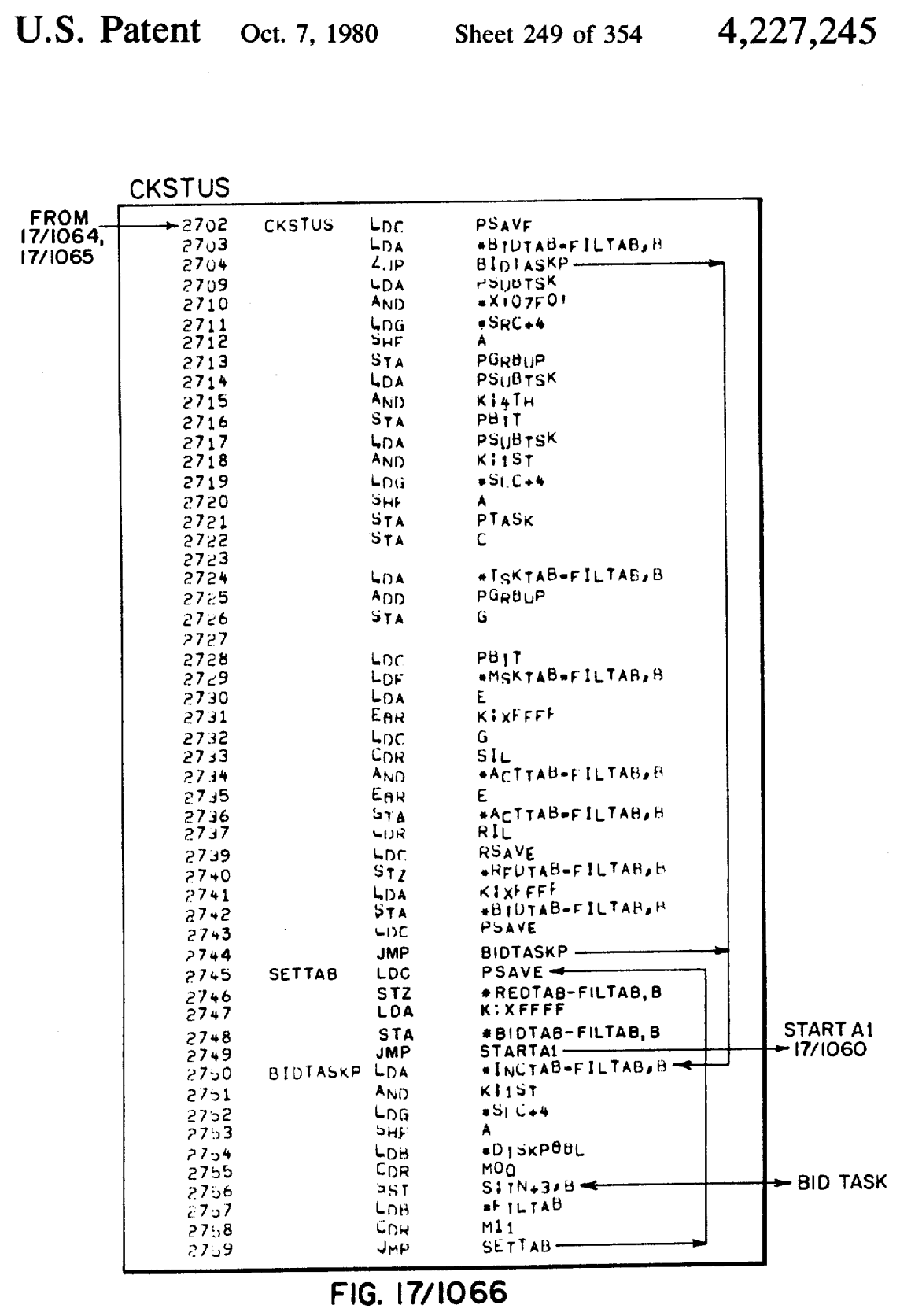

CKSTUS

FROM 17/1064, 17/1065

```
2702  CKSTUS    LDC   PSAVE
2703            LDA   *BIDTAB-FILTAB,B
2704            ZJP   BIDTASKP
2709            LDA   PSUBTSK
2710            AND   =X'07F0'
2711            LDG   *SRC+4
2712            SHF   A
2713            STA   PGRBUP
2714            LDA   PSUBTSK
2715            AND   K;4TH
2716            STA   PBIT
2717            LDA   PSUBTSK
2718            AND   K;1ST
2719            LDG   *SLC+4
2720            SHF   A
2721            STA   PTASK
2722            STA   C
2723
2724            LDA   *TSKTAB-FILTAB,B
2725            ADD   PGRBUP
2726            STA   G
2727
2728            LDC   PBIT
2729            LDF   *MSKTAB-FILTAB,B
2730            LDA   E
2731            EOR   K;XFFFF
2732            LDC   G
2733            CDR   SIL
2734            AND   *ACTTAB-FILTAB,B
2735            EOR   E
2736            STA   *ACTTAB-FILTAB,B
2737            CDR   RIL
2739            LDC   RSAVE
2740            STZ   *REDTAB-FILTAB,B
2741            LDA   K;XFFFF
2742            STA   *BIDTAB-FILTAB,B
2743            LDC   PSAVE
2744            JMP   BIDTASKP
2745  SETTAB    LDC   PSAVE
2746            STZ   *REDTAB-FILTAB,B
2747            LDA   K;XFFFF
2748            STA   *BIDTAB-FILTAB,B
2749            JMP   STARTA1
2750  BIDTASKP  LDA   *INCTAB-FILTAB,B
2751            AND   K;1ST
2752            LDG   *SLC+4
2753            SHF   A
2754            LDB   *DISKPOBL
2755            CDR   M00
2756            SST   S;TN+3,B
2757            LDB   *FILTAB
2758            CDR   M11
2759            JMP   SETTAB
```

START A1 17/1060

BID TASK

FIG. 17/1066

RESERVE

FROM 17/1060 →

```
RESERVE  LDA   *INCTAB-FILTAB,B
         STA   F
         AND   K*1ST
         LDG   =SLC+4
         SHF   A
         STA   RTASK
         LDA   F
         AND   =X'07F0'
         LDG   =SRC+4
         SHF   A
         STA   RGROUP
         LDA   E
         AND   K*4TH
         STA   RBIT

         LDC   RTASK
         LDA   *TSKTAB-FILTAB,B
         ADD   RGROUP
         STA   F

         LDC   RBIT
         LDA   *MSKTAB-FILTAB,B
         EOR   K*XFFFF
         LDC   E
         AND   *RSDTAB-FILTAB,B
         STA   *RSDTAB-FILTAB,B
         JMP   READDISK
```

→ READDISK 17/1065

FIG. 17/1067

READ

```
READ      LDG   P
          JMP   TSAI
          LDA   *A
          INC   ZISFI
READENT   STA   SUBARG
          LDA   B
          STA   BSAVF8

          INC   RSRFLAG
          ZJP   RSRV1
          LDA   SUSPLINK
          STA   4,B
          LDA   B
          ADD   KIX4
          STA   SUSPLINK

RSRV1RTN  LDA   *CSR
          ADD   ZICPR
          LDA   *A
          AND   KIX7FFF
          LDE   ZICPR
          LDG   *SRC+4
          SHE   E
          ADD   E
          STA   5,B

          LDF   P
          JMP   SUBUNPAC
          LDB   *FILTAB
          CDR   MI1
          INC   RSRFLAG
          ZJP   RSRV2
          STZ   RSRFLAG
          LDC   BIT

          LDF   *MSKTAB-FILTAB,B
          LDC   TASK
          LDA   *TSKTAB-FILTAB,B
          ADD   GROUP
          STA   C

          LDA   *TIMTAB-FILTAB,B
          EBR   E
          STA   *TIMTAB-FILTAB,B

          LDA   E
          EBR   KIXFFFF
          CDR   SIL
          AND   *ACTTAB-FILTAB,B
          STA   *ACTTAB-FILTAB,B
          CDR   RIL

RSRV2RTN  LDC   TASK
          LDA   *PNTTAB-FILTAB,B
          ADD   SUB
          STA   C

          LDA   *LGHTAB-FILTAB,B
          AND   *X'F800'
          LDG   *SLC+5
          SHF   A
          STA   C
```

ARGUMENT FETCH

SUBUNPAC 17/1000

FIG. 17/1070A

READ CONT.

```
                    LDA   SUBTASK
                    STA   *BIDTAB*FILTAB,B

                    LDA   SUBARG
                    INC   WRITFLAG
                    ZJP   SETWRITE
                    STZ   WRITFLAG
          WRITERTN  STA   *REDTAB*FILTAB,B

                    INC   READFLAG
                    ZJP   TRANSF
          MODFYD    LDB   BSAVEB
                    LDA   6,B
                    AND   *X'C03F'
                    INC   READFLAG
                    ZJP   ENTXN
          ENTXNRTN  STA   6,B
                    STZ   READFLAG

                    LDA   *DSKLVL
                    LDB   *DATABBL
                    CDR   MOO
                    SST   SIIN+3,B

                    LDA   *ZIORIG
                    ADD   ZICPR
                    LDB   *A
                    DCR   B
                    JMP   *MISFX

          TRANSF    DCR   READFLAG
                    LDE   P
                    JMP   SUBUNPAC
                    LDC   TASK
                    LDA   *TSKTAB*FILTAB,B
                    ADD   GROUP
                    STA   C
                    LDA   *CRPTAB*FILTAB,B
                    AND   K'LB
                    ADD   K'X1
                    LDG   *SIC+6
                    SHF   A
                    STA   XNSAVE
                    JMP   MODFYD
          ENTXN     EOR   XNSAVE
                    JMP   ENTXNRTN

          RSRV1     DCR   RSRFLAG
                    JMP   RSRV1RTN
          RSRV2     LDA   SUBARG
                    STA   SUBTASK
                    JMP   RSRV2RTN

          SETWRITE  EOR   K'X800
                    JMP   WRITERTN
```

BID DISCAN TASK LEVEL

EXIT

SUBUNPAC 17/1000

FIG. 17/1070B

READT

```
2338   READT   LDG   P
2339           JMP   TSAI      <-> ARGUMENT FETCH
2340           LDA   *A
2342           INC   ZISFL
2343           DCR   READFLAG
2344           JMP   READENT   --> READENT 17/1070A
```

FIG. 17/1071

RSRBID

```
2353   RSRBID  LDG   P
2354           JMP   TSAI      <-> ARGUMENT FETCH
2355           LDA   *A
2357           INC   ZISFL
2358           DCR   RSRFLAG
2359           JMP   READENT   --> READENT 17/1070A
```

FIG. 17/1072

WRITE

```
2430   WRITE   LDG   P
2431           JMP   TSAI      <-> ARGUMENT FETCH
2432           LDA   *A
2434           INC   ZISFL
2435           DCR   WRITFLAG
2436           JMP   READENT   --> READENT 17/1070A
```

FIG. 17/1073

TIMDLY

```
         TIMDLY   LDG   P
                  JMP   TSAI
                  LDA   *A
                  INC   Z:SFL
                  STA   6,B
                  LDA   *CSR
                  ADD   Z:CPR
                  LDA   *A
                  AND   K:X7FFF
                  LDE   Z:CPR
                  LDG   *SRC+4
                  SHF   E
                  ADD   E
                  STA   5,B
                  LDE   P
                  JMP   SUBUNPAC
                  LDA   6,B
                  NJP   SUSPENTR
                  LDA   TDLINK
                  STA   4,B
                  LDA   B
                  ADD   K:X4
                  STA   TDLINK

         SUSPRTN  LDB   *FILTAB
                  CDR   M:1
                  LDC   B:T
                  LDA   *MSKTAB-FILTAB,B
                  EOR   K:XFFFF
                  STA   E

                  LDC   TASK
                  LDA   *TSKTAB-FILTAB,B
                  ADD   GROUP
                  STA   C

                  CDR   S:L
                  LDA   *ACTTAB-FILTAB,B
                  AND   E
                  STA   *ACTTAB-FILTAB,B
                  LDA   E
                  EOR   K:XFFFF
                  EOR   *TIMTAB-FILTAB,B
                  STA   *TIMTAB-FILTAB,B
                  CDR   R:L

                  LDA   *Z:ORIG
                  ADD   Z:CPR
                  LDB   *A
                  DCR   B
                  CDR   MOO
                  JMP   *M:SFX
         SUSPENTR LDA   SUSPLINK
                  STA   4,B
                  LDA   B
                  ADD   K:X4
                  STA   SUSPLINK
                  JMP   SUSPRTN
```

- JMP TSAI → ARGUMENT FETCH
- JMP SUBUNPAC → SUBUNPAC 17/1000
- JMP *M:SFX → EXIT

FIG. 17/1080

TIMERMV

```
TIMERMV   LDG   P
          JMP   TSAI
          LDA   *A
          INC   ZISFL
          LDE   P
          JMP   SUBUNPAC
          LDA   B
          STA   BSAVF10
          LDB   *FILTAB
          LDC   TASK
          CDR   M11
          LDA   *GRPTAB*FILTAB,B
          NJP   TRMVXT
          SUB   GROUP
          NJP   TRMVXT
          LDA   *TSKTAB*FILTAB,B
          ADD   GROUP
          STA   C
          STA   GRPIDX
          LDA   *TIMTAB*FILTAB,B
          LDC   BIT
          AND   *MSKTAB*FILTAB,B
          ZJP   TRMVXT
          CDR   SIL
          LDF   SUBTASK
          LDG   *TDLINK
          LDC   TDLINK
SUBLOOK   ZJP   TRMVXT
          LDA   1,C
          SUB   E
          ZJP   FOUNDSUB
          LDG   C
          LDC   *C
          JMP   SUBLOOK
FOUNDSUB  LDA   *C
          STA   *G
          LDC   GRPIDX
          LDA   *TIMTAB*FILTAB,B
          LDC   BIT
          EOR   *MSKTAB*FILTAB,B
          LDC   GRPIDX
          STA   *TIMTAB*FILTAB,B
TRMVXT    CDR   RIL*M00
          LDB   BSAVF10
          JMP   *M:SFX
```

ARGUMENT FETCH

SUBUNPAC 17/1000

EXIT

FIG. 17/1081

COUNTDOWN

```
COUNTDWN INC      G
         LDE      *TDLINK
         LDC      TDLINK
LINKZER0 ZJP      *G                    --> EXIT
         DCR      2,C
         NJP      REBID
         LDE      C
         LDC      *C
         JMP      LINKZER0
REBID    LDA      *C
         STA      CSAVE1
         STA      *E
         LDA      SUSPLINK
         STA      *C
         LDA      C
         STA      SUSPLINK
         LDA      B
         STA      BSAVE7
         LDA      G
         STA      GSAVE1
         STE      ESAVE1
         LDA      1,C
         STA      SUBTASK1
         AND      =X'07F0'
         LDG      =SRC+4
         SHF      A
         STA      GR0UP1
         LDA      SUBTASK1
         AND      K14TH
         STA      BITNUM1
         LDA      SUBTASK1
         AND      K11ST
         LDG      =SLC+4
         SHF      A
         STA      SUBTASK1
         STA      C
         LDB      =FILTAB
         CDR      M11
         LDA      =TSKTAB-FILTAB,B
         ADD      GR0UP1
         STA      E
         LDC      BITNUM1
         LDA      =MSKTAB-FILTAB,B
         LDC      E
         CDR      SI1
         EOR      =ACTTAB-FILTAB,B
         STA      =ACTTAB-FILTAB,B
         CDR      RI1+M00
         CDR      M00
         LDA      SUBTASK1
         LDB      =DATP00L
         SST      S1IN+3,B              <--> BID TASK LEVEL
         LDB      BSAVE7
         LDG      GSAVE1
         LDE      ESAVE1
         LDC      CSAVE1
         JMP      LINKZER0
```

FIG. 17/1082

RELSBUF

```
RELSBUF  LDG   P
         JMP   TSAI
         LDA   *A
         INC   ZISFL
         LDE   P
         JMP   SUBUNPAC
         LDA   B
         STA   BSAVF9
         LDB   *FILTAB
         LDC   TASK
         CDR   M11
         LDA   *PNTTAB-FILTAB,B
         INC   A
         ZJP   RELEXIT
         DCR   A
         ADD   SUB
         STA   C
         LDA   *LGHTAB-FILTAB,B
         AND   *X'F800'
         LDG   *SLC+5
         SHF   A
         STA   C
         LDA   *INCTAB-FILTAB,B
         SUB   SUBTASK
         ZJP   CBRCSUB
RELEXIT  LDB   BSAVE9
         CDR   M00
         JMP   *MISFX
CBRCSUB  STZ   *BIDTAB-FILTAB,B
         STZ   *REDTAB-FILTAB,B
         LDC   BIT
         LDF   *MSKTAB-FILTAB,B
         LDC   TASK
         LDA   *TSKTAB-FILTAB,B
         ADD   GROUP
         STA   C
         LDA   *RSDTAB-FILTAB,B
         EOR   E
         STA   *RSDTAB-FILTAB,B
         LDA   *DSKLVL
         LDB   *BIDPBBL
         CDR   M00
         SST   SIIN+3,B
         JMP   RELEXIT
```

ARGUMENT FETCH

SUBUNPAC 17/1000

EXIT

BID DISCAN TASK LEVEL

FIG. 17/1090

DIGITAL SCAN ENTRY

```
                AND     =X'7FF'
                SUB     =DSLOWS
                ADD     =RGSTRT
                LDE     *A
                STE     START
                ADD     =NUMREG-RGSTRT
                LDA     *A
                STA     NUM
                LDA     B
                STA     POOL
                CDR     M11
                LDB     =TBLORG
ENTER           EQU     $
                LDC     START
                LDE     *11,B
                LDC     *1,B
                LDA     C
                SUB     ACTEST
                NJP     SCN01          SCN01 17/1101C
                                       17/1101B
NEXTWD          EQU     $
                DCR     NUM
                ZJP     $+3
                INC     START
                JMP     ENTER
                LDA     POOL
                INC     A
                LDA     *A
                JMP     *A             RETURN
```

FIG. 17/1101A

```
                LDA     *8,B
                EOR     E
                ZJP     NEXTWD         NEXTWD 17/1101A
                STE     *8,B
                JMP     NEXTWD
```

FIG. 17/1101B

```
SCN01           EQU     $
                LDA     *2,B
                EOR     K:XFFFF
                AND     E
                STA     E
                LDA     *2,B
                AND     *8,B
                EOR     E
                STA     TEMP
                EOR     *8,B
                STA     CHNG
                LDA     *8,B
                EOR     *5,B
                EOR     *6,B
                STA     E
                LDA     *4,B
                EOR     K:XFFFF
                AND     E
                ZJP     SCN03          SCN03 17/1101E
                                       17/1101D
```

FIG. 17/1101C

```
         STA    CHNG2
         LDA    C
         STA    SAVC
         LDG    K:X4
         SHF    A
         ADD    =LCWORD-BITTBL
         STA    BASTMP
         LDC    =BITTBL+16
MAL00    EQU    $
         DCR    C
         LDE    CHNG2
         ZJP    SCN02
         LDA    E
         AND    K:HI
         ZJP    MAL03
MAL02    AND    K:1ST
         ZJP    MAL04
MAL01    LDG    K:X1
         SHF    E
         CJP    MAL05
         DCR    C
         JMP    $-3
MAL03    LDG    K:X8
         SHF    E
         LDA    C
         SUB    K:X8
         LDC    A
         LDA    E
         JMP    MAL02
MAL04    LDG    K:X4
         SHF    E
         LDA    C
         SUB    K:X4
         LDC    A
         JMP    MAL01
MAL05    EQU    $
         STE    CHNG2
         LDA    C
         STA    MSKADR
         LDC    SAVC
         LDA    *BASTMP-TBLORG,B
         STA    VALU
         AND    K:X4000
         ZJP    MAL06
         LDA    *4,B
         AND    *MSKADR
         ZJP    $+2
         JMP    SCN02
         LDA    VALU
         AND    =X'1FFF'
         ADD    =TRNBUF
         STA    TNFR
```

SCN02 17/1101E

MAL06 17/1101D CONT.

SCN02 17/1101E

FIG. 17/1101D

```
            LDA     *A
            STA     NAME1
            LDA     *8,B
            AND     *MSKADR
            ZJP     $+2
            LDA     K:X1
            STA     VALUE
            LDA     *5,B
            AND     *MSKADR
            ZJP     $+2
            JMP     $+2
            LDA     K:X1
            STA     STATUS
            CDR     M00
            STZ     FLGWRD
            SST     *MSWR,B          --> TO MESSAGE WRITER
            DAT     DEVICE-TBLORG
            DAT     TYPE-TBLORG
            DAT     FORM-TBLORG
            DAT     NAME-TBLORG
            DAT     VALUE-TBLORG
            DAT     STATUS-TBLORG
            DAT     FLGWRD-TBLORG
            CDR     M11
            LDA     FLGWRD
            ZJP     $+2
            JMP     MAL06
            LDA     *6,B
            EOR     *MSKADR
            STA     *6,B
MAL06       LDC     MSKADR
            JMP     MAL00            --> MAL00 17/1101D
CHNG2       DAT
MSKADR      DAT
```

FIG. 17/1101D CONT.

```
SCN02       EQU     $
            LDC     SAVC
SCN03       EQU     $
            LDA     CHNG
            ZJP     NEXTWD           --> NEXTWD 17/1101A
            LDA     TEMP
            STA     *8,B
            LDA     C
            STA     SAVC
            LDG     K:X4
            SHF     A
            STA     REGN
            ADD     =LCWORD-BITTBL
            STA     BASTMP
            LDC     =BITTBL+16
NEXTBT      EQU     $
            DCR     C
```

FIG. 17/1101E

```
                LDE     CHNG
                ZJP     NEXTWD          → NEXTWD 17/1101E
                LDA     E
                AND     K:HI
                ZJP     INR70
        INR69   AND     K:1ST
                ZJP     INR71
        INR68   LDG     K:X1
                SHF     E
                CJP     SCN04
                DCR     C
                JMP     $-3
        INR70   LDG     K:X8
                SHF     E
                LDA     C
                SUB     K:X8
                LDC     A
                LDA     E
                JMP     INR69
        INR71   LDG     K:X4
                SHF     E
                LDA     C
                SUB     K:X4
                LDC     A
                JMP     INR68
        SCN04   EQU     $
                STE     CHNG
                LDA     C
                STA     MSKADR
                SUB     =BITTBL
                ADD     REGN
                STA     WRDBIT
                LDA     TEMP
                AND     *C
                STA     IMAG
                LDA     *BASTMP-TBLORG,B
                AND     K:X7FFF
                LDE     IMAG
                ZJP     $+2
                EOR     K:X8000
                STA     *BASTMP-TBLORG,B
                AND     K:X7FFF
                ZJP     SCN06
                STA     VALU
                LDA     *C
                STA     MSKK
                LDC     SAVC
                LDA     RETNAD
                STA     RTRN
                JMP     SCN07           → SCN07 17/1103A
                LDC     MSKADR
        SCN06   EQU     $
                JMP     NEXTBT          → NEXTBT 17/1101A
        RETNAD  DAT     SCN06-2
```

FIG. 17/1101E CONT.

```
TBLORG   DAT
         DAT    INVERT
         DAT    LISCNR
         DAT    LIENTD
         DAT    LILMTR
         DAT    LIALMT
         DAT    LIALRM
         DAT    TRGTBL
         DAT    LIUSER
         DAT    LCWORD
         DAT    TRNBUF
         DAT    LIMGTB
ACTEST   DAT    COPASO-LIUSER
```

FIG. 17/1102

```
COMMON   EQU    $
         STA    TEMP
         INC    E
         STE    RTRN
         NJP    *RTRN          → EXIT
         LDG    =X'4004'
         SHF    A
         STA    C
         LDA    TEMP
         ADD    FILIDX
         LDA    *A
         STA    VALU
         LDA    TEMP
         AND    K:4TH
         ADD    =BITTBL
         LDB    =TBLORG
         LDE    *A
         STE    MSKK
         LDA    VALU
         AND    K:X8000
         ZJP    $+3
         STE    IMAG
         JMP    SCN07
         STZ    IMAG
SCN07    EQU    $
         CDR    M11
         LDA    VALU
         AND    K:X4000
         STA    G
         LDA    *4,B
         AND    MSKK
         ZJP    SCN08
         LDA    G
         ZJP    SCN10          → SCN10 17/1103B
         JMP    SCN11          → SCN11 17/1103C
SCN08    EQU    $
         LDA    G
         ZJP    SCN20          → SCN20 17/1103B
         LDA    VALU
                               → TO 17/1103B
```

FIG. 17/1103A

```
         AND    =X'1FFF'
         ADD    =TRNBUF
         STA    TNFR
         LDA    *A
         STA    NAME1
         LDA    IMAG
         ZJP    $+2
         LDA    K:X1
         STA    VALUE
         LDA    *5,B
         AND    MSKK
         ZJP    $+2
         JMP    $+2
         LDA    K:X1
         STA    STATUS
         CDR    M00
         STZ    FLGWRD
         SST    *MSWR,B        --> TO MESSAGE WRITER
         DAT    DEVICE-TBLORG
         DAT    TYPE-TBLORG
         DAT    FORM-TBLORG
         DAT    NAME-TBLORG
         DAT    VALUE-TBLORG
         DAT    STATUS-TBLORG
         DAT    FLGWRD-TBLORG
         CDR    M11
         LDA    FLGWRD
         ZJP    $+2
         JMP    SCN09
SCN20    EQU    $
         LDA    IMAG
         EOR    *5,B
         AND    MSKK
         STA    TMP2
         LDA    MSKK
         EOR    K:XFFFF
         AND    *6,B
         ADD    TMP2
         STA    *6,B
         LDA    G
         ZJP    SCN10
SCN09    EQU    $
         INC    TNFR
         JMP    SCN12          --> SCN12 17/1103C
SCN10    EQU    $
         LDA    *7,B
         AND    MSKK
         ZJP    *RTRN          --> EXIT
         LDA    VALU
         AND    K:X2000
         ZJP    SCN11          --> SCN11 17/1103C
         LDA    VALU
         AND    =X'1E00'
         STA    TMP2
         LDA    VALU
         AND    =X'1FF'
         LDG    K:X3
                               --> TO 17/1103C
```

FIG. 17/1103B

```
         SHF    TMP2
         ADD    TMP2
         SST    *BIDR,B    --> SUBBID 17/1020
         JMP    *RTRN      --> EXIT
SCN11    EQU    $
         LDA    VALU
         AND    =X'1FFF'
         ADD    =TRNBUF
         STA    TNFR
         LDA    G
         ZJP    SCN13
         INC    TNFR
SCN12    EQU    $
         LDA    *7,B
         AND    MSKK
         ZJP    *RTRN      --> EXIT
         LDA    VALU
         AND    K:X2000
         ZJP    *RTRN
SCN13    EQU    $
         LDA    *TNFR
         SST    *BIDR,B    --> SUBBID 17/1020
         AND    K:X800
         ZJP    *RTRN
         INC    TNFR
         JMP    SCN13
```

FIG. 17/1103C

```
SETUP1   EQU    $
         LDG    =X'4003'
         LDA    TRGDAT4
         AND    =X'E00'
         ZJP    $+2
         PJP    SETUP4     --> SETUP4 17/1110C
         LDA    TRGDAT4
         AND    K:1ST
         SHF    A
         AND    =X'1E00'
         STA    C
         LDA    TRGDAT4
         AND    =X'1FF'
         ADD    C
         EOR    K:X2000
         STA    *E
                           --> TO 17/1110D (EXIT)
```

FIG. 17/1110B

```
TRGCON   CDR   4
         JMP   $+2
         ADL   CNPOOL
         LDG   P
         JMP   *SBT:
         DAT   2
         STZ   *TRGDAT2
         INC   *TRGDAT2
         LDA   *TRGDAT1
         NJP   ATVCHT
         SUB   =COPASO-LIUSER*16
         PJP   CONRTN
         JMP   ACVCHT
ATVCHT   SUB   =COPASO-LIUSER*16+X'8000'
         PJP   CONRTN
ACVCHT   ADD   =COPASO-LIUSER*16+LCWORD
         STA   E
         LDG   =X'4004'
         LDA   *TRGDAT1
         AND   K:X7FFF
         SHF   A
         ADD   TBLORG+7
         STA   G
         LDA   *TRGDAT1
         AND   K:4TH
         ADD   =BITTBL
         LDA   *A
         STA   C
         EOR   K:XFFFF
         AND   *G
         EOR   C
         STA   *G
         LDA   TRGEND
         ADD   K:X2
         SUB   =ENDTRN
         NJP   $+4
         INC   *TRGDAT2
         INC   *TRGDAT2
         JMP   CONRTN
         LDA   *TRGDAT
         STA   TRGDAT4
         STZ   C
         LDA   *E
         AND   K:X7FFF
         ZJP   SETUP1
         AND   =X'6000'
         ZJP   LNKADD
         LDG   =X'400D'
         SHF   A
         DCR   A
         ZJP   SETUP2
         STA   C
         DCR   A
         ZJP   $+2
         JMP   LNKADD
         LDA   *E
```

- ARGUMENT FETCH
- 17/1110D (EXIT)
- SETUP1 17/1110B
- SETUP2 17/1110C
- LNKADD 17/1110A CONT. 1.

FIG. 17/1110A

```
          EOR   K:X2000
          STA   *E
          JMP   LKADD3
LNKADD    EQU   $
          LDA   TRGDAT4
          EOR   K:X800
          STA   TRGDAT4
          LDA   *E
          AND   =X'1FFF'
          ADD   =TRNBUF
          STA   G
          LDA   C
          ZJP   $+2
LKADD2    INC   G
          LDA   *G
          SUB   TRGDAT4
          ZJP   CONRTN        17/1110D (EXIT)
          LDA   *G
          AND   K:X800
          ZJP   $+2
          JMP   LKADD2
          PJP   LKADD2
LKADD3    LDA   *3
          AND   =X'1FFF'
          ADD   =TRNBUF
          STA   STOPSF
          LDA   C
          ZJP   $+2
          INC   STOPSF
SHIFTR    EQU   $
          LDC   TRGEND
          INC   TRGEND
          LDG   TRGEND
          LDA   C
          SUB   STOPSF
          PJP   SFLOOP
          LDA   TRGDAT4
          STA   *G
          JMP   CONRTN
SFLOOP    EQU   $
          LDA   *C
          STA   *G
          LDA   C
          SUB   STOPSF
          ZJP   $+4
          DCR   C
          DCR   G
          JMP   SFLOOP
          LDA   TRGDAT4
          STA   *C
          LDA   *E
          AND   =X'1FFF'
          STA   C
          LDG   =ENDFIL
```

FIG. 17/1110A CONT. 1

```
CK1       EQU   $
          LDA   *G
          AND   K:X7FFF
          ZJP   CKLOOP
          AND   =X'6000'
          SUB   K:X2000
          ZJP   CKLOOP
          LDA   *G
          AND   =X'1FFF'
          SUB   C
          ZJP   CKLOOP
          NJP   CKLOOP
          INC   *G
CKLOOP    EQU   $
          DCR   G
          LDA   G
          SUB   FILIDX
          NJP   CONRTN    -> 17/1110D (EXIT)
          JMP   CK1
STOPSF    DAT
CNPOOL    EQU   $-1
          DAT   0
TRGDAT    DAT   0
TRGDAT1   DAT   0
TRGDAT2   DAT   0
TRGDAT3   DAT   0
TRGDAT4   DAT
```

FIG. 17/1110A CONT. 2

```
CONRTN    EQU   $
          LDB   1,C
          JMP   *M:SFX    -> EXIT
```

FIG. 17/1110D

```
ALMDAT    EQU   TRGDAT
ALMDAT1   EQU   TRGDAT1
ALMDAT2   EQU   TRGDAT2
ALMDAT4   EQU   TRGDAT4
ALMDAT3   EQU   TRGDAT3
ALMCON    EQU   $
          CDR   4
          JMP   $+2
          ADL   CNPOOL
          LDG   P
          JMP   *SBT:     -> ARGUMENT FETCH
          DAT   3
          STZ   *ALMDAT3
          INC   *ALMDAT3
          LDA   *ALMDAT1
          NJP   ALMCN1    -> ALMCN1 17/1120B
          SUB   =COPASO-LIUSER*16
          NJP   ALMCN2    -> ALMCN2 17/1120B
          INC   *ALMDAT3
          JMP   CONRTN    -> 17/1110D (EXIT)
```

FIG. 1120A

```
SETUP2   EQU   $
         LDA   *E
         EOR   K:X2000
         STA   *E
         LDA   TRGDAT4
         EOR   K:X800
         STA   TRGDAT4
SETUP3   EQU   $
         LDA   *E
         AND   =X'1FF'
         STA   C
         LDA   *E
         AND   =X'1E00'
         INC   TRGEND
         INC   TRGEND
         LDG   K:X3
         SHF   A
         ADD   C
         LDG   TRGEND
         STA   *G
         DCR   TRGEND
         LDA   TRGEND
         SUB   =TRNBUF
         AND   =X'1FFF'
         STA   G
         LDA   *E
         AND   =X'E000'
         ADD   G
         STA   *E
         LDA   TRGDAT4
         LDG   TRGEND
         STA   *G
         INC   TRGEND
         JMP   CONRTN
SETUP4   EQU   $
         INC   TRGEND
         LDA   TRGEND
         SUB   =TRNBUF
         AND   =X'1FFF'
         STA   G
         LDA   *E
         AND   =X'E000'
         ADD   G
         STA   *E
         LDA   TRGDAT4
         LDG   TRGEND
         STA   *G
         JMP   CONRTN      → 17/1110D (EXIT)
```

FIG. 17/1110C

```
ALMCN1   SUB   =COPASO-LIUSER*16+X'8000'
         PJP   CONRTN
ALMCN2   ADD   =COPASO-LIUSER*16+LCWORD
         STA   E
         LDA   *E
         AND   K:X4000
         ZJP   $+3
         INC   *ALMDAT3
         JMP   CONRTN
         LDA   TRGEND
         INC   A
         SUB   =ENDTRN
         NJP   $+4
         INC   *ALMDAT3
         INC   *ALMDAT3
         JMP   CONRTN
         LDA   *E
         EOR   K:X4000
         AND   K:X7FFF
         STA   *E
         CDR   M11
         LDA   B
         STA   POOL
         LDB   =TBLORG
         LDG   =X'4004'
         LDA   *ALMDAT1
         AND   K:X7FFF
         SHF   A
         STA   C
         LDA   *ALMDAT1
         AND   K:4TH
         ADD   =BITTBL
         LDA   *A
         STA   MSKK
         EOR   K:XFFFF
         STA   TEMP
         AND   *5,B
         LDG   ALMDAT2
         LDG   *G
         ZJP   $+2
         EOR   MSKK
         STA   *5,B
         LDA   *E
         LDG   ALMDAT2
         LDG   *G
         ZJP   $+2
         JMP   $+2
         EOR   K:X8000
         STA   *E
         LDA   ALMDAT1
         LDA   *A
         AND   K:X7FFF
         SUB   =CIATVE-LIUSER+1*16
         PJP   ALMCN3
         LDA   *8,B
         AND   TEMP
         LDG   ALMDAT2
         LDG   *G
         ZJP   $+2
         JMP   $+2
         EOR   MSKK
         STA   *8,B
```

17/1110D (EXIT)

ALMCN3 17/1120C

```
ALMCN3   EQU   $
         LDA   *6,B
         AND   TEMP
         STA   *6,B
         LDA   *4,B
         AND   TEMP
         STA   *4,B
         CDR   M00
         LDB   POOL
         STZ   C
         LDA   ALMDAT
         LDA   *A
         STA   ALMDAT4
         LDA   *E
         AND   =X'3FFF'
         ZJP   SETUP4      --> SETUP4 17/1110C
         AND   K:X2000
         ZJP   $+2
         JMP   SETUP3      --> SETUP3 17/1110C
         LDA   *E
         EOR   K:X2000
         STA   *E
         JMP   LKADD3      --> LKADD3 17/1110A
```

FIG. 17/1120C

```
DEL4     EQU   $
         LDA   *E
         AND   =X'7FF'
         STA   G
         LDC   *DELDAT1
         LDA   C
         AND   =X'7FF'
         EOR   G
         ZJP   $+2
         JMP   DEL6
         LDA   C
         AND   K:1ST
         STA   C
         LDA   *E
         AND   =X'1E00'
         LDG   K:X3
         SHF   A
         EOR   C
         ZJP   $+2
         JMP   DEL6
         LDA   *E
         AND   K:X8000
         STA   *E
DEL6     EQU   $
         LDA   ALCHK
         ZJP   $+2
         JMP   ALMD4       --> ALMD4 17/1140
         LDA   E
         SUB   FILIDX
         NJP   DELRTN      --> 17/1130C (EXIT)
         DCR   E
         JMP   DEL1        --> DEL1 17/1130A
```

FIG. 17/1130B

```
TRGDEL  EQU   $
        CDR   4
        JMP   $+2
        ADL   DLPOOL
        LDG   P
        JMP   *SBT:         --> ARGUMENT FETCH
        DAT   1
        STZ   *DELDAT2
        INC   *DELDAT2
        LDE   =ENDFIL
DEL1    EQU   $
        STZ   ALCHK
        LDA   *E
        AND   K:X7FFF
        ZJP   DEL6          --> DEL6 17/1130B
        STZ   C
        STZ   FRSTLC
        AND   =X'6000'
        ZJP   DEL2
        LDG   =X'400D'
        SHF   A
        DCR   A
        ZJP   DEL4          --> DEL4 17/1130B
        STA   C
        DCR   A
        ZJP   DEL6
DEL2    EQU   $
        LDA   *E
        AND   =X'1FFF'
        STA   TRNPTR
        ADD   =TRNBUF
        STA   SHFADR
        LDG   *DELDAT1
        LDC   C
        ZJP   $+3
        STA   FRSTLC
DEL3    INC   SHFADR
        LDC   SHFADR
        LDA   *C
        AND   =X'F7FF'
        EOR   G
        ZJP   FNDDEL        --> FNDDEL 17/1130C
        LDA   *C
        AND   K:X800
        ZJP   DEL6
        JMP   DEL3
```

FIG. 17/1130A

```
FNDDEL   EQU   $
         LDA   *C
         AND   K:X800
         ZJP   $+2
         JMP   LNKDEL
         LDA   TRNPTR
         ADD   =TRNBUF
         SUB   C
         ZJP   DEL75
         DCR   C
         LDA   C
         EOR   FRSTLC
         ZJP   DEL7
LNKLAA   LDA   *C
         AND   =X'F7FF'
         STA   *C
         JMP   LNKDEL
DEL75    LDA   *E
         AND   =X'8000'
         STA   *E
         STE   FRSTLC
         JMP   LNKDEL
DEL7     LDA   *E
         EOR   =X'2000'
         STA   *E
LNKDEL   EQU   $
         LDC   SHFADR
         LDG   C
DEL8     INC   G
         LDA   *G
         STA   *C
         LDA   C
         INC   C
         SUB   TRGEND
         NJP   DEL8
         DCR   TRGEND
DEL9     LDC   TRNPTR
         LDG   =ENDFIL
DEL10    EQU   $
         LDA   *G
         AND   K:X7FFF
         ZJP   DEL11
         AND   =X'6000'
         SUB   K:X2000
         ZJP   DEL11
         LDA   *G
         AND   =X'1FFF'
         SUB   C
         ZJP   DEL11
         NJP   DEL11
         DCR   *G
```

DEL 11
17/1130 CONT.

FIG.17/1130C

```
DEL11     EQU    $
          DCR    G
          LDA    G
          SUB    FILIDX
          NJP    DEL6      ---> DEL6 17/1130B
          JMP    DEL10     ---> DEL10 17/1130C
SHFADR    DAT
FRSTLC    DAT
DLPOOL    EQU    $-1
          DAT    0
DELDAT1   DAT    0
DELDAT2   DAT    0
DELDAT3   DAT    0
DELRTN    EQU    $
          LDB    1,B
          JMP    *M:SFX    ---> EXIT
```

FIG. 17/1130C CONT.

```
BITLOD    EOR    BITTBL+15
          NJP    UNPAK
          STA    E
          AND    K:4TH
          LDG    =X'4004'
          SHF    E
          ADA    LOGBAS
          LDA    *A
          AND    *E
          ZJP    1,C
          LDA    K:XFFFF
          JMP    1,C
UNPAK     ADD    FILXIX
          LDA    *A
          JMP    1,C       ---> EXIT
FILXIX    DAT    LCWORD-X'8000'
```

FIG. 17/1150

```
ALMDEL   EQU   $
         CDR   4
         JMP   $+2
         ADL   DLPOOL
         LDG   P
         JMP   *SBT:              --> ARGUMENT FETCH
         DAT   1
         STZ   *DELDAT2
         INC   *DELDAT2
         LDA   *DELDAT1
         NJP   ALMD1
         SUB   =COPASO-LIUSER*16
         PJP   DELRTN             --> 17/1130C (EXIT)
         JMP   ALMD2
ALMD1    SUB   =COPASO-LIUSER*16+X'8000'
         PJP   DELRTN
ALMD2    ADD   =COPASO-LIUSER*16+LCWORD
         STA   E
         LDA   *E
         AND   K:X4000
         PJP   ALMD3
         INC   *DELDAT2
         JMP   DELRTN
ALMD3    EQU   $
         LDA   *E
         EOR   K:X4000
         STA   *E
         AND   K:X2000
         STA   TGCHK
         LDA   *E
         AND   =X'1FFF'
         ADD   =TRNBUF
         STA   SHFADR
         STA   ALCHK
         STZ   ONCHK
         JMP   LNKDEL             --> LNKDEL 17/1130C
ALMD4    EQU   $
         LDA   TGCHK
         ZJP   ALMD5              --> ALMD5 17/1140 CONT.
         LDC   SHFADR
         LDA   *C
         AND   K:X800
         PJP   DELRTN
         LDA   *C
         AND   =X'E00'
         ZJP   $+2
         JMP   DELRTN
         LDG   X'4003'
         LDA   *C
         AND   K:1ST
         SHF   A
         AND   =X'1E00'
         STA   C
         LDA   *SHFADR
         AND   =X'1FF'
         ADD   C
```

FIG. 17/1140

```
          EOR    K:X2000
          STA    *E
          STA    ONCHK
          STZ    TGCHK
          JMP    LNKDEL      --> LNKDEL 17/1130C
ALMD5     EQU    $
          LDA    ONCHK
          ZJP    $+2
          JMP    DELRTN      --> 17/1130C (EXIT)
          LDA    *E
          AND    K:X8000
          STA    *E
          JMP    DELRTN
```

FIG. 17/1140 CONT.

```
PASSVE    EQU    $
          LDA    WRDBIT
          AND    K:4TH
          LDE    RELADR
          ADA    LOGBAS
          LDA    *A
          STA    MSKK
          AND    *E
          ZJP    *0,C        --> } RETURN
          JMP    *1,C        --> } (EXIT)
CHNGBT    LDA    MSKK
          EOR    *E
          STA    *E
          LDA    B
          STA    SAVB
          LDA    C
          STA    SAVC
COCHK     EQU    $
          LDA    RELADR
          SUB    CCOBGN
          NJP    TRCCHK
          SUB    NUMCCO
          PJP    TRCCHK
          ADD    NUMCCI
          STA    REG
          LDC    SAVC
          LDA    MSKK
          AND    5,C
          STA    PATTRN
          EST    BRCATB
COCLK     JMP    *P:CCOR     <--> EXECUTIVE C.C.O. HANDLER RESOLVED ARGMNT. ENTRY
TRCCHK    EQU    $
RETURN    EQU    $
          LDB    SAVB
          JMP    *M:SFX      --> EXIT
```

FIG. 17/1160B

```
SETZRO   EQU    $
         LDC    =RTNADR
         JMP    FCHBGN
SETONE   EQU    $
         LDC    =CHNADR
FCHBGN   EQU    $
         INC    Z:SFL
         CDR    M00
         LDE    B
         STE    SAVB
         LDG    P
         JMP    *TSA:
         LDA    *A
         LDB    SAVB
         JMP    BGNSET+2
SETZER   EQU    $
         LDC    =RTNADR
         JMP    BGNSET
SETONR   EQU    $
         LDC    =CHNADR
BGNSET   EQU    $
         INC    Z:SFL
         CDR    M00
         LDE    7,C
         STE    TMPCDE
         LDG    =X'4004'
         STA    E
         AND    K:X7FFF
         STA    WRDBIT
         SHF    A
         STA    RELADR
         LDA    E
         PJP    ACTVV
         SUB    =COPASO-LIUSER*16+X'8000'
         NJP    ACTVV
```

ARGUMENT FETCH

ACTVV 17/1160C

```
ACTVV    EQU    $
         LDA    WRDBIT
         ADD    FILIDX
         LDG    A
         LDA    *A
         PJP    *2,C
         JMP    *3,C
CHNGWD   EOR    K:X8000
         STA    *G
         LDA    TMPCDE
         EOR    K:X4
         STA    TMPCDE
         LDA    B
         STA    SAVB
         LDA    *G
         AND    K:X7FFF
         ZJP    COCHK-1
         LDA    C
         STA    SAVC
         LDA    WRDBIT
         LDE    =COCHK-2
         JMP    COMMON
```

RETURN (EXIT) 17/1160B

COCHK-1 17/1160B

COMMON 17/1103A

FIG. 17/1160C

```
RTNADR   DAT   RETURN
CHNADR   DAT   CHNGBT-1
         DAT   RETURN
         DAT   CHNGWD-1
         DAT   RETURN
         DAT   0
         DAT   X'FFFF'
BTCODE   DAT   8
         DAT   9
CCOBGN   DAT   COATVO-LIUSER
NUMCCO   DAT   COATV+COPAS
NUMCCI   DAT   COATV+COPAS+1
BRCATB   DAT   COCLK-1
         DAT   BRCATC-1
         DAT   X'4001'
         DAT   REG
         DAT   PATTRN
         DAT   MSKK
         DAT   X'C000'
BRCATC   DAT   TRCCHK
SAVB     DAT   0
WRDBIT   DAT
RELADR   DAT
TMPCDE   DAT
         DAT   TRCTBL
         DAT   0
REG      DAT
PATTRN   DAT
```

FIG. 17/1160D

```
SET1ZR   EQU   $
         LDC   =INPUTA
         JMP   INPUTX
SETION   EQU   $
         LDC   =INPUTB
INPUTX   EQU   $
         INC   Z:SFL
         CDR   M00
         LDE   B
         STE   SAVB
         LDG   P
         JMP   *TSA:        --> ARGUMENT FETCH
         LDA   *A
         LDB   SAVB
         JMP   INPUT1+2
SETINO   EQU   $
         LDC   =INPUTA
         JMP   INPUT1
SETIN1   EQU   $
         LDC   =INPUTB
INPUT1   EQU   $
         INC   Z:SFL
         CDR   M00
         STA   INTEMP
         AND   K:X7FFF
         STA   E
         LDG   =X'4004'
         AND   K:4TH
```

FIG. 17/1170

```
         SHF     E
         ADA     LOGBAS
         LDA     *A
         STA     G
         AND     *E
         ZJP     *0,C
         JMP     *1,C
INPUT2   EQU     $
         LDA     *E
         EOR     G
         STA     *E
         LDA     INTEMP
         JMP     *3,C
INPUT3   EQU     $
         JMP     *M:SFX
INPUTA   DAT     INPUT3-1
INPUTB   DAT     INPUT2-1
         DAT     INPUT3-1
         DAT     SETOR-1
         DAT     SET1R-1
INTEMP   DAT
```

SET ZER 17/1160A

SET O NR 17/1160A

EXIT

FIG. 17/1170 (CONT.)

```
         DAT     DATAO+DATA1
         DAT     DATAO
ANTSK    DAT     SRTANL-1
         DAT     0
         RPT     7
         DAT     0

         RPT     MAXTMP
         DAT     0
SRTANL   EQU     $

         LDA     DMDREQ
         PJP     DMDLXC
         LDA     DMDRDY
         ZJP     $+2
         JMP     DMDLXC
         LDA     =ANTSK-1
         STA     FILADR

DMDLXA   LDA     HXFFFF
         STA     SBCTSK
DMDLXB   EQU     $
         JMP     DMDPGA      --> DEMAND SCAN PROGRAM.
DMDLXC   EQU     $

         LDA     P
         JMP     *CKBD       --> CHKBID 17/1050
         STA     SBCTSK
         STE     FILSRT
         ZJP     NOSUBT      --> NOSUBT 17/1200A CONT.
         CDR     X'A0'

PEROPA   LDA     A
         NJP     TDSTART
         AND     =X'7FF'
         SUB     1,C
         NJP     PEROPB
         ADD     1,C
         SUB     *C
         PJP     *P*INTSTR   --> I*START 17/700
         LDB     =ANTSK-1

         INC     E
         JMP     *E          --> TO PROGRAM SUBTSK.
TDSTART  AND     =X'7FF'
         SUB     *C
         PJP     TDCHAIN
         ADD     *C
         EST     *E          --> RETURN TO PROGRAM SBTSK.
TDCHAIN  ADD     *C
         JMP     *P*INTTD    --> I*INTTD 17/710
PERUPB   EQU     $
         STZ     ANLTGR
         AND     BITTBL+14
         STA     CORDSC
         LDB     FILSRT
         LDA     *B
         PJP     VLDFIL      --> VLDFIL 17/1200A CONT.
         LDA     1,B
         ADD     B
         LDB     A
         JMP     SPNADB+2
```

FIG. 17/1200A

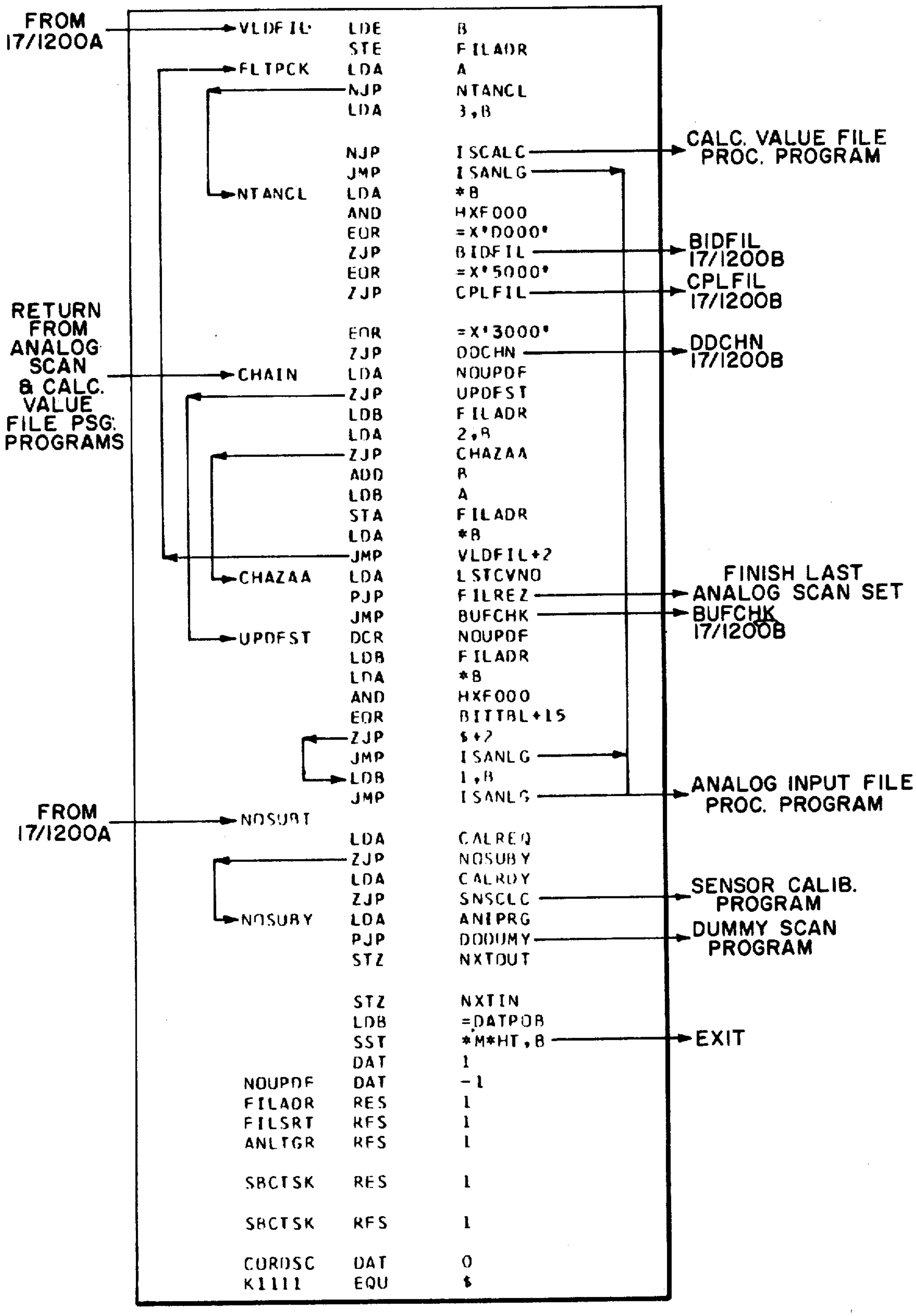
FIG. 17/1200A CONT.

```
CPLFIL   LDB    1,B
         ZJP    CHAIN
         LDA    *B
         JMP    FLTPCK
BIDFIL   LDA    ANLTGR
         ZJP    $+2
         JMP    CHAIN
         LDA    3,B
         LDB    =DATPOB
         SST    *BIDR,B
         JMP    CHAIN
DDCHN    LDA    ANLTGR
         ZJP    $+2
         JMP    CHAIN
         LDA    P
         JMP    CNTINT
         JMP    CHAIN
DDZAC    EQU    $
BUFCHK
         LDA    CORDSC
         ZJP    SRTANL
         LDA    ANIPRG
         NJP    RELBUA
         LDA    SBCTSK
         STA    BUFREL
         JMP    SRTANL
RELBUA   LDA    BUFOVR
         PJP    RELOVZ
         STZ    BUFOVR
         JMP    SRTANL
RELOVZ   LDB    SBCTSK
         LDA    P
         JMP    RELBUF
         JMP    SRTANL
BUFREL   DAT    X'FFFF'
BUFOVR   DAT    0
```

CHAIN 17/1200A CONT.

FLTPCK 17/1200A CONT.

SUBBID 17/1020

CNTINT 17/1210

SRTANL 17/1200A

RELSBUF 17/1090

FIG. 17/1200B

```
CNTINT   INC    A
         STA    DOCSTR
         LDE    B
         STE    DODSTR
         INC    E
         LDB    =ANLTSK+B
         JMP    *P*INTSTR
         LDB    DODSTR
DOCCTC   JMP    *DOCSTR
DODSTR   RES    1
DOCSTR   RES    1
         ORG    ANLCHN
         DAT    DOCCTC-2
```

I*START 17/700

RETURN

FIG. 17/1210

Figure 17:
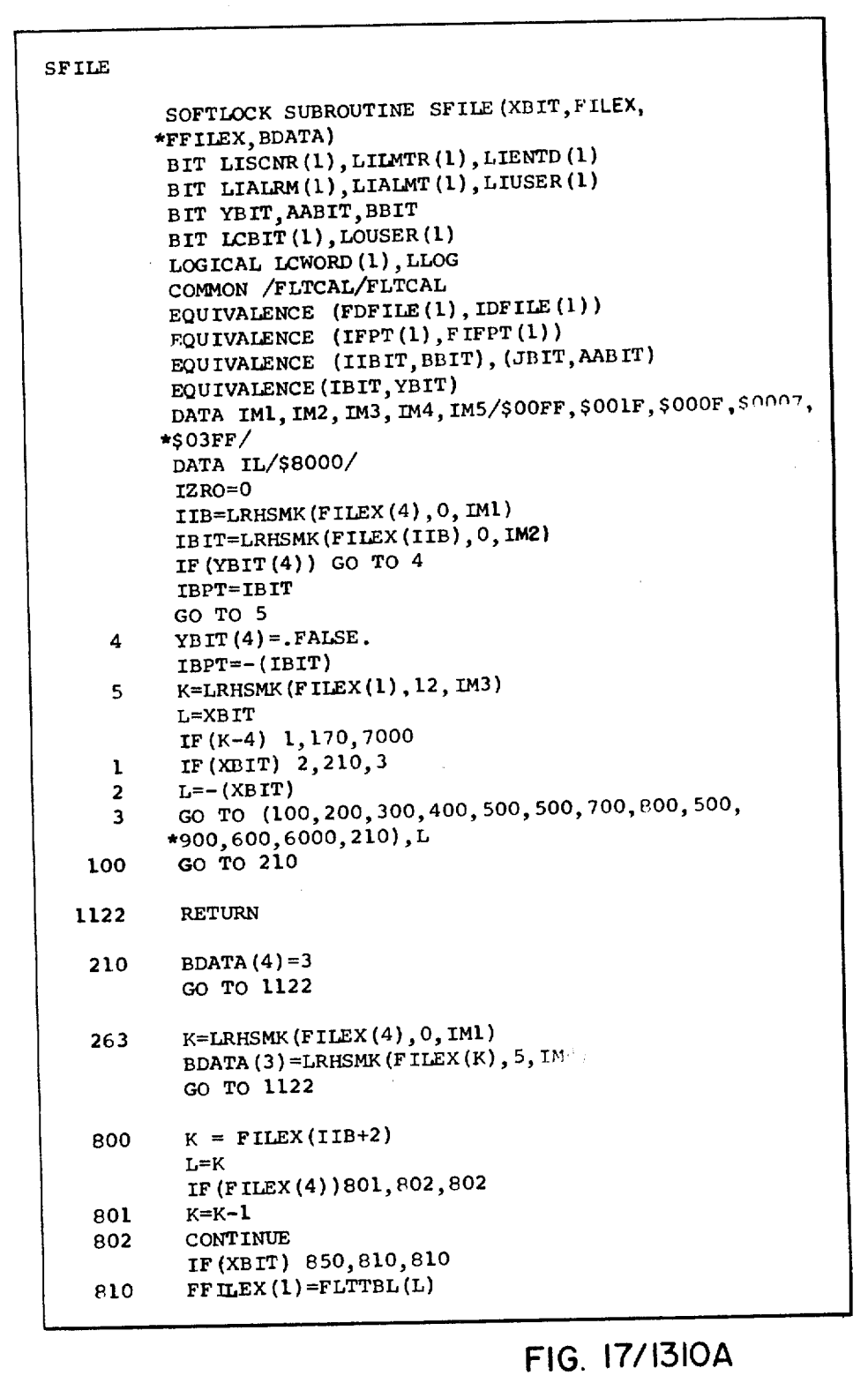

```
SFILE

      SOFTLOCK SUBROUTINE SFILE(XBIT,FILEX,
     *FFILEX,BDATA)
      BIT LISCNR(1),LILMTR(1),LIENTD(1)
      BIT LIALRM(1),LIALMT(1),LIUSER(1)
      BIT YBIT,AABIT,BBIT
      BIT LCBIT(1),LOUSER(1)
      LOGICAL LCWORD(1),LLOG
      COMMON /FLTCAL/FLTCAL
      EQUIVALENCE (FDFILE(1),IDFILE(1))
      EQUIVALENCE (IFPT(1),FIFPT(1))
      EQUIVALENCE (IIBIT,BBIT),(JBIT,AABIT)
      EQUIVALENCE(IBIT,YBIT)
      DATA IM1,IM2,IM3,IM4,IM5/$00FF,$001F,$000F,$0007,
     *$03FF/
      DATA IL/$8000/
      IZRO=0
      IIB=LRHSMK(FILEX(4),0,IM1)
      IBIT=LRHSMK(FILEX(IIB),0,IM2)
      IF(YBIT(4)) GO TO 4
      IBPT=IBIT
      GO TO 5
    4 YBIT(4)=.FALSE.
      IBPT=-(IBIT)
    5 K=LRHSMK(FILEX(1),12,IM3)
      L=XBIT
      IF(K-4) 1,170,7000
    1 IF(XBIT) 2,210,3
    2 L=-(XBIT)
    3 GO TO (100,200,300,400,500,500,700,800,500,
     *900,600,6000,210),L
  100 GO TO 210

 1122 RETURN

  210 BDATA(4)=3
      GO TO 1122

  263 K=LRHSMK(FILEX(4),0,IM1)
      BDATA(3)=LRHSMK(FILEX(K),5,IM
      GO TO 1122

  800 K = FILEX(IIB+2)
      L=K
      IF(FILEX(4))801,802,802
  801 K=K-1
  802 CONTINUE
      IF(XBIT) 850,810,810
  810 FFILEX(1)=FLTTBL(L)
```

FIG. 17/1310A

```
      JBIT=0
      IIBIT=127
      CALL SBBIT(K,BBIT,AABIT,XBIT)
      BDATA(1)=JBIT
      BDATA(2)=L
      BDATA(4)=2
      GO TO 263
 850  JBIT=0
      IIBIT = 2
      CALL SBBIT(K,BBIT,AABIT,JBIT)
      IF(AABIT(1)) GO TO 851
      GO TO 210
 851  FWRD=FLTTBL(L)
      FLTTBL(L)=FFILEX(1)
      FFILEX(1)=FWRD
      JBIT=4
      IIBIT = 4
      CALL SBBIT(K,AABIT,BBIT,XBIT)
      BDATA(4)=2
      GO TO 263

 170  K=LRHSMK(FILEX(4),0,IM5)
      J=LRHSMK(FILEX(4),10,IM3)
 171  IF(XBIT) 172,210,173
 172  L = -(XBIT)
 173  GO TO (1000,4000,210,210,210,210,210,3000,
     *210,210),L

3000  IF(XBIT)3011,3002,3002

3002  IF (LIUSER(K,J)) GO TO 3005
      FFILEX(1)=0.0
      GO TO 3006
3005  FFILEX(1)=1.0
3006  BDATA(2)=K
      BDATA(3)=J
      GO TO 1000

1000  IF(XBIT)1010,1001,1001
1001  YBIT(0)=LISCNR(K,J)
      YBIT(1)=LILMTR(K,J)
      YBIT(2)=LIENTD(K,J)
      YBIT(3)=LIALRM(K,J)
      BDATA(1)=IBIT
      GO TO 1036

1036  BDATA(4)=2
      GO TO 1122

7000  IF(XBIT)7002,210,7003
7002  L=-XBIT
7003  IF(L-8)210,7001,210
7001  IF(K-7) 7010,7100,7200
7010  BDATA(2)=LRHSMK(FILEX(4),0,IM1)
      BDATA(3)=LRHSMK(FILEX(4),9,IM3)
      BDATA(4)=2
      BDATA(1)=0
```

FIG. 17/1310B

```
            IIBIT=FILEX(4)
            II=BDATA(3)
            JJ=BDATA(2)
            IF(XBIT)7012,210,7011
      7011  IF(K-6) 7014,7013,7040
      7903  CONTINUE
      7013  YBIT(0)=LOUSER(JJ,II)
      7902  CONTINUE
      7015  CALL FXFL(IBIT,IZRO,FFILEX(1))
            GO TO 1122
      7014  JBIT=JJ
            AABIT(7)=.TRUE.
S           LDC JBIT
S           IOA 0,C
S           STA JBIT
            YBIT(0)=AABIT(II)
            GO TO 7015
      7200  IF (K-10) 210,7010,210
      7100  IBIT = FILEX(4)
            IBPT=LRHSMK(IBIT,8,IM2)
            IF(YBIT(12)) IBPT=-(IBPT)
            IF(YBIT(14)) GO TO 7300
            IF(.NOT.YBIT(15))GO TO 7400
      7913  CONTINUE
            IF(YBIT(13)) GO TO 7150
            IF(XBIT)7110,7101,7101
      7101  CALL FXFL(FILEX(5),IBPT,FFILEX(1))
      7102  BDATA(3)=IBPT
            BDATA(4) = 1
            GO TO 1122

      7150  IF(XBIT)7160,7151,7151
      7151  IFPT(1)=FILEX(5)
            IFPT(2)=FILEX(6)
            FFILEX(1)=FIFPT(1)
            GO TO 7102

      7300  ITRAK=LRHSMK(IBIT,0,IM1)
            INUM=FILEX(5)+1
            CALL IREAD(IDFILE,ITRAK,INUM)
            IF(XBIT)7310,7301,7301
      7301  IF(YBIT(13)) GO TO 7302
            CALL FXFL(IDFILE(INUM-1),IBPT,FFILEX(1))
            GO TO 7102
      7302  FFILEX(1)=FDFILE(INUM-1)
            GO TO 7102

      7400  K=FILEX(5)
            BDATA(2)=K
            IF(YBIT(13)) GO TO 7410
            IF(XBIT)7401,7402,7402
```

FIG. 17/1310C

```
7403      CALL FXFL(IFPT(1),IBPT,FFILEX(1))
          GO TO 7102
7410      IF(XBIT)7411,7412,7412

7402      IFPT(1)=ICNST(K)
          GO TO 7403
7412      FFILEX(1)=FCNST(K)
          GO TO 7102

          END
```

FIG. 17/1310D

```
          SUBROUTINE SBBIT(LL,AABIT,BBBIT,YYBIT)
          DATA IM1/$FF/
          ITEM2=LL
          JI=0
          IF(YBIT(0))JI=1
          LL=(LL+2)/2
  12      IIBIT=ISTATB(LL)
          IF(JI) 203,13,14
  13      ITEM1=LRHSMK(IIBIT,8,IM1)
          ITEM2=LRHSMK(IIBIT,0,IM1)
          GO TO 9
  14      ITEM2=LRHSMK(IIBIT,8,IM1)
          ITEM1=LRHSMK(IIBIT,0,IM1)
   9      KI=0
  10      IF(AABIT(KI)) GO TO 15
  11      KI=KI+1
          IF (KI-8) 10,200,203
  15      IF(YYBIT(15)) GO TO 100
  16      IF(YBIT(KI)) GO TO 17
          BBBIT(KI)=.FALSE.
          GO TO 11
  17      BBBIT(KI)=.TRUE.
          GO TO 11
 100      YBIT(KI)=BBBIT(KI)
          GO TO 11
 200      IF(JI)203,201,202
 201      ISTATB(LL)=ITEM1*256+ITEM2
          RETURN
 202      ISTATB(LL)=ITEM2*256+ITEM1
 203      RETURN
          END
```

FIG. 17/1311

```
4000    IF(XBIT)2002,2001,2001
2001    IF(LIALMT(K,J)) GO TO 2010
        FFILEX(1)=0.0
        GO TO 2036
2010    FFILEX(1)=1.0
2036    BDATA(4)=2
        GO TO 1122
1906    CONTINUE
2002    IF(FFILEX(1))210,2003,2004
2003    LIALMT(K,J)=.FALSE.
        GO TO 3016
2004    LIALMT(K,J)=.TRUE.
        GO TO 3016
3016    BDATA(4)=2
        GO TO 1122
```

FIG. 17/1310E

```
          SUBROUTINE SUBFN(TEM1,TEM2,TEM3)
S         LDA TEM1
S         ADD TEM3
S         DCR 5
S         LDA *5
S         STA TEM2
          RETURN
          END
```

FIG. 17/1312

```
          SUBROUTINE SUBST(TEM4,TEM5,TEM6)
S         LDA TEM4
S         ADD TEM5
S         DCR 5
S         LDE TEM6
S         STE *5
          RETURN
          END
```

FIG. 17/1313

```
    1   CONTINUE
        MATBL(4,9) = 2*16384
        DO 2 I=1,6
        ERRBUF(I) = 0
    2   CONTINUE
        DO 3 I=1,16
        SHRKNM(1,I) = -1
    3   CONTINUE
        NODATA = 0
        FRSTFG = .TRUE.
        HEDCRD = .TRUE.
        DFGCRD = .FALSE.
        ERRCNT = 0
        ITSRED = 0
        ENDFLG = .FALSE.
        ICNT = 0
   10   CALL R40A2(INPDEV,INPBUF,TEMP)
        DECODE(72,1010,INPBUF) SYMBOL,CONTNU,OPRATR,
       1ISPACE,OPRAND
 1010   FORMAT(3A2,A1,3A2,A1,29A2)
        IF(.NOT.HEDCRD) GO TO 100
   20   DO 25 I=1,2
        IF(OPRATR(I).NE.DFGTXT(I)) GO TO 30
   25   CONTINUE
        GO TO 85
   30   DO 35 I=1,3
        IF(OPRATR(I).NE.BINTXT(I)) GO TO 36
   35   CONTINUE
        GO TO 40
   36   ERRCNT = ERRCNT + 1
        ERRBUF(ERRCNT) = 1
        CALL RCSERR
        GO TO 999
   40   DO 45 I=1,3
        IF(OPRAND(I).NE.TPETXT(I)) GO TO 50
   45   CONTINUE
        GO TO 70
   50   DO 55 I=1,3
        IF(OPRAND(I).NE.CRDTXT(I)) GO TO 66
   55   CONTINUE
        GO TO 75
   66   ERRCNT = ERRCNT + 1
        ERRBUF(ERRCNT) = 2
        GO TO 70
   70   IP - TAPNCH
        GO TO 80
   75   IP = CDPNCH
   80   HEDCRD = .FALSE.
        PRINT = .FALSE.
        DO 193 I=4,6
        J = I - 3
        IF(OPRAND(I).NE.PRNTXT(J)) GO TO 194
```

FIG. 17/1501

```
 193   CONTINUE
       PRINT = .TRUE.
 194   CONTINUE
       WRITE(PRNTDV,1077)
1077   FORMAT(10H DFG START)
       IF(ERRBUF(1).EQ.0) GO TO 10
       CALL RCSERR
       GO TO 999
  85   IF(DFGCRD) GO TO 86
       GO TO 90
  86   GO TO 36
  90   DFGCRD = .TRUE.
       GO TO 10
 100   CKONLY = .FALSE.
       IF(TYPERR) CKONLY = .TRUE.
       DO 11 I=1,29
       LOCALB(I) = OPRAND(I)
  11   CONTINUE
       DECODE(58,1091,LOCALB) IALPHA
1091   FORMAT(58A1)
       IF(ISPACE.EQ.BLANK1.AND.CONTNU.EQ.BLANK1) GO TO 199
       ERRCNT = ERRCNT + 1
       ERRBUF(ERRCNT) = 8
       CALL RCSERR
       GO TO 10
 199   CONTINUE
       DO 101 I=1,3
       IF(SYMBOL(I).NE.ENDTXT(I)) GO TO 110
 101   CONTINUE
       ENDFLG = .TRUE.
       GO TO 300
 110   IF(FRSTFG) GO TO 120
       IF(MODTYP.NE.9) GO TO 140
 120   DO 121 I=1,3
       LSTSYM(I) = SYMBOL(I)
 121   CONTINUE
       ICNT = ICNT + 1
       DO 125 I=1,NUMSUB
       TEMP = MATBL(4,I)
       CALL UNPACK(X111D,ACTIV,RQRD,USED,TEMP)
       MATBL(4,I) = PACK(X111D,ACTIV,RQRD,Z,TEMP)
 125   CONTINUE
       DO 126 I=1,16
       BYTBUF(I) = 0
       EARRAY(2,I) = 0
 126   CONTINUE
       FRSTFG = .FALSE.
       MESTOP = .FALSE.
       IERFLG = 0
 130   DO 131 I=1,NUMSUB
       RNTHRU(I) = 0
 131   CONTINUE
       GO TO 150
```

FIG. 17/1502

```
  140   DO 141 I=1,3
        IF(SYMBOL(I).NE.LSTSYM(I).AND.MODTYP.NE.9) GO TO 300
  141   CONTINUE
  150   DO 152 MODTYP=1,NUMSUB
        DO 151 J=1,3
        IF(OPRATR(J).NE.MATBL(J,MODTYP)) GO TO 152
  151   CONTINUE
        GO TO 160
  152   CONTINUE
        ERRCNT = ERRCNT + 1
        ERRBUF(ERRCNT) = 3
        GO TO 168
  160   ITEMP = MATBL(4,MODTYP)
        CALL UNPACK(X111D,ACTIV,RQRD,USED,ITEMP)
        CALL UNPACK(X3166,ITEM,IGNOR,POSITN,ITEMP)
        BYTENM = ITEMP
        RPTNUM = MATBL(5,MODTYP)
        IF(ACTIV.NE.0) GO TO 170
        ERRCNT = ERRCNT + 1
        ERRBUF(ERRCNT) = 4
  168   CALL RCSERR
        GO TO 10
  170   CONTINUE
        IF(RNTHRU(MODTYP).LE.RPTNUM) GO TO 175
        ERRCNT = ERRCNT + 1
        ERRBUF(ERRCNT) = 5
        GO TO 168
  175   CONTINUE
        RNTHRU(MODTYP) = RNTHRU(MODTYP) + 1
        DO 182 I=1,16
        IF(EARRAY(1,I).NE.MODTYP) GO TO 182
        IF(IGNOR.EQ.0) GO TO 183
        EARRAY(2,I) = -1
        GO TO 260
  182   CONTINUE
  183   EARRAY(2,I) = 1
  180   CREATE = .FALSE.
        IF(MODTYP.NE.9.AND.(ICNT.LE.LINCNT.OR.LINCNT.LT.1))
       1GO TO 185
        WRITE(PRNTDV,1090)
  190   FORMAT(1H1)
        ICNT = 0
S1111   LPL
  185   GO TO (201,202,203,204,205,206,207,208,209,210,211,
       *212,213,214,215,216,217,218,219,220,221,222,223,
       *224,225,226,227,228,229,230,231,232,233,234,235)MODTYP
  200   ERRCNT = ERRCNT + 1
        ERRBUF(ERRCNT)=6
        GO TO 240
  201   CALL SHARK
        GO TO 240
  202   CALL ANIMPX
        GO TO 240
  203   CALL CONVC
        GO TO 240
```

FIG. 17/1503

```
204   CALL ALARM1
      GO TO 240
205   CALL ALARM2
      GO TO 240
206   CALL FILTER
      GO TO 240
207   CALL RATE
      GO TO 240
208   CALL COMP
      GO TO 240
209   CALL TYPE
      GO TO 240
210   CALL SQENCE
      GO TO 240
211   CALL ALARM3
      GO TO 240
212   CALL WIREA
      GO TO 240
213   CALL SENSR
      GO TO 240
214   CALL NAMEX
      GO TO 240
215   CALL CONSTC
      GO TO 240
216   CALL LOGVAR
      GO TO 240
217   CALL USRFIL
      IF(ENDFLG) GO TO 510
      GO TO 100
218   CALL SPARE6
      GO TO 240
219   CALL SPARE7
      GO TO 240
220   CALL NAME
      GO TO 240
221   CALL SPARE8
      GO TO 240
222   CALL SPARE4
      GO TO 240
223   CALL WIREB
      GO TO 240
224   CALL PERCCI
      GO TO 240
225   CALL CCO
      GO TO 240
226   CALL ALLIST
      GO TO 240
227   CALL NPRCCI
      GO TO 240
228   CALL SUB3
      GO TO 240
229   CALL SUB4
      GO TO 240
230   CALL SUB 5
      GO TO 240
```

FIG. 17/1504

```
 231    CALL SUB6
        GO TO 240
 232    CALL SUB7
        GO TO 240
 233    CALL SUB 8
        GO TO 240
 234    CALL SUB9
        GO TO 240
 235    CALL SUB10
 240    IF(CREATE) GO TO 324
        NODATA = -1
        IF(ERRBUF(1).NE.0) CALL RCSERR
        WRITE(PRNTDV,9098) BLANK2
9098    FORMAT(A2)
 260    USED = 1
        IF(MODTYP.EQ.9) USED = 0
        TEMP = PACK(XD111,Z,ACTIV,RQRD,USED)
        MATBL(4,MODTYP) = PACK(X3166,TEMP,IGNOR,POSITN,BYTENM)
        IF(ITSRED.EQ.0) GO TO 10
        ITSRED = 0
        GO TO 100
 300    DO 305 I=1,NUMSUB
        TEMP = MATBL(4,I)
        CALL UNPACK(X111D,ACTIV,RQRD,USED,TEMP)
        CALL UNPACK(X3166,ITEMP,IGNOR,POSITN,TEMP)
        IF(ACTIV.EQ.0.OR.USED.NE.0.OR.RQRD.EQ.0) GO TO 305
        ERRCNT = ERRCNT + 1
        ERRBUF(ERRCNT) = 7
        SIXFLG = .TRUE.
 305    CONTINUE
        IF(ERRBUF(1).EQ.0) GO TO 307
        CALL RCSERR
        GO TO 500
 307    IF(CKONLY) GO TO 500
        IF(IERFLG.NE.0.OR.NODATA.EQ.0) GO TO 500
        TEMP = 0
        IF(FILTYP.EQ.1) TEMP = 1
        IFIL = FILTYP
 310    CALL BEFILE
        IX = FILTYP + 1
        GO TO (1308,1309,1309,1310) IX
6969    GO TO 309
1308    RUNTOT = 5 + TEMP
        GO TO 311
1309    RUNTOT = 6 + TEMP
        GO TO 311
1310    RUNTOT = 7 + TEMP
        GO TO 311
 309    RUNTOT = 4
        IF(FILTYP.EQ.14) RUNTOT = 3 + GPOINT
 311    J = 1
        IF(FILTYP.LE.3) J = RUNTOT - 4
        IF(FILTYP.EQ.14) J = GPOINT
        IREC(1) = J
        IT = 0
        NN = 1
```

FIG. 17/1505

```
      CALL OUTPUT(IT,NN)
      DO 318 I=1,16
      J = 17-I
      IF(EARRAY(2,J).NE.0) GO TO 320
318   CONTINUE
320   DO 325 I=1,J
      IF(EARRAY(2,I).LE.0) GO TO 325
      MODTYP = EARRAY(1,I)
      GO TO 185
324   IF(.NOT.CANCEL) GO TO 325
      CALL RCSERR
      CREATE = .FALSE.
      CANCEL = .FALSE.
      GO TO 100
325   CONTINUE
326   IREC(1) = 0
      IT = 0
      NN = 1
      CALL OUTPUT(IT,NN)
329   DO 330 I=1,16
      MM = 17-I
      IF(BYTBUF(MM).NE.0) GO TO 335
330   CONTINUE
335   DO 336 I=1,MM,2
      LL = I+1
      IL = (I/2) + 1
      IREC(IL) = PACK(X8800,BYTBUF(I),BYTBUF(LL),I,I)
336   CONTINUE
      NN = IL
      IT = 1
      CALL OUTPUT(IT,NN)
      NN = 0
      IT = 27
      CALL OUTPUT(IT,NN)
500   FILTYP = IFIL
      IF(.NOT.ENDFLG) GO TO 120
510   IT = 2
      NN = 0
      CALL OUTPUT(IT,NN)
      WRITE(PRNTDV,1020)
1020  FORMAT(15H DFG TERMINATED)
      GO TO 999
999   CONTINUE
      CALL EXIT
      GO TO 1
      END
```

FIG. 17/1506

```
SUBROUTINE TYPE

  10    TYPERR = .FALSE.
        TYPSTP = .FALSE.
        MESTOP = .FALSE.
        GENCNT = 0
        GPOINT = 0
        IG = 0
        CONTNU = BLANK
  20 /  DO 30 I=1,NUMSUB
        MATBL(4,I) = 0
        MATBL(5,I) = 0
  30    CONTINUE
  35    DO 38 I=1,2
        DO 38 J=1,16
        EARRAY(I,J) = 0
  38    CONTINUE
  40    MATBL(4,9) = 2*16384
  50    DO 60 FILTYP=1,15
        DO 55 J=1,3
        IF(SYMBOL(J).NE.TYPTBL(J,FILTYP)) GO TO 60
  55    CONTINUE
        GO TO 70
  60    CONTINUE
        ERRCNT = ERRCNT + 1
        ERRBUF(ERRCNT) = 10
        TYPERR =.TRUE.
  70    DO 75 I =1,29
        LOCBUF(I) = OPRAND(I)
  75    CONTINUE
        DECODE(58,1999,LOCBUF)((OP(J,I),J=1,3 ),IGNOR(I),
       1RQRD(I),RPTNUM(I),BYTNUM(I),IMORE(I),I=1,4
1999    FORMAT(4(3A2,2A1,2I2,1A1 ))
        WRITE(PRNTDV,1904)(SYMBOL(I),I=1,3),CONTNU,
       1(OPRATR(J),J=1,3),(OPRAND(K),K=1,29)
1904    FORMAT(3A2,A1,3A2,1X,29A2)
  80    DO 95 I=1,4
        DO 88 MOD=1,NUMSUB
        DO 86 K=1,3
        IF(OP(K,I).NE.MATBL(K,MOD)) GO TO 88
  86    CONTINUE
        GO TO 90
  88    CONTINUE
        MOD = 1
        ERRCNT = ERRCNT + 1
        ERRBUF(ERRCNT) = 12
        TYPERR = .TRUE.
  90    CONTINUE
        GENCNT = GENCNT + 1
        EARRAY(1,GENCNT) = MOD
        ACTIV = 1
        RQRDB = 0
        IF(RQRD(I).NE.BLANK) RQRDB = 1
        USED = 0
```

FIG. 17/1507

```
      IGNORE = 0
      IF(IGNOR(I).NE.BLANK) IGNORE = 1
      TEMP = PACK(XD111,Z,ACTIV,RQRDB,USED)
      MATBL(4,MOD) = PACK(X3166,TEMP,IGNORE,GENCNT,BYTNUM(I))
      MATBL(5,MOD) = RPTNUM(I)
      IF(BYTNUM(I).GT.IG) IG = BYTNUM(I) + RPTNUM(I)
      IF(IMORE(I).EQ.ICOMMA) GO TO 95
      GO TO 120
  95  CONTINUE
 100  CONTINUE
      CALL R40A2(INPDEV,INPBUF,TEMP)
      DO 105 I=1,36
      LOCBUF(I) = INPBUF(I)
 105  CONTINUE
      DECODE(72,1901,LOCBUF) CONTNU, ((OP(J,I),J=1,3),
     1IGNOR(I),RQRD(I),RPTNUM(I),BYTNUM(I),IMORE(I) ,I=1,4)
1901  FORMAT(6X,A1,7X,4(3A2,2A1,2I2,1A1))
      WRITE(PRNTDV,1801) LOCBUF
1801  FORMAT(36A2)
 110  IF(CONTNU.EQ.ISTAR) GO TO 80
      ERRCNT = ERRCNT + 1
      ERRBUF(ERRCNT) = 14
      TYPERR = .TRUE.
      DECODE(72,1903,LOCBUF) SYMBOL,CONTNU,OPRATR,ISPACE,OPRAND
1903  FORMAT(3A2,A1,3A2,A1,3A2)
      ITSRED = -1
      GO TO 130
 120  CONTINUE
      DO 125 I=1,16
      J = 17 - I
      IF(EARRAY(1,J).NE.0) GO TO 126
 125  CONTINUE
 126  LINCNT = 40/(3*J)
      GPOINT = (IG+1)/2
 130  CONTINUE
      RETURN
      END
```

FIG. 17/1508

```
SUBROUTINE NAME

       ISYTAX=0
       IDATER=0
       IF(CREATE) GO TO 100
       ANIFIL=.FALSE.
       IF(FILTYP.EQ.1 ) ANIFIL=.TRUE.
       IEUDEX=-1
       IPTID=-1
       FIXFLG=.TRUE.
       FLTFLG=.TRUE.
       FILCOR=1
       IF(OPRAND(29).NE.C.AND.OPRAND(29).NE.BLANK)
      *IDATER=IDATER+1
       IF(OPRAND(27).EQ.BLANK.AND.OPRAND(28).EQ.BLANK)
      *FIXFLG=.FALSE.
       IF(OPRAND(25).EQ.BLANK.AND.OPRAND(26).EQ.BLANK)
      *IDATER=IDATER+1
       IF(OPRAND(23).EQ.BLANK.AND.OPRAND(24).EQ.BLANK)
      *IDATER=IDATER+1
       DO 11 I=1,11
       ITEMP(I)=OPRAND(I+18)
 11    CONTINUE
       DECODE(22,50,ITEMP) IENGR    ,BINPNT,FLTDEX,FIXDEX
 50    FORMAT(1X,3A2,1X,I3,1X,I4,1X,I3 )
       IF(FLTDEX .LT. 1 )IDATER=IDATER+1
       IF(OPRAND(29).EQ. C )FILCOR=0
       IF(BINPNT.GT.15 .OR. BINPNT .LT. -15 )IDATER=IDATER+1
       COMPR=2.0**(15-BINPNT) -1.
       FIXPNT=2.0**BINPNT
       IF(IDATER.EQ.0 ) GO TO 10
       ERRCNT=ERRCNT+1
       ERRBUF(ERRCNT)=200+IDATER
 10    DO 12 I=1,3
       J=4-I
       IF(IENGR(J).NE. BLANK ) GO TO 13
 12    CONTINUE
       IEUDEX=0
       GO TO 15
 13    IEUDEX=J
 15    DO 16 I=1,18
       K=19-I
       IF(OPRAND(K).NE.BLANK)GO TO 17
       IPTID=0
 16    CONTINUE
       GO TO 19
 17    IPTID=K
       DO 18 I=1,IPTID
       IDES(I)=OPRAND(I)
 18    CONTINUE
 19    WRITE(PRNTDV,51)SYMBOL,OPRATR,OPRAND
 51    FORMAT(1H ,22X,17HPOINT DESCRIPTION,13X,2HEU,3X,
      *3HBPT,1X,4HRIDX,1X,3HFDX,2H W / 3A2,1X,3A2,1X,29A2  )
       RETURN
 100   IF(CANCEL) GO TO 150
```

FIG. 17/1509

```
      IF(IEUDEX.GT,0 ) GO TO 101
      IEUDEX=1
      NOUNIT=.TRUE.
      GO TO 110
101   DO 102 I=1,IEUDEX
      IREC(I)= IENGR(I)
102   CONTINUE
      NOUNIT=.FALSE.
110   IF(IPTID .GT.0 ) GO TO 111
      KK=IEUDEX
      GO TO 119
111   DO 112 I=1,IPTID
      KK=IEUDEX+I
      IREC(KK)=IDES(I)
112   CONTINUE
119   IWRDOT=KK
      IF(NOUNIT)IWRDOT=IWRDOT-1
      IF(NOUNIT)IEUDEX = 0
122   IF(ANIFIL)GO TO 125
      BYTBUF(1) = 128 + IUNIT*16 + RUNTOT + IEUDEX
      GO TO 124
125   BYTBUF(4)=RUNTOT+ IEUDEX
124   IF(IWRDOT.EQ.0)GO TO 123
      CALL OUTPUT
123   RUNTOT=RUNTOT+IWRDOT
150   RETURN
      END
```

FIG. 17/1510

```
SHARK

      IF(CREATE)RETURN
      ITSRED=-1
      IDATER=0
      WRITE(PRNTDV,2)SYMBOL,CONTNU,OPRATR,OPRAND
    2 FORMAT(1X / 3A2,1A1,3A2,1X,29A2  )
      DO 1000 J=1,16
      IF( SHRKNM(1,J).EQ.-1) GO TO 1010
 1000 CONTINUE
      GO TO 50
 1010 IDEPTH=J
      IF(IDEPTH.LT.2) INDEX=1
      CALL SEARCH(SYMBOL,ITEMP,SHRKNM)
      IF(ITEMP.EQ.-1) GO TO 1015
      GO TO 50
 1015 DO 1020 K=1,3
      SHRKNM(K+1,IDEPTH)=SYMBOL(K)
 1020 CONTINUE
      IBP=31
      IPASS=1
  100 IF(IPASS.GT. 1 ) GO TO 10
      IF(OPRAND(1).EQ.BLANK ) GO TO 10
      ITEMP=OPRAND(1)
      DECODE(2,1,ITEMP)IBP
    1 FORMAT(1I2 )
      IF(IBP.LT.-9 .OR.IBP.GT.15 )GO TO 50
   10 DO 69 I= 3,51,8
      IF(IALPHA(I).NE.BLANK)GO TO 50
   69 CONTINUE
      KOL=18
      DO 20 I=1,7
      JJ=(IPASS-1)*7+I+INDEX-1
      IF(JJ.GT.MAX)GO TO 50
      CALL VFLD(IALPHA,KOL,FULL,ITEMP,SHARKS(JJ))
      IF(FULL.AND.ITEMP.NE.0 ) GO TO 50
      IF(.NOT.FULL) GO TO 30
      KOL=KOL+8
   20 CONTINUE
      NUMBER=JJ-INDEX+1
      GO TO 40
   30 NUMBER=JJ-INDEX
   40 IF(NUMBER.GT.31 )GO TO 50
      CALL R40A2(INPDEV,LOCAL,IDUMI)
      DECODE(72,555,LOCAL)SYMBOL,CONTNU,OPRATR,OPRAND
  555 FORMAT(3A2,1A1,3A2,1X,29A2)
      DO 669 I=1,3
      LSTSYM(I)=SYMBOL(I)
  669 CONTINUE
      DECODE(72,556,LOCAL)IALPHA
  556 FORMAT(14X,58A1)
      IPASS=IPASS+1
      IF(CONTNU.EQ.BLANK ) GO TO 51
      WRITE(PRNTDV,2)SYMBOL,CONTNU,OPRATR,OPRAND
      GO TO 100
   50 IDATER=50
      GO TO 40
```

FIG. 17/1511

```
51    IF(IDATER.NE.0) GO TO 60
      SHRKNM(1,IDEPTH)=INDEX
      INDEX=INDEX+NUMBER
      SHRKNM(5,IDEPTH)=IBP
      SHRKNM(6,IDEPTH)=NUMBER
      IDEPTH=IDEPTH+1
      GO TO 70
60    ERRCNT=ERRCNT+1
      ERRBUF(ERRCNT)=IDATER+200
70    RETURN
      END
```

FIG. 17/1512

```
      IF(FIXDEX.LT.1 )IFIXDX=0
      IREC(1)=PACK(X1F00,IFIXFG,KEY,KEY,KEY )
      IREC(2) = FLTDEX
      I = 3
      IF(FIXDEX.LT. 1 )GO TO 110
      IREC(I)=FIXDEX
      I=I+1
110   IF(ISBTSK.EQ.-1)GO TO 120
      IREC(I)=ISBTSK
      I=I+1
120   IWRDOT=I-1
      BYTBUF(2)=RUNTOT
      RUNTOT=RUNTOT+IWRDOT
      CALL OUTPUT(1,IWRDOT )
      GO TO 145
140   BYTBUF( 1    )=IUNIT*16 +(IVIDAR-1)
145   IF(LSTPNT(1).EQ.-1 )GO TO 150
      DO 400 I=1,3
      IREC(I)=LSTPNT(I)
400   CONTINUE
      CALL OUTPUT(30,3)
150   RETURN
      END
```

FIG. 17/1514

```
SQENCE

      ISYTAX=0
      IDATER=0
      IF(CREATE)GO TO 100
      DO 10 I=1,20
      ITEMP(I)=OPRAND(I)
   10 CONTINUE
      DECODE(38,50,ITEMP)JFREQ,ISPACE(1),JGROUP,ISPACE(2),
     1JTRIG,ISPACE(3),LSTPNT,ISPACE(4),IDCPLC,ISPACE(5),
     2ISPACE(6),ISPACE(7),IUNIT,ISPACE(8)
   50 FORMAT(I2,A2,I2,7A2,I1,A2,3X,A2,7X,A2,I1,A2 )
      IF(JFREQ.LT. 0 )IDATER=IDATER + 1
      IF(OPRAND(1).EQ.BLANK)IDATER=IDATER + 1
      IF(JGROUP.LT. 0 ) IDATER=IDATER+1
      IF(JTRIG.NE.BLANK.AND.JTRIG.NE.Y )ISYTAX=ISYTAX+1
      CALL HEXCOV(IALPHA,55,ISBTSK)
      IF(ISBTSK.EQ.-1 ) IDATER=IDATER+1
      IF(ISBTSK.EQ. 0 ) ISBTSK=-1
      CALL VFLD(IALPHA,43,THRFLG,ITHLD,THRHLD)
      IF(THRFLG)GO TO 99
      THRHLD-33000.0
   99 DO 11 I=1,8
      IF(ISPACE(I).NE.BLANK)ISYTAX=ISYTAX+1
   11 CONTINUE
      IF(IDCPLC.GT.7 )IDATER=IDATER+1
      IF(OPRAND(11).EQ.BLANK)IDCPLC=7
      CALL OCTAL(IALPHA,38,3,JCHBIS)
      IF(JCHBIS.EQ.-1)IDATER=IDATER+1
      ANIFLG=.TRUE.
      IF(FILTYP.GT. 1 ) ANIFLG-.FALSE.
      DO 300 I=1,3
      IF(LSTPNT(I).NE. BLANK) GO TO 20
  300 CONTINUE
      LSTPNT(1)=-1
   20 IF(ISYTAX.EQ.0 )GO TO 17
      ERRCNT=ERRCNT+1
      ERRBUF(ERRCNT)=100 + ISYTAX
   17 IF(IDATER.EQ.0 )GO TO 18
      ERRCNT=ERRCNT+1
      ERRBUF(ERRCNT)=IDATER+200
   18 WRITE(PRNTDV,51)SYMBOL,OPRATR,OPRAND
   51 FORMAT(1H ,13X,2HFR,2X,2HGR,2X,1HE,3X,6HPT FOL,
     *2X,1HM,2X,3HCHB,2X,7HTHRH EU,2X,1HU,2X,4HSTBD /
     *3A2,1X,3A2,1X,29A2 )
      RETURN
  100 IF(CANCEL)GO TO 150
      IF(ANIFLG)GO TO 140
      IBP=BINPNT
      IF(BINPNT.LT.0)IBP=-BINPNT
      KEY=0
      IF(ISBTSK.NE.-1 )KEY=KEY+8192
      KEY=KEY + 32*IDCPLC + IBP
      IF(BINPNT.LT.0 )KEY=KEY+16
      IFIXDX=1
```

FIG. 17/1513

```
ANIMPX

      ISYTAX=0
      IDATER=0
      IF(CREATE)GO TO 100
      ICALCH=0
      ICALCL=0
      DO 10 I=1,29
      ITEMP(I)=OPRAND(I)
   10 CONTINUE
      DECODE(58,50,ITEMP)IVIDAR,ISPACE(1),  ISPACE(2),
     1ISPACE(3),IBIT,ISPACE(4),IGAIN,ISPACE(5),IRESCN,
     2ISPACE(6),LIMIT,ISPACE(7),ISPACE(8),ISPACE(9),IALARM,
     3ISPACE(10),ITWAVG
   50 FORMAT(I1,A2,2X,A2,2X,A2,I2,A2,I1,A2,A1,A2,A1,A2,7X,
     *A2,7X,A2,I4,A2,I4)
      DO 5 I=4,12,4
      IF(IALPHA(I).EQ.BLANK.AND.IALPHA(I+1).EQ.BLANK)
     *IDATER=IDATER+1
    5 CONTINUE
      DO 11 I=1,10
      IF(ISPACE(I).NE.BLANK)ISYTAX=ISYTAX+1
   11 CONTINUE
      CALL OCTAL(IALPHA,22,2,IWORD)
      IF(IWORD.EQ.-1)IDATER=IDATER+1
      CALL OCTAL(IALPHA,18,2,ICHANN)
      IF(ICHANN.EQ.-1)IDATER=IDATER+1
      IF(IBIT.LT.0.OR.IBIT.GT.13) IDATER=IDATER+1
      IF(IRESCN.NE.BLANK.AND.IRESCN.NE.R)ISYTAX-ISYTAX+1
      IF(LIMIT.NE.BLANK.AND.LIMIT.NE.E)ISYTAX=ISYTAX+1
      IF(IALARM.LT.0)IDATER=IDATER+1
      IF(ITWAVG.LT.0)IDATER=IDATER+1
      IF(IGAIN.LT.8.AND.IGAIN.GT.0) GO TO 33
      IGAIN=3
      IDATER=IDATER+1
   33 CALL VFLD(IALPHA,39,HIFULL,ICALCH,RHILIM)
      IF(.NOT.HIFULL) GO TO 61
      IF(ICALCH.GT.0) GO TO 61
      IF(RHILIM.GT.GAIN(IGAIN)) IDATER=IDATER+1
      ICALCH=-1
   61 CALL VFLD(IALPHA,48,LOFULL,ICALCL,RLOLIM)
      IF(.NOT.LOFULL) GO TO 22
      IF(ICALCL.GT.0) GO TO 22
      IF(RLOLIM.LT.-GAIN(IGAIN)) IDATER=IDATER+1
      ICACL=-1
   22 IF(LIMIT.EQ.E.AND.ICALCH.EQ.-1)IDATER=IDATER+1
      IF(LIMIT.EQ.E.AND.ICALCL.EQ.-1)IDATER=IDATER+1
      IF(ISYTAX.EQ.0) GO TO 23
      ERRCNT=ERRCNT+1
      ERRBUF(ERRCNT)=ISYTAX+100
   23 IF(IDATER.EQ.0) GO TO 24
      ERRCNT=ERRCNT+1
      ERRBUF(ERRCNT)=IDATER+200
   24 WRITE(PRNTDV,51)SYMBOL,OPRATR,OPRAND
   51 FORMAT(1H,13X,1HA,2X,2HCH,2X,2HWD,2X,2HBT,2X,1HG,
     *2X,1HR,2X,1HL,2X,7HHI SLMT,2X,7HLO SLMT,2X,4HORAX,
     *2X,4HTWIX / 3A2,1X,3A2,1X,29A2 )
      RETURN
  100 IF(CANCEL) GO TO 150
```

FIG. 17/1515

```
      IWORD=IWORD-32
      ICHANN=ICHANN-JCHBIS
110   INTEMP=0
      IFIXED=1
      IF(FIXDEX.LT.1)IFIXED=0
      IF(IRESCN.EQ.R)INTEMP=INTEMP+1024
      IF(ISBTSK.NE.-1)INTEMP=INTEMP+512
      IF(ICALCH.NE.00)INTEMP=INTEMP+256
      IF(ICALCL.NE.0)INTEMP=INTEMP+128
      IF(LIMIT.EQ. E )INTEMP=INTEMP+64
      IF(IALARM.GT.0)INTEMP=INTEMP+32
      IF(ITWAVG.GT.0)INTEMP=INTEMP+16
      INTEMP=INTEMP + IDCPLC*2
      IF(BINPNT.LT.0)INTEMP=INTEMP + 1
      IBNPNT=BINPNT
      IF(BINPNT.LT.0)IBNPNT=-BINPNT
      IREC(1)=PACK(X1B40,IFIXED,INTEMP,IBNPNT,IBNPNT)
      IREC(2)=PACK(X3544,IGAIN,IWORD,IBIT,ICHANN)
      IREC(3)=FLTDEX
      I=4
      IF(FIXDEX.LT.1) GO TO 111
      IREC(I)=FIXDEX
      I=I+1
111   IF(ICALCL.LE.0)GO TO 112
      IREC(I)=ICALCL
112   IF(ICALCH.LE.0)GO TO 113
      IREC(I)=PACK(X8800,ICALCH,ICALCL,ICALCL,ICALCL)
      I=I+1
113   IF(ICALCH.LT.1.AND.ICALCL.GT.0) I=I+1
      IF(ICALCH.GT.-1)GO TO 114
      IREC(I)=(RHILIM/FULSCL(IGAIN))*4096.0
      I=I+1
114   IF(ICALCL.GT.-1)GO TO 115
      IREC(I)=(RLOLIM/(FULSCL(IGAIN)))*4096.0
      I=I+1
115   IF(IALARM.LT.1)GO TO 116
      IREC(I)=IALARM
      I=I+1
116   IF(ISBTSK.EQ.-1)GO TO 117
      IREC(I)=ISBTSK
      I=I+1
117   IF(ITWAVG.LT.1)GO TO 118
      IREC(I)=ITWAVG
      I=I+1
118   IWRDOT=I-1
      BYTBUF(2)=RUNTOT
      RUNTOT=RUNTOT+IWRDOT
      CALL OUTPUT(1,IWRDOT)
150   RETURN
      END
```

FIG. 17/1516

```
ALARM 1

      NOERR=0
      IF(CREATE) GO TO 500
      SP=.TRUE.
      HIC=.TRUE.
      HIF=.TRUE.
      LOC=.TRUE.
      LOF=.TRUE.
      PCT=.TRUE.
      IF(IALPHA(1).EQ.LSP) SP=.FALSE.
      IF(.NOT.(.NOT.SP.OR.IALPHA(1).EQ.LCS)) NOERR=NOERR+1
      IF(IALPHA(4).EQ.LSP) HIC=.FALSE.
      IF(.NOT.(.NOT.HIC.OR.IALPHA(4).EQ.LCC)) NOERR=NOERR+1
      IF(IALPHA(7).EQ.LSP) HIF=.FALSE.
      IF(.NOT.(.NOT.HIF.OR.IALPHA(7).EQ.LCF)) NOERR=NOERR+1
      IF(IALPHA(19).EQ.LSP) LOC=.FALSE.
      IF(.NOT.(.NOT.LOC.OR.IALPHA(19).EQ.LCC)) NOERR=NOERR+1
      IF(IALPHA(22).EQ.LSP) LOF=.FALSE.
      IF(.NOT.(.NOT.LOF.OR.IALPHA(22).EQ.LCF)) NOERR=NOERR+1
      IF(IALPHA(34).EQ.LSP) PCT=.FALSE.
      IF(.NOT.(.NOT.PCT.OR.IALPHA(34).EQ.LPC)) NOERR=NOERR+1
      CALL VFLD(IALPHA,24,V1,IV1,RV1)
      CALL VFLD(IALPHA,39,V2,IV2,RV2)
      CALL VFLD(IALPHA,51,V3,IV3,RV3)
      CALL VFLD(IALPHA,60,V4,IV4,RV4)
      IALPHA(52)=LSP
      CALL VFLD(IALPHA,66,V5,IV5,RV5)
      WRITE(PRNTDV,100) SYMBOL,OPRATR,OPRAND
100   FORMAT(1H,13X,7HP  X  F,2X,7HHILM/SP,2X,4HX  F,2X,
     *7HLOLM/DV,2X,1HV,2X,7HHIDB EU,2X,7HLODB EU,2X,4HALMX /
     *3A2,1X,3A2,1X,29A2 )
      IF(NOERR.EQ.0) RETURN
      ERRCNT=ERRCNT+1
      ERRBUF(ERRCNT)=100+NOERR
      RETURN
500   CONTINUE
      DO 510 I=1,16
      LRHDR(I)=0
510   CONTINUE
      BYTBUF(6)=RUNTOT
      II=2
      IF(SP) GO TO 600
      IF(.NOT.V1) GO TO 550
      LRHDR(15)=1
      IF(HIC) GO TO 530
      IF(RV1.GT.COMPR) NOERR=NOERR+1
      IREC(II)=RV1*FIXPNT+0.5
      GO TO 549
530   CONTINUE
      LRHDR(14)=1
      IF(.NOT.HIF) LRHDR(13)=1
      IREC(II)=IV1
549   II=II+1
550   CONTINUE
      IF(.NOT.V2) GO TO 700
      LRHDR(12)=1
      IF(LOC) GO TO 580
      IF(RV2.GT.COMPR) NOERR=NOERR+1
      IREC(II)=RV2*FIXPNT+0.5
      GO TO 599
```

FIG. 17/1517

```
580   CONTINUE
      LRHDR(11)=1
      IF(.NOT.LOF) LRHDR(10)=1
      IREC(II)=IV2
599   II=II+1
      GO TO 700
600   CONTINUE
      LRHDR(16)=1
      IF(V1.AND.V2) GO TO 602
601   NOERR=NOERR+1
      GO TO 700
602   CONTINUE
      IF(PCT.AND.RV2.GT.100.0) GO TO 601
      IF(PCT)RV2=RV2/100.0
      LRHDR(5)=1
      IF(HIC.OR.LOC) GO TO 640
      RV=RV1+RV2
      IF(PCT)RV=RV1+RV1*RV2
      IF(RV.GT.COMPR) NOERR=NOERR+1
      IREC(II)=RV*FIXPNT+0.5
      RV=RV1-RV2
      IF(PCT)RV=RV1-RV1*RV2
      IREC(II+1)=RV*FIXPNT+0.5
      IREC(II+2)=RV1*FIXPNT+0.5
      IREC(II+3)=RV2*FIXPNT+0.5
      IF(PCT)IREC(II+3)=RV2*2.0**15+0.5
      II=II+4
      GO TO 700
640   CONTINUE
      IF(HIC) GO TO 650
      IF(RV1.GT.COMPR) NOERR=NOERR+1
      IREC(II)=RV1*FIXPNT+0.5
      GO TO 659
650   CONTINUE
      LRHDR(9)=1
      IF(.NOT.HIF) LRHDR(8)=1
      IREC(II)=IV1
659   II=II+1
660   CONTINUE
      IF(LOC) GO TO 670
      IF(RV2.GT.COMPR) NOERR=NOERR+1
      IREC(II)=RV2*FIXPNT+0.5
      IF(PCT)IREC(II)=RV2*2.0**15+0.5
      GO TO 679
670   CONTINUE
      LRHDR(7)=1
      IF(.NOT.LOF) LRHDR(6)=1
      IREC(II)=IV2
679   II=II+1
700   CONTINUE
      IF(.NOT.V3) GO TO 750
      LRHDR(3)=1
      IF(RV3.GT.COMPR) NOERR=NOERR+1
      IREC(II)=RV3*FIXPNT+0.5
      II=II+1
```

FIG. 17/1518

```
      IF(.NOT.(V3.AND.V4.AND.RV3.EQ.RV4)) GO TO 750
      LRHDR(1)=1
      LRHDR(2)=1
750   CONTINUE
      IF(.NOT.V4) GO TO 800
      LRHDR(2)=1
      IF(RV4.GT.COMPR) NOERR=NOERR+1
      IREC(II)=RV4*FIXPNT+0.5
      II=II+1
800   CONTINUE
      IF(.NOT.V5) GO TO 900
      LRHDR(4)=1
      IREC(II)=IV5
      II=II+1
900   CONTINUE
      IF(NOERR.EQ.0) GO TO 920
      ERRCNT=ERRCNT+1
      ERRBUF(ERRCNT)=200+NOERR
      CANCEL=.TRUE.
      RETURN
920   CONTINUE
      IF(CANCEL)RETURN
      IREC(1)=LRHDR(16)
      DO 930 J=1,15
      I=16-J
      IREC(1)=IREC(1)*2+LRHDR(I)
930   CONTINUE
      NI=II-1
      CALL OUTPUT(1,NI)
      RUNTOT=RUNTOT+NI
      RETURN
      END
```

FIG. 17/1519

```
NAMEX

  10   IF(CREATE) GO TO 100
  20   IF(IALPHA(37).EQ.BLANK1.AND.IALPHA(44).EQ.BLANK1)
      *GO TO 40
       ERRBUF(1) = 201
       RETURN
  40   DO 45 I=1,29
       LOCBUF(I) = OPRAND(I)
  45   CONTINUE
       DECODE(58,1001,LOCBUF) PDESCP,ENGUNT,UNITNM
1001   FORMAT(18A2,1X,3A2,1X,I1)
  50   WRITE(PRNTDV,1002) SYMBOL,CONTNU,OPRATR,ISPACE,OPRAND
1002   FORMAT(1H,22X,17HPOINT DESCRIPTION,13X,2HEU,3X,1HU/
      *3A2,A1,3A2,A1,29A2)
 100   IX = 1
       IF(FILTYP.NE.14) GO TO 110
       IX = MATBL(4,MODTYP)
       CALL UNPACK(X3166,I,I,I,IX)
 110   BYTBUF(IX) = UNITNM*16
       DO 120 I=1,3
       J = 4-I
       IF(ENGUNT(J).NE.BLANK2) GO TO 130
 120   CONTINUE
       GO TO 150
 130   CONTINUE
       BYTBUF(IX) = BYTBUF(IX) + RUNTOT
       DO 140 I=1,J
       IREC(I) = ENGUNT(I)
 140   CONTINUE
       CALL OUTPUT(1,J)
       RUNTOT = RUNTOT + J
 150   DO 160 I=1,18
       J = 19-I
       IF(PDESCP(J).NE.BLANK2) GO TO 170
 160   CONTINUE
       GO TO 190
 170   CONTINUE
       BYTBUF(IX+1) = RUNTOT
       DO 180 I = 1,J
       IREC(I) = PDESCP(I)
 180   CONTINUE
       CALL OUTPUT(1,J)
 190   RETURN
       END
```

FIG. 17/1520

```
CONSTC

      IDATER = 0
      ISYTAX = 0
      IF(CREATE) GO TO 100
      NUMSEC = 0
      BPT = 0
      BPS = 0
      INDEX = 0
      DP = 0
      DO 10 I=1,16
      J = CHKTBL(I)
      IF(IALPHA(J).NE.BLANK1) ISYTAX = ISYTAX + 1
   10 CONTINUE
      FILCOR = -1
      IF(IALPHA(1).EQ.LETTRC)FILCOR = 0
      IF(IALPHA(1).EQ.BLANK1)FILCOR = 1
      IF(FILCOR.EQ.-1) ISYTAX = ISYTAX + 1
      EXFLAG = -1
      IF(IALPHA(4).EQ.LETTRE) EXFLAG = 1
      IF(IALPHA(4).EQ.BLANK1) EXFLAG = 0
      IF(EXFLAG.EQ.-1) ISYTAX = ISYTAX + 1
      EXLOC = -1
      IF(IALPHA(7).EQ.LETTRC) EXLOC = 1
      IF(IALPHA(7).EQ.BLANK1) EXLOC = 0
      IF(EXLOC.EQ.-1) ISYTAX = ISYTAX + 1
      IF(EXLOC.EQ.1.AND.EXFLAG.NE.1) IDATER = IDATER + 1
   30 NUMTYP = -1
      IF(IALPHA(10).EQ.LETTRF) NUMTYP = 0
      IF(IALPHA(10).EQ.BLANK1) NUMTYP = 1
      IF(NUMTYP.EQ.-1) ISYTAX = ISYTAX + 1
      DO 15 I=1,29
      LOCBUF(I) = OPRAND(I)
   15 CONTINUE
      DECODE(58,1001,LOCBUF)INDEX,BPT,DP
 1001 FORMAT(12X,I4,17X,I3,2X,I1)
      IF(DP.EQ.0) DP = 7
      IF(EXFLAG.NE.1) GO TO 40
      DO 35 I=13,16
      IF(IALPHA(I).NE.BLANK1) GO TO 40
   35 CONTINUE
      IDATER = IDATER + 1
   40 IF(EXFLAG.NE.1.OR.EXLOC.NE.0) GO TO 50
      KOL = 33
      CALL HEXCOV(IALPHA,KOL,NUMSEC)
      IF(NUMSEC.EQ.-1) IDATER = IDATER + 1
   50 IF(EXFLAG.NE.0) GO TO 60
      KOL = 39
      INTVAL = 0
      CALL VFLD(IALPHA,KOL,FULL,INTVAL,RELVAL)
      IF(INTVAL.NE.0) IDATER = IDATER + 1
      IF(FULL.AND.EXFLAG.EQ.1) ISYTAX = ISYTAX + 1
      IF(.NOT.FULL.AND.EXFLAG.EQ.0) IDATER = IDATER + 1
      IF(NUMTYP.EQ.0.AND.IALPHA(36).EQ.BLANK1) IDATER =
     *IDATER + 1
```

FIG. 17/1521

```
      IF(NUMTYP.NE.0) GO TO 60
      TEMP = 2.**(15-BPT) - 1.
      BPS = 0
      IF(BPT.GE.0) GO TO 77
      BPS = 1
      BPT = -BPT
 77   IF(RELVAL.GT.TEMP) IDATER = IDATER + 1
 60   WRITE(PRNTDV,1002) SYMBOL,CONTNU,OPRATR,ISPACE,OPRAND
1002  FORMAT(1H,13X,29HR D K F INDX SEC# VALUE,4X,6HBPT  M/
     *3A2,A1,3A2,A1,29A2)
      IF(ISYTAX.EQ.0) GO TO 65
      ERRCNT=ERRCNT + 1
      ERRBUF(ERRCNT) = ISYTAX + 100
 65   IF(IDATER.EQ.0) GO TO 68
      ERRCNT = ERRCNT + 1
      ERRBUF(ERRCNT) = IDATER + 200
 68   CONTINUE
 70   RETURN
 100  I = PACK(XD111,Z,EXFLAG,EXLOC,NUMTYP)
      J = PACK(X0B14,Z,I,BPS,BPT)
      IREC(1) = PACK(X8350,J,DP,Z,Z)
      IF(EXFLAG.EQ.1) GO TO 150
      IF(NUMTYP.EQ.1) GO TO 120
      IREC(2) = RELVAL*(2.**BPT) + 0.5
      GO TO 200
 120  RIREC2 = RELVAL
      GO TO 200
 150  IREC(2) = INDEX
      IF(EXLOC.EQ.0) IREC(3) = NUMSEC
 200  J = 2
      IF((NUMTYP.EQ.1.AND.EXFLAG.EQ.0).OR.(EXFLAG.EQ.1.AND.
     *EXLOC.EQ.0)) J = 3
      RUNTOT = RUNTOT + J
      CALL OUTPUT(1,J)
      RETURN
      END
```

FIG. 17/1522

PERCCI

```
      IF(CREATE) GO TO 99
      DO 15 I=1,29
 15   KA(I)=OPRAND(I)
      DO 20 I=1,58
 20   KB(I)=IALPHA(I)
      WRITE(PRNTDV,100) SYMBOL,CONTNU,OPRATR,ISPACE,OPRAND
100   FORMAT(1H,22X,17HPOINT DESCRIPTION,10X,22HSU
     *STATUSRTATUSBT R/CP/ 3A2,A1,3A2,A1,29A2)
      IF(IALPHA(39).EQ.BLANK1) GO TO 17
      ERRCNT=ERRCNT + 1
      ERRBUF(ERRCNT) = 101
 17   CONTINUE
      DECODE(57,1,KA) KSM,KU,KBIT,KWORD
      IF(KSM.EQ.0.OR.KSM.EQ.1) GO TO 21
      ERRCNT = ERRCNT + 1
      ERRBUF(ERRCNT) = 201
 21   CONTINUE
      FILCOR = KSM
      RETURN
 99   CONTINUE
      KODE=KWORD+KBIT*1024
      K=0
      IF (KB(58) .EQ.KBLANK) GO TO 30
      IF(KB(58).EQ.KZERO) K=2
      IF(KB(58).EQ.KONE) K=3
 30   CONTINUE
      KODE=K*16384+KODE
      KC(4)=KODE
      IX = 1
      IF(FILTYP.NE.14) GO TO 35
      IX = MATBL(4,MODTYP)
      CALL UNPACK(X3166,I,I,I,IX)
 35   BYTBUF(IX) = KU*16
      DECODE (51,4,KA) KB
      J=5
      DO 60 I=1,3
      IF (KB(I) .EQ. KBLANK) GO TO 60
      KC(J)=KB(I)
      J=J+1
 60   CONTINUE
      IF(J.EQ.5) GO TO 61
      BYTBUF(IX) = BYTBUF(IX) + J + RUNTOT - 4
 61   CONTINUE
      DO 70 I=4,6
      IF (KB(I) .EQ. KBLANK) GO TO 70
      KC(J)=KB(I)
      J=J+1
 70   CONTINUE
      BYTBUF(IX+1) = J + RUNTOT - 4
      K=19
 75   K=K-1
      IF(K.NE.0) GO TO 76
      BYTBUF(IX+1)=0
      GO TO 81
```

FIG. 17/1523

```
76    IF (KA(K) .EQ. KBLANK) GO TO 75
      DO 80 I=1,K
      KC(J)=KA(I)
      J=J+1
80    CONTINUE
81    CONTINUE
      J=J-1
      RUNTOT=RUNTOT + J - 3
      K=1
      DO 90 I=4,J
      IREC(K)=KC(I)
      K=K+1
90    CONTINUE
      CALL OUTPUT(1,K-1)
      RETURN
 1    FORMAT(36X,2I1,13X,I2,I4)
 4    FORMAT (39X,6A2)
      END
```

FIG. 17/1524

```
BEFILE

      GO TO  (10,20) FILTYP
  5   GO TO 100
 10   IREC(1) = IVIDAR
      GO TO 25
 20   IREC(1) = 0
 25   FILTYP = 0
      DO 30 I=4,8
      IWORD = MATBL(4,I)
      CALL UNPACK(X111D,JJ,JJ,KK,IWORD)
      USED(I-3) = KK
 30   CONTINUE
      IF((USED(1).NE.0.OR.USED(2).NE.0).AND.(USED(3).EQ.
     *0.AND.USED(4).EQ.0.AND.USED(5).EQ.0)) FILTYP = 1
      IF((USED(3).NE.0.OR.USED(4).NE.0.OR.USED(5).NE.0).
     *AND.(USED(1).EQ.0.AND.USED(2).EQ.0)) FILTYP = 2
      IF((USED(3).NE.0.OR.USED(4).NE.0.OR.USED(5).NE.0).
     *AND.(USED(1).NE.0.OR.USED(2).NE.0)) FILTYP = 3
      IREC(6) = JFREQ
      GO TO 150
100   IREC(1) = 1
      IREC(6) = 1
150   DO 160 I = 2,4
      IREC(I) = LSTSYM(I-1)
160   CONTINUE
      IREC(5) = -(FILTYP + 1)
      IREC(7) = FILCOR
      IF(FILTYP.EQ.15) FILTYP=14
200   IT = 29
      NN = 7
      CALL OUTPUT(IT,NN)
      RETURN
      END
```

FIG. 17/1525

```
RCSERR

  10    IF(TYPERR.AND..NOT.TYPSTP) GO TO 20
        GO TO 30
  20    WRITE(PRNTDV,1001)(SYMBOL(I),I=1,3)
1001    FORMAT(////8H**** NO,3A2,21H FILES GENERATED****////1X)
        TYPSTP = .TRUE.
        GO TO 50
  30    IF(CANCEL.OR.SIXFLG) GO TO 51
        IF(MESTOP) GO TO 50
        WRITE(PRNTDV,1002)(SYMBOL(I),I=1,3)
1002    FORMAT(4H ** ,3A2,19H FILE NOT GENERATED)
        MESTOP = .TRUE.
  50    WRITE(PRNTDV,1003)(SYMBOL(I),I=1,3),CONTNU,(OPRATR(J),
       *J=1,3),(OPRAND(K),K=1,29)
1003    FORMAT(22H //// DFG ERROR /////3A2,A1,3A2,1X,29A2)
        GO TO 60
  51    WRITE(PRNTDV,1002)(LSTSYM(I),I=1,3)
        IF(SIXFLG) GO TO 60
        WRITE(PRNTDV,1004)(MATBL(I,MODTYP),I=1,3)
1004    FORMAT(6X,15HINVALID DATA - ,3A2)
        IT = 31
        NN = 0
        CALL OUTPUT(IT,NN)
  60    DO 65 I=1,ERRCNT
        WRITE(PRNTDV,1005) ERRBUF(I)
  65    CONTINUE
1005    FORMAT(10X,8H ERROR #,I3)
        WRITE(PRNTDV,1006)
1006    FORMAT(1H )
  70    DO 75 I=1,6
        ERRBUF(I) = 0
  75    CONTINUE
        ERRCNT = 0
        IERFLG = -1
        SIXFLG = .FALSE.
        RETURN
        END
```

FIG. 17/1526

```
VFLD

      VAL = .FALSE.
      INT = 0
      REL=0.0
      DP=.FALSE.
      I=KOL-14
      J=I+7-1
      DO 10 K=I,J
      IF(LA1B(K).NE.LSP) VAL=.TRUE.
      IF(LA1B(K).EQ.LDP) DP=.TRUE.
 10   CONTINUE
      IF(.NOT.VAL) RETURN
      ENCODE(8,100,IV) (LA1B(K),K=I,J)
100   FORMAT(7A1)
      IF(DP) GO TO 20
      DECODE(7,110,IV) INT
110   FORMAT(I7)
      RETURN
 20   DECODE(7,120,IV) REL
120   FORMAT(F7.0)
      RETURN
      END
```

FIG. 17/1527

```
HEXCOV

      IHEX=0
      IBLANK=0
      IC=3
      KOL=KOL1-15
      DO 10 I=1,4
      II=KOL+I
      IF(IALPHA(II).EQ.IBLK) GO TO 50
      DO 20 J-1,16
      IF(IALPHA(II).EQ.IHEXCH(J)) GO TO 30
 20   CONTINUE
      IHEX=-1
      GO TO 60
 30   IALPHA(II)=J-1
      IHEX=IHEX+IALPHA(II)*16**IC
      IC=IC-1
      GO TO 10
 50   IBLANK=IBLANK+1
 10   CONTINUE
      IF(IBLANK.EQ.3 )IHEX=0
 60   RETURN
      END
```

FIG. 17/1528

```
OCTAL

      IRESLT=0
      KOLUM=KOL-14
      ICHARC=NUMBER
      DO 10 I=1,ICHARC
      ITEMP=IARRAY(KOLUM)
      DECODE(1,20,ITEMP)IDUMI
 20   FORMAT(I1)
      IF(IDUMI.GT.7) GO TO 50
      IPOWER=ICHARC-I
      IRESLT=IRESLT + IDUMI*8**(IPOWER)
      KOLUM=KOLUM+1
 10   CONTINUE
      GO TO 100
 50   IRESLT=-1
100   RETURN
      END
```

FIG. 17/1529

```
SEARCH

      IDEPTH-0
      DO 10 I=1,16
      IF(INAME(1).EQ.SHRKNM(2,I).AND.(SHRKNM(1,I).NE.-1))
     *GO TO 20
 10   CONTINUE
      IDEPTH=-1
      GO TO 40
 20   DO 30 J=1,3
      IF(INAME(J).NE.SHRKNM(J+1,I)) GO TO 10
 30   CONTINUE
      IDEPTH=I
 40   RETURN
      END
```

FIG. 17/1530

```
OUTPUT

          IW=1
          NW=NN
    1     CONTINUE
          IF(LCNT.NE.3) GO TO 10
          DO 5 I=2,54
          OUTBUF(I)=0
    5     CONTINUE
   10     CONTINUE
   12     CONTINUE
          K=54-LCNT
          IF(NW+1.GT.K) GO TO 30
          L=IW+NW-1
          LL=LCNT
          IF(L.EQ.0) GO TO 17
          DO 15 I=IW,L
          LL=LL+1
          OUTBUF(LL)=IREC(I)
   15     CONTINUE
   17     CONTINUE
          OUTBUF(LCNT)=IT*2048+NW
          LCNT=LL+1
          IF(L.EQ.NN) GO TO 99
          IW=IW+NW
          NW=NN-L
          GO TO 32
   30     CONTINUE
          IF(IT.EQ.1.AND.K.GE.2) GO TO 40
   32     CONTINUE
          OUTBUF(2)=LSEQ
          OUTBUF(54)=LCKSM(OUTBUF(1))
          CALL WBINRD(IP,OUTBUF(1))
          IF(.NOT.PRINT) GO TO 35
          WRITE(PRNTDV,1002)(OUTBUF(I),I=1,54)
 1002     FORMAT(7(/1X,8(Z4,1X)))
   35     CONTINUE
          LSEQ=LSEQ+1
          LCNT=3
          GO TO 1
   40     CONTINUE
          NW=K-1
          GO TO 12
   99     IF(IT.NE.2) RETURN
          OUTBUF(2)=LSEQ
          OUTBUF(54)=LCKSM(OUTBUF(1))
          CALL WBINRD(IP,OUTBUF(1))
          IF(.NOT.PRINT) GO TO 100
          WRITE(PRNTDV,1002)(OUTBUF(I),I=1,54)
  100     CONTINUE
          LSEQ=1
          LCNT=3
          RETURN
          END
```

FIG. 17/1531

```
11111   CONTINUE
        DO 10 I = 1,250
   10   BNONDX(I)=0
        MACLM1 = 0
        SEQNO=0
        CHNERR=.FALSE.
        ALGERR = .FALSE.
        SYMCOR = .TRUE.
        RECPOS =3
        NOSYMS = 0
        SYMLM1 = 0
        SYMLM2 = 0
        STATE = 0
        CONST=.FALSE.
        CONST1=.FALSE.
        SYMOP=.TRUE.
    1   CONTINUE
        CALL READER
   16   CONTINUE
        BLKNO = 0
        WORD(1)= 1
        CALL PAKNUM
        IF(NOCHAR .EQ. -1) GO TO 1
        IF(NOCHAR .EQ. 0) GO TO 17
        BLKNO= WORD(1)
   17   CONTINUE
        ISTART= PAKPOS
        CALL PAKWRD
        DO 35 I=1,12
        DO 34 J=1,4
        IF (WORD(J) .NE. DIRDIC(J,I)) GO TO 35
   34   CONTINUE
        DUMDUM = DIRDIC( 5,I)
        GO TO 40
   35   CONTINUE
        DUMDUM= ALGJAZ
   40   CONTINUE
        CALL UNPACK (X4444,TYPE,HISTA,LOSTA,DUMDUM)
   80   IF ( STATE .LT. LOSTA .OR. STATE .GT. HISTA )
       *CALL NONO(20)
        IF(BLKNO .GT. 0) CALL BNODEF
        IF( TYPE .GT. 8) CHNERR= .FALSE.
        GO TO (100,200,300,400,500,600,700,800,900,
       *1000,1100,1200) TYPE
  100   CONTINUE
        STATE= 4
        CALL ALGSUP
        ERRSKP = .FALSE.
        GO TO 16
  200   CONTINUE
        STATE=3
        CALL ARITH
        GO TO 16
```

FIG. 17/1541

```
300     CONTINUE
        STATE= 3
301     CONTINUE
        CALL LOGICAL
        GO TO 16
400     CONTINUE
        CALL RAPPER
        STATE= 1
        GO TO 1
500     CONTINUE
        GO TO 1
600     CONTINUE
        GO TO 1
700     CONTINUE
        STATE= 3
        GO TO 1
800     CONTINUE
        GO TO 1
900     CONTINUE
        CALL SYMRDR
        IF( ERRSKP ) GO TO 1200
        STATE= 1
        GO TO 1
1000    CONTINUE
        CALL MACROR
        IF( MACERR ) GO TO 1200
        STATE= 1
        GO TO 1
1100    CONTINUE
        CALL CHAIN
        ERRSKP =.FALSE.
        STATE=2
        GO TO 16
1200    CONTINUE
        MODPOD(1) = 3
        CALL MODMOD
        CALL EXIT
        GO TO 11111
        END
```

FIG. 17/1542

```
READER

    1     INBEND =80
          RSTART = 1
          ERRSKP= .FALSE.
    2     CALL R40A2 ( INDEV, IBUF(1),NOWRDS )
          DECODE(80, 10000, IBUF ) (INBUF(I),
         *I=RSTART, INBEND)
10000     FORMAT( 80A1)
          DO 4444 I=1,40
 4444     RDBUF(I) = IBUF(I)
          WRITE(OUTDEV, 10001 ) (RDBUF(I), I=1, NOWRDS)
10001     FORMAT(1H, 40A2)
    3     CONTINUE
          CHAR1=INBUF(RSTART)
          IF (CHAR1 .EQ. ASBL) GO TO 2
          IF(CHAR1 .NE. CBL ) GO TO 5
          INBUF(RSTART)=BLBL
          INBEND=INBEND+72
          RSTART=RSTART+72
          IF (INBEND .LT. 225 ) GO TO 2
          CALL NONO ( 2)
    5     CONTINUE
          ISTART= 1
          PAKPOS=1
          INBEND = INBEND - 8
          RETURN
          END
```

FIG. 17/1543

```
NONO (ERRNO)

          IP= PAKPOS-15
          IF( PAKPOS .LT.17 ) IP = 1
          WRITE(ERROUT,999) ERRNO, ( INBUF(I),I=IP,PAKPOS )
  999     FORMAT(/ 13H ///// ERROR ,I5,10X,16A1 / 1H )
          MODPOD(1)=9
          CALL MODMOD
          CHNERR= .TRUE.
          ERRSKP= .TRUE.
          RETURN
          END
```

FIG. 17/1544

```
MODMOD

        LAST = .FALSE.
        IF(ITYPE.EQ.3) GO TO 30
        IF(CHNERR) RETURN
        R=0
        I = ITYPE
        GO TO (10, 20, 30, 40, 50, 60, 70, 80, 90 ),I
   10   TYPE=0
        N=1
        GO TO 100
   20   TYPE=1
        INDEX = INDEX+N
        GO TO 100
   30   TYPE=2
        N = 2
        MOD(1) = 0
        MOD(2) = 0
        GO TO 100
   40   TYPE=9
        N=1
        GO TO 100
   50   TYPE= X001C
        GO TO 100
   60   TYPE=X001D
        INDEX = 0
        N=7
        GO TO 100
   70   TYPE=X001E
        N=3
        GO TO 100
   80   TYPE=X001B
        N=0
        GO TO 100
   90   TYPE=X001F
        N=0
  100   I= NXPOS+N
        IF( I .LT. 54) GO TO 110
  105   CONTINUE
        SEQNO = SEQNO + 1
        REC(2) = SEQNO
        REC(54) = LCKSM(REC(1))
        GO TO 1000
  998   CONTINUE
        WRITE (OUTDEV, 999 ) REC
  999   FORMAT(1H /10X, 47H       BINARY RECORD
        1,1X,7(/11X,8(Z4,2X)))
 1000   CONTINUE
        CALL WBINRD(BOTDEV, REC(1))
        DO 108 I=3,NXPOS
  108   REC(I)=0
        NXPOS=3
        IF( LAST ) RETURN
  110   REC(NXPOS)= PACK( X5380, TYPE, R, N, 0 )
        IF ( N .EQ. 0 ) GO TO 210
        DO 200 I=1,N
        IPOS = NXPOS+I
        REC(IPOS) = MOD(I)
  200   CONTINUE
  210   CONTINUE
        NXPOS = NXPOS+ N+ 1
        IF(TYPE .NE. 2) GO TO 220
        LAST= .TRUE.
        GO TO 105
  220   RETURN
        END
```

FIG.17/1545

```
PAKWRD

            DO 200 J=PAKPOS, INBEND
            IPOS=J
            DO 100 I=1,28
            CHAR= INBUF(IPOS)
      3     LDG  X6008
S           SHF  5
S           AND  X007F
S           SUB  X0030
S           NJP  )110
S           SUB  X000B
S           NJP  )90
S           SUB  X0006
S           NJP  )110
S           SUB  X001A
S           PJP  )110
     90     CONTINUE
            IPOS = IPOS+ 1
    100     CONTINUE
    110     IF(I .EQ. 1) GO TO 200
            NOCHAR=I-1
            GO TO 250
    200     CONTINUE
            NOCHAR=0
            GO TO 300
    250     CONTINUE
            JEND= IPOS-1
            DO 260 I1=1,14
    260     WORD1(I1)=BLBL
            ENCODE(28,10000,WORD1) (INBUF(J),J=J,JEND)
  10000     FORMAT( 28A1 )
            NOCHAR=NOCHAR
S           LDG  X6001
S           SHF  5
S           PJP  )290
            I1=NOCHAR/2+1
    285     WORD1(I1) = WORD1(I1)
S           LDE  $-1
S           STE  $+2
S           EOR  X00A0
S           DAT  0
    290     CONTINUE
            DO 295 I1=1,14
    295     WORD(I1)= WORD1(I1)
    300     CONTINUE
            RETURN
            END
```

FIG. 17/1546

```
PAKNUM

          DO 100 I=1,20
   100    NUMBR(I) = BLBL
          NOFS = 0
          NOIS = 0
          NOCHAR = 0
          ITYPE = WORD(1)
          IPASS = 0
   150    CONTINUE
          DO 200 PP=PP,INBEND
          IF(INBUF(PP).NE.BLBL) GO TO 210
   200    CONTINUE
          NOCHAR = -1
          RETURN
   210    PS = PP
          IF(INBUF(PP) .NE. EQBL ) GO TO 215
          PP = PP+1
          GO TO 150
   215    CONTINUE
          IF(ITYPE.EQ.3) GO TO 700
          PE = PP+19
   220    CONTINUE
          CHAR = INBUF(PS)
S         SUB  X2BA0
S         ZJP  )230
S         SUB  X0200
S         ZJP  )230
S         JMP  )240
   230    CONTINUE
          PS = PS + 1
   240    CONTINUE
          NODS = 0
          DO 260 PS=PS,PE
          CHAR = INBUF(PS)
S         LDG  X6008
S         SHF  5
S         AND  X007F
S         SUB  X0030
S         NJP  )280
S         SUB  X000A
S         PJP  )280
          NODS=NODS+1
   260    CONTINUE
   280    CONTINUE
          IF(ITYPE.EQ.1) GO TO 520
          IPASS = IPASS+1
          GO TO (300,350,400) IPASS
   300    CONTINUE
          NOIS = NODS
S         LDA   CHAR
S         SUB  X2EA0
S         ZJP  )230
```

FIG. 17/1547

```
S           INC   IPASS
S           STZ   NODS
  350       CONTINUE
            NOFS = NODS
            PS=PS+1
S           LDA    CHAR
S           SUB   XC5A0
S           ZJP   )220
            PS = PS-1
            GO TO 500
  400       CONTINUE
            NOES=NODS
  500       CONTINUE
            NODS = NOIS+NOFS
  520       IF(NODS.NE.0) GO TO 540
            RETURN
  540       NOCHAR = PS-PP
            PP=PS
            IBP = PP
            IWP = 20
            DO 600 I=1,NOCHAR
            IBP = IBP-1
            NUMBR(IWP) = INBUF(IBP)
  600       IWP = IWP-1
            ENCODE(20,10000,NUMB2) NUMBR
            GO TO (620,640,660) ITYPE
10000       FORMAT(20A1)
  620       DECODE(20,10001,NUMB2) WORD(1)
10001       FORMAT(I20)
            RETURN
  640       DECODE(20,10002,NUMB2) VALUE
10002       FORMAT(F20.0)
            RETURN
  660       DECODE(20,10003,NUMB2) WORD(1)
10003       FORMAT(Z20)
            RETURN
  700       CONTINUE
            NODS=0
            PE=PS+3
            DO 750 PS=PS,PE
            CHAR=INBUF(PS)
S           LDG   X6008
S           SHF   5
S           AND   X007F
S           SUB   X0030
S           NJP   )520
S           SUB   X000A
S           NJP   )740
S           SUB   X0007
S           NJP   )520
S           SUB   X0006
S           NJP   )740
S           JMP   )520
  740       CONTINUE
            NODS=NODS+1
  750       CONTINUE
            GO TO 520
            END
```

FIG. 17/1548

```
SYMREF

          IF(CONST) GO TO 100
          IF(NOSYMS.GT.0) GO TO 100
          CALL NONO(25)
          GO TO 900
  100     CONTINUE
          SYMNDX = 0
          IF(SYMCOR) GO TO 300
  300     CONTINUE
          IS= SYMLM1+1
          SYMEND = IS     + 4*( NOSYMS-1  )
          DO 400 I=IS, SYMEND, 4
          SYMNDX = SYMNDX+1
          IP = I
          DO 380 I1=1,3
          IF(WORD(I1).NE.CORE(IP)) GO TO 400
  380     IP=IP+1
          VALUE = CORE(IP)
          IF(SYMOP) GO TO 390
          IF( SYMVAL .EQ. -1) GO TO 390
          IF (SYMVAL.LT.0) GO TO 900
          IF(VALUE.GE.0) GO TO 382
          IP=SYMLM1 -4 * VALUE
          VALUE = CORE(IP)
  382     CONTINUE
          CALL UNPACK( X4C00, TYPE, VALUE, DUMDUM,
         *VALUE)
          CORE(IP)=PACK(X4C00,TYPE,SYMVAL,0,0)
  390     CONTINUE
          SYMVAL = VALUE
          RETURN
  400     CONTINUE
          SYMNDX = -1
  900     RETURN
          END
```

FIG. 17/1549

```
SYMDEF

          IF(NOSYMS.EQ.0) GO TO 120
          IF(CONST1) GO TO 120
          CALL SYMREF
          IF(WORD(4).EQ.-1) GO TO 120
          IF (SYMVAL.LT.0) GO TO 110
          CALL NONO(41)
          GO TO 900
  110     IP=SYMLM1+4*WORD(4)
          CORE(IP)=SYMVAL
          RETURN
  120     CONTINUE
          IF(SYMCOR) GO TO 400
  400     CONTINUE
          IP = SYMLM1+1   + 4*NOSYMS
          I=IP+3
          IF(1.LE.SYMLM2   ) GO TO 420
          CALL NONO(24)
          GO TO 900
  420     DO 460 I=1,3
          CORE(IP) = WORD(I)
  460     IP=IP+1
          CORE(IP) = SYMVAL
          NOSYMS = MOSYMS+1
          IF(CONST) CORE(IP)=KSTRT + 2*(NOSYMS-1)
  900     CONTINUE
          RETURN
          END
```

FIG. 17/1550

```
BNOREF

          IF(BLKNO .LT. 251 ) GO TO 10
          CALL NONO (   7)
          GO TO 100
   10     REF=BNONDX(BLKNO)
          IF(REF .GE. 0) GO TO 20
          REF=-REF
          GO TO 100
   20     BNONDX(BLKNO) = INDEX
  100     RETURN
          END
```

FIG. 17/1551

```
BNODEF

          IF(BLKNO .LT.251 ) GO TO 10
          CALL NONO (   7)
          GO TO 35
   10     IF(BNONDX(BLKNO)) 20, 30, 40
   20     CALL NONO(    8)
          GO TO 35
   30     BNONDX(BLKNO) = -INDEX
   35     RETURN
   40     MODPOD(1)=4
          MODPOD(4)=BNONDX(BLKNO)
          CALL MODMOD
          GO TO 30
          END
```

FIG. 17/1552

```
CHAIN

          CALL PAKWRD
          DO 110 I=1,3
  110     NAME(I) = WORD(I)
          CALL PAKWRD
          IF(WORD(1) .NE.CORE(1).OR.WORD(2) .NE.
         *CORE(2)) GO TO 120
          RES=0
          GO TO 140
  120     IF(WORD(1) .EQ. DISC(1).AND.WORD(2).EQ.
         *DISC(2)) GO TO 130
          CALL NONO(1)
  130     RES=1
  140     CONTINUE
          CTYPE = 0
          DO 150 I=8,9
  150     MODPOD(I) = 0
          LAST = .FALSE.
          BIT = 0
  200     CONTINUE
          CALL READER
          IF( CTYPE .NE. 2 ) GO TO 210
          IF( .NOT. SYMOP) GO TO 210
          CALL NONO(31)
  210     CONTINUE
          CALL PAKWRD
          DO 240 I2=1,10
          DO 230 I1=1,5
          IF(WORD(I1).NE.CHNDIC(I1,I2)) GO TO 240
  230     CONTINUE
          ITYPE = I2
          GO TO 260
```

FIG. 17/1553-A

```
240      CONTINUE
         PAKPOS = 1
         LAST = .TRUE.
         IF( CTYPE .LT. 2 ) GO TO 400
         RETURN
260      CONTINUE
         IF(ITYPE .GT. 3 .AND. CTYPE .LT. 2) GO TO 400
280      GO TO (300, 330, 360, 450, 500, 520, 540,
        *600, 650, 700 ) ITYPE
300      IF(CTYPE .GT. 1) GO TO 880
         WORD(1) = 3
         CALL PAKNUM
         IF( NOCHAR .GT. 0 ) GO TO 310
         CALL NONO( 26 )
         GO TO 900
310      BIT=WORD(1)
         GO TO 200
330      IF( CTYPE .GT. 1) GO TO 880
         WORD(1) = 2
         CALL PAKNUM
         IF( NOCHAR.GT.0) GO TO 340
         CALL NONO(27)
         GO TO 900
340      PERIOD = RVAL*10.
         GO TO 200
360      CONTINUE
         CTYPE=1
         WORD(1) = 2
         CALL PAKNUM
         IE( NOCHAR.GT. 0) GO TO 370
         CALL NONO( 28 )
         GO TO 900
370      FREQ = RVAL * 10.
         GO TO 200
400      CONTINUE
         IF (FREQ.GT. 0 ) GO TO 410
         FREQ = PERIOD
410      CONTINUE
         CBIT= BIT
         CFREQ=FREQ
         MODPOD(1) = 6
         CALL MODMOD
         MODPOD(1) = 2
         MODPOD(3) = 3
         MODPOD(4) = 0
         MODPOD(5) = CBIT
         MODPOD(6) = CFREQ
         CALL MODMOD
         IF ( LAST ) RETURN
         GO TO 280
450      CONTINUE
460      CALL PAKWRD
         IF( NOCHAR .EQ. 0 ) GO TO 490
```

FIG. 17/1553-B

```
      IF (.NOT. SYMOP ) GO TO 465
462   SYMVAL = -1
      CALL SYMREF
      IF(WORD(4) .EQ. -1 GO TO 1000
461   TNAME(1) = 0
      TNAME(2)= SYMVAL
      TNAME(3)= 0
      GO TO 485
465   CONTINUE
      DO 470 I=1,3
470   TNAME(I) = WORD(I)
485   CONTINUE
      MODPOD(1)=7
      CALL MODMOD
      GO TO 460
490   CTYPE= 3
      GO TO 200
500   CONTINUE
      IF(CTYPE .GT. 2 ) GO TO 880
      VTYPE= 3
      CTYPE= 2
      GO TO 200
520   CONTINUE
      IF(CTYPE .GT. 2 ) GO TO 880
      VTYPE= 0
      CTYPE= 2
      GO TO 200
540   CONTINUE
      TYPE = VTYPE + 1
550   CONTINUE
      IF( CTYPE .NE. 2 ) GO TO 880
560   CONTINUE
      CALL PAKWRD
      IF( NOCHAR .EQ. 0 ) GO TO 200
      SYMVAL = TYPE * 4096
      CALL SYMDEF
      GO TO 560
600   CONTINUE
      TYPE = VTYPE + 2
      GO TO 550
650   CONTINUE
      TYPE = VTYPE + 3
      GO TO 550
700   CONTINUE
      IF ( CTYPE .GT. 2 ) GO TO 880
      CALL PAKWRD
      IF( NOCHAR .EQ. 0) GO TO 200
      SYMVAL=-1
      CALL SYMREF
      IF( WORD(4) .NE. -1) GO TO 720
      CALL NONO(29)
      GO TO 900
720   IF ( SYMOP ) GO TO 770
```

FIG. 17/1553-C

```
          SYMVAL = -WORD(4)
 770      CONTINUE
          CALL PAKWRD
          IF ( NOCHAR .NE. 0 ) GO TO 780
          CALL NONO (54)
          GO TO 200
 780      CONTINUE
          CALL SYMDEF
          GO TO 700
 800      GO TO 200
 880      CALL NONO(30)
 900      CONTINUE
          GO TO 200
1000      IF(CONST) GO TO 1001
          CALL NONO(39)
          GO TO 461
1001      CONST1=.TRUE.
          CALL SYMDEF
          CONST1=.FALSE.
          GO TO 462
          END
```

FIG. 17/1553-D

```
RAPPER

          IF( SYMOP ) GO TO 200
          MODPOD(1)=5
          MODPOD(3)=5
          ICP = SYMLM1 + 1
          IVP = SYMLM1
          DO 180 I=1, NOSYMS
          IVP=IVP+4
          VALUE = CORE(IVP)
          IF(VALUE.LT.0) GO TO 110
          CALL UNPACK(X4C00,TYPE,VALUE,DUMDUM,VALUE)
          IF(VALUE.GT.0) GO TO 120
  110     CONTINUE
          ICP=ICP+4
          GO TO 180
  120     CONTINUE
          MODPOD(8)=1
          IF( TYPE.GT.3 ) TYPE=TYPE-3
          MODPOD(8)=MODPOD(8) + TYPE/3
          DO 140 IMP=4, 7
          MODPOD(IMP) = CORE(ICP)
          ICP = ICP+1
  140     CONTINUE
          CALL MODMOD
  180     CONTINUE
          NOSYMS = 0
  200     CONTINUE
          IF(CONST) GO TO 210
          NOSYMS = CORE(SYMLM1)
  210     DO 300 I=1,250
          IF( BNONDX(I)) 220, 300, 260
  220     CONTINUE
          BNONDX(I) = 0
          GO TO 300
  260     CONTINUE
          IERR = I+1000
          CALL NONO(IERR)
          MODPOD(1) = 8
          CALL MODMOD
          GO TO 220
  300     CONTINUE
          MODPOD(1) = 2
          MODPOD(3) = 1
          MODPOD(4) = PACK( X8800, BLKNO, X00FF, 0, 0)
          CALL MODMOD
          MODPOD(1) = 8
          CALL MODMOD
          IF(CONST) GO TO 400
  430     WRITE(OUTDEV,410)
  410     FORMAT(1H1)
          RETURN
  400      IF(NOSYMS.EQ.CORE(SYMLM1)) GO TO 430
```

FIG. 17/1554-A

```
       LOWLIM=CORE(SYMLM1) + 1
       WRITE(OUTDEV,390)
390    FORMAT(1H //10X, 44H         SYMBOL TABLE
      1)
       DO 420 I=LOWLIM,NOSYMS
       IADD=(I-1)*4+1+SYMLM1
       WRITE(OUTDEV,421) CORE(IADD),CORE(IADD+1),
      *CORE(IADD+2), CORE(IADD+3)
421    FORMAT(1H, 25X, 3A2, 4X, Z4)
420    CONTINUE
       CORE(SYMLM1)=NOSYMS
       GO TO 430
       END
```

FIG. 17/1554-B

```
LOGICAL

 100    CALL READER
        DO 200 I=1,INBEND
        IF(INBUF(I) .EQ. EQUSIN ) GO TO 250
 200    CONTINUE
        RETURN
 250    INBUF(I) = BLANK
 305    NXLSYM=1
        NLPREN=0
        PMACH = 0
        NOOPS=0
        K=1
        DO 307  I=1,40
 307    WRKBUF(I)=0
        WBEND = 40
        DO 308 I=1,16
 308    LSYMS(1,I) = 0
 310    DO 350 I=ISTART,INBEND
        CHAR=INBUF(I)
        IF ( CHAR .EQ. BLANK ) GO TO 350
        IF (CHAR .NE. LPREN ) GO TO 322
        NLPREN=NLPREN+1
        WRKBUF(K) = LPC
        K=K+1
        PMACH = PMACH +1
        GO TO 350
 322    IF ( CHAR .NE. RPREN ) GO TO 324
        IF(PMACH .LT. 1) CALL NONO (5)
        PMACH = PMACH - 1
        WRKBUF(K)=RPC
        K=K+1
        GO TO 350
 324    CONTINUE
        PAKPOS=I
        CALL PAKWRD
        IF( NOCHAR .NE. 0 ) GO TO 325
        CALL NONO( 3)
        GO TO 900
 325    IF( CHAR .NE. PERIOD ) GO TO 331
        DO 328 J=1,4
        IF( WORD(1) .EQ. OPDIC1(J)  ) GO TO 330
 328    CONTINUE
 329    CALL NONO( 4)
        GO TO 900
 330    IF(WORD(2) .NE. OPDIC2(J)  ) GO TO 329
        I=PAKPOS
        NOOPS= NOOPS+1
        WRKBUF(K) = -J
        K=K+1
        GO TO 350
 331    DO 334 J=1,NXLSYM
        DO 332 J1=1,3
        IF( WORD(J1) .NE. LSYMS(J1,J)  ) GO TO 334
 332    CONTINUE
        WRKBUF(K)= J
        GO TO 338
 334    CONTINUE
        DO 336 J=1,3
        LSYMS(J,NXLSYM) = WORD(J)
```

FIG. 17/1555-A

```
336     CONTINUE
        WRKBUF(K) = NXLSYM
        NXLSYM = NXLSYM + 1
338     K = K+1
        I= PAKPOS-1
504     SYMVAL = -1
        CALL SYMREF
        IF(WORD(4) .EQ. -1) GO TO 9500
350     CONTINUE
        WBEND = K-1
        IF(PMACH.EQ.0) GO TO 355
        CALL NONO (  5)
        GO TO 900
355     NLSYMS=NXLSYM-1
        IF(NLSYMS .GT. 1) GO TO 357
        CALL NONO(15)
        GO TO 900
357     CONTINUE
        IF(ERRSKP) GO TO 100
        MODPOD(1)=2
        MODPOD(4)=PACK(X8800,BLKNO,1,0,0)
        BLKNO = 0
        MODPOD(5)=NLSYMS
        DO 360 I2=1,NLSYMS
        DO 358 I1=1,3
358     WORD(I1) = LSYMS(I1,I2)
        SYMVAL=INDEX+I2+1
        CALL SYMREF
359     MODPOD(MPOS)= SYMVAL
        MPOS= MPOS+1
360     CONTINUE
        MODPOD(MPOS) = NOOPS
        MODPOD(3) = MPOS -3
        CALL MODMOD
        IF(NOOPS.EQ.0) GO TO 100
        MPOS = 4
        DO 362 I1=1,16
362     AVATMP(I1)=.TRUE.
363     IF(NLPREN .NE. 0 ) GO TO 365
        LBND = 2
        RBND = WBEND
        GO TO 372
365     DO 370 I1=2,WBEND
        IF(WRKBUF(I1) .NE. LPC) GO TO 366
        LBND=I1
        RBND=0
        GO TO 370
366     IF(WRKBUF(I1) .NE. RPC) GO TO 370
        IF(RBND .NE. 0) GO TO 370
        RBND=I1
370     CONTINUE
        WRKBUF(LBND)=0
        WRKBUF(RBND)=0
        NLPREN=NLPREN-1
```

FIG.17/1555-B

```
 372    DO 392 I=1,4
        OP=-I
        OPCODE= I-1
        LARG=0
        FNDOP=.FALSE.
        DO 390 K = LBND,RBND
        IF(WRKBUF(K)) 383,390,373
 373    IF(FNDOP) GO TO 374
        LARG=K
        GO TO 390
 374    RARG=WRKBUF(K)
        FNDOP=.FALSE.
        RESULT=K
        K=K-1
        IF( LARG.EQ. 0) GO TO 375
        LARG= LARG-1
 375    CONTINUE
        RARG = RARG-1
        IF( RARG .GT. 15) AVATMP(RARG-15) = .TRUE.
        IF(LARG .GT. 15) AVATMP(LARG-15) = .TRUE.
        IF(NOOPS .NE. 1) GO TO 376
        J=0
        GO TO 382
 376    DO 378 J=1,16
        IF(AVATMP(J)) GO TO 380
 378    CONTINUE
        CALL NONO (  6)
        GO TO 900
 380    AVATMP(J)=.FALSE.
        WRKBUF(RESULT) = J+16
        J=J-1
 382    CONTINUE
        MODPOD(MPOS)=PACK(X5542,LARG,RARG,J,OPCODE)
        MPOS = MPOS+1
        NOOPS=NOOPS-1
        IF(NOOPS .EQ. 0) GO TO 399
        GO TO 390
 383    IF(WRKBUF(K) .EQ. OP) GO TO 384
        LARG=0
        GO TO 390
 384    FNDOP = .TRUE.
        WRKBUF(K)=0
        IF (OP.EQ.-1) GO TO 390
        K1=LARG
        LARG=WRKBUF(K1)
        WRKBUF(K1)=0
 390    CONTINUE
        IF( .NOT. FNDOP ) GO TO 392
        CALL NONO (40)
        GO TO 900
 392    CONTINUE
        GO TO 363
 399    CONTINUE
        MODPOD(3)= MPOS-4
        CALL MODMOD
 900    CONTINUE
        GO TO 100
9500    IF(CONST) GO TO 9510
        CALL NONO (32)
        GO TO 350
9510    CONST1=.TRUE.
        CALL SYMDEF
        CONST1=.FALSE.
        GO TO 504
        END
```

FIG. 17/1555-C

```
ARITH

  100     CALL READER
          CALL PAKWRD
          DO 110 I=1,3
  110     ASYMS(I,1) = WORD(I)
          DO 120 I=PAKPOS, INBEND
          IF( INBUF(I) .EQ. EQBL) GO TO 130
  120     CONTINUE
          PAKPOS = 1
          RETURN
  130     PAKPOS= I+1
          NLPREN= 0
          PMACH= 0
          NOOPS= 0
          STATE= 2
          NXASYM= 2
          NXCON = 1
          WP= 1
          DO 140 I=1,70
  140     WRKBUF(I) = 0
          DO 520 IP = PAKPOS, INBEND
          CHAR= INBUF(IP)
          PAKPOS = IP
          DO 150 I = 1,8
          IF( CHAR.NE. CDIC(I)) GO TO 150
          IF( I .EQ. 1) GO TO 520
          TYPE = I-1
          IF( STATE .NE. 2) GO TO 145
          IF(TYPE.GT. 2) GO TO 145
          WORD(1) = 2
          CALL PAKNUM
          IF(NOCHAR) 145,145,155
  145     CONTINUE
          IF(TYPE.NE. 3) GO TO 180
          IF(INBUF(IP+1).NE.CDIC(4)) GO TO 180
          TYPE = 5
          PAKPOS = PAKPOS + 1
          IP = IP+1
          GO TO 180
  150     CONTINUE
          WORD(1)=2
          CALL PAKNUM
          IF(NOCHAR) 530,160,155
  155     CONTBL(NXCON) = RVAL
          TYPE - 8
          NTRE = (NXCON *2 -1 ) + 256
          NXCON = NXCON+1
          IP = PAKPOS - 1
          GO TO 180
  160     CONTINUE
          CALL PAKWRD
          IF(NOCHAR.NE. 0 ) GO TO 165
          CALL NONO(46)
          GO TO 100
```

FIG. 17/1556-A

```
165     CONTINUE
        IP = PAKPOS -1
        DO 170 I=1,8
        IF(WORD(1) .NE. FUNDIC(1,I) .OR.
       *WORD(2) .NE. FUNDIC(2,I)  ) GO TO 170
        TYPE = 9
        NOOPS = NOOPS +1
        NTRE= -I -5
        GO TO 180
170     CONTINUE
        TYPE= 10
        LIM= NXASYM - 1
        DO 174  I2=1, LIM
        DO 172  I1=1,3
        IF(WORD(I1) .NE. ASYMS(I1,I2)  ) GO TO 174
172     CONTINUE
        NTRE = I2
        GO TO 180
174     CONTINUE
        DO 175  I=1,3
175     ASYMS(I, NXASYM) = WORD(I)
        NTRE = NXASYM
        NXASYM= NXASYM+1
1000    SYMVAL=-1
        CALL SYMREF
        IF(WORD(4).EQ.-1) GO TO 2000
180     CONTINUE
        GROUPY = STAWRD(TYPE)
        CALL UNPACK(X4444, LOSTA, HISTA, NEWSTA, GROUPY)
        IF(STATE.LT.LOSTA.OR.STATE.GT. HISTA)
       *CALL NONO(47)
        STATE = NEWSTA
        GO TO (200, 220, 240, 500) GROUPY
200     NTRE =-TYPE
        NOOPS = NOOPS +1
        GO TO 500
220     NTRE= LPC
        NLPREN = NLPREN+1
        PMACH = PMACH+1
        GO TO 500
240     CONTINUE
        IF(PMACH.LT. 1) CALL NONO(49)
        NTRE=RPC
        PMACH=PMACH-1
500     CONTINUE
        IF(ERRSKP) GO TO 520
        WRKBUF(WP) = NTRE
        WP=WP+1
        IF(WP.GT.WBLIM) CALL NONO(50)
520     CONTINUE
530     CONTINUE
        IF(PMACH.NE. 0) CALL NONO(48)
```

FIG. 17/1556-B

```
      I= NXASYM + NXCON
      IF( I .LT. 2 ) CALL NONO(50)
      IF(STATE .NE. 1) CALL NONO(55)
      IF(ERRSKP) GO TO 100
      NXASYM= NXASYM-1
      NXCON= NXCON-1
      WBEND=WP-1
      MODPOD(1)=2
      MODPOD(4)= PACK(X8800, BLKNO, 2, 0, 0)
      BLKNO=0
      MODPOD(5) = NXCON*2
      MPOS= 6
      IF( NXCON .EQ. 0) GO TO 545
      DO 540 I=1, NXCON
 540  CONPOD(I) = CONTBL(I)
 545  CONTINUE
      MODPOD(3) = 2*NXCON+2
      CALL MODMOD
      MODPOD(3) = NXASYM+2
      MODPOD(4) = NXASYM
      MPOS = 5
      DO 560  I2=1,NXASYM
      DO 550  I1=1,3
 550  WORD(I1) = ASYMS(I1,I2)
1100  SYMVAL=INDEX+I2
      CALL SYMREF
      IF(WORD(4).EQ.-1) GO TO 2010
1110  MODPOD(MPOS)=SYMVAL
 560  MPOS= MPOS+1
      MODPOD(MPOS) = NOOPS*2
      CALL MODMOD
      IF(NOOPS .EQ. 0) GO TO 100
      DO 580  I=1,20
 580  AVATMP(I)= .TRUE.
 590  CONTINUE
      IF(NLPREN .NE. 0) GO TO 600
      LBND= 1
      RBND= WBEND
      GO TO 640
 600  CONTINUE
      DO 620 I=1,WBEND
      IF(WRKBUF(I) .LT. 1) GO TO 620
      IF(WRKBUF(I) .NE. LPC) GO TO 610
      LBND=I
      RBND=0
      GO TO 620
 610  IF(WRKBUF(I) .NE. RPC) GO TO 620
      IF(RBND .NE. 0) GO TO 620
      RBND = I
 620  CONTINUE
      WRKBUF(RBND)=0
      WRKBUF(LBND)=0
```

FIG. 17/1556-C

```
640     CONTINUE
        NLPREN= NLPREN-1
        DO 850 I1=1,4
        LARGP=0
        FNDOP= .FALSE.
        DO 840 I2=LBND, RBND
        IF(WRKBUF(I2)   ) 800, 840, 650
650     IF(FNDOP) GO TO 660
        LARGP = I2
        GO TO 840
660     CONTINUE
        RARG=WRKBUF(I2)
        FNDOP=.FALSE.
        RESP=I2
        I2 = I2-1
        IF(NOARGS(I1)   ) 675, 670, 665
665     IF(LARGP.EQ. 0) GO TO 680
668     CALL NONO(51)
        GO TO 100
670     CONTINUE
        IF(LARGP.EQ. 0) GO TO 668
        GO TO 690
675     CONTINUE
        IF(LARGP.NE. 0) GO TO 690
680     LARG=0
690     CONTINUE
        IF(LARG.LE. 512 ) GO TO 700
        LARG = LARG -512
        AVATMP(LARG) = .TRUE.
        LARG = LARG * 2 + 511
700     CONTINUE
        IF(RARG .LE. 512) GO TO 710
        RARG = RARG - 512
        AVATMP(RARG) = .TRUE.
        RARG = RARG * 2 + 511
710     CONTINUE
        IF(NOOPS.GT.1) GO TO 740
        RES=0
        GO TO 790
740     CONTINUE
        DO 750 I=1,TMPEND
        IF(AVATMP(I)) GO TO 760
750     CONTINUE
        CALL NONO(50)
        GO TO 100
760     CONTINUE
        AVATMP(I)=.FALSE.
        RES = I
        WRKBUF(RESP) = RES + 512
780     CONTINUE
        RES = RES*2-1
```

FIG. 17/1556-D

```
 790     CONTINUE
         MODPOD(1)=2
         MODPOD(3) = 2
         MODPOD(4) = PACK(XA600, LARG, OPCODE, 0, 0)
         MODPOD(5) = PACK(XA600, RARG, RES, 0, 0)
         CALL MODMOD
         NOOPS = NOOPS-1
         IF(NOOPS.NE. 0) GO TO 840
         GO TO 100
 800     CONTINUE
         IF(WRKBUF(I2) .LT. LOP(I1)  ) GO TO 820
         LARGP = 0
         GO TO 840
 820     OPCODE = -WRKBUF(I2)
         WRKBUF(I2) = 0
         FNDOP = .TRUE.
         IF(LARGP.EQ. 0) GO TO 840
         LARG= WRKBUF(LARGP)
         WRKBUF(LARGP)=0
 840     CONTINUE
         IF(.NOT. FNDOP) GO TO 850
         CALL NONO(52)
         GO TO 100
 850     CONTINUE
         GO TO 590
2000     IF(CONST) GO TO 2100
         CALL NONO(32)
         GO TO 180
2100     CONST1=.TRUE.
         CALL SYMDEF
         CONST1=.FALSE.
         GO TO 1000
2010     IF(CONST) GO TO 2110
         CALL NONO(32)
         GO TO 1110
2110     CONST1=.TRUE.
         CALL SYMDEF
         CONST1=.FALSE.
         GO TO 1100
         END
```

FIG. 17/1556-E

ALGSUP

```
      CONST1=.FALSE.
      LAST = .FALSE.
      IF(MACLM1 .NE. 0) GO TO 100
      CALL NONO(45)
      GO TO 300
100   CONTINUE
      CALTBL(2) = CFREQ
      CALTBL(2) = CALTBL(2)/ 10.0
      NOCHAR = (NOCHAR+5)/2
      IF(MACCOR) GO TO 200
200   CONTINUE
      ALGDIC = CORE(MACLM1)
      CPEND = MACLM2  -1
      DO 220 CP=ALGDIC, CPEND
      IEND = CORE(CP)-1
      IP = CP
      DO 210 I=1,IEND
      IF(ALGNAM(I).NE.CORE(IP)) GO TO 215
      IP = IP+1
210   CONTINUE
      IP = CORE(IP)
      ARGDIC = IP+3
      NOARGS = CORE(IP+2)
      GO TO 250
215   CP = CP+IEND
220   CONTINUE
      CALL NONO(38)
      ALGERR = .TRUE.
      GO TO 300
250   CONTINUE
      IF(NOARGS.LE.MXATPS) GO TO 260
      CALL NONO(33)
      GO TO 300
260   CONTINUE
      CP = ARGDIC
      TS(1) = 1
      TP(1) = 1
      DO 290 I=1,NOARGS
      ARBLGH = CORE(CP)
      IP = CP+ARBLGH-2
      DUMDUM = CORE(IP)
      IP = IP+1
      CALL UNPACK(X4570, ARGTYP, BPT, CALNDX, DUMDUM)
      DUMDUM = CORE(IP)
      CALL UNPACK(X11E0, CORDER, FORDER, ARGCNT,
     *DUMDUM)
      ARGSIZ = ARGTYP
      IF(ARGTYP.GT.3 .OR. BPT .GT. 0) ARGSIZ=1
      IF(ARGCNT.GT. 512) ARGCNT = ARGCNT -512
      I1 = I+1
```

FIG. 17/1557-A

```
      TS(I1) = TS(I)+ARGCNT*ARGSIZ
      IF( TS(I1) .LE. ARBEND ) GO TO 280
      CALL NONO(40)
      GO TO 300
280   CONTINUE
      TP(I1) = TS(I1)
      CP = CP+ARBLGH
290   CONTINUE
      NOCONP = IP+1
      ISTART = 1
      INBEND = 72
300   CONTINUE
      NOAPCD = 0
      CALL READER
      DO 310 I=2,INBEND
      IF(INBUF(I).NE.EQBL) GO TO 310
      NOAPCD = NOAPCD+1
310   CONTINUE
      IF(NOAPCD.EQ.0) GO TO 700
      IF(ALGERR) GO TO 300
      PAKPOS = 1
      DO 690 INAOCD = 1,NOAPCD
      CALL PAKWRD
      NOCHAR = (NOCHAR+7)/2
      IF(MACCOR) GO TO 400
400   CONTINUE
      CP = ARGDIC
      DO 420 ARGNO = 1, NOARGS
      IEND = CORE(CP) - 2
      IP = CP
      CP = CP+CORE(CP)
      DO 410 I=1,IEND
      IF(ARGNAM(I).NE.CORE(IP)) GO TO 420
      IP = IP+1
410   CONTINUE
      GO TO 430
420   CONTINUE
      CALL NONO(34)
      GO TO 300
430   CONTINUE
      DUMDUM = CORE(IP)
      ARGNO1 = ARGNO+1
440   CALL UNPACK(X4570,ARGTYP,BPT,CALNDX,DUMDUM)
      BPT = BPT-1
      GO TO (460, 480, 500, 530, 560, 560), ARGTYP
460   CONTINUE
      WORD(1) = 3
      CALL PAKNUM
      IF(NOCHAR.LT.1) GO TO 670
470   CONTINUE
      IP = TP(ARGNO)
      IF(IP.GE.TS(ARGNO1)) GO TO 680
      IF(CALNDX.NE.0) CALTBL(CALNDX) = WORD(1)
      TP(ARGNO) = IP+1
      ARGBUF(IP) = WORD(1)
      GO TO 690
```

FIG. 17/1557-B

```
480     CONTINUE
        WORD(1) = 2
        CALL PAKNUM
        IF(NOCHAR.LT.1) GO TO 670
        IF(BPT.LT. 0) GO TO 490
        WORD(1) = RVAL * 2.0 ** BPT
        GO TO 470
490     CONTINUE
        IP = TP(ARGNO)+1
        IF(IP.GE.TS(ARGNO1)) GO TO 680
        TP(ARGNO) = IP+1
        ARGBUF(IP) = WORD(2)
        IP = IP-1
        ARGBUF(IP) = WORD(1)
        IF(CALNDX.NE.0) CALTBL(CALNDX) = RVAL
        GO TO 690
500     CONTINUE
        CALL PAKWRD
        IF(NOCHAR.EQ.0) GO TO 670
504     SYMVAL=-1
        CALL SYMREF
        IF(WORD(4).EQ.-1) GO TO 9500
505     IP=TP(ARGNO)+2
        IF(IP.GE.TS(ARGNO1)) GO TO 680
        IP = IP-2
        DO 510 I=1,3
        ARGBUF(IP) = WORD(I)
510     IP = IP+1
        TP(ARGNO) = IP
        GO TO 690
530     CONTINUE
        CALL PAKWRD
        IF(NOCHAR.EQ.0) GO TO 670
        IEND = (NOCHAR+1)/2
        IP = TP(ARGNO)+IEND-1
        IF(IP.GE.TS(ARGNO1)) GO TO 680
        IP = TP(ARGNO)
        DO 540 I=1,IEND
        ARGBUF(IP) = WORD(I)
540     IP = IP+1
        TP(ARGNO) = IP
        GO TO 690
560     CONTINUE
        WORD(1) = 1
        CALL PAKNUM
        IF(NOCHAR.LT.1) GO TO 670
        IP = TP(ARGNO)
        IF(IP.GE.TS(ARGNO1)) GO TO 680
        ARGBUF(IP) = WORD(1)
        TP(ARGNO) = IP+1
        IF(CALNDX.NE.0) CALTBL(CALNDX) = WORD(1)
        GO TO 690
670     IERR = 35
        GO TO 685
```

FIG. 17/1557-C

```
680     IERR = 36
685     CALL NONO(IERR)
        GO TO 300
690     CONTINUE
        GO TO 300
700     CONTINUE
        IF( .NOT.ALGERR ) GO TO 705
        ALGERR = .FALSE.
        RETURN
705     CONTINUE
        DUMDUM=CORE(ARGDIC-3)
        CALL UNPACK(X8800, NCWRDS, ALGTYP, DUMDUM, DUMDUM)
        DUMDUM=CORE(ARGDIC-2)
        CALL UNPACK(X1F00, DIOSUP, ALGTIM, DUMDUM, DUMDUM)
        CHNTIM=CHNTIM+ALGTIM
        CALTBL(3) = NCWRDS
        CORPOS=0
        MODPOD(1)= 2
        MODPOD(4)= PACK(X8800, BLKNO, ALGTYP, 0, 0)
        MODPOD(5)=0
        MODPOD(3)=1
        IF(NCWRDS.NE. 0) MODPOD(3)=2
        CALL MODMOD
        CORNDX = INDEX-1
        GO TO 1000
710     CONTINUE
        LAST = .TRUE.
        CP=ARGDIC
        DO 900 ARGNO= 1,NOARGS
        CP=CP+CORE(CP) -2
        DUMDUM= CORE(CP)
        CP=CP+1
        CALL UNPACK(X4570, ARGTYP, BPT, CALNDX, DUMDUM)
        DUMDUM=CORE(CP)
        CP=CP+1
        CALL UNPACK(X11E0, FORDER, CORDER, ARGCNT,
       *DUMDUM)
        BPT = BPT-1
715     ARGSIZ = ARGTYP
        IF(ARGTYP .GT. 3) ARGSIZ= 1
        IF(ARGCNT.GT. 512) GO TO 720
        IF(TS(ARGNO+1) .EQ.TP(ARGNO)) GO TO 730
        CALL NONO(42)
        GO TO 9000
720     CONTINUE
        ARGCNT=(TP(ARGNO)-TS(ARGNO))/ARGSIZ
        MODPOD(1)=2
        MODPOD(3)=1
        MODPOD(4) = ARGCNT
        IF((ARGTYP.EQ.2).AND.(BPT.LT.0)) MODPOD(4)=
       *MODPOD(4)*2
        CALL MODMOD
730     CONTINUE
```

FIG. 17/1557-D

```
      IF(ARGCNT.LE.0) GO TO 900
      ARGSIZ = 1
      IF(ARGTYP.EQ.2.AND.BPT.LT.0) ARGSIZ = 2
      BUFSIZ = ARGCNT * ARGSIZ
735   IF(CORDER.EQ.0) GO TO 740
      IP = BUFSIZ + CORPOS
      IF(IP.LE.MXCRWS) GO TO 740
      CALL NONO(44)
      GO TO 9000
740   CONTINUE
      IP=TS(ARGNO)
      DO 900 INPNO= 1,ARGCNT
      IF(BPT.GE.0) GO TO 750
      GO TO (750, 760, 770, 750, 790, 750) ARGTYP
750   CONTINUE
      VALUE(1) = ARGBUF(IP)
      IP=IP+1
      GO TO 800
760   CONTINUE
      VALUE(1) = ARGBUF(IP)
      IP=IP+1
      VALUE(2) = ARGBUF(IP)
      IP=IP+1
      GO TO 800
770   CONTINUE
      DO 775 I=1,3
      WORD(I) = ARGBUF(IP)
      IP=IP+1
775   CONTINUE
      SYMVAL=INDEX
780   CONTINUE
      CALL SYMREF
      VALUE (1) = SYMVAL
      IF(WORD(4).EQ. -1) GO TO 9600
      GO TO 800
790   CONTINUE
      BLKNO = ARGBUF(IP)
      IP=IP+1
      CALL BNOREF
      VALUE(1) = BNOVAL
800   CONTINUE
      IF(CORDER.EQ.0) GO TO 820
      DO 810 I=1,ARGSIZ
      CORPOS = CORPOS+1
810   CORBUF(CORPOS) = VALUE(I)
820   CONTINUE
      IF(FORDER.EQ. 0) GO TO 840
      DO 830 I=1,ARGSIZ
830   MODPOD(I+3) = VALUE(I)
      MODPOD(3) = ARGSIZ
      MODPOD(1) = 2
      CALL MODMOD
840   IF(.NOT.LAST) GO TO 3500
```

FIG. 17/1557-E

```
 900      CONTINUE
          GO TO 3510
1000      CONTINUE
          LAST = .FALSE.
          CP = NOCONP
          NCONST = CORE(CP)
          CP=CP+1
          IF(NCONST.EQ. 0) GO TO 1100
          DO 1010 I=1,NCONST
          CALNDX = CORE(CP)*2-1
          CP=CP+1
          ICLTBL(CALNDX) = CORE(CP)
          CP=CP+1
          ICLTBL(CALNDX+1) = CORE(CP)
1010      CP = CP+1
1100      NOCALCS = CORE(CP)
          CP=CP+1
          IF(NOCALCS.EQ.0) GO TO 3000
          DO 2900 I=1,NOCALCS
          DUMDUM = CORE(CP)
          CP=CP+1
          CALL UNPACK(X8800, IR, I1, DUMDUM, DUMDUM)
          DUMDUM = CORE(CP)
          CP = CP+1
          CALL UNPACK(X8800, OP, I2, DUMDUM, DUMDUM)
          IF(OP.EQ.0) GO TO 2900
          GO TO (1120, 1130, 1140, 1150, 1160, 1170)OP
1120      CALTBL(IR)=CALTBL(I1)   +  CALTBL(I2)
          GO TO 2900
1130      CALTBL(IR) = CALTBL(I1)  -   CALTBL(I2)
          GO TO 2900
1140      CALTBL(IR)=CALTBL(I1)   *  CALTBL(I2)
          GO TO 2900
1150      CALTBL(IR) = CALTBL(I1)  /   CALTBL(I2)
          GO TO 2900
1160      CALTBL(IR)= CALTBL(I1)   **   CALTBL(I2)
          GO TO 2900
1170      CALTBL(IR)= CALTBL(I2)  **.5
2900      CONTINUE
3000      NOCRS = CORE(CP)
          CP=CP+1
          IF(NOCRS.EQ.0) GO TO 710
          DO 3500 INAOCD = 1,NOCRS
          CORDER = CORE(CP)
          CP=CP+1
          CALL UNPACK(X8611, IR, BPT, FORDER, CORDER)
          BPT=BPT-1
          IF(BPT.LT.0) GO TO 3020
          ARGSIZ = 1
          VALUE(1) = CALTBL(IR)  *2.0 ** BPT
          GO TO 800
3020      CONTINUE
          ARGSIZ = 2
          IR = IR*2
          VALUE(2)=ICLTBL(IR)
```

FIG. 17/1557-F

```
      VALUE(1)=ICLTBL(IR -1)
      GO TO 800
3500  CONTINUE
      GO TO 710
3510  CONTINUE
      IF (NCWRDS.EQ.0) RETURN
      MODPOD(1) = 5
      MODPOD(3) = CORPOS + 5
      DO 3520  I=4,6
3520  MODPOD(I)=0
      MODPOD(7) = CORNDX
      MODPOD(8) = NCWRDS
      IP = 9
      DO 3530 I=1,CORPOS
      MODPOD(IP) = CORBUF(I)
3530  IP=IP+1
      CALL MODMOD
9000  CONTINUE
      RETURN
9500  IF(CONST) GO TO 9510
      CALL NONO(32)
      GO TO 505
9510  CONST1=.TRUE.
      CALL SYMDEF
      CONST1=.FALSE.
      GO TO 504
9600  IF(CONST) GO TO 9610
      CALL NONO(32)
      GO TO 800
9610  CONST1=.TRUE.
      CALL SYMDEF
      CONST1=.FALSE.
      GO TO 780
      END
```

FIG. 17/1557-G

```
SYMRDR

          ERRSKP=.FALSE.
          SYMOP=.TRUE.
          SYMCOR=.TRUE.
          CALL PAKWRD
          IF(WORD(1).EQ.DI) SYMCOR = .FALSE.
  100     DO 120 I=1,2
          WORD(1) = 3
          CALL PAKNUM
          IF(NOCHAR.GT.0) GO TO 110
          CALL NONO(22)
          GO TO 900
  110     SYMLIM(I)=WORD(1)
  120     CONTINUE
          IF(SYMLM1.LT.SYMLM2) GO TO 130
          CALL NONO(23)
          GO TO 900
  130     CONTINUE
          KSTRT=SYMLM1
          GO TO 1001
 1002     KSTRT=ID000
 1001     CONTINUE
          NOSYMS = 0
          CALL PAKWRD
          IF(WORD(1).EQ.NE) GO TO 165
          IF(WORD(1).EQ.OL) GO TO 140
          IF(WORD(1).EQ.CO) GO TO 950
          IF(WORD(1).EQ.EX) GO TO 1000
          SYMOP=.FALSE.
          RETURN
  140     CONTINUE
          IF(SYMCOR) GO TO 150
  150     CONTINUE
          NOSYMS=CORE(SYMLM1)
          RETURN
  165     LAST=.FALSE.
          NXPOS = SYMLM1 +1
          I1 = SYMLM2   = SYMLM1
          IF(SYMCOR) GO TO 170
          MXSYMS = I1*64
          GO TO 180
  170     MXSYMS = I1/4
  180     TRKPOS = 0
          DO 250 I3=1,8
          READ(BINDEV) REC
          DO 250 I2=1,8
          IF(NREC(1,I2).NE.0) GO TO 200
          TRKPOS= TRKPOS+ 1
          SYMTRK(TRKPOS) = 0
          LAST = .TRUE.
          GO TO 300
```

FIG. 17/1558-A

```
200     DO 220 I1=1,3
        TRKPOS = TRKPOS+1
        SYMTRK(TRKPOS) = NREC(I1,I2)
220     CONTINUE
        TRKPOS = TRKPOS+1
        SYMTRK(TRKPOS) = NREC(5,I2)
        NOSYMS = NOSYMS+1
250     CONTINUE
300     IF(NOSYMS.LE.MXSYMS) GO TO 320
        CALL NONO(24)
        GO TO 900
320     CONTINUE
        IF(SYMCOR) GO TO 400
400     DO 450 I=1,TRKPOS
        CORE(NXPOS) = SYMTRK(I)
        NXPOS = NXPOS+1
450     CONTINUE
500     IF(.NOT.LAST) GO TO 180
        CORE(SYMLM1) = NOSYMS
900     CONTINUE
        RETURN
950     CONST=.TRUE.
        CORE(SYMLM1)=0
        DO 960 II=SYMLM1,SYMLM2
960     CORE(II)=0
        GO TO 140
1000    CONST=.TRUE.
        GO TO 140
        END
```

FIG. 17/1558-B

```
MACROR

            MACERR=.FALSE.
            LAST=.FALSE.
            MACCOR=.TRUE.
            CALL PAKWRD
            IF(NOCHAR.EQ.4) GO TO 2
            ERRTYP = 16
            GO TO 900
    2       IF(WORD(1).EQ.DI) MACCOR=.FALSE.
            DO 6  I=1,2
            WORD(1)=3
            CALL PAKNUM
            IF(NOCHAR.GT.0) GO TO 4
            ERRTYP = 17
            GO TO 900
    4       MACLIM(I)= WORD(1)
    6       CONTINUE
            IF(MACLM1.LT.MACLM2) GO TO 8
            ERRTYP = 18
            GO TO 900
    8       CALL PAKWRD
            IF(WORD(1).EQ.OL) RETURN
            NTKPOS = 0
            NXDPOS = MACLM1+1
            NXNPOS = MACLM2
            DTKPOS = 0
            LTYPE = 0
            MACERR=.FALSE.
   10       CALL READER
            DO 12  I=1,40
   12       IBUF(I)=RDBUF(I)
            DECODE(80, 10000, IBUF) TYPE, NAME, MAC,
           *CONSTN, ISEQ
10000       FORMAT(I1,1X,14A2,6I5,F10.0,5A2)
   15       IF(MACERR) GO TO 18
            GO TO 28
   18       IF(TYPE.EQ.5) RETURN
            GO TO 10
   28       CONTINUE
            IF(TYPE.NE.1) GO TO 40
   30       IF(LTYPE.EQ.0) GO TO 100
            GO TO 62
   40       IF(LTYPE) 50, 45, 50
   45       ERRTYP = 10
            GO TO 900
   50       IF(LTYPE-TYPE) 60, 70, 80
   60       LTYPE=TYPE
            IF(TYPE.LT.4) GO TO 65
   62       CONTINUE
            IF(NCALCS.NE.0) GO TO 65
            DEFPOS = DEFPOS + 1
            DEFBUF(DEFPOS) = 0
```

FIG. 17/1559-A

```
          DEFPOS=DEFPOS + 1
          DEFBUF(DEFPOS) = 0
          NCALCS = -1
 65       CONTINUE
          GO TO (500, 195, 295, 385, 500), TYPE
 70       GO TO (100, 200, 300, 400, 500), TYPE
 80       ERRTYP = LTYPE +10
          GO TO 900
100       LTYPE = 1
          I1 = 2
          LP = NTKPOS+1
          DO 105 I=1,14
          IF(NAME(I) .EQ. BLBL) GO TO 110
          I1 = I1+1
          LP = LP+1
105       CONTINUE
110       CONTINUE
          IF(LP.LT.256) GO TO 150
115       IF(MACCOR) GO TO 120
120       CONTINUE
          NXNPOS = NXNPOS - NTKPOS
          IF(NXDPOS.LE.NXNPOS) GO TO 130
          ERRTYP = 19
          GO TO 900
130       CONTINUE
          IP = NXNPOS
          DO 140 I=1,NTKPOS
          IP = IP+1
          CORE(IP) = NAMTRK(I)
140       CONTINUE
          CORE(MACLM1) = NXNPOS+1
          IF(LAST) RETURN
          NTKPOS = 0
150       NTKPOS = NTKPOS+1
          NAMTRK(NTKPOS) = I1
          I1 = I1-2
          IP = NTKPOS
          DO 160 I=1,I1
          IP = IP+1
          NAMTRK(IP) = NAME(I)
160       CONTINUE
          NTKPOS = IP+1
          IF(MACCOR) GO TO 170
170       CONTINUE
          NAMTRK(NTKPOS) = DTKPOS + NXDPOS
          HEADR = PACK(X8800,MAC2,MAC1,0,0)
          HEADR2=PACK(X1E00,MAC4,MAC3,0,0)
          DEFPOS = 3
          NOARGS = 0
          NCALCS = 0
          NCFORS = 0
          GO TO 10
```

FIG. 17/1559-B

```
195     CONTINUE
200     CONTINUE
        NOARGS = NOARGS+1
        DEFPOS=DEFPOS+1
        LP = DEFPOS
        I1 = 3
        DO 205 I=1,14
        IF(NAME(I).EQ.BLBL) GO TO 210
        I1 = I1+1
        LP = LP+1
205     DEFBUF(LP)=NAME(I)
210     DEFBUF(DEFPOS) = I1
        LP=LP+1
        DEFBUF(LP) = PACK(X4570,MAC2, MAC3, MAC6,0)
        DEFPOS=LP+1
        IF(MAC1.LT.0) MAC1= 512 - MAC1
        DEFBUF(DEFPOS) = PACK(X11E0, MAC4,MAC5,MAC1,0)
        GO TO 10
295     DEFPOS=DEFPOS+1
        NCNPOS=DEFPOS
        NCONST=0
        WRKPOS=1
300     CONTINUE
        NCALCS=NCALCS+1
        WRKPOS=WRKPOS+1
        WRKBUF(WRKPOS)=PACK(X8800,MAC1,MAC2,Z,Z)
        WRKPOS=WRKPOS+1
        WRKBUF(WRKPOS)=PACK(X8800,MAC3,MAC4,Z,Z)
        IF(MAC5.EQ.0) GO TO 10
        NCONST=NCONST+1
        DEFPOS=DEFPOS+1
        DEFBUF(DEFPOS)=MAC5
        DEFPOS=DEFPOS+1
        DEFBUF(DEFPOS)=ICON(1)
        DEFPOS=DEFPOS+1
        DEFBUF(DEFPOS)=ICON(2)
        GO TO 10
385     CONTINUE
        IF(NCALCS.EQ.-1) GO TO 398
        DEFBUF(NCNPOS)=NCONST
390     DO 395 I=1,WRKPOS
        DEFPOS=DEFPOS+1
395     DEFBUF(DEFPOS)=WRKBUF(I)
398     CONTINUE
        DEFPOS=DEFPOS+1
        NCFPOS=DEFPOS
400     CONTINUE
        DEFPOS=DEFPOS+1
        NCFORS = NCFORS+1
        DEFBUF(DEFPOS)=PACK(X8611,MAC1,MAC2,MAC3,MAC4)
        GO TO 10
500     CONTINUE
        IF(NCFORS.NE.0) GO TO 510
```

FIG. 17/1559-C

```
      DEFPOS = DEFPOS+1
      NCFPOS = DEFPOS
510   DEFBUF(NCFPOS) = NCFORS
      IF(DEFPOS.LE.DEFEND)= GO TO 600
      ERRTYP = 9
      GO TO 900
600   CONTINUE
      LP = DEFPOS + DTKPOS
      IF(LP.LE.256) GO TO 800
610   IF(MACCOR) GO TO 700
700   CONTINUE
      IP = NXDPOS
      NXDPOS = NXDPOS + DTKPOS
      IF(NXDPOS.LE.NXNPOS) GO TO 720
      ERRTYP = 19
      GO TO 900
720   CONTINUE
      DO 730 I=1,DTKPOS
      CORE(IP) = DEFTRK(I)
730   IP = IP+1
      IF(LAST) GO TO 115
740   CONTINUE
      DTKPOS = 0
800   CONTINUE
      DO 810 I=1,DEFPOS
      DTKPOS = DTKPOS+ 1
810   DEFTRK(DTKPOS) = DEFBUF(I)
      IF(TYPE.EQ.1) GO TO 100
      LAST=.TRUE.
      GO TO 610
900   MACERR=.TRUE.
      CALL NONO(ERRTYP)
      IF(TYPE.LT.5) GO TO 10
      RETURN
      END
```

FIG. 17/1559-D

```
         DEF     PACK
         REF     SAT:,REI:
D4       EQU     X'00B2'
XF       EQU     X'00A6'
         ADL     SAT:
         ADL     DP
PACK     LDG     X'0000'
         JMP     *$-3
         DAT     X'0004'
         LDC     D4
LOOP     LDG     =X'6004'
         LDA     XF
         AND     *DP+2
         SHF     *DP+2
         ADD     =X'E000'
         LDG     5
         LDA     *6,B
         SHF     4
         DCR     1
         DCR     2
         ZJP     END
         JMP     LOOP
END      LDA     4
         LDB     =DP
         JMP     REI:
DP       RES     7
         END
```

FIG. 17/1560

```
         DEF     UNPACK
         REF     SAT:
D4       EQU     X'00B2'
XF       EQU     X'00A6'
         ADL     SAT:
         ADL     DP
UNPACK   LDG     0
         JMP     *$=3
         DAT     4
         LDE     *DP+6
         LDC     D4
LOOP     LDG     =X'2004'
         SHF     *DP+2
         LDA     *DP+2
         AND     XF
         ZJP     $+6
         ADD     =X'A000'
         STA     3
         STZ     5
         SHF     4
         STA     *3,B
         INC     1
         DCR     2
         ZJP     END
         JMP     LOOP
END      LDB     DP+1
         EST     1,B
DP       RES     7
         END
```

FIG. 17/1561

```
        DEF     R40A2
        REF     SAT:
        ADL     SAT:
        ADL     DP
R40A2   EQU     $
        LDG     P
        JMP     *$-3
        DAT     2
        LDC     =39
        CDR     7
        LDA     BLANK
R8A1    STA     *IRECD-DP,B
        DCR     C
        PJP     R8A1
        CDR     4
        LDG     *IDEV
        SST     *M:RD
        STA     CHARCT
        SUB     =81
        NJP     $+3
        LDA     =80
        STA     CHARCT
        LDA     CHARCT
        INC     A
        LDG     =X'4001'
        SHF     A
        STA     *ICNT
        INC     E
        STE     DEVBUF
        LDC     =0
        CDR     7
R8A2    DCR     CHARCT
        NJP     R8A7
        DCR     CHARCT
        NJP     R8A5
        LDA     *DEVBUF
        AND     =X'FF'
        SUB     RCR
        ZJP     R8A5
        LDA     *DEVBUF
R8A3    EQU     $
        AND     =X'FF00'
        SUB     LCR
        ZJP     R8A6
        LDA     *DEVBUF
R8A4    EQU     $
        STA     *IRECD-DP,B
        INC     C
        INC     DEVBUF
        JMP     R8A2
```

FIG. 17/1562-A

```
R8A7    EQU   $
        CDR   4
        LDG   *IDEV
        SST   *M:RT
        LDB   1,B
        EST   1,B
R8A5    LDA   *DEVBUF
        AND   =X'FF00'
        ADD   RBLK
        STA   *DEVBUF
        JMP   R8A3
R8A6    LDA   *DEVBUF
        AND   =X'FF'
        ADD   LBLK
        STA   *DEVBUF
        JMP   R8A4
DP      DAT   0,0
IDEV    DAT   0
IRECD   DAT   0
ICNT    DAT   0
DEVBUF  DAT   0
BLANK   DAT   X'A0A0'
CHARCT  DAT   0
LCR     DAT   X'8D00'
RCR     DAT   X'8D'
RBLK    DAT   X'A0'
LBLK    DAT   X'A000'
        END
```

FIG. 17/1562-B

```
         DEF     LCKSM
         REF     SAT:,REI:
         ADL     SAT:
         ADL     DP
LCKSM    LDG     P
         JMP     *$-3
         DAT     0
         INC     LDRECD
         LDC     =51
         CDR     7
         LDA     =0
LCK1     ADD     *LDRECD-DP,B
         CJP     $+2
         DCR     A
         INC     A
         DCR     C
         PJP     LCK1
         EOR     =X'FFFF'
         INC     A
         JMP     REI:
DP       DAT     0,0
LDRECD   DAT     0
         END
```

FIG. 17/1563

```
         DEF     LRHSMK
         REF     SAT:,REI:
         ADL     SAT:
         ADL     DP
LRHSMK   LDG     P
         JMP     *$-3
         DAT     2
         LDA     =X'4000'
         ADD     *LSHIFT
         LDG     A
         LDA     *INPUT
         SHF     A
         AND     *MASK
         JMP     REI:
DP       DAT     0,0
INPUT    DAT     0
LSHIFT   DAT     0
MASK     DAT     0
         END
```

FIG. 17/1564

DIGITAL COMPUTER MONITORED SYSTEM OR PROCESS WHICH IS CONFIGURED WITH THE AID OF AN IMPROVED AUTOMATIC PROGRAMMING SYSTEM

CROSS REFERENCE TO RELATED APPLICATIONS

Ser. No. 250,826 entitled "A Digital Computer Monitored and/or Operated System Or Process Which is Structured for Operation With an Improved Automatic Programming Process and System", filed by J. W. Gomola et al on May 5, 1972 and assigned to the present assignee.

INDEX

BACKGROUND OF THE INVENTION
SUMMARY OF THE INVENTION
BRIEF DESCRIPTION OF THE DRAWINGS
DESCRIPTION OF THE PREFERRED EMBODIMENT
INTRODUCTION
1. OVERVIEW OF THE SYSTEM
A. COMMUNICATION DEVICES—GENERATION OF FILES
B. THE DIGITAL COMPUTER SYSTEM AND ITS PROGRAM SYSTEM
C. FILE GENERATION AND INTERMEDIATE FILE FORMAT
D. DATA FILES AND THE DATA FILE GENERATOR
E. CONTROL CHAINS AND THE CONTROL CHAIN GENERATOR
F. THE FILE STORAGE AREA AND FILE FORMAT
G. THE SYSTEM DIRECTORY
H. SUBTASK PROCESSOR
I. LOGIC INITIATOR
J. AUXILIARY SYNCHRONIZER
K. CONTROL CHAIN PROCESSOR, CONTROL CHAINS, AND ALGORITHMS
L. MONITOR DATA FILE PROCESSOR
M. ADVANTAGES OF THE SYSTEM
2. THE COMPUTER SYSTEM
3. SYSTEM IMPLEMENTATION OF THE INVENTION
A. METAL ROLLING MILL
B. METAL ANNEALING FURNACE
C. ELECTRICAL POWER PLANT MONITORING SYSTEM
4. COMPUTER SYSTEM ORGANIZATION
5. THE SYSTEM FILE LOADER
A. FILE LOAD RECORDS
B. LOAD MODULES
C. OVERVIEW OF THE FILE LOADER PROGRAM
D. FILE ADDRESS LINKAGES AND THE ADDRESS LINK MODULE SUBROUTINE
E. BEGINNING OF FILE MODULE SUBROUTINE
F. TRIGGER MODULE SUBROUTINE
G. SYMBOL REFERENCING AND THE SYMBOL REFERENCE MODULE SUBROUTINE
H. THE ESTABLISHMENT OF A FILE WITHIN THE SYSTEM
I. TRIGGER CONNECT SUBROUTINE
6. THE FILE SYSTEM
A. FILE STORAGE AREAS
B. THE FORMAT OF A FILE
C. CORE-RESIDENT FILE STORAGE AREAS
D. DISK-RESIDENT FILE STORAGE AREAS
E. ASSIGNMENT OF SUBTASK NUMBERS TO FILES AND TO GROUPS OF FILES
F. CONVERTER SETS
G. LINKING FILES INTO CONVERTER SETS
H. ADDING A FEW FILE TO A LINKAGE
I. AN OVERVIEW OF THE FILE AND DIRECTORY ACCESS SUBROUTINES
J. GENERATE FILE SUBROUTINE
K. FIND AN EMPTY SECTOR SUBROUTINE
L. SUBROUTINE TO OPEN A NEW DISK SECTOR
M. SUBROUUTINE TO FIND A HOLE IN THE FILE STORAGE AREA
N. SUBROUTINES TO REMOVE AN EMPTY SLOT FROM EMPTY FILE LINKAGE
O. ROUTINE TO FIND WHERE A NEW ANALOG SCAN FILE SHOULD GO INTO A LINKAGE
P. SUBROUTINE TO CONNECT A NEW FILE INTO A CONVERTER LINKAGE
Q. SUBROUTINE TO WRITE DATA INTO A FILE
R. SUBROUTINE TO TRANSFER THE CONTENTS OF A FILE INTO A DESIGNATED CORE BUFFER
S. SUBROUTINE TO DELETE A FILE FROM THE FILE STORAGE AREA
T. DIRECTORY FILES AND THE DIRECTORY FILE STORAGE AREA
U. SUBROUTINE FOR MAKING ENTRIES INTO THE SYSTEM DIRECTORY
V. SUBROUTINE FOR LOCATING A DIRECTORY FILE
W. SUBROUTINE TO FIND THE NEXT FILE IN THE ALPHANUMERIC LINKAGE
X. SUBROUTINE TO COMPARE TWO SYMBOLS
Y. SUBROUTINE TO RETRIEVE DATA FROM THE DIRECTORY
Z. SUBROUTINE TO REMOVE A DIRECTORY ENTRY
AA. OBTAINING THE NAMES OF FILES IN ALPHANUMERIC ORDER
7. THE CONTROL CHAIN PROCESSOR
8. CONTROL CHAIN ALGORITHMS AND THE USE OF CONTROL CHAINS
A. CREATION AND ESTABLISHMENT OF A CONTROL CHAIN—IN GENERAL
B. REPRESENTATIVE ALGORITHM SUBROUTINES
i. Logic Algorithm Subroutines
ii. Arithmetic Algorithm Subroutine
iii. Flip-Flop Algorithm Subroutine
iv. Set and Reset Algorithm Subroutine
v. Logical Time Delay Algorithm Subroutine
vi. Comparator Algorithm Subroutine
vii. Algorithm Subroutines Specifically Arranged for Use In Process Control
a. Contact Closure Timed Output Algorithm Subroutine b. Proportional Plus Reset Controller Algorithm Subroutines
c. Proportional Plus Rate Controllers
d. Lead and Lag Controllers
e. Special Purpose Controllers
viii. Algorithm Subroutines which Allow Branching Within a Control Chain
ix. Algorithm Subroutines Which Allow Interaction Between Control Chains And the System
9. THE AUXILIARY SYNCHRONIZER
A. DELAYED SUBTASK BID COUNTDOWN ROUTINE
B. PERIODIC SUBTASK BID COUNTDOWN ROUTINE
C. LOGICAL TIME DELAY COUNTDOWN ROUTINE
D. TIME DELAYED SUBTASK COUNTDOWN ROUTINE
E. CONTACT CLOSURE OUTPUT DEVICE COUNTDOWN ROUTINE
10. TASK, SUBTASK, AND FILE BIDDING PROCESSOR
A. TERMINOLOGY
B. THE SUBLEVEL PROCESSOR PROGRAM
C. THE DISCAN PROGRAM
D. SUBLEVEL PROCESSOR TABLES
E. THE ESTABLISHMENT OF SUBTASKS
F. THE TASK DATA POOL
11. THE LOGIC INITIATOR PROGRAM
A. DIGITAL SCAN BIT TABLES
B. ALARM AND TRIGGER TABLES
C. ADDRESSING LOGICAL VARIABLES
D. THE DIGITAL SCAN PROGRAM AND THE ALARM AND TRIGGER CHECK ROUTINE
E. AUTOMATIC IMPLEMENTATION OF A LOGIC DIRECTOR CONTROL SYSTEM
12. THE MONITOR DATA FILE PROCESSING PROGRAM
13. THE OPERATOR CONSOLE PROGRAM
14. THE MESSAGE WRITER PROGRAM
15. FILE GENERATING PROGRAMS
A. THE DATA FILE GENERATOR PROGRAM
B. FILES CREATED BY THE DATA FILE GENERATOR PROGRAM
C. THE CONTROL CHAIN GENERATOR PROGRAM
16. EXPLANATION OF PROGRAM LISTINGS
17. DETAILED DESCRIPTION OF PROGRAM LISTINGS
A. THE FILE LOADER PROGRAM
B. THE FILE AND DIRECTORY SYSTEM SUBROUTINES
i. RDFIL
ii. WTFIL
iii. MOVFIL
iv. GNFIL
v. CLSFIL
vi. LOCHOL
vii. LOCSEQ
viii. LOCBUF
ix. OPNBUF
x. OPNFIL
xi. LNKSEQ
xii. TYPSZE
xiii. CLSBUF
xiv. CVTOAB
xv. CVTORL p3 xvi. WRSYMB
xvii. ERSYMB
xviii. NXSYMB
xix. NXFLNM
xx. LOCDIR
xxi. FDIDX
xxii. RDSYMB
xxiii. IHASH
xxiv. COMSYM
xxv. DELFIL
xxvi. RESEQ
xxvii. DLELNK
xxviii. MOVLNK
C. THE CONTROL CHAIN PROCESSOR PROGRAM
D. ALGORITHM SUBROUTINE PROGRAM LISTINGS
i. General Properties of Algorithm Subroutine Program Listings
ii. Logic Algorithm Subroutine
iii. Arithmetic Algorithm Subroutines
iv. The Flip-Flop Algorithm Subroutine
v. Compare and Set Algorithm Subroutine
vi. Set and Reset Algorithm Subroutines
vii. Logical Time Delay Algorithm Subroutine
viii. Function Generator Algorithm Subroutine
ix. Timed Contact Closure Output Algorithm Subroutine
x. PIR and Related Algorithm Subroutines
xi. Trapezoidal Algorithm Subroutines
xii. Lag Controllers
xiii. Ramp Algorithm Subroutine
xiv. Limiting and Deadband Algorithm Subroutines
xv. High and Low Selector Algorithm Subroutines
xvi. Threshold Algorithm Subroutine
xvii. Transfer Algorithm Subroutines
xviii. Algorithm Subroutines Which Call For the Execution of Other System Subroutines
E. AUXILIARY SYNCHRONIZER PROGRAM
i. Counter Decrement and Subtask Bidding Subroutine
ii. Delayed Subtask Bid Countdown Routine
iii. Subroutine for Recording Delayed Subtask Bids
iv. Logical Time Delay Countdown Routine
v. Subroutines For Establishing and Cancelling Periodic Subtask Bids
F. THE SUBLEVEL PROCESSOR PROGRAM AND THE ESTABLISHMENT OF SUBTASKS
i. Terminology
ii. Creating Subtasks
iii. Form of a Program Subtask
iv. Subtask Control Subroutines
v. Bidding for the Execution of a Subtask
vi. The CHKBID Subroutine
vii. Termination of Program Execution
viii. The DISCAN Routine
ix. The WRITDISK Routine
x. The READDISK Routine
xi. The CKSTUS Routine
xii. Routine to Find Bidding Sublevel
xiii. The FINDBIT Routines
xiv. Find Empty Buffer Routine
xv. The Calculate Subtask Number Routine xvi. Subtask Read and Write Subroutines
xvii. Subtask TIme Delay and Suspension
xviii. The Time Delay and Suspend Subroutine
xix. The Time Delay Count Down Program
xx. Removing a Subtask From Time Delay or Suspension
xxi. Subtask Number Expansion Routine
xxii. Buffer Release Subroutine
G. LOGIC INITIATOR PROGRAM
i. Digital Scan Program
ii. Alarm and Trigger Check Subroutine
iii. Subtask Trigger Connect Subroutine
iv. Alarm Message Connect Subroutine
v. Subtask Trigger Delete Subroutine
vi. Alarm Delete Subroutine
vii. Check Bit Subroutine
viii. Alter Bit Subroutines
H. THE DATA FILE PROCESSING PROGRAM
I. FILE ACCESS AND ENTER SUBROUTINE
J. THE DATA FILE GENERATOR PROGRAM AND THE CONTROL CHAIN GENERATOR PROGRAM
i. The Data File Generator Program
ii. The Control Chain Generator Program Listing

BACKGROUND OF THE INVENTION

The present invention relates to automated systems and processes which are operated to manufacture goods or to generate services under the control of one or more digital computer systems. The invention also relates to digital computer operated systems which simulate system or process operations. The present invention further relates to digital computer systems which are used to monitor system apparatus and to act as a communications link between system apparatus and supervisory personnel. More particularly, the present invention is directed to systems which include apparatus connected to a digital computer system by an interface system and which further include provision for automatically establishing a system or process operating configuration through the use of automated computer programming techniques.

The use of digital computers in system monitoring and control has revolutionized the whole field of systems engineering. While solving many of the problems which faced systems designers of the past, computers have introduced a host of new problems for present day system designers. As will subsequently become more apparent herein, the present invention provides improved solutions to the more serious problems which face a systems engineer when he employs a digital computer for monitor control purposes in a system to be operated for production or other end purposes.

In a typical industrial system, literally hundreds of monitoring and control functions may have to be carried out. In an electrical power generating system, for example, it may be necessary to monitor hundreds of signals generated by sensor components associated with the power generation apparatus and representing temperatures, pressures, voltages, currents, and other system parameters. It may also be necessary to supply control signals to motor driven valves, electrical controls, relays, motors, and other system control components.

Prior to development of the modern digital computer, monitoring and control equipment usually was constructed entirely from independent hardware components. For monitoring, system parameter sensing components were connected singly or in groups to visual display meters and to recording meters. For alarm monitoring, the signal outputs of system sensors were usually fed into alarm devices which could sound an alarm when a system parameter indicated a system abnormality. For automatic control, signals generated by one or more system parameter sensing components were connected by hardware controllers to system control components in one or more control loops, and the characteristics of the hardware controllers were adjusted to give the desired control action and system or process performance.

In control applications where the on/off control of apparatus depended only or primarily upon the status of system contacts or switches, customized digital logic circuits typically were constructed to accept as input signals a plurality of contact closure or switch input signals, to operate logically upon these input signals, and to generate contact closure output signals to control directly the system apparatus in accordance with the hardware logic. A typical system might have included a large number of logic circuits interconnected with the system apparatus and with each other to form a highly complex hardware director system.

A primary advantage of these hardware arrangements is their inflexibility. Once a hardware monitoring or control system is assembled, changes may only be made by shutting down the system and rewiring the hardware into a new configuration or by the addition of supplemental hardware. Another disadvantage of these hardware arrangements is the high cost of having a separate hardware device to carry out each monitoring and control function.

Both the inflexibility and the cost disadvantages of hardware arrangements may be overcome through the use of a digital computer, assuming there is a sufficient duty assignment of monitor and/or control functions to provide an economic justification for digital computer usage. Digital computers may be reprogrammed to handle changes in a system configuration. A single digital computer may be programmed to carry out a wide number of different control functions and thus has the potential to replace literally thousands of independent hardware devices with a single, compact unit. While digital computers are not typically as rapid in their operations as are some hardware devices, the vast majority of control applications do not require extremely high execution speeds.

In adapting a digital computer system to monitoring and control system applications, certain provisions are usually made in the structure of the computer system and in the programming or "software" which resides within the computer. With regard to the computer system structure, it is usually necessary to provide an input interface subsystem for the computer so that signals generated by sensors associated with system apparatus may be fed into the computer in the case of either a monitoring or a control system, and it is necessary to provide an output interface subsystem for the computer so that internally generated signals within the computer may be fed back to the system apparatus in the case of a control system. The input and output interface subsystems further provide operator and programmer interface through panelboard switches and through communication devices. It is also necessary to enable the computer to allow predefined external events to interrupt normal computer operations so that the computer may respond quickly to sudden changes in the system.

With regard to the program system or "software", the process control executive program differs from the conventional control or executive program of a general purpose computer particularly in that it includes a scheduling program or an executive scheduler which may accept real time bids for the execution of jobs or tasks and which then may execute the jobs or tasks in accordance with assigned priorities. A digital computer system which includes most or all of the provisions just considered may be called a process control computer system and is the type of computer system most related to the present invention. The term "process control computer system" as used herein is applicable to a computer that is used for monitoring system variables without actually controlling a system or process as well as to a computer that directly controls the apparatus used in the operation of a system or process.

Soon after digital computers were introduced into the fields of system monitoring and system control, it was found that the task of structuring a system for process operations under computer monitoring or control, i.e. the task of adapting a process control computer system to a particular plant system or the like, was one which often required many man-years of programming effort by skilled computer programmers. It was found that half the cost of a process control computer system often went into the production of programs which were custom-tailored to a particular system or process. With so large a proportion of the computer system cost going into programming, workers in the systems engineering field directed their efforts at an early date towards the development of techniques which enable automation of the programming of process control computer systems and the structuring of systems or processes into operational entities. A long-term objective of workers in this field is to enable instructions written out by a systems engineer who is not necessarily a skilled computer programmer to be quickly and efficiently converted into an operative set of computer programs which configure a monitoring/control system and the system or process it is associated with when the instructions are fed into a process control computer in the monitoring/control system.

The first efforts in the direction of automatic programming led to the development of what are now commonly called "fill-in-the-blank programming systems". These systems were originally developed to simplify the complicated process of generating programs to perform elaborate data monitoring tasks and were later extended so that the same basic approach could be used to implement simple control strategies, such as simple control feedback loops. A relatively thorough discussion of this type of system may be found in the article "Process Control Software" by Herbert E. Pike, Jr. which appears in the PROCEEDINGS OF THE IEEE, Volume 58, Number 1, published in January 1970 beginning on page 87.

Perhaps the first such system is the PROSPRO/1800 system developed by the IBM Corporation. This system utilizes six coding forms which the systems engineer fills in to define the monitoring functions to be implemented in his system. The forms contain information such as monitored signal identifications, engineering units for signals (feet, pounds, volts, etc.), signal averaging and filtering characteristics, signal correction and linearizing data, and other information. Each set of forms defines how a particular incoming signal is to be scanned, processed, and stored within the computer system. In addition, these forms contain blanks into which alarm limiting values may be entered for each signal, for example, high and low limits beyond which the signal should not ordinarily fluctuate.

After the forms for signals which are to be monitored have been filled out, the information which they bear is punched into machine readable cards and fed into a process control computer system. A special processing program residing within the computer system converts the information presented by the punched cards into files of coded data. Each file defines how the monitoring of a particular incoming signal is to be carried out. The resulting files are stored away in the computer system and are periodically processed by other programs residing within the computer system. To summarize the PROSPRO/1800 programming system, a standard package of computer programs are used in conjunction with a set of coding forms to allow the speedy establishment of a monitoring system which is equipped to handle many routine signal monitoring and alarm tasks.

At a later time, when the use of digital computers for system control was becoming more widespread, IBM developed an expanded system called the PROSPRO II system. In addition to the type of coding forms used in the PROSPRO/1800 system, the PROSPRO II system includes an additional set of coding forms which allow moderately elaborate control loops to be established.

In the PROSPRO II system, any monitored variable may also be defined as a direct digital control variable by filling out an additional coding form. The data on the additional form allows the systems engineer to specify variable target values or setpoints, controller gains, controller integral (or reset) and derivative (or lead), characteristics, and other controller parameters of the type which are frequently encountered in common control situations. In addition, the PROSPRO II system provides coding forms which allow the implementation of general equations that may be used to carry out somewhat more complex control strategies.

A general action coding form allows the systems engineer to modify control actions in response to the status of the system, for example to take into account the status of system switches and relays and the relative magnitudes of signals derived from the system. The rigid format imposed upon all control actions by the structured coding forms which are a necessary part of the PROSPRO II system makes it somewhat difficult to achieve operating configurations which are in any way unusual or out of the ordinary. Provision is therefore made within the PROSPRO II system for the calling of conventional computer programs to handle the more unusual or special tasks. A general description of the PROSPRO II system may be found in the IBM Program Product Manual PROSPRO II (TSX/1800) Process Systems Programs Application Description Manual, Number GH20/0718/0 which may be obtained from the IBM Corporation, Poughkeepsie, New York.

A similar fill-in-the-blanks programming system has been developed by the General Electric Company and is called the BICEPS system. For each signal which is to be monitored, a BICEPS coding form is filled in with information defining the nature of the signal, how often it is to be scanned, and how its magnitude is to be computed by the computer system. This coding form allows the establishment of alarm limits and also includes provision for linearization and correction of each signal. The same coding form is used for both continuous or analog signals and for logical or "on-off" signals which are sometimes called digital signals or contact-closure signals.

If a control action is to be associated with a signal, information defining the control action is placed upon a second coding form for that signal. The second coding form includes control parameters such as setpoints and also includes the address of a controller output signal applied to the process or of a controller output applied as an intermediate variable to some other control element. For example, a control action associated with a first variable may be used to calculate a setpoint or target value for use in a control action associated with some other variable.

The two BICEPS coding forms provide for common monitoring and control functions. If any unusual action is desired, the action is defined by a BPL program that is written in a special language called the BPL language, a language quite similar to Fortran IV. As an example, such a BPL program may be caled upon to compute the setpoint or target value for a control action. Each BPL program associated with a signal is given a number, and the numbers of the BPL programs are placed in appropriate locations upon the coding forms for that signal so that linkages may be later established between the automatically established BICEPS monitoring and control functions and the BPL program. The BICEPS coding forms allow a BPL program to be called upon whenever the magnitude of a signal exceeds or falls below certain predefined limits. A more detailed description of the BICEPS system may be found in a manual BICEPS Summary Manual/BICEPS Supervisory Control, number GET-3559A (6/69) which is available from the General Electric Company, Process Computer Department, Phoenix, Arizona.

As a variation upon the General Electric technique of having Fortran-like computer programs accompanying monitor and control action definitions into a computer system, a programming system called the BATCH sequencing system developed by the Foxboro Company includes a programming language each line of which is intended to correspond to a single block or element of a monitoring or control system. The first word on each line of programming is the name of a function which is to be carried out, and subsequent items on the same line are data values or the names of signals or variables which are required for the execution of the function. The BATCH programming language is not translated into executable machine code as is the BPL programming language described above. Each line of BATCH programming is translated into a data body that is stored within the computer system for later processing by an interpretive processing program. The data on each line of a BATCH programming statement must be carefully ordered, since the ordering of the data determines how the data is interpreted by the processing program. Only a limited number of functions are available to the BATCH programmer. A more detailed description of the BATCH sequencing system may be found in a document entitled "BATCH Sequencing System", Number TIM-R-97400A-5-4, 1968, which may be obtained from the Systems Division of the Foxboro Company, Foxboro, Massachusetts.

A major drawback of most known fill-in-the-blank programming systems is that they represent only a part of the overall programming effort which is necessary to structure a system or process and its monitoring/process control system, and an isolated part at that. Separate program packages are required to handle other problems, such as intricate computations which are required to implement a control strategy or to produce particular computer system outputs for desired process operations. These separate packages typically are prepared by computer programmers without the benefit of automatic programming techniques. In an adaptive control system of the type which automatically adjusts itself to changes in the nature of the process which is under control, for example, the programs used to adapt the control system to changing conditions typically are entirely separate from the monitoring and simple control function programs. Interaction between such isolated programs is difficult to achieve and often requires custom tailoring of the programs by skilled programmers having an intimate knowledge of where different parameters are stored within the computer system. The resultant monitoring or control systems are often somewhat disjoined, since completely free interaction between such isolated programs is not readily achieved. In order to obtain a desired software configuration with minimum effort, programmers often resort to special and often clever shortcut techniques and intricate program interacting devices which complicate the program system and make it extremely difficult for one who did not initially participate in the establishment of a program system to perceive exactly what that system is and to modify it at a later time.

Additional faults of present day computer controlled and/or monitored systems become apparent when one attempts to modify the monitoring or control functions in such a system after the system has once been placed in operation, i.e. to restructure or reconfigure the system or process and its computer. Consider first the problem of adding a new program to the computer used in such a system. First, the new program is written out with instructions directed to achieve predetermined process or systems operating on monitoring purposes, typically in a programming language such as Fortran IV. Then a detailed map of the computer system memory allotment is usually checked to find a location where the new program may be stored within the computer system.

All system signals and variables which the new program has occasion to reference are located and their addresses are inserted into the new program so that they may be accessed. Calls for execution of the new program are then inserted manually into existing programs within the computer system. These calls and their equivalents may be called linkages between the existing programs and the new program. The insertion of such linkages into existing programs is typically accomplished by removing the existing programs from the computer system, recompiling or reassembling the existing programs to include the linkages to the new program, and reinserting the recompiled and reassembled programs into the computer system. If the reinsertion of a program into the computer system exceeds the storage space allocated to the program, then new storage space must be found for the modified programs as well as for the new program. It is usually necessary for an engineer attempting such a modification to have a detailed knowledge not only of the programs which reside within the computer system and of the signals and variables which are involved in the monitoring or control function, but also of the exact placement of all of these elements within the computer system.

If programs are to be deleted from an operating computer system in order to restructure the system or process and its computer, additional problems arise. If the memory space occupied by a program which is to be deleted is to be reused, the location of this space usually has to be determined and a record of the availability of this space has to be made. Preferably, all programs which have occasion to call for the execution of a program which is to be removed are located, and all linkages to the program being removed are deleted from the calling programs. Such a removal normally is accomplished by recompiling or reassembling and then reloading the calling programs. It is desirable to remove all such call linkages to keep the size of the calling programs as small as possible because space is usually at a premium within most process control computer systems. It is also desirable to remove all such calls so that the name or number which identifies a program that is removed may be reused to identify a program that is later added to the system and so that the later-entered program will not be placed into operation improperly by linkages which were not removed.

In prior art computer controlled or monitored systems, it is usually too difficult to remove all removable call linkages, and typically many are allowed to remain within the computer system, occupying valuable computer systems storage space and generally limiting the flexibility of the system or process and its computer system to accept additional modifications at a later time. The amount of editing which may be done upon such a system or process is limited to the number of programs which may be altered in the computer system without leaving the computer system so full of unused linkages and data segments that the system may not accept any more new programs or modifications.

Conventional processes or systems and their monitoring and control systems are commonly established by laying out all of the monitoring and control strategies in advance and by feeding the programs and data files which implement the strategies into the computer system before the system or process is initially placed into operation. Some such systems even require data files which contain signal and variable names to be fed into the computer system in alphanumeric order by name to facilitate locating variables and signals by name at a later time within the system. Conventional systems do not generally allow additional programs and data files to be inserted into a system after the initial loading of programs and data files unless room has been reserved for the programs or files when the original system configuration is established. Systems of this type are easily set up initially but may be modified only with considerable difficulty.

Another defect in conventional systems or processes and their computer systems is their inability to allow flexible interaction between monitoring and control jobs which are defined in different ways. In a typical process control computer system, monitoring functions and some control functions may be defined not by executable computer programs but by data file definitions of jobs which are processed or interpreted by executable processing programs on a regular basis. Other jobs are defined by conventional computer programs which are placed in execution by some form of executive scheduling program.

Provision is usually made for computer programs to interact with one another and for computer programs to be called upon by data file job definitions during monitoring and control operations to perform special tasks. However, different supervisory programs are provided for these different types of programming entities. The scheduler which controls program execution is separate from a first processing program which may interpret monitor data file job definitions and from a separate second processing program which may interpret control data file job definitions.

The presence of a number of separate software entitles which control the execution of jobs defined in different ways not only increases the complexity of a program system but also makes it necessary for a system job wishing to cause the execution of another system job not only to know the identification of that other job but also to have a knowledge of which of three possible entitles controls the execution of that job.

Even overlooking this defect, interaction between jobs defined in different ways is possible only on a limited basis. Typically, program control may not pass freely back and forth between conventional programs and data interpretive programs in both directions. As a direct result, the simplified programming techniques which are available for monitoring and for elementary control operations are typically not available to conventionally programmed sections of a computer system and are not called upon to aid conventional computer programs in carrying out various tasks.

Another limitation on present day production and other systems results in part from the small size of the typical process control computers in which monitoring or control systems are implemented. Because of space limitations within the computer system, the programs which accept directions from the systems engineer as to how a system or process is to be configured necessarily have to be kept relatively simple and compact. It is necessary for these programs to run on-line within the process control computer system because these programs require knowledge of where data values, variables, and signals are stored within the computer system. As a result of this limitation on program complexity, conventional fill-in-the-blank and other special programming systems are necessarily limited in their ability to accept sophisticated instructions or in their ability to interpret instructions written in a language which is meaningful to the engineer who is actually developing the system configuration and who may not be a skilled programmer.

The above-mentioned shortcomings of existing approaches to the structuring of operating production and other systems or processes and their computer monitoring/control systems become most apparent when one considers the actual way in which an elaborate system might be established. If a system is being configured for the first time, one or more systems engineers and management personnel typically make a fundamental analysis of the system to determine what it is the system should do and what apparatus items will be needed. Next, with an understanding of the characteristic behavior of the apparatus, the system operation, and of the controllable elements in the system, a determination typically is made of which variables are to be defined for monitoring or for control purposes and of which variables if any, are to be intermediately or end controlled for the purpose of achieving the performance standards defined as a result of the basic system analysis.

Functional flowcharts and other documentary records may be used at this stage to define how variables in the process are to be monitored and/or controlled.

After completion of the initial systems engineering, the sensing elements and the controlled elements, if any, of the system apparatus are interfaced with a process control computer system. Particular terminals at the input and output of the computer system are associated with each sensor and with each controlled element. The physical construction of the monitoring or control system is then complete.

It is next necessary to program the process control computer system so as to carry out the desired monitoring task and to implement the desired control functions. To the extent that fill-in-the-blank program techniques may be used, the system design engineer is able to write out on programming forms definitions of monitoring and control jobs which he wishes to have implemented, using the above-mentioned functional flowcharts as a guide.

With the assistance of a skilled computer programmer, the systems engineer may also generate additional computer programs for performing more sophisticated jobs which cannot easily be handled by fill-in-the-blank programming. Care must be taken to see that the necessary linkages between programs and between coding-form-defined job definitions are established, and all such linkages are of necessity established manually. When all job definitions have been prepared, the computer programs and the data from the coding forms are fed into the operating computer system at one time and are arranged into an operating monitoring and/or control configuration.

Up to this point, existing techniques for programming process control computers do an acceptably good job of implementing the system. Interaction between conventionally programmed and automatically programmed portions of the system software is limited in the manner previously noted, but generally any desired system configuration may ultimately be achieved in this manner, albeit at considerable expense.

It is during the debugging, troubleshooting, and modification stages of system implementation that the shortcomings of existing systems become most noticeable. In any complex system, unanticipated changes typically have to be introduced before an operating configuration is finalized. Conventional systems handle minor changes, such as changes in the magnitudes of constant values, of alarm limits, of controller parameters, or of setpoints, in a relatively satisfactory fashion.

More serious changes, such as a change in control strategy or a change in the way in which the execution of monitor tasks and control tasks are synchronized and coordinated, are difficult to implement in such a conventional system. Inter-program linkages are especially difficult to locate and to alter after an operating configuration is established. The cost, in time and in effort, of eliminating linkages which are no longer serving a useful purpose is often so great that such linkages are simply left as permanent scars within an operating system. Scars of this type occupy valuable storage space which could be profitably used for the storage of operating programs.

If major changes have to be made in a system operating configuration, the interactions and linkages between system elements can grow and become so complicated that only the programmer who has supervised the making of the changes can ever fully understand the nature of these linkages. Adequate records of system linkages are essential if some party other than this programmer is ever to be enabled to make further modifications to the operating system. Unfortunately, most programmers maintain only a very sketchy documentation of the systems upon which they work, and it is common for a programmer to use shorthand notations which are unintelligible to anyone other than himself.

Even in the case of well documented systems, it can often take so long for an outsider to come to a full understanding of a system that the engineers and programmers who initially implemented the system have to be called back again and again to make modifications. If some of these engineers and programmers leave the employ of the company which is implementing the system, it can be extremely costly to train their replacements, and it may be impossible for a new party ever to fully understand the system. It is not uncommon for programmers to be called back at great expense by their former employers to modify a system configuration which no one else can understand.

Modifications to a monitoring or control system can even become so expensive that they are simply not implemented, and non-optimal operating configurations are then tolerated because of the high cost of making modifications. In cases where changes absolutely have to be made, it is sometimes necessary to scrap entire segments of programming for a system and to replace these segments with entirely new programming segments simply because it is cheaper and faster to rewrite the programming in its entirety than to modify the existing programming to work in accordance with a modified plan of system operations.

The described characteristics of the known existing art on automated systems or processes and their monitoring and/or control digital computer systems have limited the economy and efficiency with which such systems can be established, the degree to which automation can be injected into the computer programming and system configuring process, and the flexibility with which system operations can be established and modified. Accordingly, these and other prior art limitations provide a background from which substantial opportunity exists for improvement.

No representation is made that the background art considered herein is the best art nor that alternative interpretations cannot be placed on the prior art.

SUMMARY OF THE INVENTION

In brief summary of the present invention, a production or other system includes apparatus which implements system operations and a process control digital computer system which either monitors or operates the apparatus. Within the computer system there exist mechanisms for executing programs on a priority basis and for handling system input data, output data, and interrupts. There also preferably exists within the computer system processing programs or processors for processing or executing jobdefining data files.

In the preferred embodiment of the invention, many system monitoring tasks are defined by job definitions called monitor data files which are processed by a data file processor program and many system control and other tasks are defined by job definitions called control chains or control chain data files which are processed by a control chain processor program. It is contemplated that computer programs will also be used as process or other job definitions, and no processing program is required for the execution of such programs.

In order to provide a uniform method in the preferred embodiment whereby an entity within the system may trigger the execution of any executable job within the system, the executable job definitions within the system are grouped into executable data packages which may be called subtasks. A subtask may be a control chain, a computer program, or a group of one or more data file job definitions which are to be executed as a group. Each such subtask is preferably assigned an identifier which may be a number and which may also serve as an indication of subtask execution priority. Subtask identifier numbers are hereinafter called subtask numbers.

A single executive scheduling program which hereinafter is called the "subtask processor" is established to control the execution of subtasks of all types in the preferred embodiment. Tables within the subtask processor contain the address of each system subtask and also a designation of the nature of each subtask--whether it is a program, a control chain, or a group of monitored data files, for example. Since every executable job within the system is identified by a subtask number, any operative entity within the system may call for the execution of any executable job within the system by supplying to the subtask processor the subtask number of the job which is to be executed. This procedure is hereinafter called bidding for execution of a subtask.

In response to a bid for the execution of any subtask, the preferred subtask processor first determines the nature of the subtask. If the subtask is a computer program, the subtask processor transfers program control directly to the program.

If the subtask includes one or more data files or control chains which are to be processed or interpreted, then the executive scheduler transfers the address of the first data file or control chain which is to be processed to one of the system processing programs or processors. Hence, a completely uniform system is established whereby the execution of any job which exists within the computer system may be initiated by supplying a unique subtask number for that job to a single subtask processor. Simple and flexible interaction between differing types of job definitions is thus assured.

In the preferred embodiment, machine readable definitions of jobs, of variables including signals, and of significant events are initially written out by the engineer who is setting up the system and who is hereinafter referred to as the systems engineer. Job, variable, and event definitions relating to variable monitoring are preferably written out simultaneously on separate coding forms for each system variable. Other job, variable, and event definitions may be written out either as computer programs or as control chains which preferably utilize the systems engineer's own chosen terminology and his own choice of engineering units.

A control chain consists of a series of calls by the systems engineer upon predefined algorithm subroutines within the system to carry out specific tasks. In the preferred embodiment, any desired number of algorithm subroutines may be included in the computer system for use in structuring and implementing the operation of the system or process. Many useful subroutines may be selected from a library of algorithm subroutines, and others may be custom-tailored to suit the special needs of a given operating system. Unlike prior systems, the number and the nature of the algorithm subroutines is limited only by available space within the computer system and by the imagination of the engineer who configures the system. Within a control chain, data values do not have to be arranged in a particular order. Each argument may be uniquely identified by a label or a name that is chosen by the systems engineer to be meaningful to him in the context of the system or process which he is establishing.

Each individual definition of a job, variable, or event is preferably subjected to preliminary processing by an off-line or remote processor which converts the terminology of the systems engineer and his choice of engineering units into a primarily numeric terminology that is understandable to the routines within the on-line process control computer system. The off-line processor has a complete knowledge of the monitor definition coding forms and is supplied with definitions, called macro specifications, of the systems engineer's terminology used in writing out control chains. The off-line processor is able to arithmetically or algebraically convert numeric values supplied by the systems engineer into any desired form for use within the computer system under the control of the macro specifications. For example, feet may be converted to meters or feet and inches may be converted to inches.

The output data generated by the preliminary processor for each definition is called an intermediate file. In the preferred embodiment, each intermediate file typically contains a designator which is a name or number identifying the file and also identifying any job, variable, or event which the file defines. An intermediate file may refer to system variables, including signals, defined by other files or not otherwise defined by referring to designators for the variables. An intermediate file may also include the designator for a file defining an event which is to trigger execution of the intermediate file, or identifiers of jobs the execution of which the intermediate file is to trigger. An executable intermediate file may contain its own subtask number and data indicating how frequently the job defined by the file is to be executed. In all other respects, each executable intermediate file is in proper form to be directly interpreted and executed by one of the processors which reside within the on-line computer system.

Since intermediate files preferably refer to designators and not to absolute computer system addresses, the preliminary processor which generates the intermediate files may reside in an Off-line general purpose computer and does not have to reside within the on-line process control computer system itself. Because of the ability of a general purpose computer to handle much more sophisticated and much longer programs than can typically be handled by a process control computer system, the off-line preliminary processor may be much more elaborate than the typical on-line preliminary processors used by prior art systems.

The intermediate files are fed to a loader or loader program within the operating process control computer system. The loader preferably stores each intermediate file in a file storage area and records the file designator, if any, and file address in a directory. If a file refers to the designator for a variable, including variables which are computer system input or output signals, the loader program goes to the directory, finds the address of a file containing the specific designator if any file contains the variable designator, and retrieves the address of the variable from that file. The loader program then places the variable address into the intermediate file in the place of the designator for the variable. In this manner, linkages between job definitions and specific variable addresses are automatically established.

If a variable designator referred to by an intermediate file is not found within a file and is not otherwise defined, the loader program may allocate memory space for storage of the variable within a global variable storage area and may then place the designator and the global address of the variable into the system directory. All later references to the same variable designator may then be replaced by the same global address. Intermediate files containing references to variable designators are thus converted into executable files which contain variable addresses and which are ready for direct processing by the system file and control chain processors.

If the systems engineer has assigned a specific subtask number to a job-defining file, the loader program preferably automatically supplies the subtask number together with the file address, to the subtask processor and thereby establishes the file as an executable entity within the computer system. Computer programs may also be established within the subtask processor in a similar manner with the aid of a special subtask processor subroutine. If a job-defining file is to be periodically executed, the loader program automatically transfers the subtask number for the file and an execution frequency which is retrieved from the file to a synchronizing program which thereafter automatically places periodic bids for execution of the file subtask with the subtask processor. Again, the same technique may be used to cause periodic execution of conventionally entered computer programs.

A complete analog signal monitoring system may be quickly and easily established by feeding to the loader program file definitions corresponding to each analog signal variable which is to be monitored. Each such file definition may specify a designator which may serve as a name for the monitored signal variable. The designator for such a variable may then be referred to by other system job definitions which need to know the computer system address of such a variable or which are to be triggered into execution when such a variable is scanned or processed. Each file definition also preferably specifies the computer system signal input hardware address of an analog signal. For example, the signal address may include an analog-to-digital (a. to d.) converter number and a multiplexer address which, when supplied to a multiplexer associated with the proper a. to d. converter, causes a particular analog signal to be connected to the a. to d. converter. A file definition may additionally specify the address of a location in the computer system memory where a number proportional to the magnitude of this same analog signal is to be stored, and this address may be called the variable address.

A file definition may specify how often the value of an analog signal variable is to be scanned and transferred into the computer system for storage, and this specification may be called the variable scanning frequency specification. The scanning frequency specification may be either the period of time which elapses between successive scans, or it may be the number of scans which occur during a fixed time interval. Alternatively, the systems engineer may simply specify that a given variable is to be scanned immediately after some other variable is scanned, and the systems engineer may include a designator identifying that other variable within the file definition of the given variable.

The file definition of an analog signal variable typically includes a complete definition of how the corresponding signal variable is to be scanned. Scan defining data usually includes data defining alarm limits for the signal variable, data defining any linear or nonlinear conversion which is to be carried out upon the signal magnitude before that magnitude is stored as a digital value in the designated variable address location, and other similar scan defining data. The file definition of a variable may typically also contain an English language description of the signal variable and an English language statement of the engineering units which are applicable to the signal variable. Examples of engineering units are "volts", "pounds per square inch", "megawatts", and "dynes per square centimeter".

When an intermediate file definition of an analog signal variable is presented to the file loader program, the loader program first stores the file within the computer system. The loader program and its subroutines then automatically add the new file to a chain-linkage of other analog signal monitor data files which are assigned to the same period or frequency of execution, if any such linkage exists. If no such linkage exists, then the new file is treated as the first file in a new linkage.

A subtask number or other job identifier is automatically assigned to each such linkage, and this subtask number is supplied to the subtask processor along with the address of the linkage or of a file within the linkage. In this manner, each such linkage is established as an executable job within the computer system. In the preferred embodiment of the invention, each such chain-linkage of data files is usually stored within a single sector of a magnetic disk memory of the computer system. If more monitor data files are assigned to a single frequency than can be contained within a single disk sector, then the invention automatically establishes multiple linkages of monitor data files which are assigned to separate subtask numbers but which are periodically executed at the same rate or frequency. In the preferred embodiment, provision is also made whereby linkages of monitor data files may be established within the system core memory, if the systems engineer so desires.

The loader program also is arranged to automatically supply the subtask number for each linkage of monitor data files, together with the variable scanning frequency specification for the file or files in the linkage, to the synchronizing program. The synchronizing program then places bids properly spaced from one another in time for the periodic processing of each linkage of monitor data files.

Once the loader program has established an efficient arrangement of monitor data file subtask linkages, the execution of scanning and monitoring operations automatically commences. The synchronizing program periodically places bids with the subtask processor for the execution of the subtasks which have been assigned automatically to the linkages of monitor data files. The subtask processor program includes routines which automatically retrieve the file linkages from mass storage, assuming they are not normally core-resident, and place the linkages into core buffers ready for execution. When a linkage has been transferred into core, the subtask processor program calls upon the data file processor program to process each file in the subtask linkage by retrieving the magnitude of the corresponding signal variable and by carrying out any other scan instructions included within each file definition. It is noteworthy that the same synchronizer and subtask processor programs which are used to control the execution of conventional programs and control chains may also be used to control the execution of analog signal scanning operations. The data file processing program is thus reduced to a relatively simple file interpreting program which interprets the data contained within each monitor data file definition and which processes the corresponding analog signal variable data accordingly. The resultant modular design of the overall signal monitoring and program execution system is more efficiently organized than prior art systems, since a uniform mechanism is achieved for initiating the execution of any job, regardless of the nature of that job.

In most monitoring and control systems, a number of analog-to-digital converters are associated with the computer system to interconnect the computer system with groups of analog signal variables associated with the process. A. to d. converters of this type generally operate fairly slowly in comparison with the speed at which a digital computer may operate. It is therefore customary to give each a. to d. converter a request to retrieve and to digitize the magnitude of an analog signal variable and to then allow the computer system to perform some other task while the a. to d. conversions are carried out by the converters. In a highly complex process control system, where the instructions for operation of the converters are typically stored in mass storage and where the converters are in almost continuous operation at times, it is necessary to carefully structure the arrangement of monitor scan defining data within mass storage so that all of the system converters are kept as busy as possible. An important feature of the present invention is its ability to automatically organize data files in such a manner that the monitoring system efficiency is kept as high as is possible. A high level of efficiency is maintained even though the monitor file definitions are fed into the computer system in random order and even though monitor file definitions may be deleted from the system long after the system is first placed in operation.

To achieve this efficiency, the loader program calls upon sub-routines which carefully organize the monitor file definitions within each linkage so that groups of data files which may be called "converter sets" are established. A "converter set" is a group of any number of monitor data files each of which calls upon the services of a different one of the system a. to d. converters. By carefully arranging the linkages between the files within each linkage of files, the present invention contemplates organizing the files into several "converter set" linked groups within each linkage. Each "converter set" group is typically arranged to contain as many files as is possible without containing more than one file requiring the services of a particular a. to d. converter. The present invention thus makes it possible for the data file processor program to follow the linkages within a subtask linkage of files and to call upon the a. to d. converters of the system to process each file that is encountered until the maximum practicable number of a. to d. converters have been called upon and are occupied in gathering data.

As a simple example, if the system includes four a. to d. converters numbered 0 to 3, then each subtask linkage of monitor data files may contain several converter sets of files each of which sets may contain a maximum of four data files, and each of which files requires the services of a different a. to d. converter. Assuming that the first converter set in a linkage contains a full complement of four files, the data file processor program processes the subtask linkage by examining the first four files and by supplying the signal hardware addresses from those files to the four system a. to. d. converters. When the processing program attempts to process the fifth file in the linkage, the processing program discovers that it has to call upon one of the a. to d. converters which is already busy. The processing program may therefore terminate program execution and allow other computer programs to run until the a. to d. converters have completed the process of scanning the four signals which correspond to the first four files in the linkage. At that time, the signal variable addresses from the next four files in the linkage may be supplied to the four a. to d. converters, assuming that the next converter set in the linkage also includes a full complement of four files. In this manner, the careful organization of the files within each subtask into converter sets enables the systems analog-to-digital converters to be kept simultaneously busy as often as is practicable without unduly complicating the data file processing program. The rate at which analog data may be transferred into the computer system from the monitored system or process is thus maximized, even though file definitions are fed into the system in random order and in a haphazard manner.

In order to further improve the efficiency of the system, each subtask linkage is preferably assigned a priority in relation to all other subtask linkages. To insure that the processing of a low frequency analog scan subtask linkage does not interfere with the execution of a more critical high frequency analog scan subtask, the loader program includes means for automatically assigning higher priorities to those subtask linkages which are executed more often and lower priorities to those linkages which are executed less often.

In the preferred embodiment of the invention, the system subtask numbers which identify any system job also serve as priority numbers. Hence, the assignment of subtask numbers to a linkage establishes the priority of the linkage. It can happen that a particular numerically sequential group of subtask numbers may all be assigned to subtask linkages at a time whem a new monitor data file is received by the loader program which new file is assigned to a frequency intermediate to the frequencies of the linkages assigned to the sequential group of subtask numbers. The loader program includes automatic means which may alter the assignment of subtask numbers to linkages so as to leave one subtask number not assigned which may be assigned to the new monitor data file and which has a numerical value such that the new data file is given the proper priority of execution with respect to other subtask linkages. Hence, a careful arrangement of priority assignments is automatically maintained within the system even if the linkage subtask numbers have to be reassigned.

In the preferred embodiment of the invention, increased execution speed is achieved by not permitting the scanning of one subtask linkage to interrupt the scanning of another. The number of files in each subtask linkage is limited to a fixed number of converter sets so that the execution time of each subtask linkage is held to a reasonable level.

In addition to monitor data file definitions for analog signal variables, a subtask linkage may contain monitor data file definitions for calculated internal computer systems variables. These calculated value file definitions are handled in essentially the same manner as are the signal variable file definitions. However, calculated value file definitions may be placed anywhere within a subtask linkage, since there is no need to organize such definitions into converter sets. Within the preferred embodiment of the present invention, automatic means are provided for scattering calculated value data files throughout the linkages assigned to a given scanning frequency so that they are not grouped together at one end of a linkage where they might tie up the computer system for any significant time interval.

It has already been noted that a variable file definition may specify that the variable to which it relates is to be scanned or processed immediately after another designated variable is scanned or processed. Upon receipt of such a file definition, the loader program obtains the address of the file definition corresponding to the variable which is to be processed first, using the system directory. The new file definition is then linked directly behind the file definition for the variable which is to be scanned or processed first within the same linkage of files.

This automatic linking feature of the present invention has another important use. A control chain or other job-defining entity may designate that it is to be processed immediately after the processing of a file. For example, a particular control chain or other executable job definition may be supplied to perform computations upon the value of a particular analog signal variable as soon as the value is retrieved by the computer system. Assume that the designator for the analog signal variable is "A100". The systems engineer may include within the control chain file the designator "A100" as a trigger reference to the signal variable. In response to such a designation by the systems engineer, the system loader program automatically links the control chain into the linkage of files which contains the file definition of the variable "A100" and automatically positions the control chain file immediately behind the file definition of the variable "A100" within the linkage. The data file processor program upon encountering such a control chain file within a linkage, automatically transfers program control to an appropriate control chain processing program within the system. Hence, a job may be executed immediately following the periodic scanning of any system analog variable by simply placing a trigger reference to the designator for the variable within a control chain definition of the job which is to be triggered.

In the case of system jobs which are not defined by control chains but which are assigned subtask numbers within the subtask processor program, the computer system includes means whereby a file containing the subtask number of a job may be created and linked immediately following the file for a signal variable the scanning of which signal variable file is to trigger execution of the job. The data file processor program automatically transfers the subtask numbers from such files to the sublevel processor program in the form of bids for execution of the corresponding jobs.

An important feature of the present invention is that a monitoring system once set up may be quickly and easily modified in any desired way. Monitor data file definitions may be easily removed from the system by an appropriate set of subroutines which are provided for that purpose. Afer such a removal, the linkages between other files in the same subtask linkage are reestablished so as to preserve the integrity of the linkage without actually repositioning the files which comprise the linkage. The space previously occupied by the file is automatically linked into a linkage of empty locations and is available for occupancy by new data files which are fed into the system at a later time. The arrangement of converter sets within the system is maintained to the extent possible when files are deleted. New files are automatically placed into any vacancies within a converter set that are left by the deletion of files from that converter set so as to keep the converter sets as full as possible.

If an entire subtask linkage of files are deleted from the system, the disk sector previously occupied by that subtask is automatically made available for the storage of some other subtask, and the subtask number previously assigned to the linkage is made available for assignment to some other linkage. Means are provided within the system for preventing the removal from the system of a variable file definition which serves as a trigger for some other file until after the file which is to be triggered is first removed from the system.

In combination, the above attributes of the invention enable a systems engineer to feed file definitions of signal variables into the computer system in a generally random order. He is enabled to make minor or major modifications to his monitoring or data gathering system at any time, even years after the system is initially placed into service. Generally, the system does not have to be closed down while such changes are made. The automatic programming techniques which establish linkages between definitions within the system force a tight, logical organization onto the system and thus make it practicable for an engineer who did not assist in the establishment of a system and who does not know precisely where variables and definitions are stored within the system to quickly learn enough about how the system is configured so that he may make modifications and changes in the system.

BRIEF DESCRIPTION OF THE DRAWINGS

FIG. 1

FIGS. 1 and 1 (Cont.) together form a block diagram of a process and of a process control system arranged in accordance with the present invention.

FIGS. 2/1 et seq.

The FIGS. 2/- illustrate the computer system which is used in implementing the preferred embodiment of the present invention. FIG. 2/1 is an overview block diagram of the computer system. FIG. 2/2 is a block diagram representation of the arithmetic and logic portions of the computer system. FIG. 2/3B is a block diagram representation of the computer system executive and FIG. 2/3A illustrates the words within this executive which control the operation of 16 different task levels. FIG. 2/4A is a block diagram representation of an analog-to-digital converter, and FIG. 2/4B illustrates graphically the operation of this converter.

FIGS. 3A through 3E show schematic diagrams of a metal reduction rolling mill and a digital computer control system therefor arranged and operated in accordance with the principles of the invention. FIGS. 3F through 3H schematically illustrate a metal coil annealing furnace system and a digital computer control system therefor configured and operated in accordance with the principles of the invention. FIGS. 3I through 3K schematically show an electric power plant and a digital monitoring computer system therefor arranged and operated in accordance with the principles of the invention.

FIG. 4 is a block diagram representation of a number of computer programs which reside within the computer system shown in FIG. 2.

FIG. 5A et seq.

Fig. 5A is an overview block diagram of a file loader program. FIGS. 5B through 5K illustrate various details of the file loader program. FIG. 5B is a flow chart of an address link module routine. FIG. 5C is a flow chart of a routine which processes the last module in a file. FIG. 5D is a flow chart of a routine which processes symbol reference modules. FIG. 5E is a flow chart of a routine which processes beginning of file modules. FIG. 5F is a flow chart of a routine which processes trigger modules. FIG. 5G illustrates a typical load record format for the file loader program. FIG. 5H illustrates various load module formats which may be incorporated into the load record shown in FIG. 5G. FIG. 5I illustrates tables used to store global variables, and FIG. 5J illustrates tables used to store process variables. FIG. 5K is a flow chart of a trigger connect subroutine which is called upon by the file loader program to establish trigger connections.

FIG. 6 et seq.

FIG. 6 is an overview block diagram representation of file and directory handler subroutines which are sometimes called the file and directory access and entry subroutines. FIGS. 6/100 through 6/810 are detailed illustrations of these subroutines. The file handler subroutines are presented in FIGS. 6/100 through 6/400, and the directory handler subroutines are presented in FIGS. 6/500 through 6/810.

FIGS. 6/100, 6/101, 6/102, and 6/103 together form a flow chart of a generate file subroutine. FIG. 6/104 illustrates the format of a typical data file. FIG. 6/105 illustrates the format of an empty file. FIG. 6/106 illustrates the format of a coupler file. FIG. 6/107 illustrates the structure of a typical file storage area. FIG. 6/108 illustrates the structure of a subtask and trigger file core storage area. FIG. 6/109 illustrates the structure of a general file core storage area. FIG. 6/110 illustrates the structure of general file disk storage areas. FIG. 6/111 illustrates the structure of subtask and triggered file disk storage areas. FIG. 6/112 illustrates the various buffers and tables involved in the file generation process.

FIG. 6/120 is a flow chart of the find an empty sector subroutine. FIG. 6/130 is a flow chart of a subroutine which opens a new disk sector. FIG. 6/140 is a flow chart of a subroutine which finds a hole in a file storage area. FIG. 6/150 is a flow chart of a subroutine which removes an empty slot from an empty file linkage. FIG. 6/160 is a flow chart of a subroutine which finds where a new analog scan monitor data file should go in a linkage of such files. FIG. 6/170 is a flow chart of a subroutine which connects a new file into a converter linkage of files.

FIG. 6/200 is a flow chart of a subroutine which writes data into a file. FIG. 6/300 is a flow chart of a subroutine which transfers a file into a designated core buffer. FIG. 6/400 is a flow chart of a subroutine which deletes a file from a file storage area.

FIG. 6/500 is a flow chart of a subroutine which enters a new symbol name into the system directory. FIG. 6/501 is allow chart of the alphanumeric and hash code linkage portions of the subroutine shown in FIG. 6/500. FIG. 6/502 illustrates the format of a typical directory file. FIG. 6/503 is a simplified representation of the directory file storage area. FIG. 6/504 illustrates the hash code pointer table arrangement. FIG. 6/505 illustrates the actual directory storage area as it appears in the preferred embodiment of the invention.

FIG. 6/510 is a flow chart of a subroutine for locating an entry in the system directory. FIG. 6/511 is a flow chart of a subroutine which computes the hash code for a given symbol. FIG. 6/520 is a flow chart of a subroutine which locates the next directory file in the directory storage area within an alphanumeric linkage of directory files. FIG. 6/530 is a flow chart of a subroutine which compares two symbol names and determines their alphanumeric order.

FIG. 6/600 is a flow chart of a subroutine which obtains data from the directory storage area when supplied with a symbol name. FIG. 6/700 is a flow chart of a subroutine which removes entries from the directory storage area. FIG. 6/800 is a flow chart of a subroutine which finds the next file name in the alphanumeric linkage of directory entries. FIG. 6/810 is a flow chart of a subroutine which finds the next alphanumeric symbol name in the alphanumeric linkage of directory files.

FIG. 7

FIG. 7 is a block diagram representation of the control chain processor program.

FIG. 8/A00 et seq.

FIG. 8/A00 through 8/A33 present descriptions of algorithm subroutines which may be called upon by the control chain processor program illustrated in FIG. 7. FIG. 8/A00 illustrates the format of a typical control chain which is to be processed by algorithm subroutines. FIG. 8/A01 describes an algorithm subroutine which performs logical operations. FIG. 8/A02 describes an algorithm subroutine which performs arithmetic operations. FIG. 8/A03 describes an algorithm subroutine which can cause a pair of logical variables to behave as a flip-flop. FIG. 8/A04 describes an algorithm subroutine which compares a reference value with an input value and which then adjusts the status of logical variables in accordance with the results of the comparison. FIG. 8/A05 describes an algorithm subroutine which sets logical variables true or false. FIG. 8/A06 describes an algorithm subroutine which executes logical time delays.

FIGS. 8/A06I through 8/A06L describe the process of establishing a simple control chain in an operating computer system. FIG. 8/A06K illustrates the format of a typical control chain intermediate file as the control chain appears when first generated by the control chain generator program, and FIG. 8/A06L illustrates the same control chain completely assembled and ready for storage within the operating computer system.

FIG. 8/A07 describes an alternative form of algorithm subroutine which executes logical time delays. FIG. 8/A08 describes an algorithm time delays.

FIG. 8/A08 describes an algorithm subroutine which carries out arbitrary, nonlinear transformations. FIG. 8/A09 describes an algorithm subroutine which controls the operation of timed contact closure outputs in accordance with the magnitude of a system variable.

FIG. 8/A10 describes an algorithm subroutine which functions as a proportional-plus-reset controller, which uses rectangular integration, and which has an adjustable gain and time constant. FIG. 8/A11 describes an algorithm subroutine which functions as a proportional-plus-reset controller and which uses rectangular integration. FIG. 8/A12 describes an algorithm subroutine which functions as a proportional-plus-reset controller and which uses trapezoidal integration. FIGS. 8/A12K and 8/A12L illustrate graphically the difference between rectangular and trapezoidal integration. FIG. 8/A13 describes an algorithm subroutine which functions as a proportional-plus-reset controller, which uses trapezoidal integration, and which includes provision for using different time constants and gains during automatic and manual modes of operation. FIG. 8/A14 describes an algorithm subroutine which functions as a proportional-plus-reset controller, which uses rectangular integration, and which sets high and low limits to the controller integral and output values.

FIG. 8/A15 describes a pair of algorithm subroutines which function as proportional-plus-rate controllers, one of which uses rectangular differentiation and the other of which uses trapezoidal differentiation. FIG. 8/A15P illustrates graphically the difference between rectangular and trapezoidal differentiation. FIG. 8/A16 describes an algorithm subroutine which functions as a proportional-plus-reset-plus-rate controller and which uses trapezoidal integration. FIG. 8/A17 describes a variety of algorithm subroutines which function as lag controllers and as lead-plus-lag controllers.

FIG. 8/A18 describes an algorithm subroutine which functions as a proportional-plus-reset controller using rectangular integration and which generates both absolute and velocity (differential) output variables. FIG. 8/A19 describes an algorithm subroutine which functions as a ramp controller and which causes an output variable to rise or fall at a constant rate until it equals an input variable.

FIG. 8/A20 describes an algorithm subroutine which sets an output variable equal to an input variable so long as the input variable does not fall below a low limit constant. FIG. 8/A21 describes an algorithm subroutine which sets an output variable equal to an input variable so long as the input variable does not exceed a high limit constant. FIG. 8/A22 describes an algorithm subroutine which sets an output variable equal to an input variable so long as the input variable stays within a designated range. FIG. 8/A23 describes an algorithm subroutine which sets an output variable equal to the lowest of two input variables. FIG. 8/A24 describes an algorithm subroutine which sets an output variable equal to the highest of two input variables. FIG. 8/A25 describes an algorithm subroutine which sets an output variable to zero when an input variable is within a predefined range. FIG. 8/A26 describes an algorithm subroutine which sets or clears a logical variable in accordance with whether an input variable is within a predefined range.

FIG. 8/A27 describes an algorithm subroutine capable of carrying out a transfer within a control chain. FIG. 8/A28 is the data module for an algorithm subroutine which carries out a transfer to one of two locations depending on the value of a logical variable. FIG. 8/A29 is the data module for an algorithm subroutine which executes a transfer to one of two locations within a control chain depending upon whether or not a certain relationship exists between two system variables. FIG. 8/A30 is the data module for an algorithm subroutine which may place a bid for the execution of a subtask, enable a subtask to be executed, or inhibit the execution of a subtask. FIG. 8/A31 is the data module for an algorithm subroutine which may halt and delay the execution of a control chain. FIG. 8/A32 is the data module for an algorithm subroutine which may place a time delayed bid for the execution of a subtask. FIG. 8/A33 is the data module for an algorithm subroutine which may place a subroutine call to any desired subroutine within an operating computer system.

FIG. 9A et seq.

FIG. 9A is an overview block diagram of the auxiliary synchronizer program. FIGS. 9B through 9G illustrate the details of the auxiliary synchronizer program.

FIG. 9B is a flow chart of a periodic subtask bid countdown routine. FIG. 9C is a flow chart of a logical time delay countdown routine. FIG. 9D illustrates a table in which delayed subtask bids may be recorded. FIG. 9E illustrates tables in which periodic subtask bids may be recorded. FIG. 9F illustrates an arrangement of logical time delay linkages within the operating computer system. FIG. 9G illustrates the linkages which may exist between subtasks which are in time delay or suspended. FIG. 9H illustrates a table which may be used for timing the actuation of contact closure outputs.

FIG. 10A is an overview block diagram of the subtask processor program and includes a block diagram of the sublevel processor program.

FIG. 10B is a flow chart of the program which transfers subtasks between core and disk storage.

FIG. 10C illustrates the task tables within the sublevel processor program. FIG. 10D illustrates the group tables within the sublevel processor program. FIG. 10E illustrates the subtask tables within the sublevel processor program. FIG. 10F illustrates the buffer tables within the sublevel processor program. FIG. 10G illustrates other miscellaneous system tables which are called upon by the subtask processor program.

FIG. 11A et seq.

FIG. 11A is an overview block diagram of the logic initiator program, including the digital scan program.

FIGS. 11B and 11B (Cont.) together form a flow chart of the digital scan program and of the alarm and trigger check routine.

FIG. 11D illustrates how the two halves of FIG. 11C are to be assembled. FIG. 11E illustrates a logical word table, an alarm and trigger table, a bit mask table, and an array LOGBAS all of which are part of the logic initiator program. FIG. 11F illustrates how logical variables are addressed within the preferred embodiment of the present invention. FIG. 11G presents examples of entries which may be encountered in the logical word table shown in FIG. 11E. FIG. 11H illustrates the two types of entries which may be encountered within the trigger and alarm table in FIG. 11E.

FIG. 12

FIG. 12 is a block diagram representation of the data file processing program.

FIG. 13A et seq.

FIG. 13A is an overview block diagram representation of the system operator's console program. FIG. 13C is a block diagram representation of a file access and enter subroutine which appears in FIG. 13B.

FIG. 14

FIG. 14 is a block diagram representation of a message writer program.

FIG. 15 is an overview block diagram of the file generation process, including the data file generation process, the control chain generation process, and the process of loading intermediate files into an operating computer system.

FIG. 15/100 is a flow chart of a data file generator program. FIG. 15/101 illustrates the data input arrangement expected by the data file generator program. FIG. 15/102 illustrates the intermediate files which form the output of the data file generator program. FIGS. 15/103 through 15/109 are illustrative coding forms which may be used in preparing data for the data file generator program.

FIG. 15/200 is a flow chart of a control chain generator program. FIGS. 15/201 through 15/204 illustrate different combinations of instructions which may be used in writing out the initial portions of a control chain. FIG. 15/205 is a flow diagram of a hypothetical control system which is to be implemented using a control chain, and FIG. 15/206 illustrates a control chain written out in the language of a systems engineer to implement the control system shown in FIG. 15/205.

FIG. 15/211 shows the control chain generator program calculation table. FIGS. 15/210, 15/212, 15/213, 15/215, and 15/216 illustrate the format of data which is used by the systems engineer in writing out his macro data specifications which define both the systems engineer's terminology and the preliminary computations which are to be carried out on the systems engineer's data before that data is presented to the operating system. FIG. 15/214 is a table explaining the codes used to designate the operation which is carried out by a type 3 macro data specification of the type illustrated in FIG. 15/213. FIG. 15/217 illustrates a possible macro specification which might be used to define how a particular algorithm subroutine is to be used by a systems engineer.

FIGS. 15/301 through 15/304 illustrate the organization of data within four different types of analog scan monitor data files. FIGS. 15/305 through 15/308 illustrate the organization of data within calculated value monitor data files. FIG. 15/309 illustrates the organization of data within a contact closure input logical variable data file of the type which is processed by the logic initiator program. FIG. 15/310 illustrates the organization of data within the file for a contact closure input which is not a logical variable and which is not processed by the logic initiator program. FIG. 15/311 illustrates a type of data file which may be used in association with a contact closure output logical variable. FIG. 15/312 illustrates a type of data file which may be used in defining a constant value. FIG. 15/313 illustrates a type of data file which may be used in defining a system logical variable other than a contact closure input or output. FIG. 15/314 illustrates the organization of data within an analog control chain file of the type which is linked into a subtask linkage of data files. FIG. 15/315 illustrates the organization of data within a normal control chain file which is assigned its own subtask number. FIG. 15/316 illustrates one possible format for a subtask bidding file containing subtask numbers which are to be bid when the file is processed as part of a subtask linkage of files. FIG. 15/317 illustrates a dummy file which occupies some locations in the file storage area not otherwise occupied by files. FIGS. 15/318 through 15/321 illustrate various forms of general files which may be defined by the systems engineer for any number of purposes.

FIGS. 17/500A et seq.

Figure 3A:
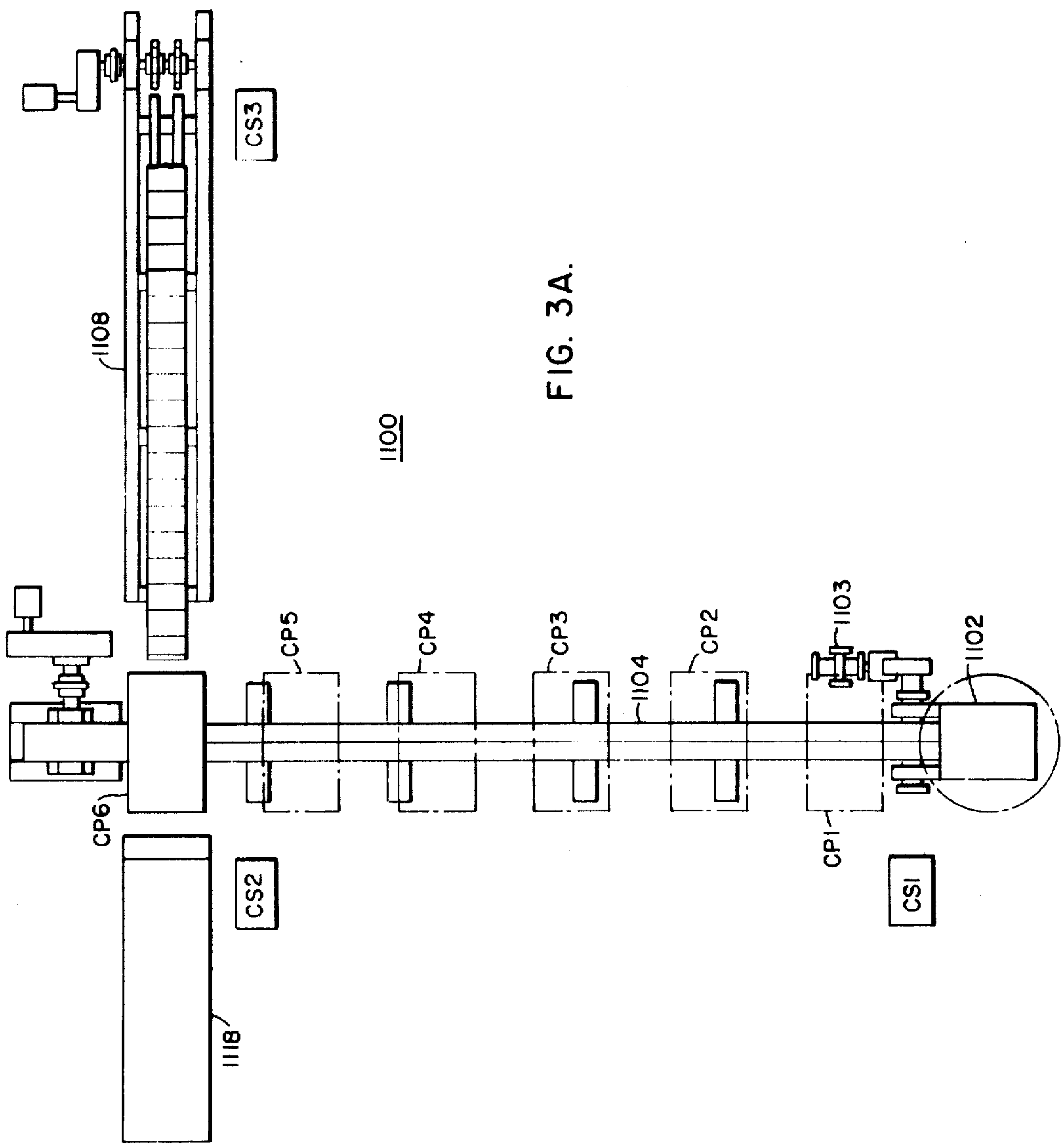
FIG. 3A et seq.
Figure 3B:
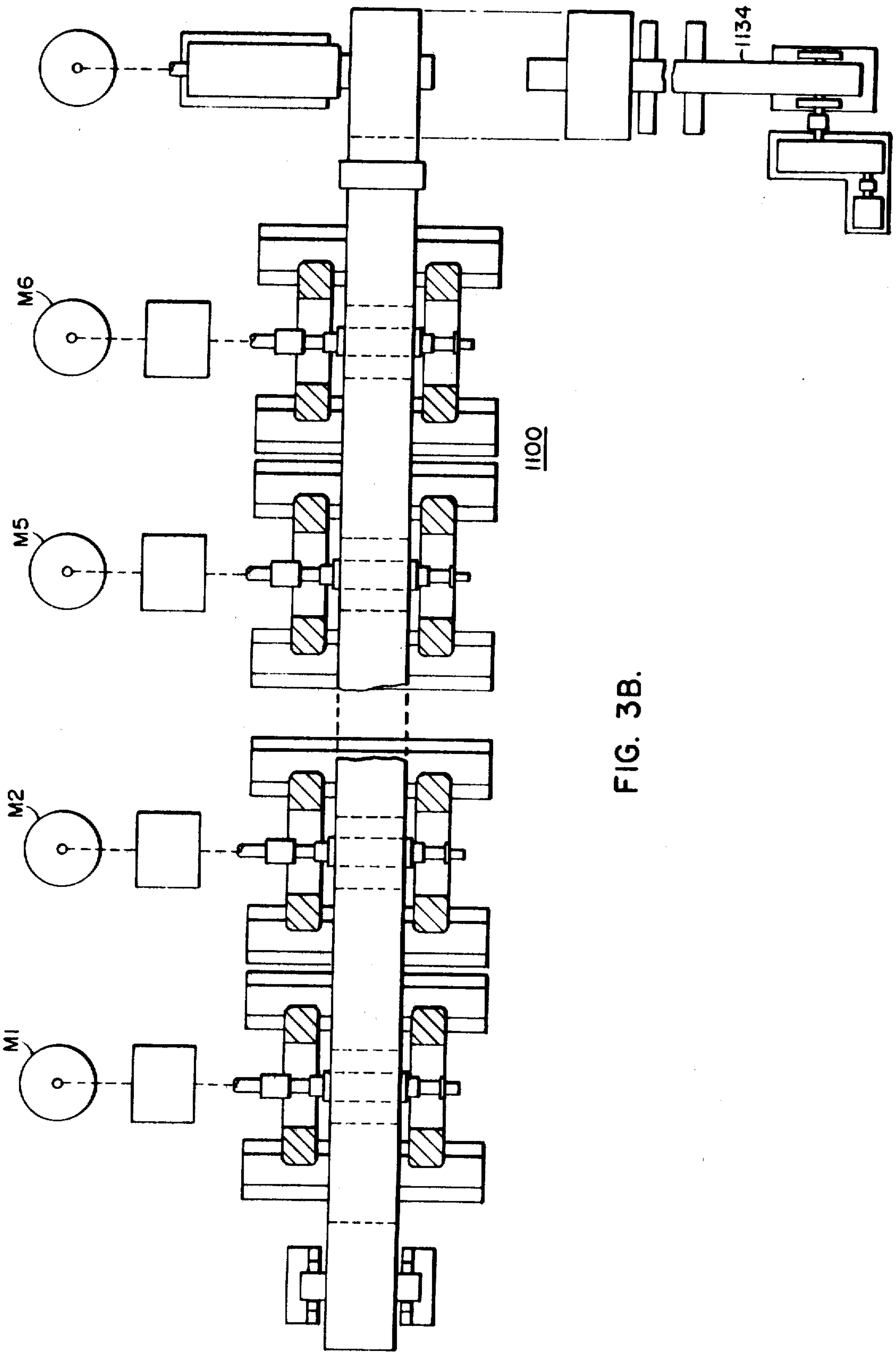

All of the figures prefixed by "17/-" contain computer program listings written out either in FORTRAN or in assembly language.

FIGS. 17/500A through 17/500F present a listing of the file loader program. FIGS. 17/510, 17/520, 17/530, and 17/540 present listings of subroutines which are called upon by the file loader program.

FIGS. 17/601 through 17/619 present listings of all of the file handler subroutines, and FIGS. 17/620 through 17/622 and 17/624 through 17/629 present listings of all of the directory handling subroutines.

FIGS. 17/700, 17/710, 17/720, and 17/730 present a listing of the control chain processor program. FIGS. 17/8A01 through 17/8A06, 17/8A08 through 17/8A11, 17/8A13 through 17/8A15, and 17/8A17 through 17/8A32 present listings of a representative selection of algorithm subroutines.

FIGS. 17/900A through 17/900D present a listing of the auxiliary synchronizer program. FIGS. 17/910, 17/920, 17/930, 17/940, 17/950A and B, 17/960, and 17/970 present listings of various subroutines which are part of the auxiliary synchronizer program.

A listing of the sublevel processor program is presented in FIGS. 17/1000 through 17/1090. FIGS. 17/100 to 17/1017 present listings of miscellaneous subroutines which form a part of the sublevel processor program. FIGS. 17/1020 and 17/1021 are listings of the subroutines which record and execute subtask bids. FIG. 17/1030 presents a listing of the basic task program.

FIG. 17/1040 presents a listing of the basic subtask exit program. FIGS. 17/1050 to 17/1056 together form a listing of the CHKBID routine. FIGS. 17/1060 through 17/1067 present a listing of the program which transfers subtasks between disk and core storage. FIGS. 17/1070A, 17/1070B, 17/1071, 17/1072 and 17/1073 present a listing of the various subroutines which include provision for automatic suspension of a calling subtask while a subtask is transferred between core and disk storage. FIGS. 17/1080 through 17/1083 present listings of the subroutines which participate in the execution and in the termination of subtask time delay and suspension. FIG. 17/1090 presents a listing of the subroutine which releases a core buffer occupied by one subtask for use by another subtask.

The logic initiator program is presented in FIGS. 17/1101A through 17/1170. A listing of the digital scan program is presented in FIGS. 17/1101A through 17/1101E, and a relevant set of tables are presented in FIG. 17/1102. A listing of the alarm and trigger check subroutine is presented in FIG. 17/1103. A listing of a subroutine which establishes logical variables as triggers for subtask bids is presented in FIG. 17/1110. A listing of a subroutine which establishes logical variables as triggers for alarm messages is presented in FIG. 17/1120. A listing of a subroutine which terminates logical variable - to - subtask trigger linkages is presented in FIG. 17/1130, and a listing of a subroutine which terminates logical variable - to - alarm message trigger linkages is presented in FIG. 17/1140. FIG. 17/1150 presents a listing of a subroutine which determines the state of any system logical variable. FIGS. 17/1160 and 17/1170 are listings of subroutines which allow the state of a system logical variable to be altered.

A listing of the data file processing program is presented in FIGS. 17/1200A, 17/1200B, and 17/1210.

FIGS. 17/1310A through D present a listing of the file access and enter subroutine. FIGS. 17/1311 to 17/1313 present listings of subroutines which are called upon by the file access and enter subroutine.

FIGS. 17/1501 through 17/1531 present a listing of the data file generator program. FIGS. 17/1541 through 17/1566 present a listing of the control chain generator program.

ALPHABETICAL LIST OF SYMBOLIC NAMES

Many of the programs, routines, subroutines, locations, and tables involved in implementing the invention have symbolic names which are used repeatedly throughout this specification and the drawings. In order to simplify the task of locating a particular program, routine, subroutine, location, or table, the following alphabetical index of the more frequently encountered symbolic names has been prepared. Each name is followed by the figure number of a figure which is relevant to the program, routine, subroutine, location, or table.

| | |
|---|---|
| A(accumulator register) | 2/2 |
| ABLE | 2/3A |
| ABLR | 17/1014 |
| ACTEST | 11C (Cont.) |
| " | 17/1102 |
| ACTIVE(word) | 2/3A |
| ACTIVE(table) | 10D |
| ACTTAB | 10D |
| ADDRESSO, (etc.) | 9E |
| ALARM1 | 17/1517 |
| ALGSUP | 17/1557A |
| ALMCON | 17/1120A |
| ALMDEL | 17/1140 |
| ANIMPX | 17/1515 |
| ANTSK | 17/1200A |
| APLSLORL | 17/1056 |
| ARITH | 17/1556A |
| B(index register) | 2/2 |
| BEFILE | 17/1525 |
| BIDPOINT | 9D |
| BIDTAB | 10F |
| BITLOD | 17/1150 |
| BITTBL | 11E |
| BNODEF | 17/1552 |
| BNOREF | 17/1551 |
| C(index register) | 2/2 |
| CHAIN | 17/1553A |
| CHKBID | 17/1050 |
| CHKENT | 17/1050 |
| CHKEXT | 17/1050 |
| CHNBID | 17/910 |
| CIPASO | 11C (Cont.) |

-continued

| | |
|---|---|
| CKMATRX | 17/1061 |
| CKSTUS | 10B |
| " | 17/1066 |
| CLSBUF | 17/614 |
| CLSFIL | 17/605 |
| CNTINT | 17/1210 |
| COATVO | 11C (Cont.) |
| COMMON | 17/1103A |
| COMSYM | 6/530 |
| " | 17/629 |
| CONSTC | 17/1521 |
| COPASE | 11C (Cont.) |
| COPASO | 11C (Cont.) |
| CORLOC | 10F |
| CORPTR | 10D |
| CORTAB | 10F |
| COUNTDWN | 17/1082 |
| CRPTAB | 10D |
| CSR | 10C |
| CSRTAB | 10C |
| CVTOAB | 17/615 |
| CVTORL | 17/616 |
| D(designator register) | 2/2 |
| DABR | 17/1015 |
| DISABLE | 17/1015 |
| DISCAN | 10B |
| DISKPROG | 17/1054 |
| DISKRTRN | 17/1050 |
| DLELNK | 17/618 |
| DLFIL | 6/400 |
| " | 17/606A |
| DLYR | 17/1080 |
| DSKTAB | 10D |
| DSKTBL | 10D |
| E(extended accumulator register) | 2/2 |
| ENDPOINT | 9E |
| ERRTN | 17/530 |
| ERSYMB | 6/700 |
| " | 17/621A |
| FDIDX | 6/520 |
| " | 17/626 |
| FIAADK | 5J |
| FILIDX | 11E |
| FILTBL | 11E |
| FINDBIT(CHKBID subr.) | 17/1055 |
| FINDBIT(DISCAN routine) | 17/1062 |
| FINDFIL | 17/960 |
| FLTADK | 5J |
| FLTTBL | 5J |
| FNDBIT | 17/1063 |
| FOUNDBIT | 17/1050 |
| G(shift code register) | 2/2 |
| GNFIL | 6/100 |
| " | 17/604A |
| GRPTAB | 10C |
| GRPTBL | 10C |
| HEXCOV | 17/1528 |
| HGHMTX | 10F |
| HGHTAB | 10F |
| HIINDX | 10G |
| HILINK | 9F |
| IDSECT | 6/110 |
| IDSZE | 6/110 |
| IFSECT | 6/111 |
| IGBREG | 5I |
| " | 11E |
| IHASH | 6/511 |
| " | 17/628 |
| I*INTD | 17/700 |
| I*INTTD | 17/710 |
| INCORE | 10F |
| INCTAB | 10F |
| INVERT | 11C |
| INXFRE | 6/505 |
| IPSNSC | 6/505 |
| ISECT | 6/505 |
| ISRGE | 6/503 |
| | 6/504 |
| ISSECT | 6/504 |
| I*START | 17/700 |
| ISTSEC | 6/504 |

-continued

| | |
|---|---|
| ITM | 6/112 |
| ITPH | 6/112 |
| IXHI | 6/503 |
| IXLO | 6/503 |
| JHDR | 5E |
| JTRIGR | 5F |
| LBLNAM | 5I |
| LBLPTR | 5I |
| LBLSZE | 5I |
| LCBIT | 11C (Cont.) |
| LCKSM | 17/1563 |
| LCORE | 6/108 |
| LCWORD | 11E |
| LDLOC | 5A |
| LDRECD | 5A |
| LENGTH | 10E |
| LFILE | 5A |
| LFILES | 5A |
| LGBREG | 5I |
| " | 11E |
| LGCT | 17/940 |
| LGHTAB | 10E |
| LIALMT | 11C (Cont.) |
| LIALRM | 11C (Cont.) |
| LIENTD | 11C (Cont.) |
| LILMTR | 11C (Cont.) |
| LIMGTB | 11C |
| LISCNR | 11C (Cont.) |
| LIUSER | 11C (Cont.) |
| LNKM | 6/111 |
| LNKSEQ | 6/170 |
| " | 17/612 |
| LOC | 6/112 |
| LOCBUF | 6/120 |
| " | 17/609 |
| LOCDIR | 6/510 |
| " | 17/625 |
| LOCHOL | 6/140 |
| " | 17/607 |
| LOCSEQ | 6/160 |
| " | 17/608 |
| LOGBAS | 11E |
| LOGICAL | 17/1555-A |
| LOINDX | 10G |
| LOLINK | 9F |
| LOUSER | 11C (Cont.) |
| LOWTAB | 10F |
| LOWMTX | 10F |
| LRHSMK | 17/1564 |
| MACROR | 17/1559A |
| MASYNC | 17/900A |
| MODAO1(etc.) | 7 |
| " | 17/720 |
| MODMOD | 17/1545 |
| MOVFIL | 17/603 |
| MOVLNK | 17/619 |
| NAME | 17/1509 |
| NAMEX | 17/1520 |
| NCORE | 6/109 |
| NDSECT | 6/110 |
| NFILE | 5A |
| NFSECT | 6/111 |
| NLNKM | 6/110 |
| NMOD | 5A |
| NONO | 17/1544 |
| NOTRACE | 17/1050 |
| NOTRGS | 5F |
| NSBLVL | 6/111 |
| NSDTSZ | 6/110 |
| NSECT | 6/505 |
| NSPGSZ | 6/111 |
| NUMOUT | 9H |
| NUMREG | 11C |
| NWDS | 6/504 |
| NWDS | 6/505 |
| NXCBDF | 6/108 |
| NXCBED | 6/108 |
| NSCBSZ | 6/108 |
| NXCBWD | 6/108 |
| NXCDDF | 6/109 |
| NXCDEN | 6/109 |
| NXCDSZ | 6/109 |

-continued

| | |
|---|---|
| NXCDWD | 6/109 |
| NXFLNM | 6/800 |
| " | 17/624 |
| NXSYMB | 6/810 |
| " | 17/622 |
| NXTTRG | 5F |
| OCTAL | 17/1529 |
| OPNBUF | 6/130 |
| " | 17/610 |
| OPNFIL | 6/150 |
| " | 17/611 |
| OUTPUT | 17/1531 |
| P(Program address register) | 2/2 |
| PACK | 17/1560 |
| PAKNUM | 17/1547 |
| PAKWRD | 17/1546 |
| PERCCI | 17/1523 |
| PNTTAB | 10C |
| POINTADR | 10C |
| R40A2 | 17/1562A |
| RAPPER | 17/1554A |
| RBINRD | 17/520 |
| RBINRD | 17/1566 |
| RCSERR | 17/1526 |
| RDFIL | 6/300 |
| " | 17/601 |
| RDSYMB | 6/600 |
| " | 17/627 |
| READ | 17/1070A |
| READAC | 17/510 |
| READDISK | 17/1065 |
| READENT | 17/1070A |
| READER | 17/1543 |
| READISK | 10B |
| READT | 17/1071 |
| REDTAB | 10F |
| REGGEN | 17/1050 |
| RELBUF | 17/1040 |
| RELSBUF | 17/1090 |
| REMOVE | 17/970 |
| REMVR | 17/1013 |
| RESBID | 10F |
| RESEQ | 17/617 |
| RESERVE | 17/1067 |
| RESREAD | 10F |
| RGSTRT | 11C |
| RSDTAB | 10D |
| RSDTBL | 10D |
| RSRBID | 17/1072 |
| SBBIT | 17/1311 |
| SCNO7 | 17/1103A |
| SEARCH (DISCAN routine) | 17/1060 |
| SEARCH (Data File Gen. Pgm.) | 17/1530 |
| SECT | 6/505 |
| SETIN1 | 17/1170 |
| SETINO | 17/1170 |
| SETION | 17/1170 |
| SETIZR | 17/1170 |
| SETONE | 17/1160A |
| SETONR | 17/1160A |
| SETTDY | 17/930 |
| SETZER | 17/1160A |
| SETZRO | 17/1160A |
| SFILE | 17/1310A |
| SHARK | 17/1511 |
| SPEXIT | 17/1030 |
| SQENCE | 17/1513 |
| SRTANL | 17/1200A |
| STARTA1 | 17/1060 |
| STARTADR | 10E |
| STRTAB | 10E |
| SUBABLE | 17/1014 |
| SUBBID | 17/1020 |
| SUBBIDR | 17/1020 |
| SUBFN | 17/1312 |
| SUBLINK | 17/1012 |
| SUBLOC | 17/1011 |
| SUBRMOVE | 17/1013 |
| SUBST | 17/1313 |
| SUBTRACE | 17/1016 |
| SUBUNPAC | 17/1000 |
| SUSPLINK | 9G |

-continued

| | |
|---|---|
| SYMDEF | 17/1550 |
| SYMRDR | 17/1558A |
| SYMREF | 17/1549 |
| SYNCLK | 17/950A |
| SYNRMV | 17/950A |
| SYSTIT | 17/1017 |
| TASKTBL | 10C |
| TBLORG | 17/1102 |
| TDLINK | 9G |
| TDYBUF | 9D |
| TDYLEN | 9D |
| TDYTAB | 9D |
| TIMDLY | 17/1080 |
| TIMERMV | 17/1081 |
| TIMTAB | 10D |
| TIMTBL | 10D |
| TMBSAI | 6/112 |
| TMETBL | 9H |
| TOTCOR | 9E |
| TRACE | 17/1052 |
| TRACETBL | 10D |
| TRCTAB | 10D |
| TRGCON | 17/1110A |
| TRGDEL | 17/1130A |
| TRGTBL | 11C (Cont.) |
| TRICON | 5K |
| " | 17/540 |
| TSKTAB | 10C |
| TYPE | 17/1507 |
| TYPSZE | 17/613 |
| UNPACK | 17/1561 |
| UNSUSP | 17/1021 |
| VFLD | 17/1527 |
| WBINRD | 17/1565 |
| WRITDISK | 10B |
| " | 17/1064 |
| WRITE | 17/1073 |
| WRSYMB | 6/500 |
| " | 17/620A |
| WTFIL | 6/200 |
| " | 17/602 |
| Z:ORIG | 10G |
| Z:START | 10G |

DETAILED DESCRIPTION OF THE PREFERRED EMBODIMENT

INTRODUCTION

The following description of a monitored and controlled system for operating a process is broken into 17 sections. The first 15 sections completely describe the system. The last 2 sections present detailed descriptions of digital computer programs which may be used to implement certain portions of the system.

Figure 15:
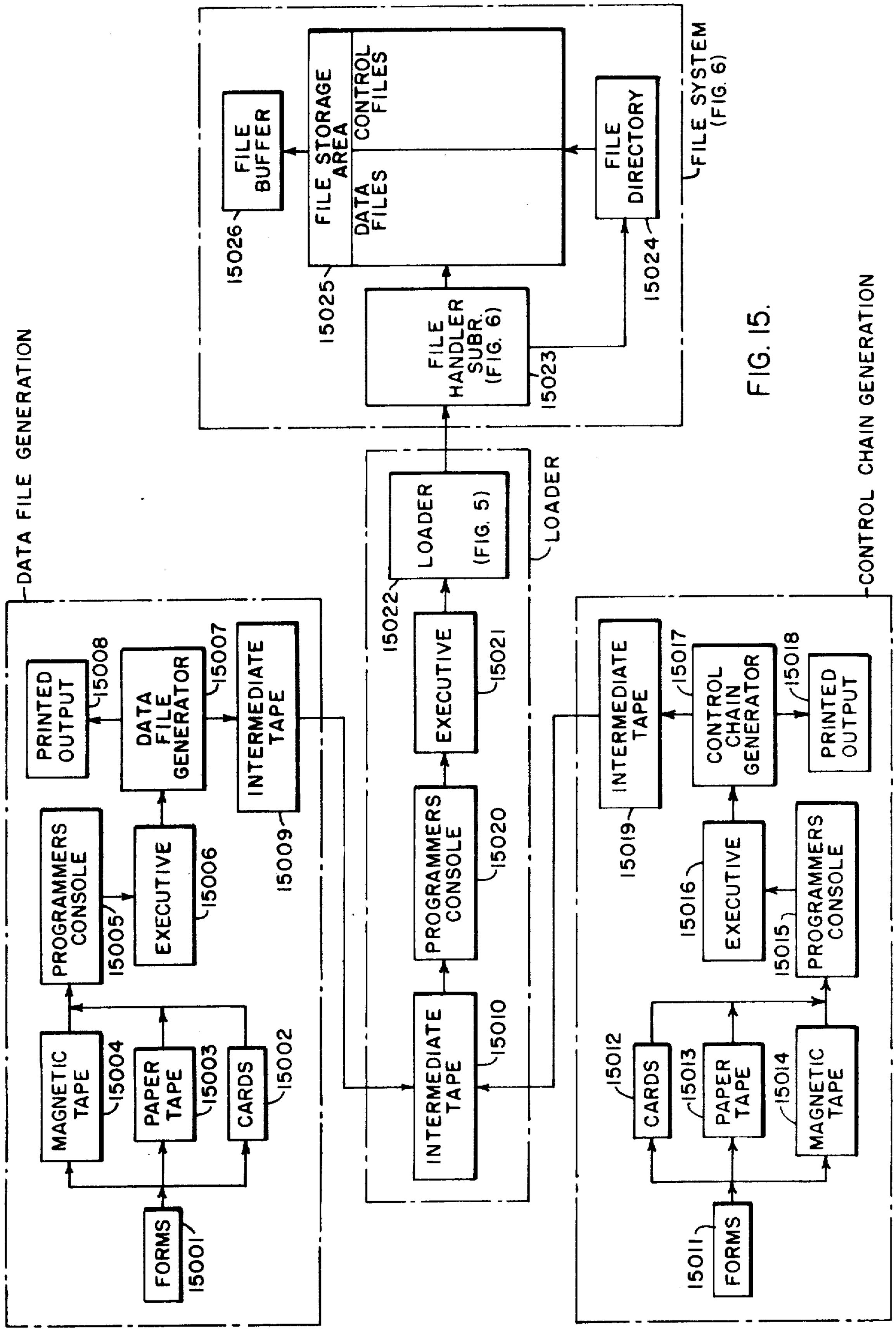
FIG. 15 et seq.

A group of figures accompany each of the 17 sections. To facilitate relating the figures to the sections, the number of each figure includes the number of the section to which that figure relates. For example: FIG. 1 relates to Section 1; FIGS. 11A to 11H relate to Section 11; FIGS. 15 to 15/321 relate to Section 15; and FIGS. 17/500A to 17/1566 relate to Section 17.

Illustrative computer programs which may be used to implement certain portions of the system are presented and are described in Section 17. The figures which relate to Section 17 are combination flowcharts and program listings. The program listings are written either in FORTRAN IV, a conventional programming language, or else in an assembly language which is explained in Section 16.

Since the monitored and controlled system is completely described in Sections 1 to 15, each figure which relates to Section 17 also relates to some earlier section. The number of each figure relating to Section 17 therefore includes the number of the earlier section to which the same figure relates. For example: FIGS. 17/900A to 17/970 relate to Section 9; and FIGS. 17/1000 to 17/1090 relate to Section 10 as well as to Section 17 (underlining added for clarity).

A variety of number systems are used in the description which follows. Decimal numbers (base 10) are constructed from the ten digits 0, 1, 2, 3, 4, 5, 6, 7, 8, and 9. Hexadecimal numbers (base 16) are constructed from the sixteen digits 0, 1, 2, 3, 4, 5, 6, 7, 8, 9, A, B, C, D, E, and F. Octal numbers (base 8) are constructed from the eight digits 0, 1, 2, 3, 4, 5, 6, and 7. Binary numbers (base 2) are constructed from the two digits 0 and 1. A subscript following a number indicates the base of the number system that is used to represent the number. For example, the decimal number twenty may be written either as $20_{10}$, $14_{16}$, $24_8$, or $10100_2$. If no subscript follows a number, and unless the context indicates otherwise, all numbers may be assumed to be decimal.

Unless otherwise indicated, a name which contains only capital letters and numbers is the name of one or more storage locations within the addressable memory portion of a digital system. A group of one or more storage locations to which a name has been assigned may contain any of the following: a single data value; an array of data values; a table containing data value entries; or an executable computer program. Wherever possible, the names used in the description and in the drawings correspond precisely with the names used in the representative computer programs presented in Section 17. The use of names, rather than numbers, to designate storage locations is in accordance with the customary practice of almost all engineers who write computer programs. Examples of names are: IXLO and IEC (single data values); NFILE(Q) (the Qth data value in an array NFILE of data values); RSDTBL and DSKTBL (tables containing one or more data values as entries); and CKBID and DISCAN (executable computer programs).

In a number of the figures which follow, the language FORTRAN IV, rather than English, is used to describe computational steps. FORTRAN IV is used only in those cases where its use adds significantly to the clarity or to the accuracy of a figure. An explanation of FORTRAN IV may be obtained from the computer programming textbook FORTRAN IV Self-Taught by Mario V. Farina, published in 1966 by Prentice-Hall, Incorporated, Engelwood, New Jersey.

Block diagrams, tables, and flowcharts are used extensively to illustrate graphically the description which follow. For added clarity, almost all of the block diagrams, flowcharts, and tables are considerably simplified in comparison to the processes, apparatus, methods, and storage arrays which comprise the preferred embodiment of the invention. This is especially true of overview block diagrams, such as FIG. 1. To the extent that any such block diagram, flowchart, or table is nonexact and disagrees with a more detailed description of the same process, apparatus, method, or storage array, the more detailed description should be accepted as the best and most accurate description of the preferred embodiment of the system. On the other hand, the overview descriptions are not intended to be limited to the details of the preferred embodiment, but are presented as an explanation of how the system may be implemented in any one of a wide variety of different embodiments.

1. OVERVIEW OF THE SYSTEM

A sytem 100 for monitoring, controlling and operating a process is preferably arranged and operated in accordance with the general aspects of the present invention as shown in a block diagram in FIG. 1 and in FIG. 1(cont.). The system 100 includes two basic parts—apparatus 116 for implementing system or process operations and a monitoring and control system 121 for determining monitoring and control actions to be applied to the apparatus 116 in accordance with the invention. In turn, the monitoring and control system 121 comprises basic subparts including a plurality of sensor and control components 104, a set of computer input/output interface components 103, a digital computer system 102, and an array of operator interface and like communication elements 101. These basic system parts and subparts are described briefly in the paragraphs which follow.

The operating system 100 and its apparatus 116 can for example be a metal rolling mill such as a steel or aluminum strip reduction rolling mill, a chemical plant or portions thereof, a power generating station or portions thereof, equipment which stimulates an operating system, or any other combination of apparatus elements which carry out a process of manufacture, transportation, control or other production or service functions needed for the various functional units in an industrialized economy.

The sensor and control components 104 are coupled to the system or process apparatus 116 and usually reside within a process environment 117 along with the system or process apparatus 116. Sensors 105 and 108 can include a wide variety of devices for gathering information about the process and for transforming this information into electrical signals which are used for system monitoring and/or control purposes. Control components 110, 112, 114 and 119 can include a wide variety of devices for altering the process in response to electrical control signals.

The input/output interface components 103 connect the sensor and control components 104 to the digital computer system 102. The input sensor interface components 106, 107 and 109 couple the sensors 105 and 108 to the digital computer system 102 and in doing so accept electrical signals from the sensors and convert the signals into a digital form suitable for presentation to the computer system 102. The output control interface components 111, 113, 115 and 118 couple the computer system 102 to the controls and in doing so accept digital outputs from the computer system and convert the digital outputs into both digital and analog control signals for the controls.

The computer system 102 is operable on line and it is a conventional process monitoring and control computer system which is arranged to accept and to implement automatically process related "programs" or tasks including those resulting from job specifications for the process as written out by a systems engineer or like person who has responsibility for establishing the operations of the system 100. The communication elements 101 enable communications between the on-line computer system 102 and the systems engineer and a system operator. The communication elements 101 can include any of various types of consoles, switches, keyboards, displays, printers and other means of direct communication. In addition, the communication elements include elemental functions 126, 128, 130 and 132 which enable the systems engineer to take job specifications written out essentially in his own language and place these specifications into a form suitable for presentation to the on-line computer system 102. It is noteworthy at this point that certain of the latter functions can be performed by the on-line computer system 102.

The sensor and control components 104 may be generally broken down into two categories of sensors and four categories of controls. Each category requires its own particular type of interface component 103.

The sensors may be generally divided into contact closure devices 105 and analog sensors 108. Contact closure devices 105 can include any sensing mechanisms associated with the system or process apparatus 116 which are capable of opening or closing a pair of electrical contacts or an electrical switch. A switch which closes in response to the motion of a machine member is a simple example of a contact closure device. A photocell which acts as a switch when illuminated or which causes a relay to close a switch when illuminated is another example. While contact closure devices would typically be relays and switches, solid state switches such as transistors and digital integrated circuits also qualify as contact closure devices. In short, any device having the attributes of a simple electrical switch that is actuated by the system or process appratus 116 or by employees supervising the system or process apparatus 116 is a contact closure device. A contact closure device can only be in one of two states: open or closed. At any given moment, the state of a contact closure device is called the status of the device.

The signals generated by contact closure devices are fed into the computer system 102 through contact closure inputs 107 which are provided by a conventional contact closure input system. The contact closure inputs 107 comprise an array of two-value (true-false, open-closed, "1"-"0") inputs to the computer system 102. The contact closure inputs 107 may be scanned by the computer system 102 any time the status of the corresponding contact closure devices is to be determined.

The computer system 102 typically includes a number of process interrupt inputs 106 which are also connected to contact closure devices. An interrupt input to the computer system 102 causes the computer system 102 to halt whatever it is doing and to take some for of action—for example, the computer may print out an alarm message or execute a program routine. The interrupt inputs 106 are usually arranged to cause an interrupt within the computer system 102 when a contact closure device changes its state, regardless of whether the "contacts" are opening or closing. In response to an interrupt, the computer system 102 typically scans the contact closure inputs 107 to determine which contact closure device has changed its state and also to determine the final status of the contact closure device before deciding what action to take in response to the interrupt.

Analog sensors 108 can include thermistors or other sensors for measuring temperature, electrical pressure transducers for measuring pressure, flow sensors, generators and hall-effect devices for measuring fluid velocity, rotational or linear speed sensors, electrical or mechanical load sensors, thickness detectors, postion detectors, flame detectors, and any other device which generates an electrical signal or a nonelectrical signal that is transformable into an electrical signal which varies as a function of a sensed process variable.

The electrical signal outputs of analog sensors are fed into the computer system 102 through analog-to-digital converters 109 which form a part of a conventional analog input system for the computer system 102. The converters 109 periodically convert the fluctuating analog signals into numbers or "digits" which the computer system can accept. The sizes of these numbers are normally proportional to the magnitudes of the corresponding analog signals. Typically, the system 102 has anywhere from one to ten analog-to-digital converts operating simultaneously. Relays or other multiplexing or switching devices connect each converter to a large number of analog signals associated with the process environment. The computer system 102 typically scans the analog signals periodically and records the magnitudes of the signals within the system 102. Analog sensors typically do not generate interrupts. However, a contact closure device of some form may be connected to an analog signal and may be arranged to generate an interrupt when the analog signal rises or falls to a dangerous level.

The control components are normally disposed within the process environment 117 to determine process operations and they may be characterized as electronic, electrical, electromechanical, electropneumatic, electrohydraulic or otherwise. They may be divided into four categories according to the type of computer output control as already indicated. The first are timed motor driven valves and controls 110 which regulate predetermined process variables such as the flow of a process fluid. For example, a fluid flow valve associated with the process 116 can be apparatus connected to an electric motor in such a manner that actuation of the motor for a fixed interval of time changes the setting of the valve by a fixed amount. A second group of controls 112 includes stepping motors, stepping relays, counters, and other impulse driven devices. In response to electrical impulses supplied by the computer system, the controls 112 perform incrementation functions such as rotation or shifting of apparatus 116 within the process environment 117. A third group of controls 114 for the apparatus 116 may be turned on or off but may not be otherwise regulated. This group includes devices such as relays, lamps, heaters, pumps and motors which have no provision for controlled variation of a controlled variable such as speed or power.

All of the control components 110, 112 and 114 are coupled to the computer system 102 by contact closure outputs 111, 113 and 115 which form a part of a conventional contact closure output system. The contact closure outputs are simply contact closure devices such as mercury wetted relays at the output of the computer system 102 which may be opened or closed by the computer central processor. The devices 111, 113 and 115 are essentially identical. Whether they function as timed contact closure outputs 111, pulsed contact closure outputs 113, or simply as contact closure outputs 115 depends upon the way in which they are actuated by the computer processor.

A final group of controls operable within the process environment 117 are those which can perform a wide variety of process functions in response to analog signal inputs. Typical examples are servo mechanisms having an analog setpoint input, electropneumatic controls, electrohydraulic controls, electronic controllers, DC motors whose position or speed may be controlled by a voltage,and AC motors provided with position or speed regulation by thyratrons, ignitrons, silicon controlled rectifiers, or triac switching devices and in which the switching devices are gate controlled by an analog signal. Output controls of this type are interfaced with the output computer system 102 by digital-to-analog converters 118 which form a part of a conventional analog output system. A digital-to-analog converter comprises a device such as a contact operated resistance network which converts a number generated by the computer system into an analog signal—either a voltage or current—whose magnitude is proportional to or otherwise dependent on the size of the number.

It is noteworthy that variations can occur in the general configuration described for the output interface between the computer system 102 and the process apparatus 116. For example, pulse outputs by contacts 113 can be used to generate analog outputs through hold amplifiers. As another example, the digital-to-analog converters 118 can obtain computer outputs from preselected contacts 115.

A. COMMUNICATION DEVICES—GENERATION OF FILES

The communication elements or devices 101 preferably include a pair of consoles 120 and 122 connected directly to the computer system 102. The communication elements also preferably include means 130 for carrying out file generation which may or may not involve operation of the on-line computer system, 102.

The system operator's console 122 provides a mechanism for the operator of the system 100 to alter control or process functions and to keep informed of what is happening within the process environment 117. The console 122 includes data input devices which accept instructions from the system operator and data display devices which present data to the system operator. Within the system 100, each variable has a name. So long as the system operator knows the name of a variable, he can determine the value of the variable, alter the value of the variable, and add or remove the variable to or from alarm checks and periodic value checks. In addition, he can cause an English language explanation of most variables or constants to be printed out. In the case of variables which are monitored or scanned, he can alter the manner in which the variable is processed—for example, he can alter the alarm limits for a variable or he can alter the way in which a variable is corrected or linearized. The system operator can also alter system time constants and gains so long as he knows the name of the file in which the constants or gains are stored and also the block number of the section within the file where the constants or gains are stored—but more will be related on this in the discussion which follows.

The computer programmer's console 120 is used by the systems engineer to establish a particular operating configuration within the computer system 102 and within the overall system 100. To some extent, the systems engineer communicates directly with tables and with other data bodies within the computer system 102 through the programmer's console 120. The systems engineer also can implement some of the more unusual or specialized process steps, such as responses to system interrupts, with special computer programs 124 which may or may not be functionally conventional and which are prepared with conventional writing procedures and fed into the computer system 102 through the programmer's console 120. However, the great bulk of the monitoring and control operations which are to be carried out are automatically established for on-line execution through the use of process variable data files and control chain data files.

If the entire system 100 is being configured for the first time, the systems engineering and management personnel may make a fundamental analysis of the system to determine what it is that the system should do and what apparatus items will be needed. Next, with an understanding of the characteristic behavior of the apparatus 116, the process operations, and selectable control system elements, a determination may be made of which process variables are to be sensed for monitoring and/or control purposes and which process variables if any are to be intermediately or end controlled for the purpose of achieving the system performance which is defined as a result of the basic system analysis. Functional flowcharts or other documentary records may be used to define how variables in the process are to be monitored and/or controlled.

After completion of the initial system engineering, the systems engineer can write out process variable data file definitions 126 which define the names and the nature of logical variables, analog variables, and constants which are to exist within the system 100. These same process varible data file definitions also define all of the signal monitoring and alarm detection tasks which are to be carried out upon the process. Logical variables include contact closure input signals, contact closure output signals, and any other variables within the control system which can only have two values (true or false, set or clear, "1" or "0"). "Analog variables" (actually numbers within the computer system 102) include numbers representing the size of analog input signals and numeric values calculated within the computer system 102. Constants may include any number used in computations and stored in tables within the system. All of the above variables and constants are classified as "process variables".

For each process variable including those which are monitored in the process, the systems engineer writes out a process variable data file definition 126. The data file definition for each analog input signal preferably generally indicates how frequently the input signal is to be checked, the (hardware) address of the input signal, where the number representing the input signal is to be stored within the computer system, how the input signal is to be corrected, and under what circumstances the input signal is to be considered in an improper or "alarm" state. The data file definition for each calculated numeric value is preferably similar to that for each analog input signal but somewhat simpler. The data file definition for each contact closure input or output signal preferably indicates the (hardware) address of the signal, where the value of the signal is to be stored within the computer system, and (optionally) which state of the signal is an alarm state. The data file definitions for other logical variables are preferably similar but somewhat simpler. Any process variable data file definition may include English language comments such as a description of the associated variable or an alarm message which is to be printed out when the associated variable is in a state of alarm. The process variable data file definitions thus can completely define all of the data monitoring and alarm detection which is to be carried out within the process environment.

The systems engineer can define process control functions aimed at achieving the preplanned system or process performance through the use of control chain definitions 128. A control chain definition is a series of steps written out in the language of the systems engineer and defining a "control chain" or job which is to be carried out by the computer system 102 to produce a logic or other algorithm defined control action. The name "control chain" comes from the frequent use of control chains to "link" sensors and control components together. For example, the signal outputs of one or more sensors may be converted by a control chain into input signals for one or more controls. In one typical control arrangement, a control functions in a feedback control loop to operate a machine, and a feedback sensor measures the performance of the same machine. A programmed control chain compares the actual machine performance as indicated by the sensor with a desired machine performance and causes signals to be generated for the control which then alters the actual machine performance to correspond with the desired machine performance. In other instances, a control chain can implement a control action in a feedforward control loop with or without feedback trim. Among other possibilities, a control chain or series of control chains can respond to logical variables to develop sequencing control actions in conjunction with or independently of control chains involved in sampled data or "continuous" control loop operations. Control chains may thus be used to define all "control" functions which are to be carried out within the process environment. Control chains may also be used to carry out many other tasks, as will be explained below.

In addition to defining process variables and control chains, the systems engineer may wish to define and to assign unique names to other system variables which do not require a file definition but which are to be made available, for example, to both control chains and process variable data files. Variables of this type may be either real variables (numbers) or logical variables (two-valued) and are called global variables. The systems engineer may define one or more new global variables at any point within his data file definitions or his control chain definitions.

The completed data file and control chain definitions, along with the global variable definitions, are subjected to a preliminary file generation step by the file generation means 130. During the file generation step, the terminology used by the systems engineer is converted into a numerical terminology which is understandable to the computer system 102 preferably at least partly in accordance with language elements selected by the systems engineer and included in the file generation means 130 for dictionarylikefunctioning. At the same time, data values supplied by the systems engineer are converted by the file generation means 130 into data values of a type which are expected by the computer system 102, preferably at least partly in accordance with preliminary computation instructions supplied by the systems engineer.

The systems engineer has complete freedom to choose the terminology which he wishes to use in defining the system 100. The systems engineer also has complete freedom to choose the system of units (feet, meters, pounds, etc.) in which he wishes to specify data values. The terminology used by the systems engineer, his choice of units, and any preliminary computations which are required to convert his data into data acceptable to the computer system are specified by a "macro specification". This macro specification is used to guide the file generation means 130 just as a computer program guides the operation of a computer.

Typically, the file generation steps are carried out in a programmed digital computer which is separate from the on-line computer system 102 and removed from the process environment 104. However, it is possible to carry out the file generation steps off-line within the on-line computer system 102. This enables the systems engineer to pass his data file definitions and his control chain definitions directly into the system 102 without the need for a separate preliminary processing step.

The file generation means 130 acts on input definitions including the process variable and control chain data file definitions. The result of the file generation step 130 in the present embodiment is intermediate data files 132 which collectively define a specific process control and system configuration and particular process operations to be produced by that configuration. The intermediate data files 132 include the names and the definitions of all system variables, complete specifications as to how all periodic collections of analog input data are to be carried out, and complete definitions of the logic and/or sampled data control loops which are to be implemented by the computer system 102 within the system 100. The intermediate data files 132 accordingly include process variable data files and control chain data files, both of which may make reference to both process and global variables by name, and they are fed into the computer system 102 through the computer programmer's console 120.

As each data file is fed into the computer system 102, and if all the necessary equipment interconnections have been established among the sensors, controls, apparatus items and the computer system, a job or task defined by that data file is immediately implemented in the system 100. For example, as each monitored process variable data file for an analog input signal is fed into the computer system 102, periodic scanning of the analog input signal begins and any alarms associated with the signal are activated. As each data file for a control chain is fed into the system, the control loop or other job which the control chain defines is immediately made operational. The systems engineer does not have to concern himself with machine details relating to the storage of variables within the computer system 102 or the arrangement of various operations to trigger one another. All variable and constant references and all trigger connections are established automatically.

B. THE DIGITAL COMPUTER SYSTEM AND ITS PROGRAM SYSTEM

The computer system 102 includes a digital computer having data input and data output facilities sufficient to service the input/output interface components 103 and the consoles 120 and 122. The computer system 102 preferably includes a number of standard computer programs 140 which are automatically interfaced with other manually or automatically programmed computer operations to process interrupt inputs and transfer data between the computer system 102 and the interface components 103 and consoles 120 and 122. The computer system 102 also preferably includes a conventional process control executive scheduler or monitor program (the executive scheduler is part of a task, subtask and file bidding processor 156) which assigns priority or "task" levels to individual jobs or tasks and which is automatically interfaced with other manually or automatically programmed computer operations so as to cause higher priority jobs or tasks to be performed ahead of lower priority jobs or tasks. Typically, the executive schedular is able to interrupt the performance of a lower priority job or task whenever a higher priority job or task is to be carried out. Another conventional program element for the computer system 102 is a program loader 142 which can load the previously noted special computer programs 124 into a program storage 144 for interaction with other manually or automatically programmed computer operations.

Most or all of the program elements just described can be found per se as part of prior art process control computer systems. In accordance with some aspects of the present invention, they are combined with other program elements or process steps to provide improved process and control system operations through automatic programming means and procedures.

Program elements 146, 148, 150, 152, 154, 156 and 158 within the computer system 102 are preferably used to establish data files as operative elements of the process control system. A file loader program 146 accepts the process variable and control chain intermediate data files 132, assembles each data file, replaces the names of process and global variables referred to by each file with the addresses of the same variables within the computer system, and stores the assembled data files within a file storage area 150. The names and addresses of all process variable and control chain data files and the names and addresses of all global variables are stored by the file loader 146 in a file directory 148. Global variables are stored by the file loader 146 in a global storage area 152.

If a file or if a group of files define a process monitoring or control task or job which is to be carried out, the file loader program 146 establishes that job or task as an operative "subtask" within the task, subtask and file bidding processor 156 (hereinafter referred to as the subtask processor 156 or the processor 156). If such a subtask is to be carried out periodically, the file loader 146 causes an auxiliary synchronizer 154 to place bids with the subtask processor 156 periodically for execution of the subtask.

If a task or job is to be carried out every time one or more logical variables change their states, the file loader 146 records this fact in tables within a logic initiator 158. The logic initiator then places a bid for execution of the subtask with the subtask processor 156 whenever the designated logical variables are detected to have changed their states. If the process variable data file for a logical variable has an alarm message associated with it, the file loader 146 transfers the address of the data file containing that alarm message to the logic initiator 158. The logic initiator then causes the alarm message to be printed out whenever the logical variable enters or is found to have entered an alarm state. A data file which defines a control chain is usually assigned to a unique subtask within the subtask processor 156.

As soon as a data file defining a job or a task is established within the computer system 102 by the file loader 146, the task or job defined by that data file is immediately implemented through the sensors and/or controls 104 associated with the apparatus 116. The auxiliary synchronizer 154 places periodic bids with the processor 156 for the execution of all monitoring and control jobs which are to be carried out periodically. The logic initiator program 158 places bids for the execution of monitoring and control subtasks which are to be triggered when logical variables are sensed to have changed their states and also initiates a printout of alarm messages whenever a logical variable is determined to have entered an alarm state.

In the preferred embodiment, the program elements 154, 156 and 158 and program elements 160 and 162 within the computer system 102 are basic operative program elements for the process control 121 and in turn for the system 100. The subtask processor 156 provides significant executive control over the functioning of the process control 121 and the system 100. Within the processor 156, every executable job or task within the computer system 102 is assigned to a specific task or subtask. It does not mater whether a job is a computer program, a control chain, or a group of monitored process variable data files defining how a corresponding group of incoming analog signals are to be scanned. No matter what the nature of the job, execution of the job may be initiated by placing a bid with the processor 156 and by supplying the task or subtask number of the job to the processor 156.

Computer programs, control chains, and process variable data file subtasks all include provisions for placing bids with the processor 156. Hence, any job within the process control system may initiate the operation of any other job within the process control system. In addition, the auxiliary synchronizer 154 is able to call for the execution of jobs periodically, the logic initiator 158 is able to call for the execution of jobs whenever a logical variable changes its state, and interrupt processing programs are able to call for the execution of jobs in response to the occurrence of any event within the process environment. The closing of an electrical contact as detected through control inputs 107, for example, can initiate the scanning of analog values through the analog-to-digital converters 109, the operation of a machine through controls 119, or the execution of a computer program within the computer system 102, or all of these. The scanning or analog values is controlled by a process variable data file subtask; the operation of a machine typically is initiated by a control chain subtask; and the execution of a computer program is a program subtask.

The subtask processor 156 records all bids which are placed and then executes the highest priority job that is bidding for execution. A determination is first made as to whether the job is in the form of a computer program, a control chain, or a group of process variable data files. If the job is defined by a program, program control is transferred directly to the computer program in the program storage 144. If the job is defined by a control chain data file, program control and the address of the control chain file are transferred to a control chain processing program 160. If the job is defined by one or more monitored process variable data files, program control is transferred to a monitor data file processor 162 along with the address of the first monitored process variable data file which is to be processed. Additional file processing programs similar to the programs 160 and 162 may also be provided to process other types of data files in addition to control chain data files and monitored process variable data files. After the job has been executed, program control returns once again to the processor 156 where a determination is carried out as to which job should be executed next.

C. FILE GENERATION AND INTERMEDIATE FILE FORMAT

The file generation step for one embodiment of the invention is outlined in FIG. 15. In both the case of process variable data files and control chain data files, the systems engineer defines his files with the use of forms 15001 and 15011 and then has these forms put into machine readable form on cards or other media. The machine readable process variable data file definitions are then presented preferably for programmed computer processing by a data file generator 15007 and the machine readable control chain definitions are presented preferably for programmed computer processing by a control chain generator 15017. The data file generator and the control chain generator use programmed procedures to respond to the input files and produce intermediate data files at a language level acceptable to the on-line digital computer system 102, and the intermediate files are then transmitted (by punched tapes for example) through the programmer's console 15020 for entry processing by the file loader 15022. The file loader 15022 calls upon file handling subroutines 15023 to establish the files within the file storage area 15025 and to place the file names into the file directory 15024.

The intermediate output data files generated by the data file generator and the control chain generator appear as is shown in FIG. 15/102. These output data files constant of uniform length load records, each of which contains one or more data sets which are called load modules and which are described in FIG. 5H. The load modules completely describe each file and also describe how each file is to be established within the computer system 102. With reference to the left-hand side of FIG. 15/102, each intermediate data file includes a beginning of file load module, a series of file data load modules, possibly one or more symbol reference modules such as that labeled "GLOBAL C ARRAY", and an end-of-file module. Figure 15/102 shows the typical intermediate file arrangement of data files generated by the data file generator program. At the left-hand edge of the figure, the load modules for two files A and B are shown. In the center of the figure, these load modules are shown broken up into standard load records of fixed length. At the right-hand side of the figure, the files as they appear when finally assembled within the process control system are illustrated.

The permissible load module formats in the present embodiment are shown in FIG. 5H. Each intermediate file includes a beginning of file module type 1D. The beginning of file load module contains the file name and a number designating the file type. By way of explanation, file types 1 through 4 are analog input data files or calculated value data files. The files for periodically scanned contact closure input data are assigned the file type number 5, and files for contact closure inputs which are not to be periodically scanned are assigned the file type number 6. Periodically scanned inputs are handled automatically by system programs which are described below, while non-periodic inputs may be scanned at will by any system program but are not scanned automatically. Contact closure output files are assigned the file type number 7, and constant files are assigned the file type number 8. The files for logical variables other than inputs or outputs are assigned the file type number 11. Control chain files are assigned the file type number 0. Miscellaneous general files are assigned the file type number 16. Files which call for the placement of subtask bids are assigned the file type number 14.

A bidding frequency may be specified for any executable file, and it is part of the beginning of file load module. The bidding frequency is an indication of how often the file is to be processed in order to provide the system specified monitoring rate for monitored process variables and the system specified control loop sampling rate for controlled process variables. Monitoring rates and sampled data control rates to affect system and process performance and system specifications for these rates accordingly ultimately stem from the results of the previously noted system analysis.

In the case of a control chain file, the bidding frequency is actually the period of time which is to elapse between successive control actions corresponding to successive executions of the control chain. For analog scan data files, the bidding frequency is an index number which indicates how often the file is to be processed for successive analog value readings.

The first location within the beginning of file load module contains the subtask number of the file if the file is assigned a specific subtask number by the systems engineer. In the case of analog input files, this first location contains the number of the analog-to-digital converter which is to convert the file specified analog signal into digital form. Knowledge of the converter number helps the file loader to organize the execution of analog signal scans so as to keep the maximum possible number of analog-to-digital converters busy at all times.

If the processing of a file is to be triggered by the processing of another file or by the change in the state of a logical variable, the name of the trigger file or logical variable is placed into a trigger load module type 1E. Trigger connections of this type are established automatically by the file loader.

Since the file generating programs have no knowledge of where variables or files are stored within the computer system 102, it is necessary for the file generator program always to refer to variables and to files by their proper names. Symbol reference load modules (type 1C) are used to relate the name of a symbol to the locations where the address of the symbol is to be placed within a file.

Each symbol reference module contains the name of a symbol and the relative address (with respect to the start of a file) of a first location within the file where the address of the symbol is to be placed when the file is established within the process control system. If the symbol is a global variable, then initial values of the global variable may be specified by the symbol reference module. The indicated relative address may contain zero, or it may contain the relative address of another location within the file where the same symbol address is to be placed. A single symbol reference module may thus be used to store the address of a symbol in several different locations.

The bulk of file data is presented in the form of a file data load module type 1. Data presented in a file data load module is transferred into the file storage area within the system essentially unaltered.

The file generator programs includes facilities for handling address references between locations within a file. The data file and control chain generator programs are able to establish backward address reference without difficulty. The file generator programs are one-pass programs, however, and they are therefore unable to establish forward address references. An address-link load module type 9 is therefore provided. When the address link module is encountered by the file loader program, the file loader program takes the relative address (relative to the beginning of a file) of the next item which is to be placed into the file and places this address in the location to which the relative address pointer within the address link load module points. The location to which the pointer points may contain zero, or it may contain the relative address within the file of an additional location where the same address is to be placed. In this manner, a single address link module can establish any number of forward address references to a single file location.

The file loader program 142 (FIG. 1) normally loads the data defining each file into the file storage area in the order in which the data is received. An alter load point module type 0 can cause data to be loaded into any desired location within a file. The alter load point module contains the address of the "load point" (relative address within the file) at which data is next to be loaded into the file.

FIG. 15/102 illustrates how load records are broken up into load modules of uniform length. If the last load record within a load module does not fill out the load module, then an end of load record module type 0 is used to indicate that the load record contains no more useful data.

If the loading of a file is to be cancelled for any reason, a cancel load module type 1F is included within the intermediate file. The cancel load module cancels the establishment of the file.

The last load module in the definition of any file is the "end of file" module type 1B. When this load module is encountered, the file loader commences to establish the file within the system as an operative entity.

The "last" load module type 2 tells the file loader that no more load modules are to follow. The "last" load module thereby terminates the operation of the file loader.

D. DATA FILES AND THE DATA FILE GENERATOR

The data file generator program accepts the systems engineer's file definitions comprising in this case the process variable file definitions which are punched into a series of data cards. The format of a typical set of data cards is illustrated in FIG. 15/101.

The first two cards are header cards which initialize the data file generator program. Each group of cards which follows is then preceded by a TYPE card which defines the type of data file which is to be constructed from the data on the cards which follow. The cards defining each file then follow in sequence. Each card contains the name of the file to which it relates and the name of a record creation subroutine which is to translate the data on the card into data for the file. Each TYPE card lists the names of all the record recreation subroutines which are to handle the data of the file defining cards which follow, and lists the subroutines in the same order in which the data handled by each subroutine is to be ordered within each file. The TYPE card also designates whether a record creation subroutine may be properly called more than once during the creation of a single file and additionally indicates whether a card calling upon a particular record creation subroutine is mandatory or optional. The last card in the deck is an END card which terminates the file generation process.

The data file generator program is represented by a flowchart shown in FIG. 15/100. The data cards bearing the file definitions are examined sequentially (step 15100). Header cards initialize the data file generator (steps 15101 and 15102). End cards terminate operation of the generator (step 15103). All other cards are assumed to be file definitions.

If the name on a file defining card is the same as the name on the previous file defining card, program control passes from step 15104 to step 15105 and an appropriate record creation subroutine is called upon to interpret the data on the card and to place the data into a record creation subroutine buffer. An image of the card data is printed out (step 15110), and the next card is examined (step 15100). This process continues until a card bearing a different file name is encountered (step 15104). The generator then enters the create mode (step 15111) and the record creation subroutines are called again in the order in which they were listed on the most recently encountered TYPE card. As each subroutine is called, the data which was previously processed by that subroutine is retrieved from the record creation subroutine buffer and is punched out on tape as part of the intermediate file ready for presentation to the process control system.

E. CONTROL CHAINS AND THE CONTROL CHAIN GENERATOR

Control chains are flexibly constructed from a series of numbered blocks or modules. Each such block or module calls upon a specific short subroutine called an algorithm or an algorithm subroutine to carry out a specific job or task. A complete library of algorithms is available to the systems engineer. One family of algorithms includes a complete assortment of digital controllers for use in constructing control loops. Another family of algorithms provide logical functions like those performed by hardware logical devices such as flip-flops, diode gates, comparators, one-shot multivibrators, and logical arrays. A third family of algorithms are able to evaluate FORTRAN-type arithmetic and logical expressions, and allow both conditional and unconditional branching to occur within a control chain. A fourth family of algorithms enable subtask bids to be placed and also make it possible to call for the execution of any desired computer program subroutine. An important part of the initial system engineering is the selection of a suitable set of algorithms for use in the operating system. A somewhat more detailed description of a representing group of algorithms is presented at a later point in this description.

The preferred arrangement for a typical control chain is illustrated in FIG. 15/206, and a block diagram of the control loop which it implements appears in FIG. 15/205. The control chain consists of a header followed by the numbered blocks or modules. The control chain header contains the name of the control chain (in this case "FLCHOV"), a number DELTATEE or PERIOD indicating how much time is to elapse between successive executions of the control chain (PERIOD is used if a chain is to be automatically placed in execution at periodic intervals, and DELTATEE is used if some external trigger for the control chain is designated—some control chains do not require a number DELTATEE or TRIGGER), and a list "TRIGGER=" of the system variables which are to trigger operation of the control chain (this list is also optional). If the trigger is an analog input variable name, the control chain is executed after the corresponding analog input data file is processed. If the trigger is a system logical variable, the control chain is executed when the logical variable changes its state. A control chain may also be assigned to a definite system subtask by including the statement "LEVEL=(subtask number)" in the control chain header. The header also lists the names of the variables which are used by the control chain and indicates the nature of each variable. This list facilitates error checking at the time when the control chain is established within the system 100.

Each of the modules or blocks of the control chain calls for the execution of an algorithm which resides within the computer system 102. Execution of a control chain begins with the algorithm called upon by the first module or block—in this case, the block numbered 1. Execution then continues sequentially until a branch or transfer algorithm is called upon. Examples of blocks which call upon branch or transfer algorithms are the blocks numbered 6, 8, 24, 25 and 27. A transfer or branch algorithm typically calls for the execution of some test and then indicates which of two blocks is to be executed next.

FIG. 15/206 illustrates a typical cross-section of the algorithms which are available to the systems engineer. For example, the algorithm called upon by blocks 10 and 21 functions as a proportional-plus-reset controller having alternate sets of time constants (TIMEA and TIMEB) and gains (GAINA and GAINB) for automatic and for manual operation and also having high and low controller limits HILIM and LOLIM. As another example, the arithmetic expressions in blocks 1, 7, 9, 11, 20, 22, 23, 26, 28 and 29 are evaluated by an arithmetic expression evaluation algorithm called ARITH, and the logical expression in block 5 is evaluated by a logical expression evaluation algorithm called LOGIC. Other algorithms are also called upon by other blocks, and their functions are illustrated in FIG. 15/205.

In the generation of data files for control chains, each block or module is preferably written out in the language of the systems engineer. The systems engineer defines his own terminology through the use of macro specifications which are fed to the control chain generator program ahead of the control chain definitions. The macro definitions may also include the definitions of preliminary calculations which are to be carried out by the control chain generator, such as calculations to combine several of the values supplied by the systems engineer into a single value for presentation to an algorithm within the computer system. A comparison of FIG. 15/206 with FIG. 15/205 shows how the systems engineer's language used in writing out the blocks or modules corresponds to the system engineer's flowchart representation of the functions which are to be carried out by the corresponding algorithms.

The control chain generator program is represented by a flowchart shown in FIG. 15/200. The control chain generator accepts the systems engineer's control chain definitions punched out on data cards. A data card is read (step 15201), and the block number (if any) on the card is recorded (step 15202). The next step performed by the control chain generator depends upon what the first word on the card is (step 15203). A list of the possible first words is presented at step 15204.

The word MACRO appears upon a card which precedes cards bearing the system engineer's "macro specification". The "macro specification" is a set of cards which define the systems engineer's terminology and which define the preliminary operations which are to be carried out on the data supplied by the systems engineer. All of this data is stored within internal tables at step 15210 and is subsequently used by the control chain generator program to guide the translation of the systems engineer's terminology.

The word "CHAIN" appears on a card which precedes the cards comprising a control chain header. The CHAIN card and the cards which follow are processed at step 15209. A beginning of file load module (see FIG. 5H) is created by the control chain generator. This load module contains most of the data from the control chain header. In addition, internal tables within the generator are established containing the names and type designations of all the symbols which are to be used within the control chain.

The two words "ARITH" and "LOGIC" are recognized as the names accompanying blocks or modules which call for the execution of arithmetic or logical operations, such as the blocks 1 and 5 in FIG. 15/206. When either of these names are detected, one of the processing steps 15205 or 15206 is called upon to translate the modules which follow into an intermediate file form.

The steps 15205 and 15206 within the control chain generator program take the arithmetic or logical expressions of the systems engineer and regenerate these expressions in parenthesis-free form—a series of steps which produce the same computation as that called for by the systems engineer but which do not include the ambiguities inherent in ordinary arithmetic and logical expressions of the type shown in block 1 of FIG. 15/206. The expressions shown are ambiguous because the precise order in which the arithmetic operations are to be carried out is not specified. The regenerated expressions are simplified as much as possible and are then placed into the control chain intermediate file.

The steps 15205 and 15206 are similar to the steps within a FORTRAN compiler program which break down arithmetic and logical expressions into unambiguous, parenthesis-free expressions and then generate machine instructions which implement the expressions. The control chain generator program does not generate actual machine instructions, however, it generates specifications as to exactly what operations are to be carried out by an algorithm within the process control system. The intermediate control chain files which result are accordingly much shorter than compiled FORTRAN computer programs containing machine instructions which implement the same arithmetic and logical expressions.

Blocks having names other than ARITH or LOGIC are processed beginning at step 15212. The block name specified by the systems engineer is looked up in the macro specification. The macro specification associates each of the systems engineer's block names with the number of a specific algorithm within the process control system. The cards which follow are then examined (step 15213). As is apparent in FIG. 15/206, each card contains an argument name, an equal sign, and either one or more numbers or else the names of one or more system variables. The macro specification for the algorithm associates each argument name with specific locations within a module or block of the control chain file and also specifies what preliminary computations are to be carried out upon the arguments and where the results of these preliminary computations are to be placed within the same module or block. The numbers and the names of system variables are stored in an argument table, and the necessary preliminary calculations are carried out (step 15215). The results of the calculations and the arguments are then loaded into the control chain file (step 15216). Symbol reference modules (see FIG. 5H) are used to indicate where within the file the address of each named system variable is to be placed.

In some embodiments of the present invention, the addresses of system variables are supplied to the control chain generator program preceded by a card bearing the word SYMTBL. The control chain generator program is then enabled to supply variable addresses to each intermediate file, rather than variable names, thus simplifying the file loading procedure. In very small computer systems which cannot accommodate a full capability file loader program, this is a desirable feature.

The last card in a set of cards defining a control chain bears the word EXIT. In response to this word, all the necessary symbol reference load modules and an end of file load module are created by the control chain generator and are added to the intermediate file (step 15208).

The last card in a complete set of control chain definitions contains the word "END". In response to this card, the control chain generator program ceases operation (step 15211).

F. THE FILE STORAGE AREA AND FILE FORMAT

The generated data files are stored in file storage areas within the process control system. A typical file storage area is preferably organized as schematically shown in FIG. 6/107. The storage area contains a number of individual files each of which begins with a first location containing the file type number and a number which equals the length of the file. Empty locations within the file storage area are linked to one another by pointers, and the first such location is linked to an empty file pointer location. Any individual empty locations within the file storage area are linked to each other by pointers. and are also linked to an empty word pointer location. The unused storage space at the end of the file storage area is indicated by an unused storage pointer. An end pointer points to the last location within the file storage area.

As intermediate files are received, the file loader program 15022 and the file handling subroutines 15203 (FIG. 15) establish each file within the file storage area starting at the beginning of the storage area and continuing on until the storage area is full. File handling subroutines 15203 are provided which can delete files from the system. If a file is deleted, the empty space previously occupied by the file is linked to the empty file pointer location in the manner shown. The file handling subroutines 15023 preferably always attempt to place new files into these empty locations before resorting to the unused storage space at the end of the file storage area.

The preferred format of a typical file is shown in FIG. 6/104. The first entry in the file contains the file type number and the length "N" of the file. The second entry is a directory pointer which is the address within the system directory of a directory entry containing the name of this file. A third, optional entry is a linkage pointer which can contain the address of the next file in a linkage of files. Several files containing linkage pointers may be chain-linked into a single subtask. The remaining entries contain file data.

FIG. 6/105 illustrates the format of an empty location within the file storage area. Such empty locations are designated file type "E" where E is the hexadecimal number representation for the decimal number 14. The second location within each empty location is a linkage pointer to the next empty location or else zero.

Groups of analog input and calculated value data files assigned the same bidding frequency index number are chain-linked into subtasks so that they may be processed together even though they are not stored adjacent one another. "Analog" control chains may also be chain-linked into such subtask linkages to process or act upon analog signal data as soon as the data is retrieved. Process control stability and effectiveness is enhanced since minimum delay occurs between data retrieved and control action. If subtask bids are to be placed following the processing of an analog input data file, then a subtask bidding file containing the subtask numbers which are to be bid may be chain-linked immediately following the analog input data file in such a linkage of files.

The file handler subroutines include provision for linking files into subtask linkages of files. Each such linkage of files is automatically assigned to a subtask number by the file handler subroutines without the intervention of the systems engineer. The subtask number assigned to such a linkage of files and the address of a coupler file of the type shown in the bottom half of FIG. 6/106 are supplied to the subtask processor 156 (FIG. 1). The coupler file contains a linkage pointer to the first file within the linkage and is arbitrarily assigned the file type number 8.

The coupler file contains an indication of the number of converter sets which are contained within a subtask linkage of files. By way of explanation, a "converter set" of files is a group of analog input files each of which is assigned to a different analog-to-digital converter. As files are added to the various subtask linkages within the system, wherever possible the file handler subroutines group the files into complete converter sets. When a subtask linkage of files is processed by the monitor data file processor program 162 (FIG. 1), the processor program is then able to go through the files sequentially and to hand out assignments to each of the system analog-to-digital converters in order until all of the converters are in operation. In this manner, the utilization of the analog-to-digital converters is maximized and the time required for the execution of analog data scans is minimized. The number of converter sets in each such linkage is specified within the coupler file so that each subtask may be limited to a fixed number of converter sets, for example to four converter sets. This limitation prevents any subtask from requiring any more than a fixed amount of time for its execution and thereby prevents it from interfering with the prompt execution of higher priority subtask linkages assigned to the same system task level, as will be explained more fully below. The assignment of subtask numbers to data file linkages is automatically carried out by the file handler subroutines, and the assignments are reorganized whenever necessary by the file handler subroutines so that the more frequently processed linkages are always assigned to higher priority subtask numbers than the less frequently processed linkages.

G. THE SYSTEM DIRECTORY

The system directory is preferably organized as is shown in FIG. 6/503. A directory storage area is divided into a number of locations each of which contains the name and address of a symbol (a file name or the name of a global variable) that exists in the system. Any unused locations within the directory storage area are linked to one another and are also linked to an empty file pointer location.

An alphanumeric linkage is established amoung the directory entries. A location IXLO contains a pointer to the directory entry containing the lowest symbol name in alphanumeric order with respect to the other symbol names; an alphanumeric pointer in the first directory entry points to the second directory entry within the linkage -- the entry containing the next lowest symbol name in alphanumeric order; and so on. A location IXHI points to the last directory entry in the alphanumeric linkage. The alphanumeric linkage of directory entries enables file and variable names and addresses to be retrieved in alphanumeric order from the directory. If the name of one system variable is known, it is possible to follow the linkages from the directory entry for that variable to the entry for the next variable in alphanumeric oder and to thereby retrieve data from the process control system in alphanumeric order. If the system operator wishes to display the values of the process variables A01 through A10, for example, the system operator instructs the system to display the variable A01 and also the next nine variables in alphanumeric order. No further data is required by the system to perform this task.

To speed up the retrieval of data from the directory storage area, the directory entries are linked by "hash code" linkage pointers to entries in a "hash code" pointer table. The "hash code" for a symbol is formed by combining the numeric code representations of the letters and numbers which comprise the symbol into a single number, using exclusive OR logical operations. The resulting number is then divided by the number of locations in the "hash code" pointer table, using integer arithmetic, and the remainder is saved. The remainder is the "hash code" for the symbol, and is also a pointer to an entry in the hash code pointer table. Each hash code pointer table entry contains a pointer to the first of a series of chain-linked directory entries each of which contains a symbol having the corresponding hash code. Once the hash code for a symbol has been calculated, the directory entry containing that symbol may be quickly found, since it is chain-linked to the corresponding entry in the hash code pointer table.

H. SUBTASK PROCESSOR

Figure 10A:
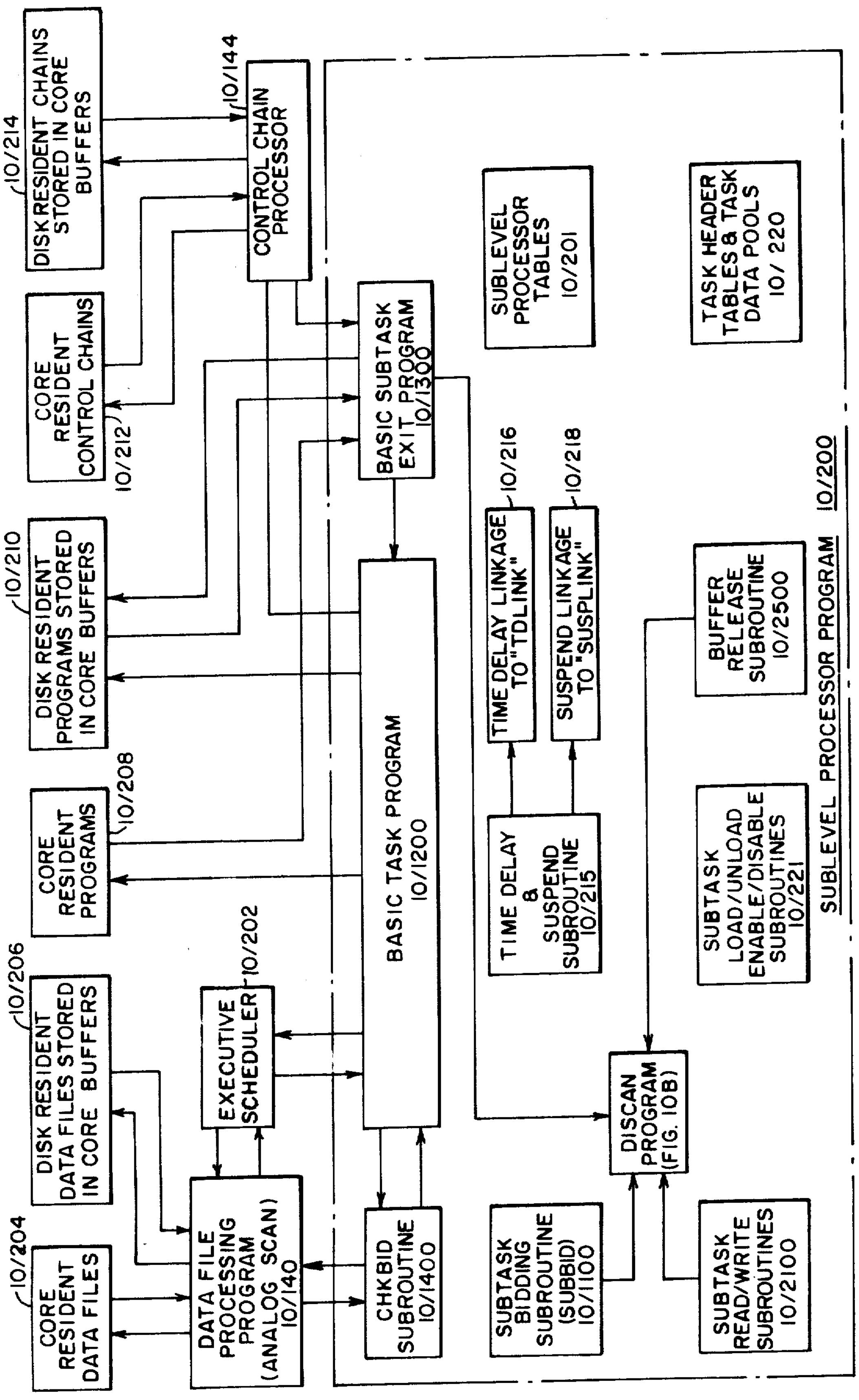
FIG. 10A et seq.

The preferred arrangement of the subtask processor 156 (FIG. 1) is shown in block diagram form in FIG. 10A. In addition to the previously noted executive scheduler indicated by the reference character 10/202 which provides executive task scheduling and a priority interrupt routine, the subtask processor also includes a sublevel processor 10/200. The executive task scheduler 10/202 is able to execute a small number of jobs called "tasks" on a priority basis and is able to interrupt the execution of one task when another, higher priority task is to be executed. Some of these tasks are assigned to computer programs, but most tasks are subdivided into "subtasks" by the sublevel processor 10/200.

When a bid for the execution of a subtask is placed, a subtask bid is placed with the sublevel processor, and a task bid is also placed with the executive scheduler for the execution of the task to which the subtask is assigned. In due course, the executive scheduler calls for execution of the task which includes the subtask. The sublevel processor program is then called upon to execute all subtasks assigned to that task in the order of the subtask priority assignments.

The sublevel processor 10/200 is intentionally designed to execute the subtasks within each task level at the highest possible rate of speed without allowing subtasks within the same task level to interrupt one another. However, a bid for the execution of a subtask assigned to a higher priority task than that which is currently in execution causes the executive scheduler to interrupt the execution of a subtask assigned to the currently running task level. Hence, the number of possible simultaneous interrupts can be no greater than the number of tasks which exist within the system. A division of labor between the executive scheduler and the sublevel processor is thus achived -- the executive scheduler handles all of the necessary task interruptions, and the sublevel processor keeps track of the subtask assignments within each task level.

A bid for the execution of a particular subtask is placed by a subroutine call to a subtask bidding subroutine 10/1100. The subtask number which is bid is recorded in sublevel processor tables 10/201, and a bid for execution of the task to which that subtask is assigned is then placed with the executive scheduler 10/202. In due course, the executive scheduler calls for execution of the task level to which the subtask is assigned. Program control then commences at a basic task program 10/1200 within the sublevel processor program. The basic task program 10/200 calls upon a CHKBID subroutine 10/1400 to determine what is the highest priority subtask that is bidding for execution. The CHKBID subroutine 10/1400 examines the sublevel processor tables and returns to the basic task program the starting address and the subtask number of the highest priority subtask which is bidding for execution. The basic task program examines the subtask number and determines whether the subtask number is assigned to a computer program, to a control chain, or to a string of chain-linked files. This determination is carried out with reference to subtask assignment data stored within the sublevel processor tables 10/201. For example, groups of subtask numbers within each task level may be assigned specifically to programs, to control chains, and to monitor data files.

In the case of a program subtask, program control is transferred directly to the program 10/208 or 10/210. When the program has run to completion, program control returns to the basic task program through a basic subtask exit program 10/1300.

In the case of control chains, program control is transferred to the control chain processor program 10/144. The basic task program 10/1200 supplies to the control chain processor program the address of a data file which contains the control chain 10/212 or 10/214. When a control chain has been completely processed, program control returns to the basic task program by way of the basic subtask exit program.

In the case of chain-linked monitor data files, the basic task program can transfer program control to a monitor data file processing program 10/140. In the preferred embodiment of the invention, the data file processing program 10/140 itself is able to perform all the tasks of the basic task program 10/1200 including that of calling upon the CHKBID subroutine 10/1400. The data file processing program is assigned to an executive scheduler task level of its own. The CHKBID subroutine 10/1400 supplies to the data file processing program the core address of the coupler file at the beginning of the highest priority subtask linkage of files 10/204 or 10/206 for which a bid has been placed. The data file processing program then processes the linkage and all other similar linkages for which bids have been placed, and returns program control to the executive scheduler 10/202.

The sublevel processor program 10/200 additionally includes a subtask time delay and a suspend subroutine 10/215. Any subtask which wishes to be placed in time delay or to be suspended indefinitely calls this subroutine. The subroutine takes the pertinent data for restarting the subtask and links this data into either a time delay linkage or into a suspended program linkage which commence at the locations indicated in 10/216 and 10/218.

The time delay linkage is processed periodically by the auxiliary synchronizer program 152 (FIG. 1). When the time delay expires, a bid to restart the delayed subtask is placed with the subtask processor. When the CHKBID subroutine 10/1400 encounters such a bid, the subroutine 10/1400 searches through the linkages and obtains the data necessary to restart the subtask. The subtask is then restarted at the point at which it was stopped. In this manner, a subtask may be placed into time delay without halting the task level to which the subtask is assigned. Similar provisions are provided for indefinitely suspending subtasks.

In order to facilitate the establishment and the alteration of subtask assignments within the operating process control system and thereby enhance the facility with which changes can be made in the configuration or the process operations of the system 100, a series of subroutines 10/220 are provided which can establish new subtasks and which can cancel out existing subtasks. Additional subroutines 10/220 enable a subtask to be disabled temporarily and re-enabled again at a later time.

Mass data storage facilities may be used for the storage of files, directory entries, and program subtasks in addition to high speed or core storage facilities. In the preferred embodiment of the invention, disk storage is used. Individual program subtasks, control chain subtasks, and subtask linkages of data files may be assigned to individual disk sectors. Other files and directory entries may be stored several to a sector, with each such sector organized as is shown in FIG. 6/107 and 6/503. The hash code pointer table (FIG. 6/503) is also stored in one or more sectors, and directory entries containing symbols having the same hash code are stored in a single sector, whenever this is feasible, to minimize the time it takes to find an entry containing a given symbol name.

When the sublevel processor 10/200 receives a bid (subroutine 10/1100) for the execution of a subtask which is not core-resident, the processor 10/200 calls upon a DISCAN program (FIG. 10B) to retrieve the subtask from disk storage. The bid for execution of the subtask is recorded in the sublevel processor tables, but a bid is not placed with the executive scheduler 10/202 for execution of the task level to which the subtask is assigned. Instead, the executive scheduler is called upon to place the DISCAN program into operation.

With reference to FIG. 10B, the DISCAN program is preferably assigned to its own high priority task level within the system. When placed in operation by the executive scheduler, the DISCAN program does one of two things: it either searches for an empty core buffer and a disk-resident subtask which is bidding to fill the empty core buffer; or it searches for a normally disk-resident subtask which is present in a core buffer and which is waiting to be returned to disk storage. The DISCAN program calls upon one of the subroutines READISK or WRITDISK to transfer subtasks either between disk and core storage (READISK) or between core and disk storage (WRITDISK).

A routine called CKSTUS then performs one of the following steps: if a subtask has just been transferred into a core buffer and is to be executed, a bid for execution of the task level to which that subtask is assigned is placed with the executive scheduler 10/202; if the transfer of the subtask to core was initiated not by a subtask bid but by another subtask, then the subtask which requested the transfer is removed from suspension or other appropriate action is taken; or if a subtask has just been transferred back into disk storage, the core buffer formerly occupied by the subtask is released and is made available to other system subtasks.

The sublevel processor 10/200 (FIG. 10A) includes a series of subroutines 10/2100 which can accept a request from a requesting subtask that a requested subtask be transferred between disk and core storage or vice versa. These subroutines can perform the following transfers: suspend the requesting subtask, transfer the requested subtask from disk storage into a core buffer, and restart the requesting subtask; suspend the requesting subtask, reserve the core buffer in which the requesting subtask resides for use by the requested subtask, transfer the requested subtask into the reserved core buffer from disk storage, and then execute the requested subtask; suspend the requesting subtask, transfer the requested subtask into a core buffer, execute the requested subtask as a subroutine of the requesting subtask, and then restart the requesting subtask; and suspend the requesting subtask, transfer the requested subtask from a core buffer back into disk storage, and restart the requesting subtask. These series of subroutines make it possible for purely data subtasks to be transferred between disk and core storage as needed by other programs. These subroutines also facilitate the transfer of program control between subtasks which are normally disk-resident with a minimum of lost time and confusion. Subtasks are always core-resident at a time when the basic task program 10/1200 (FIG. 10A) is called upon to process the subtasks. Hence, the control chain processor 10/144 and the data file processor 10/140 are often called upon to process control chains 10/214 and strings of data files 10/206 which reside in core buffers. Similarly, the basic task program may transfer program control to normally disk-resident programs 10/210 which are present in core buffers.

After a disk-resident subtask has been processed, it is necessary to release or free the core buffer in which that subtask resided temporarily so that the core buffer is available to other system programs. In the case of program subtasks and control chain subtasks, the buffer release is carried out automatically by the basic subtask exit program 10/1300 shown in FIG. 10A. In the case of data files and pure data subtasks, a buffer release subroutine 10/2500 is called upon by the processing program to release the core buffer.

I. LOGIC INITIATOR

The logic initiator is preferably arranged as schematically shown in FIG. 11A. The logic initiator includes tables 11056 containing a one bit entry for each logical variable that exists within the system 100. Some of these logical variables are contact closure input and output signals which link directly to the apparatus 16. Others are process and global logical variables which do not link with the apparatus 16. The logic initiator also includes alarm and trigger tables 11059 which can link each logical variable to an alarm message and to any number of of system subtasks.

A digital scan program 11057 is provided to check periodically the status of each contact closure input signal bit within the bit tables. Groups of these contact closure input signal bits within the digital scan table are associated with system subtasks by tables within the logic initiator. Periodic bids for the execution of these subtasks are placed by the auxiliary synchronizer 11052. All of these subtask bids cause operation of the digital scan program 11057. The particular bits which are checked during any given call are identified by the subtask number that has been bid and by the tables which relate the groups of contact closure input signal bits to the different subtasks. By bidding the different subtasks at different frequencies it is possible to have different input signal bits scanned at different rates in accordance with the varied requirements of the system 100.

If the digital scan program discovers that a contact closure input signal bit has changed its state, the digital scan program calls upon an alarm and trigger check routine 11058 to determine whether or not the input signal bit has an alarm message associated with it and whether or not any subtasks are to be executed in response to the change in the state of the signal bit. The routine 11058 has access to the alarm and trigger tables 11059 which contain the addresses of alarm message files, the subtask numbers of subtasks which are to be triggered by changes in the state of logical variables, and linkages linking the address and subtask numbers to specific logical variables. The subtask numbers of all subtasks which are to be executed are supplied to the SUBBID routine 10/1100 within the sublevel processor program 11051, and the address of the file containing an alarm message which is to be printed is transmitted to a message writer 11067. The message writer 11067 then utilizes the file handler subroutines to obtain the alarm message from the file system 11069 and prints out the alarm message 11068.

The digital scan contact closure input signal bit tables are updated by a variety of conventional routines 11062, 11063 and 11064 associated with the executive of the computer system. These routines 11062, 11063 and 11064 determine the status of external contacts 11065 and transfer the status of these contacts to the digital scan bit tables 11056 within the computer system 102.

Whenever a system program desires to know the status of a logical variable, a check bit subroutine 11055 is called upon and is supplied with the address of the logical variable within the tables 11056. The subroutine 11055 returns to the calling program the status of any designated logical variable (set or reset).

Any logical bit within the system may be altered by a call to a series of alter bit subroutines 11060. Upon request, these subroutines set or reset any logical variable by making an appropriate entry in the digital scan bit tables 11056. The subroutines 11060 then call upon the alarm and trigger check routine 11058 to determine whether or not the altered status of the bits requires the printing of an alarm message or the placing of subtask bids as has been described. If a contact closure output signal bit is altered, an executive contact closure output handler 11061 is called upon to alter the state of external contacts 11069 which correspond to the output signal and which connect to the apparatus 16 in the process environment.

Alarm message and subtask trigger connections to logical variables are established and are cancelled by a series of subroutines 11054 within the logic initiator. These subroutines adjust the table entries 11059 as needed to insure the proper connection between each logical variable and the alarm message file address (if any) for the variable and the numbers of subtasks (if any) which are triggered by the variable.

J. AUXILIARY SYNCHRONIZER

The auxiliary synchronizer 154 (FIG. 1) preferably includes subtask periodic bidding tables arranged as shown in FIG. 9E and a periodic subtask bid count-down routine which is illustrated in FIG. 9B. In response to a file loader or file handler request for the establishment of periodic bids to execute a subtask, the auxiliary synchronizer establishes an entry within the tables shown in FIG. 9E to carry out the periodic bid request.

The synchronzier tables include four linkages. Three of the linkages are respectively processed at 1/10 second, 1 second, and 1 minute intervals by the routine shown in FIG. 9B, and the fourth linkage is a linkage of empty (or available) locations which is not processed. Each linkage includes a string of chain-linked counting modules which maintain a count of elapsed time for one or more periodic subtask bid requests. Branch-linked to each counting module is one or more bidding modules containing the numbers of subtasks which are to be bid after the expiration of the time interval defined and measured by the counting module. The routine shown in FIG. 9B is executed every 0.1 second under the control of a real-time executive interrupt program. Each time a counting module is processed, a "counter" location is decremented. When a "counter" location is decremented to zero or a negative value, the "counter" is set equal to an "initial count" and bids are placed with the subtask processor for the execution of all subtasks whose numbers are in the bidding modules linked to the counting module containing that "counter". The tables may be easily rearranged at any time by auxiliary synchronizer subroutines to give any desired pattern of subtask periodic bids.

The auxiliary synchronizer also increments the counters for subtasks which are in time delay and causes bids to be placed with the subtask processor for the restarting of any subtasks for which the time delay has expired.

K. CONTROL CHAIN PROCESSOR, CONTROL CHAINS, AND ALGORITHMS

The control chain processor 700 is known in FIG. 7 in its preferred configuration. Entry to the control chain processor 700 is made from the system executive scheduler 702 by way of the sublevel processor 410 or the data file processor 412. The control chain processor is supplied with the address of the first location in a control chain file which is to be processed.

The control chain file appears as is shown in FIG. 7. The control chain file includes a header which is like the header of any other system file (see FIG. 6/104). The remainder of the control chain file comprises one or more blocks or modules each of which includes a one-word header and any number of data values. Each block or module contains explicit instructions as to how a predefined algorithm subroutine MODA01, MODA02, . . . is to carry out some job or task. The block or module header word contains the block number assigned to each block by the systems engineer to facilitate later identification of the blocks within an established control chain if and when data values within the control chain are to be altered, and the number of the algorithm which is to process the block of data. The block number occupies the left portion of each header, and the algorithm number occupies the right portion of each header.

The control chain processor program 700 places the control chain starting address into the 41st location within a task level data pool and places the starting address of the first block into the 42nd location within the task level data pool. The program 700 then loads a computer system index register B with the address of the 40th location within the task data pool and transfers program control to a find next algorithm routine 710. The significance of the task data pool is explained at a later point.

The routine 710 accesses the header of the first block within the control chain. This header contains a block number "$1_{16}$" in its left-hand portion and an algorithm subroutine number "$1_{16}$" in its right-hand portion. The algorithm subroutine number $1_{16}$ is retrieved and is used as an index to an algorithm starting address table STRTADR. The routine 710 obtains the starting address of an algorithm subroutine from the algorithm starting address table and calls upon the subroutine residing at that address to process the first block of control chain data. A computer system index register C is loaded with the address of the first entry in the block which the algorithm subroutine is to process, as is shown in FIG. 7.

The algorithm subtoutine residing at the indicated address commences to carry out its assigned function in accordance with the data contained within the block or module, using index register C to access the data. After completing its assigned task, the algorithm subroutine computes the starting address of the next block or module within the control chain file which is to be processed and stores this starting address in the 41st location within the task data pool. The find next algorithm routine 710 is then called upon once again. The routine 710 accesses the first entry in the next block and repeats the procedure outlined above.

The procedure just outlined continues until all of the blocks within the control chain file which are to be processed have been processed. Program control is then either returned to the sublevel processor 410 or to one of several entries into the data file processor program 412 depending upon the particular task level which is running and the nature of the subtask which is being processed.

A wide variety of algorithms are available for implementation by the process control chains. Many are able to function as digital process controllers for systems operated with feedback, feedforward, or any of various other control loop configurations. For example, the algorithm which processes the block 10 in FIG. 15/206 has already been described as a porportional-plus-reset controller and it can be used for example in a simple zero-error closed feedback control loop. Other algorithms function as proportional, reset, rate, lag, lead-lag, and combination controllers which are useful for various system control and operating purposes. Algorithm subroutines are also available which can give a deadband effect to inhibit control action for small variable changes, limit the value of a variable as is often desired in process control, and select the highest or the lowest of two variables for control or other purposes.

Algorithms are also available which function as logical flip-flops, as one-shot multivibrators, and as analog signal comparators for various process control and operating purposes. Other algorithms control the operation of the contact closure outputs 111, 113 and 115 in FIG. 1 or the digital-to-analog converters 118 in FIG. 1.

Algorithm subroutines for performing generalized arithmetic and logical operations are available, as are algorithms for executing direct and conditional transfers between the data blocks within a control chain. These transfer algorithms calculate a block address by adding the relative address of a block (retrieved from the data within another block) to the control chain starting address that is stored in the 41st location within the task data pool (FIG. 7). Control chains are thus enabled to perform just about any task which may be carried out by a conventional computer program, yet the control chains do not occupy nearly as much storage space as do conventional computer programs. In place of the machine language instructions which make up a conventional computer program, the control chains contain only data defining how a job is to be carried out. The algorithm subroutines are designed to be extremely efficient. As a result, most control chains are executed in less time than is required for the execution of comparable FORTRAN compiled programs, and better process operations are accordingly provided.

The task data pool shown in FIG. 7 is used only by control chains whose subtasks are assigned to the corresponding executive task level. Control chains whose subtasks are assigned to other executive task levels use other task data pools (not shown). The entry routine 706 places the address of the 40th location within the task data pool for the currently running task level into an index register B. The algorithm subroutines then store all temporary data values in the task data pool, rather than within the subroutines themselves or within a program common storage area. When execution of an algorithm subroutine at one task level is interrupted by the system executive, the temporary data values are preserved in the task data pool even though the same algorithm subroutine may be called upon during the interruption. Hence, the execution of control chains is fully interruptable. Conventional subroutines may not be interrupted in this manner, for execution of a conventional subroutine at a high priority task level destroys all temporary data values left within the subroutine following interruption of subroutine execution at a lower priority task level. In the past, it has often been necessary to execute such subroutines under what is commonly called "software lockout", thereby suppressing all task level program interruptions. Since this use of "software lockout" can cause low priority jobs to run when higher priority jobs should be running, the full interruptability of the control chains is a distinct process and computer system operating advantage.

L. MONITOR DATA FILE PROCESSOR

The monitor data file processor is shown in its preferred form in FIG. 12. In the preferred embodiment of the invention, this processor is assigned to its own task level within the computer system and therefore includes a section 1202 which is quite similar to the basic task program 10/1200 in FIG. 10A.

The monitor data file processor calls upon the subroutine CHKBID 10/1400 to determine the highest priority subtask which is bidding for execution (step 1201). The monitor data file processor then determines the nature of this subtask. If the subtask is a control chain or a program, program control is transferred either to the control chain processor program 1204 or directly to the program 1203 written by the systems engineer or by a computer programmer. If no subtasks are bidding, program control is returned to the executive scheduler after a variety of housekeeping tasks are carried out by the data file processor. If the subtask is a linkage of monitor data files, the processor follows the file linkage beginning with the coupler file (see FIG. 6/106). Each file in the linkage is processed in an appropriate manner (steps 1206 to 1211).

Analog signal input files are processed by an analog scan file processing program 1207. The program 1207 carries out the analog signal scanning, conversion and alarm checking functions which are called for by each analog signal input file. These functions typically include calling upon a system analog-to-digital converter to convert the current magnitude of the analog signal into a number, linearizing the number, checking the number against alarm limits and against other appropriate types of limits, and taking any necessary alarm actions.

Calculated value files are processed by a program 1208 in much the same manner as the analog scan files are processed. However, calculated values are already numbers existing within the computer system and do not need to be retrieved from the process environment and linearized.

Subtask bidding files contain the numbers of subtasks which are to be bid. The subtask numbers are retrieved from these files and are transferred to the subtask bidding subroutine SUBBID (step 1210). A coupler file is a file linking two other files together which does not usually call for any action on the part of the data file processing program.

Analog control chain files are control chain files which are not assigned to unique subtasks but which are linked into monitor data file linkages. Analog control chains typically are used to process the number representing the magnitude of an analog signal immediately after the number is updated by the processing of the analog scan data file for the signal. Analog control chain files are processed by the control chain processor program shown in FIG. 7.

If a file is none of the above types, a check is made to see if there are any more files in the linkage as indicated by a zero linkage pointer within the last file checked (step 1211). If there are more files, program control continues at step 1205. If there are no more files in the linkage, a check is carried out to determine if the linkage of files is normally disk-resident. If the linkage is normally disk-resident, the core buffer within which the linkage resides is released for use by other subtasks (step 1212). The CHKBID subroutine is then checked once more to see if any other chain-linked subtasks are bidding for execution. If other subtasks are bidding, they are processed in the manner just described. Otherwise the data file processor comes to a halt.

M. ADVANTAGES OF THE SYSTEM

The system just described has many advantages over conventional systems. A few of the more important advantages are discussed below. First and foremost, the sytems engineer is, to a large degree, removed from the details of computer program organizaton. He is free to concentrate on the process problems and thereby to produce better process monitor and control process operations. It is not necessary for him to pay close attention to computer considerations and software housekeeping. The system routines described above handle such duties for him. The systems engineer need not concern himself with the tedious problems of memory allocation, storage overlaps and complicated, manually established program linkages. Memory space is automatically allocated and organized in an efficient manner so as to eliminate any possibility of overlap, and all links for triggering data scans and processing steps are automatically established as needed. The systems engineer does not even have to be skilled in programming, for the simple control chain language and the uncomplicated coding forms used in defining process variable are easy to understand and to use.

The number of actual computer programs which have to be written to apply a computer system in the operation of a given process is greatly reduced in the present system. Almost all monitoring tasks and most control functions can be established through the use of process variable data file definitions and control chain definitions, rather than through the use of conventionally compiled or assembled computer programs. This reduction in the number of programs greatly reduces the amount of time which has to be spent in "debugging" computer programs. In addition, "clever coding" and custom program innovations are avoided. Since no two programmers code alike, even the best decumented conventional system is awkward for anyone other than the programmer who established the system to understand and to alter, and the many special compilers now available for process control computers increases the tendency to personalization of computer program arrangements. The rigid format - yet flexible structure - of the data file and control chain definitions greatly minimizes the number of "clever codings" which can appear. The uniform methods whereby widely different types of jobs may be placed into operation either periodically upon demand, or upon the alteration or the scanning of a system variable further reduces the use of customized programs and complex interprogram linkages. The use of monitor data file and control chain definitions enforces a uniform documentation which is easily understandable. Hence, any process engineer or technician conversant with the pertinent process principles can effect process operating or monitoring changes with little difficulty through changes in the data files and the establishment of new or different linkages within the operating program system.

With reference once again to FIG. 1, a complete improved operating system with process monitoring and/or control can be established by simply feeding an appropriate set of data files into the computer programmer's console 120. The configuration and operation of the system 100 are achieved automatically with accuracy, efficiency, flexibility and economy which is realized particularly through savings in programming labor. The monitoring and/or operating performance specified for the process is accurately and economically obtained in accordance with the system engineer's specifications through necessary physical connections between system elements and automatic programming procedures.

For those jobs which cannot be adequately handled within the system by data files or control chains, conventional computer programs may be used instead and may be established as subtasks within the subtask processor 156. Complete interaction is allowed between data-file-defined portions and program-defined portions of the system, and hence no limit is placed upon the flexibility of the system by mixing programs and data files.

The order in which control chains and data files are fed into the system is of little or no consequence. Additional files of any type may be fed into the system at any time, even long after the system is established and operating. The process control system automatically restructures itself to accommodate the new files and to carry out the additional tasks and produce the desired system configuration and process operation. There is no need to organize the chain files in any way prior to their introduction into the operating system.

Files and subtasks may be completely deleted from the system at any time, even long after the system is established and operating. The system automatically restructures itself after such a deletion to reflect in the process operations the absence of the files and subtasks. Deleted files may be replaced with new files with the same ease that the original files were fed into the system. Hence, minor changes or even major changes in the process control system and the process operations may be implemented on-line without restructuring the entire system and without seriously interrupting the operation of the process.

The fact that the file generation step 130 (FIG. 1) requires no knowledge of where the files go within the computer system enables this generating step to be carried out at some location other than that at which the computer system 102 is set up. Since process variable data file and control chain definitions are independent from one aother, it is not necessary to generate all the process variable data files and control chains at one time. A single file or control chain may be generated by itself, if desired. Typically, the systems engineer fills out his coding sheets with his monitor data file and control chain definitions and sends the sheets to a central location or transmits the sheets (in machine readable form) over telephone lines to a centrally located time sharing computer. A single generating facility of this type can carry out the file generating steps called for by many different systems engineers in connection with the establishment of many different process control systems. The fact that different engineers may use differing terminology from one another poses no great obstacle, for the generating facility is easily reprogrammed to accept any desired terminology. Alternatively, file generation may be carried out off-line in an operating process control system.

The systems engineer submits macro specifications defining his choice of terminology along with his coding forms. Hence, he does not have to use the same terminology as some other systems engineer. Control chain algorithms may even be defined using a language other than English and using engineering units (meters, feet, etc.) other than the units which are cutomarily used in the country where the computer system is built and which are expected by the system algorithms. Unit conversions of this type are carried out automatically under the control of macro specifications.

The programs which interact with the system operator's console are greatly simplified within the system 100 because any variable within the system may be located if only the name of the variable is known. Any data requests relating to specific system variables may be handled by name through the system operator's console rather than by absolute core address or by some other numeric identification which the system operator may not know or may have trouble finding. Even if the system operating configuration is altered, no changes need be made in the operator's console since the addition of new variable names or the deletion of old variable names in no way affects the operator's console. Interrupt processing programs are similarly greatly simplified and may also trigger the execution of any system job by placing a bid with the sublevel processor 156.

The ability to access any values within the system by name and to access any monitor data file or control chain within the system by name eliminates the need for the system operator and the systems engineer to have a detailed understanding of the software operating configuration of the process monitoring and control system. As an example, if the system operator wishes to change the gain or the time constant of a controller, the systems operator calls upon a subroutine associated with the operator's console which first locates by name the control chain file in which the controller resides, using the file directory, and which then locates the specific, numbered block within the control chain which defines the controller. It is a simple matter to alter the gain or the time constant figure within this block once the block itself has been located (in FIG. 7, the block number of each block in a control chain occupies the left-hand portion of the header location of the block). The system operator is able to accomplish this without any knowledge of where the control chain is stored within the system or of where the particular block is stored within the control chain. All of the programs associated with the system operator's console are thus greatly simplified.

2. THE COMPUTER SYSTEM

The preferred embodiment of the present invention is implemented using elements of the P2000 computer system designed and built by the Hagan/Computer Systems Division of Westinghouse Electric Corporation, Pittsburgh, Pennsylvania. Since many facets of the monitored and controlled system are affected by the nature of the computer system, at least a partial knowledge of the P2000 computer system is a prerequisite to a full understanding of the descriptive material which follows.

FIG. 2/1 is a greatly simplified block diagram of the P2000 computer system. The system is designed around a central processing unit 200 having an addressable core memory 240. Each addressable location within the core memory contains sixteen bits of data. In addition to the core memory 240, the P2000 system may be equipped with one or more disk or drum, high-speed, peripheral storage units 255. A variety of data input-output devices and options are available including an analog-to-digital converter input 260, contact closure inputs 270 and outputs 280, analog outputs 290, a variety of console display devices 250, and various input/output and interrupt options 230. A control unit 210 controls the operation of the central processing unit 200.

The arithmetic and logic portions of the P2000 computer system are shown in FIG. 2/2. Six system hardware registers P, B, C, G, E, and A are organized in such a way that their contents may be addressed as though they were part of the system core memory. A program address hardware register P is addressed as memory location zero. Two hardware index registers B and C are addressed as memory locations 1 and 2. A hardware shift-code register G, the contents of which are used to control data shifting operations, is addressed as memory location 3. A hardware arithmetic accumulator A and a hardware extended arithmetic accumulator E (sometimes referred to as registers A and E) are respectively addressed as memory locations 5 and 4. Data may be transferred into or retrieved from these registers in the same manner that data may be transferred into or retrieved from any location within the system core memory, but at a higher rate of speed due to the hardware nature of these registers.

Arithmetic operations, such as addition, subtraction multiplication, and division are carried out by an adder 2009. Input data for this adder is presented by a data buffer register 2003 and by a memory read data register 2004. The particular operation which is carried out is determined by the contents of a function code register 2007, a mode register 2006, and a designator register 2005 which is sometimes referred to as register D.

When an instruction is to be executed, the address of that instruction is placed in the memory address register 2001. An address selector 2002 causes the contents of that location to be transferred into the function code register 2007 and into the mode register 2006. The function code register 2007 determines what is to be done, and the mode register 2006 together with the designator register 2005 determine how address computations are to be carried out. Data from the core memory is transferred into the memory read data register 2004. Additional data which is to be included in a computation is placed in the data buffer register 2003. The result of a computation is transferred back into core or into one of the hardware registers which occupy the six lowest addresses of the core memory. In the case of input-output instructions, the system hardware communicates directly with the input-output device or devices 2008. Data is transmitted either directly from register A to the input-output device or from the device to register A.

The designator register 2005 is loaded by special programming instructions so as to determine the mode of operation of the system. Bits of data may be placed in this register to lock out completely all types of interrupts. At the end of an arithmetic computation, the result of the computation (positive, zero, overflow, or carry) is indicated by bits within the designator register. The designator register is also used to aid in addressing. Bits may be set within the designator register to cause automatic post-indexing using either the contents of index register B or the contents of index register C. When the system is operating with the designator register adjusted for post-indexing using the contents of register C, for example, the contents of register C are added to the result of every address computation involving the use of the index register B.

The central processor of the P2000 system includes an executive monitor program package (FIG. 2/3B which provides for the simultaneous handling of 16 different tasks. Each of the 16 tasks is assigned to a task (or priority level between "O" and "F" (using hexadecimal numbers). These tasks are fully interruptable. Hence, if task "3" is running at a time when a request for the execution of higher priority task "6" is received, the execution of task "3" is immediately suspended until the execution of task "6" is completed. The execution of task "3" is then recommenced where it left off.

Bids for the execution of a program assigned to an executive task level may be placed by a program (for example, the program 2306) operating within a task level (in this case, the task level $D_{16}$), by a program operating within the system interrupt level 2305 in response to an external interrupt EI or a service request interrupt SRI, or by a program operating under software lockout 2303. In every case, an executive program 2304 records the bid in the table shown in FIG. 2/3A. Each such bid is recorded within an "able" word bit whose position corresponds to the task level of the program for which the bid has been placed. For example, the seventh bit position within the "able" word (FIG. 2/3A) contains a "1" data bit indicating that a program within the seventh task level is bidding for execution. Program control is then transferred to a task scheduler program 2302. The task scheduler program 2302 examines the contents of the able word (FIG. 2/3A) and determines which is the highest priority task level that is bidding for execution by examining the bits in the able word one at a time. An active word (FIG. 2/3A) is also provided so that a particular task level may be disabled. If the bit corresponding to a task level in the active word is "0", then the task level is disabled and the programs assigned to that task level are not run. When software lockout is in effect, the program which is running runs at a software lockout priority level 2303 which is higher than the priority level of the remaining programs in the system 2301 and which may only be interrupted by an external interrupt coming in at the interrupt level 2305. When a program running under software lockout bids for execution of a task level, the task level bid is recorded in the able word (FIG. 2/3A) and then program control is returned to the program running under software lockout rather than to the task scheduler 2302. Only when software lockout is released does program control return to the task scheduler 2302.

The executive program which calls for the execution of individual task levels is called the executive scheduler or task scheduler 2302 (FIG. 2/3B). Within the scheduler are located two sets of tables containing one entry for each task level within the system. The first is called the Z:ORIG table (2301 in FIG. 2/3B and "Z:ORIG" in FIG. 10G). Each entry in this table is the starting address of a task header 10/220 (FIG. 10G). The address of the Z:ORIG table entry for a particular task is found by adding the task level number to the starting address "Z:ORIG" of the table. A typical task header is shown in FIG. 10G at 10/220. Each task header contains data which is loaded into the system hardware registers P, B, C, G, E, A, and D (register D is the designator register - see FIG. 2/2) at the time when the corresponding task is given program control. The first location within the task header is loaded into the system program counter register P and is the address of the location which immediately precedes a location containing the first executable command of the task level. For example, in FIG. 10G, the first location in the task header contains the address of a location SPEXIT. When the scheduler calls for execution of this task, program control commences at location SPEXIT+1 within the core memory.

A second table within the scheduler is called the Z:START table (FIG. 10G). Each entry in this table is the starting address of a register storage pool for a task. The register storage pool may be any group of seven consecutive core locations into which the data contents of the registers P, B, C, G, E, A, and D (see FIG. 2/2) may be placed when the execution of a task is interrupted. If the execution of a task is interrupted before the task runs to completion, the contents of these seven system registers are loaded into the task register storage pool. When execution of the task is restarted, the contents of the register pool are reloaded into "CORE" locations 0 through 5 and into the designator register. Execution of the interrupted task then automatically proceeds from the point of interruption.

In order to speed up the process of testing or of manipulating a single data bit within a 16 bit group of data bits occupying a core location, the system includes a bit mask table BITTBL. The table starting address is "BITTBL", but this starting address is occasionally referred to as "K:X1" by some system subroutines. The mask for a particular bit position within a group of sixteen bits is found by adding a bit position number to the starting address of the bit mask table. Each bit within a group of 16 bits is assigned a bit position number between zero and 15 or "$F_{16}$" (again using hexadecimal numbers). The right-most bit in a group is the bit position zero, and the left-most bit is the bit position 15 or "$F_{16}$". Thus, the second location within the bit mask table contains the binary number "0000000000000100". This location contains a "1" bit in bit position 2, and may be used to test or to manipulate the second bit position within any group of 16 bits. The following two bit manipulation commands are available within the P2000 system: AND and EXOR (exclusive OR). Any other logical operation may be carried out using logical cmbinations of these two commands.

When a program within the P2000 system wishes to call for the execution of a subroutine, the program usually executes a command:

```
SST *X,B
```

Prior to executing this command, index register B contains the address of the last location in a register storage pool. The above command stores the contents of the seven system registers (P, B, C, G, E, A, and D) in the register storage pool and subtracts "7" from the contents of register B so that index register B contains the address of the location just preceding the pool. Program control is then transferred to the subroutine. The first executable subroutine statement must reside in the location having an address one greater than the address stored in the location X. The subroutine must take steps to preserve the address which is stored in index register B, since this address must be available when program control is returned to the calling program. If any arguments are to be transferred to the subroutine from the calling program, the addresses of these arguments are stored in the locations immediately following the SST instruction, and the subroutine calls upon a standard argument fetching subroutine which retrieves the argument addresses and transfers the addresses to the subroutine.

When a subroutine has run to completion, register B is reloaded with the address of the location just preceding the register storage pool. The following command is then executed:

```
EST 1,B
```

This command reloads the system registers from the calling program pool and adds "7" to the address stored in register B. Program execution within the calling program then resumes automatically with register B again pointing to the last location within the register storage pool.

The program registers P, B, C, G, E, and A are stored in the register storage pool in the exact order in which they appear in the "CORE" memory in FIG. 2/2. The contents of the designator register D are stored in a seventh location within the pool just beyond that in which the contents of register A are stored.

If a core location contains a negative number, the number is a fifteen-bit binary number in two's complement form, and the left-most bit (bit position F) in the core location is a sign bit equal to "1". If a core location contains a positive number, the number is a 15-bit binary number in standard form, and the left-most bit is a sign bit equal to "0". Often when the contents of the core location are discussed, those contents are represented as a 4-digit hexadecimal number, and the sign bit is included as part of the first digit in the hexadecimal number. For example, a core location containing plus one is said to contain the hexadecimal number "$0001_{16}$"; a core location containing minus one is said to contain the hexadecimal number "$FFFF_{16}$".

The executive scheduler within the P2000 system includes a software lockout provision for preventing a first program from interrupting the execution of a subroutine called by a second, lower priority program. Such an interruption can be undesirable. If the first program were allowed to interrupt the second and to call for execution of the same subroutine, data values relating to the second program and stored within the subroutine would be destroyed. A subroutine establishes software lockout by adding "1" to the present value of a software lockout counter having the symbolic name Z:SFL. Software lockout is in effect whenever the counter Z:SFL has a numeric value that is greater than zero. As long as software lockout is in effect, the executive scheduler accepts bids for the running of any task level but does not execute the bids until software lockout is "released"—that is, when Z:SFL equals zero. When a bid is received by the executive scheduler during software lockout, a call flag whose symbolic name is Z:CALL is set. The flag Z:CALL is set by adding "1" to the present value of the flag.

When a subroutine executed under software lockout has run to completion, index register B is loaded with the address of the calling program. Program control is then transferred to an executive software lockout release program whose symbolic address is stored in a location M:SFX. The executive software lockout release program subtracts one from the software lockout counter. If the counter then contains zero count, the program checks the scheduler call flag Z:CALL. If the scheduler call flag indicates that task level bids have been received during the software lockout interval, program control is transferred to an executive scheduler task bidding routine. If the scheduler flag is not set, then no bids for the execution of other task levels were received furing software lockout, and program control is returned by the standard subroutine exit procedure to the calling program.

Software lockout is used by many of the subroutines within the process control system. To simplify the present discussion, no mention is normally made of software lockout except in the discussion of the control chain processor program (FIG. 7). Software lockout is mentioned in that discussion only because the algorithm subroutines associated with the processor program are fully interruptable and do not have to use software lockout.

The software lockout steps included in a program listing generally take the following form:

| (Entry into subroutine) | | |
|---|---|---|
| * | * | * |
| INC | | Z:SFL |
| * | * | * |
| JMP | | *M:SFX |

The "INC" step places software lockout in effect, and the JMP step is an executive call requesting the release of software lockout.

The analog-to-digital converters within the computer system are of the counter-integration type. A typical converter is shown in FIG. 2/4A. The computer supplies channel, word, and bit selection signals to an analog input selector which connects one of a plurality of analog input signals to the analog-to-digital converter 265. A voltage-to-frequency converter 261 converts the incoming signal into a pulse train whose frequency is proportional to the magnitude of the incoming signal. A control 264 then allows the pulse train from the converter 261 to pass through a gate 262 to a counter 263 normally for exactly 1/60 of a second so that any 60 cycle noise pickup does not affect the result of the signal measurement (see FIG. 2/4B). The count upon the counter 263 is then transferred back to the central processor unit. This count is the digitized analog signal input value.

A typical system includes anywhere from one to ten of these converters running in parallel. The executive handlers which control the operation of these converters function by transmitting the necessary channel, word, bit, and gain figures to the converters at the request of other system programs. If a converter is busy, the program task level which is attempting to use the converter is automatically suspended until the converter is free.

In a typical analog scan application, analog signal input requests are transmitted to each of the converters in sequence until all of the converters are busy. A second request is then transferred to the first converter. Since this request may not be processed immediately, the task level containing the program which is attempting to retrieve analog signal data is suspended until the converters have finished retrieving the first set of data. At that time, the request to have the first converter input a second analog signal is processed, and simultaneously the result of the initial analog input request is returned to the calling program by this first converter. In a similar manner, each subsequent request to have a converter process an analog signal input causes the queried converter to return the result of an earlier request. After the last group of requests have been supplied to the converters, it is necessary to then make a final "dummy" request to the converters so that the converters are able to return the results of the last group of actual requests.

With reference to FIG. 11A, the system includes a variety of routines for handling contact closure inputs and outputs. Executive contact closure input handler routines 11062 and 11063 periodically check the status of contact closure inputs and maintain an accurate record of the status of each contact closure input within digital scan bit tables 11056. The status of the contact closure inputs is recorded within a contact closure input hardware image table whose symbolic name is LIMGTB. Most interrupts generated by contact closure inputs are processed by a conventional sequence of events program 11064 (FIG. 11A). The program 11064 keeps a record of the order in which interrupt-generating contact closure inputs change their status and also updates portions of the contact closure input hardware image table LIMGTB. A contact closure output handler 11061 in FIG. 11A alters the status of the system contact closure outputs at the request of any program within the system. This same handler routine is also able to service digital-to-analog outputs of the system. A typical digital-to-analog converter comprises a network of resistors which converts a binary number into an analog signal. Such a converter has a binary number input which is connected to an array of the system contact closure outputs, and it has an analog signal output. By presenting appropriate data bits to the array of contact closure outputs, the contact closure output handler 11061 is able to generate any desired analog signal output.

3. SYSTEM IMPLEMENTATION OF THE INVENTION

A. METAL ROLLING MILL

In FIGS. 3A-3E there is shown a computer controlled multiple stand metal reduction rolling mill 1100 which is operated in accordance with the principles of the invention.

At the entry end of the mill, a downender 1102 is provided for positioning coils on an entry conveyer 1104. The downender 1102 is operated by a hydraulic cylinder 1103 through UP, DOWN, and STOP pushbutton switches to accept crane delivered coils and to place the coils on the conveyor 1104.

The entry conveyor 1104 is electric motor driven to advance the coils through successive indexed positions CP1 through CP6. It is operated through INDEX FORWARD, STOP, JOG FORWARD and JOG REVERSE pushbutton switches.

Figure 3C:
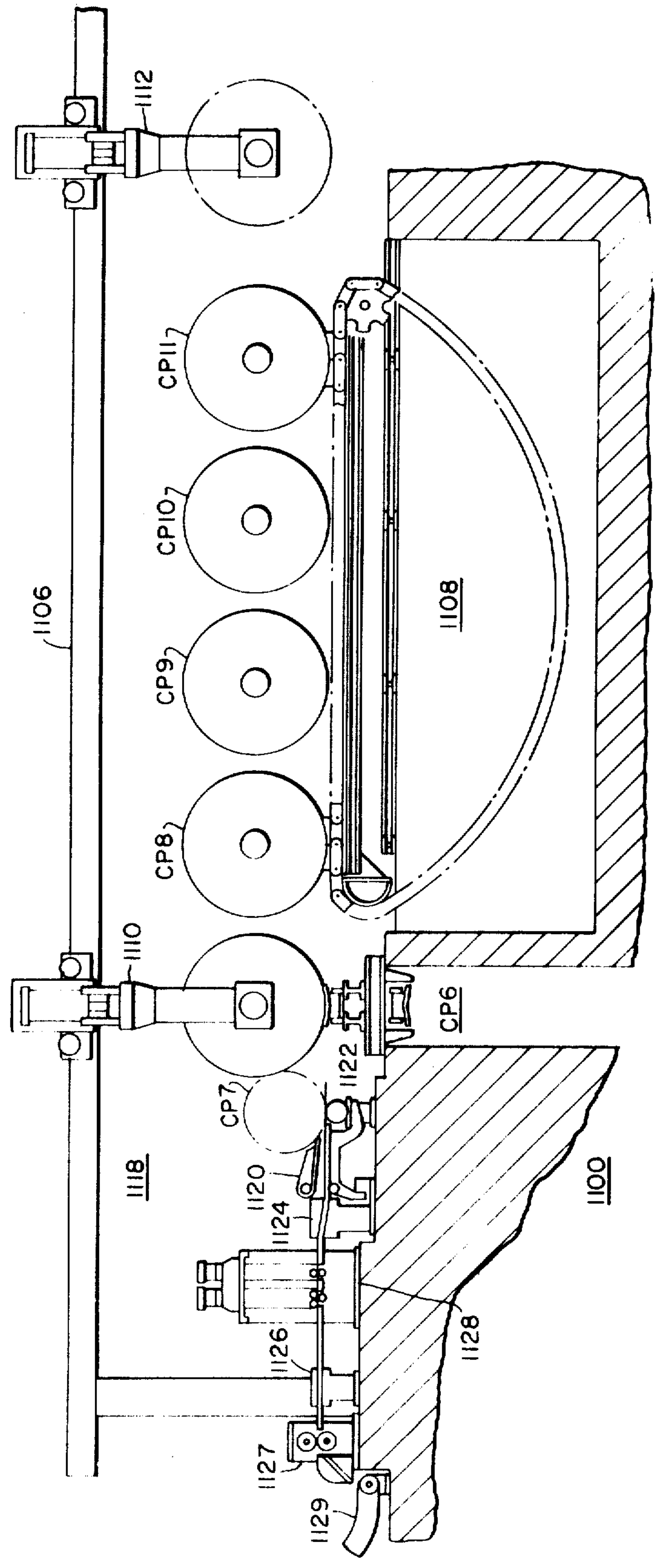
Figure 3D:
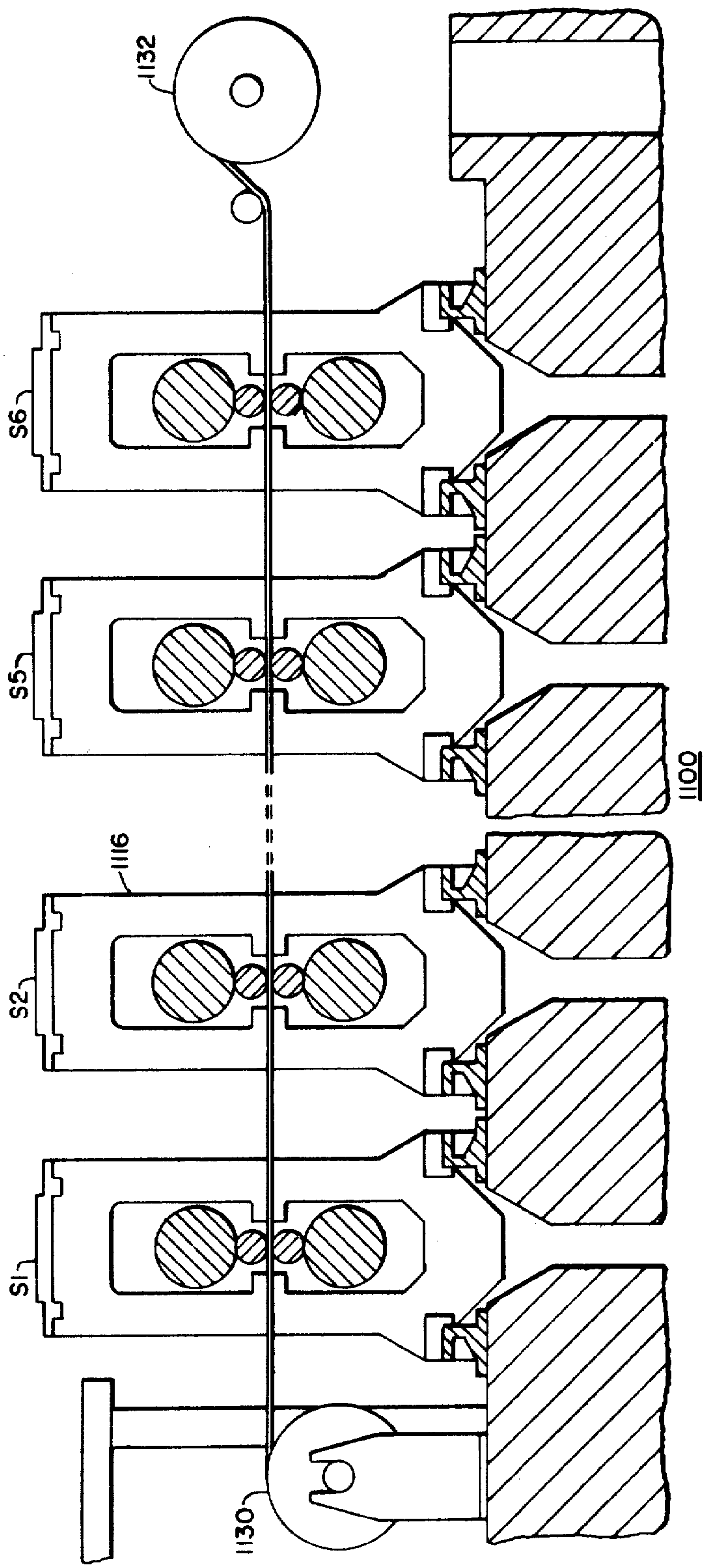
Figure 31:
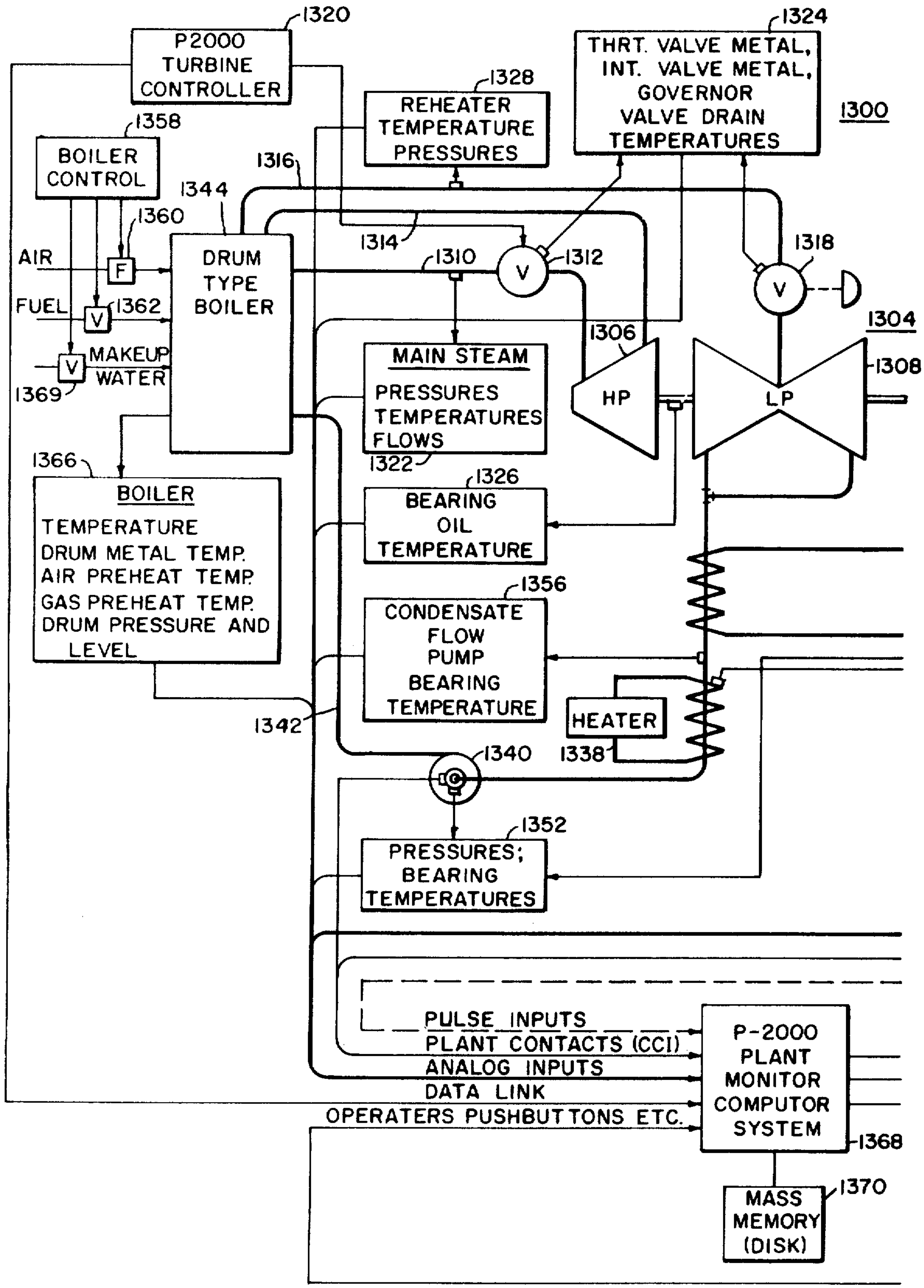

When a coil reaches the conveyor position CP6, a stiff leg crane system 1106 (FIG. 3C) is operated to process the coil through strip tail pulling and removal functions and to transfer the prepared coil to an electric motor operated storage conveyor 1108 (FIGS. 3A and 3C). The stiff leg crane system can operate in any of five selectable modes. Thus, it can operate automatically with each of two cranes 1110 and 1112 in service; manually with both cranes in service; manually with one crane in service; automatically/ manually with both cranes in service and one crane selected for automatic operation and the other crane selected for manual operation; and automatically/manually with one crane in service with automatic operation in its home area and manual operation elsewhere.

The crane 1110 normally works coil transfers in the area defined by the positions CP6–CP10 and the crane 1112 normally works coil transfers in the area from the coil position CP11 to an entry end 1130 (FIG. 3D) of a reduction rolling portion 1116 of the mill 1100. Once a coil has been moved by the crane 1110 from the coil position CP6 on the entry conveyor 1104 to the position CP7 associated with a tail puller 1118, the mill operator threads the strip tail into the tail puller 1118 as shown in FIG. 3C, i.e. the strip is passed over a traction roll 1122 through a coil opener 1120, pinch rolls 1128 and between sideguides 1124 and 1126. The strip is then directed through an electric motor operated shear 1127. A TAIL PULLER INITIATE pushbutton switch is used to initiate the tail pulling operation.

A determination is made as to how much of the strip tail is to be removed for rolling operations, coil is unwound to that extent, the shear 1127 is operated and a scrap conveyor 1129 carries the cut end piece to a scrap container (not shown).

After removal of the scrap tail piece, the coil is rewrapped and a coil-to-storage cycle is initiated by a pushbutton switch. The coil is then automatically moved by the crane 1110 to the coil position CP8 on the storage conveyor 1108.

Coils are sequenced along coil positions CP8-CP11 on the storage conveyor 1108. The storage conveyor 1108 traverses one complete index position when the storage conveyor FORWARD pushbutton switch is depressed. A STOP pushbutton switch can be used to stop the storage conveyor indexing cycle.

After a coil reaches the last storage conveyor position CP11, it is transferred for processing through a plurality of strip reduction stands in the rolling position 1116 (FIG. 3D) of the mill 1100. In this case, six stands S1–S6 are provided. The coil is threaded through the stands S1 through S6 from a payoff reel 1130 and it is delivered to a takeup reel 1132.

The metal strip is threaded through the mill 1100 at mill thread speed with the stand rolls at preset screwdown positions which provide preset roll gaps through which the strip is transported. The mill speed control system operates the stand motors M1–M6 (FIG. 3B) during threading, during acceleration of the mill to run speed, during mill operation at run speed until sufficient strip is processed to require deceleration, and during deceleration of the mill back to thread speed for strip tail processing.

The winding of the delivery strip on the takeup reel 1132 is performed under regulated strip tension for delivery gauge control. Once the coil has been passed through the mill, and taken up on the reel 1132, the strip is reduced in thickness and the reduced coil is transferred to a delivery conveyor 1134.

In FIG. 3E1, there is shown a computer control system 1136 which is used in conjunction with the described equipment to operate the mill 1100. The computer control system includes in this case a P2000 computer system 1137 and a P250 computer system 1139 both of which are sold by the Westinghouse Electric Corporation. The structure of the P2000 computer system is considered in greater detail elsewhere in the present specification and further information on the application of P250 computer systems can be obtained by reference to a copending application WE 41,236I entitled "Hybrid Computer Sys em and Method For Rapidly Generating Electric Power System Loadflow Solutions", filed by D. M. Egelston, M. K. Enns and J. C. Russell on Aug. 26, 1971 and assigned to the present assignee.

Generally, the P2000 computer system 1137 is configured to operate as a mill logic director in performing mill sequencing and like functions and to provide position regulation for certain positionable items of equipment in the entry, exit and rolling portions of the mill 1100. Thus, position regulation is provided for equipment items including cranes, sideguides, roll screwdowns, etc. The director system employs the logic initiator program, the subtask processor, and other elements of the program system considered in FIG. 1 along with the logic control chains which are entered into the file system within the P2000 computer 1137 with employment of a control chain generator program, the file loader program, etc.

In general, the P250 computer system 1139 functions within an automatic gauge control system and generates position setpoints which are transmitted to the P2000 computer 1137 through a data link 1138 in connection with some of the position regulated equipment items. The P250 computer system 1139 also provides other mill operating functions including mill speed and roll gap scheduling, mill speed and acceleration control, tail out operations, data logging, strip in stand logic and other functions. Greater detail on the P250 interaction with the mill 1100 will not be presented herein since only the substantially separately functioning aspects of the P2000 computer system 1137 involve process operations in accordance with the principles of the present invention.

The P2000 computer system 1137 is provided with a conventional contact closure input system 1140, a contact closure output system 1142 and a conventional analog output system 1144 in order to process input and output signals to and from the P2000 central processor. A conventional interrupt system 1146 interfaces the slower peripheral systems with the central processor.

Operator panels 1148 including those at stations CS1, CS2 and CS3 at the entry end of the mill (FIG. 3A) provide various selector switches and various pushbutton switches which are used to initiate automatic operating cycles for mill equipment items. Display devices 1150 include indicator lights and other elements to indicate the status of various mill conditions or mill equipment items. A typewriter 1152 and a tape reader and punch 1154 are provided for programmer console operations.

Sequence contacts 1156 which initiate various mill operations are applied as inputs to the P2000 computer system 1137. As shown, the contacts 1156 include the operator panel pushbutton switches and mill contacts which transmit the status of various mill equipment items. In the logic director system, the P2000 computer 1137 employs the logic initiator and other programs in conjunction with entered chain files to produce predefined operations of mill equipment items 1158 through the output systems 1142 and 1144 in accordance with operations of the input sequence contacts 1156.

To illustrate the invention more fully, greater detail will now be presented on the logic director operation of the equipment items associated with the entry portion of the mill 1100 and the manner in which that operation comes into being through the method and apparatus aspects of the invention.

Computer outputs are variably implemented by the mill entry equipment items. The downender hydraulic cylinder 1103 is placed into operation by a contact operated solenoid in order to move the downender 1102 in the upward and downward directions. The entry conveyor 1104 is provided with a two speed motor which is supplied with power or not supplied with power to produce conveyor motion according to the status of a computer output contact. Many computer contact closure outputs are also associated with various indicator lights. Mill input contacts include position indicator cam switches associated with the downender hydraulic cylinder 1103 and a position indicator cam switch located near the entry conveyor motor to provide the feedback information needed for entry conveyor indexing operations.

The stiff leg crane system 1106 is provided with position regulated electric hoist motors and position regulated electric traverse motors respectively for moving the cranes 1110 and 1112. In addition, each crane is provided with contact operated cone motors to move the crane legs into and out of engagement with the coils. The cranes are further provided with contact operated motors which provide for cone rotation as well as respective cone clutches wich are disengageable and engageable at the tail puller location for tail pulling operations.

A hold down roll associated with the stiff leg crane system 106 is positioned by hydraulic cylinder having a contact operated solenoid. Mill contacts associated with the stiff leg crane system 106 include photocells located on the crane legs above the cones for coil diameter measurement purposes as well as travel and slowdown limit switches associated with the hoist and the traverse paths of motion. Other contacts include one which is operated by a sensor which indicates when cone motor armature current rises to a point where it signifies cone-coil engagement.

Operated equipment items in the tail puller 1118 include the sideguides 1124 and 1126 which are driven by position regulated motors. The pinch and flattener roll gap is determined by hydraulic positioning of the rolls 1128, and a contact operated electric motor provides drive power for rotating the pinch and flattener rolls 1128. The shear 1127 and the scrap conveyor 1129 are respectively operated by contact actuated electric motors. Mill contacts associated with the tail puller equipment items include pinch and flattener roll up and down limit switches, a traction roll limit switch which is employed in making a relatively accurate coil outer diameter measurement, and sideguides out and in limit switches.

The entry and sequencing operations which are performed in response to operator pushbutton operations and in response to mill and coil conditions are set forth in greater detail in Appendix 5. A specification for input mill contacts and pushbuttons and output contacts associated with the entry sequencing operations is set forth in Appendix 4.

Performance of the mill entry end sequencing operations is enabled by the programmed configuration of the P2000 computer 1137 resulting from the computer entry and linking of logic control chains which define the desired mill operations in the systems engineer's language. Macros employed in the control chain generator (FIG. 1) and the generation of intermediate logic control chain files from the engineer's input logic control chain files are set forth in Appendix 3. A schematic representation of the on-line (loaded and linked) program system organization is shown in FIG. 3E2. As shown, files loaded into the file system are called for execution by the logic initiator after a mill or internal trigger has occurred. The executive and its sublevel processor initiate execution of the identified file by the control chain processor. Outputs are processed by the executive CCO Handler.

The logic control chains, which provide even greater detail on the mill entry sequencing than that set forth in the functional description in Appendix 5, are set forth in Appendix 1. A detail control chain generator program like that subsequently described more fully herein is employed to generate the intermediate logic control chain files. Similarly, a file loader program like that subsequently described more fully herein is used to load and link the intermediate logic control chain files, i.e. to perform functions including storing the files in a file system like that described subsequently herein, linking the files into the executive system including a sublevel processor like that subsequently described herein, linking the files to the logic initiator program and establishing specified file triggers, and providing for control chain processor program implementation of logically initiated files during mill operations. A detailed listing (i.e. a core dump) of the loaded logic control chain files is set forth in Appendix 2. Automatically loaded and linked logic control chain files provide substantial process and computer system setup economy and flexibility yet function within the overall mill system to provide accurately and efficiently the computer control functioning needed for logic director system operations in accordance with the systems engineer's specifications for the mill process operations. Logic operations are implemented by the software scanning operation of the logic director system with relatively reduced computer duty cycle as a result of logic initiator operations which avoid unnecessary chain executions in accordance with existing logical conditions in the mill and in the computer.

B. METAL ANNEALING FURNACE

In FIGS. 3F–3H, there is shown a digital computer controlled metal coil annealing furnace plant 1200. The plant 1200 includes a furnace 1202, other like furnaces (not shown) and a P2000 computer control system 1204. The coils may be formed from steel strip for example, and they are processed through the furnace 1202 to impart metallurgical properties to the strip in accordance with predetermined specifications.

The annealing furnace 1202 is provided with a chamber 1206. The furnace operator can load up to four coils in the chamber 1206 by crane or other means, and after loading the furnace operator is free to provide a GO signal to the computer 1204 to initiate annealing operations.

The interior space of the furnace 1202 is divided into four independently controlled heating zones as indicated in FIGS. 3G1 and 3G2. Normally, one coil is disposed for annealing in each furnace zone.

As illustrated in FIG. 3G3, molybdenum heater strips 1210 are disposed on standoff insulators about the interior surfaces of the furnace chamber walls. Electric power is supplied to the heater strips through cables 1214.

Electric power is obtained from a suitable source 1218 through contactors 1219 and conventional silicon controlled rectifiers 1220 which are placed under computer directed gate control. Thus, respective zone power requirement signals are generated under computer control to provide electric heating power through the respective silicon controlled rectifiers for the respective furnace zones.

Furnace temperature control is provided by the digital computer 1204 in control loops which employ various sensed plant parameters. An operator's panel 1260 provides an interface for the furnace plant operator, i.e. through selector pushbutton switches, displays, etc. A manual/automatic station 1262 is provided for each furnace in the furnace plant 1200 in order to provide a backup manual furnace operating capability. Computer controlled gates 1264 direct a single manual select output signal from the computer 1204 to those furnace manual/automatic stations which are selected for manual operation. Further consideration of the furnace operation is limited herein to the temperature control operations since those operations pertain to the invention.

Input signals to the temperature control portion of the digital computer 1204 are analog signals from the respective furnaces in the annealing furnace plant 1200. Furnace temperature sensors 1266 provide feedback information for temperature control in the respective furnace zones. Zone feedback signals 1272 are representative of the respective signal demands being placed on the silicon controlled rectifiers for furnace heating in various furnace zones thereby facilitating transfer between manual and automatic operations.

As previously indicated, output signals from the digital computer 1204 are applied to the gate controls for the zone silicon controlled rectifiers to control the amount of electric power applied to the heater strips in the various furnace zones.

A schematic diagram of each furnace temperature control loop is shown in FIG. 3F. Thus, redundant zone temperature signals are applied to a high value selector block 1280 and the highest temperature signal is then applied to a difference arithmetic block 1282 for generation of an error signal representative of the difference between a scheduled temperature signal and the high value temperature feedback signal. A proportional plus integral plus derivative controller block 1284 then operates on the temperature error signal and generates an output which is applied to the gate control for the pertaining zone silicon controlled rectifier through the associated manual/automatic station for zone temperature correction. For more detail on computer input and output signals, reference is made to Appendix 6 for a computer printout of an input/output list pertaining to a particular reduction to practice of the furnace plant 1200. In the first column of the list, the first two characters of a number indicate whether a particular signal is an input or an output. Thus, if the first two characters are A1 the signal is an input, and if the first two characters are A0 the signal is an output as on the last page of Appendix 6. The signals A001 through A008 correspond to a single computer output signal which is multiplexed over different physical paths to the different furnace controls according to the signal address.

The furnace temperature operating schedule is defined by programs loaded into the computer independently of the data file generator and the control chain generator and the file loader. The schedules are defined by the user and are readily implemented in computer program form. Thus, the temperature schedule for all zones in a furnace may be identical and it can simply be a ramp function from the existing temperature value up to a preselected value at which it is held until it is ramped down at the end of furnace operations. In the alternative, several ramp and hold steps can be involved in either or each of the temperature rise and decline operations. The temperature schedule program generates its software output as a time function generator, i.e. in response to an input from the computer clock.

Generally, temperature control is implemented with analog control chains to provide scheduled furnace temperature operations under the control of the data file processor program which performs periodic analog signal scans. In other applications, the temperature control chains or other types of control chains could be placed into operation periodically by an auxiliary synchronizer program. The analog control chains employed herein are threaded directly into previously defined monitor data file subtask linkages which correspond to groups of monitor data files operated upon by the data file generator and loaded and linked in the computer by the file loader into periodically executed subtasks.

An illustration of a mass memory resident subtask linkage of monitor data files is shown in FIG. 3H2, and FIG. 3H3 illustrates the same linkage after analog control chains have been threaded into it. In the linkage, analog points 1 and 2 correspond to two different sensors which provide temperature signals for the same furnace location. After the analog point 1 monitor data file is processed, a high select control chain is executed to compare the new point 1 value with the last point 2 value. The highest value is stored as the calculated value. Next, the analog point 2 monitor data file is processed and a high select control chain is executed to compare the new point 2 value with the last point 1 value. The highest value is stored as the calculated value and the associated calculated value file is then processed. The 3 mode control chain is then executed with use of the high selected temperature value to generate an output for temperature control in the associated furnace location. Processes similar to those just described are then implemented for analog points 3 and 4 at another furnace location. Since the analog control chains are threaded into the linkage, they are executed in response to the reading of the analog signal inputs or the processing of calculated values rather than under direct subtask processor control.

The analog control chains are generated by a control chain generator program like that described elsewhere herein on the basis of control chain definitions which include process and global variables and which call upon algorithms selected from an algorithm library in accordance with user needs. Data files are independently generated by a data file generator program described elsewhere herein. The control chain and data file generator outputs are intermediate file structures which are loaded and linked in the computer by a file system loader like that described herein thereby threading the analog control chains into the subtask linkages or monitor data files for on-line operation. Appendix 8 provides a program listing for a proportional plus integral plus derivative algorithm employed in the furnace zone temperature control loops. In Appendix 9, there is provided a printout of analog control chains written for operation of the previously referenced particular embodiment of the furnace plant 1200. At the beginning of Appendix 9, there is provided a list of the macro deck used for the furnace control chains. Appendix 7A sets forth an input/output listing of analog variable file definitions written for the furnace plant 1200 and generated for computer loading by the data file generator program. Appendix 7B sets forth calculated value file definitions generated by the data file operator program. Appendix 10 provides a loaded file dump corresponding to the results of control chain and data file generation and file loading of the chains set forth in Appendix 9.

FIG. 3H1 shows the on-line program organization within the digital computer 1204 after program and file loading. The illustrated program system functions to provide furnace operations in the manner described.

C. DATA MONITORING SYSTEM FOR ELECTRICAL POWER PLANT

Figure 3J:
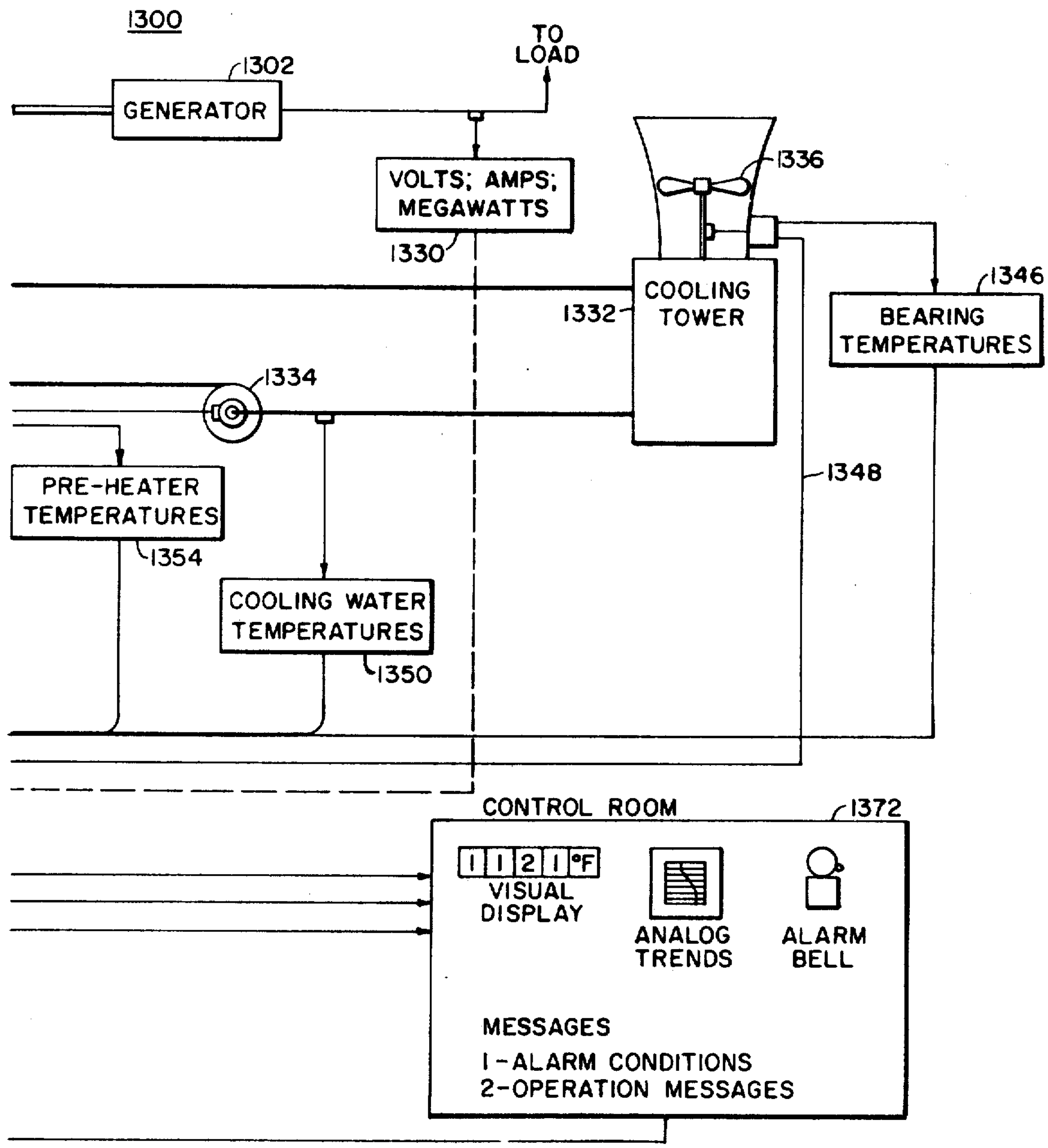

In FIGS. 3I and 3J, there is shown a digital computer monitored electrical power generating plant 1300. Electrical output is produced by a generator 1302 which is driven by a steam turbine 1304 having high pressure and low pressure turbine sections 1306 and 1308.

Steam is supplied as a working fluid under regulated throttle pressure supply lines 1310 and throttle and governor valves 1312 to the high pressure turbine section 1306. The steam flows through a reheater line 1314 from the high pressure turbine section 1306 to a reheater and thereafter through line 1316 and an interceptor valve 1318 to the low pressure turbine section 1308.

Turbine speed and load are controlled by a digital computer controller 1320 which positions the turbine throttle and governor valves 1312. Monitor sensors provided for the turbine-generator system and the main steam supply lines include main steam pressure, temperature and flow sensors 1322, temperature sensors 1324 for throttle valve metal, interceptor valve metal, and governor valve drain, turbine bearing temperature sensors 1326, sensors 1328 for reheater temperature and pressures, and generator electrical output sensors 1330. Further details on the control and operation of the turbine 1304 is not needed since it is beyond the scope of the power plant monitoring system.

Vitiated steam is directed from the low pressure turbine section 1308 to a condenser where cooling water is used to absorb and carry heat of condension to a cooling tower 1332. Pumps 1334 drive the cooling water and a plurality of fans 1336 are used in the tower 1332 to transfer heat from the cooling water to the atmosphere.

After condensation, the working fluid is returned in the form of water through a preheater 1338, boiler feed pumps 1340 and return lines 1342 to a conventional drum type boiler 1344. Monitor sensors provided for the water return system include temperature sensors 1346 for cooling tower fan bearings, fan motor contact closure inputs 1348, sensors 1350 for cooling water temperature, pressure and bearing temperature sensors 1352 for the boiler feed pumps 1340 and the cooling water pumps 1334, temperature sensors 1354 for the preheater 1338, and sensors 1356 for condensate flow and condensate pump bearing temperatures.

In the boiler 1344, air and fuel such as natural gas are supplied to a combustion process to produce the heat needed to generate steam from the return and any makeup water. A conventional drum type boiler control system 1358 is employed to control the air, fuel and water supplies by means of fans 1360 and valves 1362 and 1364. Boiler operations are directed to supplying steam flow demand through the turbine supply lines 1310 under regulated throttle pressure and temperature. Boiler monitor sensors include sensors 1366 for boiler tube temperatures, drum metal temperatures, air and gas preheat gas temperatures, and drum pressure and level.

The power plant monitor system includes a P2000 digital computer system 1368 having a mass disk memory 1370. Plant contact inputs to the monitor computer 1368 include contacts from motors for the boiler feed pumps and motors for the cooling tower fans. Pulse inputs to the monitor computer 1368 include those from the generator electrical output sensors 1330. Analog inputs to the monitor computer 1368 include outputs from the boiler, turbine-generator, and return water sensors already considered. As indicated, a data link is provided between the P2000 turbine controller 1320 and the plant monitor computer 1368. Certain plant variables are not indicated as being sensed even though they are sensed in the actual plant since they are sensed for turbine or boiler control or other particular purposes outside the plant monitoring system.

Outputs from the digital monitoring computer 1368 include typewriter printouts, contract closure outputs for alarms and visual display and analog outputs for operation of instrumentation such as trend recorders. A control room panel 1372 provides the displays and pushbuttons needed for operator interface with the monitor computer 1368.

Once the plant 1300 has been engineered with a definition of the variables to be monitored and the uses to be made of the monitor results, the format described elsewhere herein is used to prepare data files for each of the sensed variables applied as inputs to the monitor computer 1368. The resultant files are processed in the computer 1368 or an off line computer (not indicated) by a data file generator program like that described elsewhere herein. The resultant intermediate files are loaded into the file system with the linkages needed for on line monitor operation of the files as they are loaded and linked.

Figure 3K:
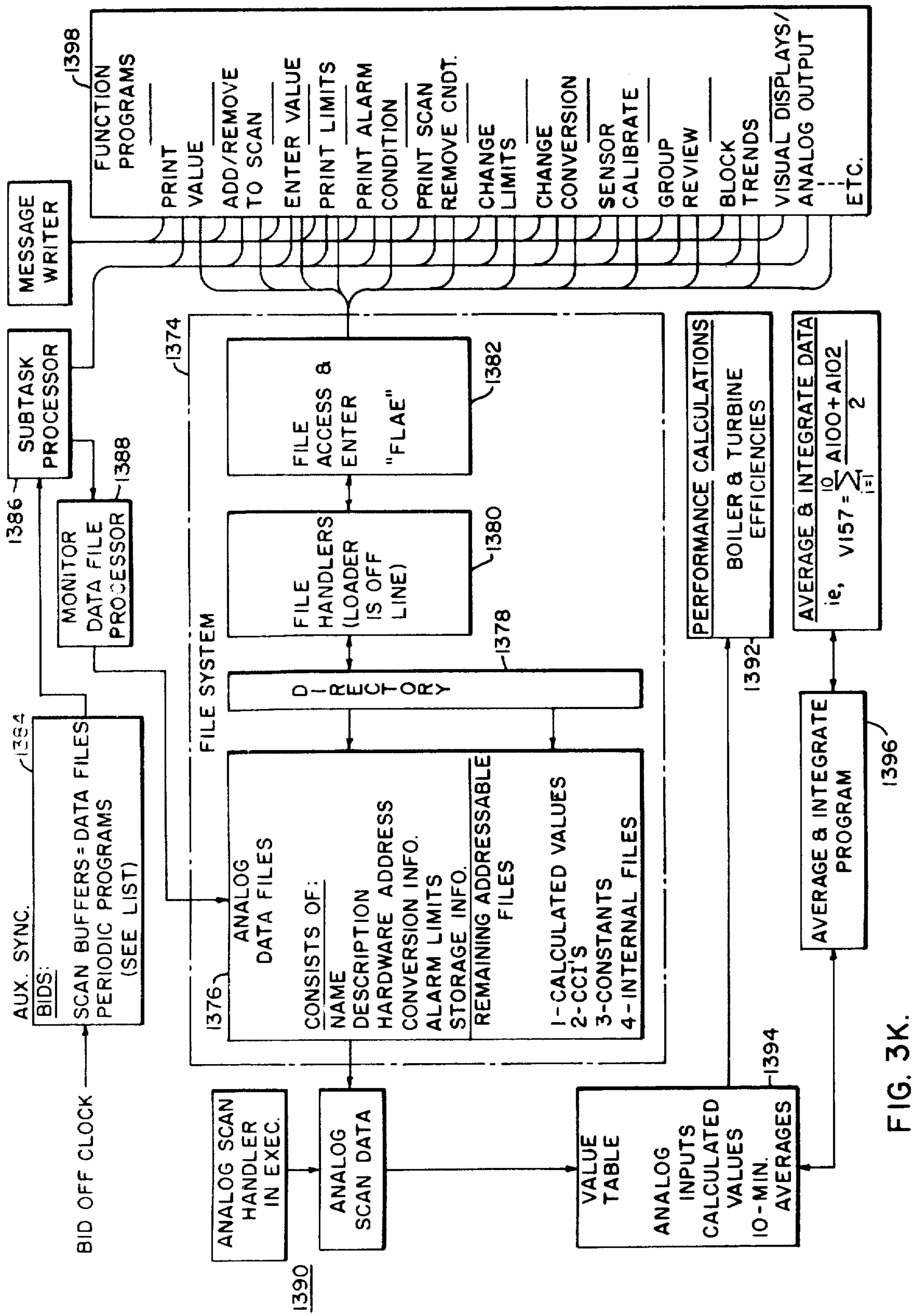

As shown in FIG. 3K, the on line program system includes a file system 1374 having the entered data files 1376 and a file directory 1378, file handlers 1380 and file access and enter programs 1382 like those considered elsewhere herein. An auxiliary synchronizer program 1384 bids for monitor data file processing through a subtask processor 1386 and a monitor data file processor 1388. Data for files in process is obtained through the analog scan system 1390. The auxiliary synchronizer 1384, the processors 1386 and 1388 and the analog scan system 1390 are like those considered elsewhere herein.

A performance calculation program 1392 is prepared and entered through a program loader program like that considered in connection with FIG. 1. The performance calculation program 1392 generally is automatically interfaced with the on line program system to operate on analog values in a value table 1394 and generate calculated boiler and turbine operating efficiencies. An average and integrate program 1396 is used to produce average value entries in the value table 1394. Functional details on the programs 1392 and 1396 are not needed for an understanding of the monitoring system implementation of the invention.

Function programs 1398 in the on line program system include those set forth in FIG. 3K. Generally, the function programs 1398 provide for operator interaction with the on line program system.

A more complete list of all programs in the on line program system and a core map like that for the monitor computer 1368 are set forth in Appendix 14.

In Appendix 13, there is set forth a complete input signal list for the monitor computer 1368. Many of the listed signals are denoted by the various sensor blocks in FIGS. 3I and 3J. In Appendix 12, there is set forth a listing of calculated value files, contact closure input files and analog data files for analog points from A100 up through A380. The listing sets forth the input and loaded file specifications. Other analog points up through A571 and other calculated value files are similarly specified.

4. COMPUTER SYSTEM ORGANIZATION

Figure 4:
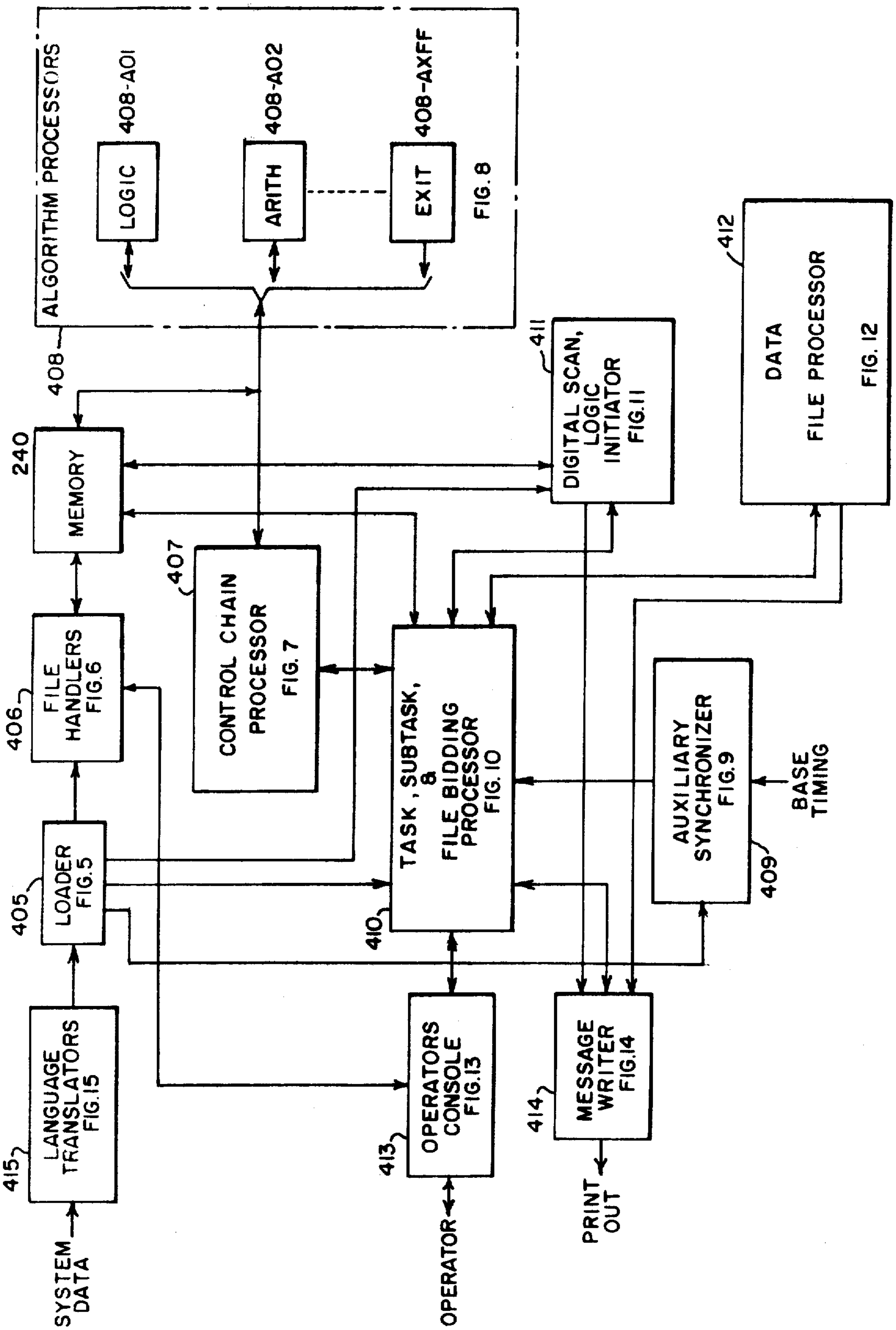
FIG. 4

FIG. 4 illustrates in block diagram form the arrangement of computer programs which enable the computer system to implement specific control or data monitoring functions when supplied with process variable data files and control chains written out in the language of the systems engineer. Most of the computer programs shown in FIG. 4 also appear in FIG. 1. However, the file handlers 406, the algorithm processors 408, and the message writer 414 in FIG. 4 do not appear separately in FIG. 1. In the present embodiment, all of the computer programs shown in FIG. 4 reside within the computer system 102 with the possible exception of the language translators 415. The language translators 415 correspond to the file generator 130 shown in FIG. 1 and may reside in some other computer system.

Sections 5 through 15 of this description present a detailed explanation of the eleven computer programs shown in FIG. 4. Each of the sections 5 through 15 describes one of the programs shown in FIG. 4. In FIG. 4, the reference number attached to each of the computer programs 405 to 415 is a combination of the number 4 plus the section number of the section which describes that same program. For example, Section 5 describes the loader program 405, Section 6 describes the file handlers 406, and Section 7 describes the control chain processor 407. The figure number within each computer program block shown in FIG. 4 indicates which figure or group of figures disclose the details of that same program. For example, FIGS. 5A to 5K disclose the details of the loader program 405, FIGS. 6 to 6/810 disclose the details of the file and directory handlers 406, and so on. FIG. 4 enables one to determine at a glance how the various computer programs relate to one another and where a detailed description of each computer program may be found.

The following table indicates the relationship of the programs shown in FIG. 4 to the elements of FIG. 1:

| ELEMENT | REFERENCE NUMBER (in FIG. 4) | REFERENCE NUMBER (in FIG. 1) |
|---|---|---|
| File loader | 405 | 146 |
| File handlers | 406 | 146 |
| Control chain processor | 407 | 160 |
| Algorithm processors | 408 | 160 |
| Auxiliary synchronizer | 409 | 154 |
| Subtask processor | 410 | 156 |
| Digital scan & logic initiator | 411 | 158 |
| Data file processor | 412 | 162 |
| Operator's console | 413 | 122 |
| Message writer | 414 | 122 |
| Language translators | 415 | 130 |

Most of the programs shown in FIG. 4 are described briefly in Section 1. A more detailed description of each program may be found in the accompanying figures and in the section of this description which is devoted to the program. Those few programs shown in FIG. 4 which have not been previously described separately are described briefly below.

The file and directory handler programs 406 comprise a group of subroutines which control the transfer of files and of data between other system programs and the file storage area 150 (FIG. 1), the file directory 148 (FIG. 1), and the global storage area 152 (FIG. 1) all of which are within the memory 240 (FIG. 4). The purpose of the file and directory handler programs is to establish and to maintain file and directory storage areas of the type which are described briefly in Section 1. The first half of Section 6 is a detailed description of the file handling subroutines, and the second half of Section 6 is a detailed description of the directory handling subroutines.

The operator's console program 413 uses the file and directory handler programs 406 to find and to alter data stored within the file system at the request of the system operator. The operator's console program is not a single program but is a collection of programs designed to carry out specific monitoring and system modification tasks. Section 13 describes the program 413.

The message writer program 414 is a common data output program for all of the programs shown in FIG. 4. Any of the programs shown in FIG. 4, or any other program within the operating system, may call upon a subroutine within the message writer program 414 and transfer to that subroutine data which is to be printed out. The subroutine stores this data in tables within the message writer program 414. At a later time, the message writer program 414 executes an orderly printout of all such data. The message writer program 414 is described in Section 14.

Interrupt routines are a normal part of any process control system. Typically, the interrupt routines must be tailored to the particular process which is to be carried out and thus the routines are not standardized. In a process control system arranged in accordance with the present invention, the interrupt routines are able to place bids with the subtask processor 410 (FIG. 4) for the execution of any system subtask. They are also able to set, reset, and determine the status of logical variables using the check bit subroutine 11055 and the alter bit subroutines 11060 which are shown in FIG. 11A. In addition, they may use the file and directory handler programs 406 (FIG. 4) to retrieve data from or to return data to any system file, so long as the file name is known. They may also use the message writer 414 (FIG. 4). In these respects, the interrupt routines are greatly simplified and shortened when used in accordance with the present invention. Generally, the interrupt routines employed in accordance with the present invention are otherwise conventional. An explanation of interrupt operation may be found on pages 302 to 307 of the book "Computer Control of Industrial Process" by Emanuel S. Savas, published by McGraw-Hill Book Company, New York, New York.

5. THE SYSTEM FILE LOADER

The file loader program is a relatively short routine which: accepts from tape or other input to the program all of the data files generated by the data file generating programs, assembles the data files, and presents the assembled data files to system file establishing subroutines—the file and directory handling subroutines; subroutines within the auxiliary synchronizer, subtask processor, and logic initiator; and other system subroutines which participate in the establishment of files within the operating system. The file loader shown here is exemplary of the file building routines which may be established and run within the present system. Other embodiments of the present invention would be likely to have additional file building programs to handle other types of files and to facilitate the acceptance of files generated in different formats or generated on-line. In addition, routines similar to the file loader program and also having access to the file establishing subroutines can be put together for the purpose of removing files from the system or for the purpose of altering the arrangement of files within the system. Routines of this type may be written in Fortran or in assembly language and may call upon the full power of the present system to reorganize itself through the use of the various system subroutines. The file loader program is thus exemplary of a whole class of programs which can reorganize a system while the system is operating.

In the preferred embodiment of the invention, the file loader is arranged to work compatibly with off-line, one-pass monitor data file or control chain generating programs of the type that are described elsewhere in this specification. The file loader is arranged to accept data files which have been broken into 54-word load records and which have been formatted in a particular manner. The file loader program assembles the files within a core buffer and then transfers the assembled files to the file handler subroutines. The directory handler subroutines are also called upon by the file loader program and are used to maintain a record of where each file is stored and to facilitate the establishment of linkages and interconnections between files. Other system file establishing subroutines are also called upon, as will be noted.

A. FILE LOAD RECORDS

The format of a typical file load record is shown in FIG. 5G. A group of such 54-word load records comprises the input data for the file loader program. The 54-word format is intentionally chosen to correspond precisely with the load record format used by the system program loader for the handling of conventional programs and other types of load records. The same input routines can then be used by both the system program loader and by the system file loader, and thus some simplification in the overall system is achieved.

A typical load record includes two control words at the beginning and one control word at the end of a 51-word data set. The two control words at the beginning and the one control word at the end of each load record are of no significance to the file loader program. These three control words make it possible for special load record handling routines to check for errors in the file loading process. The first control word in every load record contains the number "-106" and indicates that the load record which follows contains 106 8-bit characters or 53 16-bit words. The second control word within every load record is a sequence number. Successive load records are assigned sequential sequence numbers. As the system reads the load records, the sequence numbers may be checked by the system to insure that the load records are properly ordered and that none is out of place or missing. The final control word in every load record is a check-sum value whose purpose is to indicate the presence of parity errors in the load record.

The first two bits of the second control word in a load record are used to indicate whether the sequence number check, the check-sum check or both are to be carried out.

B. LOAD MODULES

The space within a load record that is of significance to the system file loader program begins with the third location within the load record and continues on through word 53. This space contains one or more load modules. A load module is a directive to the system file loader and it may or may not contain data values for incorporation into a file.

Typical load modules are shown in FIG. 5G. The first word in each module is called the load module director. The director contains an indication of the load module type and an indication of how many 16-bit words are included within the module, not including the director. The remainder of each load module contains data values. It is the function of the file loader program to assemble files in accordance with the directives contained in load modules and to establish these files within the operating system using the file and directory handler subroutines, the sublevel processor program, the auxiliary synchronizer program, the logic initiator program, and other system subroutines.

The file loader is in the present case arranged to expect ten different types of load modules. The formats of these load modules are illustrated in FIG. 5H. Groups of load modules are combined into data packages no more than 51 words in length and are supplied to the file loader program in the form of load records of the type shown in FIG. 5G.

Each individual file is defined by a group of load modules starting with a beginning of file load module (type 1D in FIG. 5H) and terminating with an end of file load module (type 1B in FIG. 5H). If a plurality of files are to be defined, each file is defined by a group of load modules and the groups are fed serially to the file loader program. The lengths of the load modules must not exceed 51 words so that the load modules may be grouped into load records in the manner shown in FIG. 5G. If a load record contains less than 51 words of load modules, the last module within the load record is followed by a word containing all zero bits. This word is interpreted as an end of load record load module (type "0" and length equal to "0" in FIG. 5H) by the file handling program and signals the end of the useful data within a load record. The last module in the last load record is called a last module (type 2 in FIG. 5H). The last module terminates execution of the file loader program.

With reference to FIG. 5H, the beginning of file module (type 1D) contains a 6-letter file name and a file type number. In addition, this module may contain any of the following information that is pertinent to a given file: analog-to-digital converter number; subtask number; bidding period; bidding frequency index; and an indication of whether the file is to be core resident or stored on a disk sector. All of this information is needed by the file establishing subroutines for the proper establishment of the file within the operating system, but none of this data is actually a part of the file itself.

The actual data which forms a body of each file is transferred to the file loader program as part of a file data module (type 1 in FIG. 5H). In general, the file data is not altered by the loader but is simply passed directly to the file handlers as part of the body of the file itself.

It is not uncommon for files to make reference to system process variables or to system global variables using the symbolic names of the variables. Any reference to a variable by name is supplied to the file loader program in the form of a symbol reference module (type 1C in FIG. 5H). The symbol reference module includes the 6-letter proper name for the symbol or variable, an indication as to what type of variable is referenced, and a pointer to the relative location within the file where the symbol address is to be placed. In addition, if the symbol is a global variable which is defined for the first time, the symbol reference module includes an indication as to how much storage space is required for the variable and may also include any initial values to which the variable or the variable array is to be initialized other than zero values. The pointer is an index relative to the beginning of the file and points to the location where the variable address is to be stored. The location in which the variable address is stored may contain either zero, or it may contain a second pointer to another location within the file where the variable address is also to be stored. A single symbol reference module may thus be used to place the address of a symbol into several locations within a file.

The file generating programs employed in the present case are one-pass programs which pass through the systems engineer's file defining data only once. It is impossible for one-pass programs to know at the time when the load modules for the beginning of a file are created the addresses of data contained in load modules for the end portions of the same file. The loader program therefore has the capability of establishing such inter-file linkages as cannot be established directly by the file generating programs. An address link module (type 9 in FIG. 5H) is used to establish such linkages. The address link module appears at a time when the file address which must be referenced is about to be loaded with file data, or it may occur at any time following an alter load point module as will be explained. The address link module contains a pointer to an earlier file location into which the file address which is about to be loaded is to be placed. The earlier file location may either contain zero or a pointer to another location, and in this manner an address may be placed in as many locations as is desired. Generally, forward references are established by the file loader program, and backward references are established by the file generating programs.

While the file loader program usually loads file data into a file in the same order the data is received, the program does include a provision whereby data may be loaded into the file at any desired point. For this purpose, an alter load point module (type zero, length equal to "1" in FIG. 5H) is provided. The alter load point module contains as data a file address relative to the beginning of the file. In response to an alter load point module, the file loader program begins loading data into the file at the file address specified. An alter load point module may be used in conjunction with an address link module to establish either a forward or a backward address reference linkage.

The execution of job-defining files is sometimes triggered either by a change in the state of a system logical variable or by the processing of some other triggering file. A trigger module (type 1E in FIG. 5H) is defined for each triggering file or logical variable. Each trigger module contains the name of the file or of the variable which is to trigger execution of such a job-defining file.

For any number of reasons it may be desirable to cancel the creation of a particular file. The occurrence of a cancel module (type 1F in FIG. 5H) anywhere among the modules which define a file causes a complete cancellation of the loading of that file.

C. OVERVIEW OF THE FILE LOADER PROGRAM

The file loader program appears in FIG. 5A in block diagram form. The file loader program is assigned to a task or to a subtask level within the computer system and is placed in operation in the same manner as any other system program. When program control is transferred to the file loader program, the program causes a 54-word load record (FIG. 5G) to be read from a tape or other input to the program and then loaded into a core buffer called LDRECD (FIG. 5A). A load record pointer location NMOD is loaded with the value 3 so that NMOD points to the third location within the buffer LDRECD. With reference to FIG. 5G, the third location is the load module director for the first load module within the load record. The file loader program is now ready to begin operation (step 502 in FIG. 5A).

The file loader program begins (step 508) by obtaining the module type number of the file module that is stored within the load record buffer LDRECD. The pointer NMOD points to the director of the module, and the first five bits of the director contain the module type number as is indicated in FIG. 5G. With reference to FIG. 5H, each different module has its own module type number and the module type number uniquely identifies each module. In accordance with the module type number, the file loader program calls upon one of the subroutines 510, 512, 514, 516, 518, 520, 522, 524 or 526 to process the module. When the module has been processed, the number stored in the location NMOD is increased by the module length LN plus 1 to that NMOD points to the load module director of the next module within the load record LDRECD (step 504). A check is then carried out (step 506) to see if the number stored within NMOD is greater than or equal to 54. If NMOD contains a number less than 54, the end of the load record has not yet been reached and program control is transferred to 508. The next load module is then processed by an appropriate subroutine. Operation continues in this manner until the value stored in NMOD finally exceeds or equals 54. When NMOD is greater than or equal to 54, another load record is read into the buffer LDRECD and the number 3 is again placed into the location NMOD (step 502). The entire operation continues in this manner until a "last" module (type number 2 in FIG. 5H) is encountered. The last module is processed by a last module subroutine 514. The subroutine 514 terminates execution of the file loader program and returns program control either to the system sublevel processor or to the system executive.

If a given load record is not completely filled but contains empty space towards the end of the load record, the empty space is filled in with 16-bit zero words. The first of these zero words is detected (step 508) and is interpreted as a module of type number zero and of zero length following the last normal load module within the load record. A subroutine 510 is called upon to process the module, since the module type number is zero. The subroutine 510 checks to see if the length of the module is also zero. When the module length is also found to be zero, the subroutine 510 knows that no more modules are to be found within the load record. The subroutine 510 sets NMOD equal to 54 and transfers control via step 506 back to step 502. The step 502 reads the next load module into the buffer LDRECD.

Whenever a file data module (type 1 in FIG. 5H) is encountered, a file data module subroutine 512 is called upon to load the file data directly into a core buffer NFILE and to advance an NFILE load point pointer LDLOC so that the load point pointer LDLOC always points to the next empty location within the core buffer NFILE. In this manner, the file is created within the buffer NFILE by the file loader program. When all of the file data has been loaded into the buffer NFILE, the loader pointer LDLOC points to the end of the file and contains a number equal to the length of the file.

An alter load point module (type zero with length equal to one -- FIG. 5H) is used to alter the numeric value stored in the location LDLOC. The single data value accompanying the alter load point module is stored in the location LDLOC and thus allows file data to be placed anywhere within a file. For example, if a file data load module (type 1) contains data which is to be loaded in the file beginning with the sixth location within a file, the file data load module is preceded by an alter load point module containing the directive to store "5" in the location LDLOC. Since the alter load point module has a type number of zero, it is processed by the subroutine 510. The subroutine 510 distinguishes an alter load point module from an all-zero end of load record module by the fact that the length of an alter load point module is equal to "1" while the length of an end of load record module is zero.

All of the subroutines 510, 512, 514, 516, 518, 520, 522, and 524 check the state of a flag LMT1D before doing anything else. The flag is normally not set, and so the subroutines proceed in a normal fashion. In response to a cancel module (type 1F in FIG. 5H), the subroutine 526 sets the flag LMT1D and the flag remains set until it is cleared by the beginning of file module subroutine 522 in response to the receipt of a beginning of file module. So long as this flag LMT1D remains set, all of the subroutines 510 and 526 are completely disabled and perform no other task except the advancement of the pointer NMOD. A file which was partially created before the setting of the flag LMT1D is not completed and is not entered into the system. The loading of such a file is thus cancelled. In the preferred embodiment of the invention, new global variables created at the request of symbol reference modules processed before the LMT1D flag is set are not erased, but are left within the system. It would be possible to arrange the file loader program so that the actual creation of such global variables is not carried out until after the last module defining a given file is received by the subroutine 510 so that even the creation of global variables could be cancelled by the flag LMT1D.

In brief summary, the file loader program has no record of where things are stored within the system and takes no direct part in determining how the system is organized. The primary task of the file loader program is that of reassembling user-defined files within the computer for presentation to the file establishing subroutines. The file establishing subroutines do the bulk of the work of storing each file away within the system in an organized manner. The file loader does not establish triggers itself, but calls upon the sublevel processor, the auxiliary synchronizing program, the file handler subroutines, and the logic initiator program to establish the actual triggering linkages. The file loader program establishes variable address linkages between files, but does this through the use of the system file and directory handler subroutines, and thus needs no actual knowledge of where a particlar variable is stored within the system. The file loader program is exemplary of different types of programs which may be provided in accordance with the invention to configure an operating system or to rearrange an operating system without having prior knowledge of exactly where system elements are stored or knowledge of how system elements are interconnected and structured.

The remainder of this section provides greater detail on the file loader subroutines.

D. FILE ADDRESS LINKAGES AND THE ADDRESS LINK MODULE SUBROUTINE

In the present system, control chains include blocks which can perform transfers similar to the transfers executed by the "GO TO" instruction in Fortran. Blocks of this type can transfer control chain processing to any block located within the same control chain. For the implementation of such transfers, the address of one algorithm block or module is determined and placed in another algorithm module. In more general terms, the address of any location within a file is determined and is stored in at least one other location within the same file.

The addressing convention adopted within the present system is to compute all internal file addresses with respect to the first entry in the file so that the address of any location within a file is numerically equal to the position of that location with respect to the beginning of the same file. Hence, the address of the twentieth entry within a file is "20".

In the discussion which follows, a "backward address reference" is a reference at one point in a program, file, or control chain to an address of an earlier portion of the same program, file, or control chain. A "forward address reference" is a similar reference to an address of a later portion of the same program, file, or control chain.

The primary responsibility for establishing address linkages in control chains lies with the control chain generator program. As a control chain is processed by the control chain generator program, the program constructs a table containing the block number (which is defined by the systems engineer) and the file-relative address of each algorithm module or block in the control chain. At the time when any given algorithm module is processed by the control chain generator, this table contains all the necessary data for the establishment of backward address references. Whenever a backward address reference is required, the control chain generator retrieves the required address from this table and inserts the address into the intermediate file at the proper point. However, this table may not be used to establish forward address reference because the address of algorithm modules which have not yet been processed are not known in advance. When confronted with a forward address reference, the control chain generator stores the address into which the forward reference is to be placed until such time as the forward referenced address is determined. The control chain generator then instructs the file loader program to establish the address reference with the aid of an address link load module (type 9 in FIG. 5H).

Assume that the address of an algorithm module whose block number is "3" must be stored in both the 20th and 30th locations within a control chain. Assume further that these are both forward address references. When the control chain generator program processes the algorithm module which includes location 20, the program stores the address "20" and the block number "3" in an internal table and stores zero in the location "20" within the control chain. When the control chain generator program processes the algorithm module which includes the location 30, the program stores the address "30" in the internal table opposite the block number "3". The Address "20" is stored in the location "30" within the control chain. In this manner, all references to a particular algorithm block number are chain-linked to a single entry in the internal table.

Ultimately, the control chain generator begins to process the algorithm module which the systems engineer has labeled block number 3. Before this algorithm module is incorporated into a load module and is passed to the file loader program, the control chain generator checks the internal table and notes the address entry "30" opposite the block number "3". The control chain generator creates a type 9 address link module (see FIG. 5H) containing the address "30" and passes this address link module to the file loader program just ahead of a file data (type 1) load module containing the algorithm module which the systems engineer has labeled block number 3.

Address link modules of this type ultimately are processed by the address link module subroutine 518 which is shown in FIG. 5B. Upon entry into the subroutine 518 and after checking to see that the LMT1D flag is not set (step 528), this subroutine stores the value of the load point address pointer LDLOC (step 534) at the point I in the file LFILE designated by the data value "K" supplied by the type 9 address link load module (retrieved from LDRECD (NMOD+1) - see step 530). If the location K within the file contains a non-zero data value F, as is shown at the right-hand edge of FIG. 5B (see also steps 532, 538), the value of the pointer LDLOC is also stored in the location F within the file (step 536). In the example shown in FIG. 5B, the location F also contains a non-zero data value C, so the value LDLOC is also stored in the location C within the file. The location C contains zero, so the location C is the last location into which the value of the pointer LDLOC is placed (step 538). Program control then returns to step 504 in FIG. 5A.

Returning to the specific example outlined above, assume that the pointer LDLOC contains the numeric value "58" at the time when the address link module containing the address "30" is received by the file loader program. The address references are to the address of an algorithm block or module which is to be stored in the series of locations beginning with the address "58". It is therefore necessary to store the address 58 in the earlier locations 20 and 30 within the file. With reference to FIG. 5B, the address link load module contains a value K equal to 30, the location K(=30) contains a value F equal to 20, and the location F(=20) contains a value C equal to zero. (In this example, the location C would be the end of the linkage.) The subroutine illustrated in FIG. 5B takes the value "58" from the location LDLOC and stores it in the locations 20 and 30. In this manner, the two forward address references are established.

The address link load module does not necessarily have to be placed just before the modules which define that portion of the file whose address is desired. If the address link module appears at some other point within the group of modules defining a file, it is preceded by an "alter load point" module which places the desired address value into the location LDLOC before the address link module is processed.

E. BEGINNING OF FILE MODULE SUBROUTINE

The beginning of file moaule subroutine 522 is illustrated in FIG. 5E. The first step in the subroutine is to clear the flag LM1TD (step 585) so as to enable all of the other file loader subroutines to commence operating. The remaining steps in the subroutine (step 586) transfer seven data entries from the beginning of the file module into an array called JHDR. These seven data entries do not become part of the file but are required by the file establishing subroutine to aid in establishing a file within the file system.

F. TRIGGER MODULE SUBROUTINE

The subroutine which processes trigger modules appears in FIG. 5F. This subroutine stores the name of the trigger in three consecutive locations within an array JTRIGR (step 587). The subroutine also advances a pointer NXTTRG (step 588) so that this pointer always points to the next empty location within the array JTRIGR. Each time the trigger module routine 524 is called upon, a number in a location NOTRGS is incremented (step 589). This number serves as a record of how many different triggers have been requested for a given file.

G. SYMBOL REFERENCING AND THE SYMBOL REFERENCE MODULE SUBROUTINE

Among the significant tasks carried out by the file loader program is the task of obtaining the actual addresses of system constants and variables and of placing these addresses into the files as they are established within the system. It will be remembered that the file generating programs do not have any knowledge of where constants or variables are stored within the system and must therefore reference all system variables and constants by their six-letter names.

All references to the names of constants or variables are supplied to the file loader program in the form of symbol reference modules type number 1C (FIG. 5H). A symbol reference module contains a symbol name and a pointer to a location within the file where the symbol address is to be placed. In addition, if the symbol name is the name of a system global variable which has not previously been defined, the symbol reference module may contain an indication of the storage space required by the symbol and also may contain initial values for the symbol.

Figure 11C:
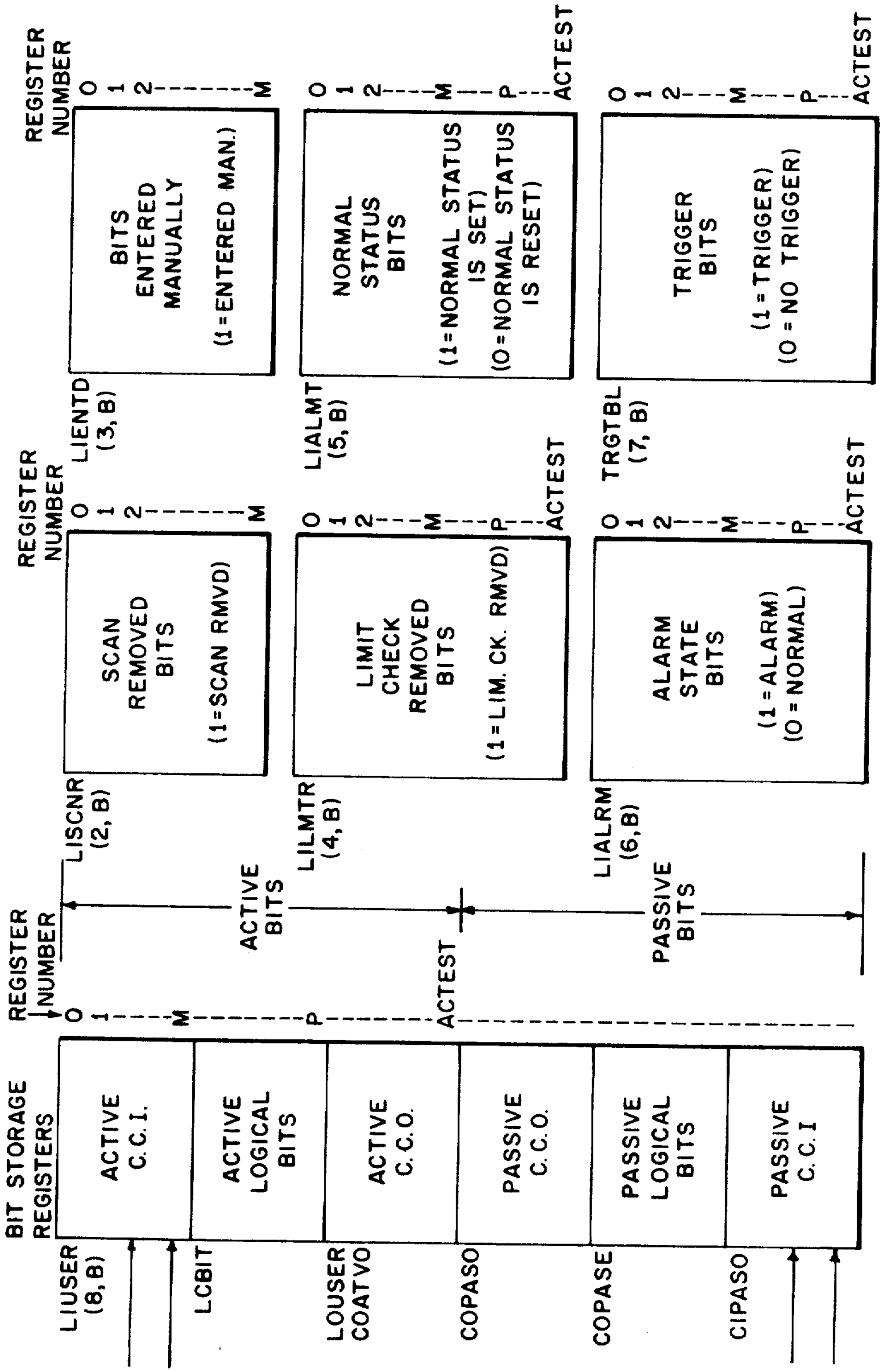
FIGS. 11C and 11C (Cont.) together illustrate the various logical variable bit tables which may exist within the operating computer system.

All system logical variables, whether process or global, are stored as data bits in a bit storage table LIUSER which appears in FIG. 11C(cont.). Some process logical variables and all global logical variables are also assigned full word entries in a logical word table LCWORD which appears in FIG. 11E. Logical variables are addressed as is illustrated in FIG. 11F. All non-logical process variables are stored in the three tables shown in FIG. 5J, and all non-logical global variables are stored in the table LBLNAM which appears in FIG. 5I. With reference to FIG. 5I, a pointer IGBREG to a global variable portion of the logical word table LCWORD and a pointer LBLPTR to the global variable LBLNAM indicate the first available locations in these two tables which may be assigned to new global variables. As new global variables are created within the system, they are assigned to the next available empty locations in the global variable tables shown in FIG. 5I, and the pointers LBLPTR and IGBREG are advanced accordingly. Pointers LBLSZE and LGBREG respectively indicate the last available empty locations in the two global variable tables.

Any system program may have access to the process and global storage areas. Logical global variables may be checked or altered through the use of the subroutines 11055 and 11060 shown in FIG. 11A. Other process and global variables may be retrieved by conventional programs written in FORTRAN and having program common storage areas which encompass the process and global variable storage areas.

When a symbol reference module is encountered by the file loader program, program control is transferred to the symbol reference module subroutine 520 which is shown in FIG. 5D. The subroutine 520 first determines whether the symbol reference module contains a name (step 570), and if so, whether the symbol name has already been entered into the system directory (step 579). Assuming the answers to both of these questions are yes, it is necessary for the subroutine 520 to determine the address of the constant or variable which corresponds to the symbol name supplied by the symbol reference module. If the variable or constant is global (step 580), the address of the variable or constant is obtained directly from the system directory and is stored temporarily in a location LDADR (step 584). If the variable or constant is not global, then the name within the symbol reference module is the name of a file (step 580). The file having that name is obtained (step 581) and the address of the variable or constant is retrieved from the file (step 582). This address is stored temporarily in the location LDADR (step 583).

If the symbol reference module does not contain a symbol name (step 570) or if the symbol name has not yet been entered into the system directory (step 579), it is assumed that the module calls for the creation of a new global variable for which storage space must be allocated within the system. The fourth entry in the symbol reference load module (FIG. 5H) is checked to determine what type of global variable it is that is to be created (step 571). If the variable is typed as a process variable, an error has occurred since the file loader program does not allocate space for process variables. If the variable is typed as a new logical global variable or array, room to store the new logical variable or array is allocated within the system logical word table LCWORD (step 572 -- a portion of the table is shown in the right half of FIG. 5I). If the variable is typed as a new real or integer global variable or array, room is allocated in the table LBLNAM (step 573 -- the table is shown in the left half of FIG. 5I). If the global variable has a name, the name is entered into the system directory (step 574) using the directory handler subroutines. If the symbol reference load module for the global variable includes any initial values, these initial values are loaded into the storage space allocated to the new global variable (step 575), and zero values are placed in any locations which are not otherwise initialized (step 576). The address of the new global variable is then placed into the temporary location LDADR (step 577).

The address of the referenced constant or variable must now be stored in the new file which is being established by the file loader program. The symbol reference module contains a pointer (an address relative to the start of the file) to the first location in the new file into which this address is to be placed. This first location may contain a pointer to a second location into which the address is also to be placed, the second location may contain a pointer to a third location, and so on. The last location into which the address is to be placed contains zero. This linkage of locations is identical to the linkage of locations illustrated in FIG. 5B. The routine (step 578) used by the subroutine 520 to store the address of a variable or constant in this linkage of locations is essentially identical to the subroutine 518 shown in FIG. 5B and is not separately disclosed.

H. THE ESTABLISHMENT OF A FILE WITHIN THE SYSTEM

The last load module in the series of modules defining a single file is always an end of file load module type 1B. This load module is processed by a last module in file subroutine 518 which is shown in FIG. 5C.

Upon entry into the subroutine 518, the file which is to be loaded into the system has already been completely assembled within the core buffer NFILE (FIG. 5A). The length of the file must be determined, since file length must be supplied as an argument to the file handler subroutines which establish the file within the system. Normally the length of the file is contained in the load pointer location LDLOC and is transferred into a file length location LFSIZE. However, if the load point is altered, the alter load point subroutine 510 (FIG. 5A) stores the contents of the load pointer location LDLOC in LFSIZE before altering the load point. Hence, if the number stored in LFSIZE is greater than the number stored in LDLOC, the number stored in LFSIZE is taken as the file length (step 540 in FIG. 5C).

If the file is triggered into operation, the symbolic names of the triggers are listed in an array JTRIGR and the number of triggers is stored in a location NOTRGS (see FIG. 5F). Other pertinent data relating to the file is stored in an array JHDR (FIG. 5E). This data includes the subtask number or converter number assigned to the file, the file name, the file type number in accordance with the code shown in FIG. 5H, the file bidding frequency in accordance with the code shown in FIG. 5H, and an indication of whether the file is to be stored in core or on disk.

The subroutine 518 begins by checking to see if the file type number is positive or negative (step 542). The file type number is stored in a location LDELT (see FIG. 5E). As is apparent in FIG. 5H, all file type numbers are negative except for zero which is assigned to control chains. If the file type number is not negative, then the file must be either a normal control chain or an analog chain of the type which is run as part of an analog scan routine. Subtask numbers are not assigned to analog control chains, so a further check is made to see if the file has been assigned a subtask number (step 546). If it has been assigned a subtask number, the file is designated as type number 12 (step 548) and is assumed to be a normal control chain. If the file has not been assigned a subtask number, the file is assumed to be an analog control chain and is designated as type number 11 (step 550). In the case of analog control chains, a special check is made to see that the file has not been assigned more than one trigger (step 552). In the present case, an analog control chain may only be triggered by the analog scan data file which it is to follow in a subtask file linkage.

If the file type number is negative (step 542), the sign of the type number is changed so that the number is positive (step 544).

The subroutine 518 next calls upon the GNFIL subroutine shown in FIG. 6/100 to establish the file in the operating system (step 554). The subroutine 518 supplies to the GNFIL subroutine all of the necessary data relating to the file and also supplies to the GNFIL subroutine the address of the core buffer NFILE within which the assembled file is temporarily stored. The GNFIL subroutine finds a storage space within the file system for the new file and records the name and address of the file in the system file directory using the file handler subroutines. If the file is involved in the analog scan procedure, the GNFIL subroutine also connects the file into an appropriate analog scan subtask linkage and establishes all the necessary interconnections between that file and other files assigned to the same subtask.

After the subroutine GNFIL has established the new file within the system, the subroutine 518 checks to see if the file is a normal control chain having the file type number 12 (step 556). If the file is a normal control chain (as opposed to an analog chain), the subroutine 518 supplies the subtask number assigned to the control chain and the address of the control chain file to the sublevel processor program shown in FIG. 10A and thereby establishes the control chain as an operative element of the system (step 558). If the control chain is to be bid periodically (step 560), the subroutine 518 links the new control chain subtask to the requested scanning frequency (step 562) by a subroutine call to a subroutine 916 within the auxiliary synchronizer program shown in FIG. 9A. A bidding period specification is retrieved from the sixth location within the beginning of the file module for the control chain (FIG. 5H) and is supplied to the rubroutine 916 along with the control chain subtask number. This bidding period (not frequency) is the length of time which is to elapse between successive placements of bids for execution of the control chain. Any bidding period within the system time resolution is acceptable. The subroutine 518 then checks to see if any triggers for the control chains have been designated (step 564). If they have, the subroutine 518 calls upon a trigger connect subroutine to establish the necessary trigger connections (step 566).

If the new file is not a normal control chain, a check of the file type number is carried out to determine if the file is that of an active logical variable (step 568). If the file is that of an active logical variable, a further check of the file data is carried out to see if the file contains an alarm message which is to be printed out when the logical variable is in an alarm state. If so, then an alarm connect subroutine 11054 within the logic initiator (FIG. 11A) is called upon to establish a connection between the logical variable and the alarm message within the file for the logical variable (step 570). The file loader program supplies the address and alarm stage (0 or 1) of the logical variable and a pointer to the system directory entry for the file of the logical variable to an alarm connect subroutine 11054 (FIG. 11A). The subroutine 11054 then establishes the necessary linkages within the alarm and trigger tables 11059 (FIG. 11A) to establish the alarm message as an active part of the system.

Program control then returns to step 504 in the main file loader program (FIG. 5A). The file has now been fully established as an operative entity within the system.

I. TRIGGER CONNECT SUBROUTINE

The system subroutine which establishes trigger connections is shown in FIG. 5K. This subroutine requires as arguments a list of trigger names or their equivalents and a subtask number of the subtask which is to be triggered.

Any type of subtask within the system may be triggered. It does not matter whether the subtask is an analog scan data file linkage, a control chain, or a conventional computer program. The triggers which are permitted within the system are analog scan and calculated value data files, periodic contact inputs, contact outputs, and logical variables all of which have some operating significance in the process being monitored or controlled. In the case of analog scan and calculated value data files serving as triggers, the trigger connect subroutine creates a type 13 subtask bidding file and links that file into the subtask linkage which contains the triggering file directly following the triggering file within the linkage. In the case of all other types of triggers, the trigger is established by a subroutine 11054 within the logic initiator (FIG. 11A).

Upon entry into this subroutine, the name of the first trigger is examined (step 590). The name is stored in three successive locations within a table (see the table JTRIGR in FIG. 5F). If the first entry of the three contains zero, then the second entry is the address of a logical variable (step 591). In this case, the address of the logical variable is supplied to the subroutine 11054 directly (step 595).

If the first entry in the array containing the trigger name is not zero, then the trigger name is checked out in the file directory (step 592). If the name is that of a global variable (step 593), the address of the global variable is supplied to the subroutine 11054 (step 595). If the name is that of a file, the type number of the file is determined (step 596). If the file is of type number 4, 6, or 10, then the trigger is either a contact closure input, a contact closure output, or a calculated logical variable. In any case, the value of the variable is contained within a bit table within the system. This bit address if obtained (step 597) and is supplied to the subroutine 11054 (step 595). If the file is of type number 0 to 3, then the file is either an analog scan data file or a calculated value data file and is connected into a scan subtask linkage of files. A type 13 subtask bidding file is created and is connected into the file linkage directly behind the trigger file so that a bid for execution of the subtask is placed immediately after the trigger file has been processed by an appropriate processing program (step 598). If the file is of any other type, then an appropriate error message is printed out.

A check is then made to see if there are any more trigger names to be processed (step 599). If there are, the above procedure is repeated. When all of the trigger names have been processed, program control returns to the calling program.

6. THE FILE SYSTEM

The file system comprises: one or more file storage areas, some of which may be core-resident and some of which may reside in mass storage; a group of file access subroutines (file handlers) for creating, altering, and eliminating files; a directory storage area in which a complete alphabetical directory of the system global variable and file names and addresses is maintained; and a number of directory access subroutines (directory handlers) for obtaining information from and for altering data within the directory storage area.

Data files of many different types are handled by the file system. For example, a data file may contain a control chain, analog scan data defining how an analog scan is to be carried out, data pertinent to a system variable or constant, or simply data values which are required by some operative program within the system.

For the most part, the file system handles all files in the same manner and does not differentiate between files of different types. However, certain types of files are handled in a special manner by the file system due to peculiarities in the way in which they must be organized within storage. As a simple example, analog scan files assigned to a single subtask are most conveniently assembled within a single disk sector so that they may all be brought into core at the same time for execution. The following is a complete list of the file types which are available within the preferred embodiment of the invention. These file types are described in detail in other sections of this specification. This list is presented simply to facilitate the discussion which follows:

| Type Number | File Description |
|---|---|
| 0, 1, 2, 3 | Analog scan and calculated value files |
| 4 | Periodic contact input file. |
| 5 | Non-periodic contact input file. |
| 6 | Contact output file. |
| 7 | Constant file. |
| 8 | Coupler file. |
| 9 | Spare |
| 10 | Calculated logical variable file. |
| 11 | Analog control chain file. |
| 12 | Normal control chain file. |
| 13 | Subtask bidding file. |
| 14 | Dummy file. |
| 15 | General file. |

A. FILE STORAGE AREAS

A typical file storage area is shown in FIG. 6/107. The file storage area comprises either a block of consecutive storage locations in core or a group of consecutive disk sectors. Files are stored in the storage area serially beginning at the top or start of the storage area and continuing down towards the bottom of the storage area. There is usually some unused storage space towards the end of each file storage area.

A primary goal of the file system is to achieve maximum flexibility in allowing files to be created and to be destroyed at will. It is contemplated that a file storage area will normally contain holes or locations previously occupied by files which are no longer within the system. In FIG. 6/107, these holes are called empty files. The empty files are chan-linked to one another and to an empty file pointer location. The empty file pointer location contains the address of the beginning of the first empty file; the second location within the first empty file contains a pointer which is the address of the second empty file; and so on. In this manner, all of the empty files are linked together. The second location within the last empty file in the linkage contains zero.

When a file is removed from the system, the storage area previously occupied by that file is added to the beginning of the empty file linkage. The address within the empty file pointer is placed in the second location within the file which is removed from the system, and the address of the file which is being removed is placed into the empty file pointer location. In this manner, all empty storage spaces within a file storage area, with the exception of the unused storage space at the end of the storage area, is chain-linked to the empty file pointer.

The unused storage space is indicated by an unused storage pointer, and the end of the unused storage space is indicated by an end pointer.

When a new file is added to the file storage area, a check is first made to see if any of the holes or empty files chain-linked to the empty file pointer location is large enough to contain the new file. If so, then the new file is placed into the empty slot. If a new file does not completely fill the empty slot, the remaining space is linked into the empty file linkage in the manner described above. If only a single unused location remains when the new file is placed into the empty slot, the single location is linked to an empty word pointer in the manner shown in FIG. 6/107. The contents of the empty word pointer are loaded into the empty word location, and the address of the empty word is stored in the empty word pointer location. In this manner, all such empty words are linked to an empty word pointer.

If no room is found for a new file in the empty file pointer linkage, a check is made to see if there is sufficient unused storage space at the end of the file storage area to contain the new file. If so, then the new file is loaded into the unused storage space starting with the address indicated by the unused storage pointer. The first location beyond those occupied by the new file is then stored in the unused storage pointer location so that a record is always maintained of the size of the unused storage space.

When a file storage area is first set up, the address of the first location within the file storage area is placed in the unused storage pointer location, and the address of the end of the file is placed in the end pointer location. Zeroes are places in the empty file and empty word pointer locations. The above procedures are then followed in determining where each file is stored within the file storage area.

Ultimately, if many changes are made in a system operating configuration and if many files are created and destroyed, the file storage area may become full to the point where it may not accept a new file. However, there may be sufficient space in the empty file linkage and in the empty word linkages to hold a number of additional files. A file compression routine may then be called upon to squeeze all of the empty space within the file storage area into the unused storage space at the end of the storage area. This routine (not shown) moves up each file towards the top of the storage area in such a manner that all the empty spaced within the storage area is eliminated. As this is done, the address of each file within the file directory system is changed so that the file directory always points to the actual location of each fil within the storage area. It is unlikely that such a file compression routine would ever be required except in a system where vast, sweeping changes in system organization are made. A few minior changes in the arrangement of the files or the addition of a few extra files to the storage area would not usually necessitate a file compression operation such as that just described.

B. THE FORMAT OF A FILE

In the preferred embodiment of the invention, the file formats shown in FIG. 6/104, 6/105, and 6/106 are adhered to. With reference to FIG. 6/104, a typical file includes a three-word header followed by a body of data which may be of any desired length. The first word in the file header contains the file type designation as a four-bit, hexadecimal number that is left-justified. The remaining twelve bits in the first location specifies the length of the file—the total number of locations occupied by the file and by the file header.

The second location within the file header of a typical file is a directory pointer which contains the address of the directory entry for the file. The directory pointer contains an 8-bit directory sector index an 8-bit word index. The directory pointer facilitates locating the directory entry for a file. If a file is ever moved from one location to another within the system, it is necessary to alter the file address within the directory. The directory pointer is provided to facilitate this alteration. Since the directory contains the name of each file, the directory pointer allows a program having access to a file to determine the name of the file.

The third location within the header of a file is an optional linkage pointer which may be used to point to the next file in an analog scan subtask linkage of files. The linkage pointer enables analog scan files to be executed in an order that is different from the order in which the files are stored within the file storage area. Within the present program system, each linkage pointer is the relative address of the next file in the linkage with respect to the address of the file containing the pointer. Hence, an analog scan program may calculate the address of the next file within a linkage by adding the linkage pointer value to the address of the file in which the linkage pointer resides.

The format used for empty files is somewhat different and is shown in FIG. 6/105. Empty or dummy files are designated as file type $14_{10}$ or $E_{16}$. The length of an empty file is indicated in the first entry of the file header as in the case of most files. In place of a directory pointer, the empty files contain a linkage pointer which is the address of the next empty file in the same linkage. In the case of empty files, the linkage pointer is the actual address of the next empty file in the case of core-resident files, or the relative address of the next empty file with respect to the beginning of the sector in the case of disk-resident files. The remainder of an empty file is not used but often may contain random data left over from the time when an active system file occupied the same location.

With reference to FIG. 6/106, the coupler file (type 8) warrants separate discussion. The coupler file is designated file type $8_{16}$ or "$1000_2$" and thus contains a "1" bit in the left-most bit position of the first location in the file. A coupler file is most commonly used as a file which precedes any file which is intentionally linked to follow an earlier file in an analog scan file linkage. When so used, the coupler file contains three locations, as is shown in the upper half of FIG. 6/106. The second location usually contains zero and the third location contains a pointer to the file which the coupler file precedes. The significance of a coupler file used in this manner is that it is easily identifiable. If an attempt is made to remove the preceding file from the system, the coupler file warns the routine which is seeking to remove the earlier file that the file following the coupler file is dependent upon the preceding file as a trigger. The preceding file is not to be removed from the system until some other arrangement has been made to trigger the file which follows the coupler file. Typically, a coupler file is placed between an analog scan data file and an analog control chain whose purpose is to process the data retrieved by the analog scan file. If an attempt is made to remove the analog scan data file without first removing the analog control chain file which follows, the coupler file serves as a flag and prevents the removal. If the analog control chain file is stored in core and is triggered by a disk-resident analog scan data file, the coupler file serves the additional purpose of containing the address of the core-resident file. The address of the core-resident file is placed in the second location within the coupler file in place of zero.

Another use of a coupler file is as a header preceding the first file in a core-resident analog scan file linkage. In this case, the coupler file appears as is shown in the lower half of FIG. 6/106. In place of a length specification, the first location within the coupler file contains the number of analog-to-digital converter sets for reasons which will be explained more fully below. The second location within this file is a pointer to the first file within the core-resident analog scan linkage.

C. CORE-RESIDENT FILE STORAGE AREAS

In the preferred embodiment of the present invention, two core-resident file storage areas are provided. The first is a general file core storage area and is shown in FIG. 6/109. This core storage area is used for the storage of general data files which are not linked to subtasks within the system. The name of this storage area is NCORE, and the arrangement of the storage area is exactly as illustrated in FIG. 6/107. A second core storage area, shown in FIG. 6/108, is used for the storage of files which are assigned to subtasks within the system. This storage area is also layed out exactly as is shown in FIG. 6/107. The name of this storage area is LCORE. FIG. 6/108 illustrates that within the sublevel processor program (FIG. 10A) there exists tables of subtask starting addresses. In the case of core-resident analog scan or control chain subtasks, these tables contain the core starting addresses of files within the storage area LCORE. In the case of control chain files, the actual starting address of the control chain file is stored within the sublevel processor starting address table. In the case of analog scan file linkages, the sublevel processor starting address table contains the address of a type-8 coupler file (see FIG. 6/108), and the files assigned to a given subtask are chain-linked to the coupler file for that subtask.

D. DISK-RESIDENT FILE STORAGE AREAS

Two disk-resident file storage areas are provided, one for the storage of general files and another for the storage of subtask and triggered files.

The disk sectors allocated to the storage of general files are shown in the central portion of FIG. 6/110. These sectors begin with a sector IDSECT and extend on through a sector NDSECT. Within this file storage area, each individual disk sector is arranged in the manner shown in FIG. 6/107 with the exception that there is no unused storage space in the disk sectors. As is shown in the right-hand portion of FIG. 6/110, the empty portion of a general file disk sector is occupied by an empty or dummy file whose length is exactly equal to the space which remains at the end of the file. The empty file pointer is the first location within the disk sector, and the empty word pointer is the second location within the sector. Since there is no unused storage space and since the length of each disk sector is known, there is no need for an unused storage pointer or for an end pointer.

In order to facilitate the storage of files within the general file storage area, an index to this storage area is maintained in a disk sector called NLNKM. This index sector is shown in the left-hand portion of FIG. 6/110. The length of the sector NLNKM is such that this sector contains one location for each disk sector within the general file storage area. The numbers stored in each location within the index sector indicate the status of the corresponding general file sector. In FIG. 6/110, the zeroes in the first two locations within the index sector indicate that the first two disk sectors are completely filled with files and contain no room for additional files. The "4" in the third location indicates that one or more vacancies or empty files exist within the third disk sector and that the largest empty file within the third sector contains four empty locations. The third sector is the one which is illustrated to the left in the figure. As can be seen, this sector contains one empty file that is four locations in length. The sixth location within the index sector contains minus one or "$FFFF_{16}$" in hexadecimal notation. This means that the corresponding sixth sector is completely empty and contains no files.

Whenever a new file is to be stored within the general file disk storage area, the index sector NLNKM is retrieved and its contents are scanned in search of a disk sector containing a hole just large enough to contain the new file. When such a sector is found, that sector is transferred into core storage and the new file is added to the sector. The empty file and empty word linkages for that sector are then readjusted, and a check is made to ascertain which is now the largest hole within the sector. The length of the largest hole is then stored in the corresponding location in the index sector. Both the index sector and the file storage sector are then returned to disk storage.

Subtask files and triggered files are stored in a separate disk storage area which is shown in FIG. 6/111. Sectors within this file storage area are organized somewhat as is shown in FIG. 6/107 with the exception of empty sectors and sectors assigned to control chains.

With reference to the right-hand portion of FIG. 6/111, a typical analog scan sector includes a header which includes a linkage pointer, an empty file pointer, and an empty word pointer. The linkage pointer is the second entry in the header and points to the first file in a linkage of analog scan files within the disk sector. These files are processed by the data file processing program (FIG. 12) in the order in which they are linked together. The empty file pointer and the empty word pointer function as is shown in FIG. 6/107. Any unused space in an analog scan sector is filled by a dummy or empty file whose length is exactly equal to the unused space, so there is no unused storage space and no unused storage pointer.

Empty sectors contain a specification of the sector length stored in the first location within the sector and either zero or the sector number of another empty sector stored in a second location within the sector. The sector number of the first empty sector in a linkage of empty sectors is stored in a core location INPGDF, and all of the empty sectors are chain-linked to this core location. The last empty sector in the linkage has zero stored in its second location.

Control chain sectors (see lower-right portion of FIG. 6/111) contain nothing other than a single control chain file. The smallest available sector is always chosen for storage of a control chain. Any extra locations at the end of the sector beyond the locations occupied by the control chain are not used. Since only a single file is stored within a control chain sector, an empty file pointer and an empty word pointer are not needed for such sectors.

As shown in the central portion of FIG. 6/111, the subtask and triggered file disk storage area extends from a first disk sector IFSECT+1 to a last disk sector NFSECT. When the disk storage area is first placed in operation, all of the sectors are empty. The address of the first sector IFSECT+1 is initially stored in a location NXPGEN. As files are loaded into sectors, the sector number stored in NXPGEN is incremented so that the location NXPGEN always contains the sector number of the first sector in the storage area which has never been used. Sectors which were once in use but which are no longer in use are chainlinked to the location INPGDF, as has been explained.

Within the subtask and triggered file disk storage areas, each separate disk sector or group of disk sectors is assigned to a specific subtask number within the system. The sublevel processor program (FIG. 10A) maintains tables which relate disk sector numbers to the corresponding subtask numbers. When a bid for the execution of any such subtask is received by the sublevel processor program, the sublevel processor program causes the corresponding disk sector or disk sectors to be placed in a core buffer and then transfers program control to an appropriate file processing program.

E. ASSIGNMENT OF SUBTASK NUMBERS TO FILES AND TO GROUPS OF FILES

In order to preserve the flexibility of the operating system and to ease as much as possible the work which must be performed in establishing a specified system configuration, different techniques are used to establish control chain subtasks from those which are used to establish analog scan subtasks. In the case of control chain subtasks, the systems engineer himself assigns a unique chain subtask number to each control chain. After the system file loader program (FIG. 5A) has established the control chain within the system, the file loader program supplies the designated subtask number plus the address of the control chain (disk sector or core starting address) to the sublevel processor program (FIG. 10A) and thereby establishes the control chain subtask as a working entity within the system. Each control chain is assigned automatically to a priority level which equals the subtask number of the control chain - the higher the subtask number, the higher the priority of the control chain. If several are bidding for execution, the control chain having the highest subtask number is executed first. The systems engineer also may designate the period of time which is to elapse between successive executions of a control chain. Whenever such a period is designated, the file loader program supplies this period designation and the subtask number of the control chain to the auxiliary synchronizer subroutine 916 (FIG. 9A) and this establishes periodic execution of the control chain in the manner specified by the systems engineer.

The assignment of subtasks to analog scan file linkages is handled in a very different manner. It is highly desirable to have high resolution analog scans (scans which are carried out more frequently) carried out on a higher priority basis than low resolution analog scans (scans which are carried out less frequently) and to prevent the execution of low resolution analog scans from hindering or delaying the execution of higher resolution analog scans. Rather than requiring the systems engineer to arrange his subtask assignments to produce this desirable result, the file system is arranged to automatically create analog scan file linkages and to assign subtask numbers to the linkages in such a manner that the time of execution required for each requested scan is minimized or kept small and simultaneously in such a manner that the probability of a low resolution scan delaying the execution of a high resolution scan is minimized or kept small.

The monitor data file processing program (often called the analog scan program) is assigned a task level which is called the analog scan task level. Within this task level a group of analog scan subtasks exist which are specifically reserved for analog scan data files. These subtasks are consecutively numbered starting with zero and ending with a level NSBLVL. As is explained elsewhere in this specification, subtasks assigned to the same task level may not interrupt one another. However, when one subtask runs to completion, the next subtask within the same task level which is executed is the bidding subtask having the highest subtask number. Hence, while the analog scan subtask levels cannot interrupt one another, they do provide means whereby the bidding subtask level having the highest subtask number is executed ahead of all bidding subtask levels having lower subtask numbers.

In general, two objects preferably are met to insure that high resolution scans are performed before low resolution scans and to insure that low resolution scans do not delay the execution of high resolution scans. The first is that high resolution scans be assigned higher subtask numbers than low resolution scans. If this is done, then when both a high resolution scan and a low resolution scan are bidding for execution, the high resolution scan is automatically executed first. The second object is that the number of files assigned to each subtask level be limited in some manner so that the execution of a low resolution scan assigned to a single subtask level does not unduly delay the execution of a higher resolution scan. A low resolution scan may be of any desired length, but it preferably is broken up into separate subtasks each of which is short enough so as not to unduly hinder the prompt execution of a bidding high resolution scan.

The file system automatically maintains the proper arrangement of subtasks to achieve this desirable end. The systems engineer simply assigns a name to each analog scan data file and designates for each file the index number of the frequency at which the file is to be scanned. The actual scanning periods which correspond to each index number are stored within the system in a table called ITM (FIG. 6/112). The scanning periods are specified in tenths of a second. The longest scanning period is stored in the first location within the table ITM, the next shorter scanning period is stored in the second location within the table, and so on. The shortest scanning period is stored in the 31st location within the table ITM. THe systems engineer thus has his choice of any one of 31 scanning frequencies.

Referring once again to FIG. 6/111, an index disk sector called LNKM appears in the left-hand portion of the figure. This index disk sector contains one storage location for each analog scan subtask. If an entry in the index sector is zero, it means that the corresponding subtask has not been assigned and is not in use. If an entry is not zero, then the left-hand portion of the entry designates the scan frequency index of the subtask and the right-hand portion of the entry designates the disk sector in which files assigned to that subtask are stored, if the files are disk-resident. If the files are core-resident, then the right-hand portion of the entry contains a zero. In the case of a disk resident subtask, the scanning frequency of the subtask is multiplied by two and one is added to the resultant product to give an odd number which is stored in the left-hand half of the index sector entry. In the case of a core-resident subtask, the scanning frequency index is multiplied by two to give an even number which is stored in the left-hand portion of the corresponding index sector entry.

With reference to the right-hand portion of FIG. 6/111, the first entry in the index sector corresponds to the highest priority analog scan subtask. The left-hand portion of this word contains two times the bidding frequency index plus one. The right-hand portion of this word contains "2", indicating that this subtask is stored in the disk sector IFSECT+2. The second entry in this index sector corresponds to the next highest priority subtask assigned to analog scan data files. Again, two times the bidding frequency index plus one is stored in the left-hand portion of the word, and a "4" is stored in the right-hand portion of the word to indicate that the corresponding data files are stored in the disk sector IFSECT+4.

The fourth entry within the index sector is the entry for the fourth highest priority subtask. This entry contains a zero in the right-hand portion and therefore relates to files which are stored in core rather than on disk. In this case, the bidding frequency index is multiplied by two and is stored in the left-hand portion of the entry.

Within the index sector, the bidding frequency index is multiplied by two and one is added to the bidding frequency index of disk-resident sectors so that disk-resident and core-resident subtasks never appear to have the same bidding frequency index. As will be explained later, this makes it impossible for the file handling programs to attempt to link a core resident file to a group of linked files which are disk resident. Thus, disk- and core-resident files are preferably never assigned to the same subtask number, even though they may be assigned the same scanning frequency index.

F. CONVERTER SETS

With reference to the illustrative analog scan sector shown in the right-hand portion of FIG. 6/111, a number equal to the "no. of converter sets" is indicated in the right-hand portion of the first word of the sector. In the lower half of FIG. 6/106, a number equal to the "no. of converter sets" is indicated in the right-hand portion of the first word of the coupler file. These numbers are used by the file handler subroutines to limit the number of files which are incorporated into each subtask so that the execution of a given subtask in a low resolution scan does not undly interfere with prompt execution of a higher resolution scan.

A converter set is a group of analog scan data files within a single subtask, with each of the files requiring services of a different system analog-to-digital converter.

Assume, for example, that a process is set up with a computer control system having four analog-to-digital converters which may be called converter number 1, converter number 2, converter number 3, and converter number 4. Assume further that four analog scan data files are assigned to a single subtask "N", that two of the analog scan data files require the services of converter number 1, that the third analog scan data file requires the services of converter number 3, and that the fourth analog scan data file requires the services of converter number 4. The subtask N would then contain two converter sets—a first converter set containing three data files assigned respectively to converters numbers 1, 3, and 4; and a second converter set containing a single data file assigned to converter number 1.

If a fifth data file is added to subtask N and if this fifth data file requires the services of converter number 2, this file is incorporated into the first converter set. The first converter set is now full, since it contains four files, one assigned to each of the four converters. If a sixth file requiring the services of converter number 3 is also added to subtask N, this sixth file is assigned to the second converter set. The second converter set now contains two files assigned respectively to converters numbers 1 and 3. The addition of these two files to the subtask does not increase the number of converter sets within the subtask.

If a new file is added to the subtask N which requires the services of converter number 1, this file may not be assigned to either of the existing converter sets since they each contain a file requiring the services of converter number 1. A third converter set is therefore created within subtask N for this new file.

The significance of the number of converter sets assigned to a subtask is that this number is a measure of the amount of time which is required to execute the subtask. By limiting the number of converter sets which may be created within a subtask, it is possible to limit the maximum execution time of the subtask. If each analog scan subtask is limited to, for example, four converter sets, then the time of execution required by each of these subtasks is limited to the time it takes to retrieve data from the system analog-to-digital converters four times in succession. Typically, the time required would be somewhat longer than 4/60 of a second.

By limiting each analog scan subtask to a fixed number of converter sets, it is possible to guarantee that the execution of a low-resolution analog scan subtask cannot delay the execution of a high-resolution analog scan subtask by more than a fixed amount of time—slightly over 4/60 of a second, for example. Typically, the highest resolution scanning subtasks within the system call for one scan every 1/10 of a second. If the maximum execution time of all lower resolution scanning subtasks is limited to 4/60 of a second, then a check is made every 4/60 of a second to see if a 1/10 of a second high resolution scanning subtask is bidding for execution. In other words, it becomes impossible for a low priority subtask to block out the execution of a high priority subtask for more than slightly over 4/60 of a second when each subtask is limited to four converter sets.

G. LINKING FILES INTO CONVERTER SETS

With reference to FIGS. 6/108 and 6/111, the analog scan files assigned to a single analog scan subtask level are linked as is shown in the figures. The address of the subtask in the sublevel processor table is either an analog scan sector number (FIG. 6/111) or else is the core address of a type 8 coupler file (FIG. 6/108). In either case, the second location beyond this address is a linkage pointer to the first file in the scan linkage. Each of the files within the scan linkage is then linked to the next file within the same scan linkage by a pointer stored in the third location within the file, as is shown in FIG. 6/104. The last file in such a linkage contains zero in the third location within the file.

The files are linked in such a manner that all of the files assigned to a first converter set come at the beginning of the linkage and are linked together in the order of their respective analog-to-digital converter numbers. The last file in this first converter linkage is chain-linked to the first file in a second converter linkage, and so on. Whenever a new file is added to such a linkage, the file is added to the first converter set linkage not containing a file assigned to the same converter number. Whenever a file cannot be incorporated into an existing converter set, the file is connected to the end of the linkage and is the first file in a new converter linkage. The program which adds new files to the file linkage also adjusts the "No. converter sets" number which is stored either in the first word of the type 8 coupler file (FIG. 6/108) or in the first word of the analog scan disk sector (FIG. 6/111) so that this word always contains a number equal to the number of converter sets in the linkage.

H. ADDING A NEW FILE TO A LINKAGE

Each new analog scan data file is first assembled by the system file loader program (FIG. 5A) and is then passed on to the file handler subroutines within the file system. An analog-to-digital converter number and a bidding frequency index number are specified for each new file. These numbers comprise the first and sixth entries in the beginning of file load module (FIG. 5H) for the file. These numbers are also passed on to the file handler subroutines by the system file loader program.

The file handler subroutines first check the index sector (FIG. 6/111) to see if a subtask already exists that contains files assigned to the same frequency index number. If no such subtask exists, then a new disk sector or core file linkage is opened to contain the new file. The number of converter sets in this new disk sector or core linkage is set equal to one, and the new file is linked into the sector or core linkage.

If the bidding frequency index of the new file is lower than any previously requested, then an unused, lower subtask number is assigned to the bidding frequency. The sector address or core address of the new file linkage is supplied to the sublevel processor program, and an appropriate entry is placed into the index sector location which corresponds to the subtask number assigned to the new linkage. If the bidding frequency index of the new file is higher than some of the existing bidding frequency indices, the assignment of subtasks to linkages must be reorganized so that the new bidding frequency is assigned to a subtask number that is higher than the subtask numbers assigned to all lower resolution scan linkages but that is lower than the subtask numbers assigned to all higher resolution linkages. In this manner, the priority of bidding is strictly maintained by the system without help from the systems engineer. The reshuffling of the subtask assignments involves shifting entries in the index sector, moving addresses of linkages within the sublevel processor subtask address table, and restructuring the analog scan subtask periodic bids within the auxiliary synchronizer program. The accommodation of one new file within the system may thus cause a major reorganization of the system without any assistance from the systems engineer.

If a subtask linkage contains files assigned the same bidding frequency index as the new file, then an attempt is made to add the new file to the linkage of files assigned to that subtask. This attempt fails only if the inclusion of the new file in the subtask linkage would require the creation of a new converter set and if the subtask linkage already contains the maximum permissible number of converter sets. If the file cannot be added to the subtask, then an attempt is made to add the new file to any other subtask linkage which contains files assigned the same bidding frequency index as the new file. If the new file cannot be added to any of the existing linkages, a new linkage is created with the new file as the first file in the linkage. This new linkage is assigned to a subtask in the manner explained in the preceding paragraph. It is thus quite possible that several subtasks may contain files assigned to the same bidding frequency index.

It is possible to specify that a particular file must follow or be triggered by a specific file in an analog scan linkage. For example, an analog control chain file may be linked to immediately follow a particular analog scan data file in a linkage. When a file is designated as one which is to be triggered by a specifically named file, the triggered file is entered into the linkage directly behind the named file. A type 8 coupler file (upper half of FIG. 6/106) is inserted between the two files so that the named file may not be accidentally removed from the system without the triggered file and coupler file having been removed first. As has been mentioned above, the triggering file may reside on a disk sector and the file which is to be triggered may reside in core. In this case, the coupler file contains the core address of the core resident file.

I. AN OVERVIEW OF THE FILE AND DIRECTORY ACCESS SUBROUTINES

The file and directory access subroutines, otherwise known as the file and directory handlers, are shown in block diagram form in FIG. 6. The eight routines which are most frequently called by outside programs are the file access subroutines GNFIL, WTFIL, RDFIL, and DLFIL; and the directory access subroutines WRSYMB, RDSYMB, ERSYMB, and NXFLNM.

The subroutine GNFIL (generate file) is responsible for loading files into the file system and for entering the file names into the system file directory. The subroutine GNFIL also is responsible for keeping track of the assignments of subtasks within the analog scan task level and for making sure that the analog scan data files are organized to substantially maximize the efficiency of the analog scanning procedure.

A number of system subroutines are called upon by the subroutine GNFIL. A subroutine TYPSZE determines whether a disk sector is assigned to general files or to triggered files. TYPSZE is used by the GNFIL subroutine simply as an error check. For example, when the subroutine GNFIL is informed that file A is to be triggered by file B, the subroutine GNIFL obtains the disk sector number of the file B from the system directory and then uses the subroutine TYPSZE to determine whether that disk sector contains general or trigger files. If the disk sector contains general files, then an error has occurred, since a general file cannot trigger the execution of another file.

A subroutine MOVFIL is a very short subroutine which transfers data between one core storage area and another.

A subroutine LOCBUF is used to find an available disk sector into which a new subtask linkage may be placed. After such a sector has been found, a subroutine OPNBUF is used to alter the various linkages so that the sector is no longer included in the unused or empty disk sector linkage.

A subroutine LOCHOL hunts through a file storage area looking for the smallest hole that is large enough for a new file. When such a hole is found, a subroutine OPNFIL is used to link the empty file linkages around the hole into which the new file is to be placed.

A subroutine LOCSEQ finds the proper positioning of a file within an analog scan linkage. Once the position of the file is determined, a subroutine LNKSEQ alters the linkages to link the new file into the linkage.

A subroutine CVTOAB is a housekeeping routine which simply converts Fortran array notation into absolute machine addresses which may be handled by assembly language subroutines.

In rearranging the subtask assignments of analog scan data files and in assigning the proper bidding frequencies to such files, the subroutine GNFIL calls upon subroutines within both the sublevel processor (FIG. 10A) and within the auxiliary synchronizer (FIG. 9A).

Once a file is established within the system, it may be deleted from the system through execution of the subroutine DLFIL (delete file). This subroutine deletes a file from the system, including a type 8 coupler file which might precede the file, unless the file is chain-linked to a type 8 coupling file and is therefore the trigger for some other system file. The subroutine DLFIL makes use of a CLSBUF subroutine which adds an empty disk sector to the empty sector linkage and also makes use of a CLSFIL subroutine which adds an empty file space to the empty file linkage within a file storage area. The subroutine DLFIL utilizes the routine TYPSZE to determine whether a file is stored in a general or in a triggered file disk sector.

The subroutine RDFIL is provided to transfer a file from its normal storage area to a core buffer. A subroutine WTFIL is provided to return a file to its normal storage area. These two subroutines make it possible to obtain data from a file and to alter data within a file without knowing anything other than the file name. Both of these subroutines use the system directory to determine where a given file is stored.

Among the directory access subroutines, the subroutine WRSYMB (write symbol) creates new entries within the file system directory. The subroutine WRSYMB utilizes a subroutine LOCDIR to determine whether an entry name already exists within the system and therefore should not be entered a second time. The subroutine WRSYMB also uses a subroutine FDIDX to trace through alphanumeric linkages within the file directory and another subroutine COMSYM to compare two file names and to indicate which comes first alphanumerically. A subroutine IHASH is called upon by the LOCDIR subroutine to convert file names into hash code numbers.

The subroutine RDSYMB (read symbol) obtains the address of a file when supplied with the file name. The RDSYMB subroutine calls upon the subroutine LOCDIR to determine whether or not a file name is recorded within the directory and to locate the address of the file. The subroutine RDSYMB may also be used to find the name of a file when supplied with a directory pointer (a one-word address of the directory entry for a file) rather than with a file name. In this case, the subroutine RDSYMB utilizes the subroutine FDIDX to obtain the address of the file.

When a file is removed from the system, a subroutine ERSYMB is used to remove the name and address of the file from the file directory. The subroutine ERSYMB makes use of the subroutines FDIDX, LOCDIR, and COMSYM.

The subroutine NXFLNM (next file name), when supplied with the name of a first file, determines the name of the next file in an alphanumeric linkage of file names. This routine is used by the operator's console routines in processing a request to scan file entries in alphanumeric order starting with a particular file. For example, the particular file might be named "A100". The following file names are retrieved in alphanumeric order by successive calls to the subroutine NXFLNM. A subroutine NXSYMB does most of the work of determining the next directory entry name, but the subroutine NXSYMB returns a name whether or not that name is the name of a file or of a global variable. The subroutine NXFLNM refuses to accept global variable names and repeatedly calls upon the subroutine NXSYMB until the next legitimate file name is found. The subroutine NXSYMB in turn calls upon the two subroutines FDIDX and LOCDIR.

J. GENERATE FILE SUBROUTINE

The generate file subroutine GNFIL is shown in FIG. 6/100. Portions of FIG. 6/100 are shown in FIGS. 6/101, 6/102, and 6/103.

The subroutine GNFIL is normally called by the file loader program whenever it is desired to establish a new file within the system. However, the subroutine GNFIL may be called by any program within the system, and it is therefore possible for the systems engineer to write his own file generating programs or even to generate files on-line using short computer programs written especially for that purpose.

The GNFIL subroutine is complicated enough so that the only simple way of explaining it is to explain how it processes different types of files. The following discussion of the subroutine therefore describes how a variety of different typical file configurations are loaded into the system using the subroutine GNFIL.

Assume first that the file which is to be established within the system is a general file which is not triggered and which is not assigned to a subtask. File types 4, 5, 6, 7, 10, and 15 fall into this category. Upon entry into the routine GNFIL, program control is rapidly transferred through steps 6/1102 and 6/1136 to step 6/1138. Assuming that the general file is to be disk-resident, the table NLNKM (FIG. 6/110) is searched for an opening in a disk sector that is large enough to hold the new file (step 6/1140). If such an opening is found, the file name is entered into the file directory along with the file address (step 6/1142). The file is then loaded into the sector, and the empty file linkages for the sector are adjusted (step 6/1144). Finally, the entry for that sector in the table NLNKM (FIG. 6/110) is adjusted so that the table entry contains a number equal to the size of the largest hole which is still available within the sector, or so that the table entry contains zero if the sector is full. Program control then returns to the calling program. If the general file is to be core-resident (step 6/1138), a similar routine shown in FIG. 6/103 finds the smallest available dummy file in the core file storage area NCORE (FIG. 6/109), enters the file name into the directory, transfers the new file into the core buffer NCORE, and adjusts the dummy file linkages as required (steps 6/1190, 6/1192, and 6/1194 in FIG. 6/103). Program control then returns to the calling program.

Assume now that a normal, disk-resident control chain file (type 12) is to be placed into storage in a disk sector. The subtask linkages for control chain files are not handled by the subroutine GNFIL, but are handled by the system file loader program, and in particular, by the subroutine 518 which is shown in FIG. 5C. Upon entry into the subroutine GNFIL, program control advances rapidly through steps 6/1102 and 6/1132 to step 6/1134. At this point, a search is made using the empty sector pointer and the unused sector pointer (FIG. 6/111) for the smallest available empty sector into which the control chain file may be placed. When a suitable empty sector has been found, program control passes through step 6/1112 to step 6/1114 and the name of the file is entered into the system directory. The file is then stored away in the chosen disk sector (step 6/1116). Since the subroutine GNFIL has no indication that this is to be a periodically bid file, program control passes through step 6/1118 and returns to the calling program.

In the case of a core-resident control chain, program control passes from step 6/1132 to step 6/1150 in FIG. 6/101. The smallest available dummy file or empty area in the core file storage area LCORE (FIG. 6/108) is located (step 6/1150). The file name is then entered into the system directory (step 6/1152) and the file is loaded into the buffer LOCRE with the empty file linkages adjusted as required (step 6/1154). Program control then returns to the calling program via step 6/1118 in FIG. 6/100.

Assume that an analog scan data file of type 0 to 3 is to be established within the system. Upon entry into the subroutine GNFIL, program control passes through step 6/1102 to step 6/1104. Assuming that no trigger file has been designated, program control passes on to step 6/1122. Analog scan files generally have a designated frequency index of scan, so normally program control would pass on to step 6/1124. If no frequency of scan is designated, however, the file is treated as a general file and program control passes to steps 6/1136.

Beginning at step 6/1124 and assuming that the file is to reside in a disk sector, a search is now made through the table LNKM (FIG. 6/111) for a subtask and sector which are assigned to the same frequency index as that of the new file. If the file's frequency index is found within the table LNKM, the corresponding disk sector is retrieved and a check is made to see if the sector has room for another file within one of its converter sets (step 6/1128) or if the sector has room for an additional converter set. If not, the search continues through the table LNKM. If no disk sector is found having the same frequency and also having room for the new file, then a new analog scan disk sector is created (step 6/1130) to hold the new file. In either case, program control advances through step 6/1112 to step 6/1114. The file name is entered into the system directory (step 6/1114), and the new file is created and stored away within the designated sector (step 6/1116).

A check is now made (step 6/1118) to see whether or not a new periodically bid sector has been opened up. If not, then the subroutine GNFIL has completed its task and program control returns to the calling program. If so, it is necessary to assign the new sector to an analog scan subtask. This assignment may involve reorganizing the subtask assignments within the sublevel processor tables, within the auxiliary synchronizer tables and within the index sector NLNKM (step 6/1120) so as to preserve the proper priority arrangement of the analog scan subtasks. After the subtask assignments are rearranged, program control returns to the calling program.

If an analog scan data file is to be core resident, program control branches from step 6/1124 to step 6/1156 in FIG. 6/101. A search is made through the table LNKM (FIG. 6/111) for a group of core-resident files which are assigned to the same frequency index as the new file. As has already been explained, the table LNKM is set up in such a way that all disk-resident analog scan subtasks have odd index entries in the table while all core-resident analog scan subtasks have even index entries within the table. If a core-resident subtask linkage assigned to the same frequency index as the new file is found, a check is made (step 6/1158) to see if the addition of a new file to the linkage exceeds the number of converter sets which are permitted in a single linkage. If the new file can be added to the linkage, the starting address of a file assigned to the same subtask number which is to precede the new file in the linkage is determined, taking due precautions to preserve the proper ordering of files in converter sets (step 6/1164), and then a hole for the new file is found within the core file storage area (step 6/1166). If the file cannot be fit into an existing subtask linkage, then a search of the LNKM table continues (step 6/1156). If no subtask linkage is found to which the file may be attached. then a hole is found in the core file storage area and a type 8 coupler file of the type shown in the lower half of FIG. 6/106 is created in the hole (step 6/1160). Program control then passes through step 6/1162 to step 6/1152 where the file name is entered into the system directory. The file is then loaded into the core buffer LCORE (FIG. 6/108) and the empty file linkages are adjusted as needed (step 6/1154). Program control then returns to step 6/1118 in FIG. 6/100. Once again, a check is made to see if a new periodically bid subtask needs to be established. If so (step 6/1118), the subtask number assignments are reorganized as needed (step 6/1120) before program control returns to the calling program. Otherwise, program control returns directly to the calling program from step 6/1118.

Now assume that an analog control chain (file type 11) is to be created and is to be linked to an analog scan file which is designated by name as a trigger. Upon entry into the subroutine GNFIL, program control passes rapidly through step 6/1102 to step 6/1104 and from thence to step 6/1106. The address of the trigger file is first retrieved from the system directory (step 6/1106). Assuming that the analog control chain is to reside in the same disk sector where the trigger file resides, program control passes from step 6/1108 to step 6/1110 and the sector containing the triggering file is retrieved from disk storage. Program control then passes through step 6/1112 to step 6/1114 where the file name is entered into the system directory. The new file is then added to the disk sector and is linked by means of a type 8 coupler file of the type shown in the upper half of FIG. 6/106 to the triggering file (step 6/1116).

Program control then passes through step 6/1118 and back to the calling program. If the analog control chain is to be core-resident, program control passes from step 6/1108 to step 6/1109. A hole with the core file storage area is found for the analog control chain (step 6/1109), and a coupler file of the type shown in the upper half of FIG. 6/106 is placed into the triggering file disk sector and is linked to the triggering file (step 6/1111). The second data value within this coupler file is a pointer—the starting address of the core resident analog control chain. The name of the analog control chain is then entered into the system directory (step 6/1114). The new file is created within the core file storage area and appropriate linkages are established (step 6/1116). Program control then passes through step 6/1118 and back to the calling program.

A subtask bidding file (type 13) is a file which contains a subtask number which is to be bid for execution. Files of this type are often triggered by analog scan files for the purpose of calling upon a control chain or program to process the data retrieved by the program which processes the analog scan data file. Triggered subtask bidding files are handled in exactly the same manner as are analog control chain files, and non-triggered subtask bidding files are handled in exactly the same manner as are analog scan data files. However, subtask bidding files have no name. For this reason, a step 6/1112 in FIG. 6/100 and a step 6/1162 in FIG. 6/101 bypass the steps which enter the file name into the system directory (step 6/1114 and step 6/1152) in the case of the subtask bidding file.

FIG. 6/102 is an expansion of step 6/1116 in FIG. 6/100 and explains briefly how new disk-resident files are created and stored. With reference to FIG. 6/102, the first step in the creation of a file is that of altering the empty file linkages so that they no longer link to the slot or hole where the new file is to be stored (step 6/1170). The subroutine OPNFIL (FIG. 6/150) carries out this task. After the empty file linkages have been adjusted and if a type 8 coupler file is required, the type 8 file is loaded into the upper part of the slot into which the file is to be placed. This type 8 file is first created and is then retrieved from locations ITPH4 through ITPH6 in a table that is shown in FIG. 6/112. The transfer of data from the table ITPH to the file storage area is carried out by the subroutine MOVFIL (step 8/1172). After this, if the file is to be linked to other files in an analog scan subtask, the necessary linkages are established (step 6/1174) using the subroutine LNKSEQ which is shown in FIG. 6/170. If the new file is to reside in what was formerly an empty disk sector, then the empty disk sector linkages are altered (step 6/1176) using the subroutine OPNBUF which appears in FIG. 6/130. The file header is then created in the first three locations of the table ITPH (FIG. 6/112) and is transferred into the upper part of the slot by the subroutine MOVFIL (step 6/1178). Then the file data is transferred into the remainder of the slot by the subroutine MOVFIL (step 6/1180). Finally, the disk sector is returned to the disk (step 6/1182) and program control continues with step 6/1118 in FIG. 6/100.

The routine GNFIL contains several tables which are shown in FIG. 6/112. The table ITM is a table of scan periods and has already been explained. A location TMBSAI contains the scan period format and designates whether the scan period is recorded in tenths of a second, in seconds, or in minutes. The subroutine GNFIL has its own temporary storage buffer within the core which is sometimes called NSTDAT and sometimes NSTPGM and which is used for temporary storage of the data that is retrieved from disk sectors. The table ITPH is used for the assembly of file headers and type 8 coupling files, as has been explained.

After the routine GNFIL has run to completion, a two-element array LOC contains the address of the newly created file. In the case of a disk-resident file, the first location within the array LOC contains the sector number of the sector within which the new file is stored and the second location contains the relative file address with the sector. In the case of a core-resident file, the first location within the array LOC contains the core address of the new file and the second location contains "−1". The contents of the array LOC are returned to the calling program as an argument.

K. FIND AN EMPTY SECTOR SUBROUTINE

The subroutine LOCBUF which is used to find an empty disk sector is shown in FIG. 6/120. Upon entry into the subroutine, a check is made to see if there are any empty sectors in the empty sector linkage (step 12002). If there are, a search is made of the empty sector linkage for the smallest sector that is large enough to hold a new file (step 12004). If such a sector is found, program control returns to the calling program with an argument IDX set equal to one. If no sector is found that is large enough for the new file, or if there are no empty sectors, then a check is made to see if there are sufficient unused sectors to hold the new file (step 12006). The number of unused sectors which are required is equal to the file length minus one divided by 256. If there is sufficient room, then program control returns to the calling program with IDX equal to 2. If not, then IDX is set equal to 4.

L. SUBROUTINE TO OPEN A NEW DISK SECTOR

The subroutine OPNBUF which opens the new disk sector is shown in FIG. 6/130. This subroutine requires as an argument a value IDX which is either generated by the calling program or is transferred by the calling program from the subroutine shown in FIG. 6/120. If IDX equals 1, then the new sector is in the empty sector linkages (step 13002). The second value in this sector is retrieved and is placed in a temporary storage location I (step 13004). This value is the linkage pointer to the next sector in the empty sector linkage. If there is a previous empty sector in the linkage (step 13006), the value I is placed in the second entry of the preceding sector in the linkage (step 13010). If no other sectors precede this one, then the empty sector pointer is set equal to I (step 13008). In either case, program control returns to the calling program.

If IDX is equal to 2, the new sector is not in the empty sector linkage but is a sector which has not previously been used by the system (step 13012). It is therefore necessary to advance the pointer to the unused sectors by adding to it a value equal to the number of sectors which the new file will occupy (step 13014). This number is equal to the new file size minus 1 divided by 256, plus 1. (256 is the number of locations in a minimum length sector within the preferred embodiment of the invention.) Program control then returns to the calling program.

M. SUBROUTINE TO FIND A HOLE IN THE FILE STORAGE AREA

FIG. 6/140 illustrates the routine LOCHOL which is used to find a hole in an existing file storage area for a new file. Upon entry into the subroutine LOCHOL, a check is made to see if there are any holes in the area (step 14002). The empty file linkage pointer is checked. If it contains zero, then there are no holes. If it contains some other value, then that value is a pointer to at least one hole within the file. If holes do exist, the subroutine follows the empty file linkage looking for the smallest hole that is large enough to hold the new file, if any (step 14004). If such a hole is found, then IEC is set equal to one (step 14006) and a return is executed to the calling program with the index number of the hole as an argument. If none of the holes is large enough or if there are no holes in the file storage area, then a check is made to see if there is an open space at the end of the storage area large enough to hold a new file (step 14008). If there is, IEC is set equal to 2 (step 14012) and program control returns to the calling program. If not, or if the storage area is not large enough for the new file IEC is set equal to 3 (step 14010) and program control is returned to the calling program.

N. SUBROUTINES TO REMOVE AN EMPTY SLOT FROM EMPTY FILE LINKAGE

The subroutine OPNFIL appears in FIG. 6/150. This subroutine has three entries depending upon the value of an argument IEC. IEC is either supplied by the calling program or is transferred by the calling program from the subroutine shown in FIG. 6/140.

If IEC equals 1, then the slot into which a new file is to be placed is a hole in the file storage area which is linked into an empty file linkage. If the new file and the slot are of the same size (step 15002), the empty file linkage is routed around the slot (step 15010) and program control returns to the calling program. If the slot is larger than the file by one location (step 15004), then this extra location is added to the empty word linkage (step 15008) before program control returns to the calling program. If the slot is larger than the file and leaves two or more spaces beyond the file, then an empty file is created in the two or more spaces which are not occupied by the file (step 15006). The new empty file is linked into the empty file linkage and program control returns to the calling program.

If IEC is equal to 2 upon entry into the subroutine OPNFIL, then the file is to be created within the unused space at the end of the file storage area. The subroutine OPNFIL simply moves the unused space pointer so that it points to the location just past the last location occupied by the file (step 15012). Program control then returns to the calling program.

If IEC is equal to 3 upon entry into the subroutine OPNFIL, no action is taken by the subroutine.

O. ROUTINE TO FIND WHERE A NEW ANALOG SCAN FILE SHOULD GO INTO A LINKAGE

The subroutine LOCSEQ appears in FIG. 6/160. Upon entry to the subroutine, it is assumed that a file storage area has been found for a file, that the file is an analog scan file which requires the services of a designated analog-to-digital converter, and that the file must be connected into a particular subtask linkage of files in such a manner as will relatively maximize the efficiency of the scanning process to the greatest degree possible. The subroutine LOCSEQ determines first whether or not a new file may be added to the subtask linkage without exceeding the maximum number of converter sets which may be assigned to that subtask, and secondly determines where in the linkage the new file should be placed.

Upon entry into the subroutine LOCSEQ, the subtask linkage of files into which a new file is to be linked is either core-resident, for example, as shown in FIG. 6/108, or is an analog scan disk sector which has been placed into a core buffer, for example as shown in the central right-hand portion of FIG. 6/111. In either case, the first entry in the linkage of files contains a number equal to the number of converter sets which already exist within the linkage, and the second entry is a linkage pointer to the first file in the linkage. As has previously been mentioned, the address of successive files in the linkage is determined by adding the linkage pointer extracted from a preceding file to the address of the file from which the linkage pointer is extracted. The subroutine LOCSEQ is supplied with the starting address of this linkage and is therefore able to follow the linkage pointers from one file to another in an effort to determine where a particular new file may be placed within the linkage and whether or not the number of converter sets must be increased to accommodate the new file.

With reference to FIG. 6/160, upon entry into the subroutine LOCSEQ, the first file in the linkage is examined (step 16002). If this first file is not an analog scan file (step 16004) and is not the last file in the linkage (step 16006), the next file in the linkage is examined (step 16008). The above procedure is repeated until either an analog scan file is found or until the last file in the linkage is found. If the last file in the linkage is encountered before an analog scan file is encountered, then there are no analog scan files within the linkage. In this case, program control returns to the calling program with an argument IX set equal to 2 to indicate that the new analog scan file should be the first entry within the linkage (step 16010).

If an analog scan file is encountered (step 16004), a check is made to see if the analog-to-digital converter number of the analog scan file in the linkage is greater than the analog-to-digital converter number of the new file (step 16012). If the converter number of the file in the linkage is greater than that of the new file, then the new file may be placed at the beginning of the linkage as part of the first converter set. Program control is then returned to the calling program with IX set equal to 2 (step 16010) to indicate that the new file should be the first entry in the linkage. Otherwise program control proceeds to step 16014 and additional files within the linkage are scanned.

The next file within the linkage is then scanned (step 16014). If this next file is an analog scan file (step 16016), a check is made to see if the new file may be placed between this next file and the preceding analog scan file (step 16022). If the converter number of the next file is greater than that of the new file which is greater than that of the preceding file; or if the converter number of the next file is less than that of the preceding file, and the converter number of the new file is either less than that of the next file or greater than that of the preceding file; then the new file may follow the preceding file, and a new converter set is not required (step 16026). Program control is then returned to the calling program with IX set equal to 1. If the new file does not fit between the next file and the preceding file (step 16022), or if the next file is not an analog scan file (step 16016), then a check is made to see if the next file is the last file within the linkage (step 16018). If it is not the last file, the next file within the linkage is examined in the same way (step 16020). If the next file is the last file within the linkage, then a check is made to see if the converter number of the last analog scan file in the linkage is less than that of the new file (step 16024). If so, then the new file may fit as the last file within the last converter set in the linkage, and a new converter set is not required (step 16026). Program contıol is then returned to the calling program with IX set equal to 1. If the converter number of the last analog scan file in the linkage is equal to or greater than that of the new file, the new file may not be included within any of the existing converter sets. Therefore, if the new file is added to the subtask linkage, the new file will be the first file in a new converter set of files (step 16028). A check is made of the first location within the subtask linkage to see whether the number of converter sets within the linkage already equals the maximum number allowed, which maximum number is stored in a location NSETS (step 16030). If the number of converter sets is less than NSETS, then the new file may be placed at the end of the linkage and a new converter set is required (step 16034). Program control is returned to the calling program with IX set equal to 3. If the subtask already contains the maximum number of converter sets allowed, then the linkage has no room for the new file (step 16032). Program control is then returned to the calling program with IX set equal to 4. Even though there may be no room for a particular new file within a subtask linkage, there may still be room for other new files which make use of different analog-to-digital converters. Hence, even though one particular new file may have to be placed in another subtask linkage, another new file supplied to the system at a later time may fit into this subtask linkage.

P. SUBROUTINE TO CONNECT A NEW FILE INTO A CONVERTER LINKAGE

The subroutine LNKSEQ appears in FIG. 6/170. This subroutine rearranges the linkages within an analog scan subtask linkage so as to include a new file within the linkage. Thus subroutine requires as an argument a value IX which is generated by the subroutine LOCSEQ shown in FIG. 6/160.

Upon entry into LNKSEQ, if IX equals 1, a new file is to be connected into the linkage following a file that is designated by the subroutine LOCSEQ (FIG. 6/160). In this case, the subroutine LNKSEQ loads the linkage pointer location within the new file with the linkage pointer from the file which is to precede the new file or with zero if the new file is the last file in the linkage (step 17002). The subroutine then loads a pointer to the new file into the linkage pointer location within the preceding file (step 17004) and returns program control to the calling program.

If the arguments IX equals 2, a new file is to be linked as the first file in the linkage. In this case, the second entry in the coupler file or sector header (the subtask linkage pointer) is loaded with a pointer to the new file. The pointer which previously occupied the second entry is modified and is placed into the linkage location within the new file (step 17006). Program control then returns to the calling program.

If the argument IX equals 3, then a new file is to be placed at the end of the linkage and a new converter set is required. The number representing the number of converter sets within the linkage which appears in the right-hand portion of the first location within the coupler file or sector header is incremented to show that the number of converter sets has been increased (step 17008). The linkage location in the last file within the linkage is then loaded with a pointer to the new file (step 17004). Zero is left in the linkage location of the new file to show that the new file is the last file within the linkage. Program control then returns to the calling program.

Q. SUBROUTINE TO WRITE DATA INTO A FILE

The subroutine WTFIL appears in FIG. 6/200. This subroutine is used to transfer a block of data from a core buffer into an existing file to replace the data which previously occupied the file.

Upon entry into the subroutine WTFIL, the name of the file is supplied as an argument. The subroutine looks up this name in the file directory (step 20002). If no such file name exists within the directory or if the name is assigned to a global variable rather than to a file, program control immediately returns to the calling program with an appropriate error flag set. If the address of the file is found, a check is made to see whether the file is core- or disk-resident (step 20004). If the file is core-resident, the new data is written directly into the designated file storage area (step 20006) and program control returns to the calling program. If the file is disk-resident, the sector containing the file data is first read into a core buffer (step 20008). The new file data is then written into the buffer in the location occupied by the file (step 20010). The buffer is then transferred back into disk storage (step 20012), and program control returns to the calling program.

R. SUBROUTINE TO TRANSFER THE CONTENTS OF A FILE INTO A DESIGNATED CORE BUFFER

The subroutine RDFIL which appears in FIG. 6/300 is used to transfer the contents of a file into a designated core buffer. This subroutine requires as arguments the name of the file and the core buffer into which the file is to be placed.

Upon entry into the subroutine RDFIL, a check is made to see if the file name exists within the system directory and if the file name is that of a legitimate file, as opposed to a global constant. If the file name does not exist or is assigned to a global constant, program control immediately returns to the calling program with an appropriate error flag set. If the file exists, a check is made to see if the file is a core-resident file (step 30004). If it is, the file is transferred directly into the core buffer (step 30006). If the file is disk-resident, the sector which contains the file is transferred into a first core buffer (step 30008) and then the designated file is transferred into the buffer designated by the subroutine argument (step 30006). Program control then returns to the calling program.

S. SUBROUTINE TO DELETE A FILE FROM THE FILE STORAGE AREA

The subroutine DLFIL shown in FIG. 6/400 is used to delete any file from the system. This subroutine requires as an argument the file name.

Upon entry into the subroutine DLFIL, a check is made to see if the file name exists within the directory and to determine whether that name is the name of a global variable or of a legitimate file (step 40002). If the name does not exist within the directory or if the name is assigned to a global variable, program control is immediately returned to the calling program with an appropriate error flag set. If the file exists, then the subroutine continues.

If the file is disk-resident, the sector which contains this file is transferred into a core buffer so that the file is available for processing (step 40004). A check is then made to see if this file precedes a type 8 coupler file in the linkage of files (step 40006). If it does, then the file is followed by another file whose operation is triggered by the file which is to be deleted. Since the deletion of the file would then leave the file which follows without a trigger, the file is not deleted. Program control is returned to the calling program with an appropriate error flag set.

Assuming that the designated file does not precede the type 8 coupler file, a check is made to see whether the file is a normal control chain file (step 40008). If it is, the subtask to which the control chain is assigned is first disabled and then the address of the control chain is removed from the sublevel processor tables so that the subtask of the control chain is completely removed from the system (step 40010). If the control chain has been assigned a periodic bidding period, the periodic bid is cancelled by an appropriate call to the auxiliary synchronizer program (step 40010).

The space occupied by the file and the space occupied by a preceding type 8 coupler file, if any, is now added to the empty file linkage (step 40012). If the file is connected into an analog scan linkage, this linkage is re-established around the file (step 40012). If the file is the only file within a disk sector, the disk sector is added to the empty sector linkage (step 40012). If the file resides in a disk sector which contains additional files, then the disk sector is written back into disk storage (step 40014). The directory entry for the file is then erased from the system directory (step 40016) and program control returns to the calling program.

The subroutine DLFIL is one of a whole class of subroutines which may reorganize the system while it is operating. Subroutines of the sublevel processor program allow sublevel assignments to be cancelled and/or altered at any time. Subroutines of the auxiliary synchronizer allow periodic bids to be cancelled and/or altered at any time. Subroutines of the logic initiator program allow logical variable triggers and alarm message triggers to be deleted and/or altered at any time. In combination, these system restructuring subroutines make it a simple matter for the system operating configuration to be rearranged at any time, even long after the system is first set up.

T. DIRECTORY FILES AND THE DIRECTORY FILE STORAGE AREA

The directory file storage area is a separate storage area in which a complete directory of file names and global constant names is maintained. Each entry in the directory is a "directory file". Each "directory file" contains the name and address of a file or of a global variable. In the discussion which follows, the names of files and the names of global variables are often called "symbols" or "symbol names". Control chain files are assigned names by the systems engineer in a manner which is explained elsewhere. The names of files for process variables are, by definition, identical to the names of the process variables themselves.

FIG. 6/502 illustrates a typical directory file. The directory file contains a single 6-character symbol name stored as the third, fourth, and fifth entries within the file. Additional entries could be provided for larger names, if desired. The address of the same symbol comprises the last two entries in the file. The first two entries in the file are pointers which link the file into an alphanumeric file linkage and into a hash code linkage. The purpose of these two linkages is explained below. The left-most bit of the first entry in the file is "0" if the symbol is the name of a global variable and is "1" if the symbol is the name of a file. There is no other difference between the directory file for a global variable and that for a control chain, process variable, or other type of file.

FIG. 6/503 illustrates how the directory storage area is arranged. The particular arrangement shown in FIG. 6/503 would be suitable for an all-core system. The preferred embodiment of the invention stores the directory files in disk sectors and therefore requires a somewhat more complicated file storage arrangement which is described below. The individual directory files are stored in the directory storage area in random order.

All of the directory files within the directory storage area are linked into a single alphanumeric linkage. A pointer in a location IXLO points to the first file in this linkage, and a pointer stored in a location IXHI points to the last file in this linkage. This linkage is organized so that if the symbol names within each directory file are examined as one follows the linkage, the symbol names are found to be arranged in alphanumeric order. For example, a first file containing the symbol name "A100" would immediately precede a second file containing the symbol name "A101" in the linkage. The alphanumeric linkage pointers occupy the second location within each directory file and contain a "directory pointer" (to be defined below) to the next file in the linkage. The purpose of the alphanumeric linkage is to make it possible to retrieve a series of symbol names from the directory in alphanumeric order with a minimum of lost time.

If time were not at a premium, the directory entry containing any symbol name could be found by simply following the alphanumeric linkage until a directory file containing the desired symbol name is encountered. In any system of reasonable size, however, a direct search in this manner would take up far more time than would normally be available. The directory files are therefore linked into a plurality of linkages which are called hash code linkages. The pointer to the first directory file in each of the hash code linkages is contained in a hash code pointer table. By providing a sufficient number of hash code linkages, it is possible to set reasonable limits on the time which it takes to find any given directory file.

The particular hash code linkage into which a directory file is placed is determined by the symbol name contained within the directory file. A computation is performed upon this symbol name, and the result of this computation is a hash code number. This hash code number is used as an index to the hash code pointer table shown in FIG. 6/503. All directory files whose symbolic names may be converted into a given hash code number by computation are stored in a linkage which begins with the entry in the hash code pointer table that corresponds to that hash code number.

When it is desired to find the directory file which contains a designated symbol, the symbol is first subjected to an arithmetic computation which results in a hash code number. That hash code number is then used as an index to the hash code pointer table, and the entry in the hash code pointer table corresponding to the hash code number is used as a pointer to a linkage of directory files which includes the file containing the desired symbol. It is then a simple matter to follow through this short linkage checking the symbol names in each directory file until the desired directory file is found.

The computational routine which is used in computing hash code numbers is shown in FIG. 6/511. A hash code divisor LRGE is first defined. This hash code divisor LRGE is equal to the number of hash code linkages which it is desired to have. The symbol name is stored in an array called LSYM with two 8-bit symbols stored in each array location. In the preferred embodiment of the invention, the array LSYM includes 3 locations and thus contains 6 symbols. The subroutine shown in FIG. 6/511 is somewhat more general and merely requires that the total number of locations in the array be stored in a locaton LWDS.

The arithmetic accummulator of the system is cleared to zero, and a number equal to one less than the number of locations in the array is stored in index register C (step 51102). A loop is then entered. During each pass through the loop, the contents of register C are decremented (step 51104). The loop terminates when C becomes negative (step 51105). During each pass through the loop, one location within the array of locations containing the symbol name is exclusively ORed together with the contents of the accumulator, and the result is stored in the accumulator. The contents of the three locations used to store the symbol name are thus exclusively ORed together.

At step 51106, the result of this exclusive OR operation is divided by the hash code divisor LRGE. As has been mentioned, this divisor is equal to the total number of hash code linkages. The arithmetic hardware in the present system is arranged in such a manner that after the division has been completed, a remainder is stored in the extended accummulator register E. This remainder is a number which may take on any value between zero and the value of the hash code divisor LRGE. It is this remainder which is the hash code number corresponding to the symbol name. In step 51107, this hash code number is transferred into the arithmetic accumulator.

In the preferred embodiment of the invention, only positive hash code numbers are permitted. Steps 51108 and step 51109 therefore reverse the sign of the hash code number if that number happens to be negative. This completes the computation of the hash code number. The hash code number is now added to the starting address of the hash code pointer table (FIG. 6/503) to give the address of the pointer table entry which points to the first directory file in the corresponding hash code linkage.

In FIG. 6/503, the directory file storage area includes an empty file pointer which initially points to the first location within the storage area. As directory files are entered into the storage area, the address stored in the empty file pointer location is incremented so that this location points to the first unused location within the storage area. If a directory file is ever removed from service after once having been established, the file is chain-linked between the empty file pointer location and the unused locations at the end of the storage area in the manner shown in FIG. 6/503. The empty file pointer location contains the address of the first unused file within the linkage. Each unused file within the linkage contains a pointer to the next unused file, and the last unused file within the linkage contains a pointer to the unused portion of the directory storage area.

In the preferred embodiment of the invention, the directory file storage area is stored on disk sectors and is arranged as is shown in FIG. 6/505. In order to minimize the time which it takes to find a particular directory file, all of directory files connected into any single hash code linkage are stored together in a common disk sector whenever this is feasible. In order to prevent too many hash code linkages from being established within a single disk sector, the number of hash code linkages assigned to any given disk sector is always limited to a maximum value NC.

FIG. 6/504 shows the hash code pointer table which is also maintained in disk storage. Once a hash code for a symbol name has been computed, the most significant 8 bits of the hash code ("N" in FIG. 6/504) designate the sector in which the hash code pointer for that hash code is stored, and the least significant 8 bits of the hash code indicate the entry within that sector that is the hash code pointer.

With reference to the right-hand portion of FIG. 6/504, each hash code pointer contains an 8-bit sector index number and an 8-bit index number. The sector index number, when added to a constant ISECT, gives the sector number of a disk sector which contains all directory files linked into the corresponding hash code linkage (see FIG. 6/505). The 8-bit index number indicates where within that sectór the first directory file in the corresponding hash code linkage is to be found. A zero entry in the hash code pointer sector means that the corresponding hash code number is not in use and that no linkage exists for that hash code number.

With reference to FIG. 6/505, directory storage disk sectors may be full, partly full, or empty. Normally a "full" sector is a sector which contains a full complement of hash code linkages. Such a sector is shown at 50502 in FIG. 6/505. If the constant NC is equal to 4, then a "full" sector must contain at least 4 files each of which is linked into a different hash code linkage so that 4 hash code linkages exists within the sector. The sector is only "full" in the sense that additional hash code linkages may not be added to the sector. It is possible for a "full" sector to contain only four directory files. Since hash code linkages are limited whenever possible to a single sector, a "full" sector of this type can become fuller and fuller as additional directory files are added to the hash code linkages which are assigned to the sector.

A truly full sector is indicated at 50504. This sector contains less than a full complement of hash code linkages. However, this sector is completely filled with directory files and could not accept even one additional directory file entry. In the preferred embodiment of the invention, hash code linkages are always limited to a single sector and therefore no provision is made for extending a hash code linkage to a second sector. As an alternative arrangement, a pointer to an extension sector may be stored in a second location within this full sector. With reference to 50504 in FIG. 6/505, a pointer "N" is included which indicates that the sector ISECT+N is an extension of this full sector and may be used for the storage of additional directory files in the hash code linkages which begin in this sector.

Only one partly full sector exists within the directory storage area at any given time. The sector number of this partly full sector is stored in a location IPSNSC. A partly full sector is one which contains less than a full complement of hash code linkages and is the sector within which a new hash code linkage may be established. Normally, the partly full sector is the sector immediately preceding that portion of the directlry storage area which has never been used.

The sector number of the first sector in that portion of the directory storage area which has never been used is normally stored in the location INXFRE. Whenever the partly full sector whose address is in IPSNSC becomes full, the sector whose sector number is stored in INXFRE is designated the partly full sector, and its sector number is stored in IPSNSC. The sector number of the next unused sector is stored in INXFRE. If at any time sufficient directory files are deleted from a sector so that a sector which was previously "full" no longer contains a full complement of hash code linkages, that sector is considered an "empty" sector and is chain-linked between the core location INXFRE and the first unused sector. An empty sector is indicated at 50506 in FIG. 6/505. The sector number of this enpty sector is stored in the location INXFRE, and the second location within the empty sector contains a pointer to the first unused sector. After the current partly full sector becomes full, the next new hash code linkage is placed in the "empty" sector.

When the directory access subroutines are in operation, generally one of the hash code pointer table sectors and one of the directory storage area sectors are core resident. The sector number of the hash code pointer table which is core resident is stored in a location ISTSEC (see FIG. 6/504). The sector number of the directory storage area sector which is core resident is stored in a location SECT (see FIG. 6/505). The purpose of these pointers is to save time. These pointers prevent needless transfers of data between disk and core when that data is already present in a core buffer. These pointers are also passed through program common between the various directory access subroutines so as to reduce the number of arguments required by the various directory handling subroutines.

U. SUBROUTINE FOR MAKING ENTRIES INTO THE SYSTEM DIRECTORY

The subroutine WRSYMB is used to enter new data into the system directory. This subroutine appears in FIGS. 6/500 and 6/501. Upon entry into the subroutine, a check is made (step 50001) to see if a symbol name is specified. If it is specified, a check is made with the subroutine LOCDIR to see if the symbol name has already been entered into the system directory (step 50005). If the symbol name has been entered in the directory, program control is returned to the calling program with an argument IEC set equal to either two or three depending upon whether the symbol is the name of a global variable or the name of a file.

If the symbol name nas not previously been entered in the directory, the subroutine LOCDIR calculates the hash code number which corresponds to the symbol name and transfers into a core buffer the directory sector containing the hash code linkage into which a directory file containing the symbol name would be linked. If no sector has been assigned to this hash code number, the next "empty" or partly full sector is transferred into a core buffer. A check of the "empty" sector is carried out to see that it lies within the directory storage area (step 50006). If the partly full sector number IPSNSC is equal to NSECT, the number of the last sector in the directory storage area, then program control returns to the calling program with the argument IEC set equal to 4, indicating that the directory is full. Otherwise, program control continues.

A check is made to see if there is room for new entries in the sector into which a new directory file containing the symbol name is to be placed (step 50007). If the sector is not full, program control continues with step 50008. A full sector is indicated by a zero stored in the third location within the sector, the sector empty file pointer location. If the sector is full, then a check is made to see if the new directory file is the first such file in the hash code linkage (step 50009). If it is the first file in the linkage, then it may be placed in a different sector. Step 50010 alters the pointer IPSNSC in such a manner that a second call to the routine LOCDIR results in an attempt to place the new directory file into one of the truly empty directory sectors. In the preferred embodiment of the invention, if the new directory file is not the first in the hash code linkage, then it is not placed in another sector; rather, program control returns to the calling program with the argument IEC set equal to 4. As has been noted, it is also possible to start a second sector limited to the same hash code linkages as this sector and to place a pointer to that sector within the "full" sector.

Ultimately, program control commences at step 50008 where the argument IEC is set equal to 1. A new directory file is now created containing the specified symbol name. The linkage of empty directory files is first adjusted and is linked around the location into which the new file is to be placed (step 50011). The symbol name and address are then loaded into the file, and the first (left-most) bit of the first word within the directory file is set equal to "1" if the symbol is the name of a file (step 50012).

A check is then made to see if the new directory file is the first file in a hash code linkage (step 50013). If it is not the first file in the linkage, the file is linked to the preceding file in the linkage (step 50014) and program control continues with step 50102 in FIG. 6/501 where alphanumeric linking is carried out. If the new directory file is the first file in a hash code linkage (step 50013), a check is made to see if there is room for at least two more hash code linkages in the partially full sector which is currently being filled (step 50015). If there is additional room, program control continues at step 50101 in FIG. 6/501 with the establishment of a new hash code linkage from an appropriate sector in the hash code table to the new directory file. If there is not room from an additional to hash code linkages in the sector, a new sector number is placed in the location IPSNSC. This new sector number is either retrieved from the second location in the sector into which the new entry was just placed (steps 50016 and 50018) or the new sector number is that of the next sector INXFRE and 1 is added to the next free sector number INXFRE (step 50017). Program control then continues with step 50101 in FIG. 6/501.

With reference to FIG. 6/501, the alphanumeric hash code linkage is established by the programming steps beginning with step 50102. First a check is made to see if zero is stored in the location IXLO which would indicate that the entry just placed in the file directory is the first entry in the directory. If IXLO is equal to zero, a directory pointer to the new directory file is created and is loaded into both the locations IXLO and IXHI (step 50103). This directory pointer comprises: an 8-bit index to the sector in which the directory file is stored which, when added to the value ISECT, gives the sector number of the sector in which the directory file is stored; and an 8-bit pointer to the location within the sector where the directory file begins. The name of the symbol stored in this first directory file is stored in an array LOSYM (step 50104). The name in the directory pointer to the new file is then recorded as a new pointer to the middle of the alphanumeric linkage (step 50105). Program control then returns to the calling program with an argument IEC equal to 1 to indicate that a new entry has been successfully placed into the system directory.

Returning to step 50102, if the location IXLO does not contain zero, then a check is made to see if the new symbol may be linked either to the front or to the back of the alphanumeric linkage (steps 50106 and 50107). If the new symbol follows the last symbol in the linkage alphanumerically, then a new directory file is linked to the last directory file in the alphanumeric linkage. The directory index to this last file is stored in the location IXHI. The linkage is then completed by placing the directory pointer to the new directory file in the location IXHI (step 50109). If the new symbol alphanumerically precedes the first symbol in the linkage (step 50107), then the new directory file is linked between the first directory file presently in the linkage and the location IXLO (step 50108), and the symbol name is stored in the array LOSYM (step 50104).

If the new symbol may not be linked to the beginning or the end of the alphanumeric linkage, the symbol name is compared to the name of the symbol which was last entered into the directory to see if the new symbol precedes or follows this previously entered symbol (step 50111). If the new symbol precedes the last symbol which was entered into the directory, then the alphanumeric linkage is traced from its starting point until the alphanumeric position of the new file is determined (step 50113). If the new symbol alphanumerically follows the last symbol which was entered, then the alphanumeric linkage is traced starting with the file of the last symbol which was entered until the alphanumeric position of the new file is determined (step 50112).

After the new alphanumeric linkage has been established, the name and the directory pointer of the new file are recorded (step 50105) for use in the performance of step 50111 the next time the alphanumeric linking procedure is carried out. Steps 50105, 50111, and 50112 are optional steps which are not essential to the proper functioning of the computer system but which can sometimes reduce the amount of time which it takes to alphanumerically link a new directory file, especially when new files are fed into the computer system in alphanumeric order.

The subroutine WRSYMB may also be used to alter the address that is stored in an existing directory file. At step 50001, a check is made to see if a symbol name is specified by the calling program. This check comprises looking for a zero in the first entry of the array which would normally contain a symbol name. If this location contains zero, then the second location in this array is assumed to be the directory pointer to a directory file which contains an address code that is to be altered (step 50002). The file indicated by the directory pointer is obtained from storage (step 50003) and the new address is loaded into the file (step 50004). The directory file is then returned to storage, and program control is returned to the calling program with the argument IEC set equal to 1. This feature of the subroutine would be used, for example, if a portion of the file storage area were moved from one location to another. As each file in the file storage area is moved, its address in the system directory may be changed. To expedite such a procedure, each file contains as its second entry a directory pointer to the corresponding directory file.

V. SUBROUTINE FOR LOCATING A DIRECTORY FILE

The subroutine LOCDIR is shown in FIG. 6/510. This subroutine expects as an argument a symbol name. Upon entry into the subroutine, the hash code which corresponds to the symbol name is first calculated using the subroutine IHASH (step 51001). A directory pointer to the desired file is then obtained from the hash code pointer table (step 51002). If this pointer is zero (step 51003), then no directory entries have been assigned to the hash code and hence the symbol is not defined within the system. An argument NIDX may be established as a pointer to where a new directory file may be placed within the sector SECT (step 51004). An argument IEC is set equal to "2" to indicate that the symbol is not defined, and program control returns to the calling program.

If the hash code pointer is not equal to zero (step 51003), then the hash code linkage which extends from the pointer is searched from the directory file containing the specified symbol (step 51005). If the symbol name is not found, program control is returned to the calling program with the argument IEC set equal 2 to indicate that the symbol is not defined and with NIDX containing a pointer to a hole where a new directory may be placed in the sector SECT (step 51004). If the sector SECT is full, or if a new sector is to be opened, NIDX is set equal to zero.

If the symbol name is found in the linkage, then the relative address within the sector of the directory file containing the symbol is stored in the location NIDX (step 51006). A value IFORV is set equal to 1 if the symbol is the name of a global variable or is set equal to 2 if the symbol is the name of a file (step 51007). Program control is then returned to the calling program with an argument IEC set equal to one to indicate the symbol is defined within the system.

W. SUBROUTINE TO FIND THE NEXT FILE IN THE ALPHANUMERIC LINKAGE

The subroutine FDIDX is shown in FIG. 6/520. This subroutine requires as an argument an alphanumeric linkage pointer to a directory file. This subroutine first calculates from this linkage pointer the sector number and the address within the sector of the next file in the linkage (step 52001). The sector number is stored in a location AMS. A check is then made to see if the sector AMS is core-resident (step 52002). If the sector is core-resident, the sector number of the sector is stored in a location SECT, and therefore SECT would be equal to AMS. If the sector is not core-resident, it is retrieved from disk storage and is placed in a core buffer (step 52003). Program control then returns to the calling program.

X. SUBROUTINE TO COMPARE TWO SYMBOLS

The subroutine COMSYM appears in FIG. 6/530. This subroutine requires as arguments an array LSA containing a first symbol name and a second array LSB containing a second symbol name. It is assumed that the symbols are stored two symbols per location in a number of locations that is specified by an argument LWSYM (step 53001).

Upon entry into the subroutine, a constant T1 is initially set equal to the number of locations in each array minus 1. A constant N is initially set equal to 1. A loop is then entered. Each time through the loop, the constant stored in T1 is decremented and the constant stored in N is incremented (step 53007). When the constant T1 becomes negative, the loop terminates (step 53008).

Each time through the loop, two characters from a single location in the array LSA are compared to two characters from a single location in the array LSD. The two characters stored in the location LSA(1) are ANDed together with a constant "$7F7F_{16}$" and the result of this computation is stored in a temporary location TA (step 53003). The first two symbols in the array LSB are retrieved from the location LSB(1), are ANDed together with the same constant, and are stored in the accummulator register A (step 53004). The purpose of the ANDing operations is to eliminate parity bits from the characters, if any are present. The characters are coded in the 7-bit ASCII code, and each symbol may optionally include an additional 8th bit that is a parity bit. The resultant 8-bit symbols are stored two in each 16-bit location. The parity bits occupy the bit positions 7 and 15 within each location. It is necessary to store a zero bit in bit positions 7 and 15 in order to prevent the presence or absence of parity bits from interfering with the alphanumeric comparison operations. The constant "$7F7F_{16}$" when written in binary form becomes the constant "$0111111101111111_2$" which contains zeros in bit positions 7 and 15. By ANDing this constant together with the array elements, all parity bits are converted into zero bits. This operation has the added benefit of placing a zero bit in the left-most or sign bit position, thereby causing all array elements to be treated as positive integers by the system arithmetic logic. Again, this is desirable if proper alphanumeric comparison is to be carried out.

The contents of the location TA are now subtracted from the contents of the accumulator register A. The result of this subtraction is zero if and only if the two locations contain the same identical pair of symbols. If the result is not zero (step 53006), then the sign of the result indicates whether the symbol name stored in the array LSA precedes or follows the symbol name stored in the array LSB in alphanumeric order. If the contents of the accummulator are positive (step 53009), an argument IEC is set equal to 1 to indicate that the symbol stored in the array LSA comes before the symbol stored in the array LSB in alphanumeric order (step 53010). Program control returns to the calling program. If the contents of the accummulator are negative, the argument IEC is set equal to 3 to indicate that the symbol stored in the array LSA follows the symbol stored in the array LSB in alphanumeric order (step 53011). Again, program control returns to the calling program.

If the test performed in step 53006 reveals that the two locations contain identically the same two characters, then the same operation is performed upon the next two pairs of characters in the two arrays. The contents of the location T1 are decremented and the value of N is incremented (step 53007). Steps 53003 and 53004 are then repeated with the value of N increased so that the contents of the next locations in the two arrays are checked. This process is continued until the value T1 becomes negative (step 53008). When the value T1 becomes negative, all of the symbols in the array LSA have been compared with and have been found to be identical to all of the symbols stored in the array LSB. The argument IEC is therefore set equal to "2" as an indication that the symbols are identical (step 53012). Program control then returns to the calling program.

Y. SUBROUTINE TO RETRIEVE DATA FROM THE DIRECTORY

The subroutine RDSYMB is shown in FIG. 6/600. This subroutine handles querries to the system directory.

Upon entry into the subroutine, a check is made to see if a symbol name is supplied as an argument (step 60001). If so, then a search is made for a directory entry which contains this symbol, using the subroutine LOCDIR (step 60002). If no entry is found corresponding to this symbol, program control returns to the calling program with IEC set equal to 2. If a directory file containing this symbol is found, the address portion of the directory file is retrieved and is stored in an array LOCATR (step 60005). A check of the first bit in the first location within the directory file is made to determine whether the symbol is the name of a global constant or the name of a file (step 60006). An argument IFORV is set equal to 1 if the symbol is the name of a global variable and is set equal to 2 if the symbol is the name of a file. Program control then returns to the calling program, and an argument IEC is set equal to 1 to indicate that the entry was found.

If the first location in the array which normally contains a symbol name contains zero (step 60001), this indicates that a symbol name has not been supplied and that the second location within the same array contains a directory pointer to a particular directory entry. The directory entry designated by this pointer is found using the subroutine FDIDX (step 60003). The symbol name is then from the directory entry and is stored in an array LSYMB (step 60004). Program control then commences with step 60005 in the manner which has been described.

Z. SUBROUTINE TO REMOVE A DIRECTORY ENTRY

The subroutine ERSYMB, which is used to remove entries from the system directory, appears in FIG. 6/700. This subroutine requires as an argument the symbol name which is stored in the directory file that is to be removed from the directory system.

Upon entry into the subroutine, the subroutine LOCDIR is called upon to determine whether a directory file exists which contains the designated symbol name, and to determine the address of that directory file (step 70001). If no directory file is found which contains the symbol name, then program control returns with an argument IEC set equal to 3 to indicate that no such directory file exists. In some embodiments of the present invention, it is desired to prevent the accidental deletion of directory files which contain the name of process variables from the system. In such systems, the step 70001 sets an argument IEC equal to 2 and returns program control to a calling program if it determines that the symbol name is the name of a process variable.

If a directory file is found which contains a symbol and if that symbol is not associated with a process variable, then the argument IEC is set equal to 1 (step 70002) and the process of removing the file from the system continues. A check is first made to see if the directory entry is the first entry in a hash code linkage (step 70003). If it is not the first entry, the space occupied by the directory file is added to the empty file linkage within the sector in which the file resides. The hash code linkage is then established around this empty slot (step 70004). If the directory file is the first entry in a hash code linkage, then a further check is carried out to determine whether or not the directory file is the only entry in the hash code linkage (step 70005). If it is not the only file in the linkage, then the space occupied by the file is added to the empty file linkage and the hash code linkage is established around the empty file location (step 70006). If the directory entry is the only one in its hash code linkage (step 70005), then there is room for a new hash code linkage within the sector in which the directory file resides. This sector is connected to the front of the empty sectory linkage (step 70007) and "1" is subtracted from the record of the number of hash codes assigned to this sector which is maintained in the 4th location within this sector (see FIG. 6/505). The space previously occupied by the file is then added to the empty file linkage within the sector, and the space is also removed from the hash code linkage. In this case, a zero is placed in the hash code linkage pointer location within the hash code pointer table.

A check is now made to see whether this file is the first file in the alphanumeric linkage of files (step 70009). It is the first file, a pointer to the second file in the alphanumeric linkage is stored in the location IXLO, and the symbol name stored in the second directory file is stored in the array LOSYM (70010). If the directory file is not the first file in the linkage, then the alphanumeric linkage is traced through from its origin to the file which immediately precedes the directory file which is to be removed (step 70011). The alphanumeric file linkage is then established in such a manner as to exclude the file which is to be removed from the linkage (step 70012). Program control then returns to the calling program.

AA. OBTAINING THE NAMES OF FILES IN ALPHANUMERIC ORDER

The two subroutines NXFLNM and NXSYMB shown in FIGS. 6/800 and 6/810 provide a method whereby file names may be retrieved from the directory storage area in alphanumeric order. These routines are highly useful to the operator of a computer system in carrying out scans. As a simple example, suppose the operator of the system wishes to scan the system variables A101, A102, . . ., and A110. The operator calls upon a scan routine and requests that routine to print out the values of ten variables in alphanumeric order beginning with the variable whose name is A101. The scan routine first obtains the address of a file corresponding to the variable A100 from the directory system, obtains the address of the variable A100 from this file, and calls upon an appropriate system routine to print out the value of this variable. The scan routine then calls upon the subroutine NXFLNM to supply it with the name of the next system file in the alphanumeric linkage of symbol names. The subroutine NXFLNM then works together with the subroutine NXSYMB to determine what file name within the system alphanumerically follows the file name A101. The subroutine NXFLNM ultimately returns the symbol name A102 to the scan program and thus allows the scan program to scan the second of the ten files. By repeatedly calling upon the subroutine NXFLNM, the scan program can carry out the desired scan without requiring the computer operation to type out the name of each of the ten variables which are to be scanned.

The subroutine NXSYMB shown in FIG. 6/810 requires as an argument a symbol name. Upon entry into the subroutine, the directory file containing the designated symbol name is obtained by a call to the subroutine LOCDIR (step 81001). If no directory file exists which contains the designated symbol name, program control is returned to the calling program with an argument IEC set equal to 3 (steps 81002 and 81003). If a directory file containing the specified symbol does exist but contains zero in the alphanumeric linkage location, this indicates that the directory file is the last file in the alphanumeric linkage. Program control is then returned to the calling program with the argument IEC set equal to 2 (steps 81004 and 81005). If the alphanumeric linkage pointer is not equal to zero, the pointer is the directory index number of a directory file containing a symbol name that follows the specified symbol name in alphanumeric order. This directory file is retrieved by a call to the subroutine FDIDX (step 81006). An argument IFORV is set equal to 1 if the next symbol name is that of a global constant and is set equal to 2 if the next symbol name is the name of a file (step 81007). The next symbol name itself is transferred into an array LYSM and is passed back to the calling program (step 81008). An argument IEC is then set equal to 1 (step 81009), and program control returns to the calling program.

The subroutine just described performs all the steps necessary to find the next symbol name in the alphanumeric linkage of symbol names. The subroutine returns the symbol name regardless of whether the symbol name is the name of a file or the name of a global constant. The subroutine NXFLNM (FIG. 6/800) returns only file names to the calling program. Upon entry into the subroutine NXFLNM, the name of the next symbol in the alphanumeric linkage is determined by a call to the subroutine NXSYMB (step 80001). If the return argument IEC is equal to 2 or 3, program control is returned immediately to the calling program with an appropriate error flag set (step 80002). If the return argument IFORV is equal to 1, this indicates that the symbol name which was returned is the name of a global constant. That symbol name is then returned once again to the program NXSYMB (step 80001). In this manner, the subroutine NXFLNM repeatedly calls upon the subroutine NXSYMB until the name of a file is returned. Program control then returns to the calling program with the file name as an argument.

7. THE CONTROL CHAIN PROCESSOR

The control chain processor 700 together with the other elements of the system which interact with the processor 700 are shown in FIG. 7. The control chain processor 700 is a very short routine which controls the transfer of program control between the system algorithm subroutines as required by the data modules in control chain data files.

When a control chain data file is to be executed, program control is transferred from either the sublevel processor program 410 or the data file processor program 412 to an entry routine 706 within the control chain processor 700. The entry routine 706 expects as arguments the address of a task data pool within which temporary values may be stored and also the starting address of the control chain file which is to be processed. The entry routine 706 first calculates the address of the 40th location within the task data pool and stores this address in index register B. The routine 706 then loads the control chain file starting address into the 41st location within the task data pool and loads the address of the first module within the control chain into the 42nd location within the task data pool. This latter address is calculated by adding five to the starting address of the control chain file. With reference to FIG. 8/A00, the beginning of the first module within a control chain file is five locations past the beginning of the control chain file itself. The header information portion of the file and the starting module of the control chain are not used by the control chain processor.

Program control is then transferred to a finding next algorithm routine 710. The routine 710 retrieves a module type number from bit positions 8 to 0 of the first storage location within the first module of the chain. Using this module type number as an index, the routine 710 retrieves the starting address of an algorithm subroutine from an algorithm subroutine starting address table. In the example shown in FIG. 7, the first module type number is "$1_{16}$". The subroutine 710 therefore retrieves the address MODAO1 from the first entry in the algorithm subroutine starting address table. Program control is then transferred directly to the algorithm subroutine MODA01 with the system index register C containing the starting address of the first module in the control chain.

Upon entry into the algorithm subroutine MODA01, index register B points to the fortieth location in the task data pool and index register C contains the starting address of the module which is to be processed by the algorithm subroutine. The algorithm subroutine MODA01 carries out some computation or calculation using the values contained within the first module. If any temporary data values are generated, these values may be stored in the task data pool, preferably in the locations beginning with the 43rd location in the task data pool. Index register B is used in addressing these locations. For example, the 43rd location is addressed as "B+3" or "3, B"; the 44th location is addressed as "B+4" or "4, B"; and so on. Sometimes before relinquishing program control, the subroutine MODA01 calculates the starting address of the next module within the control chain and stores this starting address in the 42nd location within the task data pool.

When the algorithm subroutine MODA01 has run to completion, program control is returned to the entry of the find next algorithm routine 710. The routine 710 retrieves the starting address of the next module from the 42nd location within the task data pool and again extracts a module type number from the first location within this module. Once again, the module type number is used as an index to the table of algorithm starting addresses, and program control is transferred to the algorithm subroutine which is to process the second module. Program execution continues in this manner, with successive control chain modules being processed by the corresponding algorithm subroutines and with program control passing briefly through the find next algorithm routine 710 between the execution of successive algorithm subroutines.

In FIG. 7, the state of the system is shown when the Jth module has been processed and when the Kth module is about to be processed. As program control reaches the routine 710, location 42 within the task data pool points to the Kth module within the control chain file. The module type number "$A_{16}$" is retrieved from the Kth module and is used as an index to the algorithm subroutine starting address table. Program control is then transferred to the 10th module within the file, the module MODA10 ("10" in decimal notation is the same as "A" in hexidecimal notation). FIG. 7 illustrates than when the algorithm subroutine MODA10 gains program control, index register B points to the 40th location within the task data pool and index register C points to the beginning of the Kth module.

The last module in a control chain contains the module type number $FF_{16}$. When the routine 710 retrieves the type number from this module, the routine 710 knows that the control chain has been completely processed. Program control is then transferred to an exit routine 708.

The 41st location within the task data pool contains the control chain starting address. As is explained in connection with FIG. 8/A27, this starting address permits conditional and unconditional transfers to be carried out within the scope of a control chain and thus enables control chains to simulate the operation of the GO TO and the IF statements in Fortran IV.

Within the present system, control chain files may be assigned to any of the system task levels and even to the monitor data file processor task level. If a control chain is executed at a task level other than the task level assigned to the monitor data file processor 412, control chain execution terminates via the basic subtask exit program 10/1300 shown in FIG. 10A. This is the normal exit program used by any subtask within the system that has run to completion. The exit routine 708 checks the task level that is currently running. If the running task level is not the monitor data file processor task level, an exit is immediately carried out via the basic subtask exit program 10/1300.

If the task level assigned to the monitor data file processor is running, a different exit is used to insure that program control is transferred to the monitor data file processor and not to the sublevel processor. As is explained elsewhere, the monitor data file processor task level does not use the sublevel processor as its entry point. It is therefore necessary for the exit routine 708 to transfer program control directly to the origin of the monitor data file processor task level-the input to the monitor data file processor 412. This is done in the case of all control chains which are assigned control chain subtask numbers and which are not stored or intermixed with other types of data in some form of data file subtask.

Analog control chains may be defined within the system which are intermixed with monitor data files of the type normally handled by the data file processor 412. These analog control chains are not assigned to individual subtasks, as are normal control chains, but are executed in the course of the execution of a subtask assigned to a string of chain-linked monitor data files. A typical example of where such a control chain would be encountered is in the processing of analog scan data files. If it is desirable to have a particular analog scan input value processed by a control chain as soon as the value is retrieved, an analog control chain file is linked directly to the monitor data file of the analog scan value. After the monitor data file processor 412 has processed the analog scan data file, the processor 412 comes upon the analog control chain data file and transfers program control directly to the entry routine 706 of the control chain processor 700 so that the analog control chain is executed without further delay. After the analog control chain has run to completion, the exit routine 708 first determines that the currently running task level is that assigned to the monitor data file processor and then determines that the subtask which is presently being executed is assigned to a string of monitor data files and not to a normal control chain file. This latter determination is made with the assistance of the current subtask running tables within the sublevel processor. When an analog control chain file of this type is encountered, the exit routine 708 returns program control directly to a special entry into the monitor data file processor 412 so that the processing of analog scan data files may be continued with as little delay as is practicable. With reference to FIGS. 15/314 and 15/315, the only difference between normal control chain files (FIG. 15/315) and analog control chain files (FIG. 15/324) other than the file type number is the presence of a linkage pointer in the analog control chain files which links the file to the other monitor data files in a subtask linkage of files.

Provision is made within the system for placing control chains into time delay. For this purpose, a special control chain module is provided which calls upon a time delay algorithm subroutine to suspend the currently running subtask level until the time delay expires. For the most part, the details of the time delay procedure are described in other sections of this specification. It is only important at present to note that the control chain processor 700 has a special routine 704 for restarting control chain subtasks which are returning from time delay. As will be described in more detail at a later point, when the sublevel processor 410 encounters a control chain which is returning from time delay to active operation, the sublevel processor 410 transfers program control to the return from subtask time delay routine 704. Upon entry at 704, the system registers specify the subtask number of the subtask which is returning from time delay and the address within the control chain file of the module which initiated the time delay. The routine 704 first calculates the starting address of the next control chain block or module which is to be executed by adding a constant to the address of the module which initiated the time delay. This starting address is then stored in the 42nd location within the task data pool. The routine 704 then accesses tables within the sublevel processor 410 and determines the starting address of the control chain. The chain starting address is then loaded into location 41 within the task data pool. Program control is then transferred to the find next algorithm subroutine 701 and execution of the control chain recommences exactly where it left off.

The automatic generation, linkage, and on-line use of control chains and algorithm subroutines has many advantages over conventional programming of control operations in Fortran or some other general purpose computer processing language. Storage space is saved because the control chain files are much more compact than are equivalent programs compiled in Fortran or in machine language. Time is also usually saved over the execution of similar routines and programs written out in Fortran because the algorithm subroutines are carefully arranged to be fast and highly efficient. The find next algorithm subroutines 710 consists of only twelve machine steps and does not slow down the processing of a control chain to any appreciable degree. Translation programs which are used in creating the control chain files initially allow the user great flexibility in choosing the terminology with which he defines his control instructions and the units with which he defines the parameters of his control and process operation instructions. Since each control chain can run virtually independently of any other control chain in the system, it is possible to add or to remove control chains at any time even long after the system is established and running. As discussed subsequently herein, a wide variety of algorithm subroutines are provided for use and additional ones may be constructed where there is a special need for the repeated performance of a particular operation. Algorithm subroutines are provided which can call for the execution of other algorithm subroutines; which can feed data out of the system; and which can call for the execution of programs written in Fortran or in machine language. The control chain processor and the control chain files thus give the present system increased speed, reduce the amount of storage space required, and greatly simplify the user's task of setting up or of altering the operation and control of his process.

8. CONTROL CHAIN ALGORITHMS AND THE USE OF CONTROL CHAINS

Control chains replace a large percentage of the programming that is found in a conventional computer control system. A control chain is a sequence of data blocks or modules each of which calls for the execution of a predefined algorithm or task. Control chains are written out in the language of the systems engineer, and one having no previous knowledge of computer programming can be quickly taught how to write control chains. Control chains are not compiled or assembled into machine executable instructions as are conventional programs but are translated into compact data files. These files occupy far less room within storage than do equivalent programs. When a control chain is executed or placed into operation, the blocks or modules which comprise the control chain are sequentially interpreted by a series of algorithm-defining subroutines. These algorithm subroutines carry out the desired tasks under the control of the control chain data. A control chain processor program determines which algorithm subroutine is to interpret each block or module within a data file and places the necessary calls to the algorithm subroutines.

The nature of the tasks which may be carried out by control chains is limited only by the number and the types of algorithm subroutines which are available. A library of over fifty pre-defined algorithm subroutines makes it possible for control chains to carry out almost any type of control operation. A first group of algorithm subroutines provide software counterparts to flip-flop devices, time delay devices, and other digital control hardware devices. A second group of subroutines provides software counterparts to proportional, rate, reset, and hybrid analog controllers. A third group allows FORTRAN-like arithmetic, logical, and transfer statements to be included in control chains. A fourth group allows subroutine calls to be made both to the various computer system subroutines and to programs written in FORTRAN or in assembly language. By selecting subroutines from this library, the systems engineer may tailor his process control system to the specific needs of the total system. He may also add his own algorithm subroutines to handle problems which are unique to his system and which are not adequately handled by the library routines.

In addition to requiring less storage space than conventional computer programs, control chains may usually be executed at higher speeds than is possible with programs written in FORTRAN. The algorithm subroutines are all highly efficient programs preferably written in assembly language. Program control is transferred from one algorithm subroutine to the next very rapidly by the control chain processor program. The systems engineer is given the convenience of quickly writing out his control chains using his own terminology, and he achieves execution speeds and process performance which can only be rivaled by conventional programs laboriously written out in assembly language.

A large number of the program system elements participate in the translation, the establishment, and the execution of a control chain. The control chain generator language translator program takes the systems engineer's language and converts it into a control chain file in accordance with translation instructions contained in what is called the macro specification. The file loader program, the file handler subroutines, and the directory handler subroutines establish the control chain within the system, link it up to the logic initiator and to the auxiliary synchronizer, and place a record of the control chain's existence into the sublevel processor. Finally, the control chain processor program and the algorithm subroutines jointly execute the control chain.

All of the above programs and subroutines with the exception of the algorithm subroutines are discussed in great detail in other sections of this specification. A representative group of algorithm subroutines is discussed below. Since a complete overview discussion of how control chains are created from beginning to end is not presented in any other place, such a discussion is appropriate at this point. More details may be found in the other sections of this specification.

A. CREATION AND ESTABLISHMENT OF A CONTROL CHAIN-IN GENERAL

At the time when an operating system is initially set up, the systems engineer has at least two important jobs to carry out. The first is that of selecting which algorithm subroutines he wishes to have available within the computer system. Algorithm subroutines for performing many types of control and computational operations are presently available, and the total library of available algorithm subroutines numbers over fifty at the present time. If the systems engineer desires a special algorithm subroutine other than those available within the library, he arranges to have this subroutine written out either in assembly language or in Fortran in such a manner as to be compatible with the requirements of the control chain processor program. If blanks are left within the control chain processor table of algorithm subroutine starting addresses, additional algorithm subroutines may be added to the computer system at a later date.

After the systems engineer has selected the algorithm subroutines which he wishes to use, his second job is to decide on the terminology that he wishes to use in specifying how each algorithm subroutine is to be executed, and to decide on the particular engineering units which he plans to use in writing out his control chains. As an example, two systems engineers both wishing to use a pre-defined time delay algorithm subroutine (which sets a logical variable into a particular state at the expiration of a time delay) may use entirely different terms in writing out their control chains. The first may call the algorithm subroutine "OS" for one-shot, while the second may call the algorithm subroutine "TIMDEL" for time delay. The first may define the length of the time delay in seconds, and he may call this length "SECS"; the second may define the time delay in tenths of a second, he may call this length "TENTHS". Each systems engineer prepares his own individual macro specification defining his terminology and choice of engineering units. The control chain generator program then translates the terminology and units of each engineer using the macro specification prepared by that engineer as a translation guide. The two translated control chain files which result are both intelligible to the single time delay algorithm subroutine that is to process the files.

A simple example will serve to illustrate this entire process. Suppose that a simple one-step control chain is to be established and is to set true a logical variable A200 at the expiration of a ten second time delay. In addition, the time delay is to be cancelled and the logical variable A200 is to be set false if an input logical variable A100 should happen to go false before the end of the ten second interval. A single library algorithm subroutine LGTDTT is available which can carry out all of these tasks (see FIG. 8/A06). A systems engineer might write out this control chain in the following manner:

| | | |
|---|---|---|
| | CHAIN TIMDEL (CORE) | Header |
| | Level = 5010 | |
| 1 | LGTDTT | First Block or Module |
| | SECS = 10 | |
| | INPUT = A100 | |
| | OUTPUT = A200 | |
| 2 | EXIT | Second Block or Module |

The first line of this control chain states that the systems engineer has assigned to this control chain the name "TIMDEL" and has requested that the control chain file be stored in core storage. The second line indicates that this control chain is to be assigned to the subtask number 5010 (task level 5, sublevel 10 - see FIG. 10I) within the operating computer system. The four lines beginning with "LGTDTT" is the systems engineer's request that a particular logical time delay algorithm subroutine LGTDTT (see FIG. 8/A06) be called upon to execute a ten second time delay upon the output variable A200 under the control of input variable A100. An EXIT statement then indicates the end of this very short control chain.

This simple control chain includes a two-line header and two numbered blocks or modules of data. The first statement in each block or module contains the name (LGTDTT or EXIT) of an algorithm subroutine which is to execute that block or module, and also includes an arbitrary block number which is assigned to the block or module by the systems engineer. While the block numbers serve no useful purpose in this simple example, they do have utility which is explained below. The above control chain is placed in machine readable form and is presented to the control chain generator program (FIG. 15/200).

Before this control chain is intelligible to the control chain generator program, the systems engineer must define his terminology and his choice of engineering units. He does this by preparing a macro specification and by presenting the macro specification to the control chain generator prior to the presentation of this control chain. In brief summary, the macro specification supplies to the control chain generator program the terminology which is to be used in the control chain blocks or modules for each algorithm subroutine. To process this simple control chain, the following information is incorporated into a macro specification:

LGTDTT is algorithm subroutine number 6. Within any data module which this subroutine is to process:

SECS times 10 is a number which is the first module entry.

INPUT is the name of a system variable, the address of which is to be the fourth module entry.

OUTPUT is the name of a system variable, the address of which is to be the fifth module entry.

EXIT is the algorithm subroutine number $FF_{16}$. The above is the essence of the data which appears in the macro specification.

An actual macro specification for the time delay block or module LGTDTT appears in tabular form in FIG. 8/A06H. Each line of this specification is punched into a card and the deck of cards is fed into the control chain generator program preceded by a card bearing the name MACRO, as is more fully explained in section 15. The control chain generator program includes an internal calculation table which is referred to by the macro specification. This calculation table appears in FIG. 8/A06I. A complete explanation of the macro format code and of the calculation table entries appears in FIGS. 15/210 to 15/216. Without going into great detail, the first entry in the macro format or specification table (FIG. 8/A06H) indicates that the name LGTDTT is the name of an algorithm subroutine whose address occupies the 6th entry in an algorithm starting address table within the control chain processor program (see element 710 in FIG. 7) and is to process a data module containing six data entries. The second entry indicates that the input value labeled SECS is single valued (as opposed to an array—"1" in column number 3), is a real number ("2" in column number 4), and is to be stored temporarily as the 6th entry in the calculation table ("6" in column number 8—see FIG. 8/A06I). The third and fourth table entries indicate that the input values labeled INPUT and OUTPUT are variables ("3" in column number 4) the addresses of which are to become part of the control chain file ("1" in column number 6). The fifth table entry indicates first that the number "10.0" is to be stored as the 7th entry in the calculation table ("7" in column number 7 and "10.0" in column number 9); and that the sixth calculation table entry ("6" in column number 4) is to be multiplied ("3" in column number 5) by the seventh calculation table entry ("7" in column number 6) with the result stored as the 6th entry in the calculation table ("6" in column number 3). The last three table entries cause the calculated time in tenths of a second to be transferred from the 6th calculation table entry into the control chain data file and cause "0" to be transferred twice from the first calculation table entry into the control chain file for reasons which are explained in connection with FIG. 8/A06 at a later point.

Ultimately, after the control chain file is established and operating within the computer system and the process, the block or module of data which is to be processed by the LGTDTT algorithm subroutine appears as is shown in FIG. 8/A06G. The first entry in this data module is a header entry which contains the module block number "1" to the right and the algorithm subroutine number "6" to the left. The block number enables this data module to be found within the control chain and makes it possible, for example, for the length of the time delay to be altered in an operating system. The algorithm subroutine number enables the control chain processor program (FIG. 7) to locate the address of the algorithm subroutine which is to process this data module.

The remaining entries in the data module (FIG. 8/A06G) contain data which is to be supplied to the algorithm subroutine. Values which have been calculated or which come from the calculation table form the first three entries in the data module. These values are 100, zero, and zero. The ordering of these three values is the same as the ordering of the macro specifications bearing a "4" in column number 1. The last two entries in the module are the addresses corresponding to the variables "A100" and "A200"—these entries do not come from the calculation table, but are called for by macro specifications bearing a "2" in column number 1 and a "1" in column number 6. The ordering of these last two entries is the same as the ordering of the corresponding macro specifications in the table. All of this is explained more fully in section 15 of this specification.

A complete control chain is shown in FIG. 8/A06J. A start module contains the subtask number of the control chain and the control chain periodic bidding period, if the control chain is to be executed periodically. An end module at the end of the control chain contains the block number 2 and calls upon the exit algorithm subroutine $FF_{16}$. In between the start and end modules are one or more data modules, such as the time delay data module shown in FIG. 8/A06G. Usually there will be more than one algorithm data module in a control chain file.

The actual output of the control chain generator is an intermediate file which appears in FIG. 8/A06K and which typically is punched out on paper tape. The output is in the form of a 54-word load record having a standard load record header and having a checksum value in the 54th location, as is required by FIG. 5G. The name of the file and the file subtask number (and period, if any) are contained in a "beginning of file" load module within the load record. The control chain file data is contained within a "file data" module, with the one exception that the data module contains zeroes in the locations where the addresses of the logical variables A100 and A200 are to be placed. Two symbol reference modules follow the file data module. The first indicates that the address of the symbol A100 is to be placed in the eighth location within the ultimate control chain file, and the second indicates that the address of the logical variable A200 is to be placed in the ninth location within the control chain file (note control chain file entry numbers to the right of appropriate load module entries). An "end of file" module indicates that the above entries completely define a control chain file. A "last" module indicates that no more files are to follow. A much more detailed explanation of the load module formats is presented in FIG. 5H and in the accompanying text.

The intermediate file shown in FIG. 8/A06K may be generated at a location remote from the operating system at any time, even long after the system is established and running. Off-line preparation of load records is possible because the actual addresses of the logical variables A100 and A200 do not have to appear in the load record, and the ultimate location into which the control chain is to be stored within the operating computer system also does not have to appear in the load record. This intermediate file is fed into the computer system, and the control chain which it defines immediately becomes operational. Alternatively, the control chain generator may be operated on-line within the system into which the control chain is to be loaded. In this case, the use of load records and intermediate files may be dispensed with entirely through use of a combination control chain generator and file loader program.

The intermediate file is fed into the computer system by the system file loader program (FIG. 5A). The file loader program then assembles the control chain file within a core buffer. The addresses of the variables A200 and A100 are obtained from the system file directory and are placed into the eighth and ninth locations within the file. The file loader program supplies the completely generated file to the file handler routine GENFIL (FIG. 6/100). The file handler routine finds an appropriate empty slot in the file system for the new control chain file and stores the control chain file in the empty slot. The routine GENFIL next supplies the name and address of the control chain file to the system directory and in particular to the WRSYMB subroutine (FIG. 6/500). Finally, the file loader program supplies the address and the subtask number of the control chain file to the sublevel processor program (FIG. 10A - subroutines 10/220) so that a record of the control chain's existence is recorded within the sublevel processor tables. If the control chain file is to be executed periodically, the file loader program also supplies the file subtask number and bidding frequency to the auxiliary synchronizer (subroutine 916 in FIG. 9A). If the control chain is triggered by a logical variable or by the scanning of a monitor data file, the trigger connection is established by a trigger correct subroutine (FIG. 5K) of the file loader program. Triggers of this type are defined by trigger load modules (see FIG. 5H) which form a part of the intermediate file.

The control chain file now appears as shown in FIG. 8/A06L. The C at the start of the file indicates that this is a control chain file (see FIG. 15/315), and the "12" indicates that the control chain file occupies twelve consecutive storage locations. The directory pointer is a reference to where within the system directory the name of this file is stored.

The control chain is executed whenever a bid for execution of subtask number $500A_{16}$ is placed with the subtask processor program. With reference to FIG. 7, the sublevel processor program 410 supplies the starting address of the control chain file to the control chain processor 700. As is explained in detail elsewhere, the control chain processor 700 loads index register B with a pointer to a task data pool and loads system index register C with a pointer to the first module or block within the control chain that is to be processed, in this case the time delay module which the systems engineer has designated block number 1. Using the number "6" extracted from the first entry in this time delay module as an index, the control chain processor 700 extracts from an algorithm subroutine starting address table the starting address of the time delay algorithm subroutine which is to execute this first module. The time delay algorithm subroutine establishes the required time delay using the data presented by the time delay module, as is explained below in the text which accompanies FIG. 8/A06A to C.

After the time delay algorithm subroutine has run to completion, program control is transferred back to the control chain processor 700. The processor 700 obtains the number "FF" from the next module in the control chain, in this case the end module. This number "FF" indicates that the control chain has been completely processed, and the processor 700 returns program control to the sublevel processor program or some other appropriate place, as is explained in the text which accompanies FIG. 7.

The above discussion illustrates how a relatively simple control chain containing only one module is created, translated, automatically established within the system, and automatically executed. Control chains usually contain many modules each of which is processed by a particular algorithm subroutine. The creation, translation, establishment within the system, and execution of any control chain, no matter what its length, are achieved in a manner like that just described for the described control chain. In the more general case, a control chain appears as shown in FIG. 8/A00. Every control chain preferably includes a header, a start module, one or more algorithm modules, and an exit or end module.

The structure of a typical algorithm module deserves further mention. With reference to FIG. 8/A00, a typical algorithm module includes a block number in bit positions F to A of the first entry in the module and an algorithm type number in bit position 7 to 0 of the same first entry. The type number definitely identifies the algorithm subroutine which is to process the module and is used as an index to an algorithm subroutine address table within the control chain processor. In the preferred embodiment of the invention, the data in each module must be organized in exactly the manner that is required by the corresponding algorithm subroutine. In the case of the logical time delay algorithm subroutine used in the example discussed above, the first entry has to be the length of the time delay in tenths of a second, the second two entries must be blank or zero, and the last two entries must be the addresses of the two logical variables. It is the function of the macro specification for each algorithm and of the calculation table within the control chain generator to insure that the proper data values are stored within the proper entry of each algorithm module.

The control chain start module includes an all zero first entry, the control chain subtask number (if any) as a second entry, and a third entry which is the time $\Delta T$, in tenths of a second, which is to elapse between successive executions of the control chain. If the control chain is ever removed from the system, the control chain subtask number and time between executions are used in deactivating the control chain subtask within the subtask processor and in terminating auxiliary-synchronizer-triggered periodic bids and logical-variable-triggered bids for execution of the subtask. While not yet incorporated into the present invention, it is contemplated that in the near future control chains which are triggered by monitor scan data files and which are not bid for by the auxiliary synchronizer may include a list of trigger names in place of the time $\Delta T$. When such a control chain is removed from the system, the trigger names may then be used to trace down and to eliminate the subtask bidding files which are linked behind the monitor data files in subtask file linkages, and which bid for execution of the control chain whenever the monitor data files are processed.

With reference to FIG. 8/A06H and 8/A06I, a macro specification (FIG. 8/A06H) must be present within the control chain generator for each algorithm subroutine with the exception of ARITH and LOGIC, as is explained in Section 15. The calculation table is a simple table within the control chain generator that is used for storing temporary and intermediate values required by the macro specifications for any algorithm. A wide variety of calculations may be performed using this table, and thus the systems engineer's data may be converted in any desired manner before it is placed into an algorithm module. In this way, the engineer in writing out his control chain does not have to use the same engineering units as are required by an algorithm subroutine, but may use any units of his own choosing, being careful always to insure that the correct macro specification is included within the control chain generator to convert his units into those which the algorithm subroutine expects to receive.

B. REPRESENTATIVE ALGORITHM SUBROUTINES

FIGS. 8A01 through 8A33 illustrate a representative sampling of the algorithm subroutines which are provided for automatic implementation in control chains and process operations in the preferred embodiment of the system. Most of the figures disclose the nature of the computation or task carried out by one or more algorithm subroutines. Each figure indicates the format which data in an algorithm module should conform to if that module is to be processed by the algorithm subroutine or subroutines corresponding to the figure. In many of the figures, examples are given of terminology and engineering units which might be used by a systems engineer in calling for execution of an algorithm in a control chain. In most cases where such examples are given, an exemplary macro specification table and an exemplary calculation table are also presented to make it more easy to understand how the units specified by the systems engineer are converted and stored within the control chain file. It must be emphasized that these coding examples are only examplary, since the systems engineer may use any terminology he wishes in writing out his control chain specifications. The same algorithm subroutine may even be assigned two different names by separate sets of macro specifications and thus may give the appearance of two independent algorithms within the system. In the case of some of the simpler algorithm subroutines which do not require the use of an extensive macro specification and which do not require preliminary calculations, only the algorithm module format is presented in the figure. It may be assumed in such cases that the algorithm-defining language may be freely chosen in the same manner as it is for all the other algorithms described.

i. LOGIC ALGORITHM SUBROUTINE

The logic algorithm subroutine is a subroutine which, when automatically tied into system operations by the systems engineer, is capable of carrying out any desired logical operation using logical variables as inputs and generating a logical variable as a result. As is illustrated in FIG. 8/A01A, any combination of the operations AND, OR, exclusive OR, or NOT may be executed by this algorithm subroutine.

Unlike most of the other algorithm subroutines, no macro specification or calculation table is used in assembling modules for execution by the logic subroutine. When the control chain generator encounters a request for execution of the logic algorithm subroutine, the generator calls upon a special subroutine (15206 in FIG. 15/200) which takes an input logical expression prepared by the systems engineer, such as that shown in FIG. 8/A01B, and rewrites the expression in an unambiguous, parenthesis-free (Polish) format as is illustrated in FIG. 8/A01E. The particular logical expression shown in 8/A01B is ambiguous, since there is no indication of which operation is to be performed first. Parentheses would have to be added to this logical expression in order to eliminate all ambiguities. The same logical expression is rewritten in FIG. 8/A01F in such a manner that there is no ambiguity and no need for parentheses.

The logic algorithm subroutine expects an algorithm data module which is formatted as is illustrated in FIGS. 8/A01E and 8/A01F. The first word of the data module is the usual block or module header. The second word of the module (FIG. 8/A01F) indicates the number (5) of input logical variables. The third through seventh words list the addresses of the input logical variables. The eighth word indicates the number of operations which are to be performed (4), and words 9 through 12 define the specific logical operations which are to be carried out. With reference to FIG. 8/A01E, each operation entry includes an operation code to the far right in accordance with the table 8/A01C. The two operands are indicated by an index number 1 and an index number 2. These indices refer either to the list of logical variable addresses in the file or to a table of temporary values that is maintained by the logic algorithm subroutine within the task storage area. To determine whether an index refers to the logical variable address list or to the table of temporary values, reference is made to a table reference code (TR)—if this code is zero, the corresponding index refers to the list of logical variable addresses; if this code is a "1", the corresponding index refers to the table of temporary values (see FIG. 8/A01D).

In the example shown, the first operation entry contains zero in the far right-hand position and therefore calls for a NOT operation. The single operand has an index number 4 and a zero table reference (TR) value. The operand is therefore the fourth logical variable E. The zero in the column adjacent the right-hand column is a result code and indicates that the result of this operation is to be stored as the zeroth entry within the temporary value table.

The second operation entry (line 10 of the algorithm module) calls for an AND operation (OP code 1 in the far right-hand column) between the third output variable D and the value now stored as the zeroth entry in the temporary value table. The result of this operation is stored in the first location within the temporary value table (1 in next-to-right-hand column).

The third operation entry calls for an OR-ing together of the second input variable C with the first input variable B, and the result of this operation is stored as the second entry in the temporary value table. The final entry calls for the first and second temporary value table entries to be exclusively OR-ed together. Since this is the final operation, the result is stored in the address of the logical variable A and represents the output of the logic algorithm subroutine.

Through the use of the logic algorithm subroutine, any logical expression of reasonable length may be converted into an algorithm module and then automatically interfaced with process operations with high speed implementation during the execution of a control chain. The usefulness of the logic algorithm subroutine becomes apparent where numerous variables must be taken into account in determining whether a particular control or process function is to run or not. The logic algorithm subroutine automatically and flexibly provides for desired logic control actions as compared to the performance by complex arrays of unchangeable, hard-wired logical gates or relatively fixed structure programs used in many prior computer or other digital control systems.

ii. ARITHMETIC ALGORITHM SUBROUTINE

The arithmetic algorithm subroutine is similar to the logic algorithm subroutine just described. The arithmetic algorithm subroutine is arranged to interpret arithmetic expressions and to perform numeric computations when automatically linked into process operations.

FIG. 8/A02A illustrates the five arithmetic operations which are presently available through the use of the arithmetic algorithm subroutine. A typical coding example is shown in FIG. 8/A02B. The block number 32 followed by the subroutine name ARITH is followed by the mathematical expression which is to be carried out. The mathematical expression is expressed using Fortran coding. The names in the expression are the names of the corresponding variables within the system. Arithmetic expressions may include constants.

When the control chain generator encounters an arithmetic expression, the generator calls upon a special subroutine (15205 in FIG. 15/200) which breaks the arithmetic expression up into the parenthesis-free, unambiguous algorithm data module format that is illustrated in FIG. 8/A02E and 8/A02F. With reference to these figures, the number of constants is specified first in the data module and is followed by a listing of the constant values listed as real numbers occupying two storage locations for each real constant. The number of variables is then specified and is followed by the addresses of the variables, each variable address occupying one location. The number of operations which are to be carried out is then specified, and two locations within the algorithm module are allotted to each operation.

With reference to FIG. 8/A02E, the first entry of the two entries defining each operation contains an index to the first operand, an indication TR (table reference) of whether the first operand is a constant, a variable, or an entry in a temporary value table (see FIG. 8/A02D for the TR codes), and a code designating the operation which is to be performed (see FIG. 8/A02C for the operation codes). The index indicates how far into the constant, variable, or temporary value table the desired constant value or variable address is stored. The second entry of the two entries defining each operation contains an index to the second operand, a table reference TR for the second operand, and an index of where the result of the operation is to be stored in the temporary value table. Of course, in the case of the last operation which is executed, the result is not stored in the temporary values table but is stored in the output variable address which is the first address in the variable address table (see FIG. 8/A02F).

The algorithm module shown in FIG. 8/A02F is a parenthesis-free, unambiguous version of a typical arithmetic expression. The first operation defining entry comprises entries 12 and 13 of the module. This first operation defining entry contains the operation code 1 for addition and calls for the addition of the seventh and eighth entries in the variable table, or the variables X and Y. The result of this operation is to be stored as the zeroth entry in a temporary value table (FIG. 8/A02G) which the algorithm subroutine sets up within a task header storage area.

The second operation (module entries 14 and 15) includes the operation code 3 for multiplication and calls for the multiplication of the zeroth entry in the temporary value table by the first entry in the constant table or K1. The result of this operation is stored in the first location within the temporary value table (see FIG. 8/A02G). The remaining operations are carried out in a similar manner, and the ultimate result of all operations is stored in the first variable address location, the location OUT (location 6 within the module).

The length of the data modules for both the arithmetic and the logical algorithm subroutines is variable. An important feature of the control chain generator program is its ability to count the arguments or data supplied by the systems engineer and to vary the length of a data module accordingly. The first item in any such list of arguments within a data module is always the number of items in the list.

The use of the arithmetic and logical algorithm subroutines have several advantages over conventional Fortran or other compiler language handling of similar expressions. The tables which are generated by the control chain generator do not occupy nearly as much storage space as would the machine language coding for the same arithmetic or logical operations written in Fortran and compiled by a Fortran compiler. Therefore the resulting control chains are far more compact than are similar programs implemented in Fortran or even in assembly language and process operations can accordingly be carried out more efficiently. The necessity for the arithmetic and logical algorithm subroutines to access the module tables does slow down execution of these algorithms somewhat, but in a process control environment the number of calculations of this type which must be performed are usually small enough so that there is no great loss in the speed of process execution. In practice, this slight loss in execution speed is more than offset by the gains in execution speed which result from the use of other highly efficient algorithm subroutines in implementing process control and operation.

iii. FLIP-FLOP ALGORITHM SUBROUTINE

The flip-flop algorithm subroutine is functionally similar to the operation of a hardward flip-flop in a digital hardware control system. As illustrated in FIG. 8/A03A, the flip-flop algorithm subroutine is automatically linked into the system operations to set two output logical variables in accordance with the state of two input logical variables. More specifically, if the input variable SET is true, the flip-flop algorithm subroutine sets the output logical variable DIROUT true and the output logical variable BAROUT false. If the input logical variable RESET is true, then BAROUT is true and DIROUT is set false. If the inputs are both true or both false, the output logical variables are typically not altered.

A typical coding format for the flip-flop algorithm is shown in FIG. 8/A03B, and an example of this coding format is shown in FIG. 8/A03C. The algorithm data module which is required by the flip-flop algorithm subroutine is illustrated in FIGS. 8/A03D and 8/A03E. To establish this module, the control chain generator passes the names of the logical variables to the file loader program so that the file loader program may place the addresses of the logical variables into the algorithm module. An illustrative macro specification for this algorithm which corresponds to the coding shown in FIG. 8/A03B and 8/A03C appears in FIG. 8/A03F. The first entry in the macro specification table defines the algorithm name, and the remaining entries list the order in which the logical variable addresses are to be placed into the algorithm module. If the systems engineer wishes to use different names than those illustrated in FIGS. 8/A03B and 8/A03C, he alters the macro specification accordingly by substituting his terminology for the names shown.

iv. SET AND RESET ALGORITHM SUBROUTINE

FIG. 8/A05 illustrates a subroutine which may be automatically linked into the process operations to set a first string of logical variables true and a second string of logical variables false. A typical coding example is shown in FIG. 8/A05C, and the required algorithm module format is illustrated in FIG. 8/A05D. The macro specification (FIG. 8/A05F) for establishing this algorithm subroutine closely resembles that for the flip-flop algorithm subroutine with the one exception that the −20 entry in column number 3 of the macro specification table indicates that as many as 20 variables may be set true or false in a single call to this algorithm subroutine. The minus sign indicates that less than twenty variables are to be expected—twenty is only a maximum. If the minus sign were omitted, the presence of less than twenty variables would be considered an error by the control chain generator. As in the case of the arithmetic and logical algorithm subroutines, the length of the set and reset algorithm subroutine data module is variable, depending upon how many logical values are to be set or reset. The use of a minus sign instructs the control chain generator program to count the number of variables and to precede a list of variables with the number of variables in the list, as is illustrated in FIG. 8/A05D.

v. LOGICAL TIME DELAY ALGORITHM SUBROUTINES

FIGS. 8/A06 and 8/A07 illustrate two different forms of logical time delay algorithm subroutines which exist within the program system for automatic implementation in process operations. The purpose of the logical time delay algorithm subroutines is to provide a measured time period for the occurrence or nonoccurrence of an event. These subroutines may also be used in any other application where a time delay is required or where a variable is to be monitored for a finite amount of time.

When a logical time delay algorithm is executed, a counter is established within the auxiliary synchronizing program. This counter is decremented with the passage of incremental units of time, usually every tenth of a second. Each time the counter is decremented, an input logical variable is checked. In the case of the algorithm LGTDTT shown in FIG. 8/A06, if the input logical variable remains true for the entire duration of the time delay, than an output logical variable is set true upon the expiration of the time delay. If, however, the input logical variable goes false before the logical time delay expires, then the output logical variable is immediately set false and the time delay is cancelled. This operation is illustrated in FIGS. 8/A06B and 8/A06C.

A typical coding example for the establishment of such a logical time delay is shown in FIGS. 8/A06D and 8/A06E, and the algorithm module which is generated as part of a control chain is illustrated in FIGS. 8/A06F and 8/A06G. The first entry in this module is the duration of the time delay in tenths of a second. The addresses of the input and output logical variables are stored in the fourth and fifth entries within the module. The second and third entries of the module do not initially contain any significant data values and are used by the synchronizing program both for the storage of the time delay count and for the establishment of linkage pointers, as is illustrated in FIG. 9F. The macro specification for this algorithm subroutine and its use of the calculation table have already been discussed and need no further comment.

The logical time delay algorithm subroutine LGTDFF shown in FIG. 8/A07 is essentially identical to that shown in FIG. 8/A06 except that upon expiration of the time delay the output logical variable is set false instead of true, and the time delay is cancelled when the input variable goes true rather than when the input variable goes false.

vi. COMPARATOR ALGORITHM SUBROUTINE

A comparator algorithm subroutine (FIG. 8/A04) is automatically linkable into the system to alter the state of a pair of logical variables in accordance with the relative magnitudes of a pair of numeric input variables. A typical coding example is shown in FIG. 8/A04D for the comparison greater than or equal to (GE). The particular type of comparison which is performed is part of the input data for the algorithm subroutine, and hence this same subroutine may be used for any of the comparison listed opposite COMP in FIG. 8/A04C. (Fortran terminology is used here.) The algorithm module (FIGS. 8/A04E and 8/A04F) required by this algorithm subroutine contains the addresses of the two numeric input variables as the first two entries, two letters defining the nature of the comparison which is to be carried out as the third entry, and the addresses of the two output logical variables as the fourth and fifth entries. The macro specification for converting the coding shown in FIG. 8/A04C into the module shown in FIG. 8/A04E is illustrated in FIG. 8/A04G. This coding is achieved with the four input addresses and the one pair of alphanumeric characters going directly into the algorithm module as indicated.

When this algorithm subroutine is automatically implemented by data files, it provides for operations similar in end result to those achievable with either an analog or a digital hardware comparator of any type. It is able to indicate relative sizes, equality, and inequality. However, the systems engineer is able to implement the comparator algorithm and provide comparison functions for monitoring or control purposes with a flexibility and efficiency better than that obtainable with any type of hardware comparison system.

vii. ALGORITHM SUBROUTINES SPECIFICALLY ARRANGED FOR USE IN PROCESS CONTROL

The algorithm subroutines which are to be described next are software embodiments of the more common control elements which are used in process control systems. These subroutines along with other algorithms considered herein enable a systems engineer to design and embody a complete process with a process computer control system having a wide range of system linked software controllers, limiters, converters and other control elements merely by writing out control chain definitions on listing sheets and entering the resultant data files into the control computer. Algorithms are provided for automatic implementation of all types of controllers such as proportional, reset, lead-lag and rate controllers either singly or in combination. Both trapezoidal and rectangular versions of the various differential and integral controllers are available. The fact that the systems engineer can completely change the operation of a process and a control loop for that process simply by writing a new control chain loop definition, generating the control chain, and feeding the new control chain into the system in place of the old gives rise to a flexibility in system design that has heretofore been unattainable in any control environment. It is also possible to alter the time and gain constants of controllers without recompiling a control chain through the use of the file system, and special routines are written for this purpose. Changes of this type may be made after a system is completely established and operating just as easily as when a system is first established.

A. CONTACT CLOSURE TIMED OUTPUT ALGORITHM SUBROUTINE

A process control system must be able to supply control data to the circuitry, machinery or equipment which is under control. The present system therefore includes several algorithm subroutines which are automatically tied into the system to transfer computer generated numeric values through electrical signals to machinery or equipment controls. The LOGIC algorithm subroutine and the set and reset algorithm subroutines discussed above may open or close an external switch that is connected to a system contact closure output. An analog variable output algorithm subroutine (not shown in the figures) takes a numeric value from within the system and transfers it through an appropriate executive analog handler routine to an external digital-to-analog converter that is connected to an array of the system contact closure outputs. A pulse signal output algorithm subroutine (also not shown) supplies a series of pulses to an external pulse driven mechanism such as a positioning stepping motor, the number of pulses generated corresponding to the value of a system variable. The timed contact closure output algorithm subroutine (FIG. 8/A09) closes an external switch for a predetermined time interval and thereby causes some external device, such as a motor driven valve, to be actuated for a fixed interval of time the duration of which corresponds to the value of a system variable. The timed contact closure output algorithm subroutine is discussed below. This algorithm subroutine is representative of all the various output algorithm subroutines which are provided as part of the present system.

As shown in FIG. 8/A09A, the timed contact closure output algorithm subroutine TMDOUT accepts as input arguments the address of a location INPUT containing the time that a contact closure is to remain closed, and an external device number DEVNO. It is assumed that the external device DEVNO may be actuated in either of two directions and that the value of INPUT is positive or negative in accordance with whether the external device DEVNO is to be raised or lowered, moved left or right, or whatever (see FIG. 8/A09B). The coding sequence for calling this output algorithm subroutine appears in FIG. 8/A09C and 8/A09D, and the resultant algorithm module appears as shown in FIGS. 8/A09E and 8/A09F. A typical macro specification for this algorithm subroutine appears in FIG. 8/A09G. INPUT is an address where a number is stored to indicate the length of time in tenths of a second and the direction in which the device is to be actuated. The device number DEVNO is an integer.

Among the system contact closure output bits, there is one group of bits (ACTIVE C.C.O. and PASSIVE C.C.O. in FIG. 11C(cont.), which contain two contact closure output bits for each device assigned a contact closure output device number. These devices are the ones which may be actuated by the TMDOUT algorithm subroutine.

In response to a request by an algorithm module to raise or lower an output device, the algorithm subroutine locates the two bits in the contact closure output bit table which correspond to the specified device number and calls upon the alter bit routines 11060 in FIG. 11A to set one or the other of the device bits equal to "1" thereby to actuate the device in one direction or the other. The logic initiator (FIG. 11A) automatically transfers the bit from this image table to an actual contact closure output 11066 in FIG. 11A. The contact closure time duration is then retrieved from the specified location INPUT and is stored in a time delay output table called TMDOUT which appears in FIG. 9H. This table contains one entry for each device which is assigned a contact closure output device index number. The auxiliary synchronizer automatically goes through this table every tenth of a second, decrements or increments the table entries depending upon whether they are positive or negative, and causes the proper contact closure outputs to be opened whenever an entry is incremented or decremented to zero.

The TMDOUT algorithm subroutine and the manner in which it is tied into the system is representative of a variety of system integrated algorithm subroutines which may be called upon. Contact closure output logical variables having file-defined names may be actuated by the logic algorithm subroutine or by the set and reset algorithm subroutine both of which subroutines call upon the alter bit subroutine 11060 (FIG. 11A) to alter the state of a contact closure output. A pulse generating output algorithm subroutine operates in a manner similar to the timed output algorithm subroutine, but the pulse generating subroutine calls upon a periodically executed program which generates output pulses periodically until an output counter is incremented or decremented to zero. An analog output algorithm subroutine takes a specified numerical value and transfers it directly to a digital-to-analog converter via the conventional system executive output device handlers. It is thus possible to program automatically and produce any desired type of system output through the use of appropriately arranged algorithm subroutines.

B. PROPORTIONAL PLUS RESET CONTROLLER ALGORITHM SUBROUTINES

The present system includes a wide variety of automatically implementable algorithm subroutines which are capable of functioning in control loops as proportional, reset, or combined proportional and reset contollers. A large selection of such subroutines are provided to make available all of the various options which are normally desirable on such controllers: rectangular integration, trapezoidal integration, adjustable parameters, automatic calculation of error by comparison with a set-point value, and alternate controller parameters for automatic and manual modes of operation.

No special algorithm is required to provide a proportional controller function. Since the control output of a feedback proportional controller is the difference between a feedback input value and a set-point value multiplied by a gain constant, a proportional controller may be automatically implemented in control loop operations with the use of the arithmetic algorithm subroutine which has already been described. In a feedforward control loop, the proportional controller responds only to a set-point value.

Another widely used process controller generates an output signal that includes both proportional and a reset components. A rectangular integration form of a proportional-plus-reset controller algorithm subroutine is shown in FIG. 8/A11 and is called the PIR (proportional-integral-rectangular) algorithm subroutine. As is illustrated in FIGS. 8/A11A through 8/A11C, this algorithm subroutine, when linked into the system operations by a control chain, generates an output which contains both a proportional component equal to an error input multiplied by a constant K and an integral or reset component equal to the input error divided by a time constant T and integrated with respect to time. One possible coding for this algorithm subroutine is shown in FIG. 8/A11F and 8/A11G. The name of the algorithm subroutine PIR is followed by a specification of the proportional gain GAIN, the reset time constant TIME, and the names of the input error INPUT and of the controller output OUTPUT.

The actual algorithm which defines the computation that is performed appears in FIG. 8/A11E, and the derivation of this algorithm is shown in FIG. 8/A11D. With reference to the first line in FIG. 8/A11D, the algorithm reflects an assumption that the control chain is executed periodically after the expiration of a time interval delta T. In practice, this assumption is realized either by having the auxiliary synchronizer periodically bid for execution of the control chain or by having a periodically serviced monitor data file trigger the control chain. A further discussion of periodic triggering may be found in connection with FIGS. 15/201 to 15/204 in Section 15.

The algorithm output Y(t) is defined as the sum of: a prior output or past value of the integral or reset porton of the algorithm output YI(t−1); plus a new integral or reset component which equals the error input X(t) multiplied by the ratio of delta T to the time constant T; plus a proportional gain component KX(t) (see FIG. 8/A11D). The second and third lines of FIG. 8/A11D show that the algorithm may be considerably simplified by combining the constant terms delta T divided by T and K into a new constant C1. The algorithm output Y(t) may then be calculated as the simple sum of the past output value of the integral YI(t−1), plus the constant C1 multiplied by the input error X(t). The new value of the algorithm output integral component YI(t) is then calculated in a separate step by subtracting the gain component KX(t) from the algorithm output Y(t) as is illustrated in the bottom line of FIG. 8/A11D. The value Y(t) thus calculated is stored in the designated algorithm output address as the controller output and the calculated integral output value YI(t) is stored either as part of the control chain or in a core storage area for use in the next algorithm subroutine calculation which is to occur after the expiration of another time interval delta T. The actual computations performed by the algorithm subroutine are shown in Fortran notation in FIG. 8/A11E.

In order for this algorithm subroutine to be executed with a minimum loss of time, it is desirable to have the control chain generator calculate the value of the constant C1 in advance. The value of the desired proportional gain and the value of the desired reset time constant are specified by the systems engineer when he writes out the control chain, as is shown in FIG. 8/A11G. The value of delta T, the time which elapses between control chain executions, is also specified by the systems engineer. However, the value of delta T is not a part of the PIR algorithm subroutine module specificaton (FIG. 8/A11G) but is specified by the systems engineer at the beginning of his control chain along with the name of the control chain, the subtask number and/or triggers for the control chain, and other data relevant to the entire control chain and not just to one particular module or block within the control chain (see FIG. 8/A00). Within the control chain generator there exists a table called the calculation table (FIG. 8/A11J). At the start of a control chain generation, the control chain generator program (FIG. 15/200) takes the systems engineer's definition of delta T and stores this value as the second entry in the calculation table. Hence, the values of K, T, and delta T are all available to the control chain generator program when the time comes to compute the constant C1.

The actual computation of the value C1 is performed automatically by the control chain generator program in accordance with the macro specifications for the algorithm PIR (FIG. 8/A11K). The first line of the macro specification table says that the address of the algorithm PIR is stored in the 11th location within the control chain processor program address table (see FIG. 7). The next two lines of the table says that the values called GAIN and TIME are non-array integer constants (column numbers 3 and 4) which are to be included in the output file (column number 6) and which are to be stored in locations 6 and 7 within the control chain generator calculation table (column number 8—see also FIG. 8/A11J). The 4th and 5th lines of the table say that the items designated INPUT and OUTPUT are 6-letter names of system variables (column number 4) whose addresses are to be included in the algorithm data module (FIG. 8/A11I) (column number 6). The 6th line of the table commands the control chain generator to divide ("4" in column number 5) delta T (the second entry in the calculation table—"2" in column number 4) by T (the 7th entry in the calculation table —"7" in column number 6), and to store the result of this computation as the 8th entry in the calculation table ("8" in column number 3). The 7th line of the macro specification table calls for the 6th and 8th entries in the calculation tables, delta T divided by T ("8" in column number 4) and K ("6" in column number 6), to be added ("1" in column number 5) together to form the constant C1 which is then stored as the 9th entry in the calculation table ("9" in column 3). The last two entries in the macro specification table then specify that the 9th entry C1 and the first entry (zero) in the calculation table are to be included within the algorithm data module (FIG. 8/A11I) as calculated constants.

The resultant algorithm subroutine data module appears as is shown in FIG. 8/A11H and in 8/A11I. The control chain generator program loads the calculated constants into the table first, in the order in which they are called for by the macro specification table, and then loads the four non-calculated numbers and addresses into the table, again in the same order in which they are called for by the macro specification table. This is the precise order in which the algorithm subroutine expects the data to be stored within the algorithm data module each time the data module itself is interpreted or executed by the algorithm subroutine.

The algorithm subroutine PIR performs integration during control loop operation by summing the area of rectangles having widths equal to the sampling period delta T and heights proportional to the error function X(t). This form of integration is called rectangular integration. An alternative form of integration is trapezoidal integration. If trapezoidal rule integration is desired for process control operations, an algorithm subroutine PIT (proportional-integral-trapezoidal—see FIG. 8/A12) is called upon in place of the algorithm subroutine PIR.

The PIT algorithm subroutine is quite similar to the PIR algorithm subroutine but bases its mode of operation upon a more complex algorithm which is precisely defined by the equations shown in FIGS. 8/A12C and 8/A12D. With reference to FIG. 8/A12D, three constants C1, C2, and K are required. In addition, two stored past values are required—the value YI which is, as before, the past value of the integral output, and a value XPHI which is the past value of the error. As can be seen in FIG. 8/A12C, this algorithm subroutine integrates the average value of the current error value and the error value for the period which has just expired. The rectangular algorithm subroutine PIR integrates only the current error value and does not average the current and past values of the error before integration.

FIG. 8/A12 illustrates the coding and the other details of the algorithm subroutine PIT. FIG. 8/A12 differs from FIG. 8/A11 only in its increased complexity: Storage space within the algorithm module (FIGS. 8/A12G and 8/A12H) must be allocated for two variables YI and XPHI rather than just for YI; and two constants C1 and C2 both must be calculated by the data file generator program rather than just one constant. In order to compute the constant C2 which is delta T divided by two times T, it is necessary for a "2" to be placed in the calculation table. This is done by the sixth line of the macro specification table, the same entry which multiplies "2" by T and stores the result as the 8th entry in the calculation table. In all other respects, FIG. 8/A12 is essentially the same as FIG. 8/A11.

FIGS. 8/A12K and 8/A12L illustrate the differences between the rectangular and the trapezoidal integration algorithms. With reference to FIG. 8/A12K, the dots represent successive values of the error value X multiplied by the ratio of the sampling interval delta T to the time constant T. The weighting factor (delta T)/T causes the algorithm integral output to equal the error input after the expiration of a time interval T, assuming the error input is held constant. Ideally, the dots should be connected by a smooth curve, and integration should be carried out by calculating the area under this curve.

In rectangular integration, the integral value is the sum of the area of rectangles each having a width delta T and a height equal to successive values of the weighted error values. As can be seen in the FIG. 8/A12K, this integral technique gives too small an integral value (compared to an idealized, smooth-curve integral) for a rising error value and too large an integral value for a falling error value, but averages out to a good approximation of the ideal, smooth curve integral.

Trapezoidal integraton gives a better approximation to the smooth-curve integral value. With reference to FIG. 8/A12L, trapezoidal integration reflects an assumption that the error value curve is made up of line segments connecting the points representing the weighted values of the error. Integration is performed by finding the area under the segmented line curve, as is indicated by the hatching lines sloping downward and to the left in FIG. 8/A12L. It can be seen in the figure that this amounts to breaking up the area under the curve into a series of trapezoids and summing the areas of the trapezoids. In actual practice, the area of each trapezoid is equal to the area of a rectangle having a height equal to the average value of two adjacent weighted error values, as is indicated by the hatching lines sloping downward and to the right in FIG. 8/A12L. It is the area of these equivalent rectangles which are calculated and summed by the equations which appear in FIGS. 8/A12C and 8/A12D. While trapezoidal integration gives a slightly better approximation to a smooth-curve integral, a software algorithm using trapezoidal integration can behave in an unstable manner under certain circumstances and with certain choices of time constants. Hence, the particular type of integration which is chosen for any particular application is best made only with full knowledge of the time constant T, the data sampling rate delta T, and the particular task which is being performed. A full discussion of this topic goes beyond the scope of the present invention. More information may be obtained from an article by R. Uram entitled "Choosing Numerical Methods For Digital Control Algorithms" and published in CONTROL ENGINEERING in the May 1970 issued beginning on page 94.

Another form of a proportional plus reset algorithm subroutine ADJPIR (FIG. 8/A10) allows the proportional gain and the reset time constant of the algorithm to be computed and varied while the control system is in operation. These constants may also be altered as required to give a nonlinear controller output. This algorithm subroutine uses the same basic algorithm as that described for the algorithm subroutine PIR but does not simplify the procedure by requiring the prior computation of a constant CI.

As is shown in FIG. 8/A10E, the algorithm takes the past value of the integral YI (t−1) and adds to it delta T divided by T multiplied by X(t) to give the current value of the integral YI(t). The controller output Y(t) is then calculated as the sum of YI(t) and the input error value X(t) multiplied by the proportional gain G. When the coding specification for this algorithm subroutine is written out by the systems engineer, the specification of the proportional gain G and the integral time constant T are not integers, as in the case of the PIR algorithm subroutine, but are the names of system variables. The control chain generator program passes these names on to the system file loader program which replaces the names with the addresses of the corresponding variables, as is shown in FIG. 8/A10H and in FIG. 8/A10I. The resultant data module for the ADJPIR algorithm subroutine contains two real number values and four addresses. The real number values are the initial value of the past integral (zero initially) and the value of delta T which is obtained from the second entry in the calculation table. The addresses are those of the gain, the time constant, and the input and output variables.

The macro specification table (FIG. 8/A10J) is similar to that for the algorithm PIR but is simpler because no preliminary computation of a constant C1 needs to be carried out by the control chain generator. The macro specification table communicates the following information to the control chain generator: the systems engineer's term ADJPIR corresponds to the algorithm subroutine whose address is found in the 10th entry within the control chain processor program algorithm address table; the systems engineer's terms GAIN, TIME, INPUT, and OUTPUT are the names of system variables whose addresses are to be stored in the lower half of the algorithm data module; and the first two entries in the algorithm module are real values which are to be simply lifted from the first and second entries in the calculation table and stored within the first four locations of the algorithm module, two locations per each real constant (see FIG. 8/A10I).

In many controlled processes, provisions are made for both automatic and manual operation. When control in such a system is transferred from the manual mode to the automatic mode, it is often helpful to preset all integrator controllers in the automatic computer control loops so that their outputs agree with the manual outputs which are then being supplied to the system by the backup manual control externally of the computer. A smooth or "bumpless" transfer of control is then guaranteed. A controller may be preset by simply operating the controller without the normal error input. The normal error input is replaced by an input that is the difference between the manual control setting and the controller output setting, or some equivalent signal. In time, the controller causes its own output to agree with the manual control setting. System control may then be transferred directly to the controller and the normal system error may be applied to the controller input. The automatic controller then takes over operation of the system in a completely smooth manner.

To facilitate this and other modes of operation, special algorithm subroutines are provided within the computer program system, and they are automatically linkable into the on-line system to become a part of process operations. These special subroutines process algorithm data modules which contain typically two different gain constants and two different time constants. One gain constant and one time constant may typically be intended for use during actual control operation when the algorithm data module and algorithm subroutine are automatically controlling the system. The other gain constant and time constant may be intended for use when the algorithm module and subroutine are presetting an output value to a value that is equal to the corresponding manual control value. The gain constant and the time constant used during manual control may be chosen to give maximum speed of output presetting so that the controller output follow the manual control setting continuously. The other gain constant and time constant may be chosen to give optimum system control operation during automatic control.

While a variety of different auto-manual algorithm subroutines of this type are provided within the system, a typical auto/manual, proportional-plus-reset algorithm subroutine using trapezoidal integration is illustrated in FIG. 8/A13. The name of this algorithm subroutine is PITXAM (proportional-integral-trapezoidal plus auto-manual). The same basic algorithm equation is used here as in the algorithm subroutine PIT. However, this algorithm subroutine always checks an auto-manual flag AUTO, a logical variable, to see whether automatic or manual control is in effect. In accordance with the state of the auto-manual flag, the algorithm subroutine selects the gain constant and the time constant which are appropriate for the mode of operation which is contemplated. The macro specification table (FIG. 8/A13I) and the calculation table (FIG. 8/A13H) for this algorithm subroutine look complicated, but in fact they are nothing more than the same tables used for the PIT algorithm subroutine but with twice as many calculations and entries to take into account the extra time and gain constants which are handled by this algorithm subroutine. It should be understood that the use of an auto-manual switch in an algorithm subroutine is not limited to this type of algorithm subroutine but may be used in any other type of subroutines where such a function is desirable. The systems engineer may then completely change the state of the system from automatic control to manual control merely by changing the state of a single logical variable and without altering the system control chains in any way.

Another useful function which is provided as an option for automatic control loop implementation on a number of the system algorithm subroutines is an output limit-check function which limits the output of the algorithm subroutine to within predefined values regardless of what happens to the algorithm input variables. As an example, FIG. 8/A14 illustrates a proportional plus reset controller using rectangular integration which has both its integral and its controller output limited to the range between the values LOLIM and HILIM. If an unusually large error input arises, for example, during system startup or during an emergency, these limits on the range of the controller can prevent the controller from overdriving its output or from saturating in such a manner that it cannot recover promptly when the usual input terminates. In general, this algorithm subroutine is the same as the PIR algorithm subroutine. The only changes are that the user defines the values of two constants HILIM and LOLIM. These values are stored in the control chain data module in accordance with instructions contained in the macro specification table (FIG. 8/A14I).

In the case of algorithm subroutines which do not come with a built-in capacity for high and low limiting, three special algorithm subroutines shown in FIGS. 8/A20, 8/A21, and 8/A22 may be utilized to perform an equivalent function. The algorithm subroutine LOWLMT shown in FIG. 8/A20 sets a limit on how low a variable value may go, and the corresponding algorithm subroutine HIGHLMT shown in FIG. 8/A21 sets a limit on how high a variable value may go. The algorithm subroutine HILOLMT shown in FIG. 8/A22 sets both an upper and a lower limit on the range of values which a variable may assume and thus is equivalent to that shown in FIG. 8/A14.

Another automatically implementable algorithm subroutine is a proportional plus reset controller which generates a differential or velocity output in addition to a normal output. The algorithm subroutine PIAVR acts in this manner and is shown in FIG. 8/A18. This algorithm subroutine performs a proportional-plus-reset controller computation as does the PIR algorithm subroutine described above and then goes on to calculate the amount of change which has occurred in the controller output YA(t). The change is presented as a second controller output YV(t).

The fundamental mathematical concept underlying this algorithm subroutine is illustrated diagrammatically in FIG. 8/A18B. To speed up the operation of the digital computer and to perform the calculations in the simplest manner possible, the actual computation is carried out as is shown in FIG. 8/A18C. The absolute controller output is first calculated as in the case of the algorithm subroutine PIR, using the same constant C1. The controller integral value is then calculated by subtracting the proportional constant from the controller output, again as with the algorithm subroutine PIR. The velocity component or change in controller output is then computed as the difference between C1 times the present error input and K times the past value error input.

The justification for this last step is shown in FIG. 8/A18D. The velocity term YV(t) includes a first component that is caused by the change in (X(t) minus X(t−1)) multiplied by the system gain, and a second component that is the time integral of the present error or X multiplied by delta T and divided by T. Since the constant C1 is defined to be the sum of K and the ratio of delta T to T (see FIG. 8/A18C), the equation shown in the upper half of FIG. 8/A18D simplifies to the form shown at the bottom of FIG. 8/A18D.

Sample coding examples for this algorithm subroutine are shown in FIGS. 8/A18E and 8/A18F. The algorithm module or block format, the macro specification table, and the calculation table for this algorithm are essentially the same as those for the algorithm subroutine PIR (FIG. 8/A11) with the one exception that room for an additional output variable address is provided within the algorithm module.

C. PROPORTIONAL PLUS RATE CONTROLLERS

Rate controllers are used in the system to generate an output in response to the rate of change in an error input. The rate controller generates an output function which leads the error input in time and which thus can cause the controller output to react strongly to rapid fluctuations in the error input. Two examples of algorithm subroutines which function as proportional plus rate controllers are shown in FIG. 8/A15. The precise mathematical formulation of the algorithm used by both of these controllers is given in FIG. 8/A15C, and the standard flow diagram for this type of controller is shown in FIG. 8/A15B. As can be seen in FIG. 8/A15C, for high frequency components of the error input X (high values of S), the controller gain is unity plus the proportional gain K. For low frequency components of the error input X (low values of S), the T(S) term in the denominator of the equation essentially vanishes and controller gain becomes K plus T times the frequency S and approaches a gain of K for very low frequencies. Assuming that K is small, the controller has essentially unity gain for high frequency transients and a less-than-unity gain of K for low frequency transients.

FIG. 8/A15B is a control schematic which illustrates the behavior of this controller in the time domain. The output Y(t) is the sum of the derivative $Y_D(t)$ of the input X(t) and the input X(t) multiplied by a proportional gain K. The derivative component $Y_D(t)$ is the difference between the input error and a feedback value equal to the integral of $Y_D(t)$. It can be seen that when the error X(t) changes its value suddenly, the integrating feedback value does not respond for some time. Hence, $Y_D(t)$ initially fluctuates by an amount equal to the fluctuation in the error signal X(t), and hence the change in the error input passes directly to the controller output Y(t) when the input changes suddenly. As time passes, however, the integral of $Y_D(t)$ becomes significant and eventually restores $Y_D(t)$ to its former value of zero. The output Y(t) thus falls from an initial value equal to the change in X(t) to a final value equal to K times X(t). Hence, for fast changes in the input error the differential portion of the controller initially passes the fluctuations in the error directly to the controller output unchanged, and this component of the controller output then dies off exponentially at a rate that is determined by the time constant T of the integral. Ultimately only the proportional term K times X(t) is left at the controller output.

The derivation of a software algorithm for the rectangular embodiment of this controller is shown in FIG. 8/A15D. The first equation defines $Y_D(t)$ as it is defined in FIG. 8/A15B. The second equation is the derivative form of the first equation. The third equation is derived from the second by replacing all differential variables with their rectangular equivalents, with the assumption being made that the derivative of each variable is equal to the slope of a line connecting two adjacent plotted points representing successive values of the variable just before and just after a time interval delta T (see FIG. 8/A15P). This rectangular formulation of the algorithm is accurate enough for most practical purposes, especially when the time constant T is long in comparison to the length of the time interval delta T. The fourth equation in FIG. 8/A15D is a rearrangement of the third equation with the term $Y_D(t)$ appearing on the left-hand side of the equation. The final equation in FIG. 8/A15D defines the controller output Y(t) as the sum of $Y_D(t)$ plus the proportional term K times X(t).

In the actual execution of the algorithm subroutine when automatically program-linked into process operations, $Y_D(t)$ is first calculated and is stored, and then Y(t) is calculated in a separate, second step. The constant term "T" divided by "T plus delta T" is replaced by a constant C1 which is calculated in advance by the control chain generator program. The resultant algorithm statement appears in FIG. 8/A15F written in FORTRAN. Examples of the systems engineer's coding for this algorithm subroutine are shown in FIGS. 8/A15H and 8/A15I, and the algorithm module which results appears in FIGS. 8/A15J and 8/A15K. The macro specification table which the user must specify for the use of this algorithm appears in FIG. 8/A15L, and it includes only elements that have already been fully explained. The associated calculation table is shown in FIG. 8/A15M.

A slightly more accurate, trapezoidal proportional-plus-rate algorithm subroutine PDT is also provided. The first two equations in FIG. 8/A15D are applicable to the trapezoidal version of the algorithm subroutine. The remaining equations which define the trapezoidal algorithm are shown in FIG. 8/A15E.

The main difference between the rectangular and the trapezoidal versions of the algorithm subroutine is that the value $Y_D(t)$ in the rectangular version is replaced by one-half the sum of $Y_D(t)$ plus $Y_D(t-1)$ in the trapezoidal version. This modification in the equation eliminates one error in the rectangular formulation of the algorithm—namely, that in the third equation in FIG. 8/A15D, the two derivative terms in the equation are average values of the derivatives over a time interval delta T while the value $Y_D(t)$ is measured at the end of the same time interval and is not an average value over the time interval delta T. The equations shown in FIG. 8/A15E overcome this difficulty by averaging the value of the function $Y_D(t)$ at the beginning and at the end of the time interval delta T so as to give a mean value for the function half-way through the time interval. This difference is illustrated graphically in FIG. 8/A15F. In both the rectangular and the trapezoidal versions of the algorithm, the functions $Y_D(t)$ and $X_D(t)$ are represented by the slopes of the indicated line segments. The figure clearly illustrates that the slopes of these line segments most accurately represent the derivatives of the corresponding functions at a time "t minus ½". In the simpler rectangular formulation of the algorithm, the slopes of these line segments are assumed to represent accurately the derivatives at the time "t" and therefore the rectangular equations use the value of the function $Y_D$ at the time "t". The more accurate trapezoidal formulation of the algorithm takes into account the fact that the slopes of these line segments most truly represent the derivative of the function at the time "t minus ½" and therefor calculates the approximate value of the function $Y_D$ at the time "t minus ½" to be "$\frac{1}{2}(Y_D(t)+Y_D(t-1))$" or as the average of two adjoining values of $Y_D$. As in the case of the integral functions, the trapezoidal version of this algorithm subroutine is not necessarily better than the rectangular, since it may result in instabilities in particular applications which are not encountered when using the rectangular version. Having both versions of the algorithm subroutine available for automatic programming implementation in process operations gives the utmost flexibility to the systems engineer in handling any specific problem.

FIG. 8/A15E shows the equations which define the trapezoidal version of this algorithm. Constants C1 and C2 are pre-calculated by the control chain generator program to save computational time. The resultant algorithm subroutine PDT appears in FIG. 8/A15G written in FORTRAN.

The exact same coding may be used by the systems engineer for the algorithm subroutine PDT as is used for the algorithm subroutine PDR. However, the calculation table and the macro specification table differ somewhat due to the different definition of the constant C1 and the addition of an additional constant C2. The calculation table and the macro specification table are shown in FIGS. 8/A15N and 8/A15O. The data module or block format for this particular algorithm subroutine is similar to that shown in FIG. 8/A15J and FIG. 8/A15K but includes an additional calculated constant C2 as a second entry in the data module.

Another algorithm subroutine provides proportional, reset, and rate control or compensation when automatically programmed for on-line process operations. This algorithm subroutine is illustrated n FIG. 8/A16. The name of this algorithm is PIDT (proportional plus integral plus differential trapezoidal). The precise mathematical definition of this algorithm subroutine is given in FIG. 8/A16C and a precise diagrammatical formulation is presented in FIG. 8/A16B. The mathematical expression for the algorithm subroutine itself is given in FIG. 8/A16D. The definition given in FIG. 8/A16C is a combination of the definition of the proportional-reset algorithm presented in the first line of FIG. 8/A12C with the trapeziodal derivative expression given in FIG. 8/A15E. As such, these equations need no further explanation beyond what has already been given. The coding for this algorithm subroutine, the required macro specification table, and the necessary calculations using the calculation table are adaptations of those already given in FIGS. 8/A12 and 8/A15 and therefore need no further clarification or illustration.

D. LEAD AND LAG CONTROLLERS

Lag controllers and lead-lag controllers perform filtering functions. A lag controller gives a delayed response to an input signal and a lead controller accentuates a rapidly changing input signal. The lag controller is an integral type of function, while the lead controller is a differential or rate type of function. A lead-lag controller combines a low-pass (lag) filtering characteristic with a high-pass (lead) filtering characteristic.

The precise mathematical formulation for a lag controller appears in FIGS. 8/A17B and 8/A17C. FIG. 8/A17B illustrates that the controller output Y(t) is the integral of the difference between the input error X(t) and the controller output Y(t). This integral operates under the control of a time constant T so that initially the output Y(t) is not responsive to a change in the input error X(t), but after the passage of sufficient time the output Y(t) eventually becomes equal to the input X(t). FIG. 8/A17C illustrates the same function in the frequency domain. High frequency components X are greatly attenuated in Y because the term "T times S" in the denominator of the equation dominates over the term "1" in the denominator for large values of frequency S. Low frequency components of X pass almost unattenuated to Y because the term "T times S" in the denominator becomes insignificant in comparison to the term "1" for low frequencies.

Both trapezoidal and rectangular versions of lag algorithm subroutines are provided for automatic programming linkage into system operation. The difference between these two types of integral algorithm subroutines has already been fully discussed and needs no further clarification at this point. FIG. 8/A17D illustrates the derivation of the rectangular version of the algorithm subroutine which is called LAGR. FIG. 8/A17E shows what modifications must be made to the equations in FIG. 8/A17D to give trapezoidal integration. Both versions of the algorithm subroutine make use of constants C1 and C2 which have different definitions in the two different algorithm subroutines. These constants are pre-calculated by the control chain generator and therefore do not have to be calculated every time the algorithm subroutines are executed. In all other respects, the coding and establishment of these algorithm subroutines is in accordance with the other coding examples which have already been described in some detail.

A lead-lag algorithm subroutine is also provided for on-line implementation within the system and it performs the computation illustrated in FIGS. 8/A17F and 8/A17G. The lag portion of this algorithm subroutine is identical to the LAGR or to the LAGT algorithm subroutine. The lead portion of this algorithm subroutine is a derivative function and is identical to the derivative functions used in the algorithm subroutines PDR and PDT which are shown in FIG. 8/A15. The lead and the lag components are calculated separately and are then summed to form the controller output. This algorithm subroutine is highly useful in control loops where some anticipatory response to a sudden change in the error input is needed, but where other medium-speed fluctuations in the error input must be filtered out so as to give smooth control operation.

As a slight modification of the LAGT algorithm subroutine, a different algorithm subroutine LAGPT (lag proportional trapezoidal) is provided which includes an adjustable gain constant K, as is shown in FIGS. 8/A17H and 8/A17I. The digital form of this algorithm subroutine appears in FIG. 8/A17J and is similar to the algorithm presented in FIG. 8/A17E except for the addition of a proportional term K. Again, the coding, the macro specification table, and the algorithm module required by this algorithm subroutine are similar to those which have already been described in detail.

E. SPECIAL PURPOSE CONTROLLERS

FIG. 8/A19 illustrates an automatically implementable algorithm subroutine which functions in a chain implemented control loop as a ramp controller and which generates an output that rises or falls at a constant rate until it matches the level of the controller input. As is illustrated in FIG. 3/A19D, if the controller input is initially at zero, the controller output rises in a stair-step manner until the controller output is equal to the controller input. The magnitude of each output step is equal to an input variable called RATE which may vary with time, if desired. The length of each step is equal to the time interval delta T which elapses between successive periodic calls for execution of the controller. This controller is controlled by a logical variable called CONTROL and does not function unless CONTROL is true. The controller input Y may be called DEMAND and the controller output X may be called REF, as in FIG. 8/A19B.

The actual method of integration is illustrated in FIG. 8/A19C. Depending upon whether the input DEMAND (or Y) is greater than or less than the output REF (or X), a pulse whose amplitude equals RATE is added to or subtracted from the output REF (or X) periodically.

A block diagram representation of this algorithm subroutine appears in FIG. 9/A19E. Assuming that the logical variable CONTROL enables execution, the subroutine first subtracts the controller output REF from the controller input DEMAND and calls the result of this subtraction DIFF (for difference between output and input). If DIFF is greater than or equal to zero, a check is made to see if DIfc!is greater than the magnitude of RATE. If this difference is smaller than RATE, there is no need to change the controller output since the change would be negligible in quantity and would only result in controller hunting. Therefore the subroutine sets the output REF equal to the input DEMAND and terminates execution. If, however, the difference DIFF is greater than RATE, then the output REF is set equal to itself minus the quantity RATE. In a similar manner, if the value DIFF is less than zero, the output REF is either set equal to the input DEMAND or is incremented by an amount RATE depending upon whether the absolute value of DIFF is greater than or less than RATE.

Execution of this algorithm subroutine does not require any calculations to be made by the control chain generator, and therefore its compilation needs no special explanation.

One logical function which is often required for control in a process environment is a function which causes a controller output to follow the greater or the smaller of two controller inputs. An algorithm subroutine for causing a controller to follow the greater of two input variables is the algorithm subroutine HISEL (high select) shown in FIG. 8/A24; and an algorithm subroutine for causing a controller output to follow the lowest of two input variables is the subroutine LOSEL (low select) shown in FIG. 8/A23. The operation of these two algorithm subroutines is precisely defined by the Fortran statements shown in FIG. 8/A23C and 8/A24C. Coding and algorithm module format examples are given in the figures, and sample macro specification tables used to define the coding for each of these algorithms are also shown in the figures.

Hunting or cycling behavior upon the part of a controller is an undesirable phenomenon which is usally caused by the inability of a controller to reach an absolutely stable state with zero error. It is therefore desirable to have automatically available algorithm subroutines which can terminate the operation of a controller when an error signal falls within certain pre-defined lower limits. Two algorithm subroutines are provided within the present system for this purpose. The first is a deadband algorithm subroutine (FIG. 8/A25). This algorithm subroutine functions as a controller which normally passes an input signal, but which clamps the controller output signal to zero whenever the input signal is within a range defined by a first constant LOLIM and a second constant HILIM. Two Fortran representations for this algorithm subroutine are shown in FIG. 8/A25C and in FIG. 8/A25D. Coding examples, algorithm module format examples, and macro specification table examples are also given in FIG. 8/A25. The operation of this algorithm subroutine is illustrated in FIG. 8/A25J. If it is desirable to have variable limits automatically implementable in process operations, an alternative form of this algorithm subroutine may be used as is illustrated in FIG. 8/A25K and FIG. 8/A25L. In this case, the high limit and the low limit are system variables whose addresses are stored in the algorithm subroutine module. These system variables may be altered by other algorithm modules or control chains.

In more complex systems where a deadband range does not suffice to control hunting, a second algorithm subroutine called THRESHOLD is available and is shown in FIG. 8/A26. This algorithm subroutine generates a logical output value indicating whether or not an input is within a desired special range. Other modules within the control chain or other control chains may then be triggered by the logical variable to implement a deadband action of some form. A complete coding example of this algorithm subroutine is given in FIGS. 8/A26A through A/A26I. The use of this algorithm subroutine is illustrated in FIG. 8/A26J. If it is desired to have adjustable limits, an algorithm subroutine ADJTHRESH is available and is illustrated in FIG. 8/A26K and 8/A26L.

It is often desirable to have a control chain perform nonlinear computations for implementation in process control loops structured in part by computer programming. A nonlinear function generator algorithm subroutine FNGEN (FIG. 8/A08) is therefore included within the system. The FNGEN subroutine causes a variable OUTPUT to fluctuate as a nonlinear function of variable INPUT. The systems engineer defines the nonlinear function by specifying the X and Y coordinates of points lying upon a curve of the nonlinear function where X is the function input and Y is the function output, and that function is then automatically implemented in process operations after chain file loading. For example, the nonlinear function represented by the curve shown in FIG. 8/A08D is defined by the pairs of points (X=0, Y=1), (X=1, Y=3), . . ., and (X=8, Y=4). One illustrative application of FNGEN is for value controls where it is desired to linearize a nonlinear valve charcteristic.

FIGS. 8/A08B and 8/A08C illustrate the coding which might be used by the systems engineer in defining the nonlinear function for execution in a control chain. The names of the variables corresponding to INPUT and OUTPUT are first specified. Low and high limits for the output variable are then set. The X— and Y coordinates of the points whict define the nonlinear function are then listed as separate X— and Y arrays.

In response to this coding, the control chain generator produces the algorithm data modules shown in FIGS. 8/A08F and 8/A08G. These data modules contain the arrays of X— and Y values preceded by integers specifying the length of each array. The control chain generator automatically generates these arrays in response to the "−20" in the third column of the macro specifications for X and Y (FIG. 8/A08H). The minus sign in "−20" means that the length of the arrays is variable. The twenty in "−20" means that no more than twenty array elements are to be expected. The control chain generator counts the number of entries in the X— and Y arrays. Since the X— and Y values are real, each occupies two locations. Hence, the control chain generator multiplies the number of entries times two to give the number of data words which comprises each array. In the example of FIG. 8/A08G, each array, contain five entries or ten data words. Hence, "10" precedes each array.

The algorithm subroutine FNGEN uses the equation shown in FIG. 8/A08E to convert the value of INPUT into the new value of OUTPUT. First, the subroutine compares the magnitude of INPUT with successive values of X to determine which two X values the magnitude of INPUT falls between. For example, if INPUT has a value of 3, the magnitude of input falls between the X values 2 and 4 on the curve shown in FIG. 8/A08D. The first X— value that is larger in magnitude than the magnitude of INPUT is defined to be $X_N$, and the first X— value that is smaller in magnitude than the magnitude of INPUT is defined to be $X_{N-1}$. The corresponding Y values are respectively defined to be $Y_N$ and $Y_{N-1}$. The application of the equation given in FIG. 8/A08E is then straightforward. If the magnitude of INPUT is such that it falls to the left or to the right of all of the X— values shown in FIG. 8/A08D, then the two adjoining end values of X are used for $X_N$ and $X_{N-1}$, with $X_N$ larger in magnitude than $X_{N-1}$. In effect, this procedure extends the first and last segments of the curve shown in FIG. 8/A08D to both the left and to the right as straight lines.

The algorithm subroutine FNGEN automatically forces the values of OUTPUT to fall within the range defined by the constants LOLIM and HILIM. After the value of OUTPUT has been calculated, a limiting routine essentially identical to that described in FIG. 8/A22F sets OUTPUT equal to HILIM if OUTPUT exceeds HILIM and sets OUTPUT equal to LOLIM if OUTPUT is less than LOLIM.

VIII. ALGORITHM SUBROUTINES WHICH ALLOW BRANCHING WITHIN A CONTROL CHAIN

Algorithm subroutines are provided to allow branching (Fortran GO TO) and conditional branching (Fortran IF) within a control chain. These algorithm subroutines are included for automatic control loop implementation to provide the systems engineer with a further element of flexibility.

When the systems engineer is initially coding a conrol chain, he assigns a block number to each algorithm module or block within the control chain. Whenever the systems engineer desires to perform an unconditional transfer, he inserts a transfer block into his control chain. Illustrative coding for such a block appears in FIG. 8/A27A, and the corresponding macro specification appears in FIG. 8/A27B. In this example, the systems engineer has chosen to call his transfer algorithm GO TO. The systems engineer has also defined "NEXT" as a block number by placing a "5" in the fourth column of the macro specification shown in FIG. 8/A27B. Hence, the command "NEXT=21" is interpreted by the control chain generator as meaning the next algorithm data module which is to be executed is the block or module which the systems engineer has labeled block number "21".

The control chain generator and the system file loader translate the coding of FIG. 8/A27A into the algorithm module shown generally in FIG. 8/A27C and illustratively in FIG. 8/A27D. This algorithm data module calls upon a transfer algorithm subroutine, the 27th subroutine in the algorithm subroutine starting address table (see 710 in FIG. 7).

The specified block number "21" (FIG. 8/A27A) does not appear in the illustrative algorithm data module shown in FIG. 8/A27D. In place of an actual block number, the module contains a relative address or index "87". With reference to FIG. 8/A27E, "87" is the starting address of the data module that was assigned the block number "21" by the systems engineer. The starting address "87" is a relative address with reference to the beginning of the control chain.

The transfer algorithm subroutine which processes the module shown in FIG. 8/A27D is short. With reference to FIG. 7, this algorithm subroutine obtains the control chain starting address from the location in the task data pool just past the location whose address is in index register B, adds the chain-relative address of the data module which is next to be executed to the chain starting address, stores the resultant address in the location within the task data pool that is two locations beyond the location whose address is in index register B, and transfers program control back to the find next algorithm routine 710 within the control chain processor. Control chain execution then commences with the execution of the desired data module.

As an example, assume that the transfer algorithm subroutine is about to execute the transfer module shown in FIGS. 8/A27D and 8/A27E. With reference to these two figures and also to FIG. 7, the transfer algorithm subroutine first obtains the control chain starting address from the 41st location within the task data pool (FIG. 7). The subroutine retrieves the relative starting address "87" of the module which is next to be executed from the second entry in the transfer data module (FIG. 8/A27D and 8/A27E). The chain starting address is then added to the relative starting address 87 to give the absolute core memory address of the data module assigned block number 21 which is next to be executed (see FIG. 8/A27E). The absolute core memory address is stored in the forty-second location within the task data pool (FIG. 7). Program control then passes to the find next algorithm routine 710, and the control chain processor proceeds to execute block number 21.

With reference to FIG. 8/A27D, the chain-relative address "87" is normally retrieved from a table within the control chain generator program. This table contains the block number and the chain-relative address of each block or algorithm module in the control chain. Because the control chain generator is a one-pass program which processes the chain defining data serially only once, this internal table of block numbers and chain-relative addresses is not complete until the last block in a control chain is processed.

If a transfer is to an algorithm module which precedes a transfer module in the control chain, the chain-relative address of the algorithm module is available at the time when the transfer data module is generated by the control chain generator program. The control chain generator program can simply retrieve the chain-relative address from the table and place it into the transfer data module, as in FIG. 8/A27D.

If a transfer is to an algorithm module which follows the transfer module in the control chain, as in FIG. 8/A27D, the chain-relative address of the module to which the transfer is made is not yet present within the table at the time that the transfer data module is generated by the control chain generator program. It is necessary for the control chain generator program to place a zero in the second entry of the transfer module initially. Just before the control chain generator program generates the data module to which the transfer is to be made, the generator program generates an address link load module containing a pointer to the second entry of the transfer data module (see FIG. 5H). This address link load module causes the file loader program to enter the necessary chain-relative address ("87" in FIGS. 8/A27D and 8/A27E) into the transfer module to complete the transfer linkage.

In FIG. 8/A27B, the "5" in column 4 of the macro specification for the block number NEXT identifies NEXT as a block number to the control chain generator program. All references to block numbers are identified in this fashion.

Algorithm subroutines for performing conditional transfers are also provided for automatic implementation within the system. The algorithm modules for two such subroutines appear in FIG. 8/A28 and 8/A29. A test branch logical algorithm subroutine whose algorithm module is shown in FIG. 8/A28 transfers control chain execution to one of two designated algorithm modules depending upon the state of a specific system logical variable. The coding and macro specification table for this algorithm subroutine are similar to those for the TMDOUT algorithm subroutine shown in FIG. 8/A09 but also include chain relative addresses ("IX" in the figure) of the type which have just been described.

A test branch real algorithm subroutine (FIG. 8/A29) branches after comparing two real variables. This algorithm subroutine is similar to the COMPSET algorithm subroutines (FIG. 8/A04) in its coding and action. Its coding and macro specification table include block numbers of the type just described. Other FORTRAN-types of conditional transfer instructions may also be provided by appropriately formed algorithm subroutines similar to the two just described.

IX. ALGORITHM SUBROUTINES WHICH ALLOW INTERACTION BETWEEN CONTROL CHAINS AND THE SYSTEM

The algorithm subroutines described below enable control chains automatically to access the sublevel processor, to place themselves into time delay, to call subroutines, and in general to do most anything that a computer program may do.

Three algorithm subroutines are provided which give control chains access to the sublevel processor program. All three of these subroutines expect an algorithm module that appears as is shown in FIG. 8/A30. A call subtask algorithm subroutine places a bid with the sublevel processor for execution of a designated subtask. An enable subtask algorithm subroutine calls upon the sublevel processor to enable the execution of a designated subtask, and a disable subtask algorithm subroutine calls upon the sublevel processor to disable the execution of a designated subtask. Since subtasks may be programs, control chains, or analog scan input data files, these three algorithm subroutines allow control chains to initiate, to enable, or to disable almost any job within the system. These three algorithm subroutines function by executing subroutine calls to appropriate subroutines within the sublevel processor program, supplying the specified subtask number (second entry in FIG. 8/A30) as an argument.

If the execution of a control chain is ever to be suspended for a brief interval, the systems engineer places a time delay algorithm data module, such as that shown in FIG. 8/A31, into the control chain at an appropriate point. The first module entry contains the duration of the time delay in tenths of a second. The remaining module entries remain vacant until the module is processed by its associated algorithm subroutine. The algorithm subroutine which processes this module stores the cores address of the location just preceding the time delay algorithm module first entry in index register B and calls upon the time delay subroutine 10/215 (FIG 10A) within the sublevel processor program 10/200 (FIG. 10A) to execute the time delay. The duration of the time delay is supplied to the routine 10/215 as an argument.

The time delay subroutine 10/215 links the algorithm module into the time delayed subtask linkage shown in FIG. 9G. This subroutine 10/215 does not distinguish between control chains and programs, but handles all time delay requests in exactly the same manner. The subroutine 10/215 loads the requested time delay count into the fifth memory location beyond that to which index register B points. The subroutine calculates the currently active subtask number, using the sublevel processor tables, and enters this number into the fourth memory location beyond that to which index register B points. The contents of a location TDLINK are then loaded into the third memory location beyond that to which register B points, and the address of this third location is stored in the location TDLINK (see control chain A in FIG. 9G). The control chain subtask is then terminated by a transfer of program control to the entry point of the currently running task level.

The time delay countdown and the restarting of the control chain are carried out by the periodic bidding program, by the sublevel processor program, and by the control chain processor program. An explanation of the control chain restart procedure is to be found towards the end of the description of the control chain processor program. It suffices for now to note that after the time delay expires, execution of the control chain begins with the next algorithm data module following the time delay algorithm data module.

An algorithm subroutine is provided which allows a delayed bid for the execution of a subtask to be placed with the periodic bidding program. The corresponding algorithm module appears in FIG. 8/A32. This algorithm subroutine simply supplies the designated subtask number and time interval to the subroutine 914 within the auxiliary synchronizer program (FIG. 9A).

The above algorithm subroutines are representative of a number of subroutines which pass arguments from a control chain file to a system subroutine and which call for execution of specific system subroutines. It is possible to provide algorithm subroutines which can pass arguments directly from a control chain algorithm module to any desired subroutine that exists within the system.

A final algorithm subroutine in this class allows any one of a specific list of system subroutines or programs to be executed. The algorithm module for this subroutine is a variable length module and is shown in FIG. 8/A33. The module contains an index number of the subroutine or program which is to be called upon and also contains the arguments which are to be transferred to the subroutine or program. The algorithm subroutine includes a table containing the starting addresses of the programs and subroutines listed in the order of their assigned index numbers. Blank areas may be left in this table so that additional program and subroutine addresses may be entered after the system is established and is operating. Whenever it is called upon, this algorithm subroutine executes a standard system subroutine call to the specified program or subroutine and supplies the indicated data values to the program or subroutine as arguments.

9. THE AUXILIARY SYNCHRONIZER

Substantial improvement in the flexibility of process operation and control can be achieved by making it possible to rearrange the timing pattern which defines when different system events occur even long after the system is initially set up. In the present system, the auxiliary synchronizer interacts with other program and system elements to allow the establishment of any desired periodic calling sequence for system operations and also allows changes in those calling sequences to be established at any time.

The auxilary synchronizer 900 is shown in block diagram form in FIG. 9A. The auxilary synchronizer is placed in operation periodically by a call from an executive task bidding program 902. In the preferred embodiment of the system, this call occurs every tenth of a second. The executive periodic task bidding program is essentially an interrupt program placed in operation by a 60 cycle clock which bids for the execution of designated system task levels after the expiration of six successive 60-cycle interrupts. Although the executive program interacts with other program elements in the operation of the present invention, it is per se conventional as previously noted and its details are accordingly not considered in the present application.

Five different types of periodic time measuring functions occur within the program system, and all of these functions are carried out under the control of the auxiliary synchronizer. These periodic time measuring functions are as follows:

1. Placing a subtask bid after a specified time delay (routine 904 in FIG. 9A; tables in FIG. 9D);
2. Periodically bidding for the execution of subtasks (routine 906 in FIGS. 9A and 9B; tables in FIG. 9E);
3. Changing the state of system logical variables after a specified time interval has expired (routine 908 in FIGS. 9A and 9C; linkages in FIG. 9F);
4. Suspending the operation of subtasks for specified lengths of time (routine 910 in FIG. 9A; linkages in FIG. 9G);
5. Resetting contact closure outputs after the expiration of a specified time interval (routine 912 in FIG. 9A; tables in FIG. 9H);

Within the auxiliary synchronizer, tables 918 are provided for the storage of temporary values relating to most of these operations. The flexibility of the auxiliary synchronizer results in part from the flexible way in which these tables are set up and in part from subroutines which allow these tables to be completely rearranged whenever necessary. The five basic functions of the auxiliary synchronizer are discussed below in the order in which they are listed above.

A. DELAYED SUBTASK BID COUNTDOWN ROUTINE

When the auxiliary synchronizer is first placed in operation, it checks a delayed subtask bid table TDYTAB (FIG. 9D) to see if any requests have been placed for subtasks to be executed at a future time. The subtask number of the subtask which is to be bid is stored in a first location in the table, and the 0.1 second count remaining before the time delay expires is stored in the next sequential location in the table. The address of the last table entry containing a subtask number is stored in a location BIDPOINT, and the table entry address minus two is stored in a location TDYBUF. A delayed subtask bid countdown routine 904 (FIG. 9A) first checks the entries in TDYBUF and in BIDPOINT to see if these entries are equal. If the entries are equal, then the table is empty and this portion of the auxiliary synchronizer program 900 is bypassed. If the tables are not empty, then the routine 904 goes through the table and decrements the count value stored in every other table location. Whenever a count value reaches zero, a bid is placed with the sublevel processor program (FIG. 10A) for execution of the subtask. After a bid is placed, table entries having higher addresses than the address of the entry corresponding to the bid are shifted upwards two positions to fill in the void. The number in the location BIDPOINT is then reduced in value by two. The routine 904 continues until all of the counts within the table TDYTAB have been decremented and until all the necessary subtask bids have been placed.

B. PERIODIC SUBTASK BID COUNTDOWN ROUTINE

The auxiliary synchronizer 900 next transfers program control to a periodic subtask bid countdown routine 906 the details of which are shown in FIG. 9B. Periodic subtask bids are recorded in a subtask periodic bidding table that is shown in FIG. 9E. The flexibility of this bidding table allows any desired subtask bidding frequency to be achieved within the employed time resolution of the system and allows the entire arrangement of periodic bids to be altered at any time.

With reference to FIG. 9E, the subtask periodic bidding table is divided into four linkages as shown. The starting addresses of these four linkages are stored in locations ADRES1, ADRES2, ADRES3, and ENDPOINT. The table contains two different types of modules—counting modules and bidding modules. A counting module is established for every bidding frequency that is used within the system. Bidding modules contain the subtask numbers of subtask which are to be bid. Each group of bidding modules for subtasks which are to be bid at a specified frequency are linked by branch linkages to the counting module which keeps track of the corresponding frequency count. The counting modules linked to ADRES1 measure time in tenths of a second and are serviced every tenth of a second. The counting modules linked to ADRES2 measure time in seconds and are serviced every second. The counting modules linked to ADRES3 measure time in minutes and are serviced every minute.

Each counting module contains a count or counter location which is decremented periodically when the count module is serviced, an initial count location in which is stored the initial value of the count and which determines the number of time intervals which elapse between the placing of periodic bids for the execution of a group of subtasks, a counting module linkage pointer containing the address of another counting module that is serviced at the same frequency, and a bidding module linkage pointer containing the address of the first bidding module in a linkage of bidding modules. Each bidding module in the linkage contains anywhere from one to three subtask numbers. When the count in a counting module is decremented to zero, bids are placed for the execution of all subtasks whose subtask numbers are stored in the corresponding linkage of bidding modules.

All modules which are not currently in use as either counting or bidding modules are linked to the location ENDPOINT by address pointers. An empty module linkage is thus established. Whenever a counting or a bidding module is no longer needed by the system, the module is disconnected from its linkage and is added to the end of the empty module linkage. Whenever a new counting or bidding module is added to an active linkage, the new module is taken from the end of the empty module linkage.

With reference to FIG. 9B, the periodic subtask bid countdown routine 906 maintains a tenth of a second counter in a location TENSEC 920 and a one second counter in a location ONESEC 928 (FIG. 9E). Upon entry into the countdown routine 906, the tenth of a second counter TENSEC is decremented (step 920). If this counter is decremented to zero, this means that a second has expired. Whenever this happens, the counter TENSEC is set equal to ten and the counter ONESEC is decremented (step 928). If the counter ONESEC is decremented to zero (step 930), then a minute has expiried. Whenever this happens, counter ONESEC is set equal to 60 (step 934).

The countdown routine 906 advances the 0.1 second counters which are linked to the location ADRES1 (FIG. 9E) every time the routine 906 is placed into operation (step 924). At the expiration of every second, the routine 906 decrements all of the 1.0 second counters which are linked to the location ADRES2 (step 932 in FIG. 9B; ADRES2 appears in FIG. 9E). At the expiration of every minute, the routine 906 decrements all of the one minute counters which are linked to the location ADRES3 (step 936 in FIG. 9B - ADRES3 appears in FIG. 9E). In every case, the actual decrementing of the counters is carried out by a counter decrement and subtask bid subroutine 926. The subroutine 926 is called upon by all three of the routines 924, 932, and 936. The routines 924, 932, and 936 supply to the subroutine 926 the starting address of the corresponding linkage as an argument. The subroutine 926 follows the counting module linkages (see FIG. 9E) through the bidding table, decrementing all of the counts in the counting modules. When a count reaches zero, bids are placed for the execution of all subtasks whose subtask numbers are stored in bidding modules linked to the counting module containing the zero count, and the count is restored to its initial value by transferring the initial count from the initial count location within the counting module to the count location within the counting module.

FIG. 9E is set up to illustrate how the subroutine 926 follows the 0.1 second linkage which begins in the locatin ADRES1. The subroutine 926 follows the other two linkgages in exactly the same manner.

The location ADRES1 contains the address of the "count" location within the first module (module 1) in the table. When the subroutine 926 is supplied with this address, the subroutine 926 decrements the count in module 1 and checks to see if this count has gone to zero. If the count has gone to zero, the initial count within module 1 is transferred to the count location within module 1 and the subroutine 926 accesses the bidding module linkage pointer of module 1. The bidding module linkage pointer contains the address of the first location in a bidding module, module 2. Bidding module 2 contains two subtask numbers in the second and third locations within the bidding module. The subroutine 926 places bids with the sublevel processor (FIG. 10A) for the execution of the corresponding subtasks. The first location within bidding module 2 contains zero indicating that no more bidding modules are linked to counting module 1.

The subroutine 926 now returns to counting module 1 and obtains the counting module linkage pointer from module 1. This linkage pointer contains the address of counting module J. The subroutine 926 decrements the count within the module J. If the count reaches zero, the initial count is placed in the count location and the subroutine 926 follows bidding module linkage pointers to bidding modules K, P and X. Bids are placed for all of the subtasks whose subtask numbers are found in these three bidding modules. Linkage pointer addresses stored in the first location within each bidding module link the bidding modules into a branch chain extending from the associated counting module. The end of bidding module linkage or branch chain is indicated by a zero placed in the first location within a bidding module, as can be seen in module X.

The subroutine 926 now obtains the count module linkage pointer address from the counting module linkage location within counting module J. In the example shown, the counting module linkage pointer address is the starting address of counting module N. The count in module N is decremented. If the count reaches zero, it is restoed and bids are placed for the subtask whose subtask numbers are stored in the associated bidding module W. Counting module N contains a zero in the counting module linkage pointer which indicates that this is the last module in the counting module linkage. When this counting module has been processed, the subroutine 926 terminates and returns program control to the calling routine 924 (FIG. 9B).

The arrangement of the subtask periodic bidding table (FIG. 9E) may be changed at any time with the assistance of a pair of subroutines 916 (FIG. 9A). When a request is placed with a subroutine 916 to bid a given subtask at a specified frequency, the subroutine 916 follows the linkage which is appropriate for the frequency specified and determines whether any counting modules exist which are assigned to the specified frequency. If such a counting module is found, the bidding modules linked to that counting module are then scanned for any blank entries into which the subtask number of the given subtask may be placed. If all of the associated bidding modules are full, a new bidding module is created by removing the last empty module from the empty module linkage and linking this empty module to the end of the existing bidding module linkage. The number of the given subtask is then placed within this new bidding module along with three zeros. If no counting module assigned to the desired bidding frequency is found, a new counting module is created by removing the first empty module from the empty module linkage and lining this module into the appropriate counting module linkage. The given frequency is then placed in the first two locations within this new counting module. A new bidding module is then created by taking a next empty module from the empty module linkage and linking it to this new counting module. The subtask number of the given subtask is then stored within the bidding module.

In response to a request to remove a subtask number from a periodic bidding linkage, another of the subroutines 916 scans the appropriate frequency linkage looking for a bidding module containing the specified subtask number and linked to a counting module assigned to the specified frequency. If no such bidding and counting modules are found, an error flag is set and the subroutine terminates. If the bidding and counting modules are found to exist, the specified subtask number is removed from the bidding module. A subtask number from the last bidding module in the linkage is then brought forward to fill in the hole in the bidding module so that only the last bidding module in a linkage ever contains zero entries. If the last bidding module in a linkage then contains all zeroes, the last bidding module is removed from its linkage and is added to the empty module linkage. If the associated counting module then no longer has any bidding modules attached to it, the counting module is also removed from its linkage and is added to the empty module linkage. In this manner, any desired arrangement of periodic subtask bids may be set up at any time, even long after a particular configuration is established and operating.

C. LOGICAL TIME DELAY COUNTDOWN ROUTINE

The routine 908 which controls the operation of control chain logical time delays is shown in FIG. 9C. The associated linkages appear in FIG. 9F. With reference to FIG. 9F, two linkages are provided within the logical time delay countdown tables: a low resolution linkage beginning at a location LOLINK and a high resolution linkage beginning at a location HILINK. The two linkages include all of the logical time delay countdown control chain modules which are active and counting. Tables are usually not required for logical time delays because the control chain logical time delay modules usually contain the necessary storage space. Normally, disk-resident control chains may utilize tables in core storage, however.

Logical time delays are placed in operation by logical time delay algorithms which may be called upon by any system control chain. As is explained elsewhere, two types of logical time delays may be requested: a TRUE-TRUE logical time delay and a FALSE-FALSE logical time delay. A TRUE-TRUE logical time delay sets an output logical variable true after the expiration of a predetermined time interval, but cancels the time delay and sets the output logical variable false if an input logical variable becomes false before the end of the tine interval. A FALSE-FALSE logical time delay sets an output logical variable false after the expiration of a predetermined time interval, but cancels the time delay and sets the output logical variable true if an input variable becomes true before the end of a predetermined time interval.

Since a digital computer functions in real time as a sampled data device and therefore cannot continuously monitor a logical variable, the logical time delays check each input logical variable periodically. A logical time delay may be either a high resolution time delay with the input variable checked in this instance every tenth of a second, or a low resolution time delay with the input variable checked in this instance after a time interval whose duration in tenths of a second is equal to a number that is stored in a location CORES. The choice of high or low resolution is made with reference to the activity of the logical variable, the probability that a momentary change in the state of an input variable might be missed, the need for time resolution in terms of process performance, and the length of the time delay. For example, an input logical variable representing a process temperature associated with a long time delay is best handled by a low resolution time delay to save computer time, while a logical variable indicating the presence of a system electrical transient and associated with a short time delay is best handled by a high resolution time delay. The control chain time delay modules and algorithms determine whether each logical time delay is low or high in resolution.

The logical time delay countdown routine 908 (FIG. 9C) is placed in operation every tenth of a second by the auxiliary synchronizer 900. Upon entry to the routine 908, the logical time delay counters of all high resolution logical time delays are first advanced and the logical variables are altered if necessary (FIG. 9C - step 938). A count that is stored in a location MPYER is then decremented (step 942). If the count reaches zero (step 944), the low resolution time delay counters are processed. One less than the number stored in the location CORES is placed into the count location MPYER (step 946). The routines 938 and 946 do not actually process the logical time delays themselves but merely supply the starting address of their corresponding time delay linkages to a logical time delay counter advance subroutine 940. The subroutine 940 then follows through the linkages and processes the logical time delays as is necessary.

With reference to FIG. 9F, high resolution time delay modules are linked to a location HILINK in essentially the same manner that the time delays for subtasks are linked to ADRES1 in FIG. 9E. When the subroutine 940 is supplied with the address of the location HILINK step 938 (FIG. 9C), the subroutine 940 follows linkage pointer to the first logical time delay module X. Since line two of this module contains a positive count, this is a TRUE-TRUE logical time delay. The subroutine 940 therefore checks the input logical address to see if the input variable is still true. If the input variable is false, then the output variable (whose address is retrieved from the last location in the module) is also set false; zeroes are placed in the first two locations within the module; and the module is removed from the high resolution linkage. This procedure cancels the time delay in response to the input logical variable having gone false.

If the input logical variable is found to be true, the count is decremented. If the count is decremented to zero, the output logical variable is set true, zero is stored in the counting module linkage location, and the module is removed from the high resolution linkage. If the count does not reach zero count, the subroutine 940 goes on to the next module in the linkage, module Z.

Module Z is processed in the same manner as was module X. However, the count in module Z is a negative count and therefore this module corresponds to a FALSE-FALSE time delay. The time delay is therefore cancelled and the output logical variable is set true only if the input logical variable goes true. Upon expiration or cancellation of the time delay, the output logical variable is set false rather than true. The negative count is incremented rather than decremented, but the logical time delay still expires when the count is incremented to zero count. Since the first location within module Z contains zero, this is the last module in the high resolution linkage. The subroutine 940 therefore returns program control to step 938 after processing the module Z.

The subroutine 940 processes the low resolution logical time delay modules, which are linked to a location LOLINK, in exactly the same manner as described above and as illustrated in FIG. 9F.

D. TIME DELAYED SUBTASK COUNTDOWN ROUTINE

The time delayed subtask countdown routine 910 is actually a part of the sublevel processor program. It is described here because this routine is placed in operation every tenth of a second as are all the other auxiliary synchronizer countdown routines and because the mechanism whereby subtask time delays are timed out is quite similar to the mechanism whereby other time delays and time measurements within the system are carried out.

With reference to FIG. 9G, all subtasks whose operation has been suspended pending a time delay are linked by linkage pointers to a location TDLINK. All subtasks whose operation has been suspended indefinitely are linked by linkage pointers to a location SUSPLINK. In the preferred embodiment of the invention, the time delayed subtask linkages are not stored within a defined table within the system. Any subtask which wishes to suspend itself or to place itself in time delay must provide a group of three or more successive locations within the subtask itself which locations mya be used as a basis for forming and maintaining linkages. In FIG. 9G, four program subtasks A, B, C, and D are shown. Program subtasks A and B have placed themselves into time delay by calling upon an appropriate subroutine of the sublevel processor. Program subtasks C and D have suspended themselves in a similar manner. The program register pools are shown in FIG. 9G for each of these subtask programs. In each case, entry G in the register pool contains a time delay linkage pointer or a suspend linkage pointer. Entry A in the pool of those programs which are in time delay is used to store the time delay count. The subtask number of each program is stored in pool entry E to facilitate restarting of the programs through the normal system subtask bidding procedure.

Two control chains A and B are also shown in FIG. 9G. The control chain A is linked into the time delay linkage and the control chain B is linked into the suspended subtask linkage. Each of these control chains includes a special algorithm block or module containing three successive locations for storage of a time delay counter, a linkage pointer, and a subtask number. Insofar as the time delay subtask countdown routine 910 is concerned, there is no difference between a control chain subtask and a program subtask. They are all linked into the same chain linkage and they are all processed in exactly the same manner.

The subroutine 910 periodically goes to the location TDLINK and obtains the address of the linkage pointer within the control chain A. The count location within this control chain is decremented. If the count does not go negative, the subroutine 910 follows the linkages to the program subtask A. If the count does go negative, the control chain A is removed from its position within the time delay linkage and is linked between the location SUSPLINK and subtask C in the suspended subtask linkage. The subtask number of control chain A is then retrieved from the control chain, and a bid for the restarting of control chain A is placed with the sublevel processor through the use of the SUBBID subroutine (FIG. 17/1020). The linkage pointer within control chain A is then followed to the program subtask A, and the exact same procedure is repeated. When the subtasks A and B have both been processed, the routine 910 discovers a zero in the linkage pointer location of subtask B and immediately transfers program control to the next routine 912 within the auxiliary synchronizer 900 (FIG. 9A). At a later time, the sublevel processor program restarts the control chains or program subtasks whose time delays have expired in a manner that is explained more fully in sections 7, 8 and 10 of this specification - those sections which describe the sublevel processor program basic task program 10/1200 (FIG. 10A) and CHKBID subroutine 10/1400 (FIG. 10A), and also those sections which describe the time delay algorithm subroutine (FIG. 8/A31) and the control chain processor return from subtask time delay routine (704 in FIG. 7).

E. CONTACT CLOSURE OUTPUT DEVICE COUNTDOWN ROUTINE

Another portion of the auxiliary synchronizer is the routine 912 which times out the duration of the contact closure outputs that control the actuation of system devices external to the computer. With reference to FIG. 9H, a simple table of time delay counts is maintained having one location for each timed contact closure output device that is controlled by the program system. This table includes an initial location TMETBL which contains a number indicating how many devices are in active time delay at any given time. The counts in the table are either positive or negative depending upon whether the contacts are actuating the external device in a first direction or in a second direction, as is explained in connection with the description of the C.C.O. device TMDOUT algorithm subroutine (FIG. 8/A09). A zero count indicates that the associated output device is currently inactive.

The countdown routine 912 (FIG. 9A) checks the first location in the table (FIG. 9H). If this location contains zero, then none of the devices are active and the routine 912 immediately terminates. Otherwise, the routine goes through the entire table checking each location. Positive counts are decremented and negative counts are incremented. If any count becomes zero, an appropriate call is made to an alter bit subroutine 11060 (FIG. 11A) which resets the contact closure output bit that is associated with the device. In general, two bits are assigned to each device - one bit which actuates the device in one direction and a second bit which actuates the device in the opposite direction. These bits are stored in consecutive bit locations within the contact closure output portion of the computer system bit storage table LIUSER (FIG. 11(cont.)). Each location in the table TMETBL corresponds to two bits in the bit storage table and since the two tables are similarly ordered, it is possible for the routine 912 to figure out from its position in the table TMETBL which device is to be actuated. The sign of the count then tells whether the device is actuated in one direction or in the other direction, and thus indicates which of the two bits is to altered.

Upon completion of the routine 912, the auxiliary synchronizer program 900 transfers program control back to the system executive.

10. TASK, SUBTASK, AND FILE BIDDING PROCESSOR

An important aspect of the present invention is a group of programs which collectively are called the task, subtask, and file bidding processor and which function on-line after program and file loading operations. These programs are shown as element 410 in FIG. 4 and element 156 in FIG. 1. The processor 410 is a collection of programs and subroutines and includes the system executive scheduler.

The programs which comprise the task, subtask, and file bidding processor are shown collectively in FIG. 10A. Some of these programs, such as the system executive scheduler, the data file processing program, and the control chain processor, are described elsewhere and are not described in detail here. The remaining programs and subroutines which comprise the processor 410 are collectively called the sublevel processor program or sublever processor 10/200.

Since the system executive provides a limited number of different task levels, in this instance sixteen, a primary function of the sublevel processor 10/200 is to break up the executive task levels into many subtasks or subtask levels. Whereas in a conventional computer the task or subtask levels are only assigned to computer programs, the sublevel processor 10/200 makes provision whereby control chain files, data files, and other data bodies may also be assigned to subtask levels. A single subtask bidding subroutine 10/1100 is provided through which any system program may place a bid for the program execution of any subtask, no matter what type of subtask it happens to be. The bidding program does not have to know anything more about a subtask than its priority or subtask number. The bidding program does not have to know whether the subtask is core- or disk-resident, or whether the subtask is defined by a program or by a data file. The sublevel processor program 10/200 maintains records on all the system subtasks in tables 10/201 and knows how to handle any type of bid which may be placed. After a bid has been placed for execution of a subtask, a check is made to see if the subtask is in core. If the subtask is not in core, the sublevel processor loads the subtask into a core buffer before calling for execution of the subtask. If the subtask is a program, the sublevel processor transfers program control directly to the program. If a subtask is a file, the sublevel processor program transfers control to an appropriate data file processor, for example the data file processing program 10/140 or the control chain processor 10/144.

During programmed operation of the computer 102 and the apparatus 116, a careful division of labor is maintained between the executive scheduler 10/202 and the sublevel processor 10/200. All bids for execution of system programs or subtasks outside of the task level that is running are first handled by the executive scheduler 10/202. As previously noted, the executive scheduler is part of the executive monitor package and it determines what system task level is to have program control. The sublevel processor program 10/200 then determines which subtasks within the task level are to run and in what order. Many subtasks may exist within a given task level, and the sublevel processor program is designed to switch from one subtask to another with a minimum loss of time and without recourse to the executive scheduler. The subtasks within a task level are executed in order of priority, but the sublevel processor does not allow one subtask to interrupt another. By forbidding interruptions between subtasks assigned to the same task level, the necessity for providing temporary register storage space and temporary data storage space for every system subtask is avoided. A subtask within one task level may be interrupted by a subtask within a higher priority task level, but such interruptions are handled exclusively by the executive scheduler in the conventional manner. Since there are only sixteen executive task levels, it is only necessary to provide interruption storage space for sixteen sets of registers and for sixteen sets of temporary data - one for each system task level. The execution of system programs is speeded up by this limited interruptability provision because the time lost due to interruptions between subtasks within the same task level is eliminated. The speed at which program control can be transferred from one subtask to another within the same task level is also increased because the number of calls to the executive scheduler is decreased.

Flexibility is one of the main features of the sublevel processor program 10/200 both before and during online process monitoring or control operations. Subroutines within the sublevel processor program make it possible for the entire basic structure of the subtask assignments within the system to be changed in a plant or process operating system with no loss of process operating time. For example, assume that a block of consecutive subtasks are all assigned, and assume that a new subtask must be created having a priority level intermediate to those within the block. It is a simple matter to change the subtask assignments within the sublevel processor tables so as to make room for the new subtask. When a change or modification is made to an operating configuration, changes in subtask assignments of this nature may be carried out automatically in a manner described more fully in section 6 of this specification (see the discussion relating to FIG. 6/111).

In brief summary, the sublevel processor program expands the number of priority levels available within the system by breaking down each interruptable executive task level into any desired number of non-interruptable subtasks which may be programs, job specification (control chain or monitor) data files, or even data files which contain only data values. The sublevel processor provides a uniform method whereby bids for the execution of any job within the system may be placed whether the job be defined by a program, by a control chain file, or by a monitor data file. In this manner, the computer 102 is caused systematically to monitor or control the apparatus 116 and produce the desired process performance and/or process information.

A. TERMINOLOGY

In the description which follows, when a program is assigned to a task level, it is assigned to one of the sixteen individual, interruptable task levels of the system executive scheduler (see FIG. 2/3B). Each of the sixteen task levels is assigned a unique task level number between $0_{10}$ and $15_{10}$. The present invention contemplates breaking up some, but not necessarily all of the system task levels into a number of non-interruptable subtasks or sublevels. Within each task level, the subtasks are assigned consecutive "sublevel numbers" which start from zero and which provide a subtask execution priority system. A "sublevel number" is not necessarily unique to one subtask, since another subtask assigned to a different task level may have the same "sublevel number". "Subtask numbers" are therefore used to uniquely designate a particular subtask within the system. The decimal "subtask number" of a subtask equals $1{,}000_{10}$ times the task level number (base 10) of the task to which the subtask is assigned plus the sublevel number (base 10) of the subtask. For example, in the upper half of FIG. 10I, the subtask number $\mathbf{5113}_{10}$ is assigned to a subtask having the sublevel number $\mathbf{113}_{10}$ and assigned to the $\text{fifth}_{10}$ task level.

Within the operating system, task level numbers, sublevel numbers, and subtask numbers are all hexadecimal. An internal subtask number is created in the manner shown in the lower half of FIG. 10I by multiplying the hexadecimal task level number by $1{,}000_{16}$ and by then adding the hexadecimal sublevel number to the resultant product. The two most significant digits of the hexadecimal sublevel number are called the "group number". The least significant digit of the hexadecimal sublevel number is called the "bit number". The significance of the "group number" and "bit number" is explained below.

B. THE SUBLEVEL PROCESSOR PROGRAM

The sublevel processor program 10/200 includes all of the elements enclosed within the broken line in FIG. 10A. The sublevel processor program 10/200 is not a single program, but a number of programs and subroutines which together provide a uniform method for handling all requests for the execution of process related or other subtasks no matter what the nature of the subtask may be.

A request or bid for the execution of a subtask is placed during processor or plant operations by calling a sublevel bidding subroutine SUBBID 10/1100. The subroutine 10/1100 records the bid in sublevel processor tables 10/201. The subroutine 10/1100 then requests the executive scheduler 10/202 to execute the task level to which the subtask is assigned.

Almost all the executive task levels which contain one or more subtasks have a common entry point within a basic task program 10/1200. When the executive scheduler 10/202 transfers program control to such a task level, the scheduler 10/202 establishes the task level as the currently active task level and enters the basic task program 10/1200 at the common entry point. The program 10/1200 immediately executes a CHKBID subroutine 10/1400 to determine what subtasks within the currently active task level are bidding for execution. The CHKBID subroutine 10/1400 interrogates the sublevel processor tables 10/201 for the currently active task level and either determines that no subtasks are bidding for execution or else selects the highest priority subtask that is bidding. If a bidding subtask is found, the CHKBID subroutine 10/1400 obtains the starting address of the subtask from a table 10/201. Program control is then returned to the basic task program 10/1200.

The basic task program 10/1200 now determines what type of subtask has been found. If no subtask has been found, program control is returned to the executive scheduler 10/202. If a subtask is found and if the subtask is a computer program 10/208 or 10/210, program control is transferred directly to the computer program 10/208 or 10/210 as if the program 10/208 or 10/210 were a subroutine of the basic task program 10/1200. If the subtask is a control chain 10/212 or 10/214 to be implemented in the operation of the plant or process being monitored or controlled, then program control is transferred to the control chain processor program 10/144 along with the starting address of the control chain data file. If the subtask is assigned to any type of data file, an error return is made, since monitor data file subtasks are usually handled by the data file processor program which is described in Section 12, and true data files are not executable. Alternatively, the program 10/1200 could transfer program control to a data file processing program along with the starting address of a data file subtask, if desired.

In any case, after the subtask has run to completion, program control returns once again to the basic task program 10/1200. The above procedure is then repeated starting with the call to the CHKBID subroutine 10/1400. When all of the bidding subtasks within the currently active task level have been executed, the basic task program 10/1200 returns program control to the executive scheduler 10/202.

A task header and task data pool 10/220 (see FIG. 10G) is provided for each executive task level within which temporary data values are to be stored in case of an interruption. If execution of a subtask or program assigned to a higher task level than the currently active task level is requested, the system registers are stored in the task header 10/220 (see FIG. 10G) for the currently active task level, and program execution is recommenced at the higher task level. Temporary data values placed in the task data pool 10/220 are not lost because the task data pool is not available to higher task level programs. The size of the task data pool 10/220 may be kept small because usually no more than one subtask is allowed access to a task data pool at any one time, no matter how many subtasks are assigned to the task level.

Two types of data file subtasks (other than control chain subtasks) exist within the preferred embodiment of the invention. The first is a simple data file subtask that is used by some other subtask for the storage of data values or intermediate results. A simple data file subtask is never executed, but it may be transferred between disk and core storage by a collection of read and write subroutines 10/2100 which are described below. The second is a monitor data file subtask which defines a job specification to be performed for the plant or process being monitored or controlled. For example, a monitor data file subtask may include a linkage of monitor data files which define an analog scan function that is to be performed. The monitor data file processor program 10/140 is provided to handle the processing of monitor data file subtasks. A request for the execution of a monitor data file subtask may be made by placing a bid with the subtask bidding subroutine 10/1100. In response to such a bid, the executive scheduler 10/202 transfers program control directly to the task level of a monitor data file processing program 10/140. The monitor data file processing program 10/140 calls the CHKBID subroutine 10/1400 directly to determine which data subtask is bidding for execution. The CHKBID subroutine 10/1400 supplies the monitor data file processing program 10/140 with the address of the highest priority bidding subtask assigned to the task level of the program 10/140. The monitor data file processor 10/140 then interrogates the monitor data file subtask 10/204 or 10/206 directly. After all the monitor data file subtasks which are bidding for execution have been processed, the monitor data file processing program 10/140 returns program control to the executive scheduler 10/202.

A time delay and suspend subroutine 10/215 is provided within the sublevel processor program 10/200 so that an operating subtask may be placed in time delay for a specified interval or suspended indefinitely. The call to the subroutine 10/215 is a normal subroutine call. As has been explained, a normal subroutine call is carried out by storing the contents of the system registers in a register storage pool, by storing the pool address in register B, and by jumping to the subroutine. Hence, the subroutine 10/215 has access to the pool in which the system registers are stored. The pools of all subtasks in time delay are chain-linked to each other and to a location TDLINK 10/216. One entry in each pool contains the address of the next pool in the linkage. Another entry in each pool contains the number of time intervals which are to elapse before the corresponding subtask is removed from time delay and restarted. A third entry in the pool contains the subtask number of the subtask which is in time delay. Periodically, the time interval entry in each pool is decreased by a fixed amount. When the time interval entry in a pool becomes negative, the subtask associated with the pool is restarted. A similar linkage is provided for the pools of all subtasks that are indefinitely suspended, and the first location in this linkage is a location SUSPLINK 10/218. A more detailed explanation of the time delayed and suspended subtask pool linkages may be found in the text which accompanies FIGS. 9G and 8/A31.

Requests for the execution of a disk-resident subtask are handled in exactly the same manner as requests for the execution of a core-resident subtask. The program or sublevel requesting execution does not have to know whether the requested subtask is disk- or core-resident. The subtask bidding subroutine 10/1100 records all bids for subtask execution in the sublevel processor tables 10/201, and if the requested subtask is either core resident or present within a core buffer 10/206, 10/210, or 10/214, the subroutine 10/1100 bids for execution of the task level to which the subtask is assigned. If the subtask is not core resident and is not found within a core buffer, the subroutine 10/1100 requests execution of the task level of a DISCAN program (FIG. 10B) and does not request execution of the task level to which the subtask is assigned.

The DISCAN program (FIG. 10B) is an independent program that is assigned to a high priority task level within the executive scheduler 10/202. The DISCAN program searches for available core buffers into which disk-resident subtasks may be placed. Whenever a disk-resident subtask is loaded into a core buffer, the DISCAN program requests execution of the task level to which the disk-resident subtask is assigned, and thus initiates execution of the subtask. The DISCAN program also transfers subtasks between disk and core storage at the request of the subtask read and write subroutines 10/2100 which are discussed in the following paragraph.

Since a relatively considerable time may elapse between a request for the execution of a disk-resident subtask and the actual execution of that subtask, a special group of subtask read and write subroutines 10/2100 are provided which can suspend a calling program or subtask until a requested subtask transfer between disk and core storage has been carried out. The subroutines 10/2100 usually add the calling subtask or program to the suspended subtask linkage and request that a transfer be carried out by the DISCAN program (FIG. 10B). When the transfer has been carried out, the DISCAN program bids to remove the calling program or subtask from suspension. When a subtask is transferred from disk to core storage at the request of the read and write subroutines 10/2100, the subtask is usually not executed but is simply placed in a core buffer. One of the subroutines 10/2100 makes it possible for a first subtask to reserve a core buffer for the exclusive use of a second subtask. This subroutine facilitates the transfer of temporary data values between two subtasks by allowing the higher addresses in a core buffer to be used as a temporary memory. Another of the subroutines 10/2100 allows a first subtask to be called essentially as a subroutine of a second subtask with program control returning to the second subtask after the first has run to completion. This subroutine allows the second subtask to be executed at the priority level of the first subtask.

There is no difference between the format of a disk-resident program subtask and that of a core-resident program subtask. In both cases, the subtasks transfer program control to a basic subtask exit program 10/1300 when the subtasks have run to completion. The program 10/1300 checks to see if the subtask is disk-resident. If the subtask is disk-resident, the program 10/1300 releases the core buffer in which the subtask resides and returns program control to the basic task program 10/1200. If the subtask is not disk-resident, the program 10/1300 returns program control to the basic task program 10/1200 directly. If the first subtask is one that has been called as a subroutine of a second subtask, the first subtask returns program control to the basic subtask exit program 10/1300. The program 10/1300 releases the core buffer occupied by the first subtask, if necessary, and transfers program control back to the second subtask.

A data file subtask which contains data values may be called into a core buffer by one of the subroutines 10/2100. After the data values have served their function, it is necessary to release the core buffer within which the data file subtask resided. This is done by a call to a buffer release subroutine 10/2500.

A variety of subroutines 10/222 are provided to facilitate the creation of subtasks within the system and also to facilitate the removal of subtasks from the system. Subtask load and unload subroutines are provided whereby data defining a subtask may be fed into or deleted from the sublevel processor tables 10/201. Subtask enable and disable subroutines allow a subtask to be placed in an active state or to be removed from an active state without the subtask being removed completely from the system. An initialization subroutine allows the entire system to be initialized so that the system may be started up with no programs or subroutines in operation.

C. THE DISCAN PROGRAM

During system operations, the DISCAN program (FIG. 10B) transfers disk-resident subtasks between permanent disk sector storage locations and temporary core buffer storage locations as required. The DISCAN program is not called directly by subtasks or programs but is placed in operation whenever it is needed by subroutines and programs within the sublevel processor program 10/200. The DISCAN program is assigned to a relatively high priority task level within the executive scheduler 10/202 (see FIG. 2/4B) and is placed in operation whenever a bid for execution of the DISCAN task level is lodged with the executive scheduler 10/202.

In FIG. 10A, three groups of subroutines 10/1100, 10/2100, and 10/2500 and one program 10/1300 are shown connected to the DISCAN program. Any one of these subroutines or the program on occasion places bids with the executive scheduler 10/202 for execution of the DISCAN program. While FIG. 10A shows the subroutines and the program connected directly to the DISCAN program, in the actual system the DISCAN program is connected only to the executive scheduler 10/202 and is placed in operation by bids for execution of the DISCAN task level.

The SUBBID subroutine 10/1100 bids for execution of the DISCAN program whenever the subroutine 10/1100 processes a request to bid a disk-resident subtask that cannot be found in any of an array of core buffers 10/206, 10/210 and 10/214 in FIG. 10. The subroutine 10/1100 records the bid in the appropriate sublevel processor table 10/201 (FIG. 10A) and then places a bid with the executive scheduler 10/202 for execution of the DISCAN task level rather than the task level to which the requested subtask is assigned. In response to a call from the SUBBID subroutine 10/1100, the DISCAN program loads the requested subtask into a core buffer, records the fact that the subtask is core-resident in the sublevel processor tables 10/201, and then places with the executive scheduler 10/202 a bid for execution of the task level to which the subtask is assigned. In this manner, the SUBBID subroutine 10/1100 and the DISCAN program allow both core- and disk-resident subtasks to be bid in exactly the same manner. Hence, a calling program or subtask does not have to know whether a requested subtask is core- or disk-resident.

The subtask read and write subroutines 10/2100 also bid for execution of the DISCAN program. The subroutines 10/2100 enable one subtask to suspend itself while another disk-resident subtask is moved into or out of core. In response to a call from the subtask read and write subroutines 10/2100, the DISCAN program moves the requested subtask and then removes the calling subtask from suspension.

Often it is impossible to load a subtask into a core buffer because the particular buffer (or buffers) into which the subtask is to be loaded contains some other subtask and is therefore busy or occupied. When this happens, the DISCAN program gives up program control and waits until the desired core buffer is released or becomes free. It is necessary to provide some means for calling the DISCAN program back into operation whenever a core buffer is released so that a check can be made to see if any subtasks are waiting to use the newly freed buffer. Both the basic subtask exit program 10/1300 and the buffer release subroutine 10/2500 place a bid for execution of the DISCAN program whenever they release a core buffer so that this check can be made. The DISCAN program thus checks periodically to see if any subtasks are awaiting the use of any buffer which is released.

Referring now to FIG. 10B, when the executive scheduler 10/202 calls for execution of the DISCAN program, program control passes to a DISCAN routine 10/221. The routine 10/221 scans the sublevel processor tables 10/201 (FIG. 10A) looking for subtasks which may be transferred between disk sectors and core buffers. If the DISCAN routine 10/221 finds an empty core buffer and also finds a disk-resident subtask with which to fill the core buffer, the DISCAN routine calls upon a READDISK subroutine 10/222 to load the subtask into the empty buffer. If the DISCAN routine 10/221 finds a subtask in a core buffer that is to be written into a disk sector, the routine 10/221 calls upon a WRITDISK routine 10/224 to perform the transfer. After either the READDISK routine 10/222 or the WRITDISK routine 10/224 has carried out a transfer, program control is passed to a CKSTUS routine 10/226. The CKSTUS routine 10/226 updates the sublevel processor tables to reflect the change in the system configuration caused by the transfer and then bids for execution of the subtasks which are involved in the transfer and which are awaiting execution or which are in suspension. Program control then returns to the beginning of the DISCAN routine 10/221, and the search for additional subtask transfers begins again. When all of the subtask transfers which can possibly be carried out have been completed, the DISCAN routine 10/221 transfers program control back to the executive scheduler 10/202.

D. SUBLEVEL PROCESSOR TABLES

Within the structure of the sublevel processor program 10/200, the status of all subtasks and core buffers is maintained in tables. Each table is called a task, group, subtask or buffer table depending upon how it is indexed. In the discussion which follows, an "entry" is a sixteen bit core storage location that is part of a table.

Task tables (FIG. 10C) contain one entry for each executive task level, or sixteen entries in all. The address of the entry for a particular task level is found by adding the task level number (the first four bits of a subtask number—see FIG. 10I) to the starting address of the task table.

Group tables (FIG. 10D) contain one entry for each group of sixteen consecutive subtask numbers. The address of the entry in a group table for a particular subtask is found by obtaining a group table index value for the task level to which the subtask is assigned from the task table TSKTAB and by adding to this index value the starting address of the group table plus the group number of the subtask (the group number bits of the subtask number—see FIG. 10I). Most group tables contain sixteen bits in each table entry, and each bit corresponds to one subtask within the group of sixteen subtasks. Each bit position 0 to 15 corresponds to the subtask within the group that has a bit number (see FIG. 10I) equal to the position number of the bit (see FIG. 2/3A). The CRPTAB table is different and contains two 8-bit binary numbers in each table entry. The two 8-bit binary numbers are relevant to the entire group of sixteen subtasks taken as a unit.

Subtask tables (FIG. 10E) contain one entry for each subtask within the system. The address of the entry corresponding to a particular subtask is found by adding the starting address of the table to the sublevel number of the subtask (see FIG. 10I) and by adding to this sum the index number found in the PNTTAB task table entry for the task level to which the subtask is assigned.

Buffer tables (FIG. 10F) include one entry for each core-resident buffer. The address of the entry for a particular buffer is found by adding the starting address of the buffer table to a buffer index number or core-resident index number of the particular buffer.

The CSRTAB task table (FIG. 10C) records what subtask is currently assigned for running within each of the sixteen task levels. Each entry within this table contains a sublevel number. If the activated subtask is a disk-resident subtask, the sublevel number is negative. The symbolic name for the starting address of this table is "CSR".

The TSKTAB task table contains group index numbers which enable programs to gain access to the group tables in FIG. 10D. Each entry contains a group index value which, when added to the starting address of a group table, gives the address at which group table entries for the subtasks assigned to a particular task level begin. If no subtasks are assigned to a particular task level, the table entry for that task is set equal to $-1$ or "$FFFF_{16}$". The symbolic name for the starting address of this table is "TASKTBL".

The GRPTAB task table indicates how many subtasks reside within each task level. Each entry in this table contains a number equal to one less than the number of subtask groups (sixteen subtasks to a group) which are assigned to a single task level. The symbolic name for the starting address of this table is "GRPTBL".

The PNTTAB task table contains subtask index numbers which provide access to the subtask tables. Each table entry contains a subtask index number which, when added to the starting address of a subtask table, gives the address at which subtask table entries for subtasks assigned to a particular task level begin. The symbolic name for the starting address of this table is "POINTADR".

With the exception of the table CRPTAB, each entry in a group table (FIG. 10D) contains sixteen bits of information, one for each of sixteen subtasks. The data bit for a particular subtask may be tested or altered within a group table by: obtaining from the TSKTAB table the entry for the task level to which the subtask is assigned; obtaining from the group table the entry whose address is the sum of the group table starting address, the TSKTAB table entry, and the subtask group number; obtaining an appropriate 16-bit mask containing a "1" bit in the bit position designated by the subtask bit number and "0" bits in all other bit positions (see FIG. 11E - BITTBL); and using the bit mask to test or alter a bit within the group table entry. These group tables may properly be called subtask bit tables because they contain one bit of information for each subtask within the system.

The ACTTAB table accepts outputs from the program 10/1100 and from other sublevel processor programs and records which subtasks have been bid but not executed and which subtasks are to be removed from time delay or suspension. If the bit for a particular subtask is "1", that subtask is either bidding for execution or else is bidding for removal from the time delay and suspended subtask linkages. The symbolic name for the starting address of this table is "ACTIVE".

The RSDTAB table indicates which subtasks are core-resident. If the bit for a particular subtask is "1", it means that the corresponding subtask is currently stored in core—either the subtask is permanently core-resident, or else the subtask is temporarily resident within one of the core buffers. If the bit for a particular subtask is "0", that subtask is disk-resident and is not currently within a core buffer. The symbolic name for the starting address of this table is "RSDTBL".

The DSKTAB group table denotes which subtasks are stored on disk. If the bit for a particular subtask is "1", that subtask resides on a disk sector and must be loaded into a core buffer before it may be executed. The symbolic name for the starting address of this table is "DSKTBL".

The TIMTAB group table records which subtasks are either in time delay or in suspension. If the bit for a subtask is "1", execution of the subtask has been halted, and the pool of the subtask is linked into either the time delay linkage or the suspend linkage within the system. The symbolic name for the starting address of this table is "TIMTBL".

The TRCTAB group table indicates which subtasks are currently using a system trace routine. If the bit for a subtask is "1", the trace routine is called into play when the subtask is bid. The symbolic name for the starting address of this table is "TRACETBL". Trace routines are used primarily to aid in debugging software. A complete discussion of trace routines goes beyond the scope of the present invention.

The CRPTAB group table is unique in that each entry contains two numbers which relate to a group of sixteen subtasks. This table makes it possible for buffers or groups of buffers to be reserved for specific groups of subtasks. This table also allows subtasks of differing lengths to be assigned to core buffers of differing lengths. Each entry defines the range of core buffers within which any of the group of sixteen subtasks may be stored. It has been mentioned elsewhere that the core-resident buffers are assigned numbered consecutive buffer index numbers starting with zero. Each entry in the CRPTAB group table contains two such buffer index numbers—a minimum buffer index number stored in bit locations 0 to 7, and a maximum buffer index number stored in bit locations 8 to F. Subtasks within the group corresponding to each table entry may be loaded only into these buffers whose buffer index numbers fall within the range delimited by the two specified buffer index numbers. When a disk-resident subtask is to be transferred into a core buffer, the search for an empty buffer into which the subtask may be placed is delimited by these index numbers. The symbolic name for the starting address of this table is "CORPTR".

The STRTAB subtask table (FIG. 10E) gives the address of each subtask within the system. Each entry is either a subtask core memory starting address or else a disk sector number where a subtask resides. The symbolic name for the starting address of this table is "STARTADR".

The LGHTAB place specifies the length of all disk-resident subtasks. Each entry is either the subtask length or else zero, depending upon whether the subtask is disk- or core-resident. In addition to specifying the subtask length, this table is also used to specify the index number of the buffer within which a subtask is presently stored. The subtask length is stored in bit positions $A_{16}$ to $O_{16}$, and the buffer index number is stored in bit positions $F_{16}$ to $B_{16}$. The symbolic name for the starting address of this table is "LENGTH".

The CORTAB buffer table (FIG. 10F) contains the starting address of each core buffer. The symbolic name for the table starting address is "CORLOC".

The BIDTAB table indicates whether a buffer is occupied or is free and is also used to reserve a buffer for a particular subtask. If an entry in this table is zero, the corresponding buffer is free; if an entry is $-1$ ($FFFF_{16}$), the buffer is busy; if an entry is a subtask number, the buffer is reserved for the subtask having that subtask number. The symbolic name for the start of this table is "RESBID".

The REDTAB buffer table contains either zero or else the subtask number of a subtask which is to be read into or out of core memory by the DISCAN program. Bit 11 within each table entry is called the write bit. If bit 11 is set to "1", the subtask is to be transferred from a core buffer into disk or drum storage. If bit 11 is zero, the specified subtask is to be transferred from disk storage to a core buffer. The symbolic name for the starting address of this table is "RESREAD".

The INCTAB buffer table tells what subtask is present within each buffer. If an entry is zero, the buffer is free. Any other entry is the subtask number of a subtask that is stored in that buffer. The symbolic name for the starting address of this table is "INCORE".

The LOWTAB and HIGHTAB buffer tables determine what subtask groups are permitted to enter which of the core buffers when a core buffer is found to be empty. Each entry in these tables contains a group index number that identifies a particular group of sixteen subtasks. An entry for a given group of subtasks may be used in addressing group table entries containing data bits pertinent to the sixteen subtasks. When a particular buffer is found to be empty, the entries in the LOWTAB and HIGHTAB tables are used to delimit the scope of a search through the group tables for subtasks bidding to be loaded into the empty buffer. The LOWTAB and HIGHTAB tables thus determine which groups of subtasks are permitted to be placed into each of the system core buffers. The symbolic names for the starting addresses of these tables are, respectively, "LOWMTX" and "HIGHMTX".

Executive scheduler tables frequently used by the sublevel processor are shown in FIG. 10G. Within the executive scheduler 10/202 (FIG. 10A) are located two sets of tables containing one entry for each task level within the system. The first is the previously identified Z:ORIG table (FIG. 10G). As already noted, each entry in the Z:ORIG table is the starting address of a task header and a task data pool 10/220. The address of the table entry for a particular task is found by adding the task level number to the starting address of the table Z:ORIG. A typical task header 10/220 is also shown in FIG. 10G. Each header contains data which is loaded into the system registers at the time when the corresponding task is given program control. The first location in the task header is loaded into the system program counter and is the address of the location immediately preceding that containing the first executable command of the task level. For example, in FIG. 10G, the first location in the task header contains the address of a location SPEXIT, the entry to the basic task program 10/1200 (FIG. 10A). When the scheduler calls for execution of this task, program control is transferred to the basic task program 10/1200.

The second previously noted table within the scheduler is called the Z:START table (FIG. 10G). Each entry in this table is the starting address of a register storage pool for a task. When execution of a task is interrupted before completion, the system registers are loaded into the task register storage pool. When execution of the task is to be restarted, the system registers are reloaded from the task register storage pool. Execution of the task then proceeds from the point of interruption.

E. THE ESTABLISHMENT OF SUBTASKS

Before the sublevel processor 10/200 is created, a determination is made as to how many subtasks of each variety are to be permitted within each system task level. When the program 10/200 is created, sublevel processor tables of just the right length are created to hold all the necessary data for the number of sublevels that are specified.

As has been mentioned, the sublevel processor program, and also the data file processing program (FIG. 12), process bids for the execution of different types of subtasks in different ways. A bid for the execution of a program subtask is processed by a transfer of program control to the program itself. A bid for the execution of a control chain subtask is processed by a transfer of program control to the control chain processor program. A bid for the execution of a data storage subtask is considered an error by the sublevel processing program, and a bid for the execution of a subtask linkage of monitor data files is treated in a special way by the data file processing program, as is explained in Section 12.

In order for the sublevel processor program and the data file processor program to operate in this way, the two programs are given the ability to identify three different types of subtasks—program subtasks, control chain subtasks, and data subtasks. Data subtasks include both disk-resident data sets which are assigned subtask numbers so that the data sets may be moved between disk and core storage by the subtask processor program (FIG. 10), and also subtask linkages of monitor data files which are processed by the data file processor program (FIG. 12).

Figure 10H:
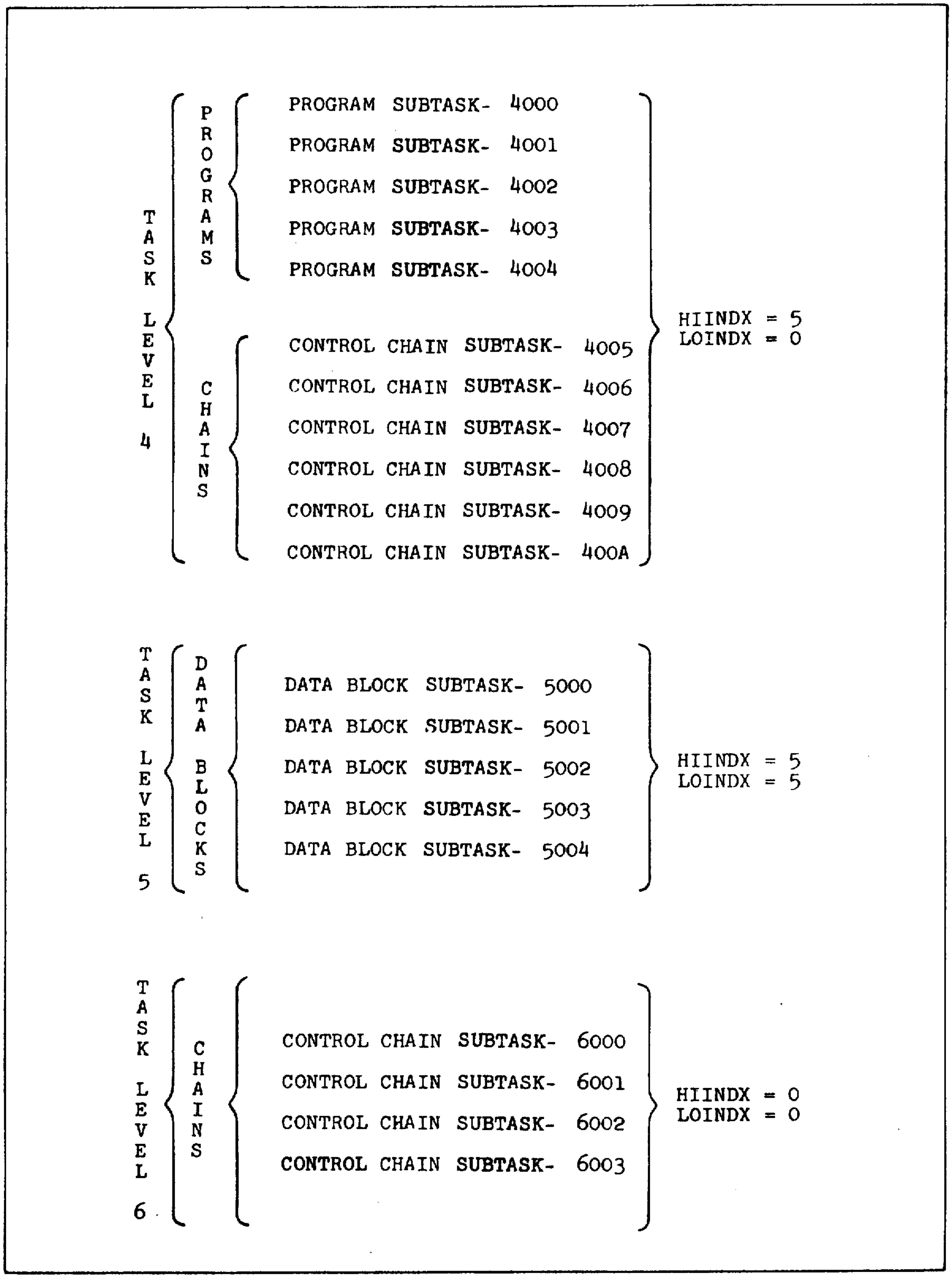
FIG. 10H illustrates how task levels may be broken into sublevels which are assigned to different types of subtasks.
Figure 10I:
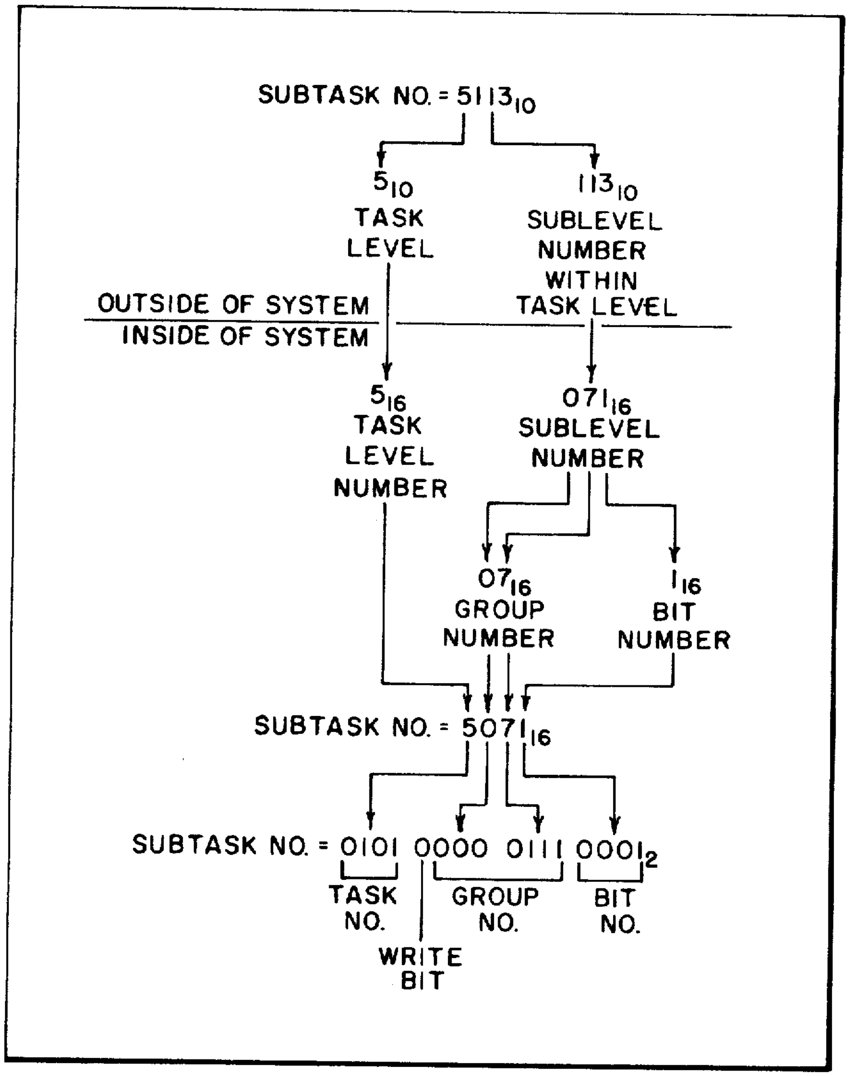
FIG. 10I illustrates the composition of task numbers, sublevel numbers, and subtask numbers both within and without the operating computer system.

Within each task level, each subtask is assigned a unique sublevel number beginning with the number zero. When a sublevel number is combined with the task number of the task to which it is assigned, as is illustrated in FIG. 10I, a unique subtask number results. Any desired number of program subtasks, control chain subtasks, and data subtasks may exist within each system task level that is assigned either to the sublevel processor program 10/200 (FIG. 10A) or to the data file processor program (FIG. 12). In every case, data subtasks are assigned the lowest continuous group of sequential sublevel numbers beginning with zero and continuing through, for example, M. Program subtasks are assigned the next lowest continuous group of sequential sublevel numbers beginning with N and continuing on through, for example R. Control chains are assigned the highest continuous group of sequential sublevel numbers beginning with R.

A value LOINDX and another value HIINDX for each task level enables the sublevel processor program and the data file processor program to quickly determine whether a subtask is a program, control chain, or data subtask. The value LOINDX equals the number of data subtasks which exist within a task level, and the value HIINDX equals the total number of data and program subtasks which exist within the task level (see, for example, FIG. 10H). If the sublevel number of a subtask is equal to or greater than the value HIINDX for the task level to which the subtask is assigned, the subtask is a control chain subtask. If the sublevel number of a subtask is greater than or equal to LOINDX but less than HIINDX for the task level to which the subtask is assigned, the subtask is a program. If the sublevel number of a subtask is less than the value LOINDX, the subtask is a data subtask—a data set in the case of the sublevel processor, or a subtask linkage of monitor data files in the case of the data file processor. In the preferred embodiment of the present invention, both the sublevel processor and the data file processor programs are able to carry out the above computations.

With reference to 10/220 in FIG. 10G, the values HIINDX and LOINDX for each task level are stored in the two locations just ahead of the task header storage area assigned to the task level. The address of these values if found by subtracting 1 or 2 from the task header addresses which are stored in the Z:ORIG executive scheduler table (FIG. 10G).

F. THE TASK DATA POOL

Referring to FIG. 10G, a typical task header includes two locations preceding the task header proper for storage of the values LOINDX and HIINDX. Following the task header and beginning in the eighth location past the task header is a storage area called the task data pool. This data pool may be used by a subtask for the storage of intermediate results. In case of an interruption by a sublevel assigned to a higher priority task level, values stored in this data pool are preserved.

When the CHKBID subroutine 10/1400 returns a sublevel number to the basic task program 10/1200, a first system register points to the address of the HIINDX value for the task and a second system register points to the task data pool. The first register is used by those program steps of the basic task program 10/1200 which determine what type of subtask has been found. If the subtask is assigned to a control chain, then the second register is still allowed to point to the task data pool when an entry is made to the control chain processor 10/144. The algorithm subroutines which interpret the control chains are thus enabled to gain direct access to the task data pool by using the second index register as an address base. If program execution is interrupted while an algorithm subroutine is halfway through a computation, the temporary values created by the algorithm subroutine are left safely stored in the task data pool and are not destroyed even if some other, high priority task level control chain subtask calls upon the same algorithm subroutine during the program execution interruption. Since subtasks assigned to the same task level are not permitted to interrupt one another, only one data pool is required for each task level in the system. Furthermore, these data pools need only be long enough to contain the number of temporary values required by the most complex single subtask in the system.

11. THE LOGIC INITIATOR PROGRAM

The invention is arranged so that any type of logical variable—whether a contact closure input, a contact closure output, or an internal computer system process or global logical variable—may be used to trigger the printing of an alarm message or to trigger the execution of any number of subtasks. The program which keeps track of the status of logical variables and of the various alarm and subroutine trigger connnections is called the logic initiator program 11053 and is shown in block diagram form in FIG. 11A.

The status of all logical variables—contact closure input logical variables, contact closure output logical variables, and internal computer system logical variables—is recorded in digital scan bit tables 11056 within the logic initiator program 11053. The state of a system logical variable can be altered either by an alter bit subroutine 11060 which may be called upon by any computer system program or subtask, or by a digital scan program 11057 which periodically updates the contact closure input data bits within the tables 11056. Whenever a table entry is altered, an alarm and trigger check routine 11058 checks alarm and trigger tables 11059 for alarm message printout requests and subtask bid requests. Whenever a table entry which corresponds to a contact closure output bit is altered, the state of the corresponding contact closure output 11066 is automatically altered to match. In this manner, process contact closings and openings and the like are enabled to trigger subtasks within the computer system, and subtasks are similarly enabled to open and to close contacts in the process environment.

In FIG. 11A, three computer system programs are shown which transfer data from external contacts 11065 in the control system to an array of digital scan contact closure input bit tables 11056 within the logic initiator program 11053. A multiplexed contact closure input handler program 11062 transfers the status of process monitoring contacts (open or closed) through a multiplexed input channel and into the bit tables 11056. A non-multiplexed contact closure input handler program 11063 transfers data between computer system terminals connected directly to contacts in the process environment and the bit tables 11056. A sequence of events program 11064 is placed in operation by an interrupt input gnerated by the opening or the closing of a process monitoring contact to cause the transfer of data between the contacts and the bit tables 11056. The three programs 11062, 11063, and 11064 are conventional computer programs and are not described in detail in the present application. In the preferred embodiment of the invention, the handlers 11062 and 11063 are part of the executive package of the computer system. The sequence of events program 11064 is a routine which maintains a record of the order in which and the times at which a select group of contacts open or close. The routine 11064 is again a conventional routine which is not described in detail in the present application.

A digital scan program 11057 periodically checks the digital scan bit tables 11056 to see if any of the contact closure input bits have changed their status. A group of subtask numbers within a single digital scan task level are assigned to the digital scan program 11057. Each of these subtasks may be bid periodically by the auxiliary synchronizer program 11052 or non-periodically by other system programs 11050. Bids for execution of digital scan subtasks are placed with the sublevel processor program 11051 and, more specifically, with the basic task program 10/200 within the sublevel processor program. When any of these subtasks is bid, program control is transferred to a common entry point in the digital scan program 11057. Tables within the digital scan program associate each digital scan subtask number with one or more groups of 16 bits within the digital scan bit tables 11056.

When a particular digital scan subtask is placed in operation, the digital scan program 11057 checks the digital scan bit tables to see if the corresponding groups of 16 bits have changed their status. If one or more of the bits in a group of 16 bits has changed its status, the digital scan program 11057 calls upon an alarm and trigger check routine 11058 to determine whether the bits which have changed are bits which are to trigger the operation of one or more system subtasks or which are to initiate the printout of an alarm message. If one or more subtask numbers are linked to a bit which has changed, the alarm and trigger check routine 11058 calls upon the SUBBID subroutine 10/1100 within the sublevel processor 11051 to record the necessary subtask bids. If an alarm message is to be printed out, the alarm and trigger check subroutine 11058 supplies to a message writer program 11067 the address of a file which contains the alarm message which is to be printed out. The message writer program 11067 (see FIG. 14) then utilizes the file system subroutines 11069 (see FIG. 6) to obtain the alarm message data from the file and to transfer this data to an alarm message printer 11068.

At any time, any program within the system may call upon a check bit subroutine 11055 to determine the status of a bit within the bit tables 11056 corresponding to any system logical variable. The check bit subroutine determines whether the bit is set or cleared and immediately returns program control to the calling program.

Any system program may alter the status of a system logical variable as recorded within the tables 11056 by calling upon a group of alter bit subroutines 11060. The subroutines 11060 not only alter the bits within the table 11056 but additionally call upon the alarm and trigger check routine 11058 to place any subtask bids or to initiate the printout of any alarm messages which are necessitated by an alteration in the status of a logical bit.

The trigger connections between the bits within the bit tables 11056 and the subtask numbers and alarm file address are stored in the alarm and trigger tables 11059. These connections are established by an array of alarm and trigger connect and delete subroutines 11054. When called upon, these subroutines place an entry into the tables 11059 which cause a designated subtask number to be bid each time a particular bit within the tables 11056 changes its state. These subroutines 11054 may also place the address of an alarm message file into the tables 11059 and link this address to a logical bit so that the file address and the status of the corresponding bit are supplied to the message writer 11067 whenever the bit changes its state. Other subroutines 11054 allow trigger connnections of this type to be deleted from the tables 11059 and thereby allow the triggering arrangements within the logical initiator to be altered or changed at any time, even while the computer system is in operation and even long after the computer system is placed into service.

A. DIGITAL SCAN BIT TABLES

FIGS. 11C and 11C (Cont.) illustrate the digital scan bit tables which exist within the preferred embodiment of the present invention. These two figures are joined as is illustrated in FIG. 11D. With reference to FIG. 11C, the various system routines which transfer data bits from the process environment into the system (elements 11062, 11063, and 11064 in FIG. 11A) transfer groups of 16 or fewer data bits directly into a contact closure input (C.C.I.) hardware image table. Each group of 16 or fewer bits within this table is stored in a single core location and is assigned a hardware image table group number, as is illustrated in FIG. 11C.

The tables RGSTRT and NUMREG shown in FIG. 11C are used by the digital scan program 11057 (FIG. 11A) to determine which groups of bits within the hardware image table are assigned to which digital scan program subtask level. With reference to FIG. 10I, each subtask number includes a task number and a sublevel number. The subtask numbers of all subtasks assigned to the digital scan program typically all contain the same task number. When a bid is placed for execution of such a digital scan subtask, the system executive transfers program control through the sublevel processor program to the digital scan program.

One entry in each of the tables RGSTRT and NUMREG is allotted to each permissable digital scan subtask sublevel number between zero and, for example, P. Each entry in the table RGSTRT contains the group number of a first group of bits in the C.C.I. hardware image table LIMGTB which group of bits is to be scanned when a bid is placed for execution of the corresponding digital scan subtask. The corresponding entry in the table NUMREG then tells how many groups of bits within the table LIMGTB are to be scanned when that same subtask is bid. Hence, any number of 16-bit groups of bits may be associated with each digital scan subtask number. In this manner, the entries within the hardware image table are broken up into any desired number of subtasks each of which contains any desired number of 16-bit groups. The bits assigned to each digital scan subtask may be scanned at any desired rate simply by establishing the necessary periodic subtask bid within the system auxiliary synchronizer program.

Programs within the system do not customarily access the C.C.I. hardware image table (FIG. 11C) directly. Programs within the system customarily access a bit storage table LIUSER which appears at the left side of FIG. 11C (Cont.). The table LIUSER contains groups of 16 bits stored in bit registers each of which registers occupies a single core storage location.

The table LIUSER is divided into two halves—an active half which includes registers zero through ACTEST, and a passive half which includes the remaining registers within the table LIUSER. The difference between the two halves of the table is that all the bits in the active half of the table may trigger subtasks into operation and may also trigger the printout of alarm messages, whereas all the bits within the passive half of the register may not be used as triggers for subtasks or for alarm messages. Three different types of logical bits exist within each half of the table. Contact closure input bits (C.C.I.) exist within the table LIUSER corresponding to each bit within the C.C.I. hardware image table shown in FIG. 10C. Contact closure output bits (C.C.O.) also exists within this table and correspond to the actual hardware contact closure outputs of the system. Logical bits (logical system variables) which do not correspond to contact closure inputs or contact closure outputs are also included. Hence, all system logical variables are represented by bits in the table LIUSER.

The relationship between the bits in the C.C.I. hardware image table LIMGTB (FIG. 11C) and the bits within the contact closure input portions of the bit storage table LIUSER (FIG. 11C(Cont.)) is established by a table INVERT which is shown in the right-hand portion of FIG. 11C. The table INVERT includes one entry for each group within the C.C.I. hardware image table. Each entry in the table INVERT relates a corresponding group of bits in the C.C.I. hardware image table to a register of bits within the bit storage table LIUSER. Each entry in the table INVERT contains a register number, and each entry thus relates the corresponding entry in the C.C.I. hardware image table to a set of bits within a specific register of the bit storage table LIUSER.

Additional data pertaining to active bits only is stored in bit tables which are shown in the remainder of FIG. 11C(Cont.). The first two bit tables LISCNR and LIENTD contain entries only for "M" registers of bits all of which are contact closure input bits (see FIG. 11C(Cont.)). Each bit entry in the table LISCNR indicates whether the corresponding active C.C.I. bit is currently being scanned by the digital scan program or whether that bit has been scan removed from scanning by the system operator. Each bit in the table LIENTD is set to "1" to indicate that the corresponding active C.C.I. bit has been entered not by the digital scan program but by one of the alter bit subroutines 11060 (FIG. 11A).

The remaining four tables in FIG. 11C include bit entries corresponding to each active bit within the bit storage table. A table LILMTR indicates when a bit is removed from alarm scanning (limit check removed) so as not to initiate the printout of an alarm message. A table LIALMT indicates whether the normal status of each bit is zero or one. A table LIALRM indicates when a bit is in an acknowledged alarm state, and a table TRGTBL indicates whether each active bit is currently being used to trigger the execution of one or more subtasks.

B. ALARM AND TRIGGER TABLES

For each logical bit within the active half of the bit storage table LIUSER (FIG. 11C(Cont.)), there exists a complete logical word entry within a logical word table LCWORD (FIG. 11E). The logical word entry for each bit is the connecting linkage between the bit and any subtasks and/or alarm message which the bit is to trigger. Each group of sixteen 16-bit entries in the logical word table corresponds to a single 16-bit register of bits within the bit storage table LIUSER (FIG. 11C(Cont.)).

The sign bit position (bit position 15) of each logical word table entry indicates the status (set or cleared; 1 or 0) of the corresponding logical bit. Usually, the sign bit of each logical word table entry agrees with the status of the logical bit as recorded in the bit storage table LIUSER.

The possible entries in the logical word table are shown in FIG 11G. If there is no subtask trigger or alarm message associated with a bit, an entry is identically zero (except, of course, for the sign bit). If there is one subtask trigger but no alarm message associated with a bit, the entry appears as is illustrated at the top of FIG. 11G. The third bit from the left of the logical word table entry is a "1" bit, and the thirteen right-most bits comprise the task number and the sublevel number of the subtask which is to be bid. If more than one subtask is to be triggered, the relative address within a trigger and alarm table FILTBL (FIG. 11E) of the first subtask number which is to be triggered is stored as the right-most 13 bits within the otherwise all zero logical word entry. If an alarm message is to be printed out and there are no subtasks to be triggered, the fourteenth bit position within the logical word entry (the alarm bit position) is equal to one, and bit positions zero to 12 contain the relative address within the table FILTBL of a location containing a directory pointer to the system directory entry for a file which contains the alarm message. If both an alarm message and one or more subtask triggers are linked to a logical bit, both the alarm bit position and the trigger bit position (bit position 13) contain "1" data bits, and again the right-most 13 bits within the logical word table entry contain a pointer to a series of entries within the trigger and alarm table FILTBL the first of which entries contains a directory pointer and the remainder of which entries contain subtask numbers.

Any number of subtasks may be triggered into operation by a change in the status of a single logical bit. The lower half of FIG. 11H illustrates the format of subtask entries in the table FILTBL. Each entry contains the task number and the sublevel number of a subtask which is to be triggered. The 5th bit from the left end of each entry is a continuation bit. This continuation bit is set equal to "1" if more subtask numbers follow and is set equal to "0" if the subtask number is the last subtask number in a given list of subtask numbers. In the case of a FILTBL table entry which is a directory pointer, the format shown in the upper half of FIG. 11H is followed. As is explained in section 6 of this specification, a directory pointer comprises an 8-bit disk sector index number and an 8-bit relative address of a directory file within the disk sector. When an alarm message is to be printed out, the message writer program 11067 (FIG. 11A) calls upon the read file subroutine RDFIL, supplying this directory pointer as an argument, to retrieve a file containing the alarm message data and to transfer this file into a core buffer. The message writer subroutine then transfers the alarm message data from this buffer to an appropriate alarm message printing output device.

The two tables shown in the lower right-hand corner of FIG. 11E are tables which are used to assist in accessing individual bits within the logic initiator bit tables. Entries in a bit mask table called BITTBL are used to mask individual bits of data out of 16 bit arrays of data bits. A table LOGBAS contains the starting address of the table BITTBL and the starting address of the bit storage register LIUSER (FIG. 11C(Cont.)). If a bit register number is stored in the system extended accumulator and if the bit number (zero to 15) of a particular bit within the register is stored in the system accumulator, the contents of the table LOGBAS may be added by double precision arithmetic into the accumulator and into the extended accumulator so as to leave the actual core address of the desired LIUSER table register stored in the system extended accumulator and the address of the proper bit mask for isolating the desired data bit stored in the system accumulator.

Logical global variables are each assigned an entry within the table LCWORD (FIG. 11E). When the system is first established, a location IGBREG contains the core address of the first logical word table entry that is available to logical global variables. As logical global variables are defined and established within the system, the core address in the location IGBREG is incremented. The core address of the last location within the table that is available for assignment to a logical global variable is stored in a location LGBREG (see FIG. 11E). A further discussion of logical global variables is presented in section 5 of this specification.

C. ADDRESSING LOGICAL VARIABLES

Within the present system, any logical variable may be addressed in either of two ways, both of which are illustrated in FIG. 11F. Any logical variable within the system for which a bit exists within the bit storage table LIUSER (FIG. 11C(Cont.)) may be addressed as is shown in the lower half of FIG. 11F. Bit 15 is set equal to "1" or negative to indicate that the address is a logical bit address. Bits 4 to 14 contain the register number of the register within the bit storage table LIUSER which contains the desired bit. Bit positions 3 to zero contain the bit position number (zero to 15) of the desired bit. In the case of an active logical variable, a logical word address may be used as is shown in the upper half of FIG. 11F. Bit position 15 is set equal to "0" or positive to indicate that the address is a logical word address. Bit positions 14 to zero contain the relative address within the logical word table LCWORD of the entry for the active logical variable. Either one of these addressing techniques is accepted by the routines 11055 and 11060 shown in FIG. 11A. Hence, either or both addressing schemes may be used by any other program in the system that wishes to determine the value of or to alter the value of a logical variable of any kind. For an active logical variable, the logical bit and logical word addresses are identical except for the sign bit position.

D. THE DIGITAL SCAN PROGRAM AND THE ALARM AND TRIGGER CHECK ROUTINE

The digital scan program is shown in block diagram form in FIG. 11B and in FIG. 11B(Cont.). The alarm and trigger check routine is shown in FIG. 11B(Cont.). While the alarm and trigger check routine normally operates as a portion of the digital scan program, the alarm and trigger check routine has its own separate entry and exit points 11016 and 11022 or 11026 when it is called upon by the alter bit subroutines 11060 (FIG. 11A).

As has already been explained, the digital scan program periodically checks the status of contact closure input bits in response to subtask bids. Different subtasks are assigned to different groups of bits, and hence one group of bits may be scanned more often or less often than another group of bits. In the preferred embodiment of the invention, all digital scan subtasks are handled as program subtasks by the sublevel processor program, and all digital scan subtasks commence by a transfer of program control from the sublevel processor program to a common entry point 11001 in the digital scan program. Each time it is called upon to perform a scan, the digital scan program determines what subtask it is processing by checking the CSRTAB table (FIG. 10C) to determine the sublevel number of the subtask which is running. Alternatively, the sublevel processor program may store in a system register the sublevel or subtask number of the subtask which is to be processed by the digital scan program when program control is transferred to the digital scan program. The latter procedure is used in the preferred embodiment of the invention.

Upon entry into the digital scan program, the sublevel number portion of the subtask number for the currently active subtask is extracted from the subtask number of the subtask (see FIG. 10I) and is used as an index to the tables RGSTRT and NUMREG shown in FIG. 11C (step 11001 in FIG. 11B). The relative address within the C.C.I. hardware image table of the first group of bits which are to be checked is retrieved from the table RGSTRT, and the number of groups which are to be checked is retrieved from the table NUMREG.

Program control then commences at step 11002 in FIG. 11B. The first group of contact closure input bits to be checked is retrieved from the C.C.I. hardware image table and is stored in a temporary location. The corresponding entry in the table INVERT (FIG. 11C) is retrieved and is used as an index to the register of bits in the table LIUSER (FIG. 11C(Cont.)) which relates to the group of bits just retrieved from the C.C.I. hardware image table. A test is now carried out to determine if the bits within the group are active or passive. The relative address of the bit register is compared to the relative address ACTEST (FIG. 11C (Cont.)). If the relative address of the bit register is greater than the value ACTEST, then the bit register lies in the passive C.C.I. portion of the table LIUSER, and this particular group of contact closure input bits are not active but passive (step 11003). A bit-by-bit comparison of the group of bits from the hardware image table with the register of bits from the table LIUSER is now carried out to see if any of the bits have altered since the last time this group of bits was scanned (step 11004). If any of the bits have altered, the register in table LIUSER is updated (step 11005). The location containing the address of the group of bits which are being checked in the C.C.I. hardware image table is then incremented (step 11006) and the number which represents the number of groups which remain to be checked is decremented. If the number of groups which remain to be checked is then zero (step 11007), then the digital scan has run to completion and program control is returned to the sublevel processor program. Otherwise, the next group of bits is checked by the steps beginning with step 11002.

Returning to step 11003, if the relative address of the bit register is smaller than the value ACTEST, then the bits in this register are active bits. Program control then commences at step 11008. A check of the entry in the table LISCNR (FIG. 11C(Cont.)) for this same register of bits is then carried out to see if any of the bits have been removed from scan (step 11008). If any of the bits have been removed from scan, then the past value of the scan removed bits is retrieved from the table LIUSER and is substituted into the hardware image of the same bits within the group.

At step 11009, a comparison of the status of the bits in the table LIUSER with the corresponding bits in the tables LIALMT and LIALRM is carried out to see if any of the bits are in the alarm state without any acknowledgment of that fact having been recorded in the table LIALRM. This can happen, for example, when a bit shifts into an alarm state but is unable to call for the printout of an alarm message due to an output printer being busy or due to the bit being limit-check removed.

Any such alarms are immediately processed by the message writer 11067 (FIG. 11A) unless the bits are limit-check removed; and if the alarms are successfully processed, the bits in the table LIALRM are adjusted accordingly. An explanation of how such alarms are processed is presented below.

The bit table entries from the hardware image table and from the bit storage register are then combined using an exclusive OR operation to create a multi-bit "change word" within which any bit which has changed its state is set equal to "1" (step 11010). If this word is all zero (step 11011), the bits have not changed their state and no further processing is required. In this case, program control returns to step 11006 as has already been described. If any bits have changed their state, the bit image table LIUSER is updated (step 11012) and the change word is checked out to determine which is the left-most bit that has changed its state (step 11013). Program control then continues in FIG. 11B(Cont.).

Beginning at step 11014 in FIG. 11B(Cont.), the logical word entry in the table LCWORD (FIG. 11E) for the bit which has changed its state is updated so that the sign bit of this word indicates the status of the bit. A check of the logical word is then carried out to see if any further action is required (step 11015.). If the bit is not to trigger a subtask and is not to initiate the printing of an alarm message, bit positions 14 to zero of the logical word contain zero, and program control commences at step 11023. A check is made to see if the last "1" bit in the change word has been checked out. If it has, program control returns to step 11006 in FIG. 11B as has been described. Otherwise, the next left-most "1" bit is retrieved (step 11024) and program control commences once again as step 11014.

Returning to step 11015, if bit positions 14 to zero of the logical word do not contain all zeros, then this particular bit is either supposed to trigger the printing of an alarm message or the execution of one or more subtasks. Program control continues at step 11016. Step 11016 is also the entry point for the alarm and trigger check routine 11058 (FIG. 11A) when the routine is called upon by one of the alter bit subroutines 11060 (FIG. 11A).

The entry for the bit which is being processed in the table LILMTR (FIG. 11C (Cont.)) is checked to determine whether or not this particular bit has been limit check removed (step 11016). If it has been limit check removed, then the alarm message printout steps are bypassed and program control commences with step 11022. Otherwise, program control continues with step 11017. A comparison of the present status of the bit with the bit entry in the table LIALMT (FIG. 11C (Cont.)) for the bit is made to see if the bit is now in its normal state. If the bid is in its normal state (as opposed to its alarm state), again the alarm message printout steps are bypassed. If the bit is not in its normal state, the alarm bit in bit position 14 (see FIG. 11G) of the logical word entry for this bit is checked to see if an alarm message actually exists for this bit (step 11018). If no alarm message exists for this bit, program control continues at step 11022. If an alarm message exists for this bit, the message writer is called upon to print out an alarm message (step 11019). Bit positions zero to 12 of the logical word for this bit contains the relative address within the trigger and alarm table FILTBL (FIG. 11E) of a directory pointer to an entry in the system directory for a file that contains the alarm message. All the message writer has to do is call upon the read file subroutine RDFIL using this directory pointer as an argument. The RDFIL subroutine finds the file containing the alarm message and places the file in a buffer where it is available to the message writer. The message is then transferred to an output device, if this is possible. In some cases, the message writer may either be busy or may not have room to handle an additional message. A check is therefore made at step 11020 to see if the message has been entered, If the message has been entered, then the alarm state bit in the table LIALRM (FIG. 11C (Cont.)) corresponding to the bit which is being checked is updated to acknowledge the alarm message having been printed out. If the message has not been entered, then the alarm state bit is not updated but serves as an indication that the alarm has not yet been acknowledged.

At step 11022, a check of the logical word (FIG. 11G) in the logical word table LCWORD (FIG. 11E) corresponding to the bit which is being checked is carried out to determine whether any subtasks are to be triggered by the change in the state of this bit. If not, program control continues at step 11023 as has been explained; or, in the case of a call from one of the alter bit subroutines 11060 (FIG. 11A), program control returns to the alter bit subroutine.

If one or more subtasks are to be triggered, program control continues at step 11025. FIG. 11G illustrates the various logical word table entries which indicate that one or more subtasks are to be triggered. If there is one subtask trigger and no alarm, then usually a trigger bit position 13 of the logical word table entry contains a "1" and bit positions 12 through zero contain the task level number and sublevel number of a subtask which is to be triggered (see the upper portion of FIG. 11G). A subtask number is created from this data by shifting the task level number from bit positions 12 through 9 to bit positions 15 through 12. The sublevel processor program ("SLP") is then called upon to bid for execution of this subtask (step 11025). Program control then commences at step 11023 or returns to an alter bit subroutine as has been explained. If one or more subtasks are to be bid and if no alarm message is associated with the bit, then bit positions 14 and 13 may both contain zeros and bit positions 12 through zero may contain the relative address within the trigger and alarm table FILTBL (FIG. 11E) of a list of one or more subtask numbers which are to be bid (see the second form illustrated in FIG. 11G). With reference to FIG. 11H, bit position 11 in each of these subtask numbers is a continuation bit which, when set equal to "1", indicates that more subtask numbers follow. In FIG. 11B (Cont.), steps 11025, 11026, and 11027 are then executed repeatedly until all of the necessary subtask bids have been placed. Program control then commences at step 11023 or returns to an alter bit subroutine. If a bit has associated with it an alarm message and one or more triggers, then both bit positions 14 and 13 contain "1" data bits (see the bottom of FIG. 11G). In this case, bit positions 12 through zero of the logical word contain the relative address within the trigger and alarm table FILTBL (FIG. 11E) of an array of data. The first entry in the array is a directory pointer for a file which contains an alarm message as has been explained. The second and following entries in the array are subtask numbers (see FIG. 11H). The digital scan program places bids for the execution of all of these subtasks with the sublevel processor in the manner which has been explained, and then program control commences at step 11023 or returns to an alter bit subroutine.

E. AUTOMATIC IMPLEMENTATION OF A LOGIC DIRECTOR CONTROL SYSTEM

In many control applications, permanently wired logical networks are used to control the occurrence of sequential operations. As a simple example, the progress of an object on a conveyor may actuate switches which in turn cause logical networks to operate both the conveyor and apparatus adjacent the conveyor which, for example, may carry out shaping or forming operations upon the object. The logical networks are often called directors or director control systems.

An important advantage of the present invention is its ability to function as a director control system. Not only is the invention able to duplicate almost any director control system which may be implemented by interconnecting standard hardware logical networks, but it also allows intimate coupling between a director control system and a digital computer implemented process control system. As an additional advantage of the invention, a director control system implemented with the present invention may be completely rearranged at any time, even long after the control system is fully established. Such rearrangements may be carried out without the need for altering the system hardware, other than to re-assign contact closure inputs and outputs to devices within the process environment.

The ability of the present invention to function as a director control system arises fom a combination of features which are present in the logic initiator program, the sublevel processor program, the control chain processor program, certain algorithm subroutines which process logical variables, and in other computer system programs. All of these programs are adequately described in this and other sections of this specification. What follows is an illustrative example of how a simple director control system may be implemented using the present invention. It is to be understood that much more elaborate systems may be established in a like manner by using more than one control chain.

Assume that a simple director control system is to be designed which is to actuate a stamping operation one second after an object actuates a micro switch located on a conveyor. In addition, assume that the director control system is to sample the results of ten "go" or "no-go" tests which are carried out upon the object by ten sensors one second after the object is stamped, and is to generate for two seconds a reject signal if the object fails any one of the tests.

First, the apparatus described above is interfaced with the process control system. The micro switch and the ten sensors are connected to contact closure inputs of the process control system, and the stamping machine and whatever apparatus is actuated by the reject signal are connected to contact closure outputs of the computer system. Data files are then defined for each of these contact closure inputs and outputs in the manner described in section 15 and illustrated in FIG. 15/100, and each of these data files is assigned a name by the systems engineer. In this manner, the contact closure inputs and outputs are established as system process variables. Let it be assumed that the variables are assigned the following names: MSW (micro switch) SEN01, SEN02, . . . , SEN10 (sensors); STAMP (stamping signal); and REJECT (reject signal).

The system engineer then writes out a control chain which implements the desired sequence of operations, preferably using his own terminology. As an example, he might use the following control chain definition:

```
CHAIN MASH DISK
     LEVEL = 8035
     TRIGGER = MSW
     PROCESS
     LOGICAL SEN01, SEN02, SEN03, SEN04,
             SEN05, SEN06, SEN07, SEN08,
             SEN09, SEN10, STAMP, REJECT
             MSW
1    TSTBR
     INPUT = MSW
     TRUE = 2
     FALSE = 9
2    TIMDEL
     TIME = 1
3    SETRES
     TRUE = STAMP
4    TIMDEL
     TIME = 1
5    LOGIC
     REJECT = .NOT. (SEN01 .AND. SEN02 .AND. SEN03
     .AND. SEN04 .AND. SEN05 .AND. SEN05
     .AND. SEN06 .AND. SEN07 .AND. SEN08
     .AND. SEN09 .AND. SEN10)
6    TSTBR
     INPUT = REJECT
     TRUE = 7
     FALSE = 8
7    TIMDEL
     TIME = 2
8    SETRES
     FALSE = REJECT, STAMP
9    END
```

This control chain is then established within the computer system as subtask number 8035, as is explained in sections 6 and 15. Once the control chain has been established within the system, the director control system is complete and begins to function.

By way of further explanation, the above control chain is placed in operation whenever the logical variable MSW (microswitch) changes its state (TRIGGER=MSW). Block number one of the control chain (TSTBR - test and branch logical -FIG. 8/A28) checks the state of the logical variable MSW and terminates execution of the control chain (by transfer to the END block number 9) if the microswitch is now open or false. If the microswitch is closed or true, block number 2 of the control chain is executed. Block number 2 places the control chain into time delay for one second by calling upon the time delay algorithm subroutine shown in FIG. 8/A31. Block number 3 calls upon the set-reset algorithm subroutine (FIG. 8/A05) to set the output logical variable STAMP true and thus to actuate the stamping mechanism. Block number 4 then executes a second one-second time delay. Block number 5 calls upon the LOGIC algorithm subroutine (FIG. 8/A01) to leave the output logical variable REJECT false if and only if all ten of the logical varibles SEN01, . . . SEN10 are all true, and to set the logical variable REJECT true if any one of the logical variables SEN01, . . . , SEN10 are false. The reject mechanism is thus actuated if any one of the sensors is in a "no-go" state one second after the stamping operation. Block number 6 then tests the logical variable REJECT. If REJECT is still false, a transfer to the 8th block is carried out to avoid an additional time delay. If REJECT is true, block number 7 executes a two-second time delay. Block number 8 then sets both of the logical variables REJECT and STAMP false to terminate the stamping and the rejection output signals, and execution of the control chain terminates with block number 9.

Whenever an object actuates the microswitch, the logical variable MSW is altered to true. This logical variable is checked periodically by the digital scan program 11057 in FIG. 11A. When the change in the state of the logical variable MSW is detected, the digital scan program calls upon the alarm and trigger check routine 11058 to check for subtask bids. The routine 11058 retrieves the subtask number 8035 of the above control chain from the trigger and alarm tables 11059 and places a bid for execution of this control chain with the subbid subroutine 10/1100 within the sublevel processor program.

In due course, the above control chain is executed. The sublevel processor program (FIG. 10A) transfers the control chain into core storage and supplies the core address of the control chain to the control chain processor program (FIG. 7). The control chain processor program and the algorithm subroutines (FIG. 8/A01 et seq.) then proceed to execute the control chain.

Whenever one of the algorithm subroutines needs to know the state of a logical variable, the subroutine calls upon the check bit subroutine 11055 within the logic initiator (FIG. 11A). Whenever the state of a logical variable is to be altered, an algorithm subroutine calls upon one of the alter bit subroutines 11060 within the logic initiator. The subroutine 11060 in turn calls upon an executive contact closure output handler 11061 to alter a contact closure output which corresponds to an altered logical variable. The subroutine 11060 also calls upon the routine 11058 to check for additional subtask triggers whenever a logical variable is altered. In this manner, the entire director control system is established around a single control chain and a few process variable data files.

12. THE MONITOR DATA FILE PROCESSING PROGRAM

Analog scan files, calculated value files, analog control chain files, and subtask bidding files which have been chain-linked into monitor data file subtask linkages are all processed by the monitor data file processing program shown in FIG. 12. Since this program includes the capability to execute periodic analog data scans, this program may also be called the analog scan program.

The data file processing program is assigned to a task level of its own within the system executive scheduler. The program is placed in operation by the system executive scheduler in response to a bid for the execution of a subtask that is assigned to the data file processing program task level. Typically, such bids are periodically placed with the sublevel processor program by the auxiliary synchronizer program so as to cause periodic execution and processing of the monitor data files. The technique whereby monitor data files are assigned to subtask linkages and whereby periodic bids for execution of these linkages are established is explained in section 6 of this specification.

Upon entry into the data file processor program task level, the sublevel processor subroutine CHECKBID is called upon to determine the nature and the address of the subtask that is bidding for execution (step 1201 in FIG. 12). The program then determines its next course of action in accordance with the type of subtask that is bidding for execution (step 1202). If the subtask is a program subtask, program control is transferred directly to the program (step 1203) and from thence back to step 1201 after the program has run to completion. If the subtask is a normal control chain, program control is transferred directly to the control chain processor program (step 1204) and from thence back to step 1201. If no subtasks are bidding for execution, program control is returned to the system executive scheduler. If the subtask is a data file subtask, then program control commences with step 1205. Section 10 explains how the program distinguishes the different types of subtasks from one another.

In the case of a data file subtask, the CHECKBID subroutine returns to the monitor data file processing program the starting address of the linkage of monitor data files which is to be processed. Upon commencement of program execution at step 1205, the monitor data file processing program follows the file linkage to the first file within the linkage and examines the file type number within that first file (step 1205). Depending upon the file type number, program control may be transferred in any one of six directions (step 1206). If the file is an analog scan file, program control is transferred to an analog scan file processing program 1207. The program 1207 interprets the file data and calls upon the analog input handlers of the system to read in data from an external analog sensor whose address is contained within the file. The program 1207 may also linearize this data, limit check this data, and perform any other routine tasks in connection with the processing of the analog data, in accordance with instructions contained within the monitor data file. The program 1207 then returns program control to the step 1205, and the next file within the subtask linkage is examined.

If the file is a calculated value file, program control commences at step 1208. A calculated value file processing program is called upon to process the data within the file. By way of explanation, a calculated value is an analog value which is calculated by a program residing within the computer. Calculated values are process variables and are initially defined by monitor data files. A calculated value file makes it possible for such values to be scanned and to be limit checked in the same way that analog input values are scanned and limit checked. The two programs 1027 and 1208 are quite similar in structure, and many subroutines may be common to both of these programs. These programs are relatively straightforward programs for processing data in accordance with instructions contained within a data file, and they are not disclosed in the present application.

If a subtask bidding file is encountered, one or more subtask numbers may be retrieved from the file and supplied to the SUBBID subroutine within the sublevel processor (step 1210). If a type 8 coupler file (FIG. 6/106) is encountered, this file is simply skipped over. However, if a type 8 coupler file containing a core address is encountered, then the file residing in that core address is processed as if it were the next file within the linkage. If an analog control chain file is encountered, program control is transferred directly to the control chain processor program (step 1209). With reference to FIG. 7, the control chain processor program 700 has a special exit for data subtasks assigned to the monitor data file processor task level. This special exit returns program control to step 1205 in FIG. 12. After a normal control chain subtask is processed, program control is returned to the monitor data file processor program task origin which corresponds to step 1201 in FIG. 12.

If the file is none of the above, then a check is made to see if there are any more files in the linkage (step 1211). If so, program control continues at step 1205. If not, and if the subtask linkage of files is normally disk-resident, the buffer release program 10/2500 within the sublevel processor program 10/200 (FIG. 10A) is called upon to release the core buffer within which the linkage of files resides (step 1212) and program control returns to step 1201. If the subtask linkage of files is normally core-resident, step 1212 is skipped.

The data file processing program may be assigned to as many task levels as is desired. This allows subtask linkages of monitor data files to run at several different task levels and to interrupt one another. The program shown in FIG. 12 is able to handle not only data file subtasks, but also control chain subtasks and normal computer program subtasks. For this reason, any type of subtask may be assigned to a task level which is processed by the data file processing program. The data file processing program thus carries out the function of the sublevel processor program basic task program for those task levels to which it is assigned.

13. THE OPERATOR CONSOLE PROGRAM

FIG. 13A is a block diagram representation of the operator console program and of its relationship to the other elements of the computer system. The program utilizes other programs within the system to achieve an extremely flexible arrangement of communication between the system operator and the various files and programs which reside within the computer system.

Whenever the operator of the system wishes to carry out some function or to be informed of system data values or constants, the operator defines his function by means of push buttons and controls which together comprise an operator console 13001. The operator console 13001 generates an interrupt input and causes a system interrupt program to transfer program control to an input device program 13004 which operates at a high priority interrupt level within the computer system. The input device program 13004 accepts the data supplied by the operator, stores this data, and places a bid with the sublevel processor program 13003 for the execution of an operator console control program 13005.

In due course, the control program 13005 processes the input data, determines what specific task is to be carried out, and calls for the execution of an appropriate function program 13006 to carry out the desired task. The control program 13005 may either call a function program as a subroutine, place a bid for the execution of a function program which is a subtask, or it may call upon the auxiliary synchronizer program to place repeated periodic bids for execution of a function program wbhich is a subtask. The latter course of action is desirable when a set of values are to be printed out periodically, say every 15 or 20 minutes.

The function program 13006 either feeds data into or obtains data from the file system 13007 using the file and directory handler subroutines which are described in section 6. If a message is to be printed out, the message is stored in a queue within the message writer program 13011, and a bid for the execution of the task level to which the message writer program is assigned is placed with the sublevel processor 13003. The message writer 13011 then causes an appropriate message to be printed out by a print device 13012. If a value is to be plotted on a visual display, the appropriate function program 13006 communicates directly with the handler program for the visual display device 13008 or for an analog recorder 13009. If the operator's command is that the system file data is to be altered in some way, the function program uses the file and the directory handler subroutines to alter the file data stored within the file system 13007 as is required.

If the operator knows the name of a constant or of a variable within the system, the operator may alter or print out the value of that constant or variable by specifying the name of the variable to the operator console program. The operator console program does not have to be informed of where the variable resides. The console program calls upon the appropriate subroutines within the file system to locate a file containing the address of the variable or constant. This file is then presented to the function program 13006. So long as the function program 13006 knows the structure of the file with which it is dealing, the function program may then retrieve the address of the variable or constant from the file and gain direct access to the variable or constant itself.

Values within a file may also be altered on-line. As an example, the system operator may wish to change the time constant of a particular proportional-plus-reset controller. If the operator knows the name of the control chain file which contains the definition of that controller, and if the operator knows the number of the algorithm block within the control chain file defining that controller, then the operator may supply the file name and the block number to a function program which may then obtain the control chain file from the file system and alter the value of the proper time constant value within the control chain file. In a similar manner, data within a monitor data file may be altered. For example, the alarm limits stored in the file for a particular analog variable may be raised or lowered by the system operator. Similarly, the conversion constants used in linearizing an analog input variable may be altered by the system operator.

The file system gives other advantages to the operator console program. If the operator wishes to have a series of variables scanned periodically, and if the names of those variables are alphanumerically ordered, the operator tells the console program the name of the first variable in the sequence, the number of variables in the sequence, and the period of time which is to elapse between successive scans of the variables. The control program 13005 may then set up a periodic bid with the auxiliary synchronizer and with the sublevel processor to have an appropriate function program called upon at the desired periodic intervals to print out a record of the variables. In addition, the function program can locate the files for all ten of the variables using subroutines within the file system if it is supplied with the name of the first file and with the number of files which are to be scanned. The subroutine NXFLNM (FIG. 6/800) is used for this purpose.

Figure 13B:
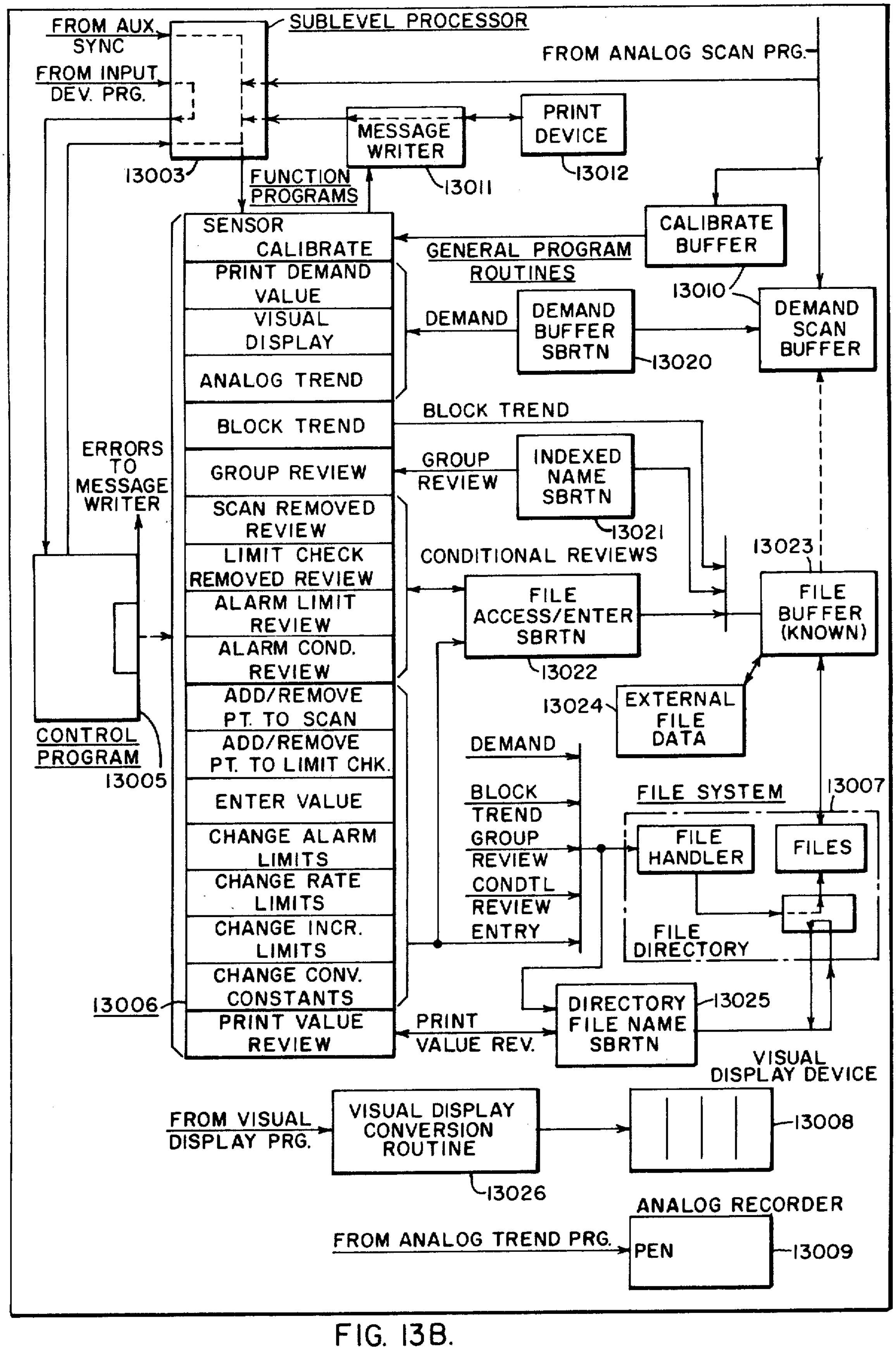
FIG. 13B is a more detailed block diagram representation of function programs which may be a part of the operator's console program shown in FIG. 13A.

A more detailed block diagram of the function programs appears in FIG. 13B. As can be seen, there are numerous function programs available which may be called by the system operator. Those shown in FIG. 13B are intended to be illustrative, and in any particular system additional function programs may be desirable. The function programs shown in FIG. 13B are briefly described in the following paragraphs.

A sensor calibrate function program allows the calibration of the system analog signal inputs to be checked.

This function program sets up a sensor calibrate flag in a sensor calibrate buffer 13010. The flag identifies the monitor data file for an analog signal input which is to be checked. The buffer is checked by the monitor data file processing program (FIG. 12) when that program is in operation. If the buffer contains a flag, the data file processing program connects to a calibrated input the analog-to-digital converter which is to retrieve the analog signal data. The converter output is then processed in the manner specified by the monitor data file for the analog signal. The resultant computed signal value is then returned to the system operator along with the magnitude of the calibrated input so that the system operator may determine whether the sensor calibration is accurate. If the computed signal value is not in accord with a desired value, a least squares program may be called upon to generate new conversion constants for incorporation into the monitor data file.

Occasionally, the operator of a system may desire to know the magnitude of a particular analog input. A print demand value function program causes the present value of a particular input to be printed out by the message writer program. A visual display program is similar and causes the value of a particular input to be displayed on a visual display device, such as the visual display device 13008 which is controlled by a conversion routine 13026. An analog trend program is provided to periodically check the value of a particular input and to plot that value on an analog recorder 13009. The analog trend program is one of those which is called periodically by the auxiliary synchronizer program and which may therefore print out values at the expiration of periodic intervals. All three of these function programs may operate by having a demand buffer subroutine 13020 locate the file for an analog variable which is to be displayed and by placing the address of the file into a demand scan buffer 13010 within the data file processing program shown in FIG. 12. The data file processing program is arranged to check the demand scan buffer whenever it is operating. If the address of a monitor data file is stored within the buffer, program control is then transferred directly to one of the routines 1207 or 1208 in FIG. 12 and the value of the corresponding analog variable is computed. The function program then takes this value and either prints it out or displays it. The function program initiates operation of the data file processing program by simply bidding for the execution of the task level that is assigned to the data file processing program. The bid may be placed with the sublevel processor program or with the executive scheduler.

A block trend subroutine is one which is periodically called by the auxiliary synchronizer to print out the values of a series (or "block") of system variables. The system operator calls upon the block trend program to change the series of variables which are printed out or to change the speed of operation of the program. The block trend program contains the names and the addresses of the series of system variables. Periodically, the block trend subroutine transfers the current values of the variables to a block trend printing device.

The print value review program prints out the values of an array of one or more system variables whose names alphanumerically follow one another within the system directory. The print value review program calls upon an indexed name subroutine 3021 (the subroutine NXFLNM in FIG. 6/800) to determine the names of successive files in alphanumeric order. After retrieving each variable name, the program requests the message writer to print out the value of the variable. After each such printout, the message writer program re-starts the print value review program.

A group review program periodically prints out the names and the status of a predefined group of system variables which typically may not be altered by the system operator. A scan removed program prints out the names and the status of one or more system variables which are scan removed. A limit check removed review function program similarly prints out the names and values of one or more system variables which have been removed from limit checking so as not to initiate the printing of alarm messages. An alarm limit review program prints out the names and the status of one or more system variables which have alarm limits. An alarm condition review program prints out the names and the status of all system variables which are in an alarm state. All of these review programs operate by obtaining the names of system variables from the system directory in alphanumeric order. These programs then obtain the file for each variable in turn and place each file into a file buffer 13023. A file access and enter subroutine 13022 is then called upon to obtain the desired data values either from the file itself or from other storage areas within the system whose addresses are stored within the file. Pertinent data is then printed out by the message writer program 13011 on the print device 13012.

The next two function programs in FIG. 13B allow digital and analog variables to be added to periodic scans or to be removed from periodic scans, and to be added to or removed from limit checking. Another function program allows the system operator to enter data values as the current values of a system variable (designated by its name) whenever desired. The next three function programs allow alarm, rate, and incremental limits to be altered within the file of a given system variable. Other similar constants may also be altered by similar function programs. Another function program allows conversion constants within an analog scan file to be altereed. All of these function programs call upon the file handler subroutines to place the named file within a buffer 13023 and then call upon a file access and enter subroutine 13022 to retrieve data from or to add data to the file or to the variable storage location within core, if any such exists.

To limit the size of the various function programs, the repetitious file access and entering steps are primarily contained within the file access and enter subroutine 13022 so that the function programs may be kept as short as possible. FIG. 13C is a block diagram of the file access and enter subroutine 13050 (13022 in FIG. 13B). The purpose of the file access and enter subroutine 13050 is to eliminate any need for the function programs to have any detailed knowledge of how data is organized within individual system files. Upon entry into the subroutine 13050, the file from which or into which information is to be transferred is assumed to reside within an external buffer 13052. The file access and enter subroutine 13050 first checks to determine the type number of the file which is in the buffer 13052. The subroutine is customized so as to be able to handle each type of file which may be encountered within the system and so as to know the exact location of all data values within any file. The file access and enter subroutine retrieves the necessary data values from the file, or from an external location 13051 whose address is contained within the file, and returns pointers to these data values and the data values themselves to the calling program. If data is to be entered into the file or into an external location, the data is supplied to the subroutine 13050 as arguments. The subroutine 13050 enters these data values either into the file 13052 or into any external storage areas 13051 designated by the file. If data is entered into a file within the buffer 13052, the file handler subroutine WTFIL (FIG. 6/200) is called upon to write the altered file data back into the file system.

A program called the chain access and enter program is available which gives access to control chains. The chain access and enter program is the control chain counterpart to the file access and enter program and enables any data values within a control chain to be examined or altered. The chain access and enter program requires as arguments the starting address of a control chain, a block number of a block within the control chain, and the relative address (with respect to the first block entry) of one or more entries within the block that are to be examined or altered. If the entries are to be altered, the altered entries are supplied as additional arguments. The chain access and enter program searches the control chain for a block or module of data having the designated block number in its first entry, and then retrieves or alters the designated entries within the block. In searching the control chain, the program locates the first location in each successive block in the same manner that the algorithm subroutines described in section 8 locate the first location in each block before returning program control to the control chain processor program. In brief, the address of the first location in each block is computed by adding the length of the preceding block to the starting address of the preceding block. The precise method whereby the length of a given data block is computed varies depending upon which algorithm subroutine is to process the block.

14. THE MESSAGE WRITER PROGRAM

A message writer program suitable for use with the present invention is shown in block diagram form in FIG. 14. The program 14003 includes a message writer entry subroutine 14004, a message queue 14005, and a message writer output routine 14006. The output routine 14006 is assigned to its own low priority task level within the system. The message writer entry subroutine 14004 is a subroutine which may be called by any program running at any task or subtask level within the computer system.

When a system program or subtask wishes to have a message printed out, the program or subtask (called the requesting program in FIG. 14) calls upon the message writer entry subroutine 14004 and supplies to the subroutine arguments defining the message which is to be printed out. These arguments may be a directory pointer to a system file which contains the message which is to be printed out, for example a directory pointer to a logical variable data file which contains an alarm message. Alternatively, the arguments may comprise the message itself either in full text form or else written in an abbreviated form. The message writer entry subroutine 14004 enters a record of the request to have a message printed out into the message queue 14005 and places a bid with the system monitor or executive scheduler program 14001 for execution of the message writer output routine 14006. Program control then returns to the calling (requesting) program or subtask.

In due course, the system monitor or executive scheduler 14001 calls for execution of the message writer output routine. The output routine obtains each message from the message queue and interprets each message using tables and dictionaries which are also contained within the message queue. Output messages are then formatted and are placed within a message writer buffer within the routine 14006. Ultimately, the messages are fed to output devices 14007 through the system executive output device handlers.

An interesting feature of the message writer program is its ability to bid for the execution of a calling subtask after a message has been printed out. For example, in FIG. 14, the message writer output routine bids for execution of the subtask level of the requesting program by placing an appropriate bid with the sublevel processor 14002 after the message supplied by this requesting program has been printed out. This feature allows the calling subtask to be halted while, for example, an alarm message is printed out. The calling subtask may be placed into time delay or suspension using the time delay or suspend subroutine within the sublevel processor program 14002 and may be restarted after the message is printed out. Alternatively, the requesting program may be started from the beginning, as is illustrated in FIG. 14.

This illustrative message writer program is only one of many different types of message writer programs which may be used in connection with the present invention. A typical computer system may include a message facility built into the system executive and may include provisions for storage messages until a particular output device is available for use. Any such message writing procedure may be used in conjunction with the present invention.

15. FILE GENERATING PROGRAMS

The entire procedure whereby control chains and data files are prepared and loaded into the system is illustrated in FIG. 15. The systems engineer initially fills out a large number of forms 15001 and 15011 defining his data files and his control chains. The forms 15001 defining data files are preliminarily processed by a series of data file generation steps to produce an intermediate output tape 15009. This intermediate tape is made up of load records each containing one or more load-modules formatted as is shown in FIGS. 5G and 5H and which are collectively referred to as intermediate files. The intermediate tape 15009 is then transferred to 15010 and is fed through the programmer's console 15020 and the system executive 15021 to the file loader program 15022 a block diagram of which appears in FIG. 5A. The file loader program 15022 assembles the load modules into files which are to be loaded into the system. The file loader program 15022 also establishes any necessary linkages between files and supplies to each file the absolute core addresses of any variables which are specified by name within the file defining load modules. Each file is assembled within a file buffer 15026. The file loader program then calls upon the file handler subroutines 15023 to establish the file within the file storage area 15025. The name and address of the file is recorded within the file directory 15024 by appropriate directory handler subroutines. In this manner, data files defined by the systems engineer are automatically established as operating entities within the system.

The forms 15011 defining control chains are similarly subjected to a series of control chain generation steps which result in an intermediate tape 15019 containing load records and load modules which collectively comprise intermediate files. This intermediate tape is also passed through the programmer's console 15020 and the system executive 15021 to the file loader program 15022 and is established within the system in the manner just described.

The data file generation and the control chain generation steps have much in common. In both cases, the data from the systems engineer's forms 15001 and 15011 is manually placed in storage on magnetic tape 15004 and 15014, punched paper tape 15003 and 15013, or punched cards 15002 and 15012. The machine readable data which results is then fed through a programmer's console 15005 or 15015 and an executive 15006 or 15016 of a computer to either a data file generator program 15007 or to a control chain generator program 15017. The programs 15007 and 15017 generate the intermediate tapes 15009 and 15019 and simultaneously print out a record of the files as defined by the system engineer together with error diagnostics which are helpful in eliminating errors from the files (15008 and 15018).

The data file generator program 15007 and the control chain generator program 15017 are essentially data translation programs. These programs have no knowledge of where anything is stored within the actual operating computer system and additionally have no knowledge of the present operating configuration of the computer system. The programs 15007 and 15017 are not concerned with the order in which the file defining data is presented, and hence the file defining data may be presented to these programs in any desired order. Since the file loader program (FIG. 5A) includes provision for establishing forward linkages, both the data file generator program and the control chain generator program may operate as one-pass programs and do not have to make a second pass over the file data to establish forward address references. The programs 15007 and 15017 refer to variables by their names and never require any knowledge of the locations assigned to variables within the operating system.

Since the data file generator and the control chain generator programs operate independently of any knowledge of the operating system and additionally operate primarily as translation programs generating an output which has a one-to-one relationship to the program input, these programs may operate in a computer which is remote from the operating system. It is contemplated that the forms filled out by the systems engineer may be forwarded to a central processing laboratory either by mail or through the medium of a timesharing computer system. The intermediate tapes and the printed outputs are then returned to the systems engineer. Alternatively, these two programs may reside within the operating system at low priority task levels. If such is the case, many of the functions of the loader program may be combined with those of the data file generator and control chain generator programs, and files may be created directly within the file buffer 15026. This latter procedure bypasses many of the intermediate file creation steps, such as the preparation of an intermediate tape in which data is formatted in load records and in load modules. As will be explained below, the data file generator program 15007 and the control chain generator program 15017 are able to generate files suitable for use in a wide variety of operating computer system, even systems in which the systems engineer uses different terminology to define his files or systems in which the data files are organized differently due to differences in the details of the analog scans which are to be carried out.

A. THE DATA FILE GENERATOR PROGRAM

The data file generator program appears in block diagram form in FIG. 15/100. This program expects as data input a plurality of punched cards or punched card images organized into file defining groups as is illustrated in FIG. 15/101.

Upon entry into the program, a first data card is read into a card buffer (step 15100). Step 15100 may read in more than one card, if the cards are continuations of one another. A continuation card is indicated by the presence of as asterisk in column 7 of the card, as is indicated in FIG. 15/101. Provision for comment cards is also provided, and such cards are ignored or skipped over by step 15100. If the card is a header card (step 15101), the data file generator program is initialized (step 15102). Two header cards are shown in FIG. 15/101. The first header card contains the letters DFG and calls for the initialization of the data file generator program. The second card contains the work "binary tape card" and causes the program to establish itself in such a manner that the data which is generated is in the form of a punched binary paper tape.

When a card is encountered which is not a header card, a check is made to see if the card is an end card (step 15103). An end card bears the letters END and is the last card in a data file generator deck (FIG. 15/101). When an END card is encountered, execution of the data file generator program terminates. If the next card is not an END card, then program control continues at step 15104 with the commencement of the data file generator program proper.

With reference to FIG. 15/101, three different types of cards may be encountered between the header cards and the END card. The first is the TYPE card. The TYPE card is a control card which establishes the format for the files which are next to be created. Each TYPE card contains a series of names of record creation subroutines (RCS in FIG. 15/101). The TYPE card specifies the order in which record creation subroutines are to be called upon to assemble data within each file which is generated. As will be explained more fully below, each record creation subroutine places a body of data into the intermediate file output of the program and places a pointer to that body of data immediately following the file header. Hence, each file contains bodies of data stored in the same order as the corresponding record creation subroutines are listed on TYPE card.

Adjacent the name of each record creation subroutine are a series of data bits which set forth ground rules on how that record creation subroutines is to be used. An ignore indicator causes a particular record creation subroutine to be skipped over. A required indicator says that a particular record creation subroutine must be called upon or else the file is defective. A repeat count indicates how many times a record creation subroutine may be called upon during the creation of a single file. A pointer byte, used in the creation of general files, may be used to distinguish one type of general file from another. With reference to FIGS. 15/318 to 15/321, this pointer byte is stored in the location "sub-file type" within the general file. If the above data is followed by a comma, then another record creation subroutine name follows. If the above data is followed by a blank, then that data terminates the data on the TYPE card. Column 7 on the card contains as asterisk in the case of a continuation, and the file name data in columns 1 to 7 of the continuation card is ignored.

The second type of card which may appear is the shared constant list card or SHARK. The format of a shared constant list card appears in FIG. 15/109. The shared constant card simply defines a global variable. The first six alphanumeric entries on the card define the global variable name, and another location on the card defines the binary point, if any. The constant value or values then follow.

The remaining cards are groups of cards each of which groups defines a file. All of the cards relating to the same file contain the file name in columns 1 through 6. For example, all of the cards bearing the name "A100" relate to a single file having the same name. Similarly, all of the cards bearing the name "B2034" relate to another file. Data from file specification forms written out by the systems engineer is converted into cards of this type.

Multiple groups of cards defining similar files are each headed up by an appropriate set of TYPE cards which define how the files are to be assembled. Each time a new set of TYPE cards appear, they supercede the TYPE cards which preceded them and cause the creation of a new type of file. Hence, a new TYPE card is included within the deck for each different type of file which is to be assembled. If more than one file of a particular type is to be assembled, a single type card may precede all of the card groups defining all the files of that type (FIG. 15/101).

Returning to FIG. 15/100, step 15104 checks to see if the file name on the card which has just been read is the same as the file name on the preceding card. If it is, then this card relates to the same file as the card which preceded. Program control then advances to step 15105. The record creation subroutine whose name appears on the particular card is called to process the data which is presented by the card. The record creation subroutine is called the "operator", and each card within the deck contains the name of the operator which is to process that card. For example, the type card shown in FIG. 15/101 contains the name of the "TYPE" record creation subroutine 15106 in columns 8 to 13. The name card shown in FIG. 15/103 contains the word "NAME" in columns 8 to 13 and calls upon the name record creation subroutine 15107 to process the card. Hence, program control is transferred from step 15105 to the record creation subroutine 15106, 10107, 10108, or 15109 which is to process the type of card which has been encountered. This preliminary processing step comprises taking the data from the card, translating the data, storing the data within a record creation subroutine buffer, and printing out an image of the untranslated data for the systems engineer. The data which is placed in the record creation subroutine buffer is ultimately placed into the intermediate file and is a direct translation of the data which is presented by the card. Program control is then transferred back to step 15100, and the next card is read into the card buffer.

The one exception to the above outlined procedure is the type record creation subroutine. Except for the pointer bytes noted above, the data on the type cards is not destined to become a part of the intermediate file. The data on each type card is stored internally within the type record creation subroutine and is used later to control the order in which the file data is incorporated into the intermediate file.

The above procedure continues until ultimately step 15104 encounters a card bearing a name which is not the same as the name on the cards which have just been processed. The data file generator program then enters the create mode (step 15111) by setting a create flag within the program. The record creation subroutines are then called a second time in the order in which they are listed on the most recently processed set of TYPE cards (step 15112). Each time one of the record creation subroutines is called, the subroutine takes note of the fact that the create mode flag is set. Each record creation subroutine then takes its individual body of data and causes this data to be punched out on paper tape as part of an intermediate file. Program control is then transferred back to step 15112 and from thence to the record creation subroutines 15107, 15108, and 15109 cyclically until all of the file data has been punched out. Ultimately, the punches output tape is fed to the file loader program (step 15114) within the operating computer system.

When all of the data defining an intermediate file has been punched out, program control recommences at step 15101. Step 15100 is bypassed, since the first card in the next group of cards has already been read into the card buffer. The entire procedure just described is then repeated as often as is necessary until all of the data cards in the deck have been completely processed and an END card is encountered. The program has then run to completion.

FIG. 15/102 illustrates the punched tape output of the data file generator program for a single file. This output is formatted into load records of the type shown in FIG. 5G, and each load record contains one or more load modules of the type shown in FIG. 5H. The left-hand portion of FIG. 15/102 illustrates a typical group of load modules which might be generated and which have not yet been broken down into load records. The first module is a begin file module of the type which must head any set of modules which define a file. An origin module follows and sets a load point pointer LDLOC (FIG. 5A) within the file loader program to point (within the buffer NFILE where the file is to be assembled) to a location past space which is reserved for the file header. Type 1 data modules then follow containing three data sets which are to be part of the file and which are to be stored sequentially within the file following the file header. A type 1C module then defines a global array of variables of the type defined through the use of a SHARK card and the SHARK record creation subroutine. This global array is not included in the file, but is stored within the system global storage area by the file loader program if it has not been defined previously. The address of the array of global variables is typically placed into the file at one or more locations singled out by an address pointer within the type 1C module. The fourth and last type 1 data module then follows. An origin module then sets the load pointer back to the beginning of the file header position. The file header and pointer data is then presented as a type 1 load module and is loaded into the file header position. An end of file module then follows and causes the file loader program to establish the file as an operative entity within the system. The modules which follow then define a second file B. A terminate module (type 2) then tells the loader program that the loading of files has been completed.

In the center of FIG. 15/102, the same data is shown broken into load records of the type shown in FIG. 5G. The data is broken up in this manner so that the file data is compatible with the standard load record format of the computer system and therefore can be handled by the standard system data loading and handling routines. When fully assembled by the file loader program, the file appears as it does in the right-hand portion of FIG. 15/102. The file header and pointers come at the beginning of the file and are followed by the four load records. Directory entries for the file and for the global variable array are also established within the system, as is shown in FIG. 15/102.

FIGS. 15/102 to 15/109 illustrate a typical set of coding forms which a systems engineer might use in defining his files. The coding forms shown in these figures are merely exemplary of a large number of such forms which might be required to aid in the establishment of any given system. Each coding form requires that the name of a record creation subroutine appear in columns 8 to 13 of the form. In addition, all coding forms relating to a single file or to a single analog signal input must bear the name of that file or input in columns one to six. Columns 15 to 72 then contain data which is passed directly to the record creation subroutine whose name appears on the coding form. How that data is processed and where that data is stored within the file depends entirely upon the nature of the record creation subroutine. The data file generator program is set up in such a manner that new record creation subroutines may be easily added to the program, and hence the system operator may write his own programs for incorporating any data he desires into any type of system file. After the coding sheets have been filled out, the data on the sheets is keypunched into cards or is otherwise converted into machine readable form. The data is then presented to the data file generator program organized as is illustrated in FIG. 15/101.

FIG. 15/103 through 15/106 illustrate typical coding forms which might be used to establish a monitor data file for an analog signal input. The coding form shown in FIG. 15/103 is processed by a NAME record creation subroutine. This form contains an English language description of an analog signal and an English language description of the engineering units which are to accompany a printout of the magnitude of the signal. Depending upon whether the digital value of the signal magnitude is to be stored in fixed point or in floating point format within the computer system, a fixed number index or a real number index is assigned to the point, and the binary point location within the fixed number is also defined in the case of a fixed point number. This card also contains an indication of whether the file is to reside in mass memory or is to be core-resident. Of the data contained on this coding form, everything except for the point name and the file storage indicator (RES) ultimately is included within the file for this point. The point name and the file storage indicator are included in the type 1D beginning of file load module that is presented to the file loader program ahead of the other load modules which define the intermediate file (see FIG. 5H).

FIG. 15/104 illustrates a SQUENCE card which is processed by a SQUENCE record creation subroutine. This card specifies which subtask linkage of files the present file is to be connected into. If a scan frequency index (FREQ) is specified, then this file is linked into a subtask linkage of files assigned to the same scan frequency index. If the name of another file is specified, this file is linked into a subtask linkage which includes the named file and is positioned just behind the named file in the linkage. If the procesing of this file is to trigger a subtask bid, this card contains the subtask number of the subtask which is to be bid after the processing of this file. For example, the subtask number might be that of a control chain which is to process analog signal input data as soon as that data is retrieved from the process environment.

If a scan frequency index is specified, this index value is passed on to the file loader program in the beginning of the file module type 1D (see FIG. 5H) for the file. If a point named to be followed is specified, the point name is passed on to the file loader program in a trigger module type 1E (see FIG. 5H). A subtask number may be supplied to the file loader program in either of two ways. Either the number may be included within the file data, in which case the analog scan file processing program 1207 (FIG. 12) is designed to place the requested subtask bid; or else the data file generator, after completing the creation of the load modules for a file, may create a subtask bidding file of type number 14 (see FIG. 15/316) using a beginning of file module type 1D, a trigger module type 1E containing the name of the file just created, a file data module type 1 containing the subtask number which is to be bied, and an end of file module type 1B (see FIG. 5H). This series of modules causes the file loader program to create a subtask bidding file and to link it immediately following the file just created within the file linkage. The remaining data on the SQENCE card is incorporated into the file itself, and its meaning is explained in FIG. 15/104.

FIG. 15/105 shows an ANIMPX coding form containing data which is processed by an AMIMPX record creation subroutine. This data defines the hardware location of each analog signal input and also specifies how the analog-to-digital converter is to be set up at the time each analog signal input is scanned. Hardware alarm limits are also indicated. If the incoming value exceeds these limits, any printout of the value is accomplished by an indication that the value may be unreliable due to the corresponding sensor (108 in FIG. 1) operating out of its normal range. An out-of-range alarm index is an index to a computer system routine which handles a sensor out-of-range alarm of this type and which may be called upon by the file processing program 1207 (FIG. 12). All of this data is placed within the file and is later interpreted by the analog scan file processing program 1207 shown in FIG. 12.

It is usually desirable to have some form of alarm printout when an analog input value lies outside of a specified range. FIG. 15/106 illustrates an ALARM1 coding form the data upon which is processed by an ALARM1 record creation subroutine. All of the data on this coding form ultimately winds up in the file where it is available to the analog scan file processing program 1207 (FIG. 12). This card includes provision for high and low alarm limit values, and also for setpoint and deviation type alarm limits. The card also includes provision whereby a deadband region may be established so that when an analog input value lies within a predetermined range, its digital value within the system is set to zero (see explanation which accompanies FIG. 8/A25). FIG. 15/106 explains in more detail the data which appears on this coding form.

The above coding forms are illustrative of many which might be used in establishing any given system. For example, a rate limit coding form is desirable in case a rate alarm limit for an analog variable is to be established. A filter specification form is useful for defining filtering coefficients for analog data. Additional alarm cards are useful to define multiple alarm limits each of which causes a printout when it is exceeded. If it is important that an English language record of the hardware interconnections to a particular point be maintained within a computer system file, a coding form containing English language hardware descriptive information is helpful. A coding form which defines alarm limits for the actual analog-to-digital converter input values in addition to the alarm limits on the calculated internal digital values is sometimes desirable. If a sensor 108 (FIG. 1) output is non-linear, a non-linear conversion coding card can contain conversion constants and specifications of what type of conversion equation is to be used to linearize the input data or to convert the data into some more useful form. If temperature compensation is required, for example in the case of thermocouple analog inputs, a compensation coding form might be included which defines the temperature compensation coefficients and the name of variables in the system memory or of global variables which should be used in computing temperature compensation. For each such additional coding form, an additional record creation subroutine is added to the data file generator, and the analog scan file processing program is modified to include routines which can carry out the requested steps.

FIG. 15/107 illustrates a coding form which is to be used to define files for logical variables. A separate file is created for each computer system logical variable, and each file is given its own name. The record creation subroutine called upon is determined by the contents of locations 8 to 13 on the coding form. A different record creation subroutine is provided for each type of logical variable—periodic contact closure inputs (PERCCI), nonperiodic contact closure inputs (NPRCCI), contact closure outputs (CCO), and internal computer system logical variables (LOGVAR). The remaining data on the coding form is explained fully in FIG. 15/107. Columns 66 to 71 are used to enter the bit number and register or channel number of the logical variable. Register numbers are used for periodic contact closure inputs, contact closure outputs, and all internal logical variables. Register numbers are references to the bit storage registers within the table LIUSER in FIG. 11C(Cont.). In the case of non-periodic contact closure inputs which are not global or process variables and which do not therefore reside in the table LIUSER, an octal hardware channel number is specified instead of a register number. The channel number and bit number, when supplied to appropriate executive subroutines, enable the system executive to interrogate such non-periodic contact closure inputs without the intervention of the logic initiator or digital scan program. All other system logical variables are true global or process variables and may be interrogated as is explained in section 11 of this specification.

FIG. 15/108 illustrates a coding form which may be used to define files for system constants. Two record creation subroutines, NAMEX and CONSTC are called upon to assemble each constant file. Constant data of this type is stored in either the floating point or the fixed point constant tables FLTADK or FIXADK (FIG. 5J) if they are stored in core. Otherwise, the contacts are stored within the same file that defines each constant, usually on disk. Constants of this type are process variables. They differ from global variables in that a file exists for each process variable constant containing, typically, an English language description of the constant. Global variables are defined directly within the system without the aid of a file and are stored in a storage area of their own (see FIG. 5I).

With the exception of analog control chain files (file type 11), control chain files (file type 12), some subtask bidding files (file type 13), dummy files (file type 14), and coupler files (file type 8), all other standard files may be created by the data file generator program. The formats of the different file types are illustrated in FIGS. 15/301 through 15/321.

B. FILES CREATED BY THE DATA FILE GENERATOR PROGRAM

What follows is a description of the various types of files which may be generated by the data file generator program. The files are shown as they appear when fully established in an operating computer system, rather than as they appear after they are generated as intermediate files by the data file generator program.

A typical file is formatted as is shown in FIG. 6/104. The file includes a first entry which contains a file type number designation and a length number N indicating the length of the file. A second file entry contains a directory pointer to a directory entry which contains the name of the file. A third entry within a file is an optional linkage pointer that is present in all files which are chain-linked together to form a subtask. The remainder of the file contains data.

A typical monitor data file for an analog signal input is shown in FIG. 15/304. The file consists of blocks of data each of which is created by one of the record creation subroutines. Pointers to the various blocks of data are included as the first data elements within the file, two pointers to a location. Bit 15 in the fourth location within the file is "0" for an analog signal input file and "1" for a similarly structured calculated value file. In an analog input file, this same location contains the number of the analog-to-digital converter which is to be used in interrogating the analog signal in the process environment.

In the preferred embodiment of the invention, both calculated value files and analog signal input files are assigned the file type numbers zero, 1, 2, and 3. These files are illustrated in FIGS. 15/301 to 15/308. Analog input files of type 0 (FIG. 15/301) contain three bodies of data—a description record, a scan and storage record, and a conversion record. This is the simplest type of file which the preferred embodiment of the invention accepts. Analog input point files of file type number 1 include the above plus two additional bodies of data—an alarm and set point record, and an incremental limit record. Analog input point files of file type number 2 include the same three bodies of data as files of type number zero and, in addition, a filter compensation record and a rate limit record. Files of type number 3 include all of the above bodies of data. Calculated value files (FIGS. 15/305 and 15/308) contain the same bodies of data as the correspondingly numbered analog input point files but include a storage record rather than a scan and storage record and include no conversion record, since no conversion is required in the case of digital variables already resident within the computer system. A complete explanation of the contents of these files is presented by the FIGS. 15/301 to 15/308. Analog scan data files are processed by the processing program 1207 shown in FIG. 12, and calculated value files are processed by the processing program 1208 shown in FIG. 12.

The remaining files created by the data file generator are similar to those just described but include different bodies of data. A periodically scanned contact closure input monitor data file is shown in FIG. 15/309. This file includes a contact input record which includes a set point limit and the address of the contact input (register and bit number), a contact status (or alarm) record in English, and a contact description record in English. A non-periodic contact closure input file (FIG. 15/310) includes essentially the same data, but addresses the point by its hardware channel number rather than its software register number. A contact closure output data file (FIG. 15/311) includes a record of the contact output bit address, a set and a reset description record, and a general description record. A constant file is shown in FIG. 15/312. A constant data file includes records of the internal address and characteristics of the constant, the English-language engineering units for the constant, and an English-language description of the constant. An internal logical variable data file appears in FIG. 15/313. This file is similar to the contact closure output file shown in FIG. 15/311.

A subtask bidding file is shown in FIG. 15/316. This file contains one or more subtask numbers as file data. A class of files called general files are shown in FIGS. 15/318 through 15/321. A general may contain any data which the systems engineer wishes to have stored within a file.

C. THE CONTROL CHAIN GENERATOR PROGRAM

A block diagram of the control chain generator program appears in FIG. 15/200. This program is designed to accept punched card images bearing the systems engineer's definitions of control chains and to convert the systems engineer's language into a numeric language which may be understood by the algorithm subroutines within the operating system. This program is also designed to accept the systems engineer's definitions of his own language in the form of macro specifications.

To illustrate how control chains are created, consider the hypothetical system flow chart shown in FIG. 15/205 and the exemplary control chain shown in FIG. 15/206. This flow chart illustrates a complex control loop within the environment of a steam turbine generator. The input analog variables named A7004 and A7059 are respectively high and low range temperature sensor outputs indicating the temperature of the feed water flowing into a boiler. Step one performs an arithmetic computation to convert these input values into percentages. Steps two through 5 then compare these percentages with reference values and determine whether or not the high or low range values are to be used in controlling the operation of the system. Steps 6 selects one or the other of the values and feeds it into a proportional-plus-reset controller comprising steps 9, 10, and 11. The computed value TOT1 is then fed through another proportional-plus-reset controller comprising the steps 20 to 22 which compare the value TOT1 to a demand or setpoint value and compute a second output TOT2. Step 23 compares the second output to an internally generated value FB, and if these two values do not agree, steps 25, 26, 27 and 28 increment or decrement the value of FB so that it gradually approaches the value of TOT2 along a straight line ramp. Step 29 then recomputes the values of the input variables A7004 and A7059 as is indicated.

Each of the numbered steps in FIG. 15/205 is translatable into a corresponding numbered block of instructions within the systems engineer's control chain illustrated in FIG. 15/206. Beginning at the top of FIG. 15/206, the system engineer defines the chain name as FLCHOV and assigns it to core storage. This control chain is to be executed every time the analog signal input named A7059 is processed or scanned, and hence the process variable name A7059 is defined as a trigger for the execution of control chain. Since that variable is processed once every second, the control chain is executed once every second. Since the control chain execution frequency is an input argument to the controller steps 10 and 21, a variable DELTATEE is set equal to 1.0 which is the control chain execution frequency. This value DELTATEE is ultimately placed in the second location within a calculation table that is shown in FIG. 15/211.

The variables called upon by this control chain are then listed. The process variables are listed first, and then the global variables. At a later time when the control chain is loaded into the on-line computer system, the loading of the control chain is terminated if a process variable is encountered which does not already exist within the computer system. When a global variable is encountered which does not exist within the computer system, the global variable is established within the computer system and the loading of the control chain is not terminated.

The steps of the control chain are then laid out in individual blocks as is shown in the lower half of FIG. 15/206. Each block includes a block number followed by the name of the algorithm subroutine which is to process the data within that block. Each block in FIG. 15/206 corresponds to the similarly numbered step in FIG. 15/205, and the two figures may be compared to show what operation the language within each block defines.

The blocks numbered 1, 7, 9, 11, 20, 22, 23, 26, 27, and 28 call upon the algorithm subroutine ARITH (FIG. 8/A02) to perform arithmetic computations. The blocks numbered 2 and 3 call upon the algorithm subroutine COMPSET (FIG. 8/A04) to compare an input value to a reference value and to generate a logical pair of output values. Block number 4 calls upon the flip-flop algorithm subroutine (FIG. 8/A03) to change the state of a software-implemented flip-flop. Block number 5 then calls upon the LOGIC algorithm subroutine (FIG. 8/A01) to perform a logical computation upon system logical variables. Block number 6 calls upon the test and branch logical algorithm subroutine to branch either to block number 9 or to block number 7 depending upon the state of the logical variable LOG3 (see FIG. 8/A28). The blocks numbered 8 and 27 call upon the transfer algorithm subroutine (FIG. 8/A27) to perform a direct transfer to another block.

The blocks numbered 10 and 21 call upon a proportional-plus-reset controller algorithm subroutine PITXAMLIM (proportional and integral trapezoidal with provision for automatic or manual operation and with provision for output limiting) to compute an output variable OUT1. For a further explanation, the text accompanying FIG. 8/A13 explains the operation of a proportional-plus-reset trapezoidal controller and also explains the auto-manual operation of this controller, and FIG. 8/A14 explains the limiting capability of this controller.

The blocks numbered 24 and 25 call upon the real variable test and branch algorithm subroutine to compare an input value ERR3 to reference values REFC3 and REFC4, and to transfer either to block number 26 or to block number 28 depending on whether the result of a "greater than" comparison is true or false. This algorithm subroutine is described in the text accompanying FIG. 8/A29. The last block in the control chain is an EXIT block which indicates the end of the control chain.

FIGS. 15/201 through 15/204 illustrate four different typical headers which may be used to precede a control chain. The first header, shown in FIG. 15/201, assigns a definite subtask number to a control chain and then establishes different system variables as triggers for this subtask. If the trigger is an analog signal input name or a calculated value name, this header causes a subtask bidding file containing the designated subtask number to be linked into a subtask linkage of monitor data files immediately following the file for the named process variable, and thus causes a bid for execution of the control chain subtask to be placed right after the named process variable is scanned. If the trigger is the name of an active logical variable (called digital inputs in the figure), then this header causes the specified subtask number to be linked to the entry within the logical word table LCWORD (FIG. 11E) for the active logical variable. A bid for execution of the control chain subtask is then placed every time the named logical variable changes its state.

The header shown in FIG. 15/202 is used when a control chain is to be executed immediately following the scanning of a particular analog input signal or points and when the control chain is not otherwise assigned to its own subtask by a "LEVEL=" statement. In this case, the trigger is the name of the analog signal monitor data file. Control chains of this type are generally placed into the subtask linkage of files which linkage includes the designated trigger file, and the control chain is positioned immediately following the triggering file within the linkage. If the trigger file is disk-resident and the control chain is to be core-resident, a type 8 coupler file is placed into the subtask linkage of files immediately behind the triggering file. This type 8 coupler file (top half of FIG. 6/106) contains a pointer to the core-resident control chain. Control chains of this type are called analog control chains, since they may be executed at the same task and subtask level as that at which the processing of the triggering file is carried out. Since the transfer of program control to the control chain is direct and does not require a subtask bid to be placed, this type of control chain is executed immediately after the triggering file is processed without delay. In the design of control systems using controllers which must be periodically placed in operation, the analog control chain is the best possible choice for insuring that controller outputs are adjusted as soon as possible after controller input signals are scanned.

If a control chain is not to be triggered by any specific system variable but is to be assigned to a specific subtask level, the header format shown in FIG. 15/203 is used. This header simply assigns a subtask number to the control chain. Bids for execution of the control chain may be placed by any other program or entity within the computer system.

Sometimes it is desirable to have a control chain bid on a periodic basis. In this case, the header shown in FIG. 15/204 is used. Once again, LEVEL is a subtask number which is assigned to the control chain. PERIOD is the period of time in seconds (accurate to 1/10th of a second) which is to elapse between successive executions of this control chain. In response to such a header, the file loader program within the system automatically places a periodic bid request with the auxiliary synchronizer program so that this subtask is automatically bid at the expiration of the designated period of time. The period of time which elapses between bids for execution of a control chain is arbitrary and may be set to any multiple of one tenth of a second.

The headers just discussed are intended to be illustrative. Every control chain has a "CHAIN" designation. The following designations are then arbitrary:

LEVEL=(subtask number)
TRIGGER=(list of trigger variables)
PERIOD=(time in 0.1 seconds)
DELTATE=(time in 0.1 seconds)

The last two items in this list are not generally used together. If a PERIOD designation is used, this means that the auxiliary synchronizer is to bid for execution of this control chain every time the designated amount of time elapses. The use of the designation PERIOD means that a periodic bid for execution of the control chain is to be automatically established within the auxiliary synchronizer. The designation DELTATEE specifies the time which elapses between successive executions of a control chain but does not cause a periodic bid for execution of the control chain to be established. The time interval specified is used only to aid the control chain generator program in creating algorithm modules for controller algorithm subroutines and the like. Many of these algorithm subroutines require as an argument the period of time which elapses between successive executions of the control chain. As a simple example, the basic equations shown in FIG. 8/A11D (which define the operation of the PIR algorithm subroutine) contain the value DELTATEE as part of the definition of the constant C1. Hence, any time a control chain calls for the execution of this controller algorithm subroutine, the control chain includes either a PERIOD designation or a DELTATEE designation. By placing a DELTATEE designation at the state of a control chain one avoids re-defining the value of DELTATEE for each algorithm subroutine in the control chain.

In addition to writing out his control chains, the systems engineer is given the option of defining the language which he wishes to use in writing out his control chain. The systems engineer is also given the option of defining arithmetic computations which are to be carried out upon his control chain data to place them in a form suitable for handling by the algorithm subroutines within the computer system. The systems engineer does this by preparing a macro format specification for each algorithm subroutine which he plans to use. The nature of these macro format specifications are described fully in the section of this specification which describes algorithm subroutines (FIG. 8/A00 et seq.).

The systems engineer prepares a series of punched macro data cards for each algorithm subroutine which he plans to use. The format of the macro data cards prepared by the systems engineer is illustrated in FIGS. 15/210 through 15/216. The group of macro data cards for each algorithm subroutine always begins with a type 1 macro data card and always ends with a type 5 macro data card. The type 1 card relates the computer system algorithm starting address table index number (see FIG. 7) for an algorithm subroutine to the name by which the systems engineer wishes to call that algorithm subroutine. One or more type 2 macro data cards may follow the type 1 macro data card (FIG. 15/212). The type 2 card defines the argument names which the systems engineer wishes to use in writing out control chain blocks for the algorithm subroutine whose name appears on the preceeding type 1 card. One or more type 3 macro data cards may follow the type 2 macro data cards. The type 3 macro data cards (FIG. 15/213) define the preliminary operations which the systems engineer wishes the control chain generator program to carry out upon his arguments in the course of preparing the arguments for inclusion into a control chain data file. The code numbers which the systems engineer uses in defining his arithmetic operations are explained in FIG. 15/214. All values used in a computation are retrieved from and all results of computations are placed into the table shown in FIG. 15/211. The first two entries in that table are zero and delta T. Delta T is either the value PERIOD or the value DELTATEE specified in the control chain header. The nature of these computations is described fully in the section of the specification which explains the algorithm subroutines. One or more type 4 macro data cards may then follow. Each type 4 macro data cards instructs the control chain generator program to transfer one data value from the calculation table (FIG. 15/211) into the data file which is being created. The input arguments listed by the systems engineer in writing out the control chain block are then automatically transferred into the data file following all of the values from the calculation table and in the same order as they are listed on the type 2 macro specification cards. These groups of cards are fed to the control chain generator program ahead of data cards containing the control chain definitions written out as is illustrated in FIG. 15/206.

FIG. 15/217 illustrates a typical macro specification deck of cards which might be used to define the systems engineer's language in calling for the execution of a trapezoidal lag controller. The type 1 card defines the controller name and states that the address of this algorithm subroutine is the 18th entry within the subroutine address table located within the control chain processor program (710 in FIG. 7). The type 2 cards then specify the names which the systems engineer plans to use for his arguments and states briefly the nature of these arugments. The type 3 cards which follow cause the control chain generator to calculate the constants C1 and C2. The type 4 cards cause the constants C1 and C2 to be placed into the control chain file, and the arguments listed on the type 2 cards are placed in the control chain file immediately following those specified by the type 4 cards. A type 5 card terminates the macro specification for this algorithm.

Control chains and analog control chains appear as is shown in FIGS. 15/314 and 15/315. The header for these control chains is the same as for any other file. Since the analog control chain is linked into a subtask linkage of files, it includes a linkage pointer within its header. The normal control chain does not include a linkage pointer. The control chain data is formatted as is shown in FIG. 8/A00.

After the systems engineer has written out his control chains and macro specifications and has had them punched into machine readable cards, he feeds all of the cards into the control chain generator program shown in FIG. 15/200 with the macro specification cards placed ahead of the other cards. The input data deck is divided into sections each of which either specifies how a single algorithm subroutine is to be executed or else conveys data to the control chain generator program. Each such group of cards is preceded by a single card bearing a block number (optional) and a word. If any macro specifications are to be fed into the control chain generator program, these are preceded by a card bearing the word MACRO. A pre-defined symbol table is preceded by a card bearing the word SYMTBL. However, a symbol table is not required in implementing the preferred embodiment of the invention. Each control chain definition is preceded by a card bearing the word CHAIN and is followed by a card bearing the word EXIT. The last card in the deck bears the word END. Each algorithm subroutine block within each control chain is preceded by a card bearing the name of the algorithm subroutine.

Once placed in operation, the control chain generator program (FIG. 15/200) reads in the image of the first card which it encounters (step 15201). If the card contains a block number, that block number is recorded (step 15202) and the control chain generator proceeds to look at the first word on the card (step 15203). Depending upon what that word is, the control chain generator carries out one of eight different tasks and then returns program control either to step 15201 or to step 15202.

The possible first words encountered on the first card are listed at 15204 in FIG. 15/200. If the input cards include a macro specification, the first card encountered may bear the name MACRO. Program control is transferred to a subroutine 15210 which reads the macro specifications into control chain generator internal tables. The macro specifications are stored in tabular form and are used to guide the control chain generator program and the file loader program in interpreting the input data and in converting this data into files which are understandable by the system algorithm subroutines.

The word CHAIN appears on the card which precedes the beginning of a complete control chain definition. In response to a card bearing the word CHAIN, a subroutine 15209 is called upon to create a beginning of file module (type 1D in FIG. 5H) and to transfer the control chain file name, bidding frequency (if any), and subtask number (if any), to the file loader program. The subroutine 15209 also reads in the variable type declarations which occur at the beginning of every control chain and thus makes it possible for the symbol reference modules (type 1C in FIG. 5H) to include a "type" designation as to what type of variable they refer to. This in turn makes it possible for the file loader program to perform error checks to insure that the systems engineer has not accidentally used a process variable which has not previously been defined, used a global variable which already exists within the system as a process variable, or committed some other such error in writing out his control chains.

If the first word encountered on a card is ARITH, the card and the cards which follow contain data defining an arithmetic computation which is to be carried out by the arithmetic algorithm subroutine. Program control is transferred to a subroutine 15205 which creates arithmetic algorithm modules. This subroutine evaluates the arithmetic expression which the systems engineer has written out essentially in Fortran and converts this expression into the parenthesis-free form which is illustrated in FIG. A/A02E. The breakdown of Fortran expressions into parenthesis-free form is not new to the present invention, since similar breakdowns are carried out by Fortran compiler programs and by other similar compiler programs. However, rather than generating actual machine instructions to carry out the parenthesis-free computation steps as would be done by a conventional Fortran compiler program, the subroutine 15205 generates a non-executable data module formatted as is illustrated in FIG. 8/A02E. This data module defines the precise computation which is to be carried out, but is much more compact than an equivalent machine language program of the type which would be generated by a Fortran compiler program. This generation of data modules results in a considerable space-saving within the computer system. The subroutine 15205 continues to read in arithmetic expressions and to generate ARITH algorithm subroutine data modules containing parenthesis-free representations of those expressions until the last arithmetic expression has been processed. Program control is then transferred back to step 15202.

If the first word on a card is the word LOGIC, a subroutine 15206 is called upon to create a logical algorithm subroutine data module in parenthesis-free notation and of the type that is illustrated in FIG. 8/A01E. The subroutine 15206 accepts the systems engineer's logical expressions, written in Fortran notation, and converts them into parenthesis-free notation using the standard techniques that are used by all Fortran compiler programs to make data conversions of this type. However, the subroutine 15206 does not generate machine language instructions implementing the parenthesis-free steps, as does a conventional Fortran compiler program, but generates a non-executable algorithm data module of the type shown in FIG. 8/A01E and containing all the necessary data to define the logical operations which are to be carried out. Once again, these data modules occupy considerably less space than do machine language routines generated by a Fortran compiler program to perform the same logical operations. When all of the cards bearing logical expressions have been evaluated, the subroutine 15206 returns program control to step 15202.

If the word on a card is any other than those listed at 15204, program control commences with the subroutine 15212. The subroutine 15212 assumes that the name on the card is that of an algorithm subroutine and that the name is one which appears in one of the algorithm subroutine macro specifications. The subroutine 15212 looks up this algorithm name in the macro specification tables and determines which macro specification the algorithm name relates to. A table is then established for the arguments accompanying the algorithm. The systems engineer's arguments, which are assumed to be punched on the cards which follow, are then read into the computer and are transferred into a temporary table (step 15213) with the macro specification being used to determine which variable is placed in which location within the table. In the case of array arguments, the array elements are loaded into the table following a number which equals the number of items in the array.

As is illustrated in FIG. 8/A00, the header for each algorithm includes the block number (read in by step 15202) and the algorithm type number from the macro specification table (in particular, from the type 1 macro specification data card). The header is now transferred to the file loader program as part of a type 1 data load module (step 15214 - see FIG. 5H). The computations called for by the type 3 macro specification cards are carried out (step 15215). The results of the computations and the algorithm subroutine arguments are loaded into a file data module (module type 1 in FIG. 5H) with the computation results specified by type 4 macro specification cards coming first and with the systems engineer's arguments coming last (step 15216). Program control is then transferred to the step 15201 if the first card in the next set of cards has not yet been read in, or to step 15202 if the next card bearing a significant name has been read in.

If the word SYMTBL appears upon a card, program control is transferred to the subroutine 15207. The cards which follow comprise a symbol table which may be assumed to reside within the on-line computer system. This symbol table contains the names and the addresses of all system variables, and the addresses from the table are placed directly into the control chains which are assembled. In the preferred embodiment of the present invention, the file system is used for address linking and a symbol table is not required.

The word EXIT appears on the last card in a control chain. When this word is encountered upon a card, program control is transferred to a subroutine 15208. This subroutine 15208 creates the necessary symbol referencing load modules (module type 1C in FIG. 5H) for causing the system file loader program to determine the address of all variables called for by the control chain and to place those addresses into the control chain in the proper positions. The subroutine 15208 also generates the end of file load module (type 1B in FIG. 5H) which is the last load module in the group of modules defining a given file.

The last card in every input deck bears the word END. When this card is encountered, program control commences at step 15211. An end of load record module (LAST module type 2 in FIG. 5H) is created to tell the file loader program that no more files follow. Execution of the control chain generator program then terminates.

16. EXPLANATION OF PROGRAM LISTINGS

Section 17 presents a selection of computer programs which may be used to implement a process control system in accordance with the present invention. Some of these program listings are written in a modified version of the language FORTRAN IV, and some of the listings are written in the assembly language of the Westinghouse P2000 computer system.

The modified FORTRAN IV language used in writing some of the listings in Section 17 is substantially in compliance with the FORTRAN IV language standards approved by the United States of America Standards Institute (X3, 9-1966) on Mar. 7, 1966. The following are some of the more important ways in which the modified language differs from the approved language: A BIT declaration statement allows a 16-bit variable to be declared a bit variable. Each bit of such a variable may be addressed through the use of a subscript notation similar to that used in addressing the elements of conventional one or two dimensional arrays. An ORG statement permits the absolute origin of a program segment to be specified. The use of apostrophes as quotation marks in Hollerith data is permitted. Statement functions may reference array elements. Hexadecimal constants (preceded by X and contained in apostrophes) may be used in DATA statements. The colon is included as a special alphabetic character. The compiler contains a table of 32 predefined executive and library subroutine names. The logical operator EOR is added to the standard FORTRAN IV list of logical operators. DATA statements may include references to a full array by using the array name without subscripts. In-line assembly code is permitted if the assembly language statements are preceded by an S. Other variances which do not appear often enough to be worthy of mention are listed on page B-1 of technical publication TP034 of the Hagan/Computer Systems Division of Westinghouse Electric Corporation, Pittsburgh, Pa.

The assembly language program listings are coded in the standard symbolic assembler language which is used in the P2000 computer system. This language is described in the manuals TP045 and TP033, both of which are available from the Hagan/Computer Systems Division of Westinghouse Electric Corporation, Pittsburgh, Pa. The following paragraphs present a brief explanation of this assembly language.

The first (optional) element of each assembly language program statement is a unique decimal number for each statement in a given listing. In many cases, however, this first element is omitted.

The second (optional) element of each assembly language program statement is a name which is to be associated with the instruction or the data value that comprises the remaining portions of the same statement. Some of these names ultimately are associated with numerical addresses within the process control system, while others are temporary data storage locations used only by the assembler program. The latter names have been left in the listings to facilitate their readability and clarity.

The third (required) entry in each assembly language program statement is a three-letter command. The commands are of two types-machine instructions and assembler directives. A brief description of each command follows:

| | Machine Instructions | |
|---|---|---|
| ADA | Add double length word to accumulator and to extended accumulator | |
| ADD | Add to accumulator | |
| AND | AND with accumulator (bit-by-bit) | |
| CDR | Change designator register as follows: (These are the symbolic names which appear in some listings. Other listings use different names or else use the hexadecimal numbers indicated) | |
| | SIL | Set internal (service request) lockout ($4000_{16}$) |
| | RIL | Release internal (service request) lockout ($0000_{16}$) |
| | SEL | Set external interrupt lockout ($8000_{16}$) |
| | REL | Release external interrupt lockout ($0000_{16}$) |
| | SAL | Set all lockouts ($C000_{16}$) |
| | RAL | Release all lockouts ($0000_{16}$) |
| | MOO | Do not post index ($0000_{16}$) |
| | M11 | Post index on register C ($0003_{16}$) |
| CJP | Carry jump (used to cause jump when "1" is shifted out of the accumulator by an SHF instruction) | |
| DCR | Decrement location (subtract one from value stored in location) | |
| DIV | Divide accumulator | |
| EOR | Exclusive OR with accumulator (bit-by-bit) | |

-continued

| | Machine Instructions | |
|---|---|---|
| EST | Enter status (load registers) | |
| INC | Increment location (add one to value stored in location) | |
| IOA | Input to or output from accumulator | |
| JMP | Unconditional jump | |
| LDA | Load accumulator register A | |
| LDB | Load base register B | |
| LDC | Load base register C | |
| LDE | Load extended accumulator register E | |
| LDG | Load shift description register G as follows: (The names shown are used in some listings—other listings use equivalent names or else use the hexadecimal numbers indicated) | |
| | SLA + X | Single left arithmetic shift ($000X_{16}$) |
| | SLC + X | Single left circular shift ($200X_{16}$) |
| | DLA + X | Double left arithmetic shift ($800X_{16}$) |
| | DLC + X | Double left circular shift ($A00X_{16}$) |
| | SRA + X | Single right arithmetic shift ($400X_{16}$) |
| | SRC + X | Single right circular shift ($600X_{16}$) |
| | DRA + X | Double right arithmetic shift ($C00X_{16}$) |
| | DRC + X | Double right circular shift ($E00X_{16}$) |
| | (Shifts of X bit positions are formed by adding the number X to the above symbolic codings) | |
| MPY | Multiply accumulator | |
| NJP | Negative jump (bit position 15 of last calculated value contains "1") | |
| OJP | Overflow jump | |
| PJP | Positive or zero jump (bit position 15 of last calculated value contains "0") | |
| SDA | Subtract double length word from accumulator and extended accumulator | |
| SHF | Shift as commanded by shift description register G | |
| SST | Store registers and jump | |
| STA | Store accumulator register A | |
| STE | Store extended accumulator register E | |
| STZ | Store zero in location indicated | |
| SUB | Subtract from accumulator | |
| ZJP | Zero jump (all bit positions of last calculated value contain "0") | |

| | Assembler Directives |
|---|---|
| ABS | Declares that labels on subsequent statements are defined as absolute values and are not relocatable |
| ADL | Generates one word containing the designated expression address |
| DAT | Data values |
| DEF | List of symbols which may be referenced by other (separately assembled) programs |
| DLE | Delete the indicated number of the statements which follow |
| EJE | Print the next line of program listing at the top of the next page of printout |
| END | Last statement in listing |
| EQU | Equates a symbolic name to a specified value |
| FMT | Input/output format specification |
| LOC | Advance the execution location counter to the value specified |
| LPL | Assemble accumulated literals at this location |
| ORG | Advance the execution location counter "$" to the value specified |
| REF | Symbols defined in another (separately assembled) program |
| REL | Relocatable |
| RPT | Repeat the following statement the number of times specified |
| RES | Reserve the specified number of locations |

-continued

| | Assembler Directives |
|---|---|
| | and advance the execution location counter accordingly |
| SKP | Stop assembly and resume at statement whose label corresponds to the Nth item in a list, where N is the first item in the list |
| TTL | Print the specified title at the top of each page of the program listing |

The fourth (optional) entry in an assembly language program statement is an argument or an address that goes with the command in the same program statement. If this fourth entry is a number, and if it contains no quotation marks or other special symbols, it is a decimal number. A fourth entry that is surrounded by apostrophes and that is preceded by an X is a hexadecimal number. A name in column 4 designates either an address within the computer system or a predefined value within the assembly program. The fourth entry may be a literal. An equal sign precedes a literal fourth entry. During assembly, the value or address which corresponds to a literal entry is computed and is stored within the direct address range of the command which refers to the literal, and a pointer to this value or address is stored with the command. Indirect addressing in the fourth entry is indicated by an asterisk preceding the entry. For example, "*B" means "the contents of the location whose address is stored in index register B." Commas separate the elements of a fourth entry which jointly participate in multiple level address calculations. For example, "1,B" is a reference to the location whose address is the contents of index register B plus 1.

Hexadecimal constants which are used frequently in assembly language programs are stored in a low core storage area where they may be addressed directly. Usually (not always) such constants are referred to by the names listed below. Each of these names is associated with a low core storage area where the corresponding hexadecimal number is stored.

| Name | Hexadecimal Constant |
|---|---|
| K:XFFFF | FFFF |
| K:HI | FFOO |
| K:LO | OOFF |
| K:1ST | FOOO |
| K:2ND | OFOO |
| K:3RD | OOFO |
| K:4TH | OOOF |
| K:X6008 | 6008 |
| K:X7FFF | 7FFF |
| K:X7F | 007F |
| K:X3F | 003F |
| K:X6 | 0006 |
| K:X3 | 0003 |
| K:X5 | 0005 |
| K:X7 | 0007 |
| K:X9 | 0009 |
| K:X1 | 0001 |
| K:X2 | 0002 |
| K:X4 | 0004 |
| K:X8 | 0008 |
| K:X10 | 0010 |
| K:X20 | 0020 |
| K:X40 | 0040 |
| K:X80 | 0080 |
| K:X100 | 0100 |
| K:X200 | 0200 |
| K:X400 | 0400 |
| K:X800 | 0800 |
| K:X1000 | 1000 |
| K:X2000 | 2000 |

-continued

| Name | Hexadecimal Constant |
|---|---|
| K:X4000 | 4000 |
| K:X8000 | 8000 |

Section 2 of this description explains how subroutine calls are carried out and also explains those details of the system executive which are important to the present invention. The use of sorftware lockout is also explained in Section 2 of this description. Other executive functions are described in the explainations which accompany each program listing. The details of the computer system executive or monitor go beyond the scope of the present invention. A further explanation of the P2000 computer system monitor or executive appears in the technical publication TP043 which may be obtained from the Hagan/Computer Systems Division, Westinghouse Electric Corporation, Pittsburgh, Pennsylvania.

Subroutines which perform double-precision arithmetic, which transfer arguments between a calling program and a subroutine, and which transfer data between disk and core storage are all conventional. These subroutines are not disclosed in Section 17.

The method whereby programs and subroutines are established within the P2000 computer system is conventional and is not disclosed in Section 17. An explanation may be found in technical publication TP039 which may be obtained from the Hagan/Computer Systems Division of Westinghouse Electric Corporation, Pittsburgh, Pennsylvania.

The five technical publications mentioned above (TP033, TP034, TP039, TP043, and TP045) have been assembled in a bound volume under the name "Prodac 2000 Computer Systems Reference Manual". A copy of this publication has been presented to the Murrysville Library, 3091 Carson Street, Murrysville, Pennsylvania. Copies of the following computer programs have also been presented to the Murrysville Library:

- P2000 Executive Monitor, including input and output handler routines
- Analog scan program (the Data File Processing Program)
- Operator Console Program (including input device programs)
- Message Writer Program These documents are all available for inspection at the Murrysville Library.

Just as a lengthy book always contains a number of errors, it is anticipated that the massive set of computer programs described in Section 17 contains some errors. Programming errors may exist which to date have not caused difficulty in an operating system. The editing and typing which went into the preparation of FIGS. 17/- may have introduced additional errors. Programs selected from different embodiments of the invention may not be totally compatible with one another, and more recent versions of some programs may not be totally compatible with older versions of other programs. Prior experience indicates that all of these errors would be of a type which can be easily corrected by one skilled in computer programmming.

17. DETAILED DESCRIPTION OF PROGRAM LISTINGS

A. THE FILE LOADER PROGRAM

The file loader program is shown in FIG. 17/500A through 17/500F, and related subroutines appear in FIGS. 17/510 to 17/540. The loader program reads in load modules, constructs files within a core buffer, and calls upon the file handler subroutines (17/601 et seq.) to establish the files within the operating computer system.

Program control commences at step 1 in FIG. 17/500A. The flag LMT1D, which is used to cancel the compilation of a file, is initially cleared. A number NSEQ is set equal to −1. This number is incremented as each load record is fed into the system and is used in checking to see that each load module is received in the proper sequential order.

Program control continues at 99. A subroutine READAC is called upon to read a load record into the core buffer LDRECD. Error checks are performed by the subroutine, and if there are any errors in the load modules or in their sequencing, an appropriate error message is printed out by subroutine ERRTN and the loader program terminates execution (see step 300 in FIG. 17/500B).

Program control then commences at 102 and continues on down through step 120 and the following steps in a manner that is fully described by block diagram steps 502, 504, 506, and 508 in FIG. 5A. At 102, "3" is placed in the location NMOD so that the pointer to the load record points to the header of the first load module within the record. The load module length value LN is set to −1 so that when the NMOD computation is carried out for the first time at 120, the value of NMOD is not changed. Later on, when program control is returned from the load module processing subroutines, program control commences at step 120. The value NMOD is then altered so as to point the next load module which is to be processed. At 121, a check is first made to see if a complete load record has been processed. If so, program control is returned to 99 where the next load record is read into the system. If the present load record still requires processing, the "director" (see FIG. 5G) for the load module whose address is in the location NMOD is retrieved from the core buffer LDRECD and is stored in the location LTMP. The module type number is then extracted from the 5 left-most bits within this director and is stored in a location LTYP. A relative address indicator which comprises the 3 bits in the middle of this director is also retrieved and is stored in the location LREL. The module length is retrieved from the left-most 8 bits within the director and is stored in the location LN. An indexing value I is then computed as the module type number LTYP plus one.

Programming steps 127, 130, 131, 133, and 134 transfer program control to an appropriate algorithm module subroutine in accordance with the value of I. In case the module type designation is an invalid one, program control commences at 134. An appropriate error message is printed out by the ERRTN subroutine, and program control continues at a location 9000 (FIG. 17/500E) where the flag LMT1D is set false so that the module which is currently being processed is not loaded into the system.

After the load module processing subroutine has run to completion, program control returns either to the location 120 or 121, and either the next module is processed or another load record is retrieved for processing.

With reference to FIG. 17/500B, type zero load modules are processed by a subroutine which begins at 200. A check is first made to see if the length of the module is zero. If the length of the module is zero, then this module is not really a module but is a zero data value indicating that there are no more modules within the present load record. The value 54 is stored in the location NMOD and program control is returned to step 121 in FIG. 17/500A. From thence, program control is transferred directly back to step 99 in the same figure, and the next load record is loaded into core.

If the length of the module is not zero, then the module is a "alter load point" module (see FIG. 5H). Program control commences at 202. A check is made to see if the cancel flag LMT1D is clear. If the flag is cleared, nothing is done and program control returns to step 210 so that the next load module may be processed. If the flag is set, then program control continues with the step following 202. A new load point value is retrieved from the load module and is stored in a location LTEMP. A check is then made to see if the value of this pointer lies within the bounds of the core buffer NFILE (see FIG. 5A). If this value is less than zero or greater than the pointer to the end of the buffer NFILE (stored in a location LFILES), an appropriate error message is printed and program control continues at the location 9000 where the flag LMT1D is cleared. If the requested load point lies within the proper range, program control continues at location 204. First, the old value of the load point pointer LDLOC is compared to a maximum pointer value LFSIZE. If the value LDLOC is greater then LFSIZE, the value of LFSIZE is set equal to LDLOC, so that a record of the maximum load point value is maintained in the location LFSIZE. The new pointer value LTMP is then placed in the location LDLOC, and this completes the adjustment of the load pointer. Program control then returns to 120 in FIG. 17/500A.

Type 1 load modules are processed by the subroutine 250 shown in FIG. 17/500B. A check is first made to see that the flag LMT1D is set. If the flag is set, then program control continues with the second step past step 250. A type 1 module is a simple data module containing data which is to be incorporated into a new file. A check is made to see if the addition of this data to the file would exceed the length of the buffer in which the file is being assembled. This check consists of adding the length of the module (and therefore the length of the new body of data) to the pointer LDLOC and checking to see if this length exceeds the address of the end of the file that is stored in a location LFILES. If it does, then an appropriate error message is printed out and program control is transferred to the location 9000 where the flag LMT1D is cleared. Otherwise, program control commences at location 252. All of the data accompanying the type 1 module is loaded into the buffer LFILE beginning with the location indicated by LDLOC. The value stored in the location LDLOC is then incremented so that the pointer points to the first empty location beyond the newly stored data. Program control then returns to step 120.

Type 2 load modules are processed by the routine 127 shown in FIG. 17/500B. This very short routine simply terminates execution of the file loader program and transfers program control back to the system executive.

The subroutine which processes address link load modules of type number 9 appears at 350 in FIG. 17/500B. This routine begins by checking to see that the flag LMT1D is set. The routine then retrieves an address from the first entry within the load module and stores this address in a temporary location I. A check is made then to see that the address I lies within the bounds of the core buffer NFILE. If it does not, an appropriate error message is printed out by the subroutine ERRTN, and program control is transferred to 9000 where the flag LMT1D is cleared. Otherwise, program control continues at 354. The program sequence beginning at step 354 is completely illustrated in FIG. 5B and has already been fully explained. After completion of this program sequence, program control returns to location 120 in FIG. 17/500A.

End of file modules type 1B are processed by the subroutine shown in FIG. 17/500C. A block diagram of this subroutine appears in FIG. 5C and is explained elsewhere. The following discussion is simply intended to explain those details of the program which do not appear in the block diagram.

Upon entry at 400, a check is made to see that the flag LMT1D is set. If the flag remains set, the flag is cleared, since this is the last module defining the file which is presently being processed. A check of the contents of the load location pointer LDLOC is then made. If the pointer LDLOC is greater than the contents of the location LFSIZE, the value of LDLOC is stored in the location LFSIZE. The value stored in the location LFSIZE is thus equated with the length of the file which is to be passed on to the file handling subroutines when the file is created.

A check is then made to see if LDELT is less than zero. With reference to FIG. 17/500F, LDELT is an alternate name for JHDR(5), the location in the array JHDR which contains the file type designation and which appears in FIG. 5E. If this value is less than zero, then the file is not a control chain or analog scan file (see the description of module type 1D given in FIG. 5H). Program control is then transferred to 405, and a value IDTYP is computed equal to 1 less than the absolute value of the file type designation in LDELT. With reference to FIG. 5H, the file type designations in FIG. 5H run from −1 to −16. Within the system, file type designations run from zero to +15. The computation following step 405 corrects for this discrepancy. Continuing at step 406, the file handling routine GNFIL is called upon to create the file within the system. If there is any error, an error message is printed out at 414 by the subroutine ERRTN and program control continues at 9000. Otherwise, program control commences at a location 415. A constant I is calculated as the file type plus one. A GOTO instruction is then executed which essentially makes the determination of whether or not the file which has been created is a normal control chain file or a periodic contact closure input file. Since the present discussion already assumes that the file is not a control chain file, and assuming that the file is not a periodic contact closure input file, program control continues at 449 with an immediate transfer back to the location 120. This completes the operation of this subroutine for all files except control chain files and contact closure input files.

Returning to the fourth step past 400, if the file is found to be a control chain file, the file type number IDTYP is arbitrarily set equal to 12, the type number of a normal control chain. A check is then made of the location LVLBIT to see if the control chain file has been assigned a subtask number. With reference to FIG. 17/500F, this location is the same as the location JHDR (1) where the subtask number is stored in the array JHDR (see FIG. 5E). If this location does not contain zero, then program execution continues at 406 with the creation of the control chain file by a call to the file generating subroutine GNFIL. If the subtask number location contains a zero, then "11" is placed in the file type number location IDTYP to indicate that this is an analog control chain which is to be linked into an analog scan subtask linkage. Since an analog scan control chain file may be linked into only one analog scan subtask behind only one particular file, it is improper to assign no more than one triggering file name to such a file. A check is therefore made to see if the number of triggers stored in the location NOTRGS is greater than one. If so, then an appropriate error message is printed out at location 420 and program control continues at 9000. Otherwise, program control continues at location 406 with the creation of the file by the subroutine GNFIL.

In the case of normal control chain files, the subroutine GNFIL does not establish linkages between the file and the sublevel processor and periodic bidding programs. These linkages are established by the subroutine shown in FIG. 17/500C beginning at location 416. A first call to the subroutine SUBLINK (FIG. 17/1012) supplies the subtask number "LVLBIT" of the file and the file address within the system to the sublevel processor program. This subroutine call establishes the control chain file as an operative control chain subtask within the system. If for some reason the file is not established within the system, an error message is printed out at 410 and program control continues at 9000. Assuming the file is successfully established within the system, program control continues at 412.

A check is made to see if a bidding period has been specified for the control chain file. If any such specification has been made, it is stored in a location LPERD which, with reference to FIG. 17/500F, is the fifth location within the array JHDR shown in FIG. 5E. If this location contains zero, then a call to the periodic bidding program is not required and program control continues at 402. If a bidding period is specified, then a subroutine call to the subroutine SNYCLK (FIG. 17/970) within the periodic bidding program is executed. If an error occurs, an appropriate error message is printed out at 401 and program control is transferred to location 9000. Otherwise, program control commences at the location 402.

Beginning at location 402, a check is made to see if any triggers for the control chain have been designated. With reference to FIG. 5F, the number of triggers is stored in a location NOTRGS. If this location contains zero, program control is transferred back to 120 via 449. If the location NOTRGS does not contain zero, then at least one trigger has been designated. A call is then executed to the trigger connect subroutine TRICON (FIG. 17/540) with the subtask number of the control chain LVLBIT, the number of triggers NOTRGS, the core buffer containing the trigger names JTRIGR, and the name of an available core buffer NFILE as arguments. Upon return from the subroutine, if any error occurs in the trigger establishment process, an appropriate error message is printed out at 403 and program control commences at 9000. Otherwise, program control is transferred back to 120 via the location 449. This completes the establishment of a control chain within the system.

If a newly established file is a monitor data file for a periodic contact closure input logical variable, the file may contain an alarm message which is to be printed out whenever the corresponding contact closure input enters an alarm state. Files of this type are assigned the file type number 4 within the computer system (see FIG. 15/309) and are detected two steps past step 415 in FIG. 17/500C. Program control is transferred to a routine 430 (FIG. 17/500C (cont.)) which establishes a linkage between the alarm message within the file and the corresponding contact closure input logical variable.

The routine 430 first transfers the file into a core buffer NFILE using the file handling subroutine RDFIL. The file access and entry subroutine SFILE is then called upon to determine the alarm limit of the logical variable-in other words, to determine which of the two states of the logical variable is the alarm state and which state is the normal state. If, for some reason, an error occurs during this subroutine call, program control is transferred back to 449. Otherwise, program control continues at 431. The alarm limit is now stored in a location ITABLE(1).

Beginning at 431, the alarm limit is retrieved from the location ITABLE(1) and is stored in the location I temporarily. The file access and enter subroutine SFILE is called upon a second time, and this time returns the word and bit address of the logical variable from the file. The logical variable address (see FIG. 11F) is then computed and is stored in a location LDADR. The alarm connect subroutine ALMCON within the logic initiator program is then called upon to establish the necessary alarm connection between the logical variable and the alarm message in the file. The arguments to this subroutine call are LFADR(1) which is a directory pointer to the directory entry for the file, LDADR the logical variable address, I the alarm limit of the logical variable, and KER an error return argument. If an error occurs, for example if the alarm connection cannot be established, the subroutine ERRTN is called upon to print out an error message. In any event, program control returns to step 120 via step 449.

FIG. 17/500D shows the subroutine which is used to process symbol reference modules of type number 1C. A block diagram of this subroutine appears in FIG. 5D. The following explanation is intended only to explain those details of the program listing which are not disclosed in the block diagram or in the accompanying text.

Upon entry at 450, a check is made to see that the flag LMT1D is set. A check is then made to see if the symbol reference module contains a name. If the module does not contain a name, the first symbol storage location within the module contains zero (see the illustrative symbol reference module in FIG. 5H). If the module does not contain a name, program control continues at 470 with the assumption being made that space within the global storage area is to be allotted for storage of a nameless variable. This procedure might be used, for example, in the case of a disk-resident control chain which requires permanent core storage for certain values, such as the past values of integrals and the like. These small sections of core storage are then reserved solely for a particular module of a control chain and are not listed by name in the system directory.

If the module is found to contain a name, then the directory access subroutine RDSYMB (FIG. 17/627) is called upon to look up the name within the system directory. Upon return from the subroutine, the value KER is equal to 1 if a symbol by that name exists within the system directory and is equal to 2 if no such symbol name exists within the system. If no such name exists, the name is assumed to be that of a new global variable, and program control is transferred to 470. Otherwise, program control commences at 451.

If the module contains a name and if that name has previously been entered into the system directory, then the purpose of the symbol referece module is to have the address of a symbol having that name computed and loaded into the new file in the locations designated by a pointer which is stored in the fourth location within the type 1C module. In this case, program control continues at 451. A check is made to see whether the name is that of a global variable or of a system file. if the name is that of a global variable, then a value IFORV returned by the subroutine RDSYMB is equal to 1. Program control commences at 453. The global variable is core-resident, and its address has been found by the subroutine RDSYMB and now is stored in a return argument location LOC(1). This address is transferred into a location LDADR for temporary storage, and program control commences at 454 with the routine that loads this address into the new file.

With reference to FIG. 5B, the subroutine outlined there for placing an entry into successive locations within the file is essentially the same as the routine which is carried out beginning at 454. A temporary location I is initially set equal to the rightmost 12 bits in the fourth entry of data within the type 1C symbol reference module. With reference to FIG. 5H, this location contains a pointer to the first location in the file in which an address is to be placed. Program control then continues with a loop which extends from step 455 down to two steps preceding step 457. During each pass through this loop, the address LDADR is stored in a location within the file. If at any time the value I becomes equal to zero, the address storage process has been completed and program control is transferred to 120. Each time through the loop, a check is made to insure that the next location into which the address is to be placed lies within the bounds of the file. If the location lies beyond the bounds of the file, an appropriate error message is printed out by the routine ERRTN, and program control is transferred to 9000. Otherwise, the address is successively loaded into locations in the manner shown in FIG. 5B.

The routine just described is used not only to store the address of global variables within the file, but is also used to store all other types of addresses within the file. Therefore each section of the program disclosed in FIG. 17/500D ultimately returns program control to the location 454.

If the test performed one step beyond location 451 reveals that the symbol is the name of a file, program control commences at 457. The designated file is read into a core buffer by the subroutine RDFIL (FIG. 17/601) and the address of the desired value is retreived from the file by the file access and entry subroutine SFILE (FIG. 17/1310). The file type is then determined in the step following 459, and program control is then transferred to an appropriate location where the address of the named variable is determined and is stored in the location LDADR. Program control then returns to step 455 where this address is placed into the new file.

If the file is an analog scan file of type number zero through 3, program control commences at 460. The relative variable address (relative to the start of the table FLTTBL in FIG. 5J) retrieved by the subroutine SFILE is converted into an absolute core address by a subroutine CVTOAB and is stored in the location LDADR by that subroutine. Program control then returns to 454, and the address is stored within the file in the manner described above.

If the file is that of a contact input, a contact output, or a calculated logical variable, then program control commences at 462. The proper logical word address (see FIG. 11F) of the logical variable is computed from the register number and bit number of the variable which were retrieved from the file by the subroutine SFILE. This logical word address is a relative address to an entry in the logical word table LCWORD which appears in FIG. 11E. The logical word address is first stored in the location LDADR and is later stored in the file by the steps beginning at 454 which have already been described.

If the file is type number 5 (non-periodic contact input), 8 (coupler), 9 (not used) or 11 to 15 (control chains, subtask bidding, dummy and general file types), no useful symbol address may be retrieved from the file. Program control then commences at 465 with the printing of an appropriate error message. The address is not entered into the file, but the file is still created within the system by a transfer to 120.

In the case of a constant file type number 7, program control commences at 480. The fourth argument returned by the subroutine SFILE is then examined. This argument must be two, meaning that the constant is stored externally of the file in core, for in the preferred embodiment of the invention only core addresses are placed into new files. Hence, an appropriate error message is printed out at 465 if the value of ITABLE(4) is anything other than 2. Assuming that this argument is 2, program control continues at 481. If the argument ITABLE(1) equals zero, the constant is a fixed point constant, and program control continues at 482. The absolute address of the fixed point constant in the table FIXADK (FIG. 5J) is calculated by the subroutine CVTOAB and is stored in the location LDADR. Program control then is transferred to 454 where the address LDADR is entered into the new file. Returning to the step following 481, if the value ITABLE(1) is not equal to zero, then the constant is a real constant whose address in the table FLTADK (FIG. 5J) is calculated by the second step past 481. With reference to FIG. 5J, floating point constants and fixed point constants are stored in two different tables whose names are shown in FIG. 5J. The second instruction following 481 and the first instruction following 482 differ from one another in that they calculate the core addresses of the constants relative to the start of different ones of these two tables. (The files contain only the relative addresses of the constants with respect to the start of these tables). In either case, program control returns to step 454 where the address of the constant or constants is placed into the new file.

If no symbol name is specified in the load module or if the symbol name is not defined within the system, program control commences at step 470. It is assumed at this point that the symbol reference module is calling for the creation of a global variable which has not previously been defined and for which storage space must be allocated within one of the two tables shown in FIG. 5I. Beginning at step 470, the symbol type number is retrieved from the leftmost four bit positions within the fourth location in the type 1C symbol reference module (see FIG. 5H). As is explained in FIG. 5H, type numbers 1, 2, and 3 are respectively assigned to logical, integer, and real global variables. Type numbers 4, 5, and 6 are assigned to process variables.

If the symbol type number is 1, program control commences at 476. The symbol is to be stored in the table of logical global constants that is shown in the right-hand side of FIG. 5I. This table is part of the logical word table LCWORD, as can be seen in FIG. 11E. A value LTMP is calculated as the highest address within the table LCWORD which would be occupied by the new logical variable or variables (the logical variable may be an array). If this address LCWORD exceeds the last address LGBBREG within the table LCWORD that is available to new global logical variables, then an error message is printed out at step 475. Otherwise, a pointer IGBREG to the next empty global logical variable location within the table LCWORD is stored in LDADR as the logical variable address, and the poiner IGBREG is advanced so that it points past the location(s) where this new logical variable(s) is to be stored. Program control then continues at 477 where the address LDADR of the newly created logical variable is placed in a location LOC(1). A −1 is placed in a second location LOC(2) to indicate that this is a core address.

A check of the symbol reference is made to see if the new logical variable has a name. If it does, the name is entered into the system directory by the subroutine WRSYMB (FIG. 17/620). If the symbol name is not entered into the directory for some reason, program control continues at 473 where an error message is printed out. Otherwise, program control continues at 472.

Beginning at step 472, any initial values of the global variable are placed into the allotted storage space. With reference to the symbol reference module 1C shown in FIG. 5H, these initial values begin with the sixth location within the load module and continue on to the end of the load module. There may or may not be sufficient initial values to fill the entire array of allocated storages spaces. At 472, the starting address of the logical variable array is stored in LMN, and the number of initial values MDS is calculated as the length of the module LN minus 5. A constant ICS is then calculated as the number of storage spaces to be occupied by the initial values less the number MDS which are predefined. If the number of initial values is greater than zero, a DO loop is entered which extends through step 471 and which transfers the initial values into the logical variable storage space within the table LCWORD. If there are no initial values specified, then NDS is equal to zero and so program control commences at 474 and the above mentioned loop is skipped. Beginning at 474, a check is made to see if any of the locations assigned to the global variable have not been assigned initial values. The number of such locations is stored in the location ICS. If ICS is not equal to zero, then a DO loop is entered extending through step 478 which loads zeros into the remaining locations. If ICS is equal to zero, this DO loop is bypassed and program control continues at 479. Ultimately, program control is transferred to 454 where the address LDADR of the global variable is inserted into the new file.

Returning to the steps immediately following 470, if the type number of the symbol is found to be greater than or equal to four, the symbol name is that of a process variable which does not exist within the system. This represents an error, and hence an appropriate error message is printed out at 465.

If the global type number is not that of a logical or process variable, then it must be a global real, integer, or floating point variable which is to be stored in the table LBLNAM shown in FIG. 5I. The highest address within the table which would be occupied by the new global variable is calculated and is stored in a location LTMP. If LTMP is greater than the highest address in the table LBLSZE, an appropriate error message is printed out at 475. Otherwise, the address of the constant within this table is converted into an absolute core address by the program CVTOAB, and the empty pointer LBLPTR to the table is adjusted to point to the next location past where this array is to be stored. Program control then commences at 477 just as in the case of a logical global variable with the entry of the global name into the file directory, the loading of initial values for the variable into the global storage area, and the loading of zeros into any remaining locations within the global storage area. Ultimately, program control returns to 454 where the address of the new global variable is placed into the new file.

The subroutine which processes type 1D beginning of file modules begins at step 500 in FIG. 17/500E. This subroutine commences by setting the flag LMT1D true. The subroutine then enters a loop which retrieves the seven entries from this module and stores these entries in the table JHDR that is shown in FIG. 5E. Various pertinent loader program constants are then set to zero, and program control is returned to the location 120. It should be noted that the subroutine beginning at 500 is the only file loader subroutine which sets the flag LMT1D true. Once this flag is set true, all the other subroutines are allowed to create a file in the normal manner. However, if LMT1D is cleared or set false by the programming steps following 600 in FIG. 17/500E, this causes all of the file generating steps to be bypassed except for those steps which examine each load module, determine the length of each load module, and proceed to the next load module. Once the value LMT1D has been set false, the file loader program does essentially nothing but scan load modules until the next beginning of file module is found. The file loader program then begins to create a new file.

The trigger modules (type 1E) are processed by the routine which begins at 550 in FIG. 17/500E. This routine first checks the flag LMT1D and then checks to see that the address stored in NXTTRG, the pointer to the table JTRIGR (see FIG. 5F) is less than NTRGS, the length of that same table. If the table JTRIGR is full, an appropriate error message is printed out and program control continues at 9000. Otherwise, a DO loop is entered at step 552 which transfers the trigger name from the load module into the table JTRIGR beginning with the location NXTTRG. The pointer NXTTRG is then increased by three and the record of the number of triggers stored in the location NOTRGS is increased by one. Program control then returns to step 120.

Cancel load modules of type 1F are processed by the routine 600 which appears in FIG. 17/500E. This routine simply clears or sets false the value of LMT1D. Program control is then returned to 120. This subroutine effectively cancels operation of all of the other subroutines and prevents any file creation until the next beginning of file module is encountered. Hence, the file which is currently beinb fed into the system is not entered into the system, but is cancelled.

The subroutine READAC which reads load records into the buffer LDRECD (FIG. 5A) is shown in FIG. 17/510. This subroutine begins by calling upon a subroutine RBINRD to read a load module into the core buffer LDRECD. The subroutine then checks to see if a sequence check is to be carried out, indicated by a "1" bit in the leftmost bit position within the second word in the load module. If a "1" bit is present, the sequence check is bypassed by a program jump to step 30. Otherwise, the sequence number is retrieved from the second location within the module. A check is then made to see if the argument NSEQ is negative. This is true only when the first load module is read into core, because the programming steps beginning at step 1 in FIG. 17/500A place a "−1" in this location. If NSEQ is negative, then it is set equal to the sequence number in the load module which has just been read into core at step 20. If NSEQ is not negative, a check is made to see if NSEQ plus one equals the new sequence number ISEQ. If so, then NSEQ is set equal to ISEQ at 20. Otherwise, an argument KER is set equal to 2 as an error flag. Program control is then returned to the calling program.

At 30, a check is made to see if a checksum check is to be carried out. If the 14th bit within the second entry of the load module is set equal to one, then this checksum check is bypassed. Otherwise, a checksum check is carried out by the second step beyond the location 30. A check sum value for the load module is calculated by a subroutine LCKSM. The mechanism whereby this checksum computation is carried out is not relevant to the present invention, and the subroutine LCKSM which performs this check is not disclosed. The result of this check is compared with the 54th data value in the load record. If they are equal, the load record is probably free from errors. Program control continues at 40 where the argument KER is set equal to one. Otherwise, the argument KER is set equal to three to indicate that an error exists in the load record. Program control then returns to the calling program.

The subroutine RBINRD (FIG. 17/520) actually reads the load module into core. After retrieving the necessary arguments, this subroutine loads a device number IDEV into register G and requests an appropriate executive subroutine to read in a load record. After this executive call, the address of a buffer into which the record has been loaded is returned as an argument stored in register E. This address is stored temporarily in a location DEVBUF. Index register C is then loaded with "53", and "7" is loaded into the designator register to produce automatic post-addressing based upon index register C. A loop is then entered at RBIN1 which transfers values between the executive buffer DEVBUF and the file loader program core buffer IRECD which is identical to the buffer LDRECD shown in FIG. 5A. "4" is then stored in the designator register to terminate postaddressing, and an executive read terminate subroutine is executed to release the input device for use by other system task levels. Program control then returns to the calling program.

The subroutine ERRTN which prints out error messages appears in FIG. 17/530. This routine simply prints out the message "FILE LOAD ERROR" followed by an error number and a file name. This printed message enables the systems engineer to determine the type of error which occurred and the file which was being loaded at the time when the error occurred.

Trigger connections within the system are established by a subroutine TRICON which appears in FIG. 17/540. A block diagram of this subroutine appears in FIG. 5K. Upon entry to the subroutine TRICON, a DO loop is established which extends from the beginning of the subroutine to step 9 within the subroutine. During each pass through this DO loop, a trigger name is examined and, if possible, a connection is established so that the file or logical variable bearing that name triggers execution of the subtask whose subtask number is LTASK. The subroutine TRICON assumes that the trigger names are stored in a table NMETRG that is identical to the table JTRIGR shown in FIG. 5F. The number of triggers is assumed to be stored in a location NTRGS.

During each pass through the DO loop, the subroutine first checks to see if the first location within the trigger name array contains zero. If it does, then the second location within the array contains the address (FIG. 11F) of a logical variable which is to trigger the subtask. This address is stored in a location LADDR, and program control continues at step 7. The logic initiator trigger connect subroutine TRGCON is called upon to establish the designated logical variable as a trigger. The pointer NXTTRG to the trigger name table is then incremented, and program control continues at the beginning of the DO loop.

If the trigger does have a name, program control commences at 1. A call to the subroutine RDSYMB is executed to determine: first, whether the trigger is defined within the system; secondly, whether the trigger name is the name of a file or of a global variable; and thirdly, to obtain the address of the file or global variable. If the trigger name is not defined, program control continues at 12 where an error message is printed out. If the trigger name is defined and is the name of a global variable, program control continues at 100. It is assumed that the global variable is a logical global variable which is to trigger execution of a subtask whenever the variable changes its state. The address of the logical global variable is stored in a location LADDR. Program control then continues at 7 with a call to the subroutine TRGCON to connect up the logical global variable as a trigger.

If the trigger name is defined and is the name of a file, program control commences at 101. The file is read into a core buffer by the subroutine RDFIL. The file type number plus one is calculated and is stored in a location LTYP. A direct transfer is then executed to one of three locations depending upon the type number of the file. If the file is of type numbers 0, 1, 2, or 3, the file is an analog scan file or a calculated value file. Program control then commences at 3. The subroutine GNFIL is called upon to generate a type 13 subtask bidding file and to link the subtask bidding file to the analog scan or calculated value file which is to be the trigger for the subtask LTASK. If the file is of type numbers 4, 6, or 10, the file is a contact closure input, a contact closure output, or some other type of logical variable file. In this case, program control commences at 4. The register and bit numbers of the logical variable are retrieved from the file by the subroutine SFILE. These numbers are converted into a logical word address (see FIG. 11F) by the step which follows step 5, and the logical word address is stored in the location LADDR. The logic initiator trigger connect subroutine TRGCON is then called upon to establish this logical variable as a trigger for the subtask LTASK. The pointer NXTTRG to the trigger name table MNETRG is then advanced, and another cycle of the DO loop commences.

When all of the trigger names have been processed by the DO loop, program control returns to the calling program.

B. THE FILE AND DIRECTORY SYSTEM SUBROUTINES

All of the system file handling and directory handling subroutines are illustrated in the figures beginning with FIG. 17/601 and continuing through FIG. 17/629. A block diagram of almost ever subroutine appears in the figures beginning with FIG. 6/100. The following discussion is therefore limited to those details of each subroutine which are not apparent in the block diagrams.

i. RDFIL

The subroutine RDFIL appears in FIG. 17/601. A block diagram of the subroutine RDFIL appears in FIG. 6/300. The initial steps through step 12 and the steps commencing with step 20 correspond to step 2002 in the block diagram. The core-resident test is carried out at step 12. If the file is core-resident, then the second location in the array J contains minus one and program control continues at step 120. If the file is normally disk-resident, program control continues with a call to the subroutine TYPSZE two steps beyond step 12.

The subroutine RDFIL must determine which of the four system file storage areas a file resides in. These storage areas have slightly different characteristics, and therefore require different handling. The subroutine TYPSZE is called upon to determine which of the disk-resident file storage areas IFSECT or IDSECT a file is stored in. This subroutine TYPSZE returns as an argument KSZ one of the two sector lengths NSPGSZ or NSDTSZ in accordance with the particular disk storage area in which a file resides. NSDTSZ is the length of sectors in the general file disk storage area shown in FIG. 6/110, and NSPGSZ is the length of sectors in the triggered file disk storage area shown in FIG. 6/111. In the case of control chains, the control chain may occupy more than one disk sector and therefore an extra large storage space for the file is required. The fourth step past step 12 therefore checks to see if the file starts in the first location within the sector. If it does, the file is definitely a control chain sector and the sector length KSZ is equal to a variable LRGCHN that is equal to the length of the largest permissible control chain. In the case of core-resident files, a call to a subroutine CVTORL determines whether a file is stored in the storage area LCORE or in the storage area NCORE (see FIGS. 6/108 and 6/109). Different subroutines 140 and 180 are provided for retrieving files from the two different core storage areas.

ii. WTFIL

The subroutine WTFIL appeard in FIG. 17/602, and a block diagram of the same subroutine appears in FIG. 6/200. This subroutine operates in a manner that is quite similar to the RDFIL subroutine which has just been described, and the discussion of that subroutine which has already been presented is also applicable to the subroutine WTFIL.

iii. MOVFIL

The subroutine MOVFIL appears in FIG. 17/603. This subroutine consists of a simple DO loop which transfers data values from a first core buffer LA to a second core buffer LB. The number of data values transferred is equal to NUM.

iv. GNFIL

The subroutine GNFIL is shown in FIGS. 17/604A through 17/604H. A block diagram of this subroutine appears in FIGS. 6/100, 6/101, 6/102, and 6/103. The subroutine requires the following data values as arguments:

| | |
|---|---|
| LTYPE | File type number. |
| LSYM | Array containing file name, or zero if file has no name. |
| LBUF | Core buffer containing file data except for file header. |
| NSZE | Length of file data. |
| NCVTR | Analog-to-digital converter number. |
| LPERD | File periodic bidding frequency index. |
| LRESD | Zero for core-resident file, one for disk-resident file. |
| MNETRG | Name of file which is to trigger operation of the new file. |

The subroutine GNFIL returns an argument LOC which is an array containing a directory pointer to the file and the length of the disk sector in which the file is stored (if any), and an argument IEC which equals 1 if the file is successfully established within the system and which equals some other value if for some reason the file could not be established within the system.

Upon entry into the subroutine (FIG. 17/604A), the file length is limited to 4,092 locations and the file type number is determined. A constant J which equals the number of entries in the file header is set to an initial value of 2, and a constant JC which equals the length of the type 8 file that is to precede the new file is set to an initial value of zero. Program control then branches to step 10, 40, or 50 (which steps correspond respectively to steps 6/1104, 6/1132, and 6/1136 in FIG. 6/100) in accordance with the file type number.

At step 10, it is assumed that the file is to be connected into an analog scan subtask linkage. The constant J, which is the length of the file header, is increased by 1 to leave room for a linkage pointer (see FIG. 6/104). The length of the file, which is stored in ITPH(1), is also increased by 1. A check is then carried out to see if a trigger name is stored in the array MNETRG. If so, then the new file is to follow a specific file. Program control continues in FIG. 17/604A which corresponds to step 6/1106 in FIG. 6/100. Otherwise, the new file may be placed in any analog scan subtask assigned to the same scanning frequency as the file. In this case, program control continues at step 12 in step 17/604B.

At step 12, a constant K which represents the size of the file is set equal to the length of the file header J plus the file size LSIZE. Continuing in FIG. 17/604C, a check of the argument LPERD is then made to see if the file has been assigned a scanning frequency index. If the file has been assigned a scanning frequency index, program control continues in FIG. 16/604C which corresponds to step 6/1124 in FIG. 6/100. If the argument LPERD is equal to zero, however, the file is treated like a general file. Program control continues at 50 in FIG. 17/604F which corresponds to step 6/1136 in FIG. 6/100.

Program control now commences at one of four different locations, depending upon the file type: for general files, program control commences at 50 in FIG. 17/604F; for control chain files, program control commences at 40 in FIG. 17/604E; for files which are to be linked into a subtask linkage of files, program control commences at the top of FIG. 17/604C; and for files which are to follow a designated trigger file, program control commences at the 5th step past step 10 in FIG. 17/604A. The steps which follow find storage space for the file, create the file header, enter the file name and address in the system directory, and assemble the file in core. Disk-resident files may be transferred into disk storage by step 39 (FIG. 17/604D), or by other similar steps. In the case of general files, program control then returns to the calling program by way of steps 101 (FIG. 17/604F) and 100 (FIG. 17/604H). For all other types of files, program control now commences at 415 in FIG. 17/604E.

The two steps following step 415 either return program control to the calling program via steps 101 and 100 or transfer program control to step 432 in FIG. 17/604E in dependence upon whether the file is an analog scan or calculated value file. If the file is an analog scan or a calculated value file, it may be necessary to alter the analog scan subtask number assignments, and in this case program control is transferred to step 432 in FIG. 17/604E which corresponds to step 6/1120 in FIG. 6/101. Ultimately, program control continues at 101 (FIG. 17/604F) where the output argument IEC is set equal to 1 and where program control is returned to the calling program by way of step 100 (FIG. 17/604H). In case of an error, the routines 102 to 111 shown in FIG. 17/604H set the argument IEC equal to some value other than 1 and then return program control directly to the calling program.

If the new file is to follow a specifically designated file in an analog scan subtask linkage of files, program control commences at the 5th step past step 10 in FIG. 17/604A. The triggering file name is located in the system directory using the subroutine RDSYMB. If a directory entry containing the triggering file name exists and is not assigned to a global constant, program control continues at 1001 with a call upon the subroutine TYPSZE to determine whether the triggering file is assigned to the general file disk storage area (FIG. 6/110) or to the triggered file disk storage area (FIG. 6/111). If the trigger file is assigned to the general file disk storage area, an error has occurred, since a general file may not serve as a trigger file. If the trigger file is assigned to the triggered file disk storage area, then program control continues at 1002. The sector number of the triggering file is transferred from LOC(1) to a location ISX, and the address of the triggering file within that sector is transferred from LOC(2) into a location LP. "1" is placed in the location IEA to serve as an argument for the subroutine LNKSEQ when that subroutine is called upon at a later point. This argument causes the subroutine LNKSEQ to link the new file immediately following the triggering file within the subtask linkage. "3" is placed in a location IEB to disable the subroutine OPNBUF at a later point. The new file bidding frequency index LPERD is stored in a location IAB so that the test following step 432 in FIG. 17/604E causes the alter sublevel linkage routines to be bypassed by a transfer to step 101 in FIG. 17/604F. The length NSPGSZ of a disk sector in the subtask and triggered file disk storage area (see FIG. 6/111) is stored in a location IBFSZE so that the sector containing the file linkage may be properly written back into disk storage by the call to the subroutine MASSWT which follows step 39 in FIG. 17/604D.

A type 8 coupler file always precedes a file which is intentionally linked to a triggering file. This type 8 file is created in the 4th, 5th, and 6th locations within an array ITPH (see FIG. 6/112). The 7th step following step 1002 in FIG. 17/604B fills the location ITPH(4) with the file type number 8 stored in the left-most 4 bit positions, as is shown in FIG. 6/112. The step which follows checks the argument LRESD to see whether the new file is to be disk- or core-resident. If the new file is to be core-resident, program control continues at step 2000 in FIG. 17/604B. If the new file is to be disk-resident, program control continues in FIG. 17/604B.

Assuming the new file is to be disk-resident, a constant JC is set equal to 3 to indicate that a type 8 file 3 locations in length is to precede the new file. The amount of storage required both for the new file, for the header of the new file, and for the type 8 file is then computed and is stored in a location K. The sector into which the new file is to be placed is then transferred into a core buffer NSTPGN, and the subroutine LOCHOL finds a hole within this sector to receive the new file. Program control then continues at 1003 in FIG. 17/604B with the creation of a type 8 coupler file within the array ITPH. Because of the coupler file, the new file begins in the third location within the hole found by the subroutine LOCHOL. The second element of the file address within the address array LOC is therefore set equal to N+JC, where N is the relative address of the hole within the sector and where JC is equal to 3. The new file is then assembled in the core buffer NSTPGN. If the file is not a subtask bidding file (file type number "LTYPE" equals 13), the subroutine WRSYMB is called upon to enter the file name and address into the system directory. A directory pointer to the directory entry is received back from the subroutine WRSYMB and is stored in the location ITPH(2). Ultimately, the first three elements in the array ITPH become the file header (see FIG. 6/112). The empty file linkages are then adjusted by the subroutine OPNFIL so as not to include the location into which the new file is to be placed. The subroutine LNKSEQ is then called upon to link the type 8 coupler file into the subtask linkage of files, and the subroutine MOVFIL transfers the type 8 coupler file into the temporarily core-resident file storage area sector. These two subroutines are then called upon a second time to link the header of the new file into the subtask linkage of files and to transfer the file header into the temporarily core-resident file storage area sector. The subroutine MOVFIL is then called upon one last time to transfer the file data into the temporarily core-resident file storage area sector. Program control is then transferred to step 39 in FIG. 17/604D where the file storage area sector is transferred back into disk storage by the subroutine MASSWT. Program control then returns to the calling program via steps 415, 432, 101 and 100.

Other types of files which are to be stored in a disk-resident file storage area are assembled in a manner similar to the way in which triggered files are assembled. Non-triggered files do not require the assembly of a type-8 coupler file, and general files do not require the services of the subroutine LNKSEQ. When a non-triggered monitor data file which is to be linked into a subtask linkage of files is assembled, a subroutine LOCSEQ is calld upon to determine into which converter set the file is to be linked. Files which are to be stored in core-resident file storage areas are assembled in a similar manner, but do not have to be transferred into disk storage after assembly. Eight different sections of the subroutine GNFIL carry out file assembly operations, and the above description is intended to suffice for all eight sections.

If a triggered file is to be core-resident, program control commences at step 2000 in FIG. 17/604B. The constant JC is set equal to 3 to indicate that a coupler file containing 3 locations is required. The constant K is set equal to 3, since a location within the disk sector of the triggering file 3 locations long is required to store the coupler file. The size KC of the new file is then calculated as J, the size of the file header, plus LSZE, the length of the file data.

The disc sector where the triggering file resides is then read into a core buffer, and the subroutine LOCHOL finds a hole within the sector large enough to contain the 3-element coupler file. Beginning at 2001, the subroutine LOCHOL is called upon a second time to find a location for the new file within the core file storage area LCORE. The subroutine CVTOAB is then called upon to compute the absolute address of the new file within the core buffer LCORE, and this address is stored in LOC(1). Since the file is to be core-resident, a −1 is placed in LOC(2). The file name and address are then entered into the system directory by a call to the subroutine WRSYMB.

Beginning at step 2003, a directory pointer LDIR to the directory entry for the new file is stored in the second location within the file header, the location ITPH(2) (see FIG. 6/112). A zero is placed in the third entry within the file header, the location ITPH(3), as an indication that no other file is linked to this file. The absolute core address LOC(1) of the new file is stored in the second location within the type 8 coupler file, the location ITPH(5).

The subroutine OPNFIL alters the empty file linkages within the core file storage area LCORE and releases that area which is to be occupied by the new file. Successive calls to the subroutine MOVFIL load first the file header and then the file data into this opening. The subroutines OPNFIL, LNKSEQ, and MOVFIL then establish the type 8 coupler file within the disk sector of the triggering file and link the type 8 coupler file directly behind the triggering file in the subtask linkage of files. Program control then commences at step 39 in FIG. 17/604A where the disk sector containing the triggering file and the coupler file is transferred back into disk storage.

FIG. 17/604F shows the program listing which creates a general file. This program listing begins at step 50 and corresponds to the steps following step 6/1136 in FIG. 6/100. The length of the file and of the file header is calculated and is stored in a location K. The argument LRESD is then checked to see if the file is core-resident. If it is, program control is transferred to step 5050 in FIG. 17/604G.

Assuming the new file is to be disk-resident, a DO loop is entered which searches through the entries in the index sector NLNKM (FIG. 6/110) looking for an entry whose numerical value is greater than or equal to the length K of the new file. During each pass through the loop, a 256-location section of the general file storage area index sector NLNKM is read into core. A second DO loop is then entered which checks each of the 256 entries. This second DO loop beings 4 steps ahead of step 52 and terminates at step 52. When (and if) an entry is found containing a number greater than or equal to K, program control continues at 53. At 53, the address of the corresponding sector in the general file storage area is calculated and is stored in a location ISX. The value of the entry is then again checked to see if the entry is equal to "$FF_{16}$". If the entry is "$FF_{16}$", the sector is completely empty and has not been used previously. In this case, program control continues at step 54. Beginning at step 54, a general file storage sector is created within the core buffer NSTDAT. The three sector header locations are loaded respectively with 3 (empty file pointer), zero (empty word pointer), and "$EOFD_{16}$" (header for an empty file whose length equals the sector length−253). Zeroes are placed in the remaining 253 locations within this buffer, and program control continues at step 56. Returning to the 2nd step past 53, if the location within the index sector does not contain "$FF_{16}$", then the general file sector already contains one or more files. The sector is transferred into the core buffer NSTDAT by the third step following step 53. Program control then continues at step 56.

At step 56, the subroutine LOCHOL is called upon to locate an opening within the general file storage sector for the new file. The subroutine LOCHOL returns an argument L which corresponds to the argument IEC shown in FIG. 6/140. If this argument equals 3, then a new general file may not be placed into this sector. In this case, program control continues at step 57 where the index sector NLNKM is read back into core, and program control then commences once again at 52 within the inner DO loop. If the argument L equals 1 or 2, then there is room within the sector for the new file. In this case, program control commences at step 58.

Beginning at step 58, the address of the new file is stored in the array LOC. The file sector number is stored in LOC(1) and the relative address of the file within the sector is stored in LOC(2). The name of the file is then entered into the system directory by the subroutine WRSYMB. At step 59, a directory pointer to the directory entry for the new file is stored in the second location within the array ITPH (See FIG. 6/112). This location ultimately becomes the second entry in the header for the new file. The empty file linkages within the sector are then adjusted by the subroutine OPNFIL to exclude the location where the new file is to be placed. The new file header and the new file data are then loaded into the sector by two successive calls to the subroutine MOVFIL. The file storage sector is then written back into disk storage.

The programming steps beginning three steps before step 60 sort through the disk sector into which the new file has been placed looking for the largest hole into which another new file may be placed, and these same steps store the size of this hole in the sector entry within the index sector NLNKKM (FIG. 6/100). Beginning three steps before step 60, zero is placed in a location LHOLE and N is loaded with the contents of the first location within the sector, the empty file pointer location. If N is zero, the sector contains no holes, so program control is transferred to step 62 with LHOLE equal to zero. If N is not zero, a loop is then entered which extends from step 60 to the fourth step past step 60. During each pass of this loop, a constant K is set equal to the length of a hole or available slot within the file storage sector. If K is greater than the value stored in LHOLE, the value of K is placed in the location LHOLE. The address of the next hole within the file storage sector is then stored in the location N, and a check is carried out to see if N is equal to zero. If N is not equal to zero, the loop continues. When N is finally equal to zero, every hole within the file storage sector has been checked. At 62, the index sector NLNKM is read back into core storage, and the value LHOLE is stored in the appropriate entry within the index sector. The index sector is then transferred back into disk storage, and program control is returned to the calling program via step 101 with the directory pointer LDIR for the file stored in LOC(1).

A core-resident general file is established within the system by the programming steps beginning with step 5050 in FIG. 17/604G. A block diagram of these programming steps appears in FIG. 6/103. The subroutine LOCHOL finds the smallest available hole within the core storage area NCORE and returns the relative address of this hole. The subroutine CVTOAB then converts this relative address into an absolute core address and stores the absolute core address in the first entry of the array LOC. A "−1" is placed in the second entry of the array LOC to indicate that this is a core-resident file. The file name is then entered into the system file directory by the subroutine WRSYMB, and the directory pointer LDIR is loaded into the second file header entry of the table ITPH (see FIG. 6/112). The subroutine OPNFIL adjusts the empty file linkages so as not to include the hole into which the new file is to be placed. The new file header and the new file data are then moved into position within the hole by two calls upon the subroutine MOVFIL. Program control then returns to the calling program.

If a new file is to be periodically bid, the file is processed by the programming steps beginning with the 2nd step in FIG. 17/604C. These steps correspond to the steps following step 6/1124 in FIG. 6/100.

The bidding frequency index LPERD for the file is multiplied by two and is added to the disk or core argument LRESD. The resultant sum is stored in the location LPERD. It will be remembered that the argument LRESD is equal to zero for files which are to be core-resident and is equal to one for files which are to be disk-resident. Hence, LPERD now equals two times the bidding frequency index of a core-resident file or two times the bidding frequency index plus one of a disk-resident file. This modified value LPERD is the value which is stored in the left-hand portion of entries in the index sector LNKM. The sector LNKM appears in the right-hand half of FIG. 6/111.

The index sector LNKM is read into a core buffer. A DO loop is entered the scope of which is limited by a constant NSBLVL, a number equal to the number of subtasks assigned to analog scan data files. Each time through this loop, an entry in the index sector LNKM is retrieved, and the left-most six bits of the entry are stored in a location IAB. If the index sector entry (NSTPGM(IF)) is minus 1, the corresponding sector is full, so the next entry is checked by a transfer to step 13, the last step in the DO loop. A check is then made of the argument LRESD to see if the new file is to be core-resident. If it is, program control continues at step 5000 in FIG. 17/604D. Assuming for the moment that the sector is to be disk-resident, checks are made to see if the value stored in LPERD is equal to or is less than the value stored in IAB. If the two values are equal, then a subtask linkage of files has been found which is assigned to the same bidding frequency index as that assigned to the new file. Program control commences at step 14 in this case. If LPERD is found to be less than IAB, then no more subtask linkages of files exists within the system which are assigned to the same bidding frequency index as that of the new file. Similarly, if IAB is found to be equal to zero, a subtask linkage of files has been found which contains no files. In both of these instances, program control is transferred to step 17. With reference to FIG. 17/604D, the same precise tests are carried out in the case of files which are to be core-resident beginning at step 5000. In either case, if all three of the tests fail, the corresponding subtask linkage of files is assigned to a bidding frequency index that is lower than that of the new file. Program control then proceeds to step 13 which is the return point for the DO loop in FIG. 17/604C. The value of the DO loop index IF is incremented, and the index sector entry for the next subtask linkage of files is checked out in a similar manner.

When a subtask linkage is found which is assigned to the same bidding frequency index as the new file, and assuming for the moment that the new file is to be disk-resident, program control commences at step 14 in FIG. 17/604C. A constant IAB is set equal to three to disable the OPNBUF subroutine, since a new sector is not required. The sector number ISX of the disk sector containing all files assigned to this subtask linkage is calculated as the base address IFSECT plus the right-most 10 bits of the entry in the index sector LNKM for this subtask linkage (see FIG. 6/111). The sector is transferred into a core buffer and the subroutine LOCSEQ is called upon to determine whether the new file may be connected into any of the existing converter sets within the subtask; and if not, to determine whether a new converter set may be added to the subtask linkage. If the new file may be added to the subtask linkage, program control continues at step 15 with a call to the subroutine LOCHOL which determines whether there is room to store the new file within the sector.

If there is room for the new file, program control continues at step 16. If either one of the subroutines LOCSEQ or LOCHOL determines that the new file may not be added to this sector, the program control continues at step 30 where the index sector LNKM is read back into core. Program control is then transferred to step 13, and the DO loop is entered once more to check the next entry in the index sector.

If the value LPERD is found to be less than the value IAB in the fifth step following the beginning of the DO loop, or if the value IAB is equal to zero, then the new file must be placed in a new sector and must be assigned to its own subtask number. In this case, program control commences at step 17. The step following 17 tests to see if zero is stored in the last entry in the index sector, thus indicating that at least one subtask number is available to be assigned to a new linkage of files. The subroutine LOCBUF is called upon to find a new sector ISX=NB into which the new file may be placed. The steps following step 18 create the new sector in the core buffer NSTPGM. A header for the new sector and an empty file (type E) containing all zero data values is created within this core buffer. The sector is an analog scan sector of the type shown in FIG. 6/111. The value "4" is then stored in a location IEA to bypass the subroutine LNKSEQ, since no linkages are required when only one file is present in a linkage. Program control then commences at step 15 where the subroutine LOCHOL finds a hole within the newly created sector for the new file.

In all cases, program control then continues at step 16. The sector size IBFSZE is set equal to NSPGSZ, the size of an analog scan sector within the subtask and triggered file disk storage areas (see FIG. 6/111). Program control then proceeds to step 20, and the file is established in the manner which has already been fully explained in connection with triggered files. Program control proceeds to step 39 and then to step 415, as has already been explained.

In the case of a periodically bid core-resident file, the program listing beginning at step 5000 in FIG. 17/604D is called into play. It has already been explained that the steps immediately following 5000 in this listing are incorporated within the DO loop shown in FIG. 17/604C and beginning with the fourth step in that figure.

It the value LPERD is found to be equal to the value IAB, this means that a subtask linkage of files has been found which is assigned to the same bidding frequency index as a new file. Program control commences at step 5014. The subtask number LVLBIT of this linkage is calculated. With reference to FIG. 10I, this subtask number includes a task number ITASK, the task number assigned to the data file processing program or analog scan program, and a sublevel number which is equal to the difference between NSBLVL, the maximum sublevel number assigned to any analog scan data file linkage, and the relative address IF of the entry in the index sector NLNKM which is being examined. The subroutine SUBLOC within the sublevel processor program is then called upon to supply the core address of this subtask. The address of the subtask is returned in an array LOC. The sublevel processor returns to zero as the second element of this array if the subtask is core-resident. Hence, if LOC(2) is not equal to zero, the subtask is not core-resident and program control is returned to the end of the DO loop in FIG. 17/604E. The subroutine CVTORL is also called upon to insure that the subtask is stored in the triggered file core storage area (FIG. 6/108) rather than in the general file core storage area (FIG. 6/109).

Program control then continues at step 5032. The subroutine LOCSEQ is called upon to determine whether the subtask linkage of files contains room for the new file. If the subtask does contain room for the new file, program control continues at 5015 with a call upon the subroutine LOCHOL to find an opening within the core storage area LCORE for the new file. If either one of these subroutines indicates that the new file may not be placed into this subtask linkage, program control returns to step 13 in FIG. 17/604C and the next subtask linkage of files is checked. Otherwise, program control continues at step 5016 where the subroutine CVTOAB is called upon to determine the absolute core address of the location where the new file is to be stored. Program control then commences at step 5020.

Returning to the steps following step 5000, if LPERD is found to be less than the value IAB or if the value IAB is equal to zero, then no subtask linkages exists within the system which are assigned to the same bidding frequency index as the new file and which have room for the new file. Program control then commences at step 5017. It is necessary to establish a new subtask linkage for the new file within core. Since core-resident subtask linkages are preceded by a two-element type 8 coupler file of the type shown in the lower half of FIG. 6/106, "2" is added to the value of K, the length of the file, to make room for this coupler file. The subroutine LOCHOL is then called upon to find an opening in the core file storage are LCORE big enough for the new file and for a two-element coupler file. Beginning at 5018, the coupler file is first created. The first location within the coupler file is loaded with the number "$800_{116}$". With reference to FIG. 6/106, the type number of the coupler file is thus designated as 8 and the number of converter sets is set equal to one. The second location within the coupler file is loaded with a linkage pointer "2" to the new file which is to immediately follow the coupler file in core storage. The value 4 is placed in a location IEA to inhibit the operation of the subroutine LNKSEQ, since no linkages are required when only a single file is in a subtask linkage. The absolute address of this type 8 coupler file is calculated by the subroutine CVTOAB and is stored in a location NSTPGM. Two is then added to the value of N, and program control commences at 5016 where the absolute core address of the new file is calculated and is stored in the location LOC(1). Program control then continues at step 5020.

At 5020, minus one is placed in LOC(2) to indicate that the new file is core-resident. IBFSZE is set equal to zero, since the new core file does not occupy any disk storage area. Unless the new file is a type-13 coupler file, the file name is written into the file directory by the subroutine WRSYMB, and at the step preceding step 5022 (FIG. 17/604E) the directory pointer returned by the subroutine WRSYMB is loaded into the file header second location ITPH(2) (see FIG. 6/112).

The new file is created beginning at step 5022. The subroutine OPNFIL is called upon to alter the empy file linkages around the hole which is to be occupied by the new file and by a type-8 coupler file, if any. The subroutine MOVFIL is called upon to load the two-element type 8 coupler file (if any) into the hole, but only if the value of JC is equal to 2. If the new file is linked directly to a preceding file, then the value of JC is equal to zero and this call to the subroutine MOVFIL prodcues no action. The subroutine LNKSEQ then links the new file to its proper place within the subtask linkage. However, if the new file is the first new file in a new subtask linkage, the argument IEA is equal to 4. This causes the subroutine LNKSEQ to take no action. The header and the data for the new file are then loaded into the hole by two successive calls to the subroutine MOVFIL. Zero is then placed in the second location within the array LOC to indicate that the file is core-resident, and program control returns to step 415 in FIG. 17/604E.

Control chain files are handled by the program listing beginning at 40 in FIG. 17/604E. This program listing corresponds to the steps in FIG. 6/100 beginning with step 6/1132.

Beginning at step 40, the constant K is set equal to the file length. A check is then made to see if the control chain file is to be core-resident. If it is to be core-resident, program control commences at step 5040. The subroutine LOCHOL is called upon to find a location within the core storage area LCORE for the new file. The argument IEA is set equal to 4, and program control is transferred to step 5016 in FIG. 17/604D. The steps taken by that program have been explained fully above.

If the control chain file is to be disk-resident, program control continues with the third step past step 40. The subroutine LOCBUF is called upon to find an empty series of disk sectors large enough to hold the control chain. Program control then continues at step 41. Since no sector header is required by a control chain (see FIG. 6/111), the value "1" is placed in a location N so that the file is loaded into the first locations within the sector, and so that no room is left for a sector header. "3" is placed into a location L to render inoperative the subroutine OPNFIL. Since only one control chain is allowed to reside in a single group of sectors, there is no need to rearrange the empty file linkages within the group of sectors, and hence the services of the OPNFIL subroutinemay be dispensed with. A "4" is placed in a location IEA so that the LNKSEQ subroutine is disabled. ISX, the sector number of the first of the sectors into which the control chain is loaded, is set equal to NB, the sector number returned by the subroutine LOCBUF. The length of this sector IBFSZE is set equal to the length of the control chain. Program control is then returned to step 20 in FIG. 17/604C, as has been explained.

FIG. 17/604E contains the routine which is used to rearrange the assignment of subtask numbers to chain-linked analog scan data files. This routine corresponds to steps 6/1118 and 6/1120 in FIG. 6/100.

Upon entry to this routine one step past step 432, a test is carried out to see if the locations LPERD and IAB contain the same frequency index number. With reference to the eighth, ninth, and tenth steps in FIG. 17/604C, and also with reference to the first, second, and third steps past step 5000 in FIG. 17/604D, the value LPERD is only equal to IAB if the new file has been linked into an existing subtask linkage by the programming steps beginning at 14 in FIG. 17/604C and at 5014 in FIG. 17/604D. If the new file has not been linked into an existing subtask linkage, then LPERD is not equal to IAB, and a rearrangement of the subtask number assignments may be required. In this case, program control commences with the second step following step 432 in FIG. 17/604E. If the new file has been linked into an existing subtask linkage, then no rearrangement of the subtask number assignments is required. In this case, program control is transferred back to the calling program via step 101.

In the case of a file which is triggered by another file, and with reference to FIG. 17/604A, the value IAB has been set equal to the value LPERD by the 5th step past step 1002. Hence, new files which are required to follow an existing file do not trigger the operation of the routine shown in FIG. 17/604E.

Assuming that a new subtask linkage is required for the new file, program control continues two steps beyond step 432. The index sector LNKM (see FIG. 6/111) is read into a core buffer NSTPGM. The entry to go in this index sector for the new file is computed and is stored in a location LNKBF. This entry comprises the doubled frequency index LPERD shifted to occupy the left-most 6 bit positions (multiplied by 1,024) plus a constant that is either zero if the new file is core-resident or that as an index number designating the sector ISX into which the new file has been stored if the new file is disk-resident. By way of further explanation, the constant LRESD is equal to zero in the case of core-resident files, and therefore causes the second term in the third instruction past step 432 to be zero for core-resident files. In the case of disk-resident files, LRESD is equal to one. Therefore the difference between the sector number of the sector ISX occupied by the new file and the sector number of the first sector IFSECT within the file storage area (see FIG. 6/111) is added to the value stored in LNKBF.

A DO loop is now entered which searches the index sector entries for an entry containing zero. The relative address of this entry is stored in a location ME when program control commences at 441. The value "1" is stored in a location MT, and this location is then used to keep track of which entry in the index sector is being checked. The value "2" is stored in a location MF which is also used as a pointer to entries in the index sector, as will be explained. A location IF contains the address of the index sector entry which is to be assigned to the newly created subtask linkage of files.

The step preceding step 446 checks to see if the first entry in the index sector contains zero, indicating an available subtask, and if the location IF contains the address of this first index sector entry. If so, program control is transferred to step 442 in FIG. 17/604F where the new subtask is established. If not, program control continues at 446.

At step 446, a first loop is entered which extends through the step preceding step 450 in FIG. 17/604F. This first loop includes a second loop that extends from step 447 to the step preceding step 448.

Upon entry into the first loop at 446, a search is carried out for index sector locations which contain minus one. By way of explanation, when a subtask linkage of files is removed from the system, the DLFIL subroutine which carries out the removal (FIG. 17/606) places a minus one in the corresponding entry in the index sector. Assuming that no such entries are found, the first loop continues incrementing the contents of the locations MF and MT (step 449) until the second step past 446 determines that the locations IF and MT contain the address of the same index sector location. Program control then leaves the first loop and commences at step 450 in FIG. 17/604F where the index sector entries are re-shuffled to accommodate the new entry.

If the step following step 446 encounters an entry in the index sector which contains minus one, the second loop is entered at step 447. The second loop first checks to see if MT is the entry immediately preceding the entry IF for the new file linkage. If it is, program control is transferred directly to 442, and the new file linkage is assigned to the available index sector entry and to the corresponding subtask number. If MT is not the entry immediately preceding the entry IF, then (top of FIG. 17/604F) a check of the entry MF (the next entry) is carried out to see if this entry in the index sector also contains minus one. If the entry MF does not contain minus one, then the step following step 448 calls upon a MOVLNK subroutine to shift the subtask number and index sector assignment of the index sector entry MT to MF. If two or more consecutive entries are found which both contain minus one, the entry MF does contain minus one. The three steps at the top of FIG. 17/604F then decrements the address stored in IF and increment the address stored in MF while not altering the address MT. This process is repeatedly carried out until an entry MF is encountered which does not contain minus one. Program control is then transferred to 448, and the index sector entry MT is moved to MF by the subroutine MOVLNK. This shifting operation shifts a subtask assignment from one side of the minus one entry or entries to the other side of the entry or entries, and thus shifts the minus one entry or entries in the index sector closer to the position IF in the index sector where the new file linkage is tentatively to be placed. Repeated transfers between the first loop (entered at 449) and the second loop (entered at 447) then call upon the subroutine MOVLNK (step 448) repeatedly until step 447 determines that the minus one entry or entries have been shifted so that the first such entry whose address is stored in MT is in position to serve as the entry for the new file linkage. Program control is then transferred to 442, and the entry whose address is stored in the location MT is established as the entry for the new file linkage.

If program control reaches step 450, the same address is stored in the locations IF and MT. This happens when no minus one entries have been encountered during the course of the first loop. It is now necessary to shift the available index sector entry whose address is stored in the location ME into position for use by the new subtask file linkage. At 450, the address ME is placed in the location MT and the address ME-1 is placed in the location MF. A loop extending from step 451 to the step preceding step 442 then repeatedly calls upon the MOVLNK subroutine to shift the entries in the index sector until the available entry address MT is the address IF which is the address of the index entry that has been assigned to the new subtask linkage of files. Program control then continues at step 442.

When program control reaches step 442, it has been determined that the index sector entry for the new subtask linkage of files is the entry whose address is in the location MT. The location MT may contain an address that is different from the address IF originally assigned to the new file linkage, since the original address assignment did not take into account the fact that an earlier entry in the index sector may have been available due to the removal of a subtask from the operating process control system.

The subtask number LVLBIT to which the new file linkage has been assigned is first computed. With reference to FIG. 10I, this subtask number includes a task number portion ITASK which is the task level of the data file processing program and a sublevel number portion which equals the difference between NSBLVL, the number of entries in the index sector, and MT, the relative address of the entry for the new linkage of files. The task number portion is shifted by multiplication with the number 4,096 which is an integer power of two. The bidding frequency index L of the new linkage of files is then extracted from the six most significant bit positions of the location LNKBF divided by two, and the time period NPERD which corresponds to this bidding frequency index is retrieved from the table ITM (FIG. 6/112). The address NISX of the subtask is then calculated for the sublevel processor program. This address is either the core address of a core-resident file linkage or the sector number of a disk-resident file linkage. If the linkage is disk-resident, the argument LRESD is equal to plus 1. The term (1-LRESD) in the second portion of the fourth step past step 442 is equal to zero, and the second portion is thus reduced to zero. The address NISX is then the sum of IFSECT, the first sector in the subtask and triggered file disk storage areas (FIG. 6/111), plus the relative address of the sector in which the new file linkage is stored which address comprises the ten least significant bits of the number stored in the location LNKBF. If the linkage is core-resident, the argument LPERD is zero. In this case, the first portion of the fourth step past step 442 reduces to zero, and the address NISX is the core address LOC(1) of the file linkage.

The sublevel processor subroutine SUBLINK is then called upon to establish the new subtask linkage of files as an operative subtask within the process control system. The sublevel processor subroutine SUBABLE is then called upon to commence operation of the new subtask. A periodic bid for execution of the subtask is then established by a call to the subroutine SYNCLK within the periodic bidding program. The pre-calculated index sector entry LNKBF is then stored as the MTth entry in the index sector which is present within the core buffer NSTPGM, and the size IFSZE of the index sector is recomputed. The index sector is then returned to disk storage by the subroutine MASSWT. Program control then returns to the calling program via steps 9000, 101, and 100.

v. CLSFIL

The subroutine which adds an empty file to the empty file linkage appears in FIG. 17/605. This subroutine simply links the empty file into the empty file linkage and then returns program control to the calling program.

vi. LOCHOL

The subroutine LOCHOL which locates available openings in file storage areas appears in FIG. 17/607 and is shown in block diagram form in FIG. 6/140. This subroutine first checks to see if any open areas are linked to the empty file INDF. If INDF is equal to zero, then no open areas exist and so program control is transferred to step 50. At 50, a check is made to see if the sum of the unused storage pointer NXEN plus the new file size ISZE-1 is less than the end pointer which contains the address of the end of the file storage area NSSZ (see FIG. 6/107 for the precise definitions of these pointers). If so, then program control commences at 60. The address LHOLE of the location where the new file is to be stored is set equal to NNEN; an argument IEC is set equal to 2; and program control returns to the calling program. If there is no room for the new file, the argument IEC is set equal to 3 and program control returns to the calling program immediately following step 50.

Returning to the start of the subroutine, if the value INDF is not equal to zero, then a linkage of empty files exists within the storage area. Zeroes are placed in locations I, LHOLE, and LPHOLE. The value 4,096, which is stored in a location LFILMX, is transferred to a location LTSZ. The valve 4,096 is the size of the largest possible hole. A constant J is set equal to INDF, the empty file pointer.

A loop is then entered beginning with step 10. Each time through this loop, the contents of a location within the file storage area (whose relative address within the storage area is stored in the location J) is retrieved and is stored in a location K with the left-most four bits altered to zero. K thus contains a number equal to the length of an empty file. The length K of the empty file is then compared to the length of the new file ISZE. If the empty file is larger than the new file, program control continues at 20 with a check to see if the size of the empty file K is less than the size LTSX, initially 4,096 locations. Assuming that K is less than LTSZ, the value of K is stored in LTSZ; the value of J (the relative address of the empty file) is stored in LHOLE; and the value of I (initially zero) is stored in a location LPHOLE. Program control then returns to step 14. The value J (the pointer to the empty file) is transferred to the loction I, and J is loaded with the contents of the J plus first location within the file storage area, the pointer to the next empty file. If J is not equal to zero, program control commences at step 10 and the loop continues.

The net effect of the step just described is to search through the linkage of empty files looking for the smallest empty file which is still larger than the new file. Ultimately, when the last empty file is checked out, the value of J when checked three steps beyond step 14 is found to be equal to zero. A check is then made to see if any value other than zero is stored in LHOLE. If LHOLE still contains zero, this means that no empty files were found which are large enough to contain the new file. Program control is then transferred to 50 where a search for storage space at the end of the file storage area is carried out as has already been described. If LHOLE does not contain zero, then an empty file has been found which is large enough to contain the new file. Theargument IEC is set equal to one, and program control returns to the calling program. The relative addres LHOLE of the smallest hole large enough to contain the new file is returned to the calling program as an argument. In case a hole is to be removed from an empty file linkage, the relative address LPHOLE of the file immediately preceding the one into which the new file is to be placed is also returned to simplify the task of altering the empty file linkages if and when a new file is placed into the hole that was found.

vii. LOCSEQ

The program listing for the subroutine LOCSEQ appears in FIG. 17/608, and a block diagram of this subroutine appears in FIG. 6/160. It should be noted that the argument IX in FIG. 6/160 corresponds to the argument IEC in the actual program listing.

Upon entry to the subroutine, the address of a sector header or of a type 8 file which heads a subtask linkage is contained in the location NST, and the analog-to-digital converter number assigned to the file which is to be added to the linkage is stored in a location NCVTR. The subroutine begins by retrieving the linkage pointer to the first file in the linkage from the location NST(2), by adding one to this pointer, and by storing the resultant relative address in a location I. "I" then points to the linkage pointer within the first file that is already in the linkage. If the converter number for the new file is zero, the new file is reassigned the converter number 6. A constant K is then sew equal to the file converter number minus 1.

A loop is then entered which extends from step 5 to the step immediately preceding step 10. This loop corresponds to the loop comprising steps 16004, 16006, and 16008 in FIG. 6/160. The step immediately past step 5 checks to see if the file is an analog scan monitor data file. Analog scan data files are assigned the type numbers 0 through 3. In addition, al analog scan data files contain a zero bit in the left-most bit position within the 4th location within the file. The step immediately following step 5 checks for these two conditions. If the file is an analog scan monitor data file, program control continues at step 10. If not, then a check is made to see if the file linkge pointer location contains zero, thereby indicating that this is the lst file in the linkage. If the file is the last file in the linkge, program control commences at 100 where the argument IEC is set equal to 2 to indicate that the new file should be the first entry in the linkage. From there, program control is transferred back to the calling program. If the file is not an analog scan file and if the file is not the last file in the linkage, I is set to point to the next file in the linkage, and the loop continues.

Program steps beginning at 10 corresond with those beginning at 16012 in FIG. 6/160. The converter number of the analog scan file is retrieved from the file and is stored in a location IV. A check is then made to see if this converter number is less than the converter number K of the new file. If so, program control commences at 100 in the manner shown at step 16010 in FIG. 6/160. If not, then the address of the next file in the linkage is computed and is stored in the location J. Program control now enters a rather complex loop beginning with the program step 25. A check is first made to see if the next file in the linkage is an analog scan file. If so, program control commences at step 30. If not, then if the next file is the last file in the linkage, program control commences at step 80. At 80, a check is made to see if K, the converter number of the new file, is greater than the converter number of the last analog scan file checked. If it is, program control commences at 110 where the argument IEC returned to the calling program is set equal to 1. If it is not, then a new converter set must be created. The second step past 80 checks to see if a new converter set may be added to this file linkage without exceeding the maximum allowed number of converter sets. The maximum allowable number of converter sets is stored in a location NSETS. If a new converter set may be added, program control continues at 120 where the argument IEC is set equal to 3 before program control is returned to the calling program. If a new converter set may not be added, the return argument is set equal to 4 to indicate that the linkage is full, insofar as this new file is concerned.

Returning to the third step past step 25, if the test reveals that this is not the last file in the linkage, then the value of J is ltered to point to the next file in the linkage and program control is returned to the beginning of the loop, step 25. This loop continues until either the end of the linkage is found or until an analog scan monitor data file is found.

Each time an anaog scan monitor data file is found within the loop, program control commences at 30. The converter numbers of both the analog scan file just found and of the previous analog scan file in the linkage are retrieved and are respectively stored in locations JV and IV. A series of tests re then performed to determine whether the new file should go between these two files. A value M is computed as the difference between JV and IV. If M equals 1, then there is not room for a new file between the two analog scan files, since their converter numbers are adjacent. Program control commences at 70 in this case. The pointer I is loaded with the address J of the analog scan file just found, and the pointer J is loaded with the address of the next file in the linkage. A test is then made to see if that is the last file in the linkage. If not, program control is returned to step 20, the beginning of the loop. Otherside, program control continues at 80 in the manner just explained.

If M is not equal to 1 but is less than or is equal to zero, then the new file is in a different converter set than the old file. In this case, the new file may be linked between the two files which are under check if its converter number is greater than that of the old file or less than that of the new file. If this is so, program control commences at 110 where the argument IEC is set equal to 1. If not, program control continues at 70 as has been explained. If the value of M is positive and is greater than 1, program control commences at step 50. In this case, the new file may be placed between the two files which are under test if the converter number of the new file lies between the converter numbers of the two files. If this is so, program control commences at 110. Otherwise, program control commences at 70, as has been explained.

A different version of the subroutine LOCSEQ is available which arbitrarily assigns the converter number 16 to all calculated value files and which thus permits only one calculated value data file to be placed in each converter set. By dispersing the calculated value files in this manner, a smoother execution of monitor data file subtasks may be achieved.

viii. LOCBUF

The subroutine LOCBUF which locates an available sector for a new subtask assignment appears in FIG. 17/609 and is shown in block diagram form in FIG. 6/120. This subroutine closely resembles the subroutine LOCHOL shown in FIG. 17/607 and thus needs little in the way of further explanation. The only significant difference between the two subroutines is that the subroutine LOCBUF is checking disk sectors which must be read into core, whereas the subroutine OCHOL is checking storage areas which already exist within core. The computation following step 50 is slightly different but is fully explained in step 12006 of FIG. 6/120.

ix. OPNBUF

The subroutine OPNBUF which establishes linkages around the newly opened buffer appears in FIG. 17/610. A block diagram of this subroutine is shown in FIG. 6/130. The block diagram completely explains this subroutine, and no further explanation at this point is required.

x. OPNFIL

The subroutine OPNFIL appears in FIG. 17/611, and a block diagram of this subroutine appears in FIG. 6/150. It should be noted that the argument IDX in FIG. 17/611 corresponds with the argument IEC in FIG. 6/150.

The subroutine contains three entry points depending upon the value of IDX. If IDX equals 2 or 3, the simple steps shown in FIG. 6/150 for IEC equal to 2 or 3 are carried out, and program control returns to the calling program. If IDX is equal to 1, then program control commences with step 20 in FIG. 17/611. The argument NST is the address of the beginning of the file storage area. The size of the opening in the file is retrieved from NST(LI) and is stored in a location M. If the size of this opening is equal to ISZE, the size of the new file, program control commences at step 30. A pointer to the next empty file in the linkage is stored in a location N. This pointer previously occupied the empty file which is now being removed from the linkage and whose relative address is LI. Program control is then transferred to step 22. The argument LP is a pointer to the previous empty file in the linkage, if any exists. If LP equals zero, there is no previous file, and so program control commences at step 26. The empty file linkage pointer INDF for the file storage area is set equal to the value N, the pointer to the next file following that which has been removed from the linkage. Program control then returns to the calling program. If LP is not equal to zero in the step following step 22, then the value N is stored in the pointer location within the empty file that precedes the empty file which is now being removed from the linkage. Since the relative address of the preceding empty file is LP, the linkage pointer is placed into the relative location LP+1 within the file storage area NST. Program control then returns to the calling program.

Returning to the second step past step 20, if the size of the slot is not equal to the size of the file, then the difference between the size of the new file and the size of the slot is computed and is stored in a location L. A relative address N is also calculated as the address of the empty file LI plus the length of the file ISZE. N thus points to the first location beyond the locations which are to be occupied by a new file. If L is now found to be equal to one, then the unused part of the slot is one word in length. In this case, program control continues at step 40. The contents of the one word linkage pointer for the file, INWD, are transferred to the location I, and a zero is placed in the location J. If INWD equals zero, the unused word is the first in the linkage of the empty words. Program control then commences at step 46, and the address N is placed in the location INWD. Program control then commences at 43, and zero is placed in the empty word location NST(N). Program control is then transferred back to step 30 and from thence ultimately back to the calling program.

Returning to the third step past step 40, if INWD does not contain zero, then program control commences at step 42. To simplify the structure of the file, empty word locations are linked together in ascending order by address. Therefore a check is carried out to see if N, the address of the new empty location, is less than I, the pointer to the first location in the linkage. If so, then program control commences at 44. The address I of the first word presently in the empty word linkage is stored in the location NST(N), the new location which is to be added to the linkage. At this point, J equal zero, so program control continues at step 48. The one word linkage pointer INWD is loaded with the relative address of the new word N, and program control returns to step 30 and from thence to the calling program.

In the step immediately following step 42, if the value N is not less than I, then program control commences with the second step past step 42. The address of the first empty word pointer I is stored in a temporary location J, and I is loaded with the address to which it points, the relative address of the next empty location within the file storage area NST. If I is not equal to zero, then the end of the linkage has not been reached, and program control returns to step 42. A loop is thus entered, and each time through the loop, the address of an empty word location is compared to the address N of the new empty word.

Ultimately, either the address of an empty word is found which is greater than the address N or else the end of the linkage is found in which case I is equal to zero. If an address is found which is greater than N, program control commences at 44. The address of the location found is stored in the new address location N. J is not equal to zero in this case, so program control continues with the third step past step 44. The address of the new empty word location N is stored in the location NST(J), the immediately preceding empty word location. Program control then returns to step 30 and from thence to the calling program. If the end of the empty word linkage is encountered in the fifth step following step 42, then program control commences with the top instruction in the right-hand side of FIG. 17/611. The last previous location in the empty word linkage, the location NST(J), is loaded with the address of the new empty word location whose relative address is N. Zero is placed in the new empty word location NST(N), and program control then returns to step 30 and from thence to the calling program.

Returning to the 5th step past step 20, if more than one location is left over at the end of the hole or opening, an empty file is created to occupy this space beginning with the 6th step past step 20. The empty file header includes a first entry which contains the file type number left-shifted (TYP14) plus the empty file length L, and a second entry is the pointer to the next empty file in the linkage. This pointer is retrieved from the second location in the empty space, the location NST (LI+1). Program control then continues at 22 as has already been explained and ultimately returns to the calling program.

xi. LNKSEQ

The subroutine LNKSEQ which links a new file into an analog scan subtask linkage is shown in FIG. 17/612. A block diagram of this subroutine appears in FIG. 6/170. The argument IX in the block diagram corresponds with the argument IEC in the program listing. NST is the origin or start of the file storage area. HDR is the subtask linkage header address. L and M are respectively the relative addresses of the file which is to precede the new file in the linkage and of the new file.

The subroutine includes four entry points depending upon the value of the argument IEC. If IEC equals 4, the subroutine does nothing. If IEC equals 3, program control commences at step 30. The number of converter sets which is maintained in the first location within the subtask (the location NST(1) ) is incremented, and program control is transferred to step 15. The relative address M of the new file with respect to the address L of the preceding file is computed as M minus L and is stored in the location NST(L+2) which is the linkage pointer address within the preceding file in the linkage. Since the new file is at the end of the linkage, this completes the precedure of establishing the converter linkage, and hence program control returns to the calling program.

If the argument IEC is equal to 2, program control commences at step 20. In this case, the new file is to be linked at the beginning of the linkage. A pointer to the first file presently within the linkage is retrieved from the subtask linkage header location NST(2) and is modified so as to be the relative address of the first file within the linkage with respect to the new file. This relative address is loaded into the third entry within the new file header HDR(3), and the relative address of the new file with respect to the subtask linkage header is stored in the second location relative to the subtask linkage header—the start of a disk sector or of a core-resident type 8 pointer file. Program control is then returned to the calling program.

If the argument IEC is equal to 1, the new file is to be linked into the middle of or at the end of the current linkage. Program control commences at step 10. The relative address with respect to the new file of the file which is to follow the new file in the subtask linkage of files is computed and is stored in the third location within the new file header, the location HDR(3). This relative address is computed by retrieving the pointer from the preceding file NST(L+2), by adding to this pointer the relative address L of the preceding file with respect to the origin of the file storage area, and by subtracting from the result the relative address of the new file M with respect to the origin of the file storage area. However, if the pointer in the preceding file is equal to zero, then the pointer placed in the new file is also set equal to zero. This indicates that the new file is the last file in the linkage. Program control then continues at step 15 as has been described.

xii. TYPSZE

The subroutine TYPSZE appears in FIG. 17/613. This subroutine determines in which disk sector file storage area a file is stored and also returns as an argument the length of the standard sectors within that storage area. The subroutine TYPSZE requires as arguments the sector numbers of the first sector in each storage area, the sector numbers of the last sector in each storage area, the second number of the sector in which the file resides, and the length of typical sectors in each of the two storage areas. The subroutine returns an argument KSZ which is the length of a typical sector in the storage area to which the file is assigned, and an argument KIX which is an integer 1 or 2 and which indicates the storage area in which the file resides.

Upon entry to the subroutine, the value 1 is stored as the output argument KIX. The length ISZ1 of a typical sector in the first storage area is stored as the output argument KSZ. The sector number to which the file is assigned is then subtracted from the sector number of the first sector in the first storage area. If the result is positive, then the sector does not lie in the first storage area and program control continues at TWO. If the result is zero or negative, then the number of the sector to which the file is assigned is subtracted from the sector number of the last sector in the first storage area. If the result of this operation is negative, the file definately does not lie in the first storage area and program control continues at TWO. If the result is zero or positive, then the file definately lies within the bounds of the first storage area. Program control then returns to the calling program.

At TWO, the contents of register B are incremented. The argument KIX is incremented, and the length of a typical sector in the second storage area is placed in register A. Program control then returns to the step CVTO where the sector length stored in register A is transferred to the second return argument location KSZ. Ultimately, program control returns to the calling program.

xiii. CLSBUF

The subroutine CLSBUF which is used to add an unused buffer to an empty linkage of buffers appears in FIG. 17/614. This subroutine simply stores the length ISZE of the sector or group of sectors in a first location within the sector and stores the contents of the empty sector pointer INDF (see FIG. 6/111 where the empty sector pointer is called INPGDF) in a second location within the sector. The sector number IDX of the empty sector is then placed in the empty sector pointer location INDF, and the sector is written back into disk storage by the subroutine MASSWT. Program control then returns to the calling program.

xiv. CVTOAB

The subroutine CVTOAB shown in FIG. 17/615 converts the relative address of a core location into an absolute core address by adding that relative address to a base address. The subroutine requires as arguments the base address NST of a FORTRAN-type array or storage area and a relative address IDX of an entry within the array or storage area. The subroutine returns as a return argument the absolute core address LOC of the entry. The subroutine is used to compute the absolute addresses of locations within Fortran arrays given the name of the first element in the Fortran array plus a Fortran index number to an element in the array.

The subroutine loads the base address NST into register A and then decrements this address, since Fortran programs assign the index number "1" to the first element of an array. The relative address IDX is then added into register A, and the result is stored as the return argument LOC. Program control then returns to the calling program.

xv. CVTORL

The subroutine CVTORL determines whether a coreresident file resides in the general file storage area or in the triggered file subtask storage area. The subroutine requires as arguments the starting addresses of the two core storage areas, the terminal address of the two core storage areas, and the absolute core address of the file. The subroutine returns a first argument KIX which is a relative address of the file within its storage area, and a second argument KST that indicates which file storage area the file is stored in. This subroutine is quite similar in its mode of operation to the subroutine TYPSZE which has already been described. The relative address returned by the subroutine is an address that is suitable for use in Fortran array statements. See FIG. 17/616.

xvi. WRSYMB

The subroutine WRSYMB appears in FIGS. 17/620A to 17/620C. A block diagram of this subroutine appears in FIGS. 6/500 and 6/501.

Upon entry to the subroutine, a check is made to see if a symbol name is specified as an argument. If not, program control commences at step 200 in FIG. 17/620C. A symbol name is normally present within an argument array LSYMB, and the presence of zero in the location LSYMB(1) means that no symbol name has been specified. The steps following step 200 correspond to the steps beginning with 50002 in FIG. 6/500. Beginning at step 200, a directory file is obtained by the subroutine FDIDX using a directory pointer NIDX which is retrieved from the second location within the argument array LSYMB. A new address for this directory file is assumed to reside in an input argument array LOC. This address is entered into the directory file by a DO loop. Program control is then returned to the calling program, with the return argument IEC set equal to one.

If a symbol name has been specified, program control commences at step 1 in FIG. 17/602A. The symbol name is checked out using the subroutine LOCDIR. If the symbol name is already defined within the system, program control passes back to the calling program through a routine at step 10 which sets the return argument IEC equal to 2 or 3 depending upon whether the symbol name is assigned to a file or to a global variable.

If the symbol name is not defined within the system, program control commences at step 20. Step 20 corresponds to step 50006 in FIG. 6/500.

Beginning at step 20, the value of a return argument J from the subroutine LOCDIR is checked. If J equals zero, there is no directory location currently available into which the new directory entry may be placed, and program control commences at step 22. If J does not equal zero, then the subroutine LOCDIR has found a storage space for the new directory entry, and program control commences at step 30.

Beginning at step 22, the value of M is checked. If M is greater than or equal to zero, there is no room left for the new directory entry in its proper hash code linkage, so program control is returned to the calling program via step 25 with the return argument IEC equal to 4. If M is negative, then the new directory entry is to be the first entry in a hash code linkage which has not previously been established. In addition, the partly full sector whose sector number is stored in the location IPSNSC is an unused sector, and the number stored in the location IPSNSC is negative to indicate that the sector is unused. This sector number is made positive, to indicate that the sector is a partly full sector, and the sector number is compared to the sector number NSECT of the last sector in the directory storage area to insure that the sector does not lie outside the range of sectors which comprise the directory storage area (see FIG. 6/505). If the sector does lie outside of the directory storage area, this indicates that the directory is so full that it cannot accept another hash code linkage, and so program control is returned to the calling program via step 25 with the argument IEC set equal to 4. Assuming that the sector lies within the directory storage area, program control continues with the third step past step 22. A new directory file sector is created within the core buffer IDIR, in accordance with the format illustrated in FIG. 6/505, but devoid of any directory files. The newly created "partly full" sector is read into disk storage, and program control returns to step 1. The subroutine LOCDIR is then called upon a second time, and this time the return argument J is non-zero. Thus, program control ultimately commences at step 30.

Step 30 corresponds to step 50008 in FIG. 6/500. The return argument IEC is set equal to 1. The value of the empty file linkage pointer is then adjusted. On the assumption that the linkage pointer points to an empty slot within the sector that contains an additional pointer, that additional pointer is retrieved from the location IDIR(J) and is stored in the empty pointer location IDIR(3), the third location within the sector. However, if the pointer IDIR(J) proves to be equal to zero, then the pointer is pointing to the empty space lying beyond the last directory file in the sector. The pointer IDIR(3) is then set equal to the relative address J of the new directory file to which is added a constant equal to the new directory file length so that the pointer points to the empty space beyond this new directory file. Since directory sectors contain only 256 locations, a test is then carried out to see if the empty pointer location contains a number greater than or equal to 256. If it does, zero is placed in the empty pointer location as a flag indicating that the sector is now completely full.

Beginning at step 32, the second location within the directory file (the alphanumeric linkage location) is loaded with zero. The symbol name is then loaded into the next three locations within the file by a DO loop which extends to step 33. The address argument array LOC is then loaded into the next two locations within the file by a DO loop which terminates at step 35. The value of the directory index pointer for this new directory file is then computed and is stored in a location NIDX. An 8-bit sector index number comprises the left-most 8 bits of the pointer, and the relative address of the directory file within this sector comprises the right-most 8 bits of the pointer. The file or global indicator bit is then loaded into the left-most bit position of the first location within the directory file. This is done by placing 16 bits into this first location. The 16 bits are retrieved from the first or second locations within an array LT, using the file or global argument IFORV to determine which element of the array LT is stored in this location. The array LT is predefined to contain zero in LT(1) and to contain "$100...000_2$" in LT(2).

The third step beyond step 35 checks to see if the new file directory is the first file in a hash code linkage. The argument M returned by the subroutine LOCDIR is checked. If M is greater than or equal to zero, then this new file is not the first in the linkage, so program control commences at step 50. M is assumed to be the relative address within the sector of an earlier directory file that is linked into the same linkage. At 50 (FIG. 17/620B) the hash code linkage location within this earlier file is loaded with a pointer to the new file, and the sector into which the new file has been placed is written back into disk storage. Program control then continues at step 60 with the establishment of an alphanumeric linkage for the new directory file.

Returning to the third step past step 35 in FIG. 17/620A, if the value of M is negative, then the new directory file is the first file in a new linkage and the absolute value of M is the relative address of a location within a sector in the hash code pointer table (FIG. 1504) where a pointer to this new file is to be placed. With reference to FIG. 6/504, the subroutine LOCDIR has transferred this sector into a core buffer and has also placed the sector number of this sector into a core location ISTSEC. Program control continues at the top of FIG. 17/620B. The 4th location within the sector into which the new directory file is to be placed is incremented. With reference to 50508 in FIG. 6/505, this location contains a record of the number of hash codes assigned to the sector. A check of the number in this location is now carried out to see if it is less than NC, the maximum number of hash code linkages which are allowed within a single sector. If the number is less than NC, then program control continues at step 43. The sector into which the directory file has been placed is read back into disk storage, and the sector into which the hash code pointer is to be placed is read into the core buffer IST. The directory pointer NIDX is now placed into the hash code table location within the core buffer IST that is indicated by the negative of the argument M. The hash code pointer table sector is then read back into core storage, and zero is placed in the location SECT so that other programs will not think that a directory sector is stored in the core buffer IST. Program control then continues at step 60 with the establishment of alphanumeric linkage for the new directory file.

Returning to the step preceding step 40, if the contents of the 4th location within the sector contain a number equal to NC, then this sector is full in the sense that it contains the maximum permitted number of hash code linkages. The sector number of a different sector must therefore be placed into the partly full sector pointer location IPSNSC (see FIG. 6/505). A check is made at step 40 to see if the sector which has just been filled is chainlinked another sector. If it is, the second location within the sector contains the sector number of a partly empty sector which may receive an additional hash code linkage. In this case, program control continues after step 40. The location IPSNSC is loaded with the sector number of the sector which is next to be supplied with a linkage, and zero is placed in the second location within the sector which has just been filled. Program control then continues at step 43 as has already been explained. If the sector linkage pointer is found to be equal to zero in step 40, then program control continues at step 41. The negative of the sector number of the next free sector is retrieved from the location INXFRE and is stored in a location IPSNSC. The sector number INXFRE is then incremented. Program control then commences at step 43 and ultimately reaches step 60.

The program steps which establish a new directory file in the alphanumeric linkage of files commence with step 60 in FIG. 17/620B. A block diagram of this program is shown in FIG. 6/501. Beginning with step 60, a check is made to see if the location IXLO (FIG. 6/503) contains zero, therefore indicating that no files presently exist within the directory storage area. If so, program control commences at step 190 in FIG. 17/620C. The directory pointer NIDX to the new directory entry is stored in the two locations IXLO and IXLI. The symbol name is retrieved from the new directory entry by the subroutine FDIDX, and this symbol name is loaded into an array LWSYM within core storage. Program control then continues at step 140 in FIG. 17/620B where the sector containing the new directory entry is written back into core storage. Program control then returns to the calling program via step 999 in FIG. 17/620C, but not before the directory pointer NIDX is stored in a location IXLAST.

Returning to the step following step 60, if the value IXLO is not equal to zero, then directory files already exist within the system. The subroutines FDIDX and COMSYM are called upon to retrieve the name of the directory file that is last in the alphanumeric linkage from disk storage and to compare the symbol name contained within this last file with the symbol name contained in the new file. The argument K returned by the subroutine COMSYM is one, two, or three depending upon whether the symbol name of the new file precedes, is identical to, or follows the symbol name of the last file in the linkage in alphanumeric order. If the symbol name contained in the new directory file follows the symbol name contained in the last directory file within the linkage, then the new file is alphanumerically linked into the linkage following the last file in the linkage. Program control commences at step 130 where a directory pointer to the new file is stored in the alphanumeric linkage pointer location within the last file presently in the linkage. The directory pointer to the new file is then stored in the core location IXHI. Program control then returns to the calling program by way of steps 140 and 995, and again the directory pointer to the new entry is stored in the location IXLAST.

If the new directory file may not be linked after the last file currently in the linkage, program control commences at 110. The subroutines FDIDX and COMSYM are called upon to compare the symbol name of the new file with the symbol name that is stored in the first directory file within the alphanumeric linkage. If the symbol name contained in the new file alphanumerically precedes that contained in the first file within the linkage, then the new file may be linked ahead of the first file within the linkage. In this case, program control commences at 120. The subroutine FDIDX is called upon to retrieve the sector into which the new directory file has been placed. The directory pointer to the first file within the linkage is retrieved from the location IXLO and is placed within the alphanumeric linkage pointer location of the new file. The directory pointer NIDX to the new file is then placed in the location IXLO. Program control is then transferred to step 92 in FIG. 17/620C where the name of the new file is stored in the core storage locations beginning with LOSYM. Program control then returns to the calling program by way of steps 140 and 999, and again the directory pointer to the new file is stored in the location IXLAST.

If the new file may not be placed ahead of the first file in the linkage or following the last file in the linkage, then it is necessary to trace through the alphanumeric linkage looking for the proper place for the new file in the linkage. The linkage may be entered at its starting point using the directory pointer IXLO to find the first directory file, or it may be entered at the point where the last new file is located, using the directory pointer IXLAST. To determine which entry point to use, a comparison of the new name with that contained in the most recently entered file is carried out at step 150. If the new name follows the name in the most recently entered file, the directory pointer IXLAST is stored in a location L (step 152) and program control commences at 153 where the alphanumeric linkage is traced beginning with the directory file whose directory pointer is stored in the location L. If the new name precedes the name of the most recently entered file, the directory pointer IXLO is stored in the location L (steps following step 151) and program control commences at step 153. The call to the subroutine FDIDX (step past step 151) simply transfers directory sector containing the first directory file in the alphanumeric linkage into core storage.

At step 153, the alphanumeric linkage pointer from the first directory file (or from the most recently entered directory file) is retrieved and is stored in a location M. The two locations L and M now contain the directory pointers to two consecutive directory files in the alphanumeric linkage. A loop is now entered which extends from step 155 in FIG. 17/620B to the first step in FIG. 17/620C. During each pass through this loop, the subroutines FILIDX and COMSYM are called upon to compare the name stored in the directory file to which M points with the name stored in the new directory file which is stored in the array LSYMB. If the name in the new directory file is ahead of the name in the file to which M points, the loop continues and the name in the next directory file is checked. at 160, the directory pointer stored in M is transferred to L, and the directory pointer to the next file is located and is stored in M. Program control is then normally returned to 155, the start of the loop, unless (through inadvertence) the end of the alphanumeric linkage is encountered. If the end of the linkage is encountered (and this should normally never happen), an error routine at the top of FIG. 17/620C is put into effect. Ultimately, a directory entry is found which contains a name that alphanumerically precedes the name in the new directory entry. The loop then terminates, and program control commences at 170, in FIG. 17/620C.

At 170, the new directory file is retrieved from disk storage. A pointer to the directory file which it precedes in the linkage is loaded into the new directory file, and the directory file is written back into disk storage. The directory file which precedes the new directory file in the linkage and whose directory pointer is L is then retrieved from disk storage. The directory pointer NIDX to the new file is loaded into this preceding directory file. The preceding directory file is written back into its disk sector, and program control returns to the calling program by way of step 999. The directory pointer NIDX is stored in the location IXLAST for use the next time the subroutine WRSYMB is called upon.

xvii. ERSYMB

The subroutine ERSYMB appears in FIG. 17/621A and FIG. 17/621B. A block diagram of this subroutine appears in FIG. 6/700.

Upon entry into the subroutine ERSYMB, an argument array LSYM contains the symbol name that is contained within the directory file which is to be removed. The subroutine LOCDIR is called upon to determine whether a directory file exists within the system containing the designated symbol name. If no such directory file is found, program control continues at 10 where a return argument IEC is set equal to 3, and program control is returned to the calling program. If a directory file is found to contain the symbol name, program control commences at 20 where a check is carried out to see if the symbol name is that of a file or of a global constant. If the symbol is the name of a file, then program control commences at 30 where a return argument IEC is set equal to 2, and program control is returned to the calling program. The ERSYMB subroutine is thus prevented from erasing the directory entry for a file from the directory system. If the symbol is the name of a global constant, program control commences at 40 where the return argument IEC is set equal to 1. The remaining steps in the program delete this particular directory file from the directory system.

This version of the subroutine includes the test following step 20 to prevent the accidental destruction of the directory entry for a system file. While this safety feature is desirable in an operating system, and alternative embodiment of the ERSYMB subroutine omits all of the steps between step 20 and step 40 and thus allows any directory file to be removed from the directory system.

The step preceding step 50 checks to see if the directory file to be eliminated is the first file in a hash code linkage of files. Assuming that the directory file is not the first file in a linkage, program control commences at step 60. An argument J returned by the subroutine LOCDIR is the starting address of a preceding file within the linkage. The first location in this preceding directory file (the location IDIR(J) ) is loaded with the 15 right-most bits from the first location within the directory file that is to be deleted. The left-most bit is preserved, since this bit is the file or global indicator flag (see FIG. 6/502).

The relative address of the directory file which is to be deleted is indicated by an argument K that is returned by the subroutine LOCDIR (in Fortran, the starting address of this directory file is IDIR(K) ). The directory file to be deleted is then added to the empty file linkage within the sector. The pointer to the empty file linkage is retrieved from the location IDIR(3) and is loaded into the directory file which is to be deleted (the location IDIR(K) ). The pointer K to the directory file which is to be deleted is then stored as the sector empty file linkage pointer IDIR(3). (The third location within the directory sector is the empty file linkage pointer, as is apparent in FIG. 6/505.) The directory pointer for the directory file which is to be removed is then calculated and is stored in a location NIDX. The altered directory sector is then written back into disk storage by the subroutine M:WDISC. Program control then continues at step 69.

Returning to the second step following step 40, if the directory file is the first such file in a hash code linkage, then program control commences at step 50. A check is first made to see if there are any other directory files in this particular hash code linkage. Normally there will be other such files, and a pointer to the next file is therefore present in the location IDIR(K). In this case, program control commences at step 70. The hash code linkage pointer IDIR(K) is retrieved from the file which is to be deleted and is stored in a location ITEMP. Only 15 bits are moved, since the 16th bit is the file/global flag bit. The file which is to be deleted is then added to the empty file linkage within the sector. The directory pointer to the file which has just been added to the empty file linkage is calculated and is stored in a location NIDX. The sector within which this directory file resides is then written back into disk storage, and the hash code pointer sector which contains a pointer to the directory file which has just been added to the empty sector linkage is retrieved from disk storage and is placed in the core buffer IST. The argument J, which argument was returned by the subroutine LOCDIR, is a negative number whose magnitude is the relative address within the hash code pointer sector of a pointer to the directory file that has just been deleted from the corresponding linkage. I is set equal to −J, so that I is a positive number. The pointer to the next file within the hash code linkage is then retrieved from the location ITEMP and is stored in the location IST(I) within the hash code table sector to serve as a pointer to the new first file within the hash code linkage. The hash code pointer sector is then transferred back into disk storage, and zero is placed in the location SECT to indicate that no directory file sector presently resides in core. Program control then commences at 69, as will be explained below.

Returning to the step following step 50, if the directory file to be removed is the only file in a hash code linkage, then program control commences at the second step past step 50. In this case a hash code linkage is being removed completely from a directory sector, and there will be room for a new hash code linkage to be placed within the sector. The contents of the empty sector pointer IPSNSC (see FIG. 6/505) is stored in the sector pointer location within the sector (the location IDIR(2)) and the sector number of the sector is retrieved from the first location within the sector (the location IDIR(1) ) and is stored in the pointer location IPSNSC. The hash code count in the fourth location IDIR(4) within the sector is then decremented, and program control commences at step 70 as has been described.

The program steps beginning at step 69 remove the directory file from the alphanumeric linkage. The subroutine COMSYM is called upon the compare the symbol name LSYM with the symbol name LOSYM, the symbol name contained within the first file with the alphanumeric linkage. If the two symbol names are identical, program control commences at 80 (FIG. 17/621B). The subroutine FDIDX is called upon to retrieve from disk storage the directory sector in which the directory file which is to be deleted resides. The alphanumeric pointer is retrieved from this directory file and is stored in a location K. The subroutine FDIDX is then called upon to retrieve the directory sector that contains the second file in the alphanumeric linkage. A check is then made to see if this second directory file contains a symbol name. If it does, then that symbol name is loaded into the array LOSYM. If the next directory file does not contain a symbol name, the DO loop which transfers this symbol name into the array LOSYM is bypassed. The directory pointer to this second file in the linkage is then stored in the core location IXLO, the pointer to the beginning of the alphanumeric linkage. Program control then returns to the calling program.

Returning to the second step past step 69 in FIG. 17/621A, if the symbol name LSYM is not identical to the symbol name stored in the first file within the alphanumeric linkage, then program control commences at 90 in FIG. 17/621B. The directory pointer to the first directory file in the alphanumeric linkage is retrieved from the core location IXLO and is stored in a location I. The subroutine FDIDX is called upon the retrieve the first directory file from disk storage. The directory pointer to the second directory file in the alphanumeric linkage is retrieved from the second location within the first file (the location IDIR(J+1)) and is stored in a location K. A loop is then entered which extends from step 92 to the step preceding step 96. Each time through the loop, the subroutine FDIDX is called upon to retrieve the next directory file in the alphanumeric linkage from disk storage, and the subroutine COMSYM is called upon to compare the name contained within that file with the name LSYM. If the comparison fails, the directory pointer K to the directory file which was just retrieved is transferred into the location I, and the directory pointer to the next file within the alphanumeric linkage is stored in the location K. The loop is then repeated. Ultimately, the directory file containing the specified name is found, and program control commences at step 96.

The location K is loaded with a directory pointer to the next directory file within the linkage. The subroutine FDIDX is then called upon to retrieve the directory file which precedes the file that is to be removed from the system and whose directory pointer is stored in the location I. The pointer K to the file which follows the file which is to be removed is stored in the alphanumeric pointer location within the file which precedes the file to be removed (the location IDIR(I+1) ). The file which precedes the file that has been removed is then read back into disk storage, and program control returns to the calling program.

xviii. NXSYMB

The subroutine NXSYMB is shown in FIG. 17/622. A block diagram of this subroutine appears in FIG. 6/810. This subroutine requires as an argument a symbol name LSYMB. The subroutine returns the two arguments IEC and IFORV which are explained in the block diagram (FIG. 6/810). The symbol name contained within the next directory file in the alphanumeric linkage is returned as the argument LSYM. The subroutine calls upon the subroutine FDIDX to locate the next file within the alphanumeric linkage. In all other respects, this subroutine is fully described by the block diagram.

xix. NXFLNM

The subroutine NXFLNM appears in FIG. 17/624. A block diagram of this subroutine appears in FIG. 6/800. The subroutine is completely explained by the block diagram, and no further explanation of the program listing is required.

xx. LOCDIR

The subroutine LOCDIR appears in FIG. 17/625. A block diagram of this subroutine appears in FIG. 6/510. This subroutine requires as an argument a symbol name LSYMB. The subroutine returns four arguments. An argument IEC is set equal to 1 if the symbol name exists within the system and is set equal to 2 if the symbol name has not previously been entered into the system. An argument NIDX is a relative address—either the address within a disk sector SECT of a directory file containing the symbol name LSYMB, or else the address of an empty slot within the sector where a new directory file may be placed if the symbol name LSYMB has not previously been entered into the system. Assuming that the symbol name LSYMB has previously been entered into the system and that a directory file containing this symbol name has been found, an argument IFORV is set equal to 1 if the symbol is the name of a global variable and is set equal to two if the symbol is the name of a file. If a directory file containing the symbol name is to be the first file within a hash code linkage, an argument LIDX is negative, and its absolute value is the relative address within a hash code pointer sector ISTSEC of a pointer to the directory file. If this directory file is not to be the first file within a hash code linkage, then the argument LIDX is positive and is the relative address within a sector SEC of a directory file which is to precede this directory file in the hash code linkage of files.

Upon entry into the subroutine, the hash code corresponding to the symbol name LSYMB is calculated by the subroutine IHASH. The sector number and the relative address within this sector of a pointer to this hash code linkage is then calculated, and the hash code pointer sector is placed in a core buffer IST by the subroutine M:RDISC. A check is then made to see if this hash code pointer is zero.

If the hash code pointer is zero, the symbol name LSYMB definitely has not been defined within the system before. In addition, there is no existent hash code linkage to which a directory file containing this symbol name may be attached. The argument LIDX is therefore set equal to −I, where I is the relative address of the hash code linkage pointer for the hash code linkage to which the symbol LSYMB is assigned. A check is then made of the sign of the partially full sector pointer IPSNSC (see FIG. 6/505). If this pointer is positive, the sector to which it points is one which has been established within the system. In this case, program control commences at 21. The designated sector IPSNSC is read into the core buffer IDIR, and the argument NIDX is set equal to the pointer IDIR(3) to the first hole within the designated sector. The argument IEC is then set equal to 2, and program control returns to the calling program. If the sector pointer IPSNSC is negative, this indicates that the sector to which IPSNSC points is one which has not previously been opened. Program control then continues two steps before step 21. The value NIDX is set equal to zero, and program control is returned to the calling progrm via step 25 with the return argument IEC set equal to 2.

If the hash code pointer is not zero, then a hash code linkage has been previously established to which a directory file containing the symbol name LSYMB may be attached. In this case, program control commences at step 30. Zero is stored in the location SECT. The directory pointer to the first directory file within this hash code linkage is retrieved from the hash code table and is stored in the location J. The sign of the relative address I of the location in the hash code table which contains the hash code linkage pointer is then made negative for reasons which will become apparent.

The subroutine FDIDX is then called upon to retrieve the first directory file within this hash code linkage from disk storage. A loop is then entered which extends from step 35 to the step preceding step 60. Each time through this loop, the symbol name contained within a directory file within the hash code linkage is compared with the name LSYMB by the subroutine COMSYM. If the comparison is successful, program control commences at 50. Otherwise, the loop continues at 40 where the relative address SL of the directory file just checked is stored in the location I. The directory pointer to the next directory file within the hash code linkage is then retrieved and is stored in the location SL. If SL then contains zero, the end of the hash code linkage has been reached and program control commences at 60. Otherwise, program control returns to step 35 and the loop continues.

If program control commences at step 60, every directory file within the linkage has been checked and the symbol name LSYMB has not been found. The argument LIDX is then set equal to I, the directory pointer to the last directory file checked, and program control commences at 22 as has already been described.

If the symbol name LSYMB is found within a directory file, then program control commences at step 50. The argument LIDX is set equal to the relative address I, and the argument NIDX is set equal to the relative address SL. The first bit in the first word within the directory file containing the symbol name LSYMB is then retrieved, and the argument IFORV is set equal to this bit value plus 1. The argument IEC is set equal to 1, and program control returns to the calling program.

In the third step past step 30, the relative address I of the entry in the hash code sector is set negative so that the argument LIDX is a negative number if it contains the relative address of an entry in a hash code sector. At step 40, when the relative address of a directory file is stored in a location I, this relative address is left positive so that the argument LIDX is a positive number if it contains the relative address of a directory file.

XXI. FDIDX

The subroutine FDIDX appears in FIG. 17/626. A block diagram of this subroutine appears in FIG. 6/520. This subroutine requires as arguments a directory pointer IDX to the directory file which is to be found, the core address IDIR of a core buffer into which directory sectors may be transferred, and the sector number SECT of the directory sector presently occupying the core buffer IDIR. The subroutine locates the directory sector in which the desired directory file is stored and transfers this sector into the core buffer IDIR. The sector number of this sector is returned as the argument SECT, and the relative address within this sector of the desired directory file is returned as an argument SL.

Upon entry to the subroutine, the relative address of the directory file is extracted from the least significant 8 bits of the argument IDX and is stored as the return argument SL. The 8 most significant bits of the argument IDX are retrieved and are added to the sector number ISECT of the first sector within the directory storage area to give the sector number AMS of the sector within which the desired directory file resides. If the sector number AMS is equal to the argument SECT, then this sector is already core-resident and so program control returns immediately to the calling program. Otherwise, the sector number AMS is returned as the argument SECT, and the directory sector AMS is transferred into the core buffer IDIR before program control is returned to the calling program.

XXII. RDSYMB

The subroutine RDSYMB is shown in FIG. 17/627, and a block diagram of this subroutine appears in FIG. 6/600. This subroutine is used for retrieving data from entries in the directory. An argument LSYMB is either the symbol name contained within the directory file that is to be accessed, or else it is an array containing zero and also containing a directory pointer to the directory file which is to be accessed. If LSYMB contains a directory pointer, then the symbol name contained within the same file is returned to the calling program as the argument LSYMB. The subroutine returns three arguments. An argument IEC is set equal to 1 if the requested entry is found and is set equal to 2 if the requested directory entry cannot be found. An argument LOCATR is an array containing the address portion of the requested directory file. An argument IFORV is set equal to 1 or 2 in accordance with whether the directory file corresponds to a global variable or to a system file.

Upon entry to the subroutine, a check of the first entry in the argument array LSYMB is made. If this first entry is zero, the second entry in the array LSYMB is a directory pointer. Program control then commences at 40. The subroutine FDIDX is called upon to locate the directory entry corresponding to the designated directory pointer. The symbol name contained within this directory entry is retrieved and is stored as the return argument LSYMB, and program control then commences at step 20.

If the first entry in the symbol name array LSYMB is not equal to zero, then program control commences two steps before step 10. The subroutine LOCDIR is called upon to locate a directory file containing the symobl name LSYMB. If such a directory file is not found, program control returns to the calling program via step 10 with the argument IEC set equal to 2. Otherwise, program control continues at step 20.

At step 20, the argument IEC is set equal to 1. The address portion of the directory file is retrieved and is stored as the return argument LOCATR. The file or global indicator bit is retrieved from the left-most bit position of the first word within the directory file. "1" is added to this value, and the resultant value is stored as a return argument IFORV. Program control then returns to the calling program.

XXIII. IHASH

The subroutine IHASH appears in FIG. 17/628. A relatively detailed block diagram of this subroutine appears in FIG. 6/511. The program listing follows the block diagram very closely, and needs relatively little in the way of an explanation. At the step preceding HASH1, the system designator register is loaded with "7" to cause address computations to be post-indexed with respect to index register C. In effect, this adds the contents of index register C to all addresses which are computed following the step HASH1 and using the index register B. The address computation carried out at HASH1 therefore corresponds precisely to step 51103 in the block diagram. The 3rd step past HASH1 restores a "4" to the designator register after termination of the loop operations.

Within the present system, division is carried out by placing one number in the accumulator register A and by then executing the command "DIV (address)". The result of the division is left in the accumulator register A, and a remainder appears in the extended accumulator register E. Hence step 51106 in the block diagram is automatically carried out by the instruction "DIV".

The step 51109 in the block diagram is carried out by exclusively ORing the contents of the accumulator together with "$FFFF_{16}$" and by then adding 1 to the result of this computation with the instruction "INC A".

XXIV. COMSYM

The subroutine COMSYM appears in FIG. 17/629. A relatively detailed block diagram of this subroutine appears in FIG. 6/530. The block diagram in FIG. 6/530 discloses all of the details of this subroutine, but is written essentially in Fortran. The folloiwng distinction must therefore be noted when comparing this block diagram to the program listing. The counter "N" which is used in the block diagram does not exist in the program listing. In place of the counter "N", the program listing (in the two steps immediately following CMSM2) increments the addresses LSA and LSB each time it passes through the loop. This corresponds to the portion of step 53007 in the block diagram where the value of "N" is increased by 1. In all other respects, the program listing and the block diagram are essentially identical.

XXV. DLFIL

The DLFIL subroutine appears in FIGS. 17/606A,17/606B, and 17/606C. A block diagram of this subroutine appears in FIG. 6/400. The subroutine expects a single input argument LSYM which is an array containing the symbolic name of a file which is to be removed from the system. The subroutine generates a single output argument IEC. If the file is successfully deleted, the argument IEC is set equal to 1. If the file is not deleted for some reason, the argument IEC is set equal to a number which indicates the reason why the file was not deleted from the system (the file may have been undefined, the file may have been a trigger for another file, etc.).

Upon entry into the subroutine DLFIL, the subroutine RDSYMB is called upon to determine the file address and also to determine that the file actually exists. If no such file exists, or if the symbolic name supplied to the subroutine is that of a global variable, then program control is returned immediately to the calling program by way of step 20 (FIG. 17/606C) with the return argument IEC set equal to 2. If the file does exist, program control continues at step 12 in FIG. 17/606A.

The second element in the array J returned by the subroutine RDSYMB is now checked to determine whether the file is disk- or core-resident. If the file is disk-resident, program control continues with the second step past step 12. If the file is core-resident, program control continues at step 120 in FIG. 17/606B.

Assuming for the moment that the file is disk-resident, the subroutine TYPSZE is called upon to determine which of the two disk storage areas the file resides in (see FIG. 6/110 and 6/111). The subroutine TYPSZE returns an argument KSZ that is equal to the length of a typical sector in the storage area. If the file resides in the general file disk storage areas (FIG. 6/110), the sector length is a value NSDTSZ. If the file resides in the subtask and triggered file disk storage areas (FIG. 6/111), the sector length returned is NSPGSZ. The subroutine TYPSZE has no way of determining the length of a control chain sector, since the length of such scetors is variable. The next step in the program listing therefore tests the second element in the array J to determine if the file is a control chain file. Control chain files begin with the first entry in a sector. If the file is a control chain file, then J(2) is equal to 1, since J(2) is the relative address of the file within the sector. The sector length is then arbitrarily set equal to 256. If the flie is not a control chain file, the sector includes a header (see FIG. 6/111) which percludes any file from beginning with the first entry in the sector. In this case, the sector length is not altered.

The subroutine MASSRD is then called upon to transfer the sector in which the file resides into a core storage area NSTPGM. The relative address J(2) of the file within the sector is then stored in the location K. A test of the return argument KST from the subroutine TYPSZE is then carried out to see which of the two disk storage areas the file resides in. If the file resides in the subtask and triggered file disk storage areas (FIG. 6/111), program control continues at 14. If the file resides in the general file disk storage areas (FIG. 6/110), program control continues at step 18.

Assuming that the file resides within the subtask and triggered file disk storage area, the first step after step 14 checks to see if the file is a control chain file. If it is, program control is transferred to step 15 in FIG. 17/606B. Assuming that the file is not a control chain file, program control continues with the second step past step 14. The sector length NSPGSZ is loaded into a location ISZE. The file linkage pointer is then retrieved from the second location within the file (the locations NSTPGM(K+2)) and is added to the relative address K of the file to give the relative address within the sector of the next file in the linkage. This relative address is stored in a location LDELTA. A check of the next file in the linkage is then carried out to see if it is a type 8 coupler file. If it is, then the file which is to be deleted is a file which triggers the execution of other files. In the preferred embodiment of the invention, such a file may not be deleted until the file or files which it triggers are first deleted from the system. Hence, program control is returned to the calling program by way of step 19 with the argument IEC set equal to 3. A second test is carried out to see if the file which is to be deleted is the only file within the subtask linkage of files in the sector. The sector linkage pointer is retrieved from the location NSTPGM(2) and 1 is added to the linkage pointer to give the address of the first file in the linkage. If this address is equal to K and if the linkage pointer in the file which is to be removed is zero, then the file which is to be removed is the only file within the sector and the entire sector may be added to the empty sector linkage. In this case, program control continues at step 30 in FIG. 17/606B.

Continuing with the sixth and seventh steps past step 14, a subroutine RESEQ is called upon to trace through the linkages of files in the sector and to alter this linkage so that it no longer includes the file which is to be removed. The arguments supplied to this subroutine include the sector starting address NSTPGM, the relative address of the file K, and the value 2 which is stored in a location LS and which is a relative address within the sector of the linkage pointer to the linkage of files within the sector. The subroutine RESEQ returns an argument KER which has a value between one and five depending upon what was discovered when the file linkage was traced out. The step following the subroutine call then transfers program control to an appropriate location in accordance with the value of the argument KER.

If the value of the argument KER is 1, then the subtask linkages were successfully altered about the file and no difficulty was encountered. Program control commences at step 13 with a call upon the subroutine CLSFIL to add the location previously occupied by the file to the empty file linkage within the sector. The sector is then returned to disk storage, and the subroutine ERSYMB is called upon to remove all reference to the file from the system directory. The argument IEC is set equal to one, and program control returns to the calling program.

If the value KER returned by the subroutine RESEQ is equal to 2, then the file which is to be deleted follows a type 8 coupler file which is also to be deleted. Program control commences at step 213. The type number and length of the file which is to be removed is retrieved from the location NSTPGM(K) and is transferred so as to become the first entry in the type 8 coupler file. The first entry in the coupler file is the location NSTPGM(K−3). This value is increased by 3 to reflect the length of the coupler file. The value 3 is then subtracted from K so that both the file and the coupler file appear to be one continuous file to the subroutine CLSFIL. Program control then continues at step 13 as has been described and ultimately returns to the calling program.

If the argument KER returned by the subroutine RESEQ equals 3, then the file which is to be deleted precedes a bidding file which, desirably, also should be removed at the same time that the file is removed. Program control commences at step 313 with a call upon the subroutine CLSFIL to remove the bidding file. Program control then continues at step 13 as has been described and ultimately returns to the calling program.

If the argument KER returned by the subroutine RESEQ is equal to 4, then the file which is to be deleted and a bidding file are the only files which exist within the subtask linkage. In this case, the entire sector may be added to the empty sector linkage, so program control commences at step 30 as will be explained.

If the argument KER returned by the subroutine RESEQ equals 5, the subroutine RESEQ was unable to find the designated file within the linkage. This is an error condition, and hence, program control is returned directly to the calling program by way of step 190 with the return argument IEC set equal to 4. This should never happen in the case of disk-resident files.

In the case of a disk-resident general file, program control commences at step 18 in FIG. 606A. The file type number is extracted from the first entry in the file header and is stored in a location L. If the file is assigned the type number 4, the file is a periodic contact closure input file which may trigger the printout of an alarm message. The file access and enter subroutine SFILE is then called upon to extract from the file the address of the contact closure input to which it relates, and then the proper logical address of this contact closure input is computed and is stored in a location LDADR. The alarm message delete subroutine ALMDEL within the logic initiator program is then called upon to decouple the alarm message printout request from the logical word table entry for the contact closure input. In this manner, the printout of an alarm message for the contact closure input variable is automatically terminated. Program control then continues at step 61. If the file is not a type 4 contact closure input file, then the above steps are skipped and program control is transferred directly from step 18 to step 61.

At step 61, the subroutine CLSFIL is called upon to add the space occupied by the general file to the linkage of empty spaces within the sector. Zero is placed in a location LHOLE, and the sector empty file pointer is retrieved from the location NSTDAT(1) and is transferred into a location N. A loop is then entered beginning at step 60 which follows through the linkages of empty files. This loop checks the size of each empty location within the sector and ultimately stores the length of the largest such empty file in the location LHOLE. The general file sector is then read back into disk storage. A computation is then carried out which determines the address of an index sector which contains the entry for this particular general file sector, and that index sector is retrieved and is placed into the core buffer NSTDAT. The value LHOLE is then placed into the entry within the index sector for the general file sector, so that a record of the largest hole within the sector is maintained within the index sector, as is shown in FIG. 6/110. The index sector is then transferred back into disk storage, and program control continues at step 17 as has alredy been described.

The steps in FIG. 17/606B following step 15 delete a disk-resident control chain from the system. The actual length of the control chain is first computed and is stored in a location ISZE. The subrouine DLELNK is then called upon to remove all record of the control chain subtask from the subtask processor program and from the auxiliary synchronizer program so that the subtask no longer exists within the system. The subroutine CLSBUF is then called upon to add the empty sectors previously occupied by the control chain to the linkage of empty sectors within the subtask and triggered file disk storage areas (FIG. 6/111). Program control then commences at step 17 as has already been explained.

When an analog scan disk sector is to be added to the empty sector linkage, program control commences at step 30 in FIG. 17/606B. The subroutine CLSBUF is called upon to add the sector to the linkage of empty sectors within the subtask and triggered file disk storage area. The relative address of the sector with respect to the first sector IFSECT in the storage area (see FIG. 6/111) is then computed by subtracting the value IFSECT from the number stored in the location J(1) and by storing the result in the location J(1). The index sector LNKM to the subtask and triggered file disk storage areas is then read into core. A DO loop is then entered which extends through step 31. During each pass through the loop, an entry within the index sector is checked to see if the entry corresponds to the sector which is to be removed. The entry is broken into 3 portions. The least significant 10 bits of the entry are stored in a location LSEC. The 11th bit is stored in a location LR. The most significant 5 bits of the entry are stored in a location LFRC. The least significant 10 bits contain the relative address of a disk sector, and the most significant 5 bits contain a bidding frequency index. The single bit stored in the location LR is equal to one for disk-resident subtasks and zero for core-resident subtasks, as is indicated by the "+1" below a doubled bidding frequency index in FIG. 6/111. The actual period of time which is to elapse between bids for the corresponding subtask is then retrieved from the table ITM (see FIG. 6/112) and in particular from the entry LFRC within the table, and is stored in the location LPERD. The test to see if this entry corresponds to the sector which has just been removed from active service is then carried out. First, the contents of the location LSEC are checked to see if they are equal to the relative sector address J(1) of the sector just removed. Secondly, the content of LR is checked to see that it contains the value one, indicating a disk-resident subtask. Finally, the bidding frequency index is checked to see that it is not equal to zero. If all of these tests are satisfied, the proper entry has been found, and program control continues at step 33. Otherwise, the search through the index sector continues. If a complete search of the index sector does not reveal an entry corresponding to the sector which has just been removed, an error has occurred. Program control then returns to the calling program with the argument IEC set equal to 4.

When program control commences at step 33, an entry in the index sector to the subtask and triggered file disk storage areas has been found which corresponds to a disk sector which has just been added to the linkage of empty sectors. The subtask number previously assigned to this sector is computed and is stored in a location LVLBIT. The details of this computation have already been explained in connection with the subroutine GNFIL. The subroutine DLELNK is then called upon to remove all record of the subtask from both the auxiliary synchronizer program and from the subtask processor program. Minus one or $FFFF_{16}$ is then placed into the entry within the index sector which previously corresponded to this sector as a flag to indicate that the sector is no longer in use. The size of the index sector is then recomputed, and the index sector is returned to disk storage. Program control then commences at step 17 as has already been explained.

In the case of core-resident files, program control commences at step 120. The subroutine CVTORL is called upon to determine which of the two core file storage areas the file is stored within. If the file is stored within the general file core storage area (FIG. 6/109), program control continues at step 180. If the file is stored within the subtask and triggered file core storage area (FIG. 6/108), program control continues at step 140.

If a file is core-resident and is stored in the subtask and triggered file core storage area, program control commences at step 140 in FIG. 17/606B. A check of the file type number is first carried out to see if the file is a control chain file. If so, then program control continues at step 150 in FIG. 17/606C where the subroutines DLELNK and CLSFIL are called upon, as in the case of disk-resident files, to completely remove the file from the operating system. Program control then returns to the calling program by way of step 17, as has been described.

If the file is not a control chain file, then a check of the next file in the linkage of files is carried out to see if the next file is a type 8 coupler file. If it is, then another file is triggered by the execution of this file. As has been explained, files which are used as triggers are not deleted from the computer system until the files which they trigger are first deleted. In this case, program control returns to the calling program by way of step 19 with the argument IEC set equal to 3.

The index sector to the subtask and triggered file disk storage areas is then retrieved and is placed in a core buffer. The entries in the index sector are then searched by a DO loop which terminates at step 142. When an entry is found in which the ten least significant bits are zero and in which the more significant bits are not zero, the entry relates to a core-resident subtask, and program control is transferred to step 145. At step 145, the subtask number of the subtask is computed and the core address of the subtask is obtained from the sublevel processor program by the subroutine SUBLOC. If no such subtask exists or if the subtask is found to be disk-resident, program control returns to the loop at step 142 and a search of entries within the index sector continues. Otherwise, the subroutine CVTORL is called upon to convert the absolute core address returned by the subroutine SUBLOC into a relative address L with respect to the start of the storage area LCORE. "1" is added to the address L to give the address LS of the linkage pointer to the first file within the subtask.

At the fourth step past step 147, a test is carried out to see if the core-resident subtask linkage of files contains only one file and to see if that file is the file which is to be deleted from the system. In that case, the linkage pointer location LS would contain the address K and the linkage pointer within the file at the address LCORE(LS+2) would be equal to zero, since no other files would exist within the linkage. If that is the case, a deletion of this file from the linkage would leave no files within the linkage. Program control then continues at step 130. With reference to the lower half of FIG. 6/106, a two element coupler file (FIG. 6/106) plus the file which is to be deleted from the system are now present, and the address of the first element in the coupler file is stored in the location L. The contents of this location are replaced with the first element in the file, LCORE(K), but not before this first element is increased by two so that the file appears to include the coupler file as well as its own file data. A single call to the subroutine CLSFIL then deletes both the coupler file and the actual file from the operating system. Program control then continues at step 33 in FIG. 17/606B as has already been explained with the deletion of the subtask from the system and with the placing of −1 into the index sector entry for this subtask.

If the fourth step past step 147 does not reveal that only a single file resides within the subtask, then the subroutine RESEQ is called upon to trace through the entire subtask linkage of files and to determine whether the file which is to be deleted from the system is actually present as part of this subtask linkage of files. If the file is not found within the subtask linkage, an argument KER is returned set equal to 5 and program control returns to the DO loop at step 142. The next entry in the index sector is then checked. The DO loop continues its operation, checking every core-resident subtask looking for the file. If the file is not found, the DO loop terminates at step 142, and program control is returned to the calling program with the argument IEC set equal to 4. Normally, however, the file will be found eventually.

Returning to the 5th step past step 147, if the file is found within the subtask linkage of files, the argument KER is returned with a value between 1 and 4. If KER equals one, the file has been found and the file linkages have been adjusted about the file. Program control continues at 148 with a call upon the subroutine CLSFIL to add the space previously occupied by the file to the empty file linkage within core. Program control is then transferred to step 17 and proceeds as has already been explained. If the argument KER is equal to 2, the file follows a coupler file which must also be deleted. Program control continues at step 248 where the coupler file and the main file are ccombined into a single file which may be deleted by a single call to the subroutine CLSFIL following step 148. Program control then returns to step 17 and proceeds as has already been explained. If the argument KER is equal to 3, the file which is to be deleted precedes a bidding file which is also to be deleted. Program control begins at 348 with a call upon the subroutine CLSFIL to remove the bidding file. Program control then continues at step 148 as has already been explained. If the argument IEC is returned equal to 4, then a file and a single bidding file are the only files which exist within the subtask linkage of files. Program control then commences at step 130, as has already been explained.

If the file is a core-resident general file, program control commences at step 180. The steps beginning with step 180 and continuing through step 191 delete any alarm message associated with the file, as did the steps between step 18 and step 61 in FIG. 17/606A which steps were fully explained above. At step 191, the subroutine CLSFIL is called upon to close the file and to add the space previously occupied by the file to the empty file linkage. Program control is then transferred to step 17, where it proceeds as has already been explained.

XXVI. RESEQ

The subroutine RESEQ which rearranges the linkages within subtask linkages of files when files are removed from such linkages is shown in FIG. 17/617. This subroutine expects 3 input arguments: an argument NST which is the name of the file storage area; an argument LT which is the relative address of the file within this storage area; and an argument LS which is the address of a pointer to the first file in the linkage of files which is to be checked. The subroutine returns as output arguments: the argument LS which contains the relative address of an accesory file, such as a bidding file, which may also be deleted along with the main file; and an argument IEC the value of which indicates what additional steps must be taken to completely eliminate the file and any related files from the subtask linkage of files.

The address of the first file within the linkage is computed and is stored in a location LN. The address of the next file within the linkage is computed and is stored in a location LF. The steps following step 100 form a loop which extends to six steps past step 100. Each time through this loop, a file within the linkage of files is checked. If that file is not the file LT which is to be removed from the linkage, then the file address LN is placed in a location LP and the file address LF is placed in the location LN. A test is then carried out to see if the most recently checked file whose address is LN is the last file within the linkage. This test comprises checking for a zero entry in the linkage location within the file header (see FIG. 6/104). If the zero linkage pointer is detected by the sixth step past step 100, then the argument IEC is set equal to 5 to indicate that the requested file was not found wihtin the subtask linkage of files, and program control returns to the calling program. Otherwise, the loop continues.

The second step past step 100 checks to see if the file whose address is LF is the file which it is desired to find, and additionally to see if the preceding file whose address is LN is a type 8 coupler file. If so, then program control continues at step 102. The file address LF is placed in the location LN, and the return argument IEC is set equal to 2. Program control then continues at step 103. If the test just described fails, then a second test is carried out at the third step past step 100 to see if the file whose address is LN is the file which is being sought. If so, program control continues at step 101 where the return argument IEC is set equal to 1. In both cases, program control then continues at step 103.

When program control commences at step 103, the sought-after file has been found and its relative address is stored in the location LN. The argument IEC is set equal to 1 if this file is not preceded by a type 8 coupler file and is set equal to 2 if the file is preceded by a type 8 coupler file. The relative address of the next file within the linkage is then computed and is stored in the location LF. If that file is a subtask bidding file whose type number equals 13, program control continues at step 105. If the file is not followed by a subtask bidding file, then a test of the location LP is carried out to see if that location still contains zero. If it does, then the file is the first file within a linkage of files, since the location LP contains zero only during the first pass through the loop beginning at step 100. In this case, program control continues at step 104. At step 104, a pointer to the second file within the linkage is stored in the pointer location whose relative address is LS, and program control returns to the calling program.

Returning to the third step past step 103, if the file is not the first file within the linkage, then program control continues at step 107. A pointer to the file following the file which is to be removed is placed into the pointer location within the file preceding the file which is to be removed and whose relative address is LT. Program control then returns to the calling program.

If program control commences at step 105, the file which is to be removed from the system is followed by a subtask bidding file. The argument IEC is set equal to 3 to indicate the existence of such a bidding file. A check of the location LP is then carried out to see if the file is the first file within the linkage. If so, program control continues at step 106. The return argument LS is set equal to LF, a pointer to the bidding file, and program control is returned to the calling program with the argument IEC set equal to 4. If a non-zero value is stored in the location LP, then program control continues with the third step past step 105. The address of the bidding file LF is stored as a return argument LS, and the location LF is loaded with the address of the file which follows the bidding file in the linkage. Program control then returns to step 107 and continues as has already been explained.

XXVII. DLELNK

The subroutine DLELNK is called upon whenever a subtask is to be removed from the operating system. The subroutine requires as an input argument the subtask number LVL of the subtask which is to be deleted from the system, and two arguments TNBS and PERD which together specify a period of time which elapses between the placement of periodic bids for execution of the subtask by the auxiliary synchronizer program.

Upon entry into the subroutine, the trigger connection delete subroutine TRGDEL within the logic initiator program is first called upon to erase all entries within the alarm and trigger tables 11059 (FIG. 11A) which would cause the change in the state of a logical variable to trigger the designated subtask LVL. Periodic bids for execution of the subtask are then terminated by a call to the auxiliary synchronizer subroutine SYNRMV. Operation of the subtask is then disabled by a call to the sublevel processor subroutine DISABLE. Program control then continues at step 20 with a call to the sublevel processor subtask removal subroutine SUBRMOVE. Program control then returns to the calling program.

The steps beginning at step 30 are not used in the preferred embodiment of the invention and therefore need no explanation.

XXVIII. MOVLNK

The subroutine MOVLNK appears in FIG. 17/620. This subroutine is called upon by the subroutine GNFIL to shift the position of an entry in the index sector LNKM of the subtask and triggered file storage areas which index sector is shown in FIG. 6/111. This subroutine can also shift the subtask number assignment for the corresponding subtask linkage of files and thereby alter the subtask number assignments within the operating process control system. The subroutine expects three arguments LA, MT and MF. The argument LA is the name of the core buffer within which the index sector resides. The argument MT is a relative address within that core buffer of an index sector entry which is to be assigned to a subtask linkage of files that is presently assigned to the entry MF.

Upon entry into the subroutine, the two entries MF and MT within the index sector are checked. If the entry MF contains minus one and if the entry MT contains zero, the entry MF is loaded with zero by the step following step 22 and program control returns to the calling program. If the above is not the case, then the second step in this subroutine checks to see if the location MF contains minus one. If it does, then the location MT must contain some non-zero value and may be in use. In this case, program control returns immediately to the calling program and nothing is done by the subroutine MOVLNK. If the above two tests both fail, then the location MF contains a valid entry which is to be transferred to the location MT. The subroutine proper then begins with the third step.

The entry MF is retrieved and is stored in a location LNKBF. The subtask number LVLBIT corresponding to this entry is then computed (a method whereby the subtask number is computed is fully explained in the writeup of the GNFIL subroutine). The 11th bit in the entry is then retrieved and is stored in a location LR. This bit is equal to "1" if the subtask corresponding to this entry is disk-resident. If the subtask is core-resident, then this bit is equal to zero. In the case of a disk-resident subtask, program control continues at step 10 where the length NSPGSZ of a standard analog scan sector is stored in the location IBFSZE to facilitate the transfer of such a section between disk and core storage. If the subtask is core-resident, then the subroutine SUBLOC within the sublevel processor program is called upon to determine the core address of the subtask.

Program control then continues at step 12. The bidding frequency index of the entry is retrieved and is stored in a location L. The time period corresponding to this bidding frequency index is then retrieved from the table ITM (see FIG. 6/112) and is stored in a loccation KPERD. The subroutine DLELNK (FIG. 17/618) is then called upon to eliminate all record of the subtask whose subtask number is LVLBIT from both the sublevel processor program and from the auxiliary synchronizer program. The subtask number corresponding to the entry MT within the index sector is then computed and is stored in the location LVLBIT. The address of this subtask is computed and is stored in a location NISX. This address computation makes use of the core/disk value LR which is "1" for a disk-resident subtask and zero for a core-resident subtask. In the case of a disk-resident subtask, the second term in the expression for NISX reduces to zero, and the first term is the sector number of the disk sector occupied by the subtask. This sector number is computed as the number of the first sector IFSECT (see FIG. 6/111) plus an index value which is retrieved from the least significant ten bits of the location LNKBF. This index value is actually the ten least significant bits of the entry MF in the index sector. In the case of a core-resident subtask, the first term in the expression for NISX reduces to zero, and the address is then the core address ISC which was returned by the subroutine SUBLOC.

The sublevel processor subroutines SUBLINK and SUBABLE are then called upon to first establish and then to place in operation the new subtask number assignment. Periodic bids for execution of this subtask are then established by a call to the auxiliary synchronizer subroutine SYNCLK. The index sector entry MF is then retrieved and is returned to the index sector as the entry MT. The entry MF is then set equal to minus one, and program control returns to the calling program.

C. THE CONTROL CHAIN PROCESSOR PROGRAM

With reference to FIG. 17/700, when a control chain is to be executed, program control is initially transferred to the location I*START (entry routine) within the control chain processor program with index register B pointing to the start of the currently running task level data pool and with index register E pointing either to the first address in a core control chain file or to the first address in a normally disk resident control chain file which has been loaded into a core buffer. "$\mathbf{39}_{10}$" is added into index register B so that register B points to the 40th location within the task data pool. The file starting address stored in register E is then incremented twice so that it contains not the file starting address but the starting address of the first or start module of the control chain. This address is then stored in the 41st location within the task data pool, the location one past that to which index register B points (STE 1,B). "$\mathbf{3}_{10}$" is then added to the number stored in register E and the resultant address is that of the first executable module in the control chain. This address is stored in the 42nd location within the task data pool, the second location past that to which index register B points (STA 2,B). An entry is then made to I*INTD, the find next algorithm routine.

The routine I*INTD is an extremely fast routine which calculates the address of the next algorithm subroutine that is to process a module of data in the control chain. Upon entry to this routine, the address of the module which is to be processed is retrieved from the 42nd location in the task data pool (the second location past that to which index register B points). A check is then made to see if a system trace flag I*TRAC is set. If this flag is set, program control is transferred to a TRAC routine which appears in FIG. 17/730. Assuming this flag is not set, the block or module type number is retrieved from bit positions 7 to 0 of the first location in the module which is to be processed. The starting address SRTADR of an algorithm address table (see routine 710 in FIG. 7) is added to this module type number so that register A points to the location within the algorithm starting address table that contains the address of the algorithm subroutine which is to process the module. The address of the algorithm subroutine is loaded into index register G. If this address is zero or if this address is greater than TERADR, the address of the location immediately following the address table, then either no subroutine exists to process the designated module type or else the end module type $FF_{16}$ has been encountered. In either case, program control is transferred to the exit routine ENDMOD. Assuming that a valid algorithm subroutine address is found, index register C is loaded with the address of the module that is to be processed, and program control is transferred directly to the algorithm subroutine whose address is stored in register G.

After the algorithm subroutine has completed processing the module, program control is returned directly to the same routine I*INTD. Upon entry at the point I*INTD, it is assumed that the subroutine just completed has calculated and has stored the starting address of the next control chain module in the 42nd location within the task data pool. The routine I*INTD proceeds exactly as described above and transfers program control either to the exit routine SENDMOD or else to the algorithm subroutine which is to process the next module in the control chain. Processing continues in this manner until all of the modules which are to be processed have been processed. Ultimately, program control is transferred to the exit routine ENDMOD.

The particular type of exit performed depends upon whether or not the task level which is currently running is that assigned to the data file processor program, and if so, upon whether or not the subtask which is currently running is assigned to a control chain or to a data file.

With reference to FIG. 10A, when the executive scheduler 10/202 transfers program control to a task level (other than the monitor data file processor program task level) which is subdivided into subtasks, program control is transferred directly to the basic task program 10/1200 within the sublevel processor program and ultimately returns to the basic task program through the basic subtask exit program 10/1300. THe monitor data file processing program 10/140 accesses the CHKBID subroutine 10/1400 (FIG. 10A) directly without the assitance of the basic task program 10/1200. A different exit routine from the control chain processor is therefore required whenever the monitor data file processing program task level is running.

If a control chain subtask is assigned to a system task level other than that of the monitor data file processing program 10/140, the control chain processor transfers program control directly to the basic subtask exit program 10/1300 when the control chain has run to completion. With reference to FIG. 17/700, upon commencement of program control at the location ENDMOD, the task level number of the currently running task level is retrieved from the executive storage location Z*CPR and is compared to the task level number of the monitor data file processing program which is stored in a location ANLTSK. If these two numbers agree, then program control is transferred to ANLCHK, a special exit routine for control chains assigned to the monitor data file processing program task level. In all other cases, index register B is loaded with an address POOL-1. Program control is then transferred directly to the location "*4,B". As will be described in much greater detail as part of the description of the basic subtask exit program, program control passes first to the basic subtask exit program 10/1300 which automatically releases the buffer occupied by a disk resident control chain, and then program control passes back to the basic task program 10/1200. See section 17-F-vii of this specification for a better expiration of what happens at this point.

Two different classes of control chains occur at the monitor data file processing program task level. The first is a conventional control chain which is assigned a control chain subtask number. When a control chain of this type is encountered, program control is returned directly to the entry point of the monitor data file processing program. With reference to FIG. 17/700, the routine ANLCHK first retrieves the highest sublevel number that is assigned to monitor data files within the monitor data file processing program task level from the location LOINDX in the monitor data file processor task header (see the table 10/220 in FIG. 10G). Since index register B points to the 40th location beyond the 7th location in the task data pool, the address of LOINDX is easily determined by subtracting 48 from the contents of register B. LOINDX is then loaded into register E for temporary storage. The sublevel number of the currently running subtask is then retrieved from the sublevel processor tables. The starting address of the currently running subtask table CSR (FIG. 10E) is first loaded into register A, and then the task number of the currently running task is retrieved from the locatin Z*CPR and is added into register A. Register A is then loaded with the entry in the CSR table corresponding to the currently running task level. If the subtask is a disk resident subtask, this sublevel number is negative and is reversed in sign before it is compared with the sublevel number in index register E. After this reversal in sign has been carried out, the LOINDX sublevel number in register E is subtracted from the sublevel number in register A. If the result is positive, this indicates definitely that the subtask to which the control chain is assigned is a control chain subtask of the normal type. In this case, the task starting address is retrieved from the 47th location in the task header data pool preceding that to which the index register B points. With reference to the table 10/220 in FIG. 10G, this is a location numbered zero which contains the address of the entry point for the task level. In the illustrative table shown in FIG. 10G, the address is SPEXIT, the common subtask entry point in the sublevel processor program. However, in the case of a task level assigned to the monitor data file processor program, this address contains the starting address SRTANL minus one of the monitor data file processor program which begins in FIG. 17/1200A.

A second type of control chain may be encountered operating at the analog scan task level. This is an analog control chain which is not assigned a unique control chain subtask number. As will be explained in that portion of this specification describing the monitor data file processor program, analog scan monitor data files which are to be processed sequentially are often linked into long chains so that many monitor data files may be assigned to a single monitor data subtask level. Generally, all these monitor data files are stored together in a single disk sector so that they all may be brought into a core buffer simultaneously when the corresponding analog input variables are scanned. It is often desirable for system stability or other control purposes to execute a short control chain immediately following the scanning of the analog variable defined by such a monitor data file. The fastest and most convenient way of doing this is to link a control chain file directly into the analog scan monitor data file linkage. Control chains linked into monitor data file linkages in this manner are called analog control chains. When the monitor data file processor program encounters an analog control chain file linked into a set of analog scan monitor data files in this manner, the processor transfers program control directly to the control chain processor program so that the control chain monitor data file may be processed immediately and without any further delay. After the control chain file has been executed, it is necessary that program control be returned to a different entry in the monitor data file processor program than the entry point to the monitor data file processor program task level. A special exit from the control chain processor is therefore provided for analog control chains.

With reference to the 11th step past the point ANLCHK in the listing, if the difference between the currently running sublevel number and the constant LOWPTR is found to be negative, the currently running subtask is assigned to monitor data files and not to a control chain. This indicates definitely that the control chain is an analog control chain. Program control is then transferred directly to a point DOCCTC within the monitor data file processor program so that the processing of analog scan data files may be continued without delay.

The table of algorithm subroutine starting addresses appears in FIG. 17/720. The address of the first entry in this table is called MODULE and the address of the last entry in this table is called TERMOD. With reference to FIG. 17/730, the addresses of the beginning and end of this table are stored in locations TERADR and SRTADR where they are available to the main processor routine shown in FIG. 17/700. Zero entries in the table indicate that no algorithm subroutines exist to process data modules having the corresponding type number. As has been monitored, when such a table entry is encountered, the execution of a control chain terminates immediately.

A very brief user trace routine appears in FIG. 17/730. This brief routine extracts the module number from the next module which is to be processed and stores this number in register E. The number "4" is then placed in register A to indicate a chain trace call, and program control is transferred to a user-written trace program. The trace program itself is not per se a part of the present invention and is not described here. Upon returning from the trace program, program control picks up in the routine I*INTD (FIG. 17/700) at the point immediately following the SST instruction.

It has been mentioned at several points throughout this specification that control chain subtasks may be placed into time delay in essentially the same manner that program subtasks may be placed into time delay. With reference to FIG. 9G, when a control chain is linked into the time delay linkage, the time delay linkage pointer points to the center of a special time delay module within the control chain. Upon expiration of the time delay, the control chain time delay module is linked into the suspended subtask linkage and a bid is placed with the sublevel processor program 10/200 (FIG. 10A) to restart the subtask (see FIG. 17/1082 and the accompanying text). In due time, the CHKBID subroutine 10/1400 (FIG. 10A) retrieves the address of the time delay module from the suspended subtask linkage, calculates the address minus one of the time delay module in the control chain linkage by subtracting three from the address of the linkage pointer, and stores this address in index register E. The CHKBID subroutine also obtains the address of the task head plus 8 for the task level to which the control chain subtask is assigned and stores this address in register B (see FIGS. 17/1050 and 17/1051 and the accompanying text). Program control is then passed through the basic task program 10/1200 (FIG. 10A) to the time delay entry of the control chain processor program. The routine which handles control chains returning from time delay appears in FIG. 17/710. The sublevel number of the control chain subtask is first placed in register G for temporary storage. The address of the 40th location within the task header is then calculated and is stored in index register B as in a conventional entry to the control chain processor. The address minus one of the time delay module is then stored in the 42nd location within the task data pool, using index register B as a pointer. The sublevel number is retrieved from register G, is stripped of its four most significant bits, and is stored in register E.

It is now necessary to determine the control chain starting address and to store this address in the 41st location within the task data pool. The number of the task level which is currently running is retrieved from the location Z*CPR and is placed in register A. The starting address POINTADR is then added into the register A. The pointer for accessing subtask tables is retrived from the location whose address is in register A (see the table PNTTAB in FIG. 10C), and the starting address STARTADR of the subtask starting address table STRTAB (FIG. 10E) is added to the subtask table pointer in register A. The sublevel number is then retrieved from register E and is added into the resultant address so that the register A points to the subtask starting address in the table STRTAB. The starting address of the currently running subtask is then retrieved from this table, two is added to this address to space over the control chain file header, and the resultant starting address for the control chain is stored in the 41st location within the task data pool. The address stored in the 42nd location within the task data pool is then retrieved and is increased by 6 so as to point to the next module within the control chain following the time delay module. The incremented address is returned to the 42nd location, and program control is transferred to I*INTD in FIG. 17/700. The processing of the control chain then continues from exactly where it left off in the manner described above.

D. ALGORITHM SUBROUTINE PROGRAM LISTINGS

FIG. 17/8A01 through FIG. 17/8A32 are illustrative program listings of algorithm subroutines. The figure numbers are chosen to correspond with the numbering of FIGS. 8/A01 through 8/A34 which describe similar, but not necessarily identical algorithm subroutines. For example, FIG. 8/A01 explains the operation of a logic algorithm subroutine and the corresponding FIG. 17/8A01 is a program listing for a logic algorithm subroutine. Whenever possible, program listings having been chosen which illustrate different embodiments of the algorithm subroutines from the embodiments illustrated in FIGS. 8/A01 to 8/A34.

I. GENERAL PROPERTIES OF ALGORITHM SUBROUTINE PROGRAM LISTINGS

With reference to FIG. 7, the addresses of the algorithm subroutines are stored in the table SRTADR (FIGS. 17/720 and 17/730) within the control chain processor program. The algorithm subroutines are called upon to process algorithm modules within a control chain, as is shown in FIG. 7 and as is explained in the text which accompanies FIG. 7.

Upon entry into an algorithm subroutine, index register B points to the fortieth location within a task data pool, and index register C points to the first location within an algorithm module or block which is to be processed by the algorithm subroutine (see FIG. 7). The control chain starting address is stored in the 41st location within the task data pool, the location just past that to which index register B points, (location "1,B" in a program listing). Locations 43 and onwards within the task data pool are available for temporary storage of data values and for the storage of arguments for subroutine calls. The locations 1 to 40 within the task data pool are available for use as a register storage area during subroutine calls.

Each task data pool is available only to control chains assigned to a specific task level. If the execution of a control chain assigned to a first task level is interrupted by a call for the execution of a control chain assigned to a higher task level, the control chain assigned to the higher task level does not use the same task data pool that is used by the control chain assigned to the first task level. The control chain assigned to the higher task level therefore cannot destroy or alter the values which have been stored in the task data pool by the control chain assigned to the first task level. This means that the execution of an algorithm subroutine may be interrupted at almost any time without any danger that data values will be lost. It is even contemplated that control chain algorithms may make subroutine calls using the instruction SST*X,B without requiring software lockout. Since register B points to the 40th location within the task data pool, subroutine calls of this type cause the registers to be stored within the task data pool in the locations preceding the 40th location within the pool. Since the registers are stored in the task data pool, they cannot be altered by another control chain running at a higher priority task level. Such subroutine calls therefore do not necessarily have to be executed under software lockout and may be interrupted whenever necessary.

After an algorithm subroutine has carried out a job or a task, the subroutine returns program control to a find next algorithm routine 710 in FIG. 7. The routine 710 accesses the first location within the next algorithm module that is to be processed and determines which algorithm subroutine is to be called upon next. In order for the routine 710 to know where the first location within the next module is located, it is necessary for each algorithm subroutine to calculate the starting address of the next algorithm module which is to be processed and to store this starting address in the 42nd location ("2,B") within the task data pool. In the case of algorithm subroutines which do not execute a transfer or jump, the algorithm subroutines determine the length of the algorithm module which they are processing and add this length to the algorithm module starting address that is stored in index register C. The resultant address is stored in the 42nd location ("2,B") within the task data pool and is the starting address of the next algorithm module within the control chain. In the case of algorithm subroutines which do execute a transfer or a jump, the relative address of the block or module which is to be executed next is contained within the data body of the algorithm block or module which is being processed. The algorithm subroutine adds this relative address to the chain starting address that is stored in location 41 ("1,B") of the task data pool and places the resultant absolute core address into the 42nd location ("2,B") within the task data pool.

In the case of algorithm subroutines which function as controllers, real numbers are used for most computations. These real numbers occupy two successive 16-bit locations or addresses within the system. Double precision arithmetic steps are used for all computations on such real numbers. In executing double precision computations, it is usually necessary to first load the contents of the two locations containing a first real number into the extended accumulator register E and into the accumulator register A. A double precision computation is then performed, usually by a subroutine. An argument to the subroutine call indicates where a second real number or the address of a second real number resides relative to the address stored in index register B. The result of such a computation is then transferred from registers E and A into two adjacent locations or addresses in core. The command "SDA E" clears both registers A and E to zero and allows the registers to be loaded simultaneously by the single command "ADA (address)".

When an algorithm subroutine has run to completion, it executes a direct jump to *DRCTR. This command transfers program control to the location I*INTD in FIG. 17/700. With reference to FIG. 7, this is the entry point to the find next algorithm routine 710.

In the discussion which follows, storage locations within a task data pool beyond the 40th location are referred to as the locations "1,B", "2,B", etc. The location "1,B" is the first location beyond the location whose address is in register B. Since register B contains the address of the 40th location within the task data pool, the location "1,B" is the 41st location within the task data pool. Similarly, the location "2,B" is the 42nd location within the task data pool, and the location "12,B" is the 52nd location within the task data pool. Storage locations within a algorithm module are addressed as "1,C", "2,C", and so on where "1,C" is the second location within an algorithm module, "2,C" is the third location, and so on.

II. LOGIC ALGORITHM SUBROUTINE

The logic algorithm subroutine program listing appears in FIG. 17/8A01. A detailed description of the algorithm module which is processed by the logic algorithm subroutine appears in FIG. 8/A01, and the logical computations which are carried out by the logic algorithm subroutine are fully described in the text which accompanies FIG. 8/A01.

With reference to steps 20 to 39 in FIG. 17/8A01, the subroutine begins by calculating the address +1 of the last location within the algorithm module that contains a logical variable address. This address is stored in the location 4,B. The address of the first location within the algorithm module containing a logical operation code is then computed as the above address plus 1 and is stored in the location 5,B. The number of logical operations which are to be carried out is then retrieved from the location within the algorithm module whose address is stored in 4,B. This number minus 1 is stored in 6,B. The number of logical operations is also added to the address stored in 5,B to give the starting address of the next algorithm module in the control chain, and this address is stored in the location 2,B for reasons which have already been explained above. The number of logical variables is retrieved from the first location 1,C within the algorithm module, and one less than this number is stored in the location 7,B. The address of the 16th location beyond that to which register B points is then computed as "B" plus "$10_{16}$" (written "K:X10") and is stored in the location 8,B. The number of logical variables is then retrieved from 1,C and is added to this address. The resultant address "B" plus "$10_{16}$" plus "No. of variables" is stored in index register C. The shift control register G is then loaded with "SRA4", the code for a 4 bit position circular rightshift.

The task header storage area is allocated as follows:

| | |
|---|---|
| 4,B | Address plus 1 of last logical variable address within algorithm module. |
| 5,B | Address of first operation code within algorithm module. |
| 6,B | Number of operation codes minus 1. |
| 7,B | Number of logical variables minus 1. |
| 8,B | Address of start of logical variable value table within task header storage area (= 16,B). |
| 9,B | Reserved for address of result logical variable. |
| 16,B to 31,B | Reserved for logical variable value table. |
| 32,B to 47,B | Reserved for temporary value table. |

With these preparations completed, the subroutine proper begins at MORARG with a routine that fetches the value of each logical variable and stores the values in the task header storage area.

At MORARG, the number of logical variables minus 1 stored in 4,B is decremented, and the address "B" plus "$10_{16}$" plus "No. of logical variables" stored in index register C is also decremented. Register A is loaded with the address of the last logical variable (LDA *4,B). This last address is also stored in a location 9,B for a reason which will beome apparent below.

A logical variable may be either a full-word logical variable (active logical variable) or a logical bit (passive logical variable). Full-word logical variables are stored in a core file which begins at a location FILIDX (see FIG. 11B). The address of a full-word logical variable is an index relative to this base address and is a positive number (see FIG. 11E). Step 45 detects positive logical variable addresses and transfers program control to LOGEX5. At LOGEX5, the base address FILIDX is added to the address index, and the full-word logical variable is retrieved from the address which results and is loaded into the accumulator. If the logical variable is set (bit 15=1), program control continues at LOGEX4 where the accumulator is loaded with "1". If the logical variable is not set (bit 15=0), then "0" is placed in the accumulator and program control commences at LOGEX4 plus 1.

If the logical variable is a logical bit, bit 15 of the bit address is intentionally set to "1" so that the bit address is negative (see FIG. 11F). In this case, the transfer "PJP LOGEX5" is not executed and program control continues at step 46. Bit 16 of the address is set equal to 0 by the instruction "EOR K"X8000". The logical bit address is then unpacked. The four least significant bits of the address are placed in the accumulator (register A) and the remaining address bits are placed in register E. An "ADA LOGBAS" instruction adds the address of a bit mask table BITTBL to the 4-bit number in register A and simultaneously adds the starting address LIUSER of the system bit tables to the number in register E (see definition of LOGBAS in FIG. 11E). Register A is then loaded with the bit mask to which it points (step 51), and this mask is ANDed into the sixteen logical bits whose address is in register E. The desired logical bit is then the only bit remaining within the accumulator register A. If the logical bit is not set, then register A contains zero and program control commences one step beyond LOGEX4 with a zero stored in register A. If the logical bit is set, then a "1" is present within register A and program control commences at LOGEX4 where "1" is placed in register A.

The "0" or "1" in register A is now stored in the address within the task header data pool to which register C points—a temporary storage table for logical values. The number of logical variables minus 1 stored in the location 7,B is decremented. If this number is still positive or zero, the above steps are repeated cyclically until all of the logical variable values are transferred into the temporary table to which index register C points. When all of the logical variable values have been retrieved and stored in the task data pool beginning with the location 10,B, program control commences at the location LOGEX6. The necessary logical operations are now carried out upon the logical values.

Upon entry at the point LOGEX6, the number of logical operators minus one is retrieved from the location 6,B. If this number is negative, this means there are no logical operations to be carried out—the algorithm subroutine is simply executing a substitution command such as "A=B". In this case, program control is transferred to a location LOGEX1 and continues as is explained below. If a number retrieved from the location 6,B is zero or positive, there is at least one logical operation which must be carried out. Program control commences at MOROP with a routine which evaluates the operation codes and carries out logical operations.

Commencing at the point MOROP, the first logical operation code within the algorithm module, whose address is in the location 5,B, is loaded into register A. The 2-bit operation code in the left-hand portion of this code is isolated and is shifted left one bit position. This, in effect, multiples the operation code by two. The address FUNEXC-1 (which is stored in a location DUNDXX) is added to the operation code to give the address within the listing of a series of instructions capable of executing each possible logical operation. This address is stored temporarily in the location 11,B.

The logical operation code is loaded into register A and is shifted right 2-bit positions and is masked in such a manner that the 4-bit result code remains right-justified in register A. The address 20,B is added to the result code so that register A contains the address of the location within the task data pool where the result of the operation is to be stored. This result address is stored temporarily in register E.

Register A is then loaded with the logical operation code and is shifted right 11-bit positions so that the index number and the table reference code of the first operand is stored in register A. The trailing "1" bits added by the shifting operation are cleared from register A. The address stored in 8,B is added into register A so that register A contains the address of the first operand within the task data pool. This address is stored in register C. By leaving the table reference code as part of this address, the table reference code effectively determines whether the address is that of an argument within a temporary storage table of argument values or the address of a result within a temporary storage table of results. These two tables lie in adjoining sections of the task data pool.

The logical operation code is again loaded into register A and the address of the second operand is calculated in the same way that the address of the first operand was calculated. The second operand is placed in register A.

The next instruction executed is "JMP *11,B". 11,B contains the address which was calculated by adding the operation code multiplied by 2 to the address FUNEXC-1. Program control now commences either at FUNEXC or at a location which is a multiple of two steps past FUNEXC, depending upon the operation code. In this manner, a different set of instructions are called upon to execute each unique logical operation.

The operation code "0" calls for a logical NOT operation. Program control commences at FUNEXC. The contents of register A are exclusively ORed with "1". Program control then continues at EXCLOG where the results of the logical operation are transferred back into storage.

The operation code "1" calls for a logical AND operation. Program control commences two steps beyond FUNEXC. The first operand in register A is ANDed together with the second operand whose address is stored in register C, and program control commences at EXCLOG.

The operation code "2" calls for a logical OR operation. Program control commences four steps beyond FUNEXC with a direct jump to location OREXC. The second operand is added into the accumulator. If the result is "0", a direct jump is executed to EXCLOG. Otherwise, "1" is placed in the accumulator and program control continues at EXCLOG. This rather complex series of instructions is required because the preferred embodiment of the system operates in a machine having no single machine language instruction capable of carrying out a logical OR operation.

The operation code "3" calls for a logical exclusive OR operation. Program control commences 6 steps beyond FUNEXC. The two arguments are exclusively ORed together by an EOR instruction, and program control commences at EXCLOG.

At EXCLOG, the result of the operation is stored in the location whose address is in register E. The address pointer to the operation code address is incremented (INC 5,B) and a counter of logical operations is decremented (DCR 6,B). If the counter remains positive or zero, more operations remain to be processed and program control is returned to MOROP.

When the counter 6,B becomes negative, the computation is complete. The address of the logical variable which is the result of the operation is retrieved from the location 9,B and is stored in index register A. The result of the final logical operation is stored within the first location within the result temporary storage table, location 32,B. This result is now retrieved and is checked. If the result is "1", the output logical variable is set by the subroutine SETONR and program control is returned to the control chain processor program. If the result is "0", program control commences at LOGEX3 where the output logical variable is cleared by the subroutine SETZER. Program control is then returned to the control chain processor. This completes the execution of the algorithm subroutine.

With reference to the step following LOGEX6, if no operation codes are contained within an algorithm module, the logic algorithm subroutine assumes that the operation which is to be carried out is the simple operation "A=B". Program control commences at LOGEX1. The value of a single input logical variable is retrieved from the location 17,B and is stored in the output logical variable location 32,B. Program control then commences at LOGEX2 and proceeds as has been explained.

III. ARITHMETIC ALGORITHM SUBROUTINES

The algorithm subroutine ARITH appears in FIG. 17/8A02. The functions performed by this algorithm subroutine are explained in FIG. 8/A02 and in the portion of this specification which accompanies that figure.

Upon entry into the ARITH algorithm subroutine, the following data values are stored within the task data pool using the index register B as a base register. The address of the next algorithm module or block is calculated and is placed in the location 2,B. The address of the location preceding the list of constants within the algorithm module is stored in the location 4,B. The address of the location preceding the list of variables in the algorithm module is stored in the location 5,B. The number of arithmetic operations minus 1 is stored in the location 6,B. The address of the first word in the first two-word arithmetic operator code is stored in location 7,B, and the address of the second word in the fist two-word operator code is stored in location 8,B. The location 9,B is reserved for storage of an operation subroutine address, the location 10,B is reserved for storage of an operation result address, and the location 11,B is used to store the address of the second operand. Location 12,B is loaded with the address of the location 13,B, the beginning of a temporary value and variable value storage table within the task header data pool.

Beginning at step 40 in FIG. 17/8A02, the number of operations which are to be performed minus one is loaded into register A. If this number is negative, then the arithmetic operation which is to be performed is a simple transfer such as "A=100" or "A=B". Program control then begins at a location ARITH7. The address of the first variable is retrieved and is stored in location 10,B as the address of the result. The number of constants as specified by the algorithm module is then checked using index register G. If this number is not zero, then the address of the first (and only) constant is loaded into register A and a transfer is executed to the location ARITH12. If the number of constants is zero, program control commences at ARITH11 where register A is loaded with the address of the first (and only) variable. Program control then commences at ARITH12. The first of two words which comprise the constant or variable is loaded into index register E, and the second of the two words is loaded into index register A. Program control then commences at ARITH8. As will be explained below, the output variable is ultimately set equal to the number which is now stored in index registers E and A, and program control ultimately returns to the control chain processor program.

Returning to step 41, if one or more arithmetic computations are to be carried out, program control commences at ARTHST. A first arithmetic computation is now carried out in accordance with the first two-word arithmetic operator code. The operation code for the first operation which is to be performed is retrieved from the first word of the operator code (steps 42 and 43). This operation code is added to an address OPADTB, the starting address of a table containing the addresses of various system subroutines for performing different types of arithmetic operations (step 44). The result of this addition is the address of a location which contains the address of a subroutine which can carry out the desired arithmetic computation. This subroutine address is stored in the location 9,B (steps 45 and 46).

Beginning with step 47, the result index is retrived from the second word of the operator code (steps 47 and 48) and this index is added to the starting address of the temporary value table which is retrieved from 12,B (step 49). The resultant address is stored in the location 10,B. This address is a location within the temporary value table where the result of the arithmetic computation is to be stored. Beginning with step 51, the index of the second operand and the table reference TR for the second operand is retrieved from the second word of the operator code and is right-justified within the accumulator (steps 51-54). In step 55, "256" is subtracted from the value in the accumulator. If the result is negative, then the table reference code TR is "00" and the second operand is a variable. "256" is then added back into register A. The operand index is added to the starting address of the variable table which is stored in 5,B. The address of this variable is placed in index register A, and program control commences at ARTH3.

If the result of the subtraction is positive or zero, the reference is either a constant or a value in the temporary data table. Program control then commences at ARTH1 with the subtraction of an additional "256" from the contents of register A. If the result is negative, then the table reference code TR is "01" and the second operand is a constant. "256" is then added to register A, and the starting address of the constant table within the algorithm module is also added to register A. Program control then commences at ARTH3.

If the result of the second subtraction is zero or positive, the second operand is a value in the temporary value table. Program control commences at ARTH2 where the address of the temporary value table is retrieved from 12,B and is added to the value index in register A.

Program control then commences at ARTH3. The address of the second operand is transferred from register A to the location 11,B.

Beginning with step 68, the first operand is located and is stored in the registers E and A. The index of the first operand and the table reference TR of the first operand are first retrieved from the first word of the arithmetic operator code, are loaded into register A, and are right-justified within the register. "256" is then subtracted from register A. If the result is negative, the first operand is a variable. If the first operand is zero, program control commences at ARTH9 with the loading of zeroes into both of the registers A and E. Program control then commences at ARTH10 minus one where the actual arithmetic computation is carried out. If the first operand is not zero, the address of the algorithm module variable address table is retrieved from 5,B and is added to the index stored in register A. Register A now contains the address of the address of the first operand. Register A is then loaded with the address to which it points so that register A contains the address of the first operand, a variable. Program control commences at ARTH6.

If the result at step 72 is positive, the first operand is either a constant or a value in the temporary table. Program control commences at ARTH4. "256" is again subtracted from register A. If the result is negative, the first operand is definitely a constant. "256" is added to register A along with the address of the constant table within the algorithm module. Register A now contains the address of the first operand, a constant. Program control then commences at ARTH6.

If the result at step 79 is positive, the first operand is a value in the temporary table. Program control commences at ARTH5. The starting address of the temporary table is retrieved from 12,B and is added to the contents of register A. Register A now contains the address of the first operand, a temporary value.

Program control now commences at ARTH6. Register E is loaded with the first half of the first operand whose address is in register A. Register A is incremented and is loaded with the second half of the first operand whose address is in register A. The location 9,B contains the address of a subroutine which is to execute the arithmetic operation. This address is retrieved and is stored in register G. Program control then commences at ARTH10.

At ARTH10, an SST*G,B command is executed. This causes the system registers to be stored in the locations preceding that to which register B points within the task data pool. Program control is then transferred to the subroutine whose address is stored in the location to which index register G points.

The subroutine addresses are shown in the table OPADTB at the bottom of FIG. 17/8A02. While the table OPADTB contains symbolic names, these names represent the addresses of the corresponding subroutines. The following subroutines are available in the preferred embodiment of the invention:

| NAME | OPERATION |
|---|---|
| FLTADD | Floating point addition |
| FLTSUB | Floating point subtraction |
| FLTMPY | Floating point multiplication |
| FLTDIV | Floating point division |
| EXPONT | Exponentiation routine |
| SINE | Sine function |
| COSINE | Cosine function |

-continued

| NAME | OPERATION |
|---|---|
| ARCTAN | Acctangent function |
| SQUROT | Square root function |
| ABSOLT | Absolute value function |
| 0 | (spare) |
| EXP | Exponential function |
| ALOG | Natural logorithm function |

Each of these subroutines expects a first operand to be stored in the registers E and A and expects a second operand to be stored in the location specified by an argument of the subroutine call. With reference to step 89, the argument is "$800B_{16}$" and indicates that the address of the second operand is stored in the 13th ("$B_{16}$") location beyond that to which index register B points. Upon returning from the subroutine call, program execution commences at ARTH8. The result of the operation is stored in registers E and A. Location 10,B contains the address of the location where the result of this operation is to be stored. Hence, the contents of register E are stored in the address to which 10,B points; 10,B is incremented; and the contents of register A are stored in the address to which 10,B then points. The addresses in the locations 7,B and 8,B are then incremented twice so that these locations point to the second two-word arithmetic operator codes within the algorithm module. The content of the location 6,B is decremented, and a test is made to see whether the number stored in the location 6,B has become negative. If this number is positive or 0, then additional operations remain to be carried out. Program control again commences at ARTHST in the manner explained above. If this number is negative, the computation is finished. The output variable is the first variable specified within the algorithm module. The address of the output variable is stored in the location just beyond the address stored in 5,B. The programming steps 99 to 104 transfer the contents of registers E and A to the output variable storage locations. Program control is then returned to the control chain processor program.

IV. THE FLIP-FLOP ALGORITHM SUBROUTINE

FIG. 17/8A03 illustrates the flip-flop algorithm subroutine. This subroutine processes an algorithm module such as that shown in FIG. 8/A03D.

The address of the set logical variable SET is first retrieved from the first data location within the algorithm module (1,C) and the value of this logical variable is determined by a call to the logic initiator subroutine BITLOD (FIG. 17/1150). This value is then stored in the location 4,B. The value of the reset logical variable RESET is determined in a similar manner and is stored in the location 5,B. Since the algorithm module for this subroutine occupies five locations, "5" is then added to the algorithm starting address in the location 2,B to give the address of the next algorithm subroutine.

In step 30, register A is loaded with the value of the set logical variable. If this variable is not set, program control commences at FLP1 where the value of the reset logical variable is checked. If neither of the input logical variables is set, program control is returned to the control chain processor, and the values of the flip-flop variables DIROUT and BAROUT are not altered.

If the set logical variable SET is set, then program control commences at a location FLP2. The output logical variable DIROUT is set and the output logical variable BAROUT is reset by calls to the subroutines SETZER and SETONR (FIG. 17/1160). If the set logical variable is cleared and the reset logical variable is set, then program control commences at a point 37 where the output logical variable DIROUT is cleared and the output logical variable BAROUT is set. In either case, program control is returned to the control chain processor program after the output logical variables have been adjusted.

If both the input and output logical variables are set, the flip-flop is reset by the program steps beginning with step 37. If desired, this algorithm subroutine may be modified so that the flip-flop either does nothing when both inputs are set or simply toggles in response to both inputs being set.

V. COMPARE AND SET ALGORITHM SUBROUTINE

The algorithm subroutine COMPSET appears in FIG. 17/8A04. In addition, reference will be made to the table shown in FIG. 17/8A29B, since a similar table forms a portion of the subroutine COMPSET program listing. A similar algorithm subroutine appears in FIG. 17/8A04 and is fully described in the text which accompanies that figure. The subroutine COMPSET shown in FIG. 17/8A04 assumes that a reference address REF is the last entry within the algorithm module. In FIG. 8/A04E, this reference address is shown as the second entry within the algorithm module. In all other respects, the algorithm module shown in FIG. 8/A04E is formatted properly for processing by the algorithm subroutine COMPSET shown in FIG. 17/8A04. The table shown in FIG. 17/8A29B labeled as "DAT1" is referred to in the COMPSET subroutine (FIG. 17/8A04) as the table "DAT". For the purposes fo the discussion which follows, the lower table in FIG. 17/8A29B will be assumed to be entitled simply "DAT" rather than "DAT1".

Upon entry into this subroutine, the address of the next algorithm module is calculated and is stored in the location 2,B. The address of the table COMPJP (FIG. 17/8A29B) is then stored in the location 5,B. Beginning at step 20, a routine is entered which determines exactly what type of comparison is to be carried out. The Fortran-type comparison code (GE, LE, LT, etc.) specified by the systems engineer is retrieved from location 2,C within the algorithm module and is successively compared with the entries in the table DAT which appears in FIG. 17/8A29B. After each unsuccessful comparison, the address stored in the location 5,B is incremented. Ultimately, program control reaches EXECSB. The location 5,B then contains the address of an entry in the table COMPJP. With reference to FIG. 17/8A29B, each entry in this table is the starting address of a routine in FIG. 17/8A04 designed to carry out a specific comparison test.

Commencing at EXECSB, the address of the reference variable REF is transferred from the 5th location within the algorithm module to the location 4,B within the task data pool. The address within the subroutine of the routine for carrying out the proper comparison is then retrieved from the table COMPJP (FIG. 17/8A29B) and is stored in the location 5,B. The input variable is then loaded into registers E and A, and a direct jump is made to a system subroutine "*S11:" which performs subtraction. An argument "$8004_{16}$" to this subroutine call points to the address of the reference variable which is stored in 4,B.

Upon return from the subroutine, the computer designator registers are set to indicate the relative magnitudes of the input and reference variables. A direct jump is then made to the address of the comparison routine which is stored in 5,B. This address is one of the addresses 61, 63, 65, 68, 70, or 72, depending upon which address was retrieved from table COMPJP. At that address, an appropriate comparison of the relative magnitudes of the input and reference variables is carried out. If the result of the comparison is true, program control commences at TRUE. If the result of the comparison is false, program control commences at FALSE. As an example, if the test requested is the test greater than ("GT"), program control commences at the location GTTEST. If the result of the comparison is negative or zero, the input variable is not greater than the reference variable, and program control is transferred to the location FALSE. Otherwise, the input variable is greater than the output variable and program control is transferred to TRUE.

At the location TRUE, the address of the true logical varible is retrieved from the third location within the algorithm module and is stored in a location 6,B. The address of the false logical variable is retrieved from the 4th location within the algorithm module and is stored in the location 7,B. Beginning at TOL3, the address of the first logical variable is loaded into register A and this variable is set via the subroutine SETONR. The address of the false logical variable is then loaded into register A and this variable is cleared by the subroutine SETZER. Program control then returns to the control chain processor program.

If program control commences at the location FALSE, the same procedure is carried out except that the false output logical variable is stored in the location 6,B and the true output variable is stored in the location 7,B. When program control commences at TOL3, the false output variable is set and the true output variable is cleared. Program control then returns to the control chain processor program.

VI. SET AND RESET ALGORITHM SUBROUTINES

A set and reset algorithm subroutine appears in FIG. 17/8A05. This algorithm subroutine processes an algorithm module of the type illustrated in FIG. 8/A05D. The algorithm subroutine begins by storing one less the number of variables which are to be set true in a location 4,B and by storing in the location 6,B the address plus one of the location within the module containing the last variable which is to be set true. One less than the number of logical variables which are to be set false is then calculated and is stored in a location 5,B, and the address plus one of the last variables which is to be set false is stored in a location 7,B. Since the address stored in 7,B is the address of the next algorithm subroutine which is to be executed, this same address is also stored in the location 2,B for reasons which have been explained fully above.

Program control then commences at STRS1. The address in 6,B is decremented, and register A is loaded with the address of the corresponding logical variable. The subroutine SETONR is then called upon to set this logical variable. The counter in 4,B is then decremented. If the counter is still positive or zero, program control returns to STRS1 and continues to do so until all of the specified logical variables which are to be set true have been set true.

Program control then commences at STRS2. In a similar manner, the specified list of logical variables which are to be set false are set false by the subroutine SETZER. Program control is then returned to the control chain processor program.

VII. LOGICAL TIME DELAY ALGORITHM SUBROUTINE

A logical time delay algorithm subroutine appears in FIG. 17/8A06. The algorithm module required by this subroutine appears in FIG. 8/A06F. This exemplary algorithm subroutine is intended for use with core-resident control chains which are always present in core and which are never returned to disk storage. It is therefore possible to store the various values required by the time delay algorithm subroutine within the control chain itself. An alternative algorithm subroutine is available for performing the same time delay function with disk-resident control chains. The algorithm subroutine program for disk-resident control chains utilizes a special core storage area which is set aside for the purpose of storing logical time delay data. A disk resident algorithm subroutine of this general type is described at another point.

Upon entry to the subroutine, the address of the input logical variable is retrieved and its value is determined by the subroutine BITLOD. This value is stored in a location 4,B within the task data pool. The address of the next algorithm subroutine is then calculated and is stored in the location 2,B. The value of the input logical variable is then checked. If the input logical variable is clared or "0", the time delay is not executed and program control is returned to the control chain processor program. If the input logical variable is set or "1", program control commences at step 45.

The current value of the counter within the algorithm module is first checked. If the counter is positive, a delay is already in effect, and program control is returned directly to the control chain processor without any further action. Otherwise, a number designating the duration of the time delay is retrieved from the first entry in the algorithm module. A check is made to see if this number is greater than a value RESHI. If so, it is assumed that a low resolution time delay is desired. Program control is transferred to a location RESLO. If the number is less than RESHI, program control continues at RES1. The number designating the duration of the time delay is stored in the location 2,C which is the second entry within the algorithm module. The contents of a location HILINK are then retireved (see FIG. 9F) and are stored as the 3rd entry within the algorithm module in the location 3,C. The address of the algorithm module itself is retrieved from the index register C and is stored in the location HILINK. In this manner, the algorithm module is linked into the high resolution time delay countdown linkage shown in FIG. 9F. Program control then returns to the control chain processor program.

At the location RESLO, a similar procedure is followed except that the algorithm module is linked into the low resolution time delay linkage which commences with the location LOLINK (see FIG. 9F). The number designating the duration of the time delay is divided by an appropriate divisor LORES to compensate for the fact that the low resolution linkage is not processed as often as the high resolution linkage.

The algorithm subroutine just described performs a true-true logical time delay of the type shown in FIG. 8/A06. An algorithm subroutine performing a false-false time delay of the type shown in FIG. 8/A07 uses an algorithm subroutine which is essentially identical to that shown in FIG. 17/8A06 but with the following changes: The test in step 44 is replaced by a test that cancels the time delay when the input variable is true; and the values which are stored in step 53 and in step 63 are made negative so that the subroutine shown in FIG. 17/940 knows that this is a false-false logical time delay.

VIII. FUNCTION GENERATOR ALGORITHM SUBROUTINE

The function generator algorithm subroutine appears in FIG. 17/A808. The algorithm module processed by this subroutine appears in FIG. 8/A08F. The subroutine begins by calculating several values and by storing these values in the task data pool. The address of the next algorithm block is calculated and is stored in the location 2,B; the input and the output variable addresses are stored respectively in the locations 4,B and 5,B; "1" is placed in location 6,B; the address of the second location preceding those locations within the algorithm module which contain the addresses of X data words is stored in location 8,B; and the number of data points involved in the nonlinear computation is calculated and is stored in the location 15,B.

Beginning at S1, the subroutine determines between which two adjoining X data points the input value lies. The address stored in 8,B is incremented twice so that it points to the location within the module where the first X value is stored. The accumulator and the extended accumulator are cleared by the command "STA E". The first X value is then placed in the accumulator and into the extended accumulator, and a subroutine is called upon which subtracts the input variable value from this first X value.

If the result of this subtraction is positive, then the input data value does not lie beyond this X value, and program control continues at S2. If the result is negative, another value of X must be checked. The value stored in location 6,B is incremented from one to two and the number of points stored in location 15,B is subtracted from this value. A negative result indicates that not all of the X data points have yet been checked, and program control returns to S1. A zero result indicates that all of the X values except for one have been checked and therefore indicates that the input value lies either between the last two points or beyond the last point. In either case, program control continues at S2.

When program control commences at S2, the address of an X data value whose magnitude just exceeds the magnitude of the input variable (if any such value was found) is stored in 8,B. This address minus 2is stored in a location 7,B so that the address of the X value whose magnitude is just below that of the input variable is stored in 7,B.

The number of X data words is retrieved from the seventh location 7,C within the algorithm module, and "1" is added to this number. The resultant number is added to the address stored in 7,B to give the address of a Y data value whose magnitude is just below that which the output variable will soon assume. This first Y data value address is stored in the location 9,B. Two is added to this address to give the address of a second Y data value whose magnitude just exceeds that which the output variable will soon assume and this address is stored in 10,B.

The accumulator and the extended accumulator are then cleared by the command "STA E", and the input variable is loaded into the accumulator and extended accumulator. A subroutine call is then executed to a floating point subtraction subroutine with an argument "8007" indicating that the address of an argument for the subroutine call is stored in 7,B. The lower X data value is thus subtracted from the input variable. The result of this subtraction is stored in the locations 11,B and 12,B. The accumulator and the extended accumulator are then again cleared, and this time the higher X data value is loaded into the accumulator and extended accumulator. Another subtraction is then performed with the subroutine argument again pointing to the lower X data value stored in the location 7,B. The result of this ccomputation is stored in the locations 13,B and 14,B.

The extended accumulator and the accumulator are then cleared. The larger Y data value is loaded into the accumulator and extended accumulator, and a subtraction is performed during which the smaller Y data value is subtracted from the larger Y data value. The argument accompanying the subroutine call to the subtraction subroutine contains a "9" and points to the location 9,B where the smaller Y data value is stored. Another subroutine call is immediately executed to a floating point divide subroutine which divides the result of the previous calculation by the number stored in the locations 13,B and 14,B. The "$D_{16}$" in the argument accompanying the subroutine call is "$13_{10}$" in decimal notation and points to the location 13,B. The result of this computation is immediately multiplied by the value stored in the locations 11,B and 12,B, and the result of this computation is then added to the lower Y data value whose address is stored in the location 9,B.

By way of explanation, the argument which accompanies each of the above subroutine calls is either of the form "$0008_{16}$" or the form "$8008_{16}$". The right-hand "8" indicates an address relative to index register B. The presence of an "$8_{16}$" in the left-hand portion of this argument changes the sign bit of the argument and signifies an indirect address reference, as opposed to a direct address reference. Hence, the argument "0008" means that a value itself is stored beginning with the 8th location past that to which index register B points, and the argument "8008" indicates that the address of a value is stored in the 8th location beyond that to which index register B points. This same explanation is applicable to all other such argument references.

Tfhe above calculations evaluate the equation which is shown in FIG. 8/A08E. This is a standard equation for converting an input value to an output value using the points on a broken curve such as that shown in FIG. 8/A08D.

The address of the output variable is stored in the location 5,B. Tfhe result of the computation is then transferred from the registers E and A to the output variable address locations. This completes the basic execution of the function generation algorithm subroutine.

The remaining steps of the subroutine beginning with the step "LDE 3,C" perform a limit check on the output of the algorithm subroutine and limit fluctuations of this output value to within the limits specified by the LOLIM and HILIM variables within the algorithm module (see FIG. 8/A08). The HILIM (high limit)

constant is first loaded into registers E and A, and the calculated output value is subtracted from the value HILIM. If the result is negative, then program control commences at S3 where the accumulator and the extended accumulators A and E are cleared and the HILIM value is placed within the accumulator and extended accumulator. Program control then commences at S5 where the value HILIM is supplied as the output variable. Program control is then returned to the control chain processor program.

If the result of the HILIM computation is positive, then the output value does not exceed the HILIM value. Registers E and A are then to be loaded with the LOLIM value and a second subtraction is performed to see whether or not the output variable is lower than the LOLIM value. If not, program control returns directly to the control chain processor program. If the function generator output is below the LOLIM value, then program control continues at S4 where the LOLIM value is loaded into the accumulator and extended accumulator. This value is then stored as the output value, and program control is returned to the control chain processor program.

IX. TIMED CONTACT CLOSURE OUTPUT ALGORITHM SUBROUTINE

The algorithm subroutine TMDOUT appears in FIG. 17/8A09. This algorithm subroutine places a timed contact closure output request into the contact closure output device timeout table shown in FIG. 9H. The algorithm module required by this subroutine appears in FIG. 8/A09E, but this module must be modified for reasons which will be explained below.

The subroutine first calculates the address of the next algorithm subroutine in the control chain and stores this address in the location 2,B for reasons which have been explained above. Zero is then stored in the location 4,B as a flag. A device number is then retrieved from the third location within the algorithm module. The upper four bits of the device number are set to zero, and the value NUMOUT, the maximum number of contact closure outputs which may be actuated in this manner, is subtracted from what remains. If the result is positive, the device number is not valid, and so program control is returned immediately to the control chain processor program. Otherwise, the program continues.

The address of the location immediately following the device timeout table (see FIG. 9H) is retrieved from a location CCOTB6 and is added to the device number index. The resultant address is stored in a location 5,B. This number is used later as an index to the table shown in FIG. 9H.

The same device number is again retrieved from the algorithm module, and once again the upper 4 bits are altered to zero. Two output bits are required to control each contact closure output device, and eight pairs of such bits are stored in each register in the contact closure output bit image table. Since three data bits are sufficient to represent the numbers one to eight, the device number includes only three bits specifying which pairs of bits within a register of the CCO bit image table (FIG. 11C continued) relate to a particular device. The remainder of the bits indicate which register within the table relates to the particular device. To isolate the three least significant bits from the others, the device number is divided by seven so that the three least significant bits are effectively shifted into the extended accumulator. The three bits are then multiplied by two by a unit shift of the extended accumulator to the left, and the bits which remain in the accumulator A are shifted left 4-bit positions so as to leave room for a 4-bit bit position number. The bit address in the extended accumulator E is then added into the accumulator. The address of the contact closure output bit registers is retrieved from a location CCOTB7 and is added into the accumulator to give a bit address which is properly formatted for processing by the subroutines SETZER and SETONR. The resultant logical bit address is stored in the location 6,B and is in the format shown in FIG. 11F.

The accumulator is now loaded with the input variable. If the variable is zero, the two bits for the contact closure output device are both reset by calls to the subroutine SETZER, and program control is returned to the control chain processor program.

If the input variable (the count) is non-zero, then program control commences at TIME1. If the input count is negative, "−1" is placed in the flag location 4,B, and the count is reversed in sign and is made positive. If the input count is positive, the above steps are skipped. In either case, program control contines a LOWTIM.

One significant difference between the subroutine shown in FIG. 17/8A09 and the modified subroutine shown in FIG. 8A09 should be pointed out. The algorithm module required by the subroutine shown in FIG. 17/8A09 includes three data values, the first of which is a maximum count, the second of which is an input address, and the third of which is a device number. In FIG. 8/A09, the maximum count data value is not shown. It would have to be included in the modules shown in FIGS. 8/A09E and 8/A09F before those modules could be executed by the subroutine shown in FIG. 17/8A09. It would be a simple matter to modify the macro specifications table in FIG. 8/A08G so as to include a maximum count value specification immediately preceding the specification for the variable INPUT. An additional MAXCT (maximum count) item could then also be added to the coding shown in FIGS. 8/A08C and 8/A08D, for example.

Commencing at LOWTIM, the absolute value of the count is stored temporarily in index register E and is also lift in the accumulator register A. The value of the maximum count is now subtracted from the absolute value of the count. If the result of this subtraction is zero or positive, the value of the maximum count is placed into register E in place of the actual count, thus effectively limiting the length of the count. Otherwise, the value of the count is left undisturbed within register E. This effectively limits the maximum allowable contact closure to the time interval which corresponds to the maximum count valve.

It is possible that the contact closure output device may already be in operation. As is noted in FIG. 9H, a record of the number of devices in operation is maintained in a location TMETBL. A check is made of the location relating to this device to see if that entry in the table TMETBL contains zero and thus indicates that this device is currently not active. If the device is active, then the record in the location TMETBL is not incremented. On the other hand, a positive or negative count indicates that the device is presently in operation. In this case, the step incrementing the location TMETBL is bypassed and is not executed.

The count value is now transferred back into register A from register E and its sign is restored. The sign of the count is recorded in the flag location 4,B. If this location contains a negative number, then the sign of the count is reversed. Otherwise, the sign reversing steps are skipped over. The adjusted count is then stored in the location 5,B, and zero is stored in register E.

The logical bit address of the contact closure output device is now retrieved from the location 6,B and is placed into register A. The address in register B is stored in a location BSTORD+1 which appears toward the bottom of the program listing. Register E is now loaded with the raise/lower flag stored in the location 4,B. If the flag is negative, program execution continues at RSZCON. Assuming the flag is positive, the logical bit address is stored in the location BSTORA+5, and register B is loaded with the address BSTORA−1 that is stored in the location ADBSTA.

A direct jump is now executed to the subroutine SETZER. The subroutine SETZER clears the first CCO bit for this particular output device. The subroutine SETZER executes an "EST 1,B" command to return program control to the alorithm subroutine, and thus automatically loads the system registers from the consecutive locations beginning with the location BSTORA to which index register B points. The program counter is thus automatically loaded with the address BBBARA−1. Program control commences at BBBARA where the bit address in register A is incremented. A direct jump is immediately executed to the subroutine SETONR where the second CCO bit for this device is set. In this manner, the first CCO device bit is cleared and the second CCO device bit set so as to put the device in a "raise" state.

Upon return from the subroutine, the program registers are automatically loaded from the location BSTORB, the address to which register B points. Hence, the program counter is automatically loaded with the value BBBARB−1 and register B is loaded with the value BSTORD−1. Program control commences at BBBARB, and a jump is immediately executed to the software lockout release program. Upon return from this program, the program registers are loaded with the locations commencing with the address BBBARD−1, and hence program control continues at the location BBBARD with a direct jump to the control chain processor program.

If the content of the location 4,B is negative, a similar routine to that just described is executed which sets the first contact closure output bit and clears the second contact closure output bit and then returns program control to the control chain processor program. This routine effectively sets the contact closure output bits to their "lower" state.

The values stored in the locations CCOTB6 and CCOTB7 are shown in the lower part of FIG. 17/8A09. CCOTB6 contains the address which is one past the last address in the table TMETBL shown in FIG. 9H. It should be noted that the count which is added to CCOTB6 is a number equal to minus one plus the negative of the device number index. Hence, the resultant address is one lying within the table TMETBL. The value CCOTB7 is calculated as follows: First, the register number of the first register within the contact closure output portion of the logical bit table (FIG. 11C continued) assigned to pairs of timed contact closure outputs is calculated. This register number is shifted left four bit positions to leave room for a 4-bit bit number. "$8000_{16}$" is added to the register number so that bit 15 is equal to "1". The result is called CCOTB7 and is in accordance with the format for a logical bit address which is illustrated in FIG. 11F. The precise definition of CCOTB7 given in the lower part of FIG. 17/8A09 includes the addresses COAVTO and LIUSER which are defined in FIG. 11C continued. Thfe value CCOINX is the number of active contact closure output registers which precede the first contact closure output register that is assigned to pairs of timed contact closure outputs.

X. PIR AND RELATED ALGORITHM SUBROUTINES

The control algorithm subroutines are often grouped so that a number of subroutines may share in the use of common program listing sections. FIG. 17/8A10, 17/8A18, 17/8A11, and 17/8A14 illustrate such a group of related algorithm subroutines all of which make use of portions of the listing shown in FIG. 17/8A14.

The simplest algorithm subroutine in this group is the proportional-plus-reset algorithm subroutine PIR which appears in FIG. 17/8A11. The algorithm module processed by this subroutine appears as follows:

| Location Within Module | Content |
|---|---|
| 1 & 2 | $CI = \frac{\Delta T}{T}$ |
| 3 & 4 | YI |
| 5 & 6 | T (Not used in computations) |
| 7 & 8 | K = Gain |
| 9 | Input variable address |
| 10 | Output variable address |

This algorithm subroutine differs somewhat from the subroutine illustrated in FIG. 8/A11, but both subroutines achieve the result illustrated by FIGS. 8/A11B and 8/A11C. The algorithm subroutine shown in FIG. 17/8A11 executes the following three equations, which are written in Fortran notation:

$$C2 = K*X$$

$$YI = YI\ CI*X \text{ (where } CI = \frac{\Delta T}{T}\text{)}$$

$$Y = YI + C2$$

An analysis of the math involved reveals that the above three equations produced the same values of Y and YI that are produced by the two equations shown in FIG. 8/A11E. However, C1 is defined differently in the two sets of equations: In the above three equations, C1 is the ratio of ΔT to the reset time constant T; in FIG. 8/A11E, C1 is this same ratio plus the proportional gain K. In all other respects, the terminology used here is identical to that used in FIG. 8/A11.

Upon entry to this algorithm subroutine, the address of the next algorithm module is calculated and is stored in the location 2,B for reasons which have been explained. The input variable address is then stored in the location 5,B and the output variable address is stored in the location 6,B. zeroes are then stored in the locations 12,B and 16,B to serve as flags. Program control then continues in FIG. 17/8A14 at the location PIAB1. The value of the grain K is first loaded into the registers E and A, and this value is multiplied by the value of the input variable, the address of which is stored in 5,B. The result of this multiplication is stored in the two locations 9,B and 10,B and is the constant C2 in the above equations. The address of the past integral value YI is next calculated and is stored in 11,B within the task data pool. The value of the constant C1 (=ΔT/T) is then loaded into the registers E and A and is multiplied by the input data value whose address is stored in the location 5,B. The result of this multiplication is immediately added to the past value of YI, the address of which is stored in 11,B.

Since the location 12,B contains zero, program control continues at PIAB5. A check is made to see whether anything is stored in the location 11,B. Since an address is stored in that location, program control continues two steps past PIAB5. The value just calculated is stored as the new value of YI in the third and fourth locations within the algorithm module. Zero is stored in the location 11,B to serve as a flag. C2 is now added to YI to give the controller output Y. Program control is then transferred successively to PIAB7, to PIAB5, and to PIAB6 in that order. The newly calculated value of Y is then stored as the controller output variable in the location whose address is stored in 5,B. Since the location 16,B contains zero, program control then returns to the control chain processor program.

An algorithm subroutine ADJPIR (adjustable parameter proportional-plus-reset controller) appears in FIG. 17/8A10. This subroutine is similar to the algorithm subroutine described in FIG. 8/A10, but processes a different algorithm module and performs a limit check on the integral and output values generated by the controller so as to keep these values wihtin preset limits.

The algorithm module processed by this subroutine is formatted as follows:

| Location Within Module | Content |
|---|---|
| 1 & 2 | Reserved for the calculated value of the constant C1 = ΔT/T. |
| 3 & 4 | The past value of the integral YI. |
| 5 & 6 | Delta T. |
| 7 | Address of the proportional gain variable K. |
| 8 | Address of the reset time constant variable T. |
| 9 & 10 | High limit value for YI and for Y. |
| 11 & 12 | Low limit value for YI and for Y. |
| 13 | Address of controller input variable X. |
| 14 | Address of controller output variable Y. |

Beginning in FIG. 17/8A10 and continuing at PIAB2 in FIG. 17/8A14, the algorithm subroutine ADJPIR begins by performing a number of preliminary computations. The address of the next algorithm module is calculated and is stored in the location 2,B within the task header data pool for reasons which have been explained. The addresses of the controller input and output variables X and Y are respectively stored in the locations 5,B and 6,B. A value is placed in the location 12,B to serve as a flag indicating that a limit check is to be carried out. The address of the gain variable K is stored in 13,B, and the address of the time constant variable T is stored in the location 14,B. A zero is placed in the location 16,B to serve as a flag.

The subroutine proper begins (at step 30 in FIG. 17/8A10) by calculating the value of the constant C1 as delta T divided by T. This value is stored in the first and second locations within the algorithm module itself (steps 30 to 37 in FIG. 17/8A10). The gain constant K is then loaded into registers E and A, and program control continues at PIAB2 in FIG. 17/8A14.

The gain constant K is then multiplied by the value of the input variable X, and the result of this multiplication is stored in locations 9,B and 10,B (steps 98 to 101 in FIG. 17/8A14). The address of the integral past value YI within the algorithm module is calculated and is stored in the location 11,B. The value of the constant C1 is then retrieved from the first two locations within the algorithm module and is multiplied by X. The past value of the integral YI is then added to the resultant product so that the new integral value YI remains within registers E and A (steps 105 to 110).

Program control then continues at step 117 where a limit check is carried out. The newly calculated integral value YI is stored temporarily in the locations 7,B and 8,B. The value of YI is then compared with the high limit and low limit values to see if it lies above the high limit value or below the low limit value (steps 119–122 and steps 127–130). If the calculated value of YI is above the high limit value (step 123), then the high limit value is loaded into registers E and A (steps 124 and 125) and is stored as the new integral output value YI (steps 141 and 142). If the calculated value is lower than the low limit value (step 131), then the low limit value is retrieved (steps 132 and 133) and is stored as the new integral value YI (steps 141 and 142). If the calculated value of YI is within the proper range, it is retrieved (steps 136 and 137) from the locations 7,B and 8,B and is stored in locations 3 and 4 within the algorithm module (steps 141 and 142). Zero is then placed in the location 11,B to serve as a flag (step 143). The controller output Y is then calculated as the sum of YI plus the product of the proportional gain K times the input value X, which product is retrieved from locations 9,B and 10,B (steps 144 and 145). Program control then returns to PIAB7 where a limit check is carried out on Y. Program control then returns to PIAB6 by way of PIAB5. The limit-checked value of Y is then stored as the controller output variable (steps 148 to 150), and program control returns to the control chain processor program.

The algorithm subroutine PIRLIM (FIG. 17/8A14—step 84) is quite similar to the algorithm subroutine ADJPIR just described but does not provide for adjustable parameters. This subroutine requires an algorithm module which is essentially the same as that required by the subroutine ADJPIR shown in FIG. 17/8A10 with the one exception that locations 7 and 8 within the algorithm module contain the gain constant K and the locations 1 and 2 within the algorithm module contain a precalculated constant C1 that is equal to delta T divided by T. The execution of this algorithm module is almost identical to the execution of the algorithm PIR shown in FIG. 17/8A11 with the exception that the limit checks (steps 117 through 137 in FIG. 17/8A14) are included to keep both the integral value and the controller output value from passing out of predetermined limit. The limit checking steps have been described in connection with the discussion of the algorithm subroutine ADJPIR shown in FIG. 17/8A10 and are called into play by step 87 which places a non-zero data value into the flag location 12,B.

The final algorithm subroutine in this group is the subroutine VELOCITY and DIFFERENCE shown in FIG. 17/8A18 which includes both a proportional plus reset controller output and a velocity output. This algorithm subroutine is essentially the same as the PIRLIM subroutine shown in FIG. 17/8A14, but it also includes the programming steps running from 154 to 167 in FIG. 17/8A14 which calculate a term proportional to the rate of change of the controller input and which present the result of this rate calculation as a second output variable. The format of the algorithm module required is as follows:

| Location Within Module | Content |
|---|---|
| 1 & 2 | Precalculated constant C1 = delta T/T. |
| 3 & 4 | Integral past value YI. |
| 5 & 6 | Past value of the controller input variable X. |
| 7 & 8 | Gain constant G. |
| 9 & 10 | High limit. |
| 11 & 12 | Low limit. |
| 13 & 14 | Time constant T (not used by the algorithm subroutine). |
| 15 | Address of controller input variable X. |
| 16 | Address of controller output variable YA. |
| 17 | Address of velocity output variable YV. |

The velocity and difference algorithm subroutine shown in FIG. 17/8A18 differs from the algorithm subroutine shown in FIG. 8A18. In FIG. 17/8A18, the velocity term is proportional to the rate of change of the controller input variable. In FIG. 8/A18, the velocity term is proportional to the rate of change of the controller output variable.

The execution of this algorithm subroutine is quite similar to that for the algorithm subroutine PIRLIM, shown in FIG. 17/8A14, but a few additional initial steps are added. The address of the output velocity variable XV is stored in the location 15,B, and a flag is placed in the location 16,B to trigger the velocity output calculation. A pointer to the past value of the controller input variable, which is stored within the algorithm module, is stored in location 18,B and a pointer to the constant C1 is stored in the location 19,B. The execution of this algorithm subroutine is then essentially identical to the execution of the subroutine PIRLIM through step 150. Steps 151 and 152 detect a flag in the location 16,B and allow program control to commence with step 154. Beginning with step 154, the difference between the present and past values of the input variable is calculated and is multiplied by the constant C1. The result of this computation is presented as the controller velocity output YV. The present value of the input variable is then stored in the 5th and 6th locations within the algorithm module for use during the next execution of the same controller algorithm subroutine, and program control then returns to the control chain processor program.

XI. TRAPEZOIDAL ALGORITHM SUBROUTINES

FIGS. 17/8A13 and 17/8A15 illustrate two typical trapezoidal controller algorithm subroutines which are suitable for use within the present system. The algorithm subroutine shown in FIG. 17/8A13 is a proportional-plus-reset trapezoidal controller which includes provision for auto or manual operation under the control of a system logical variable. Another feature of this algorithm subroutine is significant—this algorithm subroutine is one which may be incorporated into a disk-resident control chain and which therefore uses a small section of core storage to preserve integral values between successive periodic executions of the controller. This core storage may be a group of consecutive locations in a global variable storage area, or it may be any other group of consecutive core locations which are reserved for this specific use.

The algorithm subroutine shown in FIG. 17/8A13 processes an algorithm module containing the following data:

| Location Within Module | Content |
|---|---|
| 1 | Address of location in core where past value of the integral and of the input variable are stored (core data pool). |
| 2 & 3 | Constant C1 for automatic operation (see FIG. 8A13C). |
| 4 & 5 | Constant C1 for manual operation (see FIG. 8A13D). |
| 6 & 7 | High limit value. |
| 8 & 9 | Low limit value |
| 10 & 11 | Gain for automatic operation. |
| 12 | Address of input variable X. |
| 13 | Address of output variable Y. |
| 14 | Address of auto-manual logical variable. |
| 15 & 16 | Gain for manual operation. |
| 17 to 20 | Storage space for controller time constants—these time constant values are not used by the algorithm subroutine. |

Upon entry into the algorithm subroutine, the value of the auto-manual logical variable is first checked by the subroutine BITLOD. The data value returned by this subroutine is stored temporarily in index register G. The address of the next algorithm module is then calculated and is stored in the location 2,B within the task data pool. The address of the input variable is stored in 5,B and the address of the output variable is stored in 6,B. Using the value stored in register G as a criterion, either the automatic constant C1 or the manual constant C1 is selected from the algorithm module, and the address of this constant C1 is stored in location 11,B. Again using the value stored in register G as a criterion, either the value of the automatic or the manual gain constant is transferred into registers E and A and is multiplied by the current value of the input variable. The result of this multiplication is stored temporarily in the locations 9,B and 10,B. The most significant portion of this product is stored in 15,B so that the location 15,B contains a flag only if the proportional controller output term is non-zero.

Program control then commences at a location P12. Index register A is loaded with the address of the core data pool. The address of the past controller output value within this pool is stored in a location 12,B. The address of the past controller input value within this pool is calculated and is stored in a location 16,B.

The present value of the controller input variable is then loaded into the registers A and E. The past value of the input to the controller is added to the present value, and the result is multiplied by the constant C1 whose address is stored in 11,B. The past value of the integral, whose address is stored in 12,B, is added to the resultant product.

Program control then resumes at a point LIM1 in FIG. 17/8A15. The value of the controller integral output is now transferred from registers E and A into the locations 7,B and 8,B. The steps in FIG. 17/8A15 extending from LIM1 to LIM5 perform a limit check on this integral value. With the exception of the locations where the various values are stored, this limit check is identical to that performed by the steps in FIG. 17/8A14 extending from 117 down to 139. At the end of the limit check, the new value for the controller integral is in registers A and E and is properly limit checked in accordance with the limit values stored in the algorithm module. Beginning at a location LIM5, a check is made to see if anything is stored in 11,B. 11,B contains an address, so program control continues at this point with no transfer.

The integral output is now stored in core storage in the locations whose address is in 12,B. A check of the flag stored in 15,B is then made to see if a proportional controller output term exists. If no such term exists, then the integral value is used as the controller output (see the programming steps starting with LIM6). Otherwise, the proportional controller output term is retrieved from 9,B and 10,B and is added to the integral output term. The limit checking procedure is repeated, and ultimately the limit checked controller output is stored as the controller output value by the routine which begins at LIM6. The value of the input variable to the controller is stored in the core location whose address is in 16,B. Program control then returns to the control chain processor program.

FIG. 17/8A15 illustrates a trapezoidal controller which includes provision for generating a proportional plus a rate output. As in the case of the last algorithm subroutine, this algorithm subroutine is designed to be incorporated into disk-resident control chains. All integral values and the like are not stored within the algorithm module itself but are stored in an external core buffer whose address is contained within the algorithm module.

The algorithm subroutine shown in FIG. 17/8A15 requires the following algorithm module:

| Location Within Module | Content |
|---|---|
| 1 | Address of derivative and input variable past values in core storage (core data pool). |
| 2 & 3 | The constant C2 (see FIG. 8/A15E). |
| 4 & 5 | The constant C1 (see FIG. 8/A15E). |
| 6 & 7 | High limit value. |
| 8 & 9 | Low limit value. |
| 10 & 11 | Controller gain constant. |
| 12 | Address of input variable. |
| 13 | Address of output variable. |
| 14 & 15 | Time constant T (not involved in computations by the algorithm subroutine). |

The algorithm subroutine begins by transferring the address of the controller input variable to the location 5,B. The input variable is then multiplied by the gain and the resultant product is stored in locations 9,B and 10,B. The most significant portion of the result is stored in 15,B as a flag to indicate whether or not the proportional component of the controller output is zero. The address of the controller output is then stored in location 6,B. The address of the variable C1 (see FIG. 8/A15E for the definition of this constant) is stored in the location 11,B. The address of the next algorithm module in the control chain is calculated and is stored in the location 2,B. The address of the derivative past output value within the core data pool is determined and is stored in the location 12,B. The address of the past value of the controller input variable within the core data pool is also calculated and is stored in the location 16,B.

The constant C2 is loaded into registers E and A and is multiplied by the past value of the derivative. The result of this computation is stored temporarily in the locations 13,B and 14,B. The controller input is then loaded into registers E and A, and the difference between the controller input and the controller input past value is then calculated. This difference is then multiplied by the constant C1. The product of C2 and the past value of the derivative is then added to this sum to give the new controller differential output value. The programming steps extending from LIM1 to LIM5 then limit check this differential output value to keep it from falling beyond the low limit or the high limit values. These limit checking steps are analogous to the limit checking steps 119 to 139 in FIG. 17/8A14. Program control then commences at LIM5. The value stored in 11,B is checked and is found to be non-zero since this location contains an address, and the jump LIM6 is not executed. The newly calculated differential value is stored in the location whose address is stored in 12,B, and zero is placed in the location 11,B to serve as a flag. The contents of the location 15,B are then checked to see if the controller output has a proportional component. If it does not, program control continues at LIM6, and the differential value is used as the controller output. Otherwise, the proportional component is added to the differential value. The limit check is then repeated. Program control ultimately returns to LIM6. The calculated controller output value is stored as the controller output in the location whose address is stored in 6,B. The present value of the input variable is then transferred into the location whose address is stored in 16,B. Program control then returns to the control chain processor program.

XII. LAG CONTROLLERS

FIG. 17/8A17 shows an algorithm subroutine which functions as a lag controller. Lag controllers are unique in that they do not require the storage of any past values. This means that the subroutine shown in FIG. 17/8A17 is suitable for incorporation into either core- or disk-resident control chains. The algorithm module required by the subroutine is organized as follows:

| Location Within Module | Content |
|---|---|
| 1 & 2 | Constant C1 (see FIG. 8/A17D). |
| 3 & 4 | Constant C2 (see FIG. 8/A17D). |
| 5 & 6 | Delta T (not used by algorithm subroutine). |
| 7 & 8 | Time constant T (not used by algorithm subroutine). |
| 9 & 10 | High limit value. |
| 11 & 12 | Low limit value. |
| 13 | Address of controller input variable. |
| 14 | Address of controller output variable. |

The controller begins by calculating the address of the next algorithm module and storing this address in the location 2,B within the task data pool. The address of the controller input variable is and is stored in the location 5,B. The address of the controller output variable is also retrieved and is stored in the location 6,B. The constant C1 is multiplied by the past value of the controller output. The result of this multiplication is stored temporarily in location 7,B and 8,B. The constant C2 is then multiplied by the controlller input variable, and the resultant product is added to the number stored in locations 7,B and 8,B. The result is then returned to the locations 7,B and 8,B and is the controller output value.

Steps 30 through 47 carry out a limit check on the controller output value. This limit check routine is essentially identical to the routine presented in steps 119 to 137 of FIG. 17/8A14. After the limit check procedure has been carried out, the resultant controller output value is transferred to the output location whose address is in location 6,B. Program control is then returned to the control chain processor.

XIII. RAMP ALGORITHM SUBROUTINE

A ramp algorithm subroutine appears in FIG. 17/8A19. This algorithm subroutine adds or subtracts an incremental value to or from an output variable periodically so as to force this variable to approach the value of an input variable. This algorithm subroutine requires the following data in an algorithm module:

| Location Within Module | Content |
|---|---|
| 1 & 2 | The variable RATE which is to be added to or subtracted from the output variable (see FIG. 8/A19). |
| 3 | Address of the output variable. |
| 4 | Address of the input variable. |
| 5 & 6 | High limit value. |
| 7 & 8 | Low limit value. |

The algorithm subroutine begins by storing in the location 6,B the address within the algorithm module of the incremental value RATE. The address of the next algorithm module is then calculated and is stored in the location 2,B. The address of the input variable is transferred to 5,B. The value of the output variable is retrieved and is stored in the locations 7,B and 8,B. The difference between the input and the output variables is then calculated. If the output variable is larger than the input variable, the value RATE is added to the past value of the output variable. Program control jumps to RAMP2 where this computed value is stored in the location 9,B and 10,B. If, however, the output variable is larger than the input variable, then program control commences at RAMP1. The value RATE is subtracted from the value of the output variable. The result of the subtraction is stored in the locations 9,B and 10,B. The programming steps extending from RAMP3 and RAMP6 then perform a limit check on the value of the output variable of the type which has already been explained. The limit checked value is stored in the location assigned to the output variable and whose address is stored in the third location within the algorithm module. Program control then returns to the control chain processor program.

XIV. LIMITING AND DEADBAND ALGORITHM SUBROUTINES

FIGS. 17/8A20A, 17/8A20B, and 17/8A21 illustrate a pair of algorithm subroutines which allow an output variable to follow an input variable but which sets either a high or low limit on the value of the output variable. These algorithm subroutines expect algorithm modules formatted as is illustrated in FIGS. 8A20D and 8A21D.

Upon entry into either one of these algorithm subroutines, addresses are loaded into registers E and A. The address S3-1 is stored in a location D1 and is the address of a routine which sets the subroutine output value equal to a limiting value. The address S4-1 is stored in the location D2 and is the address of a routine which sets the subroutine output value equal to the subroutine input value. In the case of the high limiter algorithm subroutine (FIG. 17/8A21). the address S3-1 is stored in the register A and the address S4-1 is stored in register E. In the case of the low limiter subroutine (FIG. 17/8A20A), these same addresses are stored in the opposite registers.

Program control then commences at S1 in FIG. 17/8A20B. The addresses from registers A and E are transferred into locations 6,B and 7,B within the task data pool. The address of the next algorithm module is then computed and is stored in the location 2,B. The address of the input variable is retrieved from the third location within the algorithm module and is stored in the location 4,B. The address of the output variable is similarly stored in a location 8,B. The limiting value is then retrieved from the first two locations in the algorithm module and is stored in registers E and A. The value of the input variable is then subtracted from this limiting value. If the result is negative, a program jump is executed to the location whose address is stored in 6,B. This may be either the location S3 or the location S4, depending upon which algorithm subroutine is in operation. If the result is zero or positive, then a jump is made to the address stored in location 7,B. Once again, this address may be either the routine S3 or the routine S4.

If the address S3 is selected, the limiting value is loaded into registers E and A and program control is transferred to S2. The output variable is then set equal to the limiting value, and program control returns to the control chain processor program.

If the address S4 is selected, the value of the input variable is loaded into registers A and E, and then the output variable is set equal to this value. Program control is then transferred to the control chain processor program.

An algorithm subroutine for setting both a high and a low limit on an output variable appears in FIG. 17/8A22A. This algorithm subroutine expects an algorithm module formatted as is shown in FIG. 8/A22D. Upon entry to this algorithm subroutine, the address within the algorithm module of a high limit constant is calculated and is stored in a location 5,B. The address of a low limit constant is similarly calculated and is stored in location 6,B. The address of the algorithm input variable is stored in location 7,B and (beginning at S1 in FIG. 17/8A2B) in location 8,B. The output variable address is stored in a location 4,B. The address of the next algorithm module is then calculated and is stored in 2,B.

The difference between the high limit value and the input variable is then computed. If this difference is positive or zero, it indicates that the input variable does not exceed the high limit. The input variable is then compared with the low limit value by a similar subtraction. A zero or negative result indicates that the input variable is larger than the low limit. If the input variable falls within the proper limits, registers A and E are cleared by the command "SDA E" and the input variable is loaded into registers A and E. Program control then continues at S2 where this input variable is stored as the output variable. Program control then returns to the control chain processor program.

If the input variable is either larger than the high limiting value or smaller than the low limiting value, program control commences at one of the locations S3 or S4. At those locations, the appropriate limiting value is loaded into the registers A and E. Program control then commences at S2 where this limiting value is stored as the output variable. Program control then returns to the control chain processor program.

The same basic algorithm subroutine may be used to produce a deadband effect in which an output variable is zero when an input variable is within a designated high and low limiting range. A deadband algorithm subroutine begins in FIG. 17/8A25, and the corresponding algorithm module appears in FIG. 8/A25G. Upon entry to this algorithm subroutine, the address of zero is placed in the location 7,B. The address of the input variable is placed in the two locations 5,B and 6,B. Program control then commences at S1 in FIG. 17/8A22B. With this configuration of addresses in the task data pool, the subroutine output variable is set to zero whenever the input variable is within the designated high and low limits and is set equal to the input variable whenever the input variable is outside of the designated limits. Hence, a deadband effect is achieved as is described in FIG. 8/A25.

XV. HIGH AND LOW SELECTOR ALGORITHM SUBROUTINES

A pair of algorithm subroutines corresponding precisely to those described in FIGS. 8/A23 and 8/A24 are shown in FIGS. 17/8A23A, 17/8A23B and 17/8A24. These two algorithm subroutines each have two input variables and a single output variable which is equal either to the greatest or to the lowest of the input variables. The operation of this algorithm subroutine is quite similar to the operation of the high limiter and low limiter algorithm subroutines shown in FIGS. 17/8A20A, 17/8A20B, and 17/8A21. The routines shown in FIGS. 17/8A23A and 17/8A24 offer nothing new which has not already been fully explained in connection with FIGS. 17/8A20A and 17/8A21. In FIG. 17/8A23B, the two input values are compared, and the address in 6,B or in 7,B is selected as a transfer destination depending upon which of the two input values is the greater. At the transfer destination S3, the output variable is set equal to a first input variable. At the transfer destination S4, the output variable is set equal to the other input variable.

XVI. THRESHOLD ALGORITHM SUBROUTINE

FIG. 17/8A26 is an algorithm subroutine which corresponds to the subroutine described in FIG. 8/A26. Upon entry to this subroutine, the address of the next algorithm module is calculated and is stored in 2,B. The addresses of the input and output variables are transferred respectively to the locations 5,B and 6,B. A check is made to see if the input variable is larger than the high limit threshold. If it is, program control commences at THRES1. The output logical variable is cleared by the subroutine SETZER. Program control then returns to the control chain processor program.

If the input variable does not exceed the high limit threshold, a check is made to see if the input variable is smaller than the low limit threshold. If so, program control commences at THRES1 where the output logical variable is cleared. If the input logical variable is found to lie between the upper and lower thresholds, then (steps 28 to 30) the output logical variable is set by the subroutine SETONR. Program control is then returned to the control chain processor program.

XVII. TRANSFER ALGORITHM SUBROUTINES

FIGS. 17/8A27, 17/8A28, 17/8A29A, and 17/8A29B are the program listings of three different transfer algorithm subroutines. The algorithm modules required by these subroutines are shown respectively in FIGS. 8/A27C, 8/A28, and 8/A29.

The simplest transfer algorithm subroutine is shown in FIG. 17/8A27. This algorithm subroutine assumes that the single data item within the algorithm module which it processes is the relative address with respect to the beginning of the control chain of an algorithm module which is to be processed next (see FIG. 8/A27C and FIG. 8/A27E). Upon entry to this algorithm subroutine, the relative address of the next module is retrieved from the first location 1,C within the algorithm module. The control chain starting address is retrieved from the location 1,B in the task data pool (see illustrative pool in FIG. 7) and is added to this relative address to give an absolute core address. The resultant absolute core address is stored in the location 2,B within the task data pool. Program control is then returned to the control chain processor program, and in particular to the find next algorithm routine 710 in FIG. 7. With reference to FIG. 7, the find next algorithm routine 710 now looks to the location 2,B (the 42nd location within the task data pool) for the starting address of the next block or algorithm module which is to be processed. Hence, by calculating the address of the desired block and by placing this address in the 42nd location within the task data pool, the algorithm subroutine 17/8A27 is able to carry out a direct transfer within a control chain.

The remaining two transfer algorithm subroutines function in a similar manner but are capable of executing either of two transfers. With reference to FIG. 17/8A28, a test branch logical algorithm subroutine chooses one of two transfer destinations depending upon the value of a system logical variable. Upon entry to this subroutine, the value of the logical variable is determined by the subroutine BITLOD. If the logical variable is cleared, program control commences at TIPBR1. A relative address is retrieved from the third location within the algorithm module and is used in calculating the transfer destination. If the logical variable is set, steps 14 and 15 cause a relative address to be retrieved from the second location within the module and to be used in calculating the transfer destination. In either case, the control chain starting address is retrieved from the location 1,B and is added to the relative address. The resulting absolute address is stored in the location 2,B as the address of the next algorithm module is to be processed. Program control is then returned to the control chain processor program.

The transfer routine shown in FIG. 17/8A29A first tests for a particular relationship between two numeric input variables and then branches depending upon the result of the test. To a very large extent, this algorithm subroutine is identical to the subroutine shown in FIG. 17/8A04 which has already been fully described. The first three steps shown in FIG. 17/8A04 are not required by the subroutine 17/8A29A, since these steps merely compute the address of the next algorithm module within the control chain. Steps 18 to 74 in FIG. 17/8A04 are virtually identical to steps 8 through 64 in FIG. 17/8A29A and need no additional explanation. In brief summary, these steps compare the value of an input variable to the value of a reference variable in accordance with a comparison test that is specified by a two letter code stored in the third location within the algorithm module.

If the result of the comparison is true, program control commences at a location TRUE. A first chain relative address is retrieved from the third location within the algorithm module, the locationb 3,C. This relative address is added to the control chain starting address which is retrieved from the location 1,B. The resultant sum is the address of the next module which is to be executed. This sum is stored in the location 2,B, and program control returns to the control chain processor program.

If the result of the test is false, then program control commences at a location FALSE. A chain relative address is retrieved from a fourth location within the algorithm module, the location 4,C. The starting address of the control chain is retrieved from the location 1,B and is added to this chain relative address. The resultant sum is the address of the next algorithm module which is to be executed. This sum is stored in the location 2,B, and program control is returned to the control chain processor program.

XVIII. ALGORITHM SUBROUTINES WHICH CALL FOR THE EXECUTION OF OTHER SYSTEM SUBROUTINES

Algorithm subroutine can be arranged to call for the execution of any subroutine within the operating system. Algorithm subroutines may also place bids for the execution of other system programs and control chains. Hence, any operation which the system is capable of carrying out may be triggered by a control chain.

FIG. 17/8A30A, 17/8A30B, and 17/8A30C are algorithm subroutines which allow control chains to call for the execution of subroutines within the sublevel processor program (FIG. 10A). Each of these algorithm subroutines requires an algorithm module of the type shown in FIG. 8/A30 and in which the sole data item is the subtask number of a program, a control chain, data file, or subtask linkage of files within the system. The subroutine shown in FIG. 17/8A30A calls upon the subroutine SUBABLE (FIG. 17/1014) to "able" or place into operation the designated subtask. The algorithm subroutine shown in FIG. 17/8A30C does the opposite and calls upon the sublevel processor subroutine DISABLE (FIG. 17/1015) to disable the subtask within the system, thereby preventing its operation. The algorithm subroutine shown in FIG. 17/8A30B calls upon the SUBBID subroutine (FIG. 17/1020) to place a bid for execution of the designated subtask and thereby allows a particular subtask to be triggered into operation. It would be a simple matter to create additional algorithm subroutines which could call upon other routines within the sublevel processor program and even within the system executive. In brief, algorithm subroutines of this type call for the execution of a subroutine and transfer the necessary arguments from the algorithm module to the subroutine.

Since all of these algorithm subroutines are virtually identical, a description of the one shown in FIG. 17/8A30A will suffice as a description of all. Upon entry into the algorithm subroutine shown in FIG. 17/8A30A, the address of the next algorithm module within the control chain is calculated and is stored in the location 2,B within the task data pool. A subtask number argument is then retrieved from the first location within the algorithm module and is loaded into register A. A direct jump is then executed to a resolved argument entry of the subroutine SUBABLE shown in FIG. 17/1014. In particular, the subroutine SUBABLE is entered at step 1546. After the subroutine has run to completion, program control returns momentarily to the algorithm subroutine and a direct jump is executed to the control chain processor program. The subroutines shown in FIGS. 17/8A30B and 17/8A30C function in the same manner.

An algorithm subroutine for calling upon the sublevel processor time delay subroutine appears in FIG. 17/8A31, and the corresponding algorithm module appears in FIG. 8/A31. The general task performed by this algorithm subroutine in conjunction with the time delay subroutine within the sublevel processor program is that of placing control chain subtasks into time delay.

The subroutine shown in FIG. 17/8A31 begins by computing the address of a location which precedes the algorithm module which it is processing by two locations. This is done by subtracting two from the algorithm module starting address which is in register C. The resultant address is placed into register B so that register B points to the second location preceding the starting address of the algorithm module. A jump is then executed to a resolved argument entry into the subroutine TIMDLY shown in FIG. 17/1080.

The subroutine TIMDLY takes the control chain module and links the control chain module into the time delayed subtask linkage which is shown in FIG. 9G. The reason why the address of the location preceding the algorithm module by two had to be calculated and stored in register B is that the TIMDLY subroutine assumes that index register B is pointing to a program register pool, such as that shown at the left-hand edge of FIG. 9G.

The subroutine TIMDLY makes use of the 4th, 5th, and 6th locations within this pool. These are the 5th, 6th, and 7th locations beyond that to which register B points upon entry into the subroutine TIMDLY. Since control chains do not have program pools, it is necessary for the algorithm subroutine shown in FIG. 17/8A31 to simulate such a pool and to provide locations within the simulated pool where the corresponding temporary values may be stored. As is shown in FIG. 8/A31 and also in FIG. 9G, these temporary values are stored in the 2nd, 3rd, and 4th locations within the algorithm module itself. The algorithm subroutine shown in FIG. 17/8A31 therefore adjusts register B so that the 2nd, 3rd, and 4th locations within the pool are the 5th, 6th, and 7th locations beyond that to which register B points. This is accomplished by simply storing the address of the second location preceding the algorithm module in index register B.

After the time delay expires, program control is returned directly to the control chain processor 700 shown in FIG. 7 and in particular to the return from subtask time delay routine 704. With refer ence to FIG.

17/710, program control commences at I*INTTD. The address of the control chain is computed and is stored in the task data pool in the location 1,B. Upon entry at the point I*INTTD, register E contains the starting address of the time delay module which initiated the time delay. This address is found by the subroutine CHKBID (FIG. 17/1050) and is passed on by the basic task program (FIG. 17/1030) to the control chain time delay restart program shown in FIG. 17/710. Initially, this address is stored temporarily in the location 2,B. After other preliminary calculations have been carried out, the address is retrieved, and "6" is added to the address so that the address is now that of the next algorithm module within the control chain. This address is then stored in the location 2,B, and program control is transferred to the location I*INTTD, the normal entry point for program control returning from algorithm subroutines within the control chain processor program. Thus, after the expiration of a normal time delay, program control does not return to the algorithm subroutine 17/8A31 but commences with the execution of the next algorithm subroutine within the control chain.

As an example of an algorithm subroutine which transfers a number of arguments to a system subroutine, FIG. 17/8A32 shows an algorithm subroutine which places a request for a subtask to be bid after a time delay. This is accomplished by a call to a subroutine SETTDY, which subroutine is part of the auxiliary synchronizer program and is shown in FIG. 17/930. Upon entry to the subroutine shown in FIG. 17/8A32, the address of the next algorithm module is calculated and is stored in location 2,B. The time delay value or count is then retrieved from the first location within the algorithm module (see FIG. 8/A32) and is stored in a location 5,B within the task data pool. The subtask number which is to be bid is retrieved from the second location within the algorithm module (see FIG. 8/A32) and is stored in the location 6,B within the task data pool. A subroutine call to the normal entry of the subroutine SETTDY is then executed. The subroutine call is executed by the command "SST *PRTD,B". The arguments are designated by the three data values following the SST instruction which specify where, with respect to the address in register B, the subroutine arguments are stored. After the subroutine call has been executed, program control returns momentarily to the algorithm subroutine shown in FIG. 17/8A32 and is returned immediately to the control chain processor program without further delay.

It is also possible to design an algorithm subroutine which may call upon any number of system subroutines and which may supply any number of arguments to each such subroutine. The subroutine call and the argument transfer is carried out as shown in FIG. 17/8A32. The addresses of the subroutines are stored in a table similar to the table shown in FIG. 17/720. Each algorithm module for such an algorithm subroutine would contain an index number corresponding to one particular subroutine plus a list of arguments. The algorithm subroutine would then proceed exactly as in 17/8A32 except that program control would be transferred to the subroutine address whose position in the table (FIG. 17/720) corresponded to the index number specified by the algorithm module. In this manner, ten or twenty different system subroutines may be called upon by a single algorithm subroutine. An exemplary algorithm module for such a subroutine appears in FIG. 8/A33.

E. AUXILIARY SYNCHRONIZER PROGRAM

The central thread of the auxiliary synchronizer program 900 (FIG. 9A) appears in FIGS. 17/900A through 17/900D. When the auxiliary synchronizer is placed in operation by a call from an executive periodic task bidding program 902 (FIG. 9A), entry to the synchronizer program is at the location MASYNC in FIG. 17/900A.

The program immediately checks to see if any delayed subtask bids need to be processed. With reference to FIG. 9D, the program compares the contents of the locations TDYBUF and BIDPOINT to see if there are any entries in the delayed subtask bid table. If the two locations contain the same address, there are no delayed subtask bids recorded in the table and program control proceeds to the location MBSYNC, the beginning of the periodic subtask bid countdown routine. If the two locations do not contain the same address, then the delayed subtask bid countdown routine (FIG. 17/920) is entered and the delayed subtask bids are processed as will be described below.

Program control then returns to MBSYNC, the entry to the periodic subtask bid countdown routine. A block diagram of this routine appears in FIG. 9B. The first step performed is that of decrementing the contents of the location TENSEC and of checking to see if the counter TENSEC has been decremented to zero count. Normally, the counter will not have been decremented to zero count and program control continues at a location LDBAD1 which is the entry point to the routine that processes the tenth of a second counters in the tenth of a second periodic subtask bidding linkage. The address (ADRES1) of the first location in the 0.1 second bidding linkage (see FIG. 9E) is stored in register B. If this address is zero, then there are no tenth of a second bidding frequencies; program control is transferred to RETMYS, the entry to the logical variable time delay countdown routine. If the address is non-zero, then a subroutine call is made to the subroutine CHNBID (FIG. 17/910). As will be explained below, this subroutine decrements the counters in the tenth of a second periodic subtask bidding linkage and places any subtask bids which may be required. After the subroutine has completed its execution, program control then goes to the location RETMYS, the entry point to the logical time delay countdown routine.

With reference to the programming step MBSYNC, if the location TENSEC is decremented to zero, a full second of time has elapsed since the counters in the one-second periodic subtask bidding linkage were processed. When this happens, program control is transferred to a location SECEXP and "10" is stored in the location TENSEC. The one-second periodic subtask bidding linkage is then processed by a call to the subroutine CHNBID with the address ADRES2 (see FIG. 9E) stored in index register B. Program control then returns to the location LDBAD1 where the tenth of a second linkage is processed.

Two steps past the location SECEXP, just before the one-second linkage is processed at LDBAD2, a check is made to see if a minute has expired. The contents of a location ONESEC is decremented. If ONESEC then is found to contain zero, program control proceeds to MINEXP. "60" is loaded into ONESEC, ADRES3 is loaded into index register B, and the subroutine CHNBID is called upon to process the one-minute periodic subtask bidding linkage which starts at the location ADRES3 (see FIG. 9E). The one-second and the tenth of a second linkages are then processed by successive transfers of program control to the locations LDBAD2 and LDBAD1. Ultimately, program control is transferred to RETMYS, the entry to the logical time delay countdown routine. A block diagram at this routine appears in FIG. 9C.

Upon entry into the logical time delay countdown routine RETMYS (FIG. 17/900B), register A is loaded with the address of a location HILINK in which is stored the address of the first logical time delay module in the high resolution time delay linkage (FIG. 9F). A subroutine call is then made to the subroutine LGCT which processes the logical time delay modules in this linkage. Upon return from the subroutine LGCT, the low resolution time delay counter stored in a location MPYER is decremented. If this counter is positive after it is decremented, the low resolution logical time delays are not processed but program control is transferred immediately to LGCTDB, the time delayed subtask countdown routine. If the contents of MPYER are decremented to zero, then one less than the number stored in the location LORES is loaded into the counter MPYER so that the counter is reset to start timing the next interval which must elapse before the low resolution logical time delays are processed again. A subroutine call is then made to the subroutine LGCT with the contents of the location LOLINK stored in register A (see FIG. 9F). Upon return from the subroutine LGCT, program control is transferred directly to LGCTDB (FIG. 17/900C), the subtask time delay countdown routine.

The actual routine which is used to process sublevel time delay countdowns is not a part of the auxiliary synchronizer program but is a routine COUNTDOWN which is a part of the sublevel processor program and which appears in FIG. 17/1082. After this routine has completed processing the subtask time delay countdowns, program control is transferred to OUTSCA (FIG. 17/900D), the contact closure output device countdown routine.

Upon entry to the routine OUTSCA (FIG. 17/900D), the contents of the location TMETBL (FIG. 9H) are checked. If this location contains zero, then no devices are in active countdown and program control is immediately returned to the system executive by a transfer to the location OUTSCB. If the location TMETBL contains some number other than zero, then the countdown routine is entered. Register E is loaded to the address of the first entry in the counting table TMETBL +1 (see FIG. 9H) and register C is loaded with a number equal to one less than the number of devices which are controlled by the table (NUMOUT −1 -- see FIG. 9H). A loop is then entered. During each pass through this loop, one entry to the table is checked. The loop begins at a location SCAN in the program. Register A is loaded with the count in the table entry. If the count is zero, the device is not operating. A transfer is made directly to a location INDEX. At INDEX, register E is incremented; register C is decremented; and if C is still positive, program control returns to the beginning of the loop - the entry point SCAN. Ultimately, when C is decremented to zero, program control is returned to the system executive via OUTSCB.

If a table entry is non-zero, a check is made to see whether the entry is negative. If the table entry is negative, the corresponding controlled device is being actuated in a first direction. Program control is transferred to ISLWR and the count in the location is incremented. If the count remains non-zero, program control returns to the location INDEX and proceeds as described above. If the count is incremented to zero, the time for device actuation has expired, and program control commences at a location LWREXP. The address of the device in the table LIUSER (FIG. 11C cont.) is calculated as CCOTB5 plus 1 plus two times C. More particularly, this is the logical variable address (see FIG. 11F) of the contact closure output bit corresponding to actuation of the device in a first direction. This bit is reset by a jump to the logic initiator bit resetting routine SETZER. Program control then returns to the location INDEX and proceeds as described above.

If the count is not negative and is also non-zero, the corresponding controlled device is being actuated in a second direction. The count is decremented. If the count remains non-zero, program control returns to the location INDEX. If the count is decremented to zero, the time for device actuation has expired. Program control is then transferred to a location RASEXP. An address calculation is then performed, as was done in the case of a negative count reaching zero. However, the address which is calculated is not the same address. In this case, the particular contact closure output bit which is addressed is the one which actuates the external device in a second direction, usually in the opposite direction. The address is CCOTB5 plus two times C. The corresponding bit in the table LIUSER (FIG. 11C cont.) is reset by the routine SETZER, and program control again returns to the location INDEX.

When all entries in the table TMETBL (FIG. 9H) have been processed, program control is transferred to a location OUTSCB. Register B is loaded with the address of a pool TMZPRS within which the system registers may be stored, and the task level is exited via the executive task exit instruction SST *EXIT,B. When this task level is again bid by the system executive, program control returns to the location MASYNC at the start of the auxiliary synchronizer program (FIG. 17/900A).

I. COUNTER DECREMENT AND SUBTASK BIDDING SUBROUTINE

The counter decrement and subtask bidding subroutine appears in FIG. 17/910. Upon entry at the point CHNBID, register B contains the address (ADRES1, ADRES2, or ADRES3 - see FIG. 9E) of a count entry in the first counting module of a linkage, and register E contains the return address of the calling program. At the outset, the subroutine stores this return address in a location LAST.

The subroutine begins by decrementing the count in the second location within the first count module in the linkage using register B as an address base. If the count reaches zero count or becomes negative, a jump is made to the location RESTCN where subtask bids are carried out. If the count does not reach zero or become negative, then register B is loaded with the address of the next module (step LDCHN3) which address is retrieved from the fourth entry in the count module by LDB 3,B. Program control then normally returns to the second step in the subroutine and the above procedure is repeated cyclically. If, however, the next count module address is zero, then program control is returned to the calling program at the address one past the return address stored in LAST.

When a count expires, program control commences at a location RESTCN. The counter is reset by trnsferring the contents of the first location in the module (the initial count location) into the second location within the module (the count location). The address of the first associated bidding module is then retrieved from the third location within the count module and is loaded into register C. The contents of register B (the address of the count module) are transferred into register G for temporary storage.

Register E is now loaded with the number two ("2"). The instruction "1,C" (which instruction is stored in the location LDAO3) is loaded into register A. The "2" from register E is added into register A, and the contents of register A are executed as an instruction to load register A with the contents of the fourth entry in the bidding module whose address is in register C. If this fourth entry contains a number other than zero, the entry is a subtask number. A bid is placed for execution of the subtask by a subroutine call to the SUBBID subroutine (FIG. 17/1020). If the location contains zero, no subtask bid is placed. In either case, the number in register E is reduced by "1". If the number in register E is still positive, program control returns to the location LDA1CC and once again register A is loaded with the instruction 1,C plus E. The steps extending from LDA1CC to one instruction past LDA2CC are executed as a loop which quickly checks the three entries within a bidding module and which places bids for all subtask numbers which are found within the module.

When E is finally decremented to zero, the contents of register B (the pointer to the count module) are restored from the register G. Register C is loaded with the address to which it points. This location is either the first location in the next bidding module or else zero if there are no more bidding modules in a linkage (see FIG. 9E). If register C contains a bidding module address, program control returns to the location just prior to LDA1CC and the next group of subtask bids are placed.

The bidding procedure continues until all of the requested subtask bids have bben placed and until all of the bidding modules have been serviced. Ultimately, when register C is found to contain zero count, program control is transferred to the location LDCHN3. The address of the next count module is then retrieved and is loaded into register B. Program control then continues as described above until all of the count modules within the linkage have been processed. Program control then returns to the calling program in the manner already explained.

II. DELAYED SUBTASK BID COUNTDOWN ROUTINE

The delayed subtask bid countdown routine appears in FIG. 17/920. Upon entry into this routine, register B is loaded with the contents of the location BIDPOINT, a pointer to the last entry in the delayed subtask bid countdown table (see FIG. 9D). The location in the table TDYTAB (FIG. 9D) just beyond the table entry to which register B points is then decremented so as to reduce the counter for a subtask time delay. If the counter goes to zero count, program control is transferred to a location TDYEXP and a bid is placed for execution of the subtask. If the counter does not go to zero count, then index register B is decremented twice so as to point to a previous counter entry in the same table. A check is then made to see if all the table entries have been processed by comparing the contents of register B to the contents of a location TDYBUF which contains the starting address of the table minus two. If the register B and the location TDYBUF contain the same number, then all of the delayed subtask bids have been processed. Program control then returns to MBSYNC, the periodic subtask bid countdown routine (FIG. 17/900A).

When the time delay counter corresponding to a subtask reaches zero, program control commences at a location TDYEXP. A subtask number is transferred from the table entry preceding the zeroed counter entry to the register A. The table pointer in register B is then transferred into register E for temporary storage. Register B is then loaded with the address of a program register pool TMZPRZ. A call is then made to the subtask bidding subroutine SUBBID (FIG. 17/1020) and more particularly to a resolved argument entry SUBBIDR of that subroutine. After the subtask bid has been placed, the contents of register B are restored from register E, and a check is then made to see if register B contains the same address as that stored in the location BIDPOINT. If so, the subtask which was just bid is the last entry in the TDYTAB table. Program control is then transferred to DCRBDP where the contents of the location BIDPOINT are decremented twice to show the removal of a subtask bid from the table. Program control is then returned to NXTCHB, and the next entry in the TDYTAB table is checked.

If the subtask which was bid is not the last entry in the table, a routine is entered which shifts all of the data stored in the table up two locations so that the TDYTAB table is kept compressed to the smallest practical size. First, the contents of register B are loaded into register C. Then a loop is entered which extends from LDAMMV to the instruction just preceding DCRBDP. During each pass through this loop, an entry in the table (a subtask number and a counter) are shifted up two locations. A check is then made to see if all the shifts necessary have been made. This check comprises adding "2" to the contents of the register C and comparing the resultant number to the number stored in the location BIDPOINT. If C+2 dows not equal BIDPOINT, the loop continues. If C+2does equal BIDPOINT, the loop terminates-all the necessary shifts have been made. Program control is then transferred to DCRBDP where the contents of the location BIDPOINT are decremented as has already been explained.

III. SUBROUTINE FOR RECORDING DELAYED SUBTASK BIDS

FIG. 17/930 shows the subroutine which processes all requests to have subtasks bid after a time delay. The subroutine requires as arguments the time delay in tenths of a second, the subtask number, and an error return location into which an error return flag may be placed in case of an overflow of the TDYTAB table. After retrieving these arguments, the subroutine loads register C with a pointer to the argument pool and places the number 1 in the error return location (*4,C) to indicate a normal subroutine return. A check is then made to see if there is any room in the time delay table TDYTAB. the address of the last table entry is stored in a location TOTTDY, while the address of the last location in the table that is full is stored in a location BIDPOINT. If a comparison of these two addresses indicates that the table is full, the error return argument (*4,C) is incremented to "2" and the subroutine terminates via the executive software lockout release (*M*SFX). If there is room in the table, the contents of BIDPOINT are incremented twice so that BIDPOINT points to the next empty location in the table. Registers A and E are then loaded respectively with the time delay count (*2,C) and the subtask number (*3,C) arguments. Register C is then loaded with the address contained in BIDPOINT, and the two arguments are stored in the location to which register C points and into the next successive location. Program control is then returned to the calling program via software lockout release.

IV. LOGICAL TIME DELAY COUNTDOWN ROUTINE

FIG. 17/940 shows the routine which periodically processes logical time delay countdowns. Upon entry into subroutine LGCT, it is assumed that the address of the first module in a logiccal time delay linkage (either HILINK or LOLINK-see FIG. 9F) is stored in register A. This first module address is placed into a location LASTTD. The return address in register E is then incremented and is stored in a location RTNADR. Register E is then loaded with the address of the first time delay module, which address still is stored in register A. If this first address is zero, there are no modules in the time delay linkage and program control is immediately returned to the calling program by a jump to the address stored in RTNADR. If register E does contain a logical time delay module address, the module address is stored in index register B. Register A is then loaded from the fourth entry in this first logical time delay module, the input logical variable address entry (see FIG. 9F). A jump to the subroutine BITLOD is then executed to check the logical status of the input logical variable. Upon return from BITLOD a test is made to see whether the input logical variable is currently true or false. If the input logical variable is false, the positive flag causes program execution to be transferred to a location LGCFAL. Otherwise, the input variable is assumed to be true and program execution proceeds.

Assuming for the moment that the logical variable is true, it remains to be determined whether the logical time delay is a TRUE-TRUE logical time delay or a FALSE-FALSE logical time delay. This determination is carried out by loading register A with the count which is stored in the second location within the module (see FIG. 9F). If the count is negative, then the time delay is a FALSE-FALSE time delay which must be cancelled because the input variable has gone true. In this ccase, program control is transferred to a location CANCELZ at which point register C is loaded with the negative time delay count. A jump is then made to the location EXPIRED plus 1 in a time delay cancellation routine. The reason for loading a negative number into the register C is to serve as a flag that this is a FALSE-FALSE time delay and that the output variable is now to be set true.

If the count proved to be positive, then the time delay is a TRUE-TRUE logical time delay wiht the input variable remaining true. The count is first decremented. If the count reaches zero, the time delay has expired. Program control is transferred to the location EXPIRED where register C is loaded with "−1" to indicate that the output variable is to be set true. If the count does not reach zero, program control continues at LGCTO2.

If the input variable is found to be false, program control commences at the location LGCFAL. The count is checked. If the count is positive, this means that the time delay is a TRUE-TRUE time delay which must be cancelled because the input variable has gone false. A program jump is made to the location CANCELZ where the positive count is loaded into register C, and a jump is made to the location EXPIRED plus 1 for cancellation of the time delay. The positive number in register C indicates that the output variable is to be reset or made false. If the count is found to be negative, then the input logical variable for a FALSE-FALSE time delay is false, which is normal. Program control is transferred to a location RESLOG and the count is incremented. If the count reaches zero, the time delay has expired. Zero is stored in register C to indicate that the logical output is to be set or made true, and program control continues at the location EXPIRED plus 1.

When program control reaches the location EXPIRED plus 1, a time delay count is to be terminated. If register C contains a negative number, the logical output variable is to be set; if register C contains a positive number, the logical output variable is to be reset or made false. The address of the output logical variable is retrieved from the fifth entry in the time delay module and is loaded into register A. The contents of register B (the pointer to the count module) are stored temporarily in a location BTMDLY and register B is loaded with the address RTNLPL of a program pool, which address is stored in a location BTMDLZ. The sign of the contents of register C is then checked. If C contains a negative number, a jump is made to the subroutine SET1R which sets the output logical variable to true. If C contains a positive number, a jump is made to the subroutine SET0R which resets the output logical variable to false.

Upon returning from the subroutine call, the system registers are restored from the pool RTNLPL by the normal subroutine return command "EST *1,B" because RTNLPL is the address that was loaded into register B prior to the subroutine call. The structure of the pool RTNLPL is such that register P is loaded with the address RTNSLG minus 1. Hence, program control commences at a location one beyond this point or the location RTNSLG. Register B is loaded with the contents of the location BTMDLY, the location where the contents of register B were previously stored. Register A is loaded with the contents of LASTTD and therefore points to the beginning of the preceding module in the linkage. Hence, when program control commences at RTNSLG, register B points to the expired time delay module.

Beginning at RTNSLG, register E is loaded with the contents of the third location in the module—the linkage pointer to the next module. Zeroes are then placed in the module linkage and the count locations. The module is then completely reset for future use. Register E, which now contains the starting address of the next module in the linkage, is stored in the location three past that to which register A points—the linkage pointer location in the preceding module. In this manner, the expired module is removed from the linkage. Program control then continues at LGCT01.

When a module count is incremented or decremented but does not reach zero, program control commences at a location LGCT02. The pointer to the current module is transferred from register B to the location LASTTD, and register E is loaded with the starting address of the next module. Then program control is transferred to LGCT01.

After all of the above steps have been carried out, program control returns to the location LGCT01 and the next module in the linkage is checked. When no more modules remain to be checked, program control is returned to the calling program at the address stored in RTNADR.

V. SUBROUTINES FOR ESTABLISHING AND FOR CANCELLING PERIODIC SUBTASK BIDS

The two subroutines SYNCLK and SYNRMV appear in FIG. 17/950A. The subroutine SYNCLK adds a new subtask to a periodic bidding linkage. The subroutine SYNRMV removes a subtask from a periodic bidding linkage. Both of these subroutines require four arguments, the first of which contains a subtask number, the second of which contains a period format specification, the third of which contains a period, and the fourth of which is an error return location. The period is the number of time intervals which are to elapse between successive bids. The period format specification indicates the length of these time intervals:

0 - Basic time interval equals 0.1 second.
1 - Basic time interval equals one second.
2 - Basic time period equals one minute.

If all goes well, the error flag location contains 1 upon exit from the subroutine. If the error flag location contains two, either there is no more buffer storage for additional periodic bid requests (subroutine SYNCLK) or else the specified subtask was not found linked to the specified bidding period (subroutine SYNRMV).

The subroutine SYNCLK begins by incrementing software lockout and by storing zero in a flag location NINDEX. The subroutine SYNRMV begins by setting software lockout and by storing minus 1 in the flag location NINDEX. In both cases, program control is then transferred to IMPLST, a common entry point for both subroutines.

After the addresses of the arguments have been retrieved and stored in a pool called DATSTY, index register C is established for use as a pointer to the argument pool. The designated subtask number (*2,C) is transferred via register A into a location ALPHAO. The designated bidding period (*4,C) is transferred into a location ALPHA1. The error flag (*5,C) is cleared to zero and is incremented to 1 so as to indicate a normal return. The address of the error flag is loaded into register E and is placed into a location ERRTN.

The next portion of both subroutines determines which of the three count module linkages the subtask periodic bid is either to be stored in or is to be removed from. As received, a subtask request may specify the bidding period in tenths of a second, in seconds, or in minutes but does not specify in which linkage the bid belongs. For example, if a request to have a particular subtask number bid every 120 seconds is received, it would be inefficient to link that request into the seconds linkage. The seconds linkage would have to service such a bid 120 times in every two minutes. The minutes linkage would handle the same bid only twice in two minutes. Such a request is therefore converted into a request to have a subtask bid every two minutes. Similarly, if a calling program requests to have a subtask bid once every 60 seconds, it is much more efficient insofar as machine time is concerned to link the requested subtask bid to a counting module in the minutes linkage rather than to one in the seconds linkage. For this reason, the following steps determine what is the most efficient linkage into which a particular request can be connected regardless of the form of the subroutine call.

Zero is first placed in an indexing location KINDEX. This indexing location ultimately contains zero, 1, or 2 in accordance with whether the subtask periodic bid request is linked into the 0.1 second, the 1 second, or the 1 minute linkage. The periodic format argument (*3,C) is then loaded into index register E. If this argument is equal to two, the requested bidding period is specified in minutes and the periodic bid request is definitely to be linked into the minutes linkage. Program control is transferred to a location NOTMIN and the requested bidding period is stored in the location ALPHA1 (this step, while apparently redundant here, is useful for reasons yet to be explained). Index register B is loaded with the contents of ADRES3, the linkage pointer to the count modules in the minute linkage (see FIG. 9E). The location KINDEX is incremented twice during the execution of the steps just described, and hence the number two is present within the location KINDEX. Program control then commences at BRANCH.

If the period format argument is equal to one, the scanning period is specified in seconds rather than in minutes. Program control is transferred to a location NOT10TH, and again the bidding period stored in register A is placed in a location ALPHA1 (again, this is a redundant step whose purpose is explained below). The contents of register A are then divided by 60. Within the present system, any remainder from long division is stored in the extended accumulator register E. A check is made to see if register E contains zero. If it does, the specified bidding period is an integral multiple of 60 and may be bid from the minutes linkage rather than from the seconds linkage. In this case, a program control transfer is executed to the location NOTMIN, and the newly calculated period in register A is stored in the location ALPHA1 (a step previously noted as redundant) thus obliterating the originally specified scanning period designation. In this manner, a subtask bid request having a period that is specified in seconds may be hooked into the minutes linkage if it is possible to do so. If there is a remainder in the register E, then the specified bidding period is not a multiple of 60 and it is necessary to link the subtask bid into the seconds linkage. In this case, the seconds linkage pointer from the location ADRES2 is loaded into register B and program control is transferred to the location BRANCH. While not mentioned in the above discussion, the programming just described includes instructions to increment the contents of KINDEX. These instructions are so placed that when program control reaches the location BRANCH, the location KINDEX contains a two if the bid is placed in the minutes linkage and contains a one if the bid is placed in the seconds linkage.

If the period format argument is equal to zero, the requested bidding period is specified in tenths of a second. A program jump is then executed to the location PER101. The bidding period in register A is divided by ten to see if it is possible to place this request in the seconds linkage rather than in the tenths of a second linkage. If the extended accumulator E contains a remainder after this division, it is not possible to handle this request in the seconds linkage. Register B is loaded with the tenths of a second pointer from the location ADRES1 and program control is transferred directly to BRANCH. KINDEX is not incremented during this process and still contains zero when program control reaches the point BRANCH. If no remainder is found in the index register E, then program control is transferred to the location NOT10TH where the index KINDEX is incremented and the newly calculated period is stored in ALPHA1 (this was previously noted as a redundant step). As before, a check is then made to see if this new couting period is divisible by 60 so that the bid request may be handled by the minutes linkage. Ultimately, program control is transferred to the location BRANCH with the proper index number in KINDEX and with the proper address in index register B.

When program control reaches the location BRANCH, the linkage to which the subtask number either is now attached (SYNRMV) or is to be attached (SYNCLK) is specified by the index number stored in KINDEX; the address of the start of this linkage is stored in index register B; and the flag NINDEX is zero for a new periodic bid request (SYNCLK) or negative for cancellation of a periodic bid request (SYNRMV). At location BRANCH, the flag NINDEX is checked. If a subtask periodic bid request is to be cancelled (SYNRMV), program control is transferred to REMOVL in FIG. 17/1950B. If, on the other hand , a new periodic bid request is to be added to a linkage (SYNCLK), program control continues in FIG. 17/950A.

If the subroutine call is to SYNCLK for the establishment of a new subtask periodic bid, a check of the contents of index register B is made to see if there are any count modules connected to the linkage. If no count modules presently exist, then register B contains zero, and program control is transferred to NOGROP. A jump is made to the subroutine FINDFIL (FIG. 17/960). The FINDFIL subroutine finds the first available four-word module in the empty module linkage and returns the address of the module in register C. With reference to FIG. 9E, register A is now loaded with ADRESO, the address of the first location in the array of pointers to the various linkages. The index KINDEX is then added into A so that A now contains the address of the pointer to the desired linkage. The starting address of the vacant file is then transferred into the linkage address to which register A points, and thus a count module is created and is linked to the appropriate pointer.

The address of the count module is then stored in register B. A second execution of the subroutine FINDFIL returns the address of a bidding module. The period of the new count module is then stored in the first two locations within the count module to serve both as a count and also as the initial count (see FIG. 9E). The address of the new bidding module is then stored in the third location within the count module. The subtask number of the subtask which is to be bid is placed in the second location within the bidding module, and zero is placed in the first location within the bidding module to indicate that no more bidding modules are connected to this first count module. The return address of the calling program is then retrieved, and the subroutine terminates through the executive software lockout release routine.

Returning now to the step preceding CNTMDL, if it had been determined that a count module was linked to the designated linkage, the period (initial count) of that count module is retrieved from the module and is compared with the requested bidding period ALPHA1 by an exclusive OR operation. If the result is zero, a count module set to the same period as that requested has been found. Program control then continues at a point FRQFND. Register B is loaded with the address of the first bidding module that is chain-linked to this count module, and register A is loaded with the address of the next bidding module following the first. If register A contains zero, this is the last bidding module in the chain. If not, the bidding module linkage is followed by repeatedly loading register B from the location to which it points and by then loading register A from the location to which register B points and by again checking for a zero value in register A.

When the last bidding module is ultimately found, the new subtask number is loaded into register A from the location ALPHAO, and register E is loaded with the address of the third location within this bidding module. If this location contains zero, the new subtask number is stored in the location, and program control is returned to the calling program. If not, the fourth location is checked. If this location contains zero, the subtask number is stored in the location, and program control is returned to the calling program. If the module is full, the FINDFIL subroutine is used to obtain the address of a new bidding module. The address of this module is transferred via register B to the first location in the last bidding module presently in the linkage. Program control is then transferred to the location LDAPHO where the new subtask number is placed into the new bidding module just prior to the return of program control to the calling program.

Returning to the second step following CNTMDL, if a matching period is not found on the first try, it is necessary to check the other count modules in the same linkage to see if any of them are assigned to the desired period. Register A is loaded from the fourth entry in the count module which is a pointer to the next count module. If this entry is zero, then there are no additional count modules, and a new one must be created. Program control is then transferred to a location FNDSLT. The subroutine FINDFIL obtains the address of a new count module. This address is loaded into register A and is stored in the fourth location within the last count module so that the two count modules are linked together. Program control then is transferred to LKBALC where a new bidding module is created for the subtask. Ultimately program control then returns to the calling program through software lockout release.

Returning to the fourth step after CNTMDL, if the pointer entry is non-zero, additional count modules are present and should be checked. Register B is loaded with the address of the next count module in the linkage and program control is returned to the location CNTMDL. Program control continues in a loop starting with CNTMDL until either a count module of the proper period is found or until the end of the count module linkage is found. In either case, program execution then continues as has already been explained.

Referring now to FIG. 17/950B, the REMOVL subroutine is entered whenever a periodic subtask bid request is to be cancelled. Minus one is first stored in the location NINDEX (a redundant step at this point but required for reasons to be explained) and a check is made to see if register B contains ZERO. Register B is supposed to contain the address of the first count module in the linkage which is to be searched. If register B does contain zero, then no count module is assigned to the linkage and clearly an error has been made. A return to the calling program is then executed via an error return routine ERRLZX. If register B does not contain zero, then the search continues at the point in the program labeled LDREML.

Register A is loaded with the period of the first count module from the first location in the module. This period is compared with the period in ALPHA1, the period of the subtask which is to be removed from periodic bidding. If the two agree, program control is transferred to FOOFRQ at which point a search is made for the specific subtask number within the associated bidding modules. If the two do not agree, register A is loaded with the fourth entry in the module which is a pointer to the next count module. Once again, if this entry is zero, a return to the calling program is executed through the error return exit routine ERRLZX. If not, the address of the last count module is stored in a location LASTA, and register B is loaded with a pointer to the next count module in the linkage. Zero is then placed in the flag location NINDEX as an indication that register B points to a count module rather than to ADRES1, ADRES2, or ADRES3. Program control is then returned to LDREML. The loop extending from LDREML to the step preceding FOOFRQ is then continuously executed until either a count module is found that is assigned to the proper period or until the end of the count module linkage is found. In the former case, program control is transfered to the location FOOFRQ. In the latter case, program control is returned to the calling program through the error routine ERRLZX with two in the error return argument location.

When program control ultimately comes to the location FOOFRQ, a count module assigned to the same period as that to which the subtask is supposedly assigned has been found. The address of this count module is transferred from register B to a location LAST. Register B is loaded from the third entry in the count module with a pointer to the first associated bidding module. Minus one is then placed in a location MINDEX to indicate that LAST points to a count module and not to a bidding module.

The next portion of the REMOVL routine examines the subtask numbers within the bidding module to see if any agrees with the subtask number of the subtask which is to be removed from periodic bidding. The address of the bidding module is loaded into register G and is incremented. Two is placed in register E. A check is then made to see if the location to which register G points contains the same subtask number as is stored in ALPHAO. If so, then program control is transferred to FDAPNT. If not, E is decremented. If E is still positive or zero, program control returns to the location LDACIN plus 1. Program control continues in this small loop until either the subtask number is found or until all three of the subtask numbers in the bidding module have been checked as is indicated by E becoming negative. If the subtask number is not found, then beginning with the seventh step beyond LDACIN, the bidding module address is transferred from register B to the location LAST, and the address of the next bidding module and linkage address to the next bidding module is retrieved from the first location in the present module and is placed in register B. If register B then contains zero, all of the bidding modules have been checked and the subtask number has not been found. Program control then returns to the calling program through the error return routine ERRLZX. If register B does not contain zero, then a zero is placed in the flag MINDEX to show that LAST points to a bidding module. Program control then returns to LDACIN minus 1 where a check of the next bidding module in the linkage is carried out.

When the specified subtask number is ultimately found within a bidding module, program control commences at FDAPNT. A check is first made to see if the first location in this module contains zero which would indicate that the module is the last in the chain. If so, then program control is transferred to SYNRMV1 at which point the subtask number is eliminated from the module. If it is not the last module in the chain, a loop is entered at SYNRMV2 which hunts for the end module in the chain. The loop at SYNRMV2 loads register A with the address of the next bidding module and if it is zero, jumps to ENDCHN because the end of the chain or linkage has been found. If it is not zero, the pointer to the previous module in index register C is stored in the location LASTA, and C is loaded with the address of the next bidding module. Program control then returns to SYNRMV2 and the loop thus established continues until the end of the bidding module chain is found.

When the end of the bidding module chain is found, a search is carried out at ENDCHN for the last subtask number within the last module. The address of the last module minus 2 is stored in register A, and a loop is entered which begins at ENDLDC. During the scope of this loop, successive subtask entries in the module are checked to see if they contain a subtask number. If an entry does not contain a subtask number, index register C is decremented and program control returns to ENDLOC. When an entry is finally found which does contain a subtask number, program control is transferred to ENDCHK.

Upon entry in ENDCHK, register E contains the last subtask number in the last bidding module of the chain; register G points to the address where a subtask number is to be removed from an earlier module; and register C points to the third address preceding the location occupied by the last subtask number. Upon entry into ENDCHK, the subtask number is register E (the one removed from the last bidding module) is stored in the location whose address A A is in G (the location previously occupied by the subtask number which is to be removed from the bidding module). Zero is then stored in the location previously occupied by the last subtask number in the last bidding module of the linkage whose address is three greater than the address stored in index register C.

At this point, a check is made to see if the last bidding module is vacant. Register A now contains the address of the last bidding module minus 2. If the last subtask number was removed from the second entry in this last bidding module, then register C will also point to the address of the bidding module minus 2. A check is therefore made to see if the contents of register C equals the contents of register A. If they are equal, the last bidding module is now vacant, and program control is transferred to a routine LASTSK which removes the last bidding module from the linkage. If they are not equal, other subtask numbers remain in the last bidding module and the subroutine has run to completion. Program control is then returned to the calling program through software lockout release via the routin RETADC in FIG. 17/950A.

The routine LASTSK removes the last bidding module from the linkage and returns this module to the empty linkage. Upon entry into this routin, index register C is incremented twice so that it points to the beginning of this module. A jump is then made to the subroutine REMOVE which removes this module from the linkage. Upon return from the subroutine REMOVE, zero is placed in the first or linkage location in the immediately preceding bidding module whose address is stored in LASTA. Program control then returns to the calling program via the routine RETADC and software lockout release.

If the subtask number that is to be removed is found to be in the last bidding module within the linkage of bidding modules, the SYNKMVL routine is used to remove the subtask number from the module. This routin first stores zero in the location previously occupied by the subtask number. The address of this location is in register G. At this point, register E contains an index as to which position within the module the subtask number occupied - either zero, 1, or 2 depending upon whether the subtask number occupied the fourth, third, or second location within the module. E is decremented. If E is then negative, the subtask number occupied the fourth position within the module and the module is definitely occupied. Nothing further needs to be done, so program control is returned to the calling program via the routin RETADC (FIG. 17/950A) and software lockout release. If E is zero, the subtask number occupied the middle slot within the module; minus 1 is placed in register G to indicate that the module is definitely still occupied. If E is positive, the subtask number was removed from the second location within the module and may have been the only subtask number within the module. In this case, G is left with the value of zero indicting the possibility that the module may be vacant.

It is now necessary to determine whether any other subtask numbers exist within the module at higher addresses and to shift these subtask numbers up to fill in the vacancy in the module. The three steps in the program beginning with LDASYN transfer the contents of a second location within the module into a first location which has just been vacated and store zero in the second location. If the first location then contains a subtask number, then the value in register G is decremented to indicate that the module is definitely occupied by subtasks other than the one that was cancelled. The address pointer C is then incremented and the index register E is decremented. If E is still positive or zero (zero is considered a positive number within the system), then an additional subtask number may have to be moved downwards. Program control is transferred back to LDASYN and the above procedure is repeated.

After the shifting operations have been carried out, a check is made to see if G is negative. If it is, then the module is not vacant and must be left at the end of the counting chain. Program control is then returned via the RETADC routine and software lockout release.

If the contents of register G are zero, then the end module is vacant and may be removed from the end of the linkage. It may also be necessary to remove the count module from the linkage if no other bidding modules are assigned to the count module. The address of the previous bidding module in the chain is retrieved from the location LAST and is stored in the index register C. The flag MINDEX is then checked to see whether or not the bidding module is the first one in the chain or not. If it is not, program control continues at location NOT1ST. Zero is stored in the pointer location of the preceding module, and the address of the empty bidding module is loaded into index register C. The emply module is then removed via the subroutine REMOVE, and program control is returned to the calling program via the routin RETADC and software lockout release.

Returning to the twelfth step past LDASYN, if the location MINDEX contains minus 1, the vacant bidding module is the first one in the linkage and it is necessary not only to release the bidding module but also to release the count module. Since index register C then contains the starting address of the count module, the pointer to the next count module is retrieved from the fourth location (3,C) within the count module using C as an index, and this pointer is stored in the location LAST. A jump to the subroutine REMOVE is now made with index register C pointing to the counting module. In this manner, the count module is added to the empty module linkage. The address of the bidding module is then transferred from index register B to index register C, and a second jump to the subroutine REMOVE is made to add the vacant bidding module to the empty module linkage. The flag NINDEX is then checked to see whether or not the count module removed is the first one in the count module linkage. If it is not the first module in the count module linkage, the flag NINDEX is zero, and program control proceeds without a jump. The address of the next count module in the linkage is loaded into register A, and the address of the last count module in the linkage is loaded into register C. The address in register A is then placed in the fourth location within the preceding counting module (STA 3,C). With the linkage chain once again established, program control returns to the calling program via the routin RETADC and software lockout release.

If the flag NINDEX is negative, the count module removed is the first one in the linkage. Program control continues at OSTCNT. In this case, the address of the pointer to this linkage is calculated by adding the value KINDEX to ADRESO as was done previously. The contents of the location LAST, the pointer to the next module in the linkage, is stored in the calculated address of the first linkage pointer. Program control is then returned to the calling program via the routin RETADC and software lockout.

The FINDFIL subroutine is shown in FIG. 17/960. This subroutine assumes that the return address of the calling program is stored in register E. The subroutine begins by transferring the address of the first empty file in the empty file linkage from the location ENDPOINT (see FIG. 9E) into index register C. Register A is then loaded with the contents of the first location in this first empty file, the pointer to the second empty file or zero. If the first empty file is linked to a second empty file, register A now contains an address. In this case, the address of the second empty file is simply stored in the location ENDPOINT to reestablish the linkage. Register E is then incremented, and program control returns to the calling program.

If the first location within the empty file contains zero, the empty file is part of the heretofore unused territory in the upper half of the periodic bidding table that has not previously been used to define a module. By way of explanation, when the auxiliary synchronizer program is first placed in operation, there are no count modules or bidding modules. The location ENDPOINT points to the first location in an otherwise completely empty table. As modules are created, the space within the table is filled up, and the location ENDPOINT contains the address of successively higher addresses within the memory. When modules are released, they are added to a linkage between the location ENDPOINT and the remaining unused portions of the table. Hence, a zero linkage pointer in an empty module indicates that the module either lies in the unused portion of the table or lies outside of the table if the table is completely full.

The FINDFIL routine continues at location ENDCOR. A check is made to see if the table bounds have been exceeded. "4" is added to the address of the module, and the termination address TOTCOR (see FIG. 9E) of the table is subtracted from the resultant sum. If the result is positive, then there are no more empty modules. In response to such a table overflow, program control is not returned to the FINDFIL subtask calling program, but to the program which called the subroutin SYNCLK via the error return routine ERRLZX which appears in FIG. 17/950B. If the empty module lies totally within the table bounds, the result is negative. In this case, the address of the empty module plus four is stored in the location ENDPOINT, and program control returns via the routine RTFIND to the calling program.

FIG. 17/970 shows the subroutine REMOVE which removes modules from the table. REMOVE assumes that the return address of the calling program is stored in register E and that a pointer to a module which is to be removed is stored in register C. The address stored in the location ENDPOINT is first transferred to the location at the start of the empty module whose address is in register C. The address of the module is then stored in the location ENDPOINT. Finally, zeroes are stored in the three non-linkage locations within the module. Program control is then returned to the calling program.

F. THE SUBLEVEL PROCESSOR PROGRAM AND THE ESTABLISHMENT OF SUBTASKS i. Terminology

Throughout subsection F, all numbers are hexadecimal numbers except reference numbers, figure numbers, and numbers whose names are spelled out. For example, the number 12 or "12" is a hexadecimal representation of the decimal number "18". However, twelve is the decimal number "12". Numerous references are made to the sublevel processor tables. These tables are shown in FIGS. 10C through 10F and are fully described in section 10 of this specification.

ii. CREATING SUBTASKS

A subtask may be any of the following:

1. A core-resident program.
2. A disk-resident program.
3. A core-resident control chain.
4. A disk-resident control chain.
5. A core-resident data block.
6. A disk-resident data block.

A subtask is created in two steps: first, the subtask itself is loaded into the system; and then the sublevel processor tables are altered to reflect the presence of the subtask. The subtask then must be placed in an active state by execution of a SUBABLE subroutine (FIG. 17/1014) before it may function.

The first step in creating a subtask is feeding the subtask into the system. Program subtasks are loaded directly into core memory by the system link loader. A program which is to be permanently core-resident is loaded directly into its permanent location. A program which is to be disk-resident is customarily loaded first into the buffer within which it is to be run (by the system link loader) and then into the disk sector which is to be its permanent home (by means of a standard disk loading routine). In the case of disk-resident programs, it is necessary to inform the sublevel processor program of which core buffer the program is to be loaded into when it is run. This is done by making appropriate entries in the CRPTAB group table (FIG. 10D) and into the LOWTAB and HIGHTAB buffer tables (FIG. 10F) These entries may be entered through a console program, they may be entered by an appropriate subroutine, or they may be entered into the sublevel processor program listing before the sublevel processor program is assembled.

The second step is creating a program subtask is that of altering the system tables so that they reflect the subtask's existence. This table alteration is carried out by a SUBLINK subroutine (FIG. 17/1012). An entry to the SUBLINK subroutine requires as arguments a subtask number, a subtask address, a subtask length, and an error return argument. The SUBLINK subroutine unpacks the specified subtask number using a SUBUNPAC subroutine (FIG. 17/1000) and then checks to see whether the specified task level (first four bits of the subtask number - see FIG. 10H) actually contains subtasks (steps 1801-1806) and whether the group number within the subtask number (see FIG. 10H) exceeds the maximum group number assigned to the specified task level (steps 1807 and 1808). If the subtask number fails either one of these tests, system control returns to the calling program with a "2" returned as the error return argument (steps 1825-1828). If the subtask number passes these tests, the SUBLINK subroutine 17/1012 then checks the STRTAB subtask storing address table (FIG. 10E) to see if the designated subtask already exists (steps 1810-1815). If the subtask address specification retrieved from the STRTAB table entry for the subtask is anything other than zero, the subtask already exists. Program control returns to the calling program with a "3" in the specified error location (steps 1824-828). If the subtask does not already exist, the subtask starting address is stored (step 1819) in the STRTAB subtask address table, and the program length is stored (step 1821) in the LGHTAB subtask length table. If the program is to be core-resident, the entry in the LGHTAB subtask table is zero. Program control then returns to the calling program with a "1" in the specified error location (steps 1826-1828). The program subtask may now be placed in operation by a call to the SUBABLE subroutine (FIG. 17/1014).

Control chain subtasks may be loaded into the system by use of a file loader program (FIG. 6) or in any convenient manner. A control chain is first loaded into the system file storage area. The address of the chain, its length (zero if core-resident), and the chain subtask number are then supplied to the SUBLINK subroutine (FIG. 17/1012) along with the control chain subtask number. The control chain subtask is then ready to run. A control chain subtask is placed in operation whenever desired by the SUBABLE subroutin (FIG. 17/1014).

Data block subtasks (pure date subtasks and subtask linkages of monitor data files) may be loaded into the system by the same file loader program (FIG. 6) that loads control chains into the system, or in any other convenient manner. The only significant difference between the way the system handles control chain subtasks and data block subtasks is that bids for the execution of a data block subtask usually cause the data file processor program (FIG. 13) to be placed into operation, whereas bids for the execution of control chains use a standard sublevel processor basic task program (FIG. 17/1030) to place a control chain processor program (FIG. 7) into operation.

iii. FORM OF A PROGRAM SUBTASK

The form of a program subtask is almost identical to the form of any other program. Core-resident program subtasks and disk-resident program subtasks are identical in form to one another.

A program subtask preserves the value stored in index register B at the start of the program. When a program subtask runs to completion, it restores register B to its original value and then jumps to the location whose address is contained in the location B +4. As an example, the following is an acceptable format for either a core- or a disk-resident program.

```
LDA     B
LDB     (pool address)
STA     1,B

LDB     1,B
JMP     *4,B
```

When a disk-resident program subtask runs to completion, the core buffer containing the program is automatically released for use by other subtasks. If the subtask is to remain core-resident, the last instruction in the above sequence may be replaced with the following instruction:

```
EST   1,B
```

This last instruction bypasses the automatic buffer release routine in the basic subtask exit program 10/1300 (FIG. 10A - also FIG. 17/1040).

iv. SUBTASK CONTROL SUBROUTINES

The SUBABLE and DISABLE subroutines (FIGS. 17/1014 and 17/1015) are provided for enabling or disabling any subtask within the system. Both of these subroutines require a subtask number as an arguement. After testing the subtask number to insure that it is valid (steps 1552–1566, 1616–1628), these subroutines either set (sets 1567–1589, 1596–1599), or clear (steps 1630–1639, 1646–1649) the coreresident or disk-resident bits for the subtask and thereby either place the subtask into operation or remove the subtask from operation.

A subtask may be removed from the system by means of a SUBRMOVE subroutine (FIG. 17/1013). This subroutine requires a subtask number as an argument. After testing the subtask number for validity (steps 1849–1859), this subroutine zeroes the various table entries for the subtask (steps 1877–1899) so that so far as the system is concerned the subtask no longer exists. If a subtask is in time delay, the subtask is not removed from the system (steps 1865–1869).

A subtask may be located within the system by means of a SUBLOC subroutine (FIG. 17/1011). The SUBLOC subroutine, when supplied with a subtask number and an error return as arguments, obtains the address and the length of a subtask (steps 2170–2179). If the subtask length is zero, the subtask is core-resident, and the address is a core address. If the subtask length is specified, the subtask is disk-resident, and the address is a disk sector number. The SUBLOC subroutine (FIG. 17/1011) generates an error return as follows:

1 - everything is O.K. (steps 2162–2163).

2 - invalid subtask number (steps 2165–2168, 2182–2183).

3 - subtask is not occupied (steps 2124–2175, 2183).

When the system is first placed in operation, it is necessary to prepare all of the various subtasks. A SYSTIT subroutine (FIG. 17/1017) is provided to prepare the system. The SYSTIT subroutine performs the following operations:

Zeroes the bid bits in the table ACTTAB (steps 2085).

Zeroes the time delay and suspend linkage pointers (steps 2087, 2088).

Zeroes the time delay bits in the table TIMTAB (steps 2091–2093).

Zeroes the core-resident bits in the table RSDTAB for disk-resident programs (steps 2096–2109).

Zeroes the buffer tables BIDTAB and REDTAB for all buffers (steps 2104–2125).

Halts the DISCAN program (steps 2127–2129).

When all of the above steps have been carried out, the system is ready to start.

A SUBTRACE subroutine (FIG. 17/016) is provided to set the trace bit for a subtask (step 1942) and thereby to cause a trace program to be placed into operation before a subtask is executed. The SUBTRACE subroutine requires as arguments a subtask number and a second argument which is the following:

0 - turn trace bit off (steps 1929–1939, 1940, 1941, 1942).

−1 - turn all trace bits off (steps 1924–1925, 1948–1955).

(other) - turn trace bit on (steps 1929–1939, 1940, 1942).

v. BIDDING FOR THE EXECUTION OF A SUBTASK

When execution of a subtask is desired, a bit for subtask execution is placed by a call to the SUBBID subroutine (FIG. 17/10200. This subroutine expects the subtask number of the subtask as an argument. The SUBBID subroutine first obtains the task number portion of the subtask number (steps 1178–1190) and uses this task number to interrogate the GRPTAB task table (step 1201). If the entry in this table for the specified task is −1 or "$FFFF_{16}$", the task level contains no subtasks. The SUBBID subroutine then bids the task (steps 1202, 1232–1236) and returns program control to the calling program. If the entry is some other number than −1, this means the task is broken down into subtasks. A check is then made to see if the group number' portion of the subtask number (see FIG. 10I) exceeds the number within the GRPTAB table entry for the same task level (steps 1203–1204). If the group number does exceed the table entry, this usually indicates the subtask number is invalid, and therefore program control is usually returned to the calling program (steps 1247–1255). However, if the sublevel number portion of the subtask number (see FIG. 10I) is "$FFFF_{16}$", the SUBBID subroutine bids the specified task level without bidding for the execution of any particular subtask within the task level (steps 1249–1252, 1232–1236) and returns program control to the calling program.

If the subtask number is valid, the subtask bit in the RSDTAB group table is checked (step 1211). If the bit is "1", the subtask is already core resident. A bid for execution of the subtask is place by setting to "1" the bit corresponding to the subtask in the ACTTAB group table (steps 1224–1230). The task level to which the subtask is assigned is then bid (steps 1232–1236), and program control then returns to the calling program. If the subtask bit in the RSDTAB group table is "0", the subtask is disk-resident (steps 1211–1214, 1238–1240). In this case, the bit for the subtask in the ACTTAB group table is set (steps 1224–1230), but the task level of the subtask is not bid. Instead, a bid of execution of the task level assigned to the DISCAN program (FIGS. 10B and 17/1060) is placed (steps 1242–1245, 1232–1236) so that the DISCAN program may load the requested subtask into a core buffer.

The SUBBID subroutine also checks to see if the subtask is in time delay (steps 1216–1220). If the subtask is in time delay or suspension, the subtask is not bid, and program control is returned to the calling program (steps 1220–1222, 1253–1255). An UNSUSP subroutine (FIG. 17/1021) is used to bid for execution of a subtask that is in time delay or suspension (steps 2056–2060 in FIG. 17/1021, steps 1221–1222 in FIG. 17/1020).

In the case of a core-resident subtask, two bids are placed. The first bid (step 1230), which is recorded in the ACTTAB group table, calls for execution of the specified subtask; the second bid (step 1236), placed with the executive shedule 10/202 (FIG. 10A), calls for execution of the task level to which the subtask is assigned. When the executive scheduler 10/202 ultimately commences execution of the task level, an entry is made to the basic task program 17/1030 (element 10/1200 in FIG. 10A) at an address whose symbolic name is SPEXIT +1 (see FIG. 17/1030). The basic task program immediately calls upon a CHKBID subroutine (FIG. 17/1050) to determine what is the highest priority subtask assigned to that task level and bidding. Upon return from the CHKBID subroutine, the system registers contain the following data:

- B - address of task level task header + 8 (task data pool address - see FIG. 10G).
- C - address of task level task header − 2 (HIINDX, LOINDX pointer - see FIG. 10G).
- A - sublevel number of subtask to be executed - minus for time delay, and bit fourteen equalls "1" for disk-resident.
- E - starting address of subtask in core.

If register E contains zero, no subtasks within the task level are bidding. Program control is transferred back to the executive scheduler (steps 1127–1128, 1112, 1112). If register E contains the address of a subtask the basic task program determines what type of subtask the CHKBID subroutine has found (steps 1129, 1131–1133, 1136–1138). This determination is carried out using the information stored in the locations LOINDX and HIINDX (see FIG. 10G).

If the subtask is a program (steps 1137, 1138) and if the program is not in time delay (steps 1129, 1130), index register B is loaded with a pointer to a pool within the basic task program (step 1140). The address in register E is increased by one (step 1141), and a direct jump is made to the program at the address indicated by register E (step 1142). Later, after the program subtask has run to completion, the program executes an instruction:

```
JMP   *4,B
```

This instruction transfers program control to the address specified by the fourth location within the basic task program pool. This fourth location is preloaded with the starting address of RELBUF, the entry to the basic subtask exit program 17/1040 (element 10/1300 in FIG. 10A). Hence, when the program runs to completion, the REBLUF program is automatically entered. The RELBUF program releases the core buffer of the disk-resident program as soon as the program has run to completion and returns program control to SPEXIT +1 (step 1114 in FIG. 17/1030), the entry to the basic task program.

If the subtask is a control chain (steps 1138, 1143–1144), program control is transferred directly to the control chain processor program (FIG. 7), and more specifically to an entry I*START in FIG. 17/700A (step 1144). If the subtask is a control chain that is coming out of time delay (steps 1130, 1146–1148, 1164–1165), program control is transferred to the control chain processor program (FIG. 7) and to an entry called "I*INTTD" in FIG. 17/710 (step 1165). The control chain processor program and the computer system algorithm subroutines then carry out execution of the control chain subtask.

If a subtask is assigned to data, an executive bid for execution of the subtask does not have to result in an entry to the basic task program. Program control may also be transferred directly to the data file processing program which then calls upon the CHKBID subroutine 10/1400 to determine what data subtask is bidding for execution. If the basic task program (FIG. 17/1030) encounters a data block subtask call, an error return may be executed (steps 1133–1135). Alternatively, the basic task program may handle data subtasks in the same way that it handles control chain subtasks.

If a subtask found by the CHKBID subroutine (FIG. 17/1050) is assigned to a program (steps 1146–1148, 1149–1153, 1163) and if the program is returning from time delay (steps 1129–1130), the restart of the program is accomplished by the command:

```
EST   *E (step 1163)
```

This command restores the registers in the suspended program from a register storage pool and restarts the program execution at the program step immediately following that step which suspended program execution. In this case register E does not contain a program starting address but a program register pool address.

The basic task program includes a separate exit for programs which are suspended pending a read-transfer execution (steps 1153–1162). The operation of this exit is discussed below in connection with the discussion of the subtask read and write subroutines shown in FIGS. 17/1070A and 7/1070B.

vi. THE CHKBID SUBROUTINE

When the executive scheduler 10 202 (FIG. 10A) commences execution of a task level that is broken into subtasks, either a data file processing program (FIG. 17/1200A and B) in the case of a subtask linkage of monitor data files, or else the basic task program 17/1030 in the case of a program subtask or a control chain subtask, calls upon the CHKBID subroutine (FIG. 17/1050) to determine what is the highest priority subtask assigned to the executive task level that is bidding. The CHKBID subroutine returns to the calling program the following data:

B - the address of the task header for the currently running task level + 8;

C - the address of the task header for the currently running program − 2;

A - the sublevel number of the highest priority subtask that is bidding for execution and that is core-resident - negative if the subtask is returning from time delay, and bit fourteen equals "1" if the subtask is disk-resident;

E - the core starting address of the subtask, or a pointer to a subtask pool if the subtask is returning from time delay, or zero of no subtasks are bidding for execution.

This data enables the calling program to determine what type of subtask has been found, where the subtask resides, and where subroutine data values may be stored without fear that they will be erased by programs running at a higher task level.

Upon entry to the CHKBID subroutine, a test is first carried out to see if any subtasks are assigned to the currently active task level (steps 1276–1279). If there are no subtasks assigned to the task, program control returns to the calling program with zero in the register E (steps 1327, 1424, 1426). If the task level is divided into subtasks, the CHKBID subroutine searches through the group tables for subtasks assigned to the currently running task level looking for the highest priority subtask that is bidding and that is either core-resident or in time delay (see FIGS. 17/053 and 17/1055 - a more detailed discussion of these figures is presented below). If no bidding subtask is found, a return to the calling program is executed with a zero in the register E (step 1326 in FIG. 17/1053; steps 1327 et seq. in FIG. 17/1050).

If a bidding subtask is found, the bid bit for that subtask in the ACTTAB group table is set to zero to indicate that the subtask is no longer bidding (FIG. 17/1050 - steps 1331–1336). If the DSKTAB group table entry for the subtask indicates that the subtask is disk-resident, bit position F of the sublevel number for the subtask (the sublevel number is retrieved from a location SUBSAVE) is set equal to "1" (steps 1346–1352). The subtask number is then stored within the CSRTAB task table entry for the currently running task level (steps 1353–1354). If the subtask is core-resident (as opposed to a disc-resident program stored in a core buffer - step 1355), a return to the calling program is then executed with the positive sublevel number stored in register A (step 1423) and with the subtask starting address stored in register E (steps 1359, 1360, 1424). (The subtask starting address is retrieved from the STRTAB subtask table.) If the subtask is a normally disk-resident subtask (step 1355), bit position 14 of the calculated sublevel number in the location SUBSAVE is set equal to "1" (FIG. 17/1054 - steps 1439–1440), bit position 15 is set equal to "0" (same steps 1439–1440), and the buffer index number of the core buffer containing the subtask is retrieved from bit positions F to B of the LGHTAB subtask table entry for the subtask (steps 1446–1449). The actual core address of the core buffer is then retrieved from a CORTAB buffer table entry whose address is the starting address of the CORTAB table plus the buffer index retrieved from the LGHTAB table (steps 1450–1451). This core buffer address is placed into register E (step 1452 in FIG. 17/1054, step 1424 in FIG. 17/1050) before program control is returned to the calling program (step 1426 in FIG. 17/1050).

If the subtask time delay bit in the TIMTAB group table is set (steps 1371, 1372), bit position F of the sublevel number is set equal to "1" before a return is made to the calling program (FIG. 17/1051; steps 1410–1412). The subtask register storage pool is removed from the time delay or suspend linkage (FIG. 17/1051, steps 1377–1408), and the address of this pool (which contains the subtask restart address) is stored in register E (step 1408 in FIG. 17/1051, step 1424 in FIG. 17/1050). A more detailed description of how a subtask is removed from such a linkage is presented below.

If the trace bit for a subtask is set, the CHKBID subroutine transfers program control to a user-written TRACE program (not shown) before returning program control to the calling program (steps 1366–1367 in FIG. 17/1050; FIG. 17/1052). This enables the systems engineer to set up subtask trace procedures before a subtask is executed. A detailed explanation of program traacing goes beyond the scope of the invention.

The CHKBID subroutine is executed under software lockout. Normally, programs executed under software lockout exit through an executive software lockout release program. Since the usual release program is somewhat slow for use with the frequency called upon CHKBID subroutine, a special APLSLORL subroutine (FIG. 17/1056) is used by the CHKBID subroutine to decrement the executive software lockout counter C:SFL. This special subroutine subtracts one from the software lockout counter (step 1473). If the counter contains zero, the subroutine checks the call flag Z-CALL (step 1479). All of this is done without altering the contents of the system registers. If it is possible to transfer program control to the program which is to be executed next without first checking for task bids, the return is accomplished without the delay inherent in storing away the contents of the system registers and then re-loading the registers again. If an executive call is essentail, the APLSLORL subroutine stores the program registers at high speed (steps 1481–1502) and jumps into the middle of the executive scheduler routine 10/202 to save time (step 1503).

VII. TERMINATION OF PROGRAM EXECUTION

When execution of a program or control chain subtask terminates, the subtask (or the control chain processor program) executes the instruction:

```
JMP  *4,B
```

At this time, register B is pointing to the first address of a pool within the basic task program. The basic task program pool appears as follows:

| | | |
|---|---|---|
| POOL | DAT | SPEXIT |
| | DAT | ZERO |
| | DAT | ZERO |
| | DAT | RELBUF −1 |
| | DAT | ZERO |
| | DAT | ZERO |
| | DAT | ZERO |

Since B points to POOL, a JMP instruction to *4,B transfers program control to RELBUF, the basic subtask exit program (FIG. 17/1040). The RELBUF program is the normal exit routine for all subtask programs and control chains. The RELBUF program checks to see if the subtask is disk-resident (steps 1078–1081). If it is not, program control is returned to the basic task program as is explained in the next paragraph (steps 1078–1081, 1076). If the subtask is disk-resident, the RELBUF program obtains the index number of the core buffer in which the subtask program resides from bit positions eleven to fifteen of the LGHTAB subtask table entry for the subtask (steps 1082–1091). The program then releases the subtask buffer by storing zero in the BIDTAB table entry for the buffer and −1 or "FFFF$_{16}$" in the REDTAB table entry for the buffer (steps 1092–1084, 1042–1044; by way of further explanation, BUFNUM (steps 1043 and 1045) equals the number of buffers, and thus equals the number of locations separating the entries for the one buffer in two adjacent buffer tables). The RELBUF program then zeroes the subtask "core-resident" bit in the RSDTAB group table (steps 1045–1065). Finally, the RELBUF program places an executive bid for executive of the DISCAN program (FIG. 10B) so that the released buffer may be loaded with some other subtask (steps 1066–1073). When the RELBUF program has completed the above steps, program control is returned to the basic task program through software lockout release (step 1074) and program control eventually reverts to the location SPEXIT +1, the entry to the basic task program (FIG. 17/1030).

If the program subtask proves to be core-resident, the buffer release and DISCAN bidding portions of the RELBUF program are bypassed, and program control is returned directly to SPEXIT +1, the entry to the basic task program (steps 1081, 1076).

VIII. THE DISCAN ROUTINE

The DISCAN routine (FIG. 17/1060) is the first of the four routines which comprise the DISCAN program (FIG. 10B). When the executive scheduler 10/202 (FIG. 10A) calls for execution of the DISCAN program task level, an entry is made to DISKSTRT (steps 2519, 2520, 2448). The DISCAN routine then searches for subtasks which are awaiting transfer between disk and core storage. When a subtask is found which can be transferred, one of the two routines READDISK (FIG. 17/1065) or WRITDISK (FIG. 17/1064) is called upon to execute the transfer.

The DISCAN routine is basically a buffer scanning routine which scans the entries in the BIDTAB and REDTAB buffer tables looking first for available core buffers and secondly for core buffers containing subtasks which are requesting the transfer of other subtasks. The DISCAN routine begins by storing the highest legitimate buffer index number in the two locations PSAVE and RSAVE (steps 2451–2454). The DISCAN routine then retrieves from the buffer tables BIDTAB and REDTAB those entries corresponding to the buffer whose index number is stored in PSAVE and stores these entries respectively in locations PSUBTSK and RSUBTSK (steps 2456–2462). If the value stored in the location PSUBTSK is equal to zero or if the value stored in the location RSUBTSK is not equal to zero (steps 2458–2461), it may be possible to carry out a subtask transfer. The DISCAN routine checks further, and if a transfer can be carried out, program control is transferred either to the READDISK routine (FIG. 17/1065) or to the WRITDISK routine (FIG. 17/1064). If no transfer can be carried out, or if the location PSUBTSK does not contain zero and the location RSUBTSK does contain zero, then the buffer index numbers in locations PSAVE and RSAVE are decremented (steps 2461, 2504–2508, 2455) and the above procedures are carried out for another core buffer. When the buffer index in the location PSAVE becomes less than zero (step 2502), all of the buffers have been checked. A final test is made to see if a BIDFLAG is set indicating that an additional check for transfers should be made (step 2511). If the BIDFLAG is set, the BIDFLAG is cleared to zero (step 2513) and the DISCAN routine begins again from the start. If the BIDFLAG is not set, then no more transfers can be made at the present time. The DISCAN routine then returns program control to the executive scheduler 10/202 in FIG. 10B (steps 2518, 2519).

If the value stored in the location PSUBTSK is equal to zero (step 2458), the core buffer whose index number is stored in PSAVE is available to accept a disk-resident subtask. The DISCAN routine commences a search fur subtasks which may be loaded into the available buffer. FIGS. 17/1061, 17/1062 and 17/1063 shows the details of the search for subtasks and are described below. Basically, a search is made for a subtask whose group number falls within the limits set by the entries in the bidding tables LOWTAB and HIGHTAB for the core buffer whose index number is stored in PSAVE. The subtask must additionally be disk-resident, bidding for execution, and not presently core-resident. If such a subtask is found, the subtask number of the subtask is computed (FIG. 17/1063), and the subtask number is stored in the location RSUBTSk (step 2587 in FIG. 17/1063). Program control is then transferred to the READDISK routine (FIG. 17/1065). If a subtask satisfying the above conditions is not found, the buffer search is continued in the manner described above (step 2531 in FIG. 17/1061). The details of this search procedure are presented below.

If the storage locations PSUBTSK and RSUBTSK both contain the same subtask number (steps 2464 and 2465 in FIG. 17/1060), the buffer whose index number is stored in PSAVE is reserved specifically for the subtask having that subtask number. Since the buffer is reserved, there is no need to search for a subtask to fill the core buffer or for a core buffer within which to put the subtask. The core-resident bit in the RSDTAB table for the subtask presently occupying the buffer is set equal to zero by a RESERVE routine (FIG. 17/1067), and program control is transferred to the READDISK routine (FIG. 17/1065).

If the location RSUBTSK contains a subtask number that is not the same as the contents of the location PSUBTSK (step 2465), then a subtask residing in the buffer whose index number is stored in PSAVE has requested that the subtask whose subtask number is stored in the location RSUBTSK be loaded into a core buffer. A check is made of the "write" bit (bit position B) within the location RSUBTSK (steps 2479–2481). If the "write" bit is equal to "1 " (step 2481), program control is transferred to the WRITDISK routine (FIG. 17/1064). The WRITDISK routine transfers the subtask whose subtask number is in RSUBTSK from a core buffer to a disk sector. if the "write" bit is equal to "0", the subtask whose subtask number is in RSUBTSK is loaded into a core buffer, but only if an available buffer can be found into which the subtask may be placed (steps 2466–2478, 2484–2498). If a suitable buffer is found (step 2493), the buffer index number is stored in the location RSAVE (steps 2500, 2501) and program control is transferred to the READDISK routine (FIG. 17/1065). If a suitable, available buffer is not found, the buffer scanning routine described above is resumed (step 2497).

IX. THE WRITDISK ROUTINE

If an entry in the RSUBTSK buffer table contains a subtask number in which the "write" bit in bit position B is equal to "1", the subtask number is that of a subtask which is in a core buffer waiting to be transferred into a disk sector. Usually the subtask is a pure data subtask which is to be returned to disk storage. The DISCAN routine calls upon the WRITDISK routine (FIG. 17/1064) to transfer the subtask from the core buffer to the disk sector.

The WRITDISK routine first determines the location of the core buffer in which the subtask resides. After the "write" bit is set equal to zero (steps 2598–2599), the index number of the buffer within which the subtask resides is retrieved from the LGHTAB table entry for the subtask (steps 2600–2613). The WRITDISK routine checks to insure that the subtask is actually resident within the core buffer by obtaining a subtask number from the INCTAB buffer table entry for the buffer (step 2617) and by comparing this subtask number with the subtask number stored in the location RSUBTSK (steps 2618–2619). If the two subtask numbers agree, then the subtask is in fact resident within the specified core buffer. The WRITDISK routine then carries out the necessary steps to transfer the contents of the core buffer into the disk sector in which the subtask normally resides (steps 2622–2631). The subtask disk sector number is specified by the STRTAB table entry for the subtask. If the subtask numbers do not agree, then no transfer of information to disk is carried out (step 2620).

When the WRITDISK routine has carried out the above steps, program control is transferred to the CKSTUS routine (FIG. 17/1066).

X. THE READDISK ROUTINE

If the DISCAN routine discovers an available core buffer and a subtask that is waiting to take up residence in the buffer, the DISCAN routine stores the index number of the buffer in the location RSAVE, stores the subtask number of the subtask in the location RSUBTSK, and transfers program control to the READDISK routine (FIG. 17/1065).

The READDISK routine 17/1065 first checks to see if the subtask is already present within the core buffer by comparing the entry in the INCTAB buffer table for the buffer with the contents of the location RSUBTSK to see if the INCTAB buffer table entry and the location RSUBTSK contain the same subtask number (step 2665–2658). If they do, the specified subtask still resides in the core buffer from an earlier subtask call and has not yet been overwritten by another subtask. Since there is no reason to retrieve the subtask from disk storage when it is already core-resident, the READDISK routine sets the subtask "core-resident" bit in the RSDTAB group table (step 2698) and transfers program control to the CKSTUS routine (FIG. 17/1066).

Normally the above test reveals that some other subtask is resident within the buffer whose index number is stored in RSAVE. The READDISK routine retrieves the subtask whose subtask number is stored in RSUBTSK from the disk sector where the subtask normally resides and loads the subtask into the core buffer whose index number is stored in RSAVE (steps 2677–2681); stores the subtask number of the subtask in the INCTAB buffer table entry for the buffer whose index number is stored in RSAVE (steps 2659–2660); and transfers the buffer index number from the location RSAVE to bit positions F to B of the subtask LGHTAB table entry (steps 2672–2676). Since the subtask is now core-resident, the READDISK routine sets the "core-resident" bit for the sublevel in the RSDTAB group table (step 2698). Program control is then transferred to the CKSTUS routine (FIG. 17/1066).

XI. THE CKSTUS ROUTINE

The CKSTUS routine (FIG. 17/1066) is called by both the READDISK routine and by the WRITDISK routine after a subtask has been transferred between a disk sector and a core buffer. The CKSTUS routine performs different tasks depending upon what type of a transfer was carried out and also depending upon which system subroutine called for the transfer initially.

If the transfer was initiated by the SUBBID subroutine (FIG. 17/1020), a disk-resident subtask was transferred into a core buffer. The subtask is now ready for execution. The CKSTUS routine tests for a transfer of this type by looking for zero in the BIDTAB table entry whose index number is stored in PSAVE (steps 2702–2704). If a transfer of this type is found, the CKSTUS routine places "−1" and "0" respectively into the BIDTAB and REDTAB table entries (steps 2745–2748) for the buffer into which the subtask has been loaded (the buffer whose index number is stored in PSAVE). The "bid" bit for the subtask in the ACTTAB group table has already been set by the SUBBID subroutine (FIG. 17/1020), and the "core-resident" bit for the subtask in the RSDTAB table has already been set by the READDISK routine (FIG. 17/1065). The subtask is almost ready for execution, but the task level to which the subtask is assigned has yet to be bid. The CKSTUS routine therefore places a bid with the executive scheduler for the exection of the task level to which the subtask is assigned (steps 2750–2756). The subtask number of the subtask is stored in the PSAVE entry of the table INCTAB (step 2750).

If the BIDTAB table entry for the buffer whose index number is stored in PSAVE is not equal to zero (step 2704), then the buffer whose index number is stored in PSAVE contains a program subtask that is either in suspension or that is awaiting an opportunity for execution. In either case, the CKSTUS routine 2000 bids for execution (or for unsuspension) of the subtask by setting the subtask bid bit in the ACTTAB table (steps 2709–2737) and by bidding the task level to which the subtask is assigned (steps 2750–2756). The CKSTUS routine also sets the entries in the tables BIDTAB and REDTAB respectively equal to "−1" and "0" for the buffers whose index numbers are stored in PSAVE and in RSAVE (steps 2739–2742, 2745–2748).

After having completed the above steps, the CKSTUS routine transfers program control to an entry STARTA1 at the very beginning of the DISCAN routine (FIG. 17/1060-step 2749 in FIG. 17/1066). This transfer reinitiates the entire DISCAN program. The DISCAN program is commenced from the beginning because additional buffers may have become available and additional requests for subtask transfers may have been received during the time required to carry out a single subtask transfer between disk and core.

XII. ROUTINE TO FIND BIDDING SUBLEVEL

Both the CHKBID subroutine (FIG. 17/1050) and the DISCAN routine (FIG. 17/1060) have occasion to hunt for the highest priority subtask within a given range of subtasks whose status as indicated by group table entries satisfies particular logical criteria. Separate routines are used by the CHKBID subroutine and by the DISCAN routine, but these two routines are so similar that only one need be discussed in full detail. The CHKBID routine used for this purpose appears in FIGS. 17/1053 and 17/1055; the DISCAN routine appears in FIGS. 17/1061 and 17/1062.

With reference to FIGS. 7/1053 and 17/1055, the search for a particular subtask is carried out in two steps. First, a search is carried out for a group of sixteen subtasks which includes at least one subtask satisfying the specified criteria (FIG. 17/1053). Secondly, a search is carried out within the group of subtasks for the highest priority subtask that satisfies the specified criteria (FIG. 17/1055).

The search for a group of subtasks involves checking the sublevel processor group table entries for each group of sixteen subtasks. Not all of the group table entries are scanned. The criteria used to limit the scope of the group table search are different in the two versions of the routine and are discussed more fully below. For now it is sufficient to note that index register C is loaded with a group table index number which, when added to the starting address of a group table, points to the group table entry for the first group of sixteen subtasks which are to be included in the search (steps 1280–1282); and that a core location LOWPOINT (in the CHKBID routine-LOWSCAN in the DISCAN routine) contains a group index number which, when added to the starting address of a group table, points to the group table entry for the last group of subtasks which are to be included in the search (step 1325 in FIG. 17/1053; step 1569 in FIG. 17/1061). The group tableentries for the first group of subtasks are checked first. If these entries do not satisfy the specified criteria (steps 1285–1295), "1" is subtracted from the contents of index register C (step 1323), and the group table entries for a second group of subtasks are checked. Checks of this type are continued cyclically until a group is found whose table entries satisfy the specified criteria (step 1295) or until the group index number in register C is lower than the group index number stored in the location LOWPOINT (steps 1324–1326). If a group is found to contain subtasks satisfying the criteria, the highest priority subtask within the group satisfying the criteria is determined by a FINDBIT routine (FIG. 17/1055); and program control returns to a FOUNDBIT entry of the calling CHKBID subroutine. If none of the groups checked contains subtasks satisfying the criteria, program control returns to a CKEXT entry to the calling CHKBID subroutine (FIG. 17/1053, step 1326).

In a search initiated by the DISCAN routine, register C and the location LOWSACN are respectively loaded with the HGHTAB and the LOWTAB table entries for the buffer whose index number is PSAVE (FIG. 17/1061, steps 2530–2533). The search is thus limited to those subtasks falling into groups whose group index numbers lie between the LOWTAB and HGHTAB table entries for the buffer PSAVE. In this manner, the entries in the tables LOWTAB and HGHTAB delimit the range of bidding subtasks which may be loaded into an available core buffer.

The DISCAN routine is searching for a subtask which is disk-resident, bidding, but not core-resident. Such a subtask has a "1" in the subtask bit positions within the tables DSKTAB and ACTTAB, and a "0" in the subtask bit position within the table RSDTAB. The test as to whether a group contains subtasks satisfying these criteria is carried out by: (FIG. 17/1061, steps 2536–2540)

1. Using a bit-by-bit logical AND operation, combining the entries in the ACTTAB table and DSKTAB table for the group whose index number is stored in register C, and storing the result in register G.
2. Performing a bit-by-bit logical exclusive-OR operation on the entry in the RSDTAB table for the group whose index number is in register C and storing the result in register A.
3. Using a bit-by-bit logical AND operation, combining contents of the register G with the contents of the register A and leaving the result in register A.

After the above operations have been performed, each "1" bit remaining in register A indicates that the corresponding subtask satisfies the specified criteria. If none of the subtasks within the group satisfies the criteria, then all of the bits in register A are "0" bits, and register A contains zero.

If the contents of register A are not equal to zero (step 2542), the FINDBIT routine (FIG. 17/1062) is immediately called to determine the bit number of the highest priority subtask within the group that satisfies the criteria. Tfhe subtask number of this subtask is then calculated by a FNDBIT routine (FIG. 17/1063). The subtask number is stored in RSUBTSK (step 2587) and program control is transferred to the READDISK routine (step 2588). If the contents of register A are equal to zero (FIG. 17/1061, step 2542), then the group index number in register C is decremented (step 2567) and the above test is repeated for the group of sixteen subtasks whose group index number is one less than the group index number of the group of sixteen subtasks just tested (step 2571).

A search initiated by the CHKBID subroutine is limited to those groups of subtasks falling within the currently active task level. The TSKTAB table entry for the currently active task levels is stored in the location LOWPOINT (FIG. 17/1050, step 1278; FIG. 17/1053, step 1280), and the sum of the TSKTAB and GRPTAB table entries for the currently active task level is stored in register C (steps 1281, 1282). Hence, C contains the group index number of the group of subtasks assigned to the currently active task level having the numerically highest group index number, and the location LOWPOINT contains the group index-number of the group of subtasks assigned to the currently active task level having the numerically lowest group index number. The search is carried out in exactly the same manner as in the DISCAN version of the routine, but the test is different and is as follows: (steps 1285–1291)

1. Using a bit-by-bit logical OR operation, combined the entries in the tables RSDTAB and TIMTAB for the group whose group index number is in register C, and store the result in register G;
2. Using a bit-by-bit logical AND operation, combined the entries in the tables TIMTAB and RSDTAB and store the result in register A;
3. Exclusive-OR together the contents of registers G and A, storing the result in register A; and
4. AND together the contents of register A and of the ACTTAB table entry, leaving the result in register A. The CHKBID routine searches for a subtask which is bidding for execution and which is also either core-resident or in time delay. If one or more subtasks within a group are found to satisfy these criteria, the bit positions in register A corresponding to these subtasks contain "1". If register A contains zero after the above operations, none of the subtasks within the group satisfies the specified criteria (step 1295). The group index number in register C is decremented (step 1323) and the same test is carried out for another group of subtasks. If register A does not contain zero (step 1295), then at least one subtask within the group satisfies the specified criteria. A FINDBIT routine (FIG. 17/1055) is executed, and the sublevel number of the highest priority subtask satisfying the criteria is calculated and is ultimately stored in a location SUBSAVE (FIG. 17/1050, steps 1339-1344).

In the above description, it has been assumed that the system is capable of performing bit-by-bit logical AND and exclusive OR operations. If the system is incapable of performing these operations, other equivalent combinations of logical operations may be utilized to produce the same logical results.

XIII. THE FINDBIT ROUTINES

The FINDBIT routines (FIGS. 17/1055 and 17/1062 are entered with a bit pattern stored in register A. The purpose of the routines is to determine as rapidly as possible the bit position of the left-most bit within register A that is equal to "1". Since the two FINDBIT routines are almost exactly identical to one another, only the FINDBIT routine (FIG. 17/1055) used with the CHKBID subroutine (FIG. 17/1050) need be described. In the following discussion, all numbers in quotation marks are hexadecimal unless otherwise noted.

The FINDBIT routine (FIG. 17/1055) is preceded by the loading of "F" into register E (FIG. 17/1053, step 1284). After the FINDBIT routine has completed its operation, register E contains the bit position number of the left-most bit within register A that is equal to "1".

The FINDBIT routine first checks to see if register A contains a negative number (step 1296). If it does, then bit position F of register A contains "1". In this case, an immediate return is made to the CHKBID subroutine with "F" still stored in register E. If register A is found to contain a positive number or zero, the FINDBIT routine continues.

The FINDBIT routine next determines whether there are any "1" bits in the bit positions F to 8 of register A. This is done by subtracting "100" from the number within register A (step 1297).

A negative result (step 1298) indicates that the number within register A contains no "1" bit positions F to 8. In this case, "8" is subtracted from the number in register E by double precision subtraction (step 1299) and the contents of register A are shifted eight bit positions to the left (steps 1300, 1301) so that the lowermost eight bits within register A now occupy bit positions F to 8. A check is again made to see if the number within register A is negative (step 1302), and if so, a return to the CHKBID subroutine is executed with the number "7" stored within the register E. If not, "100" is subtracted from the contents of register A (step 1303).

A positive result at step 1298 indicates that the number within register A contains at least one "1" bit in bit positions "F" to "8". If the result is positive, the steps described in the preceding paragraph are not performed.

The remaining portions of the FINDBIT routine concentrate only upon the bits in bit positions F to 8 of register A. Register E now contains either "F" or "7" depending upon whether bit positions F to 8 of register A contain what was originally the left half or the right half of the initial contents of register A.

A test is now made to determine whether any one of the left-most four bits in register A is equal to "1". This is done by subtracting "F00" from the contents of register A (step 1305). Since "100" has already been subtracted, the result is equivalent to subracting "1000" from the original contents of register A.

If the result of this subtraction is positive or zero (step 1306), then one or more of the left-most four bits in register A are equal to "1". In this case, "1000" is added to register A so that these upper four bits are returned to their original form (step 1313).

If the result of this subtraction is negative (step 1306), then the upper four bits in register A are all equal to "0". "4" is subtracted from the number in register E by double-precision subtraction (step 1307). The contents of register A are shifted four bit positions to the left (steps 1308-1309) so that the bits formally in bit positions "B" to "8" are shifted into bit positions "F" to "C". Note that negative numbers are represented in two's complement form. In two's complement arithmetic, when the number "1000" is subtracted from any other number, the lowermost twelve bits in the other number are not altered by the subtraction operation. Hence, after the above shifting operation, the four bits in bit positions F to C are in their original form and need not be altered by the addition of "1000" or by any other restoring step. If the number in register A is negative after the four bit position shift (step 1310), an immediate return is made with the number "B" or "3" stored in register E. If the result is positive, then the FINDBIT routine continues.

At this point, the three bits in bit positions E to C remain to be checked. The FINDBIT routine now enters a loop. During each pass through the loop, "1" is subtracted from register E (step 1315), the contents of register A are shifted one bit position to the left by addition of A to itself (step 1316), and a test is made to see if the number in register A is negative (step 1317). When the test finally reveals that the number in register A is negative, program control is returned to the CHKBID subroutine with the proper bit position number stored in registrar E (step 1318).

XIV. FIND EMPTY BUFFER ROUTINE

When the DISCAN routine (FIG. 17/1060) encounters a request by a core-resident subtask to load a disk-resident subtask into a core buffer, the routine utilizes a find empty buffer routine (steps 2484-2498) to scan entries in the BIDTAB buffer table looking for an entry that is equal to zero and that therefor indicates the corresponding buffer is free to accept a subtask. The range of this search is limited to buffers whose index numbers fall within the upper and lower limits set by the CRPTAB group table entry for the group of sixteen subtasks into which the requested disk-resident subtask falls. The upper eight bit positions in each CRPTAB table entry designate an upper buffer index number limit, and the lower eight bits in each entry designate a lower buffer index number limit.

The find empty buffer routine (steps 2484-2498) places the upper buffer index number limit register C (steps 2487-2491) and places the lower limit into a location LOWPTR (steps 2484-2486). A check is then made to see if the BIDTAB table entry for the core buffer whose index number is in register C is equal to zero (steps 2492, 2493). If the entry is zero, program control returns to a location OPENBUFF within the DISCAN routine 1700 with register C containing the index number of the available buffer. If the table entry is not zero, then "1" is subtracted from the contents of register C (step 2494), and the search continues until either an available buffer is found (step 2493) or until the index number in C is lower in magnitude than the index number stored in the location LOWPTR (step 2494–2497). If no available buffers are found, program control is returned to a location SEARCH within the DISCAN routine.

XV. THE CALCULATE SUBTASK NUMBER ROUTINE

When the DISCAN routine to find a bidding subtask (FIGS. 17/1061 and 17/1062) is completed, if a subtask satisfying the proper criteria is found, it is necessary to calculate the subtask number of the subtask. The routine which calculates the subtask number is shown in FIG. 17/1063.

Upon entry to the routine, the bit number of the subtask (obtained by the FINDBIT routine-FIG. 17/1062) is stored in a location RBIT (step 2573), and the group index for the group into which the subtask falls is present in register C. The routine first transfers the group index into register E (step 2574) and stores "0" in register C (step 2575). Register C is now used as a task level number storage location.

Using register C as an index, the routine obtains the GRPTAB table entry for the task level stored in register C (step 2576). If the entry is less than zero (step 2577), no subtasks are assigned to this task level, so C is incremented (step 2589) and the next entry in the GRPTAB table is checked (step 2576). If the GRPTAB table entry is greater than zero but less than the group index number in E (steps 2578, 2579), the subtask does not fall within the task level whose task number is stored in register C. The number of subtasks assigned to the task level C is subtracted from the group index stored in register E (steps 2591–2595). Since the GRPTAB table contains one less than the number of subtasks assigned to each task level, this subtraction is carried out at follows: The GRPTAB entry of the task level C is subtracted from the group index number in E; and the group index number in E is additionally decremented by "1". The task level number in register C is then incremented (step 2589) and the next entry in the GRPTAB table is checked.

If the entry is greater than or equal to the number stored in register E (step 2579), then register C contains the desired subtask task number, register E contains the desired subtask group number, and the location RBIT contains the desired subtask bit number. The routine left-shifts the contents of register C twelve bit positions (steps 2580–2582) and left-shifts the contents of register E four bit positions (steps 2583–2584). The contents of registers C and E and the location RBIT are then added together in register A to produce the subtask number of the subtask which has been found (steps 2585, 2586). Program control then returns to the READDISK routine (FIG. 17/1065) with the subtask number stored in the location RSUBTSK (steps 2587, 2588).

XVI. SUBTASK READ AND WRITE SUBROUTINES

Special problems arise in the handling of disk-resident subtasks because of the time it takes to load a disk-resident subtask into a core buffer. The sublevel processor program therefore includes a special set of subroutines 10/2100 (FIG. 10A) which make possible the following operations:

1. Suspend a first subtask while a second subtask is transferred from a disk sector to a core buffer (READ subroutine).
2. Suspend a first subtask while a second subtask is tranferred from a core buffer to a disk sector (WRITE subroutine).
3. Suspend a first subtask while a second subtask is transferred from a disk sector to a core buffer; and then execute the second subtask as a subroutine of the first subtask (READT subroutine);
4. Reserve the core buffer within which a first subtask resides for a second subtask; transfer the second subtask into the reserve buffer; and bid for execution of the second subtask (RSRBID subroutine).

All four of these subroutines are combined in a single READ subroutine having an entry point READENT (FIG. 17/1070A). The subroutines READT, RSRBID, and WRITE have separate entry points which are shown in FIGS. 17/1071, 17/1072, and 17/1073. In the case of these three subroutines, an appropriate flag (READFLAG, RSRFLAG, or WRITFLAG) is set, and program control is transferred directly to READENT (step 2205 in FIG. 17/1070A). In the case of a READ subroutine call, either the READ or the READENT entry points may be used and no flag is set.

The READ subroutine is executed by a first subtask that wishes to suspend execution until a second subtask is loaded into a core buffer. The subtask number of the second subtask is supplied as an argument. The READ subroutine first suspends the first subtask by linking the pool of the first subtask into the system suspended subtask linkage. The subtask numbers of the first and second subtasks are then loaded respectively into the BIDTAB and into the REDTAB table entries for the core buffer within which the first subtask resides. The DISCAN program task level is then bid. When the DISCAN program has loaded the second subtask into a core buffer, the DISCAN program sets the BIDTAB and the REDTAB table entries respectively equal to −1 and zero and bids for unsuspension of the first subtask.

The WRITE subroutine is executed in the same manner as the READ subroutine except that a "write" bit (bit position B) of the entry in the REDTAB table is set equal to "1" so that the second subtask is transferred from core to disk rather than from disk to core. As in the case of the READ subroutine, afer the transfer has been completed the calling subtask is unsuspended.

The READT subroutine is actually an imitation subroutine cell. A first subtask is suspended temporarily while a second subtask is executed as though it were a subroutine of the first subtask. As with the READ subroutine, the first subtask is initially suspended while the DISCAN program loads the second subtask into a core buffer. The buffer index number of the second subtask is then stored within bit positions "D" to "6" in entry D of the first subtask register storage pool. This buffer index number serves as a flag which differentiates a READT suspension from a normal READ suspension. The DIS- CAN program handles a READT request in the same way as it handles a READ request and bids for unsuspension of the first subtask after the second subtask is loaded into its core buffer. When the basic task program (FIG. 17/1030) finally receives from the CHKBID subroutine a request to restart the first subtask, the basic task program notes the presence of the buffer index number in entry D of the pool for the first subtask (see steps 1151–1153 in FIG 17/1030). Rather than restarting the first subtask, the basic task program loads register B with the address of the first subtask pool (FIG. 17/1050, step 1424; FIG. 17/1030, steps 1150 and 1161), stores the starting address RELBUF−1 of the basic subtask exit program 17/1040 in entry G of the pool (steps 1154, 1155), and transfers program control to the starting address of the buffer within which the second task resides (steps 1156–1162). The basic task program obtains the starting address of the buffer from the CORTAB table entry (starting address of table=CORLOC) using the index number from entry D in the subtask pool as a table index (steps 1151, 1156, 1157, 1158, 1159). The second subtask then runs to completion. The second subtask terminates in the conventional manner by executing the command:

```
JMP  *4,B
```

Because the starting address of the basic subtask exit program is stored in the fourth location within the first subtask pool, this command automatically transfers program control to the basic subtask exit program (FIG. 17/1040). The exit program detects the buffer index number in the pool of the calling program (steps 1036–1038) and releases the core buffer having this index number (steps 1039–1044). The exit program then attempts to return program control to the basic task program through software lockout (step 1074); however, since register B points to the pool of the first subtask and not to the pool of the basic task program, program control returns directly to the first subtask. In this manner, the READT subroutine is able to execute one subtask as a subroutine of another subtask.

The RSTBID subroutine is executed by a first subtask which wishes to have a second subtask loaded into the same core buffer as itself. The RSRBID subroutine is normally used when data is left in the lower portions of a buffer by the first subtask for further processing by the second subtask. It is important that no other subtasks gain acccess to the buffer before the second subtask has processed the data, since the data might be destroyed by the presence of another subtask within the buffer. A RSRBID subroutine call is handled quite differently from the other read and write subroutine calls. The first subtask is not suspended because the first subtask has run its course and is finished. The subtask number of the second subtask is stored in a location SUBTSK and is eventually loaded into both the BIDTAB and the REDTAB table entries for the buffer in which the first subtask resides. The DISCAN program later is able to recognize a RSRBID request by the fact that the BIDTAB and the REDTAB table entries are identical. The DISCAN program sets the first subtask core-resident bit in the RSDTAB table to zero (see FIG. 17/1067), loads the second subtask into the core buffer occupied by the first subtask, and bids for execution of the second subtask.

All four subroutines are shown in FIGS. 17/1070A and 17/1070B. As has been mentioned, all four of the subroutines share a common entry point. The subroutine calls are differentiated from one another by the presence or the absence of subroutine flags as follows:

| Flag | Subroutine |
|---|---|
| (None) | READ (Figure 17/1070A) |
| Location READFLAG contains "−1" | READT (Figure 17/1071) |
| Location RSRFLAG contains "−1" | RSRBID (Figure 17/1072) |
| Location WRITFLAG contains "−1" | WRITE (Figure 17/1073) |

If the location RSRFLAG does not contain "−1" (steps 2209, 2210), the pool of the first (calling) subtask is linked into the suspended subtask linkage (steps 2211–2215) in a manner which is described below in connection with subtask suspension.

In every case, the sublevel number of the first (calling) subtask (which is also the currently running subtask) is next obtained from the CSRTAB table entry for the currently running task level (steps 2217–2219). The subtask number of this first subtask is calculated. This subtask number is stored in the subtask pool, entry E (steps 2220–2228) using the subroutine SUBUNPAC (FIG. 17/1000) and is also stored in a location SUBTASK.

The next steps performed depend upon whether or not the location RSRFLAG contains "−1" (steps 2231–2232). If the location does contain "−1", the subtask number of the second (the called) subtask (whose subtask number is an argument SUBARG) is placed in the location subtask (steps 2314–2315). If the location RSRFLAG does not contain "−1" (step 2232), then in place of the above steps, the time delay bit for the currently running subtasks is set in the TIMTAB table (steps 2234–2244) and the bid bit of the currently running subtask in the ACTTAB table is set equal to zero (steps 2246–2251). In any event, zero is placed in the location RSRFLAG (steps 2231, 2233).

The index number of the core buffer within which the first subtask resides is now obtained from the LGHTAB table entry for the first subtask (steps 2254–2262). With this buffer index number being used as an index to the buffer tables, the contents of the location SUBTASK are loaded into the BIDTAB table entry for the buffer (steps 2264–2265), and the subtask number of the second (the called) subtask is loaded into the REDTAB table entry for the buffer (steps 2267, 2271). If the WRITFLAG is set, the "write" bit (bit positon B) of the entry placed in the REDTAB table is set equal to "1" (step 2318). In any event, zero is placed in the location WRITFLAG (step 2270).

If the location READFLAG contains "−1" (steps 2273, 2274), the subtask number of the second subtask is unpacked using the subroutine SUBUNPAC (step 2296). The group number of the second subtask and the TSKTAB table entry corresponding to the task level of the second subtask are added together to produce the group table index for the second subtask (steps 2297–2300). This group index is then used to retrieve a buffer index number from bit positions "7" to −0" of the CRPTAB table entry for the group within which the second subtask resides (steps 2301–2302). The contents of bit positions "7" to "0" of this entry are left-shifted 6 bit positions (steps 2304–2305) and are stored in a location XNSAVE (step 2306). XNSAVE now contains in bit positions "D" to "6" the index number of the buffer into which the second subtask is ultimately to be loaded.

The next step for all four subroutines is to clear bit positions "D" to "6" within entry D of the first subtask pool. Entry D is retrieved and is stored in register A (steps 2275, 2276). Bit positions "D" to "6" of register A are then set equal to zero (step 2277). If the location READFLAG is set (steps 2278, 2279), a bit-by-bit EXOR (exclusive or) operation is performed to combine the contents of register A with the contents of XNSAVE (step 2309). The contents of register A are then returned to entry D of the first subtask pool (step 2280). Zero is stored in the location READFLAG (step 2281) and the task level of the DISCAN program is bid (steps 2283–2286). Program control then is transferred to the starting address of the currently running task level, usually to SPEXIT +1 - the entry to the basic task program which appears in FIG. 17/1030 (steps 2288–2292).

xvii. SUBTASK TIME DELAY AND SUSPENSION

The sublevel processor program includes a number of subroutines which allow the execution of a subtask to be suspended indefinitely or which allow a subtask to be placed into time delay for any desired period of time. When a subtask is suspended, a subtask register pool (or an equivalent control chain pool) is chain-linked to the pools of all other subtasks which are also suspended. The address of the first pool in the suspended subtask linkage is stored in a location SUSPLINK. When a subtask is placed in time delay, the pool of the subtask is chain-linked to the pools of all other subtasks which are in time delay. The address of the first pool in the time delay linkage is stored in a location TDLINK (see FIG. 9G). When a subtask is in time delay or is suspended, the subtask time delay bit in the TIMTAB table is normally set.

The addresses in the locations TDLINK and SUSPLINK point to entry G of the first subtask pool in each linkage, rather than to the start of the pool (see FIG. 9G). Entry G of the first pool contains the address of entry G in the second pool, and entry G in the second pool contains the address of entry G in the third pool, and so on. The last pool in the linkage contains zero in entry G. If no pools are included in a linkage, zero is placed in the location TDLINK or SUSPLINK.

It is necessary to keep track of what subtask each pool belongs to. This is done by storing the subtask number of each subtask in entry E of the subtask's own pool (see FIG. 9G). A suspended or time delayed subtask may then be found by searching through the chain linkages looking for the subtask number of the subtask in entry E of each pool in the linkage. This is the procedure used by the CHKBID subroutine in steps 1386 to 1398 (FIG. 177/1051).

In the case of the time delay linkage, a counter must be provided for subtask that is in time delay. The counter is entry A of the subtask pool. Periodically, a COUNTDWN (time delay count-down) program (FIG. 17/1082) decrements the counter within each pool in the time delay linkage and removes the subtasks from the time delay linkage when their counters reach a negative count.

Within the sublevel processor program, a time delay and suspend routine TIMDLY (FIG. 17/1080) may be called upon by a running subtask to place the running subtask into either the time delay or the suspend linkage. A subtask is normlly removed from time delay automatically by the COUNTDOWN program (FIG. 17/1082), but a subtask may be removed from time delay and execution of the subtask may be terminated by a remove subtask from time delay subroutine TIMERMV (FIG. 17/1801). A subtask may be removed from either linkage and restarted by an UNSUSP subroutine (FIG. 17/1021) that is actually an alternative entry to the SUBBID subroutine (FIG. 17/1020) with a SUSPFLAG location containing minus one.

xviii. THE TIME DELAY AND SUSPEND SUBROUTINE

A subtask may be placed into either the time delayed or the suspended subtask linkage by the TIMDLY subroutine (FIG. 17/1080). This subroutine is called by the subtask which is to be suspended or which is to be placed into time delay. The subroutine requires as an argument the time delay count. If the time delay count is negative, the call is assumed to be a request for suspension of the subtask.

The TIMDLY subroutine obtains the sublevel number of the currently running subtask from the CSRTAB table entry for the currently running task level (steps 1662–1664). The subtask number for this subtask is then created and is stored in entry E of the subtask pool (steps 1665–1670). The argument (the time delay count or a negative number) is stored in entry A of the subtask pool (steps 1657–1661). If the argument is negative (steps 1673, 1674), the contents of the location SUSPLINK are stored in entry G of the subtask pool (steps 1713, 1714), and the address of entry G in the pool is stored in the location SUSPLINK (steps 1715–1717). The pool is thus chain-linked into the suspended subtask linkage. If the argument is positive (step 1674), the contents of the location TDLINK are stored in entry G of the sublevel pool (step 1675–1676), and the address of entry G in the pool is stored in the location TDLINK (steps 1677–1679). The pool is thus chain-linked into the time delayed subtask linkage. The subtask bid bit in the ACTTAB table is then set to zero (steps 1682–1696), and the subtask time delay bit in the TIMTAB table is set to "1" (steps 1697–1700). Program control then returns to the currently running task level entry point, usually SPEXIT +1 - the entry to the basic task program (steps 1703–1708).

xix. THE TIME DELAY COUNT-DOWN PROGRAM

The count-down program COUNTDWN (FIG. 17/1082) decrements the counters within the pools of all subtasks chain-linked into the time delay linkage and removes from the time delayed linkage all subtasks whose counters become negative. The program is called periodically by a system program that operates in synchronism with a real time clock. In the present system, the COUNTDWN routine is called by the auxiliary synchronizer (FIG. 17/900C).

Each time the COUNTDWN program is called, the program first loads the address of the location TDLINK into register E (step 1968) and the contents of the location TDLINK into register C (step 1969). Register C points to pool entry G of the first subtask in the time delay linkage. A loop is now entered. During each pass through the loop, "1" is subtracted from the contents of the time delay counter stored in entry A of the pool to which register C points (step 1971). The contents of register C are then transferred to register E (step 1973), and register C is loaded with the contents of the location to which register C points (step 1974). Since register C points to engry G of a subtask pool, and since entry G of each subtask pool contains the address of pool entry G for the next subtask pool in the linkage, register C now points to the next subtask pool in the linkage. During each pass through the loop, a test is made to see if the contents of register C are equal to zero (step 1970). If so, then there are no more subtask pools in the linkage. A return is immediately executed to the calling program.

If the time delay counter for a given subtask becomes negative (step 1972), the time delay has expired. The subtask pool is removed from the time delay linkage (steps 1976–1978) and is added to the beginning of the suspend linkage (steps 1979–1982). The subtask number of the subtask is retrieved from the subtask pool entry E (steps 1992–1993) and is unpacked by a routine similar to the SUBUNPAC subroutine shown in FIG. 17/1000 (steps 1994–2005). The "bid" bit of the subtask in the ACCTAB table is set (steps 2006–2021), and the task level of the subtask is bid (steps 2025–2027). The basic task program (FIG. 17/1030) and the CHKBID subroutine (FIG. 17/1050) then remove the pool from the suspended subtask linkage and return program control to the subtask as has been explained.

A pool is removed from the time delay linkage in the following manner. The contents of the location whose address is in register C are stored in the location whose address is in register E (steps 1976 and 1978). This step links together the pools immediately preceding and immediately following the pool which is to be removed from the linkage and leaves register C pointing to entry G of the pool which has been removed from the linkage. The pool is then placed into the suspended subtask linkage in the following manner. The contents of the location SUSPLINK are stored in the location whose address is in register C (steps 1979–1980); and the contents of register C are stored in the location SUSPLINK (steps 1981–1982). The location SUSPLINK now points to entry G of the pool, and entry G of the pool now points to the next pool within the suspended subtask linkage.

xx. REMOVING A SUBTASK FROM TIME DELAY OR SUSPENSION

Requests for execution of a subtask normally are placed by a call to the SUBBID subroutne (FIG. 17/1020). The SUBBID subroutine includes steps 1216–1222 which prevent subtasks that are suspended or in time delay from being accidentally restarted at the wrong time.

A subtask is removed from time delay or suspension by an UNSUSP subroutine, shown in FIG. 17/1021. The UNSUSP subroutine is an alternate entry to the SUBBID subroutine (FIG. 17/1020). The UNSUSP subroutine places "−1" in a location SUSPLFAG (steps 2057–2058). The steps 1221 and 1222 in the SUBBID subroutine (FIG. 17/1020) detect the "−1" in this location and allow a bid to be placed for execution of the specified subtask even though the subtask is suspended or is in time delay. The SUBBID subroutine sets the "bid" for the specified subtask in the ACTTAB table (steps 1224–1230) and bids for execution of the task level to which the subtask is assigned (steps 1232–1236). In due course, the executive scheduler 10/202 (FIG. 10A) commences execution of the specified task level and transfers program control to the basic task program (FIG. 17/1030). In the manner already described above, the basic task program calls upon the CHKBID subroutine (FIG. 17/1050) to find the subtask within the task level that is bidding for execution.

The CHKBID subroutine includes steps 1368–1372 which check to see if the time delay bit for the subtask is set. If the time delay bit is set (step 1372), then the requested subtask is in time delay or is suspended, and the pool of the subtask is linked into either the time delayed or the suspended subtask linkage. With reference to FIG. 17/1051, the CHKBID subroutine sets the time delay bit of the subtask to zero (steps 1374–1375) and then executes a routine which hunts for the pool of the subtask in the time delay and in the suspended subtask linkages (steps 1377–1398). The pool of the subtask is removed from the linkage within which it lies (steps 1400–1401), and the pool address is stored in a location ADRSAVE (steps 1406–1408). Three is subtracted from the pool address (step 1407) because the pool addresses used in the time delay and suspended sublevel linkages are the addresses of the third entry in each pool and not of the first entry. The basic task program then restarts the subtask by loading the system registers from data stored in the subtask pool (step 1163 in FIG. 17/1030) in the manner explained above.

The routine which removes a subtask pool from the time delay or suspended subtask linkages comprises steps 1377–1401 in FIG. 17/1051. The subtask number of the subtask is first computed and stored in register E (steps 1377–1381). The address of the location SUSPLINK is then loaded into register G, and the contents of the location SUSPLINK are loaded into register C (steps 1386–1387). A loop is then entered. Each time through the loop, a check is made to see if the pool to which register C points contains in pool entry E the computed subtask number that is stored in register E (steps 1388–1389 -- the address of pool entry E is one greater than the address in register C). If the comparison is successful, the pool to which register C points is removed from the linkage (steps 1400–1401), and program control returns to step 1414 of the CHKBID subroutine (FIG. 17/1050). If the subtask numbers do not agree, then the contents of register C are loaded into register G (step 1391) and register C is loaded with the contents of the location whose address is in register C(step 1392). In this manner, a different pool within the suspended subtask linkage is checked each time through the loop. If the contents of register C are ever found to be equal to zero (step 1393), all of the pools within the suspended subtask linkage have been checked and the subtask pool has not been found. A search for the subtask pool is now carried out in the time delay linkage. Register G is loaded with the address of the location TDLINK (step 1396), register C is loaded with the contents of the location TDLINK (step 1397), and the exact same loop is entered again (step 1398).

When a pool containing the proper subtask number is found, the pool is removed from the linkage in the following manner - the contents of the location whose address is in register C are transferred to the location whose address is in register G (steps 1400–1401).

It is often desirable to remove a subtask from time delay and to cancel execution of the subtask. For example, a simple way of checking to see that an event happens within a given time interval is to place some form of alarm subtask into time delay for the specified time interval and to cancel out execution of the alarm subtask if the event occurs before the time delay expires. A TIMERMV subroutine (FIG. 17/1081) is provided to perform this function. The TIMERMV subroutine accepts a subtask number as an argument. If the subtask number is valid (steps 1736–1743) and if the specified subtask is actually in time delay (steps 1745–1753), the TIMERMV subroutine searches the time delay linkage for a pool containing the specified subtask number (steps 1755–1765). The searching routine is similar to that just described which appears in the CHKBID subroutine. If such a pool is found, the pool is removed from the time delay linkage (steps 1766–1767) and the subtask time delay bit in the TIMTAB table is set equal to zero (steps 1769–1774). No bid is placed for execution of the subtask. The next time that the subtask is bid, execution of the subtask begins at the start of the subtask, rather than at the point within the subtask at which the time delay was requested.

xxi. SUBTASK NUMBER EXPANSION ROUTINE

The component parts of a typical subtask number are shown at the bottom of FIG. 10I. A subtask number includes a four bit "task" number, a "write" bit, a seven bit "group" number, and a four bit "bit" number stored right-to-left in a single sixteen bit storage location. Since a large number of the sublevel processor routines and subroutines must have access to the various parts of the subtask number, a special SUBUNPAC subroutines (FIG. 17/1000) is provided for breaking up subtask numbers into their component parts.

The SUBUNPAC subroutine (FIG. 17/1000) expects as an argument a subtask number stored in register A. The contents of register A are first stored in a location SUBTASK (step 1509). The contents of bit positions "F" to "C" of register A are shifted right twelve bit positions and are stored in a location TASK (steps 1510–1513). The contents of bit positions "A" to "0" (zero) of register A are stored in a location SUB (steps 1515–1517). The contents of bit positions "A" to "4" are shifted right four bit positions and are stored in a location GROUP (steps 1519–1522). The contents of bit positions "3" to "0" of register A are stored in a location BIT (steps 1524–1526). Program control is then returned to the calling program.

xxii. BUFFER RELEASE SUBROUTINE

If a disk-resident subtask is assigned to data, the core buffer into which the data is placed is released after the data has served its purpose. A buffer release subroutine RELSBUF (FIG. 17/1090) is provided to release the buffer occupied by any such subtask. The RELSBUF subroutine expects a subtask number as an argument. After the subtask number is unpacked and checked for validity (steps 2372–2385), the RELSBUF subroutine obtains from the LIGHTAB table the index number of the buffer in which the subtask is stored (steps 2386–2393). A check is then made to see if the specified subtask is actually present within the indicated core buffer (steps 2395–2397). If the subtask number stored in the INCTAB table entry for the core buffer is not equal to the argument (step 2397), then the subtask is not present within the buffer and program control returns to the calling program without any further action (steps 2399–2401). If the subtask number and the argument agree (step 2397), zero is placed in the REDTAB and BIDTAB table entries for the core buffer (steps 2402–2405); the subtask "core-resident" bit in the RSDTAB bit table is set to zero (steps 2406–2414); and the DISCAN program task levels is bid (steps 2415–2418). Program control then returns to the calling program (steps 2419 and 2399–2401).

G. LOGIC INITIATOR PROGRAM

FIGS. 17/101A through 17/1170 contain illustrative program listings for the logic initiator program and for the digital scan program which is a part of the logic initiator program. These programs are generally described in FIGS. 1A through 11H. Accordingly,the discussion which follows is limited to those details of the program listings which are not apparent in FIGS. 11A through 11H and in the discussion which accompanies those figures.

I. DIGITAL SCAN PROGRAM

The common entry point for all digital scan subtasks is the first step shown in FIG. 17/1101A. Upon entry into such a subtask, the arithmetic accumulator register A contains the sublevel or the subtask number of the digital scan subtask which is operating. The programming steps shown in FIG. 17/1101A isolate the sublevel number (the least significant 11 bits in the accumulator) from the subtask number in register A and use this sublevel number as an index to the tables RGSTRT and NUMREG shown in FIG. 11C. The "group number" entry in the table RGSTRT for the subtask is stored in a location START, and the "number of groups" entry in the table NUMREG for the subtask is stored in a location NUM. Hence, the location START contains the hardware image table group number of the first group of input bits which is to be checked, and the location NUM contains the number of such groups which are to be checked.

The entry in the table INVERT for the first group of bits which is to be checked is retrieved. This entry input bits in the bit storage register LIUSER shown in FIG. 11C (cont.).

The relative address ACTEST (see FIG. 11C (cont.)) is subtracted from this register number. If the result is negative, then this group of bits is assigned to the active portion of the bit storage register, and program control contnues in FIG. 17/1101C. Otherwise, this group of bits is assigned to the passive portion of the bit storage register, and program control continues in FIG. 17/1101B. Ultimately, after the bits for this group have been processed and after any alarm message printouts which are required have been initiated and any subtask bids which are required have been placed, program control returns to NEXTWD in FIG. 17/1101A. The count is in the location NUM is decremented, the relative address in the location START is incremented, and program control commences at the location ENTER where the next group of bits are checked. When the number stored in the location NUM finally becomes zero, the digital scan program terminates by a return to the calling program, usually the sublevel processor program.

The digital scan program and other logic initiator routines often have to access data stored within the logic initiator tables. These tables are shown in FIG. 11C and 11C (cont.). Below the name of each table in parenthesis is the name by which that table is referred to in the program listing. For example, in FIG. 11C there appears a table LIMGTB which has a starting address which is stored in the location "11,B" within the program listing. By way of explanation, the starting address of each of these tables is stored in an array which begins at a location TBLORG and which is shown in FIG.

17/1102. Hence, whenever the register B is loaded with the address TBLORG, the starting address of any of these tables is "*1,B", "*2,B", and so on. To determine which table is being referred to by the listing, one simply refers to FIG. 17/1102. For example, if a program listing refers to the location "*8,B", this is a reference to the eighth entry in FIG. 17/1102 -- "LIUSER". Hence, the starting address of the table LIUSER is stored in the location "*8,B".

The scanning of passive contact closure inputs is handled by the subroutine shown in FIG. 17/1101B. Register A is loaded with the past image of the group of bits that is retrieved from the table LIUSER (8,B). This past image is exclusively ORed together with the new image for these bits that is stored in the extended accumulator E. If the result is non-zero, then at least one or more of the bits have changed their state since the last digital scan. The updated image of the bits is then transferred from the extended accumulator E to the table LIUSER. Program control is then returned to the location NEXTWD within the program shown in FIG.17/1101A.

In the case of active logical variables, program control commences at SCN01 in FIG. 17/1101C. The current image of the bits is altered so that those bits which have been removed from scanning retain their past status, and the resultant bit image is stored in a location TEMP. This bit image is then compared with the past bit image in the bit storage register LIUSER by an exclusive OR operation, and the result is stored in a location CHNG. A check is then made to see if any of the bits are in an alarm state, and if the corresponding alarm state bits in the table LIALRM are not set - this indicating that the bit was previously in an alarm state but that an alarm message has not been printed out. When such bits are encountered which have not been limit check removed, program control is transferred to FIG. 17/1101D where such missed alarms are processed. If there are no missed alarms, program control commences at SCNO3 in FIG. 17/1101E.

The subroutine which processes missed alarms is shown in FIG. 17/11O1D. However, since this subroutine substantially duplicates portions of the subroutines shown in FIG. 17/11O1E and in the figures which follow, a detailed description of this subroutine is omitted.

The subroutines shown in FIG. 17/11O1E checks each bit within the group just procesed to see if that bit has changed its state and, if so, to see if any task should be performed. Register A is loaded with the contents of the location CHNG. It will be remembered that this location contains a bit in each bit position corresponding to a bit which has changed its status since the last digital scan. If this word contains all zeroes, then none of the bits have changed their status, and program control is returned to NEXTWD in FIG. 17/11O1A. Otherwise, program control continues in FIG. 17/11O1E.

Assuming that program control continues in FIG. 17/11O1E, it is now necessary to check each individual bit within the group for which the corresponding bit in the location CHNG is equal to "1". The system designator register is set to cause automatic post-indexing with respect to register C, and hence any address computation automatically adds the contents of register C to the computed address. Index register C contains the register number of the group of bits within the bit storage register LIUSER and within the other tables shown in FIG. 11C(cont.). This address is stored in a location SAVC. The updated bit image is retrieved from the location TEMP and is stored in "*8,B" +C as the updated bit image within the bit storage register LIUSER. The register number of this group is now multiplied by 16 (by a four position left shift) and is stored in a location REGN as a base address to entries in the logical word table LCWORD shown in FIG. 11E. This relative address is then added to the difference between the starting address of the logical word table LCWORD and the starting address of the bit mask table BITTBL (see FIG. 11E) and is stored as a base address in a location BASTEMP. Index regiser C is then loaded with the address of the last entry in the bit mask table (FIG. 11E). By way of explanation, a bit mask table address in register C may now be added to the contents of BASTEMP to give the address within the logical word table LCWORD (FIG.11E) of the entry in that table which corresponds to a particular bit position within a register in the bit storage register.

Program control now commences at NEXTBT. The address stored in register C is decremented. Register E is loaded with the contents of CHNG, the location containing bits in positions corresponding to bits which have changed their state since the last scan interval. If register E contains zero, none of the bits have changed their status and program control is returned to NEXTWED in FIG. 17/11O1A. Otherwise, at least one of the bits within this register has changed its status since the last digital scan and requires further processing.

Beginning with the third step preceding INR69, a program is entered which scans the contents of CHNG to determine the most significant bit position containing a "1" data bits. Without going into the details of this routine (see the description of the FINDBIT subroutine which is presented in subsection F of section 17 for a detailed description of a similar routine), the contents of register E are shifted and the address within register C is decremented until a "1" bit is shifted into the sign bit position for register E and is detected by the second step past INR68. The remaining steps in this routine check groups of multiple bits for the presence of any "1" data bits and thus speed up this searching procedure. When a "1" data bit is detected, program control commences at SCNO4. The address in index register C is now the address of a location within the bit mask table (FIG. 11E) which contains a "1" bit in the bit position of a bit which has changed its status. The entry in the logical word table for the same bit is found by adding to the address in register C the contents of the location BASTEMPT, as has already been explained.

At SCNO4, the contents of register E are stored in the location CHNG, and the address in register A is stored in the location MASKADR. The logical word table index is computed by subtracting the bit mask table starting address BITTBL from the bit table entry address in register C to give a bit table index, and by adding the contents of the location REGN to this index. REGN contains the address of the first location within the logical word table containing an entry for this particular register of bits. Hence, by adding the address of this first location to the bit number of the desired bit, one obtains an index to the entry in the logical word table which corresponds to this bit position. This logical word table index is stored in the location WRDBIT.

Index register A is now loaded with the new status of the register of bits from the location TEMP. All bit positions within register A other than that which is now being checked are set to zero by ANDing the contents of register A with the bit mask table entry whose address is stored in register C. The resultant word contains either a "1" or a "0" in the bit position corresponding to the bit which is being checked. This word is stored in a location IMAG.

The sign of the logical word table entry is now set to indicae the current status of the logical bit. The logical word table entry is transferred into register A, and the sign bit is set initially to zero. The contents of the location IMAG are then checked. If the location contains anything other than zero, the sign bit (bit position 15) in the logical word table entry is set equal to "1". The logical word table entry is then returned to its normal storage place. The address of the logical word table entry is "* BASTMP TBLORG,B". Since index register B contains the data value TBLORG, and since post-indexing on base register C is still in effect, this address is effectively BASTMP plus the bit mask table address which is in register C. As has been explained, this is the address of the logical word table entry which is desired.

The contents of bit positions 14 to O of the logical word table entry are now checked. If these bit positions contain all zero bits, program control is transferred to SCNO6 and from thence back to NEXTBT where the next bit within the group is checked, since there is nothing further which needs to be done. If the contents of bit positions 14 to O are not equal to zero, then the contents of these bit positions are stored in a location VALU. Index register A is loaded with the bit mask table entry for this bit, and that mask is stored in a location MSKK. The relative address of this group of logical bits within the bit storage register is then retrieved from the location SAVC and is placed in index register C. A return address is then stored in a location RTRN, and a subroutine call is executed to the alarm and trigger check subroutine which appears in FIG. 17/11O3A. That subroutine then determines if any alarm message is to be printed out or if any subtasks are to be triggered and returns program control to the step preceding SCNO6. The bit table address is then restored in index register C, and program control jumps back to the location NEXTBT where the next bit position within this word group of bits is checked. Program control continues in this manner until all bit positions in which the bits have been changed have been checked out and processed completely. Then program control returns to NEXTWD in FIG. 17/11O1A.

ii. ALARM AND TRIGGER CHECK SUBROUTINE

The alarm and trigger check subroutine appears in FIGS. 17/11O3A, 17/11O3B, and 17/11O3C. This subroutine is called upon both by the digital scan program and by the alter bit subroutines to check for subtask triggers and for alarm message printouts.

The entry to the subroutine from the digital scan program is at SCNO7 in FIG. 17/11O3A. The entry to this program from the alter bit subroutines is at COMMON in FIG. 17/11O3A. The only difference between these entries is that, when called upon by an alter bit subroutine, the alarm and trigger check subroutine calculates and stores appropriate data values in the locations TEMP, VALU, MSKK, and IMAG. The data values which are stored in these locations have already been listed in the above discussion, and that discussion will not be repeated here.

Beginning at SCNO7, is loaded into the system designator register to initiate address post-indexing using index register C. The accumulator register A is loaded with the contents of bit positions 14 to O of the logical word table entry for the bit which has changed its status. The logical word table entry is retrieved from the location VALU. The alarm bit (bit position 14) of the logical word table entry is isolated and is placed in register G so that register G contains a "1" data bit only if an alarm message is to be printed out.

A check is now made to see if the logical variable corresponding to this logical word table entry has been limit-check removed so that alarm messages are not to be printed out. The entry in the limit check removed table LILMTR (FIG. 11C (cont.)) is obtained and is ANDed together with the masking bit image which is retrieved from the location MSKK. If the result is zero, then this logical bit has not beem limit check removed, and program control commences at SCNO8. A non-zero result means that this bit has been limit check removed and that no alarm message is to be printed out. Assuming that the bit has been limit check removed, the contents of register G are now checked. Register G contains the alarm bit from the logical word table entry for this logical bit. If the alarm bit is zero, then a direct program jump is made to SCN10 in FIG. 17/11O3B where a check is made to determine if there are any subtask triggers which need to be processed. If the alarm bit is not zero, then program control commences with a routine SCN11 that appears in FIG. 17/11O3C.

Beginning at SCNO8, the contents of register G are checked to see if an alarm message is to be printed out. If not, then program control is transferred to SCN20 in FIG. 17/11O3B, and the alarm message printout steps are bypassed. Otherwise, the logical word table entry for the bit being checked is retrieved from the location VALUE and is placed in register A. Program control then commences at the top of FIG. 17/11O3B. Bit positions 11 to O of the logicl word table entry are isolated and are added to the starting address of the table FILTBL (FIG. 11E) which starting address is stored in a location TRNBUF. The resultant table address is stored in a location TNFR. The contents of this location (a directory pointer to a file containing an alarm message) are retrieved and are stored in a location NAME1 which is the location immediately following a location NAME in core storage. The contents of the loction IMAG are then checked to determine whether the corresponding logical variable is set or reset, and an appropriate flag is stored in a location VALUE. The alarm limit status of the variable is now retrieved from the normal status bits table LIALMT (FIG. 11C (cont.)) and is ANDed together with the bit mask entry from the location MSKK. Depending on the status of the bit for this logical variable, an appropriate flag is placed in a location STATUS. The designator registers are cleared to the end post-indexing on register C, and a zero is placed in a location FLGWRD. The message writer entry subroutine (14004 in FIG. 14) is then called upon to print out an alarm message. The message writer entry subroutine receives as arguments the data which has been stored as described above. The argument NAME is a two element array, the first element of which contains zero and the second element of which contains the entry which was retrieved from the trigger and alarm table FILTBL and which is a directory pointer to the directory entry for a file containing the alarm message which is to be printed out. The message writer entry subroutine calls upon the file system subroutine RDFIL (FIG. 17/601) to retrieve the file containing the alarm message. The message writer entry subroutine and the message writer program then transfer this message to an appropriate alarm message printing device. If the message writer entry subroutine successfully accepts the message, a zero is returned as the return argument FLGWRD. Otherwise, a "1" is returned as the return argument FLGWRD.

Upon return from the message writer entry subroutine, the designator register is once again set for post-indexing using register C. The argument FLGWRD is checked. If the argument is non-zero, this means that the alarm mesage was not accepted by the message writer. Program control then jumps forward to SCNO9, and the change in the state of the variable is not acknowledged by alteration of the alarm state bit for this logical variable. If the argument FLGWRD is zero, then program control commences at SCN20 where the alarm is acknowedged. That acknowledgment of an alarm comprises, in essence, updating the entry in the alarm state bit table LIALRM (FIG. 11C (cont.)) to reflect the fact that the variable is in an alarm state or has returned to its normal state.

If an alarm message has not been successfully printed out, program control commences at SCNO9. The address in the location TNFR, the pointer to an entry in the trigger and alarm table FILTBL (FIG. 11E), is incremented so that the location TNFR contains the address of a first entry in that table containing a subtask number which is to be bid, if any bids exist for the logical variable which is being processed. Program control then commences at SCN12 in FIG. 17/11O3C.

If an alarm message has been successfully printed out, or if there was no alarm message to be printed out in the first place, program control continues at SCN1O in FIG. 17/11O3B. A check is made of the trigger bits table TRGTBL to see if any subtask triggers are linked to this logical variable. If not, then program control returns immediately to the calling program. Otherwise, program control continues with the fourth step past SCN1O. The subtask trigger bit (bit position 13) of the logical word table entry is obtained and is examined. If this bit is zero, program control is transferred to SCN11. By way of explanation, the logical word table entry is in accordance with the second example shown in FIG. 11G, and it contains the relative address of the first number in a list of subtask numbers within the trigger and alarm table. This relative address occupies the least significant bit positions of the logical word table entry. The routine beginning at SCN11 (FIG. 17/11O3C) obtains the list of subtask numbers from the indicated locations within the alarm and trigger table and places bids for execution of the subtask numbers listed. Returning to the 6th step past SCN1O in FIG. 17/11O3B, if the trigger bit is not zero, then the logical word entry is in accordance with the first examle in FIG. 11G and contains a task number and a sublevel number in its less significant bit positions. This task number and sublevel number are assembled into a subtask number, and a bid for execution of the corresponding subtask is then placed with the subroutine SUBBID. Program control then returns immediately to the calling program.

If program control commences at SCN11 in FIG. 17/11O3C, subtask numbers may have to be retrieved from the trigger and alarm table FILTBL shown in FIG. 11E. The least significant bits in the logical word table entry are retrieved and are added to the starting address FILTBL of the trigger and alarm table. This table starting address is retrieved from the locations TRNBUF. The resultant address of an entry in the alarm and trigger table is stored in a location TNFR. A check of trigger G is then made to see if the logical associated with it. If it does, the address stored in the location TNFR is incremented so as to bypass the directory pointer that is stored in the trigger and alarm table preceding any subtask numbers, and program control commences at SCN12. If no alarm message is associated with the logical bit, then program control commences immediately at SCN13 with the placement of subtask bids, since at least one such bid is to be placed in this case.

At SCN12, a check of the trigger bits table TRGTBL (FIG. 11C(cont.)) is carried out to see if there are any subtasks to be bid. If not, program control is returned to the calling program. If subtasks are to be bid, the trigger bit is retrieved from the logical word entry. If this trigger bit is zero, then again there are no subtasks which are to be triggered and program control returns to the calling program. Otherwise, program control commences at SCN13.

Beginning at SCN13, a subtask number is retrieved from the alarm and trigger table and is placed in the arithmetic accumulator A. The subroutine SUBBID is then called upon to place a bid for the execution of this subtask. Upon return from the SUBBID subroutine, the continuation bit (bit position 10) within the subtask number is checked to see if another subtask number remains to be bid (see FIG. 11H). If not, then program control is returned directly to the calling program. If additional subtasks remain to be bid, then the address in the location TNFR is incremented and program control is returned to SCN13. Program control continues to loop through the six instructions beginning at SCN13 until all the necessary subtask bids have been placed.

iii. SUBTASK TRIGGER CONNECT SUBROUTINE

The subroutine for causing subtasks to be triggered by the change in the state of logical varibles is shown beginning in FIG. 17/1110A and continuing in FIGS. 17/1110B and 17/1110C. This subroutine may be called by any computer system program. The subroutine requires a first argument TRGDAT that is a subtask number and a second argument TRGDAT1 which is the address of the logical bit which is to do the triggering. A return argument TRGDAT2 serves as an error return flag in case a trigger connection is not established.

Upon entry to the subroutine TRGCON in FIG. 17/1110A, the two input arguments are fetched, and the error return argument is set equal to one. Depending upon whether the logical variable address argument is a logical word address or a logical bit address (see FIG. 11F), one of two routines is carried out to test whether the logical variable is an active or a passive logical variable. If the result of the test is positive, the logical variable is passive, and program control is returned immediately to the calling program. Otherwise, program control commences at ACHVCHT.

The address of the entry in the logical word table for the specified bit is computed and is stored in register E. Register G is loaded with a call for a four bit position right-hand shift, and register A is loaded with the 15 least significant bits of the user bit address argument TRGDAT1. This argument is then shifted so as to leave the four bit group number in register A. The trigger bit table TRGTBL starting address (TBLORG+7-see FIG. 17/1102) is then added into register A, and the resultant address of an entry within the trigger bit table is stored temporarily in register G. The first four bits of the address input argument are then retrieved and are added to the starting address of the bit mask table BITTBL to give the address of the bit mask for the specified logical variable. This bit mask is loaded into registers A and C. The bit mask in register A is reversed in sign by an exclusive OR operation and is ANDed together with the trigger bit table entry whose address is in register G. This AND operation definitely sets the trigger bit for the designated logical variable to "0". The contents of registers A and C are then combined by an exclusive OR operation so that the trigger bit for the designated logical variable is definitely set equal to "1". The resultant updated trigger bit table entry is then returned to the trigger bit table.

Program control now commences 17 steps past ACVCHT with a check to see if the alarm and trigger table FILTBL (FIG. 11E) contains room for additional entries. A pointer TRGEND to the beginning of empty space within this table is placed in the accumulator, and "2" is added to this pointer. The end address of the trigger and alarm table ENDTRN is then subtracted from this address. If the result is positive, the error flag argument TRGDAT2 is incremented twice and program control returns to the calling program via CONRTN, since there is no more room within the trigger and alarm table. If there is room in the table for additional entries, program control commences with the step "LDA *TRGDAT".

The subtask number argument is retrieved from the location TRGDAT and is stored in a location TRGDAT4. A zero is placed in register C. Register A is then loaded with the logical word table entry for the specified logical variable. (The address of the logical word table entry is stored in register E.) The most significant bit of this logical word table entry is set equal to zero. A check is then carried out to determine the present status of the logical word table entry. If the entry is zero, then program control commences at SETUP1 in FIG. 17/1110B. If both the alarm bit and the trigger bit are zero, then program control continues at LNKADD. Otherwise, program control commences with the step "LDG=X'400D'".

The alarm and trigger bits are right-shifted 14 bit positions so as to occupy the zero and first bit positions within the accumulator. The number "1" is then subtracted from the accumulator. If the result is zero, this indicates the logical word table entry is in accord with the top example in FIG. 11G and contains a sublevel and task number. Program control is transferred to SETUP2 in FIG. 17/1110C. Otherwise, the contents of register A are stored in register C to serve as a flag and register A is decremented. If the result is not zero, then the logical word entry is in accord with the bottom example in FIG. 11G, and an alarm message and one or more subtask triggers are linked to the logical variable. Program control is then transferred to LNKADD. If the result is zero, then the logical word is in accord with the example in FIG. 11G entitled "ALARM AND NO TRIGGERS". Program control then continues with the instruction appearing at the bottom of FIG. 17/1110A and continues at the top of FIG. 17/1110A(-cont. 1).

Beginning with the last instruction in FIG. 17/1110A, the logical word table entry is once again retrieved. The entry is modified by the reversal of the sign of the trigger bit position and is returned to its normal storage position within the logical word table (FIG. 11E). This reversal brings the entry into accord with the example at the bottom of FIG. 11G and thus causes it to indicate that both an alarm message and one or more subtask numbers are linked to the logical variable. A program jump is then executed to LKADD3 for further processing.

Program control commences at the location LNKADD in FIG. 17/1110A(cont. 1) when the logical word table entry indicates the existence of multiple triggers and no alarm, or the existence of an alarm and one or more triggers. The new subtask number which is to be added to the list of those connected to this logical variable is retrieved from the location TRGDAT4, and the continuation bit position within this subtask number (see FIG. 11H) is set equal to "1" by exclusively ORing the subtask number together with the hexadecimal number $800_{16}$. The logical word table entry is then retrieved, and the 13 least significant bits of this entry are added to the starting address of the trigger and alarm table (FIG. 11E) which starting address is stored in a location TRNBUF. The resultant address is the address of an entry in the trigger and alarm table. This resultant address is stored temporarily in register G. The flag in register C is now checked. If there is no alarm message, register C contains zero. If an alarm message exists, then register C contains a bit pattern. If register C does contain a bit pattern, the address in register G is incremented once; otherwise, this step is skipped. The content of the location to which register G points in the trigger and alarm table is then retrieved and is compared to the new subtask number which is stored in the location TRGDAT4. If the two are identical, then the new subtask number is already triggered by this logical variable. Program control then returns immediately to the calling program. If the two do not agree, then the continuation bit (see FIG. 11H) is checked to see if this is the last subtask number in the list. If there are additional subtask numbers in the list, then program control returns to LKADD2 and the additional subtask numbers are similarly checked. Ultimately, either the subroutine returns control to the calling program because the subtask number already exists within the list, or else program control commences at LKADD3.

When program control commences at LKADD3, a subtask number is to be added to the end of the list of subtask numbers which are bid when the selected logical variable changes its state. The address of the first trigger and alarm table entry associated with this logical variable is retrieved from the logical word table entry and is stored in a location STOPSF. A check is then carried out to see if index register C contains something other than zero which would indicate that an alarm message is also printed out in response to a change in the state of this logical variable. If so, then the address in the location STOPSF is incremented by one. Program control then commences at SHIFTR. Index register C is loaded with the address of the next available slot in the trigger and alarm table. The address of this slot resides in a location TRGEND. The contents of the location TRGEND are then incremented, and register G is loaded with the address of the second available slot. The address of the first available slot is then transferred into register A, and a check is carried out to determine whether the address just retrieved from the location TRGEND is larger or smaller than the address STOPSF of the first item in the list of subtask numbers associated with this logical variable. If the address TRGEND proves to be identical to the address STOPSF, then the trigger and alarm table contains only one entry for this particular logical bit, and that entry is the last entry in the trigger and alarm table. The new subtask number is retrieved from TRGDAT4 and is stored as the next entry in the trigger and alarm table. Program control then returns to the calling program. In general, the address STOPSF is found to be less than the address TRGEND, and program control commences at SFLOOP.

At SFLOOP, a loop is entered which shifts all entries in the alarm and trigger table starting with the entries having the highest addresses and continuing through the entry having the address STOPSF. This makes room for a new entry in the trigger and alarm table. The loop terminates with a transfer to the ninth step following SFLOOP. The new subtask number is retrieved from the location TRGDAT4 and is inserted into the new empty slot within the alarm and trigger table.

The thirteen least significant bits of the logical word table entry are again retrieved and are this time stored in index register C. Index register G is loaded with the terminal address of the logical word table which is retrieved from a location ENDFIL. It is now necessary to alter the addresses within all logical word table entries pointing to alarm and trigger table entries whose relative addresses are larger than the relative address that is stored in index register C. A loop is now entered which extends from CK1 to five steps past CKLOOP (FIG. 17/1110A(cont. 2)). During each pass through this loop, one entry in the logical word table is checked and adjusted, if necessary. The address in register G is then decremented and the loop repeats. When the address in register G is less than the starting address FILIDX of the logical word table, all entries have been checked, and program control is returned to the calling program by way of CONRTN.

Beginning at CK1, the contents of a logical word entry are retrieved, and the lower thirteen bits are isolated. If these bits are equal to zero, there are no corresponding entries in the trigger and alarm table, and hence program control jumps directly to CKLOOP where the address in register G is decremented. If these thirteen bits are non-zero, then the trigger and alarm bits are isolated and a check is made to see if the alarm bit is zero and the trigger bit is one, indicating that the entry is in accordance with the example shown at the top of FIG. 11G. If this check reveals that the entry is of the type shown at the top of FIG. 11G, then again there is no corresponding entry in the alarm and trigger table, so program control commences immediately at CKLOOP. If the entry passes this test, the thirteen bits are placed into the accumulator, and the address which they represent is compared to the address stored in register C. If and only if the address in the accumulator is greater than the address in register C, "1" is added to the contents of this logical bit location to correct for the shift of all entries within the trigger and alarm table having higher addresses. Program control then commences at CKLOOP as has been explained.

If the logical word table entry for a variable which is to be established as a trigger contains all zeroes in bit positions fourteen to zero, then this logical variable has never before been established as a trigger. If possible, the subtask trigger is placed right in the logical word itself in accordance with the example shown at the top of FIG. 11G. Program control commences in FIG. 17/1110B at SETUP1. Register G is initially loaded with the code number for a three-bit position right-hand shift. The subtask number argument is then retrieved from the location TRGDAT4. With reference to FIG. 11G, the maximum allowable sublevel number is "$1FF_{16}$". Hence, the sublevel number portion of the subtask number may occupy only 9 bit positions and must have three zero bit positions to the left. Returning to FIG. 17/1110B, the subtask number is ANDed together with "$EOO_{16}$". This operation isolates the three bits within the sublevel number which must be zero. If any of these bits are non-zero, then the sublevel number is too large to be stored in the format shown at the top of FIG. 11G. In this case, program control is transferred to FIG. 17/1110C. Otherwise, the routine shown in FIG. 17/1110B proceeds.

The subtask number argument is retrieved from TRGDAT4, and the four most significant bits (the task number—see FIG. 10I) are isolated in register A. Register A is then shifted 3 bit positions to the right. The shifted task number portion of the subtask number (the four most significant bits) are then isolated and are stored temporarily in register C. The subtask number argument is then loaded into register A a second time, and this time the sublevel number portion of the subtask number (the nine least significant bits) are isolated. The shifted task number in register C is added into register A, and the trigger bit position is set equal to "1" by exclusively ORing the result of the above operation with "$200_{16}$". The resultant logical word is then transferred back into the logical word table, and program control is returned to the calling program by way of the routine shown in FIG. 17/1110D.

If program control commences in FIG. 17/1110C, either a subtask trigger is to be added to a logical variable already having one subtask trigger and having a logical word table entry formatted as is shown at the top of FIG. 11G, or else a first subtask trigger is to be added to a logical variable having no subtask triggers, and the sublevel number portion of the subtask number which is to be triggered is too large for the format shown at the top of trigger 11G. In the former case, program control commences at SETUP2 in FIG. 17/1110C. In the latter case, program control commences at SETUP4 in FIG. 17/1110C.

Beginning at SETUP2, the logical word table entry is retrieved (the entry address is in register E), and the trigger bit position is set equal to zero. The logical word entry is then returned to the logical word table. The subtask number which is to be bid is then retrieved and a "1" is placed in the continuation bit position within the subtask number (see FIG. 11H). The subtask number is then returned to the location TRGDAT4.

At SETUP3, the subtask number currently stored in the logical word table entry in the format shown at the top of FIG. 11G is retrieved and is restored to its normal form. The logical word entry is placed in register A, and the sublevel number portion of the logical word entry (bit positions 8 to 0) is isolated and is stored temporarily in register C. The logical word entry is again placed in register A, and this time the task number portion of the logical word entry is isolated in register A. The pointer TRGEND to the last occupied entry within the trigger and alarm table is incremented twice to make room for two new entries within the table. Shift register G is then loaded with a number that specifies a three bit position shift to the left, and the task number in register A is shifted three bit positions to the left to put it into normal form. The sublevel number from register C is then added into register A, so that the reconstituted subtask number now resides in register A. Register G is then loaded with the address TRGEND of an open space two locations beyond the last entry in the trigger and alarm table (FIG. 11E). The subtask number in register A is stored in this location. The address TRGEND is the decremented. The resultant address is that of the first available entry within the trigger and alarm table. This address is converted into a relative address by having the table starting address (stored in the location TRNBUF) subtracted from the address TRGEND. The resultant relative address is masked to insure that it occupies no more than 13 bit positions and is stored temporarily in register G. The logical word entry is then retrieved from the address to which register E points, and the upper 3 bit positions within this entry are isolated from the remainder of the logical word entry. The relative address in register G is added into the logical word entry, and the resultant updated logical word entry is returned to the logical word table, and more specifically to the address to which register E points. The new subtask number is then retrieved from the location TRGDAT4 and is stored within the trigger and alarm table, and more specifically in the entry whose address is in the location TRGEND. The address in TRGEND is then incremented so that this location again points to the last entry in the trigger and alarm table, and program control is returned to the calling program by way of the routine shown in FIG. 17/1110D.

The routine shown at SETUP4 is called upon to place a subtask number into the trigger and alarm table when that subtask number is too large to be accommodated by the format shown at the top of FIG. 11G. This subroutine begins by incrementing the address pointer TRGEND to the last occupied entry within the trigger and alarm table. This address is then placed in register A, and the starting address of the trigger and alarm table (the starting address is stored in a location TRNBUF) is subtracted from this address to give the relative address of the location into which the new subtask number is to be placed. The resultant relative address is masked to eliminate its most significant 3 bits and is stored temporarily in register G. The logical word entry is then retrieved and is masked to eliminate all but the most significant 3 bits in the entry. The pointer in register G to the alarm and trigger table entry is then combined with the logical word entry in register A, and the logical word entry which results is transferred back into the logical word table location to which register E points. The subtask number which is to be bid is then retrieved from the location TRGDAT4 and is stored in the trigger and alarm table in the address that is stored in the location TRGEND. Program control then returns to the calling program by way of the routine shown in FIG. 17/1110D.

iv. ALARM MESSAGE CONNECT SUBROUTINE

The alarm connect subroutine ALMCON is shown in FIGS. 17/1120A, 17/1120B, and 17/1120C. When this subroutine has run to completion, it transfers program control back to the calling program using the software lockout release routine shown in FIG. 17/1110D.

The subroutine begins in FIG. 17/1120A at ALMCON. Three arguments are fetched from the calling program. The first argument is a directory pointer to a file containing an alarm message which is to be printed out. The address of this argument is stored in a location ALMDAT. The second argument is the logical variable address, and the address of this argument is stored in the location ALMDAT1. The third argument is the alarm limit, and its address is stored in a location ALMDAT2. A fourth argument is an error return flag that is maintained in the location whose address is stored in ALMDAT3.

Upon entry to this subroutine ALMCON, the address of the arguments are fetched from the calling program, and the error flag return argument ALMDAT3 is set equal to 1.

A test is now carried out upon the logical variable address to determine whether the variable is active or passive. If the logical variable is passive, program control returns to the calling program. If the logical variable is active, program control continues two steps beyond ALMCN2 in FIG. 17/1120B with register E containing the address of the entry in the logical word table for the logical variable.

The contents of the logical word table entry are retrieved, and the alarm bit position is checked (see FIG. 11G) to see if an alarm message is already associated with the logical variable. If so, then program control is returned to the calling program with the number "2" as the return argument ALMDAT3. If not, then the alarm and trigger table is checked to see if there is room in the table for another entry. The address of the last occupied table entry is stored in a location TRGEND, and the address of the last table entry is ENDTRN. If there is no more room in the table, program control returns to the calling program with the argument ALMDAT3 equal to 3. Otherwise, program execution continues in FIG. 17/1120B at "LDA *E", "EOR K:X4000".

The trigger table entry is retrieved from register E. The alarm bit (bit position 14) is reversed in sign and the status bit (bit position 15) is set to "0". The trigger table entry is then restored to the trigger table.

Post-address indexing using index register C is initiated by the command "CDR M11". The return address of the calling program is transferred from register B to a location POOL. Register B is then loaded with the starting address TBLORG of the address table shown in FIG. 17/1102. Shift register G is loaded with a code number defining a 4-bit position, right-hand shift.

The logical variable address (except for the bit in bit position 15 ) is retrieved from ALMDAT1 and is shifted 4 bit positions to the right to eliminate the bit number portion of the address (see FIG. 11F). The resultant register number is stored in index register C. The bit number portion of the logical variable address is then isolated and is added to the starting address BITTBL of the bit mask table to give the address of the bit mask in the bit mask table for the bit in the register which corresponds to the logical variable. This bit mask is stored in register A and in a location MSKK. The bit mask is then reversed in sign and is stored in register A and in a location TEMP. The reversed sign bit mask is then combined with the normal status bit table entry for this logical variable by an "AND *5,B" operation so that the normal status of the logical bit is set to "0".

The alarm limit argument whose address is stored in ALMDAT2 is transferred into register G, and its sign is checked. If the argument ALMDAT2 is zero, then the normal status of the logical variable is "0" or reset. In this case, the contents of register A are transferred directly back into the normal status bit table by the instruction "STA *5,B". If this argument is not zero, then the normal status of this logical variable is "1" or set. In this case, the normal status bits table entry in register A is exclusively ORed together with the bit mask MSKK before it is returned to the normal status bits table. This exclusive OR operation sets the normal status bit for the designated logical variable equal to "1".

The logical word table entry for the designated logical variable is now retrieved and is placed in the accumulator register A. The second input argument is again checked. If this argument is zero, then the status bit (bit position 15) of the logical word table entry is reversed in sign by an exclusive OR operation with the nuber "$8000_{16}$". If the argument ALMDAT2 is non-zero, then the status bit of the logical word table entry is not altered.

The address of the logical variable is again retrieved from the location ALMDAT1, and the sign bit position of this address is set equal to zero. A check of this address is then carried out to see if this is the address of an active contact closure input. With reference to FIG. 11C(cont.), the test consists of first computing the register number M as the core address CIATVE (which core address immediately precedes the core address LCBIT in FIG. 11C(cont.)) minus the starting address of the bit storage register table LIUSER, plus one. The value of M is then multiplied by 16 and is subtracted from the address of the logical variable. If the result of this test is positive or zero, then the logical variable is not an active contact closure input, and the steps remaining in FIG. 17/1120B need not be carried out. In this case, program control jumps directly to ALMCN3 at the top of FIG. 17/1120C. If the result is negative, the logical variable is an active contact closure input. The steps which remain in FIG. 17/1120B adjust the image of this bit in the bit storage register to its normal status. Program control then commences at ALMCN3 at the top of FIG. 17/1120C.

The alarm state and limit check removed bits for the logical variable are next both set to zero by the six steps commencing at ALMCN3. These bits are stored in the tables LILMTR and LIALRM in FIG. 11C(cont.). The system designator register is then loaded with the contents of the location "MOO" to end post-indexing based on register C. The return address of the calling program is restored to register B from the location POOL, and zero is stored in register C. The address of the designated logical variable is retrieved from the location ALMDAT and is placed in the location ALMDAT4 which location is identical to the location TRGDAT4 (see the fourth step in FIG. 17/1120A). The logical word table entry for the designated logical variable is then retrieved and is stripped of its most significant sign bit. If the entry is identically zero, program control commences at SETUP4 in FIG. 17/1110C. If the entry is non-zero, the entry is checked for the presence of a trigger bit (see FIG. 11G). If a trigger bit is detected, program control commences at SETUP3 in FIG. 17/1110C. Otherwise, the trigger bit position within the logical bit table entry is set equal to "1" and this entry is returned to the logical word table by the command "STA *E". Program control then commences at LKADD3 in FIG. 1110A(cont. 1). Program execution then proceeds as has already been described and ultimately returns to the calling program.

v. SUBTASK TRIGGER DELETE SUBROUTINE

The subroutine TRGDEL which deletes subtask triggers from the logic initiator appears in FIG. 17/1130A, 117/1130B, and 17/1130C. This subroutine requires as an argument the subtask number which is to be deleted from the trigger tables stored in a location DELDAT1. An error return argument is maintained in a location DELDAT2.

Upon entry into the subroutine TRGDEL, the subtask number argument is retrieved from the calling program and "1" is placed in the error flag location DELDAT2. Index register E is then loaded with the address ENDFIL of the last entry in the logical word table. A loop is then entered which commences at DEL1. During each pass through the loop, one entry in the logical word table is checked to see if that entry triggers the designated subtask number.

Beginning at DEL1, zero is stored in an alarm check flag location ALCHK. The contents of the last entry in the logical word table is retrieved from the location whose address is in register E, and the most significant bit position of this table entry is set equal to zero. If the entry is then identically zero, there are no subtask triggers associated with this entry. Program control commences at DEL6 in FIG. 17/1130B. At DEL6, the flag ALCHK is checked and is found to be zero. A check is then made to see if the address in register E has a lower magnitude than the address FILIDX of the first entry in the logical word table. This, in effect, checks to see if all of the entries in the logical word table have been checked. If all entries have been checked, program control returns to the calling program by way of the routine DELRTN shown in FIG. 17/1130C(cont.). Otherwise, program control returns to DEL1 in FIG. 17/1130A, and the loop continues with the checking of the next logical variable. The address stored in register E is decremented each time through this loop.

Returning to the fourth step past DEL1 in FIG. 17/1130A, if the logical word table entry is not identically zero, then program control continues with the fifth step past DEL1. Zero is placed in register C and in a location FRSTLC. The logical word table entry is then checked for the presence of either an alarm bit or a trigger bit (see FIG. 11G). If neither an alarm bit or a trigger bit is present, the logical word table entry is in accord with the second example in FIG. 11G and contains the relative address of one or more subtask numbers that are stored in the alarm and trigger table (FIG. 11E). In this case, program control commences at DEL2 where the entries in the alarm and trigger table are checked out.

If either the alarm bit or the trigger bit is set, then program control continues with the ninth step past DEL1. The alarm and trigger bit positions of the logical word table entry are now isolated by shifting the entire logical word entry 13 bit positions to the right. This leaves the alarm and trigger bits respectively in bit positions 1 and 0 within the arithmetic accumulator. The contents of the arithmetic accumulator are now decremented. If the result is zero, then the logical word entry is in accord with the first example in FIG. 11G, and the subtask number within this entry is to be assembled and compared to the subtask numbers supplied by the calling program. Program control in this case commences at DEL4 in FIG. 17/1130B. If the result is not zero, then the logical word entry is in accord with one of the bottom two examples in FIG. 11G, and the alarm bit is definitely set. The contents of the arithmetic register are then placed in register C as a flag indicating the existence of an alarm message connection to the corresponding logical variable. The contents of the accumulator are then decremented a second time. If the accumulator now contains zero, then the logical word table entry is in accord with the example in FIG. 11G entitled "ALARM AND NO TRIGGERS", and there are no triggers to be checked out. In this case, program control commences at DEL6 in FIG. 17/1130B where the address in register E is decremented so that the next entry in the logical word table may be checked. If the accumulator does not contain zero, then the logical word table entry is in accord with the bottom example in FIG. 11G. In this case, program control commences at DEL2 with a search for the designated subtask number in the trigger and alarm table.

When program control commences at DEL2, register E contains the address of an entry in the logical word table. This logical word table entry contains the relative address of the first item in a list of one or more subtask numbers within the trigger and alarm table. It is now necessary to compare the argument subtask number with those in the trigger and alarm table and to delete from the table any subtask numbers which prove to be identical to the argument subtask number. The logical word table entry is retrieved, and the three most significant bit positions in the entry are set equal to zero by an appropriate bit mask. The resulting relative address of an entry in the trigger and alarm table is stored in a location TRNPTR. The starting address of the trigger and alarm table is then retrieved from the location TRNBUF and is added to the relative address which now resides in register A. The resultant address of the first entry in a list within the trigger and alarm table is stored in a location SHFADR.

The alarm message flag in register C is now checked. If register C does not contain zero, then the first entry in the list within the trigger and alarm table is a directory pointer to an alarm message within the file system. The address of this alarm message is placed in the location FRSTLC, and the address in the location SHFADR is incremented so as to point to the first subtask number of the group of entries within the trigger and alarm table. If register C contains zero, the last two steps are skipped.

A loop is now entered which extends from DEL3 to the bottom of FIG. 17/1130A. During each pass through this loop, one entry in the trigger and alarm table is checked and is compared with the argument subtask number. Register G is loaded with the argument subtask number which is retrieved from the location whose address is stored in the location DELDAT1. Register C is loaded with the address of the first entry which is to be checked in the trigger and alarm table, and register A is loaded with the entry itself. The continuation bit in each alarm and trigger table entry (see FIG. 11H) is set equal to "0". The entry in register A is compared with the argument subtask number in register G by an exclusive OR operation. If the two are identical, the subtask number is to be deleted from the alarm and trigger table. This deletion is carried out by a subroutine FNDDEL shown in FIG. 17/1130C. If they are not identical, then the continuation bit (see FIG. 11H) is checked to see if this is the last subtask number in the group of subtask numbers. If so, then program control commences at DEL6 in FIG. 17/1130B. Otherwise, program control returns to DEL3, and the next entry within the trigger and alarm tables is checked.

If the logical word table entry is of the type shown at the top of FIG. 11G, program control commences at DEL4 in FIG. 17/1130B. The logical word table entry is retrieved, and the sublevel number portion of the entry is isolated and is stored in register G. The sublevel portion of the argument subtask number is retrieved from the location DELDAT1 and is compared with the contents of register G by an exclusive OR operation. If the result is non-zero, the two sublevel numbers do not agree, and program control commences at DEL6. If the result is zero, then the two sublevel numbers do agree, and the task numbers are then compared. Program control then commences with the tenth step past DEL4. The four most significant bits of the argument subtask number are isolated and are stored in register C. The task number portion of the logical word table entry (see the "ONE TRIGGER, NO ALARM" portion of FIG. 11G) is also isolated and is shifted until it is left-justified within the accumulator. The task number in the accumulator is now compared to the argument task number in register C by an exclusive OR operation. A non-zero result indicates that they do not agree. If the result is non-zero, program control commences at DEL6. If the result is zero, then both the task and sublevel numbers agree. It is then necessary to delete this entry from the logical word table. The logical word table entry is retrieved, and all bit positions save the sign bit position are set equal to zero by ANDing the logical word entry together with the number "$8000_{16}$". The logical word table entry is then returned to the logical word table, and program control commences at DEL6.

When program control commences at FNDDEL in FIG. 17/1130C, the subtask number specified by the calling program has been found within the trigger and alarm table and is to be deleted from that table. At this point, register C contains the address of the entry which is to be deleted. This entry is retrieved from the trigger and alarm table, and a check is carried out to see if the continuation bit (see FIG. 11H) within the entry is zero. If the continuation bit is not zero, then this is not the last entry within the linkage and program control continues at LNKDEL. Otherwise, program control continues with the fifth step past FNDDEL.

A comparison is then carried out of the table entry address stored in register C with the address of the first table entry for the logical variable. The latter address is TRNBUF, the alarm and trigger table starting address, plus TRNPTR, the relative address within the table of this first entry. If the two addresses agree, only a single subtask number (and no alarm file directory pointer) within the table is linked to this logical variable. Program control commences at DEL75 where the logical word table entry for this logical variable is set equal to zero. Program control then continues at LNKDEL.

If the address stored in register C is not identical to the address of the first entry for the logical variable, program control commences with the 9th step past FNDDEL. The address stored in register C is decremented and is compared with the contents of FRSTLC by an exclusive OR operation. If the result is not zero, then the preceding entry cannot possibly be a directory pointer to an alarm message but is another subtask number. Program control continues at LNKLAA where the continuation bit in the preceding entry is set to zero, and program control then commences at LNKDEL. If the result is zero, then the preceding entry is a directory pointer to an alarm message, and only one subtask number is linked to the logical variable. Since this subtask number linkage is now being cancelled, program control continues at DEL7 where the trigger bit in the logical word table entry is set equal to zero. Program control then continues at LNKDEL.

Program control then commences at LNKDEL. Beginning with the entry whose address is one past the address SHFADR, all entries in the alarm and trigger table are shifted up one position until the entire table has been shifted. The loop which extends from DEL8 to "NJP DEL8" shifts one entry each time it is executed and terminates when the last table entry has been shifted. The pointer TRGEND to the last occupied table entry is then decremented, and program control continues at DEL10.

Beginning at DEL10, it is necessary to adjust the relative address in the logical word table for all entries containing addresses higher than the address SHFADR. The routine which begins at DEL10 and which continues to the last executable step in FIG. 17/1130C(cont.) goes through the logical word table entries and makes the necessary adjustments. This routine is similar to the routine which begins in FIG. 17/1110A(cont. 1) eleven steps beyond SFLOOP and which extends to the end of FIG. 17/1110A(cont. 2). The only important difference between these two routines is that the routine in FIG. 17/1110A increments relative addresses within the logical word table, while the routine in FIG. 17/1130C decrements relative addresses within the logical word table. When this task is finished, program control continues at DEL6 in FIG. 17/1130B, as has been explained.

vi. ALARM DELETE SUBROUTINE

A subroutine ALMDEL which deletes alarm directory file pointers from the trigger and alarm table appears in FIGS. 17/1140 and 17/1140(cont.). This subroutine expects a single argument DELDAT1 which is the logical address of the logical variable whose alarm is to be deleted. The subroutine returns an error argument DELDAT2 in case of a mishap during execution of the subroutine.

Program control commences at ALMDEL with a jump to a subroutine which retrieves the argument DELDAT1. The error flag return argument DELAD2 is set equal to one. The logical address argument DELDAT1 is then checked to insure that the logical variable is an active logical variable. If the logical variable proves to be a passive logical variable, program control is returned to the calling program by way of the software lockout exit routine DELRTN which appears in FIG. 17/1130C(cont.). Otherwise, program control commences at ALMD2 with the accumulator loaded with the address of the logical word table entry for the logical variable specified by the argument DELDAT1.

Beginning at ALMD2, the address of the logical word table entry is stored in register E. The contents of this entry are checked to see if the alarm bit (bit position 14) has been set. If not, the error flag location DELDAT2 is incremented, and program control is returned to the calling program. Otherwise, program control commences at ALMD3.

The logical word table entry is retrieved, and the alarm bit within the entry is altered to zero. The entry is then returned to the logical word table. The contents of the trigger bit position within the logical word table entry is retrieved and is stored in the location TGCHK. The least significant thirteen bits from the logical word table entry are then retrieved and are added to the starting address TRNBUF of the trigger and alarm table. The resultant address is stored in a location SHFADR and in a flag location ALCHK. Zero is placed in a flag location ONCHK, and program control is transferred directly to the steps beginning with LNKDEL in FIG. 17/1130C. The routine beginning with LNKDEL then deletes the alarm entry from the trigger and alarm table in the manner which has already been described and ultimately transfers program control to DEL6 in FIG. 1130B. The presence of data values within the flag location ALCHK causes program control to be transferred back to ALMD4 in FIG. 17/1140.

Beginning at ALMD4, a check is carried out to see if the trigger bit location TGCHK contains zero. If so, program control is returned to the calling program by way of ALMD5 in FIG. 17/1140(cont.) and DELRTN in FIG. 17/1130C(cont.). The presence of zero in the location ONCHK causes the fourth through the seventh step past ALMD5 to load zero into bit positions 14 to zero in the logical word table entry before program control is returned to the calling program. If the trigger bit is not zero, program control continues at the third step past ALMD4.

Register C is loaded with the address SHFADR of the entry which has been deleted from the trigger and alarm table. Register A is then loaded with the contents of this entry in the trigger and alarm table. A check of the continuation bit (see FIG. 11H) is carried out to determine if this is the last subtask which remains linked to this logical variable. If the continuation bit is set, then other subtask numbers are linked to this same logical variable and nothing further needs to be done. Program control returns to the calling program by way of the routine DELRTN. If the continuation bit is not set, then the subtask number is removed from this location in the trigger and alarm table and is placed into the logical word table entry in the format shown at the top of FIG. 11G. The task number portion of this subtask number is first isolated, shifted to the right 3 bit positions, and is stored in register C. The sublevel number portion is then isolated and is added to the task number portion from register C. A "1" is then placed in the trigger bit position, and the result is stored in the logical word table location whose address is in register E (FIG. 17/1140(cont.)). While not included in the listing at this point, it would be desirable to include at this point a check to insure that the sublevel portion of the subtask number is not too large to be stored in the logical word table in this manner. However, if the sublevel numbers within the system are limited to a maximum of "1FF", a test at this point is not required. This is the case in the embodiment of the invention from which FIG. 17/1140 was taken.

A flag is now placed in the location ONCHK, and zero is placed in the flag location TGCHK. Program control is then transferred to LNKDEL in FIG. 17/1130C so that this additional subtask number may be deleted from the trigger and alarm table. Once again, program control returns by way of DEL6 in FIG. 17/1130B to ALMD4 in FIG. 1140 because of the presence of data in the location ALCHK. From ALMD4, program control is transferred to ALMD5. The flag ONCHK is checked and is found to contain a data value. Program control therefore returns to the calling program by way of DELRTN in FIG. 17/1130C.

VII. CHECK BIT SUBROUTINE

The subroutine BITLOD which can determine the value of any logical variable within the system is shown in FIG. 17/1150. This subroutine expects as an argument a logical word address or a logical bit address in the format shown in FIG. 11F and stored in the arithmetic accumulator.

Upon entry to this subroutine, the sign bit of the logical address is reversed by an exclusive OR operation. If the sign bit is then negative, the address supplied is a logical word address. Program control then commences at a location UNPAK. The base address FILXIX is added to the contents of register A so that register A contains the address of an entry within the logical word table. (By way of further explanation, the location FILXIX contains the starting address of the logical word table LCWORD from which has been subtracted the number "$8000_{16}$". In this manner, the presence of a minus sign in the address in the accumulator is cancelled out by the negative number "$8000_{16}$" so that the base address LCWORD of the logical word table is added to the relative address supplied by the calling program.) The contents of this logical word table entry are loaded into the arithmetic accumulator, and program control is returned immediately to the calling program.

If the result of the test in the step past BITLOD is zero or positive, the address is a logical bit address. The logical bit address is transferred into the extended accumulator E and is also allowed to remain in the accumulator A. The bit number portion of this logical word address (see FIG. 11F) is isolated in the accumulator by setting the remaining bits equal to zero. The extended accumulator is then shifted four bit positions to the right so that only the register numbe portion of the logical bit address remains within the extended accumulator E. Using double precision arithmetic, the contents of the two locations in the array LOGBAS (see FIG. 11E) are added into the accumulator and the extended accumulator. This single step adds the base address LIUSER of the bit storage register table to the register number in the extended accumulator and simultaneously adds the base address BITTBL of the bit mask table (see FIG. 11E) to the bit number in the accumulator. The accumulator is then loaded with the group of bits in the bit storage register table entry whose address the accumulator contains, and this group of bits is masked with the bit mask whose address is stored in the extended accumulator register E. If the result is zero, program control is returned directly to the calling program. If the result is not zero, the number "$FFFF_{16}$" is loaded into the accumulator so that the accumulator contains all "1" bits, and then program control is returned to the calling program.

When the calling program commences, the arithmetic accumulator sign bit position contains a "1" bit if the logical variable is set and a "0" bit if the logical variable is cleared. It is also possible for the calling program to execute a "PJP" or a "ZJP" instruction with the resultant transfer being executed or not executed depending upon whether the logical bit is set or cleared. Hence, the subroutine shown in FIG. 17/1150 allows the determination of the state of a logical variable with a minimum loss of time. A similar subroutine may also be provided to allow FORTRAN programs to determine the state of any system logical variable. Such a routine would have a conventional argument fetch step and would not expect the argument to be stored in register A.

VIII. ALTER BIT SUBROUTINES

A subroutine which allows a logical variable to be set or to be cleared is shown in FIG. 17/1160A, 17/1160B, 17/1160C, and 17/1160D. This subroutine has normal FORTRAN program entries SETZRO to clear a logical variable and SETONE to set a logical variable. Depending upon which of these entry points is used, either the address RTNADR or CHNADR is stored initially in register C. The return address of the calling program is stored in SAVB, and an argument fetching subroutine is called upon to retrieve from the calling program the address of the logical variable which is to be set or cleared. If the calling program is written in assembly language and is able to place the address of the logical variable in the accumulator, then a pair of resolved argument entries to the subroutine, SETZER and SETONR, may be used. In either case, program control commences with the third step past BGNSET.

Register E is loaded with the contents of the seventh location past that whose address is in register C. With reference to FIG. 17/1160D, register C contains either the address RTNADR or CHNADR. Hence, register E is loaded with either the number 8 or the number 9. This value is stored in a location TMPCDE. The code for a four bit position right-hand shift is loaded into the shift control register G. The logical variable address is maintained in register A and is also transferred into register E. The sign bit is removed from the accumulator register A by ANDing the contents of register A together with the number "$7FFF_{16}$". The resulting logical word address is stored in a location WRDBIT. Register A is then shifted 4 bit positions to the right so that the bit number within the register is shifted out of the register. The relative bit register address which remains is stored in a location RELADR.

The logical variable address is then restored to register A, and a check is carried out upon this address to see if the address is that of a passive or of an active system variable. If the logical variable proves to be active, program control commences at ACTVV in FIG. 17/1160C. If the logical variable is passive, program control commences at PASSVE in FIG. 17/1160B.

Assuming that the logical variable is passive, program control commences at PASSVE in FIG. 17/1160B. The logical variable address is retreived from the location WRDBIT and is stored in register A. All but the four least significant bits (the bit number -- see FIG. 11F) are reduced to zero. The extended accumulator register E is loaded with the logical variable register number from the location RELADR. The contents of the two element array LOGBAS are then added into the accumulator and extended accumulator by a double precision arithmetic step so that the extended accumulator contains the address within the bit storage register table of the register of bits which is to be checked and so that the accumulator contains the address within the bit mask table of the proper bit mask for the bit that is to be checked. The proper bit mask is transferred into the accumulator and is also stored in the location MSKK. The logical bit is then isolated, and its sign is checked. If the bit is zero, program control commences at the location to which index register C points. If the bit is "1", program control commences at a location whose address is stored one past the location to which register C points.

With reference to FIG. 17/1160D, the transfer which is next carried out is either a return to the calling program or transferred to the location CHNGBT in FIG. 17/1160B, depending upon whether register C was initially loaded with the address RTNADR or the address CHNADR. The result of this transfer is: if the bit which has just been checked is already in the state into which the calling program wishes to place it, then program control returns to the calling program; but, if the bit which has just been checked is not in the state into which the calling program wishes to place it, then program control commences at CHNGBT.

Beginning at CHNGBT, the accumulator register A is loaded with the bit mask which is retrieved from MSKK. The logical bit within the bit register, the address of which is in register E, is then changed from a "0" to a "1" or from a "1" to a "0" through the use of this bit mask. The calling program return address is then transferred from register B to a location SAVB, and the address in register C is stored in a location SAVC.

Program control then commences at COCHK. This routine checks to see if the logical variable which has just been altered is a contact closure output logical variable. The bit storage register address of the group of bits in which the designated logical variable resides is loaded into register A. A number CCOBGN, which is defined as (see FIG. 17/1160D) the relative address of the location COATVO within the bit storage register minus the starting address LIUSER of the bit storage register, is subtracted from the relative address RELADR. If the result is negative, the bit which is being checked lies in the upper portion of the bit storage register (see FIG. 11C(cont.)) and is not a contact closure output logical variable. Program control then commences at TRCCHK. If the result is zero or positive, a number NUMCCO, which is defined (see FIG. 17/1160D) as the sum of the number of passive contact closure outputs COPAS plus the number of active contact closure outputs COATV, is subtracted from the result. If the result is negative, the bit corresponding to the logical variable which is being checked lies in the lower portion of the bit storage register, outside of the range of contact closure output logical variable (see FIG. 11C(cont.)). Once again, program control commences at TRCCHK. If both of the above tests are passed without a transfer occurring, then the logical variable is definitely a contact closure output logical variable.

If the logical variable is a contact closure output logical variable, the value NUMCCI, which is defined as (see FIG. 17/1160D) the number of active contact closure output logical variable plus one, is added back into register A so that register A contains the register number of the register of contact closure output bits which includes the bit representing the logical variable which has just been set or cleared. This register number is stored in a location REG. The address TTNADR or CHNADR is restored to register C from the location SAVC, and register A is loaded with the bit mask from the location MSKK. The bit mask is then ANDed together with the fifth location past that to which register C points, which location either contains zero or "$FFFF_{16}$" (see FIG. 17/1160D), and the resultant bit pattern is stored in a location PATTERN. The system registers are then loaded with the data in the array of locations beginning with BRCATB (FIG. 17/1160D) by the command "EST BRACTB". The program counter is loaded with the address preceding the location COCLK, and hence the next instruction executed is the instruction labelled COCLK. The other system registers are now loaded with the data required by the system executive contact closure output handler subroutine. An immediate subroutine jump is now executed to the executive contact closure output handler to a resolved argument entry within the handler. The contact closure output handler then alters the contact closure output corresponding to the logical variable.

When the contact closure output handler subroutine has run to completion, the subroutine loads the system registers by the standard subroutine return instruction "EST *1,B". Since register B is loaded with the address "BRCATC−1", the system registers are loaded from the array of locations beginning with BRCATC in FIG. 17/1160D. In particular, the program register is loaded with the address TRCCHK. Hence, program control resumes at TRCCHK upon return from the contact closure output handler subroutine. Register B is loaded with the return address of the calling program from the location SAVB. Program control is then returned to the calling program via software lockout.

In the case of an active logical variable, program control commences at ACTVV in FIG. 17/1100C. Register A is loaded with the logical variable address from the location WRDBIT, and the starting address FILIDX of the logical word table is added into register A. The resulting address is transferred to register G, and the contents of the corresponding logical word table entry are loaded into register A. The sign of this table entry indicates whether the bit is set or cleared.

As has been fully described in connection with FIG. 17/1160B, the next steps determine whether or not the logical variable is already in the state which the calling program is requesting that it be placed into. If the logical variable is already in the proper state, program control returns to the calling program. Otherwise, program control continues at the location CHNGWD. The sign bit position of the entry in the logical word table is reversed by exclusively ORing the table entry together with "$8000_{16}$". The code number which was previously placed in a location TMPCDE is now retrieved, is combined with the number "$F000_{16}$" which is retrieved from a location K:X4, and is returned to the location TMPCDE. The return address to the calling program is transferred from register B to a location SAVB. The logical word table entry is then retrieved and is checked to see if any of the bit positions within the logical word entry other than the most significant bit position contain any data bits. If not, then there are no subtask bits linked to this logical variable and there is no alarm message linked to this logical variable. The logical variable is then treated as a passive logical variable, and so program control commences at COCHK-1 in FIG. 17/1160B. If any of these bit positions do contain data, then it is necessary to call upon the alarm and trigger check routine to see if further processing is required. The contents of register C are stored in a location SAVC. Register A is loaded with WRDBIT, the address of the logical variable. Register E is loaded with a return address COCHK−2 in FIG. 1160B where program control is to commence after the alarm and trigger check routine has run to completion. Program control is then transferred to COMMON, the main entry to the alarm and trigger check routine in FIG. 17/1103A. With reference to FIG. 17/1103A, the address in register A is stored in the location TMP, and the address in register E is incremented and stored in the location RTN.

When the alarm and trigger check subroutine has run to completion, program control is returned to COCHK in FIG. 17/1160B where the test of whether the logical variable is a contact closure output logical variable is carried out. If it is a contact closure output logical variable, the executive contact closure output handler is called upon to alter the contact closure output. Program control then returns to the calling program by way of software lockout release.

The set and reset subroutine which begins in FIG. 17/1160A sets or resets active logical variables by altering the sign of the entries in the logical word table corresponding to those logical variables. This subroutine does not alter the corresponding bits in the bit storage registers shown in FIG. 11C(cont.). In the case of passive logical variables, the bit for the passive logical variable within the bit storage register is altered. An additional subroutine, shown in FIG. 17/1170, is provided which alters the logical bit entry in the bit storage register (FIG. 11C(cont.)) in the case of both active and passive logical variables. The subroutine shown in FIG. 17/1170 is, in general, quite similar to the subroutine which begins in FIG. 17/1160A and needs little in the way of additional explanation. The initial portions of this subroutine down through the second step past INPUT1 are virtually identical to the initial portions of the subroutine shown in FIG. 17/1160A down through the second step past BGNSET. The subroutine shown in FIG. 17/1170 then proceeds to check the status of the bit which is to be altered within the bit storage register (FIG. 11C(cont.)). A routine quite similar to that shown in FIG. 17/1160B between the step PASSIVE and the second step past CHNGBT is then used to compare the present status of the logical variable with the desired status of the variable. If the bit is not to be altered, then program control commences at INPUT3 and is returned to the calling program via software lockout. Otherwise, the routine shown at INPUT2 reverses the entry in the bit storage register, and program control is then transferred to one of the resolved argument entries SETZER or SETONR in the program shown in FIG. 17/1160A, depending upon whether the logical variable is to be set or cleared and depending upon whether the address INPUTA or INPUTB is present within index register C.

H. THE DATA FILE PROCESSING PROGRAM

The program listing for the data file processing program is shown in FIGS. 17/1200A, 17/1200A(cont.), and 17/1200B. A subroutine of this program appears in FIG. 17/1210. FIG. 12 is a block diagram of this program, and the text which accompanies FIG. 12 gives an overview description of the program. The following comments are limited to those aspects of the program which are not apparent in FIG. 12 or in the accompanying text.

Whenever a bid is placed for the execution of a subtask that is assigned to the task level of the data file processing program, program control is transferred to the task entry point SRTANL in FIG. 17/1200A. The program begins by checking to see if any scans have been requested by the demand buffer subroutine 13020 shown in FIG. 13B. Two demand scan flags DMDREQ and DMDRDY are checked. If these flags are set, program control is transferred to a demand scan routine DMDPGA. By way of explanation, the demand scan routine causes the analog scan file processing program 1207 (FIG. 12) to immediately check an input analog data value by immediately processing the file which is associated with that value. The result of the demand scan is then returned to the subroutine 13020 (FIG. 3B), and program control returns to the location SRTANL in FIG. 17/1200A.

If no demand scans need to be processed, program control commences at DMDLXC in FIG. 17/1200A. A subroutine call to the sublevel processor subroutine CHKBID is executed to determine which subtask within the data file processing program task level is bidding for execution. Upon return to the subroutine CHKBID, register A contains the sublevel number of a bidding subtask, and register E contains the starting address of that subtask. The subtask starting address is stored in a location FILSTRT, and the sublevel number of the subtask is stored in the location SBCTSK.

If no subtasks are bidding for execution, then register E is returned from the subroutine CHKBID containing zero. When a zero is detected in register E, program control commences at NOSUBT in FIG. 17/1200A(-cont.). Sensor calibration flags CALREQ and CALRDY are checked to see if the sensor calibrate function program in FIG. 13B has called for a sensor calibration to be carried out. If so, then program control commences at a sensor calibration subroutine SNSCLC. Otherwise, program control continues at NOSUBY. A check of the flag ANIPRG (analog scan in progress) is carried out. If this flag is set, it means that the analog to digital converters of the system are presently carrying out a conversion of analog data to digital form and that this data has not yet been recovered. Program control is transferred to a location DODUMY where a dummy scan program resides. This dummy scan program supplies imaginary values to the system analog to digital converters so that the converters may return the values which they are presently converting. The use of a dummy scan routine is a characteristic of the computer system and in general would not be required in some other computer system. If the flag ANIPRG is not set, then program control is transferred back to the system executive scheduler. Program execution at this task level ceases.

If one or more subtasks are bidding for execution, program control commences at PEROPA in FIG. 17/1200A. The sign of the sublevel number returned by the subroutine CHKBID is checked. If this sublevel number is negative, the bidding subtask is returning from suspension or from time delay. Program control then commences at a location TDSTART. The number whose address is in register C is subtracted from the sublevel number in register A. If the result is positive or zero, the subtask is a control chain. The sublevel number is restored in register A, and program control jumps to the entry I*INTTD within the control chain processor program routine shown in FIG. 17/710. If the result of this subtraction is negative, then the subtask is a program subtask. The program is restarted by simply restoring the system registers from the register pool whose address is stored in register E. This is carried out by the command "EST *E".

Returning to the step following PEROPA, if the sublevel number in register A is not negative, a check is carried out to see if the subtask is a data file subtask, a control chain subtask, or a program subtask. At this point, index register C contains the address of the HIINDX number within the task header (see FIG.

10G), and the next successive address contains the value LOINDX. The significance of these two values for differentiating different types of subtasks from one another is illustrated in FIG. 10H and is fully explained in the text which accompanies that figure. First, the LOINDX value is retrieved from the location 1,C and is subtracted from the sublevel number in register A. A negative result indicates the subtask is a data file subtask, and program control commences at PEROPB. If the result is positive of zero, the value LOINDX is added back to the sublevel number and the value HIINDX is retrieved from the location *C and is subtracted from the sublevel number. A positive or zero result indicates a control chain subtask, in which case program control is transferred directly to the entry I*START within the control processor program. A negative result indicates a conventional program subtask. In the case of a program subtask, index register B is loaded with the return address ANTSK, the entry to the data file processor program task level. Register E contains the address of a location which immediately precedes the program subtask in core. This address is incremented, and program control is transferred directly to the program subtask as though the program subtask were a subroutine.

In the case of either a program subtask or of a control chain subtask, program control is ultimately returned to the entry point ANTSK of the data file processing program. The program subtask returns to this point because the program has been supplied with this address as the program termination address. The control chain processing program checks the task level which is running at the completion of the execution of any control chain and transfers program control the location ANTSK whenever a normal control chain is running within the data file processor program task level.

If the subtask is assigned to a data file, program control commences at PEROPB. The register E contains the address of a header which precedes a linkage of files within core. Register A contains the sublevel number of the data file subtask, and also contains a "1" bit in bit position 15 if this sublevel is normally disk-resident. This bit is now isolated and is stored in a location CORDSC as a flag indicating whether the data file subtask is core- or disk-resident. Register B is loaded with the address of the header, and register A is loaded with the contents of the first entry in this header. With reference to FIG. 6/111, the header is distinguished from a valid file by the presence of a "1" data bit in bit position 15. See, for example, the first entry in the "ANALOG SCAN SECTOR" in FIG. 6/111. Similarly, the file header which precedes the string of files in core is shown in the lower half of FIG. 6/106 to contain a "1" data bit in bit position 15 of the first entry, because the file type number "$8_{16}$" is "$1000_2$" with the "1" data bit falling into bit position 15. The first entry in the header is checked to see if it is positive or negative. In this case it is negative, for reasons which have just been explained. Register A is then loaded with the linkage pointer which is retrieved from the location 1,B and which is the second entry in the header (note the second entry in the analog scan sector in FIG. 6/111 and the second entry in the second form of coupler file in FIG. 6/106). This location contains the difference between the address of the first file in the linkage and the address of the header. This difference is added to the subtask address in register B, and the resultant address of the first file in the linkage is transferred back into register A. Program control then returns to the step "LDA *B", and the first entry in the first file is retrieved and checked. Generally, this entry is an analog scan or a calculated value file of type number zero, 1, 2, or 3. When written in binary form, all of these file type numbers include a leading zero which occupies bit position 15 within the first entry in the file header. Hence, the first entry in the file header appears positive. Program control then jumps to the location VLDFIL in FIG. 17/1200A(cont.).

Commencing at the location VLDFIL, the file address is stored in register E and is also stored in a location FILADR. The sign of the first file entry in register A is checked once again for reasons which are explained below. In this case, the check indicates that this first entry is positive, for the reasons explained above, and hence program control continues with the second step past FLTPCK. With the assumption being made that the file must be either an analog signal input file or a calculated value file, the third entry within the file is checked to determined whether the file is an analog input file or a calculated value file. As is evident in FIGS. 15/301 through 15/308, the third entry in all calculated value files is negative, and the third entry in all analog scan files is positive. (Negative numbers all contain a "1" data bit in the left-most bit position.) if the third entry in the file is negative, program control jumps to ISCALC, the calculated value file processing program. The calculated value file is then processed, and program control is ultimately returned to a location CHAIN. If the third entry is positive, program control commences at ISANLG, the analog input file processing program. The analog scan file is then processed. After the file has been processed, program control returns to the location CHAIN.

In the preferred embodiment of the invention, the analog input file processing program does not read in just one file, but is programmed to continue reading in analog scan data files by following the file linkages from one file to another until an entire converter set of data files have been checked. Each converter set of data files are handled together so that all of the system analog to digital converters may be loaded with data requests simultaneously, whenever this is possible. The scanning of files continues either until a file containing the highest allowable converter number is encountered or until a file is encountered having a lower converter number than a previous file within the same converter set. In the former case, program control returns to the location CHAIN with the location FILADR containing the address of the last file which has been checked and with some number other than zero in a flag location NOUPDF. In the latter case, program control is returned to the location CHAIN with the location FILADR containing the address of the next file which is to be checked and with a zero in a flag location NOUPDF. This flag is tested by the programming steps at CHAIN. In the latter case, program control commences at UPDFST. In the former case, program control continues with the second step past CHAIN.

Beginning with the second step past CHAIN, register B is loaded with the address of the file which has just been processed, and register A is loaded with the linkage pointer that is stored in the second entry within that file (the location 2,B). If the linkage pointer is zero, program control is transferred to CHAZAA. Otherwise, the linkage pointer is added to the address in register B, and the resultant address of the next file in the linkage is stored in register B and the location FILADR. Register A is then loaded with the first entry in the file and program control continues at FLTPCK. The sign of the first entry in the file is then checked. If the entry is negative in sign, the file type number in binary form includes a "1" bit in the most significant bit position. Therefore, the file type number is eight or greater and is not an analog scan or calculated value file. Program control then commences at a location NTANCL. If the first entry in the file is positive, then program control is returned to the calculated value file processing program or to the analog input file processing program in the manner already explained.

When program control commences at UPDFST, the file whose address is stored in the location FILADR is definitely an analog scan or a calculated value file and is the next file which is to be processed. The flag NOUPDF is set equal to minus one, and the file address is loaded into register B. The first entry in the file is then rertrieved, and the file type number (the leftmost four bit positions) is masked away from the remainder of this entry. The file type number is then combined with the fifteenth entry in the bit mask table BITTBL (see FIG. 11E). This reverses the sign of the most significant bit in the file type number. If register A then contains a number, the file type number is not 8, and the file is an analog scan data file. Program control then jumps directly to the analog input file processing program. If the result is zero, then the file type number is 8. The file in this case is a type 8 coupler file containing the core address of a file which is to be processed as a second entry within the file (see the upper half of FIG. 6/106). Register B is loaded with this core address, and program control is transferred to the analog input file processing program with the type 8 coupler file address still resident in the location FILADR. In this manner, a core-resident file which is linked into a disk-resident linkage of files may be processed without interrupting the normal sequence of file processing steps.

Returning to the step past FLTPCK, when a file in the linkage is encountered which is not an analog scan or a calculated value file and which contains a file type number of 8 or greater, program control commences at NTANCL. The file type number is retrieved from the first entry in the file and is isolated from the remainder of this first entry by ANDing the first entry together with the number "$F000_{16}$". The next programming steps check to determine if this file is a subtask bidding file of type number 13, a coupler file of type number 8, or an analog control chain file of type number 11. The file type number is successively exclusively ORed together with the numbers indicated in the listing, and zero results are indicative that the type number is of the type desired.

If the file type number indicates that the file is a subtask bidding file, program control continues at a location BIDFIL in FIG. 17/1200B. After checking a flag ANLTGR which is not pertinent to the present discussion, register A is loaded with the third entry in this file, the number of a subtask for which a bid is to be placed. Register B is then loaded with the address of a temporary data pool, and the subroutine SUBBID within the sublevel processor program is called upon to place the bid. Program control then returns to CHAIN.

In the case of a coupler file, program control commences at CPLFIL. The format of a typical coupler file is shown at the top of FIG. 6/106. This file may or may not contain a core address as its second entry. If it does not contain a core address, the file requires no processing, and program control commences at CHAIN. If the second entry in the file is non-zero, then the core address in the second entry is placed in register A and program control commences at FLTPCK as has already been explained. The address of the coupler file itself remains in the address FILADR so that this processing of a branch core file does not interrupt the processing of the main subtask linkage of files.

If the file is an analog control chain of the type shown in FIG. 15/314, program control commences at DDCHN. The flag ANLTGR (which is not relevant to the present discussion) is checked. Assuming this flag is zero, a subroutine CNTINT shown in FIG. 17/1210 is called upon. The subroutine stores both the return address to the calling program and the contents of register B in appropriate temporary storage locations, increments the address in register E so that E points to the second entry in the control chain file, and transfers program control the location I*START within the control chain processor program. The address in register E is incremented because the control chain processor program expects a control chain file to be formatted as is shown in FIG. 15/315 without a linkage pointer of the type shown in FIG. 15/314. If register E contains the address of the entry "POINTER TO FILER DIRECTORY" in the analog control chain, then both the analog control chain and the regular control chain may be handled in exactly the same manner by the control chain processor program. With reference to FIG. 17/700, when a control chain has been processed, program control commences at ANLCHK. A check is carried out to determine if this is an analog control chain rather than a normal control chain, and then program control is returned to DOCCTC−1 in FIG. 17/1210. The contents of register B are then restored, and program control then returns to the location CHAIN.

If a file is not an analog scan or calculated value file and is not one of the three file types which have just been discussed, then program control passes directly from NTANTL to CHAIN (FIG. 17/1200A(cont.)). In effect, the file is simply skipped over and the next file within the linkage is checked.

Eventually, the end of a subtask linkage of files is encountered by the fourth step past the location CHAIN. When this happens, program control commences at CHAZAA. A location LSTCVNO is then checked. This location is used by the analog input file processing program to maintain a record of the converter number of the last file which has been checked. If the last file checked was assigned to the highest number digital to analog converter, a negative flag is placed in this location to indicate that the last converter number set was a complete set which needs no further processing. If this location LSTCVNO contains a positive number, additional analog to digital converters remain which have not been supplied with requests for data or dummy requests for data. In the preferred embodiment of the system, it is necessary to supply dummy requests for data to all such converters. Hence, program control is transferred to a "finish last analog scan set" routine which supplies dummy converter numbers to the remaining analog to digital converters so as to fill out the converter set. If the number in LSTCVNO is negative, the last converter set is complete and no further action is required. Program control then jumps to a location BUFCHK in FIG. 17/1200B.

The short routine beginning at BUFCHK checks various flags to insure that the data files which have just been processed are completely processed. If they have been completely processed, this routine checks to see if the buffer within which the data files reside has yet been released. If not, this routine calls upon the subroutine RELSBUF within the sublevel processor program to release the core buffer within which these data files reside so that a new subtask may be loaded into that same core buffer by the DISCAN program.

First, the CORDSC flag is checked to see if the linkage of data files is disk-resident. If the linkage is core-resident, then clearly no buffer needs to be released and program control returns to the start of the data file processing program SRTANL. The ANIPRG flag is then checked to see if the last group of analog to digital variables have been read into the computer. If this flag is zero or positive, the data values have not yet been read in and converted, and hence the buffer may not be released. The core address of the subtask linkage within this core buffer is retrieved from the location SBCTSK and is stored in a flag location BUFREL so that the analog input file processing program may release the core buffer within which this linkage of data files resides when the data values have been read back into core. Program control is then transferred back to SRTANL. If an analog scan is not in progress, program control commences at RELBUFA, and the flag BUFOVR is checked. If this flag contains a negative number, the buffer has already been released. A zero is placed in the flag location, and program control returns to SRTANL. if the buffer has not already been released, program control commences at RELOVZ. The sublevel number of the subtask linkage is loaded into register B, and the program return address is loaded into register A. Program control is then transferred to the subroutine RELSBUF which releases the core buffer. Program control is then transferred back to SRTANL in FIG. 17/1200A.

Once placed in operation, the data file processing program continues to run cyclically: until all subtasks which are bidding for execution and which are assigned to the data file processor program task level have been run to completion; until all demand scan requests have been processed; and until any requested sensor calibrations have been carried out. The data file processor program could make use of the sublevel processor basic entry program 10/1200 shown in FIG. 10A as do other task levels within the system. However, the handling of demand scan requests and sensor calibration requests is facilitated by having a separate basic task program built right into the data file processor program. The CHKBID subroutine is utilized by the data file processing program, and hence the more lengthy portions of the sublevel processor program are not duplicated.

I. FILE ACCESS AND ENTER SUBROUTINE

The file access and enter subroutine SFILE is shown in block diagram form in FIG. 13C. This subroutine enables calling programs to obtain data from data files without having an explicit knowledge of how the files are constructed. This program assumes that the file from which data is to be retrieved is located in a core buffer, and one of the input arguments to this subroutine specifies the location of the core buffer. The remaining input arguments specify what data calling program desires to retrieve from or place into the file. If a calling program has knowledge of the structure of a file, the calling program dowes not have to utilize the file access and enter subroutine. The purpose of this subroutine is therefore to simplify other programs by taking all of the file data retrieval routines which otherwise would appear in many programs within the system and by collecting all of these routines in one place as part of a single subroutine. The subroutine is designed to retrieve data from files formatted as shown in FIG. 15/320 through 15/321. An analogous control chain access and enter subroutine (not shown) is designed to find and/or to alter data within control chain files when supplied the address of a control chain file, with the block number of the block or module within which the desired data values reside, and with the relative address within the module of the desired data valnes.

Since this subroutine has knowledge of the structure of the various files within the system, it is necessarily a lengthy program.

An abbreviated form of this subroutine appears in FIGS. 17/1310A through 17/1310E. The subroutines which this subroutine calls upon appear in FIG. 17/1311 through 17/1313. The abbreviated program shown in FIG. 17/1310 can retrieve from a file or from locations whose addresses are in a file the value of data items to which the file relates and the addresses of the core locations where those data items may be found. It can also retrieve from a periodic contact closure input logical variable file the register and bit numbers of the associated logical variable and the normal and alarm states of the variable.

The abbreviated subroutine can handle subroutine calls in which the value of the argument NBIT equal "3" or "8". An argument FILEX is the address of the core buffer in which a file resides. The subroutine returns information to the calling program in the two argument arrays FFILEX and BDATA.

As examples of the function of this routine, the file loader program trigger connect subroutine calls upon the file access and enter subroutine to determine the address of logical variables within the system once the file for a logical variable has been found (see step 4 in FIG. 17/540). The file loader program also calls upon the subroutine to determine the address of any system variable (see step 457 in FIG. 17/500D). At another point, the file loader program calls upon the subroutine to determine the normal/alarm states of a logical variable (see step 432 in FIG. 17/500C(cont.))

The subroutine SFILE determines the file type number of the file stored in the location FILEX by retrieving the file type number from the leftmost four bit positions within the first entry of the file. The subroutine then transfers program control to an appropriate subprogram which retrieves the necessary data items from the file of which loads data items into the file. Program control is then returned to the calling program. The details regarding the way this program operates are apparent in the program listing.

J. THE DATA FILE GENERATOR PROGRAM AND THE CONTROL CHAIN GENERATOR PROGRAM

The figures beginning with FIG. 17/1501 present a program listing of the data file generator program which is shown in block diagram form in FIG. 15/100. The figures beginning with FIG. 17/1541 present a program listing of the control chain generator program which is shown in block diagram form in FIG. 15/[illegible]. In a typical installation of the present system, these programs would not necessarily reside in the same computer which is controlling the process environment, but might reside in a computer that is many hundreds of miles away. These two programs are, in essence, data translation programs which take data prepared by the systems engineer and translate the data into a form which is understandable by the operating computer system. The listings are intended to be exemplary of how translation programs of this type may be structured. The listings follow quite closely the block diagrams and are self-explanatory. The programs have no knowledge of the operating configuration which exists within any particular computer system configuration and do not have to worry about how subtasks are linked together or where files are stored within the system. The sole task of these programs is to translate the system engineer's terminology and his instructions into intermediate data files which may be loaded into the operating computer system and automatically placed into service.

In the paragraphs which follow, tables are presented listing the contents of storage locations. Each location contains either a single number or two symbols. The symbol for a blank " " is represented by underlining " ". If more than one storage location is listed, the contents of successive locations are separated by spaces. All locations whose names begin with "X" contain the hexadecimal number which is also part of the location name.

i. The Data File Generator Program

The data file generator program listing is a minimum-configuration listing which includes a minimal number of record creation subroutines such as those shown at 15106–15109 in FIG. 15/100. The subroutines which have been included are those which are necessary to assemble data which is encoded using the illustrative data presentation forms shown in FIGS. 15/101 through 15/109. The program listings are self-explanatory. The notes which follow are merely guides to aid one in relating the program listings to the block diagram 15/100 and to supply any information which is missing from the listings.

The program listing beginning with FIG. 17/1501 and continuing on through FIG. 17/1508 comprises all of the steps in the block diagram FIG. 15/100 other than the record creation subroutine steps 15106 through 15109, the print card image step 15110, the punch intermediate file output step 15113, and the file loader step 15114. The program steps which read cards, detect header cards and end cards, and read the names on each card are included within this listing. This listing also calls upon the appropriate record creation subroutine to process the data presented by the input data cards. Within this program listing, the array MATBL is a two-dimensional array of storage locations five locations wide by 35 locations long. In each row of this array, the first three locations contain two symbols each and the last two locations both contain zero.

The array MATBL appears as follows:

| | |
|---|---|
| MATBL | SH AR K_ 0 0 |
| | AN IM PX 0 0 |
| | CO NV C_ 0 0 |
| | AL AR M1 0 0 |
| | AL AR M2 0 0 |
| | FI LT ER 0 0 |
| | RA TE _ 0 0 |

-continued

| | |
|---|---|
| | CO MP _ 0 0 |
| | TY PE _ 0 0 |
| | SQ EN CE 0 0 |
| | AL AR M3 0 0 |
| | WI RE A_ 0 0 |
| | SE NS R_ 0 0 |
| | NA ME X_ 0 0 |
| | CO NS TC 0 0 |
| | LO GV AR 0 0 |
| | US RF IL 0 0 |
| | SP AR E6 0 0 |
| | SP AR E7 0 0 |
| | NA ME _ 0 0 |
| | SP AR E8 0 0 |
| | SP AR E4 0 0 |
| | WI RE B_ 0 0 |
| | PE RC CI 0 0 |
| | _ _C CO 0 0 |
| | AL LI SC 0 0 |
| | NP RC CI 0 0 |
| | SU B3 _ 0 0 |
| | SU B4 _ 0 0 |
| | SU B5 _ 0 0 |
| | SO B6 _ 0 0 |
| | SU B7 _ 0 0 |
| | SU B8 _ 0 0 |
| | SU B9 _ 0 0 |
| | SU B1 0_ 0 0 |

This array contains all of the names of record creation subroutines which may appear on input data cards in the preferred embodiment of the invention. Some of these names correspond to record creation subroutines which are shown in the pages of listing which follow. However, only a representative grouping of record creation subroutines are included here. Some of the above names are spare locations which are reserved for expansion and for the addition of additional record creation subroutines as the need arises.

Other data values used in this first routine are as follows:

| LOCATION | CONTENTS |
|---|---|
| Z | 0 |
| BLANK1 | _0 |
| BLANK2 | _ |
| TPETXT | TA PE _ |
| ENDTXT | EN D_ _ |
| CRDTXT | CK RD _ |
| DFGTXT | DF G_ _ |
| BINTXT | BI NA RY |
| PRNTXT | PR IN T_ |

The subroutines called by this main routine function as follows: "PACKS" packs arguments two through four into a single fifth word argument in accordance with a format that is designated by the first argument; "UNPACK" separates the fifth subroutine argument into dependent arguments two through four in accordance with a format specified by the first argument; "R40A2" reads data from an input device; "RCSERR" prints out error messages and specifies error numbers; and "TYPE" reads and interprets the data on "TYPE" cards and stores this data in the table MATBL, the record creation subroutine data table.

The record creation subroutine TYPE appears in FIGS. 17/1507 through 17/1508. This subroutine sets up the data file generator program to generate the type of file which is designated by a "TYPE" card. Predefined data values within this program are as follows:

| LOCATION | CONTENTS |
|---|---|
| BLANK | −0 |
| ICOMMA | ,_ |
| TYPTBL | AN AL OG CA LV AL 0 0 0<br>PC CI _ NP CC 1_ CC 0_ _<br>CN ST NT 0 0 0 0 0 0<br>LO GI CV 0 0 0 0 0 0 0 0 0 0 0 0 GE NR AL |
| D111 | 12015 |
| Z | 0 |
| ISTAR | *_ |

The record creation subroutine NAME appears in FIGS. 17/1509 and 17/1510. The logical variable "CREATE" determines whether the program runs in the create mode or in the decode mode. With reference to FISS. 15/100, all record creation subroutines operate in the decode mode when called by the program step 15015 and in the create mode when called by the programming step 15112. This comment is applicable to all of the record creation subroutines.

The record creation subroutine SHARK appears in FIG. 17/1511 and 17/1512. In this subroutine, the data value BLANK is a location containing the symbolic coding for two blank characters. The location MAX contains the number 127.

The record creation subroutine SQENCE appears in FIGS. 17/1513 and 17/1514. In this subroutine, the following definitions apply:

| LOCATION | CONTENTS |
|---|---|
| BLANK | _ |
| YY | 0_ |

The record creation subroutine ANIMPX appears in FIGS. 17/1515 and 17/1516. The array GAIN contains the following data values: 0.019, 0.039, 0.085, 0.190, 0.950, 1.9 and 12.0. The array FULSCL contains the following data values: 0.01, 0.02, 0.05, 0.1, 0.5, 1, and 10. The location BLANK contains "   ". The locations R and E contain "R   " and "E   ", respectively.

The record creation subroutine ALARM1 appears in FIG. 17/1517 to 17/1519. This subroutine includes the following predefined data values:

| LOCATION | CONTENTS |
|---|---|
| LSP | _ |
| LCS | S_ |
| LCC | C_ |
| LCF | F_ |
| LPC | %_ |

The record creation subroutine NAMEX appears in FIG. 17/1520. This subroutine includes the following predefined values:

| LOCATION | CONTENTS |
|---|---|
| BLANK1 | _0 |
| BLANK2 | _ |

The record creation subroutine CONSTC appears in FIG. 17/1521 and 17/1522. Predefined data values for this subroutine are as follows:

| LOCATION | CONTENTS |
|---|---|
| BLANK1 | _0 |
| BLANK2 | _ |
| LETTRC | C_ |
| LETTRF | F_ |
| LETTRE | E_ |
| CHKTBL | 2, 3, 5, 6, 8, 9, 11, 12<br>17, 18, 23, 24, 32, 33, 37, 38 |
| Z | 0 |

The record creation subroutine PERCCI is shown in FIG. 17/1523 and 17/1524. This subroutine includes the following predefined data values:

| LOCATION | CONTENTS |
|---|---|
| KBLANK | _ |
| KZERO | 0_ |
| KONE | 1_ |
| BLANK1 | _0 |

The record creation subroutine BEFILE is shown in FIG. 17/1525.

The subroutine RCSERR is an error message printing subroutine which is called on by the other routines within the data file generator program. This subroutine appears in FIG. 17/1526.

The subroutine shown in FIGS. 17/1527 through 17/1530 are subroutines which are called upon by the various record creation subroutines to perform miscellaneous tasks such as converting the ASII codes to hexadecimal or octal codes. The subroutine VFLD includes five arguments LA1B, KOL, VAL, INT, and REL which are specified in that order by the calling program. Predefined data values for the subroutine are as follows:

| LOCATION | CONTENTS |
|---|---|
| LSP | _ |
| LDP | _ |
| IV | _ _ _ _ |

The subroutine HEXCAV shown in FIG. 17/1528 requires as arguments the three variables IALPHA, KOL1 and IHEX in that order. The location IBLK in this program contains "  O" and the array IHEXCH is a 16 element array containing the code representations for the hexadecimal numbers from $O_{16}$ to $F_{16}$. The subroutine OCTAL shown in FIG. 17/1529 expects the four arguments IARRAY, KOL, NUMBER, and IRSLT listed in that order. The subroutine SEARCH shown in FIG. 17/1530 expects the three arguments INAME, IDEPTH, and SHRKNM in that order. Neither of these last two subroutines includes any predefined data values.

The subroutine OUTPUT shown in FIG. 17/1531 carries out the preparation of a binary output tape when a data batch from the data file generator program is ready to be transmitted to the file loader program. Within this program, OUTBUF is a symbolic name for an array of 54 storage locations, the first of which contains the hexadecimal number $FF96_{16}$. The location LCNT contains the number 3, and the location LSEQ contains the number 1.

ii. The Control Chain Generator Program Listing

The program listing of the control chain generator program begins with FIG. 17/1541 and continues on to 17/1566. FIG. 15/200 is an accurate block diagram representation of these program listings. The listings themselves are self-explanatory. The remarks which follow are intended to explain the relationship between the program listings and the block diagram (FIG. 15/200) and also to supply any details which are not present within the programs but which are desirable to give a full understanding of how each program operates.

The main program begins in FIG. 17/1541 with a step 11111 and continues through FIG. 17/1542. The main program encompasses steps 15201 through 15204 in the block diagram of FIG. 15/200. Within this main program listing the following pairs of names are references to the same locations:

MACLM1 and
MACLIM(L);
SYMLM1 and
SYMLIM(1).

Predefined data values are as follows:

| LOCATION | CONTENTS |
|---|---|
| ALGJAZ | 1420 |
| DIRDIC | CH AI N. _ BL00$_{16}$; |
| | LO GI C_ _ 3420$_{16}$; |
| | AR IT H_ _ 2420$_{16}$; |
| | EX IT _ _ 4430$_{16}$; |
| | SY MT BL _ 9100$_{16}$; |
| | MA CR 0_ _ A100$_{16}$; |
| | _ _ _ _ 6400$_{16}$; |
| | _ _ _ _ 8320$_{16}$; |
| | _ _ _ _ 7220$_{16}$; |
| | EN D_ _ _ C100$_{16}$; |
| EQBL | =_ |

The subroutine READER (FIG. 17/1543) is called by the main program or by any other program to read into core one or more card images. This subroutine corresponds to step 15201 in the block diagram. Predefined data values are as follows:

| LOCATION | CONTENTS |
|---|---|
| ASBL | *_ |
| BLBL | _ |
| CBL | C_ |

This program is thus able to recognize an asterisk, a blank, and the letter "C". Within the control chain processor program, an asterisk indicates a data card is a remark card which is to be ignored, and a C indicates a card is a continuation of the preceding card and is therefore to be considered part of the preceding card.

The extremely short subroutine NONO (FIG. 17/1544) is called upon by other routines to print out error messages.

The subroutine MODMOD (FIG. 17/1545) is called upon by the various programs comprising the control chain generator to assemble the output load records. When an output load record has been completely assembled, the subroutine MODMOD transfers that load record to a tape punch output or to some other appropriate output device. Within this program, the following pairs of names refer to the same locations: RECPOS and NXPOS; MOD(1) and MODPOD(4); RHEADR and REC(1); NREC(1) and REC(3); ITYPE and MODPOD(3). The location RHEADR contains −106.

The subroutine PAKWRD (FIG. 17/1546) is used to retrieve words from the input cards and to eliminate blank spaces. Within this subroutine, the names PAKPOS and IPOS refer to the same location. The locaion BLBL contains a pair of blanks.

The subroutine PAKNUM (FIG. 17/1547 and 17/1548) is used to extract numerical data from input card images. Within this subroutine, the following pairs of names refer to the same locations: VALUE and WORD(1); IBP and NOFS; IWP and NOIS; PP and PAKPOS. The location BLBL contains a pair of blanks and the location EQBL contains an equal sign and a blank.

The subroutine SYMREF (FIG. 17/1549) is called upon in connection with the execution of steps 15212 and 15213 in FIG. 15/200 to associate a symbol in the input data with a symbol stored within the argument table. Within this subroutine, the following pairs of names apply to the same locations: SYMLM1 and SYMLIM(1); SYMNDX and WORD(4).

The subroutine SYMDEF (FIG. 17/1550) is called upon in connection with the execution of step 15210 in FIG. 15/200. When new macro-specification data is fed into the system, as each new argument name is encountered, the subroutine SYMDEF is called upon to insure that that argument name has not already been used in connection with the algorithm, which is being defined and to add the new argument name to the table of symbols associated with the algorithm. The names SYMLM1 and SYMLIM(1) refer to the same location.

The subroutine BNOREF (FIG. 17/1551) is called upon whenever the relative address within a control chain of a particular algorithm block or module is required. This subroutine requires as an argument a value INDEX which is the relative address of a location within a control chain where the relative address of a block or module is to be placed. If the block number has already been assigned an address, this subroutine returns the address of the block as an argument REF. If this particular block has not yet been assigned an address, this subroutine returns as an argument the address (if any) of a previous location within the control chain where the same block number address is to be placed. The subroutine BNOREF then retains the address of the latest location into which this address is to be placed. By wayof explanation, this subroutine chain-links together all locations into which the system file loader program is to place the address of a block. The early portions of the control chain may then be generated without any concern about the fact that forward address references have not been completed. Within this subroutine, the names BNOVAL and REF refer to the same location.

The subroutine BNODEF (FIG. 17/1552) is called upon when the address of a particular block or module has been determined. This subroutine requires as an argument the relative address of the block stored in a location INDEX and the block number stored in a locaton BLKNO. If the address of this block is not to be placed in any previous locations within the control chain, the subroutine BNODEF simply stores the address of the block number in a table BNONDX and returns program control to the calling program. If the address is to be placed in previous locations within the control chain by the file loader program, the subroutine BNODEF loads the relative address of the most recent location into which this address is to be placed into the fourth location within an array MODPOD and then calls upon the MODMOD subroutine to create a TYPE9 address reference module (see FIG. 5H) so as to cause the file loader program to establish the necessary address linkages.

The subroutine CHAIN (FIGS. 17/1553A to D) corresponds to step 15209 in FIG. 15/200. This subroutine is called upon the create a beginning of file load module and also to set up a symbol table for the control chain which is to be created. This program not only processes the card bearing the name of the chain, but also processes cards bearing the names "LEVEL", "PERIOD", "DELTATEE", "TRIGGER", "PROCESS", "GLOBAL", "LOGICAL", "INTEGER", "REAL", or "EQUIVALENCE". All of the above terms have been explained with the exception of the last. The "EQUIVALENCE" statement is precisely equivalent to its FORTRAN counterpart and allows one variable name within a control chain to be equated with a different variable name within the system. After generating a beginning of file module and supplying this to the subroutine MODMOD, this program creates a complete symbol table of all variables used within the control chain and including a type designation for each symbol. This type designations enable the file loader program at a later time to carry out error checks and to locate symbols which are not used in accordance with their type designation. Within this program, the following pairs of names refer to the same locatons: TNAME(1) and MODPOD(4); BIT and MODPOD(4); NAME(1) and MODPOD(5); FREQ and MODPOD(8); PERIOD and MODPOD(9); RES and MODPOD(10); RVAL and WORD(1). The name "DISC" refers to two locations containing the letters "DI SC" and the name CORE refers to a pair of locations containing the letters "CO RE". The name CHNDIC refers to a five-by-ten element array of locations containing the following data values: LE VE L ; PE RI OD ; DE LT AT EE ; TR IG GE R , PR OC ES S ; GL OB AL ; LO GI CA L ; IN TE GE R ; RE AL ; EQ UI VA LE NC.

The subroutine RAPPER (FIGS. 17/1554A and B) corresponds to step 15208 in FIG. 15/200. This subroutine generates a chain end module and also clears the various system tables and prepares the tables to handle the next chain which is to created.

The subroutine LOGICAL (FIGS. 17/1555A to C) corresponds to step 15206 in FIG. 15/200. Within this subroutine, the names RDBUF(1) and WRKBUF(1) refer to the same location. The following is a list of predefined data values for this subroutine:

| LOCATION | CONTENTS |
|---|---|
| BLANK | _ |
| EQUSIN | =_ |
| LPC | PL |
| LPREN | (_ |
| OPDIC1 | NO AN OR EO |
| OPDIC2 | T_ D_ _ R_ |
| PERIOD | ._ |
| RPC | PR |
| RPREN | )_ |

The subroutine ARITH (FIG. 17/1556-A to E) corresponds to step 15205 in the block diagram of FIG. 15/200. Within this subroutine, the following pairs of names refer to the same locations: IRVAL and WORD(1); CONPOD(1) and MODPOD(6). The following locations contain predefined data:

| LOCATION | CONTENTS |
|---|---|
| NOARGS | 1, 0, 0, −1 |
| TEMPEND | 28 |
| CDIC | _ +_ −_ * _/_ _ (_ )_ |
| STAWRD | 1231 1231 1131 1131 1131 2322, 1113 2314 2324 2314 [all hexadecimal numbers] |
| LOP | −5 −4 −2 0 |
| FUNDIC | SI N_ CO S_ AT AN SQ RT AB S_ TA N_ EX P_ AL OG |
| MXSYMS | 20 |
| EQBL | =_ |
| LPC | 100 |
| RPC | 101 |
| WBLIM | 70 |

The subroutine ALGSUP (FIGS. 17/1557A to G) corresponds to steps 15212 through 15216 in the block diagram of FIG. 15/200. This subroutine creates the output data packages for all algorithm subroutines other than the subroutines ARITH and LOGIC. Within the subroutine ALGSUP, the following pairs of names refer to the same locations: MACLM1 and MACLIM(1); SYMLM1 and SYMLIM(1); ALGNAM(1) and NOCHAR; ARGNAM(1) and NOCHAR; CALTBL(1) and ICLTBL(1); WORD(1) and RVAL. The following is a list of predefined data values for this subroutine:

| LOCATION | CONTENTS |
|---|---|
| ARBEND | 200 |
| CALTBL(1) | 0.0 |
| MXCRWS | 30 |
| MXATPS | 20 |
| BLBL | _ |
| EQBL | = _ |
| ABFEND | 200 |

The subroutine SYMRDR (in FIGS. 17/1558-A and -B) corresponds to step 15207 in the block diagram of FIG. 15/200. Within the subroutine SYMRDR, the following names refer to the same locations: SYMLM1 and SYMLIM(1); NREC(1,1) and REC(2). The following is a list of predefined data values:

| LOCATION | CONTENTS |
|---|---|
| DI | DI |
| NE | NE |
| OL | OL |
| CO | CO |
| EX | EX |
| ID000 | $D000_{16}$ |

The subroutine MACROR (FIGS. 17/1559A to D) corresponds to step 15210 within the block diagram in FIG. 15/200. This program reads new macro specifications and loads then into the control chain generator translation tables. Within this program, the following pairs of names refer to the same locations: MACLM1 and MACLIM(1); ICON(1) and CONSTN; MAC1 and MAC(1); MAC2 and MAC(2); MAC3 and MAC(3); MAC4 and MAC(4); MAC5 and MAC(5); MAC6 and MAC(6); WRKBUF(1) and NCALCS; DEFBUF(3) and NOARGS; DEFBUF(2) and HEADR2; DEFBUF(1) and HEADR. The following are predefined data values:

| LOCATION | CONTENTS |
|---|---|
| DI | DI |
| OL | OL |
| BLBL | — |
| DEFEND | 256 |
| Z | 0 |

The subroutines PACK (FIG. 17/1560 and UNPACK (FIG. 17/1561) are subroutines which pack data into a single word location and unpack the data from a single word location. the subroutine R40A2 (FIGS. 17/1562A and B) is used to read input data cards into the control chain generator program. The subroutine ICKSM (FIG. 17/1563) computes the check sum number which is attached to the end of each binary load record. The subroutine LRHSMK (FIG. 17/1564) is called upon by Fortran programs and subroutines throughout the computer system to perform shifts and masking operations. The subroutine WBINRD (FIG. 17/1565) causes a tape punching device to punch out a binary record 54 words in length. The subroutine RBINRD (FIG. 17/1566 calls upon an input device to read in a binary load record 54 words in length.

For more detailed information on the computer program system and processes operated in accordance with it, reference is made to the appendices in the aforementioned patent application Ser. No. 250,826.

We claim:

1. A data gathering system for collecting data from a plurality of analog signal sources, comprising:

a digital computer system;

means for converting an analog signal into a digital value when supplied with an analog signal address, said means connecting said plurality of analog signal sources to said digital computer system;

a plurality of machine readable definitions each defining an analog signal scanning operation, and each specifying an analog signal address and a variable scanning frequency or period;

means for operating said computer system to accept and to store said definitions;

means for operating said computer system to establish linkages between groups at least portions of said stored definitions such that each group includes portions of definitions which specify the same scanning frequency or period; and means for operating said computer system to process each group of linked definition portions periodically at a rate determined by the scanning frequencies or periods specified by the definitions whose portions comprise each linked group, where processing comprises following the linkages from one definition to the next and carrying out the analog signal scanning operation called for by each definition.

2. A data gathering system in accordance with claim 1 wherein each definition is accompanied into the system by a designator which serves as a variable name, and wherein the system includes means for operating said computer system to establish a directory of designators each of which designators is stored within the directory together with the computer system address of at least a portion of the corresponding variable definition.

3. A data gathering system in accordance with claim 2 and further including means for operating said computer system to use said directory and said definitions to determine the magnitude of any given variable when supplied by another system entity with the variable designator.

4. A data gathering system in accordance with claim 2 wherein at least some of the definitions specify a variable address, said system further including definitions of executable jobs at least some of which contain references to variable addresses by designator, and which further includes means for operating said computer system to accept said job definitions and to replace designators within such job definitions with the variable addresses of the corresponding variables, said means utilizing the directory and the variable definitions to obtain said variable addresses when supplied with said designators.

5. A data gathering system in accordance with claim 2 and which includes job definitions at least some of which contain triggering references to variable designators; which further includes means for operating said computer system to accept said job definitions, to locate linked portions of the variable definitions corresponding to designators contained within such job definitions using said directory, and to include such job definitions in the linkage of definition portions with the job definition linked immediately following the portion relating to the triggering variable; and further including means for operating said computer system to execute the job defined by said definitions when such a definition is encountered during the processing of a linkage of definition portions.

6. A data gathering system in accordance with claim 2 to which is added job definitions containing identifiers some of which also contain triggering references to variable designators; and which further include means for operating said computer system to link the identifier of such job definition to the linked portion of the definition of the designated trigger variable, using said directory to locate the variable definition portion; and means for operating said computer system to initiate execution of a job definition when the identifier for the job definition is encountered during the processing of a linkage of definition portions.

7. A data gathering system in accordance with claim 2 and further including means for operating said computer system to remove any of said definitions from said computer system when supplied with the designator that accompanied the definition into the system, said removal means using the directory to locate the portion of said definition connected within a linkage, said removal means including means for re-establishing the linkage from which said definition is removed, and said removal means including means for removing the designator for a variable from the directory.

8. A data gathering system in accordance with claim 7 and further including means for operating said computer system to maintain a record of all locations previously occupied by definitions which have been removed, said record maintaining means cooperating with said acceptance and storing means to reassign previously occupied locations to definitions newly entered into the computer system.

9. A data gathering system in accordance with claim 1 which includes a plurality of said means for converting analog signals into digital values and which further includes means for operating said computer system to organize the definition portions within each linkage in such a manner that definition portions within a linkage are linked into converter sets, and the converter sets are linked to form a complete linkage, where a converter set is defined as a group of any number of definitions each of which requires the services of a different one of said means for converting.

10. A data gathering system in accordance with claim 9 to which is added means for operating said computer system to assign a priority level to each linkage of definition portions, wherein the means for operating said computer system to process includes means for processing linkages in order of their priority, and wherein means are provided to limit the number of converter sets within each linkage to a predetermined value so as to prevent the processing of a low priority linkage from substantially interfering with the prompt processing of a high priority linkage.

11. A data gathering system in accordance with claim 1 wherein the computer system includes a scheduling program containing at least one table relating the identifier to the address of each executable system job definition, wherein the means for operating the computer system to establish linkages includes means for assigning an identifier to each such linkage and means for supplying the identifier along with a linkage address to said scheduler, wherein the means for operating said computer system to process comprises means for periodically supplying each linkage identifier to said scheduler at the desired frequency rate and separate means for interpreting definition portions and for carrying out scanning operations, and wherein said scheduler includes means for supplying the address of a linkage to said means for interpreting after an identifier assigned to a linkage is supplied to said scheduler by said means for periodically supplying.

12. A method of automatically organizing analog signal variable monitor data files to facilitate the operation of a digital computer system having a plurality of analog-to-digital converters, said method comprising the steps of:

- grouping the files into groups each of which contains files assigned to a single scanning frequency or period;
- within each group, grouping the files into converter sets, where a converter set is defined as a group of any number of files each of which requires the services of a different one of said plurality of analog-to-digital converters; and
- periodically carrying out the analog scans defined by the files in each group, carrying out the scans defined by all of the files within each converter set before proceeding to carry out the scans defined by a file in any other converter set within the group.

13. A method in accordance with claim 12 wherein the grouping of files is achieved by linking the files within a group or a set into a continuous chain-linkage of files.

14. A method in accordance with claim 13 wherein the linking of files is carried out one file at a time as files are fed into the system; and wherein each new file is added into an existing linkage, if an appropriate existing linkage does exist, and into an existing converter set within that linkage, if the new file can possibly be included in an existing converter set.

15. A method in accordance with claim 13 wherein each file contains a number identifying the analog-to-digital converter whose services it requires, and wherein the files within each converter set are linked together in numerical order by converter number.

16. A data gathering system for collecting analog data from a plurality of analog signal sources, comprising:

- a digital computer system;
- means for converting an analog signal into a digital value and connecting said plurality of analog signal sources to said digital computer system;
- a plurality of machine readable definitions of analog signal scanning operations each specifying a scanning frequency or period;
- means for operating said computer system to accept and to store said definitions;
- means for operating said computer system to group at least portions of each of said definitions such that each group includes portions of definitions which specify the same scanning frequency or period and to assign an address to each such group;
- means for operating said computer system to carry out, in cooperation with said converting means, the signal scanning operations defined by a group of said portions when supplied with an address of such a group;
- a program entity within said computer system including at least one table relating group scanning frequencies or periods to group addresses, said program including means for transferring the group addresses from said table to said carrying out operations means at periodic intervals in accordance with the associated group scanning frequencies or periods; and
- means for operating said computer system to enter the address and the frequency or period of each group into said tables.

17. A data gathering system for collecting analog data from a plurality of analog signal sources, comprising: a digital computer system; means for converting an analog signal into a digital value and connecting said plurality of analog signal sources to said digital computer system;

- a plurality of machine readable definitions of analog signal scanning operations each specifying a scanning frequency or period;
- means for operating said computer system to accept and to store said definitions;
- means for operating said computer system to group at least portions of each of said definitions such that each group includes portions of definitions which specify the same scanning frequency or period and to assign an address and an identifier to each such group;
- means for operating said computer system to carry out, in cooperation with said converting means, the signal scanning operations defined by a group of said portions when supplied with an address of such a group;
- a first program entity within said computer system including at least one table relating identifiers to group addresses and including means for transferring a group address from said table to said carrying out operations means when supplied with the corresponding group identifier;
- a second program entity within said computer system including at least one table relating scanning frequencies or periods to group identifiers and including means for periodically transferring group identifiers from said table to aid first program entity at intervals governed by the related scanning frequencies or periods; and means for operating said computer system to associate the address and the identifier of each group within said first program entity tables and to associate the identifier and the scanning frequency or period of each group within said second program entity tables.

18. A data gathering system in accordance with claim 17 wherein the first program entity is a computer system job scheduler which includes means for accepting job identifiers corresponding to executable job definitions and means for executing the corresponding jobs on a priority basis in response to receipt of the identifiers from other computer system entities.

19. A data gathering system in accordance with claim 18 wherein the second program entity is a synchronizing program which controls the periodic execution of a variety of computer system executable jobs.

20. A data gathering system in accordance with claim 17 to which is added means for removing group entries from the tables within said program entities.

21. A data gathering system in accordance with claim 17 wherein the computer system includes an addressable memory and at least one mass data storage device, wherein at least some groups of definition portions are stored together in said device, wherein said first program entity includes means for temporarily transferring entire groups from said device into a portion of said addressable memory, wherein the tables within said first portion contain the mass storage address of said groups, and wherein said first program means supplies the address of the location where a group temporarily resides in said addressable memory to said carrying out operations means.

22. A signal monitoring system which automatically scans a plurality of analog signals at arbitrary frequencies and which scans several signals simultaneously whenever it is possible to do so, said system comprising:

a plurality of analog-to-digital converters each of which has plural analog inputs and each of which, when supplied with an address, scans and digitizes whatever signal is present at a correspondingly-addressed analog input to the converter and, after a finite time interval, presents a digitized value representing the magnitude of the scanned signal at a digital output;

means for connecting each analog signal to analog inputs of one of said converters;

a memory containing a plurality of addressable storage locations;

means for storing the digital values presented by said converters in said memory;

loader means for loading files into said memory each of which files contains data representing a converter identifier, an input signal address, and a frequency-of-scan designation;

means responsive to the acceptance by said loader program of a file containing a new frequency-of-scan designation for recording in said memory a linkage to said file and the frequency-of-scan of said file so that the file is established as the first file in a linkage of files all of which files are to contain the same frequency-of-scan designation;

means responsive to the acceptance by said loader program of a new file containing a frequency-of-scan designation for which a linkage has been established for locating where within the existing linkage the new file may be placed, said means including means for scanning the linkage starting with the first file in the linkage, means for examining each "converter set" of files in the linkage to determine if a file in that set already contains a converter identifier identical to the identifier within the new file, where a "converter set" is a set of files each of which contains a different converter identifier from all other files in the set, and means for transferring to the means for incorporating data indicating which converter set within the linkage the new file may be linked into or else data indicating that the new file is to be linked to the end of the linkage as the first file in a new converter set, since all other converter sets already contain a file containing the same converter identifier as the new file;

means for incorporating a new file into a linkage of files at a location determined by said means for locating, whereby the linkage of files is extended;

means for initiating sequential signal scans by said analog-to-digital converters including means for tracing a linkage of files and means for sequentially supplying the signal addresses from the traced files to the converters whose identifiers are contained within each of the files; and means for periodically retrieving from said memory and supplying to said means for initiating the linkage to each linkage of files at periodic intervals determined by the frequency-of-scan designation which is recorded, along with the linkage to each linkage of files, in said memory;

whereby a highly efficient, parallel utilizaton of the analog-to-digital converters is realized regardless of the order in which files are loaded by the loader means.

* * * * *